US005835579A

United States Patent [19]

Gersi et al.

[11] Patent Number: 5,835,579

[45] Date of Patent: Nov. 10, 1998

[54] APPARATUS AND METHODS FOR PREVENTING DISCONNECTION OF FACSIMILE TRANSMISSION OVER A NETWORK

[75] Inventors: Meir Gersi, Raanana; Felix Shogol, Petach Tikva; Elazar Ronen, Ramat Hasharon, all of Israel

[73] Assignee: Radlinx Ltd., Tel Aviv, Israel

[21] Appl. No.: 662,635

[22] Filed: Jun. 13, 1996

[51] Int. Cl.[6] .................... H04M 11/00

[52] U.S. Cl. .................... 379/100.17; 379/100.09; 379/93.05; 370/282

[58] Field of Search .................... 379/93.05, 93.06, 379/93.14, 93.15, 93.31–93.34, 100.01, 100.06, 100.09, 100.17; 358/431, 434, 435, 436, 437, 438, 439, 442, 468; 455/442; 370/522, 525, 282

[56] References Cited

U.S. PATENT DOCUMENTS

| | | | |
|---|---|---|---|
| 5,018,022 | 5/1991 | Tatsumi | 358/431 |
| 5,282,238 | 1/1994 | Berland | 358/431 |
| 5,291,546 | 3/1994 | Giler et al. . | |
| 5,448,378 | 9/1995 | Matsumoto | 358/434 |
| 5,509,050 | 4/1996 | Berland | 358/468 |
| 5,513,212 | 4/1996 | Bremer | 358/434 |
| 5,515,178 | 5/1996 | Dimolitsas et al. | 379/100.17 |
| 5,535,014 | 7/1996 | Sommer | 358/434 |
| 5,561,844 | 10/1996 | Jayapalan et al. | 455/442 |

*Primary Examiner*—Curtis A. Kuntz
*Assistant Examiner*—Stephen W. Palan
*Attorney, Agent, or Firm*—Helfgott & Karas, P.C.

[57] ABSTRACT

Facsimile transmission apparatus for transmitting and receiving facsimile messages over a network, the apparatus comprising a facsimile transmission control device operative, upon occurrence of a network transmission delay which would otherwise cause an associated local facsimile device to disconnect, to supply at least one disconnection-preventing signal to the associated local facsimile device until a signal arrives from a remote facsimile device via the network and the switchboard, a switchboard interface operative to interface between said facsimile transmission control device and the switchboard and a network interface operative to interface between said facsimile transmission control device and the network.

21 Claims, 5 Drawing Sheets

APPARATUS AND METHODS FOR PREVENTING DISCONNECTION OF FACSIMILE TRANSMISSION OVER A NETWORK

The present invention relates to apparatus and methods for facsimile transmission.

BACKGROUND OF THE INVENTION

Conventional solutions for using private networks or Internet for inter-site facsimile transmission are hard to integrate, expensive to implement and do not integrate existing, conventional fax machines with LANs.

State of the art fax servers, which effect binary file transfer to transmit faxes, are mainly suitable for new systems. They usually are not cost-effective for already-installed bases of standalone fax machines in most organizations.

A state of the art fax message system is described in U.S. Pat. No. 5,291,546 to Giller et al.

The disclosures of all publications mentioned in the specification and of the publications cited therein are hereby incorporated by reference.

SUMMARY OF THE INVENTION

The present invention seeks to provide improved apparatus and methods for inter-site facsimile transmission over private networks or Internet, preferably including integration of existing, conventional facsimile machines and/or provision of fax routing capability.

The present invention also seeks to provide a facsimile transmission system which employs existing, conventional facsimile machines, such as standard G3 facsimile machines, to send standard fax messages over the Internet or any private Internet-protocol based network (LAN or WAN).

The facsimile transmission system of the present invention preferably provides at least some and preferably all of the following advantages:

a. Reduced costs, because faxes are sent over already-paid-for leased lines, b. High quality of transmitted faxes since the digital network is more reliable than public phone lines, c. Imitation of normal fax sending routines, such that retraining of fax operators is unnecessary, d. Acknowledgement of each faxed message is received instantly and online directly from the receiving fax machine, e. Online choice of carrier: Internet, LAN/WAN or PSTN (public switched telephone network).

There is thus provided, in accordance with a preferred embodiment of the present invention, facsimile transmission apparatus for transmitting and receiving facsimile messages over a network via a switchboard, the apparatus including a facsimile transmission control device operative, upon occurrence of a network transmission delay which would otherwise cause an associated local facsimile device to disconnect, to supply at least one disconnection-preventing signal to the associated local facsimile device until a signal arrives from a remote facsimile device via the network and the switchboard, a switchboard interface operative to interface between the facsimile transmission control device and the switchboard, and a network interface operative to interface between the facsimile transmission control device and the network.

Further in accordance with a preferred embodiment of the present invention, the disconnection-preventing signal includes a NULL signal which causes the local facsimile device to hold traffic for a predetermined period.

Still further in accordance with a preferred embodiment of the present invention, the disconnection-preventing signal includes a training sequence signal.

Additionally in accordance with a preferred embodiment of the present invention, the local facsimile device includes a receiving facsimile device, the remote facsimile device includes a sending facsimile device and the signal arriving from the remote facsimile device includes a portion of a facsimile message.

Further in accordance with a preferred embodiment of the present invention, the local facsimile device includes a sending facsimile device, the remote facsimile device includes a receiving facsimile device and the signal arriving from the remote facsimile device includes an acknowledgement of a portion of a facsimile message.

Still further in accordance with a preferred embodiment of the present invention, the at least one disconnection-preventing signal includes a false acknowledgement signal.

Additionally in accordance with a preferred embodiment of the present invention, the facsimile transmission control device also includes a facsimile transmission speed adjuster operative to cause the associated local facsimile device to reduce its speed of transmission.

Also provided, in accordance with a preferred embodiment of the present invention, is a facsimile transmission method for transmitting and receiving facsimile messages over a network via a switchboard, the method including transmitting a facsimile message over a network from a sending facsimile device to a receiving facsimile device, and upon occurrence of a network transmission delay which would otherwise cause a local one of the facsimile devices to disconnect, locally supplying at least one disconnection-preventing signal to the local facsimile device until a signal arrives from the remote facsimile device via the network.

Further in accordance with a preferred embodiment of the present invention, the disconnection-preventing signal includes a NULL signal which causes the local facsimile device to hold traffic for a predetermined period.

Still further in accordance with a preferred embodiment of the present invention, the disconnection-preventing signal includes a training sequence signal.

Additionally in accordance with a preferred embodiment of the present invention, the local facsimile device includes a receiving facsimile device, the remote facsimile device includes a sending facsimile device and the signal arriving from the remote facsimile device includes a portion of a facsimile message.

Further in accordance with a preferred embodiment of the present invention, the local facsimile device includes a sending facsimile device, the remote facsimile device includes a receiving facsimile device and the signal arriving from the remote facsimile device includes an acknowledgement of a portion of a facsimile message.

Still further in accordance with a preferred embodiment of the present invention, the at least one disconnection-preventing signal includes a false acknowledgement signal.

Additionally in accordance with a preferred embodiment of the present invention, the facsimile transmission control device also includes a facsimile transmission speed adjuster operative to cause the associated local facsimile device to reduce and preferably subsequently restore its speed of transmission.

Further in accordance with a preferred embodiment of the present invention, the speed adjuster is operative to indicate to the local facsimile device that a training session has failed.

Still further in accordance with a preferred embodiment of the present invention, the facsimile message includes a last page and also including transmitting, after the last page, an additional page having a predetermined contents known to the receiving facsimile device.

Additionally in accordance with a preferred embodiment of the present invention, the additional page includes a blank page.

BRIEF DESCRIPTION OF THE DRAWINGS

The present invention will be understood and appreciated from the following detailed description, taken in conjunction with the drawings in which.

Attached herewith are the following appendices which aid in the understanding and appreciation of one preferred embodiment of the invention shown and described herein:

- Appendix A is a netlist of hardware components of facsimile transmission apparatus constructed and operative in accordance with a preferred embodiment of the present invention;
- Appendix B is a partlist for the netlist of Appendix A; and
- Appendix C is a computer listing of software components of the facsimile transmission apparatus of Appendices A–B.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1:
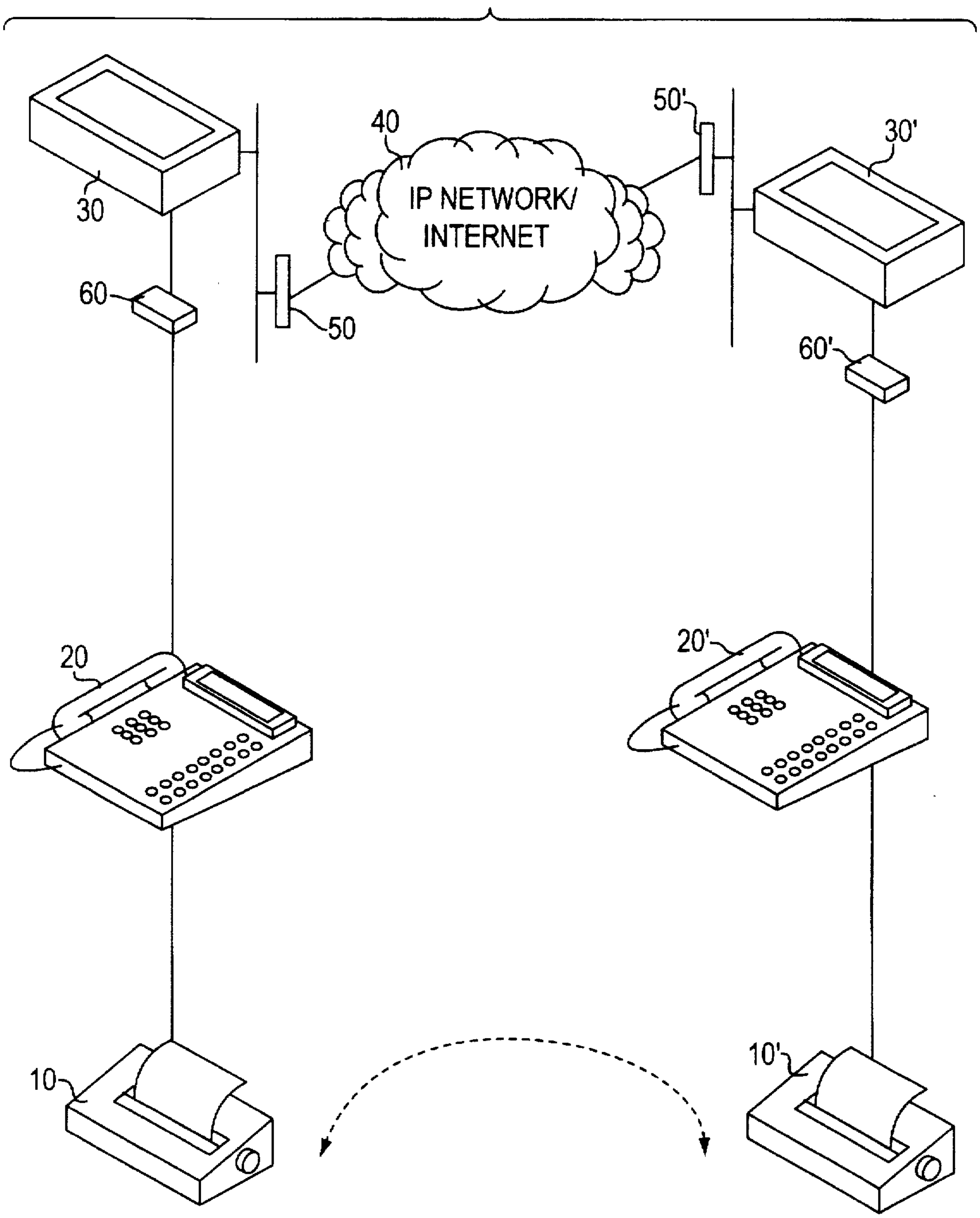
FIG. 1 is a simplified pictorial illustration of a facsimile transmission system constructed and operative in accordance with a preferred embodiment of the present invention.

FIG. 1 is a simplified pictorial illustration of a facsimile transmission system constructed and operative in accordance with a preferred embodiment of the present invention. In all of the figures, the same numbers are utilized to designate like parts. However, unprimed numbers are used to show a first sending end, prime numbers and double prime numbers are used to show the subsequent receiving end in sequence. However, it should be appreciated that communication can take place from either side to the other side and thus, either side can be used as the sending end and the other side as the receiving end.

The system of FIG. 1 includes a plurality of fax machines 10 communicating via switchboards 20 (such as PABXS), facsimile transmission control devices 30, and a network 40 such as the Internet or an IP (Internet protocol) LAN or WAN.

Each facsimile transmission control device 30 is associated with the network by means of a conventional LAN interface 50 which, in the illustrated embodiment, connects the facsimile transmission control device to any Ethernet based IP network, such as a 10BaseT/UTP or a 10Base2/BNC. Each facsimile transmission control device acts as any IP node on the network, having its own IP address and being able to access any remote facsimile transmission control device 30 across the network 40.

Each facsimile transmission control device 30 is associated with its corresponding switchboard by means of a serial interface 60 which connects the device 30, via an external fax-modem (not shown), to a local extension of the corresponding switchboard 20. Alternatively, the facsimile control device 30 may be operative to perform both switching and D/A–A/D conversions, in which case the facsimile control device may connect directly to a facsimile machine.

Preferably, each fax transmission control device 30 is operative to receive inputs from a fax operator which are provided using the internal fax keypad or an attached handset, and which do not require physical access of the fax operator to the device 30.

In the illustrated embodiment, each facsimile transmission control device 30 uses the standard G3 facsimile protocol to communicate with one or more corresponding facsimile devices 10 and uses the standard IP protocol to communicate among themselves. In this embodiment, the network 40 may comprise any LAN/WAN environment that supports IP, such as private networks based on routers or the Internet public network.

The system of FIG. 1 may be used to send a fax in either of the following ways:

a. Via PTT (public telephone) service—through the external line of switchboard 20; or b. Via the network 40, in which case the fax operator dials the local extension of the receiving fax transmission control device.

Typically, the following events occur when a call is made from a sending facsimile machine 10 to its corresponding facsimile transmission control device 30:

a. The sending facsimile control device 30 creates an IP session with the receiving control device 30 (the control device 30 associated with the receiving fax machine 10). Some initial parameters are transferred between the two control devices 30 including the number that the receiving facsimile control device has to dial in order to access the receiving fax machine 10.

b. The receiving facsimile control device 30 uses the information it received in order to call the receiving fax.

According to one embodiment of the present invention, each facsimile control device can dial to any fax machine 10 accessible to it. Alternatively, for security reasons, configuration parameters may be used to limit access to predefined destinations.

c. The connection and handshake stages of the fax transmission are effected.

d. A virtual connection is created between the sending fax machine, the fax control device 30 associated therewith, the receiving fax machine and the fax control device 30 associated therewith. The page images are now sent from the sending fax to the receiving fax.

The connection made is an end-to-end connection between the two fax machines. The sending fax control device 30 is operative to digitize the information from the sending fax machine, packetize it into IP messages and send it through the network 40. The receiving fax control device 30 reverses the above procedure and sends the resulting information to the receiving fax machine 10.

e. Once the page images are transferred, the receiving fax sends a positive or negative confirmation via the facsimile transmission control devices 30 to the sending fax machine.

The procedure for facsimile transmission using the system of FIG. 1 is described in more detail below with reference to FIGS. 4A–4B.

Figure 3:
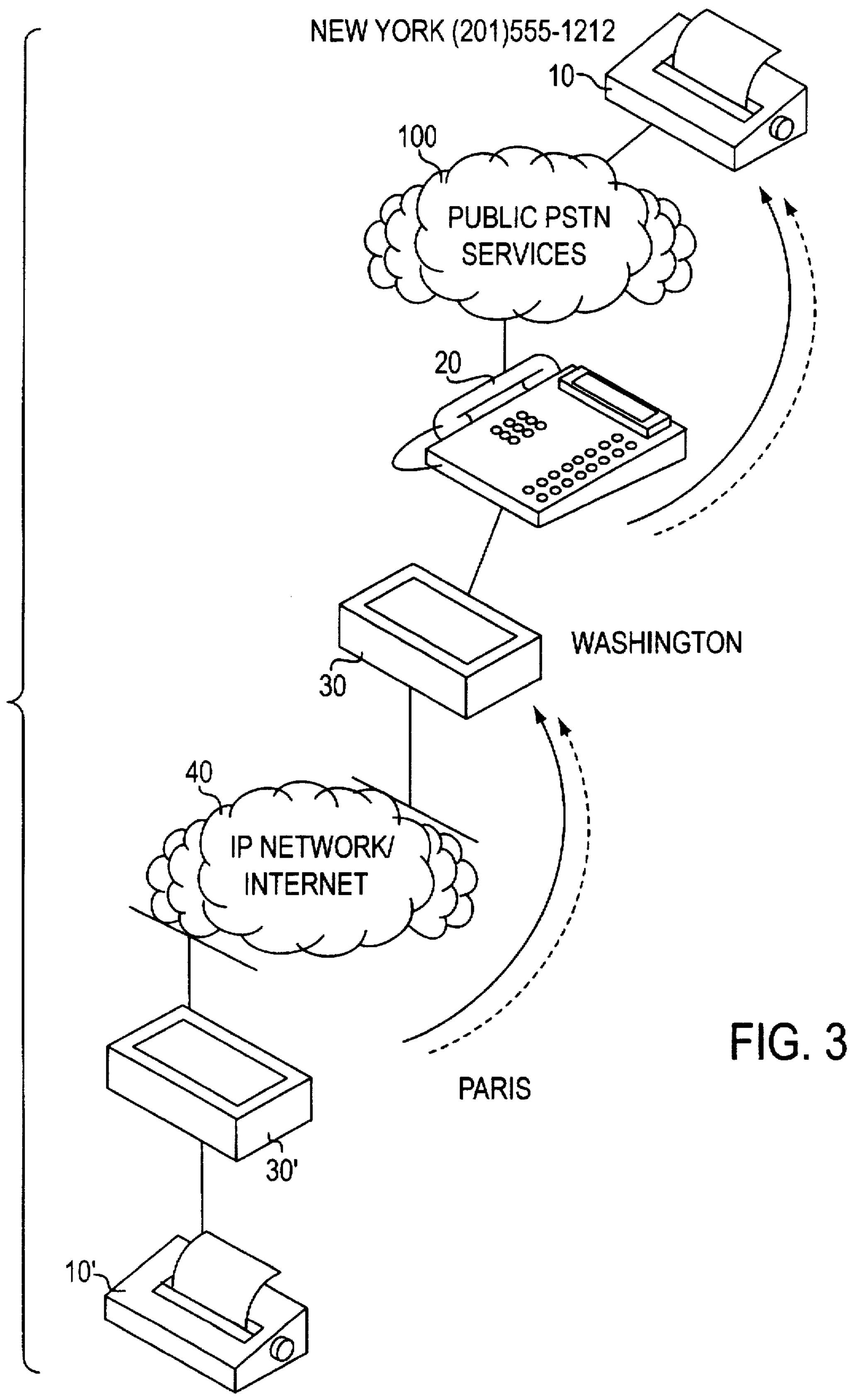
FIG. 3 is a simplified pictorial illustration of "off-net" operation of the system of FIG. 1.

Preferably, each fax transmission control device 30 has security configuration options that protect a network from misuse by unauthorized users. Preferably, a Firewall mechanism may be provided which allows the fax transmission control device to be configured in different ways to accept transmission commands, such as the following:

a. The control device 30 may be configured to call only specific IP addresses;

b. The control device 30 may be configured to accept calls from specific IP addresses;

c. The control device 30 may be configured to send faxes to internal faxes only (i.e. the off-net mode of operation described below with reference to FIG. 3 is not permitted).

Figure 2:
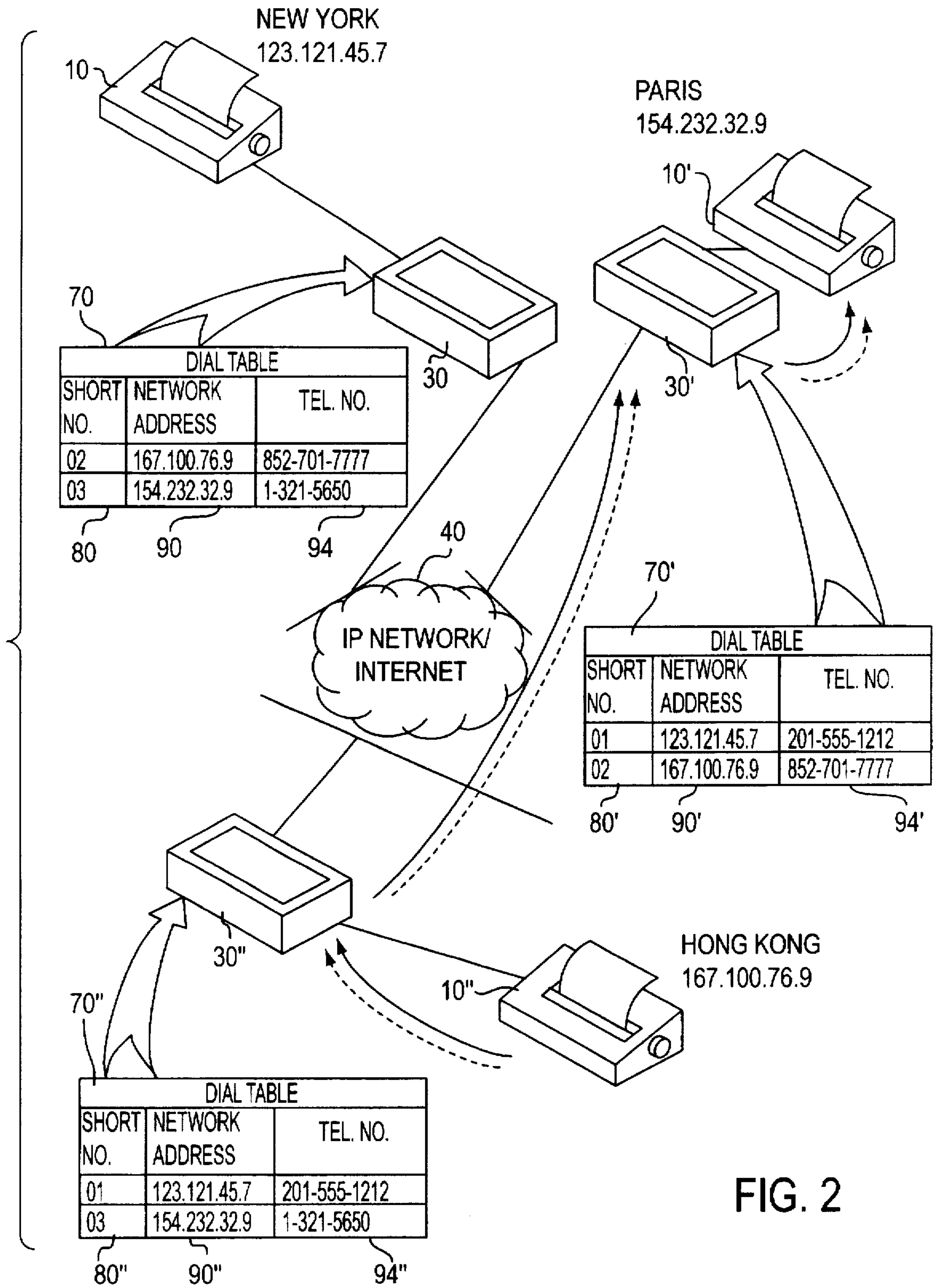
FIG. 2 is a simplified pictorial illustration of "on-net" operation of the system of FIG. 1.

FIG. 2 is a simplified pictorial illustration of "on-net" operation of the system of FIG. 1 in which the sending facsimile machine 10 and its associated fax transmission control device 30 are physically connected to the same switchboard 20 as the receiving facsimile machine 10 and its associated fax transmission control device 30.

Alternatively, the facsimile control device 30 may be operative to perform both switching and D/A–A/D conversions, in which case the facsimile control device may connect directly to a facsimile machine.

When a fax operator calls a fax transmission control device 30, s/he preferably gets a special dial tone prompting him or her to specify the fax transmission control device which is to receive the fax transmission. This may be effected in any suitable manner. For example:

Each fax transmission control device 30 may include an internal dial table 70 which stores associated pairs of short "destination numbers" 80 and network addresses (IP addresses) 90, or associated triplets of short numbers 80, network addresses 90 and telephone numbers 94. The operator inputs a relatively short destination number 80 which is translated by the dial table in the control device 30 into the IP address of the receiving fax control device 30.

In the illustrated example, if it is desired to send a fax from Hong Kong to Paris over the network 40, the operator dials the internal extension of the associated fax control device 30, waits for 2 beeps and then dials #02##, where 02 is the entry in the table of the Hong Kong fax control device that represents the Paris fax control device.

FIG. 3 is a simplified pictorial illustration of "off-net" operation of the system of FIG. 1 in which the sending facsimile machine 10 and its associated fax transmission control device 30 are not physically connected to the same switchboard. Instead, the sending facsimile machine 10 calls the control device 30 using the public telephone network 100.

In the illustrated example, the operator wishes to send a fax from Paris to New York. The New York office is not connected to the corporate backbone and has a regular phone/fax connection to the public telephone network (e.g. phone number 201 555 1212). The nearest office with a fax control device 30 connected to the corporate backbone is in Washington. Instead of placing an expensive call from Paris to New York, the operator can use the corporate backbone from Paris to Washington and the public telephone service only from Washington to New York.

To do this, the operator gains access to the local fax control device by dialing a local extension, then dials the short number of the Washington fax control device, then dials the New York phone number.

Figure 4A:
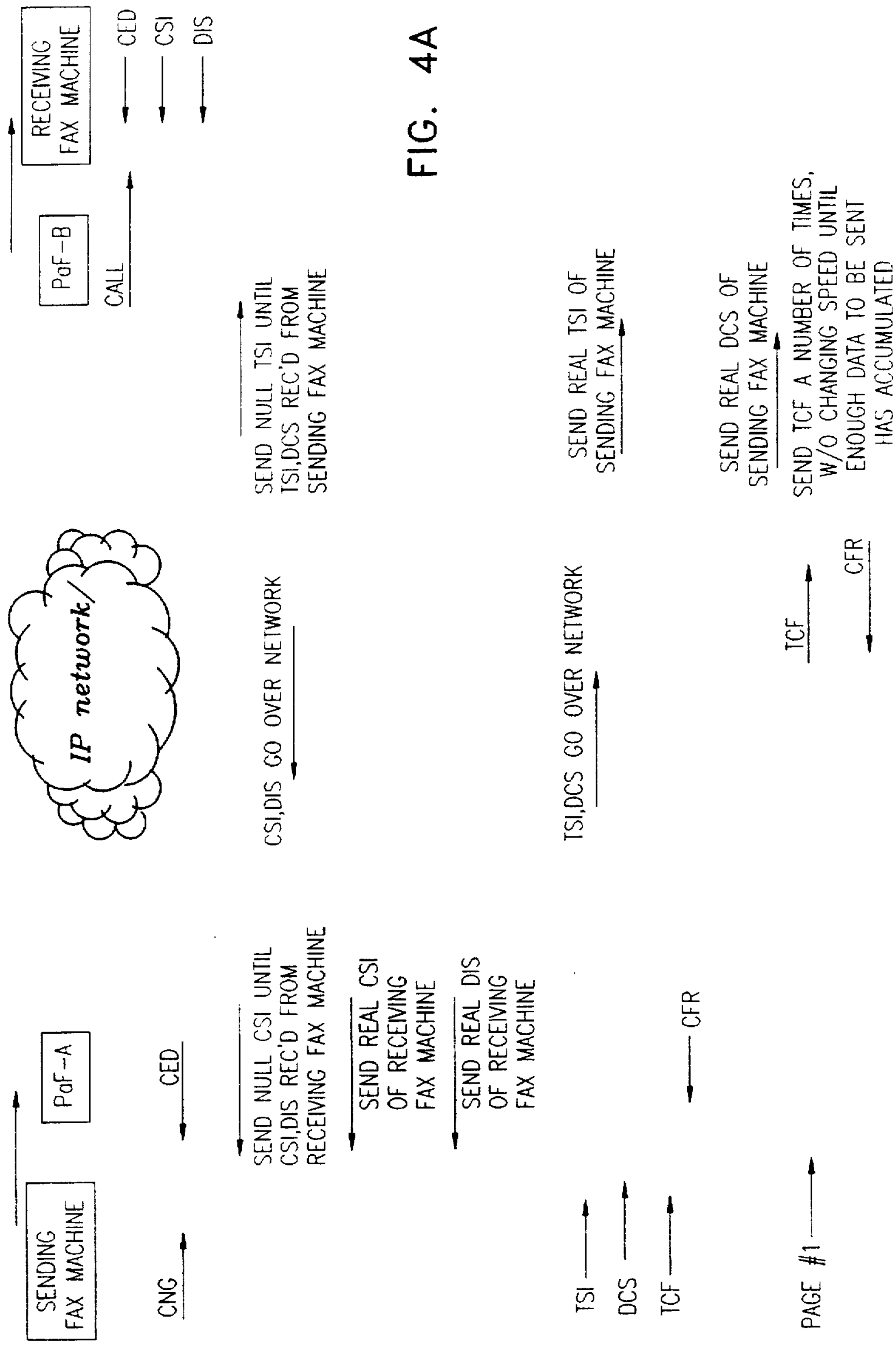
FIGS. 4A and 4B, taken together, form a timing diagram for transmission of a facsimile message using the system of FIGS. 1–3.
Figure 4B:
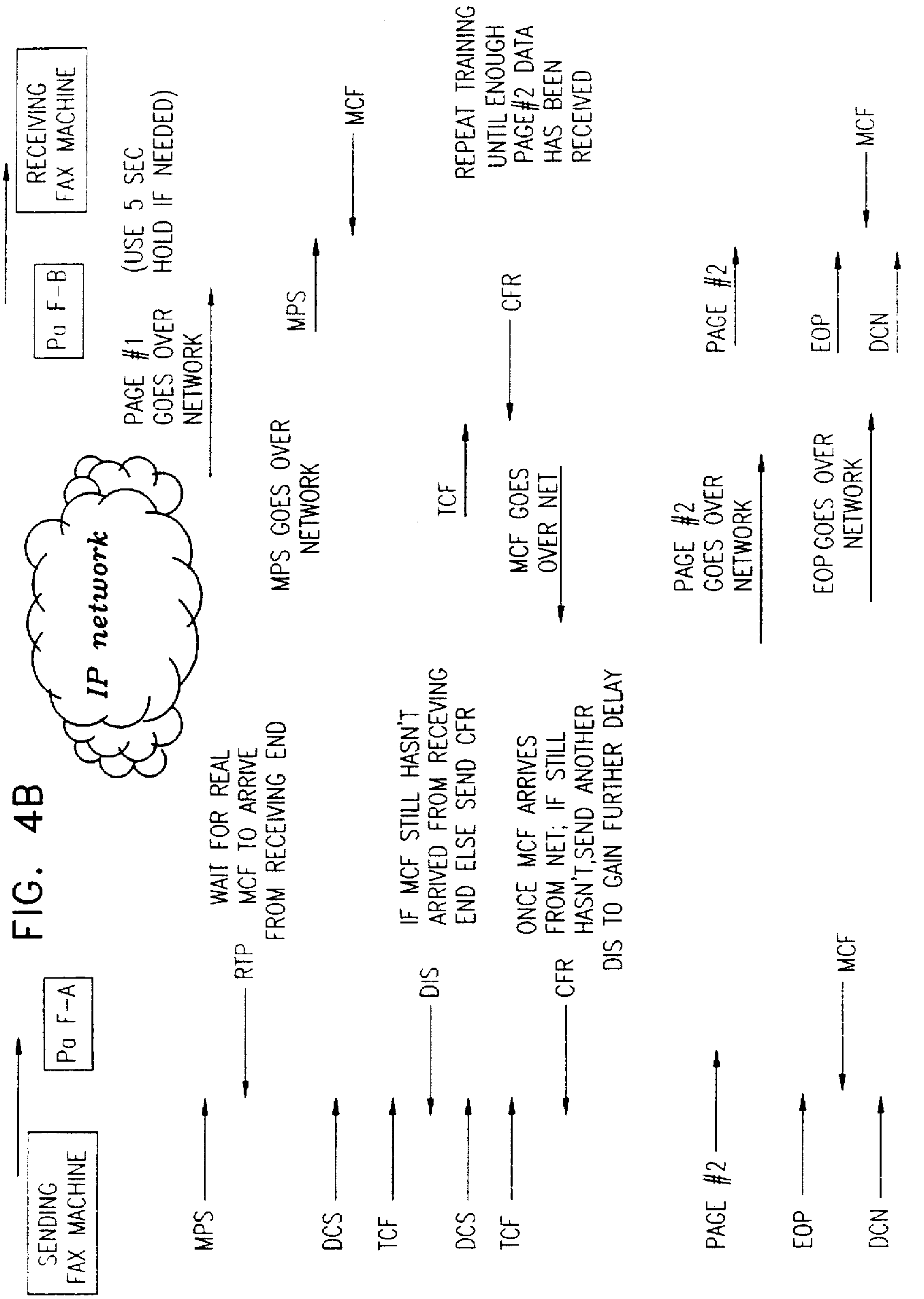

FIGS. 4A–4B, taken together, form a timing diagram for transmission of a facsimile message using the system of FIGS. 1–3. The following terminology is used in the description of FIGS. 4A–4B:

A sending facsimile machine ("sending fax") with an associated fax transmission control device ("PASSaFAX A" or "PaF-A") sends a message, via a network ("IP network") to a receiving facsimile machine ("receiving fax") with an associated fax transmission control device ("PASSaFAX B" or "PaF B").

The following table lists conventional messages that may be exchanged between the two fax machines in the diagrams of FIGS. 4A–4B. "Recv" indicates the receiving fax machine whereas "Send" indicates the sending fax machine.

| Name | Type | Sent by | Description |
|---|---|---|---|
| CED | Tone | Recv | Indicating that the answering machine is a fax |
| NSF | HDLC/300 baud | Recv (optional) | Indicating what type of non-standard facilities will be used |
| CSI | HDLC/300 baud | Recv (optional) | ID of the receiving fax |
| DIS | HDLC/300 baud | Recv | Capabilities offered by receiving fax |
| TSI | HDLC/300 baud | Send (optional) | ID of the sending machine |
| DCS | HDLC/300 baud | Send | Capabilities that will be used |
| TCF | HDLC/Variable | Send | Training sequence (1.5 seconds of 0's) |
| CFR | HDLC/300 baud | Recv | Confirm the training |
| FTT | HDLC/300 baud | Recv | Reject the training |
| EOP | HDLC/300 baud | Send | End of last page |
| MPS | HDLC/300 baud | Send | End of not last page |
| MCF | HDLC/300 baud | Recv | Confirmation of page |
| RTN | HDLC/300 baud | Recv | Rejection of page |
| RTP | HDLC/300 baud | Recv | Acceptance of page, return to TCF |

Conventional fax transmissions include the following 4 phases:

Phase A—Sending machine dials, and waits for CED tone

Phase B—Receiving fax sends NSF (optional), CSI (optional) and DIS (always present). Sending fax sends TSI (optional), DCS and TCF (training sequence of 1.5 seconds of nulls) according to the speed declared in the DCS. Receiving fax machine answers with CFR (positive) or FTT (negative).

Phase C—Sending fax sends the page image.

Phase D—Sending fax sends EOP (after last page) or MPS (after not last page) and waits for MCF or RTN. If MPS was sent, return to phase C.

According to a preferred embodiment of the present invention, the transmission process proceeds as follows:

1. The sending fax device dials to PASSaFAX "A", and specifies the destination fax, typically by dialing DTMF codes.
2. PASSaFAX "A" creates a TCP/IP or UDP/IP session with PASSaFAX "B". Alternatively, the session may be conducted in accordance with any other suitable communications protocol.

3. PASSaFAX "B" dials to the receiving fax.

A "pipe" now exists between the two faxes, through the PASSaFAX units. The data sent by any of the fax devices is digitized, typically by a fax modem, and sent in IP packets to the other side. Each IP packet includes one original HDLC frame, or a segment from the page image, which is very large piece of data. Both PASSaFAXs typically do not store the fax transmission but send the information as soon as it arrives at the destination.

Typical timing problems and solutions therefor are now described.

Regular fax transmissions are conducted over telephone links and can therefore assume constant and low delay transmission time. Fax devices have internal, relatively short time-outs that are regulated for the telephone links environment.

Facsimile transmission conducted via packet switching networks are subject to frequent and intermittent delays.

The following table lists timing sensitive locations in a fax transmission, according to the ITU T-30 standard:

| Phase | Description | Time out value (seconds) |
|---|---|---|
| A | Sending waits for CED | 30 |
| B | Receiving waits for DCS | 2 |
| | Receiving waits for TCF | 2 |
| C | Receiving fax should get image data continuously | — |
| D | Sending waits for response | 10 |

The present invention provides several methods which can be employed either separately or in any combination to overcome the timer sensitive locations. Each PASSaFAX may function either as PASSaFAX "A" or "B", according to the direction of the fax transmission for a specific fax session. These methods include:

1. Sending NULL TSIs (TSIs which do not contain any real information) to keep the fax waiting until the real data arrives from the other side.
2. Generating a training sequence phase at least once, or more than once, when waiting for the beginning of a page transmission other than the first page transmission, even though the training is not needed for the fax session, to induce the associated local fax machine to wait for information from the other side.
3. Forcing the sending fax to repeat the training after each page, if no confirmation from receiving PASSaFAX "B" has arrived within a predetermined time period, thus gaining more time to receive the confirmation. The predetermined time period is determined by the time interval within which the transmitting fax expects to receive confirmation.
4. Using the training sequence to reduce the speed in case of slow networks, e.g. by sending a negative "FTT" signal falsely indicating that a training session has failed. Conventional fax machines slow their speeds upon receipt of a negative "ack" signal.
5. Using the fax modem capability to hold traffic for periods of 5 seconds, by sending it a NULL (zero) character.
6. If confirmation still has not been received, allowing the associated local fax to send another page, by sending it a false confirmation signal. If, however, confirmation does not arrive during the transmission of next page, disconnect.
7. Add a blank or other redundant page to the transmission so the real last page of the transmission is not considered as such by the fax machine. Typically, adding a blank or other redundant page to the transmission causes the real last page to be followed by an MPS (multi-page segment) signal rather than an EOP (end of pages) signal. After an MPS signal is received, the above Method No. 3 can be employed, whereas after an EOP signal is received, the above Method No. 3 cannot be employed.

Returning again to FIGS. 4A–4B, the operation of PASSaFAX "A" (near the sending fax) is preferably as follows:

Phase Description

A Generate CED instead of getting it from PASSaFAX "B"

B Send NULL CSI until the real CSI and DIS of the receiving fax is received

Accept the training request (TCF) locally, generate response

C Nothing

D If sending fax machine sends MPS:

The page send operation is ended, but it takes time for the confirmation from the remote side to arrive. PASSaFAX "A" therefore generates RTP (instead of MCF) so the sending fax will start the TCF again, giving more time to the MCF from the other side to arrive, and if it does not arrive the PASSaFAX has a chance to terminate the session.

Reject the TCF (by DIS) if MCF still does not arrive (so this stage is repeated), and answer by CFR when it does arrive.

Use a blank or "dummy" page so the real last page is not considered as the physical last page by the sending fax.

The operation of PASSaFAX "B" (near the receiving fax) is preferably as follows:

Phase Description

A Initiate a call.

B Send NULL TSIs (as many as needed) until the real TSI and DCS sent by the sending fax are received. After each NULL TSI, restart the timer at the receiving fax.

Generate the TCF again and again, typically using the same speed, until the data buffer is filled.

C Each time the amount of data in the data buffer falls below a specific level, use the fax modem ability to hold the fax for 5 seconds. Thus when PASSaFAX "B" sees that it does not get enough data to feed the fax (the network throughput is lower than the fax session) it stops, wait for 5 seconds and continues. During this time more data arrives.

D Between pages, generate the TCF again and again, typically using the same speed, until the data buffer is filled with enough data.

A preferred method for constructing facsimile transmission apparatus operative in accordance with a preferred embodiment of the present invention, is now described.

The method is based on the following appendices:

Appendix A, which is a netlist of hardware components for facsimile transmission apparatus;

Appendix B, which is a partlist for the netlist of Appendix A; and

Appendix C, which is a computer listing of software components of the facsimile transmission apparatus of Appendices A–B.

Appendix C includes an image of the Altera U4 component of Appendix B, an image of the Altera U10 component of Appendix B and an image of code which is programmed into the EPROMs of Appendix B. The format of the first two items, which are files entitled U4.txt and U10.txt, respectively, is suitable for the Altera 7a32 component.

To construct facsimile transmission apparatus, a printed circuit is constructed based on the netlist of Appendix A and the partlist (BOM) of Appendix B, using a PCAD system. The images of Appendix C are programmed into the appropriate components. The EPROMs are programmed in Intel MCS-86 format with word width =16. The code is loaded onto two EPROMS: U12 and U13, where high bytes are on U12 and low bytes are on U13.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

Abbreviations used in the present specification include the following, as defined in the T.30 standard (ITU-T Recommendation T.30) of the International Telecommunication Union (ITU), 3/93:

NSF—Nonstandard facilities
CSI—Called subscriber identification
DIS—Digital identification signal
TSI—Transmitting subscriber identification
DCS—Digital command signal
TCF—Training check
DCS—Digital command signal
TCF—Training check
CFR—Confirmation to receive
FTT—Failure to train
EOP—End of procedure
MPS—Multipage signal
MCF—Message confirmation
RTN—Retrain negative
RTP—Retrain positive.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

```
% PASSaFAX                                        Revised:    August 30, 1995
% 1PORT.SCH                                       Revision: 1.0
% RADLINX LTD.
% PROJECT: 1PORT
% DESIGN: RAMI YONA                                              APPENDIX A
%
%
BOARD = ORCAD.PCB;

PARTS
0                  = R40,    % 0
                     R41,    % 0
                     R48,    % 0
                     R49;    % 0
0.01U              = C41,    % 0.01U
                     C48;    % 0.01U
0.1UF              = CF1,    % 0.1UF
                     C2,    % 0.1UF
                     CF2,    % 0.1UF
                     CF3,    % 0.1UF
                     CF4,    % 0.1UF
                     CF5,    % 0.1UF
                     CF6,    % 0.1UF
                     CF7,    % 0.1UF
                     CF8,    % 0.1UF
                     CF9,    % 0.1UF
                     CF10,    % 0.1UF
                     CF11,    % 0.1UF
                     CF12,    % 0.1UF
                     CF13,    % 0.1UF
                     CF14,    % 0.1UF
                     CF15,    % 0.1UF
                     CF16,    % 0.1UF
                     CF17,    % 0.1UF
                     C17,    % 0.1UF
                     CF18,    % 0.1UF
                     CF19,    % 0.1UF
                     C20,    % 0.1UF
                     CF20,    % 0.1UF
                     CF21,    % 0.1UF
                     C21,    % 0.1UF
                     C22,    % 0.1UF
                     CF22,    % 0.1UF
                     C23,    % 0.1UF
                     CF23,    % 0.1UF
                     C24,    % 0.1UF
                     CF24,    % 0.1UF
                     CF25,    % 0.1UF
                     CF26,    % 0.1UF
                     CF27,    % 0.1UF
                     CF28,    % 0.1UF
                     CF29,    % 0.1UF
                     C30,    % 0.1UF
                     CF30,    % 0.1UF
                     CF31,    % 0.1UF
                     CF32,    % 0.1UF
                     C33,    % 0.1UF
                     CF33,    % 0.1UF
                     C34,    % 0.1UF
                     CF34,    % 0.1UF
                     CF35,    % 0.1UF
                     CF36,    % 0.1UF
                     CF37,    % 0.1UF
                     C38,    % 0.1UF
                     CF38,    % 0.1UF
```

```
                CF39,     % 0.1UF
                CF40,     % 0.1UF
                CF41,     % 0.1UF
                CF42,     % 0.1UF
                CF43,     % 0.1UF
                CF44,     % 0.1UF
                CF45,     % 0.1UF
                C45,    % 0.1UF
                C46,    % 0.1UF
                CF46,     % 0.1UF
                CF47,     % 0.1UF
                CF48,     % 0.1UF
                CF49,     % 0.1UF
                CF50,     % 0.1UF
                CF51;     % 0.1UF
100           = R46,    % 100
                R70;    % 100
100K          = R15;    % 100K
100UF/16V     = C3,    % 100UF/16V
                C4,    % 100UF/16V
                C5;    % 100UF/16V
10K           = R5,    % 10K
                R6,    % 10K
                R7,    % 10K
                R13,    % 10K
                R16,    % 10K
                R19,    % 10K
                R34,    % 10K
                R42,    % 10K
                R62;    % 10K
10NF/1KV      = C6,    % 10NF/1KV
                C11;    % 10NF/1KV
10UF/16V      = C15,    % 10UF/16V
                C16,    % 10UF/16V
                C18,    % 10UF/16V
                C19,    % 10UF/16V
                C25,    % 10UF/16V
                C26,    % 10UF/16V
                C27,    % 10UF/16V
                C28,    % 10UF/16V
                C29,    % 10UF/16V
                C37,    % 10UF/16V
                C42;    % 10UF/16V
10UH          = L1,    % 10UH
                L2;    % 10UH
150UH         = L3;    % 150UH
180           = R18;    % 180
1K            = R30,    % 1K
                R76;    % 1K
1K-1%         = R74;    % 1K-1%
1K5/C         = R57;    % 1K5/C
1M            = R45;    % 1M
1M-1/4        = R2,    % 1M-1/4
                R3;    % 1M-1/4
1N4001        = D1,    % 1N4001
                D2,    % 1N4001
                D8,    % 1N4001
                D9,    % 1N4001
                D10;    % 1N4001
1N5822        = D7;    % 1N5822
1N914B        = D11,    % 1N914B
                D12,    % 1N914B
                D13,    % 1N914B
                D14;    % 1N914B
1NF/1KV       = C10;    % 1NF/1KV
```

```
2.7K            = R75;    % 2.7K
20M             = Y2;    % 20M
20MHZ           = U5;    % 20MHZ
22              = R8,    % 22
                  R9,    % 22
                  R10,    % 22
                  R11,    % 22
                  R17,    % 22
                  R20,    % 22
                  R21,    % 22
                  R23,    % 22
                  R24,    % 22
                  R25,    % 22
                  R26,    % 22
                  R27,    % 22
                  R28,    % 22
                  R29,    % 22
                  R31,    % 22
                  R33,    % 22
                  R35,    % 22
                  R36,    % 22
                  R37,    % 22
                  R38,    % 22
                  R43,    % 22
                  R44,    % 22
                  R47,    % 22
                  R54,    % 22
                  R55,    % 22
                  R57,    % 22
                  R58,    % 22
                  R59,    % 22
                  R60,    % 22
                  R63,    % 22
                  R64,    % 22
                  R71,    % 22
                  R72;    % 22
220UF/25V       = C12;    % 220UF/25V
22P             = C31,    % 22P
                  C32,    % 22P
                  C35,    % 22P
                  C36;    % 22P
270P            = C8,    % 270P
                  C9,    % 270P
                  C13,    % 270P
                  C14;    % 270P
274-1%          = R65,    % 274-1%
                  R68,    % 274-1%
                  R77,    % 274-1%
                  R78;    % 274-1%
27C040-100      = U12,    % 27C040-100
                  U13;    % 27C040-100
28C64           = U7;    % 28C64
3.6864M         = Y1;    % 3.6864M
330K            = R51,    % 330K
                  R61,    % 330K
                  R69;    % 330K
330P            = C39,    % 330P
                  C40,    % 330P
                  C43,    % 330P
                  C44,    % 330P
                  C47;    % 330P
33K             = R1,    % 33K
                  R14;    % 33K
390             = R32;    % 390
4.7K            = R4,    % 4.7K
```

```
                            R39,      % 4.7K
                            R50;      % 4.7K
4030-2                    = JP1,      % 4030-2
                            JP4;      % 4030-2
4030-3                    = JP2,      % 4030-3
                            JP3;      % 4030-3
470                       = R22,      % 470
                            R52,      % 470
                            R53,      % 470
                            R56;      % 470
470UF/16V                 = C7;     % 470UF/16V
47K                       = R12;      % 47K
47UF/10V                  = C1;     % 47UF/10V
4C16257                   = U11;     % 4C16257
64103                     = T1;     % 64103
67-1%                     = R66,      % 67-1%
                            R67;      % 67-1%
74ACT04                   = U27;      % 74ACT04
74F11                     = U30;      % 74F11
74F113                    = U21,      % 74F113
                            U22;      % 74F113
74F125                    = U24;      % 74F125
74F138                    = U23;      % 74F138
74F157                    = U28,      % 74F157
                            U31;      % 74F157
74F373                    = U25,      % 74F373
                            U26,      % 74F373
                            U29,      % 74F373
                            U32,      % 74F373
                            U33;      % 74F373
74F74                     = U20;      % 74F74
74HC14                    = U35;      % 74HC14
74HCT365                  = U34;      % 74HCT365
806-1%                    = R73;      % 806-1%
82C54PLCC                 = U2;     % 82C54PLCC
9*10K/C                   = RS1,      % 9*10K/C
                            RS2,      % 9*10K/C
                            RS3,      % 9*10K/C
                            RS4,      % 9*10K/C
                            RS5,      % 9*10K/C
                            RS6;      % 9*10K/C
BNC                       = J3;     % BNC
CON1                      = TP1,      % CON1
                            TP2;      % CON1
CON40                     = J1,     % CON40
                            J2;     % CON40
DB25(F)                   = P1;     % DB25(F)
DP83902-PLCC              = U9;     % DP83902-PLCC
DP83C92                   = U14;      % DP83C92
EPM7032/PLCC44            = U4,     % EPM7032/PLCC44
                            U10;      % EPM7032/PLCC44
LED-RED                   = D3,     % LED-RED
                            D4,     % LED-RED
                            D5,     % LED-RED
                            D6;     % LED-RED
LT1032CS                  = U18;      % LT1032CS
LT1054                    = U1;     % LT1054
LT1076-5                  = U16;      % LT1076-5
LT1134                    = U3;     % LT1134
MC26C32D                  = U19;      % MC26C32D
N80960SA-10               = U6;     % N80960SA-10
NPI6612-20                = FL1;      % NPI6612-20
PM7202                    = U15;      % PM7202
POWER JACK                = J4;     % POWER JACK
RJ45                      = P2;     % RJ45
```

```
SPARE            = SP1;    % SPARE
ST16C1550PLCC    = U8;    % ST16C1550PLCC
TL7705A          = U17;    % TL7705A

NETS

12V_9      = J4/2 C12/1 C46/1 C45/1
             U16/5 ;
VSW_9      = U16/4 D7/CATHODE L3/2 ;
RC_9       = R75/1 C41/1 ;
VC_9       = R75/2 U16/2 ;
PL_9       = R22/2 D3/CATHODE ;
A1_9       = R37/2 U27/1 ;
OC1_9      = R27/2 U24/4 ;
F1_9       = R26/2 U24/5 ;
H1_9       = R72/2 U35/1 ;
OC2_9      = R29/2 U24/1 ;
I1_9       = R64/2 U30/1 ;
H2_9       = R71/2 U35/3 ;
F2_9       = R28/2 U24/2 ;
I2_9       = R63/2 U30/2 ;
I3_9       = R43/2 U30/13 ;
CT_2       = C1/1 U17/3 ;
REF_2      = U17/1 C2/1 ;
-RSET_2    = U22/2 U22/4 U17/5 R4/1
             U22/10 ;
OC_2       = R33/1 U33/1 ;
RST_2      = U22/9 U27/9 ;
MCLK_2     = U22/1 U22/13 R23/1 ;
SR_2       = U22/6 U22/12 ;
-RST_2     = U22/8 U27/11 ;
I1_2       = R62/2 U30/3 ;
DT-R_2     = U6/68 RS1/8 ;
-RDY_2     = U30/6 U6/79 ;
CLK_2      = R24/1 U5/5 ;
20M_2      = R24/2 U27/5 U21/1 U27/3
             U27/13 U20/3 ;
M20_2      = U27/4 R20/1 ;
S20A_2     = U27/12 R17/1 ;
S20B_2     = U27/6 R38/1 ;
10M_2      = U21/5 R23/2 U20/2 ;
DCK_2      = U20/5 R21/1 ;
-10M_2     = U21/6 U21/13 ;
-2M5_2     = U20/8 U20/12 ;
2M5_2      = U20/9 R10/1 ;
5M_2       = U21/9 U20/11 ;
-OC_3      = U25/1 U29/1 U35/6 U26/1 ;
ADS1_3     = R76/1 U25/11 U29/11 U9/44 ;
I1_3       = R42/2 U30/9 ;
OC_3       = U30/8 U35/5 ;
V+_3       = U15/11 U15/14 L1/1 ;
Y2_3       = C36/1 Y2/1 R49/2 ;
Y1_3       = C35/1 Y2/2 R48/1 ;
V-_3       = U15/10 U15/15 L2/1 ;
DO-_3      = R77/2 T1/8 U9/73 ;
DO+_3      = U9/74 R78/2 T1/7 ;
X1_3       = U9/69 R40/2 R48/2 ;
TX-_3      = T1/9 U14/8 ;
TX+_3      = T1/10 U14/7 ;
X2_3       = U9/70 R41/2 R49/1 ;
RX-_3      = T1/12 RS7/6 U14/6 ;
RX+_3      = T1/13 RS7/5 U14/3 ;
CD-_3      = T1/15 RS7/3 U14/2 ;
CD+_3      = T1/16 RS7/2 U14/1 ;
DI-_3      = U9/78 T1/5 ;
```

```
DI+_3     = U9/79 T1/4 ;
RR+_3     = U14/11 R74/1 ;
RR-_3     = U14/12 R74/2 ;
CI-_3     = U9/80 T1/2 ;
RXI_3     = U14/14 D14/ANODE J3/CENTER ;
TXO_3     = U14/15 D14/CATHODE ;
CI+_3     = U9/81 T1/1 ;
TXOD-_3   = U9/54 R65/1 ;
TXD+_3    = R65/2 R66/2 R73/1 FL1/1 ;
TXO+_3    = U9/55 R66/1 ;
TX0-_3    = U9/56 R67/1 ;
TXOD+_3   = U9/57 R68/1 ;
RXI+_3    = U9/61 R70/1 FL1/6 ;
RXI-_3    = U9/62 R70/2 FL1/8 ;
PCT1_3    = C39/1 FL1/2 ;
SCT1_3    = C40/1 FL1/15 ;
TXD-_3    = R73/2 R67/2 R68/2 FL1/3 ;
TXP+_3    = FL1/16 P2/1 C9/1 ;
TXP-_3    = FL1/14 C8/1 P2/2 ;
SEL_3     = U9/71 R50/1 ;
RXP+_3    = P2/3 FL1/11 C13/1 ;
-SNI_3    = U9/83 R39/1 ;
TEST_3    = U9/52 R47/1 ;
RXP-_3    = P2/6 FL1/9 C14/1 ;
PCT2_3    = FL1/7 C44/1 ;
SCT2_3    = FL1/10 C43/1 ;
ERR_4     = U4/17 D13/ANODE ;
DERR_4    = D13/CATHODE R69/1 C34/1 U35/9 ;
-EL_4     = U35/8 R56/1 ;
EL_4      = R56/2 D6/CATHODE ;
G0_4      = U2/13 R9/1 ;
LAN_4     = U4/6 D11/ANODE ;
DLAN_4    = D11/CATHODE R51/1 C30/1 U35/11 ;
-LL_4     = U35/10 R52/1 ;
LL_4      = R52/2 D4/CATHODE ;
FDI_4     = R5/2 JP2/2 U34/12 ;
GPI_4     = R34/2 JP3/2 U34/14 ;
-REF_4    = U2/12 U2/18 U2/21 U10/19 ;
G1_4      = U2/17 R11/1 ;
-TICK_4   = U2/16 U4/24 ;
-IORD_4   = U34/15 U4/34 ;
G2_4      = U2/19 R8/1 ;
-WDI_4    = U2/20 U24/12 ;
PRT_4     = U4/21 D12/ANODE ;
DPRT_4    = D12/CATHODE R61/1 C33/1 U35/13 ;
-PL_4     = U35/12 R53/1 ;
PL_4      = R53/2 D5/CATHODE ;
-WDEN_4   = U4/12 U24/13 ;
-WDO_4    = U24/11 JP4/1 ;
-CAS_4    = U10/39 U4/40 ;
DMA_C_4   = U10/14 U4/31 ;
-PRDY_4   = U10/40 U4/20 ;
RES_7     = R12/2 U18/12 ;
-DTR_7    = U8/23 U18/2 U3/15 ;
DTR_7     = U18/3 P1/20 U3/11 ;
TXD_7     = U8/10 U18/5 U3/19 ;
TD_7      = U18/6 U3/7 P1/2 ;
VCAT_7    = D8/CATHODE D1/ANODE C15/1 ;
-RTS_7    = U8/22 U18/11 U3/17 ;
RTS_7     = U18/10 P1/4 U3/9 ;
VO_7      = U1/5 D9/CATHODE C4/2 ;
CAP+_7    = C15/2 C16/1 U1/2 ;
CAP-_7    = U1/4 C16/2 C19/1 ;
VAN_7     = D9/ANODE C19/2 D10/CATHODE D2/ANODE ;
CTS_7     = U19/7 U3/8 R1/1 P1/5 ;
```

```
-CTS_7     = U8/25 U19/5 U3/18 ;
REF_7      = U19/6 U19/14 R16/2 R15/1 ;
RXD_7      = U8/9 U19/11 U3/20 ;
RD_7       = U19/9 U3/6 R13/1 P1/3 ;
DSR_7      = U19/15 R14/1 U3/10 P1/6 ;
-DSR_7     = U8/26 U19/13 U3/16 ;
RDG_7      = U19/10 R13/2 P1/16 ;
V+_7       = C17/1 U3/1 ;
C1+_7      = C20/1 C21/1 U3/3 ;
V-_7       = C22/2 U3/24 ;
C1-_7      = C20/2 C21/2 U3/4 ;
C2+_7      = C24/1 C23/1 U3/22 ;
C2-_7      = C24/2 C23/2 U3/23 ;
X1_7       = Y1/2 C31/1 R45/1 U8/12 ;
X_7        = Y1/1 C32/1 R46/1 ;
X2_7       = R46/2 R45/2 U8/13 ;
XA1_6      = U28/4 R36/1 ;
DRA1_6     = R36/2 U11/16 ;
XA2_6      = U28/7 R58/1 ;
DRA2_6     = R58/2 U11/17 ;
XA3_6      = U28/9 R57/1 ;
DRA3_6     = R57/2 U11/18 ;
XA4_6      = U28/12 R31/1 ;
DRA4_6     = R31/2 U11/19 ;
GL_6       = R25/2 U28/15 ;
XA5_6      = U31/4 R60/1 ;
DRA5_6     = R60/2 U11/22 ;
XA6_6      = U31/7 R59/1 ;
DRA6_6     = R59/2 U11/23 ;
XA7_6      = U31/9 R54/1 ;
DRA7_6     = R54/2 U11/24 ;
XA8_6      = U31/12 R44/1 ;
DRA8_6     = R44/2 U11/25 ;
GH_6       = R35/2 U31/15 ;
DRA9_6     = R55/2 U11/26 ;
-AS_1      = U6/76 RS1/6 U4/9 U10/5
             J1/20 ;
-BE0_1     = U6/52 RS1/9 U10/36 J1/28 ;
-BE1_1     = U6/51 RS1/10 U10/27 J1/29 ;
-CSEP_1    = U23/15 U13/22 U12/22 ;
-BLAST_1   = U6/69 U10/32 U4/32 J1/21 ;
-EPOE_1    = U4/36 U13/24 U12/24 ;
W-R_1      = U6/66 U4/27 U10/4 J1/19 ;
-DEN_1     = U6/67 RS1/7 U34/1 ;
HLDA_1     = U6/61 U32/1 U30/10 U9/45
             U4/14 U10/20 J2/16 ;
-LOCK_1    = U6/70 JP1/2 R32/1 R18/1
             J2/17 ;
-NVCS_1    = U10/13 U7/20 ;
-WD_1      = U17/2 R6/2 JP4/2 ;
-POE_1     = U9/37 U2/26 U10/12 U8/16
             U7/22 ;
CLK2_1     = R20/2 U6/55 U10/43 U4/43 ;
-LGRDY_1   = U30/4 U9/43 U4/28 ;
-PWE_1     = U9/36 U2/27 U10/21 U8/14
             U7/27 ;
DCLK_1     = R21/2 U10/9 U4/2 ;
-TMIRQ_1   = U6/57 U4/13 ;
BCLK2_1    = R17/2 J1/25 ;
ETCLK_1    = R38/2 U9/40 R40/1 ;
TMCLK_1    = R10/2 U2/10 ;
-CSTMR_1   = U23/12 U2/24 ;
-CSDB1_1   = U23/9 J1/17 ;
-CSDB2_1   = U23/7 J1/18 ;
-DBRDY_1   = U30/5 R7/2 J1/22 ;
```

```
ETINT_1    = U6/58 U9/5 ;
URINT_1    = U6/59 U8/18 ;
-DBINT_1   = U6/60 R19/2 J1/16 ;
DRMUX_1    = U10/41 U4/39 U28/1 U31/1 ;
HOLD_1     = U6/64 U30/11 U9/46 J2/15 ;
ALE_1      = U33/11 U32/11 U6/78 R30/2
             U26/11 U9/32 U4/25 ;
XA9_1      = U10/26 R55/1 ;
RESET_1    = U27/10 U8/24 ;
-ACK_1     = U9/38 U10/25 ;
-RAS_1     = U4/16 U10/38 U11/14 ;
-RESET_1   = U27/8 U6/56 U23/6 U9/53
             U10/1 U4/1 J1/15 ;
-MRD_1     = U9/35 U10/33 ;
-CASL_1    = U10/37 U11/29 ;
-MWR_1     = U9/34 U10/29 ;
-CASH_1    = U10/34 U11/28 ;
-DROE_1    = U10/31 U11/27 ;
-ETCS_1    = U9/33 U10/18 ;
-DRWE_1    = U10/28 U11/13 ;
AUI_1      = U9/72 U4/18 ;
GDLNK_1    = U9/67 U34/10 ;
-UCS_1     = U10/17 U8/11 ;
A1_1       = U6/49 U9/11 U26/5 U4/4
             U2/22 J1/30 U8/21 U7/10
             RS5/2 U12/12 U13/12 ;
A2_1       = U6/46 U9/10 U26/6 U4/5
             U2/23 J1/31 U8/20 U7/9
             RS5/3 U12/11 U13/11 ;
A3_1       = U6/45 U9/9 U26/9 U4/44
             J1/32 U8/19 U7/8 RS5/4
             U12/10 U13/10 ;
A4_1       = U32/12 U9/8 U26/12 J1/33
             U28/14 U7/7 RS5/5 U12/9
             U13/9 ;
A5_1       = U32/15 U26/15 J1/34 U31/2
             U7/6 RS5/6 U12/8 U13/8 ;
A6_1       = U32/16 U26/16 J1/35 U31/5
             U7/5 RS5/7 U12/7 U13/7 ;
A7_1       = U32/19 U26/19 J1/36 U31/11
             U7/4 RS5/8 U12/6 U13/6 ;
A8_1       = U33/2 J2/18 U31/14 U7/3
             RS5/9 U12/5 U13/5 ;
A9_1       = U33/5 U10/7 J2/19 U7/25
             RS5/10 U12/27 U13/27 ;
A10_1      = U33/6 J2/20 U28/3 U7/24
             RS6/2 U12/26 U13/26 ;
A11_1      = U33/9 J2/21 U28/6 U7/21
             RS6/3 U12/23 U13/23 ;
A12_1      = U33/12 J2/22 U28/10 U7/23
             RS6/4 U12/25 U13/25 ;
A13_1      = U33/15 J2/23 U28/13 U7/2
             RS6/5 U12/4 U13/4 ;
A14_1      = U33/16 J2/24 U31/3 RS6/6
             U12/28 U13/28 ;
A15_1      = U33/19 J2/25 U31/6 RS6/7
             U12/29 U13/29 ;
A16_1      = U6/16 U29/2 J2/26 U31/10
             RS6/8 U12/3 U13/3 ;
A17_1      = U6/15 U29/5 J2/27 U31/13
             RS6/9 U12/2 U13/2 ;
A18_1      = U6/14 U29/6 U10/16 J2/28
             RS6/10 U12/30 U13/30 ;
A19_1      = U6/13 RS2/2 U29/9 J2/29
             U12/31 U13/31 ;
```

```
A20_1       = U6/12 RS2/3 U29/12 J2/30 ;
A21_1       = U6/11 RS2/4 U29/15 J2/31 ;
A22_1       = U6/10 RS2/5 U29/16 J2/32 ;
A23_1       = U6/9 RS2/6 U29/19 ;
A24_1       = U6/8 RS2/7 U25/2 ;
A25_1       = U6/5 RS2/8 U25/5 ;
A26_1       = U6/4 RS2/9 U25/6 ;
A27_1       = U23/1 U6/3 RS2/10 U25/9
              U4/7 U10/2 ;
A28_1       = U23/2 U6/83 RS1/2 U25/12
              U4/8 U10/44 J2/33 ;
A29_1       = U23/3 U6/82 RS1/3 U25/15
              U4/11 U10/6 J2/34 ;
A30_1       = U23/4 U6/81 RS1/4 U25/16
              U4/19 U10/8 J2/35 ;
A31_1       = U23/5 U6/80 RS1/5 U25/19
              U4/29 U10/11 J2/36 ;
D0_1        = U6/41 U9/12 U29/3 U4/26
              U2/9 J1/1 U11/2 RS3/2
              U13/13 ;
D1_1        = U6/40 U9/13 U26/4 U29/4
              U2/8 J1/2 U11/3 RS3/3
              U13/14 ;
D2_1        = U6/39 U9/14 U26/7 U29/7
              U2/7 U34/3 J1/3 U11/4
              RS3/4 U13/15 ;
D3_1        = U6/38 U9/15 U26/8 U29/8
              U2/6 U34/5 J1/4 U11/5
              RS3/5 U13/17 ;
D4_1        = U6/37 U32/13 U9/16 U26/13
              U29/13 U2/5 U34/7 J1/5
              U11/7 RS3/6 U13/18 ;
D5_1        = U6/36 U32/14 U9/17 U26/14
              U29/14 U2/4 U34/9 J1/6
              U11/8 RS3/7 U13/19 ;
D6_1        = U6/35 U32/17 U9/18 U26/17
              U29/17 U2/3 U34/11 J1/7
              U11/9 RS3/8 U13/20 ;
D7_1        = U6/30 U32/18 U9/19 U26/18
              U29/18 U2/2 U34/13 J1/8
              U11/10 RS3/9 U13/21 ;
D8_1        = U6/29 U33/3 U9/20 U25/3
              J2/1 U8/1 U11/31 U7/11
              RS4/2 U12/13 ;
D9_1        = U6/28 U33/4 U9/21 U25/4
              J2/2 U8/2 U11/32 U7/12
              RS4/3 U12/14 ;
D10_1       = U6/27 U33/7 U9/22 U25/7
              J2/3 U8/3 U11/33 U7/13
              RS4/4 U12/15 ;
D11_1       = U6/26 U33/8 U9/23 U25/8
              J2/4 U8/4 U11/34 U7/15
              RS4/5 U12/17 ;
D12_1       = U6/25 U33/13 U9/28 U25/13
              J2/5 U8/5 U11/36 U7/16
              RS4/6 U12/18 ;
D13_1       = U6/24 U33/14 U9/29 U25/14
              J2/6 U8/6 U11/37 U7/17
              RS4/7 U12/19 ;
D14_1       = U6/20 U33/17 U9/30 U25/17
              J2/7 U8/7 U11/38 U7/18
              RS4/8 U12/20 ;
D15_1       = U6/19 U33/18 U9/31 U25/18
              J2/8 U8/8 U11/39 U7/19
              RS4/9 U12/21 ;
```

```
MA1_1     = U4/41 U28/2 ;
MA2_1     = U4/38 U28/5 ;
MA3_1     = U4/37 U28/11 ;
VCC       = SP1/16 R40/1 R63/1 R71/1
            R64/1 U30/14 R29/1 R72/1
            U35/14 U24/14 R27/1 R37/1
            U27/14 D3/ANODE L3/1 U16/1
            C7/1 C42/1 C37/1 C29/1
            C28/1 C27/1 C26/1 C25/1
            C18/1 CF51/1 CF50/1 CF49/1
            CF48/1 CF47/1 CF46/1 CF45/1
            CF44/1 CF43/1 CF42/1 CF41/1
            CF40/1 CF39/1 CF38/1 CF37/1
            CF36/1 CF35/1 CF34/1 CF33/1
            CF32/1 CF31/1 CF30/1 CF29/1
            CF28/1 CF27/1 CF26/1 CF25/1
            CF24/1 CF23/1 CF22/1 CF21/1
            CF20/1 CF19/1 CF18/1 CF17/1
            CF16/1 CF15/1 CF14/1 CF13/1
            CF12/1 CF11/1 CF10/1 CF9/1
            CF8/1 CF7/1 CF6/1 CF5/1
            CF4/1 CF3/1 CF2/1 CF1/1
            U20/13 U21/11 U21/12 U21/10
            U20/10 U20/1 U23/16 U20/14
            U21/14 U21/3 U21/2 U20/4
            U21/4 U9/8 R18/2 R62/1
            RS1/1 U6/73 U6/71 U6/62
            U6/6 U6/53 U6/47 U6/44
            U6/33 U6/31 U6/21 U6/17
            U6/1 RS2/1 U22/14 R4/2
            U17/7 U32/20 U33/20 U17/8
            R39/2 R50/2 U9/4 U9/77
            U9/76 U9/60 U9/59 U9/47
            U9/27 U9/1 U15/24 U15/1
            R42/1 U26/20 U29/20 U25/20
            U4/35 U4/23 U4/15 U4/3
            U10/35 U10/23 U10/15 U10/3
            R6/1 D5/ANODE R8/2 R11/2
            D4/ANODE R9/2 U34/16 U2/28
            R34/1 R5/1 D6/ANODE R7/1
            R19/1 J2/37 J2/38 J2/39
            J2/40 J1/37 J1/38 J1/39
            J1/40 U8/28 U3/2 R15/2
            U19/16 U19/4 U1/8 R12/1
            D8/ANODE U11/20 U11/6 U11/1
            U31/16 U28/16 U7/28 RS6/1
            RS4/1 U12/1 U13/1 RS3/1
            RS5/1 U12/32 U13/32 ;
GND       = SP1/8 U30/7 R28/1 U35/7
            U24/7 R26/1 U27/7 R22/1
            TP2/1 C7/2 D7/ANODE C41/2
            C45/2 C46/2 C12/2 J4/1
            U16/3 TP1/1 C42/2 C37/2
            C29/2 C28/2 C27/2 C26/2
            C25/2 C18/2 CF51/2 CF50/2
            CF49/2 CF48/2 CF47/2 CF46/2
            CF45/2 CF44/2 CF43/2 CF42/2
            CF41/2 CF40/2 CF39/2 CF38/2
            CF37/2 CF36/2 CF35/2 CF34/2
            CF33/2 CF32/2 CF31/2 CF30/2
            CF29/2 CF28/2 CF27/2 CF26/2
            CF25/2 CF24/2 CF23/2 CF22/2
            CF21/2 CF20/2 CF19/2 CF18/2
            CF17/2 CF16/2 CF15/2 CF14/2
            CF13/2 CF12/2 CF11/2 CF10/2
```

```
              CF9/2 CF8/2 CF7/2 CF6/2
              CF5/2 CF4/2 CF3/2 CF2/2
              CF1/2 U23/8 U20/7 U21/7
              JP1/1 R32/2 U5/4 U6/84
              U6/77 U6/74 U6/72 U6/7
              U6/63 U6/54 U6/48 U6/43
              U6/34 U6/32 U6/22 U6/18
              U22/7 U22/11 U22/3 R33/2
              U32/10 U33/10 C1/2 U17/4
              U32/4 U32/3 U32/7 U32/8
              C2/2 U9/58 U9/63 U9/75
              U9/82 U9/3 U9/64 U9/49
              U9/39 U9/26 U9/2 C47/2
              C48/2 C44/2 R47/2 C39/2
              R41/1 R2/2 C6/2 U15/12
              U15/13 R77/1 R78/1 C35/2
              C36/2 R76/2 R30/1 U26/10
              U29/10 U25/10 U26/3 U4/42
              U4/30 U4/22 U4/10 U10/42
              U10/30 U10/22 U10/10 C33/2
              R61/2 U2/14 JP2/1 JP3/1
              U34/8 C30/2 R51/2 C34/2
              R69/2 J1/24 J1/23 J1/26
              J1/27 J2/10 J2/9 J2/11
              J2/12 J2/13 J2/14 J1/10
              J1/9 J1/11 J1/12 J1/13
              J1/14 U8/15 C31/2 C32/2
              U3/13 P1/7 C22/1 C17/2
              R16/1 C3/1 D2/CATHODE U19/12
              U19/8 R14/2 R1/2 U1/3
              C4/1 U18/7 U18/15 C5/2
              U11/40 U11/35 U11/21 U31/8
              R35/1 U28/8 R25/1 U7/14
              U12/16 U13/16 ;
VDD         = U14/10 U14/16 C10/1 R3/1
              J3/SHIELD C11/1 U14/9 R2/1
              C6/1 L1/2 C38/1 ;
VEE         = U14/13 U14/5 U14/4 RS7/1
              L2/2 C38/2 ;
RFG         = C47/1 C48/1 C43/2 C9/2
              C8/2 C13/2 C14/2 C40/2
              C11/2 R3/2 C10/2 ;
+V          = C5/1 D1/CATHODE U18/16 U18/4 ;
-V          = D10/ANODE C3/2 U18/1 ;
.
```

PASSaFAX
1PORT.SCH
Bill Of Materials

Revised: October 1, 1995
Revision: 1.1
Page 1 of 4

| Item | Qty. | Reference | Part | Comments |
|---|---|---|---|---|
| 1 | 1 | U14 | DP83C92 | |
| 2 | 1 | U19 | MC26C32D | Option |
| 3 | 1 | U7 | 28C64 | |
| 4 | 1 | U27 | 74ACT04 | |
| 5 | 2 | U21,U22 | 74F113 | |
| 6 | 1 | U30 | 74F11 | |
| 7 | 1 | U24 | 74F125 | |
| 8 | 1 | U23 | 74F138 | |
| 9 | 2 | U28,U31 | 74F157 | |
| 10 | 1 | U20 | 74F74 | |
| 11 | 1 | U35 | 74HC14 | |
| 12 | 1 | U34 | 74HCT365 | |
| 13 | 1 | U17 | TL7705A | |
| 14 | 1 | U2 | 82C54PLCC | |
| 15 | 1 | U18 | LT1032CS | Option |
| 16 | 1 | U11 | 4C16257 | |
| 17 | 1 | U1 | LT1054 | Option |
| 18 | 2 | R2,R3 | 1M-1/4 | |
| 19 | 1 | R74 | 1K-1% | |
| 20 | 4 | R65,R68,R77,R78 | 274-1% | |
| 21 | 4 | R40,R41,R48,R49 | 0 | Option |
| 22 | 2 | R70,R46 | 100 | |
| 23 | 9 | R5,R6,R7,R13,R16,R19,R34, R42,R62 | 10K | |
| 24 | 1 | R15 | 100K | Option |
| 25 | 1 | R45 | 1M | |
| 26 | 1 | R18 | 180 | |

PASSaFAX
1PORT.SCH
Bill Of Materials

Revised: October 1, 1995
Revision: 1.1
Page 2 of 4

| Item | Qty. | Reference | Part | Comments |
|---|---|---|---|---|
| 27 | 33 | R8,R9,R10,R11,R17,R20, R21,R23,R24,R25,R26,R27, R28,R29,R31,R33,R35,R36, R37,R38,R43,R44,R47,R54, R55,R57,R58,R59,R60,R63, R64,R71,R72 | 22 | |
| 28 | 1 | R75 | 2.7K | |
| 29 | 2 | R14,R1 | 33K | Option |
| 30 | 3 | R51,R61,R69 | 330K | |
| 31 | 1 | R32 | 390 | |
| 32 | 4 | R22,R52,R53,R56 | 470 | |
| 33 | 5 | R4,R30,R39,R50,R76 | 4.7K | |
| 34 | 1 | R12 | 47K | Option |
| 35 | 1 | RS7 | 1K5/C | |
| 36 | 6 | RS1,RS2,RS3,RS4,RS5,RS6 | 9*10K/C | |
| 37 | 2 | L1,L2 | 10uH | |
| 38 | 2 | C11,C6 | 10nF/1KV | |
| 39 | 1 | C10 | 1nF/1KV | |
| 40 | 1 | C1 | 47uF/10V | |
| 41 | 1 | C7 | 470uF/16V | |
| 42 | 1 | C12 | 220uF/25V | |
| 43 | 2 | C41,C48 | 0.01u | |
| 44 | 64 | CF1,CF2,C2,CF3,CF4,CF5, CF6,CF7,CF8,CF9,CF10, CF11,CF12,CF13,CF14,CF15, CF16,CF17,C17,CF18,CF19, CF20,C20,CF21,C21,CF22, C22,CF23,C23,CF24,C24, CF25,CF26,CF27,CF28,CF29, CF30,C30,CF31,CF32,CF33, C33,CF34,C34,CF35,CF36, CF37,CF38,C38,CF39,CF40, CF41,CF42,CF43,CF44,CF45, C45,CF46,C46,CF47,CF48, CF49,CF50,CF51 | 0.1uF | |

PASSaFAX
1PORT.SCH
Bill Of Materials

Revised: October 1, 1995
Revision: 1.1
Page 3 of 4

| Item | Qty. | Reference | Part | Comments |
|---|---|---|---|---|
| 45 | 4 | C31,C32,C35,C36 | 22p | |
| 46 | 5 | C39,C40,C43,C44,C47 | 330p | |
| 47 | 11 | C15,C16,C18,C19,C25,C26, C27,C28,C29,C37,C42 | 10uF/16V | |
| 48 | 1 | D7 | 1N5822 | |
| 49 | 4 | D11,D12,D13,D14 | 1N914B | |
| 50 | 5 | D1,D2,D8,D9,D10 | 1N4001 | Option |
| 51 | 4 | D3,D4,D5,D6 | LED-RED | + SPACER |
| 52 | 1 | U5 | 20MHz | |
| 53 | 1 | Y2 | 20M | Option |
| 54 | 1 | Y1 | 3.6864M | |
| 55 | 2 | TP1,TP2 | CON1 | |
| 56 | 2 | JP1,JP4 | 4030-2 | |
| 57 | 2 | JP3,JP2 | 4030-3 | |
| 58 | 2 | J2,J1 | CON40 | |
| 59 | 1 | P2 | RJ45 | |
| 60 | 1 | P1 | DB25(F) | |
| 61 | 1 | J4 | POWER JACK | |
| 62 | 2 | U10,U4 | EPM7032/PLCC44 | |
| 63 | 1 | L3 | 150uH | |
| 64 | 1 | FL1 | NPI6612-20 | |
| 65 | 1 | T1 | 64103 | |
| 66 | 1 | U9 | DP83902-PLCC | |
| 67 | 1 | U6 | N80960SA-10 | |
| 68 | 5 | U25,U26,U29,U32,U33 | 74F373 | |
| 69 | 1 | U8 | ST16C1550PLCC | |
| 70 | 1 | U16 | LT1076-5 | |

PASSaFAX
1PORT.SCH
Bill Of Materials

Revised: October 1, 1995
Revision: 1.1
Page 4 of 4

| Item | Qty. | Reference | Part | Comments |
|---|---|---|---|---|
| 71 | 1 | U3 | LT1134 | |
| 72 | 1 | U15 | PM7202 | |
| 73 | 2 | R67,R66 | 67-1% | |
| 74 | 1 | R73 | 806-1% | |
| 75 | 3 | C3,C4,C5 | 100uF/16V | 'Option' |
| 76 | 4 | C8,C9,C13,C14 | 270p | |
| 77 | 1 | J3 | BNC | |
| 78 | 2 | U13,U12 | 27C040-100 | |
| 79 | 1 | R100 | 1K-1/8W | |
| 80 | 1 | SP1 | SPARE | |

Mar 27 18:20 1996 ...txt Page 1

```
0000    50 4f 46 00 0c 00 01 00  06 00 00 00 01 00 1c 00   P.F.............
0010    00 00 56 65 72 73 69 6f  6e 20 33 2e 35 30 20 39   ..Version 3.50 9
0020    2f 31 35 2f 39 33 00 02  00 0f 00 00 00 43 50 4a   ..............EPM
0030    37 30 33 31 4c 43 34 34  2a 31 32 00 03 00 01 00   7C1L1244-12.....
0040    00 00 00 05 00 02 00 00  00 10 00 11 00 30 07 00   ..............0..
0050    00 00 00 00 00 00 00 50  59 00 00 01 00 ff ef fe   .......PY.......
0060    de 7f ff f7 f6 df ff ff  ff ff ff ff ff ff ff ff   ................
0070    ff ff ff ff ff ff ff ff  ff ff ff ff ff ff ff ff   ................
*
0090    ff ff ff ff ff ef df de  ff ff ff fe ff ff ff ff   ................
00a0    ff ff ff ff ff ff ff ff  ff ff ff ff ff ff ff ff   ................
*
01a0    ff ff ff ff ff ff ff ff  ef bf ee 7f ff dc f7 df   ................
01b0    7c ee ff ff ff ff ff ff  ff ff ff 7c ee ff ef be   |...........|...
01c0    ee 7f ff f7 f7 df 7c ee  ff ef fe de 7f ff df f6   ......|.........
01d0    df 7c ee ff ff ff ff f7  ff ff ff ff ff ff ff ef   .|..............
01e0    ff ed ff ff ff ff ff ff  ff ff df f7 ff ff ff ff   ................
01f0    fd ff ff ff ff ef bb ed  ff fd ff ff ff ff ff ff   ................
0200    ff ff ff ff ff ff ff ff  ff ff ff ff ff ff f7 ff   ................
0210    ff ff ff ff ff ff ef 7f  fd ff ff ff ff ff ff ff   ................
0220    ff ff fe fd ff ff d7 f7  df ff ff 00 00 00 00 00   ................
0230    00 00 00 00 00 00 ff ff  ff ff ff ff ff ff ff ff   ................
0240    ff 00 00 00 00 00 00 00  00 00 00 00 ff ff ff ff   ................
0250    ff ff ff ff ff ff ff ff  ff ff ff ff ff ff ff ff   ................
*
02b0    ff ff ff ff ff ff ff ff  ff ff ff ff fe ff ff ff   ................
02c0    e7 f7 df ff ff ff ff fe  fd ff ff db f7 df ff ff   ................
02d0    00 00 00 00 00 00 00 00  00 00 00 ff ff ff ff ff   ................
02e0    ff ff ff ff ff ff 00 00  00 00 00 00 00 00 00 00   ................
02f0    00 ff ff 7f ed ff ff ff  fe ff ff ff ff ff fd fd   ................
0300    ff ff db f7 df ff ff 00  00 00 00 00 00 00 00 00   ................
0310    00 00 ff ff ff ff ff ff  ff ff ff ff ff 00 00 00   ................
0320    00 00 00 00 00 00 00 00  ff ff ff ff ff ff ff ff   ................
0330    ff ff ff ff ff ff ff ff  ff ff ff ff ff ff ff ff   ................
*
0390    ff ff ff ff ff ff ff df  fe ff ff ff e7 f5 5f ff   .............._.
03a0    ff ff df ff ff ff ff ff  fe 7f ff f7 ff ef bf ed   ................
03b0    ff fe ff ff bf ff ff ff  ff 7f dd ff ff ff fe 7f   ................
03c0    ff f7 ff ff ff ff f7 ff  ff ff ff ff ff df 7f f5   ................
03d0    ff ff ff e7 7f fc ef ff  5f 7f f7 ff ff ff ff ff   ........_.......
```

Mar 27 15:20 1996 ui0.txt Page 2

```
03e0    ff bf ff 9f ff fd ff ff  ff e7 7f fd ff fe 5f 7f   ..............._
03f0    fb ff ff ff ff ff ff ff  df ff ff ff ff f7 ff ff   ................
0400    ff ff ff ff ff ff ff ff  ff ff ff ff ff ff ff ff   ................
0410    fb 7f db ff ff ff ff ff  ff ff ff db 7f fd ff ff   ................
0420    ff df ff ff f7 ff f7 7f  ed ff ff ff ef ff ff ff   ................
0430    ff ff ff ff f7 ff ff ff  ff ff ff ff ff ff ff ff   ................
0440    ff ff ff ff ff ff ff ff  ff ff 7f ff ff ff ff f7   ................
0450    ff 00 00 00 00 00 00 00  00 00 00 00 ff ff ff ff   ................
0460    ff ff ff ff ff ff ff ff  ff ff ff f7 ff ff ff ff   ................
0470    ff ff 7b 7f fb ff ff ff  ff ff bf ff ff ff ff ff   ..{.............
0480    ff ff ff ff f5 ff ff fe  00 00 00 00 00 00 00 00   ................
0490    00 00 00 ff ff ff ff ff  ff ff ff ff ff ff ff ff   ................
04a0    ff ff f7 ff ff ff ff ff  ff ff df ff ff ff ff ff   ................
04b0    df ff ff ff bf ff ff ff  ff ff ff ff ff ff ff 7f   ................
04c0    7f f7 ff ff ff ff ff ef  ff ff ff ff ff ff ff ff   ................
04d0    ff ff ff ff ff 00 00 00  00 00 00 00 00 00 00 00   ................
04e0    ff fb 7d de ff f7 db 6f  fd ff ff ff fb 7f ee ff   ..}....o........
04f0    ff ff df ff ff ff ff db  5d ed ff ff db 7f fd ff   ........].......
0500    ff ff fb bf de ff ff ff  df ff ff ff ff ff ff ff   ................
0510    f7 ff ff ff ff ff ff ff  ff fd ff ff ff e7 7f fd   ................
0520    ff ff bf ff ff ff ff ff  ff ff ff ff ff 7f 7f f7   ................
0530    bf ff ff ff ff ff ff ff  ff ff ff ff ff ff ff ff   ................
0540    ff ff ff 00 00 00 00 00  00 00 00 00 00 00 ff ff   ................
0550    7d ed ff ff db 7f fd ff  ff ff fb 7f ff ff ff ff   }...............
0560    ff ff ff ef ff fb bf ed  ff ff ff df ff ff ff ff   ................
0570    ff 7f ed ff ff ff ef ff  ff ff ff ff ff ff f7 ff   ................
0580    ff ff ff ff ff ff ff f7  ff ff ff ff ef ff ff ff   ................
0590    00 00 00 00 00 00 00 00  00 00 00 5f bf ff ff ff   ..........._....
05a0    ff ff ff ff ff ff ff ff  ff fb ff ff ff ff ff ff   ................
05b0    ff 00 00 00 00 00 00 00  00 00 00 00 5f df f5 ff   ............_...
05c0    ff ff e7 5f fd ff ff ef  ff ff ff ff ff ff ff ff   ..._............
05d0    ff ff df ff fb ff ff ff  ff ff bf ff ff 5f bf ff   ............._..
05e0    ff ff ff ff ff ff ff ff  df ff f7 ff ff bf ff ff   ................
05f0    ff ff ff 9f 7f fd ff ff  ff e7 7f fd ff ff 7f 7f   ................
0600    f5 ff ff ff e7 5f fd ff  ff af bf f7 ff ef ff ff   ....._..........
0610    df ff ff ff 5f bf ff ff  ff ff ff df ff ff ff 6f   ...._..........o
0620    7f ff ff ff ff ff ff ff  ff ff ff ff fd ff ff ff   ................
0630    db 7f fd ff ff ef ff ff  ff ff ff ff ff ff ff ff   ................
0640    db ff fb ff ff ff ff ff  ff ff ff 5f bf ff ff ff   ..........._....
0650    ff ff ff ff ff ff df ff  f7 ff ff 7f ff ff ff ff   ................
```

Apr 27 18:20 1996 u1c.txt Page 3

```
0660    ff ff ff ff de ff ff ff  ff ff ff ff ff ff fd ff   ................
0670    ff ff e7 7f fd ff ff 5f  7f ff ff ff ff ff ff ff   ........_.......
0680    ff ff ff ff ff ff ff fb  ff ff ff ff ff 00 00 00   ................
0690    00 00 00 00 00 00 00 00  fb ff ff ff ff ff ff ff   ................
06a0    bf ff ff ff 7f ff ff ff  fe ff ff ff ff ff fe bf   ................
06b0    ff ff ff ff ff ff ff ff  ff ff ff ff ff ff ff ff   ................
06c0    ff ff ff ff 00 00 00 00  00 00 00 00 00 00 00 5b   ...............[
06d0    7f fb ff ff ff ff ff bf  ff ff 9f ff fe ff ff ff   ................
06e0    ff ff ff ff ff af bf f5  ff df f7 e7 6f fd ff ff   ............o...
06f0    af bf f7 ff df ff bf ef  ff ff ff af be fb ff ff   ................
0700    ff ff ff ff ff ff 9f ff  ff ff ff ff fb ff ff ff   ................
0710    ff 9f ff ff ff ff ff df  ff ff ff ff 9f ff ff ff   ................
0720    ff ff ff ff fe ff ff 9f  ff ff ff ff ff ff bf ff   ................
0730    ff ff 7f bf ff ff ff ff  ff df ff ff ff 2f f8 82   ............./..
0740    2f f0 02 2f f0 02 12 9a  91 3d fe 02 2f d0 e3 3d   /../.....=../..=
0750    fe 02 2f 00 91 10 1a a1  10 db b1 3b 0e a1 3b 0e   ../........;..;.
0760    a1 3d 3a e2 20 3c e2 3d  98 c3 20 0c c2 d8 45 22   .=:. <.=.. ...E"
0770    c6 59 01 a4 05 10 05 13  16 4e 89 47 24 5a f1 00   .Y.......N.G$Z..
0780    c0 c3 c3 ff 33 cc cc 08  00 02 00 00 00 f9 a5      ....3..........
078f
```

Mar 27 18:20 1996 u4.txt Page 1

```
0000   50 44 46 00 00 00 01 00  06 00 00 00 01 00 15 00   PDF.............
0010   00 00 56 65 72 73 69 6f  6e 20 33 2e 33 30 20 39   ..Version 3.30 9
0020   2f 31 35 2f 39 33 00 02  00 0f 00 00 00 45 50 4d   /15/93.......EPM
0030   37 30 33 32 4c 43 34 34  2d 31 32 00 03 00 01 00   7032LC44-12.....
0040   00 00 00 05 00 02 00 00  00 00 00 11 00 36 07 00   .............6..
0050   00 00 00 00 00 00 00 50  39 00 00 01 00 ff ff fe   .......P9.......
0060   ff 7f fe ef fd ff ff ff  ff ff ff fb ff ff ff ff   ................
0070   ff ff ff ff ff f7 ff ff  ff ff ff ff ff ff ff ff   ................
0080   ff ff ff ff ff ff ff ff  ef 00 00 00 00 00 00 00   ................
0090   00 00 00 00 ff ff ff ff  ff ff ff ff ff ff ff ff   ................
00a0   ff ff ff ff ff ff ff ff  ff ff ff ff ff ff ff ff   ................
*
00c0   ff ff ff ff ff ff ff ff  ff ff ff ff ff fe ff 7f   ................
00d0   fd ef fd ff ff ff ff ff  ff fb ff ff ff ff ff ff   ................
00e0   ff ff ff f7 ff ff ff ff  ff ff ff ff ff ff ff ff   ................
00f0   ff ff ff ff ff ff fe 00  00 00 00 00 00 00 00 00   ................
0100   00 00 ff ff ff ff ff ff  ff ff ff ff ff ff ff ff   ................
0110   ff ff ff ff ff ff ff ff  ff ff ff ff ff ff ff ff   ................
*
01e0   fe ff bf fe df fd ff ff  ff ff ff ff fb ff ff ff   ................
01f0   ff ff ff ff 00 00 00 00  00 00 00 00 00 00 00 ff   ................
0200   ff ff ff ff ff ff ff ff  ff f7 ff ff f7 ff ff ff   ................
0210   ff ff ff ff ff ff ff fe  ff bf fd df fd ff ff ff   ................
0220   00 00 00 00 00 00 00 00  00 00 00 00 00 00 00 00   ................
0230   00 00 00 00 00 00 ff ff  ff ef ff ff ff ff ff ff   ................
0240   ff df ff ff ff ff ff ff  ff ff ff ff ff ff ff ff   ................
0250   ff ff ff ff ff ff ff ff  ff ff ff ff ff ff ff ff   ................
*
02b0   ff ff ff ff ff ff ff ff  ff ff ff ff fe ff 7f fe   ................
02c0   df fd ff ff ff ff ff ff  fb ff ff ff ff ff ff ff   ................
02d0   ff ff f7 ff ff ff ff ff  ff ff ff ff ff ff ff ff   ................
02e0   ff ff ff ff fb ff 00 00  00 00 00 00 00 00 00 00   ................
02f0   00 ff ff fe ff 7f fd df  fd ff ff ff ff ff ff fb   ................
0300   ff ff ff ff ff ff ff ff  ff f7 ff ff ff ff ff ff   ................
0310   ff ff ff ff ff ff ff ff  ff ff ff fe ff 00 00 00   ................
0320   00 00 00 00 00 00 00 00  ff ff ff ff ff ff ff ff   ................
0330   ff ff ff ff ff ff ff ff  ff ff ff ff ff ff ff ff   ................
*
03a0   ff ff ff ff fb ff ff ff  ff ff ff ff ff ff f7 ff   ................
03b0   ff ff ff ff ff ff ff ff  ff ff ff ff ff ff ff ff   ................
```

Mar 27 18:20 1996 u4.txt Page 2

```
03c0   7f ff 00 00 00 00 00 00  00 00 00 00 00 ef fe ff   ................
03d0   ff ff f7 fb ff ff ff ff  ff ff ff ff ff ff 7f df   ................
03e0   ff ff ff ff ff ff ff f7  ff ff ff ff ff ff ff ff   ................
03f0   ff ff ff ff ff ff ff ff  ff 00 00 00 00 00 00 00   ................
0400   00 00 00 00 df fe ff ff  ff fb fb ff ff ff ff fa   ................
0410   fe ff ff df df ff ff ff  ff ff fe ff ff ff ef ef   ................
0420   ff ff ff ff ff ff ff ff  ff ff ff ff ff 7f ff ff   ................
0430   00 00 00 00 00 00 00 00  00 00 00 ed bf fd ff de   ................
0440   df db ff ff ff ff ef b9  fd ff ff ff ff fe ff ff   ................
0450   ff ed bd fd ff df df ff  fe ff ff ff ef bb fa ff   ................
0460   fe ff db ff ff ff ff ef  bf fd ff 7e ff eb ff ff   ................
0470   ff ff ef fd fd ff ff f7  ff fd ff ff ff ff ff ff   ................
0480   ff ff ff ff f7 ff c4 ff  ff ff ff ff f7 ff ff ff   ................
0490   ff ff ff ff ff ff ff ff  ff ff ff ff ff ff 00 00   ................
04a0   00 00 00 00 00 00 00 00  00 df fd fd ff ff fb ff   ................
04b0   fd ff ff ff 7f ff ff ff  ff ff ff ff ff 3f b5 ff   .............?..
04c0   ff ff ff f7 ff ff ff ff  ff ff ff ff ff ff ff ff   ................
04d0   ff ff ff ff ff 00 00 00  00 00 00 00 00 00 00 00   ................
04e0   ff bd fd ff 7f ff ff fe  ff ff ff ff ff 7f df ff   ................
04f0   ff ff ff ff ff ff f7 ff  bd 67 bf ff fd fd dd ff   .........g......
0500   ff ff df fd df 7f ff ff  ff ff ff ff ff ff ff ff   ................
0510   f7 ff ff ff ff ff ff ff  fe ff ff fe ff db ff ff   ................
0520   ff ff ff ff fe fd ff ff  ff ff ff ff ff f7 ff fd   ................
0530   7a ff ff fd fd dd ff ff  ff ff ff ff ff ff ff ff   z...............
0540   ff ff ff ff ff ff ff f7  ff ff ff ff ff ff ff fe   ................
0550   ff ff fd ff eb ff ff ff  ff ff ff 7f df ff ff ff   ................
0560   ff ff ff ff f7 ff bd a7  bf ff fd fd dd ff ff ff   ................
0570   df 7d ff 7f ff ff ff ff  ff ff ff ff ff ff f7 ff   .}..............
0580   ff ff ff ff ff f7 ff fd  f7 ff ff fd fd dd ff ff   ................
0590   ff ff ff ff ff ff ff ff  ff ff ff ff ff ff ff ff   ................
*
05b0   ff ff ff ff ff ff ff ff  ff ff ff ff ff fd fd ff   ................
05c0   fe ff df fd ff ff ff f7  ff ff f7 ff ff fd ff de   ................
05d0   ff ff fd ff ff ff df df  ff ff ff ff ff ff fe ef   ................
05e0   ff ff ff ff ff ff ff ff  00 00 00 00 00 00 00 00   ................
05f0   00 00 00 ff ff bf ef ff  ff ff ff ff ff fe ff ff   ................
0600   fd ff 7f ff ff ff ff ff  ff ff ff fe ff bf ff ff   ................
0610   ff ff ff ff ff ff 7f df  ff ff ff ff ff ff ff ff   ................
0620   ff ff ff f7 ff ff ff ff  ff ff ff fd fd ff fd ff   ................
0630   ef fd ff ff ff ff f6 fb  fe bf ff ff ff fb ff ff   ................
```

Mar 27 13:20 1996 u4.txt Page 3

```
0640   ff f7 fb fe af ff ff ff  fb ff ff fe f7 fb fe bf   ................
0650   ff ff ff fb ff ff ff f7  fb fe bf ef ff ff fb ff   ................
0660   ff fd bf fd ff df dd fb  ff ff ff ff ff 7d fd ff   ................
0670   ff fe ff fd ff ff ff fd  fd fd ff df df ff fe ff   ................
0680   ff ff ff bb fd ff ff fd  fb ff ff ff ff ff ef fd   ................
0690   ff 7f fd fb ff ff ff ff  ff bd fd ff ff fd ff fd   ................
06a0   ff ff ff ff fd fd ff 7f  ff ff fe ff ff ff ff 7e   ................
06b0   ff ff ff fe fb ff ff ff  ff ff be ff ff ff fd fb   ................
06c0   ff ff ff ff ff f9 fd ff  ff ff ff fe ff ff ff ef   ................
06d0   bd fd ff 7f ff ff fe ff  ff ff ff ff fe ff ff ff   ................
06e0   ff ff f7 ff ff f7 ff fd  bb ff ff fd fd d9 ff ff   ................
06f0   ff ff ff ff ff ff ff ff  ff ff ff ff ff ff ff f7   ................
0700   ff ff ff ff ff ff eb bf  fd ff df d7 fb ff ff ff   ................
0710   ff ff b9 fd ff ff ff ff  fe ff ff ff fd bd fd ff   ................
0720   df df ff fe ff ff ff ef  bb fd ff ff f7 fb ff ff   ................
0730   ff ff ef bf fd ff 7f f7  fb ff ff ff ff 3d f8 02   .............=..
0740   3d f8 02 2f f0 02 2f d0  83 3d f8 02 2f d0 83 3d   =../../..=../..=
0750   f8 02 2f d0 83 1d db 83  20 dc b1 1d 1b 91 19 1a   ../..... .......
0760   91 2f d8 83 10 18 c2 20  0c c2 19 0a c2 e8 75 aa   ./..... ......u.
0770   d7 4e 01 64 0e 70 05 13  16 4c 98 35 29 29 99 30   .N.d.p...L.5)).0
0780   c0 c3 c3 c3 ff cc 00 08  00 02 00 00 00 07 57      ..............W
078f
```

```
Mar 27 15:20 1996  image.txt Page 1

0000    00 00 00 00 00 11 00 00  ff ff ff ff a0 12 00 00    ................
0010    00 00 00 00 aa aa aa aa  55 55 55 55 60 dc ff ff    ........UUUU`...
0020    00 00 00 00 00 00 00 00  00 00 00 00 00 00 00 00    ................
*
0070    00 00 00 00 00 00 00 00  00 07 00 00 fb 00 40 30    ..............@0
0080    00 00 00 00 00 00 00 00  00 00 00 00 fb 00 fc 00    ................
0090    00 00 00 00 00 00 00 00  00 07 00 00 fb 00 40 30    ..............@0
00a0    00 00 00 00 00 00 00 00  00 02 00 00 fb 00 40 30    ..............@0
00b0    00 00 00 00 00 00 00 00  00 00 00 00 00 00 00 00    ................
*
0100    d0 5a 00 00 00 00 00 00  d0 5a 00 00 00 00 00 00    ................
*
0200    00 00 00 00 00 00 00 00  00 00 00 00 00 22 00 10    ............."..
0210    00 00 00 00 00 00 00 00  00 00 00 00 00 00 00 00    ................
*
0230    02 00 00 00 02 00 00 00  02 00 00 00 02 00 00 00    ................
*
0640    00 00 00 00 00 00 00 00  00 00 00 00 00 00 00 00    ................
*
0700    00 00 00 00 00 00 00 00  00 00 00 00 01 22 00 10    ............."..
0710    00 00 00 00 00 00 00 00  00 00 00 00 00 00 00 00    ................
*
1100    00 00 00 00 0c 00 00 00  00 00 00 00 00 00 00 00    ................
1110    00 00 00 00 00 0c 00 00  00 12 00 10 00 00 00 00    ................
1120    ff 01 00 00 7f 02 00 00  00 01 00 00 00 00 00 00    ................
1130    00 00 00 00 00 00 00 00  00 00 00 00 00 00 00 00    ................
*
11b0    c0 81 00 09 00 00 20 8c  00 30 20 82 06 00 00 40    ...... ..0 ....@
11c0    00 30 20 82 04 00 00 40  00 30 20 82 08 00 00 40    .0 ....@.0 ....@
11d0    00 00 00 0a 00 00 00 00  00 00 00 00 00 00 00 00    ................
11e0    10 60 08 8c 00 30 80 8c  00 10 00 3b 54 04 00 09    .`...0.....;T...
11f0    00 00 28 8c 05 16 20 5c  05 16 e8 5c 04 16 a0 5c    ..(... \...\...\
1200    9d 02 1d 64 40 e0 1f 92  05 16 e8 5c 04 16 a0 5c    ...d@......\...\
1210    9d 42 a7 65 14 16 18 5c  44 e0 1f 92 44 e0 27 90    .B.e...\D...D.'.
1220    0d 0e 21 58 44 e0 27 92  40 e0 37 90 44 e0 2f 90    ..!XD.'.@.7.D./.
1230    00 30 20 8c 00 22 00 10  06 16 18 5c 05 16 e8 5c    .0 .."......\...\
1240    04 16 a0 5c 06 5e 80 59  01 00 0c 59 00 d0 07 8c    ...\.^.Y...Y....
1250    03 16 80 5c 00 50 8f 8c  14 00 00 09 14 16 f8 5c    ...\.P.........\
1260    00 10 05 8c 40 e0 0f 8c  20 00 00 08 80 3e 00 66    ....@... ....>.f
1270    80 d3 01 58 00 f4 87 92  f4 ff ff ff 00 f4 8f 92    ...X............
```

```
Mar 27 14:20 1996  image.txt Page 2

1280    f0 ff ff ff 00 00 00 0a  c8 03 00 0e 00 3e 00 60    ..............>.`
1290    00 00 00 0a 00 00 00 00  00 00 00 00 00 00 00 00    ................
12a0    20 60 08 8c 00 1e f0 5c  00 30 60 8c 00 10 00 3b     `..............;
12b0    90 03 00 09 fc fe ff 09  00 30 38 8c 40 0c 06 10    .........08.@...
12c0    00 30 30 8c e8 25 00 00  00 30 28 8c 00 25 06 10    .00..%...0(..%..
12d0    07 16 20 5c 04 41 21 59  07 16 80 5c 06 16 68 5c    .. \.A!Y...\..h\
12e0    04 16 90 5c c4 02 00 0b  00 30 38 8c 00 00 00 10    ...\.....08.....
12f0    00 00 30 8c 00 30 28 8c  40 0c 06 10 07 16 20 5c    ..0..0(.@..... \
1300    04 41 21 59 07 16 80 5c  06 16 68 5c 04 16 50 5c    .A!Y...\..h\..P\
1310    08 02 00 0b 00 30 20 8c  00 0c 00 00 00 30 60 8c    .....0 ......0`.
1320    00 02 00 10 04 16 48 5c  40 e0 4f 92 40 e0 4f 90    ......H\@.O.@.O.
1330    00 50 22 b0 00 10 23 b2  10 60 4a 8c 40 e0 4f 92    .P"...#..`J.@.O.
1340    10 20 63 8c 00 30 40 8c  10 06 00 10 e0 1f 62 35    . c..0@.......b5
1350    00 30 20 8c 00 07 00 00  00 30 68 8c 00 07 00 10    .0 ......0h.....
1360    04 16 48 5c 44 e0 4f 92  44 e0 4f 90 00 50 22 b0    ..H\D.O.D.O..P".
1370    00 50 23 b2 10 60 4a 8c  44 e0 4f 92 10 60 6b 8c    .P#..`J.D.O..`k.
1380    00 30 40 8c 40 0b 00 10  e0 1f 6a 35 00 30 20 8c    .0@.@.....j5.0 .
1390    00 01 00 00 00 30 70 8c  00 0c 00 10 04 16 48 5c    .....0p.......H\
13a0    48 e0 4f 92 48 e0 4f 90  00 50 22 b0 00 90 23 b2    H.O.H.O..P"...#.
13b0    10 60 4a 8c 48 e0 4f 92  10 a0 73 8c 00 30 40 8c    .`J.H.O...s..0@.
13c0    00 0d 00 10 e0 1f 72 35  00 30 20 8c 00 11 00 00    ......r5.0 .....
13d0    00 30 58 8c 00 01 00 10  04 16 48 5c 4c e0 4f 92    .0X.......H\L.O.
13e0    4c e0 4f 90 00 50 22 b0  00 d0 22 b2 10 60 4a 8c    L.O..P"..."..`J.
13f0    4c e0 4f 92 10 e0 5a 8c  00 30 40 8c b0 01 00 10    L.O...Z..0@.....
1400    e0 1f 5a 35 00 30 20 8c  00 0c 00 10 00 30 20 92    ..Z5.0 ......0 .
1410    28 01 00 10 00 30 20 8c  00 02 00 10 00 30 20 92    (....0 ......0 .
1420    14 01 00 10 00 30 20 8c  00 02 00 00 00 30 50 8c    .....0 ......0P.
1430    00 0d 00 10 04 16 48 5c  50 e0 4f 92 50 e0 4f 90    ......H\P.O.P.O.
1440    00 50 22 b0 00 90 22 b2  10 60 4a 8c 50 e0 4f 92    .P"..."..`J.P.O.
1450    10 a0 52 8c 00 30 40 8c  40 11 00 10 e0 1f 52 35    ..R..0@.@.....R5
1460    00 30 20 8c 00 00 00 00  00 30 78 8c 00 00 00 10    .0 ......0x.....
1470    04 16 48 5c 54 e0 4f 92  54 e0 4f 90 00 50 22 b0    ..H\T.O.T.O..P".
1480    00 d0 23 b2 10 60 4a 8c  54 e0 4f 92 10 e0 7b 8c    ..#..`J.T.O...{.
1490    00 30 40 8c b0 00 00 10  e0 1f 7a 35 00 30 20 8c    .0@.......z5.0 .
14a0    00 07 00 10 00 30 20 92  98 00 00 10 00 30 20 92    .....0 ......0 .
14b0    78 00 00 10 00 30 20 8c  00 00 00 10 00 30 20 92    x....0 ......0 .
14c0    88 00 00 10 00 30 20 8c  00 0d 00 10 00 30 20 92    .....0 ......0 .
14d0    a8 00 00 10 00 30 20 8c  00 15 00 00 00 30 e8 8c    .....0 ......0..
14e0    10 00 00 ff 04 16 a0 5c  1d 21 05 60 00 00 18 22    .......\.!.`..."
14f0    03 16 e8 5c 00 00 00 0a  00 00 00 00 00 00 00 00    ...\............
```

Mar 27 18:20 1996 image.txt Page 3

```
1500   00 00 00 93 00 00 00 10  00 01 00 10 e0 11 00 00   ................
1510   00 14 f0 8c 64 00 00 00  07 a6 04 5a 00 90 ef 8c   ...........Z....
1520   10 d1 59 56 00 00 f0 ec  18 4e a4 59 00 10 64 0c   ...X.....N.Y....
1530   08 0c ad 59 4e 00 00 13  13 20 04 5a 07 e0 5c 8c   ...YN.... .Z....
1540   54 43 a5 58 1c 00 00 12  16 e0 04 5a 00 90 8c e2   TC.X.......Z....
1550   01 89 94 59 01 a0 b5 8c  f0 ff ff 13 2a a0 5c 3c   ...Y........*.\<
1560   10 0c ad 59 94 43 a5 58  14 16 a8 5c 0f a8 04 5a   ...Y.C.X...\...Z
1570   00 90 a5 9a 08 89 54 59  08 a0 b5 6c f0 ff ff 14   ......TY........
1580   14 a0 04 33 01 a8 04 5a  00 90 8d 82 01 89 94 59   ...3...Z.......Y
1590   01 a0 b5 8c f0 ff ff 15  00 50 07 84 00 00 00 0a   .........P......
15a0   00 14 f0 8c 64 00 00 00  1e 16 ed 5c 58 a0 04 3b   ....d......\X..;
15b0   10 60 04 5a 12 40 9c 59  4c 00 00 12 13 21 04 5a   .`.Z.@.YL....!.Z
15c0   12 00 b4 59 54 00 00 11  00 50 bc 90 10 16 a8 5c   ...YT....P.....\
15d0   10 00 00 08 00 50 bc 90  00 50 a5 92 04 46 ad 59   .....P...P...F.Y
15e0   04 48 8c 59 13 60 04 5a  17 16 a0 5c ee ff ff 13   .H.Y.`.Z...\....
15f0   14 40 b5 32 00 50 a5 82  08 0c a5 59 01 48 ad 59   .@.2.P.....Y.H.Y
1600   f4 5f b5 35 00 1e f0 5c  00 50 07 84 00 00 00 0a   ._.5...\.P......
1610   04 89 b5 59 00 90 bd 92  04 c9 9c 59 11 e0 04 5a   ...Y.......Y...Z
1620   00 d0 bc 90 ec ff ff 16  dc 1f b4 32 01 89 b5 59   ...........2...Y
1630   88 ce bd 59 00 90 bd 82  f4 1f b4 35 c8 ff ff 08   ...Y.......5....
1640   01 19 88 59 91 02 84 64  00 00 00 0a 00 00 00 00   ...Y...d........
1650   20 75 00 09 6c 78 00 09  01 00 80 8c a4 1e 00 08    u..lx..........
1660   10 16 70 5c 11 16 78 5c  12 16 30 5c 10 ce 24 59   ..p\..x\..0\..$Y
1670   90 0d 39 59 00 00 18 8c  00 30 20 c8 00 79 00 10   ..9Y.....0 ..y..
1680   2c 20 01 3a 78 00 20 8c  24 00 19 3b 01 e0 20 8c   , .:x. .$..;.. .
1690   04 16 18 5c 05 0e 21 59  00 34 21 c8 00 79 00 10   ...\..!Y.4!..y..
16a0   0c 20 01 3a 78 00 20 8c  e4 1f 19 3c 78 00 20 8c   . .:x. ....<x. .
16b0   1c 00 19 3c 00 30 80 8c  40 2e 00 00 e4 1e 00 09   ...<.0..@.......
16c0   00 30 80 8c ff ff ff ff  00 00 00 0a 01 00 28 8c   .0............(.
16d0   05 ce 20 59 00 34 29 ca  00 79 00 10 05 ce 20 59   .. Y.4)..y.... Y
16e0   00 34 79 92 10 79 00 10  05 ce 20 59 00 34 29 8c   .4y..y.... Y.4).
16f0   1a 79 00 10 04 00 20 8c  05 16 80 5c 0e 16 88 5c   .y.... ....\...\
1700   04 16 90 5c 14 ee 02 0b  05 ce 20 59 00 34 39 ca   ...\...... Y.49.
1710   18 79 00 10 00 90 19 92  00 00 80 8c 00 00 00 0a   .y..............
1720   20 60 08 8c 10 16 50 5c  11 16 60 5c 12 16 48 5c    `....P\..`\..H\
1730   48 e0 4f 92 00 00 78 8c  00 30 38 8c ff ff ff ff   H.O...x..08.....
1740   11 16 18 5c 11 16 80 5c  08 ef 02 0b 10 16 70 5c   ...\...\......p\
1750   03 e0 18 8c 03 00 68 8c  6c 20 1c 3b 00 d0 28 c0   ......h.l .;..(.
1760   30 00 20 8c 50 00 29 3c  00 d0 28 c0 39 00 20 8c   0. .P.)<..(.9. .
1770   44 00 29 39 40 e0 37 8c  00 00 28 8c 04 00 20 8c   D.)9@.7...(... .
```

```
Mar 17 16:20 1996  image.txt Page 4

1780    06 16 80 5c 05 16 88 5c  04 16 90 5c 8c 1d ff 0b   ...\...\...\....
1790    06 16 80 5c 0c 16 88 5c  0d 16 90 5c 7c ed 02 0b   ...\...\...\|...
17a0    06 16 80 5c 03 16 80 5c  10 e6 02 0b 10 16 36 5c   ...\...\......6\
17b0    14 00 00 08 01 60 23 8c  04 16 6e 5c 01 e0 16 8c   .....`#...n\....
17c0    5c 5f 23 3c 00 00 20 8c  04 16 70 5c 04 16 6e 5c   \_#<.. ...p\..n\
17d0    00 30 20 c8 00 79 00 10  38 20 11 3a 05 4e 23 59   .0 ..y..8 .:.N#Y
17e0    00 34 29 8c 1a 79 00 10  04 00 20 8c 05 16 80 5c   .4)..y.... ....\
17f0    0c 16 88 5c 04 16 90 5c  d4 ed 02 0b 14 20 04 3d   ...\...\..... .=
1800    05 4e 23 59 00 34 21 c8  16 79 00 10 60 c0 21 3a   .N#Y.4!..y..`.!:
1810    78 00 20 8c 58 00 69 3b  01 60 23 8c 04 16 68 5c   x. .X.i;.`#...h\
1820    05 0e 21 59 00 34 21 c8  00 79 00 10 38 20 11 3a   ..!Y.4!..y..8 .:
1830    05 4e 23 59 00 34 29 8c  1a 79 00 10 04 00 20 8c   .N#Y.4)..y.... .
1840    05 16 80 5c 0c 16 88 5c  04 16 90 5c 80 ed 02 0b   ...\...\...\....
1850    14 20 04 3d 05 4e 23 59  00 34 21 c8 16 79 00 10   . .=.N#Y.4!..y..
1860    0c c0 21 3a 78 00 20 8c  b0 11 69 3c 78 00 20 8c   ..!:x. ...i<x. .
1870    1c 00 69 3c 00 30 80 8c  60 2e 00 00 24 1d 00 09   ..i<.0..`...$...
1880    00 30 e0 8c ff ff ff ff  00 00 00 0a 05 8e 23 59   .0............#Y
1890    00 34 21 c8 00 79 00 10  2c 20 01 3a 78 00 20 8c   .4!..y.., .:x. .
18a0    24 00 71 3b 01 a0 23 8c  04 16 70 5c 05 0e 21 59   $.q;..#...p\..!Y
18b0    00 34 21 c8 00 79 00 10  0c 20 01 3a 78 00 20 8c   .4!..y... .:x. .
18c0    e4 11 71 3c 78 00 20 8c  1c 00 71 3c 00 30 80 8c   ..q<x. ...q<.0..
18d0    60 2e 00 00 cc 1c 00 09  00 30 80 8c ff ff ff ff   `........0......
18e0    00 00 00 0a 02 00 28 8c  05 4e 23 59 00 34 29 ca   ......(..N#Y.4).
18f0    00 79 00 10 05 8e 23 59  00 34 29 ca 00 79 00 10   .y....#Y.4)..y..
1900    05 8e 23 59 00 34 69 ca  02 79 00 10 05 4e 23 59   ..#Y.4i..y...N#Y
1910    00 34 71 ca 02 79 00 10  f8 42 00 09 05 4e 23 59   .4q..y...B...N#Y
1920    00 34 81 92 04 79 00 10  05 4e 23 59 00 34 21 90   .4...y...N#Y.4!.
1930    10 79 00 10 00 10 29 90  05 4e 23 59 00 34 21 90   .y....)..N#Y.4!.
1940    04 79 00 10 00 10 29 92  05 4e 23 59 00 34 81 90   .y....)..N#Y.4..
1950    04 79 00 10 5c 37 00 09  05 4e 23 59 00 34 29 90   .y..\7...N#Y.4).
1960    04 79 00 10 05 8e 23 59  00 34 29 92 08 79 00 10   .y....#Y.4)..y..
1970    05 4e 23 59 00 34 29 90  04 79 00 10 00 30 20 90   .N#Y.4)..y...0 .
1980    d0 95 00 10 04 41 29 59  24 00 20 8c 84 45 21 74   .....A)Y$. ..E!t
1990    84 39 68 ca 42 89 00 10  78 42 00 09 05 4e 23 59   .9h.B...xB...N#Y
19a0    00 34 81 92 08 79 00 10  05 4e 23 59 00 34 21 90   .4...y...N#Y.4!.
19b0    10 79 00 10 04 20 29 90  05 4e 23 59 00 34 21 90   .y... )..N#Y.4!.
19c0    08 79 00 10 00 10 29 92  05 4e 23 59 00 34 81 90   .y....)..N#Y.4..
19d0    08 79 00 10 dc 36 00 09  05 4e 23 59 00 34 29 90   .y...6...N#Y.4).
19e0    08 79 00 10 05 8e 23 59  00 34 29 92 04 79 00 10   .y....#Y.4)..y..
19f0    05 4e 23 59 00 34 29 90  08 79 00 10 00 30 20 90   .N#Y.4)..y...0 .
```

```
Mar 27 18:20 1996  image.txt Page 5

1a00   d0 95 00 10 04 41 29 59  24 00 20 8c 84 45 21 74   .....A)Y$. ..E!t
1a10   84 39 68 ca 42 89 00 10  f8 41 00 09 05 8e 23 59   .9h.B....A....#Y
1a20   00 34 81 52 0c 79 00 10  0c 30 28 8c 40 0c 0c 10   .4...y...0(.@...
1a30   05 8e 23 59 00 34 21 90  0c 79 00 10 00 10 29 92   ..#Y.4!..y....).
1a40   05 8e 23 59 00 34 31 90  0c 79 00 10 84 38 00 09   ..#Y.41..y...8..
1a50   05 8e 23 59 00 34 29 90  0c 79 00 10 00 30 20 90   ..#Y.4)..y...0 .
1a60   d0 95 00 10 04 41 29 59  24 00 20 8c 84 45 21 74   .....A)Y$. ..E!t
1a70   84 39 70 ca 42 89 00 10  05 8e 23 59 00 34 29 90   .9p.B.....#Y.4).
1a80   0c 79 00 10 05 4e 23 59  00 34 21 90 04 79 00 10   .y...N#Y.4!..y..
1a90   0c 20 29 92 05 4e 23 59  00 34 31 90 04 79 00 10   . )..N#Y.41..y..
1aa0   05 8e 23 59 00 34 29 90  0c 79 00 10 00 30 20 90   ..#Y.4)..y...0 .
1ab0   d0 95 00 10 04 41 29 59  24 00 20 8c 84 45 21 74   .....A)Y$. ..E!t
1ac0   84 39 30 32 44 89 00 10  05 8e 23 59 00 34 29 90   .902D.....#Y.4).
1ad0   0c 79 00 10 1a 60 21 88  84 09 21 58 1a 60 21 8a   .y...`!...!X.`!.
1ae0   00 90 2a c8 a0 00 20 8c  85 00 21 70 00 34 29 8c   ..*... ...!p.4).
1af0   e0 8e 00 10 05 8e 23 59  00 34 21 90 0c 79 00 10   ......#Y.4!..y..
1b00   14 20 29 92 05 8e 23 59  00 34 29 90 04 79 00 10   . )...#Y.4)..y..
1b10   05 8e 23 59 00 34 21 90  0c 79 00 10 0c 20 29 92   ..#Y.4!..y... ).
1b20   05 8e 23 59 00 34 31 90  0c 79 00 10 05 8e 23 59   ..#Y.41..y....#Y
1b30   00 34 29 90 04 79 00 10  00 30 20 90 d0 95 00 10   .4)..y...0 .....
1b40   04 41 29 59 24 00 20 8c  84 45 21 74 84 39 30 92   .A)Y$. ..E!t.90.
1b50   44 89 00 10 05 4e 23 59  00 34 21 90 04 79 00 10   D....N#Y.4!..y..
1b60   00 10 21 90 08 20 21 90  78 20 01 32 05 4e 23 59   ..!.. !.x .2.N#Y
1b70   00 34 49 90 04 79 00 10  4c e0 4f 92 0d 16 40 5c   .4I..y..L.O...@\
1b80   50 e0 47 92 05 4e 23 59  00 34 29 c8 18 79 00 10   P.G..N#Y.4)..y..
1b90   00 30 20 8c ff ff ff ff  0c 00 29 3d 02 00 58 8c   .0 .......)=..X.
1ba0   08 00 00 08 01 00 58 8c  05 4e 23 59 00 34 21 90   ......X..N#Y.4!.
1bb0   04 79 00 10 00 10 21 90  08 20 e9 90 4c e0 4f 90   .y....!.. ..L.O.
1bc0   09 16 80 5c 50 e0 47 90  08 16 88 5c 03 00 48 8c   ...\P.G....\..H.
1bd0   09 16 90 5c 0b 16 98 5c  00 50 07 86 10 16 78 5c   ...\...\.P....x\
1be0   00 30 20 8c ff ff ff ff  20 00 79 3d 00 00 20 8c   .0 ..... .y=.. .
1bf0   0e 16 80 5c 04 16 88 5c  08 56 00 09 00 30 80 8c   ...\...\.V...0..
1c00   ff ff ff ff 00 00 00 0a  48 e0 4f 90 00 50 72 92   ........H.O..Pr.
1c10   0f 16 80 5c 00 00 00 0a  00 00 00 00 00 00 00 00   ...\............
1c20   00 01 80 8c 00 00 00 0a  00 00 00 00 00 00 00 00   ................
1c30   10 16 30 5c 00 00 18 8c  06 16 80 5c d4 4d 00 09   ..0\.......\.M..
1c40   f8 3f 04 3c 05 8e 21 59  00 34 21 c8 02 79 00 10   .?.<..!Y.4!..y..
1c50   05 0e 21 59 00 34 21 90  10 79 00 10 0c 20 21 90   ..!Y.4!..y... !.
1c60   60 20 01 32 01 00 38 8c  00 00 18 8c 05 ce 21 59   ` .2..8.......!Y
1c70   00 34 21 c8 00 79 00 10  38 20 11 3a 05 ce 21 59   .4!..y..8 .:..!Y
```

Mar 27 16:20 1996 image.txt Page 5

```
1c80    00 34 21 90 04 79 00 10  00 10 29 90 05 8e 21 59   .4!..y....)...!Y
1c90    00 34 21 c8 02 79 00 10  05 0e 21 59 00 34 21 90   .4!..y....!Y.4!.
1ca0    10 79 00 10 00 10 21 90  1e 00 29 35 01 e0 16 8c   .y....!...)5....
1cb0    01 e0 29 8c 05 16 3a 5c  7a 00 20 8c 60 11 29 3c   ..)...:\z. .`.)<
1cc0    70 e0 08 3a 01 00 38 8c  05 ce 21 59 00 34 21 c8   p...:..8..!Y.4!.
1cd0    00 79 00 10 4c 20 11 3a  05 ce 21 59 00 34 21 90   .y..L .:..!Y.4!.
1ce0    04 79 00 10 00 10 29 90  05 8e 21 59 00 34 21 c8   .y....)...!Y.4!.
1cf0    02 79 00 10 05 0e 21 59  00 34 21 90 10 79 00 10   .y....!Y.4!..y..
1d00    4c 20 21 90 1c 00 29 35  00 30 20 8c 0a 53 00 00   L !...)5.0 ..S..
1d10    06 16 80 5c 04 16 88 5c  07 16 90 5c 34 0a 00 09   ...\...\...\4...
1d20    01 e0 29 8c 05 16 3a 5c  7a 00 20 8c 9c 11 29 3c   ..)...:\z. ...)<
1d30    01 00 20 8c 06 16 80 5c  04 16 88 5c c4 34 00 0e   .. ....\...\.4..
1d40    10 16 60 5c 11 16 68 5c  12 16 70 5c 13 16 78 5c   ..`\..h\..p\..x\
1d50    78 00 20 8c 0e 00 81 39  1c 20 03 3e 09 00 20 8c   x. ....9. .>.. .
1d60    00 30 20 92 c0 95 00 10  00 30 60 8c ff ff ff ff   .0 ......0`.....
1d70    00 00 00 0a 05 0e 23 59  00 34 21 c8 00 79 00 10   ......#Y.4!..y..
1d80    1c 20 11 3a 3c 00 20 8c  00 30 20 92 c0 95 00 10   . .:<. ..0 .....
1d90    00 30 80 8c ff ff ff ff  00 00 00 0a 04 60 23 90   .0..........`#.
1da0    a8 20 e1 35 08 60 23 90  00 10 21 90 9c 20 71 3d   . .5.`#...!.. q=
1db0    08 60 23 90 04 20 21 8c  08 60 23 92 04 60 23 90   .`#.. !..`#..`#.
1dc0    04 09 21 59 04 60 23 92  0d 16 80 5c 0e 16 88 5c   ..!Y.`#....\...\
1dd0    0f 16 90 5c 0c 2c 00 09  10 16 30 5c 0e 00 28 8c   ...\.,....0\..(.
1de0    14 20 24 90 0d 20 29 82  05 0e 23 59 00 34 21 90   . $.. )...#Y.4!.
1df0    04 79 00 10 00 10 21 90  00 10 21 90 34 20 01 32   .y....!...!.4 .2
1e00    05 0e 23 59 00 34 29 90  04 79 00 10 05 0e 23 59   ..#Y.4)..y....#Y
1e10    00 34 21 90 04 79 00 10  00 10 21 90 00 10 19 90   .4!..y....!.....
1e20    05 16 80 5c 06 16 88 5c  00 d0 00 86 a0 00 00 08   ...\...\........
1e30    05 0e 23 59 00 34 81 90  04 79 00 10 06 16 88 5c   ..#Y.4...y.....\
1e40    20 27 00 09 88 00 00 08  0d 16 80 5c 0e 16 88 5c    '.........\...\
1e50    0f 16 90 5c 6c 2b 00 09  10 16 30 5c 64 20 04 32   ...\l+....0\d .2
1e60    05 0e 23 59 00 34 21 90  04 79 00 10 00 10 21 90   ..#Y.4!..y....!.
1e70    00 10 21 90 34 20 01 32  05 0e 23 59 00 34 29 90   ..!.4 .2..#Y.4).
1e80    04 79 00 10 05 0e 23 59  00 34 21 90 04 79 00 10   .y....#Y.4!..y..
1e90    00 10 21 90 00 10 e5 90  05 16 80 5c 06 16 88 5c   ..!.........\...\
1ea0    00 50 07 66 26 00 00 08  05 0e 23 59 00 34 81 90   .P.f&.....#Y.4..
1eb0    04 79 00 10 06 16 88 5c  a6 26 00 09 10 00 00 08   .y.....\.&......
1ec0    00 30 80 8c ff ff ff ff  00 00 00 0a 05 0e 23 59   .0............#Y
1ed0    00 34 81 90 04 79 00 10  78 2c 00 09 90 30 00 5a   .4...y..x,...0.Z
1ee0    00 00 80 22 00 00 00 0a  00 00 00 00 00 00 00 00   ..."............
1ef0    10 16 70 5c 11 16 78 5c  12 16 28 5c 13 16 30 5c   ..p\..x\..(\..0\
```

Mar 27 18:20 1996 image.txt Page 7

```
1f00   78 00 20 8c 0e 00 81 3e  1c a0 03 3e 0e 0c 20 8c   x.....>...>.....
1f10   00 30 20 92 c0 95 00 10  00 30 80 8c ff ff ff ff   .0 .......0......
1f20   00 00 00 0a 05 8e 23 59  00 34 21 c8 00 79 00 10   ......#Y.4!..y..
1f30   1c 20 11 5a 3c 00 20 8c  00 30 20 92 c0 95 00 10   . .Z<. .0 ......
1f40   00 30 80 8c ff ff ff ff  00 00 00 0a 05 8e 23 59   .0............#Y
1f50   00 34 21 90 0c 79 00 10  04 20 21 90 04 16 38 5c   .4!..y... !...8\
1f60   24 20 01 35 00 90 21 90  10 20 21 3d 0b 00 20 8c   $ .5..!.. !=.. .
1f70   00 30 20 92 c0 95 00 10  00 30 80 8c ff ff ff ff   .0 .......0......
1f80   00 00 00 0a 00 90 21 90  30 20 01 30 14 e0 21 90   ......!.0 .0..!.
1f90   0c 20 21 80 24 20 39 37  00 90 21 90 10 20 21 3d   . !.$ 97..!.. !=
1fa0   0b 00 20 8c 00 30 20 92  c0 95 00 10 00 30 80 8c   .. ..0 .......0..
1fb0   ff ff ff ff 00 00 00 0a  05 8e 23 59 00 34 81 90   ..........#Y.4..
1fc0   0c 79 00 10 1c 24 00 09  10 16 38 5c 24 20 04 35   .y...$....8\$ .5
1fd0   00 90 21 90 10 20 21 3d  0b 00 20 8c 00 30 20 92   ..!.. !=.. ..0 .
1fe0   c0 95 00 10 00 30 80 8c  ff ff ff ff 00 00 00 0a   .....0..........
1ff0   14 e0 21 90 0d 20 21 80  0c 20 39 30 01 00 20 ac   ..!.. !.. 90.. .
2000   00 90 21 92 07 16 80 5c  0f 16 88 5c 05 16 90 5c   ..!....\...\...\
2010   20 28 00 09 1c 20 04 3d  05 8e 23 59 00 34 81 90    (... .=..#Y.4..
2020   0c 79 00 10 07 16 88 5c  e8 26 00 09 0c 00 00 08   .y.....\.&......
2030   07 16 80 5c 6c 0f 00 09  01 00 80 8c 00 00 00 0a   ...\l...........
2040   00 00 20 8c 00 10 24 92  00 00 00 0a 00 00 00 00   .. ...$.........
2050   10 60 08 8c 10 16 60 5c  11 16 68 5c 12 16 70 5c   .`....`\..h\..p\
2060   00 00 20 8c 40 e0 27 92  00 30 58 8c ff ff ff ff   .. .@.'..0X.....
2070   04 16 38 5c 78 00 20 8c  10 00 89 3e 00 30 80 8c   ..8\x. ....>.0..
2080   ff ff ff ff 00 00 00 0a  00 30 20 8c ff ff ff ff   .........0 .....
2090   54 00 71 3a 50 a0 03 3a  64 00 20 8c 84 85 23 74   T.q:P..:d. ...#t
20a0   04 16 70 5c 0c 20 01 3d  01 00 50 8c 08 00 00 08   ..p\. .=..P.....
20b0   0e 16 50 5c 0a 16 70 5c  01 00 20 8c 40 e0 27 92   ..P\..p\.. .@.'.
20c0   00 30 28 8c 40 20 00 00  40 e0 27 8c 05 16 80 5c   .0(.@ ..@.'....\
20d0   04 16 88 5c 0a 16 90 5c  78 1b 00 09 10 16 58 5c   ...\...\x.....X\
20e0   18 00 00 08 00 30 20 8c  ff ff ff ff 0c 00 71 3d   .....0 .......q=
20f0   01 00 20 8c 40 e0 27 92  40 e0 27 90 80 28 01 5a   .. .@.'.@.'..(.Z
2100   80 01 00 12 00 00 78 8c  80 68 03 5a 24 01 00 13   ......x..h.Z$...
2110   00 00 20 8c 8f 3d 23 ca  06 00 00 00 8f 1d 2b 90   .. ..=#.......+.
2120   05 16 30 5c 78 00 20 8c  85 20 01 5a f4 00 00 11   ..0\x. .. .Z....
2130   80 a8 01 5a ec 00 00 11  05 8e 21 59 00 34 21 c8   ...Z......!Y.4!.
2140   00 79 00 10 14 20 01 3d  20 00 20 8c 8f 3d 23 ca   .y... .= . ..=#.
2150   06 00 00 00 cc 00 00 08  8f 3d 23 c8 04 00 00 00   .........=#.....
2160   24 20 11 30 05 8e 21 59  00 34 81 90 04 79 00 10   $ .0..!Y.4...y..
2170   e0 25 00 09 10 20 04 3a  04 00 20 8c 8f 3d 23 ca   .%... .:.. ..=#.
```

```
Mar 27 18:20 1996  image.txt Page 9

2180   06 00 00 00 05 8e 21 59  00 34 21 90 0c 79 00 10   ......!Y.4!..y..
2190   80 20 01 32 05 6e 21 59  00 34 21 90 0c 79 00 10   . .2..!Y.4!..y..
21a0   14 20 21 90 04 16 18 5c  18 20 01 30 8f 3d 23 c8   . !....\ . .0.=#.
21b0   05 00 00 00 8c 20 01 3a  01 e0 39 8c 84 00 00 08   ....i .:..9.....
21c0   8f 3d 23 c8 04 00 00 00  28 20 09 00 14 e0 2c 51   .=#.....( ....,Q
21d0   0c 20 21 80 1c 20 39 30  8f 3d 23 c8 05 00 00 00   . !.. 90.=#.....
21e0   81 09 21 58 8f 3d 23 ca  06 00 00 00 24 00 00 08   ..!X.=#.....$...
21f0   8f 3d 23 c8 04 00 00 00  18 20 01 30 8f 3d 23 c8   .=#...... .0.=#.
2200   05 00 00 00 80 09 21 58  8f 3d 23 ca 05 00 00 00   ......!X.=#.....
2210   8f 3d 23 c8 06 00 00 00  08 20 01 2a 01 e0 39 8c   .=#...... .*..9.
2220   11 e0 22 8c 04 16 7b 5c  24 60 00 2a e4 1e ff 14   ..#...{\$`.*....
2230   08 e0 01 2c 3d a0 03 3d  e5 6d 00 09 10 16 48 5c   ...,=..=.m....H\
2240   40 e0 27 90 1a 20 01 3a  00 30 20 8c ff ff ff ff   @.'.. .:.0 .....
2250   0c 00 59 3a 0b 16 80 5c  18 1a 00 09 09 16 80 5c   ..Y:...\.......\
2260   e0 6d 00 09 07 16 80 5c  00 00 00 0a 00 00 80 8c   .m.....\........
2270   90 11 00 09 40 e0 27 90  80 28 01 5a 8e 1e ff 15   ....@.'..(.Z....
2280   40 e0 27 90 16 20 01 3a  00 30 20 8c ff ff ff ff   @.'.. .:.0 .....
2290   0c 00 59 3a 0b 16 80 5c  d8 19 00 09 07 16 80 5c   ..Y:...\.......\
22a0   00 00 00 0a 00 00 00 00  00 00 00 00 00 00 00 00   ................
22b0   10 16 60 5c 11 16 66 5c  12 16 70 5c 13 16 78 5c   ..`\..h\..p\..x\
22c0   78 00 20 8c 10 00 91 3e  00 30 80 8c ff ff ff ff   x. ....>.0......
22d0   00 00 00 0a 14 20 03 32  00 10 23 c8 0c 20 01 39   ..... .2..#.. .9
22e0   00 10 23 c8 10 20 51 3b  00 30 80 8c ff ff ff ff   ..#.. Q;.0......
22f0   00 00 00 0a 00 30 20 8c  ff ff ff ff 28 00 79 3a   .....0 .....(.y:
2300   24 e0 03 3a 64 00 20 8c  84 c5 23 74 04 16 78 5c   $..:d. ...#t..x\
2310   0c 20 01 3d 01 00 18 8c  08 00 00 08 0f 16 18 5c   . .=...........\
2320   03 16 78 5c fc 6c 00 09  08 20 33 90 00 10 2b c8   ..x\.l... 3...+.
2330   a0 00 20 8c 85 00 21 70  00 34 31 92 e4 8e 00 10   .. ...!p.41.....
2340   04 20 33 90 00 10 2b c8  a0 00 20 8c 85 00 21 70   . 3...+... ...!p
2350   00 34 31 92 e0 8e 00 10  00 10 2b c8 a0 00 20 8c   .41.......+... .
2360   85 00 21 70 00 34 71 ca  ec 8e 00 10 00 10 2b c8   ..!p.4q.......+.
2370   a0 00 20 8c 85 00 21 70  00 34 69 92 e8 8e 00 10   .. ...!p.4i.....
2380   00 00 30 8c 00 10 2b c8  a0 00 20 8c 85 00 21 70   ..0...+... ...!p
2390   00 34 31 ca ee 8e 00 10  00 10 2b c8 a0 00 20 8c   .41.......+... .
23a0   85 00 21 70 00 34 31 92  f0 8e 00 10 94 6c 00 09   ..!p.41......l..
23b0   1c e0 03 3a 00 10 2b c8  a0 00 20 8c 85 00 21 70   ...:..+... ...!p
23c0   00 34 81 8c e0 8e 00 10  98 00 00 09 00 10 2b c8   .4............+.
23d0   a0 00 20 8c 85 00 21 70  00 34 21 c8 ee 8e 00 10   .. ...!p.4!.....
23e0   08 20 01 3d 1c e0 03 3d  00 10 2b c8 a0 00 20 8c   . .=...=..+... .
23f0   85 00 21 70 00 34 81 8c  e0 8e 00 10 64 52 00 08   ..!p.4......dR..
```

Mar 27 16:20 1996 image.txt Page 9

```
2400    00 30 20 8c ff ff ff ff  0e 00 79 3d 00 00 00 0a   .0......y=....
2410    10 6c 00 09 10 16 38 5c  00 50 30 ec 60 75 00 00   .l....8\.P0.`u..
2420    00 10 2b c8 a0 00 20 8c  85 00 21 70 00 34 21 8c   ..+.... ..!p.4!.
2430    e0 9e 00 10 06 16 80 5c  04 1c d8 5c 01 16 90 5c   .......\...\...\
2440    10 16 00 09 00 10 2b c8  a0 00 20 8c 85 00 21 70   ......+... ...!p
2450    00 34 81 92 f0 de 00 10  07 15 d0 5c e4 6b 00 08   .4.........\.k..
2460    10 16 78 5c 00 00 20 8c  0e 20 24 ca 04 16 36 5c   ..x\.. .. $...6\
2470    0c 20 24 ca 08 20 01 3c  00 00 00 0a 00 00 28 8c   . $.. .<......(.
2480    08 e0 23 90 87 3d 29 ca  06 00 00 00 08 e0 23 90   ..#..=).......#.
2490    87 1d 25 90 05 16 18 5c  78 00 20 8c 85 20 01 5a   ..%....\x. .. .Z
24a0    15 01 00 11 80 e8 00 5a  10 01 30 11 05 ce 20 59   .......Z..0... Y
24b0    00 34 21 c8 00 79 00 10  18 20 01 3a 20 00 28 5c   .4!..y... .: .(\
24c0    08 e0 23 90 87 3d 29 c8  06 00 00 00 ec 00 00 08   ..#..=).........
24d0    08 e0 23 90 87 3d 21 c8  04 00 00 00 28 20 11 30   ..#..=!.....( .0
24e0    05 ce 20 59 00 34 81 90  04 79 00 10 64 26 00 09   .. Y.4...y..d&..
24f0    14 20 04 3a 04 00 28 6c  08 e0 23 90 87 3d 29 ca   . .:..(l..#..=).
2500    06 00 00 00 06 e0 23 90  87 3d 21 c8 04 00 00 00   ......#..=!.....
2510    8c 20 01 30 05 ce 20 59  00 34 21 90 0c 79 00 10   . .0.. Y.4!..y..
2520    7c 20 01 32 05 ce 20 59  00 34 21 90 0c 79 00 10   | .2.. Y.4!..y..
2530    04 20 21 90 04 16 30 5c  64 20 01 32 08 e0 23 90   . !...0\d .2..#.
2540    87 3d 21 c8 04 00 00 00  2c 20 09 30 14 a0 21 90   .=!....., .0..!.
2550    0d 20 21 80 20 20 39 30  08 e0 2b 90 87 7d 21 c8   . !.  90..+..}!.
2560    06 00 00 00 81 09 21 58  87 7d 21 ca 06 00 00 00   ......!X.}!.....
2570    2c 00 00 08 08 e0 23 90  87 3d 21 c8 04 00 00 00   ,.....#..=!.....
2580    1c 20 01 30 08 e0 2b 90  87 7d 21 c8 06 00 00 00   . .0..+..}!.....
2590    80 09 21 58 87 7d 21 ca  06 00 00 00 08 e0 23 90   ..!X.}!.......#.
25a0    87 3d 21 c8 06 00 00 00  10 20 01 3a 0e e0 23 c8   .=!...... .:..#.
25b0    01 20 21 8c 0e e0 23 ca  01 e0 29 8c 05 16 38 5c   . !...#...)...8\
25c0    0c e0 23 c8 85 20 01 5a  b4 fe ff 14 00 00 00 0a   ..#.. .Z........
25d0    10 16 70 5c 10 20 04 35  00 30 80 8c ff ff ff ff   ..p\. .5.0......
25e0    00 00 00 0a 0e 16 80 5c  78 fe ff 09 0e a0 23 c8   .......\x.....#.
25f0    0c 20 01 3d 00 00 80 8c  00 00 00 0a 24 6a 00 09   . .=........$j..
2600    10 16 18 5c 04 a0 23 90  04 16 78 5c 0c 20 01 35   ...\..#...x\. .5
2610    03 16 80 5c 2c 6a 00 08  00 00 20 8c 04 a0 23 92   ...\,j.... ...#.
2620    10 a0 23 90 14 20 01 3b  10 a0 83 90 44 16 00 09   ..#.. .;....D...
2630    00 00 20 8c 10 a0 23 92  03 16 80 5c 04 6a 00 09   .. ...#....\.j..
2640    00 90 3b 90 0c a0 33 c8  08 a0 2b 90 0e a0 23 c8   ..;...3...+...#.
2650    07 16 80 5c 06 16 88 5c  05 16 90 5c 04 16 98 5c   ...\...\...\...\
2660    00 d0 03 84 00 00 00 00  00 00 00 00 00 00 00 00   ................
2670    10 16 68 5c 0c 20 04 32  14 60 23 90 10 20 01 35   ..h\. .2.`#.. .5
```

```
Mar 27 16:20 1996  image.txt Page 13

2680    00 30 80 8c ff ff ff ff  00 00 00 0a 14 60 73 90   .0...........'s.
2690    00 30 20 90 d4 95 00 10  15 20 01 3a cc 16 80 5c   .0 ...... .:...\
26a0    80 16 00 09 00 30 80 8c  ff ff ff ff 00 00 00 0a   ....0...........
26b0    01 00 20 8c 00 30 20 92  d4 95 00 10 0e 16 80 5c   .. ..0 .........\
26c0    a0 1c ff 09 0e a0 23 c8  15 20 01 3d 00 00 20 8c   .......#.. .=.. .
26d0    00 30 20 92 d4 95 00 10  04 16 80 5c 00 00 00 0a   .0 ........\....
26e0    40 69 00 09 10 16 13 5c  04 a0 7b 90 00 00 20 8c   @i.....\..{... .
26f0    04 a0 23 92 10 a0 23 90  14 20 01 3b 10 a0 83 90   ..#...#.. .;....
2700    70 19 00 09 00 00 20 8c  10 a0 23 92 03 16 80 5c   p..... ...#....\
2710    30 69 00 09 00 30 3b 90  0c a0 23 c8 08 a0 2b 90   0i...0;...#...+.
2720    0e a0 23 c8 07 16 80 5c  05 16 88 5c 05 16 90 5c   ..#....\...\...\
2730    04 16 98 5c 00 d0 03 8e  00 00 20 8c 0c 30 20 92   ...\...... ..0 .
2740    04 95 00 10 04 16 80 5c  00 00 00 0a 00 00 00 00   .......\........
2750    e0 65 08 8c 10 16 60 5c  11 16 68 5c 12 16 70 5c   .e....'\..h\..p\
2760    00 30 20 8c 02 53 00 00  04 41 5c 59 0c e8 02 5a   .0 ..S...A\Y...Z
2770    30 01 00 14 0b 35 20 90  68 2f 00 00 00 10 01 84   0....5 .h/......
2780    05 0e 23 59 00 34 21 90  0c 79 00 10 18 20 01 32   ..#Y.4!..y... .2
2790    05 0e 23 59 00 34 21 90  0c 79 00 10 14 20 21 90   ..#Y.4!..y... !.
27a0    10 20 01 35 00 30 80 8c  ff ff ff ff 00 00 00 0a   . .5.0..........
27b0    05 0e 23 59 00 34 21 90  0c 79 00 10 14 20 31 90   ..#Y.4!..y... 1.
27c0    06 16 18 5c 00 30 20 8c  e0 6e 00 10 04 81 29 59   ...\.0 ........)Y
27d0    a0 00 20 8c 84 45 21 74  e0 e5 27 ca 00 90 21 90   .. ..E!t..'...!.
27e0    e4 e5 27 92 04 a0 21 90  e8 e5 27 92 e0 e5 87 8c   ..'...!...'.....
27f0    0c 16 88 5c 0e 16 90 5c  88 3e 00 09 00 00 00 0a   ...\...\.>......
2800    0c 16 80 5c 0c 42 00 09  00 00 00 0a d0 e5 27 8c   ...\.B........'.
2810    0c 16 80 5c 0e 16 88 5c  04 16 90 5c 64 45 00 09   ...\...\...\dE..
2820    00 30 20 8c 0c 53 00 00  b0 e5 27 92 0c 00 20 8c   .0 ..S....'... .
2830    bc e5 27 92 94 e5 27 92  d0 e5 27 8c 98 e5 27 92   ..'...'...'...'.
2840    88 00 00 08 d0 e5 27 8c  0c 16 80 5c 0e 16 88 5c   ......'....\...\
2850    04 16 90 5c 0c 49 00 09  00 30 20 8c 0d 53 00 00   ...\.I...0 ..S..
2860    b0 e5 27 92 0c 00 20 8c  bc e5 27 92 94 e5 27 92   ..'... ...'...'.
2870    d0 e5 27 8c 98 e5 27 92  50 00 00 08 00 90 23 90   ..'...'.P.....#.
2880    b0 e5 27 92 08 a0 23 90  bc e5 27 92 08 a0 23 90   ..'...#...'...#.
2890    94 e5 27 92 0c a0 23 90  98 e5 27 92 2c 00 00 08   ..'...#...'.,...
28a0    00 30 80 8c 10 2e 00 00  0d 16 88 5c 44 0f 00 09   .0.........\D...
28b0    16 00 20 8c 00 30 20 92  c0 95 00 10 00 30 80 8c   .. ..0 ......0..
28c0    ff ff ff ff 00 00 00 0a  0e 00 20 8c 80 e4 27 92   .......... ...'.
28d0    84 e4 37 8c b0 e5 2f 8c  1c 00 20 8c 06 16 80 5c   ..7.../... ....\
28e0    05 16 88 5c 04 16 90 5c  c0 ec ff 0b 84 e5 27 92   ...\...\......'.
28f0    80 e4 27 8c 88 e5 27 92  01 00 20 8c a0 e5 27 92   ..'...'... ...'.
```

```
Mar 27 14:20 1996  image.txt Page 11

2900    03 0e 23 59 00 34 21 90  0c 79 00 10 00 30 20 92   ..#(.4!..y...0 .
2910    d8 95 00 10 03 0e 23 59  00 34 21 90 0c 79 00 10   .......#Y.4!..y..
2920    14 20 21 90 04 16 1e 2c  04 20 21 90 0c 20 01 35   . !.......!...5
2930    01 00 20 8c 04 e0 20 92  90 e5 37 8c 90 e5 12 8c   ..............7.
2940    a0 e5 27 90 0c 16 80 5c  06 16 88 5c 05 16 90 5c   ................
2950    04 16 98 5c ec f3 ff 09  30 20 04 3e 30 e4 2f 8c   ...\....0 .>0./.
2960    00 30 20 8c e0 2e 00 00  05 16 80 5c 04 16 88 5c   .0 ........\...\
2970    0c 16 90 5c cc d3 02 09  03 16 80 5c 24 00 00 09   ...........\$...
2980    01 00 80 8c 5c 0e 00 09  00 00 20 8c a0 e5 27 92   ....\.........'.
2990    e8 03 20 8c 90 e5 27 92  94 e5 27 92 40 e0 27 8c   ......'...'.@.'.
29a0    98 e5 27 92 00 01 20 8c  80 e5 27 92 84 e5 27 92   ..'.......'...'.
29b0    80 e4 27 8c e8 e5 27 92  00 00 80 8c 44 00 00 09   ..'...'.....D...
29c0    00 00 20 8c 00 30 20 91  d8 95 00 10 04 e0 20 90   ...0 ...........
29d0    0c 20 09 35 00 00 20 8c  04 e0 20 92 80 e5 37 8c   . .5..........7.
29e0    90 e5 2f 8c a0 e5 27 8c  0c 16 80 5c 06 16 88 5c   ../...'....\...\
29f0    05 16 90 5c 04 16 98 5c  f5 f4 ff 09 1c 20 04 3e   ...\...\..... .>
2a00    00 30 80 8c c0 2e 00 00  e8 0d 00 09 00 30 80 8c   .0...........0..
2a10    ff ff ff ff 00 00 00 0a  a0 e5 27 90 80 28 01 5a   ..........'..(.Z
2a20    b0 00 00 12 88 e5 27 90  00 10 79 90 88 e5 27 90   ......'...y...'.
2a30    04 20 39 8c 04 20 29 90  b0 e5 27 90 10 00 29 3a   . 9.. )...'...):
2a40    00 30 80 8c ff ff ff ff  00 00 00 0a 81 00 20 8c   .0............ .
2a50    58 00 79 3d 00 d0 29 90  b0 e5 27 90 4c 00 29 3d   X.y=..)...'.L.)=
2a60    0d 16 50 5c 00 30 20 8c  0c 53 00 00 0c 40 23 3d   ..P\.0 ..S...@#=
2a70    d8 e5 87 90 00 00 00 0a  00 30 20 8c 0d 53 00 00   .........0 ..S..
2a80    20 80 22 3d d0 e5 27 8c  0c 16 80 5c 0e 16 88 5c    ."=..'....\...\
2a90    04 16 90 5c 0c 46 00 09  01 00 80 8c 00 00 00 0a   ...\.F..........
2aa0    01 00 80 8c 00 00 00 0a  82 00 20 8c 24 00 79 3d   .......... .$.y=
2ab0    00 30 28 8c 20 2f 00 00  00 d0 21 90 05 16 80 5c   .0(. /....!....\
2ac0    04 16 88 5c 2c 0d 00 09  01 00 80 8c 00 00 00 0a   ...\,...........
2ad0    00 30 80 8c a0 2e 00 00  18 0d 00 09 00 30 80 8c   .0...........0..
2ae0    ff ff ff ff 00 00 00 0a  00 00 00 00 00 00 00 00   ................
2af0    20 60 06 8c 00 00 18 8c  00 00 28 8c a0 00 20 8c    `........(... .
2b00    83 00 21 70 00 34 29 82  78 8f 00 10 a0 00 20 8c   ..!p.4).x..... .
2b10    83 00 21 70 00 34 29 92  e0 8e 00 10 a0 00 20 8c   ..!p.4)....... .
2b20    83 00 21 70 00 34 29 ca  ec 8e 00 10 a0 00 20 8c   ..!p.4)....... .
2b30    83 00 21 70 00 34 29 92  e8 8e 00 10 a0 00 20 8c   ..!p.4)....... .
2b40    83 00 21 70 00 34 29 92  f0 8e 00 10 01 e0 20 8c   ..!p.4)....... .
2b50    04 16 18 5c a4 3f 51 39  00 00 18 8c 00 00 28 8c   ...\.?Q9......(.
2b60    05 ce 20 59 00 34 29 ca  00 79 00 10 05 ce 20 59   .. Y.4)..y.... Y
2b70    00 34 29 92 04 79 00 10  05 ce 20 59 00 34 29 92   .4)..y.... Y.4).
```

```
Mar 27 18:20 1996  image.txt Page 12

2b80    08 79 00 10 05 ce 20 59  00 34 29 92 0c 79 00 10   .y.... Y.4)..y..
2b90    05 ce 20 59 00 34 29 92  10 79 00 10 05 ce 20 59   .. Y.4)..y.... Y
2ba0    00 34 29 ca 02 79 00 10  00 30 2a ec ff ff ff ff   .4)..y...0'.....
2bb0    05 ce 20 59 00 34 29 ca  18 79 00 10 05 ce 20 59   .. Y.4)..y.... Y
2bc0    00 34 29 8c 1a 79 00 10  04 00 20 8c 05 16 90 5c   .4)..y.... ....\
2bd0    04 16 88 5c 8c 0a 00 09  01 e0 28 8c 05 16 18 5c   ...\......(....\
2be0    78 00 20 8c 78 1f 29 3c  02 00 20 8c 00 30 20 ca   x. .x.)<.. .0 .
2bf0    00 79 00 10 00 00 20 8c  00 30 20 92 d8 95 00 10   .y.... ..0 .....
2c00    00 30 20 92 dc 95 00 10  00 30 20 92 e0 95 00 10   .0 ......0 .....
2c10    00 30 20 92 d4 95 00 10  98 2f 00 09 84 00 00 09   .0 ....../......
2c20    30 e0 e7 ca 00 30 38 8c  38 2e 00 00 00 30 30 8c   0....08.8....00.
2c30    00 0c 08 10 40 e0 21 8c  00 30 20 8c ff ff ff ff   ....@.!..0 .....
2c40    07 16 80 5c 0a 16 88 5c  00 16 90 5c 04 16 98 5c   ...\...\...\...\
2c50    10 ea ff 09 18 20 04 3e  00 30 80 8c 50 2f 00 00   ..... .>.0..P/..
2c60    40 09 00 09 01 00 80 8c  7e 05 00 09 50 e0 37 8c   @.......x...P.7.
2c70    00 30 28 8c 38 2e 00 00  40 e0 27 8c 06 16 80 5c   .0(.8...@.'....\
2c80    05 16 98 5c 04 16 90 5c  98 ea ff 09 08 20 04 39   ...\...\..... .9
2c90    00 00 00 0a 00 30 80 8c  f0 2d 00 00 04 09 00 09   .....0..-.......
2ca0    01 00 80 8c 3c 0b 00 09  00 00 00 0a 00 00 00 00   ....<...........
2cb0    10 0e 24 59 90 0d 21 59  05 0e 21 59 00 34 81 c8   ..$Y..!Y..!Y.4..
2cc0    18 79 00 10 00 00 00 0a  00 00 00 00 00 00 00 00   .y..............
2cd0    00 00 38 8c 00 30 20 80  78 8f 00 10 28 20 01 3a   ..8..0 .x...( .:
2ce0    24 e0 51 3e 01 e0 29 8c  05 16 38 5c a0 00 20 8c   $.Q>..)...8\.. .
2cf0    85 00 21 70 00 34 21 80  78 8f 00 10 08 20 01 3a   ..!p.4!.x.... .:
2d00    e4 ff 51 39 78 00 20 8c  1c 00 39 3c 00 30 80 8c   ..Q9x. ...9<.0..
2d10    00 2f 00 00 8c 08 00 09  00 30 80 8c ff ff ff ff   ./.......0......
2d20    00 00 00 0a 01 00 28 8c  a0 00 20 8c 87 00 21 70   ......(... ...!p
2d30    00 34 29 82 78 8f 00 10  00 00 18 8c 00 00 28 8c   .4).x.........(.
2d40    a0 00 20 8c 87 00 21 70  03 3d 29 92 f8 8e 00 10   .. ...!p.=).....
2d50    01 e0 28 8c 05 16 18 5c  20 00 20 8c e0 1f 29 3c   ..(....\ . ...)<
2d60    07 16 80 5c 00 00 00 0a  00 00 00 00 00 00 00 00   ...\............
2d70    10 16 18 5c a0 00 20 8c  90 00 21 70 00 34 21 80   ...\.. ...!p.4!.
2d80    78 8f 00 10 10 20 09 3a  00 30 80 8c ff ff ff ff   x.... .:.0......
2d90    00 00 00 0a 00 00 28 8c  a0 00 20 8c 83 00 21 70   ......(... ...!p
2da0    00 34 29 82 78 8f 00 10  05 16 80 5c 00 00 00 0a   .4).x......\....
2db0    01 00 18 8c 78 00 38 8c  00 00 18 8c 05 ce 21 59   ....x.8.......!Y
2dc0    00 34 21 c8 00 79 00 10  10 20 11 3a 01 00 18 8c   .4!..y... .:....
2dd0    07 16 80 5c 5c ee ff 09  81 c9 21 59 04 16 38 5c   ...\\.....!Y..8\
2de0    0c 3f 09 3c d0 ff 00 3d  00 00 80 8c 00 00 00 0a   .?.<...=........
2df0    6c 61 74 20 63 6f 6e 74  72 6f 6c 20 6f 70 65 6e   lat control open
```

```
2e00   20 66 61 69 6c 65 64 00  00 00 00 00 00 00 00 00    failed.........
2e10   75 6e 73 75 70 70 6f 72  74 65 64 20 69 6f 63 74   unsupported ioct
2e20   6c 5f 74 65 73 74 20 63  6f 6d 6d 61 6e 64 20 25   l_test command %
2e30   78 00 00 00 00 00 00 00  67 64 65 76 00 00 01 00   x.......gdev....
2e40   70 69 70 65 20 69 6e 69  74 20 65 72 72 6f 72 0a   pipe init error.
2e50   00 00 00 00 00 00 00 00  00 00 00 00 00 00 00 00   ................
2e60   70 69 70 65 20 6f 70 65  6e 69 6e 67 20 65 72 72   pipe opening err
2e70   6f 72 20 32 0a 00 00 00  00 00 00 00 00 00 00 00   or 2............
2e80   70 69 70 65 20 6f 70 65  6e 69 6e 67 20 65 72 72   pipe opening err
2e90   6f 72 20 31 0a 00 00 00  00 00 00 00 00 00 00 00   or 1............
2ea0   49 4f 43 54 4c 20 77 61  73 6e 27 74 20 61 63 6b   IOCTL wasn't ack
2eb0   65 64 0a 00 00 00 00 00  00 00 00 00 00 10 00 00   ed..............
2ec0   49 4f 43 54 4c 20 67 65  74 6d 73 67 20 66 61 69   IOCTL getmsg fai
2ed0   6c 65 64 00 00 00 00 00  00 00 00 00 00 00 00 00   led.............
2ee0   49 4f 43 54 4c 20 70 75  74 6d 73 67 20 66 61 69   IOCTL putmsg fai
2ef0   6c 65 64 20 66 64 00 00  00 00 00 00 00 00 00 00   led fd..........
2f00   75 73 65 72 20 69 6e 69  74 20 65 72 72 6f 72 0a   user init error.
2f10   00 00 00 00 00 00 00 00  00 00 00 00 00 00 00 00   ................
2f20   49 4f 43 54 4c 20 4e 4f  5f 41 43 4b 20 72 65 63   IOCTL NO_ACK rec
2f30   65 69 76 65 64 20 66 6f  72 20 25 78 0a 00 00 00   eived for %x....
2f40   73 74 72 65 61 6d 00 00  00 00 00 00 00 00 00 00   stream..........
2f50   73 74 72 65 61 6d 20 63  72 65 61 74 69 6f 6e 20   stream creation
2f60   65 72 72 6f 72 00 00 00  80 27 00 00 00 28 00 00   error....'...(..
2f70   a0 28 00 00 a0 28 00 00  a0 28 00 00 a0 28 00 00   .(...(...(...(..
2f80   7c 28 00 00 a0 28 00 00  a0 28 00 00 a0 28 00 00   |(...(...(...(..
2f90   0c 28 00 00 44 28 00 00  00 00 00 00 00 00 00 00   .(..D(..........
2fa0   10 16 48 5c 10 16 50 5c  00 00 58 8c 08 20 04 35   ..H\..P\..X.. .5
2fb0   00 00 00 0a 01 e0 5a 8c  09 16 50 5c 08 60 4a 90   ......Z...P\.`J.
2fc0   10 a0 02 32 0a 16 80 5c  08 28 00 09 14 00 00 08   ...2...\.(......
2fd0   00 30 80 8c b0 34 00 00  0b 16 88 5c 14 08 00 09   .0...4.....\....
2fe0   d4 7f 02 35 00 00 00 0a  00 00 00 00 00 00 00 00   ...5............
2ff0   10 16 30 5c 7c 2d 00 09  10 16 38 5c 10 16 1d 5c   ..0\|-....8\...\
3000   0c 20 04 35 00 00 80 8c  00 00 00 0a 08 a0 21 90   . .5..........!.
3010   04 16 30 5c 14 20 01 35  00 00 20 8c 08 e0 21 92   ..0\. .5.. ...!.
3020   07 16 80 5c 00 00 00 0a  20 a0 01 32 06 16 80 5c   ...\.... ..2...\
3030   40 2d 00 09 08 e0 80 92  08 e0 18 90 08 a0 21 90   @-............!.
3040   04 16 30 5c e8 3f 01 35  00 00 20 8c 08 e0 20 92   ..0\.?.5.. ... .
3050   07 16 80 5c 00 00 00 0a  00 00 00 00 00 00 00 00   ...\............
3060   10 16 78 5c 11 16 30 5c  0c 60 04 3d 01 00 80 8c   ..x\..0\.`.=....
3070   00 00 00 0a 70 a0 01 3b  0f 16 38 5c 00 e8 03 5a   ....p..;..8\...Z
```

Mar 27 18:20 1996 image.txt Page 14

```
3080    18 00 00 12 14 e0 23 90  0d 20 29 80 14 e0 21 90   ......#.. )....!.
3090    0d 20 21 80 40 00 29 3d  10 e0 29 90 0c e0 21 90   . !.@.)=..)....!.
30a0    04 41 21 59 18 00 31 3f  0c e0 21 90 04 a0 21 59   .A!Y..1?..!...!Y
30b0    0c e0 21 92 01 00 80 8c  00 00 00 0a 10 e0 29 90   ..!...........).
30c0    0c e0 21 90 04 41 21 59  84 81 31 59 0c e0 21 90   ..!..A!Y..1Y..!.
30d0    10 e0 21 92 08 e0 21 90  04 16 38 5c a8 3f 01 35   ..!...!...8\.?.5
30e0    38 00 00 08 94 a0 01 3e  01 18 38 5c 00 00 18 8c   8......>..8\....
30f0    38 e0 03 32 14 e0 23 90  0d 20 29 80 14 e0 21 90   8..2..#.. )....!.
3100    0d 20 21 80 18 00 29 3d  10 e0 29 90 0c e0 21 90   . !...)=..)....!.
3110    04 41 21 59 08 20 01 3c  07 18 18 5c 08 e0 21 90   .A!Y. .<...\..!.
3120    04 18 38 5c 80 3f 01 35  44 e0 00 32 10 e0 20 90   ..8\.?.5D..2.. .
3130    04 a0 29 59 0c e0 20 90  18 00 29 34 10 e0 20 90   ..)Y.. ...)4.. .
3140    04 80 21 59 10 e0 20 92  01 00 80 8c 00 00 00 0a   ..!Y.. .........
3150    10 e0 28 90 0c e0 20 90  04 41 21 59 86 00 31 59   ..(... ..A!Y..1Y
3160    0c e0 20 90 10 e0 20 92  0c 00 00 08 00 00 80 8c   .. ... .........
3170    00 00 00 0a 74 bf 01 35  00 00 80 8c 00 00 00 0a   ....t..5........
3180    10 16 60 5c 11 16 58 5c  08 20 74 90 10 20 2c 90   ..`\..X\. t.. ,.
3190    0c 20 24 90 04 41 79 59  00 30 20 8c ff ff ff ff   . $..AyY.0 .....
31a0    91 20 01 5a 10 01 00 15  48 a0 03 32 14 a0 23 90   . .Z....H..2..#.
31b0    0d 20 29 80 14 20 23 90  0d 20 21 80 34 00 29 3d   . ).. #.. !.4.)=
31c0    10 a0 2b 90 0c a0 23 90  04 41 21 59 8f 00 79 59   ..+...#..A!Y..yY
31d0    08 a0 23 90 04 16 70 5c  18 20 01 32 14 a0 23 90   ..#...p\. .2..#.
31e0    0d 20 29 80 14 20 23 90  0d 20 21 80 d4 1f 29 3a   . ).. #.. !...):
31f0    10 20 2b 90 0c 20 23 90  04 41 21 59 84 c1 33 59   . +.. #..A!Y..3Y
3200    14 20 23 90 08 20 29 90  10 20 23 90 04 41 21 59   . #.. ).. #..A!Y
3210    18 00 31 3e 00 30 80 8c  d0 34 00 00 d4 05 00 09   ..1>.0...4......
3220    00 00 80 8c 00 00 00 0a  08 20 23 90 04 16 70 5c   ......... #...p\
3230    7c 20 01 32 14 a0 23 90  0d 20 29 80 14 20 23 90   | .2..#.. ).. #.
3240    0d 20 21 80 68 00 29 3d  10 20 3b 90 0c a0 33 90   . !.h.)=. ;...3.
3250    10 a0 2b 90 0c a0 23 90  04 41 21 59 07 16 80 5c   ..+...#..A!Y...\
3260    06 16 88 5c 04 16 90 5c  40 e3 ff 0b 10 a0 2b 90   ...\...\@.....+.
3270    0c a0 23 90 04 41 29 59  10 20 23 90 04 40 21 59   ..#..A)Y. #..@!Y
3280    10 20 23 92 0c a0 23 90  10 a0 23 92 08 a0 23 90   . #...#...#...#.
3290    04 16 70 5c 18 20 01 32  14 a0 23 90 0d 20 29 80   ..p\. .2..#.. ).
32a0    14 20 23 90 0d 20 21 80  a0 1f 29 3a 01 00 80 8c   . #.. !...):....
32b0    00 00 00 0a 0c c0 6b 39  01 00 80 8c 00 00 00 0a   ......k9........
32c0    48 a0 03 32 14 a0 23 90  0d 20 29 80 14 20 23 90   H..2..#.. ).. #.
32d0    0d 20 21 80 34 00 29 3d  10 a0 2b 90 0c a0 23 90   . !.4.)=..+...#.
32e0    04 41 21 59 6f 00 79 59  08 a0 23 90 04 16 70 5c   .A!Y..yY..#...p\
32f0    18 20 01 32 14 a0 23 90  0d 20 29 80 14 20 23 90   . .2..#.. ).. #.
```

Mar 27 18:20 1996 image.txt Page 15

```
3300    0d 20 21 80 04 1f 29 3a  0c 40 70 3b 00 00 30 8c   . ..../:.@(;....
3310    00 00 00 0a 10 20 29 90  0c 20 23 90 04 41 79 59   .....  *.. #..Ay!
3320    04 a0 03 32 90 40 7b 3c  14 a0 23 90 03 20 23 90   ...2.@{;..#.. /.
3330    14 20 23 90 0d 20 21 80  7c 00 29 3c 10 20 3b 90   . #.. !.(.;=. ;.
3340    0c a0 33 90 10 a0 2b 90  0c a0 23 90 04 41 21 59   ..3...+...#..A!Y
3350    07 16 80 5c 06 16 86 5c  04 16 90 5c 4c e8 1f 0b   ...\...\...\L...
3360    10 a0 2b 90 0c a0 23 90  04 41 21 59 61 00 79 59   ..+...#..A!Y..y!
3370    10 a0 2b 90 0c a0 23 90  04 41 29 59 10 20 23 90   ..+...#..A)Y. #.
3380    04 40 21 59 10 20 23 92  0c a0 23 90 10 a0 23 92   .@!Y. #...#...#.
3390    08 a0 23 90 04 16 70 5c  1c 20 01 32 13 40 7b 3b   ..#...p\. .2.@{;
33a0    14 a0 23 90 0d 20 29 90  14 20 23 90 0c 20 21 80   ..#.. )..#.. !.
33b0    8c 1f 29 3a 01 00 80 8c  00 00 00 0a 00 00 00 00   ..):............
33c0    10 16 78 5c 3c 2a 00 09  10 16 38 5c 10 20 04 33   ..x\<*....8\ .3
33d0    00 30 80 8c 90 34 00 00  18 04 00 09 07 16 80 5c   .0...4.........\
33e0    10 23 00 09 00 00 80 8c  00 00 00 0a 08 e0 23 90   .#............#.
33f0    04 16 30 5c 07 16 18 5c  48 20 01 32 06 16 80 5c   ..0\...\H .2...\
3400    00 2a 00 09 10 16 28 5c  28 20 04 35 00 30 80 8c   .*....(\( .5.0..
3410    90 34 00 00 dc 03 00 09  07 16 80 5c 84 1b 1f 09   .4.........\....
3420    05 16 80 5c ac 23 00 09  00 00 80 8c 00 00 00 0a   ...\.#..........
3430    08 e0 28 92 08 a0 21 90  04 16 30 5c c0 3f 01 35   ..(...!...0\.?.5
3440    07 16 80 5c 00 00 00 0a  00 00 00 00 00 00 00 00   ...\............
3450    10 16 38 5c 00 00 18 8c  14 e0 21 90 0d 20 21 80   ..8\......!.. !.
3460    14 20 01 3d 10 e0 29 90  0c e0 21 90 04 41 21 59   . .=..)...!..A!Y
3470    83 00 19 59 08 e0 21 90  04 16 38 5c dc 3f 01 35   ...Y..!...8\.?.5
3480    03 16 80 5c 00 00 00 0a  00 00 00 00 00 00 00 00   ...\............
3490    63 6f 70 79 6d 73 67 3a  20 63 6f 70 79 20 66 61   copymsg: copy fa
34a0    69 6c 75 72 65 0a 00 00  00 00 00 00 00 00 00 00   ilure...........
34b0    46 72 65 65 6d 73 67 23  20 45 72 72 6f 72 20 4e   Freemsg# Error N
34c0    75 6c 6c 20 4d 70 20 69  20 3d 20 25 64 0a 00 00   ull Mp i = %d...
34d0    70 75 6c 6c 75 70 6d 73  67 20 66 61 69 6c 65 64   pullupmsg failed
34e0    3a 20 66 69 72 73 74 20  6d 62 6c 6b 20 74 6f 6f   : first mblk too
34f0    20 73 68 6f 72 74 0a 00  00 00 00 00 00 00 00 00    short..........
3500    10 16 30 5c 00 30 20 90  e0 95 00 10 6c 20 01 32   ..0\.0 .....l .2
3510    01 00 20 8c 00 30 20 92  e4 95 00 10 00 30 28 90   .. ..0 ......0(.
3520    e0 95 00 10 05 16 38 5c  05 16 80 5c a4 0d 00 09   ......8\...\....
3530    00 30 20 90 d8 95 00 10  24 00 29 32 00 d0 21 90   .0 .....$.)2..!.
3540    04 20 21 90 28 20 01 32  00 d0 21 90 04 20 19 90   . !.( .2..!.. ..
3550    07 16 80 5c 00 d0 00 86  14 00 00 08 00 00 20 8c   ...\.......... .
3560    00 30 20 92 d8 95 00 10  00 00 00 0a 00 30 20 90   .0 ..........0 .
3570    e0 95 00 10 9c 3f 01 35  00 00 20 8c 00 30 20 92   .....?.5.. ..0 .
```

Mar 27 16:20 1996 image.txt Page 16

```
3580   e4 95 00 10 80 0f 01 3d  00 00 00 0a 00 00 00 00   .......=........
3590   00 00 80 8c 8c ff ff 09  fe ff ff 08 00 00 00 00   ....1...........
35a0   50 e0 c8 8c 00 30 18 8c  90 38 00 00 11 15 10 5c   P'...0...8.... \
35b0   05 15 80 5c 04 15 88 5c  38 02 00 08 00 00 30 00   ...\...\8.......
35c0   14 15 80 5f 00 30 18 8c  8c 38 00 00 10 15 20 5c   .. _.0...8.... \
35d0   05 16 80 5c 04 16 88 5c  16 02 00 09 00 30 80 8c   ...\...\.....0..
35e0   30 38 00 00 0d 16 88 5c  08 02 00 09 00 00 18 8c   08.....\........
35f0   80 6e 03 5a 00 00 20 24  4c 20 01 30 00 30 30 8c   .n.Z.. $L .0.00.
3600   88 38 00 00 0e c0 20 59  c0 10 29 00 ff 00 20 8c   .8.... Y..)... .
3610   e3 00 21 58 05 16 80 5c  04 16 88 5c a4 01 00 09   ..!X...\...\....
3620   01 e0 30 8c 06 16 18 5c  88 80 02 5a 00 00 08 24   ..0....\...Z...$
3630   32 00 20 8c 86 20 01 5a  00 00 20 24 85 00 21 58   2. .. .Z.. $..!X
3640   8c 3f 01 3d 00 30 80 8c  9c 38 00 00 a4 01 00 08   .?.=.0...8......
3650   10 15 20 5c 11 16 80 5c  04 16 88 5c 44 df ff 08   .. \...\...\D...
3660   00 00 28 8c 11 16 20 5c  05 16 88 5c 04 16 90 5c   ..(... \...\...\
3670   a0 de ff 08 00 00 00 00  00 00 00 00 00 00 00 00   ................
3680   11 16 80 5c 12 16 88 5c  a8 22 00 08 00 00 00 00   ...\...\."......
3690   00 30 80 8c 60 38 00 00  58 01 00 08 00 00 00 00   .0..`8..X.......
36a0   00 30 80 8c a0 38 00 00  46 01 00 08 00 00 00 00   .0...8..H.......
36b0   10 0e 24 59 90 0d 31 59  11 16 38 5c 12 16 18 5c   ..$Y..1Y..8\...\
36c0   1c a0 04 32 18 e0 08 32  a0 00 20 8c 86 00 21 70   ...2...2.. ...!p
36d0   07 3d 19 92 f8 8e 00 10  00 00 00 0a 00 00 28 8c   .=............(.
36e0   a0 00 20 8c 86 00 21 70  07 3d 29 92 f8 8e 00 10   .. ...!p.=).....
36f0   00 00 00 0a 00 00 00 00  00 00 00 00 00 00 00 00   ................
3700   10 16 28 5c 10 16 30 5c  00 00 20 8c 14 20 24 92   ..(\..0\.. .. $.
3710   50 20 24 90 14 20 01 32  00 90 21 90 50 a0 39 90   P $.. .2..!.P.9.
3720   04 16 80 5c 00 d0 01 84  00 30 80 8c c0 38 00 00   ...\.....0...8..
3730   05 16 88 5c bc 00 00 08  00 00 00 00 00 00 00 00   ...\............
3740   10 0e 24 59 90 0d 29 59  05 16 30 5c 11 16 38 5c   ..$Y..)Y..0\..8\
3750   d0 58 00 09 10 16 18 5c  a0 00 20 8c 85 00 21 70   .X.....\.. ...!p
3760   00 34 21 90 f4 8e 00 10  18 20 01 3a a0 00 20 8c   .4!...... .:.. .
3770   86 00 21 70 00 34 81 90  f4 8e 00 10 f4 04 00 09   ..!p.4..........
3780   00 00 28 8c a0 00 20 8c  86 00 21 70 00 34 29 92   ..(... ...!p.4).
3790   f4 8e 00 10 03 16 80 5c  a8 58 00 09 08 e0 01 35   .......\.X.....5
37a0   00 00 00 0a 00 30 28 8c  00 37 00 00 a0 00 20 8c   .....0(..7.... .
37b0   86 00 21 70 00 34 21 8c  e0 8e 00 10 05 16 80 5c   ..!p.4!........\
37c0   04 16 88 5c 07 16 90 5c  98 04 00 09 a0 00 20 8c   ...\...\...... .
37d0   86 00 21 70 00 34 81 92  f4 8e 00 10 00 00 00 0a   ..!p.4..........
37e0   90 58 00 08 00 00 00 00  00 00 00 00 00 00 00 00   .X..............
37f0   20 61 08 8c 50 e0 c7 b2  08 a0 07 35 30 e1 f7 8c    a..P......50...
```

```
Mar 27 15:26 1996  image.txt Page 17

3800    1e 16 20 5c 40 e0 27 92  00 00 10 8c 04 20 69 91   .. \@.........  ..
3810    08 20 91 9a 10 20 a1 b2  10 20 c1 b2 01 00 50 8c   . ... ..  ......
3820    50 e0 c7 b0 00 30 00 0a  00 00 00 00 00 00 00 00   P...............
3830    42 75 66 66 65 72 20 6c  65 6e 67 74 68 3a 20 25   Buffer length: %
3840    64 20 62 75 66 66 65 72  20 28 68 65 78 29 3a 20   d buffer (hex): 
3850    00 00 00 00 00 00 00 00  00 00 00 00 00 00 00 00   ................
3860    77 61 6b 65 75 70 20 65  6e 74 65 72 65 64 2c 20   wakeup entered, 
3870    6e 75 6c 6c 20 61 63 74  69 6f 6e 0a 00 00 00 00   null action.....
3880    25 73 20 00 00 00 00 00  25 30 32 78 2e 00 00 00   %s .....%02x....
3890    45 52 52 4f 52 3a 25 73  0a 00 00 00 0a 00 00 00   ERROR:%s........
38a0    73 6c 65 65 70 20 63 61  6c 6c 65 64 2c 20 6e 75   sleep called, nu
38b0    6c 6c 20 61 63 74 69 6f  6e 0a 00 00 00 00 00 00   ll action.......
38c0    53 69 67 6e 61 6c 20 41  6c 61 72 6d 20 20 6f 6e   Signal Alarm  on
38d0    20 20 75 73 65 72 20 25  78 0a 00 00 00 00 00 00     user %x.......
38e0    00 00 18 8c 00 00 28 8c  05 ce 20 59 00 34 29 92   ........(... Y.4).
38f0    f0 95 00 10 05 ce 20 59  00 34 29 92 f4 95 00 10   ...... Y.4).....
3900    05 ce 20 59 00 34 29 92  f8 95 00 10 05 ce 20 59   .. Y.4)....... Y
3910    00 34 29 92 fc 95 00 10  01 e0 28 8c 05 16 18 5c   .4).......(....\
3920    64 00 20 8c c0 1f 29 3c  03 00 20 8c 00 30 20 92   d. ...)<.. ..0 .
3930    f0 95 00 10 00 00 20 8c  00 30 20 92 70 a2 00 10   ...... ..0 .p...
3940    00 30 20 92 74 a2 00 10  00 30 20 92 78 a2 00 10   .0 .t....0 .x...
3950    00 30 20 92 7c a2 00 10  00 30 20 92 80 a2 00 10   .0 .|....0 .....
3960    a0 57 00 08 00 00 00 00  00 00 00 00 00 00 00 00   .W..............
3970    e0 57 00 08 00 00 00 00  00 00 00 00 00 00 00 00   .W..............
3980    10 16 60 5c 11 16 68 5c  12 16 70 5c 13 16 58 5c   ..`\..h\..p\..X\
3990    00 00 38 8c 08 a0 04 3e  00 00 70 8c 8a 8d 23 74   ..8....>..p...#t
39a0    02 20 71 8c 7c 56 00 09  10 16 30 5c 00 00 78 8c   . q.|V....0\..x.
39b0    00 30 20 90 f0 95 00 10  2c 20 01 3a 64 00 20 8c   .0 ....., .:d. .
39c0    24 00 79 3b 01 e0 23 8c  04 16 78 5c 05 0e 21 59   $.y;..#...x\..!Y
39d0    00 34 21 90 f0 95 00 10  0c 20 01 3a 64 00 20 8c   .4!...... .:d. .
39e0    e4 1f 79 3c 64 00 20 8c  24 00 79 3d 00 30 80 8c   ..y<d. .$.y=.0..
39f0    d0 41 00 00 ac fb ff 09  06 16 80 5c 44 56 00 09   .A.........\DV..
3a00    00 30 80 8c ff ff ff ff  00 00 00 0a 03 00 28 8c   .0............(.
3a10    05 ce 23 59 00 34 29 92  f0 95 00 10 05 ce 23 59   ..#Y.4).......#Y
3a20    00 34 61 92 00 96 00 10  05 ce 23 59 00 34 69 92   .4a.......#Y.4i.
3a30    04 96 00 10 05 ce 23 59  00 34 59 92 08 96 00 10   ......#Y.4Y.....
3a40    00 30 20 90 74 a2 00 10  5c 20 01 3d 05 ce 23 59   .0 .t...\ .=..#Y
3a50    00 34 71 92 fc 95 00 10  00 00 28 8c 05 ce 23 59   .4q.......(...#Y
3a60    00 34 39 92 f8 95 00 10  05 ce 23 59 00 34 29 92   .49.......#Y.4).
3a70    f4 95 00 10 05 ce 23 59  00 34 21 8c f0 95 00 10   ......#Y.4!.....
```

Mar 27 18:20 1995 image.txt Page 19

```
3a80    00 30 20 92 70 a2 00 10  01 00 20 8c 00 30 20 92   .0 .p...... ..0 .
3a90    74 a2 00 10 06 16 80 5c  a8 53 00 09 01 16 80 5c   t.......\.S.....\
3aa0    00 00 00 1a 10 10 10 90  70 a2 00 10 04 1e 18 5c   ........p.......\
3ab0    0c 20 21 90 87 00 21 59  34 80 23 39 04 e0 20 90   . !...!Y4.#9.. .
3ac0    2c 20 01 32 0c e0 20 90  87 00 29 39 03 16 38 5c   , ..2.. ...)9..8\
3ad0    04 e0 20 90 04 16 18 5c  0c 20 21 90 55 00 21 59   .. ......\. !.U.!Y
3ae0    0c 80 23 39 04 e0 20 90  dc 3f 01 35 24 e0 00 35   ..#9.. ....5$..5
3af0    00 30 80 8c a0 41 00 00  a0 1a ff 09 06 16 80 5c   .0...A..........\
3b00    40 55 00 09 00 30 80 5c  ff ff ff ff 00 00 00 0a   @U...0.\........
3b10    0c e0 20 90 87 c0 21 59  c4 80 23 3e 00 30 20 92   .. ....!Y..#>.0 .
3b20    70 a2 00 10 2c 00 19 35  05 ce 23 59 00 34 21 8c   p...,..5..#Y.4!.
3b30    f0 95 00 10 00 30 20 92  70 a2 00 10 00 00 28 8c   .....0 .p.....(.
3b40    05 ce 23 59 00 34 29 92  f8 95 00 10 28 00 00 0e   ..#Y.4).....(...
3b50    05 ce 23 59 00 34 29 8c  f0 95 00 10 08 e0 20 92   ..#Y.4)....... .
3b60    04 20 29 92 0c e0 28 90  05 ce 23 59 00 34 29 92   . )...(...#Y.4).
3b70    f8 95 00 10 05 ce 23 59  00 34 19 92 f4 95 00 10   ......#Y.4......
3b80    87 81 2b 59 05 ce 23 59  00 34 29 92 fc 95 00 10   ..+Y..#Y.4).....
3b90    05 ce 23 59 00 34 21 8c  f0 95 00 10 08 e0 20 92   ..#Y.4!....... .
3ba0    05 ce 23 59 00 34 29 90  fc 95 00 10 0c e0 20 90   ..#Y.4)....... .
3bb0    65 01 21 59 0c e0 20 92  00 30 20 90 74 a2 00 10   ..!Y.. ..0 .t...
3bc0    01 20 21 8c 00 30 20 92  74 a2 00 10 06 16 80 5c   . !..0 .t......\
3bd0    70 54 00 09 0f 16 80 5c  00 00 00 0a 05 ce 23 59   pT.....\......#Y
3be0    00 34 21 8c f0 95 00 10  04 e0 20 92 05 ce 23 59   .4!....... ...#Y
3bf0    00 34 19 92 f8 95 00 10  00 00 28 8c 05 ce 23 59   .4........(...#Y
3c00    00 34 29 92 f4 95 00 10  87 81 2b 59 0c e0 20 90   .4).......+Y.. .
3c10    84 41 29 59 05 ce 23 59  00 34 29 92 fc 95 00 10   .A)Y..#Y.4).....
3c20    00 30 20 90 74 a2 00 10  01 20 21 8c 00 30 20 92   .0 .t.... !..0 .
3c30    74 a2 00 10 06 16 80 5c  08 54 00 09 0f 16 80 5c   t......\.T.....\
3c40    00 00 00 0a 00 00 00 00  00 00 00 00 00 00 00 00   ................
3c50    01 00 98 8c 2c fd ff 08  00 00 00 00 00 00 00 00   ....,...........
3c60    02 00 98 8c 1c fd ff 08  00 00 00 00 00 00 00 00   ................
3c70    10 16 38 5c ac 53 00 09  10 16 18 5c 0c e0 01 39   ..8\.S.....\...9
3c80    64 00 20 8c 18 00 39 3c  00 30 80 8c 80 40 00 00   d. ...9<.0...@..
3c90    10 f9 ff 09 03 16 80 5c  a8 53 00 08 05 ce 21 59   .......\.S....!Y
3ca0    00 34 21 90 f0 95 00 10  1c 20 09 3d 02 00 28 8c   .4!...... .=..(.
3cb0    05 ce 21 59 00 34 29 92  f0 95 00 10 03 16 80 5c   ..!Y.4)........\
3cc0    80 53 00 08 05 ce 21 59  00 34 21 90 f0 95 00 10   .S....!Y.4!.....
3cd0    18 20 19 3a 00 30 80 8c  b0 40 00 00 c4 f8 ff 09   . .:.0...@......
3ce0    03 16 80 5c 5c 53 00 08  00 30 28 90 70 a2 00 10   ...\\S...0(.p...
3cf0    05 ce 21 59 00 34 21 8c  f0 95 00 10 58 00 29 35   ..!Y.4!.....X.)5
```

```
Mar 27 15:20 1996  image.txt Page 15

3a00    05 ce 21 59 00 34 21 90  f4 95 00 10 00 30 20 92    ..!Y.4!.......0 .
3a10    70 a2 00 10 00 30 20 90  70 a2 00 10 a4 20 01 32    p....0 .p.... .2
3a20    00 00 28 8c 00 30 20 90  70 a2 00 10 0e 20 29 92    ......0 .p.... ).
3a30    05 ce 21 59 00 34 31 90  fc 95 00 10 00 20 29 90    ..!Y.41...... ).
3a40    70 a2 00 10 0c 60 21 90  54 80 21 59 0c 60 21 92    p....`!.T.!Y.`!.
3a50    70 00 00 08 05 ce 21 59  00 34 29 90 f4 95 00 10    p.....!Y.4).....
3a60    05 ce 21 59 00 34 21 90  f8 95 00 10 04 20 29 91    ..!Y.4!...... ).
3a70    05 ce 21 59 00 34 21 90  f4 95 00 10 44 20 01 32    ..!Y.4!.....D .2
3a80    05 ce 21 59 00 34 29 90  f8 95 00 10 05 ce 21 59    ..!Y.4).......!Y
3a90    00 34 21 90 f4 95 00 10  08 20 29 92 05 ce 21 59    .4!..... )...!Y
3aa0    00 34 31 90 fc 95 00 10  05 ce 21 59 00 34 29 90    .41.......!Y.4).
3ab0    f4 95 00 10 0c 60 21 90  64 80 21 59 0c 60 21 92    .....`!.d.!Y.`!.
3ac0    00 00 28 8c 05 ce 21 59  00 34 29 92 f4 95 00 10    ......!Y.4).....
3ad0    05 ce 21 59 00 34 29 92  f8 95 00 10 00 30 20 90    ..!Y.4)......0 .
3ae0    74 a2 00 10 81 09 21 59  00 30 20 92 74 a2 00 10    t.....!Y.0 .t...
3af0    05 ce 21 59 00 34 29 92  f0 95 00 10 03 16 80 5c    ..!Y.4).........\
3e00    40 52 00 08 00 00 00 00  00 00 00 00 00 00 00 00    @R..............
3e10    10 16 30 5c 0c 52 00 09  10 16 38 5c 0c a0 01 39    ..0\.R....8\...9
3e20    64 00 20 8c 18 00 31 3c  00 30 80 8c 10 41 00 00    d. ...1<.0...A..
3e30    70 f7 ff 09 07 16 80 5c  08 52 00 08 05 8e 21 59    p......\.R....!Y
3e40    00 34 21 90 f0 95 00 10  0c 20 09 3d 01 00 18 8c    .4!...... .=....
3e50    34 00 00 08 05 8e 21 59  00 34 21 90 f0 95 00 10    4.....!Y.4!.....
3e60    0c 20 11 3d 00 00 18 8c  1c 00 00 08 00 30 80 8c    . .=.........0..
3e70    e0 40 00 00 2c f7 ff 09  00 00 18 8c 07 16 80 5c    .@..,..........\
3e80    c0 51 00 08 00 00 28 8c  05 8e 21 59 00 34 29 92    .Q....(...!Y.4).
3e90    f0 95 00 10 07 16 80 5c  a8 51 00 09 03 16 80 5c    .......\.Q.....\
3ea0    00 00 00 0a 00 00 00 00  00 00 00 00 00 00 00 00    ................
3eb0    00 30 20 90 78 a2 00 10  01 0c 81 59 00 00 00 0a    .0 .x......Y....
3ec0    60 51 00 09 10 16 78 5c  00 30 20 90 e4 95 00 10    `Q....x\.0 .....
3ed0    1c 20 01 3a 00 30 20 90  7c a2 00 10 01 20 21 8c    . .:.0 .|.... !.
3ee0    00 30 20 92 7c a2 00 10  18 00 00 08 00 30 20 90    .0 .|........0 .
3ef0    80 a2 00 10 01 20 21 8c  00 30 20 92 80 a2 00 10    ..... !..0 .....
3f00    00 30 20 90 78 a2 00 10  01 20 21 8c 00 30 20 92    .0 .x.... !..0 .
3f10    78 a2 00 10 00 30 20 90  74 a2 00 10 0c 20 01 3d    x....0 .t.... .=
3f20    0f 16 80 5c 1c 51 00 08  00 30 28 90 70 a2 00 10    ...\.Q...0(.p...
3f30    05 16 38 5c 0c 60 21 90  81 09 21 59 0c 60 21 92    ..8\.`!...!Y.`!.
3f40    00 00 20 8c 00 30 20 92  70 0c 06 10 0c 60 21 90    .. ..0 .p....`!.
3f50    80 28 01 5a 24 01 00 14  00 30 20 90 74 a2 00 10    .(.Z$....0 .t...
3f60    80 28 01 5a 14 01 00 13  0c e0 21 90 10 20 01 3a    .(.Z......!.. .:
3f70    00 30 80 8c 40 41 00 00  28 f6 ff 09 00 a0 21 90    .0..@A..(.....!.
```

Mar 27 13:20 1996 image.txt Page 20

```
3180    4c 20 19 3d 18 e0 21 90  18 20 09 3d 14 e0 21 90   L .=..!.. .=..!.
3190    10 e0 19 90 04 16 e0 5c  00 d0 00 86 3c 00 00 c8   ........ ....<..
31a0    00 30 20 8c 10 95 00 10  04 e1 21 59 05 0d 31 5c   .0 .......!Y..1\
31b0    10 e0 29 90 14 e0 21 90  06 16 80 0c 05 16 0c 5c   ..).....!.......\
31c0    04 16 90 5c 1c 37 00 09  1c 00 00 0a 00 30 80 8c   ...\.7.......0..
31d0    70 41 00 00 cc f5 ff 09  18 e0 21 90 10 20 09 3d   pA........!.. .=
31e0    00 00 20 8c 00 d0 21 92  02 00 00 08 01 00 20 8c   .. ...!....... .
31f0    00 d0 21 92 00 30 20 90  74 a2 00 10 61 05 21 53   ..!..0 .t...a.!S
4000    00 30 20 92 74 a2 00 10  00 30 20 90 70 a2 00 10   .0 .t....0 .p...
4010    4e 00 39 35 04 e0 21 90  2c 20 01 32 04 e0 21 9c   N.95..!., .2..!.
4020    00 10 21 90 20 20 19 3d  14 e0 29 90 00 30 2e 92   ..!.  .=..)..0..
4030    70 a2 00 10 05 16 38 5c  00 00 20 8c 06 60 21 92   p.....8\.. ..`!.
4040    20 00 00 08 00 00 20 8c  00 30 20 92 70 a2 00 10    ..... .0 .p...
4050    0f 16 60 5c ec 4f 00 08  00 30 38 90 70 a2 00 10   ..`\.O...08.p...
4060    0c e0 21 90 14 20 01 3c  00 30 20 90 74 a2 00 10   ..!.. .<.0 .t...
4070    80 28 01 5a f4 fe ff 14  0f 16 80 5c c4 4f 00 08   .(.Z.......\.O..
4080    55 4e 54 49 4d 45 4f 55  54 20 20 23 30 30 32 3a   UNTIMEOUT  #002:
4090    20 69 6e 76 61 6c 69 64  20 74 69 6d 65 72 20 69    invalid timer i
40a0    64 20 0a 00 00 00 00 00  00 00 00 00 00 00 00 00   d ..............
40b0    55 4e 54 49 4d 45 4f 55  54 20 20 23 30 30 32 3a   UNTIMEOUT  #002:
40c0    20 74 69 6d 65 6f 75 74  20 6e 6f 74 20 61 63 74    timeout not act
40d0    69 76 65 0a 00 00 00 00  00 00 00 00 00 00 00 00   ive.............
40e0    55 4e 54 49 4d 45 4f 55  54 20 20 23 30 30 32 3a   UNTIMEOUT  #002:
40f0    20 4c 6f 6e 67 20 74 69  6d 65 6f 75 74 20 6e 6f    Long timeout no
4100    74 20 76 61 6c 69 64 0a  00 00 00 00 00 00 00 00   t valid.........
4110    43 48 45 43 4b 4c 4f 4e  47 20 20 23 30 30 31 3a   CHECKLONG  #001:
4120    20 69 6e 76 61 6c 69 64  20 74 69 6d 65 72 20 69    invalid timer i
4130    64 20 0a 00 00 00 00 00  00 00 00 00 00 00 00 00   d ..............
4140    54 49 4d 45 52 5f 49 4e  54 20 20 23 30 30 31 3a   TIMER_INT  #001:
4150    20 6e 65 67 61 74 69 76  65 20 63 6f 75 6e 74 20    negative count
4160    76 61 6c 75 65 0a 00 00  00 00 00 00 00 00 00 00   value...........
4170    54 49 4d 45 52 5f 49 4e  54 20 20 23 30 30 32 3a   TIMER_INT  #002:
4180    20 46 52 45 45 44 20 65  6e 74 72 79 20 69 6e 20    FREED entry in
4190    74 6f 5f 74 62 6c 0a 00  00 00 00 00 00 00 00 00   to_tbl..........
41a0    54 49 4d 45 4f 55 54 3a  20 20 20 20 23 30 30 33   TIMEOUT:    #003
41b0    20 4e 75 6c 6c 20 65 6e  74 72 79 20 69 6e 20 74    Null entry in t
41c0    2e 6f 2e 20 63 68 61 69  6e 0a 00 00 00 00 00 00   .o. chain.......
41d0    54 49 4d 45 4f 55 54 20  20 23 30 30 31 3a 20 4e   TIMEOUT  #001: N
41e0    6f 20 6d 6f 72 65 20 66  72 65 65 20 65 6e 74 72   o more free entr
41f0    69 65 73 20 69 6e 20 74  6f 5f 74 62 6c 0a 00 00   ies in to_tbl...
```

Mar 27 18:20 1996 image.txt Page 21

```
4200   10 16 30 5c 08 20 04 35  00 00 00 0a 1a 10 21 88   ..0\. .5.......!.
4210   08 20 01 30 00 00 00 0a  08 4e 00 09 10 18 38 5c   . .0.....N....8\
4220   1a a0 21 88 0c 20 01 30  07 18 80 5c 14 4e 00 0c   ..!.. .0.....N..
4230   00 90 29 90 00 30 20 8c  40 0c 08 10 44 00 2f 35   ...).0 .@...D./5
4240   14 a0 21 90 04 16 18 5c  30 20 01 32 98 e0 20 90   ..!.....\0 .2.. .
4250   28 20 01 3a 04 e0 20 90  20 20 01 32 10 e0 20 90   ( .:.. .  .2.. .
4260   20 20 01 3b 10 e0 80 90  08 1a ff 09 00 00 20 dc     .;........... .
4270   10 e0 20 92 0c 00 00 08  07 16 80 5c c4 4d 00 08   .. .........\.M..
4280   00 30 20 90 dc 95 00 10  1c 20 01 32 00 30 20 90   .0 ...... .2.0 .
4290   dc 95 00 10 10 20 31 92  00 30 30 92 dc 95 00 10   ..... 1..00.....
42a0   14 00 00 0d 00 30 30 92  dc 95 00 10 00 30 30 92   .....00......00.
42b0   e0 95 00 10 00 00 20 8c  10 a0 21 92 1a a0 21 88   ...... ..!...!.
42c0   80 09 21 58 1a a0 21 8a  07 18 80 5c 74 4d 00 08   ..!X..!....\tM..
42d0   10 16 68 5c 00 30 20 90  e0 95 00 10 14 20 01 35   ..h\.0 ...... .5
42e0   00 30 80 8c e0 52 00 00  0d 15 88 5c 04 15 ff 08   .0...R.....\....
42f0   1a 60 2b 88 00 30 20 8c  ff ff 00 00 85 00 21 58   .`+..0 .......!X
4300   14 20 01 37 00 30 80 8c  00 52 00 00 0d 16 88 5c   . .7.0...R.....\
4310   e0 14 ff 08 0c 4d 00 09  10 16 78 5c 00 30 20 90   .....M....x\.0 .
4320   e0 95 00 10 44 40 23 35  10 60 23 90 00 30 20 92   ....D@#5.`#..0 .
4330   e0 95 00 10 00 30 20 90  dc 95 00 10 10 40 23 35   .....0 ......@#5
4340   00 00 20 8c 00 30 20 92  dc 95 00 10 00 00 20 8c   .. ..0 ....... .
4350   10 60 23 92 1a 60 23 88  00 0e 21 58 1a 60 23 8a   .`#..`#...!X.`#.
4360   0f 16 80 5c dc 4c 00 08  00 30 20 90 e0 95 00 10   ...\.L...0 .....
4370   04 16 70 5c 40 20 01 32  10 a0 23 90 38 40 23 32   ..p\@ .2..#.8@#2
4380   10 a0 2b 90 00 30 20 90  dc 95 00 10 28 00 29 32   ..+..0 .....(.)2
4390   10 a0 23 90 04 16 70 5c  1c 20 01 32 10 a0 23 90   ..#...p\. .2..#.
43a0   14 40 23 32 10 a0 2b 90  00 30 20 90 dc 95 00 10   .@#2..+..0 .....
43b0   e0 1f 29 35 10 a0 23 90  24 40 23 35 10 60 23 90   ..)5..#.$@#5.`#.
43c0   10 a0 23 92 00 30 20 90  dc 95 00 10 20 40 23 35   ..#..0 ..... @#5
43d0   00 30 70 92 dc 95 00 10  14 00 00 08 00 30 80 8c   .0p..........0..
43e0   20 52 00 00 0d 16 88 5c  08 f4 ff 09 1a 60 23 88    R.....\.....`#.
43f0   00 0e 21 58 1a 60 23 8a  00 00 20 8c 10 60 23 92   ..!X.`#... ..`#.
4400   0f 16 80 5c 3c 4c 00 08  00 00 00 00 00 00 00 00   ...\<L..........
4410   10 16 18 5c 08 20 04 35  00 00 00 0a 00 30 20 90   ...\. .5.....0 .
4420   d0 95 00 10 04 c1 28 59  24 00 20 8c 84 45 21 74   ......(Y$. ..E!t
4430   84 39 20 90 44 89 00 10  08 20 01 35 00 00 00 0a   .9 .D.... .5....
4440   00 30 20 90 d0 95 00 10  04 c1 28 59 24 00 20 8c   .0 .......(Y$. .
4450   84 45 21 74 84 39 80 90  44 89 00 10 a4 fd ff 08   .E!t.9..D.......
4460   11 16 78 5c 2c 07 00 09  10 16 70 5c 0c 20 24 90   ..x\,.....p\. $.
4470   3c 20 01 32 0c a0 23 90  00 10 21 90 00 10 21 90   < .2..#...!...!.
```

Mar 27 18:20 1996 image.txt Page 21

```
4480    20 20 01 32 0c a0 2b 90  0c a0 23 90 00 10 21 90    ..2..+...#...!.
4490    00 10 31 90 05 16 80 5c  0f 15 98 5c 00 90 01 84   ..1....\...\....
44a0    0c a0 83 90 01 16 98 5c  05 00 00 08 00 30 80 8c   ................
44b0    40 52 00 00 0e 16 83 5c  38 22 22 08 50 00 00 00   @R.....\8.......
44c0    10 15 55 5c 5c 4b 00 09  10 15 18 5c 04 a0 21 90   ..U\\K.....\..!.
44d0    04 16 38 5c 50 20 01 32  00 a0 21 90 04 a0 21 92   ..8\P .2..!...!.
44e0    10 20 01 32 00 00 28 8c  04 a0 21 90 04 20 29 92   . .2..(...!.. ).
44f0    18 a0 21 88 01 09 21 59  15 a0 21 8a 18 a0 29 88   ..!...!Y..!...).
4500    22 a0 21 88 20 00 29 39  1a a0 21 88 18 20 19 30   ".!. .)9..!.. .0
4510    1a a0 21 88 03 0e 21 5b  1a a0 21 8a 05 18 80 5c   ..!...![..!....\
4520    10 1e ff 09 04 a0 21 90  1c 20 01 35 00 00 20 8c   ......!.. .5.. .
4530    08 a0 21 92 18 a0 21 8a  1a a0 21 88 03 0e 21 58   ..!...!...!...!X
4540    1a a0 21 8a 03 1e 80 5c  1c 4a 00 09 0c e0 01 32   ..!....\.J.....2
4550    00 00 20 8c 00 d0 21 92  07 16 80 5c 00 00 00 0a   .. ...!....\....
4560    10 16 50 5c 11 15 68 5c  28 20 04 35 00 30 80 8c   ..P\..h\( .5.0..
4570    70 52 00 00 2c f0 ff 09  0c 60 03 32 0d 16 80 5c   pR..,....`.2...\
4580    20 ea ff 09 00 30 80 8c  ff ff ff ff 00 00 00 0a    ....0..........
4590    1a 20 23 88 64 20 21 30  14 60 23 90 0d 20 21 80   . #.d !0.`#.. !.
45a0    14 20 59 3a 14 60 23 90  0d 20 29 80 84 00 20 8c   . Y:.`#.. )... .
45b0    48 00 29 3d 14 20 3b 90  07 16 48 5c 0c 60 23 90   H.)=. ;...H\.`#.
45c0    00 10 21 80 04 fd 31 90  18 00 00 00 06 16 40 5c   ..!...1.......@\
45d0    00 00 28 8c 0c 60 23 90  00 10 21 80 04 fd 29 92   ..(..`#...!...).
45e0    18 00 00 00 0c a0 01 32  00 50 82 90 00 10 02 86   .......2.P......
45f0    0d 16 80 5c ac e9 ff 08  28 4a 00 09 10 16 50 5c   ...\....(J....P\
4600    04 20 73 90 08 20 5b 90  04 20 23 90 24 20 01 35   . s.. [.. #.$ .5
4610    04 20 6b 92 08 20 6b 92  00 00 20 8c 00 50 23 92   . k.. k... ..P#.
4620    04 60 23 92 0c 16 80 5c  d8 fb ff 09 b0 00 00 08   .`#....\........
4630    14 60 23 90 0d 20 21 80  1c 20 39 37 00 d0 6a 92   .`#.. !.. 97..j.
4640    04 60 5b 92 00 00 20 8c  00 50 23 92 08 20 6b 92   .`[... ..P#.. k.
4650    8c 00 00 08 0e 16 78 5c  2c a0 03 32 14 e0 23 90   ......x\,..2..#.
4660    0d 20 21 80 20 20 39 30  0f 16 18 5c 00 d0 23 90   . !.  90...\..#.
4670    04 16 78 5c 10 20 01 32  14 e0 23 90 0d 20 21 80   ..x\. .2..#.. !.
4680    e8 3f 39 37 24 80 7b 35  04 20 23 90 00 50 23 92   .?97$.{5. #..P#.
4690    00 00 20 8c 04 60 23 92  04 20 23 90 04 20 69 92   .. ..`#.. #.. i.
46a0    04 20 6b 92 30 00 00 08  18 e0 03 32 00 50 7b 92   . k.0......2.P{.
46b0    04 60 1b 92 00 d0 68 92  04 e0 6b 92 18 00 00 08   .`....h...k.....
46c0    00 00 20 8c 00 50 23 92  04 60 1b 92 00 d0 68 92   .. ..P#..`....h.
46d0    08 20 6b 92 0c 16 80 5c  28 fb ff 09 18 20 23 88   . k....\(.... #.
46e0    01 20 21 8c 18 20 23 8a  18 20 2b 88 20 20 23 88   . !.. #.. +.  #.
46f0    10 00 29 3c 1a 20 23 86  83 09 21 58 1a 20 23 8a   ..)<. #...!X. #.
```

Mar 27 ... 1996 image.txt Page ..

```
4700   0a 16 e0 5c 3c 49 00 08  00 00 00 00 00 00 00 00   ...\<I..........
4710   10 16 70 5c 11 16 78 5c  08 49 00 09 10 16 18 5c   ..p\..x\.I......\
4720   04 a0 23 90 04 16 30 5c  34 20 01 35 04 a0 7b 92   ..#...0\4 .5..{.
4730   0d a0 7b 92 00 00 20 8c  04 e0 23 92 00 d0 23 92   ......  ...#...#.
4740   14 e0 23 90 0d 20 21 80  07 21 01 5a 54 00 00 10   ..#.. !..!.Z....
4750   0e 16 60 5c ac fa ff 09  a8 00 00 08 14 e0 23 90   ...\..........#.
4760   0d 20 21 80 24 20 39 30  00 d0 33 92 00 00 20 8c   . !.$ 90..3... .
4770   04 e0 23 92 04 a0 7b 92  04 a0 79 92 0e 16 80 5c   ..#...{...y....\
4780   80 fa ff 09 7c 00 00 08  1c a0 01 32 14 a0 21 90   ....|......2..!.
4790   0d 20 21 80 20 20 39 30  06 16 3a 5c 00 90 21 90   . !.  90..:\..!.
47a0   04 16 30 5c 10 20 01 32  14 a0 21 90 00 20 21 80   ..0\. .2..!.. !.
47b0   e8 3f 39 37 1c a0 01 35  00 d0 79 92 00 00 20 8c   .?97...5..y... .
47c0   00 d0 23 92 04 e0 3b 92  08 a0 7b 92 34 00 00 0c   ..#...;...{.4...
47d0   04 a0 21 90 1c 20 01 33  04 a0 7b 92 00 d0 33 92   ..!.. .3..{...3.
47e0   00 00 20 8c 04 e0 23 92  04 a0 79 92 14 00 00 08   .. ...#...y.....
47f0   00 d0 79 92 04 e0 3b 92  00 d0 33 92 04 a0 79 92   ..y...;...3...y.
4800   18 a0 23 8a 01 20 21 8c  18 a0 23 8a 18 a0 2b 88   ..#.. !...#...+.
4810   20 a0 23 88 10 00 29 3c  1a a0 23 88 83 09 21 58    .#...)<..#...!X
4820   1a a0 23 8a 03 16 80 5c  18 48 00 08 00 00 00 00   ..#....\.H......
4830   10 16 60 5c 11 16 68 5c  12 16 70 5c 00 00 38 8c   ..`\..h\..p\..8.
4840   01 00 18 8c 14 20 24 90  0d 20 29 80 83 00 20 8c   ..... $.. )... .
4850   85 00 21 58 80 28 01 5a  d4 00 00 12 00 68 03 5a   ..!X.(.Z.....h.Z
4860   cc 00 00 12 00 50 33 90  10 20 2b 90 0c 20 23 90   .....P3.. +.. #.
4870   04 41 21 59 14 00 31 3b  00 50 23 90 04 60 23 92   .A!Y..1;.P#..`#.
4880   00 00 18 8c 14 00 00 08  10 20 2b 90 0c 20 23 90   ......... +.. #.
4890   04 41 21 59 04 60 23 92  14 20 23 90 0d 20 29 80   .A!Y.`#.. #.. ).
48a0   82 00 20 8c 14 00 29 3a  14 20 23 90 0d 20 29 80   .. ...):. #.. ).
48b0   81 00 20 8c 18 00 29 3d  14 20 23 90 0d 20 29 80   .. ...)=. #.. ).
48c0   08 60 23 90 00 10 29 92  04 00 38 8c 0c 20 33 90   .`#...)...8.. 3.
48d0   08 60 23 90 04 c0 29 59  04 60 23 90 06 16 80 5c   .`#...)Y.`#....\
48e0   05 16 88 5c 04 16 90 5c  68 ed ff 09 04 60 2b 90   ...\...\h....`+.
48f0   0c 20 23 90 04 40 21 59  0c 20 23 92 04 60 23 90   . #..@!Y. #..`#.
4900   84 c0 21 59 04 60 23 92  08 20 23 90 18 20 01 35   ..!Y.`#.. #.. .5
4910   00 30 20 8c ff ff ff ff  04 a0 23 92 03 16 80 5c   .0 .......#....\
4920   00 00 00 0a 08 20 7b 90  18 00 00 08 10 60 03 32   ..... {......`.2
4930   00 30 20 8c ff ff ff ff  04 60 23 92 0c 16 78 5c   .0 ......`#...x\
4940   14 e0 23 90 0d 20 21 80  7c 20 01 3d 14 a0 03 35   ..#.. !.| .=...5
4950   00 00 20 8c 04 16 18 5c  04 16 80 5c 00 00 00 0a   .. ....\...\....
4960   00 90 33 90 10 e0 2b 90  0c e0 23 90 04 41 21 59   ..3...+...#..A!Y
4970   14 00 31 3b 00 90 23 90  04 a0 23 92 00 00 18 8c   ..1;..#...#.....
```

Mar 27 10:20 1995 image.txt Page 24

```
4980    14 00 00 08 10 e0 2b 90  0c e0 23 90 04 41 21 59   ......+...#..A!Y
4990    04 a0 23 92 0c e0 33 90  08 a0 2b 90 04 a0 23 90   ..#...3...+...#.
49a0    06 16 80 5c 05 16 88 5c  04 16 90 5c 84 4c ff 09   ...\...\...\....
49b0    04 a0 2b 90 0c e0 23 90  04 40 21 59 0c e0 23 92   ..+...#..@!Y..#.
49c0    10 00 00 08 00 30 20 8c  ff ff ff ff 04 a0 23 92   .....0 .......#.
49d0    03 16 80 5c 00 00 00 0a  00 00 00 00 00 00 00 00   ...\............
49e0    10 16 60 5c 11 16 68 5c  12 16 70 5c 00 00 20 8c   ..`\..h\..p\.. .
49f0    04 16 38 5c 04 16 78 5c  70 50 04 32 04 50 2b 90   ..8\..x\pP.2.P+.
4a00    00 30 20 8c ff ff ff ff  80 00 29 3a 08 80 23 90   .0 .......):..#.
4a10    58 20 01 32 04 60 2b 90  00 00 20 8c 03 16 80 5c   X .2.`+... ....\
4a20    04 16 e8 5c 0c 01 00 09  10 16 38 5c 5c 20 04 32   ...\......8\\ .2
4a30    00 00 28 8c 14 e0 21 90  0a 20 29 82 08 60 33 90   ..(...!.. )..`3.
4a40    10 e0 29 90 04 60 23 90  06 16 80 5c 05 16 88 5c   ..)..`#....\...\
4a50    04 16 90 5c fc eb ff 09  0c e0 29 90 04 60 23 90   ...\......)..`#.
4a60    05 00 21 59 10 e0 21 92  90 20 03 32 04 20 2b 90   ..!Y..!.. .2. +.
4a70    00 30 20 8c ff ff ff ff  80 00 29 3a 08 20 23 90   .0 .......):. #.
4a80    78 20 01 32 04 20 2b 90  00 00 20 8c 05 16 80 5c   x .2. +... ....\
4a90    04 16 88 5c 9c 0e 00 09  10 16 78 5c 5c 20 04 32   ...\......x\\ .2
4aa0    0c a0 0b 3d 83 00 18 8c  08 00 00 08 01 00 18 8c   ...=............
4ab0    14 e0 23 90 0d 20 19 82  08 20 33 90 10 e0 2b 90   ..#.. .. 3...+.
4ac0    04 20 23 90 06 16 80 5c  05 16 88 5c 04 16 90 5c   . #....\...\...\
4ad0    80 eb ff 09 0c e0 2b 90  04 20 23 90 05 00 21 59   ......+. #...!Y
4ae0    10 e0 23 92 0c e0 01 32  08 e0 3b 92 0c 00 00 08   ..#....2..;.....
4af0    00 00 20 8c 08 e0 23 92  0c e0 03 32 0f 16 80 5c   .. ...#....2...\
4b00    00 00 00 0a 07 16 80 5c  00 00 00 0a 00 00 00 00   .......\........
4b10    10 16 78 5c 11 16 30 5c  0c 20 24 90 00 10 21 90   ..x\..0\. $...!.
4b20    00 10 21 90 20 20 01 32  0c e0 2b 90 0c e0 23 90   ..!.  .2..+...#.
4b30    00 10 21 90 00 10 39 90  05 16 80 5c 06 16 88 5c   ..!...9....\...\
4b40    00 d0 01 84 0c e0 83 90  06 16 88 5c 14 fa ff 08   ...........\....
4b50    10 16 38 5c 0c 20 04 35  00 00 80 8c 00 00 00 0a   ..8\. .5........
4b60    1a e0 21 88 14 20 29 30  1a e0 21 88 0c 20 19 37   ..!.. )0..!.. .7
4b70    01 00 18 8c 08 00 00 08  00 00 18 8c 03 16 80 5c   ...............\
4b80    00 00 00 0a 00 00 00 00  00 00 00 00 00 00 00 00   ................
4b90    10 16 18 5c 00 30 20 90  d0 95 00 10 04 01 2c 59   ...\.0 .......,Y
4ba0    24 00 20 8c 84 45 21 74  84 39 20 c8 42 89 00 10   $. ..E!t.9 .B...
4bb0    05 0e 21 59 00 34 21 90  04 79 00 10 30 00 24 35   ..!Y.4!..y..0.$5
4bc0    00 30 20 90 d0 95 00 10  04 c1 28 59 24 00 20 8c   .0 .......(Y$. .
4bd0    84 45 21 74 84 39 20 c8  42 89 00 10 05 0e 21 59   .E!t.9 .B.....!Y
4be0    00 34 81 90 08 79 00 10  00 00 00 0a 00 30 20 90   .4...y.......0 .
4bf0    d0 95 00 10 04 c1 28 59  24 00 20 8c 84 45 21 74   ......(Y$. ..E!t
```

```
Mar 27 16:20 1995  image.txt Page 23

4c00   84 39 20 c8 42 89 00 10  05 0e 21 59 00 34 81 90   .9 .B.....!Y.4..
4c10   04 79 00 10 00 00 00 0a  00 00 00 00 00 00 00 00   .y..............
4c20   10 16 18 5c 00 30 20 90  d0 95 00 10 04 c1 2c 59   ...\.0 ........,Y
4c30   24 00 20 8c 84 45 21 74  84 39 20 c8 42 89 00 10   $. ..E!t.9 .B...
4c40   05 0e 21 59 00 34 21 90  04 79 00 10 30 00 24 35   ..!Y.4!..y..0.$5
4c50   00 30 20 90 d0 95 00 10  04 c1 28 59 24 00 20 8c   .0 .......(Y$. .
4c60   84 45 21 74 84 39 20 c8  42 89 00 10 05 0e 21 59   .E!t.9 .B.....!Y
4c70   00 34 81 90 08 79 00 10  00 00 00 0a 00 30 20 90   .4...y.......0 .
4c80   d0 95 00 10 04 c1 28 59  24 00 20 8c 84 45 21 74   ......(Y$. ..E!t
4c90   84 39 20 c8 42 89 00 10  05 0e 21 59 00 34 81 90   .9 .B.....!Y.4..
4ca0   04 79 00 10 00 00 00 0a  00 00 00 00 00 00 00 00   .y..............
4cb0   10 16 18 5c 00 30 20 90  d0 95 00 10 04 01 2c 59   ...\.0 ........,Y
4cc0   24 00 20 8c 84 45 21 74  84 39 20 c8 42 89 00 10   $. ..E!t.9 .B...
4cd0   05 0e 21 59 00 34 21 90  04 79 00 10 30 00 24 35   ..!Y.4!..y..0.$5
4ce0   00 30 20 90 d0 95 00 10  04 c1 28 59 24 00 20 8c   .0 .......(Y$. .
4cf0   84 45 21 74 84 39 20 c8  42 89 00 10 05 0e 21 59   .E!t.9 .B.....!Y
4d00   00 34 81 90 08 79 00 10  00 00 00 0a 00 30 20 90   .4...y.......0 .
4d10   d0 95 00 10 04 c1 28 59  24 00 20 8c 84 45 21 74   ......(Y$. ..E!t
4d20   84 39 20 c8 42 89 00 10  05 0e 21 59 00 34 81 90   .9 .B.....!Y.4..
4d30   04 79 00 10 00 00 00 0a  00 00 00 00 00 00 00 00   .y..............
4d40   10 16 78 5c 11 16 30 5c  10 60 04 3a 0c a0 09 3a   ..x\..0\.`.:...:
4d50   83 00 20 8c 0c 00 31 3d  00 00 80 8c 00 00 00 0a   .. ...1=........
4d60   0c e0 03 35 00 00 80 8c  00 00 00 0a 00 00 28 8c   ...5..........(.
4d70   03 00 20 8c 05 16 80 5c  04 16 88 5c b4 0b 00 09   .. ....\...\....
4d80   10 16 38 5c 0c 20 04 35  00 00 80 8c 00 00 00 0a   ..8\. .5........
4d90   14 e0 21 90 0d 20 31 82  00 d0 23 90 00 10 21 90   ..!.. 1...#...!.
4da0   1c 20 01 32 00 d0 23 90  00 10 19 90 0f 16 80 5c   . .2..#........\
4db0   07 16 88 5c 00 d0 00 86  10 00 00 08 0f 16 80 5c   ...\...........\
4dc0   07 16 88 5c 9c f7 ff 09  01 00 80 8c 00 00 00 0a   ...\............
4dd0   10 16 68 5c 11 16 70 5c  12 16 78 5c 10 60 04 3a   ..h\..p\..x\.`.:
4de0   0c a0 0b 3a 83 00 20 8c  0c 00 71 3d 00 00 80 8c   ...:.. ...q=....
4df0   00 00 00 0a 0c 60 03 35  00 00 80 8c 00 00 00 0a   .....`.5........
4e00   01 00 28 8c 03 00 20 8c  05 16 80 5c 04 16 88 5c   ..(... ....\...\
4e10   20 0b 00 09 10 16 38 5c  0c 20 04 35 00 00 80 8c    .....8\. .5....
4e20   00 00 00 0a 14 e0 21 90  0d 20 71 82 18 ce 23 59   ......!.. q...#Y
4e30   58 0d 31 59 10 e0 29 90  01 60 21 8c 10 e0 21 92   ..1Y..)..`!...!.
4e40   00 50 31 82 00 50 23 90  00 10 21 90 1c 20 01 32   .P1..P#...!.. .2
4e50   00 50 23 90 00 10 19 90  0d 16 80 5c 07 16 88 5c   .P#........\...\
4e60   00 d0 00 86 10 00 00 08  0d 16 80 5c 07 16 88 5c   ...........\...\
4e70   f0 f6 ff 09 01 00 80 8c  00 00 00 0a 00 00 00 00   ................
```

```
Mar 27 15:20 1996  image.txt Page 26

4e80    50 80 08 8c 30 e0 c7 b2  08 a0 07 33 b0 e0 f7 8c   F'..F......3 ...
4e90    1e 16 20 5c 40 e0 f7 92  00 00 10 8c 08 20 31 9a   .. \@......... ..
4ea0    10 20 a1 b2 20 20 c1 b2  50 e0 c7 b0 00 00 00 0a   . ..  ..F.......
4eb0    30 80 08 5c 30 e0 c7 b2  08 a0 c7 33 b0 e0 f7 8c   F ..\.......3'...
4ec0    1e 16 20 5c 40 e0 f7 92  00 00 10 8c 14 20 a9 92   .. \@......... ..
4ed0    18 20 b1 9a 20 20 c1 b2  50 e0 c7 b0 00 00 00 0a   . ..  ..F.......
4ee0    10 16 30 5c 11 16 38 5c  08 20 04 35 00 00 00 0a   ..0\..8\. .5....
4ef0    04 a0 21 90 04 16 18 5c  08 20 01 35 00 00 00 0a   ..!....\. .5....
4f00    10 e0 09 3a 14 e0 20 90  0a 20 21 80 24 20 01 3d   ...:.. .. !.$ .=
4f10    03 16 20 5c 00 d0 18 90  06 16 80 5c 04 16 86 5c   .. \........\...\
4f20    30 00 00 09 04 16 80 5c  78 e0 ff 09 10 00 00 08   0......\x.......
4f30    00 80 16 90 06 16 80 5c  c8 f2 ff 09 c4 f1 00 33   .......\.......3
4f40    00 00 00 0a 00 00 00 00  00 00 00 00 00 00 00 00   ................
4f50    10 16 78 5c 11 16 30 5c  c8 40 00 09 10 16 18 5c   ..x\..0\.@.....\
4f60    04 e0 23 90 04 16 38 5c  3c 20 01 32 38 80 39 32   ..#...8\< .28.92
4f70    24 e0 01 35 00 30 80 8c  90 52 00 00 24 e8 ff 09   $..5.0...R..$...
4f80    03 16 80 5c bc 40 00 09  00 30 80 8c ff ff ff ff   ...\.@...0......
4f90    00 00 00 0a 00 d0 21 90  04 16 38 5c 08 20 01 32   ......!...8\. .2
4fa0    d0 9f 39 35 04 a0 21 90  14 20 01 32 00 90 29 90   ..95..!.. .2..).
4fb0    04 a0 21 90 00 10 29 92  14 00 00 08 04 e0 23 90   ..!...)........#.
4fc0    0c 80 21 35 00 90 21 90  04 e0 23 92 00 90 21 90   ..!5..!...#...!.
4fd0    14 20 01 32 04 a0 29 90  00 90 21 90 04 20 29 92   . .2..)...!.. ).
4fe0    14 00 00 08 08 e0 23 90  0c 80 21 35 04 a0 21 90   ......#...!5..!.
4ff0    08 e0 23 92 18 e0 23 88  01 09 21 59 18 e0 23 8a   ..#...#...!Y..#.
5000    18 e0 2b 88 22 e0 23 88  18 00 29 39 1a e0 23 88   ..+.".#...)9..#.
5010    03 0e 21 58 1a e0 23 8a  0f 16 80 5c f4 f3 ff 09   ..!X..#....\....
5020    03 16 80 5c 1c 40 00 08  00 00 00 00 00 00 00 00   ...\.@..........
5030    00 00 00 0a 00 00 00 00  00 00 00 00 00 00 00 00   ................
5040    10 16 30 5c 04 20 24 90  04 16 18 5c 0c 20 01 35   ..0\. $....\. .5
5050    00 00 80 8c 00 00 00 0a  01 00 38 8c 08 a0 21 90   ..........8...!.
5060    0c c0 20 35 01 00 80 8c  00 00 00 0a 00 d0 20 90   .. 5.......... .
5070    30 20 01 32 00 d0 28 90  08 a0 21 90 24 00 29 32   0 .2..(...!.$.)2
5080    00 d0 20 90 04 16 18 5c  01 e0 39 8c 00 10 21 90   .. ....\..9...!.
5090    10 20 01 32 00 d0 28 90  08 a0 21 90 e4 1f 29 35   . .2..(...!...)5
50a0    07 16 80 5c 00 00 00 0a  00 00 00 00 00 00 00 00   ...\............
50b0    00 10 24 90 14 20 21 90  08 20 21 c8 1c 20 24 ca   ..$.. !.. !.. $.
50c0    00 10 24 90 14 20 21 90  0a 20 21 c8 1e 20 24 ca   ..$.. !.. !.. $.
50d0    00 10 24 90 14 20 21 90  0c 20 21 88 20 20 24 8a   ..$.. !.. !.  $.
50e0    00 10 24 90 14 20 21 90  0e 20 21 88 22 20 24 8a   ..$.. !.. !." $.
50f0    20 00 20 8c 1a 20 24 8a  00 00 20 8c 0c 20 24 92    . .. $... .. $.
```

Mar 27 18:20 1996 image.txt Page 27

```
5100   10 20 24 92 10 20 24 8a  04 20 24 92 08 20 24 92   . $.. $.. $.. $.
5110   14 20 24 92 00 00 00 0a  00 00 00 00 00 00 00 00   . $.............
5120   10 16 78 5c 11 16 28 5c  12 16 30 5c 14 3e 00 09   ..x...(\..0\.>..
5130   10 16 18 5c 00 68 01 5a  a4 00 00 12 04 e0 23 90   ...\.h.Z......#.
5140   0c 30 01 32 08 e0 23 90  20 20 01 35 00 30 30 8c   . .2..#.  .5.0..
5150   f0 52 00 00 9c e6 ff 09  03 16 60 5c e4 3e 00 09   .R..........\.>..
5160   00 00 80 8c 00 00 00 0a  04 e0 23 90 04 16 38 5c   ..........#...8\
5170   0c 40 21 32 08 e0 23 90  18 00 39 35 00 a0 21 90   .@!2..#...95..!.
5180   04 16 38 5c f8 5f 21 32  08 e0 23 90 f0 12 39 32   ..8\._!2..#...92
5190   20 40 39 32 00 30 80 8c  b0 52 00 00 54 e6 ff 09    @92.0...R..T...
51a0   03 16 80 5c 9c 3e 00 09  00 00 80 8c 00 00 00 0a   ...\.>..........
51b0   00 90 29 92 04 60 21 90  04 a0 21 92 04 60 21 90   ..)..`!...!..`!.
51c0   14 20 01 32 04 60 21 90  00 10 31 92 04 60 31 92   . .2.`!...1..`1.
51d0   18 00 00 08 04 e0 33 92  10 00 00 08 0f 16 80 5c   ......3........\
51e0   06 16 88 5c 7c f3 ff 09  03 16 80 5c 54 3e 00 09   ...\|......\T>..
51f0   01 00 80 8c 00 00 00 0a  00 00 00 00 00 00 00 00   ................
5200   51 20 6e 6f 74 20 65 6e  61 62 6c 65 64 20 25 78   Q not enabled %x
5210   0a 00 00 00 00 00 00 00  00 00 00 00 00 00 00 00   ................
5220   51 20 6e 6f 74 20 6f 6e  20 6c 69 6e 6b 20 6c 69   Q not on link li
5230   73 74 20 25 78 0a 00 00  00 00 00 00 00 00 00 00   st %x...........
5240   71 72 65 70 6c 79 20 65  72 72 6f 72 20 6e 6f 20   qreply error no 
5250   6e 65 78 74 20 71 75 65  75 65 20 66 6f 72 20 71   next queue for q
5260   20 3d 20 30 78 25 78 0a  00 00 00 00 00 00 00 00    = 0x%x.........
5270   50 55 54 51 23 20 71 20  3d 3d 20 4e 55 4c 4c 0a   PUTQ# q == NULL.
5280   00 00 00 00 00 00 00 00  00 00 00 00 00 00 00 00   ................
5290   72 6d 76 71 20 66 6f 72  20 61 6e 20 75 6e 65 78   rmvq for an unex
52a0   69 73 74 69 6e 67 20 6d  65 73 73 61 67 65 0a 00   isting message..
52b0   69 6e 73 71 3a 20 6d 65  73 73 67 61 65 20 70 6f   insq: messgae po
52c0   69 6e 74 65 64 20 62 75  20 65 6d 70 20 64 6f 65   inted bu emp doe
52d0   73 20 6e 6f 74 20 65 78  69 73 74 0a 00 00 00 00   s not exist.....
52e0   4e 6f 20 66 69 72 73 74  20 71 20 25 78 20 0a 00   No first q %x ..
52f0   69 6e 73 71 3a 20 6e 6f  6e 2d 7a 65 72 6f 20 65   insq: non-zero e
5300   6d 70 20 69 6e 73 65 72  74 69 6f 6e 20 69 6e 74   mp insertion int
5310   6f 20 65 6d 70 74 79 20  71 75 65 75 65 0a 00 00   o empty queue...
5320   00 30 38 8c b0 c4 00 10  07 16 18 5c 00 00 30 8c   .08........\..0.
5330   18 00 28 8c dc 05 20 8c  06 16 80 5c 07 16 88 5c   ..(... ....\...\
5340   05 16 90 5c 04 16 98 5c  c8 0e 00 09 1c 20 04 3a   ...\...\..... .:
5350   00 30 28 8c f0 61 00 00  00 00 20 8c 05 16 80 5c   .0(..a.... ....\
5360   04 16 88 5c 8c e4 ff 08  00 f4 28 8c a0 8c 00 00   ...\......(.....
5370   05 16 18 5c 00 30 20 90  00 c9 05 10 1c 00 29 36   ...\.0 .......)6
```

Mar 27 18:20 1996 image.txt Page 25

```
5380     00 30 28 8c e0 5f 00 00  00 00 20 8c 05 16 80 5c   .0(.._.... ....\
5390     04 16 88 5c 5c e4 ff 09  01 00 30 8c 10 00 28 8c   ...\\.....0...(.
53a0     dc 05 20 8c 06 16 80 5c  03 16 88 5c 05 16 90 5c   .. ....\...\...\
53b0     04 16 98 5c 5c 0e 00 09  1c 20 04 3a 00 30 28 8c   ...\\..... .:.0(.
53c0     f0 61 00 00 01 00 20 8c  05 16 80 5c 04 16 88 5c   .a.... ....\...\
53d0     20 e4 ff 08 00 f4 28 8c  c0 5a 00 00 05 16 18 5c    .....(..Z.....\
53e0     00 30 20 90 00 c9 05 10  1c 00 29 36 00 30 28 8c   .0 .......)6.0(.
53f0     e0 5f 00 00 01 00 20 8c  05 16 80 5c 04 16 88 5c   ._.... ....\...\
5400     f0 e3 ff 09 02 00 30 8c  00 30 28 8c 50 19 00 00   ......0..0(.P...
5410     01 00 20 8c 06 16 80 5c  03 16 88 5c 05 16 90 5c   .. ....\...\...\
5420     04 16 98 5c ec 0d 00 09  1c 20 04 3a 00 30 28 8c   ...\...... .:.0(.
5430     f0 61 00 00 02 00 20 8c  05 16 80 5c 04 16 88 5c   .a.... ....\...\
5440     b0 e3 ff 08 00 f4 28 8c  50 19 00 00 05 16 18 5c   ......(.P......\
5450     00 30 20 90 00 c9 05 10  1c 00 29 36 00 30 28 8c   .0 .......)6.0(.
5460     e0 5f 00 00 02 00 20 8c  05 16 80 5c 04 16 88 5c   ._.... ....\...\
5470     80 e3 ff 09 03 00 30 8c  08 00 28 8c 32 00 20 8c   ......0...(.2. .
5480     06 16 80 5c 03 16 88 5c  05 16 90 5c 04 16 98 5c   ...\...\...\...\
5490     80 0d 00 09 1c 20 04 3a  00 30 28 8c f0 61 00 00   ..... .:.0(..a..
54a0     03 00 20 8c 05 16 80 5c  04 16 88 5c 44 e3 ff 08   .. ....\...\D...
54b0     90 e1 28 8c 05 16 18 5c  00 30 20 90 00 c9 05 10   ..(....\.0 .....
54c0     1c 00 29 36 00 30 28 8c  e0 5f 00 00 03 00 20 8c   ..)6.0(.._.... .
54d0     05 16 80 5c 04 16 88 5c  18 e3 ff 09 04 00 30 8c   ...\...\......0.
54e0     20 00 28 8c 40 01 20 8c  06 16 80 5c 03 16 88 5c    .(.@. ....\...\
54f0     05 16 90 5c 04 16 98 5c  18 0d 00 09 1c 20 04 3a   ...\...\..... .:
5500     00 30 28 8c f0 61 00 00  04 00 20 8c 05 16 80 5c   .0(..a.... ....\
5510     04 16 88 5c dc e2 ff 08  00 f4 28 8c 00 28 00 00   ...\......(..(..
5520     05 16 18 5c 00 30 20 90  00 c9 05 10 1c 00 29 36   ...\.0 .......)6
5530     00 30 28 8c e0 5f 00 00  04 00 20 8c 05 16 80 5c   .0(.._.... ....\
5540     04 16 88 5c ac e2 ff 09  05 00 30 8c 80 00 28 8c   ...\......0...(.
5550     dc 00 20 8c 06 16 80 5c  03 16 88 5c 05 16 90 5c   .. ....\...\...\
5560     04 16 98 5c ac 0c 00 09  1c 20 04 3a 00 30 28 8c   ...\..... .:.0(.
5570     f0 61 00 00 05 00 20 8c  05 16 80 5c 04 16 88 5c   .a.... ....\...\
5580     70 e2 ff 08 00 f4 28 8c  00 6e 00 00 05 16 18 5c   p.....(..n.....\
5590     00 30 20 90 00 c9 05 10  1c 00 29 36 00 30 28 8c   .0 .......)6.0(.
55a0     e0 5f 00 00 05 00 20 8c  05 16 80 5c 04 16 88 5c   ._.... ....\...\
55b0     40 e2 ff 09 06 00 30 8c  8a 02 28 8c 2c 01 20 8c   @.....0...(.,. .
55c0     06 16 80 5c 03 16 88 5c  05 16 90 5c 04 16 98 5c   ...\...\...\...\
55d0     40 0c 00 09 1c 20 04 3a  00 30 28 8c f0 61 00 00   @.... .:.0(..a..
55e0     06 00 20 8c 05 16 80 5c  04 16 88 5c 04 e2 ff 08   .. ....\...\....
55f0     00 f4 28 8c b8 f9 02 00  05 16 18 5c 00 30 20 90   ..(........\.0 .
```

```
Mar 27 18:20 1996  image.txt Page 23

5600   00 c9 05 10 1c 00 29 36  00 30 28 8c e0 5f 00 00   ....../6.0\.._..
5610   06 00 20 8c 05 16 80 5c  04 16 88 5c d4 e1 ff 09   .. ....\...\.....
5620   07 00 30 8c 40 06 28 8c  0a 00 20 8c 05 16 80 5c   ..0.@.(... .....\
5630   03 16 88 5c 05 16 90 5c  04 16 98 5c d4 0b 00 09   ...\...\........
5640   1c 20 04 3a 00 30 28 8c  10 61 00 00 07 00 20 8c   . .:.0(..a.... .
5650   03 16 80 5c 04 16 88 5c  98 e1 ff 08 00 f4 28 8c   ...\...\.......(.
5660   80 3e 00 00 05 16 18 5c  00 30 20 90 00 c9 05 10   .>.....\.0 .....
5670   1c 00 29 36 00 30 28 8c  e0 5f 00 00 07 00 20 8c   ..)6.0(.._.... .
5680   03 16 80 5c 04 16 88 5c  88 e1 ff 09 08 00 30 8c   ...\...\......0.
5690   e1 04 28 8c 0a 00 20 8c  06 16 80 5c 03 16 88 5c   ..(... ....\...\
56a0   05 16 90 5c 04 16 98 5c  68 0b 00 09 1c 20 04 3a   ...\...\h.... .:
56b0   00 30 28 8c f0 61 00 00  08 00 20 8c 05 16 80 5c   .0(..a.... ....\
56c0   04 16 88 5c 2c e1 ff 08  00 f4 28 8c d4 30 00 00   ...\,.....(..0..
56d0   03 16 18 5c 00 30 20 90  00 c9 05 10 1c 00 29 36   ...\.0 .......)6
56e0   00 30 28 8c e0 5f 00 00  08 00 20 8c 05 16 80 5c   .0(.._.... ....\
56f0   04 16 88 5c fc e0 ff 09  00 30 30 8c 90 a2 00 10   ...\.....00.....
5700   00 00 28 8c 30 00 20 8c  06 16 80 5c 03 16 88 5c   ..(.0. ....\...\
5710   04 16 90 5c fc bd ff 08  00 00 00 00 00 00 00 00   ...\............
5720   10 16 78 5c 11 16 28 5c  18 60 44 3c 03 00 80 8c   ..x\..(\.`D<....
5730   0f 16 88 5c bc 0d 00 09  08 20 04 3d 00 00 00 0a   ...\..... .=....
5740   20 00 20 8c 18 00 29 39  04 00 80 6c 0f 16 88 5c    . ...)9........\
5750   a0 0d 00 09 08 20 04 3d  00 00 00 0a 80 00 20 8c   ..... .=...... .
5760   18 00 29 39 05 00 80 8c  0f 16 88 5c 84 0d 00 09   ..)9.......\....
5770   08 20 04 3d 00 00 00 0a  8a 02 20 8c 18 00 29 39   . .=...... ...)9
5780   06 00 80 8c 0f 16 88 5c  68 0d 00 09 08 20 04 3d   .......\h.... .=
5790   00 00 00 0a 40 06 20 8c  18 00 29 39 07 00 80 8c   ....@. ...)9....
57a0   0f 16 88 5c 4c 0d 00 09  08 20 04 3d 00 00 00 0a   ...\L.... .=....
57b0   00 30 20 90 a0 a2 00 10  01 20 21 8c 00 30 20 92   .0 ...... !..0 .
57c0   a0 a2 00 10 00 00 00 0a  00 00 00 00 00 00 00 00   ................
57d0   10 16 70 5c 14 20 7c 90  28 20 04 35 00 30 80 8c   ..p\. |.( .5.0..
57e0   60 60 00 00 bc dd ff 09  00 30 20 90 a8 a2 00 10   ``.......0 .....
57f0   01 20 21 8c 00 30 20 92  a8 a2 00 10 00 00 00 0a   . !..0 .........
5800   10 a0 2b 90 08 e0 23 90  3c 00 29 36 00 30 30 8c   ..+...#.<.)6.00.
5810   10 61 00 00 10 a0 2b 90  08 e0 23 90 06 16 80 5c   .a....+...#....\
5820   0e 16 88 5c 05 16 90 5c  04 16 98 5c c4 df ff 09   ...\...\...\....
5830   00 30 20 90 b0 a2 00 10  01 20 21 8c 00 30 20 92   .0 ...... !..0 .
5840   b0 a2 00 10 0c a0 2b 90  04 e0 23 90 3c 00 29 33   ......+...#.<.)3
5850   00 30 30 8c d0 60 00 00  0c a0 2b 90 04 e0 23 90   .00..`....+...#.
5860   06 16 80 5c 0e 16 88 5c  05 16 90 5c 04 16 98 5c   ...\...\...\...\
5870   80 df ff 09 00 30 20 90  b4 a2 00 10 01 20 21 8c   .....0 ...... !.
```

Mar 27 16:20 1996  image.txt Page 30

```
5880    00 30 20 92 b4 a2 00 10  5c e0 03 32 0c e0 23 80   .0......\..2..#.
5890    14 20 09 3b 0c e0 23 80  01 09 21 59 0c e0 23 82   . .;..#...!Y..#.
58a0    5c 00 00 08 00 00 20 8c  0c e0 23 82 04 e0 33 90   \..... ...#...3.
58b0    08 e0 25 90 04 e0 23 90  04 41 21 59 05 16 80 5c   ..%...#..A!Y...\
58c0    04 16 88 5c 5c fe ff 09  01 10 80 8c 01 16 88 5c   ...\\..........\
58d0    20 0c 00 09 28 20 04 3a  00 30 80 8c a0 80 00 00    ...( .:.0......
58e0    10 df ff 08 00 30 20 90  ac a2 00 10 01 20 21 8c   .....0 ...... !.
58f0    00 30 20 92 ac a2 00 10  00 00 00 0a 00 00 20 8c   .0............ .
5900    14 a0 23 92 10 a0 23 92  0c a0 23 92 04 16 80 5c   ..#...#...#....\
5910    0e 16 88 5c dc 0b 00 09  08 20 04 3a 00 00 00 0a   ...\..... .:....
5920    00 00 00 0a 00 00 00 00  00 00 00 00 00 00 00 00   ................
5930    10 16 70 5c 40 06 20 8c  3c 00 e1 3e 00 30 28 8c   ..p\@. .<..>.0(.
5940    10 60 00 00 40 06 20 8c  05 16 80 5c 04 16 88 5c   . ..@. ....\...\
5950    0e 16 90 5c 9c de ff 09  00 30 20 90 b8 a2 00 10   ...\.....0 .....
5960    01 20 21 8c 00 30 20 92  b8 a2 00 10 00 00 80 8c   . !..0 .........
5970    00 00 00 0a 00 00 80 8c  48 0a 00 09 10 16 78 5c   ........H.....x\
5980    0c 20 04 35 00 00 80 8c  00 00 00 0a 18 00 20 8c   . .5.......... .
5990    0f 16 80 5c 04 16 88 5c  c8 dc ff 09 01 00 80 8c   ...\...\........
59a0    20 0a 00 09 10 16 30 5c  0c 20 04 35 00 00 80 8c    .....0\. .5....
59b0    00 00 00 0a 10 00 20 8c  06 16 80 5c 04 16 88 5c   ...... ....\...\
59c0    a0 dc ff 09 00 00 20 8c  0c a0 21 82 08 e0 23 92   ...... ...!...#.
59d0    14 e0 33 92 04 a0 21 92  54 a0 43 3c 03 00 80 8c   ..3...!.T.C<....
59e0    e0 09 00 09 04 a0 81 92  44 20 04 32 14 e0 23 90   ........D .2..#.
59f0    04 20 21 90 0c e0 23 92  0c e0 23 90 10 e0 23 92   . !...#...#...#.
5a00    14 e0 23 90 04 20 21 90  08 20 29 8c 14 e0 23 90   ..#.. !.. )...#.
5a10    08 20 29 92 01 00 20 8c  0c a0 21 82 00 00 20 8c   . )... ...!... .
5a20    0d a0 21 82 0f 16 80 5c  00 00 00 0a 20 00 20 8c   ..!....\.... . .
5a30    54 00 71 39 04 00 80 8c  88 09 00 09 04 a0 81 92   T.q9............
5a40    44 20 04 32 14 e0 23 90  04 20 21 90 0c e0 23 92   D .2..#.. !...#.
5a50    0c e0 23 90 10 e0 23 92  14 e0 23 90 04 20 21 90   ..#...#...#.. !.
5a60    20 20 29 8c 14 e0 23 90  08 20 29 92 01 00 20 8c     )...#.. )... .
5a70    0c a0 21 82 00 00 20 8c  0d a0 21 82 0f 16 80 5c   ..!... ...!....\
5a80    00 00 00 0a 80 00 20 8c  54 00 71 39 05 00 80 8c   ...... .T.q9....
5a90    30 09 00 09 04 a0 81 92  44 20 04 32 14 e0 23 90   0.......D .2..#.
5aa0    04 20 21 90 0c e0 23 92  0c e0 23 90 10 e0 23 92   . !...#...#...#.
5ab0    14 e0 23 90 04 20 21 90  80 20 29 8c 14 e0 23 90   ..#.. !.. )...#.
5ac0    08 20 29 92 01 00 20 8c  0c a0 21 82 00 00 20 8c   . )... ...!... .
5ad0    0d a0 21 82 0f 16 80 5c  00 00 00 0a 8a 02 20 8c   ..!....\...... .
5ae0    54 00 71 39 06 00 80 8c  d8 0b 00 09 04 a0 81 92   T.q9............
5af0    44 20 04 32 14 e0 23 90  04 20 21 90 0c e0 23 92   D .2..#.. !...#.
```

```
5b00   0c e0 23 90 10 e0 23 92  14 e0 23 90 04 20 21 90   ..#...#...#.. !.
5b10   0a 22 29 8c 14 e0 23 90  0a 20 29 92 01 00 20 8c   .")...#.. )... .
5b20   0c a0 21 82 00 00 20 8c  0a a0 21 82 01 15 80 5c   ..!... ...!....\
5b30   00 00 00 0a 40 08 20 8c  34 00 71 39 07 00 80 8c   ....@. .4.q9....
5b40   80 08 00 05 04 a0 81 92  44 20 04 32 14 e0 23 90   ........D .2..#.
5b50   04 20 21 90 0c e0 23 92  0c e0 23 90 10 e0 23 92   . !...#...#...#.
5b60   14 e0 23 90 04 20 21 90  40 26 29 8c 14 e0 23 90   ..#.. !.@&)...#.
5b70   08 20 29 92 01 00 20 8c  0c a0 21 82 00 00 20 8c   . )... ...!... .
5b80   0a a0 21 82 01 16 80 5c  00 00 00 0a 00 00 80 8c   ..!....\........
5b90   01 16 88 5c 5c 09 00 09  01 00 80 8c 06 15 88 5c   ...\\..........\
5ba0   50 09 00 09 00 00 80 8c  00 00 00 0a 00 00 00 00   P...............
5bb0   02 00 80 8c 0c 08 00 09  00 30 80 92 a0 95 00 10   .........0......
5bc0   10 20 04 35 00 30 80 8c  80 50 00 00 d4 a5 ff 09   . .5.0... ......
5bd0   00 00 18 8c 00 00 20 8c  83 39 20 ca 40 89 00 10   ...... ..9 .@...
5be0   83 39 20 ca 42 89 00 10  83 39 20 92 44 89 00 10   .9 .B....9 .D...
5bf0   01 e0 28 8c 05 16 18 5c  b4 00 20 8c d8 1f 29 3c   ..(....\.. ...)<
5c00   00 00 00 0a 00 00 00 00  00 00 00 00 00 00 00 00   ................
5c10   00 00 18 8c 83 39 20 c8  40 89 00 10 6c 20 01 3d   .....9 .@...l .=
5c20   00 30 20 90 90 a2 00 10  01 20 29 8c 00 30 28 92   .0 ...... )..0(.
5c30   90 a2 00 10 00 30 20 90  94 a2 00 10 14 00 29 36   .....0 .......)6
5c40   00 30 20 90 90 a2 00 10  00 30 20 92 94 a2 00 10   .0 ......0 .....
5c50   01 00 20 8c 83 39 20 ca  40 89 00 10 00 30 28 90   .. ..9 .@....0(.
5c60   d0 95 00 10 24 00 20 8c  83 00 21 70 05 00 29 59   ....$. ...!p..)Y
5c70   00 00 20 8c 04 60 21 92  08 60 21 92 14 60 21 92   .. ..`!..`!..`!.
5c80   05 16 80 5c 00 00 00 0a  01 e0 28 8c 05 16 18 5c   ...\......(....\
5c90   b4 00 20 8c 80 1f 29 3c  00 30 20 90 98 a2 00 10   .. ...)<.0 .....
5ca0   01 20 21 8c 00 30 20 92  98 a2 00 10 00 30 80 8c   . !..0 ......0..
5cb0   d0 61 00 00 ec d8 ff 09  00 00 80 8c 00 00 00 0a   .a..............
5cc0   10 16 30 5c 08 20 04 35  00 00 00 0a 06 16 80 5c   ..0\. .5.......\
5cd0   f0 e7 ff 09 10 16 38 5c  1c 20 04 32 07 16 80 5c   ......8\. .2...\
5ce0   c0 d2 ff 09 06 16 80 5c  d8 e7 ff 09 10 16 38 5c   .......\......8\
5cf0   ec 3f 04 35 00 30 20 90  d0 95 00 10 04 81 29 59   .?.5.0 .......)Y
5d00   24 00 20 8c 84 45 21 74  04 16 18 5c 84 39 20 c8   $. ..E!t...\.9 .
5d10   40 89 00 10 24 20 01 3d  00 30 20 90 9c a2 00 10   @...$ .=.0 .....
5d20   01 20 21 8c 00 30 20 92  9c a2 00 10 00 30 80 8c   . !..0 ......0..
5d30   40 60 00 00 6c d8 ff 08  00 00 20 8c 83 39 20 ca   @`..l..... ..9 .
5d40   40 89 00 10 83 39 20 92  44 89 00 10 83 39 20 ca   @....9 .D....9 .
5d50   42 89 00 10 00 30 20 90  90 a2 00 10 01 09 21 59   B....0 .......!Y
5d60   00 30 20 92 90 a2 00 10  00 00 00 0a 00 00 00 00   .0 .............
5d70   10 16 38 5c 20 20 04 35  00 30 20 90 a4 a2 00 10   ..8\  .5.0 .....
```

```
5d80    01 20 21 8c 00 30 20 92  a4 a2 00 10 00 00 80 8c   . !..0 .........
5d90    00 00 00 0a 00 00 80 8c  28 06 00 09 10 16 18 5c   ........\......\
5da0    0c 20 04 35 00 00 30 8c  00 00 00 0a 18 00 20 8c   . .5.......... .
5db0    03 16 80 5c 04 16 88 5c  a8 dc ff 09 14 e0 21 90   ...\...\......!.
5dc0    14 e0 20 92 0c e0 21 90  0c e0 20 92 10 e0 21 90   .. ...!... ...!.
5dd0    10 e0 20 92 14 e0 28 90  0c 60 21 80 01 20 21 8c   .. ...(..`!.. !.
5de0    0c 60 21 82 00 00 20 8c  00 a0 20 92 03 16 80 5c   . !... ... ....\
5df0    00 00 00 0a 00 00 00 00  00 00 00 00 00 00 00 00   ................
5e00    10 16 78 5c 14 20 24 90  08 20 29 90 14 20 24 90   ..x\. $.. )... $.
5e10    04 20 21 90 04 41 29 59  02 00 20 8c 03 16 80 5c   . !..A)Y.. ....\
5e20    04 16 88 5c 0c 10 ff 09  10 16 18 5c 0c 20 04 35   ...\.......\. .5
5e30    00 00 80 8c 00 00 00 0a  10 e0 38 90 0c e0 33 90   ..........8...3.
5e40    10 e0 28 90 0c e0 23 90  04 41 21 59 07 16 80 5c   ..(...#..A!Y...\
5e50    06 16 88 5c 04 16 90 5c  50 b7 ff 0b 10 e0 28 90   ...\...\P.....(.
5e60    0c e0 23 90 04 41 29 59  10 e0 20 90 04 40 21 59   ..#..A)Y.. ..@!Y
5e70    10 e0 20 92 03 16 80 5c  00 00 00 0a 00 00 00 00   .. ....\........
5e80    20 d7 ff 09 01 00 80 8c  58 d9 ff 08 00 00 00 00    .......X.......
5e90    10 16 30 5c 11 16 38 5c  0c 20 04 35 00 00 80 8c   ..0\..8\. .5....
5ea0    00 00 00 0a 06 16 18 5c  08 a0 21 90 14 20 01 32   .......\..!.. .2
5eb0    08 e0 20 90 04 16 18 5c  08 20 21 90 f4 3f 01 35   .. ....\. !..?.5
5ec0    08 e0 38 92 01 00 80 8c  00 00 00 0a 00 00 00 00   ..8.............
5ed0    10 16 30 5c 11 16 38 5c  10 20 04 35 00 30 80 8c   ..0\..8\. .5.0..
5ee0    ff ff ff ff 00 00 00 0a  1c c0 31 35 06 a0 29 90   ..........15..).
5ef0    05 16 18 5c 00 00 20 8c  08 a0 21 92 05 16 80 5c   ...\.. ...!....\
5f00    00 00 00 0a 06 16 18 5c  08 a0 21 90 2c 20 01 32   .......\..!., .2
5f10    08 e0 20 90 14 c0 21 35  08 e0 21 90 08 e0 20 92   .. ...!5..!... .
5f20    06 16 80 5c 00 00 00 0a  08 e0 20 90 04 16 18 5c   ...\...... ....\
5f30    08 20 21 90 dc 3f 01 35  00 30 80 8c ff ff ff ff   . !..?.5.0......
5f40    00 00 00 0a 00 00 00 00  00 00 00 00 00 00 00 00   ................
5f50    e2 04 20 8c 2c 00 81 3e  00 30 80 8c a0 61 00 00   .. .,..>.0...a..
5f60    90 d8 ff 09 00 30 20 90  b8 a2 00 10 01 20 21 8c   .....0 ...... !.
5f70    00 30 20 92 b8 a2 00 10  00 00 80 8c 00 00 00 0a   .0 .............
5f80    08 00 80 8c 3c 04 00 09  10 16 18 5c 18 20 04 35   ....<......\. .5
5f90    00 30 80 8c 50 61 00 00  58 d8 ff 09 00 00 80 8c   .0..Pa..X.......
5fa0    00 00 00 0a 03 16 80 5c  00 00 00 0a 00 00 00 00   .......\........
5fb0    10 16 38 5c 08 00 28 8c  10 16 20 5c 05 16 80 5c   ..8\..(... \...\
5fc0    04 16 88 5c 2c 05 00 09  08 20 04 3a 00 00 00 0a   ...\,.... .:....
5fd0    00 30 80 8c 70 61 00 00  07 16 88 5c 14 d8 ff 08   .0..pa.....\....
5fe0    53 4e 41 52 20 61 6c 6c  6f 63 5f 69 6e 69 74 3a   SNAR alloc_init:
5ff0    20 70 61 72 74 69 74 69  6f 6e 20 25 64 20 69 73    partition %d is
```

```
Mar 27 18:20 1996  image.txt Page 55

6000   20 6f 76 65 72 66 6c 6f  77 69 6e 67 0a 00 00 00    overflowing....
6010   61 6c 6c 6f 63 62 3a 20  61 6c 6c 6f 63 61 74 69   allocb: allocati
6020   6f 6e 20 65 78 63 65 65  64 69 6e 67 20 25 64 20   on exceeding %d 
6030   72 65 71 75 65 73 74 65  64 20 25 64 0a 00 00 00   requested %d....
6040   51 55 45 55 45 20 72 65  6c 65 61 73 65 20 65 72   QUEUE release er
6050   72 6f 72 0a 00 00 00 00  00 00 00 00 00 00 00 00   ror.............
6060   46 52 45 45 42 3a 20 6e  75 6c 6c 20 6d 65 73 73   FREEB: null mess
6070   61 67 65 0a 00 00 00 00  00 00 00 00 00 00 00 00   age.............
6080   51 75 65 75 65 20 61 6c  6c 6f 63 61 74 69 6f 6e   Queue allocation
6090   20 66 61 69 6c 75 72 65  00 00 00 00 00 00 00 00    failure........
60a0   66 72 65 65 62 3a 20 61  74 74 65 6d 70 74 20 74   freeb: attempt t
60b0   6f 20 66 72 65 65 20 61  20 66 72 65 65 64 20 64   o free a freed d
60c0   61 74 61 64 20 62 6c 6f  63 6b 0a 00 00 00 00 00   atad block......
60d0   66 72 65 65 62 3a 20 72  65 61 64 20 75 64 66 20   freeb: read udf 
60e0   62 70 28 25 78 29 2c 62  70 2d 3e 62 5f 72 70 74   bp(%x),bp->b_rpt
60f0   72 28 25 78 29 2c 64 70  2d 3e 64 62 5f 62 61 73   r(%x),dp->db_bas
6100   65 28 25 78 29 0a 00 00  00 00 00 00 00 00 00 00   e(%x)...........
6110   66 72 65 65 62 3a 20 77  72 69 74 65 20 6f 76 66   freeb: write ovf
6120   20 62 70 28 25 78 29 2c  62 70 2d 3e 62 5f 77 70    bp(%x),bp->b_wp
6130   74 72 28 25 78 29 2c 64  70 2d 3e 64 62 5f 6c 69   tr(%x),dp->db_li
6140   6d 28 25 78 29 0a 00 00  00 00 00 00 00 00 00 00   m(%x)...........
6150   52 4c 5f 6d 61 6c 6c 6f  63 20 3a 20 6f 75 74 20   RL_malloc : out 
6160   6f 66 20 68 65 61 70 20  73 70 61 63 65 0a 00 00   of heap space...
6170   52 4c 5f 66 61 6c 6c 6f  63 20 3a 20 66 72 65 65   RL_falloc : free
6180   20 65 72 72 6f 72 20 6f  6e 20 61 64 64 72 65 73    error on addres
6190   73 20 25 78 0a 00 00 00  00 00 00 00 00 00 00 00   s %x............
61a0   52 4c 5f 6d 61 6c 6c 6f  63 20 3a 20 48 65 61 70   RL_malloc : Heap
61b0   20 73 65 67 6d 65 6e 74  20 73 69 7a 65 20 74 6f    segment size to
61c0   6f 20 73 6d 61 6c 6c 0a  00 00 00 00 00 00 00 00   o small.........
61d0   6e 6f 20 66 72 65 65 20  51 55 45 55 45 20 65 6e   no free QUEUE en
61e0   74 72 79 0a 00 00 00 00  00 00 00 00 00 00 00 00   try.............
61f0   73 63 5f 70 63 72 65 61  74 65 20 66 61 69 6c 65   sc_pcreate faile
6200   64 20 70 69 64 20 3d 20  25 64 00 00 00 00 00 00   d pid = %d......
6210   10 16 60 5c 11 16 68 5c  12 16 70 5c 13 16 78 5c   ..`\..h\..p\..x\
6220   00 30 20 90 74 0c 06 10  78 20 01 3a 00 00 20 8c   .0 .t...x .:.. .
6230   00 30 20 92 74 0c 06 10  00 30 30 8c c0 a2 00 10   .0 .t....00.....
6240   04 16 28 5c 20 01 20 8c  06 16 80 5c 05 16 88 5c   ..(\ . ....\...\
6250   04 16 90 5c c4 b2 ff 0b  00 30 30 8c f0 c3 00 10   ...\.....00.....
6260   b0 00 20 8c 06 13 80 5c  05 16 88 5c 04 16 90 5c   .. ....\...\...\
6270   a8 b2 ff 0b 00 30 30 8c  e0 a3 00 10 00 30 20 8c   .....00......0 .
```

Mar 27 16:20 1996 image.txt Page 34

```
6280    f4 ff 00 00 0b 16 80 5c  05 16 88 5c 04 16 90 5c   .......\...\...\
6290    8a b2 ff 0b 05 16 20 5c  00 30 20 92 e0 c3 00 10   ......  \.0 .....
62a0    f4 20 4b 3e 05 0e 23 59  00 34 21 90 c0 a2 00 10   . K>..#Y.4!.....
62b0    0c 20 01 32 01 00 80 8c  00 00 00 0a 01 e0 2b 8c   . .2..........+.
62c0    00 30 20 90 e0 c3 00 10  85 00 29 59 fa 01 20 8c   .0 .......)Y.. .
62d0    0c 00 29 3e 01 00 80 8c  00 00 00 0a 05 0e 23 59   ..)>..........#Y
62e0    00 34 69 92 c0 a2 00 10  05 0e 23 59 00 34 71 92   .4i.......#Y.4q.
62f0    c8 a2 00 10 05 0e 23 59  00 34 79 92 cc a2 00 10   ......#Y.4y.....
6300    00 00 28 8c 05 0e 23 59  00 34 29 92 c4 a2 00 10   ..(...#Y.4).....
6310    00 30 28 90 e0 c3 00 10  05 0e 23 59 00 34 29 ca   .0(.......#Y.4).
6320    d0 a2 00 10 00 30 28 90  e0 c3 00 10 05 16 38 5c   .....0(.......8\
6330    01 00 18 8c 00 30 20 90  e0 c3 00 10 84 c0 23 59   .....0 .......#Y
6340    81 09 21 59 30 00 29 3b  03 16 20 5c 01 e0 18 8c   ..!Y0.);.. \....
6350    87 38 20 ca e0 a3 00 10  01 e0 29 8c 05 16 38 5c   .8 .......)...8\
6360    00 30 20 90 e0 c3 00 10  84 c0 23 59 81 09 21 59   .0 .......#Y..!Y
6370    d8 1f 29 3c 00 30 28 8c  ff ff ff ff 00 30 20 90   ..)<.0(......0 .
6380    e0 c3 00 10 84 c0 23 59  81 09 21 59 84 38 28 ca   ......#Y..!Y.8(.
6390    e0 a3 00 10 01 e0 2b 8c  00 30 20 90 e0 c3 00 10   ......+..0 .....
63a0    84 40 21 59 00 30 20 92  e0 c3 00 10 00 00 80 8c   .@!Y.0 .........
63b0    00 00 00 0a 00 00 00 00  00 00 00 00 00 00 00 00   ................
63c0    10 16 70 5c 5c 2c 00 09  10 16 18 5c 14 a0 4b 3e   ..p\\,.....\..K>
63d0    05 8e 23 59 00 34 21 90  c0 a2 00 10 28 20 01 35   ..#Y.4!.....( .5
63e0    00 30 20 90 90 c4 00 10  01 20 21 8c 00 30 20 92   .0 ...... !..0 .
63f0    90 c4 00 10 03 16 80 5c  48 2c 00 09 00 00 80 8c   .......\H,......
6400    00 00 00 0a 05 8e 23 59  00 34 29 90 c4 a2 00 10   ......#Y.4).....
6410    00 30 20 8c ff ff ff ff  28 00 29 3d 0e 39 20 90   .0 .....(.)=.9 .
6420    40 c4 00 10 01 20 21 8c  0e 39 20 92 40 c4 00 10   @.... !..9 .@...
6430    03 16 80 5c 0c 2c 00 09  00 00 80 8c 00 00 00 0a   ...\.,..........
6440    05 8e 23 59 00 34 39 90  c4 a2 00 10 05 8e 23 59   ..#Y.49.......#Y
6450    00 34 29 90 c0 a2 00 10  05 8e 23 59 00 34 21 90   .4).......#Y.4!.
6460    c8 a2 00 10 87 00 21 74  05 00 79 59 05 8e 23 59   ......!t..yY..#Y
6470    00 34 31 c8 d0 a2 00 10  86 c0 21 59 84 38 28 c8   .41.......!Y.8(.
6480    e0 a3 00 10 05 8e 23 59  00 34 29 92 c4 a2 00 10   ......#Y.4).....
6490    00 30 28 8c ff ff ff ff  86 c0 21 59 84 38 28 ca   .0(.......!Y.8(.
64a0    e0 a3 00 10 0e 39 20 90  f0 c3 00 10 01 20 21 8c   .....9 ...... !.
64b0    0e 39 20 92 f0 c3 00 10  0e 39 28 90 f0 c3 00 10   .9 ......9(.....
64c0    0e 39 20 90 18 c4 00 10  14 00 29 36 0e 39 20 90   .9 .......)6.9 .
64d0    f0 c3 00 10 0e 39 20 92  18 c4 00 10 03 16 80 5c   .....9 ........\
64e0    60 2b 00 09 0f 16 80 5c  00 00 00 0a 00 00 00 00   `+.....\........
64f0    10 16 60 5c 11 16 68 5c  28 2b 00 09 10 16 38 5c   ..`\..h\(+....8\
```

```
Mar 27 15:20 1996  image.txt Page 33

6500    14 20 4b 3e 05 0e 23 59  00 34 21 90 c0 a2 00 10   . K>..#Y.4!.....
6510    28 20 01 35 00 30 20 90  94 c4 00 10 01 20 21 8c   ( .5.0 ...... !.
6520    00 30 20 92 94 c4 00 10  07 16 80 5c 14 2b 00 09   .0 .........\.+..
6530    01 00 80 8c 00 00 00 0a  05 0e 23 59 00 34 21 90   ..........#Y.4!.
6540    c0 a2 00 10 04 41 2b 59  05 0e 23 59 00 34 21 90   .....A+Y..#Y.4!.
6550    c8 a2 00 10 84 45 31 74  06 16 78 5c 05 0e 23 59   .....E1t..x\..#Y
6560    00 34 29 90 c0 a2 00 10  05 0e 23 59 00 34 21 90   .4).......#Y.4!.
6570    c8 a2 00 10 88 00 21 74  05 00 21 59 16 40 23 35   ......!t..!Y.@#5
6580    05 0e 23 59 00 34 21 90  cc a2 00 10 08 00 79 3b   ..#Y.4!.......y;
6590    28 e0 03 3e 0c 39 20 90  88 c4 00 10 01 20 21 8c   (..>.9 ...... !.
65a0    0c 39 20 92 88 c4 00 10  07 16 80 5c 94 2a 00 09   .9 ........\.*..
65b0    01 00 80 8c 00 00 00 0a  05 0e 23 59 00 34 21 c8   ..........#Y.4!.
65c0    c0 a2 00 10 04 16 18 5c  84 c0 23 59 84 3e 28 c8   .......\..#Y.>(.
65d0    e0 a3 00 10 00 30 20 8c  ff ff ff ff 28 00 29 3a   .....0 .....(.):
65e0    00 30 20 90 94 c4 00 10  01 20 21 8c 00 30 20 92   .0 ...... !..0 .
65f0    94 c4 00 10 07 16 80 5c  48 2a 00 09 01 00 80 8c   .......\H*......
6600    00 00 00 0a 05 0e 23 59  00 34 29 90 c4 a2 00 10   ......#Y.4).....
6610    05 16 70 5c 00 30 20 8c  ff ff ff ff 28 00 29 3d   ..p\.0 .....(.)=
6620    05 0e 23 59 00 34 79 92  c4 a2 00 10 00 30 28 8c   ..#Y.4y......0(.
6630    ff ff ff ff 83 c0 23 59  84 38 28 ca e0 a3 00 10   ......#Y.8(.....
6640    1c 00 00 08 83 c0 23 59  84 38 70 ca e0 a3 00 10   ......#Y.8p.....
6650    05 0e 23 59 00 34 79 92  c4 a2 00 10 0c 39 20 90   ..#Y.4y......9 .
6660    f0 c3 00 10 01 09 21 59  0c 39 20 92 f0 c3 00 10   ......!Y.9 .....
6670    07 16 80 5c cc 29 00 09  00 00 80 8c 00 00 00 0a   ...\.)..........
6680    50 60 08 8c 10 16 68 5c  11 16 70 5c 12 16 78 5c   P`....h\..p\..x\
6690    05 4e 24 59 00 34 21 c8  00 79 00 10 10 20 11 3a   .N$Y.4!..y... .:
66a0    00 30 80 8c fd ff ff ff  00 00 00 0a 40 e0 27 8c   .0..........@.'.
66b0    0d 16 80 5c 0f 16 88 5c  04 16 90 5c 64 b0 ff 09   ...\...\...\d...
66c0    10 20 04 3e 00 30 80 8c  ff ff ff ff 00 00 00 0a   . .>.0..........
66d0    40 e0 27 90 05 0e 21 59  00 34 19 c8 02 79 00 10   @.'...!Y.4...y..
66e0    05 8e 23 59 00 34 39 c8  02 79 00 10 05 8e 23 59   ..#Y.49..y....#Y
66f0    00 34 31 8c 00 79 00 10  50 e0 2f 8c 20 00 20 8c   .41..y..P./. . .
6700    06 16 80 5c 05 16 88 5c  04 16 90 5c 44 cf ff 09   ...\...\...\D...
6710    05 ce 21 59 00 34 31 8c  00 79 00 10 70 e0 2f 8c   ..!Y.41..y..p./.
6720    20 00 20 8c 06 16 80 5c  05 16 88 5c 04 16 90 5c    . ....\...\...\
6730    20 cf ff 09 40 e0 27 90  05 0e 21 59 00 34 31 8c    ...@.'...!Y.41.
6740    00 79 00 10 05 8e 23 59  00 34 29 8c 00 79 00 10   .y....#Y.4)..y..
6750    20 00 20 8c 06 16 80 5c  05 16 88 5c 04 16 90 5c    . ....\...\...\
6760    f0 ce ff 09 05 ce 20 59  00 34 31 8c 00 79 00 10   ...... Y.41..y..
6770    05 ce 21 59 00 34 29 8c  00 79 00 10 20 00 20 8c   ..!Y.4)..y.. . .
```

```
Mar 27 18:20 1996  image.txt Page 36

6780   06 16 80 5c 05 16 88 5c  04 16 90 5c c4 ce ff 09   ...\...\...\....
6790   05 8e 23 59 00 34 39 ca  02 79 00 10 05 ce 21 59   ..#Y.49..y....!Y
67a0   00 34 71 ca 02 79 00 10  50 e0 37 8c 40 e0 27 90   .4q..y..P.7.@.'.
67b0   05 0e 21 59 00 34 29 8c  00 79 00 10 20 00 20 8c   ..!Y.4)..y.. . .
67c0   06 16 80 5c 05 16 88 5c  04 16 90 5c 84 ce ff 09   ...\...\...\....
67d0   70 e0 37 8c 05 ce 20 59  00 34 29 8c 00 79 00 10   p.7... Y.4)..y..
67e0   20 00 20 8c 06 16 80 5c  05 16 88 5c 04 16 90 5c    . ...\...\...\
67f0   60 ce ff 09 40 e0 27 90  05 0e 21 59 00 34 19 ca   `...@.'...!Y.4..
6800   02 79 00 10 40 e0 21 90  05 ce 20 59 00 34 29 ca   .y..@.!... Y.4).
6810   02 79 00 10 05 ce 21 59  00 34 29 90 04 79 00 10   .y....!Y.4)..y..
6820   00 30 20 90 d0 95 00 10  04 41 29 59 24 00 20 8c   .0 ......A)Y$. .
6830   84 45 21 74 84 39 38 ca  42 89 00 10 05 ce 21 59   .E!t.98.B.....!Y
6840   00 34 29 90 08 79 00 10  00 30 20 90 d0 95 00 10   .4)..y...0 .....
6850   04 41 29 59 24 00 20 8c  84 45 21 74 84 39 38 ca   .A)Y$. ..E!t.98.
6860   42 89 00 10 05 8e 23 59  00 34 29 90 0c 79 00 10   B.....#Y.4)..y..
6870   00 30 20 90 d0 95 00 10  04 41 29 59 24 00 20 8c   .0 ......A)Y$. .
6880   84 45 21 74 84 39 70 ca  42 89 00 10 05 ce 20 59   .E!t.9p.B..... Y
6890   00 34 29 90 04 79 00 10  00 30 20 90 d0 95 00 10   .4)..y...0 .....
68a0   04 41 29 59 24 00 20 8c  84 45 21 74 84 39 18 ca   .A)Y$. ..E!t.9..
68b0   42 89 00 10 05 ce 20 59  00 34 29 90 08 79 00 10   B..... Y.4)..y..
68c0   00 30 20 90 d0 95 00 10  04 41 29 59 24 00 20 8c   .0 ......A)Y$. .
68d0   84 45 21 74 84 39 18 ca  42 89 00 10 40 e0 37 90   .E!t.9..B...@.7.
68e0   40 e0 27 90 05 0e 21 59  00 34 29 90 0c 79 00 10   @.'...!Y.4)..y..
68f0   00 30 20 90 d0 95 00 10  04 41 29 59 24 00 20 8c   .0 ......A)Y$. .
6900   84 45 21 74 84 39 30 ca  42 89 00 10 05 ce 20 59   .E!t.90.B..... Y
6910   00 34 29 90 08 79 00 10  05 ce 21 59 00 34 21 90   .4)..y....!Y.4!.
6920   08 79 00 10 0c 20 29 92  05 ce 21 59 00 34 31 90   .y... )...!Y.41.
6930   08 79 00 10 05 ce 20 59  00 34 29 90 08 79 00 10   .y.... Y.4)..y..
6940   00 30 20 90 d0 95 00 10  04 41 29 59 24 00 20 8c   .0 ......A)Y$. .
6950   84 45 21 74 84 39 30 92  44 89 00 10 05 ce 21 59   .E!t.90.D.....!Y
6960   00 34 29 90 04 79 00 10  05 ce 20 59 00 34 21 90   .4)..y.... Y.4!.
6970   04 79 00 10 0c 20 29 92  05 ce 20 59 00 34 31 90   .y... )... Y.41.
6980   04 79 00 10 05 ce 21 59  00 34 29 90 04 79 00 10   .y....!Y.4)..y..
6990   00 30 20 90 d0 95 00 10  04 41 29 59 24 00 20 8c   .0 ......A)Y$. .
69a0   84 45 21 74 84 39 30 92  44 89 00 10 05 8e 23 59   .E!t.90.D.....#Y
69b0   00 34 29 90 0c 79 00 10  05 ce 21 59 00 34 21 90   .4)..y....!Y.4!.
69c0   04 79 00 10 0c 20 29 92  05 ce 21 59 00 34 31 90   .y... )...!Y.41.
69d0   04 79 00 10 05 8e 23 59  00 34 29 90 0c 79 00 10   .y....#Y.4)..y..
69e0   00 30 20 90 d0 95 00 10  04 41 29 59 24 00 20 8c   .0 ......A)Y$. .
69f0   84 45 21 74 84 39 30 92  44 89 00 10 01 00 80 8c   .E!t.90.D.......
```

```
Mar 27 13:20 1996  image.txt Page 37

6a00   00 00 00 0a 00 00 00 00  00 00 00 00 00 00 00 00   ................
6a10   40 60 08 8c 10 16 70 5c  05 0e 24 59 00 34 21 c8   @`....p\..$Y.4!.
6a20   02 79 00 10 04 16 78 5c  05 0e 21 59 00 34 21 90   .y....x\..!Y.4!.
6a30   08 79 00 10 0c 20 21 90  10 20 01 35 00 30 30 8c   .y... !.. .5.0..
6a40   ff ff ff ff 00 00 00 0a  05 ce 23 59 00 34 21 90   ..........#Y.4!.
6a50   08 79 00 10 0c 20 29 90  00 30 20 90 d0 55 00 10   .y... )..0 .....
6a60   04 41 29 59 24 00 20 8c  84 45 21 74 84 39 20 c8   .A)Y$. ..E!t.9 .
6a70   42 89 00 10 04 16 18 5c  05 0e 21 59 00 34 29 90   B......\..!Y.4).
6a80   08 79 00 10 05 ce 23 59  00 34 21 90 08 79 00 10   .y....#Y.4!..y..
6a90   0c 20 21 90 10 00 29 32  00 30 80 8c 1e ff ff ff   . !...)2.0......
6aa0   00 00 00 0a 05 ce 20 59  00 34 39 c8 02 79 00 10   ...... Y.49..y..
6ab0   05 ce 23 59 00 34 21 90  08 79 00 10 0c 20 21 90   ..#Y.4!..y... !.
6ac0   34 20 01 32 00 00 30 8c  05 ce 23 59 00 34 21 90   4 .2..0...#Y.4!.
6ad0   08 79 00 10 0c 20 29 90  00 30 20 90 d0 95 00 10   .y... )..0 .....
6ae0   04 41 29 59 24 00 20 8c  84 45 21 74 84 39 30 92   .A)Y$. ..E!t.90.
6af0   44 89 00 10 00 00 28 8c  05 ce 23 59 00 34 21 90   D.....(...#Y.4!.
6b00   08 79 00 10 0c 20 29 92  05 ce 21 59 00 34 29 90   .y... )...!Y.4).
6b10   0c 79 00 10 05 ce 20 59  00 34 21 90 04 79 00 10   .y.... Y.4!..y..
6b20   0c 20 29 92 05 ce 20 59  00 34 31 90 04 79 00 10   . )... Y.41..y..
6b30   05 ce 21 59 00 34 29 90  0c 79 00 10 00 30 20 90   ..!Y.4)..y...0 .
6b40   d0 95 00 10 04 41 29 59  24 00 20 8c 84 45 21 74   .....A)Y$. ..E!t
6b50   84 39 30 92 44 89 00 10  05 8e 23 59 00 34 31 8c   .90.D.....#Y.41.
6b60   00 79 00 10 40 e0 2f 8c  20 00 20 8c 06 16 80 5c   .y..@./. . ....\
6b70   05 16 88 5c 04 16 90 5c  d8 ca ff 09 05 ce 23 59   ...\...\......#Y
6b80   00 34 31 8c 00 79 00 10  60 e0 2f 8c 20 00 20 8c   .41..y..`./. . .
6b90   06 16 80 5c 05 16 88 5c  04 16 90 5c b4 ca ff 09   ...\...\...\....
6ba0   05 ce 21 59 00 34 31 8c  00 79 00 10 05 8e 23 59   ..!Y.41..y....#Y
6bb0   00 34 29 8c 00 79 00 10  20 00 20 8c 06 16 80 5c   .4)..y.. . ....\
6bc0   05 16 88 5c 04 16 90 5c  88 ca ff 09 05 ce 20 59   ...\...\...... Y
6bd0   00 34 31 8c 00 79 00 10  05 ce 23 59 00 34 29 8c   .41..y....#Y.4).
6be0   00 79 00 10 20 00 20 8c  06 16 80 5c 05 16 88 5c   .y.. . ....\...\
6bf0   04 16 90 5c 5c ca ff 09  40 e0 37 8c 05 ce 21 59   ...\\...@.7...!Y
6c00   00 34 29 8c 00 79 00 10  20 00 20 8c 06 16 80 5c   .4)..y.. . ....\
6c10   05 16 88 5c 04 16 90 5c  38 ca ff 09 60 e0 37 8c   ...\...\8...`.7.
6c20   05 ce 20 59 00 34 29 8c  00 79 00 10 20 00 20 8c   .. Y.4)..y.. . .
6c30   06 16 80 5c 05 16 88 5c  04 16 90 5c 14 ca ff 09   ...\...\...\....
6c40   05 ce 23 59 00 34 71 ca  02 79 00 10 05 8e 23 59   ..#Y.4q..y....#Y
6c50   00 34 79 ca 02 79 00 10  05 ce 20 59 00 34 39 ca   .4y..y.... Y.49.
6c60   02 79 00 10 05 ce 21 59  00 34 19 ca 02 79 00 10   .y....!Y.4...y..
6c70   05 ce 23 59 00 34 29 90  04 79 00 10 00 30 20 90   ..#Y.4)..y...0 .
```

Mar 27 15:20 1996 image.txt Page 38

```
6c80   d0 95 00 10 04 41 29 59  24 00 20 8c 84 45 21 74   .....A)Y$. ..E!t
6c90   84 39 78 ca 42 89 00 10  05 ce 23 59 00 34 29 90   .9x.B.....#Y.4).
6ca0   08 79 00 10 00 30 20 90  d0 95 00 10 04 41 29 59   .y...0 ......A)Y
6cb0   24 00 20 8c 84 45 21 74  84 39 78 ca 42 89 00 10   $. ..E!t.9x.B...
6cc0   05 8e 23 59 00 34 29 90  0c 79 00 10 00 30 20 90   ..#Y.4)..y...0 .
6cd0   d0 95 00 10 04 41 29 59  24 00 20 8c 84 45 21 74   .....A)Y$. ..E!t
6ce0   84 39 70 ca 42 89 00 10  05 ce 20 59 00 34 29 90   .9p.B..... Y.4).
6cf0   04 79 00 10 00 30 20 90  d0 95 00 10 04 41 29 59   .y...0 ......A)Y
6d00   24 00 20 8c 84 45 21 74  84 39 18 ca 42 89 00 10   $. ..E!t.9..B...
6d10   05 ce 20 59 00 34 29 90  08 79 00 10 00 30 20 90   .. Y.4)..y...0 .
6d20   d0 95 00 10 04 41 29 59  24 00 20 8c 84 45 21 74   .....A)Y$. ..E!t
6d30   84 39 18 ca 42 89 00 10  05 ce 21 59 00 34 29 90   .9..B.....!Y.4).
6d40   0c 79 00 10 00 30 20 90  d0 95 00 10 04 41 29 59   .y...0 ......A)Y
6d50   24 00 20 8c 84 45 21 74  84 39 38 ca 42 89 00 10   $. ..E!t.98.B...
6d60   01 00 20 8c 07 16 60 5c  04 16 68 5c 94 04 00 09   .. ....\...\....
6d70   04 16 80 5c 00 00 00 ca  00 00 00 00 00 00 00 00   ...\............
6d80   10 16 68 5c 11 16 70 5c  12 16 78 5c 00 00 38 8c   ..h\..p\..x\..8.
6d90   07 16 18 5c 00 30 20 c8  00 79 00 10 2c 20 01 3a   ...\.0 ..y.., .:
6da0   78 00 20 8c 24 00 39 3b  01 e0 21 8c 04 16 38 5c   x. .$.9;..!...8\
6db0   05 0e 21 59 00 34 21 c8  00 79 00 10 0c 20 01 3a   ..!Y.4!..y... .:
6dc0   78 00 20 8c e4 1f 39 3c  78 00 20 8c 10 00 39 3c   x. ...9<x. ...9<
6dd0   00 30 80 8c 40 74 00 00  c8 c7 ff 08 02 00 28 8c   .0..@t........(.
6de0   05 ce 21 59 00 34 29 ca  00 79 00 10 05 ce 20 59   ..!Y.4)..y.... Y
6df0   00 34 21 c8 00 79 00 10  2c 20 01 3a 78 00 20 8c   .4!..y.., .:x. .
6e00   24 00 19 3b 01 e0 20 8c  04 16 18 5c 05 0e 21 59   $..;.. ....\..!Y
6e10   00 34 21 c8 00 79 00 10  0c 20 01 3a 78 00 20 8c   .4!..y... .:x. .
6e20   e4 1f 19 3c 78 00 20 8c  10 00 19 3c 00 30 80 8c   ...<x. ....<.0..
6e30   40 74 00 00 6c c7 ff 08  02 00 28 8c 05 ce 20 59   @t..l.....(... Y
6e40   00 34 29 ca 00 79 00 10  c8 ed ff 09 05 ce 21 59   .4)..y........!Y
6e50   00 34 81 92 04 79 00 10  05 4e 23 59 00 34 21 c8   .4...y...N#Y.4!.
6e60   02 79 00 10 05 0e 21 59  00 34 21 90 10 79 00 10   .y....!Y.4!..y..
6e70   08 20 29 90 05 ce 21 59  00 34 21 90 04 79 00 10   . )....!Y.4!..y..
6e80   00 10 29 92 05 ce 21 59  00 34 81 90 04 79 00 10   ..)...!Y.4...y..
6e90   20 e2 ff 09 05 ce 21 59  00 34 29 90 04 79 00 10    .....!Y.4)..y..
6ea0   00 30 20 90 d0 95 00 10  04 41 29 59 24 00 20 8c   .0 ......A)Y$. .
6eb0   84 45 21 74 84 39 38 ca  42 89 00 10 54 ed ff 09   .E!t.98.B...T...
6ec0   05 ce 21 59 00 34 81 92  08 79 00 10 05 4e 23 59   ..!Y.4...y...N#Y
6ed0   00 34 21 c8 02 79 00 10  05 0e 21 59 00 34 21 90   .4!..y....!Y.4!.
6ee0   10 79 00 10 0c 20 29 90  05 ce 21 59 00 34 21 90   .y... )....!Y.4!.
6ef0   08 79 00 10 00 10 29 92  05 ce 21 59 00 34 81 90   .y....)....!Y.4..
```

```
Mar 27 18:20 1998  image.txt Page 59

6f00   08 79 00 10 ac e1 ff 09  05 ce 21 59 00 34 29 90   .y........!Y.4).
6f10   08 79 00 10 00 30 20 90  d0 95 00 10 04 41 29 59   .y...0 ......A)Y
6f20   24 00 20 8c 84 45 21 74  84 39 38 ca 42 59 00 10   $. ..E!t.98.BY..
6f30   05 ce 21 59 00 34 29 90  08 79 00 10 05 ce 20 59   ..!Y.4)..y.... Y
6f40   00 34 29 92 04 79 00 10  05 ce 21 59 00 34 29 90   .4)..y....!Y.4).
6f50   04 79 00 10 05 ce 20 59  00 34 29 92 08 79 00 10   .y.... Y.4)..y..
6f60   05 ce 20 59 00 34 39 ca  02 79 00 10 05 ce 21 59   .. Y.49..y....!Y
6f70   00 34 19 ca 02 79 00 10  05 8e 23 59 00 34 29 90   .4...y....#Y.4).
6f80   04 79 00 10 05 ce 21 59  00 34 21 90 08 79 00 10   .y....!Y.4!..y..
6f90   0c 20 29 92 05 ce 21 59  00 34 31 90 08 79 00 10   . )...!Y.41..y..
6fa0   05 8e 23 59 00 34 29 90  04 79 00 10 00 30 20 90   ..#Y.4)..y...0 .
6fb0   d0 95 00 10 04 41 29 59  24 00 20 8c 84 45 21 74   .....A)Y$. ..E!t
6fc0   84 39 30 92 44 89 00 10  05 ce 21 59 00 34 29 90   .90.D.....!Y.4).
6fd0   04 79 00 10 05 8e 23 59  00 34 21 90 08 79 00 10   .y....#Y.4!..y..
6fe0   0c 20 29 92 05 8e 23 59  00 34 31 90 08 79 00 10   . )...#Y.41..y..
6ff0   05 ce 21 59 00 34 29 90  04 79 00 10 00 30 20 90   ..!Y.4)..y...0 .
7000   d0 95 00 10 04 41 29 59  24 00 20 8c 84 45 21 74   .....A)Y$. ..E!t
7010   84 39 30 92 44 89 00 10  05 8e 23 59 00 34 21 90   .90.D.....#Y.4!.
7020   0c 79 00 10 48 20 01 32  05 8e 23 59 00 34 21 90   .y..H .2..#Y.4!.
7030   0c 79 00 10 1a 20 21 88  14 20 01 30 05 8e 23 59   .y... !.. .0..#Y
7040   00 34 81 90 0c 79 00 10  88 d2 ff 09 05 8e 23 59   .4...y........#Y
7050   00 34 81 90 0c 79 00 10  68 ec ff 09 00 00 28 8c   .4...y..h.....(.
7060   05 8e 23 59 00 34 29 92  0c 79 00 10 05 ce 21 59   ..#Y.4)..y....!Y
7070   00 34 21 90 08 79 00 10  04 e0 23 92 05 ce 21 59   .4!..y....#...!Y
7080   00 34 21 90 04 79 00 10  00 d0 23 92 08 e0 3b 92   .4!..y....#...;.
7090   00 00 00 0a 00 00 00 00  00 00 00 00 00 00 00 00   ................
70a0   11 16 38 5c 00 00 18 8c  0c 60 04 39 78 00 20 8c   ..8\.....`.9x. .
70b0   08 00 39 3c 00 00 00 0a  05 ce 20 59 00 34 21 90   ..9<...... Y.4!.
70c0   08 79 00 10 0c 20 29 90  05 ce 21 59 00 34 21 90   .y... )...!Y.4!.
70d0   04 79 00 10 3c 00 29 32  78 00 20 8c 34 00 19 3b   .y..<.)2x. .4..;
70e0   01 e0 20 8c 04 16 18 5c  05 0e 21 59 00 34 21 90   .. ....\..!Y.4!.
70f0   08 79 00 10 0c 20 29 90  05 ce 21 59 00 34 21 90   .y... )...!Y.4!.
7100   04 79 00 10 0c 00 29 32  78 00 20 8c d4 1f 19 3c   .y....)2x. ....<
7110   78 00 20 8c 14 00 19 3b  01 00 20 8c 03 16 80 5c   x. ....;.. ....\
7120   04 16 88 5c dc 00 00 09  05 ce 21 59 00 34 81 c8   ...\......!Y.4..
7130   02 79 00 10 dc f8 ff 09  f0 3f 04 3c 05 ce 21 59   .y.......?.<..!Y
7140   00 34 29 c8 02 79 00 10  01 00 20 8c 05 16 80 5c   .4)..y.... ....\
7150   04 16 88 5c ac 00 00 08  00 00 00 00 00 00 00 00   ...\............
7160   11 16 30 5c 12 16 38 5c  00 00 18 8c 0c 60 04 39   ..0\..8\.....`.9
7170   78 00 20 8c 08 00 31 3c  00 00 00 0a 05 ce 20 59   x. ...1<...... Y
```

```
Mar 27 18:20 1996  image.txt Page 40

7180    00 34 21 90 08 79 00 10  0c 20 29 90 05 8e 21 59   .4!..y... )...!Y
7190    00 34 21 90 04 79 00 10  3c 00 29 32 78 00 20 8c   .4!..y..<.)2x. .
71a0    34 00 19 3b 01 e0 20 8c  04 18 18 5c 05 0e 21 59   4..;.. ....\..!Y
71b0    00 34 21 90 08 79 00 10  0c 20 29 90 05 8e 21 59   .4!..y... )...!Y
71c0    00 34 21 90 04 79 00 10  0c 00 29 32 78 00 20 8c   .4!..y....)2x. .
71d0    d4 1f 19 3c 05 8e 21 59  00 34 21 90 08 79 00 10   ...<..!Y.4!..y..
71e0    04 e0 21 92 05 ce 20 59  00 34 21 90 08 79 00 10   ..!... Y.4!..y..
71f0    00 d0 21 92 08 e0 19 92  00 00 00 0a 00 00 00 00   ..!.............
7200    10 18 70 5c 05 0e 24 59  00 34 79 ca 02 79 00 10   ..p\..$Y.4y..y..
7210    84 60 04 3a 05 ce 23 59  00 34 21 90 04 79 00 10   .`.:..#Y.4!..y..
7220    00 10 21 90 0c 20 21 90  2c 20 01 32 05 ce 23 59   ..!.. !., .2..#Y
7230    00 34 29 90 04 79 00 10  05 ce 23 59 00 34 21 90   .4)..y....#Y.4!.
7240    04 79 00 10 00 10 21 90  0c 20 39 90 05 18 80 5c   .y....!.. 9....\
7250    00 d0 01 8b 05 ce 23 59  00 34 21 90 08 79 00 10   ......#Y.4!..y..
7260    00 10 21 90 0c 20 21 90  2c 20 01 32 05 ce 23 59   ..!.. !., .2..#Y
7270    00 34 29 90 08 79 00 10  05 ce 23 59 00 34 21 90   .4)..y....#Y.4!.
7280    08 79 00 10 00 10 21 90  0c 20 19 90 05 16 80 5c   .y....!.. .....\
7290    00 d0 00 86 8c 1d 00 09  10 16 30 5c 05 ce 23 59   ..........0\..#Y
72a0    00 34 21 90 0c 79 00 10  48 20 01 32 05 ce 23 59   .4!..y..H .2..#Y
72b0    00 34 21 90 0c 79 00 10  1a 20 21 88 14 20 01 30   .4!..y... !.. .0
72c0    05 ce 23 59 00 34 81 90  0c 79 00 10 04 d0 ff 09   ..#Y.4...y......
72d0    05 ce 23 59 00 34 81 90  0c 79 00 10 e4 e9 ff 09   ..#Y.4...y......
72e0    00 00 28 8c 05 ce 23 59  00 34 29 92 0c 79 00 10   ..(...#Y.4)..y..
72f0    05 ce 23 59 00 34 21 90  04 79 00 10 48 20 01 32   ..#Y.4!..y..H .2
7300    05 ce 23 59 00 34 21 90  04 79 00 10 1a 20 21 88   ..#Y.4!..y... !.
7310    14 20 01 30 05 ce 23 59  00 34 81 90 04 79 00 10   . .0..#Y.4...y..
7320    b0 cf ff 09 05 ce 23 59  00 34 81 90 04 79 00 10   ......#Y.4...y..
7330    90 e9 ff 09 00 00 28 8c  05 ce 23 59 00 34 29 92   ......(...#Y.4).
7340    04 79 00 10 05 ce 23 59  00 34 21 90 08 79 00 10   .y....#Y.4!..y..
7350    48 20 01 32 05 ce 23 59  00 34 21 90 08 79 00 10   H .2..#Y.4!..y..
7360    1a 20 21 88 14 20 01 30  05 ce 23 59 00 34 81 90   . !.. .0..#Y.4..
7370    08 79 00 10 5c cf ff 09  05 ce 23 59 00 34 81 90   .y..\.....#Y.4..
7380    08 79 00 10 3c e9 ff 09  00 00 28 8c 05 ce 23 59   .y..<.....(...#Y
7390    00 34 29 92 08 79 00 10  01 00 28 8c 05 ce 23 59   .4)..y....(...#Y
73a0    00 34 29 ca 00 79 00 10  05 8e 23 59 00 34 21 90   .4)..y....#Y.4!.
73b0    0c 79 00 10 48 20 01 32  05 8e 23 59 00 34 21 90   .y..H .2..#Y.4!.
73c0    0c 79 00 10 1a 20 21 88  14 20 01 30 05 8e 23 59   .y... !.. .0..#Y
73d0    00 34 81 90 0c 79 00 10  f8 ce ff 09 05 8e 23 59   .4...y........#Y
73e0    00 34 81 90 0c 79 00 10  d8 e8 ff 09 00 00 28 8c   .4...y........(.
73f0    05 8e 23 59 00 34 29 92  0c 79 00 10 00 00 28 8c   ..#Y.4)..y....(.
```

Mar 27 16:20 1996 image.txt Page 41

```
7400    05 8e 23 59 00 34 29 92  08 79 00 10 05 8e 23 59   ..#Y.4)..y....#Y
7410    00 34 29 92 04 79 00 10  05 8e 23 59 00 34 29 ca   .4)..y....#Y.4).
7420    00 79 00 10 05 8e 23 59  00 34 29 ca 02 79 00 10   .y....#Y.4)..y..
7430    06 16 80 5c 0c 1c 00 08  00 00 00 00 00 00 00 00   ...\............
7440    70 69 70 65 20 6f 70 65  6e 69 6e 67 20 65 72 72   pipe opening err
7450    6f 72 0a 00 00 00 00 00  00 00 00 00 00 00 00 00   or..............
7460    00 00 80 8c 00 00 00 0a  00 00 00 00 00 00 00 00   ................
*
7480    a0 1b 00 08 00 00 00 00  00 00 00 00 00 00 00 00   ................
7490    b0 1b 00 08 00 00 00 00  00 00 00 00 00 00 00 00   ................
74a0    80 1b 00 08 00 00 00 00  00 00 00 00 00 00 00 00   ................
74b0    00 00 20 8c 00 30 20 92  a0 c4 00 10 00 00 00 0a   .. ..0 .........
74c0    00 30 80 92 a0 c4 00 10  00 00 80 8c 00 00 00 0a   .0..............
74d0    00 00 20 8c 00 30 20 92  a0 c4 00 10 04 16 80 5c   .. ..0 ........\
74e0    00 00 00 0a 00 00 00 00  00 00 00 00 00 00 00 00   ................
74f0    10 16 60 5c 00 30 20 90  d4 95 00 10 18 20 01 3a   ..`\.0...... .:
7500    0c 16 80 5c fc cc ff 09  00 30 80 8c ff ff ff ff   ...\.....0......
7510    00 00 00 0a 01 00 20 8c  00 30 20 92 d4 95 00 10   ...... ..0 .....
7520    00 00 78 8c 0c 16 80 5c  98 cf ff 09 10 16 68 5c   ..x....\......h\
7530    00 28 04 5a 1c 01 00 12  14 60 23 90 0d 20 29 80   .(.Z.....`#.. ).
7540    83 00 20 8c 44 00 29 3a  14 60 23 90 0d 20 21 80   .. .D.):.`#.. !.
7550    38 20 09 3a 00 30 28 8c  10 78 00 00 14 60 23 90   8 .:.0(..x...`#.
7560    0d 20 21 80 05 16 80 5c  04 16 88 5c 84 c2 ff 09   . !....\...\....
7570    0d 16 80 5c 2c ba ff 09  00 00 20 8c 00 30 20 92   ...\,..... ..0 .
7580    d4 95 00 10 00 00 00 0a  10 60 2b 90 0c 60 23 90   .........`+..`#.
7590    04 41 29 59 20 00 20 8c  3c 00 29 33 00 30 30 8c   .A)Y . .<.)3.00.
75a0    40 78 00 00 10 60 2b 90  0c 60 23 90 04 41 21 59   @x...`+..`#..A!Y
75b0    06 16 80 5c 04 16 88 5c  38 c2 ff 09 0d 16 80 5c   ...\...\8......\
75c0    e0 b9 ff 09 00 00 20 8c  00 30 20 92 d4 95 00 10   ...... ..0 .....
75d0    00 00 00 0a 0c 60 23 90  04 16 70 5c 00 10 39 c0   .....`#...p\..9.
75e0    10 e0 01 3d 10 a0 83 90  e8 af ff 09 24 00 00 08   ...=........$...
75f0    20 e0 09 3d 10 e0 83 90  18 c8 ff 09 14 20 04 3a    ..=......... .:
7600    18 a0 23 90 14 a0 1b 90  04 16 80 5c 00 d0 00 86   ..#........\....
7610    0d 16 80 5c 8c b9 ff 09  01 e0 23 8c 04 16 78 5c   ...\......#...x\
7620    1c 20 21 3b 0c 16 80 5c  18 da ff 09 10 20 04 3a   . !;...\..... .:
7630    0c 16 80 5c cc cb ff 09  18 00 00 08 0c 16 80 5c   ...\...........\
7640    80 ce ff 09 10 16 68 5c  00 28 04 5a ec fe ff 15   ......h\.(.Z....
7650    00 00 20 8c 00 30 20 92  d4 95 00 10 00 00 00 0a   .. ..0 .........
7660    10 16 78 5c 00 30 20 90  a0 c4 00 10 10 20 01 35   ..x\.0 ...... .5
7670    00 30 80 8c b0 77 00 00  78 c1 ff 08 20 00 28 8c   .0...w..x... .(.
```

```
7680   03 00 20 8c 05 16 80 5c  04 16 88 5c a4 e2 ff 09   .. ....\...\....
7690   10 16 38 5c 10 20 04 35  00 30 80 8c f0 77 00 00   ..8\. .5.0...w..
76a0   50 c1 ff 08 0c e0 31 90  01 00 28 8c 14 e0 21 90   P.......1.....!.
76b0   0a 20 29 82 0c e0 21 90  20 20 21 8c 10 e0 21 92   . )...!.  !...!.
76c0   00 00 20 8c 00 90 21 c2  10 a0 79 92 00 30 80 90   .. ...!...y..0..
76d0   a0 c4 00 10 07 16 88 5c  88 ce ff 08 00 00 00 00   .......\........
76e0   10 16 68 5c 11 16 70 5c  12 16 78 5c 00 30 20 90   ..h\..p\..x\.0 .
76f0   a0 c4 00 10 10 20 01 35  00 30 80 8c 70 77 00 00   ..... .5.0..pw..
7700   f0 c0 ff 08 20 00 28 8c  03 00 20 8c 05 16 80 5c   .... .(... ....\
7710   04 16 88 5c 1c e2 ff 09  10 16 38 5c 10 20 04 35   ...\......8\. .5
7720   00 30 80 8c f0 77 00 00  c8 c0 ff 08 0c e0 31 90   .0...w........1.
7730   83 00 28 8c 14 e0 21 90  0d 20 29 82 0c e0 21 90   ..(...!.. )...!.
7740   20 20 21 8c 10 e0 21 92  01 00 20 8c 00 90 21 c2     !...!... ...!.
7750   10 a0 69 92 14 a0 71 92  18 a0 79 92 00 30 80 90   ..i...q...y..0..
7760   a0 c4 00 10 07 16 88 5c  18 cd ff 08 00 00 00 00   .......\........
7770   47 65 6e 44 65 76 20 3a  20 74 69 6d 65 5f 65 76   GenDev : time_ev
7780   65 6e 74 20 63 61 6c 6c  65 64 20 77 68 65 6e 20   ent called when 
7790   64 65 76 69 63 65 20 77  61 73 20 6e 6f 74 20 69   device was not i
77a0   6e 69 74 0a 00 00 00 00  00 00 00 00 00 00 00 00   nit.............
77b0   47 65 6e 44 65 76 20 3a  20 70 6f 6c 6c 5f 65 76   GenDev : poll_ev
77c0   65 6e 74 20 63 61 6c 6c  65 64 20 77 68 65 6e 20   ent called when 
77d0   64 65 76 69 63 65 20 77  61 73 20 6e 6f 74 20 69   device was not i
77e0   6e 69 74 0a 00 00 00 00  00 00 00 00 00 00 00 00   nit.............
77f0   47 65 6e 44 65 76 20 3a  20 4e 6f 20 62 75 66 66   GenDev : No buff
7800   65 72 20 66 6f 72 20 6d  65 73 73 61 67 65 0a 00   er for message..
7810   47 65 6e 64 65 76 3a 20  4d 65 73 73 61 67 65 20   Gendev: Message 
7820   74 79 70 65 20 6e 6f 74  20 63 6f 72 72 65 63 74   type not correct
7830   00 00 00 00 00 00 00 00  00 00 00 00 00 00 00 00   ................
7840   47 65 6e 64 65 76 3a 20  4d 65 73 73 61 67 65 20   Gendev: Message 
7850   54 6f 6f 20 73 68 6f 72  74 20 73 69 7a 65 20 3d   Too short size =
7860   20 25 78 00 00 00 00 00  67 64 65 76 00 00 00 00    %x.....gdev....
7870   30 60 08 8c 40 e0 c7 b2  00 00 68 8c 0d 16 70 5c   0`..@.....h...p\
7880   00 30 80 8c 70 87 00 00  68 bf ff 09 0d 16 60 5c   .0..p...h.....`\
7890   05 0e 23 59 00 34 21 90  08 79 00 10 00 28 01 5a   ..#Y.4!..y...(.Z
78a0   6c 01 00 12 05 0e 23 59  00 34 21 90 08 79 00 10   l.....#Y.4!..y..
78b0   18 20 21 88 80 28 01 5a  54 01 00 13 00 00 70 8c   . !..(.ZT.....p.
78c0   05 0e 23 59 00 34 21 90  08 79 00 10 04 20 21 90   ..#Y.4!..y... !.
78d0   04 16 78 5c 04 16 18 5c  24 20 01 32 08 e0 23 90   ..x\...\$ .2..#.
78e0   04 16 78 5c 10 20 01 35  00 d0 20 90 04 16 18 5c   ..x\. .5.. ....\
78f0   04 16 78 5c 01 a0 73 8c  e4 ff 03 35 05 0e 23 59   ..x\..s....5..#Y
```

```
Mar 27 16:20 1996  image.txt Page 43

7900    00 34 21 90 0c 79 00 10  10 20 01 32 00 30 58 8c   .4!..y... .2.0X.
7910    04 88 00 00 0c 00 00 08  00 30 58 8c 10 87 00 00   .........0X.....
7920    05 0e 23 59 00 34 21 90  0e 79 00 10 18 20 49 88   ..#Y.4!..y... I.
7930    50 e0 47 92 0e 15 40 5c  54 e0 47 92 05 0e 23 59   P.G...@\T.G...#Y
7940    00 34 49 90 08 79 00 10  58 e0 47 92 0c 16 40 5c   .4I..y..X.G...@\
7950    5c e0 47 92 05 0e 23 59  00 34 21 90 08 79 00 10   \.G...#Y.4!..y..
7960    00 10 21 90 14 20 21 90  04 20 49 90 60 e0 47 92   ..!.. !.. I.`.G.
7970    05 0e 23 59 00 34 21 90  08 79 00 10 0c 20 41 90   ..#Y.4!..y... A.
7980    64 e0 47 92 05 0e 23 59  00 34 21 90 08 79 00 10   d.G...#Y.4!..y..
7990    0c 20 21 90 24 20 01 32  05 0e 23 59 00 34 21 90   . !.$ .2..#Y.4!.
79a0    08 79 00 10 0c 20 21 90  00 10 21 90 14 20 21 90   .y... !...!.. !.
79b0    04 20 51 90 0c 00 00 08  00 30 50 8c b0 88 00 00   . Q......0P.....
79c0    00 30 48 8c 40 88 00 00  09 16 80 5c 08 16 88 5c   .0H.@......\...\
79d0    50 e0 47 90 08 16 90 5c  54 e0 47 90 09 16 98 5c   P.G....\T.G....\
79e0    58 e0 47 90 08 16 a0 5c  5c e0 47 90 09 16 a8 5c   X.G....\\.G....\
79f0    60 e0 47 90 08 16 b0 5c  64 e0 47 90 09 16 b8 5c   `.G....\d.G....\
7a00    0a 16 c0 5c ec bd ff 09  8d 80 6b 59 05 0e 23 59   ...\......kY..#Y
7a10    00 34 21 90 0c 79 00 10  b4 20 01 32 05 0e 23 59   .4!..y... .2..#Y
7a20    00 34 21 90 0c 79 00 10  18 20 21 88 a0 20 01 3b   .4!..y... !.. .;
7a30    00 00 70 8c 05 0e 23 59  00 34 21 90 0c 79 00 10   ..p...#Y.4!..y..
7a40    04 20 21 90 04 16 78 5c  04 16 18 5c 24 20 01 32   . !...x\...\$ .2
7a50    08 e0 23 90 04 16 7d 5c  10 20 01 35 00 d0 20 90   ..#...x\. .5.. .
7a60    04 16 18 5c 04 16 78 5c  01 a0 73 8c e4 ff 03 35   ...\..x\..s....5
7a70    00 30 38 8c c0 87 00 00  05 0e 23 59 00 34 21 90   .08.......#Y.4!.
7a80    0c 79 00 10 18 20 31 88  05 0e 23 59 00 34 29 90   .y... 1...#Y.4).
7a90    0c 79 00 10 05 0e 23 59  00 34 21 90 08 79 00 10   .y....#Y.4!..y..
7aa0    00 10 21 90 14 20 21 90  04 20 21 90 07 16 80 5c   ..!.. !.. !....\
7ab0    06 16 88 5c 0e 16 90 5c  05 16 98 5c 0c 16 a0 5c   ...\...\...\...\
7ac0    04 16 a8 5c 2c bd ff 09  8d 80 6b 59 01 20 2b 8c   ...\,.....kY. +.
7ad0    05 16 60 5c 82 00 20 8c  85 20 01 5a b4 fd ff 14   ..`\.. .. .Z....
7ae0    00 30 80 8c 70 89 00 00  0d 16 88 5c 40 e0 c7 b0   .0..p......\@...
7af0    00 bd ff 08 00 00 00 00  00 00 00 00 00 00 00 00   ................
7b00    00 30 80 8c 50 89 00 00  e8 bc ff 09 00 30 80 8c   .0..P........0..
7b10    c0 8a 00 00 dc bc ff 09  00 30 18 8c 80 8a 00 00   .........0......
7b20    01 00 e8 8c 10 00 78 8c  dc 05 38 8c 00 30 30 90   ......x...8..00.
7b30    f4 c3 00 10 00 30 28 90  1c c4 00 10 00 30 20 90   .....0(......0 .
7b40    44 c4 00 10 03 16 80 5c  1a 16 88 5c 0f 16 90 5c   D......\...\...\
7b50    07 16 98 5c 06 16 a0 5c  05 16 a8 5c 04 16 b0 5c   ...\...\...\...\
7b60    90 bc ff 09 03 16 e8 5c  00 00 70 8c 18 00 18 8c   .......\..p.....
7b70    00 30 30 90 f0 c3 00 10  00 30 28 90 18 c4 00 10   .00......0(.....
```

Mar 27 18:20 1996 image.txt Page 44

```
7b80    00 30 20 90 40 c4 00 10  1d 16 80 5c 0e 16 88 5c   .0 .@......\...\
7b90    03 16 90 5c 07 16 98 5c  06 16 a0 5c 05 16 a8 5c   ...\...\...\...\
7ba0    04 16 b0 5c 4c bc ff 09  00 30 70 8c 80 8a 00 00   ...\L....0p.....
7bb0    02 00 78 8c 24 00 e8 8c  34 00 38 8c 00 30 30 90   ..x.$.....8..00.
7bc0    90 a2 00 10 00 30 28 90  94 a2 00 10 00 30 20 90   .....0(......0 .
7bd0    98 a2 00 10 0e 16 80 5c  0f 16 88 5c 1d 16 90 5c   .......\...\...\
7be0    07 16 98 5c 06 16 a0 5c  05 16 a8 5c 04 16 b0 5c   ...\...\...\...\
7bf0    00 bc ff 09 0e 16 78 5c  03 00 18 8c 08 00 70 8c   ......x\......p.
7c00    32 00 38 8c 00 30 30 90  fc c3 00 10 00 30 28 90   2.8..00......0(.
7c10    24 c4 00 10 00 30 20 90  4c c4 00 10 0f 16 80 5c   $....0 .L......\
7c20    03 16 88 5c 0e 16 90 5c  07 16 98 5c 06 16 a0 5c   ...\...\...\...\
7c30    05 16 a8 5c 04 16 b0 5c  8d bb ff 09 0f 16 18 5c   ...\...\.......\
7c40    04 00 e8 8c 20 00 78 8c  40 01 38 8c 00 30 30 90   .... .x.@.8..00.
7c50    00 c4 00 10 00 30 28 90  28 c4 00 10 00 30 20 90   .....0(.(....0 .
7c60    50 c4 00 10 03 16 80 5c  1d 16 88 5c 0f 16 90 5c   P......\...\...\
7c70    07 16 98 5c 06 16 a0 5c  05 16 a8 5c 04 16 b0 5c   ...\...\...\...\
7c80    70 bb ff 09 03 16 e8 5c  05 00 70 8c 80 00 18 8c   p......\..p.....
7c90    dc 00 38 8c 00 30 30 90  04 c4 00 10 00 30 28 90   ..8..00......0(.
7ca0    2c c4 00 10 00 30 20 90  54 c4 00 10 1d 16 80 5c   ,....0 .T......\
7cb0    0e 16 88 5c 03 16 90 5c  07 16 98 5c 06 16 a0 5c   ...\...\...\...\
7cc0    05 16 a8 5c 04 16 b0 5c  28 bb ff 09 00 30 70 8c   ...\...\(....0p.
7cd0    80 8a 00 00 06 00 78 8c  8a 02 e8 8c 2c 01 38 8c   ......x.....,.8.
7ce0    00 30 30 90 08 c4 00 10  00 30 28 90 30 c4 00 10   .00......0(.0...
7cf0    00 30 20 90 58 c4 00 10  0e 16 80 5c 0f 16 88 5c   .0 .X......\...\
7d00    1d 16 90 5c 07 16 98 5c  06 16 a0 5c 05 16 a8 5c   ...\...\...\...\
7d10    04 16 b0 5c dc ba ff 09  0e 16 78 5c 07 00 18 8c   ...\......x\....
7d20    40 06 70 8c 0a 00 38 8c  00 30 30 90 0c c4 00 10   @.p...8..00.....
7d30    00 30 28 90 34 c4 00 10  00 30 20 90 5c c4 00 10   .0(.4....0 .\...
7d40    0f 16 80 5c 03 16 88 5c  0e 16 90 5c 07 16 98 5c   ...\...\...\...\
7d50    06 16 a0 5c 05 16 a8 5c  04 16 b0 5c 94 ba ff 09   ...\...\...\....
7d60    0f 16 18 5c 08 00 e8 8c  e2 04 78 8c 00 30 30 90   ...\......x..00.
7d70    10 c4 00 10 00 30 28 90  38 c4 00 10 00 30 20 90   .....0(.8....0 .
7d80    60 c4 00 10 03 16 80 5c  1d 16 88 5c 0f 16 90 5c   `......\...\...\
7d90    07 16 98 5c 06 16 a0 5c  05 16 a8 5c 04 16 b0 5c   ...\...\...\...\
7da0    50 ba ff 09 00 30 80 8c  80 88 00 00 44 ba ff 09   P....0......D...
7db0    00 30 78 8c 40 8a 00 00  00 00 18 8c 00 30 28 90   .0x.@........0(.
7dc0    f0 c3 00 10 00 30 20 90  f4 c3 00 10 05 00 29 59   .....0 .......)Y
7dd0    00 30 20 90 90 a2 00 10  05 00 29 59 00 30 20 90   .0 .......)Y.0 .
7de0    fc c3 00 10 05 00 29 59  00 30 20 90 00 c4 00 10   ......)Y.0 .....
7df0    05 00 29 59 00 30 20 90  04 c4 00 10 05 00 29 59   ..)Y.0 .......)Y
```

```
Mar 27 18:20 1996  image.txt Page 45

7e00   00 30 20 90 08 c4 00 10  05 00 29 59 00 30 20 90   .0 ......)Y.0 .
7e10   0c c4 00 10 05 00 29 59  00 30 20 90 10 c4 00 10   ......)Y.0 .....
7e20   05 00 39 59 00 30 28 90  18 c4 00 10 00 30 20 90   ..9Y.0(......0 .
7e30   1c c4 00 10 05 00 29 59  00 30 20 90 94 a2 00 10   ......)Y.0 .....
7e40   05 00 29 59 00 30 20 90  24 c4 00 10 05 00 29 59   ..)Y.0 .$.....)Y
7e50   00 30 20 90 28 c4 00 10  05 00 29 59 00 30 20 90   .0 .(.....)Y.0 .
7e60   2c c4 00 10 05 00 29 59  00 30 20 90 30 c4 00 10   ,.....)Y.0 .0...
7e70   05 00 29 59 00 30 20 90  34 c4 00 10 05 00 29 59   ..)Y.0 .4.....)Y
7e80   00 30 20 90 38 c4 00 10  05 00 31 59 00 30 28 90   .0 .8.....1Y.0(.
7e90   40 c4 00 10 00 30 20 90  44 c4 00 10 05 00 29 59   @....0 .D.....)Y
7ea0   00 30 20 90 98 a2 00 10  05 00 29 59 00 30 20 90   .0 ......)Y.0 .
7eb0   4c c4 00 10 05 00 29 59  00 30 20 90 50 c4 00 10   L.....)Y.0 .P...
7ec0   05 00 29 59 00 30 20 90  54 c4 00 10 05 00 29 59   ..)Y.0 .T.....)Y
7ed0   00 30 20 90 58 c4 00 10  05 00 29 59 00 30 20 90   .0 .X.....)Y.0 .
7ee0   5c c4 00 10 05 00 29 59  00 30 20 90 60 c4 00 10   \.....)Y.0 .`...
7ef0   05 00 21 59 0f 16 80 5c  03 16 88 5c 07 16 90 5c   ..!Y...\...\...\
7f00   06 16 98 5c 04 16 a0 5c  e8 b8 ff 09 00 30 80 8c   ...\...\.....0..
7f10   f0 89 00 00 dc b8 ff 09  00 30 28 8c c0 88 00 00   .........0(.....
7f20   00 30 20 90 a0 a2 00 10  05 16 80 5c 04 16 88 5c   .0 .......\...\
7f30   c0 b8 ff 09 00 30 70 8c  00 88 00 00 00 30 38 90   .....0p......08.
7f40   a8 a2 00 10 00 30 30 90  ac a2 00 10 00 30 28 90   .....00......0(.
7f50   b0 a2 00 10 00 30 20 90  b4 a2 00 10 0e 16 80 5c   .....0 ........\
7f60   07 16 88 5c 06 16 90 5c  05 16 98 5c 04 16 a0 5c   ...\...\...\...\
7f70   80 b8 ff 09 00 30 28 8c  60 88 00 00 00 30 20 90   .....0(.`....0 .
7f80   a4 a2 00 10 05 16 80 5c  04 16 88 5c 64 b8 ff 09   .......\...\d...
7f90   00 30 28 8c 10 87 00 00  00 30 20 90 b8 a2 00 10   .0(......0 .....
7fa0   05 16 80 5c 04 16 88 5c  48 b8 ff 09 00 30 38 8c   ...\...\H....08.
7fb0   c0 86 00 00 00 30 30 90  90 c4 00 10 00 30 28 90   .....00......0(.
7fc0   40 c4 00 10 00 30 20 90  44 c4 00 10 05 00 29 59   @....0 .D.....)Y
7fd0   00 30 20 90 98 a2 00 10  05 00 29 59 00 30 20 90   .0 ......)Y.0 .
7fe0   4c c4 00 10 05 00 29 59  00 30 20 90 50 c4 00 10   L.....)Y.0 .P...
7ff0   05 00 29 59 00 30 20 90  54 c4 00 10 05 00 29 59   ..)Y.0 .T.....)Y
8000   00 30 20 90 58 c4 00 10  05 00 29 59 00 30 20 90   .0 .X.....)Y.0 .
8010   5c c4 00 10 05 00 29 59  00 30 20 90 60 c4 00 10   \.....)Y.0 .`...
8020   05 00 21 59 07 16 80 5c  06 16 88 5c 04 16 90 5c   ..!Y...\...\...\
8030   c0 b7 ff 09 00 30 38 8c  e0 88 00 00 00 30 30 90   .....08......00.
8040   94 c4 00 10 00 30 28 90  68 c4 00 10 00 30 20 90   .....0(.h....0 .
8050   6c c4 00 10 05 00 29 59  00 30 20 90 9c a2 00 10   l.....)Y.0 .....
8060   05 00 29 59 00 30 20 90  74 c4 00 10 05 00 29 59   ..)Y.0 .t.....)Y
8070   00 30 20 90 78 c4 00 10  05 00 29 59 00 30 20 90   .0 .x.....)Y.0 .
```

Mar 27 18:20 1996  image.txt Page 46

```
8080    7c c4 00 10 05 00 29 59  00 30 20 90 80 c4 00 10   |......)Y.0 .....
8090    05 00 29 59 00 30 20 90  84 c4 00 10 05 00 29 59   ..)Y.0 .......)Y
80a0    00 30 20 90 88 c4 00 10  05 00 21 59 07 16 80 5c   .0 .......!Y...\
80b0    06 16 88 5c 04 16 90 5c  38 b7 ff 09 84 17 ff 06   ...\...\8.......
80c0    10 16 88 5c 00 30 88 8c  f0 86 00 00 74 7c 02 09   ...\.0......t|..
80d0    10 16 30 5c 0d 00 2c 59  00 30 20 8c b0 87 00 00   ..0\..,Y.0 .....
80e0    05 16 80 5c 04 16 88 5c  58 7c 02 09 86 00 7c 59   ...\...\X|....|Y
80f0    0d c0 73 59 00 30 18 8c  10 8a 00 00 10 00 38 8c   ..sY.0........8.
8100    00 30 30 90 f4 c3 00 10  00 30 28 90 1c c4 00 10   .00......0(.....
8110    00 30 20 90 44 c4 00 10  0e 16 80 5c 03 16 88 5c   .0 .D......\...\
8120    07 16 90 5c 06 16 98 5c  05 16 a0 5c 04 16 a8 5c   ...\...\...\...\
8130    10 7c 02 09 8f 00 1c 59  0d c0 78 59 00 30 e8 8c   .|.....Y..xY.0..
8140    10 8a 00 00 18 00 38 8c  00 30 30 90 f0 c3 00 10   ......8..00.....
8150    00 30 28 90 18 c4 00 10  00 30 20 90 40 c4 00 10   .0(......0 .@...
8160    0f 16 80 5c 1a 16 88 5c  07 16 90 5c 06 16 98 5c   ...\...\...\...\
8170    05 16 a0 5c 04 16 a8 5c  c8 7b 02 09 83 00 7c 59   ...\...\.{....|Y
8180    0d c0 1b 59 00 30 70 8c  10 8a 00 00 24 00 38 8c   ...Y.0p.....$.8.
8190    00 30 30 90 90 a2 00 10  00 30 28 90 94 a2 00 10   .00......0(.....
81a0    00 30 20 90 98 a2 00 10  03 16 80 5c 0e 16 88 5c   .0 ........\...\
81b0    07 16 90 5c 06 16 98 5c  05 16 a0 5c 04 16 a8 5c   ...\...\...\...\
81c0    80 7b 02 09 8f 00 74 59  0d 80 eb 59 00 30 78 8c   .{....tY...Y.0x.
81d0    10 8a 00 00 08 00 38 8c  00 30 30 90 fc c3 00 10   ......8..00.....
81e0    00 30 28 90 24 c4 00 10  00 30 20 90 4c c4 00 10   .0(.$....0 .L...
81f0    1d 16 80 5c 0f 16 88 5c  07 16 90 5c 06 16 98 5c   ...\...\...\...\
8200    05 16 a0 5c 04 16 a8 5c  38 7b 02 09 8e 00 74 59   ...\...\8{....tY
8210    0d 80 1b 59 20 00 38 8c  00 30 30 90 00 c4 00 10   ...Y .8..00.....
8220    00 30 28 90 28 c4 00 10  00 30 20 90 50 c4 00 10   .0(.(....0 .P...
8230    03 16 80 5c 0f 16 88 5c  07 16 90 5c 06 16 98 5c   ...\...\...\...\
8240    05 16 a0 5c 04 16 a8 5c  f8 7a 02 09 8e 00 7c 59   ...\...\.z....|Y
8250    0d c0 eb 59 00 30 18 8c  10 8a 00 00 80 00 38 8c   ...Y.0........8.
8260    00 30 30 90 04 c4 00 10  00 30 28 90 2c c4 00 10   .00......0(.,...
8270    00 30 20 90 54 c4 00 10  1d 16 80 5c 03 16 88 5c   .0 .T......\...\
8280    07 16 90 5c 06 16 98 5c  05 16 a0 5c 04 16 a8 5c   ...\...\...\...\
8290    b0 7a 02 09 8f 00 1c 59  0d c0 70 59 00 30 e8 8c   .z.....Y..pY.0..
82a0    10 8a 00 00 8a 02 38 8c  00 30 30 90 08 c4 00 10   ......8..00.....
82b0    00 30 28 90 30 c4 00 10  00 30 20 90 58 c4 00 10   .0(.0....0 .X...
82c0    0e 16 80 5c 1d 16 88 5c  07 16 90 5c 06 16 98 5c   ...\...\...\...\
82d0    05 16 a0 5c 04 16 a8 5c  68 7a 02 09 83 00 1c 59   ...\...\hz.....Y
82e0    0d c0 78 59 00 30 70 8c  10 8a 00 00 40 06 38 8c   ..xY.0p.....@.8.
82f0    00 30 30 90 0c c4 00 10  00 30 28 90 34 c4 00 10   .00......0(.4...
```

Mar 27 16:20 1996 image.txt Page 47

```
8300   00 30 20 90 5c c4 00 10  0f 16 80 5c 0e 16 88 5c   .0 .\......\...\
8310   07 16 90 5c 06 16 98 5c  03 16 a0 5c 04 16 a8 5c   ...\...\...\...\
8320   20 7a 02 09 83 00 74 59  0d 80 10 59 00 30 78 8c    z....tY...Y.0x.
8330   10 8a 00 00 e2 04 38 8c  00 30 30 90 10 c4 00 10   ......8..00.....
8340   00 30 28 90 38 c4 00 10  00 30 20 90 60 c4 00 10   .0(.8....0 .`...
8350   03 16 80 5c 0f 16 88 5c  07 16 90 5c 06 16 98 5c   ...\...\...\...\
8360   05 16 a0 5c 04 16 a8 5c  d8 79 02 09 8e 00 24 59   ...\...\.y....$Y
8370   0d 00 79 59 00 30 e8 8c  30 87 00 00 00 30 28 90   ..yY.0..0....0(.
8380   f0 c3 00 10 00 30 20 90  f4 c3 00 10 05 00 29 59   .....0 .......)Y
8390   00 30 20 90 90 a2 00 10  05 00 29 59 00 30 20 90   .0 .......)Y.0 .
83a0   fc c3 00 10 05 00 29 59  00 30 20 90 00 c4 00 10   ......)Y.0 .....
83b0   05 00 29 59 00 30 20 90  04 c4 00 10 05 00 29 59   ..)Y.0 .......)Y
83c0   00 30 20 90 08 c4 00 10  05 00 29 59 00 30 20 90   .0 .......)Y.0 .
83d0   0c c4 00 10 05 00 29 59  00 30 20 90 10 c4 00 10   ......)Y.0 .....
83e0   05 00 39 59 00 30 28 90  18 c4 00 10 00 30 20 90   ..9Y.0(......0 .
83f0   1c c4 00 10 05 00 29 59  00 30 20 90 94 a2 00 10   ......)Y.0 .....
8400   05 00 29 59 00 30 20 90  24 c4 00 10 05 00 29 59   ..)Y.0 .$.....)Y
8410   00 30 20 90 28 c4 00 10  05 00 29 59 00 30 20 90   .0 .(.....)Y.0 .
8420   2c c4 00 10 05 00 29 59  00 30 20 90 30 c4 00 10   ,.....)Y.0 .0...
8430   05 00 29 59 00 30 20 90  34 c4 00 10 05 00 29 59   ..)Y.0 .4.....)Y
8440   00 30 20 90 38 c4 00 10  05 00 31 59 00 30 28 90   .0 .8.....1Y.0(.
8450   40 c4 00 10 00 30 20 90  44 c4 00 10 05 00 29 59   @....0 .D.....)Y
8460   00 30 20 90 98 a2 00 10  05 00 29 59 00 30 20 90   .0 .......)Y.0 .
8470   4c c4 00 10 05 00 29 59  00 30 20 90 50 c4 00 10   L.....)Y.0 .P...
8480   05 00 29 59 00 30 20 90  54 c4 00 10 05 00 29 59   ..)Y.0 .T.....)Y
8490   00 30 20 90 58 c4 00 10  05 00 29 59 00 30 20 90   .0 .X.....)Y.0 .
84a0   5c c4 00 10 05 00 29 59  00 30 20 90 60 c4 00 10   \.....)Y.0 .`...
84b0   05 00 21 59 0f 16 80 5c  1d 16 88 5c 07 16 90 5c   ..!Y...\...\...\
84c0   06 16 98 5c 04 16 a0 5c  78 78 02 08 00 00 00 00   ...\...\xx......
84d0   10 16 70 5c 00 30 28 8c  40 88 00 00 00 30 20 90   ..p\.0(.@....0 .
84e0   a0 a2 00 10 05 16 88 5c  04 16 90 5c 54 78 02 09   .......\...\Tx..
84f0   10 16 78 5c 0e 00 1c 59  00 30 e8 8c 00 8b 00 00   ..x\...Y.0......
8500   00 30 38 90 a8 a2 00 10  00 30 30 90 ac a2 00 10   .08......00.....
8510   00 30 28 90 b0 a2 00 10  00 30 20 90 b4 a2 00 10   .0(......0 .....
8520   03 16 80 5c 1d 16 88 5c  07 16 90 5c 06 16 98 5c   ...\...\...\...\
8530   05 16 a0 5c 04 16 a8 5c  08 78 02 09 8f 00 3c 59   ...\...\.x....<Y
8540   0e c0 31 59 00 30 28 8c  30 89 00 00 00 30 20 90   ..1Y.0(.0....0 .
8550   a4 a2 00 10 06 16 80 5c  05 16 88 5c 04 16 90 5c   .......\...\...\
8560   e0 77 02 09 87 00 3c 59  0e c0 31 59 00 30 28 8c   .w....<Y..1Y.0(.
8570   10 89 00 00 00 30 20 90  b8 a2 00 10 06 16 80 5c   .....0 ........\
```

```
Mar 27 18:20 1995  image.txt Page 48

8580    05 16 88 5c 04 16 90 5c  b8 77 02 09 87 00 1c 59   ...\...\.w.....Y
8590    0e c0 78 59 00 30 38 8c  90 89 00 00 00 30 30 90   ..xY.08......00.
85a0    90 c4 00 10 00 30 28 90  40 c4 00 10 00 30 20 90   .....0(.@....0 .
85b0    44 c4 00 10 05 00 29 59  00 30 20 90 98 a2 00 10   D.....)Y.0 .....
85c0    05 00 29 59 00 30 20 90  4c c4 00 10 05 00 29 59   ..)Y.0 .L.....)Y
85d0    00 30 20 90 50 c4 00 10  05 00 29 59 00 30 20 90   .0 .P.....)Y.0 .
85e0    54 c4 00 10 05 00 29 59  00 30 20 90 58 c4 00 10   T.....)Y.0 .X...
85f0    05 00 29 59 00 30 20 90  5c c4 00 10 05 00 29 59   ..)Y.0 .\.....)Y
8600    00 30 20 90 60 c4 00 10  05 00 21 59 01 16 80 5c   .0 .`.....!Y...\
8610    07 16 88 5c 06 16 90 5c  04 16 98 5c 24 77 02 09   ...\...\...\$w..
8620    85 00 24 59 0e 00 71 59  00 30 38 8c c0 89 00 00   ..$Y..qY.08.....
8630    00 30 30 90 94 c4 00 10  00 30 28 90 68 c4 00 10   .00......0(.h...
8640    00 30 20 90 6c c4 00 10  05 00 29 59 00 30 20 90   .0 .l.....)Y.0 .
8650    9c a2 00 10 05 00 29 59  00 30 20 90 74 c4 00 10   ......)Y.0 .t...
8660    05 00 29 59 00 30 20 90  78 c4 00 10 05 00 29 59   ..)Y.0 .x.....)Y
8670    00 30 20 90 7c c4 00 10  05 00 29 59 00 30 20 90   .0 .|.....)Y.0 .
8680    80 c4 00 10 05 00 29 59  00 30 20 90 84 c4 00 10   ......)Y.0 .....
8690    05 00 29 59 00 30 20 90  88 c4 00 10 05 00 21 59   ..)Y.0 .......!Y
86a0    0e 16 80 5c 07 16 88 5c  06 16 90 5c 04 16 98 5c   ...\...\...\...\
86b0    90 76 02 08 00 00 00 00  00 00 00 00 00 00 00 00   .v..............
86c0    47 62 6c 6f 63 6b 20 20  46 61 69 6c 75 72 65 73   Gblock  Failures
86d0    3a 20 4e 6f 6e 76 61 6c  69 64 20 28 25 75 29 20   : Nonvalid (%u)
86e0    6e 6f 66 72 65 65 20 28  25 75 29 20 0a 00 00 00   nofree (%u) ....
86f0    0a 0d 4d 45 4d 4f 52 59  20 43 4f 4e 53 55 4d 50   ..MEMORY CONSUMP
8700    54 49 4f 4e 0a 0d 0a 0d  00 00 00 00 00 00 00 00   TION............
8710    41 6c 6c 6f 63 62 20 20  46 61 69 6c 75 72 65 73   Allocb  Failures
8720    3a 20 54 6f 6f 20 62 69  67 20 28 25 75 29 0a 00   : Too big (%u)..
8730    0a 0d 20 20 54 4f 54 41  4c 3a 20 20 20 20 20 20   ..  TOTAL:
8740    49 6e 20 55 73 65 3a 25  35 75 20 20 20 4d 61 78   In Use:%5u   Max
8750    3a 25 35 75 20 20 20 46  61 69 6c 3a 25 35 75 0a   :%5u   Fail:%5u.
8760    0d 00 00 00 00 00 00 00  00 00 00 00 00 00 00 00   ................
8770    63 6f 75 6e 74 20 74 6f  74 61 6c 5f 6d 62 6c 6b   count total_mblk
8780    20 20 71 75 65 75 65 20  20 20 69 6e 64 65 78 20     queue   index
8790    20 20 20 6e 61 6d 65 20  20 20 20 6e 65 78 74 2d      name    next-
87a0    71 75 65 75 65 0a 00 00  00 00 00 00 00 00 00 00   queue...........
87b0    42 75 66 66 65 72 73 3a  0a 0d 00 00 00 00 00 00   Buffers:........
87c0    68 65 61 64 2d 2d 3e 25  30 33 75 20 20 20 20 20   head-->%03u
87d0    25 30 33 75 20 20 20 20  20 20 25 30 33 78 20 20   %03u      %03x
87e0    20 20 20 20 25 30 33 75  20 20 20 20 25 73 0a 00       %03u    %s..
87f0    72 71 00 00 00 00 00 00  00 00 00 00 00 00 00 00   rq..............
```

```
Mar 27 18:20 1996  image.txt Page 43

8800    46 72 65 65 62 20 20 20  46 61 69 6c 75 72 65 73   Freeb   Failures
8810    3a 20 4e 75 6c 6c 20 62  70 20 28 25 75 29 20 20   : Null bp (%u)  
8820    4e 75 6c 6c 20 64 70 20  28 25 75 29 20 20 61 76   Null dp (%u)  av
8830    66 28 25 75 29 20 20 75  64 66 28 25 75 29 0a 00   f(%u)  udf(%u)..
8840    0a 0a 20 20 52 65 6c 65  61 73 65 20 3a 20 42 75   ..  Release : Bu
8850    66 66 65 72 73 28 25 75  29 0d 0a 00 00 00 00 00   ffers(%u).......
8860    44 75 70 62 20 20 20 20  46 61 69 6c 75 72 65 73   Dupb    Failures
8870    3a 20 4e 75 6c 6c 20 62  70 20 28 25 75 29 0a 00   : Null bp (%u)..
8880    2d 2d 2d 2d 2d 2d 2d 2d  2d 2d 2d 2d 2d 2d 2d 2d   ----------------
*
88a0    2d 2d 2d 2d 2d 2d 2d 2d  2d 2d 2d 2d 2d 0a 00 00   -------------...
88b0    00 00 00 00 77 71 00 00  00 00 00 00 00 00 00 00   ....wq..........
88c0    52 65 6c 65 61 73 65 20  46 61 69 6c 75 72 65 73   Release Failures
88d0    3a 20 42 75 66 66 65 72  73 20 28 25 75 29 0a 00   : Buffers (%u)..
88e0    52 62 6c 6f 63 6b 20 20  46 61 69 6c 75 72 65 73   Rblock  Failures
88f0    3a 20 4e 6f 6e 76 61 6c  69 64 20 28 25 75 29 20   : Nonvalid (%u) 
8900    6e 6f 74 61 6c 6c 6f 63  20 28 25 75 29 20 0a 00   notalloc (%u) ..
8910    20 20 41 6c 6c 6f 63 20  20 20 3a 20 54 6f 6f 20     Alloc   : Too 
8920    62 69 67 28 25 75 29 0d  0a 00 00 00 00 00 00 00   big(%u).........
8930    20 20 44 75 70 20 20 20  20 20 3a 20 4e 75 6c 6c     Dup     : Null
8940    20 62 61 73 65 28 25 75  29 0d 0a 00 00 00 00 00    base(%u).......
8950    20 42 75 66 66 65 72 20  61 6c 6c 6f 63 61 74 69    Buffer allocati
8960    6f 6e 20 73 74 61 74 75  73 20 0a 00 00 00 00 00   on status ......
8970    20 4f 76 65 72 20 41 6c  6c 20 6d 62 6c 6b 20 69    Over All mblk i
8980    6e 20 71 75 65 75 65 73  20 25 75 0a 00 00 00 00   n queues %u.....
8990    20 20 47 62 6c 6f 63 6b  20 20 3a 20 4e 6f 6e 76     Gblock  : Nonv
89a0    61 6c 69 64 28 25 75 29  20 20 20 6e 6f 66 72 65   alid(%u)   nofre
89b0    65 28 25 75 29 0d 0a 00  00 00 00 00 00 00 00 00   e(%u)...........
89c0    20 20 52 62 6c 6f 63 6b  20 20 3a 20 4e 6f 6e 76     Rblock  : Nonv
89d0    61 6c 69 64 28 25 75 29  20 20 20 6e 6f 74 61 6c   alid(%u)   notal
89e0    6c 6f 63 20 28 25 75 29  0d 0a 00 00 00 00 00 00   loc (%u)........
89f0    45 78 70 65 72 74 20 69  6e 66 6f 72 6d 61 74 69   Expert informati
8a00    6f 6e 3a 0a 00 00 00 00  00 00 00 00 00 00 00 00   on:.............
8a10    20 20 53 69 7a 65 3a 20  25 34 75 20 20 49 6e 20     Size: %4u  In 
8a20    55 73 65 3a 25 35 75 20  20 20 4d 61 78 3a 25 35   Use:%5u   Max:%5
8a30    75 20 20 20 46 61 69 6c  3a 25 35 75 0a 0d 00 00   u   Fail:%5u....
8a40    20 54 6f 74 61 6c 20 20  20 20 20 20 20 20 20 20    Total          
8a50    20 20 20 25 34 75 20 20  20 20 20 20 20 20 25 34      %4u        %4
8a60    75 20 20 20 20 20 25 34  75 20 20 20 20 20 25 34   u     %4u     %4
8a70    75 0a 0a 00 00 00 00 00  00 00 00 00 00 00 00 00   u...............
```

Mar 27 18:20 1996 image.txt Page 50

```
8a80   20 25 31 75 20 20 20 20  20 20 25 34 75 20 20 20    %1u     %4u
8a90   20 20 20 20 20 25 34 75  20 20 20 20 20 20 20 25         %4u       %
8aa0   34 75 20 20 20 20 20 25  34 75 20 20 20 20 20 25   4u      %4u      %
8ab0   34 75 0a 00 00 00 00 00  00 00 00 00 00 00 00 00   4u..............
8ac0   20 4e 6f 20 20 20 20 20  53 49 5a 45 20 20 20 20    No     SIZE
8ad0   20 41 6c 6c 6f 63 61 74  65 64 20 20 20 20 75 73    Allocated    us
8ae0   65 64 20 20 20 20 20 20  4d 61 78 20 20 20 46 61   ed      Max   Fa
8af0   69 6c 65 64 0a 00 00 00  00 00 00 00 00 00 00 00   iled............
8b00   20 20 46 72 65 65 20 20  20 20 3a 20 4e 75 6c 6c     Free    : Null
8b10   20 62 61 73 65 28 25 75  29 20 20 4e 75 6c 6c 20    base(%u)  Null
8b20   64 61 74 61 28 25 75 29  20 20 6f 76 66 28 25 75   data(%u)  ovf(%u
8b30   29 20 20 75 64 66 28 25  75 29 0a 0a 00 00 00 00   )  udf(%u)......
8b40   25 73 20 2d 2d 3e 25 30  36 75 20 20 25 30 33 75   %s -->%06u  %03u
8b50   20 20 20 25 30 33 78 20  20 20 25 30 33 75 20 20      %03x   %03u
8b60   20 20 25 73 20 20 20 25  78 28 25 73 29 0a 00 00     %s   %x(%s)...
8b70   60 60 08 8c 40 e0 c7 b2  38 10 00 09 00 30 20 8c   ``..@...8....0 .
8b80   fc c8 05 10 00 30 20 92  00 c9 05 10 b4 00 70 8c   .....0 .......p.
8b90   dc 05 78 8c 0f 16 e8 5c  32 00 18 6c 08 00 b8 8c   ..x....\2.......
8ba0   40 01 b0 8c 20 00 58 8c  ac 00 50 8c 80 00 48 8c   @... .X...P...H.
8bb0   2c 01 38 8c 8a 02 30 8c  0a 00 28 8c 40 06 20 8c   ,.8...0...(.@. .
8bc0   0e 16 80 5c 0f 16 88 5c  1d 16 90 5c 03 16 98 5c   ...\...\...\...\
8bd0   17 16 a0 5c 16 16 a8 5c  0b 16 b0 5c 0a 16 b8 5c   ...\...\...\...\
8be0   09 16 c0 5c 07 16 c8 5c  06 16 d0 5c 05 16 d8 5c   ...\...\...\...\
8bf0   90 e0 27 92 60 e0 f7 8c  28 c7 ff 09 00 00 f0 8c   ..'.`...(.......
8c00   f0 9e ff 09 5c 03 00 09  d8 ac ff 09 00 30 80 8c   ....\........0..
8c10   60 ec 05 10 bc 0c 00 09  00 30 20 80 60 ec 05 10   `........0 .`...
8c20   2c 20 01 3a 00 00 68 8c  00 00 20 8c 00 74 23 82   , .:..h... ..t#.
8c30   60 ec 05 10 01 60 23 8c  04 16 68 5c ec 3f 31 39   `....`#...h\.?19
8c40   00 30 80 8c 60 ec 05 10  08 0d 00 09 00 30 38 8c   .0..`........08.
8c50   e0 8e 00 00 00 30 30 8c  40 0f 06 10 50 e0 2f 8c   .....00.@...P./.
8c60   00 30 20 8c ff ff ff ff  07 16 80 5c 06 16 88 5c   .0 ........\...\
8c70   05 16 90 5c 04 16 98 5c  e8 89 ff 09 18 20 04 3e   ...\...\..... .>
8c80   00 30 80 8c 00 8f 00 00  18 a9 ff 09 01 00 80 8c   .0..............
8c90   50 ab ff 09 00 30 38 8c  f4 8e 00 00 00 30 30 8c   P....08......00.
8ca0   50 0e 06 10 50 e0 2f 8c  00 30 20 8c ff ff ff ff   P...P./..0 .....
8cb0   07 16 80 5c 06 16 88 5c  05 16 90 5c 04 16 98 5c   ...\...\...\...\
8cc0   a0 89 ff 09 18 20 04 3e  00 30 80 8c 00 8f 00 00   ..... .>.0......
8cd0   d0 a8 ff 09 01 00 80 8c  08 ab ff 09 00 30 38 8c   ..............08.
8ce0   f0 8e 00 00 00 30 30 8c  f0 22 06 10 50 e0 2f 8c   .....00.."..P./.
8cf0   00 30 20 8c ff ff ff ff  07 16 80 5c 06 16 88 5c   .0 ........\...\
```

```
Mar 27 18:20 1996  image.txt Page 3.

8d00    03 16 90 5c 04 16 98 5c  58 89 ff 09 18 20 04 3e    ...\...\X.... .>
8d10    00 30 80 8c 00 8f 00 00  a8 a8 ff 09 01 00 80 8c    .0..............
8d20    c0 aa ff 09 00 00 60 8c  00 30 38 8c e0 8e 00 00    ...... ..08.....
8d30    00 30 30 8c 40 0f 06 10  50 e0 2f 8c 01 20 23 8c    .00.@...P./.. #.
8d40    07 16 80 5c 06 16 88 5c  05 16 90 5c 04 16 98 5c    ...\...\...\...\
8d50    10 89 ff 09 18 20 04 3e  00 30 80 8c 00 8f 00 00    ..... .>.0......
8d60    40 a8 ff 09 01 00 80 8c  78 aa ff 09 01 20 23 8c    @.......x.... #.
8d70    04 16 60 5c b4 3f 21 39  00 00 60 8c 00 30 38 8c    ..`\.?!9..`..08.
8d80    f4 8e 00 00 00 30 30 8c  50 0e 06 10 50 e0 2f 8c    .....00.P...P./.
8d90    01 20 23 8c 07 16 80 5c  06 16 88 5c 05 16 90 5c    . #....\...\...\
8da0    04 16 98 5c bc 88 ff 09  18 20 04 3e 00 30 80 8c    ...\..... .>.0..
8db0    00 8f 00 00 ec a7 ff 09  01 00 80 8c 24 aa ff 09    ............S...
8dc0    00 30 38 8c f0 8e 00 00  00 30 30 8c f0 22 06 10    .08......00.."..
8dd0    50 e0 2f 8c 01 20 23 8c  07 16 80 5c 06 16 88 5c    P./.. #....\...\
8de0    05 16 90 5c 04 16 98 5c  78 88 ff 09 18 20 04 3e    ...\...\x.... .>
8df0    00 30 80 8c 00 8f 00 00  a8 a7 ff 09 01 00 80 8c    .0..............
8e00    e0 a9 ff 09 01 20 23 8c  04 16 60 5c 70 3f 09 39    ..... #...`\p?.9
8e10    00 30 38 8c d8 8e 00 00  00 30 30 8c f0 13 06 10    .08......00.....
8e20    50 e0 2f 8c 00 30 20 8c  ff ff ff ff 07 16 80 5c    P./..0 ........\
8e30    06 16 88 5c 05 16 90 5c  04 16 98 5c 24 88 ff 09    ...\...\...\s...
8e40    18 20 04 3e 00 30 80 8c  00 8f 00 00 54 a7 ff 09    . .>.0......T...
8e50    01 00 80 8c 8c a9 ff 09  00 30 38 8c e8 8e 00 00    .........08.....
8e60    00 30 30 8c 70 23 06 10  50 e0 2f 8c 00 30 20 8c    .00.p#..P./..0 .
8e70    ff ff ff ff 07 16 80 5c  06 16 88 5c 05 16 90 5c    .......\...\...\
8e80    04 16 98 5c dc 87 ff 09  18 20 04 3e 00 30 80 8c    ...\..... .>.0..
8e90    00 8f 00 00 0c a7 ff 09  01 00 80 8c 44 a9 ff 09    ............D...
8ea0    60 55 00 09 7c a8 00 09  48 0e 00 09 04 05 01 09    `U..|...H.......
8eb0    a0 1e 01 09 40 e0 c7 b0  00 00 00 0a 00 00 00 00    ....@...........
8ec0    00 00 28 8c 05 16 20 5c  05 16 80 5c 04 16 88 5c    ..(... \...\...\
8ed0    d0 2a 00 08 00 00 00 00  66 6d 6e 67 00 00 00 00    .*......fmng....
8ee0    6d 66 78 00 00 00 00 00  63 6f 6e 66 00 00 00 00    mfx.....conf....
8ef0    65 70 69 00 65 74 30 00  00 00 00 00 00 00 00 00    epi.et0.........
8f00    73 74 72 65 61 6d 20 63  72 65 61 74 69 6f 6e 20    stream creation 
8f10    65 72 72 6f 72 00 00 00  00 00 00 00 00 00 00 00    error...........
8f20    e0 00 00 09 10 16 20 5c  48 aa ff 09 04 16 80 5c    ...... \H......\
8f30    10 01 00 09 00 00 20 8c  00 30 20 82 04 00 00 40    ...... ..0 ....@
8f40    00 30 20 82 06 00 00 40  00 30 20 82 08 00 00 40    .0 ....@.0 ....@
8f50    00 00 00 0a 00 00 00 00  00 00 00 00 00 00 00 00    ................
8f60    20 60 08 8c 80 00 20 8c  53 e0 27 82 40 e0 27 8c     `.... .S.'.@.'.
8f70    54 e0 27 92 50 e0 87 8c  48 04 00 09 44 e0 27 90    T.'.P...H...D.'.
```

Mar 27 16:20 1996 image.txt Page 52

```
8f80    14 20 29 90 00 30 20 8c  90 f3 00 00 c4 63 21 92   . )..0 ......c!.
8f90    00 30 20 8c c0 91 00 00  e4 61 21 92 00 30 20 8c   .0 ......a!..0 .
8fa0    80 87 00 00 24 80 21 92  00 30 20 8c 70 92 00 00    ...$'!..0 .p...
8fb0    f4 50 21 92 00 30 20 8c  f0 92 00 00 44 61 21 92   .'!..0 .....Da!.
8fc0    00 30 80 8c 78 08 f0 fe  18 04 00 09 00 00 80 8c   .0..x...........
8fd0    d0 03 00 09 00 00 20 8c  00 30 20 82 04 00 00 40   ...... ..0 ....@
8fe0    00 30 20 82 06 00 00 40  00 30 20 82 08 00 00 40   .0 ....@.0 ....@
8ff0    00 00 00 0a 00 00 00 00  00 00 00 00 00 00 00 00   ................
9000    ff 00 80 8c 9c 03 00 09  00 30 20 8c 00 00 1f 00   .........0 .....
9010    90 00 21 58 90 0d 81 59  00 00 00 0a 00 00 00 00   ..!X...Y........
9020    0b 00 80 8c 7c 03 00 09  00 30 20 8c 00 00 1f 00   .........0 .....
9030    90 00 21 58 90 0d 81 59  00 00 00 0a 00 00 00 00   ..!X...Y........
9040    60 03 00 08 00 00 00 00  00 00 00 00 00 00 00 00   `...............
9050    0a 00 80 8c 4c 03 00 09  00 30 20 8c 00 00 1f 00   ....L....0 .....
9060    90 00 21 58 90 0d 81 59  00 00 00 0a 00 00 00 00   ..!X...Y........
9070    00 00 18 8c 01 00 20 8c  00 30 20 82 04 00 00 40   ...... ..0 ....@
9080    00 30 20 82 06 00 00 40  00 30 20 82 08 00 00 40   .0 ....@.0 ....@
9090    00 30 80 8c 30 75 00 00  98 03 00 09 00 00 20 8c   .0..0u........ .
90a0    00 30 20 82 04 00 00 40  00 30 20 82 06 00 00 40   .0 ....@.0 ....@
90b0    00 30 20 82 08 00 00 40  00 30 80 8c 30 75 00 00   .0 ....@.0..0u..
90c0    70 03 00 09 01 e0 20 8c  04 16 18 5c a8 3f 51 39   p..... ....\.?Q9
90d0    00 00 20 8c 00 30 20 82  02 00 00 40 00 00 00 0a   .. ..0 ....@....
90e0    10 60 08 8c 40 00 20 8c  43 e0 27 82 42 e0 87 82   .`..@. .C.'.B...
90f0    40 e0 87 8c cc 02 00 09  00 00 00 0a 00 00 00 00   @...............
9100    20 ff ff 09 76 00 20 8c  00 30 20 8a 06 00 00 18    ...v. ..0 .....
9110    00 30 20 90 10 c9 05 10  03 0e 21 59 00 30 20 8a   .0 .......!Y.0 .
9120    02 00 00 18 00 00 20 8c  00 30 20 8a 02 00 00 18   ...... ..0 .....
9130    00 30 20 92 14 c9 05 10  01 00 20 8c 00 30 20 82   .0 ....... ..0 .
9140    00 00 00 40 fc fe ff 08  00 00 00 00 00 00 00 00   ...@............
9150    d0 fe ff 09 00 00 20 8c  00 30 20 82 00 00 00 40   ...... ..0 ....@
9160    76 00 20 8c 00 30 20 8a  06 00 00 18 00 00 20 8c   v. ..0 ....... .
9170    00 30 20 8a 02 00 00 18  00 30 20 8a 02 00 00 18   .0 ......0 .....
9180    c0 fe ff 08 00 00 00 00  00 00 00 00 00 00 00 00   ................
9190    00 30 20 8c 00 e1 00 00  14 00 81 3e 04 00 20 8c   .0 ........>.. .
91a0    00 30 20 92 10 c9 05 10  10 00 00 08 08 00 20 8c   .0 ........... .
91b0    00 30 20 92 10 c9 05 10  48 ff ff 08 00 00 00 00   .0 .....H.......
91c0    40 60 08 8c 40 e0 87 b2  50 e0 a7 b2 70 e0 e7 a2   @`..@...P...p...
91d0    00 1e f0 5c 00 30 20 90  14 c9 05 10 01 20 21 8c   ...\.0 ...... !.
91e0    00 30 20 92 14 c9 05 10  68 62 00 09 00 30 20 90   .0 .....hb...0 .
91f0    c0 0d 06 10 01 20 31 8c  00 30 30 92 c0 0d 06 10   ..... 1..00.....
```

Mar 27 18:20 1996 image.txt Page 53

```
9200   28 00 28 8c 00 30 20 90  10 c9 05 10 84 45 21 74   ..(..0 ......E!t
9210   18 00 31 3c 50 00 80 8c  c8 fe ff 09 00 00 20 8c   ..1<P.........  .
9220   00 30 20 92 c0 0a 06 10  00 30 20 90 84 0e 06 10   .0 ......0 .d...
9230   0c 20 01 3a 3c 00 80 8c  a8 fe ff 09 00 00 20 8c   .  .:<.........  .
9240   00 30 20 82 00 00 00 40  01 00 20 8c 00 30 20 82   .0 ....@.. ..0 .
9250   00 00 00 40 40 e0 87 b0  50 e0 a7 b0 70 e0 e7 a0   ...@@...P...p...
9260   00 00 00 0a 00 00 00 00  00 00 00 00 00 00 00 00   ................
9270   40 60 08 8c 40 e0 87 b2  50 e0 a7 b2 70 e0 e7 a2   @`..@...P...p...
9280   00 1e f0 5c 9c fd ff 09  10 16 18 5c 00 30 20 90   ...\.......\.0 .
9290   c4 0d 06 10 1c 20 01 3a  03 16 80 5c a4 fd ff 09   ..... .:...\....
92a0   40 e0 87 b0 50 e0 a7 b0  70 e0 e7 a0 00 00 00 0a   @...P...p.......
92b0   01 00 20 8c 00 30 20 92  c4 0d 06 10 03 16 80 5c   .. ..0 ........\
92c0   80 fd ff 09 00 30 20 90  84 0e 06 10 08 20 01 3a   .....0 .d.... .:
92d0   40 18 00 09 00 00 20 8c  00 30 20 92 c4 0d 06 10   @..... ..0 .....
92e0   40 e0 87 b0 50 e0 a7 b0  70 e0 e7 a0 00 00 00 0a   @...P...p.......
92f0   40 60 08 8c 40 e0 87 b2  50 e0 a7 b2 70 e0 e7 a2   @`..@...P...p...
9300   00 1e f0 5c 1c fd ff 09  10 16 18 5c 00 30 20 90   ...\.......\.0 .
9310   c8 0d 06 10 1c 20 01 3a  03 16 80 5c 24 fd ff 09   ..... .:...\$...
9320   40 e0 87 b0 50 e0 a7 b0  70 e0 e7 a0 00 00 00 0a   @...P...p.......
9330   01 00 20 8c 00 30 20 92  c8 0d 06 10 03 16 80 5c   .. ..0 ........\
9340   00 fd ff 09 7c ab ff 09  d8 61 00 09 00 00 20 8c   ....|....a....  .
9350   00 30 20 92 c8 0d 06 10  40 e0 87 b0 50 e0 a7 b0   .0 .....@...P...
9360   70 e0 e7 a0 00 00 00 0a  00 00 00 00 00 00 00 00   p...............
9370   36 00 20 8c 00 30 20 8a  06 00 00 18 27 00 20 8c   6. ..0 .....'. .
9380   00 30 20 8a 00 00 00 18  00 00 20 8c 00 30 20 8a   .0 ....... ..0 .
9390   00 00 00 18 00 00 00 0a  00 00 00 00 00 00 00 00   ................
93a0   00 30 28 8c 00 00 1f 00  10 0e 84 59 85 42 81 65   .0(........Y.B.e
93b0   00 00 00 0a 00 00 00 00  00 00 00 00 00 00 00 00   ................
93c0   00 30 30 8c 10 00 00 ff  06 21 04 60 00 00 00 0a   .00......!.`....
93d0   00 30 28 8c 04 00 00 ff  85 12 80 61 00 00 00 0a   .0(........a....
93e0   00 50 80 92 00 30 28 8c  04 00 00 ff 05 60 00 60   .P...0(......`.`
93f0   00 00 00 0a 00 00 00 00  00 00 00 00 00 00 00 00   ................
9400   00 30 80 8c 10 00 00 ff  00 30 88 8c 20 94 00 00   .0.......0.. ...
9410   10 61 04 60 00 00 00 0a  00 00 00 00 00 00 00 00   .a.`............
9420   00 00 00 89 00 00 00 00  00 00 00 00 00 00 00 00   ................
9430   00 1e 20 5c 04 16 18 5c  0c 00 00 08 81 08 21 59   .. \...\......!Y
9440   81 c8 18 59 94 08 7c 74  f4 df 1b 3c 00 00 00 0a   ...Y..|t...<....
9450   10 16 70 5c 11 16 78 5c  12 16 30 5c 92 1c 2c 8c   ..p\..x\..0\..,.
9460   00 30 20 8c 00 40 00 00  18 00 29 3c 00 30 80 8c   .0 ..@....)<.0..
9470   90 9a 00 00 7c a3 ff 09  00 00 80 8c 00 00 00 0a   ....|...........
```

Mar 27 18:20 1996 image.txt Page 54

```
9480    01 a0 3b 8c 00 00 18 8c  50 a0 01 3b 01 c0 20 59   ..;.....P..;.. Y
9490    00 10 21 80 00 f4 21 82  00 00 00 0d 05 cd 29 59   ..!...!.......)Y
94a0    02 e0 21 8c 05 0d 21 59  20 00 29 3a 00 f4 29 80   ..!...!Y .):..).
94b0    00 00 00 08 ff 00 20 8c  85 00 29 58 01 c0 20 59   ...... ...)X.. Y
94c0    00 10 21 80 e8 ff 29 3d  01 e0 20 8c 04 15 18 5c   ..!...)=.. ....\
94d0    02 e0 39 8c b8 9f 21 3c  86 9c 83 8c 00 00 00 0a   ..9...!<........
94e0    10 16 70 5c 11 16 78 5c  12 16 30 5c 92 1c 2c 8c   ..p\..x\..0\..,.
94f0    00 30 20 8c 00 40 00 00  18 00 29 3c 00 30 80 8c   .0 ..@....)<.0..
9500    90 9a 00 00 ec a2 ff 09  00 00 80 8c 00 00 00 0a   ................
9510    01 a0 3b 8c 00 00 18 8c  24 a0 01 3b 00 f4 29 80   ..;.....$..;..).
9520    00 00 00 08 0f c0 20 59  00 10 29 82 01 e0 20 8c   ...... Y..)... .
9530    04 16 18 5c 02 e0 39 8c  e4 9f 21 3c 86 9c 83 8c   ...\..9...!<....
9540    00 00 00 0a 00 00 00 00  00 00 00 00 00 00 00 00   ................
9550    00 74 08 8c 10 1c 00 00  10 16 78 5c 40 e0 ff 8c   .t........x\@...
9560    10 00 38 8c 03 16 30 5c  00 00 28 8c 00 30 20 8c   ..8...0\..(..0 .
9570    03 1c 00 00 06 16 80 5c  05 16 88 5c 04 16 90 5c   .......\...\...\
9580    98 7f ff 0b 03 16 28 5c  2a 00 20 8c 05 16 80 5c   ......(\*. ....\
9590    0f 16 88 5c 04 16 90 5c  10 80 ff 0b 6a e0 37 8c   ...\...\....j.7.
95a0    2a e0 2b 8c 14 00 20 8c  06 16 80 5c 05 16 88 5c   *.+... ....\...\
95b0    04 16 90 5c f4 7f ff 0b  7e e0 37 8c 3e e0 2b 8c   ...\....~.7.>.+.
95c0    2f 00 20 8c 06 16 80 5c  05 16 88 5c 04 16 90 5c   /. ....\...\...\
95d0    d8 7f ff 0b be e0 37 8c  7e e0 2b 8c 00 30 20 8c   ......7.~.+..0 .
95e0    a8 15 00 00 06 16 80 5c  05 16 88 5c 04 16 90 5c   .......\...\...\
95f0    b8 7f ff 0b 00 f4 37 8c  66 16 00 00 00 f4 2b 8c   ......7.f.....+.
9600    26 16 00 00 cd 05 20 8c  06 16 80 5c 05 16 88 5c   &..... ....\...\
9610    04 16 90 5c 94 7f ff 0b  ad e0 37 8c 6d e0 2b 8c   ...\......7.m.+.
9620    11 00 20 8c 06 16 80 5c  05 16 88 5c 04 16 90 5c   .. ....\...\...\
9630    78 7f ff 0b 00 f4 37 8c  33 1c 00 00 00 f4 2b 8c   x.....7.3.....+.
9640    f3 1b 00 00 0a 00 20 8c  06 16 80 5c 05 16 88 5c   ...... ....\...\
9650    04 16 90 5c 54 7f ff 0b  00 00 20 8c 40 e0 27 8a   ...\T..... .@.'.
9660    03 16 28 5c 00 30 20 8c  03 1c 00 00 05 16 80 5c   ..(\.0 ........\
9670    04 16 88 5c 6c 30 00 09  40 e0 87 8a 07 16 80 5c   ...\l0..@......\
9680    03 16 88 5c 04 16 90 5c  c8 fd ff 09 00 30 80 8c   ...\...\.....0..
9690    b0 9a 00 00 5c a1 ff 09  00 00 80 8c 00 00 00 0a   ....\...........
96a0    00 74 08 8c 10 1c 00 00  10 16 78 5c 00 00 18 8c   .t........x\....
96b0    10 00 30 8c 40 e0 2f 8c  00 30 20 8c 03 1c 00 00   ..0.@./..0 .....
96c0    06 16 80 5c 05 16 88 5c  04 16 90 5c 14 fe ff 09   ...\...\...\....
96d0    03 16 28 5c 0f 16 80 5c  05 16 88 5c 04 16 90 5c   ..(\...\...\...\
96e0    38 7e ff 0b 40 e0 2f 8c  2a 00 20 8c 0f 16 80 5c   8~..@./.*. ....\
96f0    05 16 88 5c 04 16 90 5c  b0 7e ff 0b 2a e0 33 8c   ...\...\.~..*.3.
```

```
9700   0a e0 2f 8c 14 00 20 8c  06 16 80 5c 05 16 88 5c   )./...  ....\...\
9710   04 16 90 5c 94 7e ff 0b  3e e0 33 8c 7e e0 2f 8c   ...\. ..>.3. ./.
9720   2f 00 20 8c 06 16 80 5c  05 16 88 5c 04 16 90 5c   /. ....\...\...\
9730   78 7e ff 0b 7e e0 33 8c  0e e0 2f 8c 00 30 20 8c   x.. .3.../..0 .
9740   a8 13 00 00 06 16 80 5c  05 16 88 5c 04 16 90 5c   .......\...\...\
9750   58 7e ff 0b 00 f4 33 8c  28 16 00 00 00 f4 2f 8c   X~....3.&...../.
9760   66 16 00 00 cd 05 20 8c  06 16 80 5c 05 16 88 5c   f.....  ....\...\
9770   04 16 90 5c 34 7e ff 0b  6d e0 33 8c ad e0 2f 8c   ...\4~..m.3.../.
9780   ff 00 20 8c 06 16 80 5c  05 16 88 5c 04 16 90 5c   .. ....\...\...\
9790   18 7e ff 0b 00 f4 33 8c  f3 1b 00 00 00 f4 2f 8c   .~....3......./.
97a0   33 1c 00 00 0a 00 20 8c  06 16 80 5c 05 16 88 5c   3.....  ....\...\
97b0   04 16 90 5c f4 7d ff 0b  40 e0 37 8a 42 e0 2f 8c   ...\.}..@.7.B./.
97c0   00 30 20 8c 01 1c 00 00  05 16 80 5c 04 16 88 5c   .0 .........\...\
97d0   10 2f 00 09 24 00 34 3a  00 30 80 8c f0 99 00 00   ./..$.4:.0......
97e0   10 a0 ff 09 00 30 80 8c  30 9a 00 00 04 a0 ff 09   .....0..0.......
97f0   01 00 18 8c 44 00 00 08  42 e0 37 8c 00 30 28 8c   ....D...B.7..0(.
9800   a8 99 00 00 0a 00 20 8c  06 16 80 5c 05 16 88 5c   ......  ....\...\
9810   04 16 90 5c b8 6d 02 0b  20 20 04 3a 00 30 80 8c   ...\.m..  .:.0..
9820   f0 99 00 00 cc 9f ff 09  00 30 80 8c b0 99 00 00   .........0......
9830   c0 9f ff 09 01 00 18 8c  78 e0 00 3a 00 00 38 8c   ........x..:..8.
9840   01 00 20 8c 00 30 20 82  04 00 00 40 00 30 20 62   .. ..0 ....@.0 .
9850   06 00 00 40 00 30 20 82  08 00 00 40 00 30 80 8c   ...@.0 ....@.0..
9860   10 27 00 00 cc fb ff 09  00 00 20 8c 00 30 20 82   .'........ ..0 .
9870   04 00 00 40 00 30 20 82  06 00 00 40 00 30 20 82   ...@.0 ....@.0 .
9880   08 00 00 40 00 30 80 8c  10 27 00 00 a4 fb ff 09   ...@.0...'......
9890   01 e0 21 8c 04 16 38 5c  a8 3f 51 39 0f 16 80 5c   ..!...8\.?Q9...\
98a0   c0 2c 00 09 0f 16 80 5c  a8 fc ff 09 10 00 00 08   .,.....\........
98b0   00 30 80 8c 70 9a 00 00  38 9f ff 09 00 00 80 8c   .0..p...8.......
98c0   00 00 00 0a 00 00 00 00  00 00 00 00 00 00 00 00   ................
98d0   10 60 08 8c 10 16 18 5c  00 00 30 8c 40 e0 2f 8c   .`.....\..0.@./.
98e0   08 00 20 8c 06 16 80 5c  05 16 88 5c 04 16 90 5c   .. ....\...\...\
98f0   f0 fb ff 09 46 e0 37 88  06 00 20 8c 05 16 80 5c   ....F.7... ....\
9900   04 16 88 5c dc 2d 00 09  24 00 34 3a 00 00 28 8c   ...\.-..$.4:..(.
9910   06 00 20 8c 03 16 80 5c  05 16 88 5c 04 16 90 5c   .. ....\...\...\
9920   f8 7b ff 0b 05 16 80 5c  00 00 00 0a 40 e0 2f 8c   .{.....\....@./.
9930   06 00 20 8c 03 16 80 5c  05 16 88 5c 04 16 90 5c   .. ....\...\...\
9940   68 7c ff 0b 01 00 80 8c  00 00 00 0a 00 00 00 00   h|..............
9950   10 60 08 8c 00 00 18 8c  40 e0 3f 8c 07 16 30 5c   .`......@.?...0\
9960   10 16 28 5c 06 00 20 8c  06 16 80 5c 05 16 88 5c   ..(\.. ....\...\
9970   04 16 90 5c 34 7c ff 0b  06 16 28 5c 05 16 80 5c   ...\4|....(\...\
```

```
Mar 27 13:20 1996  image.txt Page 56

9980   04 16 88 5c 5c 2d 00 09  46 e0 87 8a 08 00 20 8c   ...\\-..F...... .
9990   03 16 80 5c 07 16 88 5c  04 16 90 5c 04 fa ff 09   ...\...\...\....
99a0   00 00 00 0a 00 00 00 00  31 2e 31 2e 32 00 00 00   ........1.1.2...
99b0   3c 2d 2d 2d 2d 2d 2d 2d  2d 2d 2d 2d 20 20 72 65   <-----------  re
99c0   61 73 6f 6e 20 3a 20 62  61 64 20 76 65 72 73 69   ason : bad versi
99d0   6f 6e 20 20 20 2d 2d 2d  2d 2d 2d 2d 2d 2d 2d 2d   on   -----------
99e0   2d 3e 0a 0d 00 00 00 00  00 00 00 00 00 00 00 00   ->..............
99f0   3c 2d 2d 2d 2d 2d 2d 2d  2d 2d 2d 2d 20 20 6e 6f   <-----------  no
9a00   6e 20 76 6f 6c 61 74 69  6c 65 20 64 65 6d 61 67   n volatile demag
9a10   61 65 64 20 20 2d 2d 2d  2d 2d 2d 2d 2d 2d 2d 2d   aed  -----------
9a20   2d 3e 0a 0d 00 00 00 00  00 00 00 00 00 00 00 00   ->..............
9a30   3c 2d 2d 2d 2d 2d 2d 2d  2d 2d 2d 2d 20 20 72 65   <-----------  re
9a40   61 73 6f 6e 20 3a 20 62  61 64 20 63 68 65 63 6b   ason : bad check
9a50   73 75 6d 20 20 2d 2d 2d  2d 2d 2d 2d 2d 2d 2d 2d   sum  -----------
9a60   2d 3e 0a 0d 00 00 00 00  00 00 00 00 00 00 00 00   ->..............
9a70   4e 6f 6e 20 76 6f 6c 61  74 69 6c 65 20 6d 65 6d   Non volatile mem
9a80   6f 72 79 20 72 65 61 64  0a 00 00 00 00 00 00 00   ory read........
9a90   4e 56 52 41 4d 20 77 72  69 74 65 20 6f 66 66 73   NVRAM write offs
9aa0   65 74 20 74 6f 20 62 69  67 0a 00 00 00 00 00 00   et to big.......
9ab0   4e 6f 6e 20 76 6f 6c 61  74 69 6c 65 20 6d 65 6d   Non volatile mem
9ac0   6f 72 79 20 77 72 69 74  74 65 6e 0a 00 00 00 00   ory written.....
9ad0   80 3e 00 66 00 f4 1f 8c  f0 ff ff ff 08 e0 20 90   .>.f.......... .
9ae0   10 0c 29 59 ff 00 20 8c  85 00 39 58 00 30 30 8c   ..)Y.. ...9X.00.
9af0   20 9b 00 00 08 e0 28 90  85 00 29 58 0c e0 20 90    .....(...)X.. .
9b00   06 16 80 5c 07 16 88 5c  05 16 90 5c 04 16 98 5c   ...\...\...\...\
9b10   03 16 a0 5c dc 9c ff 08  00 00 00 00 00 00 00 00   ...\............
9b20   46 41 55 4c 54 20 68 61  6e 64 6c 65 72 3a 20 74   FAULT handler: t
9b30   79 70 65 20 30 78 25 78  2c 20 73 75 62 74 79 70   ype 0x%x, subtyp
9b40   65 20 30 78 25 78 2c 20  69 70 20 25 78 2c 20 72   e 0x%x, ip %x, r
9b50   65 63 6f 72 64 20 70 74  72 20 30 78 25 78 0a 00   ecord ptr 0x%x..
9b60   00 00 20 90 00 30 20 92  d4 0d 06 10 04 00 20 90   .. ..0 ....... .
9b70   00 30 20 92 d8 0d 06 10  0c 00 20 90 00 30 20 92   .0 ....... ..0 .
9b80   dc 0d 06 10 00 30 20 8c  d0 0d 06 10 00 30 e8 8c   .....0 ......0..
9b90   10 00 00 ff 04 16 a0 5c  1d 21 05 60 00 00 18 22   .......\.!.`..."
9ba0   00 00 00 0a 00 00 00 00  00 00 00 00 00 00 00 00   ................
9bb0   00 74 08 8c 10 1c 00 00  00 00 20 8c 00 30 20 92   .t........ ..0 .
9bc0   c0 cf 05 10 00 30 28 80  00 00 00 40 ff 00 20 8c   .....0(....@.. .
9bd0   85 00 21 58 1c 20 31 37  40 e0 87 8c 84 29 00 09   ..!X. 17@....)..
9be0   40 e0 87 8c 6c f9 ff 09  0b 00 80 8c 84 f4 ff 09   @...l...........
9bf0   01 00 20 8c 00 30 20 82  04 00 00 40 00 30 20 82   .. ..0 ....@.0 .
```

```
Mar 27 18:20 1996  image.txt Page 37

9c00    06 00 00 40 00 30 20 82  08 00 00 40 00 30 80 8c   ...@.0 ....@.0..
9c10    10 27 00 00 1c f8 ff 09  00 00 20 8c 00 30 20 82   .'........ ..0 .
9c20    04 00 00 40 00 30 20 82  06 00 00 40 00 30 20 82   ...@.0 ....@.0 .
9c30    08 00 00 40 00 30 80 8c  10 27 00 00 f4 f7 ff 09   ...@.0...'......
9c40    00 30 20 82 04 00 00 40  00 30 20 82 06 00 00 40   .0 ....@.0 ....@
9c50    00 30 20 82 08 00 00 40  00 30 80 8c 10 27 00 00   .0 ....@.0...'..
9c60    d0 f7 ff 09 00 30 20 82  04 00 00 40 00 30 20 82   .....0 ....@.0 .
9c70    06 00 00 40 00 30 20 82  08 00 00 40 00 00 00 0a   ...@.0 ....@....
9c80    65 74 30 00 00 00 00 00  00 00 00 00 00 00 00 00   et0.............
9c90    10 16 18 5c 00 30 28 88  50 c9 05 10 00 30 20 8c   ...\.0(.P....0 .
9ca0    ff ff 00 00 85 00 21 58  40 20 09 3a 00 30 20 90   ......!X@ .:.0 .
9cb0    40 c9 05 10 20 00 19 35  48 14 00 09 00 00 20 8c   @... ..5H..... .
9cc0    00 30 20 8a 50 c9 05 10  00 30 20 92 40 c9 05 10   .0 .P....0 .@...
9cd0    18 00 00 08 00 00 20 8c  03 16 60 5c d4 af ff 09   ...... ....\....
9ce0    14 20 24 92 14 e0 20 92  00 00 00 0a 00 00 00 00   . $... .........
9cf0    00 00 20 8c 00 30 20 92  30 c9 05 10 00 30 28 8c   .. ..0 .0....0(.
9d00    40 c9 05 10 40 00 20 8c  05 16 80 5c 04 16 88 5c   @...@. ....\...\
9d10    50 99 ff 09 00 30 28 8c  28 c9 05 10 06 00 20 8c   P....0(.(..... .
9d20    05 16 80 5c 04 16 88 5c  38 99 ff 09 00 30 28 8c   ...\...\8....0(.
9d30    20 c9 05 10 08 00 20 8c  05 16 80 5c 04 16 88 5c    ..... ....\...\
9d40    20 99 ff 09 00 30 30 8c  60 ec 05 10 00 30 28 8c    ....00.`....0(.
9d50    28 c9 05 10 06 00 20 8c  06 16 80 5c 05 16 88 5c   (..... ....\...\
9d60    04 16 90 5c ec 98 ff 09  00 00 20 8c 00 30 20 82   ...\...... ..0 .
9d70    26 c9 05 10 00 30 20 8a  50 c9 05 10 00 30 20 8a   &....0 .P....0 .
9d80    52 c9 05 10 00 30 20 92  40 c9 05 10 00 30 20 8a   R....0 .@....0 .
9d90    54 c9 05 10 04 16 18 5c  00 00 20 8c 03 3a 20 92   T......\.. ..: .
9da0    60 c9 05 10 03 3a 20 92  64 c9 05 10 03 3a 20 92   `....: .d....: .
9db0    68 c9 05 10 01 e0 20 8c  04 16 18 5c dc 3f 09 31   h..... ....\.?.1
9dc0    00 00 00 0a 00 00 00 00  00 00 00 00 00 00 00 00   ................
9dd0    10 16 38 5c 10 4e 24 59  90 0d 19 59 44 e0 14 3d   ..8\.N$Y...YD..=
9de0    00 30 38 92 40 c9 05 10  01 00 20 8c 00 30 20 8a   .08.@..... ..0 .
9df0    50 c9 05 10 00 00 20 8c  00 30 20 8a 52 c9 05 10   P..... ..0 .R...
9e00    20 f2 ff 09 10 16 20 5c  a8 12 00 09 a4 0d 00 09    ..... \........
9e10    04 16 80 5c 2c f2 ff 09  03 16 80 5c 00 00 00 0a   ...\,.......\....
9e20    00 30 28 88 50 c9 05 10  00 30 20 8c ff ff 00 00   .0(.P....0 .....
9e30    85 00 21 58 10 20 09 3a  00 30 80 8c ff ff ff ff   ..!X. .:.0......
9e40    00 00 00 0a 00 00 18 8c  03 3a 20 90 60 c9 05 10   .........: .`...
9e50    18 20 01 32 01 e0 20 8c  10 0e 21 59 90 0d 21 59   . .2.. ...!Y..!Y
9e60    04 16 18 5c e4 3f 09 39  10 e0 06 3d 00 30 80 8c   ...\.?.9...=.0..
9e70    ff ff ff ff 00 00 00 0a  03 3a 38 92 60 c9 05 10   .........:8.`...
```

Mar 27 18:20 1996 image.txt Page 58

```
9e80    00 00 20 8c 03 3a 20 92  64 c9 05 10 03 3a 20 92   .. ..: .d....: .
9e90    68 c9 05 10 03 3a 20 8c  60 c9 05 10 14 e0 21 92   h....: .`.....!.
9ea0    03 3a 20 8c 60 c9 05 10  07 16 80 5c 74 ad ff 09   .: .`......\t...
9eb0    14 20 24 92 03 16 80 5c  00 00 00 0a 00 00 00 00   . $....\........
9ec0    81 00 28 8c 14 60 24 90  0a 20 29 82 94 a5 ff 08   ..(..`$.. )......
9ed0    10 16 78 5c 11 16 18 5c  12 16 38 5c 0c e0 30 90   ..x\...\..8\..0.
9ee0    82 00 28 8c 14 e0 20 90  0a 20 29 82 10 a0 39 92   ..(... .. )...9.
9ef0    70 a5 ff 08 00 00 00 00  00 00 00 00 00 00 00 00   p...............
9f00    11 16 28 5c 0c 60 21 90  08 60 19 90 0c 20 21 90   ..(\.`!..`... !.
9f10    30 20 31 31 0c e0 30 90  00 30 28 8c 26 c9 05 10   0 11..0..0(.&...
9f20    06 00 20 8c 06 16 80 5c  05 16 88 5c 04 16 90 5c   .. ....\...\...\
9f30    20 97 ff 09 bc 01 00 09  00 00 80 8c 00 00 00 0a    ...............
9f40    02 00 80 8c 00 00 00 0a  00 00 00 00 00 00 00 00   ................
9f50    10 60 08 8c 10 16 70 5c  11 16 78 5c 0c e0 23 90   .`....p\..x\..#.
9f60    08 e0 3b 90 0c 20 19 90  38 e0 30 35 00 30 30 8c   ..;.. ..8.05.00.
9f70    28 c9 05 10 0c e0 29 90  06 00 20 8c 06 16 80 5c   (.....)... ....\
9f80    05 16 88 5c 04 16 90 5c  c8 96 ff 09 0e 16 80 5c   ...\...\.......\
9f90    0f 16 88 5c 2c ff ff 09  01 00 80 8c 00 00 00 0a   ...\,...........
9fa0    60 e0 50 35 00 30 30 8c  28 c9 05 10 0c e0 29 90   `.P5.00.(.....).
9fb0    06 00 20 8c 06 16 80 5c  05 16 88 5c 04 16 90 5c   .. ....\...\...\
9fc0    90 96 ff 09 00 00 20 8c  40 e0 27 92 40 e0 37 8c   ...... .@.'.@.7.
9fd0    0c e0 21 90 06 20 29 8c  04 00 20 8c 06 16 80 5c   ..!.. )... ....\
9fe0    05 16 88 5c 04 16 90 5c  68 96 ff 09 0e 16 80 5c   ...\...\h......\
9ff0    0f 16 88 5c cc fe ff 09  01 00 80 8c 00 00 00 0a   ...\............
a000    84 e0 70 35 00 30 30 8c  28 c9 05 10 0c e0 29 90   ..p5.00.(.....).
a010    06 00 20 8c 06 16 80 5c  05 16 88 5c 04 16 90 5c   .. ....\...\...\
a020    30 96 ff 09 00 00 20 8c  40 e0 27 92 40 e0 37 8c   0..... .@.'.@.7.
a030    0c e0 21 90 06 20 29 8c  04 00 20 8c 06 16 80 5c   ..!.. )... ....\
a040    05 16 88 5c 04 16 90 5c  08 96 ff 09 00 00 20 8c   ...\...\...... .
a050    40 e0 27 92 0c e0 21 90  0a 20 29 8c 04 00 20 8c   @.'...!.. )... .
a060    06 16 80 5c 05 16 88 5c  04 16 90 5c e4 95 ff 09   ...\...\...\....
a070    0e 16 80 5c 0f 16 88 5c  48 fe ff 09 01 00 80 8c   ...\...\H.......
a080    00 00 00 0a 00 00 80 8c  00 00 00 0a 00 00 00 00   ................
a090    11 16 28 5c 0c 60 21 90  08 60 19 90 0c 20 21 90   ..(\.`!..`... !.
a0a0    9c 20 31 31 0c e0 20 90  00 10 21 80 0c 20 01 37   . 11.. ...!.. .7
a0b0    01 00 80 8c 00 00 00 0a  00 30 20 80 26 c9 05 10   .........0 .&...
a0c0    30 20 01 32 00 30 30 8c  20 c9 05 10 0c e0 28 90   0 .2.00. .....(.
a0d0    06 00 20 8c 06 16 80 5c  05 16 88 5c 04 16 90 5c   .. ....\...\...\
a0e0    a0 62 02 0b 0c 20 04 3d  01 00 80 8c 00 00 00 0a   .b... .=........
a0f0    00 30 20 80 26 c9 05 10  3c 20 01 35 0c e0 30 90   .0 .&...< .5..0.
```

Mar 27 18:20 1996 image.txt Page 59

```
a100    00 30 28 8c 20 c9 05 10  06 00 20 8c 06 16 80 5c   .0(. ..... ....\
a110    05 16 88 5c 04 16 90 5c  38 95 ff 09 01 00 20 8c   ...\...\8..... .
a120    00 30 20 82 26 c9 05 10  58 0e 00 09 00 00 80 8c   .0 .&...X.......
a130    00 00 00 0a 01 00 80 8c  00 00 00 0a 02 00 80 8c   ................
a140    00 00 00 0a 00 00 00 00  00 00 00 00 00 00 00 00   ................
a150    11 16 28 5c 0c 60 21 90  08 60 19 90 0c 20 21 90   ..(\.`!..`... !.
a160    68 20 31 31 0c e0 20 90  00 10 21 80 0c 20 01 37   h 11.. ...!.. .7
a170    01 00 80 8c 00 00 00 0a  00 30 20 80 26 c9 05 10   .........0 .&...
a180    40 20 01 32 00 30 30 8c  20 c9 05 10 0c e0 28 90   @ .2.00. ......(.
a190    06 00 20 8c 06 16 80 5c  05 16 88 5c 04 16 90 5c   .. ....\...\...\
a1a0    e0 61 02 06 1c 20 04 3d  00 00 20 8c 00 30 20 82   .a... .=.. ..0 .
a1b0    26 c9 05 10 cc 0a 00 09  04 16 80 5c 00 00 00 0a   &..........\....
a1c0    01 00 80 8c 00 00 00 0a  02 00 80 8c 00 00 00 0a   ................
a1d0    10 16 30 5c 11 16 38 5c  0c e0 21 90 08 e0 19 90   ..0\..8\..!.....
a1e0    0c 20 21 90 24 20 21 31  0c e0 20 90 00 10 21 90   . !.$ !1.. ...!.
a1f0    00 30 20 92 44 c9 05 10  06 16 80 5c 07 16 88 5c   .0 .D......\...\
a200    c0 fc ff 09 18 00 00 08  01 00 20 8c 06 16 80 5c   .......... ....\
a210    07 16 88 5c 04 16 90 5c  b8 fc ff 08 00 00 00 0a   ...\...\........
a220    00 30 28 90 44 c9 05 10  60 00 20 8c 05 16 80 5c   .0(.D...`. ....\
a230    04 16 88 5c 2c 94 ff 09  78 9c ff 09 00 30 20 90   ...\,...x....0 .
a240    44 c9 05 10 00 10 81 92  00 00 00 0a 00 00 00 00   D...............
a250    10 16 78 5c 11 16 38 5c  0c e0 21 90 08 e0 19 90   ..x\..8\..!.....
a260    0c 20 29 90 60 00 20 8c  34 00 29 34 00 30 30 90   . ).`. .4.)4.00.
a270    44 c9 05 10 0c e0 28 90  60 00 20 8c 06 16 80 5c   D.....(.`. ....\
a280    05 16 88 5c 04 16 90 5c  c8 93 ff 09 0f 16 80 5c   ...\...\.......\
a290    07 16 88 5c 2c fc ff 09  18 00 00 08 01 00 20 8c   ...\,......... .
a2a0    0f 16 80 5c 07 16 88 5c  04 16 90 5c 24 fc ff 08   ...\...\...\$...
a2b0    00 00 00 0a 00 00 00 00  00 00 00 00 00 00 00 00   ................
a2c0    10 16 68 5c 11 16 70 5c  0c a0 23 90 00 10 29 90   ..h\..p\..#...).
a2d0    00 30 20 8c 04 44 00 00  04 41 79 59 0b e8 03 5a   .0 ..D...AyY...Z
a2e0    88 01 00 14 0f 39 20 90  80 a4 00 00 00 10 01 84   .....9 .........
a2f0    0d 16 80 5c 0e 16 88 5c  08 fc ff 09 10 16 30 5c   ...\...\......0\
a300    14 20 04 3d 0d 16 80 5c  0e 16 88 5c b4 fb ff 09   . .=...\...\....
a310    6c 01 00 08 1c a0 09 3d  02 00 20 8c 0d 16 80 5c   l......=.. ....\
a320    0e 16 88 5c 04 16 90 5c  a8 fb ff 09 50 01 00 08   ...\...\....P...
a330    82 a8 01 5a 48 01 00 15  01 00 20 8c 0d 16 80 5c   ...ZH..... ....\
a340    0e 16 88 5c 04 16 90 5c  88 fb ff 09 30 01 00 08   ...\...\....0...
a350    0d 16 80 5c 0e 16 88 5c  f8 fb ff 09 80 28 04 5a   ...\...\.....(.Z
a360    1c 01 00 15 03 00 20 8c  0d 16 80 5c 0e 16 88 5c   ...... ....\...\
a370    04 16 90 5c 5c fb ff 09  04 01 00 08 0d 16 80 5c   ...\\..........\
```

```
Mar 27 18:20 1996  image.txt Page 60

a380    0e 16 88 5c 4c fe ff 09  f4 00 00 08 94 fe ff 09   ...\L...........
a390    0d 16 80 5c 0e 16 88 5c  28 fb ff 09 e0 00 00 08   ...\...\(.......
a3a0    0d 16 80 5c 0e 16 88 5c  a8 fe ff 09 d0 00 00 08   ...\...\........
a3b0    0d 16 80 5c 0e 16 88 5c  ad fc ff 09 10 16 38 5c   ...\...\......8\
a3c0    14 20 04 3d 0d 16 80 5c  0e 16 88 5c f4 fa ff 09   . .=...\...\....
a3d0    ac 00 00 08 1c e0 09 3d  02 00 20 8c 0d 16 80 5c   .......=.. ....\
a3e0    0e 16 88 5c 04 16 90 5c  e8 fa ff 09 90 00 00 08   ...\...\........
a3f0    8c e0 11 3d 01 00 20 8c  0d 16 80 5c 0e 16 88 5c   ...=.. ....\...\
a400    04 16 90 5c cc fa ff 09  74 00 00 08 0d 16 80 5c   ...\....t......\
a410    0e 16 88 5c 3c fd ff 09  10 16 18 5c 14 20 04 3d   ...\<......\. .=
a420    0d 16 80 5c 0e 16 88 5c  98 fa ff 09 50 00 00 08   ...\...\....P...
a430    1c e0 08 3d 02 00 20 8c  0d 16 80 5c 0e 16 88 5c   ...=.. ....\...\
a440    04 16 90 5c 8c fa ff 09  34 00 00 08 30 e0 10 3d   ...\....4...0..=
a450    01 00 20 8c 0d 16 80 5c  0e 16 88 5c 04 16 90 5c   .. ....\...\...\
a460    70 fa ff 09 18 00 00 08  04 00 20 8c 0d 16 80 5c   p......... ....\
a470    0e 16 88 5c 04 16 90 5c  58 fa ff 08 00 00 00 0a   ...\...\X.......
a480    a0 a3 00 00 50 a3 00 00  68 a4 00 00 f0 a2 00 00   ....P...h.......
a490    8c a3 00 00 b0 a3 00 00  68 a4 00 00 68 a4 00 00   ........h...h...
a4a0    68 a4 00 00 68 a4 00 00  0c a4 00 00 7c a3 00 00   h...h.......|...
a4b0    10 16 58 5c 0c a0 ff 09  10 16 18 5c 3c 20 04 32   ..X\.......\< .2
a4c0    0c e0 82 90 8c a6 ff 09  14 20 04 3a 0b 16 80 5c   ......... .:...\
a4d0    03 16 88 5c 3c a6 ff 09  10 00 00 08 0b 16 80 5c   ...\<..........\
a4e0    03 16 88 5c 2c a2 ff 08  0b 16 80 5c d4 9f ff 09   ...\,......\....
a4f0    10 16 18 5c cc 3f 04 35  00 00 00 0a 00 00 00 00   ...\.?.5........
a500    10 16 78 5c 0c e0 23 90  04 16 18 5c 00 00 38 8c   ..x\..#....\..8.
a510    00 10 21 80 60 20 01 30  00 30 28 8c e0 0d 06 10   ..!.` .0.0(.....
a520    06 00 20 8c 03 16 80 5c  05 16 88 5c 04 16 90 5c   .. ....\...\...\
a530    50 5e 02 0b 40 20 04 3a  03 16 80 5c 34 04 00 09   P^..@ .:...\4...
a540    34 20 04 3d 00 30 20 90  44 c9 05 10 18 20 01 32   4 .=.0 .D.... .2
a550    00 30 28 90 44 c9 05 10  48 60 21 90 01 20 21 8c   .0(.D...H`!.. !.
a560    48 60 21 92 0f 16 80 5c  38 8a ff 09 00 00 80 8c   H`!....\8.......
a570    00 00 00 0a 0c e0 20 88  88 0d 29 59 ff 00 20 8c   ...... ...)Y.. .
a580    85 00 31 58 0c e0 20 88  08 0f 29 59 00 30 20 8c   ..1X.. ...)Y.0 .
a590    00 ff 00 00 85 00 21 58  86 03 29 58 06 08 20 8c   ......!X..)X.. .
a5a0    34 00 29 3a 0c e0 20 88  88 0d 29 59 ff 00 20 8c   4.):.. ...)Y.. .
a5b0    85 00 31 58 0c e0 20 88  08 0f 29 59 00 30 20 8c   ..1X.. ...)Y.0 .
a5c0    00 ff 00 00 85 00 21 58  86 03 29 58 00 08 20 8c   ......!X..)X.. .
a5d0    10 00 29 3d 00 30 38 90  40 c9 05 10 08 00 00 08   ..)=.08.@.......
a5e0    00 00 38 8c 14 e0 01 35  0f 16 80 5c b4 89 ff 09   ..8....5...\....
a5f0    00 00 80 8c 00 00 00 0a  07 16 80 5c 54 a5 ff 09   ...........\T...
```

```
Mar 27 18:20 1996  image.txt Page 61

a600    34 20 04 3d 00 30 20 90  44 c9 05 10 18 20 01 32   4 .=.0 .D.... .2
a610    00 30 28 90 44 c9 05 10  50 60 21 90 01 20 21 8c   .0(.D...P`!.. !.
a620    50 60 21 92 0f 16 80 5c  78 d9 ff 09 00 00 80 8c   P`!....\x.......
a630    00 00 00 0a 07 16 80 5c  0f 16 88 5c 24 9f ff 09   .......\...\$...
a640    07 16 80 5c 00 00 00 0a  00 00 00 00 00 00 00 00   ...\............
a650    10 16 28 5c 11 16 30 5c  02 00 20 8c 11 16 80 5c   ..(\..0\.. ....\
a660    04 16 88 5c cc b2 ff 09  10 16 38 5c 30 20 04 32   ...\......8\0 .2
a670    0c e0 21 90 05 16 80 5c  04 16 88 5c 06 16 90 5c   ..!....\...\...\
a680    d0 8f ff 09 0c e0 21 90  04 80 21 59 10 e0 21 92   ......!...!Y..!.
a690    00 00 20 8c 08 e0 21 92  14 00 00 08 00 30 80 8c   .. ...!......0..
a6a0    00 a7 00 00 06 16 88 5c  48 91 ff 09 07 16 80 5c   .......\H......\
a6b0    00 00 00 0a 00 00 00 00  00 00 00 00 00 00 00 00   ................
a6c0    18 0e 24 59 98 0d 29 59  05 16 18 5c 61 00 20 8c   ..$Y..)Y...\a. .
a6d0    0c 00 29 3c 7a 00 20 8c  14 00 19 3e 30 00 20 8c   ..)<z. ....>0. .
a6e0    14 00 19 3c 39 00 20 8c  0c 00 19 39 01 00 80 8c   ...<9. ....9....
a6f0    00 00 00 0a 00 00 80 8c  00 00 00 0a 00 00 00 00   ................
a700    45 54 30 23 65 74 42 75  66 32 4d 73 67 20 23 30   ET0#etBuf2Msg #0
a710    30 32 3a 20 2a 2a 2a 20  50 52 4f 42 4c 45 4d 2c   02: *** PROBLEM,
a720    20 4e 4f 20 42 55 45 45  46 45 52 53 20 73 69 7a    NO BUEEFERS siz
a730    65 3a 25 64 0a 00 00 00  00 00 00 00 00 00 00 00   e:%d............
a740    10 16 70 5c 11 16 78 5c  01 00 38 8c 00 30 28 88   ..p\..x\..8..0(.
a750    52 c9 05 10 00 30 20 8c  ff ff 00 00 85 00 21 58   R....0 .......!X
a760    18 20 09 3d 01 00 20 8c  00 30 20 8a 54 c9 05 10   . .=.. ..0 .T...
a770    00 00 38 8c c8 00 00 08  0c e0 33 90 00 30 28 8c   ..8.......3..0(.
a780    28 c9 05 10 06 00 20 8c  06 16 80 5c 05 16 88 5c   (..... ....\...\
a790    04 16 90 5c ec 5b 02 0b  1c 20 04 3d 0e 16 80 5c   ...\.[... .=...\
a7a0    10 a5 ff 09 0f 16 88 5c  08 01 00 09 07 16 80 5c   .......\.......\
a7b0    00 00 00 0a 0c e0 23 90  00 10 21 80 58 20 01 30   ......#...!.X .0
a7c0    00 00 18 8c 0c e0 33 90  00 30 28 8c e0 0d 06 10   ......3..0(.....
a7d0    06 00 20 8c 06 16 80 5c  05 16 88 5c 04 16 90 5c   .. ....\...\...\
a7e0    a0 5b 02 0b 10 20 04 3a  0c e0 83 90 84 01 00 09   .[... .:........
a7f0    24 20 04 3a 0f 16 80 5c  f8 87 ff 09 10 16 18 5c   $ .:...\.......\
a800    14 20 04 32 0e 16 80 5c  a8 a4 ff 09 03 16 88 5c   . .2...\.......\
a810    a0 00 00 09 0f 16 80 5c  08 09 00 09 18 20 04 3a   .......\..... .:
a820    0e 16 80 5c 0f 16 88 5c  e8 9e ff 09 00 00 80 8c   ...\...\........
a830    00 00 00 0a 0f 16 80 5c  68 87 ff 09 07 16 80 5c   .......\h......\
a840    00 00 00 0a 00 00 00 00  00 00 00 00 00 00 00 00   ................
a850    10 16 38 5c 11 16 18 5c  e8 fe ff 09 18 0e 24 59   ..8\...\......$Y
a860    98 0d 21 59 18 20 01 3d  07 16 80 5c 03 16 88 5c   ..!Y. .=...\...\
a870    a0 9e ff 09 01 00 80 8c  00 00 00 0a 07 16 80 5c   ...............\
```

Mar 27 18:20 1996 image.txt Page 62

```
a880   c0 a7 ff 09 14 20 04 3d  00 00 20 8c 00 30 20 8a   ..... .=.. ..0 .
a890   54 c9 05 10 10 00 00 08  01 00 20 8c 00 30 20 8a   T......... ..0 .
a8a0   54 c9 05 10 00 00 80 8c  00 00 00 0a 00 00 00 00   T...............
a8b0   10 16 78 5c 11 16 38 5c  0c 20 84 90 94 a2 ff 09   ..x\..8\. ......
a8c0   2c 20 04 3a 00 30 20 90  44 c9 05 10 18 20 01 32   , .=.0 .D.... .2
a8d0   00 30 28 90 44 c9 05 10  50 60 21 90 01 20 21 8c   .0(.D...P`!.. !.
a8e0   50 60 21 92 07 16 80 5c  08 88 ff 08 00 30 20 90   P`!....\.....0 .
a8f0   44 c9 05 10 18 20 01 32  00 30 28 90 44 c9 05 10   D.... .2.0(.D...
a900   20 60 21 90 01 20 21 8c  20 60 21 92 07 16 18 5c    `!.. !. `!....\
a910   3c e0 01 32 00 30 20 90  44 c9 05 10 24 20 01 32   <..2.0 .D...$ .2
a920   10 e0 28 90 0c e0 20 90  04 41 31 59 00 30 28 90   ..(... ..A1Y.0(.
a930   44 c9 05 10 24 60 21 90  04 60 21 59 24 60 21 92   D...$`!...!Y$`!.
a940   06 e0 20 90 04 16 18 5c  cc 3f 01 35 01 00 28 8c   .. ....\.?.5..(.
a950   14 e0 21 90 0d 20 29 82  0f 16 80 5c 07 16 88 5c   ..!.. )....\...\
a960   b0 a1 ff 08 00 00 00 00  00 00 00 00 00 00 00 00   ................
a970   10 16 18 5c 00 30 20 80  26 c9 05 10 2c 20 01 32   ...\.0 .&..., .2
a980   00 30 28 8c 20 c9 05 10  06 00 20 8c 05 16 80 5c   .0(. ..... ....\
a990   03 16 88 5c 04 16 90 5c  e8 59 02 0b 0c 20 04 3d   ...\...\.Y... .=
a9a0   01 00 80 8c 00 00 00 0a  00 00 80 8c 00 00 00 0a   ................
a9b0   10 16 30 5c 11 16 38 5c  14 60 24 90 0d 20 19 80   ..0\..8\.`$.. ..
a9c0   0c e0 08 3a 83 00 20 8c  14 c0 20 3d 06 16 80 5c   ...:.. ... =...\
a9d0   07 16 88 5c 8c 9b ff 09  9c 00 00 08 14 e0 70 3d   ...\..........p=
a9e0   06 16 80 5c 07 16 88 5c  78 9b ff 09 88 00 00 08   ...\...\x.......
a9f0   86 00 20 8c 68 c0 20 3d  0c e0 21 90 00 10 21 80   .. .h. =..!...!.
aa00   14 20 09 30 00 00 20 8c  06 16 80 5c 04 16 88 5c   . .0.. ....\...\
aa10   d0 a4 ff 09 0c e0 21 90  00 10 21 80 34 20 01 30   ......!...!.4 .0
aa20   06 16 80 5c 8c a2 ff 09  00 00 88 8c b4 a4 ff 09   ...\............
aa30   0c e0 29 90 00 50 21 80  01 0e 21 58 00 50 21 82   ..)..P!...!X.P!.
aa40   06 16 80 5c 07 16 88 5c  18 9a ff 09 28 00 00 08   ...\...\....(...
aa50   07 16 80 5c 4c 85 ff 09  1c 00 00 08 10 e0 00 3d   ...\L..........=
aa60   07 16 80 5c 3c 85 ff 09  0c 00 00 08 07 16 80 5c   ...\<..........\
aa70   30 85 ff 08 00 00 00 0a  00 00 00 00 00 00 00 00   0...............
aa80   10 16 30 5c 00 30 28 88  50 c9 05 10 00 30 20 8c   ..0\.0(.P....0 .
aa90   ff ff 00 00 85 00 21 58  68 20 09 3d 06 16 80 5c   ......!Xh .=...\
aaa0   20 9a ff 09 10 16 38 5c  58 20 04 32 14 e0 21 90    .....8\X .2..!.
aab0   0d 20 19 80 0c e0 08 3a  83 00 20 8c 18 c0 20 3d   . .....:.. ... =
aac0   06 16 80 5c 07 16 88 5c  88 fa ff 09 24 20 04 3a   ...\...\....$ .:
aad0   00 00 00 0a 14 e0 70 3d  06 16 80 5c 07 16 88 5c   ......p=...\...\
aae0   e0 f7 ff 09 0c 00 00 08  07 16 80 5c b4 84 ff 09   ...........\....
aaf0   06 16 80 5c cc 99 ff 09  10 16 38 5c b0 3f 04 35   ...\......8\.?.5
```

Mar 27 18:20 1996 image.txt Page 63

```
ab00   00 00 00 0a 00 00 00 00  00 00 00 00 00 00 00 00   ................
ab10   00 30 80 90 40 c9 05 10  08 a1 ff 09 10 16 38 5c   .0..@.........8\
ab20   a0 99 ff 09 10 16 18 5c  14 20 04 35 00 00 20 8c   .......\. .5.. .
ab30   00 30 20 92 64 0e 06 10  00 00 00 0a 07 16 80 5c   .0 .d..........\
ab40   03 16 88 5c fc fb ff 09  18 0e 24 59 98 0a 21 59   ...\......$Y..!Y
ab50   20 20 01 3d 07 16 80 5c  03 16 88 5c b4 9a ff 09     .=...\...\....
ab60   00 00 20 8c 00 30 20 92  64 0e 06 10 00 00 00 0a   .. ..0 .d.......
ab70   07 16 80 5c cc a4 ff 09  14 20 04 3d 00 00 20 8c   ...\..... .=.. .
ab80   00 30 20 8a 54 c9 05 10  10 00 00 08 01 00 20 8c   .0 .T......... .
ab90   00 30 20 8a 54 c9 05 10  00 00 20 8c 00 30 20 92   .0 .T..... ..0 .
aba0   64 0e 06 10 00 00 00 0a  00 00 00 00 00 00 00 00   d...............
abb0   00 30 28 8c 00 00 07 10  00 30 20 8c 00 7e 00 00   .0(......0 ..~..
abc0   05 16 80 5c 04 16 88 5c  98 8a ff 09 21 00 20 8c   ...\...\....!. .
abd0   00 30 20 82 00 00 00 20  4d 00 20 8c 00 30 20 82   .0 .... M. ..0 .
abe0   1c 00 00 20 00 00 20 8c  00 30 20 82 16 00 00 20   ... .. ..0 ....
abf0   00 30 20 82 14 00 00 20  20 00 20 8c 00 30 20 82   .0 ....  . ..0 .
ac00   18 00 00 20 00 00 20 8c  00 30 20 82 1a 00 00 20   ... .. ..0 ....
ac10   00 30 20 8c ff ff 00 00  85 00 21 58 10 20 01 3a   .0 .......!X. .:
ac20   00 30 80 8c 80 b9 00 00  c8 8b ff 08 00 30 20 8c   .0...........0 .
ac30   00 00 07 10 90 0d 29 59  ff 00 20 8c 85 00 21 58   ......)Y.. ...!X
ac40   00 30 20 82 10 00 00 20  00 30 20 8c 00 00 07 10   .0 .... .0 .....
ac50   90 0d 21 59 88 0d 29 59  ff 00 20 8c 85 00 21 58   ..!Y..)Y.. ...!X
ac60   00 30 20 82 12 00 00 20  00 30 28 8c 00 06 07 10   .0 .... .0(.....
ac70   00 30 20 8c 00 00 07 10  84 41 21 59 88 0d 29 59   .0 ......A!Y..)Y
ac80   ff 00 20 8c 85 00 21 58  00 30 20 82 02 00 00 20   .. ...!X.0 ....
ac90   00 30 28 8c 00 06 07 10  00 30 20 8c 00 00 07 10   .0(......0 .....
aca0   84 41 21 59 88 0d 29 59  ff 00 20 8c 85 00 21 58   .A!Y..)Y.. ...!X
acb0   00 30 20 82 06 00 00 20  00 30 20 8c 00 7e 07 10   .0 .... .0 ..~..
acc0   88 0d 29 59 ff 00 20 8c  85 00 21 58 00 30 20 82   ..)Y.. ...!X.0 .
acd0   04 00 00 20 ff 00 20 8c  00 30 20 82 0e 00 00 20   ... .. ..0 ....
ace0   1f 00 20 8c 00 30 20 82  70 c9 05 10 00 30 20 80   .. ..0 .p....0 .
acf0   70 c9 05 10 00 30 20 82  1e 00 00 20 00 30 28 80   p....0 .... .0(.
ad00   00 00 00 20 ff 00 20 8c  85 00 29 58 3f 00 20 8c   ... .. ...)X?. .
ad10   85 00 21 58 86 09 21 58  00 30 20 82 00 00 00 20   ..!X..!X.0 ....
ad20   00 30 20 80 28 c9 05 10  00 30 20 82 02 00 00 20   .0 .(....0 ....
ad30   00 30 20 80 29 c9 05 10  00 30 20 82 04 00 00 20   .0 .)....0 ....
ad40   00 30 20 80 2a c9 05 10  00 30 20 82 06 00 00 20   .0 .*....0 ....
ad50   00 30 20 80 2b c9 05 10  00 30 20 82 08 00 00 20   .0 .+....0 ....
ad60   00 30 20 80 2c c9 05 10  00 30 20 82 0a 00 00 20   .0 .,....0 ....
ad70   00 30 20 80 2d c9 05 10  00 30 20 82 0c 00 00 20   .0 .-....0 ....
```

Mar 27 18:20 1998 image.txt Page 64

```
ad80    00 30 20 80 26 c9 05 10  7c 20 01 32 00 30 20 80   .0 .&...| .2.0 .
ad90    71 c9 05 10 83 09 21 58  00 30 20 82 71 c9 05 10   q.....!X.0 .q...
ada0    00 30 20 80 20 c9 05 10  00 30 20 82 10 00 00 20   .0 . ....0 ....
adb0    00 30 20 80 21 c9 05 10  00 30 20 82 12 00 00 20   .0 .!....0 ....
adc0    00 30 20 80 22 c9 05 10  00 30 20 82 14 00 00 20   .0 .".....0 ....
add0    00 30 20 80 23 c9 05 10  00 30 20 82 16 00 00 20   .0 .#....0 ....
ade0    00 30 20 80 24 c9 05 10  00 30 20 82 18 00 00 20   .0 .$....0 ....
adf0    00 30 20 80 25 c9 05 10  00 30 20 82 1a 00 00 20   .0 .%....0 ....
ae00    4c 00 00 08 00 30 20 80  71 c9 05 10 03 0e 21 58   L....0 .q.....!X
ae10    00 30 20 82 71 c9 05 10  00 00 20 8c 00 30 20 82   .0 .q..... ..0 .
ae20    10 00 00 20 00 30 20 82  12 00 00 20 00 30 20 82   ... .0 .... .0 .
ae30    14 00 00 20 00 30 20 82  16 00 00 20 00 30 20 82   ... .0 .... .0 .
ae40    18 00 00 20 00 30 20 82  1a 00 00 20 00 30 28 8c   ... .0 .... .0(.
ae50    00 06 07 10 00 30 20 8c  00 00 07 10 84 41 21 59   .....0 ......A!Y
ae60    88 0d 29 59 ff 00 20 8c  85 00 21 58 00 30 20 82   ..)Y.. ...!X.0 .
ae70    0e 00 00 20 00 30 28 8c  00 06 07 10 00 30 20 8c   ... .0(......0 .
ae80    00 00 07 10 84 41 21 59  88 0d 29 59 ff 00 20 8c   .....A!Y..)Y.. .
ae90    85 00 21 58 00 30 20 82  72 c9 05 10 00 30 28 80   ..!X.0 .r....0(.
aea0    00 00 00 20 ff 00 20 8c  85 00 29 58 3f 00 20 8c   ... .. ...)X?. .
aeb0    85 00 21 58 00 30 20 82  00 00 00 20 22 00 20 8c   ..!X.0 .... ". .
aec0    00 30 20 82 00 00 00 20  04 00 20 8c 00 30 20 82   .0 .... .. ..0 .
aed0    71 c9 05 10 00 30 20 80  71 c9 05 10 00 30 20 82   q....0 .q....0 .
aee0    18 00 00 20 00 00 00 0a  00 00 00 00 00 00 00 00   ... ............
aef0    30 e1 ff 09 00 30 28 80  00 00 00 20 ff 00 20 8c   0....0(.... .. .
af00    85 00 29 58 3f 00 20 8c  85 00 21 58 86 09 21 58   ..)X?. ...!X..!X
af10    00 30 20 82 00 00 00 20  00 30 20 80 28 c9 05 10   .0 .... .0 .(...
af20    00 30 20 82 02 00 00 20  00 30 20 80 29 c9 05 10   .0 .... .0 .)...
af30    00 30 20 82 04 00 00 20  00 30 20 80 2a c9 05 10   .0 .... .0 .*...
af40    00 30 20 82 06 00 00 20  00 30 20 80 2b c9 05 10   .0 .... .0 .+...
af50    00 30 20 82 08 00 00 20  00 30 20 80 2c c9 05 10   .0 .... .0 .,...
af60    00 30 20 82 0a 00 00 20  00 30 20 80 2d c9 05 10   .0 .... .0 .-...
af70    00 30 20 82 0c 00 00 20  c8 e0 ff 08 00 00 00 00   .0 .... ........
af80    a0 e0 ff 09 10 16 18 5c  00 30 28 80 00 00 00 20   .......\.0(....
af90    ff 00 20 8c 85 00 29 58  3f 00 20 8c 85 00 21 58   .. ...)X?. ...!X
afa0    86 09 21 58 00 30 20 82  00 00 00 20 00 30 20 80   ..!X.0 .... .0 .
afb0    26 c9 05 10 7c 20 01 32  00 30 20 80 71 c9 05 10   &...| .2.0 .q...
afc0    83 09 21 58 00 30 20 82  71 c9 05 10 00 30 20 80   ..!X.0 .q....0 .
afd0    20 c9 05 10 00 30 20 82  10 00 00 20 00 30 20 80    ....0 .... .0 .
afe0    21 c9 05 10 00 30 20 82  12 00 00 20 00 30 20 80   !....0 .... .0 .
aff0    22 c9 05 10 00 30 20 82  14 00 00 20 00 30 20 80   "....0 .... .0 .
```

```
Mar 27 18:20 1996  image.txt Page 83

b000    23 c9 05 10 00 30 20 82  16 00 00 20 00 30 20 80   #....0 .... .0 .
b010    24 c9 05 10 00 30 20 82  18 00 00 20 00 30 20 80   $....0 .... .0 .
b020    25 c9 05 10 00 30 20 82  1a 00 00 20 4c 00 00 08   %....0 .... L...
b030    00 30 20 80 71 c9 05 10  03 0e 21 58 00 30 20 82   .0 .q.....!X.0 .
b040    71 c9 05 10 00 00 20 8c  00 30 20 82 10 00 00 20   q..... ..0 ....
b050    00 30 20 82 12 00 00 20  00 30 20 82 14 00 00 20   .0 .... .0 ....
b060    00 30 20 82 16 00 00 20  00 30 20 82 18 00 00 20   .0 .... .0 ....
b070    00 30 20 82 1a 00 00 20  00 30 28 80 00 00 00 20   .0 .... .0(....
b080    ff 00 20 8c 85 00 29 58  3f 00 20 8c 85 00 21 58   .. ...)X?. ...!X
b090    00 30 20 82 00 00 00 20  00 30 20 80 71 c9 05 10   .0 .... .0 .q...
b0a0    00 30 20 82 18 00 00 20  03 16 80 5c 94 df ff 08   .0 .... ...\....
b0b0    00 30 28 80 00 00 00 40  ff 00 20 8c 85 00 21 58   .0(....@.. ...!X
b0c0    14 20 29 37 00 00 20 8c  00 30 20 82 73 c9 05 10   . )7.. ..0 .s...
b0d0    10 00 00 08 01 00 20 8c  00 30 20 82 73 c9 05 10   ...... ..0 .s...
b0e0    00 30 20 80 73 c9 05 10  00 30 20 82 0a 00 00 40   .0 .s....0 ....@
b0f0    00 00 00 0a 00 00 00 00  00 00 00 00 00 00 00 00   ................
b100    20 df ff 09 21 00 20 8c  00 30 20 82 00 00 00 20    ...!. ..0 ....
b110    00 00 20 8c 00 30 20 82  1e 00 00 20 24 df ff 08   .. ..0 .... $...
b120    10 60 08 8c 10 16 60 5c  f8 de ff 09 10 16 68 5c   .`....`\......h\
b130    00 30 28 88 52 c9 05 10  00 30 20 8c ff ff 00 00   .0(.R....0 .....
b140    85 00 21 58 14 20 09 3d  0d 16 80 5c f4 de ff 09   ..!X. .=...\....
b150    01 00 80 8c 00 00 00 0a  01 00 20 8c 00 30 20 8a   .......... ..0 .
b160    52 c9 05 10 00 30 20 90  4c c9 05 10 10 20 01 32   R....0 .L.... .2
b170    00 30 80 90 48 c9 05 10  f8 8a ff 09 00 30 30 8c   .0..H........00.
b180    f0 b8 00 00 00 00 28 8c  d0 07 20 8c 06 16 80 5c   ......(... ....\
b190    05 16 88 5c 04 16 90 5c  c8 8a ff 09 00 30 80 92   ...\...\.....0..
b1a0    48 c9 05 10 01 00 20 8c  00 30 20 92 4c c9 05 10   H..... ..0 .L...
b1b0    0d 16 80 5c 8c de ff 09  00 30 30 8c 00 00 07 10   ...\.....00.....
b1c0    0c 20 2b 90 06 00 20 8c  05 16 80 5c 06 16 88 5c   . +... ....\...\
b1d0    04 16 90 5c 7c 84 ff 09  00 30 30 8c 06 00 07 10   ...\|....00.....
b1e0    00 30 28 8c 28 c9 05 10  05 16 80 5c 06 16 88 5c   .0(.(......\...\
b1f0    04 16 90 5c 5c 84 ff 09  0c 20 23 90 0c 20 31 8c   ...\\.... #.. 1.
b200    40 e0 2f 8c 02 00 20 8c  06 16 80 5c 05 16 88 5c   @./... ....\...\
b210    04 16 90 5c 3c 84 ff 09  40 e0 2f 88 ff 00 20 8c   ...\<...@./... .
b220    85 00 21 58 00 30 20 82  0c 00 07 10 40 e0 27 88   ..!X.0 .....@.'.
b230    88 0d 29 59 ff 00 20 8c  85 00 21 58 00 30 38 8c   ..)Y.. ...!X.08.
b240    0e 00 07 10 00 30 20 82  0d 00 07 10 0e 00 70 8c   .....0 .......p.
b250    0c 20 23 90 0e 20 21 8c  0c 20 23 92 0c 16 78 5c   . #.. !.. #...x\
b260    34 20 03 32 10 e0 2b 90  0c e0 23 90 04 41 21 59   4 .2..+...#..A!Y
b270    0c e0 83 90 07 16 68 5c  04 16 90 5c d4 83 ff 09   .......\...\....
```

```
Mar 27 18:20 1996  image.txt Page 66

b280    07 00 39 59 8e 00 71 59  08 e0 23 90 04 16 78 5c   ..9Y..qY..#...x\
b290    d4 3f 01 35 3c 00 20 8c  10 00 71 3b 3c 00 20 8c   .?.5<. ...q;<. .
b2a0    8e 01 21 59 8e 00 71 59  00 30 28 80 00 00 00 20   ..!Y..qY.0(....
b2b0    ff 00 20 8c 85 00 29 58  3f 00 20 8c 85 00 21 58   .. ...)X?. ...!X
b2c0    00 30 20 82 00 00 00 20  00 30 20 8c 00 00 07 10   .0 .... .0 .....
b2d0    84 30 00 5a 00 00 18 8c  08 00 00 12 01 00 18 8c   .0.Z............
b2e0    8d ca 20 59 00 30 20 82  08 00 00 20 ff 00 20 8c   .. Y.0 .... .. .
b2f0    8e 00 21 58 00 30 20 82  0a 00 00 20 86 8d 2b 59   ..!X.0 .... ..+Y
b300    ff 00 20 8c 85 00 21 58  00 30 20 82 0c 00 00 20   .. ...!X.0 ....
b310    00 30 28 80 00 00 00 20  ff 00 20 8c 85 00 21 58   .0(.... .. ...!X
b320    82 09 21 58 00 30 20 82  00 00 00 20 00 30 20 90   ..!X.0 .... .0 .
b330    44 c9 05 10 18 20 01 32  00 30 28 90 44 c9 05 10   D.... .2.0(.D...
b340    04 60 21 90 01 20 21 8c  04 60 21 92 00 30 20 90   .`!.. !..`!..0 .
b350    44 c9 05 10 18 20 01 32  00 30 28 90 44 c9 05 10   D.... .2.0(.D...
b360    06 60 21 90 04 80 23 59  08 60 21 92 00 00 60 8c   .`!...#Y.`!.....
b370    00 00 00 0a 00 00 00 00  00 00 00 00 00 00 00 00   ................
b380    00 30 28 80 00 00 00 20  ff 00 20 8c 85 00 29 58   .0(.... .. ...)X
b390    3f 00 20 8c 85 00 21 58  86 09 21 58 00 30 20 82   ?. ...!X..!X.0 .
b3a0    00 00 00 20 00 30 28 80  72 c9 05 10 ff 00 20 8c   ... .0(.r..... .
b3b0    85 00 31 58 00 30 28 80  0e 00 00 20 85 00 21 58   ..1X.0(.... ..!X
b3c0    86 20 01 5a 90 02 00 12  00 30 28 80 72 c9 05 10   . .Z.....0(.r...
b3d0    ff 00 20 8c 85 00 21 58  08 0f 21 59 00 34 79 8c   .. ...!X..!Y.4y.
b3e0    00 00 07 10 02 e0 23 88  84 09 29 59 00 30 20 8c   ......#...)Y.0 .
b3f0    ff ff 00 00 85 00 39 58  01 e0 23 80 00 30 20 82   ......9X..#..0 .
b400    72 c9 05 10 3c 00 20 8c  14 00 39 3c ee 05 20 8c   r...<. ...9<.. .
b410    0c 00 39 39 00 d0 23 80  b4 20 01 37 00 30 28 80   ..99..#.. .7.0(.
b420    00 00 00 20 ff 00 20 8c  85 00 29 58 3f 00 20 8c   ... .. ...)X?. .
b430    85 00 21 58 00 30 20 82  00 00 00 20 00 d0 23 80   ..!X.0 .... ..#.
b440    14 20 31 30 00 30 20 80  71 c9 05 10 00 30 20 82   . 10.0 .q....0 .
b450    18 00 00 20 00 30 28 80  72 c9 05 10 ff 00 20 8c   ... .0(.r..... .
b460    85 00 21 58 81 09 31 59  00 30 28 8c 00 06 07 10   ..!X..1Y.0(.....
b470    00 30 20 8c 00 00 07 10  84 41 21 59 88 0d 29 59   .0 ......A!Y..)Y
b480    ff 00 20 8c 85 00 21 58  24 00 31 3b 00 30 20 8c   .. ...!X$.1;.0 .
b490    00 7d 07 10 88 0d 29 59  ff 00 20 8c 85 00 21 58   .}....)Y.. ...!X
b4a0    00 30 20 82 06 00 00 20  00 00 00 0a 00 30 28 80   .0 .... .....0(.
b4b0    72 c9 05 10 ff 00 20 8c  85 00 21 58 81 09 21 59   r..... ...!X..!Y
b4c0    00 30 20 82 06 00 00 20  00 00 00 0a 02 00 20 8c   .0 .... ...... .
b4d0    07 1b 80 5c 04 16 88 5c  58 a4 ff 09 10 16 70 5c   ...\...\X.....p\
b4e0    08 20 04 35 4c 01 00 08  04 e0 23 8c 04 16 18 5c   . .5L.....#....\
b4f0    04 c0 29 59 00 30 20 8c  00 7e 07 10 48 00 29 34   ..)Y.0 ..~..H.)4
```

Mar 27 18:20 1996   image.txt Page 67

```
b500   00 30 20 8c 00 7e 07 10  03 01 31 59 10 a0 23 90   .0 .. ....1Y..#.
b510   03 16 80 5c 04 16 88 5c  06 16 90 5c 34 81 ff 09   ...\...\...\4...
b520   86 c1 29 59 00 30 20 8c  ff ff 00 00 85 00 39 58   ..)Y.0 .......9X
b530   10 a0 23 90 04 80 21 59  10 a0 23 92 00 30 18 8c   ..#...!Y..#..0..
b540   00 06 07 10 10 a0 23 90  03 16 80 5c 04 16 88 5c   ......#....\...\
b550   07 16 90 5c fc 80 ff 09  10 a0 23 90 04 c0 21 59   ...\......#...!Y
b560   10 a0 23 92 01 00 28 8c  14 a0 23 90 0d 20 29 82   ..#...(...#.. ).
b570   0e 16 80 5c 8c e1 ff 09  00 30 28 80 00 00 00 20   ...\.....0(....
b580   ff 00 20 8c 85 00 29 58  31 00 20 8c 85 00 21 58   .. ...)X?. ...!X
b590   00 30 20 82 00 00 00 20  00 30 28 80 72 c9 05 10   .0 .... .0(.r...
b5a0   ff 00 20 8c 85 00 21 58  81 09 31 59 00 30 28 8c   .. ...!X..1Y.0(.
b5b0   00 06 07 10 00 30 20 8c  00 00 07 10 84 41 21 59   .....0 ......A!Y
b5c0   88 0d 29 59 ff 00 20 8c  85 00 21 58 24 00 31 3b   ..)Y.. ...!X9.1;
b5d0   00 30 20 8c 00 7d 07 10  88 0d 29 59 ff 00 20 8c   .0 ..}....)Y.. .
b5e0   85 00 21 58 00 30 20 82  06 00 00 20 20 00 00 08   ..!X.0 ....  ...
b5f0   00 30 28 80 72 c9 05 10  ff 00 20 8c 85 00 21 58   .0(.r..... ...!X
b600   81 09 21 59 00 30 20 82  06 00 00 20 00 30 28 80   ..!Y.0 .... .0(.
b610   00 00 00 20 ff 00 20 8c  85 00 29 58 3f 00 20 8c   ... .. ...)X?. .
b620   85 00 21 58 86 09 21 58  00 30 20 82 00 00 00 20   ..!X..!X.0 ....
b630   00 30 28 80 72 c9 05 10  ff 00 20 8c 85 00 31 58   .0(.r..... ...1X
b640   00 30 28 80 0e 00 00 20  85 00 21 58 86 20 01 5a   .0(.... ..!X. .Z
b650   78 fd ff 15 00 30 28 80  00 00 00 20 ff 00 20 8c   x....0(.... .. .
b660   85 00 29 58 3f 00 20 8c  85 00 21 58 00 30 20 82   ..)X?. ...!X.0 .
b670   00 00 00 20 00 00 00 0a  00 00 00 00 00 00 00 00   ... ............
b680   10 16 28 5c 00 00 18 8c  98 d9 ff 09 10 16 38 5c   ..(\..........8\
b690   03 16 20 5c 00 30 20 82  14 00 00 20 00 30 20 82   .. \.0 .... .0 .
b6a0   16 00 00 20 24 60 11 30  00 30 28 80 0e 00 00 20   ... $`.0.0(....
b6b0   ff 00 20 8c 85 00 21 58  84 90 22 58 0c 20 01 3d   .. ...!X.."X. .=
b6c0   01 00 18 8c 08 00 00 08  00 00 18 8c 02 00 20 8c   .............. .
b6d0   00 30 20 82 1a 00 00 20  22 00 20 8c 00 30 20 82   .0 .... ". .0 .
b6e0   00 00 00 20 9c fc ff 09  10 00 20 8c 00 30 20 82   ... ...... .0 .
b6f0   0e 00 00 20 00 00 20 8c  00 30 20 82 1a 00 00 20   ... .. .0 ....
b700   10 e0 00 3a 26 00 20 8c  00 30 20 82 00 00 00 20   ...:&. .0 ....
b710   00 00 20 8c 00 30 20 8a  52 c9 05 10 00 30 20 90   .. .0 .R....0 .
b720   4c c9 05 10 1c 20 01 32  00 30 80 90 48 c9 05 10   L.... .2.0..H...
b730   40 85 ff 09 00 00 20 8c  00 30 20 92 4c c9 05 10   @..... .0 .L...
b740   00 00 20 8c 00 30 20 82  08 00 00 40 07 16 80 5c   .. .0 ....@...\
b750   f0 d8 ff 08 00 00 00 00  00 00 00 00 00 00 00 00   ................
b760   40 60 08 8c 40 e0 87 b2  50 e0 a7 b2 70 e0 e7 a2   @`..@...P...p...
b770   00 1e f0 5c 01 00 20 8c  00 30 20 82 04 00 00 40   ...\.. .0 ....@
```

```
Mar 27 10:20 1996  image.txt Page 68

b780    00 30 28 80 00 00 00 20  ff 00 20 8c 85 00 19 58   .0(...........X
b790    00 30 28 80 00 00 00 20  85 00 29 58 3f 00 20 8c   .0(.......)X?. .
b7a0    85 00 21 58 00 30 20 82  00 00 00 20 00 30 28 80   ..!X.0 ..... .0(.
b7b0    0e 00 00 20 ff 00 20 8c  85 00 29 58 05 16 58 5c   ... .. ...)X..X\
b7c0    00 30 20 82 0e 00 00 20  1c 60 01 3d 00 30 18 82   .0 ..... .`.=.0..
b7d0    00 00 00 20 40 e0 87 b0  50 e0 a7 b0 70 e0 e7 a0   ... @...P...p...
b7e0    00 00 00 0a 08 e0 01 30  98 fb ff 09 34 e0 09 30   .......0....4..0
b7f0    00 00 20 8c 00 30 20 8a  52 c9 05 10 00 30 28 88   .. ..0 .R....0(.
b800    54 c9 05 10 00 30 20 8c  ff ff 00 00 85 00 21 58   T....0 .......!X
b810    10 20 01 3a 01 00 20 8c  00 30 20 92 64 0e 06 10   . .:.. ..0 .d...
b820    1c e0 11 30 01 00 20 8c  00 30 20 82 08 00 00 40   ...0.. ..0 ....@
b830    00 00 20 8c 00 30 20 82  08 00 00 40 4c e0 19 30   .. ..0 ....@L..0
b840    01 00 20 8c 00 30 20 82  08 00 00 40 00 00 20 8c   .. ..0 ....@.. .
b850    00 30 20 8a 52 c9 05 10  00 30 28 88 54 c9 05 10   .0 .R....0(.T...
b860    00 30 20 8c ff ff 00 00  85 00 21 58 10 20 01 3a   .0 .......!X. .:
b870    01 00 20 8c 00 30 20 92  64 0e 06 10 00 00 20 8c   .. ..0 .d..... .
b880    00 30 20 82 08 00 00 40  38 e0 21 30 01 00 20 8c   .0 ....@8.!0.. .
b890    00 30 20 82 08 00 00 40  21 00 20 8c 00 30 20 82   .0 ....@!. ..0 .
b8a0    00 00 00 20 00 30 28 8c  80 b6 00 00 02 00 20 8c   ... .0(....... .
b8b0    05 16 80 5c 03 16 88 5c  04 16 90 5c 94 83 ff 09   ...\...\...\....
b8c0    00 00 20 8c 00 30 20 82  04 00 00 40 00 30 18 82   .. ..0 ....@.0..
b8d0    00 00 00 20 40 e0 87 b0  50 e0 a7 b0 70 e0 e7 a0   ... @...P...p...
b8e0    00 00 00 0a 00 00 00 00  00 00 00 00 00 00 00 00   ................
b8f0    30 d7 ff 09 10 16 18 5c  00 00 20 8c 00 30 20 92   0......\.. ..0 .
b900    4c c9 05 10 00 30 28 80  00 00 00 20 ff 00 20 8c   L....0(.... .. .
b910    85 00 29 58 3f 00 20 8c  85 00 21 58 00 30 20 82   ..)X?. ...!X.0 .
b920    00 00 00 20 00 30 28 80  08 00 00 20 ff 00 20 8c   ... .0(.... .. .
b930    85 00 21 58 84 50 22 58  0c 20 01 3d 74 f7 ff 09   ..!X.P"X. .=t...
b940    70 f2 ff 09 00 00 20 8c  00 30 20 8a 52 c9 05 10   p..... ..0 .R...
b950    00 30 28 88 54 c9 05 10  00 30 20 8c ff ff 00 00   .0(.T....0 .....
b960    85 00 21 58 10 20 01 3a  01 00 20 8c 00 30 20 92   ..!X. .:.. ..0 .
b970    64 0e 06 10 03 16 80 5c  c8 d6 ff 08 00 00 00 00   d......\........
b980    49 6e 69 74 53 54 6e 69  63 3a 20 45 72 72 6f 72   InitSTnic: Error
b990    20 21 21 20 61 6c 69 67  6e 6d 65 6e 74 0a 00 00    !! alignment...
b9a0    a0 00 00 09 2c 73 ff 09  00 30 80 ca d0 cf 05 10   ....,s...0......
b9b0    70 01 00 09 0c 01 00 09  28 02 00 09 c4 02 00 09   p.......(.......
b9c0    40 03 00 09 ec 07 00 09  38 08 00 09 00 30 18 90   @.......8....0..
b9d0    88 c9 05 10 00 30 78 90  e0 cf 05 10 00 30 38 90   .....0x......08.
b9e0    10 d0 05 10 01 00 30 8c  65 00 28 8c 64 00 20 8c   ......0.e.(.d. .
b9f0    03 16 80 5c 0f 16 88 5c  07 16 90 5c 06 16 98 5c   ...\...\...\...\
```

Mar 27 18:20 1996  image.txt Page 69

```
ba00    05 16 a0 5c 04 16 a8 5c  48 08 00 09 00 30 38 8c   ...\...\H....08.
ba10    d0 cf 05 10 00 30 30 8c  18 d0 05 10 01 00 28 8c   .....00.......(.
ba20    00 30 20 8c ff ff ff ff  07 16 80 5c 06 16 88 5c   .0 ........\...\
ba30    05 16 90 5c 04 16 98 5c  78 6e ff 08 00 00 00 00   ...\...\xn......
ba40    00 00 20 8c 00 30 20 92  d4 cf 05 10 00 30 20 8c   .. ..0 ......0 .
ba50    70 bd 00 00 00 30 20 92  d8 cf 05 10 01 00 20 8c   p....0 ....... .
ba60    00 30 20 ca 1c d0 05 10  00 30 80 8c 20 d0 05 10   .0 ......0.. ...
ba70    30 00 00 09 ee 05 20 8c  00 30 20 92 b0 cf 05 10   0..... ..0 .....
ba80    00 30 20 8c b0 c9 05 10  00 30 20 92 b8 cf 05 10   .0 ......0 .....
ba90    00 00 20 8c 00 30 20 92  a0 c9 05 10 00 00 00 0a   .. ..0 .........
baa0    00 dc ff 09 08 20 04 3d  00 00 00 0a 00 30 80 8c   ..... .=.....0..
bab0    30 c5 00 00 ec 7a ff 09  01 00 80 8c 24 7d ff 08   0....z......$}..
bac0    20 60 08 8c 00 30 30 8c  d0 cf 05 10 00 30 28 8c    `...00......0(.
bad0    18 c3 00 00 00 30 20 8c  94 c9 05 10 06 16 80 5c   .....0 ........\
bae0    05 16 88 5c 04 16 90 5c  38 5c ff 09 18 20 04 3e   ...\...\8\... .>
baf0    00 30 80 8c 70 c4 00 00  a8 7a ff 09 01 00 80 8c   .0..p....z......
bb00    e0 7c ff 09 00 30 20 90  94 c9 05 10 00 30 20 92   .|...0 ......0 .
bb10    88 c9 05 10 00 00 00 0a  00 00 00 00 00 00 00 00   ................
bb20    30 60 08 8c 00 30 30 8c  d0 cf 05 10 00 30 28 8c   0`...00......0(.
bb30    20 c3 00 00 00 30 20 8c  90 c9 05 10 06 16 80 5c    ....0 ........\
bb40    05 16 88 5c 04 16 90 5c  d8 5b ff 09 18 20 04 3e   ...\...\.[... .>
bb50    00 30 80 8c b0 c4 00 00  48 7a ff 09 01 00 80 8c   .0......Hz......
bb60    80 7c ff 09 50 e0 37 8c  00 30 28 8c 28 c3 00 00   .|..P.7..0(.(...
bb70    01 00 20 8c 06 16 80 5c  05 16 88 5c 04 16 90 5c   .. ....\...\...\
bb80    c0 41 02 09 00 30 30 8c  d0 cf 05 10 50 e0 2f 8c   .A...00.....P./.
bb90    40 e0 27 8c 06 16 80 5c  05 16 88 5c 04 16 90 5c   @.'....\...\...\
bba0    80 5b ff 09 18 20 04 3e  00 30 80 8c d0 c4 00 00   .[... .>.0......
bbb0    f0 79 ff 09 01 00 80 8c  28 7c ff 09 40 e0 27 90   .y......(|..@.'.
bbc0    00 30 20 92 80 c9 05 10  01 00 80 8c 24 03 00 09   .0 .........$...
bbd0    90 03 00 09 00 00 00 0a  00 00 00 00 00 00 00 00   ................
bbe0    10 60 08 8c 00 30 30 8c  d0 cf 05 10 00 30 28 8c   .`...00......0(.
bbf0    d0 c3 00 00 00 30 20 8c  98 c9 05 10 06 16 80 5c   .....0 ........\
bc00    05 16 88 5c 04 16 90 5c  18 5b ff 09 18 20 04 3e   ...\...\.[... .>
bc10    00 30 80 8c 00 c5 00 00  88 79 ff 09 01 00 80 8c   .0.......y......
bc20    c0 7b ff 09 00 30 80 90  98 c9 05 10 94 03 00 09   .{...0..........
bc30    00 00 18 8c 00 30 30 8c  d0 cf 05 10 00 30 28 8c   .....00......0(.
bc40    d8 c3 00 00 40 e0 27 8c  06 16 80 5c 05 16 88 5c   ....@.'....\...\
bc50    04 16 90 5c cc 5a ff 09  18 20 04 3e 00 30 80 8c   ...\.Z... .>.0..
bc60    20 c4 00 00 3c 79 ff 09  01 00 80 8c 74 7b ff 09    ...<y......t{..
bc70    01 e0 20 8c 04 16 18 5c  bc 3f 09 39 00 00 00 0a   .. ....\.?.9....
```

Mar 27 16:20 1996 image.txt Page 70

```
bc80     00 30 30 90 98 c9 05 10  00 30 28 8c 02 53 00 00    .00.......0(..S..
bc90     00 30 20 8c cc c3 00 00  06 16 80 5c 05 16 88 5c    .0 ........\...\
bca0     04 16 90 5c ac 6a ff 09  18 20 04 3e 00 30 80 8c    ...\.j... .>.0..
bcb0     50 c3 00 00 ec 78 ff 09  01 00 80 8c 24 7b ff 09    P....x......${..
bcc0     00 30 16 90 98 c9 05 10  00 30 38 8c 4a d0 05 10    .0.......08.J...
bcd0     00 30 30 8c 4e d0 05 10  00 30 28 8c 52 d0 05 10    .00.N....0(.R...
bce0     00 30 20 8c 56 d0 05 10  03 16 80 5c 07 16 88 5c    .0 .V......\...\
bcf0     06 16 90 5c 03 16 98 5c  04 16 a0 5c 44 03 00 08    ...\...\...\D...
bd00     00 30 30 8c d0 cf 05 10  00 30 28 8c a8 c3 00 00    .00......0(.....
bd10     00 30 20 8c 9c c9 05 10  06 16 80 5c 05 16 88 5c    .0 ........\...\
bd20     04 16 90 5c fc 59 ff 09  18 20 04 3e 00 30 80 8c    ...\.Y... .>.0..
bd30     90 c4 00 00 6c 78 ff 09  01 00 80 8c a4 7a ff 09    ....lx......z..
bd40     00 30 20 90 9c c9 05 10  00 30 20 92 98 07 06 10    .0 ......0 .....
bd50     00 30 20 90 9c c9 05 10  00 30 20 92 18 d0 05 10    .0 ......0 .....
bd60     00 00 00 0a 00 00 00 00  00 00 00 00 00 00 00 00    ................
bd70     ee 05 20 8c 00 30 20 92  b0 cf 05 10 00 30 20 8c    .. ..0 ......0 .
bd80     b0 c9 05 10 00 30 20 92  b8 cf 05 10 00 30 20 c8    .....0 ......0 .
bd90     1e d0 05 10 70 20 01 30  00 30 20 c8 1e d0 05 10    ....p .0.0 .....
bda0     00 0e 21 58 00 30 20 ca  1e d0 05 10 00 00 20 8c    ..!X.0 ....... .
bdb0     00 30 20 92 a0 c9 05 10  00 30 38 90 18 d0 05 10    .0 ......08.....
bdc0     00 30 30 8c a0 cf 05 10  00 30 28 8c b0 cf 05 10    .00......0(.....
bdd0     00 30 20 8c a0 c9 05 10  07 16 80 5c 06 16 88 5c    .0 ........\...\
bde0     05 16 90 5c 04 16 98 5c  08 61 ff 09 18 20 04 3e    ...\...\.a... .>
bdf0     00 30 80 8c e0 c3 00 00  98 00 00 09 01 00 80 8c    .0..............
be00     e0 00 00 09 00 30 30 90  80 0e 06 10 00 30 28 90    .....00......0(.
be10     b8 cf 05 10 00 30 80 90  80 0e 06 10 34 48 02 0b    .....0......4H..
be20     10 16 20 5c 06 16 80 5c  05 16 88 5c 04 16 90 5c    .. \...\...\...\
be30     9c 47 02 0b 08 20 04 3d  18 11 01 08 00 30 38 8c    .G... .=.....08.
be40     d0 cf 05 10 00 30 30 8c  18 d0 05 10 01 00 28 8c    .....00.......(.
be50     00 30 20 8c ff ff ff ff  07 16 80 5c 06 16 88 5c    .0 ........\...\
be60     05 16 90 5c 04 16 98 5c  48 64 ff 08 00 00 00 00    ...\...\Hd......
be70     b0 d0 ff 09 00 30 80 90  94 c9 05 10 b4 5d ff 08    .....0.......]..
be80     00 00 00 0a 00 00 00 00  00 00 00 00 00 00 00 00    ................
be90     70 60 08 8c 10 16 30 5c  40 e0 2f 8c 00 30 20 8c    p`....0\@./..0 .
bea0     70 0e 06 10 05 16 80 5c  04 16 88 5c 14 46 02 0b    p......\...\.F..
beb0     05 16 80 5c 06 16 88 5c  b0 45 02 0b 00 30 20 8c    ...\...\.E...0 .
bec0     24 c5 00 00 05 16 80 5c  04 16 88 5c 9c 45 02 0b    $......\...\.E..
bed0     00 00 00 0a 00 00 00 00  00 00 00 00 00 00 00 00    ................
bee0     00 79 ff 08 00 00 00 00  00 00 00 00 00 00 00 00    .y..............
bef0     20 60 08 8c 10 20 04 3a  00 30 18 8c 11 41 00 00     `... .:.0...A..
```

```
Mar 27 18:20 1996   image.txt Page 71

bf00    0c 00 00 08 00 30 18 8c  12 41 00 00 40 e0 ff 92   ......0...A..@...
bf10    50 e0 27 8c 4c e0 27 92  0a 00 20 8c 48 e0 27 92   P.'.L.'... .H.'.
bf20    00 30 30 90 80 c9 05 10  00 30 28 8c 08 53 00 00   .00......0(..S..
bf30    40 e0 27 8c 06 16 80 5c  05 16 88 5c 04 16 90 5c   @.'....\...\...\
bf40    10 68 ff 09 08 20 04 39  00 00 00 0a 00 30 80 8c   .h... .9.....0..
bf50    90 c3 00 00 4c 76 ff 09  00 00 00 0a 00 00 00 00   ....Lv..........
bf60    20 60 08 8c 0a 00 20 8c  40 e0 27 92 50 e0 27 8c    `.... .@.'.P.'.
bf70    4c e0 27 92 0a 00 20 8c  48 e0 27 92 00 30 30 90   L.'... .H.'..00.
bf80    80 c9 05 10 00 30 28 8c  08 53 00 00 40 e0 27 8c   .....0(..S..@.'.
bf90    06 16 80 5c 05 16 88 5c  04 16 90 5c b4 67 ff 09   ...\...\...\.g..
bfa0    08 20 04 39 00 00 00 0a  00 30 80 8c b0 c3 00 00   . .9.....0......
bfb0    f0 75 ff 09 01 00 80 8c  28 78 ff 09 00 00 00 0a   .u......(x......
bfc0    20 60 08 8c 10 16 38 5c  00 30 20 8c 07 44 00 00    `....8\.0 ..D..
bfd0    40 e0 27 92 50 e0 37 8c  00 30 28 8c 60 ec 05 10   @.'.P.7..0(.`...
bfe0    06 00 20 8c 06 16 80 5c  05 16 88 5c 04 16 90 5c   .. ....\...\...\
bff0    b8 55 ff 0b 06 16 20 5c  4c e0 27 92 06 00 20 8c   .U.... \L.'... .
c000    48 e0 27 92 00 30 28 8c  08 53 00 00 40 e0 27 8c   H.'..0(..S..@.'.
c010    07 16 80 5c 05 16 88 5c  04 16 90 5c 34 67 ff 09   ...\...\...\4g..
c020    08 20 04 39 00 00 00 0a  00 30 80 8c 00 c4 00 00   . .9.....0......
c030    70 75 ff 09 01 00 80 8c  a8 77 ff 09 00 00 00 0a   pu.......w......
c040    40 60 08 8c 10 16 78 5c  12 16 38 5c 13 16 30 5c   @`....x\..8\..0\
c050    14 16 18 5c 50 e0 2f 8c  04 00 20 8c 11 16 80 5c   ...\P./... ....\
c060    05 16 88 5c 04 16 90 5c  e8 75 ff 09 54 e0 2f 8c   ...\...\.u..T./.
c070    07 16 80 5c 05 16 88 5c  04 16 90 5c d4 75 ff 09   ...\...\...\.u..
c080    58 e0 2f 8c 06 16 80 5c  05 16 88 5c 04 16 90 5c   X./....\...\...\
c090    c0 75 ff 09 00 30 20 8c  02 52 00 00 40 e0 27 92   .u...0 ..R..@.'.
c0a0    00 00 20 8c 44 e0 27 92  10 00 20 8c 48 e0 27 92   .. .D.'... .H.'.
c0b0    50 e0 27 8c 4c e0 27 92  00 30 28 8c 08 53 00 00   P.'.L.'..0(..S..
c0c0    40 e0 27 8c 0f 16 80 5c  05 16 88 5c 04 16 90 5c   @.'....\...\...\
c0d0    80 66 ff 09 10 20 04 3e  00 30 80 8c 70 c3 00 00   .f... .>.0..p...
c0e0    10 77 ff 09 60 e0 2f 8c  04 00 20 8c 05 16 80 5c   .w..`./... ....\
c0f0    04 16 88 5c 6c 75 ff 09  64 e0 2f 8c 05 16 80 5c   ...\lu..d./....\
c100    04 16 88 5c 5c 75 ff 09  68 e0 2f 8c 05 16 80 5c   ...\\u..h./....\
c110    04 16 88 5c 4c 75 ff 09  60 e0 2f 8c 05 16 80 5c   ...\Lu..`./....\
c120    03 16 88 5c 04 16 90 5c  58 42 02 0b 08 20 04 3d   ...\...\XB... .=
c130    00 00 00 0a 6c e0 2f 8c  04 00 20 8c 03 16 80 5c   ....l./... ....\
c140    05 16 88 5c 04 16 90 5c  08 75 ff 09 00 30 20 8c   ...\...\.u...0 .
c150    04 52 00 00 40 e0 27 92  00 00 20 8c 44 e0 27 92   .R..@.'... .D.'.
c160    20 00 20 8c 48 e0 27 92  60 e0 27 8c 4c e0 27 92    . .H.'.`.'.L.'.
c170    00 30 28 8c 08 53 00 00  40 e0 27 8c 0f 16 80 5c   .0(..S..@.'....\
```

Mar 27 18:20 1996 image.txt Page 72

```
c180    05 16 88 5c 04 16 90 5c  c8 65 ff 09 08 20 04 39   ...\...\.e... .9
c190    00 00 00 0a 00 30 80 8c  30 c3 00 00 54 76 ff 09   .....0..0...Tv..
c1a0    00 00 00 0a 00 00 00 00  00 00 00 00 00 00 00 00   ................
c1b0    00 30 30 90 94 c9 05 10  00 30 28 8c 0c 53 00 00   .00......0(..S..
c1c0    00 30 20 90 80 c9 05 10  06 16 80 5c 05 16 88 5c   .0 ........\...\
c1d0    04 16 90 5c 7c 65 ff 09  00 30 80 92 e0 cf 05 10   ...\|e...0......
c1e0    08 20 04 39 00 00 00 0a  00 30 80 8c e0 c2 00 00   . .9.....0......
c1f0    60 73 ff 09 01 00 80 8c  e8 75 ff 08 00 00 00 00   `s.......u......
c200    00 30 30 90 94 c9 05 10  00 30 28 8c 0c 53 00 00   .00......0(..S..
c210    00 30 20 90 98 c9 05 10  06 16 80 5c 05 16 88 5c   .0 ........\...\
c220    04 16 90 5c 2c 65 ff 09  00 30 80 92 10 d0 05 10   ...\,e...0......
c230    08 20 04 39 00 00 00 0a  00 30 80 8c 00 c3 00 00   . .9.....0......
c240    60 73 ff 09 01 00 80 8c  98 75 ff 08 00 00 00 00   `s.......u......
c250    30 60 08 8c 54 e0 9f 92  58 e0 8f 92 5c e0 97 92   0`..T...X...\...
c260    60 e0 a7 c2 61 e0 af c2  00 30 20 8c 01 59 00 00   `...a....0 ..Y..
c270    40 e0 27 92 00 00 20 8c  44 e0 27 92 20 00 20 8c   @.'... .D.'. . .
c280    48 e0 27 92 50 e0 27 8c  4c e0 27 92 08 20 04 35   H.'.P.'.L.'.. .5
c290    00 00 00 0a 00 30 30 90  88 c9 05 10 00 30 28 8c   .....00......0(.
c2a0    08 53 00 00 40 e0 27 8c  06 16 80 5c 05 16 88 5c   .S..@.'....\...\
c2b0    04 16 90 5c 9c 64 ff 09  08 20 04 39 00 00 00 0a   ...\.d... .9....
c2c0    00 30 80 8c 40 c4 00 00  d8 72 ff 09 01 00 80 8c   .0..@....r......
c2d0    10 75 ff 09 00 00 00 0a  00 00 00 00 00 00 00 00   .u..............
c2e0    4c 69 6e 6b 20 6f 66 20  6d 66 20 66 61 69 6c 65   Link of mf faile
c2f0    64 00 00 00 00 00 00 00  00 00 00 00 00 00 00 00   d...............
c300    4c 69 6e 6b 20 6f 66 20  52 6c 78 45 70 69 20 66   Link of RlxEpi f
c310    61 69 6c 65 64 00 00 00  66 6d 6e 67 00 00 00 00   ailed...fmng....
c320    6d 66 78 00 00 00 00 00  6d 66 78 25 64 00 00 00   mfx.....mfx%d...
c330    52 6c 78 45 70 69 20 63  6f 6e 66 69 67 20 65 72   RlxEpi config er
c340    72 6f 72 0a 00 00 00 00  00 00 00 00 00 00 00 00   ror.............
c350    50 75 73 68 20 6f 66 20  52 6c 78 45 70 69 20 6d   Push of RlxEpi m
c360    6f 64 75 6c 65 20 66 61  69 6c 65 64 00 00 00 00   odule failed....
c370    52 6c 78 45 70 69 20 69  66 20 63 6f 6e 66 69 67   RlxEpi if config
c380    20 65 72 72 6f 72 0a 00  00 00 00 00 00 00 00 00    error..........
c390    75 69 20 3a 20 44 74 72  20 63 68 61 6e 67 65 20   ui : Dtr change
c3a0    66 61 69 6c 65 64 00 00  63 6f 6e 66 00 00 00 00   failed..conf....
c3b0    75 69 20 3a 20 69 6e 69  74 20 66 61 78 20 6d 6f   ui : init fax mo
c3c0    64 65 6d 20 66 61 69 6c  65 64 00 00 65 70 69 00   dem failed..epi.
c3d0    65 74 30 00 00 00 00 00  65 74 30 30 31 00 00 00   et0.....et001...
c3e0    65 72 72 6f 72 20 72 65  61 64 69 6e 67 20 72 65   error reading re
c3f0    71 75 65 73 74 00 00 00  00 00 00 00 00 00 00 00   quest...........
```

```
Mar 27 18:20 1996  image.txt Page 73

c400    45 74 30 20 73 65 74 20  61 64 64 72 20 66 61 69   Et0 set addr fai
c410    6c 65 64 00 00 00 00 00  00 00 00 00 00 00 00 00   led.............
c420    45 72 72 6f 72 20 6f 70  65 6e 69 6e 67 20 6f 66   Error opening of
c430    20 65 74 30 30 31 00 00  00 00 00 00 00 00 00 00    et001..........
c440    45 72 72 6f 72 20 69 6e  20 53 57 49 54 43 46 20   Error in SWITCF
c450    63 6f 6e 66 69 67 0a 20  00 00 00 00 00 00 00 00   config. ........
c460    73 74 61 72 74 20 73 65  74 75 70 00 00 00 00 00   start setup.....
c470    45 72 72 6f 72 20 6f 70  65 6e 69 6e 67 20 63 6f   Error opening co
c480    6e 74 72 6f 6c 20 6f 66  20 74 33 30 00 00 00 00   ntrol of t30....
c490    45 72 72 6f 72 20 6f 70  65 6e 69 6e 67 20 63 6f   Error opening co
c4a0    6e 74 72 6f 6c 20 6f 66  20 63 6f 6e 66 00 00 00   ntrol of conf...
c4b0    45 72 72 6f 72 20 6f 70  65 6e 69 6e 67 20 63 6f   Error opening co
c4c0    6e 74 72 6f 6c 20 6f 66  20 63 6c 61 73 73 31 00   ntrol of class1.
c4d0    45 72 72 6f 72 20 6f 70  65 6e 69 6e 67 20 63 6f   Error opening co
c4e0    6e 74 72 6f 6c 20 6f 66  20 43 6c 61 73 73 31 20   ntrol of Class1
c4f0    00 00 00 00 00 00 00 00  00 00 00 00 00 00 00 00   ................
c500    45 72 72 6f 72 20 6f 70  65 6e 69 6e 67 20 63 6f   Error opening co
c510    6e 74 72 6f 6c 20 6f 66  20 65 74 68 65 72 6e 65   ntrol of etherne
c520    74 00 00 00 0a 0a 00 00  00 00 00 00 00 00 00 00   t...............
c530    4e 6f 74 20 65 6e 6f 75  67 68 74 20 62 79 74 65   Not enought byte
c540    73 20 72 65 61 64 20 66  72 6f 6d 20 6d 61 6e 61   s read from mana
c550    67 65 6d 6e 65 74 20 64  61 74 61 62 61 73 65 00   gemnet database.
c560    70 60 08 8c 10 16 38 5c  00 00 28 8c 00 30 20 8c   p'....8\..(..0 .
c570    03 1c 00 00 05 16 88 5c  04 16 90 5c 9c 4f ff 0b   .......\...\.O..
c580    05 16 20 5c 2a e0 21 82  2b e0 21 82 2c e0 21 82   .. \*.!.+.!.,.!.
c590    2d e0 21 82 2e e0 21 82  2f e0 21 82 30 e0 21 82   -.!...!./.!.0.!.
c5a0    31 e0 21 82 36 e0 21 82  37 e0 21 82 38 e0 21 82   1.!.6.!.7.!.8.!.
c5b0    39 e0 21 82 f4 01 20 8c  3a e0 21 92 3e e0 29 8c   9.!... .:.!.>.).
c5c0    00 30 20 8c 68 c7 00 00  05 16 80 5c 04 16 88 5c   .0 .h......\...\
c5d0    f0 3e 02 0b 49 e0 29 8c  00 30 20 8c 70 c7 00 00   .>..I.)..0 .p...
c5e0    05 16 80 5c 04 16 88 5c  d8 3e 02 0b 5e e0 29 8c   ...\...\.>..^.).
c5f0    00 30 20 8c 60 c7 00 00  05 16 80 5c 04 16 88 5c   .0 .`......\...\
c600    c0 3e 02 0b 69 e0 29 8c  00 30 20 8c 90 c7 00 00   .>..i.)..0 .....
c610    05 16 80 5c 04 16 88 5c  a8 3e 02 0b 6b e0 29 8c   ...\...\.>..k.).
c620    00 30 20 8c 78 c7 00 00  05 16 80 5c 04 16 88 5c   .0 .x......\...\
c630    90 3e 02 0b 6d e0 31 8c  7a e0 29 8c 00 30 20 8c   .>..m.1.z.)..0 .
c640    5c c7 00 00 05 16 80 5c  04 16 88 5c 74 3e 02 0b   \......\...\t>..
c650    7c e0 29 8c 00 30 20 8c  74 c7 00 00 05 16 80 5c   |.)..0 .t......\
c660    04 16 88 5c 5c 3e 02 0b  00 30 20 8c 88 c7 00 00   ...\\>...0 .....
c670    06 16 80 5c 04 16 88 5c  48 3e 02 0b 00 f4 29 8c   ...\...\H>....).
```

```
Mar 27 16:20 1996   image.txt Page 74

c680    f3 16 00 00 00 30 20 8c  80 c7 00 00 05 16 80 5c   .....O ........\
c690    04 16 88 5c 2c 3e 02 0b  16 e0 29 8c 00 30 20 8c   ...\,>....)..0 .
c6a0    40 c7 00 00 05 16 80 5c  04 16 88 5c 14 3e 02 0b   @.......\...\.>..
c6b0    02 e0 29 8c 00 30 20 8c  50 c7 00 00 05 16 80 5c   ..)..0 .P.......\
c6c0    04 16 88 5c 1c 3d 02 0b  0c e0 29 8c 00 30 20 8c   ...\.=....)..0 .
c6d0    58 c7 00 00 05 16 80 5c  04 16 88 5c dc 3d 02 0b   X.......\...\.=..
c6e0    11 16 78 5c 10 16 38 5c  00 00 18 8c 03 16 30 5c   ..x\..8\......0\
c6f0    1c 60 04 3b 00 d0 21 80  06 00 31 59 01 e0 20 8c   .`.;..!...1Y.. .
c700    04 16 18 5c 01 e0 39 8c  ec df 23 3c 00 30 20 8c   ...\..9...#<.0 .
c710    ff ff 00 00 1c 00 31 36  10 8c 21 59 06 00 29 59   ......16..!Y..)Y
c720    05 16 30 5c 00 30 20 dc  ff ff 00 00 ec ff 29 31   ..0\.0 .......)1
c730    06 16 80 5c 00 00 00 0a  00 00 00 00 00 00 00 00   ...\............
c740    50 41 53 53 61 46 41 58  00 00 00 00 00 00 00 00   PASSaFAX........
c750    31 2e 31 2e 32 00 00 00  31 2e 30 00 59 00 00 00   1.1.2...1.0.Y...
c760    39 2c 00 00 00 00 00 00  50 53 54 4e 00 00 00 00   9,......PSTN....
c770    20 00 00 00 4e 00 00 00  23 00 00 00 00 00 00 00    ...N...#.......
c780    45 50 52 4f 4d 00 00 00  73 79 73 74 65 6d 00 00   EPROM...system..
c790    2a 00 00 00 00 00 00 00  00 00 00 00 00 00 00 00   *...............
c7a0    10 16 68 5c 1a 20 24 80  3c 20 19 30 00 00 78 8c   ..h\. $.< .0..x.
c7b0    02 00 e8 8c ff 00 38 8c  f5 00 30 8c 0f 16 28 5c   ......8...0...(\
c7c0    05 16 20 5c 0d 16 80 5c  0f 16 88 5c 1d 16 90 5c   .. \...\...\...\
c7d0    07 16 98 5c 06 16 a0 5c  05 16 a8 5c 04 16 b0 5c   ...\...\...\...\
c7e0    90 27 02 08 01 00 18 8c  04 00 70 8c ff 00 38 8c   .'........p...8.
c7f0    f5 00 30 8c 07 16 28 5c  f2 00 20 8c 0d 16 80 5c   ..0...(\.. ....\
c800    03 16 88 5c 0e 16 90 5c  07 16 98 5c 06 16 a0 5c   ...\...\...\...\
c810    05 16 a8 5c 04 16 b0 5c  58 27 02 08 00 00 00 00   ...\...\X'......
c820    10 16 68 5c 1a 20 24 80  3c 20 19 30 00 00 78 8c   ..h\. $.< .0..x.
c830    02 00 e8 8c ff 00 38 8c  f6 00 30 8c 0f 16 28 5c   ......8...0...(\
c840    05 16 20 5c 0d 16 80 5c  0f 16 88 5c 1d 16 90 5c   .. \...\...\...\
c850    07 16 98 5c 06 16 a0 5c  05 16 a8 5c 04 16 b0 5c   ...\...\...\...\
c860    10 27 02 08 01 00 18 8c  04 00 70 8c ff 00 38 8c   .'........p...8.
c870    f6 00 30 8c 07 16 28 5c  f2 00 20 8c 0d 16 80 5c   ..0...(\.. ....\
c880    03 16 88 5c 0e 16 90 5c  07 16 98 5c 06 16 a0 5c   ...\...\...\...\
c890    05 16 a8 5c 04 16 b0 5c  d8 26 02 08 00 00 00 00   ...\...\.&......
c8a0    00 00 18 8c 02 00 78 8c  ff 00 38 8c f3 00 30 8c   ......x...8...0.
c8b0    03 16 28 5c 03 16 20 5c  03 16 88 5c 0f 16 90 5c   ..(\.. \...\...\
c8c0    07 16 98 5c 06 16 a0 5c  05 16 a8 5c 04 16 b0 5c   ...\...\...\...\
c8d0    a0 26 02 08 00 00 00 00  00 00 00 00 00 00 00 00   .&..............
c8e0    10 16 68 5c 1a 20 24 80  3c 20 19 30 00 00 78 8c   ..h\. $.< .0..x.
c8f0    02 00 e8 8c ff 00 38 8c  f4 00 30 8c 0f 16 28 5c   ......8...0...(\
```

```
Mar 27 18:20 1996  image.txt Page 75

c900   05 16 20 5c 0d 16 80 5c  01 16 88 5c 1a 16 90 5c   ..  \...\...\...\
c910   07 16 98 5c 06 16 a0 5c  05 16 a8 5c 04 16 b0 5c   ...\...\...\...\
c920   50 26 02 08 01 00 18 8c  04 00 70 8c ff 00 38 8c   P&........p...8.
c930   f4 00 30 8c 07 16 28 5c  f2 00 20 8c 0a 16 80 5c   ..0...(\..  ....\
c940   03 16 8d 5c 0e 16 90 5c  07 16 98 5c 06 16 a0 5c   ...\...\...\...\
c950   05 16 a8 5c 04 16 b0 5c  18 26 02 08 00 00 00 00   ...\...\.&......
c960   00 00 18 8c 02 00 78 8c  ff 00 38 8c ef 00 30 8c   ......x...8...0.
c970   03 16 28 5c 03 16 20 5c  03 16 88 5c 01 16 90 5c   ..(\..  \...\...\
c980   07 16 98 5c 06 16 a0 5c  05 16 a8 5c 04 16 b0 5c   ...\...\...\...\
c990   e0 25 02 08 00 00 00 00  00 00 00 00 00 00 00 00   .%..............
c9a0   00 00 18 8c 02 00 78 8c  ff 00 38 8c f1 00 30 8c   ......x...8...0.
c9b0   03 16 28 5c 03 16 20 5c  03 16 88 5c 01 16 90 5c   ..(\..  \...\...\
c9c0   07 16 98 5c 06 16 a0 5c  05 16 a8 5c 04 16 b0 5c   ...\...\...\...\
c9d0   a0 25 02 08 00 00 00 00  00 00 00 00 00 00 00 00   .%..............
c9e0   01 00 18 8c 02 00 78 8c  ff 00 38 8c f2 00 30 8c   ......x...8...0.
c9f0   00 00 28 8c 05 16 20 5c  03 16 88 5c 01 16 90 5c   ..(...  \...\...\
ca00   07 16 98 5c 06 16 a0 5c  05 16 a8 5c 04 16 b0 5c   ...\...\...\...\
ca10   60 25 02 08 00 00 00 00  00 00 00 00 00 00 00 00   `%..............
ca20   00 00 00 0a 00 00 00 00  00 00 00 00 00 00 00 00   ................
ca30   00 30 20 c0 ef ec 05 10  08 20 01 3a 00 00 00 0a   .0 ......  .:....
ca40   00 30 20 c0 f0 ec 05 10  14 20 01 3d 02 00 20 8c   .0 ......  .=.. .
ca50   00 30 20 c2 f0 ec 05 10  00 00 00 0a 00 00 20 8c   .0 ........... .
ca60   00 30 20 c2 f0 ec 05 10  00 00 00 0a 00 00 00 00   .0 .............
ca70   01 00 20 8c 00 30 20 92  d0 ec 05 10 00 30 28 8c   .. ..0 ......0(.
ca80   c0 ec 05 10 10 00 20 8c  05 16 80 5c 04 16 88 5c   ...... ....\...\
ca90   d0 6b ff 09 17 00 20 8c  00 30 20 8a c4 ec 05 10   .k.... ..0 .....
caa0   00 30 38 80 e6 ec 05 10  00 ce 39 58 00 30 38 82   .08.......9X.08.
cab0   e6 ec 05 10 0d 00 20 8c  00 30 20 82 e4 ec 05 10   ...... ..0 .....
cac0   00 00 20 8c 00 30 20 82  e5 ec 05 10 00 30 18 80   .. ..0 ......0..
cad0   ea ec 05 10 80 c9 18 58  00 30 18 82 ea ec 05 10   .......X.0......
cae0   0d 00 20 8c 00 30 20 82  e8 ec 05 10 0a 00 20 8c   .. ..0 ....... .
caf0   00 30 20 82 e9 ec 05 10  00 00 20 8c 00 30 20 c2   .0 ....... ..0 .
cb00   ec ec 05 10 01 00 20 8c  00 30 20 c2 ed ec 05 10   ...... ..0 .....
cb10   00 30 20 c2 ee ec 05 10  02 00 20 8c 00 30 20 c2   .0 ....... ..0 .
cb20   ef ec 05 10 00 00 00 0a  00 00 00 00 00 00 00 00   ................
cb30   10 16 30 5c ff 00 20 8c  91 00 39 58 78 e0 04 35   ..0\.. ...9Xx..5
cb40   07 16 18 5c fb 00 20 8c  18 c0 21 3d 01 00 20 8c   ...\.. ...!=.. .
cb50   00 30 20 c2 f0 ec 05 10  04 16 80 5c 00 00 00 0a   .0 ........\....
cb60   fd 00 20 8c 18 c0 20 3d  00 00 20 8c 00 30 20 c2   .. ... =.. ..0 .
cb70   f0 ec 05 10 01 00 80 8c  00 00 00 0a fc 00 20 8c   .............  .
```

```
Mar 27 18:20 1996  image.txt Page 76

cb80    18 c0 20 3d 00 00 20 8c  00 30 20 c2 f0 ec 05 10   .. =.. ..0 .....
cb90    04 16 80 5c 00 00 00 0a  fe 00 20 8c 18 c0 20 3d   ...\...... ... =
cba0    01 00 20 8c 00 30 20 c2  f0 ec 05 10 00 00 80 8c   .. ..0 .........
cbb0    00 00 00 0a 04 00 20 8c  06 16 80 5c 04 16 88 5c   ...... ....\...\
cbc0    70 06 00 09 00 00 80 8c  00 00 00 0a 00 00 00 00   p...............
cbd0    00 30 20 8c 50 cd 00 00  00 30 20 92 70 ec 05 10   .0 .P....0 .p...
cbe0    00 30 20 8c d0 d0 00 00  00 30 20 92 74 ec 05 10   .0 ......0 .t...
cbf0    00 30 20 8c e0 d0 00 00  00 30 20 92 78 ec 05 10   .0 ......0 .x...
cc00    00 30 20 8c f0 d0 00 00  00 30 20 92 7c ec 05 10   .0 ......0 .|...
cc10    00 30 20 8c 30 d1 00 00  00 30 20 92 80 ec 05 10   .0 .0....0 .....
cc20    00 30 20 8c 40 d1 00 00  00 30 20 92 84 ec 05 10   .0 .@....0 .....
cc30    00 30 20 8c 50 d1 00 00  00 30 20 92 88 ec 05 10   .0 .P....0 .....
cc40    00 30 20 8c 60 d1 00 00  00 30 20 92 8c ec 05 10   .0 .`....0 .....
cc50    00 30 20 8c 70 d1 00 00  00 30 20 92 90 ec 05 10   .0 .p....0 .....
cc60    00 30 20 8c 80 d1 00 00  00 30 20 92 94 ec 05 10   .0 ......0 .....
cc70    00 30 20 8c 00 d2 00 00  00 30 20 92 98 ec 05 10   .0 ......0 .....
cc80    00 30 20 8c 30 d2 00 00  00 30 20 92 9c ec 05 10   .0 .0....0 .....
cc90    00 30 20 8c 30 cb 00 00  00 30 20 92 74 24 06 10   .0 .0....0 .t$..
cca0    00 30 20 8c 70 24 06 10  00 30 20 92 a0 ec 05 10   .0 .p$...0 .....
ccb0    00 30 80 8c 70 ec 05 10  00 00 00 0a 00 00 00 00   .0..p...........
ccc0    00 00 20 8c 00 30 20 8a  dc ec 05 10 00 30 20 8a   .. ..0 ......0 .
ccd0    de ec 05 10 00 30 20 8a  e0 ec 05 10 21 00 30 8c   .....0 .....!.0.
cce0    f0 fe ff 09 17 00 28 8c  10 16 20 5c 05 16 80 5c   ......(... \...\
ccf0    04 16 88 5c 06 16 90 5c  d8 05 02 09 00 30 80 92   ...\...\.....0..
cd00    c8 ec 05 10 0c 20 04 35  00 00 80 8c 00 00 00 0a   ..... .5........
cd10    60 fd ff 09 01 00 80 8c  00 00 00 0a 00 00 00 00   `...............
cd20    10 16 38 5c 00 30 20 90  b0 ec 05 10 04 16 18 5c   ..8\.0 ........\
cd30    18 20 01 32 03 16 80 5c  08 2b 02 09 0c e0 01 3a   . .2...\.+.....:
cd40    03 16 80 5c bc 04 00 09  00 00 80 8c 00 00 00 0a   ...\............
cd50    50 60 08 8c 11 16 60 5c  12 16 68 5c 08 20 04 32   P`....`\..h\. .2
cd60    08 20 03 35 00 00 00 0a  00 30 20 80 ea ec 05 10   . .5.....0 .....
cd70    3c 20 01 30 00 10 23 80  34 20 69 3d 30 60 13 35   < .0..#.4 i=0`.5
cd80    01 20 23 80 28 20 51 3d  00 30 60 8c e8 ec 05 10   . #.( Q=.0`.....
cd90    00 30 20 80 e9 ec 05 10  0c 20 01 32 02 00 18 8c   .0 ...... .2....
cda0    08 00 00 08 01 00 18 8c  03 16 68 5c 00 10 23 80   ..........h\..#.
cdb0    8d 28 01 5a e4 01 00 15  00 30 20 88 e2 ec 05 10   .(.Z.....0 .....
cdc0    01 20 29 8c 00 30 20 8c  ff ff 00 00 85 00 21 58   . )..0 .......!X
cdd0    00 30 28 8a e2 ec 05 10  83 28 01 5a 94 01 00 11   .0(......(.Z....
cde0    00 30 20 c0 91 07 06 10  ac 20 09 3d 50 00 28 8c   .0 ...... .=P.(.
cdf0    02 00 20 8c 05 16 80 5c  04 16 88 5c 34 8b ff 09   .. ....\...\4...
```

```
Mar 27 16:20 1996  image.txt Page 77

ce00   10 16 38 5c 0c 20 04 35  01 00 80 8c d4 69 ff 09   ..8\. .5.....i..
ce10   40 e0 2f 8c 00 30 20 8c  d0 a2 00 00 05 16 80 5c   @./..0 ........\
ce20   04 16 88 5c 9c 36 02 0b  05 16 30 5c 0c e0 29 90   ...\.6....0\..).
ce30   06 16 80 5c 1c 38 02 0b  10 16 20 5c 06 16 80 5c   ...\.8....  \...\
ce40   05 16 88 5c 04 16 90 5c  08 68 ff 09 06 16 80 5c   ...\...\.h.....\
ce50   00 38 02 0b 10 e0 21 90  04 00 24 59 10 e0 21 92   .8....!...$Y..!.
ce60   00 30 20 90 94 07 06 10  0c 20 81 90 e4 7c ff 09   .0 ...... ...|..
ce70   18 20 04 3a 07 16 80 5c  e8 04 00 09 00 00 80 8c   . .:...\........
ce80   a0 fe ff 09 00 00 00 0a  07 16 80 5c 14 61 ff 09   ...........\.a..
ce90   00 00 00 0a 00 30 20 c0  91 07 06 10 80 28 01 5a   .....0 ......(.Z
cea0   d0 0c 00 15 00 30 80 90  80 0e 06 10 a4 37 02 0b   .....0.......7..
ceb0   02 00 88 8c 7c 8a ff 09  10 16 38 5c 0c 20 04 35   ....|.....8\. .5
cec0   01 00 80 8c 1c 69 ff 09  00 30 30 90 80 0e 06 10   .....i...00.....
ced0   0c e0 29 90 00 30 80 90  80 0e 06 10 74 37 02 0b   ..)..0......t7..
cee0   10 16 20 5c 06 16 80 5c  05 16 88 5c 04 16 90 5c   .. \...\...\...\
cef0   60 67 ff 09 00 30 80 90  80 0e 06 10 54 37 02 0b   `g...0......T7..
cf00   10 e0 21 90 04 00 24 59  10 e0 21 92 00 00 28 8c   ..!...$Y..!...(.
cf10   10 e0 21 90 00 10 29 82  00 30 20 90 94 07 06 10   ..!...)..0 .....
cf20   0c 20 81 90 2c 7c ff 09  24 20 04 3a 00 30 80 90   . ..,|..$ .:.0..
cf30   94 07 06 10 07 16 88 5c  d8 7b ff 09 02 00 20 8c   .......\.{.... .
cf40   00 30 20 c2 91 07 06 10  00 00 00 0a 07 16 80 5c   .0 ............\
cf50   50 60 ff 09 00 00 00 0a  00 30 20 88 e2 ec 05 10   P`.......0 .....
cf60   10 20 19 3e 00 00 20 8c  00 30 20 8a e2 ec 05 10   . .>.. ..0 .....
cf70   00 30 20 c0 91 07 06 10  08 20 11 3a 00 00 00 0a   .0 ...... .:....
cf80   00 00 20 8c 00 30 20 8a  e2 ec 05 10 00 30 20 90   .. ..0 ......0 .
cf90   84 0e 06 10 38 20 01 35  02 00 20 8c 0d 16 80 5c   ....8 .5.. ....\
cfa0   04 16 88 5c 8c 89 ff 09  00 30 80 92 84 0e 06 10   ...\.....0......
cfb0   08 20 04 35 00 00 00 0a  00 00 28 8c 00 30 20 90   . .5......(..0 .
cfc0   84 0e 06 10 14 20 21 90  0d 20 29 82 00 30 20 c0   ..... !.. )..0 .
cfd0   ee ec 05 10 44 20 01 3d  00 00 78 8c 0c 16 70 5c   ....D .=..x...p\
cfe0   54 60 03 33 00 90 2b c0  7f 00 20 8c 85 00 29 58   T`.3..+... ...)X
cff0   00 30 20 90 84 0e 06 10  10 20 21 90 04 c0 23 59   .0 ...... !...#Y
d000   00 10 29 82 01 e0 23 8c  04 16 78 5c 01 a0 73 8c   ..)...#...x\..s.
d010   d4 5f 23 34 20 00 00 08  00 30 20 90 84 0e 06 10   ._#4 ....0 .....
d020   10 20 21 90 0c 16 80 5c  04 16 88 5c 0d 16 90 5c   . !....\...\...\
d030   20 66 ff 09 00 30 28 90  84 0e 06 10 10 60 21 90    f...0(......`!.
d040   04 40 23 59 10 60 21 92  00 30 20 90 94 07 06 10   .@#Y.`!..0 .....
d050   0c 20 81 90 fc 7a ff 09  24 20 04 3a 00 30 28 90   . ...z..$ .:.0(.
d060   94 07 06 10 00 30 20 90  84 0e 06 10 05 16 80 5c   .....0 ........\
d070   04 16 88 5c 9c 7a ff 09  10 00 00 08 00 30 80 90   ...\.z.......0..
```

```
Mar 27 18:20 1996  image.txt Page 78

d080     84 0e 06 10 1c 5f ff 09  00 00 20 8c 00 30 20 92   ....._.... ..0 .
d090     84 0e 06 10 00 00 00 0a  00 00 00 00 00 00 00 00   ................
d0a0     00 00 80 8c 7c 4b ff 08  00 00 00 00 00 00 00 00   ....|K..........
d0b0     00 00 80 8c 6c 4b ff 08  00 00 00 00 00 00 00 00   ....lK..........
d0c0     00 00 80 8c 5c 4b ff 08  00 00 00 00 00 00 00 00   ....\K..........
d0d0     00 00 00 0a 00 00 00 00  00 00 00 00 00 00 00 00   ................
*
d0f0     10 16 30 5c 00 30 28 8c  c0 d2 00 00 05 16 80 5c   ..0\.0(.........\
d100     50 35 02 0b 10 16 20 5c  06 16 80 5c 05 16 88 5c   P5....  \...\...\
d110     04 16 90 5c 0c 1c 02 09  18 0e 24 59 98 0d 21 59   ...\......$Y..!Y
d120     08 20 01 3d 00 00 00 0a  00 00 00 0a 00 00 00 00   . .=............
d130     00 00 00 0a 00 00 00 00  00 00 00 00 00 00 00 00   ................
*
d180     00 30 80 92 b0 ec 05 10  00 30 20 8c b0 ec 05 10   .0.......0 .....
d190     20 20 24 92 01 00 20 8c  00 30 20 8a dc ec 05 10     $... ..0 .....
d1a0     00 00 20 8c 00 30 20 c2  ef ec 05 10 00 30 20 c2   .. ..0 ......0 .
d1b0     f0 ec 05 10 00 30 36 90  b0 ec 05 10 01 00 30 8c   .....06.......0.
d1c0     04 16 28 5c 06 16 20 5c  07 16 80 5c 06 16 88 5c   ..(\.. \...\...\
d1d0     05 16 90 5c 04 16 98 5c  c8 1e 02 09 05 16 20 5c   ...\...\...... \
d1e0     00 30 20 c2 ec ec 05 10  00 30 20 8a e2 ec 05 10   .0 ......0 .....
d1f0     00 00 00 0a 00 00 00 00  00 00 00 00 00 00 00 00   ................
d200     80 f4 00 09 00 00 20 8c  00 30 20 92 b0 ec 05 10   ...... ..0 .....
d210     00 30 20 8a dc ec 05 10  00 30 20 8a e2 ec 05 10   .0 ......0 .....
d220     00 00 00 0a 00 00 00 00  00 00 00 00 00 00 00 00   ................
d230     10 16 38 5c 18 4e 24 59  98 0d 21 59 04 16 18 5c   ..8\.N$Y..!Y...\
d240     64 20 79 34 03 39 20 90  18 d3 00 00 00 10 01 84   d y4.9 .........
d250     00 00 00 0a 00 00 00 0a  4c 00 00 08 48 00 00 08   ........L...H...
d260     44 00 00 08 40 00 00 08  3c 00 00 08 38 00 00 08   D...@...<...8...
d270     34 00 00 08 30 00 00 08  2c 00 00 08 28 00 00 08   4...0...,...(...
d280     24 00 00 08 01 00 20 8c  00 30 20 8a de ec 05 10   $..... ..0 .....
d290     00 00 00 0a 00 00 20 8c  00 30 20 8a de ec 05 10   ...... ..0 .....
d2a0     00 00 00 0a 07 16 80 5c  a8 25 02 08 00 00 00 00   .......\.%......
d2b0     80 82 01 08 00 00 00 00  00 00 00 00 00 00 00 00   ................
d2c0     0d 0a 5b 59 45 53 5d 0d  0a 00 00 00 00 00 00 00   ..[YES].........
d2d0     0d 0a 0d 0a 20 21 21 21  20 53 65 74 75 70 20 6d   .... !!! Setup m
d2e0     61 6e 61 67 6d 65 6e 74  20 69 73 20 61 6c 72 65   anagment is alre
d2f0     61 64 79 20 61 63 74 69  76 61 74 65 64 20 62 79   ady activated by
d300     20 4c 6f 63 61 6c 20 54  65 72 6d 69 6e 61 6c 20    Local Terminal
d310     21 21 21 20 0a 0d 00 00  50 d2 00 00 54 d2 00 00   !!! ....P...T...
d320     58 d2 00 00 5c d2 00 00  60 d2 00 00 64 d2 00 00   X...\...`...d...
```

Mar 27 18:20 1996 image.txt Page 79

```
d330    68 d2 00 00 6c d2 00 00  70 d2 00 00 74 d2 00 00   h...l...p...t...
d340    78 d2 00 00 7c d2 00 00  80 d2 00 00 84 d2 00 00   x...|...........
d350    94 d2 00 00 a4 d2 00 00  00 00 00 00 00 00 00 00   ................
d360    10 60 0a 8c 10 16 48 5c  40 e0 4f 92 00 30 20 88   .`....H\@.O..0 .
d370    dc ec 05 10 10 20 01 32  00 30 20 88 de ec 05 10   ..... .2.0 .....
d380    10 20 01 32 00 30 80 8c  ff ff ff ff 00 00 00 0a   . .2.0..........
d390    00 30 60 90 b0 ec 05 10  00 30 20 80 e5 ec 05 10   .0`......0 .....
d3a0    10 20 01 32 02 00 48 8c  44 e0 4f 92 0c 00 00 08   . .2..H.D.O.....
d3b0    01 00 48 8c 44 e0 4f 92  44 e0 4f 90 09 16 50 5c   ..H.D.O.D.O...P\
d3c0    00 30 58 8c e4 ec 05 10  40 e0 47 90 08 16 68 5c   .0X.....@.G...h\
d3d0    00 28 02 5a 0c 02 00 12  10 60 2b 90 0c 60 23 90   .(.Z.....`+..`#.
d3e0    04 41 49 59 48 e0 4f 92  0c 60 7b 90 0c 60 2b 90   .AIYH.O..`{..`+.
d3f0    05 16 70 5c 10 60 23 90  05 20 01 5a 88 01 00 13   ..p\.`#.. .Z....
d400    00 30 20 c0 ed ec 05 10  14 20 01 3d 00 30 2b 80   .0 ...... .=.0+.
d410    7f 00 20 8c 85 00 21 58  00 90 23 82 00 30 20 c0   .. ...!X..#..0 .
d420    ec ec 05 10 83 28 01 5a  48 01 00 12 00 30 20 c0   .....(.ZH....0 .
d430    ec ec 05 10 81 28 01 5a  38 01 00 12 00 30 20 80   .....(.Z8....0 .
d440    e6 ec 05 10 00 2f 01 5a  28 01 00 10 00 00 18 8c   ...../.Z(.......
d450    00 90 2b 80 00 d0 22 80  18 00 29 3d 10 a0 12 35   ..+..."...)=...5
d460    01 a0 2b 80 01 e0 22 80  08 00 29 3d 01 00 18 8c   ..+..."...)=....
d470    10 e0 00 35 00 90 23 80  08 20 69 3d 02 00 18 8c   ...5..#.. i=....
d480    00 e8 00 5a ec 00 00 12  0f 81 23 59 30 20 01 3a   ...Z......#Y0 .:
d490    0f 81 23 59 0c 16 80 5c  0f 16 88 5c 04 16 90 5c   ..#Y...\...\...\
d4a0    80 18 02 09 18 0e 24 59  98 0d 21 59 10 20 01 3a   ......$Y..!Y. .:
d4b0    00 30 80 8c ff ff ff ff  00 00 00 0a 60 e0 08 35   .0..........`..5
d4c0    00 00 e8 8c 02 00 98 8c  0d 00 38 8c 0a 00 30 8c   ..........8...0.
d4d0    1d 16 28 5c 05 16 20 5c  0c 16 80 5c 1d 16 88 5c   ..(\.. \...\...\
d4e0    13 16 90 5c 07 16 98 5c  06 16 a0 5c 05 16 a8 5c   ...\...\...\...\
d4f0    04 16 b0 5c 7c 1a 02 09  18 0e 24 59 98 0d 21 59   ...\|.....$Y..!Y
d500    10 20 01 3a 00 30 80 8c  ff ff ff ff 00 00 00 0a   . .:.0..........
d510    5c a0 12 35 01 a0 73 8c  54 00 00 08 00 00 e8 8c   \..5..s.T.......
d520    02 00 98 8c 0d 00 38 8c  1d 16 30 5c 06 16 28 5c   ......8...0\..(\
d530    05 16 20 5c 0c 16 80 5c  1d 16 88 5c 13 16 90 5c   .. \...\...\...\
d540    07 16 98 5c 06 16 a0 5c  05 16 a8 5c 04 16 b0 5c   ...\...\...\...\
d550    20 1a 02 09 18 0e 24 59  98 0d 21 59 10 20 01 3a    .....$Y..!Y. .:
d560    00 30 60 8c ff ff ff ff  00 00 00 0a 01 a0 7b 8c   .0`...........{.
d570    01 a0 2b 8c 05 16 70 5c  10 60 23 90 05 20 01 5a   ..+...p\.`#.. .Z
d580    80 fe ff 14 10 60 23 90  0f 01 21 59 34 20 01 3b   .....`#...!Y4 .;
d590    10 60 23 90 0f 01 21 59  0c 16 80 5c 0f 16 88 5c   .`#...!Y...\...\
d5a0    04 16 90 5c 7c 17 02 09  18 0e 24 59 98 0d 21 59   ...\|.....$Y..!Y
```

Mar 27 16:20 1996 image.txt Page 80

```
d5b0    10 20 01 3a 00 30 80 8c  ff ff ff ff 00 00 00 0a   . .:.0..........
d5c0    48 e0 4f 90 0c 60 02 33  0c 60 23 90 10 60 23 92   H.O..`.3.`#..`#.
d5d0    08 60 23 90 04 16 68 5c  00 26 01 5a fc fd ff 15   .`#...h\.(.Z....
d5e0    00 00 80 8c 00 00 00 0a  10 16 18 5c 00 d0 18 92   ............\...
d5f0    03 10 19 59 f8 5f 1c 34  00 30 98 8c 00 00 01 00   ...Y._.4.0......
d600    01 c9 9c 59 fc ff 04 35  10 16 18 5c 00 d0 28 90   ...Y...5...\..(.
d610    28 40 19 35 03 10 19 59  f4 5f 1c 34 10 16 18 5c   (@.5...Y._.4...\
d620    00 00 28 8c 00 d0 28 92  03 10 19 59 c0 5f 1c 34   ..(...(....Y._.4
d630    00 1e 80 5c 00 00 00 0a  01 1e 80 5c 00 00 00 0a   ...\.......\....
d640    00 00 20 8c 00 30 20 82  08 00 00 40 00 30 20 90   .. ..0 ....@.0 .
d650    88 0e 06 10 28 20 01 3a  01 00 20 8c 00 30 20 82   ....( .:.. ..0 .
d660    06 00 00 40 00 30 20 82  04 00 00 40 00 00 20 8c   ...@.0 ....@.. .
d670    00 30 20 92 88 0e 06 10  24 00 00 08 00 00 20 8c   .0 .....$..... .
d680    00 30 20 82 06 00 00 40  00 30 20 82 04 00 00 40   .0 ....@.0 ....@
d690    01 00 20 8c 00 30 20 92  88 0e 06 10 00 00 18 8c   .. ..0 .........
d6a0    01 e0 28 8c 05 16 18 5c  00 30 20 8c 00 00 04 00   ..(....\.0 .....
d6b0    f0 1f 29 3c 00 00 00 0a  00 00 00 00 00 00 00 00   ..)<............
d6c0    80 ff ff 09 00 00 20 8c  00 30 20 82 08 00 00 40   ...... ..0 ....@
d6d0    00 30 20 82 04 00 00 40  01 00 20 8c 00 30 20 82   .0 ....@.. ..0 .
d6e0    06 00 00 40 4c 01 00 09  18 20 04 3a 01 00 20 8c   ...@L.... .:.. .
d6f0    00 30 20 82 08 00 00 40  05 00 80 8c 00 00 00 0a   .0 ....@........
d700    f0 09 00 09 18 20 04 3a  01 00 20 8c 00 30 20 82   ..... .:.. ..0 .
d710    08 00 00 40 02 00 80 8c  00 00 00 0a 01 00 20 8c   ...@.......... .
d720    00 30 20 82 04 00 00 40  00 00 20 8c 00 30 20 82   .0 ....@.. ..0 .
d730    06 00 00 40 6c 07 00 09  18 20 04 3a 01 00 20 8c   ...@l.... .:.. .
d740    00 30 20 82 08 00 00 40  08 00 80 8c 00 00 00 0a   .0 ....@........
d750    01 00 20 8c 00 30 20 82  04 00 00 40 00 30 20 82   .. ..0 ....@.0 .
d760    06 00 00 40 00 30 28 80  00 00 00 40 ff 00 20 8c   ...@.0(....@.. .
d770    85 00 21 58 14 20 29 37  00 00 20 8c 00 30 20 82   ..!X. )7.. ..0 .
d780    0a 00 00 40 10 00 00 08  01 00 20 8c 00 30 20 82   ...@...... ..0 .
d790    0a 00 00 40 00 00 20 8c  00 30 20 82 04 00 00 40   ...@.. ..0 ....@
d7a0    00 30 20 82 06 00 00 40  04 16 80 5c 00 00 00 0a   .0 ....@...\....
d7b0    40 60 08 8c 00 30 20 90  00 ed 05 10 01 20 21 8c   @`...0 ...... !.
d7c0    00 30 20 92 00 ed 05 10  00 00 20 8c 00 30 20 82   .0 ....... ..0 .
d7d0    00 00 00 40 01 00 20 8c  00 30 20 82 00 00 00 40   ...@.. ..0 ....@
d7e0    00 00 00 0a 00 00 00 00  00 00 00 00 00 00 00 00   ................
d7f0    76 00 20 8c 00 30 20 8a  06 00 00 18 19 00 20 8c   v. ..0 ....... .
d800    00 30 20 8a 02 00 00 18  00 00 20 8c 00 30 20 8a   .0 ....... ..0 .
d810    02 00 00 18 01 00 20 8c  00 30 20 82 00 00 00 40   ...... ..0 ....@
d820    00 00 00 0a 00 00 00 00  00 00 00 00 00 00 00 00   ................
```

Mar 27 18:20 1996 image.txt Page 81

```
d830    50 60 08 8c 00 00 30 8c  64 00 28 8c 00 30 20 8c   P`....0.d.(..0 .
d840    b0 d7 00 00 06 16 80 5c  05 16 88 5c 04 16 90 5c   .......\...\...\
d850    10 09 00 09 06 16 20 5c  00 30 20 92 00 ea 05 10   ......  \.0 .....
d860    90 ff ff 09 04 16 80 5c  38 bb ff 09 04 16 38 5c   .......\8.....8\
d870    01 e0 29 8c 05 16 38 5c  00 30 20 8c 00 a0 00 00   ..)...8\.0 .....
d880    f0 1f 29 3c 00 30 28 90  00 ed 05 10 05 16 18 5c   ..)<.0(........\
d890    5a 00 20 8c 0c 00 29 3b  09 00 80 8c 00 00 00 0a   Z. ...);........
d8a0    6e 00 20 8c 0c 00 19 3e  0a 00 80 8c 00 00 00 0a   n. ....>........
d8b0    00 00 80 8c 00 00 00 0a  00 00 00 00 00 00 00 00   ................
d8c0    18 4e 24 59 98 0d 29 59  ff 00 20 8c 85 00 21 58   .N$Y..)Y.. ...!X
d8d0    01 20 24 82 00 00 80 8c  00 00 00 0a 00 00 00 00   . $.............
d8e0    10 16 78 5c 11 16 30 5c  12 16 38 5c 0b 20 2c 80   ..x\..0\..8\. ,.
d8f0    ff 00 20 8c 85 00 29 58  85 00 29 58 85 00 29 58   .. ...)X..)X..)X
d900    05 16 18 5c 00 00 20 8c  00 90 24 92 70 60 01 30   ...\.. ...$.p`.0
d910    01 e0 2b 80 ff 00 20 8c  85 00 29 58 85 00 21 58   ..+... ...)X..!X
d920    00 90 21 c2 04 e0 39 8c  83 90 27 58 34 20 01 3a   ..!...9...'X4 .:
d930    0c e0 20 30 01 00 80 8c  00 00 00 0a 0c e0 18 30   .. 0...........0
d940    02 00 80 8c 00 00 00 0a  0c e0 10 30 03 00 80 8c   ...........0....
d950    00 00 00 0a 0c e0 08 30  04 00 80 8c 00 00 00 0a   .......0........
d960    0b e0 2b 80 ff 00 20 8c  85 00 29 58 85 00 29 58   ..+... ...)X..)X
d970    85 00 21 58 04 16 18 5c  98 3f 01 37 00 00 80 8c   ..!X...\.?.7....
d980    00 00 00 0a 00 00 00 00  00 00 00 00 00 00 00 00   ................
d990    10 60 08 8c 10 16 60 5c  00 30 a0 98 d8 da 00 00   .`....`\.0......
d9a0    40 e0 a7 92 44 e0 af 82  00 00 70 8c 0e 16 58 5c   @...D.....p...X\
d9b0    11 16 68 5c 00 50 24 c0  80 28 01 5a 04 01 00 12   ..h\.P$..(.Z....
d9c0    0b 20 2b 80 ff 00 20 8c  85 00 21 58 0c 20 29 30   . +... ...!X. )0
d9d0    01 00 30 8c 08 00 00 08  00 00 30 8c e4 bf 01 3a   ..0.......0....:
d9e0    00 50 23 c0 0c 16 80 5c  04 16 88 5c d4 fe ff 09   .P#....\...\....
d9f0    10 16 70 5c 0c 20 04 3a  0e 16 80 5c 00 00 00 0a   ..p\. .:...\....
da00    00 00 78 8c 0b 20 2b 80  ff 00 20 8c 85 00 21 58   ..x.. +... ...!X
da10    0c 20 01 30 01 00 38 8c  08 00 00 08 00 00 38 8c   . .0..8.......8.
da20    40 e0 01 3d 00 30 20 8c  00 00 01 00 34 00 79 39   @..=.0 .....4.y9
da30    01 e0 7b 8c 0b 20 2b 80  ff 00 20 8c 85 00 21 58   ..{.. +... ...!X
da40    0c 20 01 30 01 00 18 8c  08 00 00 08 00 00 18 8c   . .0............
da50    10 e0 00 3d 00 30 20 8c  00 00 01 00 d4 1f 79 3e   ...=.0 .......y>
da60    00 30 20 8c 00 00 01 00  0c 00 79 3c 05 00 80 8c   .0 .......y<....
da70    00 00 00 0a 40 e0 2f 8c  48 e0 27 8c 0c 16 80 5c   ....@./.H.'....\
da80    05 16 88 5c 04 16 90 5c  58 fe ff 09 10 16 70 5c   ...\...\X.....p\
da90    0c 20 04 3a 0e 16 80 5c  00 00 00 0a 40 e0 2f c0   . .:...\....@./.
daa0    00 50 23 c0 08 00 29 3a  01 e0 5a 8c 01 60 23 8c   .P#...):..Z..`#.
```

```
Mar 27 18:20 1996  image.txt Page 82

dab0    04 16 68 5c 00 10 21 c0  80 28 01 5a 04 ff ff 15   ..h\..!..(.Z....
dac0    0c e0 02 3d 00 00 80 8c  00 00 00 0a 8f c9 82 58   ...=...........X
dad0    00 00 00 0a 00 00 00 00  00 00 00 00 00 00 00 00   ................
dae0    11 16 38 5c 4c 20 04 3a  00 00 18 8c 00 30 20 90   ..8\L .:......0 .
daf0    90 df 00 00 08 20 01 35  00 00 00 0a 83 39 20 90   ..... .5.....9 .
db00    90 df 00 00 14 c0 21 35  83 39 20 90 94 df 00 00   ......!5.9 .....
db10    01 0e 81 59 00 00 00 0a  01 e0 20 8c 04 16 18 5c   ...Y...... ....\
db20    84 39 20 90 90 df 00 00  d4 3f 01 35 00 00 00 0a   .9 ......?.5....
db30    00 00 18 8c 00 30 20 90  94 df 00 00 08 20 01 35   .....0 ...... .5
db40    00 00 00 0a 83 39 20 90  94 df 00 00 01 0e 21 59   .....9 .......!Y
db50    10 c0 21 35 83 39 80 90  90 df 00 00 00 00 00 0a   ..!5.9..........
db60    01 e0 20 8c 04 16 18 5c  84 39 20 90 94 df 00 00   .. .....\.9 .....
db70    d4 3f 01 35 00 00 00 0a  00 00 00 00 00 00 00 00   .?.5............
db80    10 60 08 8c 10 16 18 5c  11 16 38 5c 10 16 30 5c   .`......\..8\..0\
db90    01 00 28 8c 00 50 24 90  05 16 80 5c 04 16 88 5c   ..(..P$....\...\
dba0    40 ff ff 09 00 30 20 8c  00 ff 00 00 90 00 21 58   @....0 .......!X
dbb0    88 0d 21 59 05 e0 21 82  00 d0 21 90 05 16 80 5c   ..!Y..!...!....\
dbc0    04 16 88 5c 1c ff ff 09  ff 00 20 8c 90 00 21 58   ...\...... ...!X
dbd0    06 e0 21 82 04 e0 21 80  87 09 21 58 07 a0 21 82   ..!...!...!X..!.
dbe0    06 e0 21 80 01 a0 21 82  05 e0 21 80 03 a0 21 82   ..!...!...!...!.
dbf0    04 e0 21 80 07 a0 21 82  07 e0 21 80 09 a0 21 82   ..!...!...!...!.
dc00    40 e0 2f 8c 44 e0 27 8c  03 16 80 5c 05 16 88 5c   @./.D.'....\...\
dc10    04 16 90 5c cc fc ff 09  03 16 80 5c 05 16 88 5c   ...\.......\...\
dc20    04 16 90 5c bc fc ff 09  00 00 00 0a 00 00 00 00   ...\............
dc30    40 60 08 8c 00 00 20 8c  00 30 20 92 10 ed 05 10   @`.... ..0 .....
dc40    00 00 00 0a 00 00 00 00  00 00 00 00 00 00 00 00   ................
dc50    10 60 08 8c 10 16 60 5c  11 16 68 5c 10 16 70 5c   .`....`\..h\..p\
dc60    00 30 20 90 88 de 00 00  44 e0 27 92 00 30 80 98   .0 .....D.'..0..
dc70    90 de 00 00 48 e0 87 92  4c e0 8f 82 02 00 30 8c   ....H...L.....0.
dc80    d2 00 28 8c 00 30 20 8c  30 dc 00 00 06 16 80 5c   ..(..0 .0......\
dc90    05 16 88 5c 04 16 90 5c  c8 04 00 09 00 00 80 8c   ...\...\........
dca0    00 b7 ff 09 06 16 20 5c  03 a0 23 82 07 60 23 80   ...... \..#..`#.
dcb0    83 09 21 58 09 a0 23 82  01 00 20 8c 00 30 20 92   ..!X..#... ..0 .
dcc0    10 ed 05 10 00 00 78 8c  41 00 20 8c 0c 16 80 5c   ......x.A. ....\
dcd0    04 16 88 5c ec fb ff 09  00 30 20 90 10 ed 05 10   ...\.....0 .....
dce0    24 20 01 3a 01 e0 2b 8c  05 16 78 5c 00 30 20 8c   $ .:..+...x\.0 .
dcf0    00 00 01 00 10 00 29 3b  00 30 20 90 10 ed 05 10   ......);.0 .....
dd00    e4 3f 01 3d 00 30 20 90  10 ed 05 10 0c 20 01 3a   .?.=.0 ...... .:
dd10    06 00 80 8c 00 00 00 0a  01 00 20 8c 03 a0 23 82   .......... ...#.
dd20    07 60 23 80 84 13 26 58  09 a0 23 82 01 00 20 8c   .`#...&X..#... .
```

```
Mar 27 15:20 1996   image.txt Page 83

dd30    00 30 20 92 10 ed 05 10  00 00 78 8c 41 00 20 8c   .0 ........x.A. .
dd40    0c 16 80 5c 04 16 88 5c  78 fb ff 09 00 30 20 90   ...\...\x.....0 .
dd50    10 ed 05 10 24 20 01 3a  01 e0 2b 8c 05 16 78 5c   ....$ .:..+...x\
dd60    00 30 20 8c 00 00 01 00  10 00 29 3b 00 30 20 90   .0 .......);.0 .
dd70    10 ed 05 10 e4 3f 01 3d  00 30 20 90 10 ed 05 10   .....?.=.0 .....
dd80    0c 20 01 3a 07 00 80 8c  00 00 00 0a 44 e0 2f 8c   . .:.........D./.
dd90    40 e0 27 8c 0c 16 80 5c  05 16 88 5c 04 16 90 5c   @.'.....\...\...\
dda0    40 fb ff 09 41 00 20 8c  05 a0 23 82 01 00 20 8c   @...A. ...#... .
ddb0    03 a0 23 82 07 60 23 80  84 13 26 58 09 a0 23 82   ..#..`#...&X..#.
ddc0    01 00 20 8c 00 30 20 92  10 ed 05 10 00 00 78 8c   .. ..0 .......x.
ddd0    48 e0 3f 8c 48 e0 27 c0  44 20 01 3a 0b 20 2b 80   H.?.H.'.D .:. +.
dde0    ff 00 20 8c 85 00 21 58  0c 20 29 30 01 00 18 8c   .. ...!X. )0....
ddf0    08 00 00 08 00 00 18 8c  e4 ff 00 3a 00 d0 21 c0   ...........:..!.
de00    0c 16 80 5c 04 16 88 5c  b8 fa ff 09 01 e0 21 8c   ...\...\......!.
de10    04 16 38 5c 00 10 21 c0  c4 3f 01 3d 00 30 20 8c   ..8\..!..?.=.0 .
de20    00 00 01 00 30 00 79 3b  00 30 20 90 10 ed 05 10   ....0.y;.0 .....
de30    24 20 01 3a 01 e0 2b 8c  05 16 78 5c 00 30 20 8c   $ .:..+...x\.0 .
de40    00 00 01 00 10 00 29 3b  00 30 20 90 10 ed 05 10   ......);.0 .....
de50    e4 3f 01 3d 00 30 20 90  10 ed 05 10 0c 20 01 3a   .?.=.0 ...... .:
de60    08 00 80 8c 00 00 00 0a  44 e0 2f 8c 40 e0 27 8c   ........D./.@.'.
de70    0c 16 80 5c 05 16 88 5c  04 16 90 5c 64 fa ff 09   ...\...\...\d...
de80    00 00 80 8c 00 00 00 0a  00 00 00 00 00 00 00 00   ................
de90    54 45 53 54 00 00 00 00  00 00 00 00 00 00 00 00   TEST............
dea0    10 60 08 8c 00 30 20 8c  80 25 00 00 40 e0 27 92   .`...0 ..%..@.'.
deb0    03 00 20 8c 44 e0 27 82  47 e0 27 82 47 e0 27 80   .. .D.'.G.'.G.'.
dec0    84 09 21 58 47 e0 27 82  00 30 28 8c 00 00 00 28   ..!XG.'..0(....(
ded0    40 e0 27 8c 05 16 80 5c  04 16 88 5c a4 fc ff 09   @.'....\...\....
dee0    00 30 20 8c 90 0e 06 10  05 16 80 5c 04 16 88 5c   .0 ........\...\
def0    a0 fa ff 09 0c 20 04 3a  03 00 80 8c 00 00 00 0a   ..... .:........
df00    00 30 20 8c 00 e1 00 00  40 e0 27 92 00 30 28 8c   .0 .....@.'..0(.
df10    00 00 00 28 40 e0 27 8c  05 16 80 5c 04 16 88 5c   ...(@.'....\...\
df20    60 fc ff 09 00 30 20 8c  90 0e 06 10 05 16 80 5c   `....0 ........\
df30    04 16 88 5c 5c fa ff 09  0c 20 04 3a 03 00 80 8c   ...\\.... .:....
df40    00 00 00 0a 00 30 20 8c  80 25 00 00 40 e0 27 92   .....0 ..%..@.'.
df50    00 30 28 8c 00 00 00 28  40 e0 27 8c 05 16 80 5c   .0(....(@.'....\
df60    04 16 88 5c 1c fc ff 09  05 16 80 5c 04 16 88 5c   ...\.......\...\
df70    e0 fc ff 09 0c 20 04 3a  03 00 80 8c 00 00 00 0a   ..... .:........
df80    00 00 80 8c 00 00 00 0a  00 00 00 00 00 00 00 00   ................
df90    32 00 00 00 00 09 00 00  4b 00 00 00 00 06 00 00   2.......K.......
dfa0    6e 00 00 00 17 04 00 00  86 00 00 00 59 03 00 00   n...........Y...
```

Mar 27 18:20 1996 image.txt Page 84

```
dfb0    96 00 00 00 00 03 00 00  2c 01 00 00 80 01 00 00   ........,.......
dfc0    58 02 00 00 c0 00 00 00  60 04 00 00 60 00 00 00   X...........`...
dfd0    60 09 00 00 30 00 00 00  10 0e 00 00 20 00 00 00   `...0....... ...
dfe0    c0 12 00 00 18 00 00 00  20 1c 00 00 10 00 00 00   ........ .......
dff0    80 25 00 00 0c 00 00 00  00 4b 00 00 06 00 00 00   .%.......K......
e000    00 96 00 00 03 00 00 00  00 e1 00 00 02 00 00 00   ................
e010    00 c2 01 00 01 00 00 00  00 00 00 00 00 00 00 00   ................
e020    10 16 70 5c 11 16 78 5c  12 16 30 5c 92 1c 2c 8c   ..p\..x\..0\..,.
e030    00 30 20 8c 00 20 00 00  0c 00 29 3c 00 00 80 8c   .0 .. ....)<....
e040    00 00 00 0a 01 a0 3b 8c  00 00 18 8c 24 a0 01 3b   ......;.....$..;
e050    00 f4 29 a0 00 00 00 08  0f c0 20 59 00 10 29 82   ..)....... Y..).
e060    01 e0 20 8c 04 16 18 5c  02 e0 39 8c e4 9f 21 3c   .. ....\..9...!<
e070    86 9c 83 8c 00 00 00 0a  00 00 00 00 00 00 00 00   ................
e080    11 16 78 5c 10 16 38 5c  00 00 18 8c 03 16 30 5c   ..x\..8\......0\
e090    1c 60 04 3b 00 d0 21 80  06 00 31 59 01 e0 20 8c   .`.;..!...1Y.. .
e0a0    04 16 18 5c 01 e0 39 8c  ec df 23 3c 00 30 20 8c   ...\..9...#<.0 .
e0b0    ff ff 00 00 28 00 31 36  00 30 20 8c ff ff 00 00   ....(.16.0 .....
e0c0    86 00 29 58 10 8c 21 59  05 00 29 59 05 16 30 5c   ..)X..!Y..)Y..0\
e0d0    00 30 20 8c ff ff 00 00  e0 1f 29 31 06 16 80 5c   .0 .......)1...\
e0e0    00 00 00 0a 00 00 00 00  00 00 00 00 00 00 00 00   ................
e0f0    10 60 08 8c 00 00 38 8c  40 e0 1f 8c 00 30 28 80   .`....8.@....0(.
e100    00 00 00 40 ff 00 20 8c  85 00 21 58 0c 20 39 37   ...@.. ...!X. 97
e110    00 00 80 8c 00 00 00 0a  08 00 20 8c 07 16 80 5c   .......... ....\
e120    03 16 88 5c 04 16 90 5c  f8 fe ff 09 46 e0 37 88   ...\...\....F.7.
e130    40 e0 2f 8c 06 00 20 8c  05 16 80 5c 04 16 88 5c   @./... ....\...\
e140    40 ff ff 09 0c 00 34 3a  02 00 80 8c 00 00 00 0a   @.....4:........
e150    00 00 80 8c 00 00 00 0a  00 00 00 00 00 00 00 00   ................
e160    20 60 08 8c 10 16 18 5c  11 16 38 5c 12 16 30 5c    `.....\..8\..0\
e170    80 00 20 8c 53 e0 27 82  40 e0 27 8c 54 e0 27 92   .. .S.'.@.'.T.'.
e180    50 e0 87 8c 3c b2 ff 09  44 e0 27 90 14 20 29 90   P...<...D.'.. ).
e190    01 e0 21 8c 04 5d 31 92  38 b2 ff 09 ff 00 28 8c   ..!..]1.8.....(.
e1a0    03 ce 20 59 04 47 21 59  10 02 29 58 03 ce 20 59   .. Y.G!Y..)X.. Y
e1b0    04 c7 21 59 85 03 81 58  28 b2 ff 09 00 00 00 0a   ..!Y...X(.......
e1c0    00 00 00 0a 00 00 00 00  00 00 00 00 00 00 00 00   ................
e1d0    25 00 28 8c 02 00 20 8c  05 16 80 5c 04 16 88 5c   %.(... ....\...\
e1e0    50 77 ff 09 10 16 18 5c  08 20 04 35 00 00 00 0a   Pw.....\. .5....
e1f0    00 00 28 8c 14 e0 20 90  0d 20 29 82 00 30 30 8c   ..(... .. )..00.
e200    b0 0e 06 10 10 e0 28 90  25 00 20 8c 06 16 80 5c   ......(.%. ....\
e210    05 16 88 5c 04 16 90 5c  38 54 ff 09 10 e0 20 90   ...\...\8T.... .
e220    25 20 21 8c 10 e0 20 92  03 16 80 5c 34 f1 ff 08   % !... ....\4...
```

```
Mar 27 18:20 1996  image.txt Page 85

e230   6d 66 78 00 00 00 00 00  00 00 00 00 00 00 00 00   mix.............
e240   14 20 24 90 04 16 30 5c  18 28 19 90 20 20 01 35   . $...0\.(..  .5
e250   00 30 80 8c 30 ed 05 10  28 00 00 09 00 00 20 8c   .0..0...(.....  .
e260   00 30 20 92 20 ed 05 10  0c 00 00 08 06 16 80 5c   .0 . ...........\
e270   10 00 00 08 00 00 00 0a  00 00 00 00 00 00 00 00   ................
e280   10 16 78 5c 18 28 2c 90  04 00 20 8c 05 60 21 82   ..x\.(,...  ..`!.
e290   01 00 80 8c 9c b1 ff 09  02 00 20 8c 05 60 21 82   ..........  ..`!.
e2a0   01 00 80 8c 8c b1 ff 09  78 ad ff 09 10 16 38 5c   .........x.....8\
e2b0   f4 e7 23 90 14 20 01 32  f4 e7 83 90 b4 59 ff 09   ..#.. .2.....Y..
e2c0   00 00 20 8c f4 e7 23 92  07 16 80 5c 74 ad ff 09   .. ...#....\t...
e2d0   00 00 18 8c 60 e0 2b 8c  30 00 20 8c 83 00 21 70   ....`.+.0. ...!p
e2e0   05 00 21 59 00 10 21 c0  64 20 09 3a 60 e0 2b 8c   ..!Y..!.d .:`.+.
e2f0   30 00 20 8c 83 00 21 70  05 00 21 59 18 20 21 90   0. ...!p..!Y. !.
e300   34 20 01 32 60 e0 2b 8c  30 00 20 8c 83 00 21 70   4 .2`.+.0. ...!p
e310   05 00 21 59 18 20 81 90  88 4c ff 09 00 00 30 8c   ..!Y. ...L....0.
e320   60 e0 2b 8c 30 00 20 8c  83 00 21 70 05 00 21 59   `.+.0. ...!p..!Y
e330   18 20 31 92 01 00 30 8c  60 e0 2b 8c 30 00 20 8c   . 1...0.`.+.0. .
e340   83 00 21 70 05 00 21 59  00 10 31 c2 01 e0 28 8c   ..!p..!Y..1...(.
e350   05 16 18 5c 28 00 20 8c  7c 1f 29 3c 00 00 18 8c   ...\(. .|.)<....
e360   01 00 30 8c 30 e0 2b 8c  30 00 20 8c 83 00 21 70   ..0.0.+.0. ...!p
e370   05 00 21 59 00 10 31 c2  30 e0 2b 8c 30 00 20 8c   ..!Y..1.0.+.0. .
e380   83 00 21 70 05 00 21 59  18 20 21 90 34 20 01 32   ..!p..!Y. !.4 .2
e390   30 e0 2b 8c 30 00 20 8c  83 00 21 70 05 00 21 59   0.+.0. ...!p..!Y
e3a0   18 20 81 90 fc 4b ff 09  00 00 30 8c 30 e0 2b 8c   . ...K....0.0.+.
e3b0   30 00 20 8c 83 00 21 70  05 00 21 59 18 20 31 92   0. ...!p..!Y. 1.
e3c0   01 e0 20 8c 04 16 18 5c  98 3f 09 39 00 00 28 8c   .. ....\.?.9..(.
e3d0   1c e0 23 90 14 20 29 92  20 e0 23 90 14 20 29 92   ..#.. ). .#.. ).
e3e0   05 16 20 5c 1c e0 23 92  20 e0 23 92 05 e0 23 c2   .. \..#. .#...#.
e3f0   00 00 00 0a 00 00 00 00  00 00 00 00 00 00 00 00   ................
e400   00 00 20 8c 00 30 20 92  24 ed 05 10 00 30 20 92   .. ..0 .$....0 .
e410   20 ed 05 10 00 30 20 8c  00 00 00 28 00 30 20 92    ....0 ....(.0 .
e420   48 f5 05 10 00 00 18 8c  01 e0 28 8c 30 00 20 8c   H.........(.0. .
e430   85 00 21 70 00 34 29 8c  90 ed 05 10 30 00 20 8c   ..!p.4).....0. .
e440   83 00 21 70 00 34 29 92  b0 ed 05 10 01 e0 28 8c   ..!p.4).......(.
e450   30 00 20 8c 83 00 21 70  00 34 29 82 b4 ed 05 10   0. ...!p.4).....
e460   01 e0 28 8c 05 16 18 5c  27 00 20 8c bc 1f 29 3c   ..(....\'. ...)<
e470   00 30 28 8c 90 ed 05 10  30 00 20 8c 83 00 21 70   .0(.....0. ...!p
e480   00 34 29 92 b0 ed 05 10  01 e0 28 8c 30 00 20 8c   .4).......(.0. .
e490   83 00 21 70 00 34 29 82  b4 ed 05 10 00 30 20 8c   ..!p.4)......0 .
e4a0   60 ed 05 10 00 30 20 92  80 ed 05 10 00 00 00 0a   `....0 .........
```

```
Mar 27 18:20 1996  image.txt Page 86

e4b0    10 16 68 5c 10 4e 24 59  90 0d 71 59 14 e0 14 3a   ..n\.N$Y..qY...=
e4c0    00 30 68 92 20 ed 05 10  0e 16 80 5c 00 00 00 0a   .0h. ......\....
e4d0    0e 16 80 5c dc 47 ff 09  10 0e 24 59 90 0d 71 59   ...\.G....$Y..qY
e4e0    00 30 20 90 20 ed 05 10  1c 20 01 32 18 a0 0b 3c   .0 . .... .2...<
e4f0    00 30 20 c0 35 ed 05 10  18 0e 21 59 9d 0d 21 59   .0 .5.....!Y..!Y
e500    10 20 01 3a 00 30 80 8c  ff ff ff ff 00 00 00 0a   . .:.0..........
e510    00 30 38 8c 30 ed 05 10  00 30 20 8c 60 ed 05 10   .08.0....0 .`...
e520    00 30 20 92 14 f5 05 10  00 30 20 92 10 f5 05 10   .0 ......0 .....
e530    00 30 20 8c 90 ed 05 10  00 30 20 92 18 f5 05 10   .0 ......0 .....
e540    00 30 20 92 1c f5 05 10  00 30 20 92 20 f5 05 10   .0 ......0 . ...
e550    00 00 78 8c 01 00 30 8c  60 e0 29 8c 30 00 20 8c   ..x...0.`.).0. .
e560    8f 00 21 70 05 00 21 59  00 10 31 c2 01 e0 2b 8c   ..!p..!Y..1...+.
e570    05 16 78 5c 28 00 20 8c  dc 1f 29 3c 00 00 78 8c   ..x\(. ...)<..x.
e580    05 00 30 8c 30 e0 29 8c  30 00 20 8c 8f 00 21 70   ..0.0.).0. ...!p
e590    05 00 21 59 00 10 31 c2  40 06 20 8c 28 e8 21 8a   ..!Y..1.@. .(.!.
e5a0    28 e8 29 88 00 30 20 8c  ff ff 00 00 85 00 29 58   (.)..0 .......)X
e5b0    03 00 20 8c 05 16 80 5c  04 16 88 5c 74 73 ff 09   .. ....\...\ts..
e5c0    30 e0 29 8c 30 00 20 8c  8f 00 21 70 05 00 21 59   0.).0. ...!p..!Y
e5d0    18 20 81 92 30 e0 29 8c  30 00 20 8c 8f 00 21 70   . ..0.).0. ...!p
e5e0    05 00 21 59 18 20 21 90  10 20 01 35 00 30 80 8c   ..!Y. !.. .5.0..
e5f0    ff ff ff ff 00 00 00 0a  f4 01 20 8c 2a e8 21 8a   .......... .*.!.
e600    2a e8 29 88 00 30 20 8c  ff ff 00 00 85 00 21 58   *.)..0 .......!X
e610    14 20 29 8c 03 00 20 8c  05 16 80 5c 04 16 88 5c   . )... ....\...\
e620    10 73 ff 09 30 e0 29 8c  30 00 20 8c 8f 00 21 70   .s..0.).0. ...!p
e630    05 00 21 59 1c 20 81 92  30 e0 29 8c 30 00 20 8c   ..!Y. ..0.).0. .
e640    8f 00 21 70 05 00 21 59  1c 20 21 90 10 20 01 35   ..!p..!Y. !.. .5
e650    00 30 80 8c ff ff ff ff  00 00 00 0a 30 e0 29 8c   .0.........0.).
e660    30 00 20 8c 8f 00 21 70  05 00 21 59 18 20 21 90   0. ...!p..!Y. !.
e670    0c 20 31 90 30 e0 29 8c  30 00 20 8c 8f 00 21 70   . 1.0.).0. ...!p
e680    05 00 21 59 08 20 31 92  30 e0 29 8c 30 00 20 8c   ..!Y. 1.0.).0. .
e690    8f 00 21 70 05 00 21 59  08 20 31 90 30 e0 29 8c   ..!p..!Y. 1.0.).
e6a0    30 00 20 8c 8f 00 21 70  05 00 21 59 10 20 31 92   0. ...!p..!Y. 1.
e6b0    30 e0 29 8c 30 00 20 8c  8f 00 21 70 05 00 21 59   0.).0. ...!p..!Y
e6c0    08 20 31 90 30 e0 29 8c  30 00 20 8c 8f 00 21 70   . 1.0.).0. ...!p
e6d0    05 00 21 59 0c 20 31 92  30 e0 29 8c 30 00 20 8c   ..!Y. 1.0.).0. .
e6e0    8f 00 21 70 05 00 21 59  18 20 21 90 0c 20 31 90   ..!p..!Y. !.. 1.
e6f0    28 e8 29 88 00 30 20 8c  ff ff 00 00 85 00 21 58   (.)..0 .......!X
e700    06 00 21 59 01 09 31 59  30 e0 29 8c 30 00 20 8c   ..!Y..1Y0.).0. .
e710    8f 00 21 70 05 00 21 59  14 20 31 92 01 e0 23 8c   ..!p..!Y. 1...#.
e720    04 16 78 5c 81 28 01 5a  58 fe ff 11 14 60 3b 92   ..x\.(.ZX....`;.
```

```
Mar 27 18:20 1996  image.txt Page 87

e730   0a 16 80 5c ec 64 ff 09  14 20 3c 92 1c e0 69 92   ...\.d...  <...i.
e740   0d 16 80 5c dc 64 ff 09  20 e0 81 92 01 00 28 8c   ...\.d.. .....(.
e750   00 30 20 8c 00 4b 00 00  05 16 80 5c 04 16 88 5c   .0 ..K.....\...\
e760   80 16 00 09 00 30 20 8c  00 ff 00 00 90 00 21 58   .....0 .......!X
e770   88 0a 21 59 1e e8 21 8a  00 30 20 8c 00 4b 00 00   ..!Y..!..0 ..K..
e780   05 16 80 5c 04 16 88 5c  58 16 00 09 ff 00 20 8c   ...\...\X..... .
e790   90 00 21 58 1c e8 21 8a  03 00 20 8c 20 e8 21 8a   ..!X..!... . .!.
e7a0   05 16 20 5c 24 e8 21 8a  08 00 20 8c 22 e8 21 8a   .. \$.!... .".!.
e7b0   00 00 20 8c f4 e7 21 92  42 e8 21 82 05 16 20 5c   .. ...!.B.!... \
e7c0   05 e0 21 c2 09 00 20 8c  06 e0 21 c2 05 16 20 5c   ..!... ...!... \
e7d0   1a e0 21 c2 00 00 20 8c  08 e0 21 c2 07 e0 21 c2   ..!... ...!...!.
e7e0   e8 03 20 8c 10 e8 21 92  64 00 20 8c 08 e8 21 92   .. ...!.d. ...!.
e7f0   00 00 20 8c 44 e8 21 82  0d 00 20 8c 46 e8 21 82   .. .D.!... .F.!.
e800   03 00 20 8c 47 e8 21 82  00 00 20 8c 48 e8 21 82   .. .G.!... .H.!.
e810   50 e8 21 c2 f4 e7 21 92  f8 e7 21 92 4c e8 21 92   P.!...!...!.L.!.
e820   42 e8 21 82 3c e8 21 82  3e e8 21 82 3f e8 21 82   B.!.<.!.>.!.?.!.
e830   43 e8 21 82 45 e8 21 82  fc e7 21 92 16 e8 21 82   C.!.E.!...!...!.
e840   3d e8 21 82 00 30 20 92  50 0f 06 10 00 30 20 8c   =.!..0 .P....0 .
e850   30 ed 05 10 00 30 20 92  a0 f5 05 10 00 00 20 8c   0....0 ....... .
e860   00 30 20 92 b4 f5 05 10  00 30 20 92 b8 f5 05 10   .0 ......0 .....
e870   00 30 20 92 bc f5 05 10  07 16 80 5c 04 0a 00 09   .0 ........\....
e880   0e 16 80 5c 00 00 00 0a  00 00 00 00 00 00 00 00   ...\............
e890   10 16 78 5c 00 00 18 8c  01 00 30 8c 60 e0 2b 8c   ..x\......0.`.+.
e8a0   30 00 20 8c 83 00 21 70  05 00 21 59 00 10 31 c2   0. ...!p..!Y..1.
e8b0   60 e0 2b 8c 30 00 20 8c  83 00 21 70 05 00 21 59   `.+.0. ...!p..!Y
e8c0   18 20 21 90 50 20 01 32  60 e0 2b 8c 30 00 20 8c   . !.P .2`.+.0. .
e8d0   83 00 21 70 05 00 21 59  18 20 21 90 0c 20 21 90   ..!p..!Y. !.. !.
e8e0   34 20 01 32 60 e0 2b 8c  30 00 20 8c 83 00 21 70   4 .2`.+.0. ...!p
e8f0   05 00 21 59 18 20 81 90  a8 46 ff 09 00 00 30 8c   ..!Y. ...F....0.
e900   60 e0 2b 8c 30 00 20 8c  83 00 21 70 05 00 21 59   `.+.0. ...!p..!Y
e910   18 20 31 92 01 e0 28 8c  05 16 18 5c 28 00 20 8c   . 1...(....\(. .
e920   78 1f 29 3c 60 e0 23 8c  e8 e7 23 92 60 e0 23 8c   x.)<`.#...#.`.#.
e930   ec e7 23 92 60 e0 23 8c  f0 e7 23 92 38 e0 23 90   ..#.`.#...#.8.#.
e940   40 e0 23 92 38 e0 23 90  3c e0 23 92 38 e0 3b 90   @.#.8.#.<.#.8.;.
e950   00 00 30 8c 44 e0 2b 90  38 e0 23 90 04 41 21 59   ..0.D.+.8.#..A!Y
e960   07 16 80 5c 06 16 88 5c  04 16 90 5c ac 2b ff 0b   ...\...\...\.+..
e970   01 00 20 8c 04 e0 23 c2  05 e0 23 c2 09 00 20 8c   .. ...#...#... .
e980   06 e0 23 c2 06 16 20 5c  0c e0 23 92 10 e0 23 92   ..#... \..#...#.
e990   18 e0 23 82 f4 e7 23 92  f8 e7 23 92 fc e7 23 92   ..#...#...#...#.
e9a0   00 e8 23 92 04 e8 23 92  64 00 20 8c 08 e8 23 92   ..#...#.d. ...#.
```

Mar 27 18:20 1996 image.txt Page 88

```
e9b0   e8 03 20 8c 10 e8 23 92  06 16 20 5c 14 e8 23 82   .. ...#... \..#.
e9c0   15 e8 23 82 3c e8 23 82  3e e8 23 82 3f e8 23 82   ..#.<.#.>.#.?.#.
e9d0   42 e8 23 82 01 00 20 8c  1a e0 23 c2 06 16 20 5c   B.#... ...#... \
e9e0   44 e8 23 82 0a 00 20 8c  46 e8 23 82 03 00 20 8c   D.#... .F.#... .
e9f0   47 e8 23 82 06 16 20 5c  48 e8 23 82 50 e8 23 c2   G.#... \H.#.P.#.
ea00   4c e8 23 92 43 e8 23 82  45 e8 23 82 16 e8 23 82   L.#.C.#.E.#...#.
ea10   08 e0 23 c2 07 e0 23 c2  3d e8 23 82 00 30 20 c2   ..#...#.=.#..0 .
ea20   d0 07 06 10 00 30 20 92  b4 f5 05 10 00 30 20 92   .....0 ......0 .
ea30   b8 f5 05 10 00 30 20 92  bc f5 05 10 00 00 00 0a   .....0 .........
ea40   00 00 00 0a 00 00 00 00  00 00 00 00 00 00 00 00   ................
ea50   90 60 08 8c 10 16 60 5c  0c 20 03 32 14 20 23 90   .`....`\. .2. #.
ea60   08 20 01 35 00 00 00 0a  14 20 23 90 04 16 70 5c   . .5..... #...p\
ea70   05 20 21 c0 18 0e 21 59  98 0d 21 59 08 20 01 3d   . !...!Y..!Y. .=
ea80   00 00 00 0a 50 a8 23 c0  18 0e 21 59 98 0d 21 59   ....P.#...!Y..!Y
ea90   81 28 01 5a 8c 01 00 15  00 30 20 c0 91 07 06 10   .(.Z.....0 .....
eaa0   a8 20 11 3d 00 00 20 8c  50 a8 23 c2 64 00 28 8c   . .=.. .P.#.d.(.
eab0   02 00 20 8c 05 16 80 5c  04 16 88 5c 74 6e ff 09   .. ....\...\tn..
eac0   10 16 78 5c 08 20 04 35  78 ff ff 09 40 e0 2f 8c   ..x\. .5x...@./.
ead0   00 30 20 8c 70 ee 00 00  05 16 80 5c 04 16 88 5c   .0 .p......\...\
eae0   e0 19 02 0b 05 16 30 5c  0c e0 2b 90 06 16 80 5c   ......0\..+....\
eaf0   60 1b 02 0b 10 16 20 5c  06 16 80 5c 05 16 88 5c   `..... \...\...\
eb00   04 16 90 5c 4c 4b ff 09  06 16 80 5c 44 1b 02 0b   ...\LK.....\D...
eb10   10 e0 23 90 04 00 24 59  10 e0 23 92 00 30 20 90   ..#...$Y..#..0 .
eb20   94 07 06 10 0c 20 81 90  28 60 ff 09 10 20 04 3a   ..... ..(`... .:
eb30   0f 16 80 5c 4c 13 00 09  00 00 00 0a 0f 16 80 5c   ...\L..........\
eb40   60 44 ff 09 00 00 00 0a  00 30 20 c0 91 07 06 10   `D.......0 .....
eb50   80 28 01 5a cc 00 00 15  f8 a7 23 90 14 20 01 32   .(.Z......#.. .2
eb60   f8 a7 83 90 0c 51 ff 09  00 00 20 8c f8 a7 23 92   .....Q.... ...#.
eb70   00 30 80 90 80 0e 06 10  d8 1a 02 0b 02 00 88 8c   .0..............
eb80   b0 6d ff 09 10 16 78 5c  08 20 04 35 b4 fe ff 09   .m....x\. .5....
eb90   00 30 30 90 80 0e 06 10  0c e0 2b 90 00 30 80 90   .00.......+..0..
eba0   80 0e 06 10 ac 1a 02 0b  10 16 20 5c 06 16 80 5c   .......... \...\
ebb0   05 16 88 5c 04 16 90 5c  98 4a ff 09 00 30 80 90   ...\...\.J...0..
ebc0   80 0e 06 10 8c 1a 02 0b  10 e0 23 90 04 00 24 59   ...........#...$Y
ebd0   10 e0 23 92 00 00 28 8c  10 e0 23 90 00 10 29 82   ..#...(...#...).
ebe0   00 30 20 90 94 07 06 10  0c 20 81 90 64 5f ff 09   .0 ...... ..d_..
ebf0   24 20 04 3a 00 30 80 90  94 07 06 10 0f 16 88 5c   $ .:.0.........\
ec00   10 5f ff 09 01 00 20 8c  00 30 20 c2 91 07 06 10   ._.... ..0 .....
ec10   00 00 00 0a 0f 16 80 5c  88 43 ff 09 00 00 00 0a   .......\.C......
ec20   e4 a7 23 90 04 16 68 5c  0c 20 29 90 10 20 21 90   ..#...h\. ).. !.
```

Mar 27 18:20 1996 image.txt Page 89

```
ec30    04 41 21 59 04 16 18 5c  14 20 01 3e 14 60 2b 50   .A!Y...\. .>.`+.
ec40    08 60 23 90 04 41 21 59  83 00 19 59 42 a8 2b 80   . #..A!Y...YB.+.
ec50    ff 00 20 8c 85 00 21 58  18 20 11 30 90 01 20 8c   .. ...!X. .0.. .
ec60    10 00 19 3b 0e 16 80 5c  78 01 00 09 00 00 00 0a   ...;...\x.......
ec70    08 a0 23 c0 18 0e 21 59  98 0d 21 59 8c 20 41 3a   ..#...!Y..!Y. A:
ec80    0e 16 80 5c 9c 3e 00 09  08 a0 23 c0 18 0e 21 59   ...\.>....#...!Y
ec90    98 0d 21 59 74 20 01 3d  e4 a7 3b 90 b0 e0 37 8c   ..!Yt .=..;...7.
eca0    28 a8 2b 88 00 30 20 8c  ff ff 00 00 85 00 29 58   (.+..0 .......)X
ecb0    01 00 20 8c 07 16 80 5c  06 16 88 5c 05 16 90 5c   .. ....\...\...\
ecc0    04 16 98 5c 2c 42 00 09  64 00 20 8c 10 00 81 3d   ...\,B..d. ....=
ecd0    00 00 20 8c 08 a0 23 c2  30 00 00 08 b0 e0 37 8c   .. ...#.0.....7.
ece0    00 30 28 8c b0 ee 00 00  05 00 20 8c 06 16 80 5c   .0(....... ....\
ecf0    05 16 88 5c 04 16 90 5c  d4 18 02 0b 0c 20 04 3d   ...\...\..... .=
ed00    07 00 20 8c 08 a0 23 c2  08 a0 23 c0 18 0e 21 59   .. ...#...#...!Y
ed10    98 0d 21 59 2c 20 19 3a  08 a0 23 c0 18 0e 21 59   ..!Y, .:..#...!Y
ed20    98 0d 21 59 1c 20 41 3a  18 a0 2b 80 ff 00 20 8c   ..!Y. A:..+... .
ed30    85 00 21 58 0c 20 09 3d  00 00 20 8c 08 a0 23 c2   ..!X. .=.. ...#.
ed40    08 a0 23 c0 18 0e 21 59  98 0d 21 59 38 20 01 3a   ..#...!Y..!Y8 .:
ed50    08 a0 23 c0 18 0e 21 59  98 0d 21 59 81 09 29 59   ..#...!Y..!Y..)Y
ed60    06 a0 23 c0 18 0e 21 59  98 0d 21 59 05 0e 21 59   ..#...!Y..!Y..!Y
ed70    05 3d e9 90 60 0f 06 10  0f 16 80 5c 0e 16 88 5c   .=..`......\...\
ed80    00 50 07 86 00 00 00 0a  00 00 00 00 00 00 00 00   .P..............
ed90    10 16 18 5c 40 28 24 88  08 20 41 37 00 00 00 0a   ...\@(s.. A7....
eda0    40 e8 20 c0 18 0e 21 59  98 0d 21 59 08 20 11 3a   @. ...!Y..!Y. .:
edb0    00 00 00 0a 13 00 20 8c  03 16 80 5c 04 16 88 5c   ...... ....\...\
edc0    60 00 00 09 42 e8 20 80  82 09 21 58 42 e8 20 82   `...B. ...!XB. .
edd0    00 00 00 0a 00 00 00 00  00 00 00 00 00 00 00 00   ................
ede0    10 16 18 5c 40 28 24 c0  18 0e 21 59 98 0d 21 59   ...\@(s...!Y..!Y
edf0    08 20 11 3a 00 00 00 0a  11 00 20 8c 03 16 80 5c   . .:...... ....\
ee00    04 16 88 5c 1c 00 00 09  42 e8 20 80 02 0e 21 58   ...\....B. ...!X
ee10    42 e8 20 82 00 00 00 0a  00 00 00 00 00 00 00 00   B. .............
ee20    10 16 18 5c 2c 28 34 8c  3e 28 2c 80 ff 00 20 8c   ...\,(4.>(,.... .
ee30    85 00 21 58 06 00 21 59  00 10 89 82 3e 28 24 80   ..!X..!Y....>(s.
ee40    01 20 21 8c 3e 28 24 82  3e 28 2c 80 ff 00 20 8c   . !.>(s.>(,.... .
ee50    85 00 21 58 0c 20 81 3d  00 00 20 8c 3e e8 20 82   ..!X. .=.. .>. .
ee60    3f e8 20 80 01 20 21 8c  3f e8 20 82 00 00 00 0a   ?. .. !.?. .....
ee70    0d 0a 0d 0a 20 21 21 21  20 53 65 74 75 70 20 6d   .... !!! Setup m
ee80    61 6e 61 67 6d 65 6e 74  20 69 73 20 61 6c 72 65   anagment is alre
ee90    61 64 79 20 61 63 74 69  76 61 74 65 64 20 62 79   ady activated by
eea0    20 54 65 6c 6e 65 74 20  21 21 21 20 0a 0d 00 00    Telnet !!! ....
```

```
Mar 27 18:20 1996  image.txt Page 90

eeb0    45 52 52 4f 52 00 00 00  00 00 00 00 00 00 00 00   ERROR...........
eec0    10 16 30 5c 11 16 38 5c  14 e0 21 90 0d 20 19 80   ..0\..8\..!.. ..
eed0    14 e0 00 3a 06 16 80 5c  07 16 88 5c 84 56 ff 09   ...:...\...\.V..
eee0    38 00 00 08 0c e0 08 3a  83 00 20 8c 10 c0 20 3d   8.......:.. ... =
eef0    07 16 80 5c ac 40 ff 09  20 00 00 08 14 e0 70 3d   ...\.@.. .....p=
ef00    06 16 80 5c 07 16 88 5c  98 02 00 09 0c 00 00 0d   ...\...\........
ef10    07 16 80 5c 8c 40 ff 08  00 00 00 0a 00 00 00 00   ...\.@..........
ef20    10 16 70 5c 0c a0 03 32  14 a0 23 90 08 20 01 35   ..p\...2..#.. .5
ef30    00 00 00 0a 14 a0 23 90  04 16 78 5c 08 20 01 35   ......#...x\. .5
ef40    00 00 00 0a 05 e0 23 c0  18 0e 21 59 98 0d 21 59   ......#...!Y..!Y
ef50    08 20 01 3d 00 00 00 0a  e8 e7 23 90 00 10 21 c0   . .=......#...!.
ef60    4c 20 01 3a e8 e7 23 90  18 20 21 90 10 20 01 32   L .:..#.. !.. .2
ef70    e8 e7 23 90 18 20 81 90  28 40 ff 09 00 00 28 8c   ..#.. ..(@....(.
ef80    e8 e7 23 90 18 20 29 92  01 00 28 8c e8 e7 23 90   ..#.. )...(...#.
ef90    00 10 29 c2 e8 e7 23 90  20 20 21 90 e8 e7 23 92   ..)...#.  !...#.
efa0    e8 e7 23 90 00 10 21 c0  bc 3f 01 3a 0e 16 80 5c   ..#...!..?.:...\
efb0    10 55 ff 09 10 16 38 5c  0c 20 04 35 0f 16 80 5c   .U....8\. .5...\
efc0    a0 38 00 08 08 e0 01 35  00 00 00 0a f0 e7 23 90   .8.....5......#.
efd0    00 10 21 c0 1c 20 19 3d  f0 e7 23 90 00 10 21 c0   ..!.. .=..#...!.
efe0    10 20 19 3d 0e 16 80 5c  07 16 88 5c 24 57 ff 08   . .=...\...\$W..
eff0    e8 e7 23 90 00 10 21 c0  40 20 01 3d e8 e7 23 90   ..#...!.@ .=..#.
f000    18 20 21 90 10 20 01 32  e8 e7 23 90 18 20 81 90   . !.. .2..#.. ..
f010    90 3f ff 09 00 00 28 8c  e8 e7 23 90 18 20 29 92   .?....(...#.. ).
f020    01 00 28 8c e8 e7 23 90  00 10 29 c2 e8 e7 23 90   ..(...#...)...#.
f030    20 20 21 90 e8 e7 23 92  10 e0 29 90 0c e0 21 90     !...#...)...!.
f040    5c 00 29 32 0c e0 21 90  00 10 21 80 07 e0 23 c2   \.)2..!...!...#.
f050    07 e0 23 c0 18 0e 21 59  98 0d 21 59 48 20 01 3a   ..#...!Y..!YH .:
f060    07 e0 23 c0 18 0e 21 59  98 0d 21 59 81 09 31 59   ..#...!Y..!Y..1Y
f070    06 e0 23 c0 18 0e 21 59  98 0d 29 59 28 00 20 8c   ..#...!Y..)Y(. .
f080    85 00 21 70 06 3d 19 90  c0 10 06 10 07 16 80 5c   ..!p.=.........\
f090    0f 16 88 5c 00 d0 00 86  0c 00 00 08 07 16 80 5c   ...\...........\
f0a0    00 3f ff 09 0e 16 80 5c  18 54 ff 09 10 16 38 5c   .?.....\.T....8\
f0b0    00 28 04 5a 18 ff ff 15  00 00 00 0a 00 00 00 00   .(.Z............
f0c0    81 00 28 8c 14 60 24 90  0d 20 29 82 94 53 ff 08   ..(..`$.. )..S..
f0d0    10 16 78 5c 11 16 18 5c  12 16 38 5c 0c e0 30 90   ..x\...\..8\..0.
f0e0    82 00 28 8c 14 e0 20 90  0d 20 29 82 10 a0 39 92   ..(... .. )...9.
f0f0    70 53 ff 08 00 00 00 00  00 00 00 00 00 00 00 00   pS..............
f100    14 20 34 90 22 a8 21 88  80 09 21 58 22 a8 21 8a   . 4.".!...!X".!.
f110    22 a8 29 88 00 30 20 8c  ff ff 00 00 85 00 29 58   ".)..0 .......)X
f120    18 a8 21 90 09 20 29 82  22 a8 21 88 81 09 21 58   ..!.. ).".!...!X
```

```
Mar 27 18:20 1996   image.txt Page 51

f130    22 a8 21 8a 22 a8 29 88  00 30 20 8c ff ff 00 00   ".!.".)..0 .....
f140    85 00 29 58 18 a8 21 90  09 20 29 82 00 00 00 0a   ..)X..!.. )......
f150    14 20 34 30 22 a8 21 88  00 0e 21 58 22 a8 21 8a   . 4.".!...!X".!.
f160    22 a8 29 88 00 30 20 8c  ff ff 00 00 85 00 29 58   ".)..0 .......)X
f170    18 a8 21 90 09 20 29 82  22 a8 21 88 01 0e 21 58   ..!.. ).".!...!X
f180    22 a8 21 8a 22 a8 29 88  00 30 20 8c ff ff 00 00   ".!.".)..0 .....
f190    85 00 29 58 18 a8 21 90  09 20 29 82 00 00 00 0a   ..)X..!.. )......
f1a0    10 16 60 5c 11 16 68 5c  14 20 73 90 0c 60 23 90   ..`\..h\. s..`#.
f1b0    00 10 39 90 00 30 20 8c  11 41 00 00 20 c0 21 3d   ..9..0 ..A.. .!=
f1c0    0c 16 80 5c 0d 16 88 5c  38 ff ff 09 0c 16 80 5c   ...\...\8.......\
f1d0    0d 16 88 5c ec fe ff 09  98 00 00 08 00 30 20 8c   ...\..........0 .
f1e0    12 41 00 00 20 c0 21 3d  0c 16 80 5c 0d 16 88 5c   .A.. .!=...\...\
f1f0    60 ff ff 09 0c 16 80 5c  0d 16 88 5c c4 fe ff 09   `.......\...\....
f200    70 00 00 08 58 e0 51 3d  08 00 28 8c 02 00 20 8c   p...X.Q=..(.... .
f210    05 16 80 5c 04 16 88 5c  18 67 ff 09 10 16 78 5c   ...\...\.g....x\
f220    0c 20 04 35 01 00 80 8c  b8 45 ff 09 09 00 30 8c   . .5.....E....0.
f230    10 e0 2b 90 01 60 21 8c  10 e0 23 92 00 50 31 82   ..+..`!...#..P1.
f240    0c 16 80 5c 0f 16 88 5c  18 53 ff 09 20 a0 83 90   ...\...\.S.. ...
f250    0d 16 88 5c 6c fe ff 09  18 00 00 08 01 00 20 8c   ...\l.......... .
f260    0c 16 80 5c 0d 16 88 5c  04 16 90 5c 64 fe ff 08   ...\...\...\d...
f270    00 00 00 0a 00 00 00 00  00 00 00 00 00 00 00 00   ................
f280    10 16 38 5c 1c 28 2c 88  00 30 20 8c ff ff 00 00   ..8\.(,..0 .....
f290    85 00 29 58 ff 00 20 8c  85 00 21 58 10 0e 21 59   ..)X.. ...!X..!Y
f2a0    90 0d 31 59 1e 28 2c 88  00 30 20 8c ff ff 00 00   ..1Y.(,..0 .....
f2b0    85 00 21 58 08 0f 29 59  00 30 20 8c 00 ff 00 00   ..!X..)Y.0 .....
f2c0    85 00 21 58 86 03 21 58  10 0e 21 59 90 0d 21 59   ..!X..!X..!Y..!Y
f2d0    00 00 80 8c 04 16 88 5c  08 0b 00 09 b4 9e ff 09   .......\........
f2e0    18 e8 31 90 02 00 20 8c  05 a0 21 82 01 00 80 8c   ..1... ...!.....
f2f0    40 a1 ff 09 04 00 20 8c  05 a0 21 82 01 00 80 8c   @..... ...!.....
f300    30 a1 ff 09 41 00 20 8c  05 a0 21 82 20 e8 29 88   0...A. ...!. .).
f310    00 30 20 8c ff ff 00 00  85 00 21 58 87 09 21 58   .0 .......!X..!X
f320    07 a0 21 82 1c e8 29 88  00 30 20 8c ff ff 00 00   ..!...)..0 .....
f330    85 00 21 58 01 a0 21 82  1e e8 29 88 00 30 20 8c   ..!X..!...)..0 .
f340    ff ff 00 00 85 00 21 58  03 a0 21 82 20 e8 29 88   ......!X..!. .).
f350    00 30 20 8c ff ff 00 00  85 00 21 58 07 a0 21 82   .0 .......!X..!.
f360    24 e8 29 88 00 30 20 8c  ff ff 00 00 85 00 21 58   $.)..0 .......!X
f370    03 a0 21 82 22 e8 29 88  00 30 20 8c ff ff 00 00   ..!.".)..0 .....
f380    85 00 21 58 09 a0 21 82  00 00 00 0a 00 00 00 00   ..!X..!.........
f390    40 60 08 8c 40 e0 87 b2  50 e0 a7 b2 70 e0 e7 a2   @`..@...P...p...
f3a0    00 1e f0 5c 00 30 18 8c  30 ed 05 10 00 30 20 c0   ...\.0..0....0 .
```

Mar 27 18:20 1996 image.txt Page 92

```
f3b0   35 ed 05 10 18 0e 21 59  98 0d 21 59 14 20 01 3d   5.....!Y..!Y. .=
f3c0   40 e0 87 b0 50 e0 a7 b0  70 e0 e7 a0 00 00 00 0a   @...P...p.......
f3d0   00 30 28 80 0b 00 00 28  ff 00 20 8c 85 00 29 58   .0(....(.. ...)X
f3e0   85 00 29 58 00 30 20 8c  ff ff 00 00 85 00 21 58   ..)X.0 .......!X
f3f0   04 16 38 5c 14 20 01 37  40 e0 87 b0 50 e0 a7 b0   ..8\. .7@...P...
f400   70 e0 e7 a0 00 00 00 0a  50 e8 20 c0 18 0e 21 59   p.......P. ...!Y
f410   98 0d 21 59 20 20 09 3d  03 16 80 5c 07 16 88 5c   ..!Y  .=...\...\
f420   70 01 00 09 40 e0 87 b0  50 e0 a7 b0 70 e0 e7 a0   p...@...P...p...
f430   00 00 00 0a 03 16 80 5c  07 16 88 5c 54 03 00 09   .......\...\T...
f440   40 e0 87 b0 50 e0 a7 b0  70 e0 e7 a0 00 00 00 0a   @...P...p.......
f450   00 30 18 8c 30 ed 05 10  00 30 20 c0 35 ed 05 10   .0..0....0 .5...
f460   18 0e 21 59 98 0d 21 59  08 20 01 3d 00 00 00 0a   ..!Y..!Y. .=....
f470   00 30 28 80 0b 00 00 28  ff 00 20 8c 85 00 29 58   .0(....(.. ...)X
f480   85 00 29 58 00 30 20 8c  ff ff 00 00 85 00 21 58   ..)X.0 .......!X
f490   04 16 38 5c 30 20 01 30  50 e8 20 c0 18 0e 21 59   ..8\0 .0P. ...!Y
f4a0   98 0d 21 59 14 20 09 3d  03 16 80 5c 07 16 88 5c   ..!Y. .=...\...\
f4b0   e0 00 00 09 10 00 00 08  03 16 80 5c 07 16 88 5c   ...........\...\
f4c0   d0 02 00 09 08 e0 29 37  00 00 00 0a 00 30 20 90   ......)7.....0 .
f4d0   1c f5 05 10 00 10 21 c0  18 20 19 3a 00 30 20 90   ......!.. .:.0 .
f4e0   1c f5 05 10 00 10 21 c0  08 20 21 3a 00 00 00 0a   ......!.. !:....
f4f0   50 e8 20 c0 18 0e 21 59  98 0d 21 59 0c 20 09 3d   P. ...!Y..!Y. .=
f500   03 16 80 5c bc 04 00 08  03 16 80 5c 44 04 00 09   ...\.......\D...
f510   08 20 04 3d 00 00 00 0a  03 16 80 5c 64 05 00 08   . .=.......\d...
f520   00 30 18 8c 30 ed 05 10  00 30 20 c0 35 ed 05 10   .0..0....0 .5...
f530   18 0e 21 59 98 0d 21 59  08 20 01 3d 00 00 00 0a   ..!Y..!Y. .=....
f540   e0 e7 20 90 10 20 29 90  e0 e7 20 90 0c 20 21 90   .. .. )... .. !.
f550   0c 00 29 32 1c e0 80 90  a8 4c ff 09 00 30 20 90   ..)2.....L...0 .
f560   50 0f 06 10 08 20 01 3d  00 00 00 0a 20 e0 80 90   P.... .=.... ...
f570   90 4c ff 09 00 00 20 8c  00 30 20 92 50 0f 06 10   .L.... ..0 .P...
f580   00 00 00 0a 00 00 00 00  00 00 00 00 00 00 00 00   ................
f590   10 16 60 5c 00 30 20 8c  ff ff 00 00 91 00 69 58   ..`\.0 .......iX
f5a0   e0 27 24 90 04 16 38 5c  0c 20 71 90 10 20 29 90   .'$...8\. q.. ).
f5b0   0c 20 21 90 04 41 21 59  04 16 78 5c 14 20 01 3e   . !..A!Y..x\. .>
f5c0   14 e0 29 90 08 e0 21 90  04 41 21 59 8f 00 79 59   ..)...!..A!Y..yY
f5d0   10 e0 63 3e 0c e0 03 3b  00 00 50 8c 08 00 00 08   ..c>...;..P.....
f5e0   01 00 50 8c 18 28 23 90  01 20 21 80 00 90 23 82   ..P..(#.. !...#.
f5f0   40 28 23 c0 18 0e 21 59  98 0d 21 59 5c 20 11 3d   @(#...!Y..!Y\ .=
f600   40 28 23 88 54 20 49 30  00 90 23 80 24 20 99 3d   @(#.T I0..#.$ .=
f610   42 28 23 80 83 09 21 58  42 28 23 82 18 28 23 90   B(#...!XB(#..(#.
f620   01 20 29 80 ff 00 20 8c  85 00 69 58 60 00 00 08   . )... ...iX`...
```

```
Mar 27 16:20 1995  image.txt Page 93

f630    00 90 23 80 24 20 89 3d  42 28 23 80 03 0e 21 58   ..#.$ .=B(#...!X
f640    42 28 23 82 18 28 23 90  01 20 29 80 ff 00 20 8c   B(#..(#.. )... .
f650    85 00 69 58 38 00 00 08  8d 90 27 58 20 20 01 3d   ..iX8.....'X  .=
f660    1c a0 02 3a 14 e0 21 90  0c 00 71 35 08 e0 71 90   ...:..!...q5..q.
f670    0c 00 00 08 01 a0 73 8c  04 00 00 08 18 28 23 90   ......s......(#.
f680    0b 20 29 80 ff 00 20 8c  85 00 69 58 00 6f 03 5a   . )... ...iX.o.Z
f690    54 ff ff 17 10 a0 02 3d  00 00 20 8c 44 28 23 82   T......=.. .D(#.
f6a0    cc 00 00 08 00 30 20 c0  91 07 06 10 08 20 09 3a   .....0 ...... .:
f6b0    00 00 00 0a 0c e0 71 92  0c e0 29 90 10 e0 21 90   ......q...)...!.
f6c0    04 41 21 59 04 16 78 5c  14 20 01 3e 14 e0 29 90   .A!Y..x\. .>..).
f6d0    08 e0 21 90 04 41 21 59  8f 00 79 59 02 00 20 8c   ..!..A!Y..yY.. .
f6e0    01 16 60 5c 04 16 88 5c  48 62 ff 09 10 16 18 5c   ...\...\Hb.....\
f6f0    08 20 04 35 00 00 00 0a  00 00 58 8c 10 e0 71 90   . .5......X...q.
f700    38 e0 03 3b 00 90 33 80  10 e0 28 90 01 60 21 8c   8..;..3...(..`!.
f710    10 e0 20 92 00 50 31 82  14 e0 21 90 0c 00 71 35   .. ..P1...!...q5
f720    08 e0 71 90 08 00 00 08  01 a0 73 8c 01 e0 22 8c   ..q.......s...".
f730    04 16 58 5c d0 df 23 3c  00 30 20 90 94 07 06 10   ..X\..#<.0 .....
f740    0c 20 81 90 0c 54 ff 09  1c 20 04 3a 10 e0 71 92   . ...T... .:..q.
f750    00 30 80 90 94 07 06 10  03 16 88 5c b4 53 ff 09   .0.........\.S..
f760    0c 00 00 08 03 16 80 5c  38 38 ff 09 78 05 20 8c   .......\88..x. .
f770    08 00 79 39 00 00 00 0a  08 e0 03 3c 00 00 00 0a   ..y9.......<....
f780    0c 16 80 5c 0c f6 ff 08  00 00 00 00 00 00 00 00   ...\............
f790    10 16 60 5c 00 30 20 8c  ff ff 00 00 91 00 69 58   ..`\.0 .......iX
f7a0    e0 27 24 90 04 16 18 5c  0c 20 79 90 10 20 29 90   .'$....\. y.. ).
f7b0    0c 20 21 90 04 41 21 59  04 16 38 5c 14 20 01 3e   . !..A!Y..8\. .>
f7c0    14 e0 28 90 08 e0 20 90  04 41 21 59 87 00 39 59   ..(... ..A!Y..9Y
f7d0    10 e0 61 3e 0c e0 01 3b  00 00 70 8c 08 00 00 08   ..a>...;..p.....
f7e0    01 00 70 8c 18 28 23 90  01 20 21 80 00 d0 23 82   ..p..(#.. !...#.
f7f0    06 20 23 c0 18 0e 21 59  98 0d 21 59 14 20 01 3a   . #...!Y..!Y. .:
f800    06 20 23 c0 18 0e 21 59  98 0d 21 59 5c 20 51 3d   . #...!Y..!Y\ Q=
f810    00 d0 33 80 46 28 2b 80  ff 00 20 8c 85 00 21 58   ..3.F(+... ...!X
f820    40 00 31 3d 48 28 23 80  01 20 29 8c ff 00 20 8c   @.1=H(#.. )... .
f830    85 00 31 58 48 28 2b 82  47 28 2b 80 85 00 21 58   ..1XH(+.G(+...!X
f840    28 00 31 3d 00 00 20 8c  48 28 23 82 01 00 20 8c   (.1=.. .H(#... .
f850    50 28 23 c2 10 e0 78 92  1c 20 83 90 a4 49 ff 08   P(#...x.. ...I..
f860    00 00 20 8c 48 28 23 82  40 28 23 c0 18 0e 21 59   .. .H(#.@(#...!Y
f870    98 0d 21 59 5c 20 11 3d  40 28 23 88 54 20 49 30   ..!Y\ .=@(#.T I0
f880    00 d0 23 80 24 20 99 3d  42 28 23 80 83 09 21 58   ..#.$ .=B(#...!X
f890    42 28 23 82 18 28 23 90  0b 20 29 80 ff 00 20 8c   B(#..(#.. )... .
f8a0    85 00 69 58 60 00 00 08  00 d0 23 80 24 20 89 3d   ..iX`.....#.$ .=
```

Mar 27 18:20 1996 image.txt Page 94

```
f8b0   42 28 23 80 03 0e 21 58  42 28 23 82 18 28 23 90   B(#...!XB(#..(#.
f8c0   0b 20 29 80 ff 00 20 8c  85 00 69 58 38 00 00 08   . )... ...iX8...
f8d0   8d 90 27 58 20 20 01 3d  1c a0 03 3a 14 e0 20 90   ..'X  .=...:.. .
f8e0   0c 00 79 35 08 e0 78 90  0c 00 00 08 01 e0 7b 8c   ..y5..x.......(.
f8f0   04 00 00 08 18 28 23 90  0b 20 29 80 ff 00 20 8c   .....(#.. )... .
f900   85 00 69 58 00 6f 03 5a  dc fe ff 17 0c e0 78 92   ..iX.o.Z......x.
f910   0c e0 28 90 10 e0 20 90  04 41 21 59 04 16 38 5c   ..(... ..A!Y..8\
f920   14 20 01 3e 14 e0 28 90  08 e0 20 90 04 41 21 59   . .>..(... ..A!Y
f930   87 00 39 59 78 05 20 8c  08 00 39 39 00 00 00 0a   ..9Yx. ...99....
f940   08 e0 01 3c 00 00 00 0a  0c 16 80 5c 44 f4 ff 08   ...<.......\D...
f950   10 16 18 5c 3d 28 2c 80  ff 00 20 8c 85 00 21 58   ...\=(,... ...!X
f960   40 20 01 32 18 e8 20 90  0b 20 29 80 ff 00 20 8c   @ .2.. .. )... .
f970   85 00 21 58 1c 20 29 30  00 00 28 8c 18 e8 20 90   ..!X. )0..(... .
f980   01 20 29 82 05 16 20 5c  3d e8 20 82 0c 00 00 08   . )... \=. .....
f990   00 00 80 8c 00 00 00 0a  00 00 80 8c 00 00 00 0a   ................
f9a0   42 e8 28 80 ff 00 20 8c  85 00 21 58 0c 20 19 30   B.(... ...!X. .0
f9b0   00 00 80 8c 00 00 00 0a  01 00 80 8c 00 00 00 0a   ................
f9c0   10 16 78 5c 18 28 34 90  18 28 3c 90 ec 27 24 90   ..x\.(4..(<..'$.
f9d0   00 10 21 c0 08 20 19 3a  00 00 00 0a ec e7 1b 90   ..!.. .:........
f9e0   0b a0 29 80 ff 00 20 8c  85 00 21 58 08 20 29 37   ..)... ...!X. )7
f9f0   00 00 00 0a ec e7 23 90  0c 20 21 90 00 10 21 80   ......#.. !...!.
fa00   01 e0 21 82 ec e7 2b 90  0c 60 21 90 01 20 21 8c   ..!...+..`!.. !.
fa10   0c 60 21 92 ec e7 23 90  0c 20 29 90 ec e7 23 90   .`!...#.. )...#.
fa20   14 20 21 90 44 00 29 35  00 00 28 8c ec e7 23 90   . !.D.)5..(...#.
fa30   00 10 29 c2 ec e7 23 90  18 20 21 90 1c 20 01 32   ..)...#.. !.. .2
fa40   ec e7 23 90 18 20 81 90  58 35 ff 09 00 00 28 8c   ..#.. ..X5....(.
fa50   ec e7 23 90 18 20 29 92  ec e7 23 90 20 20 21 90   ..#.. )...#.  !.
fa60   ec e7 23 92 00 00 00 0a  0b a0 29 80 ff 00 20 8c   ..#.......)... .
fa70   85 00 21 58 80 3f 29 37  00 00 00 0a 00 00 00 00   ..!X.?)7........
fa80   10 16 60 5c 18 28 5c 90  18 28 74 90 ec 27 24 90   ..`\.(\..(t..'$.
fa90   00 10 21 c0 83 28 01 5a  ec 01 00 15 ec 27 1b 90   ..!..(.Z.....'..
faa0   f4 27 23 90 50 20 01 32  06 20 23 c0 18 0e 21 59   .'#.P .2. #...!Y
fab0   98 0d 21 59 40 20 39 3d  0c 28 3b 90 10 28 33 90   ..!Y@ 9=.(;..(3.
fac0   2a 28 2b 88 00 30 20 8c  ff ff 00 00 85 00 21 58   *(+..0 .......!X
fad0   04 9d 21 8c 20 00 39 3b  04 28 2b 90 08 28 23 90   ..!. .9;.(+..(#.
fae0   14 00 29 39 00 30 20 90  50 06 06 10 08 20 01 35   ..)9.0 .P.... .5
faf0   00 00 00 0a 06 20 23 c0  18 0e 21 59 98 0d 21 59   ..... #...!Y..!Y
fb00   20 20 39 3d 40 28 23 c0  18 0e 21 59 98 0d 21 59     9=@(#...!Y..!Y
fb10   10 20 11 3d 0c 28 23 90  08 20 01 3d 00 00 00 0a   . .=.(#.. .=....
fb20   00 00 78 8c 0b a0 2b 80  ff 00 20 8c 85 00 29 58   ..x...+... ...)X
```

```
Mar 27 18:20 1996  image.txt Page 95

fb30    85 00 29 58 00 30 20 8c  ff ff 00 00 85 00 21 58   ..)X.0 .......!X
fb40    04 16 68 5c 05 2f 01 5a  e4 00 00 10 0c e0 20 90   ..h\./.Z...... .
fb50    00 10 21 80 01 e0 22 82  0c e0 20 90 01 20 21 8c   ..!..."... .. !.
fb60    0c e0 20 92 0c 28 23 90  10 20 01 3a 0c 28 23 90   .. ..(#.. .:.(#.
fb70    81 09 21 59 0c 28 23 92  0c 28 23 90 0c 20 01 3e   ..!Y.(#..(#.. .>
fb80    00 00 20 8c 0c 28 23 92  06 20 23 c0 18 0e 21 59   .. ..(#.. #...!Y
fb90    98 0d 21 59 38 20 39 3d  40 28 23 c0 18 0e 21 59   ..!Y8 9=@(#...!Y
fba0    98 0d 21 59 28 20 11 3d  0c 28 2b 90 10 28 23 90   ..!Y( .=.(+..(#.
fbb0    1c 00 29 3b 04 28 2b 90  08 28 23 90 10 00 29 39   ..);.(+..(#...)9
fbc0    04 28 23 90 01 20 21 8c  04 28 23 92 0c e0 28 90   .(#.. !..(#...(.
fbd0    14 e0 20 90 24 00 29 35  00 00 20 8c 00 d0 20 c2   .. .$.)5.. ... .
fbe0    ec 27 23 90 20 20 21 90  ec 27 23 92 04 16 18 5c   .'#.  !..'#....\
fbf0    00 10 21 c0 38 20 19 3d  01 e0 23 8c 04 16 78 5c   ..!.8 .=..#...x\
fc00    24 20 21 39 00 00 78 8c  0b a0 2b 80 ff 00 20 8c   $ !9..x...+... .
fc10    85 00 29 58 85 00 29 58  00 30 20 8c ff ff 00 00   ..)X..)X.0 .....
fc20    85 00 69 58 05 6f 03 5a  24 ff ff 17 06 20 23 c0   ..iX.o.Z$.... #.
fc30    18 0e 21 59 98 0d 21 59  08 20 39 3a 00 00 00 0a   ..!Y..!Y. 9:....
fc40    40 28 23 c0 18 0e 21 59  98 0d 21 59 08 20 11 3a   @(#...!Y..!Y. .:
fc50    00 00 00 0a 0c 28 2b 90  10 28 23 90 08 00 29 3c   .....(+..(#...)<
fc60    00 00 00 0a 04 28 2b 90  08 28 23 90 08 00 29 3b   .....(+..(#...);
fc70    00 00 00 0a 01 00 20 8c  00 30 20 92 50 0f 06 10   ...... ..0 .P...
fc80    00 00 00 0a ec 27 23 90  00 10 21 c0 08 20 21 3a   .....'#...!.. !:
fc90    00 00 00 0a 0c 28 23 90  48 20 01 39 0b a0 2b 80   .....(#.H .9..+.
fca0    ff 00 20 8c 85 00 21 58  04 16 68 5c 08 20 29 37   .. ...!X..h\. )7
fcb0    00 00 00 0a 00 00 20 8c  01 e0 22 82 0c 28 23 90   ...... ..."..(#.
fcc0    81 09 21 59 0c 28 23 92  0b a0 2b 80 ff 00 20 8c   ..!Y.(#...+... .
fcd0    85 00 21 58 04 16 68 5c  dc 3f 29 37 00 00 00 0a   ..!X..h\.?)7....
fce0    0b a0 2b 80 ff 00 20 8c  85 00 21 58 04 16 68 5c   ..+... ...!X..h\
fcf0    04 30 00 5a 00 00 20 22  e8 3f 29 37 10 00 20 8c   .0.Z.. ".?)7.. .
fd00    01 e0 22 82 0b a0 2b 80  ff 00 20 8c 85 00 21 58   .."...+... ...!X
fd10    04 16 68 5c 04 30 00 5a  00 00 20 22 e8 3f 29 37   ..h\.0.Z.. ".?)7
fd20    03 00 20 8c 01 e0 22 82  00 00 28 8c ec 27 23 90   .. ..."...(..'#.
fd30    00 10 29 c2 05 16 20 5c  40 28 23 c2 40 28 eb 88   ..)... \@(#.@(..
fd40    09 4e ef 58 40 28 eb 8a  00 00 00 0a 00 00 00 00   .N.X@(..........
fd50    10 16 78 5c 00 00 20 8c  f4 27 24 92 04 28 24 92   ..x\.. ..'$..($.
fd60    06 20 24 c0 18 0e 21 59  98 0d 21 59 08 20 39 3a   . $...!Y..!Y. 9:
fd70    00 00 00 0a 40 e8 23 88  08 20 49 37 00 00 00 0a   ....@.#.. I7....
fd80    08 00 28 8c 02 00 20 8c  05 16 80 5c 04 16 88 5c   ..(... ....\...\
fd90    a0 5b ff 09 10 16 38 5c  08 20 04 35 00 00 00 0a   .[....8\. .5....
fda0    06 00 30 8c 10 e0 29 90  01 60 21 8c 10 e0 21 92   ..0...)..`!...!.
```

```
Mar 27 16:20 1996   image.txt Page 96

fdb0    00 50 31 82 1c e0 23 90  0c 20 81 90 94 4d ff 09   .P1...#.. ...M..
fdc0    10 20 04 3a 1c e0 83 90  07 16 88 5c 44 4d ff 08   . .:.......\DM..
fdd0    07 16 80 5c cc 31 ff 08  00 00 00 00 00 00 00 00   ...\.1..........
fde0    11 16 38 5c 4c 20 04 3a  00 00 18 8c 00 30 20 90   ..8\L .:......0 .
fdf0    e0 fe 00 00 08 20 01 35  00 00 00 0a 83 39 20 90   ..... .5.....9 .
fe00    e0 fe 00 00 14 c0 21 35  83 39 20 90 e4 fe 00 00   ......!5.9 .....
fe10    01 0e 81 59 00 00 00 0a  01 e0 20 8c 04 16 18 5c   ...Y...... ....\
fe20    84 39 20 90 e0 fe 00 00  d4 3f 01 35 00 00 00 0a   .9 ......?.5....
fe30    00 00 18 8c 00 30 20 90  e4 fe 00 00 08 20 01 35   .....0 ...... .5
fe40    00 00 00 0a 83 39 20 90  e4 fe 00 00 01 0e 21 59   .....9 .......!Y
fe50    10 c0 21 35 83 39 80 90  e0 fe 00 00 00 00 00 0a   ..!5.9..........
fe60    01 e0 20 8c 04 16 18 5c  84 39 20 90 e4 fe 00 00   .. ....\.9 .....
fe70    d4 3f 01 35 00 00 00 0a  00 00 00 00 00 00 00 00   .?.5............
fe80    00 30 30 90 a0 f5 05 10  0c 20 2c 90 f0 a7 21 90   .00...... ,...!.
fe90    10 20 29 92 0c 20 2c 90  f0 a7 21 90 0c 20 29 92   . ).. ,...!.. ).
fea0    0c 20 2c 90 f0 a7 21 90  08 20 29 92 10 20 2c 90   . ,...!.. ).. ,.
feb0    f0 a7 21 90 14 20 29 92  f0 a7 21 90 18 20 81 92   ..!.. )...!.. ..
fec0    03 00 28 8c f0 a7 21 90  00 10 29 c2 f0 a7 21 90   ..(...!...)...!.
fed0    20 20 21 90 f0 a7 21 92  00 00 80 8c 00 00 00 0a     !...!.........
fee0    32 00 00 00 00 09 00 00  4b 00 00 00 00 06 00 00   2.......K.......
fef0    6e 00 00 00 17 04 00 00  86 00 00 00 59 03 00 00   n...........Y...
ff00    96 00 00 00 00 03 00 00  2c 01 00 00 60 01 00 00   ........,.......
ff10    58 02 00 00 c0 00 00 00  b0 04 00 00 60 00 00 00   X...........`...
ff20    60 09 00 00 30 00 00 00  10 0e 00 00 20 00 00 00   `...0....... ...
ff30    c0 12 00 00 18 00 00 00  20 1c 00 00 10 00 00 00   ........ .......
ff40    80 25 00 00 0c 00 00 00  00 4b 00 00 06 00 00 00   .%.......K......
ff50    00 96 00 00 03 00 00 00  00 e1 00 00 02 00 00 00   ................
ff60    00 c2 01 00 01 00 00 00  00 00 00 00 00 00 00 00   ................
ff70    10 16 38 5c 11 16 18 5c  f4 67 24 90 14 20 01 32   ..8\...\.g$.. .2
ff80    f4 e7 80 90 ec 3c ff 09  00 00 20 8c f4 e7 20 92   .....<.... ... .
ff90    f8 e7 20 90 14 20 01 32  f8 e7 80 90 d4 3c ff 09   .. .. .2.....<..
ffa0    00 00 20 8c f8 e7 20 92  14 e0 01 32 0c e0 21 90   .. ... ....2..!.
ffb0    0c 20 01 32 07 16 80 5c  e8 2f ff 09 03 16 80 5c   . .2...\./.....\
ffc0    d0 e8 ff 09 03 16 80 5c  88 29 00 08 00 00 00 00   .......\.)......
ffd0    11 16 78 5c 11 16 80 5c  d8 11 00 09 1a 00 28 8c   ..x\...\......(.
ffe0    02 00 20 8c 05 16 80 5c  04 16 88 5c 44 59 ff 09   .. ....\...\DY..
fff0    10 e0 83 92 0c 20 04 35  0f 16 80 5c 44 ea ff 09   ..... .5...\D...
10000   00 30 80 8c 40 ec 05 10  48 06 02 0b 10 16 18 5c   .0..@...H......\
10010   00 00 38 8c 10 e0 33 90  10 a0 29 90 01 60 21 8c   ..8...3...)..`!.
10020   10 a0 21 92 00 50 39 82  00 30 38 80 c0 f5 05 10   ..!..P9..08.....
```

```
10030  10 e0 33 90 10 a0 29 90  01 60 21 8c 10 a0 21 92  ..3.../..`!...!.
10040  00 50 39 82 34 20 04 3a  10 e0 23 90 10 20 29 90  .P9.4 .:..#.. ).
10050  00 30 20 8c 40 ec 05 10  05 16 80 5c 04 16 88 5c  .0 .@.......\...\
10060  60 04 02 0b 01 e0 30 8c  10 e0 2b 90 10 60 21 90  `.....0...+..`!.
10070  04 80 21 59 10 60 21 92  10 e0 23 90 01 16 80 5c  ..!Y.`!...#.....\
10080  04 16 88 5c 6c 0f 00 09  00 00 20 8c 10 e0 23 92  ...\l..... ...#.
10090  00 00 00 0a 00 00 00 00  00 00 00 00 00 00 00 00  ................
100a0  11 16 70 5c 11 16 80 5c  08 11 00 09 18 a0 2b 80  ..p\...\......+.
100b0  ff 00 20 8c 85 00 21 58  8c 20 09 3d 16 a8 2b 80  .. ...!X. .=..+.
100c0  ff 00 20 8c 85 00 21 58  28 20 29 39 00 30 80 8c  .. ...!X( )9.0..
100d0  40 18 01 00 ac ba 00 09  0e 16 80 5c b4 e7 ff 09  @...........\....
100e0  00 00 20 8c 16 a8 23 82  04 16 80 5c 84 81 ff 08  .. ...#....\....
100f0  08 00 28 8c 02 00 20 8c  05 16 80 5c 04 16 88 5c  ..\... ....\...\
10100  30 58 ff 09 10 16 78 5c  0c 20 04 35 0e 16 80 5c  0X....x\. .5...\
10110  30 e9 ff 09 02 00 30 8c  10 e0 2b 90 01 60 21 8c  0.....0...+..`!.
10120  10 e0 23 92 00 50 31 82  0e 16 80 5c 0f 16 88 5c  ..#..P1....\...\
10130  c0 0e 00 09 00 00 20 8c  06 a0 23 c2 18 a0 23 82  ...... ...#...#.
10140  00 00 00 0a 08 00 28 8c  02 00 20 8c 05 16 80 5c  ......(... ....\
10150  04 16 88 5c dc 57 ff 09  10 16 78 5c 0c 20 04 35  ...\.W....x\. .5
10160  0e 16 80 5c dc e8 ff 09  01 00 30 8c 10 e0 2b 90  ...\......0...+.
10170  01 60 21 8c 10 e0 23 92  00 50 31 82 0e 16 80 5c  .`!...#..P1....\
10180  0f 16 88 5c 6c 0e 00 09  06 a0 23 c0 18 0e 21 59  ...\l.....#...!Y
10190  98 0d 21 59 08 20 39 3d  0c a8 3b 90 00 00 20 8c  ..!Y. 9=..;... .
101a0  16 e8 23 82 40 a8 23 c2  40 a8 1b 88 09 ce 18 58  ..#.@.#.@......X
101b0  40 a8 1b 8a 06 a0 23 c2  0c a0 23 90 08 20 01 35  @.....#...#.. .5
101c0  00 00 00 0a 0c a0 23 90  0c 20 21 90 08 20 01 35  ......#.. !.. .5
101d0  00 00 00 0a 0c a0 83 90  c8 2d ff 09 00 00 20 8c  .........-.... .
101e0  0c a0 23 92 00 00 00 0a  00 00 00 00 00 00 00 00  ..#.............
101f0  11 16 78 5c 11 16 80 5c  b8 0f 00 09 08 00 28 8c  ..x\...\......(.
10200  02 00 20 8c 05 16 80 5c  04 16 88 5c 24 57 ff 09  .. ....\...\$W..
10210  10 16 38 5c 0c 20 04 35  0f 16 80 5c 24 e8 ff 09  ..8\. .5...\$...
10220  01 00 30 8c 10 e0 29 90  01 60 21 8c 10 e0 21 92  ..0...)..`!...!.
10230  00 50 31 82 0f 16 80 5c  07 16 88 5c b4 0d 00 09  .P1....\...\....
10240  00 00 20 8c 40 e8 23 c2  40 e8 1b 88 09 ce 18 58  .. .@.#.@......X
10250  40 e8 1b 8a 06 e0 23 c2  0c e0 23 90 08 20 01 35  @.....#...#.. .5
10260  00 00 00 0a 0c e0 23 90  0c 20 21 90 08 20 01 35  ......#.. !.. .5
10270  00 00 00 0a 0c e0 83 90  28 2d ff 09 00 00 20 8c  ........(-.... .
10280  0c e0 23 92 00 00 00 0a  00 00 00 00 00 00 00 00  ..#.............
10290  11 16 38 5c 11 16 80 5c  18 0f 00 09 08 00 28 8c  ..8\...\......(.
102a0  02 00 20 8c 05 16 80 5c  04 16 88 5c 84 56 ff 09  .. ....\...\.V..
```

Mar 27 18:20 1996 image.txt Page 98

```
102b0   10 16 18 5c 04 20 04 35  01 00 30 8c 10 e0 28 90   ...\. .5..0...(.
102c0   01 60 21 8c 10 e0 20 92  00 50 31 82 07 16 80 5c   .`!... ..P1....\
102d0   03 16 88 5c 1c 0d 00 09  06 16 20 5c 06 e0 21 c2   ...\....... \..!.
102e0   00 00 00 0a 00 00 00 00  00 00 00 00 00 00 00 00   ................
102f0   11 16 38 5c 11 16 80 5c  b8 0e 00 09 18 e0 29 80   ..8\...\......).
10300   ff 00 20 8c 85 00 21 58  00 28 01 5a cc 00 00 12   .. ...!X.(.Z....
10310   16 e8 29 80 ff 00 20 8c  85 00 21 58 2c 20 29 39   ..).. ...!X, )9
10320   00 30 80 8c 40 18 01 00  58 b8 00 09 07 16 80 5c   .0..@...X......\
10330   60 e5 ff 09 00 00 20 8c  16 e8 21 82 18 e0 21 82   `..... ...!...!.
10340   04 16 80 5c 2c 8d ff 08  18 e0 29 80 ff 00 20 8c   ...\,.....)... .
10350   85 00 21 58 30 20 09 3a  02 00 20 8c 18 e0 21 82   ..!X0 .=.. ...!.
10360   00 30 28 8c 40 04 01 00  c8 00 20 8c 05 16 80 5c   .0(.@..... ....\
10370   07 16 88 5c 04 16 90 5c  e8 38 ff 09 f8 e7 81 92   ...\...\.8......
10380   00 00 00 0a 08 00 28 8c  02 00 20 8c 05 16 80 5c   ......(... ....\
10390   04 16 88 5c 9c 55 ff 09  10 16 18 5c 0c 20 04 35   ...\.U.....\. .5
103a0   07 16 80 5c 9c e6 ff 09  02 00 30 8c 10 e0 28 90   ...\......0...(.
103b0   01 60 21 8c 10 e0 20 92  00 50 31 82 07 16 80 5c   .`!... ..P1....\
103c0   03 16 88 5c 2c 0c 00 09  00 00 20 8c 18 e0 21 82   ...\,..... ...!.
103d0   06 e0 21 c2 00 00 00 0a  00 30 20 90 b4 f5 05 10   ..!......0 .....
103e0   10 20 01 3a 00 00 20 8c  00 30 20 92 b4 f5 05 10   . .:.. ..0 .....
103f0   10 e0 21 90 08 20 01 35  00 00 00 0a 10 e0 21 90   ..!.. .5......!.
10400   0c 20 21 90 08 20 01 35  00 00 00 0a 00 00 20 8c   . !.. .5...... .
10410   16 e8 21 82 10 e0 21 90  07 16 80 5c 04 16 88 5c   ..!...!....\...\
10420   d0 0b 00 09 00 00 20 8c  06 e0 21 c2 10 e0 21 92   ...... ...!...!.
10430   00 00 00 0a 00 00 00 00  00 00 00 00 00 00 00 00   ................
10440   10 16 38 5c 00 00 20 8c  f8 27 24 92 08 00 28 8c   ..8\.. ..'$...(.
10450   02 00 20 8c 05 16 80 5c  04 16 88 5c d4 54 ff 09   .. ....\...\.T..
10460   10 16 18 5c 0c 20 04 35  07 16 80 5c d4 e5 ff 09   ...\. .5...\....
10470   02 00 30 8c 10 e0 28 90  01 60 21 8c 10 e0 20 92   ..0...(..`!... .
10480   00 50 31 82 07 16 80 5c  03 16 88 5c 64 0b 00 09   .P1....\...\d...
10490   00 00 20 8c 18 e0 21 82  06 e0 21 c2 00 00 00 0a   .. ...!...!.....
104a0   11 16 28 5c 11 16 80 5c  08 0d 00 09 01 00 20 8c   ..(\...\...... .
104b0   04 60 21 c2 00 00 00 0a  00 00 00 00 00 00 00 00   .`!.............
104c0   11 16 38 5c 11 16 80 5c  e8 0c 00 09 0c e0 31 90   ..8\...\......1.
104d0   0c a0 21 90 01 20 29 8c  f0 e7 21 90 10 20 29 92   ..!.. )...!.. ).
104e0   f0 e7 21 90 10 20 29 90  f0 e7 21 90 0c 20 29 92   ..!.. )...!.. ).
104f0   f0 e7 21 90 10 20 29 90  f0 e7 21 90 08 20 29 92   ..!.. )...!.. ).
10500   10 a0 29 90 f0 e7 21 90  14 20 29 92 02 00 20 8c   ..)...!.. )... .
10510   06 e0 21 c2 01 00 20 8c  04 e0 21 c2 0c e0 29 90   ..!... ...!...).
10520   f0 e7 21 90 18 20 29 92  00 00 20 8c 0c e0 21 92   ..!.. )... ...!.
```

Mar 27 18:20 1996 image.txt Page 99

```
10530   02 00 20 8c 40 e8 21 c2  40 e6 19 68 85 c9 18 58   .. .@.!.@......X
10540   40 e8 19 8a 03 00 28 8c  f0 e7 21 90 00 10 29 c2   @.....(...!...).
10550   f0 e7 21 90 20 20 21 90  f0 e7 21 92 00 00 00 0a   ..!.  !...!.....
10560   11 16 28 5c 11 16 80 5c  48 0c 00 09 02 00 20 8c   ...(\...\H...... .
10570   04 60 21 c2 00 00 20 8c  00 30 20 92 b8 f5 05 10   .`!...  ..O .....
10580   15 68 21 82 00 00 00 0a  00 00 00 00 00 00 00 00   .n!.............
10590   11 16 28 5c 11 16 80 5c  18 0c 00 09 02 00 20 8c   ..(\...\...... .
105a0   04 60 21 c2 00 00 20 8c  04 b8 21 92 14 68 21 82   .`!...  ..n!..n!.
105b0   15 68 21 82 00 30 20 92  b8 f5 05 10 00 00 00 0a   .n!..O .........
105c0   11 16 60 5c 00 00 50 8c  e4 67 3c 90 07 16 78 5c   ..`\..P..g<...x\
105d0   04 00 48 8c 28 68 2c 88  00 30 20 8c ff ff 00 00   ..H.(h,..O .....
105e0   85 00 31 58 10 e0 29 90  0c e0 21 90 04 41 21 59   ..1X..)...!..A!Y
105f0   84 81 31 59 28 68 2c 88  00 30 20 8c ff ff 00 00   ..1Y(h,..O .....
10600   85 00 21 58 04 84 21 74  04 16 70 5c 1c e0 19 90   ..!X..!t..p\....
10610   0a 16 68 5c 80 28 01 5a  3c 01 00 13 15 28 2b 80   ..n\.(.Z<....(+.
10620   ff 00 20 8c 85 00 21 58  80 20 01 32 00 30 20 90   .. ...!X. .2.O .
10630   b8 f5 05 10 74 20 01 30  10 e0 23 90 00 10 21 80   ....t .O..#...!.
10640   60 20 19 3d 00 00 20 8c  00 30 20 92 b8 f5 05 10   ` .=.. ..O .....
10650   10 e0 23 90 00 10 31 80  10 e0 28 90 01 60 21 8c   ..#...1...(..`!.
10660   10 e0 20 92 00 50 31 82  10 e0 2b 90 14 e0 23 90   .. ..P1...+...#.
10670   10 00 29 35 08 e0 23 90  10 e0 23 92 10 00 00 08   ..)5..#...#.....
10680   10 e0 23 90 01 20 21 8c  10 e0 23 92 01 00 20 8c   ..#.. !...#... .
10690   04 20 23 c2 05 00 48 8c  04 16 50 5c b8 00 00 08   . #...H...P\....
106a0   00 00 20 8c 15 28 23 82  10 e0 23 90 00 10 21 80   .. ..(#...#...!.
106b0   24 20 81 3d 00 30 20 90  b8 f5 05 10 01 20 21 8c   $ .=.O ...... !.
106c0   00 30 20 92 b8 f5 05 10  01 00 20 8c 15 28 23 82   .O ....... ..(#.
106d0   10 00 00 08 00 00 20 8c  00 30 20 92 b8 f5 05 10   ...... ..O .....
106e0   10 e0 23 90 00 10 31 80  10 e0 28 90 01 60 21 8c   ..#...1...(..`!.
106f0   10 e0 20 92 00 50 31 82  10 e0 2b 90 14 e0 23 90   .. ..P1...+...#.
10700   10 00 29 35 08 e0 23 90  10 e0 23 92 10 00 00 08   ..)5..#...#.....
10710   10 e0 23 90 01 20 21 8c  10 e0 23 92 10 e0 28 90   ..#.. !...#...(.
10720   0c e0 20 90 04 41 31 59  2a 28 2b 88 00 30 20 8c   .. ..A1Y*(+..O .
10730   ff ff 00 00 85 00 21 58  0c 00 31 3d 01 00 50 8c   ......!X..1=..P.
10740   14 00 00 08 01 60 23 8c  04 16 68 5c 84 a0 03 5a   .....`#...h\...Z
10750   cc fe ff 14 08 a0 02 3d  00 00 00 0a 2a 28 2b 88   .......=....*(+.
10760   00 30 20 8c ff ff 00 00  85 00 21 58 0a 20 29 8c   .O .......!X. ).
10770   02 00 20 8c 05 16 80 5c  04 16 88 5c b4 51 ff 09   .. ....\...\.Q..
10780   10 16 58 5c 0c 20 04 35  0c 16 80 5c b4 e2 ff 09   ..X\. .5...\....
10790   0c e0 22 90 00 10 49 82  0c e0 38 90 0c e0 22 90   .."...I...8...".
107a0   01 20 31 8c 10 e0 28 90  0c e0 20 90 04 41 21 59   . 1...(... ..A!Y
```

Mar 27 18:20 1996 image.txt Page 100

```
107b0   07 16 80 5c 06 16 88 5c  04 16 90 5c 94 2e ff 09   ...\...\...\....
107c0   0c e0 32 90 10 e0 28 90  0c e0 20 90 04 41 21 59   ..2...(... ..A!Y
107d0   06 00 21 59 01 20 21 8c  10 e0 22 92 0c 16 80 5c   ..!Y. !..."....\
107e0   0b 15 88 5c 0c 08 00 09  0c e0 20 90 10 e0 20 92   ...\...... ... .
107f0   00 00 00 0a 00 00 00 00  00 00 00 00 00 00 00 00   ................
10800   11 16 30 5c 11 16 80 5c  a8 09 00 09 a4 36 ff 09   ..0\...\.....6..
10810   92 20 24 8c 00 a8 21 92  02 00 20 8c 40 a8 21 c2   . $...!... .@.!.
10820   40 a8 19 88 89 c9 18 58  40 a8 19 8a 04 00 28 8c   @......X@.....(.
10830   f0 a7 21 90 00 10 29 c2  00 00 00 0a 00 00 00 00   ..!...).........
10840   11 16 68 5c e4 67 3c 90  07 16 18 5c 28 68 2c 88   ..h\.g<....\(h,.
10850   00 30 20 8c ff ff 00 00  85 00 31 58 10 e0 29 90   .0 .......1X..).
10860   0c e0 21 90 04 41 21 59  84 81 31 59 28 68 2c 88   ..!..A!Y..1Y(h,.
10870   00 30 20 8c ff ff 00 00  83 00 21 58 04 84 21 74   .0 .......!X..!t
10880   04 16 78 5c 00 00 70 8c  08 20 01 3c 00 00 00 0a   ..x\..p.. .<....
10890   15 68 2b 80 ff 00 20 8c  85 00 21 58 00 28 01 5a   .h+... ...!X.(.Z
108a0   c8 00 00 12 00 30 20 90  b8 f5 05 10 00 2f 01 5a   .....0 ......./.Z
108b0   b8 00 00 10 10 e0 20 90  00 10 21 80 83 28 01 5a   ...... ...!..(.Z
108c0   a0 00 00 15 00 00 20 8c  00 30 20 92 b8 f5 05 10   ...... ..0 .....
108d0   10 e0 28 90 14 e0 20 90  10 00 29 35 08 e0 20 90   ..(... ...)5.. .
108e0   10 e0 20 92 10 00 00 08  10 e0 20 90 01 20 21 8c   .. ....... .. !.
108f0   10 e0 20 92 08 00 28 8c  02 00 20 8c 05 16 80 5c   .. ...(... ....\
10900   04 16 88 5c 2c 50 ff 09  0c 60 83 92 08 20 04 35   ...\,P...`... .5
10910   00 00 00 0a 0c 68 2b 90  04 68 23 90 20 00 29 3e   .....h+..h#. .)>
10920   02 00 38 8c 0c 60 33 90  10 a0 29 90 01 60 21 8c   ..8..`3...)..`!.
10930   10 a0 21 92 00 50 39 82  1c 00 00 08 01 00 38 8c   ..!..P9.......8.
10940   0c 60 33 90 10 a0 29 90  01 60 21 8c 10 a0 21 92   .`3...)..`!...!.
10950   00 50 39 82 01 00 20 8c  04 60 23 c2 00 00 00 0a   .P9... ..`#.....
10960   00 00 20 8c 15 68 23 82  10 e0 20 90 00 10 21 80   .. ..h#... ...!.
10970   24 20 81 3d 00 30 20 90  b8 f5 05 10 01 20 21 8c   $ .=.0 ...... !.
10980   00 30 20 92 b8 f5 05 10  01 00 20 8c 15 68 23 82   .0 ....... ..h#.
10990   10 00 00 08 00 00 20 8c  00 30 20 92 b8 f5 05 10   ...... ..0 .....
109a0   10 e0 20 90 00 10 21 80  14 68 23 82 10 e0 20 90   .. ...!..h#... .
109b0   00 10 21 80 14 20 01 3d  04 68 23 90 01 20 21 8c   ..!.. .=.h#.. !.
109c0   04 68 23 92 18 00 00 08  04 68 2b 90 0c 68 23 90   .h#......h+..h#.
109d0   0c 00 29 3b 00 00 20 8c  04 68 23 92 10 e0 28 90   ..);.. ..h#...(.
109e0   14 e0 20 90 10 00 29 35  08 e0 20 90 10 e0 20 92   .. ...)5.. ... .
109f0   10 00 00 08 10 e0 20 90  01 20 21 8c 10 e0 20 92   ...... .. !... .
10a00   01 a0 23 8c 04 16 70 5c  84 e0 03 5a 84 fe ff 14   ..#...p\...Z....
10a10   00 00 00 0a 00 00 00 00  00 00 00 00 00 00 00 00   ................
10a20   11 16 28 5c 11 16 80 5c  88 07 00 09 0c 60 21 90   ..(\...\.....`!.
```

```
Mar 27 18:20 1996   image.txt Page 101

10a30   05 16 80 5c 04 16 88 5c  b8 05 00 09 00 00 20 8c   ...\...\........
10a40   0c 60 21 92 40 68 21 c2  40 68 19 88 09 ce 18 58   .`!.@n!.@n.....X
10a50   40 68 19 8a 06 60 21 c2  00 00 00 0a 00 00 00 00   @n...`!.........
10a60   10 16 68 5c 11 16 70 5c  11 16 80 5c 44 07 c0 09   ..h\..p\...\D...
10a70   18 a0 2b 80 ff 00 20 8c  85 00 21 58 60 20 01 32   ..+... ...!X` .2
10a80   16 a8 2b 80 ff 00 20 8c  85 00 21 58 28 20 29 39   ..+... ...!X( )9
10a90   00 30 80 8c 40 18 01 00  e8 b0 00 09 0e 16 80 5c   .0..@..........\
10aa0   f0 0d ff 09 00 00 20 8c  16 a8 23 82 04 16 80 5c   ...... ...#....\
10ab0   c0 85 ff 0a a0 0f 20 8c  0e 16 80 5c 04 16 88 5c   ...... ....\...\
10ac0   b0 1f 00 09 0d 16 80 5c  0e 16 88 5c 74 05 00 09   .......\...\t...
10ad0   00 00 20 8c 18 a0 23 82  00 00 00 0a 00 00 20 8c   .. ...#........ .
10ae0   16 a8 23 82 4c a8 23 90  00 28 01 5a 80 03 00 12   ..#.L.#..(.Z....
10af0   19 a0 2b 80 ff 00 20 8c  85 00 79 58 4c e0 03 3a   ..+... ...yXL..:
10b00   a0 0f 20 8c 0e 16 80 5c  04 16 88 5c 64 1f 00 09   .. ....\...\d...
10b10   00 30 20 90 c8 12 06 10  00 30 20 92 b0 f5 05 10   .0 ......0 .....
10b20   00 30 20 90 b0 f5 05 10  0e 16 80 5c 04 16 88 5c   .0 ........\...\
10b30   a0 05 00 09 0a 00 20 8c  19 a0 23 82 07 00 20 8c   ...... ...#... .
10b40   1a a0 23 c2 00 00 00 0a  58 e0 53 3d a0 0f 20 8c   ..#.....X.S=.. .
10b50   0e 16 80 5c 04 16 88 5c  18 1f 00 09 00 30 20 90   ...\...\.....0 .
10b60   e8 12 06 10 00 30 20 92  b0 f5 05 10 00 30 20 90   .....0 ......0 .
10b70   b0 f5 05 10 0e 16 80 5c  04 16 88 5c 54 05 00 09   .......\...\T...
10b80   0b 00 20 8c 19 a0 23 82  00 00 20 8c 00 30 20 92   .. ...#... ..0 .
10b90   bc f5 05 10 00 30 20 92  94 f5 05 10 00 00 00 0a   .....0 .........
10ba0   b4 e0 5b 3d a0 0f 20 8c  0e 16 80 5c 04 16 88 5c   ..[=.. ....\...\
10bb0   c0 1e 00 09 00 30 20 90  94 f5 05 10 60 20 01 3d   .....0 .....` .=
10bc0   00 30 20 90 bc f5 05 10  01 20 21 8c 00 30 20 92   .0 ...... !..0 .
10bd0   bc f5 05 10 20 20 19 3e  00 30 20 90 e8 12 06 10   ....   .>.0 .....
10be0   00 30 20 92 b0 f5 05 10  0b 00 20 8c 19 a0 23 82   .0 ...... ...#.
10bf0   50 00 00 08 00 30 20 90  ec 12 06 10 00 30 20 92   P....0 ......0 .
10c00   b0 f5 05 10 6f 00 20 8c  19 a0 23 82 00 00 20 8c   ....o. ...#... .
10c10   00 30 20 92 bc f5 05 10  28 00 00 08 00 00 20 8c   .0 .....(..... .
10c20   00 30 20 92 bc f5 05 10  00 30 20 90 b0 12 06 10   .0 ......0 .....
10c30   00 30 20 92 b0 f5 05 10  0c 00 20 8c 19 a0 23 82   .0 ....... ...#.
10c40   00 30 20 90 b0 f5 05 10  0e 16 80 5c 04 16 88 5c   .0 ........\...\
10c50   80 04 00 08 6f 00 20 8c  98 c0 23 3d a0 0f 20 8c   ....o. ...#=.. .
10c60   0e 16 80 5c 04 16 88 5c  08 1e 00 09 00 30 20 90   ...\...\.....0 .
10c70   94 f5 05 10 44 20 01 3d  6f 00 20 8c 19 a0 23 82   ....D .=o. ...#.
10c80   00 30 20 90 bc f5 05 10  01 20 21 8c 00 30 20 92   .0 ...... !..0 .
10c90   bc f5 05 10 18 20 19 3e  00 30 20 90 ec 12 06 10   ..... .>.0 .....
10ca0   00 30 20 92 b0 f5 05 10  34 00 00 08 00 00 80 8c   .0 .....4.......
```

Mar 27 18:20 1996 image.txt Page 102

```
10cb0   c0 83 ff 09 28 00 00 08  00 00 20 8c 00 30 20 92   ....(..... ..0 .
10cc0   bc f5 05 10 00 30 20 90  b0 12 06 10 00 30 20 92   .....0 ......0 .
10cd0   b0 f5 05 10 0c 00 20 8c  19 a0 23 82 00 30 20 90   ...... ...#..0 .
10ce0   b0 f5 05 10 0e 16 80 5c  04 16 88 5c e4 03 00 08   .......\...\....
10cf0   8c e0 63 3d a0 0f 20 8c  0e 16 80 5c 04 16 88 5c   ..c=.. ....\...\
10d00   70 1d 00 09 00 30 38 90  94 f5 05 10 20 e0 11 3d   p....08..... ..=
10d10   00 30 20 90 cc 12 06 10  00 30 20 92 b0 f5 05 10   .0 ......0 .....
10d20   0d 00 20 8c 19 a0 23 82  40 00 00 08 20 e0 09 3d   .. ...#.@... ..=
10d30   00 30 20 90 dc 12 06 10  00 30 20 92 b0 f5 05 10   .0 ......0 .....
10d40   0e 00 20 8c 19 a0 23 82  20 00 00 08 1c e0 19 3d   .. ...#. ......=
10d50   00 30 20 90 f0 12 06 10  00 30 20 92 b0 f5 05 10   .0 ......0 .....
10d60   0e 00 20 8c 19 a0 23 82  00 30 20 90 b0 f5 05 10   .. ...#..0 .....
10d70   0e 16 80 5c 04 16 88 5c  58 03 00 08 50 e0 6b 3d   ...\...\X...P.k=
10d80   a0 0f 20 8c 0e 16 80 5c  04 16 88 5c e4 1c 00 09   .. ....\...\....
10d90   00 30 20 90 94 f5 05 10  14 20 11 3d 00 30 20 90   .0 ...... .=.0 .
10da0   c4 12 06 10 00 30 20 92  b0 f5 05 10 00 30 20 90   .....0 ......0 .
10db0   b0 f5 05 10 0e 16 80 5c  04 16 88 5c 14 03 00 09   .......\...\....
10dc0   0e 00 20 8c 19 a0 23 82  00 00 00 0a 08 e0 73 3a   .. ...#.......s:
10dd0   00 00 00 0a a0 0f 20 8c  0e 16 80 5c 04 16 88 5c   ...... ....\...\
10de0   90 1c 00 09 00 30 18 90  94 f5 05 10 24 e0 10 3d   .....0......$..=
10df0   00 30 20 90 c0 12 06 10  4c a8 23 92 4c a8 23 90   .0 .....L.#.L.#.
10e00   0e 16 80 5c 04 16 88 5c  c8 02 00 09 48 00 00 08   ...\...\....H...
10e10   24 e0 08 3d 00 30 20 90  bc 12 06 10 4c a8 23 92   $..=.0 .....L.#.
10e20   4c a8 23 90 0e 16 80 5c  04 16 88 5c a4 02 00 09   L.#....\...\....
10e30   24 00 00 08 20 e0 18 3d  00 30 20 90 00 13 06 10   $... ..=.0 .....
10e40   4c a8 23 92 4c a8 23 90  0e 16 80 5c 04 16 88 5c   L.#.L.#....\...\
10e50   80 02 00 09 00 00 20 8c  19 a0 23 82 4c a8 23 92   ...... ...#.L.#.
10e60   00 30 20 c2 d0 07 06 10  00 00 00 0a 00 30 30 8c   .0 ..........00.
10e70   d0 f5 05 10 00 00 28 8c  1e 00 20 8c 06 16 80 5c   ......(... ....\
10e80   05 16 88 5c 04 16 90 5c  90 06 ff 0b 05 16 20 5c   ...\...\...... \
10e90   16 a8 23 82 18 a0 23 82  19 a0 23 82 4c a8 23 92   ..#...#...#.L.#.
10ea0   0e 16 80 5c ec d9 ff 09  0d 16 80 5c 0e 16 88 5c   ...\.......\...\
10eb0   f0 f1 ff 09 06 a0 23 c2  00 00 00 0a 00 00 00 00   ......#.........
10ec0   11 16 70 5c 11 16 80 5c  e8 02 00 09 0c a0 33 90   ..p\...\......3.
10ed0   0c a0 21 90 01 20 21 8c  0c a0 21 92 0c a0 29 90   ..!.. !...!...).
10ee0   01 60 21 8c 0c a0 21 92  00 50 29 80 f0 a7 23 90   .`!...!..P)...#.
10ef0   04 20 29 92 0c a0 29 90  f0 a7 23 90 10 20 29 92   . )...)...#.. ).
10f00   f0 a7 23 90 10 20 29 90  f0 a7 23 90 0c 20 29 92   ..#.. )...#.. ).
10f10   f0 a7 23 90 10 20 29 90  f0 a7 23 90 08 20 29 92   ..#.. )...#.. ).
10f20   10 a0 29 90 f0 a7 23 90  14 20 29 92 0c a0 2b 90   ..)...#.. )...+.
```

```
Mar 27 18:20 1996  image.txt Page 103

10f30   f0 a7 23 90 18 20 29 92  00 00 20 8c 0c a0 23 92   ..#.. )... ...#.
10f40   01 00 20 8c 04 a0 23 c2  10 a0 29 90 0c a0 21 90   .. ...#...)...!.
10f50   04 41 29 59 0c a8 23 90  84 40 21 59 0c a8 23 92   .A)Y..#..@!Y..#.
10f60   02 00 20 8c 40 a8 23 c2  40 a8 3b 88 89 c9 39 58   .. .@.#.@.;...9X
10f70   40 a8 3b 8a 03 00 28 8c  f0 a7 23 90 00 10 29 c2   @.;...(...#...).
10f80   f0 a7 23 90 20 20 21 90  f0 a7 23 92 08 00 28 8c   ..#.  !...#...(.
10f90   02 00 20 8c 05 16 80 5c  04 16 88 5c 94 49 ff 09   .. ....\...\.I..
10fa0   10 16 78 5c 0c 20 04 35  0e 16 80 5c 94 da ff 09   ..x\. .5...\....
10fb0   06 00 30 8c 10 e0 2b 90  01 60 21 8c 10 e0 23 92   ..0...+..`!...#.
10fc0   00 50 31 82 1c a0 23 90  0c 20 81 90 84 3b ff 09   .P1...#.. ...;..
10fd0   10 20 04 3a 1c a0 83 90  0f 16 88 5c 34 3b ff 08   . .:........\4;..
10fe0   0f 16 80 5c bc 1f ff 08  00 00 00 00 00 00 00 00   ...\............
10ff0   10 16 30 5c 11 16 38 5c  1c 20 24 90 04 16 18 5c   ..0\..8\. $....\
11000   0c 20 81 90 4c 3b ff 09  18 20 04 3d 06 16 80 5c   . ..L;... .=...\
11010   80 dd ff 09 00 30 80 8c  ff ff ff ff 00 00 00 0a   .....0..........
11020   03 16 80 5c 07 16 88 5c  e8 3a ff 09 00 00 80 8c   ...\...\.:......
11030   00 00 00 0a 00 00 00 00  00 00 00 00 00 00 00 00   ................
11040   11 16 18 5c 00 30 28 c0  d0 f5 05 10 ff 00 20 8c   ...\.0(....... .
11050   85 00 21 58 08 20 01 3d  00 00 00 0a 00 30 28 8c   ..!X. .=.....0(.
11060   d0 f5 05 10 f0 e7 20 90  10 20 29 92 f0 e7 20 90   ...... .. )... .
11070   0c 20 29 92 f0 e7 20 90  10 20 29 90 f0 e7 20 90   . )... .. )... .
11080   08 20 29 92 f0 e7 20 90  0c 20 29 90 00 30 20 90   . )... .. )..0 .
11090   f0 f5 05 10 05 00 29 59  f0 e7 20 90 14 20 29 92   ......)Y.. .. ).
110a0   00 00 28 8c f0 e7 20 90  18 20 29 92 01 00 20 8c   ..(... .. )... .
110b0   04 e0 20 c2 03 00 28 8c  f0 e7 20 90 00 10 29 c2   .. ...(... ...).
110c0   f0 e7 20 90 20 20 21 90  f0 e7 20 92 00 00 00 0a   .. .  !... .....
110d0   10 16 38 5c f0 27 24 90  10 20 89 92 f0 27 24 90   ..8\.'$.. ...'$.
110e0   0c 20 89 92 f0 27 24 90  10 20 29 90 f0 27 24 90   . ...'$.. )..'$.
110f0   08 20 29 92 f0 27 24 90  0c 20 21 90 11 16 80 5c   . )..'$.. !....\
11100   50 f5 01 0b 04 00 2c 59  f0 e7 21 90 14 20 29 92   P.....,Y..!.. ).
11110   00 00 28 8c f0 e7 21 90  18 20 29 92 01 00 20 8c   ..(...!.. )... .
11120   04 e0 21 c2 03 00 28 8c  f0 e7 21 90 00 10 29 c2   ..!...(...!...).
11130   00 30 30 8c d0 f5 05 10  00 00 28 8c 1e 00 20 8c   .00.......(... .
11140   06 16 80 5c 05 16 88 5c  04 16 90 5c cc 03 ff 0b   ...\...\...\....
11150   f0 e7 21 90 14 20 29 90  f0 e7 21 90 08 20 21 90   ..!.. )...!.. !.
11160   04 41 21 59 00 30 20 92  f0 f5 05 10 f0 e7 21 90   .A!Y.0 .......!.
11170   08 20 31 90 00 30 28 8c  d0 f5 05 10 00 30 20 90   . 1..0(......0 .
11180   f0 f5 05 10 06 16 80 5c  05 16 88 5c 04 16 90 5c   .......\...\...\
11190   c0 24 ff 09 f0 e7 21 90  20 20 21 90 f0 e7 21 92   .$....!.  !...!.
111a0   00 00 00 0a 00 00 00 00  00 00 00 00 00 00 00 00   ................
```

Mar 27 18:20 1996 image.txt Page 104

```
111b0   10 16 18 5c f8 27 24 90  08 20 01 35 00 00 00 0a   ...\.'$.. .5....
111c0   f8 e7 80 90 ac 2a ff 09  00 00 20 8c f8 e7 20 92   .....*.... ... .
111d0   00 00 00 0a 00 00 00 00  00 00 00 00 00 00 00 00   ................
111e0   11 16 38 5c 11 16 80 5c  c8 ff ff 09 08 e0 21 c0   ..8\...\......!.
111f0   18 0e 21 59 98 0d 21 59  0c 20 39 3d 01 00 20 8c   ..!Y..!Y. 9=.. .
11200   18 e0 21 82 00 30 18 90  a4 12 06 10 40 e8 21 c0   ..!..0......@.!.
11210   18 0e 21 59 98 0d 21 59  0c 20 01 3a 00 00 20 8c   ..!Y..!Y. .:.. .
11220   40 e8 21 c2 f0 e7 21 90  10 20 19 92 f0 e7 21 90   @.!...!.. ....!.
11230   0c 20 19 92 f0 e7 21 90  10 20 29 90 f0 e7 21 90   . ....!.. )...!.
11240   08 20 29 92 f0 e7 21 90  0c 20 21 90 03 16 80 5c   . )...!.. !....\
11250   00 f4 01 0b 04 00 2c 59  f0 e7 21 90 14 20 29 92   ......,Y..!.. ).
11260   00 00 28 8c f0 e7 21 90  18 20 29 92 01 00 20 8c   ..(...!.. )... .
11270   04 e0 21 c2 03 00 28 8c  f0 e7 21 90 00 10 29 c2   ..!...(...!...).
11280   f0 e7 21 90 20 20 21 90  f0 e7 21 92 18 e0 21 80   ..!.  !...!...!.
11290   01 20 21 8c 18 e0 21 82  09 00 20 8c 08 e0 21 c2   . !...!... ...!.
112a0   16 e8 21 80 01 20 21 8c  16 e8 21 82 16 e8 29 80   ..!.. !...!...).
112b0   ff 00 20 8c 85 00 21 58  28 20 29 39 00 30 80 8c   .. ...!X( )9.0..
112c0   40 18 01 00 bc a8 00 09  07 16 80 5c c4 d5 ff 09   @..........\....
112d0   00 00 20 8c 16 e8 21 82  04 16 80 5c 94 7d ff 08   .. ...!....\.}..
112e0   a0 0f 20 8c 07 16 80 5c  04 16 88 5c 84 17 00 08   .. ....\...\....
112f0   11 16 30 5c 00 30 20 8c  20 4e 00 00 11 16 80 5c   ..0\.0 . N.....\
11300   04 16 88 5c 6c 17 00 09  00 30 18 90 94 f5 05 10   ...\l....0......
11310   10 e0 10 3d 00 30 38 90  d0 12 06 10 20 00 00 08   ...=.08..... ...
11320   10 e0 08 3d 00 30 38 90  e0 12 06 10 10 00 00 08   ...=.08.........
11330   0c e0 18 3d 00 30 38 90  f4 12 06 10 03 00 20 8c   ...=.08....... .
11340   1a a0 21 c2 06 16 80 5c  07 16 88 5c 84 fd ff 08   ..!....\...\....
11350   10 16 60 5c 11 16 68 5c  11 16 80 5c 54 fe ff 09   ..`\..h\...\T...
11360   1a 60 23 c0 18 0e 21 59  98 0d 21 59 01 09 79 59   .`#...!Y..!Y..yY
11370   05 e8 03 5a 3c 01 00 14  0f 39 20 90 60 18 01 00   ...Z<....9 .`...
11380   00 10 01 84 00 30 30 90  94 f5 05 10 10 a0 11 3d   .....00........=
11390   00 30 70 90 d4 12 06 10  20 00 00 08 10 a0 09 3d   .0p..... ......=
113a0   00 30 70 90 e4 12 06 10  10 00 00 08 0c a0 19 3d   .0p............=
113b0   00 30 70 90 fc 12 06 10  0d 16 80 5c 0e 16 88 5c   .0p........\...\
113c0   10 fd ff 09 a0 0f 20 8c  0d 16 80 5c 04 16 88 5c   ...... ....\...\
113d0   a0 16 00 09 04 00 20 8c  1a 60 23 c2 00 00 00 0a   ...... ..`#.....
113e0   e8 03 20 8c 0d 16 80 5c  04 16 88 5c 04 04 00 09   .. ....\...\....
113f0   05 00 20 8c 1a 60 23 c2  00 00 00 0a 00 30 38 90   .. ..`#......08.
11400   94 f5 05 10 10 e0 11 3d  00 30 70 90 d4 12 06 10   .......=.0p.....
11410   20 00 00 08 10 e0 09 3d  00 30 70 90 e4 12 06 10    ......=.0p.....
11420   10 00 00 08 0c e0 19 3d  00 30 70 90 fc 12 06 10   .......=.0p.....
```

```
Mar 27 16:20 1996  image.txt Page 105

11430   0d 16 80 5c 0e 16 88 5c  98 1c ff 09 00 30 20 8c   ...\...\......0 .
11440   10 27 00 00 0d 16 80 5c  04 16 88 5c 24 16 00 09   .'.....\...\$...
11450   01 00 20 8c 1a 60 23 c2  00 00 00 0a 14 60 83 90   .. ..`#.......`..
11460   0d 16 98 5c 4c 01 00 09  01 00 20 8c 1a 60 23 c2   ...\L.......`#.
11470   00 00 00 0a 00 00 20 8c  08 60 23 c2 00 30 28 8c   ...... ..`#..0(.
11480   20 18 01 00 00 30 20 8c  80 38 01 00 05 16 80 5c    ....0 ..8.....\
11490   0d 16 88 5c 04 16 90 5c  c8 27 ff 09 f8 67 83 92   ...\...\.'...g..
114a0   0c 16 80 5c 0d 16 88 5c  28 00 00 08 00 00 00 0a   ...\...\(.......
114b0   00 00 00 0a 00 00 00 00  00 00 00 00 00 00 00 00   ................
114c0   00 30 88 90 d8 12 06 10  08 1c ff 08 00 00 00 00   .0..............
114d0   10 16 38 5c 11 16 18 5c  00 30 20 c0 d0 07 06 10   ..8\...\.0 .....
114e0   10 20 01 3a 03 00 20 8c  04 e0 20 c2 00 00 00 0a   . .:.. ... .....
114f0   03 16 80 5c 1c 00 00 09  08 20 04 3a 00 00 00 0a   ...\..... .:....
11500   07 16 80 5c 03 16 88 5c  c8 ea ff 08 00 00 00 00   ...\...\........
11510   10 16 60 5c 00 30 70 8c  20 d0 05 10 00 30 20 80   ..`\.0p. ....0 .
11520   d4 07 06 10 80 28 01 5a  34 01 00 12 00 30 80 8c   .....(.Z4....0..
11530   d4 07 06 10 64 e9 01 0b  10 16 68 5c 7e a0 33 8c   ....d.....h\~.3.
11540   81 09 2c 59 38 00 20 8c  85 00 21 70 06 00 21 59   ..,Y8. ...!p..!Y
11550   00 10 21 90 14 20 01 3d  0c 16 80 5c 54 02 00 09   ..!.. .=...\T...
11560   01 00 80 8c 00 00 00 0a  7e a0 33 8c 81 49 2b 59   ........~.3..I+Y
11570   38 00 20 8c 85 00 21 70  06 00 21 59 1b 20 21 8c   8. ...!p..!Y. !.
11580   00 30 20 92 34 ec 05 10  05 00 18 8c ea 03 78 8c   .0 .4.........x.
11590   00 30 20 90 34 ec 05 10  00 10 39 80 00 30 20 90   .0 .4.....9..0 .
115a0   34 ec 05 10 01 20 31 80  00 30 20 90 34 ec 05 10   4.... 1..0 .4...
115b0   02 20 29 80 00 30 20 90  34 ec 05 10 03 20 21 80   . )..0 .4.... !.
115c0   03 16 80 5c 0f 16 88 5c  07 16 90 5c 06 16 98 5c   ...\...\...\...\
115d0   05 16 a0 5c 04 16 a8 5c  f8 99 00 09 7e a0 33 8c   ...\...\....~.3.
115e0   81 49 2b 59 38 00 20 8c  85 00 21 70 06 00 21 59   .I+Y8. ...!p..!Y
115f0   1f 20 29 80 54 00 20 8c  24 00 29 3a 7e a0 33 8c   . ).T. .$.):~.3.
11600   81 49 2b 59 38 00 20 8c  85 00 21 70 06 00 21 59   .I+Y8. ...!p..!Y
11610   1f 20 29 80 74 00 20 8c  14 00 29 3d 01 00 20 8c   . ).t. ...)=.. .
11620   00 30 20 c2 30 ec 05 10  10 00 00 08 00 00 20 8c   .0 .0......... .
11630   00 30 20 c2 30 ec 05 10  7e a0 33 8c 81 49 2b 59   .0 .0...~.3..I+Y
11640   38 00 20 8c 85 00 21 70  06 00 21 59 21 20 21 80   8. ...!p..!Y! !.
11650   00 30 20 82 c0 f5 05 10  4c 00 00 08 00 30 20 80   .0 .....L....0 .
11660   d8 07 06 10 30 20 01 3a  00 30 20 8c d8 07 06 10   ....0 .:.0 .....
11670   00 30 20 92 34 ec 05 10  00 00 20 8c 00 30 20 c2   .0 .4..... ..0 .
11680   30 ec 05 10 4e 00 20 8c  00 30 20 82 c0 f5 05 10   0...N. ..0 .....
11690   14 00 00 08 0c 16 80 5c  18 01 00 09 01 00 80 8c   .......\........
116a0   00 00 00 0a 00 30 20 c0  30 ec 05 10 14 20 01 3d   .....0 .0.... .=
```

Mar 27 18:20 1996 image.txt Page 106

```
116b0   00 30 20 90 5a d0 05 10  2a 28 23 8a 0c 00 00 08   .0 .Z...*(#.....
116c0   f4 01 20 8c 2a 28 23 8a  00 30 30 8c 40 ec 05 10   .. .*(#..00.@...
116d0   00 00 28 8c 15 00 20 8c  06 16 80 5c 05 16 88 5c   ..(... ....\...\
116e0   04 16 90 5c 34 fe fe 06  00 30 20 80 e0 07 06 10   ...\4....0 .....
116f0   6c 20 01 3d 00 30 20 80  00 08 06 10 24 20 01 3a   l .=.0 .....$ .:
11700   00 30 28 8c 40 ec 05 10  00 30 20 8c 00 08 06 10   .0(.@....0 .....
11710   05 16 80 5c 04 16 88 5c  a8 ed 01 0b 5c 00 00 08   ...\...\....\...
11720   00 30 20 80 d4 07 06 10  50 20 01 3a 00 30 38 8c   .0 .....P .:.08.
11730   40 ec 05 10 7e a0 33 8c  81 49 2b 59 38 00 20 8c   @...~.3..I+Y8. .
11740   85 00 21 70 06 00 21 59  23 20 21 8c 07 16 80 5c   ..!p..!Y# !....\
11750   04 16 88 5c 6c ed 01 0b  20 00 00 08 00 30 28 8c   ...\l... ....0(.
11760   40 ec 05 10 00 30 20 8c  e0 07 06 10 05 16 80 5c   @....0 ........\
11770   04 16 88 5c 4c ed 01 0b  03 00 30 8c e9 03 28 8c   ...\L.....0...(.
11780   00 30 20 8c 40 ec 05 10  06 16 80 5c 05 16 88 5c   .0 .@......\...\
11790   0d 16 90 5c 04 16 98 5c  38 98 00 09 00 00 80 8c   ...\...\8.......
117a0   00 00 00 0a 00 00 00 00  00 00 00 00 00 00 00 00   ................
117b0   ff 00 20 8c 4c 28 24 92  00 00 20 8c 19 20 24 82   .. .L($... .. $.
117c0   18 20 24 82 0a 00 20 8c  06 20 24 c2 00 00 20 8c   . $... .. $... .
117d0   08 20 24 c2 04 16 28 5c  10 16 20 5c 05 16 80 5c   . $...(\.. \...\
117e0   04 16 88 5c 7c f2 ff 08  00 00 00 00 00 00 00 00   ...\|...........
117f0   10 16 28 5c 11 16 20 5c  b8 f9 ff 09 00 30 80 8c   ..(\.. \.....0..
11800   a0 2a 01 00 05 16 88 5c  04 16 90 5c 54 24 ff 09   .*.....\...\T$..
11810   f8 67 81 92 00 00 00 0a  00 00 00 00 00 00 00 00   .g..............
11820   00 00 20 8c f8 27 24 92  ff 00 20 8c 4c 28 24 92   .. ..'$... .L($.
11830   00 00 20 8c 19 20 24 82  18 11 00 08 00 00 00 00   .. .. $.........
11840   52 65 63 65 69 76 65 20  45 72 72 6f 72 20 66 72   Receive Error fr
11850   6f 6d 20 6c 6f 63 61 6c  20 6d 6f 64 65 6d 00 00   om local modem..
11860   74 14 01 00 ac 14 01 00  84 13 01 00 e0 13 01 00   t...............
11870   fc 13 01 00 5c 14 01 00  00 00 00 00 00 00 00 00   ....\...........
11880   10 16 38 5c 11 16 18 5c  11 16 80 5c 24 f9 ff 09   ..8\...\...\$...
11890   14 e0 01 32 0c e0 21 90  0c 20 01 32 07 16 80 5c   ...2..!.. .2...\
118a0   00 17 ff 09 03 16 80 5c  e8 cf ff 09 ff 00 20 8c   .......\...... .
118b0   4c e8 20 92 00 00 20 8c  19 e0 20 82 03 16 80 5c   L. ... ... ....\
118c0   90 10 00 08 00 00 00 00  00 00 00 00 00 00 00 00   ................
118d0   10 16 38 5c 11 16 18 5c  07 60 24 c0 18 0e 21 59   ..8\...\.`$...!Y
118e0   98 0d 21 59 14 20 11 3d  a0 0f 20 8c 03 16 80 5c   ..!Y. .=.. ....\
118f0   04 16 88 5c 7c 11 00 09  07 e0 20 c0 18 0e 21 59   ...\|..... ...!Y
11900   98 0d 21 59 81 09 21 59  04 39 30 90 80 12 06 10   ..!Y..!Y.90.....
11910   f0 e7 20 90 10 20 31 92  f0 e7 20 90 10 20 29 90   .. .. 1... .. ).
11920   f0 e7 20 90 0c 20 29 92  f0 e7 20 90 10 20 29 90   .. .. )... .. ).
```

```
Mar 27 18:20 1996  image.txt Page 107

11930   f0 e7 20 90 08 20 29 92  f0 e7 20 90 10 20 21 90   .. .. )... .. !.
11940   06 16 80 5c 0c ed 01 0b  04 00 2c 59 f0 e7 20 90   ...\.......,Y.. .
11950   14 20 29 92 00 00 28 8c  f0 e7 20 90 18 20 29 92   . )...(... .. ).
11960   0c e0 38 92 00 30 30 8c  d0 f5 05 10 1e 00 20 8c   ..8..00....... .
11970   06 16 80 5c 05 16 88 5c  04 16 90 5c 9c fb fe 0b   ...\...\...\....
11980   f0 e7 20 90 14 20 29 90  f0 e7 20 90 08 20 21 90   .. .. )... .. !.
11990   04 41 21 59 00 30 20 92  f0 f5 05 10 f0 e7 20 90   .A!Y.0 ....... .
119a0   08 20 31 90 00 30 28 8c  d0 f5 05 10 00 30 20 90   . 1..0(......0 .
119b0   f0 f5 05 10 06 16 80 5c  05 16 88 5c 04 16 90 5c   .......\...\...\
119c0   90 1c ff 09 01 00 20 8c  06 e0 20 c2 04 e0 20 c2   ...... ... ... .
119d0   03 00 28 8c f0 e7 20 90  00 10 29 c2 f0 e7 20 90   ..(... ...)... .
119e0   20 20 21 90 f0 e7 20 92  00 00 00 0a 00 00 00 00     !... .........
119f0   10 16 18 5c 11 16 38 5c  a0 0f 20 8c 11 16 80 5c   ...\..8\.. ....\
11a00   04 16 88 5c 6c 10 00 09  0c e0 20 90 01 20 29 8c   ...\1..... .. ).
11a10   f0 e7 21 90 10 20 29 92  0c e0 20 90 01 20 29 8c   ..!.. )... .. ).
11a20   f0 e7 21 90 0c 20 29 92  0c e0 20 90 01 20 29 8c   ..!.. )... .. ).
11a30   f0 e7 21 90 08 20 29 92  10 e0 28 90 f0 e7 21 90   ..!.. )...(...!.
11a40   14 20 29 92 02 00 20 8c  06 e0 21 c2 01 00 20 8c   . )... ...!... .
11a50   04 e0 21 c2 00 30 30 8c  d0 f5 05 10 00 00 28 8c   ..!..00.......(.
11a60   1e 00 20 8c 06 16 80 5c  05 16 88 5c 04 16 90 5c   .. ....\...\...\
11a70   a8 fa fe 0b f0 e7 21 90  14 20 29 90 f0 e7 21 90   ......!.. )...!.
11a80   08 20 21 90 04 41 21 59  00 30 20 92 f0 f5 05 10   . !..A!Y.0 .....
11a90   f0 e7 21 90 08 20 31 90  00 30 28 8c d0 f5 05 10   ..!.. 1..0(.....
11aa0   00 30 20 90 f0 f5 05 10  06 16 80 5c 05 16 88 5c   .0 ........\...\
11ab0   04 16 90 5c 9c 1b ff 09  f0 e7 21 90 18 20 19 92   ...\......!.. ..
11ac0   03 00 28 8c f0 e7 21 90  00 10 29 c2 f0 e7 21 90   ..(...!...)...!.
11ad0   20 20 21 90 f0 e7 21 92  00 00 00 0a 00 00 00 00     !...!.........
11ae0   10 16 78 5c 11 16 38 5c  a0 0f 20 8c 11 16 80 5c   ..x\..8\.. ....\
11af0   04 16 88 5c 7c 0f 00 09  01 00 20 8c 04 e0 21 c2   ...\|..... ...!.
11b00   00 30 20 90 94 f5 05 10  10 20 19 3d 00 30 18 90   .0 ...... .=.0..
11b10   f8 12 06 10 0c 00 00 08  00 30 18 90 b8 12 06 10   .........0......
11b20   f0 e7 21 90 10 20 19 92  f0 e7 21 90 10 20 29 90   ..!.. ....!.. ).
11b30   f0 e7 21 90 0c 20 29 92  f0 e7 21 90 10 20 29 90   ..!.. )...!.. ).
11b40   f0 e7 21 90 08 20 29 92  f0 e7 21 90 10 20 21 90   ..!.. )...!.. !.
11b50   03 16 80 5c fc ea 01 0b  04 00 2c 59 f0 e7 21 90   ...\.......,Y..!.
11b60   14 20 29 92 00 00 28 8c  f0 e7 21 90 18 20 29 92   . )...(...!.. ).
11b70   00 30 30 8c d0 f5 05 10  1e 00 20 8c 06 16 80 5c   .00....... ....\
11b80   05 16 88 5c 04 16 90 5c  90 f9 fe 0b f0 e7 21 90   ...\...\......!.
11b90   14 20 29 90 f0 e7 21 90  08 20 21 90 04 41 21 59   . )...!.. !..A!Y
11ba0   00 30 20 92 f0 f5 05 10  f0 e7 21 90 08 20 31 90   .0 .......!.. 1.
```

Mar 27 18:20 1996 image.txt Page 108

```
11bb0   00 30 28 8c d0 f5 05 10  00 30 20 90 f0 f5 05 10   .0(......0 .....
11bc0   06 16 80 5c 05 16 88 5c  04 16 90 5c 84 1a ff 09   ...\...\...\....
11bd0   14 e0 79 92 03 00 28 8c  f0 e7 21 90 00 10 29 c2   ..y...(...!...).
11be0   f0 e7 21 90 20 20 21 90  f0 e7 21 92 06 00 20 8c   ..!.  !...!... .
11bf0   1a e0 21 c2 00 00 00 0a  00 00 00 00 00 00 00 00   ..!.............
11c00   10 16 18 5c 11 16 38 5c  a0 0f 20 8c 11 16 80 5c   ...\..8\.. ....\
11c10   04 16 88 5c 5c 0e 00 09  07 e0 21 c0 18 0e 21 59   ...\\.....!...!Y
11c20   98 0d 21 59 81 09 21 59  04 39 30 90 80 12 06 10   ..!Y..!Y.90.....
11c30   f0 e7 21 90 10 20 31 92  f0 e7 21 90 10 20 29 90   ..!.. 1...!.. ).
11c40   f0 e7 21 90 0c 20 29 92  f0 e7 21 90 10 20 29 90   ..!.. )...!.. ).
11c50   f0 e7 21 90 08 20 29 92  f0 e7 21 90 10 20 21 90   ..!.. )...!.. !.
11c60   06 16 80 5c ec e9 01 0b  04 00 2c 59 f0 e7 21 90   ...\......,Y..!.
11c70   14 20 29 92 00 00 28 8c  f0 e7 21 90 18 20 29 92   . )...(...!.. ).
11c80   03 00 20 8c 06 e0 21 c2  00 30 30 8c d0 f5 05 10   .. ...!..00.....
11c90   1e 00 20 8c 06 16 80 5c  05 16 88 5c 04 16 90 5c   .. ....\...\...\
11ca0   78 f8 fe 0b f0 e7 21 90  14 20 29 90 f0 e7 21 90   x.....!.. )...!.
11cb0   08 20 21 90 04 41 21 59  00 30 20 92 f0 f5 05 10   . !..A!Y.0 .....
11cc0   f0 e7 21 90 08 20 31 90  00 30 28 8c d0 f5 05 10   ..!.. 1..0(.....
11cd0   00 30 20 90 f0 f5 05 10  06 16 80 5c 05 16 88 5c   .0 .........\...\
11ce0   04 16 90 5c 6c 19 ff 09  00 00 20 8c 14 e8 21 82   ...\l..... ...!.
11cf0   15 e8 21 82 01 00 20 8c  04 e0 21 c2 03 00 28 8c   ..!... ...!...(.
11d00   f0 e7 21 90 00 10 29 c2  f0 e7 21 90 20 20 21 90   ..!...)...!.  !.
11d10   f0 e7 21 92 08 e0 00 35  00 00 00 0a 03 16 80 5c   ..!....5.......\
11d20   80 12 ff 08 00 00 00 00  00 00 00 00 00 00 00 00   ................
11d30   10 16 60 5c 11 16 68 5c  a0 0f 20 8c 11 16 80 5c   ..`\..h\.. ....\
11d40   04 16 88 5c 2c 0d 00 09  07 60 23 c0 18 0e 21 59   ...\,....`#...!Y
11d50   98 0d 21 59 81 09 21 59  04 39 78 90 80 12 06 10   ..!Y..!Y.9x.....
11d60   0c 20 23 90 01 20 21 80  04 39 38 90 10 13 06 10   . #.. !..98.....
11d70   00 30 30 8c d0 f5 05 10  00 00 28 8c 1e 00 20 8c   .00.......(... .
11d80   06 16 80 5c 05 16 88 5c  04 16 90 5c 8c f7 fe 0b   ...\...\...\....
11d90   06 16 80 5c 0f 16 88 5c  28 e7 01 0b 06 16 80 5c   ...\...\(.......\
11da0   07 16 88 5c c4 e6 01 0b  06 16 80 5c a4 e8 01 0b   ...\.......\....
11db0   00 30 80 92 f0 f5 05 10  06 16 28 5c f0 67 23 90   .0........(\.g#.
11dc0   10 20 29 92 f0 67 23 90  10 20 29 90 f0 67 23 90   . )..g#.. )..g#.
11dd0   0c 20 29 92 f0 67 23 90  10 20 29 90 f0 67 23 90   . )..g#.. )..g#.
11de0   08 20 29 92 f0 67 23 90  10 20 29 90 00 30 20 90   . )..g#.. )..0 .
11df0   f0 f5 05 10 05 00 29 59  f0 67 23 90 14 20 29 92   ......)Y.g#.. ).
11e00   00 00 28 8c f0 67 23 90  18 20 29 92 04 00 20 8c   ..(..g#.. ).... .
11e10   06 60 23 c2 0c 20 23 90  01 20 21 80 04 16 70 5c   .`#.. #.. !...p\
11e20   64 20 59 34 0e 39 20 90  c0 2a 01 00 00 10 01 84   d Y4.9 ..*......
```

```
Mar 27 18:20 1996  image.txt Page 109

11e30   00 30 20 8c e0 e3 ff ff  0c 68 23 92 48 00 00 08   .0 ......h#.H...
11e40   00 30 20 8c c0 c7 ff ff  0c 68 23 92 38 00 00 08   .0 ......h#.8...
11e50   00 30 20 8c a0 ab ff ff  0c 68 23 92 28 00 00 08   .0 ......h#.(...
11e60   c8 04 20 8c 0c 68 23 92  1c 00 00 0d fa 05 20 8c   .. ..h#....... .
11e70   0c 68 23 92 10 00 00 08  00 30 20 8c 40 57 ff ff   .h#......0 .@W..
11e80   0c 68 23 92 01 00 20 8c  04 60 23 c2 03 00 28 8c   .h#... ..`#...(.
11e90   f0 67 23 90 00 10 29 c2  f0 67 23 90 20 20 21 90   .g#...)..g#.  !.
11ea0   f0 67 23 92 08 20 03 35  00 00 00 0a 0c 16 80 5c   .g#.. .5.......\
11eb0   f0 10 ff 08 00 00 00 00  00 00 00 00 00 00 00 00   ................
11ec0   10 16 60 5c 11 16 68 5c  07 60 24 c0 18 0e 21 59   ..`\..h\.`$...!Y
11ed0   98 0d 21 59 81 09 21 59  04 39 78 90 80 12 06 10   ..!Y..!Y.9x.....
11ee0   0c 20 24 90 01 20 21 80  04 39 38 90 10 13 06 10   . $.. !..98.....
11ef0   00 30 30 8c d0 f5 05 10  00 00 28 8c 1e 00 20 8c   .00.......(... .
11f00   06 16 80 5c 05 16 88 5c  04 16 90 5c 0c f6 fe 0b   ...\...\...\....
11f10   06 16 80 5c 0f 16 88 5c  a8 e5 01 0b 06 16 80 5c   ...\...\.......\
11f20   07 16 88 5c 44 e5 01 0b  06 16 80 5c 24 e7 01 0b   ...\D......\$...
11f30   00 30 80 92 f0 f5 05 10  06 16 28 5c f0 67 23 90   .0........(\.g#.
11f40   10 20 29 92 f0 67 23 90  10 20 29 90 f0 67 23 90   . )..g#.. )..g#.
11f50   0c 20 29 92 f0 67 23 90  10 20 29 90 f0 67 23 90   . )..g#.. )..g#.
11f60   08 20 29 92 f0 67 23 90  10 20 29 90 00 30 20 90   . )..g#.. )..0 .
11f70   f0 f5 05 10 05 00 29 59  f0 67 23 90 14 20 29 92   ......)Y.g#.. ).
11f80   00 00 28 8c f0 67 23 90  18 20 29 92 06 00 20 8c   ..(..g#.. )... .
11f90   06 60 23 c2 0c 20 23 90  01 20 21 80 04 16 70 5c   .`#.. #.. !...p\
11fa0   54 20 59 34 0e 39 20 90  f0 2a 01 00 00 10 01 84   T Y4.9 ..*......
11fb0   c2 01 20 8c 0c 68 23 92  3c 00 00 08 84 03 20 8c   .. ..h#.<..... .
11fc0   0c 68 23 92 30 00 00 08  46 05 20 8c 0c 68 23 92   .h#.0...F. ..h#.
11fd0   24 00 00 08 08 07 20 8c  0c 68 23 92 18 00 00 08   $..... ..h#.....
11fe0   ca 08 20 8c 0c 68 23 92  0c 00 00 08 8c 0a 20 8c   .. ..h#....... .
11ff0   0c 68 23 92 01 00 20 8c  04 60 23 c2 03 00 28 8c   .h#... ..`#...(.
12000   f0 67 23 90 00 10 29 c2  f0 67 23 90 20 20 21 90   .g#...)..g#.  !.
12010   f0 67 23 92 08 20 03 35  00 00 00 0a 0c 16 80 5c   .g#.. .5.......\
12020   80 0f ff 08 00 00 00 00  00 00 00 00 00 00 00 00   ................
12030   10 16 68 5c 11 16 18 5c  07 60 24 c0 18 0e 21 59   ..h\...\.`$...!Y
12040   98 0d 21 59 81 09 21 59  04 39 70 90 80 12 06 10   ..!Y..!Y.9p.....
12050   0c 20 24 90 01 20 21 80  04 39 38 90 10 13 06 10   . $.. !..98.....
12060   00 30 30 8c d0 f5 05 10  00 00 28 8c 1e 00 20 8c   .00.......(... .
12070   06 16 80 5c 05 16 88 5c  04 16 90 5c 9c f4 fe 0b   ...\...\...\....
12080   06 16 80 5c 0e 16 88 5c  38 e4 01 0b 06 16 80 5c   ...\...\8......\
12090   07 16 88 5c d4 e3 01 0b  06 16 80 5c b4 e5 01 0b   ...\.......\....
120a0   00 30 80 92 f0 f5 05 10  06 16 28 5c f0 e7 20 90   .0........(\.. .
```

```
Mar 27 16:20 1996  image.txt Page 110

120b0   10 20 29 92 f0 e7 20 90  10 20 29 90 f0 e7 20 90   . )... .. )... .
120c0   0c 20 29 92 f0 e7 20 90  10 20 29 90 f0 e7 20 90   . )... .. )... .
120d0   08 20 29 92 f0 e7 20 90  10 20 29 90 00 30 20 90   . )... .. )..0 .
120e0   f0 f5 05 10 05 00 29 59  f0 e7 20 90 14 20 29 92   ......)Y.. .. ).
120f0   00 00 28 8c f0 e7 20 90  18 20 29 92 05 00 20 8c   ..(... .. )... .
12100   06 e0 20 c2 01 00 20 8c  04 e0 20 c2 03 00 28 8c   .. ... ... ...(.
12110   f0 e7 20 90 00 10 29 c2  f0 e7 20 90 20 20 21 90   .. ...)... .  !.
12120   f0 e7 20 92 08 60 03 35  00 00 00 0a 0d 16 80 5c   .. ..`.5.......\
12130   70 0e ff 08 00 00 00 00  00 00 00 00 00 00 00 00   p...............
12140   10 16 78 5c 11 16 18 5c  07 60 24 c0 18 0e 21 59   ..x\...\.`$...!Y
12150   98 0d 21 59 81 09 21 59  04 39 70 90 60 12 06 10   ..!Y..!Y.9p.....
12160   0c 20 24 90 01 20 21 80  04 39 38 90 10 13 06 10   . $.. !..98.....
12170   00 30 30 8c a0 f5 05 10  00 00 28 8c 1e 00 20 8c   .00.......(... .
12180   06 16 80 5c 05 16 88 5c  04 16 90 5c 8c f3 fe 0b   ...\...\...\....
12190   06 16 80 5c 0e 16 88 5c  28 e3 01 0b 06 16 80 5c   ...\...\(......\
121a0   07 16 88 5c c4 e2 01 0b  06 16 80 5c a4 e4 01 0b   ...\.......\....
121b0   00 30 80 92 f0 f5 05 10  06 16 28 5c f0 e7 20 90   .0........(\.. .
121c0   10 20 29 92 f0 e7 20 90  10 20 29 90 f0 e7 20 90   . )... .. )... .
121d0   0c 20 29 92 f0 e7 20 90  10 20 29 90 f0 e7 20 90   . )... .. )... .
121e0   08 20 29 92 f0 e7 20 90  10 20 29 90 00 30 20 90   . )... .. )..0 .
121f0   f0 f5 05 10 05 00 29 59  f0 e7 20 90 14 20 29 92   ......)Y.. .. ).
12200   00 00 28 8c f0 e7 20 90  18 20 29 92 07 00 20 8c   ..(... .. )... .
12210   06 e0 20 c2 01 00 20 8c  04 e0 20 c2 03 00 28 8c   .. ... ... ...(.
12220   f0 e7 20 90 00 10 29 c2  68 00 28 8c 0c e0 23 90   .. ...).h.(...#.
12230   01 20 29 82 0c e0 78 92  00 00 20 8c 0c e8 20 92   . )...x... ... .
12240   04 e8 20 92 f4 e7 20 92  f0 e7 20 90 20 20 21 90   .. ... ... .  !.
12250   f0 e7 20 92 00 00 00 0a  00 00 00 00 00 00 00 00   .. .............
12260   10 16 38 5c 11 16 18 5c  0c 20 24 90 01 20 21 80   ..8\...\. $.. !.
12270   38 20 49 3d 06 e0 20 c0  18 0e 21 59 98 0d 21 59   8 I=.. ...!Y..!Y
12280   28 20 51 3a 03 16 80 5c  08 c6 ff 09 0a 00 20 8c   ( Q:...\....... .
12290   06 e0 20 c2 ff 00 20 8c  4c e8 20 92 00 00 20 8c   .. ... .L. ... .
122a0   19 e0 20 82 0c 00 00 08  08 00 20 8c 06 e0 20 c2   .. ....... ... .
122b0   a0 0f 20 8c 03 16 80 5c  04 16 88 5c b4 07 00 09   .. ....\...\....
122c0   0c e0 21 90 01 20 21 80  04 39 30 90 80 12 06 10   ..!.. !..90.....
122d0   f0 e7 20 90 10 20 31 92  f0 e7 20 90 0c 20 31 92   .. .. 1... .. 1.
122e0   f0 e7 20 90 10 20 29 90  f0 e7 20 90 08 20 29 92   .. .. )... .. ).
122f0   f0 e7 20 90 0c 20 21 90  06 16 80 5c 54 e3 01 0b   .. .. !....\T...
12300   04 00 2c 59 f0 e7 20 90  14 20 29 92 00 00 28 8c   ..,Y.. .. )...(.
12310   f0 e7 20 90 18 20 29 92  01 00 20 8c 04 e0 20 c2   .. .. )... ... .
12320   03 00 28 8c f0 e7 20 90  00 10 29 c2 00 30 30 8c   ..(... ...)..00.
```

Mar 27 18:20 1996 image.txt Page 111

```
12330  d0 f5 05 10 00 00 28 8c  1e 00 20 8c 06 16 80 5c  ......\... ....\
12340  05 16 88 5c 04 16 90 5c  d0 f1 1e 0b f0 e7 20 90  ...\...\...... .
12350  14 20 29 90 f0 e7 20 90  08 20 21 90 04 41 21 59  . )... .. !..A!Y
12360  00 30 20 92 f0 f5 05 10  f0 e7 20 90 08 20 31 90  .0 ....... .. 1.
12370  00 30 28 8c d0 f5 05 10  00 30 20 90 f0 f5 05 10  .0(......0 .....
12380  06 16 80 5c 05 16 88 5c  04 16 90 5c c4 12 ff 09  ...\...\...\....
12390  f0 e7 20 90 20 20 21 90  f0 e7 20 92 08 e0 01 35  .. .  !... ....5
123a0  00 00 00 0a 07 16 80 5c  f8 0b ff 08 00 00 00 00  .......\........
123b0  20 60 08 8c 10 16 60 5c  11 16 68 5c 00 30 70 8c   `....`\..h\.0p.
123c0  20 d0 05 10 0c 20 2c 90  01 60 21 8c 0c 20 24 92   .... ,..`!.. $.
123d0  01 60 49 80 0c 20 24 90  01 20 21 8c 0c 20 24 92  .`I.. $.. !.. $.
123e0  0c 20 2c 90 10 20 24 90  24 00 29 35 40 e0 2f 8c  . ,.. $.$.)5@./.
123f0  49 a0 23 8c 05 16 80 5c  04 16 88 5c c4 e0 01 0b  I.#....\...\....
12400  00 30 50 8c ff ff ff ff  24 00 00 08 0c 20 83 90  .0P.....$.... ..
12410  88 da 01 0b 10 16 50 5c  40 e0 2f 8c 0c 20 23 90  ......P\@./.. #.
12420  05 16 80 5c 04 16 88 5c  98 e0 01 0b 40 e0 87 8c  ...\...\....@...
12430  68 da 01 0b 10 16 58 5c  7a a0 2b 80 4e 00 20 8c  h.....X\z.+.N. .
12440  38 00 29 3d 64 00 20 8c  30 00 51 3c 0c 20 23 90  8.)=d. .0.Q<. #.
12450  10 20 23 92 02 00 30 8c  10 20 2b 90 01 60 21 8c  . #...0.. +..`!.
12460  10 20 23 92 00 50 31 82  0d 16 80 5c 0c 16 88 5c  . #..P1....\...\
12470  80 eb ff 09 00 00 00 0a  7c a0 2b 80 59 00 20 8c  ........|.+.Y. .
12480  a0 00 29 3d 01 00 18 8c  00 00 78 8c 64 e0 00 3a  ..)=......x.d..:
12490  7e a0 2b 8c 38 00 20 8c  8f 00 21 70 05 00 21 59  ~.+.8. ...!p..!Y
124a0  00 10 21 90 38 20 01 3a  00 30 30 8c 80 06 06 10  ..!.8 .:.00.....
124b0  7e a0 2b 8c 38 00 20 8c  8f 00 21 70 05 00 21 59  ~.+.8. ...!p..!Y
124c0  1b 20 29 8c 04 00 20 8c  06 16 80 5c 05 16 88 5c  . )... ....\...\
124d0  04 16 90 5c ac de 01 0b  10 16 18 5c 01 e0 2b 8c  ...\.......\..+.
124e0  05 16 78 5c 63 00 20 8c  08 00 29 3b a4 ff 00 3d  ..x\c. ...);...=
124f0  30 e0 00 3a 0c 20 23 90  10 20 23 92 02 00 30 8c  0..:. #.. #...0.
12500  10 20 2b 90 01 60 21 8c  10 20 23 92 00 50 31 82  . +..`!.. #..P1.
12510  0d 16 80 5c 0c 16 88 5c  d8 ea ff 09 00 00 00 0a  ...\...\........
12520  64 00 20 8c 8b 20 01 5a  e4 00 00 13 80 e8 02 5a  d. .. .Z.......Z
12530  dc 00 00 11 7e a0 33 8c  81 c9 2a 59 38 00 20 8c  ....~.3...*Y8. .
12540  85 00 21 70 06 00 21 59  00 10 21 90 30 20 01 3d  ..!p..!Y..!.0 .=
12550  0c 20 23 90 10 20 23 92  02 00 30 8c 10 20 2b 90  . #.. #...0.. +.
12560  01 60 21 8c 10 20 23 92  00 50 31 82 0d 16 80 5c  .`!.. #..P1....\
12570  0c 16 88 5c 7c ea ff 09  00 00 00 0a 40 e0 37 8c  ...\|.......@.7.
12580  00 00 28 8c 15 00 20 8c  06 16 80 5c 05 16 88 5c  ..(... ....\...\
12590  04 16 90 5c 84 ef fe 0b  81 c9 2a 59 38 00 20 8c  ...\......*Y8. .
125a0  85 00 21 70 00 34 21 80  c1 d0 05 10 1c 20 01 3d  ..!p.4!...... .=
```

Mar 27 18:20 1996 image.txt Page 112

```
125b0  40 e0 2f 8c 49 a0 23 8c  05 16 80 5c 04 16 88 5c   @./.I.#....\...\
125c0  00 df 01 0b 48 00 00 08  81 c9 2a 59 38 00 20 8c   ....H.....*Y8. .
125d0  d5 00 21 70 00 34 39 8c  c1 d0 05 10 40 e0 37 8c   ..!p.49.....@.7.
125e0  81 c9 2a 59 38 00 20 8c  d5 00 21 70 00 34 81 8c   ..*Y8. ...!p.4..
125f0  c1 d0 05 10 5c e0 01 0b  10 16 20 5c 07 16 80 5c   ....\.....  \...\
12600  06 16 88 5c 04 16 90 5c  48 10 ff 09 14 20 23 90   ...\...\H.... #.
12610  04 20 21 90 0c 20 23 92  0c 20 23 90 10 20 23 92   . !.. #.. #.. #.
12620  0c 20 2b 90 00 30 20 8c  b8 2a 01 00 05 16 80 5c   . +..0 ..*.....\
12630  04 16 88 5c 8c de 01 0b  59 00 20 8c 18 00 49 3a   ...\....Y. ...I=
12640  0c 20 2b 90 5e a0 23 8c  05 16 80 5c 04 16 88 5c   . +.^.#....\...\
12650  18 de 01 0b 0c 20 2b 90  40 e0 27 8c 05 16 80 5c   ..... +.@.'....\
12660  04 16 88 5c 04 de 01 0b  0c 20 83 90 e4 df 01 0b   ...\.....  .....
12670  0c 20 23 90 04 00 24 59  10 20 23 92 0d 00 30 8c   . #...$Y. #...0.
12680  10 20 2b 90 01 60 21 8c  10 20 23 92 00 50 31 82   . +..`!.. #..P1.
12690  f0 67 2b 90 0c 20 23 90  10 60 21 92 10 60 21 90   .g+.. #..`!..`!.
126a0  0c 60 21 92 10 60 21 90  08 60 21 92 10 20 23 90   .`!..`!..`!.. #.
126b0  14 60 21 92 18 60 61 92  03 00 20 8c 06 60 23 c2   .`!..`a... ..`#.
126c0  00 00 20 8c 14 68 23 82  15 68 23 82 01 00 20 8c   .. ..h#..h#... .
126d0  04 60 23 c2 03 00 28 8c  f0 67 23 90 00 10 29 c2   .`#...(..g#...).
126e0  f0 67 23 90 20 20 21 90  f0 67 23 92 00 00 00 0a   .g#.  !..g#.....
126f0  10 16 38 5c 11 16 18 5c  0c 20 04 32 07 16 80 5c   ..8\...\. .2...\
12700  a0 08 ff 09 ff 00 20 8c  4c e8 20 92 00 00 20 8c   ...... .L. ... .
12710  19 e0 20 82 03 16 80 5c  38 02 00 08 00 00 00 00   .. ....\8.......
12720  11 16 70 5c 0c 20 24 90  01 20 21 8c 0c 20 24 92   ..p\. $.. !.. $.
12730  0c 20 2c 90 01 60 21 8c  0c 20 24 92 00 50 29 80   . ,..`!.. $..P).
12740  f0 67 24 90 04 20 29 92  0c 20 2c 90 f0 67 24 90   .g$.. ).. ,..g$.
12750  10 20 29 92 f0 67 24 90  10 20 29 90 f0 67 24 90   . )..g$.. )..g$.
12760  0c 20 29 92 f0 67 24 90  10 20 29 90 f0 67 24 90   . )..g$.. )..g$.
12770  08 20 29 92 10 20 2c 90  f0 67 24 90 14 20 29 92   . ).. ,..g$.. ).
12780  f0 67 24 90 18 20 81 92  03 00 28 8c f0 67 24 90   .g$.. ....(..g$.
12790  00 10 29 c2 f0 67 24 90  20 20 21 90 f0 67 24 92   ..)..g$.  !..g$.
127a0  10 20 2c 90 0c 20 24 90  04 41 29 59 0c 68 24 90   . ,.. $..A)Y.h$.
127b0  84 40 21 59 0c 68 24 92  0c 68 3c 90 10 68 34 90   .@!Y.h$..h<..h4.
127c0  2a 68 2c 88 00 30 20 8c  ff ff 00 00 85 00 21 58   *h,..0 .......!X
127d0  04 9d 21 8c 1c 00 39 3e  f4 a7 23 90 14 20 01 32   ..!...9>..#.. .2
127e0  f4 a7 83 90 8c 14 ff 09  00 00 20 8c f4 a7 23 92   .......... ...#.
127f0  f0 a7 23 90 00 10 21 c0  08 20 19 3d 00 00 00 0a   ..#...!.. .=....
12800  08 00 28 8c 02 00 20 8c  05 16 80 5c 04 16 88 5c   ..(... ....\...\
12810  20 31 ff 09 10 16 78 5c  0c 20 04 35 0e 16 80 5c    1....x\. .5...\
12820  20 c2 ff 09 06 00 30 8c  10 e0 2b 90 01 60 21 8c    .....0...+..`!.
```

```
Mar 27 18:20 1996  image.txt Page 113

12830   10 e0 23 92 00 50 31 82  1c a0 23 90 0c 20 81 90   ..#..P1...#.. ..
12840   10 23 ff 09 10 20 04 3a  1c a0 83 90 0f 16 88 5c   .#... .:.......\
12850   c0 22 ff 08 0f 16 80 5c  48 07 ff 08 00 00 00 00   ."......\H.......
12860   10 16 78 5c 06 20 24 c0  18 0e 21 59 9a 0a 21 59   ..x\. $...!Y..!Y
12870   08 20 39 3a 00 00 00 0a  0c e8 23 90 08 20 01 3c   . 9:......#.. .<
12880   00 00 00 0a 0c e8 2b 90  10 e8 23 90 08 00 29 3c   ......+...#...)<
12890   00 00 00 0a f4 e7 23 90  08 20 01 32 00 00 00 0a   ......#.. .2....
128a0   00 30 20 90 50 06 06 10  08 20 01 32 00 00 00 0a   .0 .P.... .2....
128b0   04 e8 2b 90 08 e8 23 90  38 00 29 3c 00 30 28 8c   ..+...#.8.)<.0(.
128c0   50 fa 00 00 00 30 20 8c  70 17 00 00 05 16 80 5c   P....0 .p......\
128d0   0f 16 88 5c 04 16 90 5c  88 13 ff 09 f4 e7 83 92   ...\...\........
128e0   00 00 20 8c 04 e8 23 92  01 00 20 8c 3a e8 23 82   .. ...#... .:.#.
128f0   08 00 28 8c 02 00 20 8c  05 16 80 5c 04 16 88 5c   ..(... ....\...\
12900   30 30 ff 09 10 16 38 5c  0c 20 04 35 0f 16 80 5c   00....8\. .5...\
12910   30 c1 ff 09 06 00 30 8c  10 e0 29 90 01 60 21 8c   0.....0...)..`!.
12920   10 e0 21 92 00 50 31 82  1c e0 23 90 0c 20 81 90   ..!..P1...#.. ..
12930   20 22 ff 09 10 20 04 3a  1c e0 83 90 07 16 88 5c    "... .:.......\
12940   d0 21 ff 08 07 16 80 5c  58 06 ff 08 00 00 00 00   .!.....\X.......
12950   10 16 38 5c 5c e8 ff 09  00 30 28 90 a4 12 06 10   ..8\\....0(.....
12960   f0 e7 21 90 10 20 29 92  f0 e7 21 90 0c 20 29 92   ..!.. )...!.. ).
12970   f0 e7 21 90 10 20 29 90  f0 e7 21 90 08 20 29 92   ..!.. )...!.. ).
12980   f0 e7 21 90 0c 20 21 90  00 30 80 90 a4 12 06 10   ..!.. !..0......
12990   c0 dc 01 0b 04 00 2c 59  f0 e7 21 90 14 20 29 92   ......,Y..!.. ).
129a0   00 30 30 8c d0 f5 05 10  00 00 28 8c 1e 00 20 8c   .00.......(... .
129b0   06 16 80 5c 05 16 88 5c  04 16 90 5c 5c eb fe 0b   ...\...\...\\...
129c0   f0 e7 21 90 14 20 29 90  f0 e7 21 90 08 20 21 90   ..!.. )...!.. !.
129d0   04 41 21 59 00 30 20 92  f0 f5 05 10 f0 e7 21 90   .A!Y.0 .......!.
129e0   08 20 31 90 00 30 28 8c  d0 f5 05 10 00 30 20 90   . 1..0(......0 .
129f0   f0 f5 05 10 06 16 80 5c  05 16 88 5c 04 16 90 5c   .......\...\...\
12a00   50 0c ff 09 0a 00 20 8c  06 e0 21 c2 00 00 28 8c   P..... ...!...(.
12a10   f0 e7 21 90 18 20 29 92  01 00 20 8c 04 e0 21 c2   ..!.. )... ...!.
12a20   03 00 28 8c f0 e7 21 90  00 10 29 c2 f0 e7 21 90   ..(...!...)...!.
12a30   20 20 21 90 f0 e7 21 92  00 30 28 8c 60 2a 01 00     !...!..0(.`*..
12a40   00 30 20 8c 10 27 00 00  05 16 80 5c 07 16 88 5c   .0 ..'.....\...\
12a50   04 16 90 5c 0c 12 ff 09  f8 e7 81 92 00 00 00 0a   ...\............
12a60   00 00 20 8c f8 27 24 92  e8 fe ff 08 00 00 00 00   .. ..'$.........
12a70   10 16 28 5c 11 16 20 5c  38 e7 ff 09 00 30 80 8c   ..(\.. \8....0..
12a80   a0 2a 01 00 05 16 88 5c  04 16 90 5c d4 11 ff 09   .*.....\...\....
12a90   f8 67 81 92 00 00 00 0a  00 00 00 00 00 00 00 00   .g..............
12aa0   00 00 20 8c f8 27 24 92  08 00 20 8c 08 20 24 c2   .. ..'$... .. $.
```

```
Mar 27 18:20 1996  image.txt Page 114

12ab0   1c 20 84 90 4c 17 ff 08  61 74 64 74 00 00 00 00   . ..L...atdt....
12ac0   30 1e 01 00 60 1e 01 00  40 1e 01 00 50 1e 01 00   0...`...@...P...
12ad0   78 1e 01 00 84 1e 01 00  6c 1e 01 00 64 1e 01 00   x.......l.......
12ae0   78 1e 01 00 60 1e 01 00  6c 1e 01 00 50 1e 01 00   x...`...l...P...
12af0   b0 1f 01 00 d4 1f 01 00  bc 1f 01 00 c8 1f 01 00   ................
12b00   ec 1f 01 00 f4 1f 01 00  e0 1f 01 00 f4 1f 01 00   ................
12b10   f4 1f 01 00 d4 1f 01 00  f4 1f 01 00 c8 1f 01 00   ................
12b20   20 60 08 8c 10 16 60 5c  00 00 20 8c 08 20 24 c2    `....`\.. .. $.
12b30   04 20 24 c0 18 0e 21 59  9b 0d 59 59 81 e8 02 5a   . $...!Y..YY...Z
12b40   34 02 00 15 40 e0 37 8c  00 00 28 8c 14 00 20 8c   4...@.7...(... .
12b50   06 16 80 5c 05 16 8d 5c  04 16 90 5c bc e9 fe 0b   ...\...\...\....
12b60   e4 27 3b 90 28 28 2b 88  00 30 20 8c ff ff 00 00   .';.((+..0 .....
12b70   85 00 29 58 00 00 20 8c  07 16 80 5c 06 16 88 5c   ..)X.. ....\...\
12b80   05 16 90 5c 04 16 98 5c  6e 03 00 09 64 00 20 8c   ...\...\n...d. .
12b90   10 00 81 3d 00 00 20 8c  08 20 23 c2 00 00 00 0a   ...=.. .. #.....
12ba0   40 e0 37 8c 00 30 28 8c  c0 33 01 00 05 00 20 8c   @.7..0(..3.... .
12bb0   06 16 80 5c 05 16 88 5c  04 16 90 5c 10 da 01 0b   ...\...\...\....
12bc0   10 20 04 3d 07 00 20 8c  08 20 23 c2 00 00 00 0a   . .=.. .. #.....
12bd0   40 e0 37 8c 00 30 28 8c  a0 33 01 00 04 00 20 8c   @.7..0(..3.... .
12be0   06 16 80 5c 05 16 88 5c  04 16 90 5c e0 d9 01 0b   ...\...\...\....
12bf0   10 20 04 3d 01 00 20 8c  08 20 23 c2 00 00 00 0a   . .=.. .. #.....
12c00   40 e0 37 8c 00 30 28 8c  98 33 01 00 04 00 20 8c   @.7..0(..3.... .
12c10   06 16 80 5c 05 16 88 5c  04 16 90 5c b0 d9 01 0b   ...\...\...\....
12c20   1c 20 04 3d 07 00 20 8c  08 20 23 c2 00 30 80 8c   . .=.. .. #..0..
12c30   40 18 01 00 4c 8f 00 09  00 00 00 0a 40 e0 37 8c   @...L.......@.7.
12c40   00 30 28 8c 88 33 01 00  02 00 20 8c 06 16 80 5c   .0(..3.... ....\
12c50   05 16 88 5c 04 16 90 5c  74 d9 01 0b 10 20 04 3d   ...\...\t.... .=
12c60   03 00 20 8c 08 20 23 c2  00 00 00 0a 40 e0 37 8c   .. .. #.....@.7.
12c70   00 30 28 8c 80 33 01 00  07 00 20 8c 06 16 80 5c   .0(..3.... ....\
12c80   05 16 88 5c 04 16 90 5c  44 d9 01 0b 10 20 04 3d   ...\...\D.... .=
12c90   02 00 20 8c 08 20 23 c2  00 00 00 0a 40 e0 37 8c   .. .. #.....@.7.
12ca0   00 30 28 8c 90 33 01 00  04 00 20 8c 06 16 80 5c   .0(..3.... ....\
12cb0   05 16 88 5c 04 16 90 5c  14 d9 01 0b 10 20 04 3d   ...\...\..... .=
12cc0   03 00 20 8c 08 20 23 c2  00 00 00 0a 40 e0 37 8c   .. .. #.....@.7.
12cd0   00 30 28 8c b0 33 01 00  0a 00 20 8c 06 16 80 5c   .0(..3.... ....\
12ce0   05 16 88 5c 04 16 90 5c  e4 d8 01 0b 10 20 04 3d   ...\...\..... .=
12cf0   05 00 20 8c 08 20 23 c2  00 00 00 0a 1a 20 23 c0   .. .. #...... #.
12d00   18 0e 21 59 98 0d 21 59  08 20 39 3a 00 00 00 0a   ..!Y..!Y. 9:....
12d10   06 20 23 c0 18 0e 21 59  98 0d 21 59 08 20 51 3a   . #...!Y..!Y. Q:
12d20   00 00 00 0a 40 e0 87 8c  c8 05 00 09 00 30 20 90   ....@........0 .
```

```
Mar 27 16:20 1996  image.txt Page 115

12d30   94 f5 05 10 14 20 19 3d  e4 27 2b 90 10 60 21 90   ..... .=.'+..'!.
12d40   02 09 21 59 10 60 21 92  00 00 20 8c 08 20 23 c2   ..!Y.'!... .. #.
12d50   e4 27 23 90 10 20 29 90  e4 27 23 90 0c 20 21 90   .'#.. )..'#.. !.
12d60   08 00 29 35 00 00 00 0a  1c 20 83 90 94 14 ff 09   ..)5..... ......
12d70   00 00 00 0a 44 e0 12 3d  06 20 23 c0 1a 0e 21 59   ....D..=. #...!Y
12d80   9a 0d 51 59 10 a0 1a 3d  0c 16 80 5c 24 03 00 09   ..QY...=...\$...
12d90   00 00 00 0a 10 a0 22 3d  06 00 20 8c 08 20 23 c2   ......"=.. .. #.
12da0   00 00 00 0a 08 a0 2a 3a  00 00 00 0a 06 00 20 8c   ......*:...... .
12db0   08 20 23 c2 00 00 00 0a  83 e8 02 5a 1c 01 00 15   . #........Z....
12dc0   e4 27 23 90 04 16 68 5c  0c 20 39 90 10 20 31 90   .'#...h\. 9.. 1.
12dd0   28 28 2b 88 00 30 20 8c  ff ff 00 00 85 00 29 58   ((+..0 .......)X
12de0   07 81 21 59 84 41 31 59  28 28 2b 88 00 30 20 8c   ..!Y.A1Y((+..0 .
12df0   ff ff 00 00 85 00 21 58  04 84 21 74 04 16 70 5c   ......!X..!t..p\
12e00   00 00 78 8c 80 28 01 5a  d0 00 00 13 10 60 23 90   ..x..(.Z.....'#.
12e10   00 10 21 80 18 0e 21 59  98 0a 81 59 b4 92 00 09   ..!...!Y...Y....
12e20   10 16 18 5c 2c 20 0c 3d  10 60 2b 90 14 60 23 90   ...\, .=.'+..'#.
12e30   10 00 29 35 08 60 23 90  10 60 23 92 8c 00 00 08   ..)5.'#..'#.....
12e40   10 60 23 90 01 20 21 8c  10 60 23 92 7c 00 00 08   .'#.. !..'#.|...
12e50   24 e0 10 3d 0c 16 80 5c  58 e3 ff 09 00 00 20 8c   $..=...\X..... .
12e60   08 20 23 c2 04 16 80 5c  0c 16 88 5c 84 f8 ff 09   . #....\...\....
12e70   00 00 00 0a 54 e0 18 3d  a0 0f 20 8c 0c 16 80 5c   ....T..=.. ....\
12e80   04 16 88 5c ec fb ff 09  01 00 20 8c 04 20 23 c2   ...\...... .. #.
12e90   00 30 20 90 94 f5 05 10  10 20 19 3d 00 30 48 90   .0 ...... .=.0H.
12ea0   f8 12 06 10 0c 00 00 08  00 30 48 90 b8 12 06 10   .........0H.....
12eb0   0c 16 80 5c 09 16 88 5c  18 e2 ff 09 00 00 20 8c   ...\...\...... .
12ec0   08 20 23 c2 00 00 00 0a  01 e0 23 8c 04 16 78 5c   . #........#...x\
12ed0   84 a0 03 5a 38 ff ff 14  00 00 20 8c 08 20 23 c2   ...Z8..... .. #.
12ee0   00 00 00 0a 00 00 00 00  00 00 00 00 00 00 00 00   ................
12ef0   10 60 08 8c 10 16 60 5c  11 16 68 5c 12 16 70 5c   .'....'\..h\..p\
12f00   ff 00 20 8c 93 00 79 58  10 20 24 90 40 e0 27 92   .. ...yX. $.@.'.
12f10   40 e0 2f 90 0c 20 24 90  04 41 21 59 04 81 24 59   @./.. $..A!Y..$Y
12f20   12 04 21 70 04 16 30 5c  40 e0 8f 8c 04 16 90 5c   ..!p..0\@......\
12f30   00 01 00 09 0c 20 04 3a  64 00 80 8c 00 00 00 0a   ..... .:d.......
12f40   40 e0 27 90 44 e0 27 92  40 e0 2f 90 0c 20 23 90   @.'.D.'.@./.. #.
12f50   04 41 21 59 04 81 23 59  0e 04 29 70 05 16 30 5c   .A!Y..#Y..)p..0\
12f60   44 e0 27 8c 0c 16 80 5c  04 16 88 5c 05 16 90 5c   D.'....\...\...\
12f70   c0 00 00 09 0c 20 04 3a  64 00 80 8c 00 00 00 0a   ..... .:d.......
12f80   40 e0 2f 90 44 e0 27 90  04 41 21 59 04 81 23 59   @./.D.'..A!Y..#Y
12f90   0e 04 21 70 04 16 30 5c  14 20 11 35 40 e0 27 90   ..!p..0\. .5@.'.
12fa0   10 20 23 92 06 16 80 5c  00 00 00 0a 00 00 38 8c   . #....\......8.
```

```
Mar 27 18:20 1996  image.txt Page 116

12fb0   44 a0 01 33 40 e0 27 90  00 10 29 80 0d c0 21 59   D..3@.'.....!Y
12fc0   00 10 29 82 40 e0 2f 90  14 20 23 90 10 00 29 35   ..).@./.. #...)5
12fd0   08 20 23 90 40 e0 27 92  10 00 00 08 40 e0 27 90   . #.@.'.....@.'.
12fe0   01 20 21 8c 40 e0 27 92  01 e0 21 8c 04 16 38 5c   . !.@.'...!...8\
12ff0   c4 9f 21 34 2c e0 03 32  00 30 28 8c c0 33 01 00   ..!4,..2.0(..3..
13000   05 00 20 8c 0d 16 80 5c  05 16 88 5c 04 16 90 5c   .. ....\...\...\
13010   bc d5 01 0b 0c 20 04 3a  06 16 80 5c 00 00 00 0a   ..... .:...\....
13020   44 e0 27 90 10 20 23 92  06 16 80 5c 00 00 00 0a   D.'.. #....\....
13030   10 16 68 5c 11 16 70 5c  12 16 78 5c 00 50 2c 90   ..h\..p\..x\.P,.
13040   00 00 30 8c 06 16 38 5c  06 16 18 5c 48 c0 1b 33   ..0...8\...\H..3
13050   18 e0 01 3a 00 50 21 80  0c 20 51 3d 01 00 30 8c   ...:.P!.. Q=..0.
13060   08 00 00 08 00 00 38 8c  00 50 21 80 08 20 69 3d   ......8..P!.. i=
13070   01 00 38 8c 14 60 23 90  0c 00 29 35 08 60 2b 90   ..8..`#...)5.`+.
13080   08 00 00 08 01 60 29 8c  01 e0 18 8c 08 a0 01 3d   .....`)........=
13090   c0 df 1b 34 10 a0 01 3a  00 90 2b 92 00 00 80 8c   ...4...:..+.....
130a0   00 00 00 0a 64 00 80 8c  00 00 00 0a 00 00 00 00   ....d...........
130b0   10 16 60 5c e4 27 24 90  04 16 70 5c 0c 20 39 90   ..`\.'$...p\. 9.
130c0   10 20 31 90 06 16 68 5c  28 28 2c 88 00 30 20 8c   . 1...h\((,..0 .
130d0   ff ff 00 00 85 00 29 58  07 81 21 59 84 41 31 59   ......)X..!Y.A1Y
130e0   28 28 2c 88 00 30 20 8c  ff ff 00 00 85 00 21 58   ((,..0 .......!X
130f0   04 84 21 74 04 16 50 5c  00 00 18 8c 08 20 01 3c   ..!t..P\..... .<
13100   00 00 00 0a 15 28 2b 80  ff 00 20 8c 85 00 21 58   .....(+... ...!X
13110   00 28 01 5a 6c 01 00 12  00 30 20 90 b8 f5 05 10   .(.Zl....0 .....
13120   00 2f 01 5a 5c 01 00 10  00 50 23 80 83 28 01 5a   ./.Z\....P#..(.Z
13130   48 01 00 15 28 28 2b 88  00 30 20 8c ff ff 00 00   H...((+..0 .....
13140   85 00 29 58 10 a0 23 90  0d 01 21 59 84 41 31 59   ..)X..#...!Y.A1Y
13150   28 28 2b 88 00 30 20 8c  ff ff 00 00 85 00 21 58   ((+..0 .......!X
13160   04 84 21 74 04 16 58 5c  10 20 11 3c 01 60 23 8c   ..!t..X\. .<.`#.
13170   10 a0 23 92 00 00 00 0a  0a e0 2a 8c 02 00 20 8c   ..#.......*... .
13180   05 16 80 5c 04 16 88 5c  a8 27 ff 09 10 20 83 92   ...\...\.'... ..
13190   08 20 04 35 00 00 00 0a  04 00 20 8c 08 20 23 c2   . .5...... .. #.
131a0   03 00 28 8c 10 20 23 90  0c 20 21 90 00 10 29 82   ..(.. #.. !...).
131b0   00 30 20 90 94 f5 05 10  08 20 11 3a 82 c9 5a 59   .0 ...... .:..ZY
131c0   00 00 78 8c 81 c9 22 59  54 20 01 3b 10 a0 23 90   ..x..."YT .;..#.
131d0   00 10 29 80 10 20 23 90  0c 20 21 90 01 20 21 8c   ..).. #.. !.. !.
131e0   04 c0 23 59 00 10 29 82  10 a0 2b 90 14 a0 23 90   ..#Y..)...+...#.
131f0   10 00 29 35 08 a0 23 90  10 a0 23 92 10 00 00 08   ..)5..#...#.....
13200   10 a0 23 90 01 20 21 8c  10 a0 23 92 01 e0 2b 8c   ..#.. !...#...+.
13210   05 16 78 5c 81 c9 22 59  b4 1f 29 3c 10 20 23 90   ..x\.."Y..)<. #.
13220   0c 20 21 90 04 c0 23 59  01 20 29 8c 10 20 23 90   . !...#Y. ).. #.
```

Mar 27 18:20 1996 image.txt Page 117

```
13230   10 20 29 92 01 49 23 59  00 10 39 80 10 20 33 90   . )..I#Y..9.. 3.
13240   10 a0 29 90 01 60 21 8c  10 a0 21 92 00 50 39 82   ..)..`!...!..P9.
13250   00 50 3b 80 10 20 33 90  10 a0 29 90 01 60 21 8c   .P;.. 3...)..`!.
13260   10 a0 21 92 00 50 39 82  00 00 20 8c 00 30 20 92   ..!..P9... ..0 .
13270   b8 f5 05 10 00 00 00 0a  00 00 20 8c 15 28 23 82   .......... ..(#.
13280   00 50 23 80 24 20 81 3d  00 30 20 90 b8 f5 05 10   .P#.$ .=.0 .....
13290   01 20 21 8c 00 30 20 92  b8 f5 05 10 01 00 20 8c   . !..0 ....... .
132a0   15 28 23 82 10 00 00 08  00 00 20 8c 00 30 20 92   .(#....... ..0 .
132b0   b8 f5 05 10 00 50 23 80  14 28 23 82 14 a0 23 90   .....P#..(#...#.
132c0   0c 00 65 35 08 a0 6b 90  08 00 00 08 01 60 6b 8c   ..e5..k......`k.
132d0   01 e0 20 8c 04 16 18 5c  84 a0 02 5a 28 fe ff 14   .. ....\...Z(...
132e0   00 00 00 0a 00 00 00 00  00 00 00 00 00 00 00 00   ................
132f0   10 16 38 5c 00 00 18 8c  00 30 28 90 e4 33 01 00   ..8\.....0(..3..
13300   00 30 20 8c ff ff ff ff  6c 00 29 3a 05 ce 20 59   .0 .....l.):.. Y
13310   00 34 29 8c d0 33 01 00  05 ce 20 59 00 34 21 90   .4)..3.... Y.4!.
13320   e4 33 01 00 05 16 80 5c  07 16 88 5c 04 16 90 5c   .3.....\...\...\
13330   9c d2 01 0b 20 20 04 3d  05 ce 20 59 00 34 21 90   ....  .=.. Y.4!.
13340   e8 33 01 00 00 30 20 92  94 f5 05 10 00 00 80 8c   .3...0 .........
13350   00 00 00 0a 01 e0 20 8c  04 16 18 5c 05 0e 21 59   ...... ....\..!Y
13360   00 34 29 90 e4 33 01 00  00 30 20 8c ff ff ff ff   .4)..3...0 .....
13370   9c 1f 29 3d 01 00 80 8c  00 00 00 0a 00 00 00 00   ..)=............
13380   43 4f 4e 4e 45 43 54 00  4f 4b 00 00 00 00 00 00   CONNECT.OK......
13390   56 43 4f 4e 00 00 00 00  42 55 53 59 00 00 00 00   VCON....BUSY....
133a0   52 49 4e 47 00 00 00 00  00 00 00 00 00 00 00 00   RING............
133b0   4e 4f 20 43 41 52 52 49  45 52 00 00 00 00 00 00   NO CARRIER......
133c0   45 52 52 4f 52 00 00 00  00 00 00 00 00 00 00 00   ERROR...........
133d0   5a 79 58 45 4c 00 00 00  00 00 00 00 00 00 00 00   ZyXEL...........
133e0   00 00 00 00 05 00 00 00  02 00 00 00 00 00 00 00   ................
133f0   43 49 52 52 55 53 20 4c  4f 47 49 43 00 00 00 00   CIRRUS LOGIC....
13400   00 00 00 00 0c 00 00 00  01 00 00 00 00 00 00 00   ................
13410   55 53 52 6f 62 6f 74 69  63 73 00 00 00 00 00 00   USRobotics......
13420   00 00 00 00 0a 00 00 00  03 00 00 00 00 00 00 00   ................
13430   20 00 00 00 00 00 00 00  00 00 00 00 00 00 00 00    ...............
13440   00 00 00 00 ff ff ff ff  ff ff ff ff 00 00 00 00   ................
13450   00 00 00 00 00 00 00 00  00 00 00 00 00 00 00 00   ................
*
13510   31 30 31 0d 00 00 00 00  31 32 32 0d 00 00 00 00   101.....122.....
13520   31 34 36 0d 00 00 00 00  31 32 31 0d 00 00 00 00   146.....121.....
13530   31 34 35 0d 00 00 00 00  32 34 0d 00 00 00 00 00   145.....24......
13540   20 20 20 20 20 20 20 20  20 00 00 00 37 33 0d 00            ...73..
```

Mar 27 18:20 1996 image.txt Page 118

```
13550   37 32 0d 00 00 00 00 00  00 00 00 00 00 00 00 00   72..............
13560   6e 6f 74 20 75 73 65 64  00 00 00 00 61 74 0d 00   not used....at..
13570   61 74 61 0d 00 00 00 00  61 74 64 74 00 00 00 00   ata.....atdt....
13580   61 74 6d 30 0d 00 00 00  61 74 26 68 32 0d 00 00   atm0....at&h2...
13590   61 74 26 68 34 0d 00 00  61 74 23 76 62 70 0d 00   at&h4...at#vbp..
135a0   61 74 68 30 26 66 0d 00  61 74 2b 66 74 6d 3d 00   ath0&f..at+ftm=.
135b0   61 74 2b 66 72 6d 3d 00  00 00 00 00 00 00 00 00   at+frm=.........
135c0   61 74 23 6d 66 72 3f 0d  00 00 00 00 00 00 00 00   at#mfr?.........
135d0   61 74 23 63 6c 73 3d 31  0d 00 00 00 00 00 00 00   at#cls=1........
135e0   61 74 23 63 6c 73 3d 38  0d 00 00 00 00 00 00 00   at#cls=8........
135f0   61 74 2b 66 6d 66 72 3f  0d 00 00 00 00 00 00 00   at+fmfr?........
13600   61 74 23 76 63 6c 3d 31  0d 00 00 00 00 00 00 00   at#vcl=1........
13610   61 74 2b 76 6c 73 3d 32  0d 00 00 00 00 00 00 00   at+vls=2........
13620   61 74 5c 6a 30 5c 71 31  0d 00 00 00 00 00 00 00   at\j0\q1........
13630   61 74 2b 66 72 73 3d 38  0d 00 00 00 00 00 00 00   at+frs=8........
13640   61 74 2b 66 74 73 3d 38  0d 00 00 00 00 00 00 00   at+fts=8........
13650   61 74 2b 66 72 68 3d 33  0d 00 00 00 00 00 00 00   at+frh=3........
13660   61 74 2b 66 74 68 3d 33  0d 00 00 00 00 00 00 00   at+fth=3........
13670   61 74 23 76 6c 6e 20 3d  31 0d 00 00 00 00 00 00   at#vln =1.......
13680   61 74 73 33 39 2e 36 3d  31 0d 00 00 00 00 00 00   ats39.6=1.......
13690   61 74 2b 66 63 6c 61 73  73 3d 38 0d 00 00 00 00   at+fclass=8.....
136a0   61 74 2b 66 63 6c 61 73  73 3d 31 0d 00 00 00 00   at+fclass=1.....
136b0   61 74 2b 76 74 73 3d 7b  2a 2c 31 7d 0d 00 00 00   at+vts={*,1}....
136c0   61 74 2b 76 74 73 3d 7b  41 2c 33 30 7d 0d 00 00   at+vts={A,30}...
136d0   61 74 23 76 74 73 3d 5b  30 2c 32 30 30 2c 32 5d   at#vts=[0,200,2]
136e0   0d 00 00 00 00 00 00 00  00 00 00 00 00 00 00 00   ................
136f0   61 74 6c 30 6d 31 78 34  71 30 76 31 65 30 73 30   atl0m1x4q0v1e0s0
13700   3d 30 73 37 3d 30 34 35  26 64 32 0d 00 00 00 00   =0s7=045&d2.....
13710   34 38 0d 00 39 37 0d 00  39 36 0d 00 00 00 00 00   48..97..96......
13720   00 00 38 8c 00 00 28 8c  0b ce 21 59 00 34 29 92   ..8...(...!Y.4).
13730   14 f6 05 10 0b ce 21 59  00 34 29 92 50 f6 05 10   ......!Y.4).P...
13740   0b ce 21 59 00 34 29 92  54 f6 05 10 0b ce 21 59   ..!Y.4).T.....!Y
13750   00 34 29 92 58 f6 05 10  0b ce 21 59 00 34 29 92   .4).X.....!Y.4).
13760   5c f6 05 10 0b ce 21 59  00 34 29 c2 61 f6 05 10   \.....!Y.4).a...
13770   0b ce 21 59 00 34 29 92  fc fd 05 10 00 30 28 8c   ..!Y.4)......0(.
13780   ff ff ff ff 0b ce 21 59  00 34 29 92 00 fe 05 10   ......!Y.4).....
13790   00 00 28 8c 0b ce 21 59  00 34 29 92 04 fe 05 10   ..(...!Y.4).....
137a0   0b ce 21 59 00 34 29 92  1c f6 05 10 0b ce 21 59   ..!Y.4).......!Y
137b0   00 34 29 92 20 f6 05 10  0b ce 21 59 00 34 29 c2   .4). .....!Y.4).
137c0   24 f6 05 10 0b ce 21 59  00 34 29 c2 25 f6 05 10   $.....!Y.4).%...
```

```
Mar 27 18:20 1996  image.txt Page 119

137d0   0b ce 21 59 00 34 29 c2  16 f6 05 10 0b ce 21 59   ..!Y.4).......!Y
137e0   00 34 29 92 28 f6 05 10  0b ce 21 59 00 34 29 82   .4).(.....!Y.4).
137f0   35 f6 05 10 0b ce 21 59  00 34 29 92 2c f6 05 10   5.....!Y.4).,...
13800   0b ce 21 59 00 34 29 92  30 f6 05 10 0b ce 21 59   ..!Y.4).0.....!Y
13810   00 34 29 82 34 f6 05 10  0b ce 21 59 00 34 29 92   .4).4.....!Y.4).
13820   38 f6 05 10 0b ce 21 59  00 34 29 c2 3c f6 05 10   8.....!Y.4).<...
13830   0b ce 21 59 00 34 29 92  40 f6 05 10 0b ce 21 59   ..!Y.4).@.....!Y
13840   00 34 29 82 4c f6 05 10  05 16 20 5c 00 30 20 92   .4).L..... \.0 .
13850   50 06 06 10 01 00 20 8c  00 30 20 8a 20 06 06 10   P..... ..0 . ...
13860   00 30 20 8a 22 06 06 10  00 30 20 92 10 08 06 10   .0 ."....0 .....
13870   05 16 20 5c 00 30 20 92  60 06 06 10 01 00 20 8c   .. \.0 .`..... .
13880   00 30 20 92 64 06 06 10  05 16 20 5c 00 30 20 92   .0 .d..... \.0 .
13890   68 06 06 10 00 30 20 92  6c 06 06 10 00 30 20 92   h....0 .l....0 .
138a0   24 06 06 10 0b ce 21 59  00 34 29 92 44 f6 05 10   $.....!Y.4).D...
138b0   0b ce 21 59 00 34 29 92  48 f6 05 10 0b ce 21 59   ..!Y.4).H.....!Y
138c0   00 34 29 92 64 f6 05 10  0b ce 21 59 00 34 29 92   .4).d.....!Y.4).
138d0   68 f6 05 10 0b ce 21 59  00 34 29 82 4e f6 05 10   h.....!Y.4).N...
138e0   0b ce 21 59 00 34 29 82  4d f6 05 10 05 16 18 5c   ..!Y.4).M......\
138f0   0b ce 21 59 00 34 29 8c  70 f6 05 10 01 e0 20 8c   ..!Y.4).p..... .
13900   05 0e 21 59 05 00 31 59  0b ce 21 59 00 34 29 8c   ..!Y..1Y..!Y.4).
13910   70 f6 05 10 05 ce 20 59  05 00 21 59 18 20 31 92   p..... Y..!Y. 1.
13920   01 00 30 8c 0b ce 21 59  00 34 29 8c 70 f6 05 10   ..0...!Y.4).p...
13930   05 ce 20 59 05 00 21 59  00 10 31 c2 0b ce 21 59   .. Y..!Y..1...!Y
13940   00 34 29 8c 70 f6 05 10  05 ce 20 59 05 00 21 59   .4).p..... Y..!Y
13950   14 20 21 90 3c 20 01 32  0b ce 21 59 00 34 29 8c   . !.< .2..!Y.4).
13960   70 f6 05 10 05 ce 20 59  05 00 21 59 14 20 81 90   p..... Y..!Y. ..
13970   30 f6 fe 09 00 00 30 8c  0b ce 21 59 00 34 29 8c   0.....0...!Y.4).
13980   70 f6 05 10 05 ce 20 59  05 00 21 59 14 20 31 92   p..... Y..!Y. 1.
13990   01 e0 30 8c 0b ce 21 59  00 34 29 8c 70 f6 05 10   ..0...!Y.4).p...
139a0   05 ce 20 59 05 00 21 59  01 20 31 82 00 00 30 8c   .. Y..!Y. 1...0.
139b0   0b ce 21 59 00 34 29 8c  70 f6 05 10 05 ce 20 59   ..!Y.4).p..... Y
139c0   05 00 21 59 02 20 31 82  f4 01 28 8c 0b ce 21 59   ..!Y. 1...(...!Y
139d0   00 34 29 92 f8 fd 05 10  01 e0 28 8c 05 16 18 5c   .4).......(....\
139e0   3b 00 20 8c 05 20 01 5a  08 ff ff 14 0b ce 21 59   ;. .. .Z......!Y
139f0   00 34 31 8c 70 f6 05 10  0b ce 21 59 00 34 29 8c   .41.p.....!Y.4).
13a00   70 f6 05 10 05 ce 20 59  05 00 21 59 18 20 31 92   p..... Y..!Y. 1.
13a10   01 00 30 8c 0b ce 21 59  00 34 29 8c 70 f6 05 10   ..0...!Y.4).p...
13a20   05 ce 20 59 05 00 21 59  00 10 31 c2 0b ce 21 59   .. Y..!Y..1...!Y
13a30   00 34 29 8c 70 f6 05 10  05 ce 20 59 05 00 21 59   .4).p..... Y..!Y
13a40   14 20 21 90 3c 20 01 32  0b ce 21 59 00 34 29 8c   . !.< .2..!Y.4).
```

Mar 27 18:20 1996 image.txt Page 120

```
13a50   70 f6 05 10 05 ce 20 59  05 00 21 59 14 20 81 90   p..... Y..!Y. ..
13a60   40 f5 fe 09 00 00 30 8c  0b ce 21 59 00 34 29 8c   @.....0...!Y.4).
13a70   70 f6 05 10 05 ce 20 59  05 00 21 59 14 20 31 92   p..... Y..!Y. 1.
13a80   01 e0 30 8c 0b ce 21 59  00 34 29 8c 70 f6 05 10   ..0...!Y.4).p...
13a90   05 ce 20 59 05 00 21 59  01 20 31 82 00 00 30 8c   .. Y..!Y. 1...0.
13aa0   0b ce 21 59 00 34 29 8c  70 f6 05 10 05 ce 20 59   ..!Y.4).p..... Y
13ab0   05 00 21 59 02 20 31 82  0b ce 21 59 00 34 29 8c   ..!Y. 1...!Y.4).
13ac0   70 f6 05 10 0b ce 21 59  00 34 29 92 f4 fd 05 10   p.....!Y.4).....
13ad0   0b ce 21 59 00 34 29 8c  70 f6 05 10 0b ce 21 59   ..!Y.4).p.....!Y
13ae0   00 34 29 92 f0 fd 05 10  f4 01 28 8c 0b ce 21 59   .4).......(...!Y
13af0   00 34 29 92 f8 fd 05 10  00 30 28 8c 30 e0 05 10   .4)......0(.0...
13b00   0b ce 21 59 00 34 29 92  08 fe 05 10 01 e0 21 8c   ..!Y.4).......!.
13b10   04 16 38 5c 02 28 01 5a  0c fc ff 11 00 00 80 8c   ..8\.(.Z........
13b20   00 00 00 0a 00 00 00 00  00 00 00 00 00 00 00 00   ................
13b30   10 4e 24 59 90 0d 39 59  08 e0 14 32 00 00 00 0a   .N$Y..9Y...2....
13b40   07 16 80 5c 00 00 00 0a  00 00 00 00 00 00 00 00   ...\............
13b50   00 00 38 8c 00 00 28 8c  0b ce 21 59 00 34 29 92   ..8...(...!Y.4).
13b60   14 f6 05 10 0b ce 21 59  00 34 29 92 50 f6 05 10   ......!Y.4).P...
13b70   0b ce 21 59 00 34 29 92  54 f6 05 10 0b ce 21 59   ..!Y.4).T.....!Y
13b80   00 34 29 92 58 f6 05 10  0b ce 21 59 00 34 29 92   .4).X.....!Y.4).
13b90   5c f6 05 10 01 00 28 8c  0b ce 21 59 00 34 29 c2   \.....(...!Y.4).
13ba0   61 f6 05 10 00 00 28 8c  0b ce 21 59 00 34 29 92   a.....(...!Y.4).
13bb0   fc fd 05 10 00 30 28 8c  ff ff ff ff 0b ce 21 59   .....0(.......!Y
13bc0   00 34 29 92 00 fe 05 10  00 00 28 8c 0b ce 21 59   .4).......(...!Y
13bd0   00 34 29 92 04 fe 05 10  05 16 18 5c 0b ce 21 59   .4)........\..!Y
13be0   00 34 29 8c 70 f6 05 10  01 e0 20 8c 05 0e 21 59   .4).p..... ...!Y
13bf0   05 00 31 59 0b ce 21 59  00 34 29 8c 70 f6 05 10   ..1Y..!Y.4).p...
13c00   05 ce 20 59 05 00 21 59  18 20 31 92 01 00 30 8c   .. Y..!Y. 1...0.
13c10   0b ce 21 59 00 34 29 8c  70 f6 05 10 05 ce 20 59   ..!Y.4).p..... Y
13c20   05 00 21 59 00 10 31 c2  00 00 30 8c 0b ce 21 59   ..!Y..1...0...!Y
13c30   00 34 29 8c 70 f6 05 10  05 ce 20 59 05 00 21 59   .4).p..... Y..!Y
13c40   14 20 31 92 01 e0 28 8c  05 16 18 5c 3b 00 20 8c   . 1...(....\;. .
13c50   8c 1f 29 34 0b ce 21 59  00 34 31 8c 70 f6 05 10   ..)4..!Y.41.p...
13c60   0b ce 21 59 00 34 29 8c  70 f6 05 10 05 ce 20 59   ..!Y.4).p..... Y
13c70   05 00 21 59 18 20 31 92  01 00 30 8c 0b ce 21 59   ..!Y. 1...0...!Y
13c80   00 34 29 8c 70 f6 05 10  05 ce 20 59 05 00 21 59   .4).p..... Y..!Y
13c90   00 10 31 c2 00 00 30 8c  0b ce 21 59 00 34 29 8c   ..1...0...!Y.4).
13ca0   70 f6 05 10 05 ce 20 59  05 00 21 59 14 20 31 92   p..... Y..!Y. 1.
13cb0   0b ce 21 59 00 34 29 8c  70 f6 05 10 0b ce 21 59   ..!Y.4).p.....!Y
13cc0   00 34 29 92 f4 fd 05 10  0b ce 21 59 00 34 29 8c   .4).......!Y.4).
```

Mar 27 18:20 1996 image.txt Page 121

```
13cd0   70 f6 05 10 0b ce 21 59  00 34 29 92 f0 fd 05 10   p.....!Y.4).....
13ce0   f4 01 28 8c 0b ce 21 59  00 34 29 92 f8 fd 05 10   ..(...!Y.4).....
13cf0   01 e0 21 8c 04 16 38 5c  02 28 01 5a 58 fe ff 11   ..!...8\.(.ZX...
13d00   00 00 00 0a 00 00 00 00  00 00 00 00 00 00 00 00   ................
13d10   10 16 60 5c 11 16 68 5c  08 20 03 32 08 60 03 35   ..`\..h\. .2.`.5
13d20   00 00 00 0a 14 60 23 90  0d 20 21 80 8e 28 01 5a   .....`#.. !..(.Z
13d30   b8 03 00 15 0c 60 23 90  04 16 30 5c 00 10 59 90   .....`#...0\..Y.
13d40   00 30 20 8c 0c 53 00 00  84 e0 02 5a f8 00 00 15   .0 ..S.....Z....
13d50   08 60 23 90 0c 20 39 90  00 00 70 8c 0b 8e 23 59   .`#.. 9...p...#Y
13d60   00 34 21 90 50 f6 05 10  20 20 01 32 01 a0 23 8c   .4!.P...  .2..#.
13d70   04 16 70 5c 14 20 11 36  0b 8e 23 59 00 34 21 90   ..p\. .6..#Y.4!.
13d80   50 f6 05 10 e8 3f 01 35  34 a0 13 31 82 00 28 8c   P....?.54..1..(.
13d90   14 60 23 90 0a 20 29 82  00 00 20 8c 0c a0 21 92   .`#.. )... ...!.
13da0   08 60 83 90 fc f1 fe 09  08 60 23 92 0c 16 80 5c   .`.......`#....\
13db0   0d 16 88 5c ac 06 ff 09  38 03 00 08 04 e0 81 90   ...\....8.......
13dc0   f0 0e ff 09 0b 8e 23 59  00 34 81 92 50 f6 05 10   ......#Y.4..P...
13dd0   04 e0 29 90 0b 8e 23 59  00 34 29 92 54 f6 05 10   ..)...#Y.4).T...
13de0   0c 16 80 5c cc 0e ff 09  0b 8e 23 59 00 34 81 92   ...\......#Y.4..
13df0   58 f6 05 10 0b 8e 23 59  00 34 61 92 5c f6 05 10   X.....#Y.4a.\...
13e00   08 e0 29 90 0b 8e 23 59  00 34 29 92 fc fd 05 10   ..)...#Y.4).....
13e10   01 00 28 8c 0b 8e 23 59  00 34 29 c2 61 f6 05 10   ..(...#Y.4).a...
13e20   81 00 28 8c 14 60 23 90  0d 20 29 82 00 00 20 8c   ..(..`#.. ).... .
13e30   0c a0 21 92 0c 16 80 5c  0d 16 88 5c 24 06 ff 09   ..!....\...\$...
13e40   b0 02 00 08 00 30 20 8c  0d 53 00 00 84 e0 02 5a   .....0 ..S.....Z
13e50   c8 00 00 15 08 60 23 90  0c 20 39 90 00 00 70 8c   .....`#.. 9...p.
13e60   0b 8e 23 59 00 34 29 90  54 f6 05 10 04 e0 21 90   ..#Y.4).T.....!.
13e70   24 00 29 32 01 a0 23 8c  04 16 70 5c 18 20 11 36   $.)2..#...p\. .6
13e80   0b 8e 23 59 00 34 29 90  54 f6 05 10 04 e0 21 90   ..#Y.4).T.....!.
13e90   e4 1f 29 35 34 a0 13 31  82 00 28 8c 14 60 23 90   ..)54..1..(..`#.
13ea0   0d 20 29 82 00 00 20 8c  0c a0 21 92 08 60 83 90   . )... ...!..`..
13eb0   f0 f0 fe 09 08 60 23 92  0c 16 80 5c 0d 16 88 5c   .....`#....\...\
13ec0   a0 05 ff 09 2c 02 00 08  00 00 28 8c 0b 8e 23 59   ....,.....(...#Y
13ed0   00 34 29 92 54 f6 05 10  01 00 28 8c 0b 8e 23 59   .4).T.....(...#Y
13ee0   00 34 29 c2 61 f6 05 10  81 00 28 8c 14 60 23 90   .4).a.....(..`#.
13ef0   0d 20 29 82 00 00 20 8c  0c a0 21 92 08 60 83 90   . )... ...!..`..
13f00   a0 f0 fe 09 08 60 23 92  0c 16 80 5c 0d 16 88 5c   .....`#....\...\
13f10   50 05 ff 09 dc 01 00 08  00 30 20 8c 01 59 00 00   P........0 ..Y..
13f20   84 e0 02 5a 98 01 00 15  08 60 23 90 0c 20 19 90   ...Z.....`#.. ..
13f30   00 00 70 8c 0b 8e 23 59  00 34 29 90 fc fd 05 10   ..p...#Y.4).....
13f40   08 e0 20 90 24 00 29 32  01 a0 23 8c 04 16 70 5c   .. .$.)2..#...p\
```

```
Mar 27 18:20 1996  image.txt Page 122

13f50   18 20 11 36 0b 8e 23 59  00 34 29 90 fc fd 05 10   . .6..#Y.4).....
13f60   08 e0 20 90 e4 1f 29 35  00 00 78 8c 0b ce 23 59   .. ...)5..x...#Y
13f70   00 34 29 90 fc fd 05 10  0c e0 20 90 24 00 29 32   .4)....... .$.)2
13f80   01 e0 23 8c 04 16 78 5c  18 20 11 36 0b ce 23 59   ..#...x\. .6..#Y
13f90   00 34 29 90 fc fd 05 10  0c e0 20 90 e4 1f 29 35   .4)....... ...)5
13fa0   08 a0 13 36 30 e0 13 31  82 00 28 8c 14 60 23 90   ...60..1..(..`#.
13fb0   0d 20 29 82 08 60 83 90  e0 ef fe 09 00 00 20 8c   . )..`........ .
13fc0   08 60 23 92 0c 16 80 5c  0d 16 88 5c 94 04 ff 09   .`#....\...\....
13fd0   20 01 00 08 0b 8e 23 59  c0 34 21 8c 10 f6 05 10    .....#Y.4!.....
13fe0   00 30 20 92 10 06 06 10  10 e0 28 c0 0b 8e 23 59   .0 .......(...#Y
13ff0   00 34 29 c2 19 f6 05 10  11 e0 28 c0 0b ce 23 59   .4).......(...#Y
14000   00 34 29 c2 19 f6 05 10  04 e0 28 90 0b 8e 23 59   .4).......(...#Y
14010   00 34 29 92 14 f6 05 10  04 e0 28 90 0b ce 23 59   .4).......(...#Y
14020   00 34 29 92 14 f6 05 10  0b 8e 23 59 00 34 79 92   .4).......#Y.4y.
14030   00 fe 05 10 0b ce 23 59  00 34 29 90 54 f6 05 10   ......#Y.4).T...
14040   0b 8e 23 59 00 34 29 92  04 fe 05 10 0b ce 23 59   ..#Y.4).......#Y
14050   00 34 71 92 00 fe 05 10  0b 8e 23 59 00 34 29 90   .4q.......#Y.4).
14060   54 f6 05 10 0b ce 23 59  00 34 29 92 04 fe 05 10   T.....#Y.4).....
14070   02 00 28 8c 0b 8e 23 59  00 34 29 c2 61 f6 05 10   ..(...#Y.4).a...
14080   0b ce 23 59 00 34 29 c2  61 f6 05 10 81 00 28 8c   ..#Y.4).a.....(.
14090   14 60 23 90 0d 20 29 82  00 00 20 8c 0c a0 21 92   .`#.. ).... ...!.
140a0   08 60 83 90 fc ee fe 09  08 60 23 92 0c 16 80 5c   .`........`#....\
140b0   0d 16 88 5c ac 03 ff 09  38 00 00 08 82 00 28 8c   ...\....8.....(.
140c0   14 60 23 90 0d 20 29 82  08 60 83 90 d4 ee fe 09   .`#.. )..`......
140d0   00 00 20 8c 08 60 23 92  0c 16 80 5c 0d 16 88 5c   .. ..`#....\...\
140e0   80 03 ff 09 0c 00 00 08  0d 16 80 5c b4 ee fe 08   ...........\....
140f0   00 00 00 0a 00 00 00 00  00 00 00 00 00 00 00 00   ................
14100   10 16 28 5c 11 16 30 5c  08 60 01 32 08 a0 01 35   ..(\..0\.`.2...5
14110   00 00 00 0a 00 00 38 8c  0b ce 21 59 00 34 21 90   ......8...!Y.4!.
14120   50 f6 05 10 20 40 21 32  01 e0 21 8c 04 16 38 5c   P... @!2..!...8\
14130   14 20 11 36 0b ce 21 59  00 34 21 90 50 f6 05 10   . .6..!Y.4!.P...
14140   e8 5f 21 35 0c e0 11 31  06 16 80 5c 54 ee fe 08   ._!5...1...\T...
14150   14 a0 21 90 0d 20 19 80  14 e0 00 3d 05 16 80 5c   ..!.. .....=...\
14160   06 16 88 5c fc 03 ff 09  70 00 00 08 0c e0 08 3a   ...\....p......:
14170   83 00 20 8c 14 c0 20 3d  05 16 80 5c 06 16 88 5c   .. ... =...\...\
14180   e0 03 ff 09 54 00 00 08  81 00 20 8c 14 c0 20 3d   ....T..... ... =
14190   06 16 80 5c 0c ee fe 09  00 00 30 8c 3c 00 00 08   ...\......0.<...
141a0   82 00 20 8c 14 c0 20 3d  06 16 80 5c f4 ed fe 09   .. ... =...\....
141b0   00 00 30 8c 24 00 00 08  14 e0 70 3d 05 16 80 5c   ..0.$.....p=...\
141c0   06 16 88 5c 9c 03 ff 09  10 00 00 08 06 16 80 5c   ...\...........\
```

Mar 27 18:20 1996 image.txt Page 123

```
141d0   d0 e0 fe 09 00 00 30 8c  00 00 00 0a 00 00 00 00   ......0.........
141e0   10 16 60 5c 00 00 70 8c  0e 16 68 5c 0b 4e 23 59   ..`\..p...h\.N#Y
141f0   00 34 21 90 50 f6 05 10  20 00 23 32 01 60 23 8c   .4!.P... .#2.`#.
14200   04 16 68 5c 14 20 11 3b  0b 4e 23 59 00 34 21 90   ..h\. .;.N#Y.4!.
14210   50 f6 05 10 e8 1f 23 35  08 60 13 31 00 00 00 0a   P.....#5.`.1....
14220   0b 4e 23 59 00 34 79 8c  10 f6 05 10 00 34 21 c0   .N#Y.4y......4!.
14230   24 f6 05 10 48 20 99 3d  0b 4e 23 59 00 34 29 c0   $...H .=.N#Y.4).
14240   19 f6 05 10 64 00 20 8c  34 00 29 3a 14 e0 33 c0   ....d. .4.):..3.
14250   50 e0 2b c0 54 00 20 8c  85 00 21 70 06 3d e9 90   P.+.T. ...!p.=..
14260   00 14 06 10 0e 16 80 5c  0f 16 88 5c 00 50 07 86   .......\...\.P..
14270   00 00 20 8c 14 e0 23 c2  00 00 00 0a 0c 16 80 5c   .. ...#........\
14280   40 02 ff 09 10 16 70 5c  00 28 04 5a 14 02 00 12   @.....p\.(.Z....
14290   14 a0 23 90 0d 20 39 80  0c e0 01 3a 81 e8 01 5a   ..#.. 9....:...Z
142a0   fc 00 00 15 0b 4e 23 59  00 34 21 c0 61 f6 05 10   .....N#Y.4!.a...
142b0   1c 20 11 3a 0e 16 80 5c  e8 ec fe 09 0c 16 80 5c   . .:...\.......\
142c0   00 02 ff 09 10 16 70 5c  d0 01 00 08 0b 4e 23 59   ......p\.....N#Y
142d0   00 34 21 90 00 fe 05 10  0b 0e 21 59 00 34 21 c0   .4!.......!Y.4!.
142e0   61 f6 05 10 a8 20 11 3d  0b 4e 23 59 00 34 29 c0   a.... .=.N#Y.4).
142f0   19 f6 05 10 64 00 20 8c  48 00 29 3d 0b 4e 23 59   ....d. .H.)=.N#Y
14300   00 34 81 90 04 fe 05 10  48 08 ff 09 28 20 04 3a   .4......H...( .:
14310   00 00 28 8c 14 a0 23 90  0d 20 29 82 0b 4e 23 59   ..(...#.. )..N#Y
14320   00 34 81 90 04 fe 05 10  0e 16 88 5c 34 02 ff 09   .4.........\4...
14330   5c 00 00 08 0c 16 80 5c  0e 16 88 5c d4 03 ff 08   \......\...\....
14340   0e 16 80 5c 0f 16 88 5c  38 46 00 09 14 e0 83 c2   ...\...\8F......
14350   14 e0 23 c0 38 20 01 3a  14 e0 33 c0 50 e0 2b c0   ..#.8 .:..3.P.+.
14360   54 00 20 8c 85 00 21 70  06 3d e9 90 00 14 06 10   T. ...!p.=......
14370   0e 16 80 5c 0f 16 88 5c  00 50 07 86 10 20 04 32   ...\...\.P... .2
14380   0c 16 80 5c 0e 16 88 5c  88 03 ff 08 0c 16 80 5c   ...\...\.......\
14390   30 01 ff 09 10 16 70 5c  00 01 00 08 83 00 20 8c   0.....p\...... .
143a0   1c c0 21 3d 0e 16 80 5c  f8 eb fe 09 0c 16 80 5c   ..!=...\.......\
143b0   10 01 ff 09 10 16 70 5c  e0 00 00 08 8e e8 01 5a   ......p\.......Z
143c0   d8 00 00 15 0b 4e 23 59  00 34 29 c0 19 f6 05 10   .....N#Y.4).....
143d0   64 00 20 8c 85 20 01 5a  b4 00 00 15 18 00 28 8c   d. .. .Z......(.
143e0   02 00 20 8c 05 16 80 5c  04 16 88 5c 44 15 ff 09   .. ....\...\D...
143f0   10 16 18 5c 0c 20 04 35  00 00 80 8c 74 4c ff 09   ...\. .5....tL..
14400   0c e0 20 90 18 20 21 8c  10 e0 20 92 0c e0 28 90   .. .. !... ...(.
14410   00 30 20 8c 08 52 00 00  00 50 21 92 ff 00 20 8c   .0 ..R...P!... .
14420   08 60 21 92 0c a0 23 90  04 16 58 5c 00 10 29 90   .`!...#...X\..).
14430   00 30 20 8c 08 52 00 00  34 40 21 3d 0b 4e 23 59   .0 ..R..4@!=.N#Y
14440   00 34 81 90 04 fe 05 10  0e 16 88 5c 14 01 ff 09   .4.........\....
```

```
14450   81 00 28 8c 14 e0 20 90  0a 20 29 82 0c 16 80 5c   ..(.... .. ).....
14460   03 16 88 5c fc ff fe 09  24 00 00 08 82 00 28 8c   ...\....$.....(.
14470   14 e0 20 90 0d 20 29 82  07 00 20 8c 10 e0 22 92   .. .. )... ...".
14480   0c 16 80 5c 03 16 88 5c  d8 ff fe 09 0c 16 80 5c   ...\...\.......\
14490   30 00 ff 09 10 16 70 5c  00 a8 03 5a 14 fd ff 15   0.....p\...Z....
144a0   00 00 00 0a 00 00 00 00  00 00 00 00 00 00 00 00   ................
144b0   10 60 08 8c 10 16 58 5c  00 00 20 8c 40 e0 27 92   .`....X\.. .@.'.
144c0   04 16 60 5c 0b 0e 23 59  00 34 21 90 54 f6 05 10   ..`\..#Y.4!.T...
144d0   20 c0 22 32 01 20 23 8c  04 16 60 5c 14 20 11 36    ."2. #...`\. .6
144e0   0b 0e 23 59 00 34 21 90  54 f6 05 10 e8 df 22 35   ..#Y.4!.T....."5
144f0   08 20 13 31 00 00 00 0a  0b 0e 23 59 00 34 71 8c   . .1......#Y.4q.
14500   10 f6 05 10 00 34 21 c0  25 f6 05 10 4c 20 41 3d   .....4!.%...L A=
14510   0b 0e 23 59 00 34 29 c0  19 f6 05 10 64 00 20 8c   ..#Y.4).....d. .
14520   38 00 29 3a 40 e0 3f 90  15 a0 33 c0 50 a0 2b c0   8.):@.?...3.P.+.
14530   28 00 20 8c 85 00 21 70  06 3d e9 90 e0 1d 06 10   (. ...!p.=......
14540   07 16 80 5c 0e 16 88 5c  00 50 07 86 00 00 20 8c   ...\...\.P.... .
14550   15 a0 23 c2 00 00 00 0a  40 e0 27 90 3c 20 01 35   ..#.....@.'.< .5
14560   58 a0 2b 90 e7 03 20 8c  30 00 29 35 0b 0e 23 59   X.+... .0.)5..#Y
14570   00 34 29 c0 19 f6 05 10  64 00 20 8c 1c 00 29 3a   .4).....d. ...):
14580   00 00 20 8c 58 a0 23 92  04 16 80 5c 0e 16 88 5c   .. .X.#....\...\
14590   90 3a 00 09 00 00 00 0a  0b 0e 23 59 00 34 21 90   .:........#Y.4!.
145a0   00 fe 05 10 0b 0e 21 59  00 34 81 90 50 f6 05 10   ......!Y.4..P...
145b0   50 fc fe 09 0b 16 80 5c  08 ff fe 09 40 e0 87 92   P......\....@...
145c0   0c e0 82 90 8c 05 ff 09  80 28 04 5a 04 02 00 12   .........(.Z....
145d0   40 e0 27 90 00 28 01 5a  f8 01 00 12 40 e0 27 90   @.'..(.Z....@.'.
145e0   14 20 21 90 0d 20 51 80  83 00 20 8c 10 80 22 3d   . !.. Q... ...."=
145f0   40 e0 87 90 ac e9 fe 09  b4 01 00 08 58 a0 72 3d   @...........X.r=
14600   0b 0e 23 59 00 34 29 c0  19 f6 05 10 64 00 20 8c   ..#Y.4).....d. .
14610   18 00 29 3d 40 e0 27 90  0b 16 80 5c 04 16 88 5c   ..)=@.'....\...\
14620   f0 04 ff 09 88 01 00 08  02 00 20 8c 08 a0 23 c2   .......... ...#.
14630   50 a0 23 c0 14 20 79 3d  40 e0 87 90 0e 16 88 5c   P.#.. y=@......\
14640   c0 18 00 09 68 01 00 08  40 e0 87 90 54 e9 fe 09   ....h...@...T...
14650   5c 01 00 08 0c a0 02 3a  81 a8 02 5a 48 01 00 15   \......:...ZH...
14660   0b 0e 23 59 00 34 21 c0  61 f6 05 10 10 20 11 3a   ..#Y.4!.a.... .:
14670   40 e0 87 90 2c e9 fe 09  34 01 00 08 0b 0e 23 59   @...,...4.....#Y
14680   00 34 21 90 00 fe 05 10  0b 0e 21 59 00 34 21 c0   .4!.......!Y.4!.
14690   61 f6 05 10 82 28 01 5a  14 01 00 15 0b 0e 23 59   a....(.Z......#Y
146a0   00 34 29 c0 19 f6 05 10  64 00 20 8c 18 00 29 3d   .4).....d. ...)=
146b0   40 e0 27 90 0b 16 80 5c  04 16 88 5c 54 04 ff 09   @.'....\...\T...
146c0   ec 00 00 08 01 00 78 8c  40 e0 87 8c e4 44 00 09   ......x.@....D..
```

```
Mar 27 18:20 1996  image.txt Page 123

146d0   10 16 68 5c 01 09 1c 59  04 e8 00 5a bc 00 00 14   ..h\...Y...Z....
146e0   03 39 20 90 f8 47 01 00  00 10 01 d4 40 e0 87 90   .9 ..G......@...
146f0   b0 e8 fe 09 00 00 78 8c  a0 00 00 08 00 00 78 8c   ......x.......x.
14700   98 00 00 08 02 00 20 8c  3e a0 23 82 40 e0 27 50   ......  .>.#.@.'.
14710   20 20 01 32 40 e0 27 90  0c 20 21 90 14 20 01 32     .2@.'.. !.. .2
14720   40 e0 87 90 7c e8 fe 09  00 00 20 8c 40 e0 27 92   @...|.....  .@.',
14730   00 00 80 8c 0e 16 88 5c  a8 0a 00 09 00 00 78 8c   .......\......x.
14740   58 00 00 08 40 e0 87 90  0e 16 88 5c 14 40 00 09   X...@......\.@..
14750   15 a0 83 c2 15 a0 23 c0  2c 20 01 3a 40 e0 3f 90   ......#., .:@.?.
14760   15 a0 33 c0 50 a0 2b c0  28 00 20 8c 85 00 21 70   ..3.P.+.(. ...!p
14770   06 3a e9 90 e0 1a 06 10  07 16 80 5c 0e 16 88 5c   .:.........\...\
14780   00 50 07 86 0c 60 23 35  00 00 78 8c 0c 00 00 08   .P...`#5..x.....
14790   00 00 20 8c 40 e0 27 92  00 e8 03 5a 2c ff ff 15   .. .@.'....Z,...
147a0   0c 00 00 08 40 e0 87 90  f8 e7 fe 09 0b 16 80 5c   ....@..........\
147b0   10 fa fe 09 40 e0 87 92  0c e0 82 90 94 03 ff 09   ....@...........
147c0   10 20 04 3a 40 e0 27 90  00 28 01 5a 10 fe ff 15   . .:@.'..(.Z....
147d0   40 e0 27 90 14 20 01 32  40 e0 27 90 0b 16 80 5c   @.'.. .2@.'....\
147e0   04 16 88 5c 2c ff fe 09  00 00 00 0a 00 00 00 00   ...\,...........
147f0   66 6d 6e 67 00 00 00 00  fc 46 01 00 04 47 01 00   fmng.....F...G..
14800   44 47 01 00 44 47 01 00  ec 46 01 00 00 00 00 00   DG..DG...F......
14810   10 16 38 5c 11 16 18 5c  18 20 04 32 0c e0 21 90   ..8\...\. .2..!.
14820   10 20 01 32 07 16 80 5c  78 e7 fe 09 00 00 38 8c   . .2...\x.....8.
14830   02 00 20 8c 3e e0 20 82  07 16 80 5c 03 16 88 5c   .. .>. ....\...\
14840   a0 09 00 09 00 00 80 8c  00 00 00 0a 00 00 00 00   ................
14850   10 16 18 5c 11 16 80 5c  d8 33 00 09 0c e0 00 32   ...\...\.3.....2
14860   03 16 80 5c 3c e7 fe 09  00 00 80 8c 00 00 00 0a   ...\<...........
14870   10 16 68 5c 11 16 70 5c  f4 67 84 90 d4 02 ff 09   ..h\..p\.g......
14880   14 20 04 3a 44 a0 23 90  0c 20 81 90 c4 02 ff 09   . .:D.#.. ......
14890   0c 20 04 3d 01 00 80 8c  00 00 00 0a 01 00 20 8c   . .=.......... .
148a0   08 a0 23 c2 0e 16 80 5c  48 32 00 09 00 30 20 8a   ..#....\H2...0 .
148b0   22 06 06 10 00 30 20 92  10 08 06 10 00 00 20 8c   "....0 ....... .
148c0   3d a0 23 82 30 a0 23 92  3c a0 23 82 25 a0 23 82   =.#.0.#.<.#.%.#.
148d0   10 60 2b 90 0c 60 23 90  04 41 21 59 81 09 21 59   .`+..`#..A!Y..!Y
148e0   04 16 78 5c 0a 20 29 8c  02 00 20 8c 05 16 80 5c   ..x\. )... ....\
148f0   04 16 88 5c 3c 10 ff 09  10 a0 83 92 0c 20 04 35   ...\<........ .5
14900   00 00 80 8c 6c 47 ff 09  01 00 28 8c 10 a0 23 90   ....lG....(...#.
14910   14 20 21 90 0d 20 29 82  24 00 38 8c 10 a0 33 90   . !.. ).$.8...3.
14920   10 a0 29 90 01 60 21 8c  10 a0 21 92 00 50 39 82   ..)..`!...!..P9.
14930   ff 00 20 8c 8f 00 39 58  10 a0 33 90 10 a0 29 90   .. ...9X..3...).
14940   01 60 21 8c 10 a0 21 92  00 50 39 82 88 cd 2b 59   .`!...!..P9...+Y
```

Mar 27 18:20 1996 image.txt Page 126

```
14950   ff 00 20 8c 85 00 39 58  10 a0 33 90 10 a0 29 90   .. ....9X..3...).
14960   01 60 21 8c 10 a0 21 92  00 50 39 82 00 30 38 80   .`!...!..P9..08.
14970   22 06 06 10 10 a0 33 90  10 a0 29 90 01 60 21 8c   ".....3...)..`!.
14980   10 a0 21 92 00 50 39 82  00 30 38 80 23 06 06 10   ..!..P9..08.#...
14990   10 a0 33 90 10 a0 29 90  01 60 21 8c 10 a0 21 92   ..3...)..`!...!.
149a0   00 50 39 82 00 30 20 88  22 06 06 10 01 20 21 8c   .P9..0 ."....  !.
149b0   00 30 20 8a 22 06 06 10  64 00 38 8c 10 a0 33 90   .0 ."...d.8...3.
149c0   10 a0 29 90 01 60 21 8c  10 a0 21 92 00 50 39 82   ..)..`!...!..P9.
149d0   0c 60 23 90 01 20 29 8c  10 a0 23 90 10 20 21 90   .`#.. )...#.. !.
149e0   05 16 80 5c 04 16 88 5c  0f 16 90 5c 64 ec fe 09   ...\...\...\d...
149f0   10 a0 2b 90 10 60 21 90  04 c0 23 59 10 60 21 92   ..+..`!...#Y.`!.
14a00   f4 a7 2b 90 10 a0 23 90  05 16 80 5c 04 16 88 5c   ..+...#....\...\
14a10   50 fb fe 09 00 00 20 8c  10 a0 23 92 00 30 28 8c   P.....  ...#..0(.
14a20   60 7c 01 00 00 30 20 8c  40 9c 00 00 05 16 80 5c   `|...0 .@......\
14a30   0e 16 88 5c 04 16 90 5c  28 f2 fe 09 54 a0 83 92   ...\...\(...T...
14a40   00 00 20 8c 5c a0 23 92  02 00 20 8c 50 a0 23 c2   ..  .\.#...  .P.#.
14a50   0c 60 03 32 0d 16 80 5c  48 e5 fe 09 23 00 28 8c   .`.2...\H...#.(.
14a60   02 00 20 8c 05 16 80 5c  04 16 88 5c c4 0e ff 09   .. ....\...\....
14a70   10 16 68 5c 0c 20 04 35  00 00 80 8c f4 45 ff 09   ..h\. .5.....E..
14a80   01 00 28 8c 0c 60 23 90  00 10 29 82 00 30 30 8c   ..(..`#...)..00.
14a90   a0 7f 01 00 0c 60 23 90  01 20 29 8c 19 00 20 8c   .....`#.. )... .
14aa0   06 16 80 5c 05 16 88 5c  04 16 90 5c a4 eb fe 09   ...\...\...\....
14ab0   0c 60 23 90 1a 20 21 8c  10 60 23 92 44 a0 83 90   .`#.. !..`#.D...
14ac0   0d 16 88 5c 4c 00 ff 09  00 00 80 8c 00 00 00 0a   ...\L...........
14ad0   10 16 38 5c 11 16 18 5c  11 16 80 5c 54 31 00 09   ..8\...\...\T1..
14ae0   3e e0 20 80 10 20 01 32  07 16 80 5c 03 16 88 5c   >. .. .2...\...\
14af0   f0 06 00 08 0c e0 01 32  07 16 80 5c a4 e4 fe 09   .......2...\....
14b00   54 e0 20 90 14 20 01 32  54 e0 80 90 64 f1 fe 09   T. .. .2T...d...
14b10   00 00 20 8c 54 e0 20 92  0c e0 20 90 6c 20 01 32   .. .T. ... .l .2
14b20   0c e0 20 90 0c 20 21 90  03 20 29 80 80 00 20 8c   .. .. !.. )... .
14b30   58 00 29 3d 44 e0 20 90  0c 20 81 90 14 00 ff 09   X.)=D. .. ......
14b40   0c 20 04 3d 01 00 80 8c  00 00 00 0a 00 30 20 8c   . .=.........0 .
14b50   40 9c 00 00 03 16 80 5c  04 16 88 5c 84 3b 00 09   @......\...\.;..
14b60   44 e0 28 90 0c e0 20 90  05 16 80 5c 04 16 88 5c   D.(... ....\...\
14b70   a0 ff fe 09 00 00 20 8c  0c e0 20 92 03 00 20 8c   ...... ... ... .
14b80   50 e0 20 c2 2c 00 00 08  01 00 20 8c 50 e0 20 c2   P. .,..... .P. .
14b90   00 30 28 8c 60 7c 01 00  a0 0f 20 8c 05 16 80 5c   .0(.`|.... ....\
14ba0   03 16 88 5c 04 16 90 5c  b8 f0 fe 09 54 e0 80 92   ...\...\....T...
14bb0   00 00 80 8c 00 00 00 0a  00 00 00 00 00 00 00 00   ................
14bc0   10 16 78 5c 11 16 38 5c  11 16 80 5c 64 30 00 09   ..x\..8\...\d0..
```

Mar 27 18:20 1996 image.txt Page 127

```
14bd0   3e e0 21 80 10 20 01 32  0f 16 80 5c 07 16 88 5c   >.!.. .2...\...\
14be0   00 06 00 08 44 e0 21 90  0c 20 81 90 64 ff fe 09   ....D.!.. ..d...
14bf0   0c 20 04 3d 01 00 80 8c  00 00 00 0a 00 30 20 8c   . .=.........0 .
14c00   40 9c 00 00 07 16 80 5c  04 16 88 5c d4 3a 00 09   @......\...\.:..
14c10   0c e0 23 90 10 e0 23 92  03 00 30 8c 10 e0 2b 90   ..#...#...0...+.
14c20   01 60 21 8c 10 e0 23 92  00 50 31 82 44 e0 81 90   .`!...#..P1.D...
14c30   0f 16 88 5c dc fe fe 09  04 00 20 8c 50 e0 21 c2   ...\...... .P.!.
14c40   00 00 80 8c 00 00 00 0a  00 00 00 00 00 00 00 00   ................
14c50   10 16 70 5c 11 16 78 5c  11 16 80 5c d4 2f 00 09   ..p\..x\...\./..
14c60   3e e0 23 80 10 20 01 32  0e 16 80 5c 0f 16 88 5c   >.#.. .2...\...\
14c70   70 05 00 08 44 e0 23 90  0c 20 81 90 d4 fe fe 09   p...D.#.. ......
14c80   0c 20 04 3d 01 00 80 8c  00 00 00 0a 5a 00 28 8c   . .=........Z.(.
14c90   02 00 20 8c 05 16 80 5c  04 16 88 5c 94 0c ff 09   .. ....\...\....
14ca0   10 e0 83 92 0c 20 04 35  00 00 80 8c c4 43 ff 09   ..... .5.....C..
14cb0   01 00 28 8c 10 e0 23 90  14 20 21 90 0d 20 29 82   ..(...#.. !.. ).
14cc0   24 00 38 8c 10 e0 33 90  10 a0 29 90 01 60 21 8c   $.8...3...)..`!.
14cd0   10 a0 21 92 00 50 39 82  10 a0 2b 90 0c a0 23 90   ..!..P9...+...#.
14ce0   04 41 21 59 81 09 39 59  10 e0 33 90 10 a0 29 90   .A!Y..9Y..3...).
14cf0   01 60 21 8c 10 a0 21 92  00 50 39 82 00 00 38 8c   .`!...!..P9...8.
14d00   10 e0 33 90 10 a0 29 90  01 60 21 8c 10 a0 21 92   ..3...)..`!...!.
14d10   00 50 39 82 00 30 38 80  22 06 06 10 10 e0 33 90   .P9..08."......3.
14d20   10 a0 29 90 01 60 21 8c  10 a0 21 92 00 50 39 82   ..)..`!...!..P9.
14d30   00 30 38 80 23 06 06 10  10 e0 33 90 10 a0 29 90   .08.#......3...).
14d40   01 60 21 8c 10 a0 21 92  00 50 39 82 00 30 20 88   .`!...!..P9..0 .
14d50   22 06 06 10 01 20 21 8c  00 30 20 8a 22 06 06 10   ".... !..0 ."...
14d60   67 00 38 8c 10 e0 33 90  10 a0 29 90 01 60 21 8c   g.8...3...)..`!.
14d70   10 a0 21 92 00 50 39 82  10 a0 2b 90 0c a0 23 90   ..!..P9...+...#.
14d80   04 41 21 59 81 09 39 59  10 e0 33 90 10 a0 29 90   .A!Y..9Y..3...).
14d90   01 60 21 8c 10 a0 21 92  00 50 39 82 0c a0 23 90   .`!...!..P9...#.
14da0   01 20 39 8c 10 e0 23 90  10 20 31 90 10 a0 2b 90   . 9...#.. 1...+.
14db0   0c a0 23 90 04 41 21 59  81 09 21 59 07 16 80 5c   ..#..A!Y..!Y...\
14dc0   06 16 88 5c 04 16 90 5c  88 e8 fe 09 10 a0 2b 90   ...\...\......+.
14dd0   0c a0 23 90 04 41 21 59  81 09 31 59 10 e0 2b 90   ..#..A!Y..1Y..+.
14de0   10 60 21 90 04 80 21 59  10 60 21 92 00 30 20 8c   .`!...!Y.`!..0 .
14df0   40 9c 00 00 0f 16 80 5c  04 16 88 5c e4 38 00 09   @......\...\.8..
14e00   0c a0 23 90 10 a0 23 92  03 00 30 8c 10 a0 2b 90   ..#...#...0...+.
14e10   01 60 21 8c 10 a0 23 92  00 50 31 82 44 e0 83 90   .`!...#..P1.D...
14e20   0e 16 88 5c ec fc fe 09  05 00 20 8c 50 e0 23 c2   ...\...... .P.#.
14e30   00 00 80 8c 00 00 00 0a  00 00 00 00 00 00 00 00   ................
14e40   70 60 08 8c 10 16 68 5c  11 16 70 5c 11 16 80 5c   p`....h\..p\...\
```

Mar 27 18:20 1996 image.txt Page 128

```
14e50   e0 2d 00 09 00 00 20 8c  00 30 20 92 24 06 06 10   .-.... ..0 .$...
14e60   3e a0 23 80 14 20 01 32  0d 16 80 5c 0e 16 88 5c   >.#.. .2...\...\
14e70   70 03 00 09 00 00 00 0a  f4 a7 e3 90 d4 fc fe 09   p...............
14e80   14 20 04 3a 44 a0 23 90  0c 20 81 90 c4 fc fe 09   . .:D.#.. ......
14e90   0c 20 04 3d 01 00 80 8c  00 00 00 0a 0c 60 23 90   . .=.........`#.
14ea0   05 20 21 80 82 0a 21 59  84 d0 23 58 28 a0 23 92   . !...!Y..#X(.#.
14eb0   10 60 2b 90 0c 60 23 90  04 41 21 59 81 09 79 59   .`+..`#..A!Y..yY
14ec0   10 a0 23 90 00 28 01 5a  78 01 00 15 0a e0 2b 8c   ..#..(.Zx.....+.
14ed0   02 00 20 8c 05 16 80 5c  04 16 88 5c 54 0a ff 09   .. ....\...\T...
14ee0   10 a0 83 92 0c 20 04 35  00 00 80 8c 84 41 ff 09   ..... .5.....A..
14ef0   01 00 28 8c 10 a0 23 90  14 20 21 90 0a 20 29 82   ..(...#.. !.. ).
14f00   24 00 38 8c 10 a0 33 90  10 a0 29 90 01 60 21 8c   $.8...3...)..`!.
14f10   10 a0 21 92 00 50 39 82  01 e0 3b 8c 10 a0 33 90   ..!..P9...;...3.
14f20   10 a0 29 90 01 60 21 8c  10 a0 21 92 00 50 39 82   ..)..`!...!..P9.
14f30   00 00 38 8c 10 a0 33 90  10 a0 29 90 01 60 21 8c   ..8...3...)..`!.
14f40   10 a0 21 92 00 50 39 82  00 30 38 80 22 06 06 10   ..!..P9..08."...
14f50   10 a0 33 90 10 a0 29 90  01 60 21 8c 10 a0 21 92   ..3...)..`!...!.
14f60   00 50 39 82 00 30 38 80  23 06 06 10 10 a0 33 90   .P9..08.#.....3.
14f70   10 a0 29 90 01 60 21 8c  10 a0 21 92 00 50 39 82   ..)..`!...!..P9.
14f80   00 30 20 88 22 06 06 10  01 20 21 8c 00 30 20 8a   .0 .".... !..0 .
14f90.  22 06 06 10 67 00 38 8c  10 a0 33 90 10 a0 29 90   "...g.8...3...).
14fa0   01 60 21 8c 10 a0 21 92  00 50 39 82 10 a0 33 90   .`!...!..P9...3.
14fb0   10 a0 29 90 01 60 21 8c  10 a0 21 92 00 50 79 82   ..)..`!...!..Py.
14fc0   0c 60 23 90 01 20 29 8c  10 a0 23 90 10 20 21 90   .`#.. )...#.. !.
14fd0   05 16 80 5c 04 16 88 5c  0f 16 90 5c 74 e6 fe 09   ...\...\...\t...
14fe0   10 a0 2b 90 10 60 21 90  04 c0 23 59 10 60 21 92   ..+..`!...#Y.`!.
14ff0   40 e0 2f 8c 00 30 20 8c  10 80 01 00 05 16 80 5c   @./..0 ........\
15000   04 16 88 5c bc b4 01 0b  00 30 20 90 10 08 06 10   ...\.....0 .....
15010   20 20 09 3d 02 00 30 8c  50 04 28 8c 40 e0 27 8c     .=..0.P.(.@.'.
15020   06 16 80 5c 05 16 88 5c  04 16 90 5c a4 5f 00 09   ...\...\...\._..
15030   01 00 20 8c 00 30 20 82  06 00 00 40 24 01 00 08   .. ..0 ....@$...
15040   00 00 28 8c 10 a0 23 90  10 20 21 90 00 10 29 82   ..(...#.. !...).
15050   40 e0 37 8c 00 30 28 8c  14 80 01 00 10 a0 23 90   @.7..0(.......#.
15060   0c 20 21 90 08 20 21 8c  06 16 80 5c 05 16 88 5c   . !.. !....\...\
15070   04 16 90 5c cc ac 01 09  06 16 80 5c 34 b2 01 09   ...\.......\4...
15080   00 30 20 90 10 08 06 10  20 20 09 3d 02 00 30 8c   .0 .....  .=..0.
15090   50 04 28 8c 40 e0 27 8c  06 16 80 5c 05 16 88 5c   P.(.@.'....\...\
150a0   04 16 90 5c 2c 5f 00 09  01 00 20 8c 00 30 20 82   ...\,_.... ..0 .
150b0   06 00 00 40 10 60 2b 90  0c 60 23 90 04 41 21 59   ...@.`+..`#..A!Y
150c0   81 09 39 59 10 a0 33 90  10 a0 29 90 01 60 21 8c   ..9Y..3...)..`!.
```

Mar 27 18:20 1996 image.txt Page 129

```
150d0   10 a0 21 92 00 50 39 82  0c 60 23 90 01 20 39 8c   ..!..P9..`#.. 9.
150e0   10 a0 23 90 10 20 31 90  10 60 2b 90 0c 60 23 90   ..#.. 1..`+..`#.
150f0   04 41 21 59 81 09 21 59  07 16 80 5c 06 16 88 5c   .A!Y..!Y...\...\
15100   04 16 90 5c 4c e5 fe 09  10 60 2b 90 0c 60 23 90   ...\L....`+..`#.
15110   04 41 21 59 81 09 31 59  10 a0 23 90 0c 20 29 90   .A!Y..1Y..#.. ).
15120   01 60 21 80 84 80 21 59  01 60 21 82 10 a0 23 90   .`!...!Y.`!...#.
15130   0c 20 29 90 01 60 21 80  02 20 21 8c 01 60 21 82   . )..`!.. !..`!.
15140   10 60 2b 90 0c 60 23 90  04 41 21 59 81 09 31 59   .`+..`#..A!Y..1Y
15150   10 a0 2b 90 10 60 21 90  04 80 21 59 10 60 21 92   ..+..`!...!Y.`!.
15160   f4 a7 2b 90 10 a0 23 90  05 16 80 5c 04 16 88 5c   ..+...#....\...\
15170   f0 f3 fe 09 00 00 20 8c  10 a0 23 92 00 30 20 8c   ......  ...#..0 .
15180   10 27 00 00 0e 16 80 5c  04 16 88 5c 54 35 00 09   .'.....\...\T5..
15190   0c 60 23 90 10 60 23 92  04 00 30 8c 10 60 2b 90   .`#..`#...0..`+.
151a0   01 60 21 8c 10 60 23 92  00 50 31 82 28 a0 33 90   .`!..`#..P1.(.3.
151b0   10 60 2b 90 01 60 21 8c  10 60 23 92 00 50 31 82   .`+..`!..`#..P1.
151c0   44 a0 83 90 0d 16 88 5c  48 f9 fe 09 06 00 20 8c   D......\H..... .
151d0   50 a0 23 c2 00 00 80 8c  00 00 00 0a 00 00 00 00   P.#.............
151e0   10 16 70 5c 11 16 78 5c  18 20 04 32 0c a0 23 90   ..p\..x\. .2..#.
151f0   10 20 01 32 0e 16 80 5c  a8 dd fe 09 00 00 70 8c   . .2...\......p.
15200   44 e0 23 90 0c 20 81 90  48 f9 fe 09 0c 20 04 3d   D.#.. ..H.... .=
15210   01 00 80 8c 00 00 00 0a  3e e0 23 80 82 28 01 5a   ........>.#..(.Z
15220   40 01 00 15 f4 e7 2b 90  01 00 20 8c 05 16 80 5c   @.....+... ....\
15230   04 16 88 5c ac fc fe 09  f4 e7 83 90 74 fa fe 09   ...\........t...
15240   04 16 88 5c 9c fc fe 09  f4 e7 23 90 0c 20 29 90   ...\......#.. ).
15250   01 00 20 8c 05 16 80 5c  04 16 88 5c 84 fc fe 09   .. ....\...\....
15260   f4 e7 23 90 0c 20 81 90  48 fa fe 09 01 00 88 8c   ..#.. ..H.......
15270   70 fc fe 09 f4 e7 83 90  d8 f8 fe 09 0c 20 04 3d   p............ .=
15280   01 00 80 8c 00 00 00 0a  28 a0 03 35 0a 00 28 8c   ........(..5..(.
15290   02 00 20 8c 05 16 80 5c  04 16 88 5c 94 06 ff 09   .. ....\...\....
152a0   10 16 70 5c 0c 20 04 35  00 00 80 8c c4 3d ff 09   ..p\. .5.....=..
152b0   01 00 28 8c 14 a0 23 90  0d 20 29 82 0c a0 23 90   ..(...#.. )...#.
152c0   10 a0 23 92 24 00 30 8c  10 a0 2b 90 01 60 21 8c   ..#.$.0...+..`!.
152d0   10 a0 23 92 00 50 31 82  00 00 30 8c 10 a0 2b 90   ..#..P1...0...+.
152e0   01 60 21 8c 10 a0 23 92  00 50 31 82 10 a0 2b 90   .`!...#..P1...+.
152f0   01 60 21 8c 10 a0 23 92  00 50 31 82 00 30 30 80   .`!...#..P1..00.
15300   22 06 06 10 10 a0 2b 90  01 60 21 8c 10 a0 23 92   "......+..`!...#.
15310   00 50 31 82 00 30 30 80  23 06 06 10 10 a0 2b 90   .P1..00.#.....+.
15320   01 60 21 8c 10 a0 23 92  00 50 31 82 00 30 20 88   .`!...#..P1..0 .
15330   22 06 06 10 01 20 21 8c  00 30 20 8a 22 06 06 10   "..... !..0 ."...
15340   69 00 30 8c 10 a0 2b 90  01 60 21 8c 10 a0 23 92   i.0...+..`!...#.
```

Mar 27 18:20 1996 image.txt Page 130

```
15350   00 50 31 82 f4 e7 83 90  0e 16 88 5c 04 f2 fe 09   .P1.........\....
15360   00 00 80 8c 0f 16 88 5c  d8 0a 00 08 00 00 00 00   .......\........
15370   10 16 70 5c 11 16 78 5c  11 16 80 5c b4 28 00 09   ..p\..x\...\.(..
15380   3e e0 23 80 10 20 01 32  0e 16 80 5c 0f 16 88 5c   >.#.. .2...\...\
15390   50 fe ff 08 44 e0 23 90  0c 20 81 90 b4 f7 fe 09   P...D.#.. ......
153a0   0c 20 04 3d 01 00 80 8c  00 00 00 0a 0f 00 28 8c   . .=..........(.
153b0   02 00 20 8c 05 16 80 5c  04 16 88 5c 74 05 ff 09   .. ....\...\t...
153c0   0c e0 83 92 0c 20 04 35  00 00 80 8c a4 3c ff 09   ..... .5.....<..
153d0   02 00 38 8c 0c e0 33 90  10 a0 29 90 01 60 21 8c   ..8...3...)..`!.
153e0   10 a0 21 92 00 50 39 82  0c a0 23 90 00 10 21 80   ..!..P9...#...!.
153f0   81 28 01 5a cc 00 00 15  3c e0 23 80 94 20 01 32   .(.Z....<.#.. .2
15400   3d e0 23 80 8c 20 11 3e  30 e0 23 90 84 20 01 32   =.#.. .>0.#.. .2
15410   0c e0 23 90 18 20 01 32  0c e0 23 90 0c 20 21 90   ..#.. .2..#.. !.
15420   0c 20 01 32 0c e0 83 90  78 db fe 09 3d e0 23 80   . .2....x...=.#.
15430   01 20 21 8c 3d e0 23 82  1c e0 83 90 c4 09 ff 09   . !.=.#.........
15440   0c e0 83 92 00 30 20 8c  40 9c 00 00 0f 16 80 5c   .....0 .@......\
15450   04 16 88 5c 8c 32 00 09  44 e0 2b 90 0c e0 23 90   ...\.2..D.+...#.
15460   05 16 80 5c 04 16 88 5c  a8 f6 fe 09 00 00 20 8c   ...\...\...... .
15470   0c e0 23 92 03 00 20 8c  50 e0 23 c2 0c a0 03 32   ..#... .P.#....2
15480   0e 16 80 5c 1c db fe 09  00 00 80 8c 00 00 00 0a   ...\............
15490   00 00 20 8c 3d e0 23 82  00 30 30 8c 00 80 01 00   .. .=.#..00.....
154a0   0c e0 23 90 10 20 29 90  05 00 20 8c 06 16 80 5c   ..#.. )... ....\
154b0   05 16 88 5c 04 16 90 5c  98 e1 fe 09 28 00 00 08   ...\...\....(...
154c0   00 30 30 8c 08 80 01 00  0c e0 23 90 10 20 29 90   .00.......#.. ).
154d0   05 00 20 8c 06 16 80 5c  05 16 88 5c 04 16 90 5c   .. ....\...\...\
154e0   70 e1 fe 09 0c e0 2b 90  10 60 21 90 05 20 21 8c   p.....+..`!.. !.
154f0   10 60 21 92 00 30 20 8c  40 9c 00 00 0f 16 80 5c   .`!..0 .@......\
15500   04 16 88 5c dc 31 00 09  0c a0 23 90 10 a0 23 92   ...\.1....#...#.
15510   09 00 30 8c 10 a0 2b 90  01 60 21 8c 10 a0 23 92   ..0...+..`!...#.
15520   00 50 31 82 0a 00 30 8c  10 a0 2b 90 01 60 21 8c   .P1...0...+..`!.
15530   10 a0 23 92 00 50 31 82  44 e0 83 90 0e 16 88 5c   ..#..P1.D......\
15540   d0 f5 fe 09 08 00 20 8c  50 e0 23 c2 00 00 80 8c   ...... .P.#.....
15550   00 00 00 0a 00 00 00 00  00 00 00 00 00 00 00 00   ................
15560   10 16 38 5c 11 16 18 5c  11 16 80 5c c4 26 00 09   ..8\...\...\.&..
15570   44 e0 20 90 0c 20 81 90  d8 f5 fe 09 0c 20 04 3d   D. .. ........ .=
15580   01 00 80 8c 00 00 00 0a  3e e0 20 80 10 20 01 32   ........>. .. .2
15590   07 16 80 5c 03 16 88 5c  48 fc ff 08 0c e0 20 90   ...\...\H..... .
155a0   0c 20 21 90 03 20 29 80  84 00 20 8c 10 00 29 3d   . !.. )... ...)=
155b0   09 00 20 8c 50 e0 20 c2  0c 00 00 08 03 00 20 8c   .. .P. ....... .
155c0   50 e0 20 c2 0c e0 20 90  60 20 01 32 0c e0 20 90   P. ... .` .2.. .
```

Mar 27 18:20 1996 image.txt Page 131

```
155d0   0c 20 21 90 03 20 29 80  84 00 20 8c 18 00 29 3a   . !.. )... ...):
155e0   0c e0 20 90 0c 20 21 90  03 20 29 80 44 00 20 8c   .. .. !.. ).D. .
155f0   38 00 29 3d 00 30 20 8c  40 9c 00 00 03 16 80 5c   8.)=.0 .@......\
15600   04 16 88 5c dc 30 00 09  44 e0 28 90 0c e0 20 90   ...\.0..D.(... .
15610   03 16 80 5c 04 16 88 5c  18 f4 fe 09 00 00 20 8c   ...\...\...... .
15620   0c e0 20 92 0c 00 00 08  00 00 80 8c 44 3a ff 09   .. .........D:..
15630   0c e0 01 32 07 16 80 5c  68 d9 fe 09 00 00 80 8c   ...2...\h.......
15640   00 00 00 0a 00 00 00 00  00 00 00 00 00 00 00 00   ................
15650   10 16 78 5c 11 16 38 5c  11 16 80 5c d4 25 00 09   ..x\..8\...\.%..
15660   3e e0 21 80 10 20 01 32  0f 16 80 5c 07 16 88 5c   >.!.. .2...\...\
15670   70 fb ff 08 44 e0 21 90  0c 20 81 90 d4 f4 fe 09   p...D.!.. ......
15680   0c 20 04 3d 01 00 80 8c  00 00 00 0a 00 30 20 8c   . .=.........0 .
15690   20 4e 00 00 07 16 80 5c  04 16 88 5c 44 30 00 09    N.....\...\D0..
156a0   0c e0 23 90 10 e0 23 92  05 00 30 8c 10 e0 2b 90   ..#...#...0...+.
156b0   01 60 21 8c 10 e0 23 92  00 50 31 82 28 e0 31 90   .`!...#..P1.(.1.
156c0   10 e0 2b 90 01 60 21 8c  10 e0 23 92 00 50 31 82   ..+..`!...#..P1.
156d0   44 e0 81 90 0f 16 88 5c  38 f4 fe 09 07 00 20 8c   D......\8..... .
156e0   50 e0 21 c2 02 00 30 8c  51 04 28 8c 00 30 20 90   P.!...0.Q.(..0 .
156f0   10 08 06 10 06 16 80 5c  05 16 88 5c 04 16 90 5c   .......\...\...\
15700   d0 58 00 09 00 00 80 8c  00 00 00 0a 00 00 00 00   .X..............
15710   10 16 70 5c 11 16 78 5c  11 16 80 5c 14 25 00 09   ..p\..x\...\.%..
15720   3e e0 23 80 10 20 01 32  0e 16 80 5c 0f 16 88 5c   >.#.. .2...\...\
15730   b0 fa ff 08 f4 e7 83 90  18 f4 fe 09 0c 20 04 3d   ............. .=
15740   01 00 80 8c 00 00 00 0a  10 a0 2b 90 0c a0 23 90   ..........+...#.
15750   04 41 21 59 81 09 39 59  0c a0 23 90 06 20 29 8c   .A!Y..9Y..#.. ).
15760   0c a0 23 90 01 20 21 8c  05 16 80 5c 04 16 88 5c   ..#.. !....\...\
15770   07 16 90 5c 34 be fe 0b  01 00 28 8c 14 a0 23 90   ...\4.....(...#.
15780   0d 20 29 82 0c a0 23 90  10 a0 23 92 24 00 30 8c   . )...#...#.$.0.
15790   10 a0 2b 90 01 60 21 8c  10 a0 23 92 00 50 31 82   ..+..`!...#..P1.
157a0   ff 00 20 8c 87 00 31 58  10 a0 2b 90 01 60 21 8c   .. ...1X..+..`!.
157b0   10 a0 23 92 00 50 31 82  88 cd 29 59 ff 00 20 8c   ..#..P1...)Y.. .
157c0   85 00 31 58 10 a0 2b 90  01 60 21 8c 10 a0 23 92   ..1X..+..`!...#.
157d0   00 50 31 82 00 30 30 80  22 06 06 10 10 a0 2b 90   .P1..00."......+.
157e0   01 60 21 8c 10 a0 23 92  00 50 31 82 00 30 30 80   .`!...#..P1..00.
157f0   23 06 06 10 10 a0 2b 90  01 60 21 8c 10 a0 23 92   #.....+..`!...#.
15800   00 50 31 82 00 30 20 88  22 06 06 10 01 20 21 8c   .P1..0 ."..... !.
15810   00 30 20 8a 22 06 06 10  68 00 30 8c 10 a0 2b 90   .0 ."...h.0...+.
15820   01 60 21 8c 10 a0 23 92  00 50 31 82 10 a0 23 90   .`!...#..P1...#.
15830   04 c0 21 59 10 a0 23 92  f4 e7 83 90 0e 16 88 5c   ..!Y..#........\
15840   20 ed fe 09 00 30 20 8c  20 4e 00 00 0f 16 80 5c    ....0 . N.....\
```

```
Mar 27 18:20 1996   image.txt Page 132

15850   04 16 88 5c 8c 2e 00 09  00 00 80 8c 00 00 00 0a   ...\............
15860   10 16 70 5c 11 16 78 5c  11 16 80 5c c4 23 00 09   ..p\..x\...\.#..
15870   3e e0 23 80 10 20 01 32  0e 16 80 5c 0f 16 88 5c   >.#.. .2...\...\
15880   60 f9 ff 08 f4 e7 83 90  c8 f2 fe 09 0c 20 04 3d    ............ .=
15890   01 00 80 8c 00 00 00 0a  10 a0 2b 90 0c a0 23 90   ..........+...#.
158a0   04 41 21 59 81 09 39 59  0c a0 23 90 06 20 29 8c   .A!Y..9Y..#.. ).
158b0   0c a0 23 90 01 20 21 8c  05 16 80 5c 04 16 88 5c   ..#.. !....\...\
158c0   07 16 90 5c e4 bc fe 0b  01 00 28 8c 14 a0 23 90   ...\......(...#.
158d0   0d 20 29 82 0c a0 23 90  10 a0 23 92 24 00 30 8c   . )...#...#.$.0.
158e0   10 a0 2b 90 01 60 21 8c  10 a0 23 92 00 50 31 82   ..+..`!...#..P1.
158f0   ff 00 20 8c 87 00 31 58  10 a0 2b 90 01 60 21 8c   .. ...1X..+..`!.
15900   10 a0 23 92 00 50 31 82  88 ca 29 59 ff 00 20 8c   ..#..P1...)Y.. .
15910   85 00 31 58 10 a0 2b 90  01 60 21 8c 10 a0 23 92   ..1X..+..`!...#.
15920   00 50 31 82 00 30 30 80  22 06 06 10 10 a0 2b 90   .P1..00."......+.
15930   01 60 21 8c 10 a0 23 92  00 50 31 82 00 30 30 80   .`!...#..P1..00.
15940   23 06 06 10 10 a0 2b 90  01 60 21 8c 10 a0 23 92   #.....+..`!...#.
15950   00 50 31 82 00 30 20 88  22 06 06 10 01 20 21 8c   .P1..0 ."..... !.
15960   00 30 20 8a 22 06 06 10  6a 00 30 8c 10 a0 2b 90   .0 ."...j.0...+.
15970   01 60 21 8c 10 a0 23 92  00 50 31 82 10 a0 23 90   .`!...#..P1...#.
15980   04 c0 21 59 10 a0 23 92  f4 e7 83 90 0e 16 88 5c   ..!Y..#........\
15990   d0 eb fe 09 00 00 20 8c  34 e0 23 92 24 e0 23 82   ...... .4.#.$.#.
159a0   00 30 20 8c 20 4e 00 00  0f 16 80 5c 04 16 88 5c   .0 . N.....\...\
159b0   30 2d 00 09 00 00 80 8c  00 00 00 0a 00 00 00 00   0-..............
159c0   10 16 78 5c 11 16 38 5c  11 16 80 5c 64 22 00 09   ..x\..8\...\d"..
159d0   44 e0 21 90 0c 20 81 90  78 f1 fe 09 0c 20 04 3d   D.!.. ..x.... .=
159e0   01 00 80 8c 00 00 00 0a  3e e0 21 80 10 20 01 32   ........>.!.. .2
159f0   0f 16 80 5c 07 16 88 5c  e8 f7 ff 08 00 30 20 8c   ...\...\.....0 .
15a00   40 9c 00 00 07 16 80 5c  04 16 88 5c d4 2c 00 09   @......\...\.,..
15a10   01 00 20 8c 00 30 20 92  b4 f5 05 10 0c e0 23 90   .. ..0 .......#.
15a20   10 e0 23 92 03 00 30 8c  10 e0 2b 90 01 60 21 8c   ..#...0...+..`!.
15a30   10 e0 23 92 00 50 31 82  44 e0 81 90 0f 16 88 5c   ..#..P1.D......\
15a40   d0 f0 fe 09 0a 00 20 8c  50 e0 21 c2 00 00 80 8c   ...... .P.!.....
15a50   00 00 00 0a 00 00 00 00  00 00 00 00 00 00 00 00   ................
15a60   10 16 60 5c 11 16 68 5c  11 16 80 5c c4 21 00 09   ..`\..h\...\.!..
15a70   00 00 20 8c 00 30 20 92  24 06 06 10 3e 60 23 80   .. ..0 .$...>`#.
15a80   10 20 01 32 0c 16 80 5c  0d 16 88 5c 54 f7 ff 08   . .2...\...\T...
15a90   00 30 20 90 10 08 06 10  2c 20 09 3b 00 30 28 90   .0 ......, .;.0(.
15aa0   10 08 06 10 25 60 23 80  84 41 21 59 18 20 09 3b   ....%`#..A!Y. .;
15ab0   02 00 20 8c 3e 60 23 82  0c 16 80 5c 0d 16 88 5c   .. .>`#....\...\
15ac0   20 f7 ff 08 34 60 23 90  00 28 01 5a 64 01 00 15    ...4`#..(.Zd...
```

```
Mar 27 18:20 1996  image.txt Page 133

15ad0   f4 67 83 90 7c f0 fe 09  0c 20 04 3d 01 00 80 8c   .g..|.... .=....
15ae0   00 00 00 0a 02 00 38 8c  52 04 30 8c 00 30 28 90   ......8.R.0..0(.
15af0   10 08 06 10 01 60 21 8c  00 30 20 92 10 08 06 10   .....`!..0 .....
15b00   07 16 80 5c 06 16 88 5c  05 16 90 5c c4 54 00 09   ...\...\...\.T..
15b10   10 20 2b 90 0c 20 23 90  04 41 21 59 81 09 71 59   . +.. #..A!Y..qY
15b20   0f 00 28 8c 07 16 20 5c  05 16 80 5c 04 16 88 5c   ..(... \...\...\
15b30   00 fe fe 09 10 16 78 5c  0c 20 04 35 00 00 80 8c   ......x\. .5....
15b40   30 35 ff 09 0c 20 23 90  03 20 21 80 38 60 23 92   05... #.. !.8`#.
15b50   01 00 28 8c 14 e0 23 90  0d 20 29 82 24 00 30 8c   ..(...#.. ).$.0.
15b60   10 e0 2b 90 01 60 21 8c  10 e0 23 92 00 50 31 82   ..+..`!...#..P1.
15b70   ff 00 20 8c 8e 00 31 58  10 e0 2b 90 01 60 21 8c   .. ...1X..+..`!.
15b80   10 e0 23 92 00 50 31 82  88 8d 2b 59 ff 00 20 8c   ..#..P1...+Y.. .
15b90   85 00 31 58 10 e0 2b 90  01 60 21 8c 10 e0 23 92   ..1X..+..`!...#.
15ba0   00 50 31 82 00 30 30 80  22 06 06 10 10 e0 2b 90   .P1..00.".....+.
15bb0   01 60 21 8c 10 e0 23 92  00 50 31 82 00 30 30 80   .`!...#..P1..00.
15bc0   23 06 06 10 10 e0 2b 90  01 60 21 8c 10 e0 23 92   #.....+..`!...#.
15bd0   00 50 31 82 00 30 20 88  22 06 06 10 01 20 21 8c   .P1..0 .".... !.
15be0   00 30 20 8a 22 06 06 10  66 00 30 8c 10 e0 2b 90   .0 ."...f.0...+.
15bf0   01 60 21 8c 10 e0 23 92  00 50 31 82 0c 20 23 90   .`!...#..P1.. #.
15c00   01 20 29 8c 10 e0 23 90  05 16 80 5c 04 16 88 5c   . )...#....\...\
15c10   0e 16 90 5c 3c da fe 09  10 e0 23 90 04 80 23 59   ...\<.....#...#Y
15c20   10 e0 23 92 f4 67 83 90  0f 16 88 5c 34 e9 fe 09   ..#..g.....\4...
15c30   34 60 23 90 01 20 21 8c  34 60 23 92 00 30 28 8c   4`#.. !.4`#..0(.
15c40   60 7c 01 00 a0 0f 20 8c  05 16 80 5c 0d 16 88 5c   `|.... ....\...\
15c50   04 16 90 5c 0c e0 fe 09  54 60 83 92 0b 00 20 8c   ...\....T`.... .
15c60   50 60 23 c2 0c 20 03 32  0c 16 80 5c 34 d3 fe 09   P`#.. .2...\4...
15c70   00 00 80 8c 00 00 00 0a  00 00 00 00 00 00 00 00   ................
15c80   10 16 70 5c 11 16 78 5c  11 16 80 5c a4 1f 00 09   ..p\..x\...\....
15c90   3e e0 23 80 10 20 01 32  0e 16 80 5c 0f 16 88 5c   >.#.. .2...\...\
15ca0   40 f5 ff 08 44 e0 23 90  0c 20 81 90 a4 ee fe 09   @...D.#.. ......
15cb0   0c 20 04 3d 01 00 80 8c  00 00 00 0a 00 30 20 8c   . .=.........0 .
15cc0   40 9c 00 00 0f 16 80 5c  04 16 88 5c 14 2a 00 09   @......\...\.*..
15cd0   02 00 30 8c 53 04 28 8c  00 30 20 90 10 08 06 10   ..0.S.(..0 .....
15ce0   81 09 21 59 06 16 80 5c  05 16 88 5c 04 16 90 5c   ..!Y...\...\...\
15cf0   e0 52 00 09 0c e0 23 90  0c 20 21 90 03 20 29 80   .R....#.. !.. ).
15d00   fe 00 20 8c 85 00 29 58  ff 00 20 8c 85 00 39 58   .. ...)X.. ...9X
15d10   44 e0 2b 90 0c e0 23 90  05 16 80 5c 04 16 88 5c   D.+...#....\...\
15d20   f0 ed fe 09 00 00 20 8c  0c e0 23 92 38 e0 23 90   ...... ...#.8.#.
15d30   01 09 19 59 2e 00 20 8c  10 c0 20 35 0d 00 20 8c   ...Y.. ... 5.. .
15d40   50 e0 23 c2 4c 00 00 08  4e 00 20 8c 28 c0 20 35   P.#.L...N. .(. 5
```

```
Mar 27 18:20 1996  image.txt Page 154

15d50   8c 00 20 8c 0c 00 39 3a  09 00 20 8c 50 e0 23 c2   .. ...9=.. .P.#.
15d60   cc 00 20 8c 2c 00 39 3d  03 00 20 8c 50 e0 23 c2   .. .,.9=.. .P.#.
15d70   20 00 00 08 8e 00 20 8c  10 c0 20 35 03 90 20 8c    ..... ... 5.. .
15d80   50 e0 23 c2 0c 00 00 08  00 00 80 8c e4 32 ff 09   P.#..........2..
15d90   0c a0 03 32 0e 16 80 5c  08 d2 fe 09 00 00 80 8c   ...2...\........
15da0   00 00 00 0a 00 00 00 00  00 00 00 00 00 00 00 00   ................
15db0   10 16 78 5c 11 16 38 5c  11 16 80 5c 74 1e 00 09   ..x\..8\...\t...
15dc0   3e e0 21 80 10 20 01 32  0f 16 80 5c 07 16 88 5c   >.!.. .2...\...\
15dd0   10 f4 ff 08 44 e0 21 90  0c 20 81 90 74 ed fe 09   ....D.!.. ..t...
15de0   0c 20 04 3d 01 00 80 8c  00 00 00 0a 00 30 20 8c   . .=.........0 .
15df0   40 9c 00 00 07 16 80 5c  04 16 88 5c e4 2b 00 09   @......\...\.+..
15e00   0c e0 23 90 10 e0 23 92  03 00 30 8c 10 e0 2b 90   ..#...#...0...+.
15e10   01 60 21 8c 10 e0 23 92  00 50 31 82 44 e0 81 90   .`!...#..P1.D...
15e20   0f 16 88 5c ec ec fe 09  0e 00 20 8c 50 e0 21 c2   ...\....... .P.!.
15e30   00 00 80 8c 00 00 00 0a  00 00 00 00 00 00 00 00   ................
15e40   10 16 38 5c 11 16 18 5c  11 16 80 5c e4 1d 00 09   ..8\...\...\....
15e50   f4 e7 80 90 fc ec fe 09  0c 20 04 3d 01 00 80 8c   ......... .=....
15e60   00 00 00 0a 01 00 28 8c  54 04 20 8c 05 16 80 5c   ......(.T. ....\
15e70   04 16 88 5c 5c 51 00 09  18 e0 01 32 0c e0 21 90   ...\\Q.....2..!.
15e80   10 20 01 32 07 16 80 5c  18 d1 fe 09 00 00 38 8c   . .2...\......8.
15e90   00 30 20 c0 30 ec 05 10  28 20 01 3d 07 16 80 5c   .0 .0...( .=...\
15ea0   03 16 88 5c 5c 00 00 09  03 16 80 5c 14 1d 00 09   ...\\......\....
15eb0   00 00 20 8c 50 e0 20 c2  04 16 80 5c 00 00 00 0a   .. .P. ....\....
15ec0   08 e0 20 c0 0c 20 01 3a  08 e0 20 c0 1c 20 11 3d   .. .. .:.. .. .=
15ed0   07 16 80 5c 03 16 88 5c  28 00 00 09 00 00 20 8c   ...\...\(..... .
15ee0   50 e0 20 c2 14 00 00 08  03 16 80 5c d4 1c 00 09   P. ........\....
15ef0   0f 00 20 8c 50 e0 20 c2  00 00 80 8c 00 00 00 0a   .. .P. .........
15f00   10 16 60 5c 11 16 68 5c  11 16 80 5c 24 1d 00 09   ..`\..h\...\$...
15f10   54 60 23 90 14 20 01 32  54 60 83 90 54 dd fe 09   T`#.. .2T`..T...
15f20   00 00 20 8c 54 60 23 92  0c 20 03 32 0c 16 80 5c   .. .T`#.. .2...\
15f30   70 d0 fe 09 0c 60 23 90  20 20 01 32 0c 60 23 90   p....`#.  .2.`#.
15f40   0c 20 21 90 14 20 01 32  0c 60 83 90 54 d0 fe 09   . !.. .2.`..T...
15f50   00 00 20 8c 0c 60 23 92  10 60 23 90 20 20 01 32   .. ..`#..`#.  .2
15f60   10 60 23 90 0c 20 21 90  14 20 01 32 10 60 83 90   .`#.. !.. .2.`..
15f70   30 d0 fe 09 00 00 20 8c  10 60 23 92 00 00 20 8c   0..... ..`#... .
15f80   14 60 23 c2 15 60 23 c2  18 60 23 90 20 20 01 32   .`#..`#..`#.  .2
15f90   18 60 23 90 0c 20 21 90  14 20 01 32 18 60 83 90   .`#.. !.. .2.`..
15fa0   00 d0 fe 09 00 00 20 8c  18 60 23 92 1c 60 23 90   ...... ..`#..`#.
15fb0   20 20 01 32 1c 60 23 90  0c 20 21 90 14 20 01 32     .2.`#.. !.. .2
15fc0   1c 60 83 90 dc cf fe 09  00 00 20 8c 1c 60 23 92   .`........ ..`#.
```

```
Mar 27 18:20 1996  image.txt Page 135

15fd0   20 60 23 90 20 20 01 32  20 60 23 90 0c 20 21 90    `#.  .2 `#.. !.
15fe0   14 20 01 32 20 60 83 90  b8 cf fe 09 00 00 20 8c   . .2 `........ .
15ff0   20 60 23 92 00 00 20 8c  08 60 23 c2 24 60 23 82    `#... ..'#.$'#.
16000   25 60 23 82 28 60 23 92  2c 60 23 c2 30 60 23 92   %'#.('#.,'#.0'#.
16010   00 30 20 92 50 06 06 10  00 30 20 92 24 06 06 10   .0 .P....0 .$...
16020   34 60 23 92 3c 60 23 82  38 60 23 92 54 60 23 92   4'#.<'#.8'#.T'#.
16030   58 60 23 92 5c 60 23 92  3e 60 23 82 3d 60 23 82   X'#.\'#.>'#.='#.
16040   50 60 23 c2 01 00 20 8c  00 30 20 8a 20 06 06 10   P'#... ..0 . ...
16050   00 30 20 da 22 06 06 10  00 00 20 8c 00 30 20 82   .0 ."..... ..0 .
16060   06 00 00 40 00 30 20 82  08 00 00 40 04 16 70 5c   ...@.0 ....@..p\
16070   00 00 78 8c 01 00 30 8c  0b 8e 23 59 00 34 29 8c   ..x...0...#Y.4).
16080   70 f6 05 10 05 ce 23 59  05 00 21 59 00 10 31 c2   p.....#Y..!Y..1.
16090   00 00 30 8c 0b 8e 23 59  00 34 29 8c 70 f6 05 10   ..0...#Y.4).p...
160a0   05 ce 23 59 05 00 21 59  02 20 31 82 0b 8e 23 59   ..#Y..!Y. 1...#Y
160b0   00 34 29 8c 70 f6 05 10  05 ce 23 59 05 00 21 59   .4).p.....#Y..!Y
160c0   14 20 21 90 5c 20 01 32  0b 8e 23 59 00 34 29 8c   . !.\ .2..#Y.4).
160d0   70 f6 05 10 05 ce 23 59  05 00 21 59 14 20 21 90   p.....#Y..!Y. !.
160e0   0c 20 21 90 3c 20 01 32  0b 8e 23 59 00 34 29 8c   . !.< .2..#Y.4).
160f0   70 f6 05 10 05 ce 23 59  05 00 21 59 14 20 81 90   p.....#Y..!Y. ..
16100   a0 ce fe 09 00 00 30 8c  0b 8e 23 59 00 34 29 8c   ......0...#Y.4).
16110   70 f6 05 10 05 ce 23 59  05 00 21 59 14 20 31 92   p.....#Y..!Y. 1.
16120   01 e0 2b 8c 05 16 78 5c  3b 00 20 8c 48 1f 29 3c   ..+...x\;. .H.)<
16130   01 00 30 8c 0b 8e 23 59  00 34 29 8c 70 f6 05 10   ..0...#Y.4).p...
16140   05 ce 23 59 05 00 21 59  00 10 31 c2 00 00 30 8c   ..#Y..!Y..1...0.
16150   0b 8e 23 59 00 34 29 8c  70 f6 05 10 05 ce 23 59   ..#Y.4).p.....#Y
16160   05 00 21 59 02 20 31 82  0b 8e 23 59 00 34 29 8c   ..!Y. 1...#Y.4).
16170   70 f6 05 10 05 ce 23 59  05 00 21 59 14 20 21 90   p.....#Y..!Y. !.
16180   5c 20 01 32 0b 8e 23 59  00 34 29 8c 70 f6 05 10   \ .2..#Y.4).p...
16190   05 ce 23 59 05 00 21 59  14 20 21 90 0c 20 21 90   ..#Y..!Y. !.. !.
161a0   3c 20 01 32 0b 8e 23 59  00 34 29 8c 70 f6 05 10   < .2..#Y.4).p...
161b0   05 ce 23 59 05 00 21 59  14 20 81 90 e4 cd fe 09   ..#Y..!Y. ......
161c0   00 00 30 8c 0b 8e 23 59  00 34 29 8c 70 f6 05 10   ..0...#Y.4).p...
161d0   05 ce 23 59 05 00 21 59  14 20 31 92 0b 8e 23 59   ..#Y..!Y. 1...#Y
161e0   00 34 29 8c 70 f6 05 10  0b 8e 23 59 00 34 29 92   .4).p.....#Y.4).
161f0   f4 fd 05 10 0b 8e 23 59  00 34 29 8c 70 f6 05 10   ......#Y.4).p...
16200   0b 8e 23 59 00 34 29 92  f0 fd 05 10 01 a0 23 8c   ..#Y.4).......#.
16210   04 16 70 5c 82 28 01 5a  58 fe ff 11 0a 00 28 8c   ..p\.(.ZX.....(.
16220   02 00 20 8c 05 16 80 5c  04 16 88 5c 04 f7 fe 09   .. ....\...\....
16230   10 16 38 5c 0c 20 04 35  00 00 80 8c 34 2e ff 09   ..8\. .5....4...
16240   00 30 20 8c 40 9c 00 00  0d 16 80 5c 04 16 88 5c   .0 .@......\...\
```

```
Mar 27 16:20 1996  image.txt Page 136

16250   90 24 00 09 09 00 30 8c  10 e0 25 90 01 60 21 8c   .$....0...)..`!.
16260   10 e0 21 92 00 50 31 82  10 e0 29 90 01 60 21 8c   ..!..P1...)..`!.
16270   10 e0 21 92 00 50 31 82  44 60 83 90 07 16 88 5c   ..!..P1.D`.....\
16280   90 e8 fe 09 01 00 20 8c  00 30 20 92 10 08 06 10   ...... ..0 .....
16290   00 00 20 8c 3e 60 23 82  2c 60 23 c2 00 30 20 92   .. .>`#.,`#..0 .
162a0   60 06 06 10 01 00 20 8c  00 30 20 92 64 06 06 10   `..... ..0 .d...
162b0   00 00 20 8c 00 30 20 92  6c 06 06 10 00 30 20 90   .. ..0 .l....0 .
162c0   68 06 06 10 10 20 01 32  00 30 80 90 68 06 06 10   h.... .2.0..h...
162d0   d0 cc fe 09 00 00 20 8c  00 30 20 92 6e 06 06 10   ...... ..0 .n...
162e0   04 16 80 5c 00 00 00 0a  00 00 00 00 00 00 00 00   ...\............
162f0   10 16 78 5c 11 16 38 5c  11 16 80 5c 34 19 00 09   ..x\..8\...\4...
16300   3e e0 21 80 10 20 01 32  0f 16 80 5c 07 16 88 5c   >.!.. .2...\...\
16310   d0 ee ff 08 44 e0 21 90  0c 20 81 90 34 e8 fe 09   ....D.!.. ..4...
16320   0c 20 04 3d 01 00 80 8c  00 00 00 0a 00 30 20 8c   . .=.........0 .
16330   40 9c 00 00 07 16 80 5c  04 16 88 5c a4 23 00 09   @......\...\.#..
16340   0c e0 23 90 10 e0 23 92  03 00 30 8c 10 e0 2b 90   ..#...#...0...+.
16350   01 60 21 8c 10 e0 23 92  00 50 31 82 44 e0 81 90   .`!...#..P1.D...
16360   0f 16 88 5c ac e7 fe 09  00 00 80 8c 00 00 00 0a   ...\............
16370   10 16 70 5c 11 16 78 5c  11 16 80 5c b4 18 00 09   ..p\..x\...\....
16380   3e e0 23 80 10 20 01 32  0e 16 80 5c 0f 16 88 5c   >.#.. .2...\...\
16390   50 ee ff 08 44 e0 23 90  0c 20 81 90 b4 e7 fe 09   P...D.#.. ......
163a0   0c 20 04 3d 01 00 80 8c  00 00 00 0a 01 00 20 8c   . .=.......... .
163b0   00 30 20 8a 22 06 06 10  5a 00 28 8c 02 00 20 8c   .0 ."...Z.(... .
163c0   05 16 80 5c 04 16 88 5c  68 f5 fe 09 10 e0 83 92   ...\...\h.......
163d0   0c 20 04 35 00 00 80 8c  98 2c ff 09 01 00 28 8c   . .5.....,....(.
163e0   10 e0 23 90 14 20 21 90  0d 20 29 82 24 00 38 8c   ..#.. !.. ).$.8.
163f0   10 e0 33 90 10 a0 29 90  01 60 21 8c 10 a0 21 92   ..3...)..`!...!.
16400   00 50 39 82 10 a0 2b 90  0c a0 23 90 04 41 21 59   .P9...+...#..A!Y
16410   81 09 39 59 10 e0 33 90  10 a0 29 90 01 60 21 8c   ..9Y..3...)..`!.
16420   10 a0 21 92 00 50 39 82  00 00 38 8c 10 e0 33 90   ..!..P9...8...3.
16430   10 a0 29 90 01 60 21 8c  10 a0 21 92 00 50 39 82   ..)..`!...!..P9.
16440   00 30 38 80 22 06 06 10  10 e0 33 90 10 a0 29 90   .08.".....3...).
16450   01 60 21 8c 10 a0 21 92  00 50 39 82 00 30 38 80   .`!...!..P9..08.
16460   23 06 06 10 10 e0 33 90  10 a0 29 90 01 60 21 8c   #.....3...)..`!.
16470   10 a0 21 92 00 50 39 82  00 30 20 88 22 06 06 10   ..!..P9..0 ."...
16480   01 20 21 8c 00 30 20 8a  22 06 06 10 67 00 38 8c   . !..0 ."...g.8.
16490   10 e0 33 90 10 a0 29 90  01 60 21 8c 10 a0 21 92   ..3...)..`!...!.
164a0   00 50 39 82 10 a0 2b 90  0c a0 23 90 04 41 21 59   .P9...+...#..A!Y
164b0   81 09 39 59 10 e0 33 90  10 a0 29 90 01 60 21 8c   ..9Y..3...)..`!.
164c0   10 a0 21 92 00 50 39 82  0c a0 23 90 01 20 39 8c   ..!..P9...#.. 9.
```

```
Mar 27 18:20 1996  image.txt Page 137

164d0   10 e0 23 90 10 20 31 90  10 a0 2b 90 0c a0 23 90   ..#.. 1...+...#.
164e0   04 41 21 59 81 09 21 59  07 16 80 5c 06 16 88 5c   .A!Y..!Y...\...\
164f0   04 16 90 5c 5c d1 fe 09  10 a0 2b 90 0c a0 23 90   ...\\.....+...#.
16500   04 41 21 59 81 09 31 59  10 e0 2b 90 10 60 21 90   .A!Y..1Y..+..`!.
16510   04 80 21 59 10 60 21 92  00 30 20 8c 40 9c 00 00   ..!Y.`!..0 .@...
16520   0f 16 80 5c 04 16 88 5c  b8 21 00 09 0c a0 23 90   ...\...\.!....#.
16530   10 a0 23 92 03 00 30 8c  10 a0 2b 90 01 60 21 8c   ..#...0...+..`!.
16540   10 a0 23 92 00 50 31 82  44 e0 83 90 0e 16 88 5c   ..#..P1.D......\
16550   c0 e5 fe 09 00 00 80 8c  00 00 00 0a 00 00 00 00   ................
16560   10 16 68 5c 11 16 70 5c  11 16 80 5c c4 16 00 09   ..h\..p\...\....
16570   3e a0 23 80 10 20 01 32  0a 16 80 5c 0e 16 88 5c   >.#.. .2...\...\
16580   60 ec ff 08 f4 a7 83 90  c8 e5 fe 09 14 20 04 3a   `............ .:
16590   44 a0 23 90 0c 20 81 90  b8 e5 fe 09 0c 20 04 3d   D.#.. ....... .=
165a0   01 00 80 8c 00 00 00 0a  01 00 28 8c 4f 04 20 8c   ..........(.O. .
165b0   05 16 80 5c 04 16 88 5c  18 4a 00 09 10 60 2b 90   ...\...\.J...`+.
165c0   0c 60 23 90 04 41 21 59  81 09 79 59 10 a0 23 90   .`#..A!Y..yY..#.
165d0   00 28 01 5a 54 01 00 15  05 e0 2b 8c 02 00 20 8c   .(.ZT.....+... .
165e0   05 16 80 5c 04 16 88 5c  48 f3 fe 09 10 a0 83 92   ...\...\H.......
165f0   0c 20 04 35 00 00 80 8c  78 2a ff 09 01 00 20 8c   . .5....x*.... .
16600   00 30 20 8a 22 06 06 10  04 16 28 5c 10 a0 23 90   .0 ."....(\..#.
16610   14 20 21 90 0d 20 29 82  24 00 38 8c 10 a0 33 90   . !.. ).$.8...3.
16620   10 a0 29 90 01 60 21 8c  10 a0 21 92 00 50 39 82   ..)..`!...!..P9.
16630   01 e0 3b 8c 10 a0 33 90  10 a0 29 90 01 60 21 8c   ..;...3...)..`!.
16640   10 a0 21 92 00 50 39 82  00 00 38 8c 10 a0 33 90   ..!..P9...8...3.
16650   10 a0 29 90 01 60 21 8c  10 a0 21 92 00 50 39 82   ..)..`!...!..P9.
16660   00 30 38 80 22 06 06 10  10 a0 33 90 10 a0 29 90   .08.".....3...).
16670   01 60 21 8c 10 a0 21 92  00 50 39 82 00 30 38 80   .`!...!..P9..08.
16680   23 06 06 10 10 a0 33 90  10 a0 29 90 01 60 21 8c   #.....3...)..`!.
16690   10 a0 21 92 00 50 39 82  00 30 20 88 22 06 06 10   ..!..P9..0 ."...
166a0   01 20 21 8c 00 30 20 8a  22 06 06 10 67 00 38 8c   . !..0 ."...g.8.
166b0   10 a0 33 90 10 a0 29 90  01 60 21 8c 10 a0 21 92   ..3...)..`!...!.
166c0   00 50 39 82 10 a0 33 90  10 a0 29 90 01 60 21 8c   .P9...3...)..`!.
166d0   10 a0 21 92 00 50 79 82  0c 60 23 90 01 20 29 8c   ..!..Py..`#.. ).
166e0   10 a0 23 90 10 20 21 90  05 16 80 5c 04 16 88 5c   ..#.. !....\...\
166f0   0f 16 90 5c 5c cf fe 09  10 a0 2b 90 10 60 21 90   ...\\.....+..`!.
16700   04 c0 23 59 10 60 21 92  00 30 28 8c 30 06 06 10   ..#Y.`!..0(.0...
16710   00 30 20 8c 10 80 01 00  05 16 80 5c 04 16 88 5c   .0 ........\...\
16720   a0 9d 01 0b f4 00 00 08  00 00 28 8c 10 a0 23 90   ..........(...#.
16730   10 20 21 90 00 10 29 82  00 30 30 8c 30 06 06 10   . !...)..00.0...
16740   00 30 28 8c 14 80 01 00  10 a0 23 90 0c 20 21 90   .0(.......#.. !.
```

```
Mar 27 18:20 1996  image.txt Page 108

16750   0a 20 21 8c 06 16 80 5c  05 16 88 5c 04 16 90 5c   . !....\...\...\
16760   e0 95 01 09 06 16 80 5c  4d 9b 01 09 10 60 2b 90   .......\M....`+.
16770   0c 60 23 90 04 41 21 59  81 09 39 59 10 a0 33 90   .`#..A!Y..9Y..3.
16780   10 a0 29 90 01 60 21 8c  10 a0 21 92 00 50 39 82   ..)..`!...!..P9.
16790   0c 60 23 90 01 20 39 8c  10 a0 23 90 10 20 31 90   .`#.. 9...#.. 1.
167a0   10 60 2b 90 0c 60 23 90  04 41 21 59 81 09 21 59   .`+..`#..A!Y..!Y
167b0   07 16 80 5c 06 16 88 5c  04 16 90 5c 94 ce fe 09   ...\...\...\....
167c0   10 60 2b 90 0c 60 23 90  04 41 21 59 81 09 31 59   .`+..`#..A!Y..1Y
167d0   10 a0 23 90 0c 20 29 90  01 60 21 80 84 80 21 59   ..#.. )..`!...!Y
167e0   01 60 21 82 10 a0 23 90  0c 20 29 90 01 60 21 80   .`!...#.. )..`!.
167f0   02 20 21 8c 01 60 21 82  10 60 2b 90 0c 60 23 90   . !..`!..`+..`#.
16800   04 41 21 59 81 09 31 59  10 a0 2b 90 10 60 21 90   .A!Y..1Y..+..`!.
16810   04 80 21 59 10 60 21 92  f4 a7 2b 90 10 a0 23 90   ..!Y.`!...+...#.
16820   05 16 80 5c 04 16 88 5c  38 dd fe 09 00 30 20 8c   ...\...\8....0 .
16830   40 9c 00 00 0e 16 80 5c  04 16 88 5c a4 1e 00 09   @......\...\....
16840   0c 60 23 90 10 60 23 92  09 00 30 8c 10 60 2b 90   .`#..`#...0..`+.
16850   01 60 21 8c 10 60 23 92  00 50 31 82 0a 00 30 8c   .`!..`#..P1...0.
16860   10 60 2b 90 01 60 21 8c  10 60 23 92 00 50 31 82   .`+..`!..`#..P1.
16870   44 a0 83 90 0d 16 88 5c  98 e2 fe 09 11 00 20 8c   D......\...... .
16880   50 a0 23 c2 00 00 80 8c  00 00 00 0a 00 00 00 00   P.#.............
16890   10 16 68 5c 11 16 70 5c  11 16 80 5c 94 13 00 09   ..h\..p\...\....
168a0   3e a0 23 80 10 20 01 32  0d 16 80 5c 0e 16 88 5c   >.#.. .2...\...\
168b0   30 e9 ff 08 54 a0 23 90  14 20 01 32 54 a0 83 90   0...T.#.. .2T...
168c0   b0 d3 fe 09 00 00 20 8c  54 a0 23 92 0c a0 23 90   ...... .T.#...#.
168d0   48 20 01 32 0c 60 03 32  0d 16 80 5c c4 c6 fe 09   H .2.`.2...\....
168e0   0e 16 80 5c 1c 10 00 09  0c 20 04 3a 01 00 80 8c   ...\..... .:....
168f0   00 00 00 0a 00 30 20 8c  40 9c 00 00 0e 16 80 5c   .....0 .@......\
16900   04 16 88 5c dc 1d 00 09  00 00 20 8c 3d a0 23 82   ...\...... .=.#.
16910   04 16 80 5c 00 00 00 0a  3d a0 23 80 30 20 79 39   ...\....=.#.0 y9
16920   0c 60 03 32 0d 16 80 5c  78 c6 fe 09 00 30 80 8c   .`.2...\x....0..
16930   d0 7f 01 00 4c 52 00 09  02 00 20 8c 3e a0 23 82   ....LR.... .>.#.
16940   00 00 80 8c 0e 16 88 5c  98 e8 ff 08 44 a0 23 90   .......\....D.#.
16950   0c 20 81 90 fc e1 fe 09  0c 20 04 3d 01 00 80 8c   . ....... .=....
16960   00 00 00 0a 23 00 28 8c  02 00 20 8c 05 16 80 5c   ....#.(... ....\
16970   04 16 88 5c bc ef fe 09  10 16 78 5c 0c 20 04 35   ...\......x\. .5
16980   00 00 80 8c ec 26 ff 09  02 00 28 8c 0c e0 23 90   .....&....(...#.
16990   00 10 29 82 00 30 30 8c  80 7f 01 00 0c e0 23 90   ..)..00.......#.
169a0   01 20 29 8c 19 00 20 8c  06 16 80 5c 05 16 88 5c   . )... ....\...\
169b0   04 16 90 5c 9c cc fe 09  0c e0 23 90 1a 20 21 8c   ...\......#.. !.
169c0   10 e0 23 92 44 a0 83 90  0f 16 88 5c 44 e1 fe 09   ..#.D......\D...
```

```
Mar 27 16:20 1996  image.txt Page 139

169d0   12 00 20 8c 50 a0 23 c2  3d a0 23 80 01 20 21 8c   .. .P.#.=.#.. !.
169e0   3d a0 23 82 14 60 03 32  0c 60 23 90 0c 20 01 32   =.#..`.2.`#.. .2
169f0   0d 16 80 5c ac c5 fe 09  00 00 80 8c 00 00 00 0a   ...\............
16a00   10 16 38 5c 11 16 18 5c  3e 60 24 80 10 20 01 32   ..8\...\>`$.. .2
16a10   07 16 80 5c 03 16 88 5c  c8 e7 ff 08 00 30 28 8c   ...\...\.....0(.
16a20   80 7c 01 00 a0 01 20 8c  05 16 80 5c 03 16 88 5c   .|.... ....\...\
16a30   04 16 90 5c 2c d2 fe 09  54 e0 80 92 14 e0 01 32   ...\,...T......2
16a40   0c e0 21 90 0c 20 01 32  07 16 80 5c 54 c5 fe 09   ..!.. .2...\T...
16a50   00 00 80 8c 00 00 00 0a  00 00 00 00 00 00 00 00   ................
16a60   10 16 38 5c 11 16 18 5c  11 16 80 5c c4 11 00 09   ..8\...\...\....
16a70   3e e0 20 80 10 20 01 32  07 16 80 5c 03 16 88 5c   >. .. .2...\...\
16a80   60 e7 ff 08 44 e0 20 90  0c 20 81 90 c4 e0 fe 09   `...D. .. ......
16a90   0c 20 04 3d 01 00 80 8c  00 00 00 0a 0c e0 20 90   . .=.......... .
16aa0   18 20 01 32 0c e0 20 90  0c 20 21 90 0c 20 01 32   . .2.. .. !.. .2
16ab0   0c e0 80 90 ec c4 fe 09  18 e0 80 90 44 f3 fe 09   ............D...
16ac0   0c e0 80 92 58 20 04 32  00 30 20 8c 40 9c 00 00   ....X .2.0 .@...
16ad0   03 16 80 5c 04 16 88 5c  08 1c 00 09 0c e0 20 90   ...\...\...... .
16ae0   0c 20 21 90 05 20 21 80  82 0d 21 59 84 d0 23 58   . !.. !...!Y..#X
16af0   28 e0 20 92 44 e0 28 90  0c e0 20 90 05 16 80 5c   (. .D.(... ....\
16b00   04 16 88 5c 0c e0 fe 09  00 00 20 8c 0c e0 20 92   ...\...... ... .
16b10   14 00 20 8c 50 e0 20 c2  0c 00 00 08 00 00 80 8c   .. .P. .........
16b20   50 25 ff 09 14 e0 01 32  0c e0 21 90 0c 20 01 32   P%.....2..!.. .2
16b30   07 16 80 5c 6c c4 fe 09  00 00 80 8c 00 00 00 0a   ...\l...........
16b40   10 16 78 5c 11 16 38 5c  11 16 80 5c e4 10 00 09   ..x\..8\...\....
16b50   3e e0 21 80 10 20 01 32  0f 16 80 5c 07 16 88 5c   >.!.. .2...\...\
16b60   80 e6 ff 08 44 e0 21 90  0c 20 81 90 e4 df fe 09   ....D.!.. ......
16b70   0c 20 04 3d 01 00 80 8c  00 00 00 0a 00 30 20 8c   . .=.........0 .
16b80   40 9c 00 00 07 16 80 5c  04 16 88 5c 54 1b 00 09   @......\...\T...
16b90   0c e0 23 90 10 e0 23 92  09 00 30 8c 10 e0 2b 90   ..#...#...0...+.
16ba0   01 60 21 8c 10 e0 23 92  00 50 31 82 0a 00 30 8c   .`!...#..P1...0.
16bb0   10 e0 2b 90 01 60 21 8c  10 e0 23 92 00 50 31 82   ..+..`!...#..P1.
16bc0   44 e0 81 90 0f 16 88 5c  48 df fe 09 15 00 20 8c   D......\H..... .
16bd0   50 e0 21 c2 00 00 80 8c  00 00 00 0a 00 00 00 00   P.!.............
16be0   10 16 78 5c 11 16 38 5c  11 16 80 5c 44 10 00 09   ..x\..8\...\D...
16bf0   3e e0 21 80 10 20 01 32  0f 16 80 5c 07 16 88 5c   >.!.. .2...\...\
16c00   e0 e5 ff 08 44 e0 21 90  0c 20 81 90 44 df fe 09   ....D.!.. ..D...
16c10   0c 20 04 3d 01 00 80 8c  00 00 00 0a 00 30 20 8c   . .=.........0 .
16c20   10 27 00 00 07 16 80 5c  04 16 88 5c b4 1a 00 09   .'.....\...\....
16c30   0c e0 23 90 10 e0 23 92  07 00 30 8c 10 e0 2b 90   ..#...#...0...+.
16c40   01 60 21 8c 10 e0 23 92  00 50 31 82 28 e0 31 90   .`!...#..P1.(.1.
```

Mar 27 16:20 1996 image.txt Page 140

```
16c50  10 e0 2b 90 01 60 21 8c  10 e0 23 92 00 50 31 82  ..+..'!...#..P1.
16c60  44 e0 81 90 0f 16 88 5c  a8 de fe 09 16 00 20 8c  D......\....... .
16c70  50 e0 21 c2 00 30 20 90  10 08 06 10 24 20 09 3d  P.!..0 .....$ .=
16c80  02 00 30 8c 50 04 28 8c  00 30 20 8c 30 06 06 10  ..0.P.(..0 .0...
16c90  06 16 80 5c 05 16 88 5c  04 16 90 5c 34 43 00 09  ...\...\...\4C..
16ca0  01 00 20 8c 00 30 20 82  06 00 00 40 00 30 30 8c  .. ..0 ....@.00.
16cb0  30 06 06 10 00 00 28 8c  19 00 20 8c 06 16 80 5c  0.....(... ....\
16cc0  05 16 88 5c 04 16 90 5c  50 a8 fe 06 05 16 80 5c  ...\...\P......\
16cd0  00 00 00 0a 00 00 00 00  00 00 00 00 00 00 00 00  ................
16ce0  10 16 78 5c 11 16 38 5c  11 16 80 5c 44 0f 00 09  ..x\..8\...\D...
16cf0  3e e0 21 80 10 20 01 32  0f 16 80 5c 07 16 88 5c  >.!.. .2...\...\
16d00  e0 e4 ff 08 44 e0 21 90  0c 20 81 90 44 de fe 09  ....D.!.. ..D...
16d10  0c 20 04 3d 01 00 80 8c  00 00 00 0a 00 30 20 8c  . .=.........0 .
16d20  40 9c 00 00 07 16 80 5c  04 16 88 5c b4 19 00 09  @......\...\....
16d30  0c e0 23 90 10 e0 23 92  03 00 30 8c 10 e0 2b 90  ..#...#...0...+.
16d40  01 60 21 8c 10 e0 23 92  00 50 31 82 44 e0 81 90  .'!...#..P1.D...
16d50  0f 16 88 5c bc dd fe 09  00 00 80 8c 00 00 00 0a  ...\............
16d60  10 16 78 5c 11 16 38 5c  11 16 80 5c c4 0e 00 09  ..x\..8\...\....
16d70  00 00 20 8c 00 30 20 92  24 06 06 10 3e e0 21 80  .. ..0 .$...>.!.
16d80  10 20 01 32 0f 16 80 5c  07 16 88 5c 54 e4 ff 08  . .2...\...\T...
16d90  44 e0 21 90 0c 20 81 90  b8 dd fe 09 0c 20 04 3d  D.!.. ........ .=
16da0  01 00 80 8c 00 00 00 0a  e4 e7 21 90 00 10 21 c0  ...........!...!.
16db0  68 20 11 3d 00 30 20 8c  40 9c 00 00 07 16 80 5c  h .=.0 .@......\
16dc0  04 16 88 5c 1c 19 00 09  0c e0 23 90 10 e0 23 92  ...\......#...#.
16dd0  09 00 30 8c 10 e0 2b 90  01 60 21 8c 10 e0 23 92  ..0...+..'!...#.
16de0  00 50 31 82 0a 00 30 8c  10 e0 2b 90 01 60 21 8c  .P1...0...+..'!.
16df0  10 e0 23 92 00 50 31 82  44 e0 81 90 0f 16 88 5c  ..#..P1.D......\
16e00  10 dd fe 09 17 00 20 8c  50 e0 21 c2 01 00 20 8c  ...... .P.!... .
16e10  2c e0 21 c2 d4 00 00 08  3d e0 21 80 24 20 51 39  ,.!.....=.!.$ Q9
16e20  00 30 80 8c d0 7f 01 00  58 4d 00 09 02 00 20 8c  .0......XM.... .
16e30  3e e0 21 82 0f 16 80 5c  07 16 88 5c a4 e3 ff 08  >.!....\...\....
16e40  14 e0 03 32 0c e0 23 90  0c 20 01 32 0f 16 80 5c  ...2..#.. .2...\
16e50  50 c1 fe 09 0c e0 21 90  18 20 01 32 0c e0 21 90  P.....!.. .2..!.
16e60  0c 20 21 90 0c 20 01 32  0c e0 81 90 34 c1 fe 09  . !.. .2....4...
16e70  18 e0 81 90 8c ef fe 09  0c e0 81 92 64 20 04 32  ............d .2
16e80  00 30 20 8c 40 9c 00 00  07 16 80 5c 04 16 88 5c  .0 .@......\...\
16e90  50 18 00 09 0c e0 21 90  0c 20 21 90 05 20 21 80  P.....!.. !.. !.
16ea0  82 0d 21 59 84 d0 23 58  28 e0 21 92 44 e0 29 90  ..!Y..#X(.!.D.).
16eb0  0c e0 21 90 05 16 80 5c  04 16 88 5c 54 dc fe 09  ..!....\...\T...
16ec0  00 00 20 8c 0c e0 21 92  14 00 20 8c 50 e0 21 c2  .. ...!... .P.!.
```

```
Mar 27 18:20 1996  image.txt Page 141

16ed0   3a e0 21 80 01 20 21 8c  3d e0 21 82 0c 00 00 08   =.!.. !.=.!.....
16ee0   00 00 80 8c 8c 21 11 09  00 00 80 8c 00 00 00 0a   .....!..........
16ef0   10 16 38 5c 11 16 18 5c  11 16 80 5c 34 0d 00 09   ..8\...\...\4...
16f00   00 00 20 8c 00 30 20 92  24 06 06 10 3e e0 20 80   .. ..0 .$...>. .
16f10   10 20 01 32 07 16 80 5c  03 16 88 5c c4 e2 ff 08   . .2...\...\....
16f20   28 e0 20 90 00 28 01 5a  d4 00 00 12 44 e0 20 90   (. ..(.Z....D. .
16f30   0c 20 81 90 1c dc fe 09  0c 20 04 3a 01 00 80 8c   . ....... .=....
16f40   00 00 00 0a 28 e0 80 90  18 1c 00 09 28 e0 80 92   ....(.......(...
16f50   0c e0 20 90 18 20 01 32  0c e0 20 90 0c 20 21 90   .. .. .2.. .. !.
16f60   0c 20 01 32 0c e0 80 90  38 c0 fe 09 c3 00 30 8c   . .2....8.....0.
16f70   18 e0 20 90 0c 20 29 90  05 60 21 80 84 80 21 58   .. .. )..`!...!X
16f80   05 60 21 82 28 e0 20 90  02 0e 31 59 18 e0 20 90   .`!.(. ...1Y.. .
16f90   0c 20 29 90 05 60 21 80  84 83 21 58 05 60 21 82   . )..`!...!X.`!.
16fa0   18 e0 80 90 5c ee fe 09  0c e0 80 92 00 30 20 8c   ....\.........0 .
16fb0   40 9c 00 00 03 16 80 5c  04 16 88 5c 24 17 00 09   @......\...\$...
16fc0   44 e0 28 90 0c e0 20 90  05 16 80 5c 04 16 88 5c   D.(... ....\...\
16fd0   40 db fe 09 00 00 20 8c  0c e0 20 92 14 00 20 8c   @..... ... .... .
16fe0   50 e0 20 c2 2c e0 01 32  0c e0 21 90 24 20 01 32   P. .,..2..!.$ .2
16ff0   07 16 80 5c ac bf fe 09  18 00 00 08 02 00 20 8c   ...\........... .
17000   3e e0 20 82 07 16 80 5c  03 16 88 5c d4 e1 ff 08   >. ....\...\....
17010   00 00 80 8c 00 00 00 0a  00 00 00 00 00 00 00 00   ................
17020   10 16 38 5c 11 16 18 5c  11 16 80 5c 04 0c 00 09   ..8\...\...\....
17030   0c e0 01 32 07 16 80 5c  68 bf fe 09 3e e0 20 80   ...2...\h...>. .
17040   10 20 01 32 07 16 80 5c  03 16 88 5c 94 e1 ff 08   . .2...\...\....
17050   e4 e7 20 90 00 10 21 c0  18 20 11 3a 00 30 80 8c   .. ...!.. .:.0..
17060   d0 7f 01 00 1c 4b 00 09  00 00 80 8c 00 00 00 0a   .....K..........
17070   44 e0 20 90 0c 20 81 90  d8 da fe 09 80 28 04 5a   D. .. ........(.Z
17080   c4 00 00 12 00 00 20 8c  3d e0 20 82 30 e0 20 92   ...... .=. .0. .
17090   3c e0 20 82 e4 e7 20 90  14 20 29 90 0c 60 21 90   <. ... .. )..`!.
170a0   04 20 21 8c 0c 60 21 92  08 00 28 8c e4 e7 20 90   . !..`!...(... .
170b0   14 20 21 90 0c 20 21 90  00 10 29 82 00 30 20 8c   . !.. !...)..0 .
170c0   20 4e 00 00 03 16 80 5c  04 16 88 5c 14 16 00 09    N.....\...\....
170d0   28 e0 28 90 e4 e7 20 90  14 20 21 90 0c 20 21 90   (.(... .. !.. !.
170e0   01 20 29 82 44 e0 28 90  e4 e7 20 90 14 20 21 90   . ).D.(... .. !.
170f0   05 16 80 5c 04 16 88 5c  18 da fe 09 18 00 20 8c   ...\...\....... .
17100   50 e0 20 c2 00 00 28 8c  e4 e7 20 90 00 10 29 c2   P. ...(... ...).
17110   e4 e7 20 90 18 20 21 90  e4 e7 20 92 02 00 30 8c   .. .. !... ...0.
17120   51 04 28 8c 00 30 20 90  10 08 06 10 06 16 80 5c   Q.(..0 ........\
17130   05 16 88 5c 04 16 90 5c  98 3e 00 09 00 00 80 8c   ...\...\.>......
17140   00 00 00 0a 01 00 80 8c  00 00 00 0a 00 00 00 00   ................
```

```
Mar 27 16:20 1996  image.txt Page 142

17150   10 16 38 5c 11 16 18 5c  11 16 80 5c d4 0a 00 09   ..8\...\...\....
17160   3e e0 20 80 10 20 01 32  07 16 80 5c 03 16 88 5c   >. .. .2...\...\
17170   70 e0 ff 08 14 e0 01 32  0c e0 21 90 0c 20 01 32   p......2..!.. .2
17180   07 16 80 5c 1c be fe 09  2c e0 20 c0 0c 20 09 3d   ...\....,. .. .=
17190   00 00 20 8c 2c e0 20 c2  e4 e7 20 90 00 10 21 c0   .. .,. ... ...!.
171a0   82 28 01 5a cc 00 00 15  2c e0 20 c0 80 28 01 5a   .(.Z....,. ..(.Z
171b0   c0 00 00 15 44 e0 20 90  0c 20 81 90 94 d9 fe 09   ....D. .. ......
171c0   80 28 04 5a a4 00 00 12  e4 e7 20 90 14 20 29 90   .(.Z...... .. ).
171d0   0c 60 21 90 04 20 21 8c  0c 60 21 92 08 00 28 8c   .`!.. !..`!...(.
171e0   e4 e7 20 90 14 20 21 90  0c 20 21 90 00 10 29 82   .. .. !.. !...).
171f0   00 30 20 8c 20 4e 00 00  03 16 80 5c 04 16 88 5c   .0 . N.....\...\
17200   e0 14 00 09 44 e0 28 90  e4 e7 20 90 14 20 21 90   ....D.(... .. !.
17210   05 16 80 5c 04 16 88 5c  f8 d8 fe 09 00 00 28 8c   ...\...\......(.
17220   e4 e7 20 90 14 20 29 92  18 00 20 8c 50 e0 20 c2   .. .. )....P. .
17230   e4 e7 20 90 00 10 29 c2  e4 e7 20 90 02 20 21 80   .. ...)... .. !.
17240   10 20 01 32 02 00 20 8c  2c e0 20 c2 24 00 00 08   . .2.. .,. .$...
17250   01 00 20 8c 2c e0 20 c2  e4 e7 20 90 18 20 21 90   .. .,. ... .. !.
17260   e4 e7 20 92 0c 00 00 08  01 00 80 8c 00 00 00 0a   .. .............
17270   00 00 80 8c 00 00 00 0a  00 00 00 00 00 00 00 00   ................
17280   10 16 78 5c 11 16 38 5c  11 16 80 5c a4 09 00 09   ..x\..8\...\....
17290   3e e0 21 80 10 20 01 32  0f 16 80 5c 07 16 88 5c   >.!.. .2...\...\
172a0   40 df ff 08 00 30 20 90  50 06 06 10 18 20 01 35   @....0 .P.... .5
172b0   02 00 20 8c 3e e0 21 82  0f 16 80 5c 07 16 88 5c   .. .>.!....\...\
172c0   20 df ff 08 44 e0 21 90  0c 20 81 90 84 d8 fe 09    ...D.!.. ......
172d0   0c 20 04 3d 01 00 80 8c  00 00 00 0a 00 30 20 8c   . .=.........0 .
172e0   40 9c 00 00 07 16 80 5c  04 16 88 5c f4 13 00 09   @......\...\....
172f0   0c e0 23 90 10 e0 23 92  09 00 30 8c 10 e0 2b 90   ..#...#...0...+.
17300   01 60 21 8c 10 e0 23 92  00 50 31 82 0a 00 30 8c   .`!...#..P1...0.
17310   10 e0 2b 90 01 60 21 8c  10 e0 23 92 00 50 31 82   ..+..`!...#..P1.
17320   44 e0 81 90 0f 16 88 5c  e8 d7 fe 09 19 00 20 8c   D......\....... .
17330   50 e0 21 c2 00 00 80 8c  00 00 00 0a 00 00 00 00   P.!.............
17340   10 16 78 5c 11 16 18 5c  11 16 80 5c e4 08 00 09   ..x\...\...\....
17350   3e e0 20 80 10 20 01 32  0f 16 80 5c 03 16 88 5c   >. .. .2...\...\
17360   80 de ff 08 00 30 20 90  50 06 06 10 84 20 01 32   .....0 .P.... .2
17370   44 e0 20 90 0c 20 81 90  d8 d7 fe 09 6c 20 04 3a   D. .. ......l .:
17380   00 30 20 8c 40 9c 00 00  03 16 80 5c 04 16 88 5c   .0 .@......\...\
17390   50 13 00 09 20 e0 80 90  68 ea fe 09 44 e0 28 90   P... ...h...D.(.
173a0   10 16 20 5c 05 16 80 5c  04 16 88 5c 64 d7 fe 09   .. \...\...\d...
173b0   1a 00 20 8c 50 e0 20 c2  02 00 38 8c 52 04 30 8c   .. .P. ...8.R.0.
173c0   00 30 28 90 10 08 06 10  01 60 21 8c 00 30 20 92   .0(.......`!..0 .
```

Mar 27 18:20 1996 image.txt Page 143

```
173d0  10 08 06 10 07 16 80 5c  06 16 88 5c 05 16 90 5c  .......\...\...\
173e0  f0 3b 00 09 0c 00 00 08  01 00 80 8c 00 00 00 0a  .;..............
173f0  0c e0 03 32 0f 16 80 5c  a8 bb fe 09 00 00 80 8c  ...2...\........
17400  00 00 00 0a 00 00 00 00  00 00 00 00 00 00 00 00  ................
17410  10 16 78 5c 11 16 38 5c  11 16 80 5c 14 08 00 09  ..x\..8\...\....
17420  3e e0 21 80 10 20 01 32  0f 16 80 5c 07 16 88 5c  >.!.. .2...\...\
17430  b0 da ff 08 44 e0 21 90  0c 20 81 90 14 d7 fe 09  ....D.!., ......
17440  0c 20 04 3a 01 00 80 8c  00 00 00 0a 00 30 20 8c  .  .=.........0 .
17450  40 9c 00 00 07 16 80 5c  04 16 88 5c 84 12 00 09  @......\...\....
17460  0c e0 23 90 10 e0 23 92  03 00 30 8c 10 e0 2b 90  ..#...#...0...+.
17470  01 60 21 8c 10 e0 23 92  00 50 31 82 44 e0 81 90  .`!...#..P1.D...
17480  0f 16 88 5c 8c d6 fe 09  1b 00 20 8c 50 e0 21 c2  ...\...... .P.!.
17490  00 00 80 8c 00 00 00 0a  00 00 00 00 00 00 00 00  ................
174a0  10 16 78 5c 11 16 18 5c  11 16 80 5c 84 07 00 09  ..x\...\...\....
174b0  44 e0 20 90 0c 20 81 90  98 d6 fe 09 0c 20 04 3d  D. .. ........ .=
174c0  01 00 80 8c 00 00 00 0a  0c e0 03 32 0f 16 80 5c  ...........2...\
174d0  d0 ba fe 09 0f 00 28 8c  02 00 20 8c 05 16 80 5c  ......(... ....\
174e0  04 16 88 5c 4c e4 fe 09  0c e0 80 92 0c 20 04 35  ...\L........ .5
174f0  00 00 80 8c 7c 1b ff 09  00 30 20 8c 40 9c 00 00  ....!....0 .@...
17500  03 16 80 5c 04 16 88 5c  d8 11 00 09 02 00 38 8c  ...\...\......8.
17510  0c e0 30 90 10 a0 29 90  01 60 21 8c 10 a0 21 92  ..0...)..`!...!.
17520  00 50 39 82 00 30 30 8c  c0 7f 01 00 0c e0 20 90  .P9..00....... .
17530  10 20 29 90 05 00 20 8c  06 16 80 5c 05 16 88 5c  . )... ....\...\
17540  04 16 90 5c 0c c1 fe 09  0c e0 28 90 10 60 21 90  ...\......(..`!.
17550  05 20 21 8c 10 60 21 92  44 e0 28 90 0c e0 20 90  . !..`!.D.(... .
17560  05 16 80 5c 04 16 88 5c  a8 d5 fe 09 00 00 20 8c  ...\...\...... .
17570  0c e0 20 92 1d 00 20 8c  50 e0 20 c2 00 00 80 8c  .. ... .P. .....
17580  00 00 00 0a 00 00 00 00  00 00 00 00 00 00 00 00  ................
17590  10 16 38 5c 11 16 18 5c  11 16 80 5c 94 06 00 09  ..8\...\...\....
175a0  3e e0 20 80 10 20 01 32  07 16 80 5c 03 16 88 5c  >. .. .2...\...\
175b0  30 dc ff 08 02 00 20 8c  3e e0 20 82 07 16 80 5c  0..... .>. ....\
175c0  03 16 88 5c 1c dc ff 08  00 00 00 00 00 00 00 00  ...\............
175d0  10 16 60 5c 11 16 68 5c  11 16 80 5c 54 06 00 09  ..`\..h\...\T...
175e0  00 00 20 8c 00 30 20 92  24 06 06 10 3e 60 23 80  .. ..0 .$...>`#.
175f0  10 20 01 32 0c 16 80 5c  0d 16 88 5c e4 db ff 08  . .2...\...\....
17600  f4 67 83 90 4c d5 fe 09  14 20 04 3a 44 60 23 90  .g..L.... .;D`#.
17610  0c 20 81 90 3c d5 fe 09  0c 20 04 3d 01 00 80 8c  . ..<.... .=....
17620  00 00 00 0a 02 00 30 8c  53 04 28 8c 00 30 20 90  ......0.S.(..0 .
17630  10 08 06 10 81 09 21 59  06 16 80 5c 05 16 88 5c  ......!Y...\...\
17640  04 16 90 5c 8c 39 00 09  00 00 20 8c 00 30 20 92  ...\.9.... ..0 .
```

Mar 27 18:20 1996 image.txt Page 144

```
17650   6c 06 06 10 00 30 20 92  50 06 06 10 20 60 23 90   l....0 .P... `#.
17660   20 20 01 32 20 60 23 90  0c 20 21 90 14 20 01 32    .2 `#.. !.. .2
17670   20 60 83 90 2c b9 fe 09  00 00 20 8c 20 60 23 92    `..,..... . `#.
17680   e4 67 23 90 18 20 21 90  e4 67 23 92 10 20 2b 90   .g#.. !..g#.. +.
17690   0c 20 23 90 04 41 21 59  81 09 31 59 0c 20 23 90   . #..A!Y..1Y. #.
176a0   03 20 29 80 fe 00 20 8c  85 00 29 58 ff 00 20 8c   . )... ...)X.. .
176b0   85 00 71 58 0a a0 29 8c  02 00 20 8c 05 16 80 5c   ..qX..)... ....\
176c0   04 16 88 5c 6c e2 fe 09  10 60 83 92 0c 20 04 35   ...\l....`... .5
176d0   00 00 80 8c 9c 19 ff 09  01 00 28 8c 10 60 23 90   ..........(..`#.
176e0   14 20 21 90 0d 20 29 62  24 00 38 8c 10 60 33 90   . !.. ).$.8..`3.
176f0   10 a0 29 90 01 60 21 8c  10 a0 21 92 00 50 39 82   ..)..`!...!..P9.
17700   10 20 2b 90 0c 20 23 90  04 41 21 59 81 09 39 59   . +.. #..A!Y..9Y
17710   10 60 33 90 10 a0 29 90  01 60 21 8c 10 a0 21 92   .`3...)..`!...!.
17720   00 50 39 82 00 00 38 8c  10 60 33 90 10 a0 29 90   .P9...8..`3...).
17730   01 60 21 8c 10 a0 21 92  00 50 39 82 00 30 38 80   .`!...!..P9..08.
17740   22 06 06 10 10 60 33 90  10 a0 29 90 01 60 21 8c   "....`3...)..`!.
17750   10 a0 21 92 00 50 39 82  00 30 38 80 23 06 06 10   ..!..P9..08.#...
17760   10 60 33 90 10 a0 29 90  01 60 21 8c 10 a0 21 92   .`3...)..`!...!.
17770   00 50 39 82 00 30 20 88  22 06 06 10 01 20 21 8c   .P9..0 ."..... !.
17780   00 30 20 8a 22 06 06 10  66 00 38 8c 10 60 33 90   .0 ."...f.8..`3.
17790   10 a0 29 90 01 60 21 8c  10 a0 21 92 00 50 39 82   ..)..`!...!..P9.
177a0   0c 20 23 90 01 20 39 8c  10 60 23 90 10 20 31 90   . #.. 9..`#.. 1.
177b0   10 20 2b 90 0c 20 23 90  04 41 21 59 81 09 21 59   . +.. #..A!Y..!Y
177c0   07 16 80 5c 06 16 88 5c  04 16 90 5c 84 be fe 09   ...\...\...\....
177d0   10 20 2b 90 0c 20 23 90  04 41 21 59 81 09 31 59   . +.. #..A!Y..1Y
177e0   10 60 2b 90 10 60 21 90  04 80 21 59 10 60 21 92   .`+..`!...!Y.`!.
177f0   f4 67 2b 90 10 60 23 90  05 16 80 5c 04 16 88 5c   .g+..`#....\...\
17800   60 cd fe 09 00 00 20 8c  10 60 23 92 30 60 7b 90   `..... ..`#.0`(.
17810   2e 00 20 8c 54 c0 23 35  00 30 20 8c 40 9c 00 00   .. .T.#5.0 .@...
17820   0d 16 80 5c 04 16 88 5c  b8 0e 00 09 0c 20 23 90   ...\...\..... #.
17830   10 20 23 92 09 00 30 8c  10 20 2b 90 01 60 21 8c   . #...0.. +..`!.
17840   10 20 23 92 00 50 31 82  0a 00 30 8c 10 20 2b 90   . #..P1...0.. +.
17850   01 60 21 8c 10 20 23 92  00 50 31 82 1c 00 20 8c   .`!.. #..P1... .
17860   50 60 23 c2 88 00 00 08  4e 00 20 8c 44 c0 23 35   P`#.....N. .D.#5
17870   cc 00 20 8c 0c 00 71 3a  4c 00 20 8c 18 00 71 3d   .. ...q:L. ...q=
17880   0c 16 80 5c 0d 16 88 5c  d8 f1 ff 09 00 00 80 8c   ...\...\........
17890   00 00 00 0a 8c 00 20 8c  54 00 71 3d 0c 16 80 5c   ...... .T.q=...\
178a0   0d 16 88 5c bc f4 ff 09  00 00 80 8c 00 00 00 0a   ...\............
178b0   8e 00 20 8c 30 c0 23 35  14 20 03 32 0c 20 23 90   .. .0.#5. .2. #.
178c0   0c 20 01 32 0c 16 80 5c  d8 b6 fe 09 18 60 83 90   . .2...\.....`..
```

Mar 27 18:20 1996 image.txt Page 145

```
178d0  30 e5 fe 09 10 16 60 5c  14 00 20 8c 50 60 23 c2  0.....`\.. .P`#.
178e0  0c 00 00 08 00 00 80 8c  88 17 ff 09 44 60 83 90  ............D`..
178f0  0c 16 88 5c 1c d2 fe 09  00 00 80 8c 00 00 00 0a  ...\............
17900  10 16 70 5c 54 20 24 90  14 20 01 32 54 a0 83 90  ..p\T $.. .2T...
17910  60 c3 fe 09 00 00 20 8c  54 a0 23 92 44 a0 23 90  `..... .T.#.D.#.
17920  0c 20 81 90 2c d2 fe 09  0c 20 04 3d 01 00 80 8c  . ..,.... .=....
17930  00 00 00 0a 0c a0 2b 90  0c 60 21 90 06 20 21 8c  ......+..`!.. !.
17940  0c 60 21 92 0c a0 23 90  0c 20 21 90 00 10 29 80  .`!...#.. !...).
17950  05 16 78 5c 0c a0 23 90  0c 20 21 90 04 40 21 59  ..x\..#.. !..@!Y
17960  01 20 29 8c 0c a0 23 90  10 20 29 92 0c a0 23 90  . )...#.. )...#.
17970  0c 20 21 90 03 20 29 80  fe 00 20 8c 85 00 29 58  . !.. )... ...)X
17980  42 00 20 8c 85 20 01 5a  00 01 00 15 0a e0 2b 8c  B. .. .Z......+.
17990  02 00 20 8c 05 16 80 5c  04 16 88 5c 94 df fe 09  .. ....\...\....
179a0  10 16 38 5c 0c 20 04 35  00 00 80 8c c4 16 ff 09  ..8\. .5........
179b0  02 00 28 8c 0c e0 21 90  00 10 29 82 0c a0 23 90  ..(...!...)...#.
179c0  0c 20 21 90 01 20 29 8c  0c e0 21 90 01 20 21 8c  . !.. )...!.. !.
179d0  05 16 80 5c 04 16 88 5c  0f 16 90 5c 74 bc fe 09  ...\...\...\t...
179e0  01 e0 2b 8c 10 e0 21 90  04 40 21 59 10 e0 21 92  ..+...!..@!Y..!.
179f0  01 e0 33 8c 0c a0 2b 90  0c 60 21 90 04 80 21 59  ..3...+..`!...!Y
17a00  0c 60 21 92 0c a0 23 90  0c 20 21 90 00 10 31 80  .`!...#.. !...1.
17a10  06 16 78 5c 02 00 28 8c  0c a0 23 90 0c 20 21 90  ..x\..(...#.. !.
17a20  00 10 29 82 0c a0 23 90  0c 20 21 90 04 80 21 59  ..)...#.. !...!Y
17a30  01 20 29 8c 0c a0 23 90  10 20 29 92 18 a0 23 90  . )...#.. )...#.
17a40  0c 20 01 32 18 a0 83 90  58 b5 fe 09 0c a0 83 90  . .2....X.......
17a50  b0 e3 fe 09 18 a0 83 92  0c a0 23 90 0c 20 21 90  ..........#.. !.
17a60  05 20 21 80 82 0d 21 59  84 d0 23 58 28 a0 23 92  . !...!Y..#X(.#.
17a70  13 00 20 8c 50 a0 23 d2  44 a0 83 90 07 16 88 5c  .. .P.#.D......\
17a80  90 d0 fe 09 54 00 00 08  02 00 28 8c 0c a0 23 90  ....T.....(...#.
17a90  0c 20 21 90 00 10 29 82  0c a0 83 90 64 e3 fe 09  . !...).....d...
17aa0  18 a0 83 92 14 00 20 8c  50 a0 23 c2 0c a0 23 90  ...... .P.#...#.
17ab0  0c 20 21 90 05 20 21 80  82 0d 21 59 84 d0 23 58  . !.. !...!Y..#X
17ac0  28 a0 23 92 44 a0 2b 90  0c a0 23 90 05 16 80 5c  (.#.D.+...#....\
17ad0  04 16 88 5c 3c d0 fe 09  0c a0 83 90 c4 b4 fe 09  ...\<...........
17ae0  00 00 20 8c 0c a0 23 92  04 16 80 5c 00 00 00 0a  .. ...#....\....
17af0  10 16 78 5c 18 00 28 8c  02 00 20 8c 05 16 80 5c  ..x\..(... ....\
17b00  04 16 88 5c 2c de fe 09  10 16 38 5c 0c 20 04 35  ...\,.....8\. .5
17b10  00 00 80 8c 5c 15 ff 09  04 00 28 8c 02 00 20 8c  ....\.....(... .
17b20  05 16 80 5c 04 16 88 5c  08 de fe 09 08 e0 81 92  ...\...\........
17b30  0c 20 04 35 00 00 80 8c  38 15 ff 09 0c e0 21 90  . .5....8.....!.
17b40  18 20 21 8c 10 e0 21 92  0e 00 28 8c 14 e0 21 90  . !...!...(...!.
```

Mar 27 18:20 1996 image.txt Page 146

```
17b50   0d 20 29 82 0c e0 29 90  00 30 20 8c 06 52 00 00   . )...)..0 ..R..
17b60   00 50 21 92 ff 00 20 8c  08 60 21 92 04 00 20 8c   .P!... ..`!... .
17b70   0c 60 21 92 08 e0 29 90  10 60 21 90 04 20 21 8c   .`!...)..`!.. !.
17b80   10 60 21 92 00 30 30 90  34 ec 05 10 08 e0 21 90   .`!..00.4.....!.
17b90   0c 20 29 90 04 00 20 8c  06 16 80 5c 05 16 88 5c   . )... ....\...\
17ba0   04 16 90 5c ac ba fe 09  f4 e7 83 90 07 16 88 5c   ...\...........\
17bb0   60 cf fe 08 00 00 00 00  00 00 00 00 00 00 00 00   `...............
17bc0   10 16 30 5c 18 00 28 8c  02 00 20 8c 05 16 80 5c   ..0\..(... ....\
17bd0   04 16 88 5c 5c ad fe 09  10 16 38 5c 0c 20 04 35   ...\\.....8\. .5
17be0   00 00 80 8c 8c 14 ff 09  0c e0 21 90 18 20 21 8c   ..........!.. !.
17bf0   10 e0 21 92 0e 00 28 8c  14 e0 21 90 0d 20 29 82   ..!...(...!.. ).
17c00   0c e0 29 90 00 30 20 8c  07 52 00 00 00 50 21 92   ..)..0 ..R...P!.
17c10   ff 00 20 8c 08 60 21 92  f4 a7 81 90 07 16 88 5c   .. ..`!........\
17c20   40 c9 fe 08 00 00 00 00  00 00 00 00 00 00 00 00   @...............
17c30   10 16 18 5c 58 20 24 90  08 20 01 35 00 00 00 0a   ...\X $.. .5....
17c40   58 e0 80 90 2c c0 fe 09  00 00 20 8c 58 e0 20 92   X...,..... .X. .
17c50   00 00 00 0a 00 00 00 00  00 00 00 00 00 00 00 00   ................
17c60   08 00 20 8c 15 20 24 c2  00 00 20 8c 54 20 24 92   .. .. $... .T $.
17c70   44 20 84 90 8c c5 fe 08  00 00 00 00 00 00 00 00   D ..............
17c80   13 00 20 8c 14 20 24 c2  00 00 20 8c 54 20 24 92   .. .. $... .T $.
17c90   40 20 84 90 6c c5 fe 08  00 00 00 00 00 00 00 00   @ ..l...........
17ca0   10 16 20 5c 11 16 18 5c  11 16 80 5c 84 ff ff 09   .. \...\...\....
17cb0   04 16 80 5c ec b2 fe 09  00 00 20 8c 03 16 80 5c   ...\...... ....\
17cc0   04 16 88 5c 5c 02 00 09  0c 20 04 3a 00 00 80 8c   ...\\.... .:....
17cd0   00 00 00 0a 1c e0 80 90  28 e1 fe 09 0c e0 80 92   ........(.......
17ce0   44 e0 20 90 0c 20 81 90  68 ce fe 09 0c 20 04 3d   D. .. ..h.... .=
17cf0   01 00 80 8c 00 00 00 0a  00 30 20 8c 40 9c 00 00   .........0 .@...
17d00   03 16 80 5c 04 16 88 5c  d8 09 00 09 44 e0 28 90   ...\...\....D.(.
17d10   0c e0 20 90 05 16 80 5c  04 16 88 5c f4 cd fe 09   .. ....\...\....
17d20   00 00 20 8c 0c e0 20 92  03 00 20 8c 50 e0 20 c2   .. ... ... .P. .
17d30   00 00 80 8c 00 00 00 0a  00 00 00 00 00 00 00 00   ................
17d40   10 16 78 5c 11 16 38 5c  11 16 80 5c e4 fe ff 09   ..x\..8\...\....
17d50   07 16 80 5c 0f 16 88 5c  c8 01 00 09 0c 20 04 3a   ...\...\..... .:
17d60   00 00 80 8c 00 00 00 0a  44 e0 21 90 0c 20 81 90   ........D.!.. ..
17d70   e0 cd fe 09 0c 20 04 3d  01 00 80 8c 00 00 00 0a   ..... .=........
17d80   00 30 20 8c 40 9c 00 00  07 16 80 5c 04 16 88 5c   .0 .@......\...\
17d90   50 09 00 09 0c e0 23 90  10 e0 23 92 03 00 30 8c   P.....#...#...0.
17da0   10 e0 2b 90 01 60 21 8c  10 e0 23 92 00 50 31 82   ..+..`!...#..P1.
17db0   44 e0 81 90 0f 16 88 5c  58 cd fe 09 0a 00 20 8c   D......\X..... .
17dc0   50 e0 21 c2 00 00 80 8c  00 00 00 0a 00 00 00 00   P.!.............
```

Mar 27 18:20 1996 image.txt Page 147

```
17dd0   10 16 78 5c 11 16 38 5c  11 16 80 5c 54 fe ff 09   ..x\..8\...\T...
17de0   07 16 80 5c 0f 16 88 5c  38 01 00 09 0c 20 04 3a   ...\...\8.... .:
17df0   00 00 80 8c 00 00 00 0a  44 e0 21 90 0c 20 81 90   ........D.!.. ..
17e00   50 cd fe 09 0c 20 04 3d  01 00 80 8c 00 00 00 0a   P.... .=........
17e10   00 30 20 8c 40 9c 00 00  07 16 80 5c 04 16 88 5c   .0 .@......\...\
17e20   c0 08 00 09 0c e0 23 90  10 e0 23 92 09 00 30 8c   ......#...#...0.
17e30   10 e0 2b 90 01 60 21 8c  10 e0 23 92 00 50 31 82   ..+..`!...#..P1.
17e40   0a 00 30 8c 10 e0 2b 90  01 60 21 8c 10 e0 23 92   ..0...+.,`!...#.
17e50   00 50 31 82 44 e0 81 90  0f 16 88 5c b4 cc fe 09   .P1.D......\....
17e60   19 00 20 8c 50 e0 21 c2  00 00 80 8c 00 00 00 0a   .. .P.!.........
17e70   10 16 20 5c 11 16 18 5c  11 16 80 5c b4 fa ff 09   .. \...\...\....
17e80   03 16 80 5c 04 16 88 5c  98 00 00 09 0c 20 04 3a   ...\...\..... .:
17e90   00 00 80 8c 00 00 00 0a  44 e0 20 90 0c 20 81 90   ........D. .. ..
17ea0   b0 cc fe 09 0c 20 04 3d  01 00 80 8c 00 00 00 0a   ..... .=........
17eb0   18 e0 80 90 4c df fe 09  0c e0 80 92 50 20 04 32   ....L.......P .2
17ec0   00 30 20 8c 40 9c 00 00  03 16 80 5c 04 16 88 5c   .0 .@......\...\
17ed0   10 08 00 09 44 e0 28 90  0c e0 20 90 05 16 80 5c   ....D.(... ....\
17ee0   04 16 88 5c 2c ct fe 09  00 00 20 8c 0c e0 20 92   ...\,..... ... .
17ef0   14 00 20 8c 50 e0 20 c2  3d e0 20 80 01 20 21 8c   .. .P. .=. .. !.
17f00   3d e0 20 82 00 00 80 8c  00 00 00 0a 00 00 80 8c   =. .............
17f10   60 11 ff 08 00 00 00 00  00 00 00 00 00 00 00 00   `...............
17f20   10 16 38 5c 11 16 18 5c  00 30 20 90 24 06 06 10   ..8\...\.0 .$...
17f30   01 20 21 8c 00 30 20 92  24 06 06 10 00 30 20 90   . !..0 .$....0 .
17f40   24 06 06 10 28 20 21 3b  3e e0 21 80 18 20 01 35   $...( !;>.!.. .5
17f50   02 00 20 8c 3e e0 21 82  03 16 80 5c 07 16 88 5c   .. .>.!....\...\
17f60   80 d2 ff 09 01 00 80 8c  00 00 00 0a 00 00 80 8c   ................
17f70   00 00 00 0a 00 00 00 00  00 00 00 00 00 00 00 00   ................
17f80   ff 03 43 20 20 20 20 20  20 20 20 20 20 20 20 20   ..C
17f90   20 20 20 20 20 20 20 10  03 00 00 00 00 00 00 00          .........
17fa0   ff 03 40 20 20 20 20 20  20 20 20 20 20 20 20 20   ..@
17fb0   20 20 20 20 20 20 20 10  03 00 00 00 00 00 00 00          .........
17fc0   ff 13 fb 10 03 00 00 00  00 00 00 00 00 00 00 00   ................
17fd0   54 69 6d 65 20 4f 75 74  20 2d 20 6e 6f 20 72 65   Time Out - no re
17fe0   73 70 6f 6e 73 65 20 66  72 6f 6d 20 6c 6f 63 61   sponse from loca
17ff0   6c 20 4d 6f 64 65 6d 00  00 00 00 00 00 00 00 00   l Modem.........
18000   ff 13 84 10 03 00 00 00  ff 13 44 10 03 00 00 00   ..........D.....
18010   20 20 00 00 25 73 00 00  00 00 00 00 00 00 00 00     ..%s..........
18020   10 16 38 5c 11 16 18 5c  18 20 04 32 0c e0 21 90   ..8\...\. .2..!.
18030   10 20 01 32 07 16 80 5c  68 af fe 09 00 00 38 8c   . .2...\h.....8.
18040   15 e0 20 c0 0c 20 49 3a  02 00 20 8c 3e e0 20 82   .. .. I:.. .>. .
```

```
Mar 27 18:20 1996   image.txt Page 148

18050   07 16 80 5c 03 16 88 5c  88 d1 ff 08 00 00 00 00   ...\...\........
18060   10 16 70 5c 54 20 24 90  14 20 01 32 54 a0 83 90   ..p\T $.. .2T...
18070   00 bc fe 09 00 00 20 8c  54 a0 23 92 3e a0 23 80   ...... .T.#.>.#.
18080   10 20 01 32 07 16 80 5c  0e 16 88 5c 34 d1 ff 08   . .2...\...\T...
18090   00 30 20 8c 40 5c 00 00  0e 16 80 5c 04 16 88 5c   .0 .@......\...\
180a0   40 06 00 09 0c a0 2b 90  0c 60 21 90 06 20 21 8c   @.....+..'!.. !.
180b0   0c 60 21 92 0c a0 23 90  0c 20 21 90 00 10 29 80   .'!...#.. !...).
180c0   05 16 78 5c 0c a0 23 90  0c 20 21 90 04 40 21 59   ..x\..#.. !..@!Y
180d0   01 20 29 8c 0c a0 23 90  10 20 29 92 03 00 20 8c   . )...#.. )... .
180e0   50 a0 23 c2 02 00 28 8c  0c a0 23 90 0c 20 21 90   P.#...(...#.. !.
180f0   00 10 29 82 0c a0 23 90  0c 20 21 90 03 20 29 80   ..)...#.. !.. ).
18100   40 00 20 8c 85 20 01 5a  e8 00 00 15 0a e0 2b 8c   @. .. .Z......+.
18110   02 00 20 8c 05 16 80 5c  04 16 88 5c 14 d8 fe 09   .. ....\...\....
18120   10 16 38 5c 0c 20 04 35  00 00 60 8c 44 0f ff 09   ..8\. .5...,D...
18130   02 00 28 8c 0c e0 21 90  00 10 29 82 0c a0 23 90   ..(...!...)...#.
18140   0c 20 21 90 01 20 29 8c  10 e0 21 90 01 20 21 8c   . !.. )...!.. !.
18150   05 16 80 5c 04 16 88 5c  0f 16 90 5c f4 b4 fe 09   ...\...\...\....
18160   01 e0 2b 8c 10 e0 21 90  04 40 21 59 10 e0 21 92   ..+...!..@!Y..!.
18170   01 e0 33 8c 0c a0 2b 90  0c 60 21 90 04 80 21 59   ..3...+..'!...!Y
18180   0c 60 21 92 0c a0 23 90  0c 20 21 90 00 10 31 80   .'!...#.. !...1.
18190   06 16 78 5c 02 00 20 8c  50 a0 23 c2 04 16 28 5c   ..x\.. .P.#...(\
181a0   0c a0 23 90 0c 20 21 90  00 10 29 82 0c a0 23 90   ..#.. !...)...#.
181b0   0c 20 21 90 04 80 21 59  01 20 29 8c 0c a0 23 90   . !...!Y. )...#.
181c0   10 20 29 92 1c a0 23 90  0c 20 01 32 1c a0 83 90   . )...#.. .2....
181d0   d0 ad fe 09 0c a0 83 90  28 dc fe 09 1c a0 83 92   ........(.......
181e0   44 a0 83 90 07 16 88 5c  28 c9 fe 09 3c 00 00 08   D......\(...<...
181f0   1c a0 23 90 0c 20 01 32  1c a0 83 90 a4 ad fe 09   ..#.. .2........
18200   0c a0 83 90 fc db fe 09  1c a0 83 92 44 a0 2b 90   ............D.+.
18210   0c a0 23 90 05 16 80 5c  04 16 88 5c f4 c8 fe 09   ..#....\...\....
18220   00 00 20 8c 0c a0 23 92  01 00 20 8c 00 30 20 82   .. ...#... ..0 .
18230   08 00 00 40 00 00 80 8c  00 00 00 0a 00 00 00 00   ...@............
18240   10 16 70 5c 11 16 78 5c  00 00 20 8c 54 60 24 92   ..p\..x\.. .T'$.
18250   3e 60 24 80 10 20 01 32  0e 16 80 5c 0f 16 88 5c   >'$.. .2...\...\
18260   80 cf ff 08 0c e0 23 90  14 20 01 32 00 00 20 8c   ......#.. .2... .
18270   3d e0 23 82 0f 16 80 5c  e8 fd ff 08 3d e0 23 80   =.#....\....=.#.
18280   24 20 79 39 00 30 80 8c  30 87 01 00 f4 38 00 09   $ y9.0..0....8..
18290   02 00 20 8c 3e e0 23 82  0e 16 80 5c 0f 16 88 5c   .. .>.#....\...\
182a0   40 cf ff 08 23 00 28 8c  02 00 20 8c 05 16 80 5c   @...#.(... ....\
182b0   04 16 88 5c 7c db fe 09  10 16 38 5c 0c 20 04 35   ...\|.....8\. .5
182c0   00 00 80 8c ac 0d ff 09  02 00 28 8c 0c e0 21 90   ..........(...!.
```

Mar 27 18:20 1996 image.txt Page 149

```
182d0   00 10 29 82 00 30 30 8c  a0 7f 01 00 0c e0 21 90   ..)..00.......!.
182e0   01 20 29 8c 19 00 20 8c  06 16 80 5c 05 16 88 5c   . )... ....\...\
182f0   04 16 90 5c 5c b3 fe 09  0c e0 21 90 1a 20 21 8c   ...\\......!.. !.
18300   10 e0 21 92 44 e0 83 90  07 16 88 5c 04 c8 fe 09   ..!.D......\....
18310   02 00 20 8c 50 e0 23 c2  3d e0 23 80 01 20 21 8c   .. .P.#.=.#.. !.
18320   3d e0 23 82 00 00 80 8c  00 00 00 0a 00 00 00 00   =.#.............
18330   10 16 68 5c 11 16 70 5c  00 00 20 8c 54 60 24 92   ..h\..p\.. .T`$.
18340   3e 60 24 80 10 20 01 32  0d 16 80 5c 0e 16 88 5c   >`$.. .2...\...\
18350   90 ce ff 08 34 a0 23 90  10 20 09 36 24 a0 23 80   ....4.#.. .6$.#.
18360   00 28 01 5a 24 01 00 12  0f 00 28 8c 02 00 20 8c   .(.Z$.....(... .
18370   05 16 80 5c 04 16 88 5c  b8 d5 fe 09 0c a0 83 92   ...\...\........
18380   0c 20 04 35 00 00 80 8c  e8 0c ff 09 02 00 38 8c   . .5..........8.
18390   0c a0 33 90 10 a0 29 90  01 60 21 8c 10 a0 21 92   ..3...)..`!...!.
183a0   00 50 39 82 00 30 30 8c  20 87 01 00 0c a0 23 90   .P9..00. .....#.
183b0   10 20 29 90 05 00 20 8c  06 16 80 5c 05 16 88 5c   . )... ....\...\
183c0   04 16 90 5c 8c b2 fe 09  0c a0 2b 90 10 60 21 90   ...\......+..`!.
183d0   05 20 21 8c 10 60 21 92  24 a0 23 80 28 20 01 3d   . !..`!.$.#.( .=
183e0   30 a0 2b 90 4e 00 20 8c  1c 00 29 35 cc 00 28 8c   0.+.N. ...)5..(.
183f0   0c a0 23 90 0c 20 21 90  03 20 29 82 01 00 20 8c   ..#.. !.. )... .
18400   3c a0 23 82 00 00 20 8c  34 a0 23 92 0c 00 20 8c   <.#... .4.#... .
18410   50 a0 23 c2 0a 00 28 8c  02 00 20 8c 05 16 80 5c   P.#...(... ....\
18420   04 16 88 5c 0c d5 fe 09  10 16 78 5c 0c 20 04 35   ...\......x\. .5
18430   00 00 80 8c 3c 0c ff 09  00 30 20 8c 40 9c 00 00   ....<....0 .@...
18440   0e 16 80 5c 04 16 88 5c  98 02 00 09 09 00 30 8c   ...\...\......0.
18450   10 e0 2b 90 01 60 21 8c  10 e0 23 92 00 50 31 82   ..+..`!...#..P1.
18460   0a 00 30 8c 10 e0 2b 90  01 60 21 8c 10 e0 23 92   ..0...+..`!...#.
18470   00 50 31 82 44 a0 83 90  0f 16 88 5c 94 c6 fe 09   .P1.D......\....
18480   00 00 80 8c 00 00 00 0a  07 00 20 8c 50 a0 23 c2   .......... .P.#.
18490   0a 00 28 8c 02 00 20 8c  05 16 80 5c 04 16 88 5c   ..(... ....\...\
184a0   90 d4 fe 09 10 16 78 5c  0c 20 04 35 00 00 80 8c   ......x\. .5....
184b0   c0 0b ff 09 0f 16 80 5c  0e 16 88 5c 04 d5 ff 08   .......\...\....
184c0   70 60 08 8c 10 16 78 5c  11 16 38 5c 00 30 20 8c   p`....x\..8\.0 .
184d0   80 38 01 00 11 16 80 5c  04 16 88 5c 04 02 00 09   .8.....\...\....
184e0   01 00 20 8c 08 e0 21 c2  0c e0 23 90 05 20 21 8c   .. ...!...#.. !.
184f0   0c e0 23 92 10 e0 2b 90  0c e0 23 90 04 41 21 59   ..#...+...#..A!Y
18500   82 09 31 59 0c e0 23 90  02 20 29 8c 40 e0 27 8c   ..1Y..#.. ).@.'.
18510   05 16 80 5c 04 16 88 5c  06 16 90 5c 34 b1 fe 09   ...\...\...\4...
18520   00 00 28 8c 04 80 21 59  00 10 29 c2 06 00 28 8c   ..(...!Y..)...(.
18530   0c e0 23 90 00 10 29 82  44 e0 81 90 0f 16 88 5c   ..#...).D......\
18540   d0 c5 fe 09 10 00 20 8c  50 e0 21 c2 02 00 30 8c   ...... .P.!...0.
```

```
Mar 27 18:20 1996  image.txt Page 150

18550   4e 04 28 8c 40 e0 27 8c  06 16 80 5c 05 16 88 5c   N.(.@.'....\...\
18560   04 16 90 5c 6c 2a 00 09  01 00 20 8c 00 30 20 82   ...\l*.... ..0 .
18570   08 00 00 40 00 00 80 8c  00 00 00 0a 00 00 00 00   ...@............
18580   10 16 20 5c 11 16 30 5c  11 16 80 5c a4 f6 ff 09   .. \..0\...\....
18590   20 a0 21 92 20 a0 29 90  0c 60 21 90 05 20 21 8c    .!. ./..'!.. !.
185a0   0c 60 21 92 02 00 28 8c  20 a0 21 90 0c 20 21 90   .'!...(. .!.. !.
185b0   00 10 29 82 20 a0 21 90  0c 20 21 90 03 20 29 80   ..). .!.. !.. ).
185c0   fe 00 20 8c 85 00 21 58  30 a0 21 92 30 a0 21 90   .. ...!X0.!.0.!.
185d0   00 30 20 92 50 06 06 10  00 00 20 8c 2c a0 21 c2   .0 .P..... .,.!.
185e0   04 16 80 5c 06 16 88 5c  08 00 00 08 00 00 00 00   ...\...\........
185f0   10 16 38 5c 11 16 18 5c  11 16 80 5c 34 f6 ff 09   ..8\...\...\4...
18600   3e e0 20 80 10 20 01 32  07 16 80 5c 03 16 88 5c   >. .. .2...\...\
18610   d0 cb ff 08 e4 e7 20 90  00 10 21 c0 82 28 01 5a   ...... ...!..(.Z
18620   ac 00 00 15 2c e0 20 c0  80 28 01 5a a0 00 00 15   ....,. ..(.Z....
18630   e4 e7 20 90 14 20 29 90  0c 60 21 90 04 20 21 8c   .. .. )..'!.. !.
18640   0c 60 21 92 08 00 28 8c  e4 e7 20 90 14 20 21 90   .'!...(... .. !.
18650   0c 20 21 90 00 10 29 82  00 30 20 8c 20 4e 00 00   . !...)..0 . N..
18660   03 16 80 5c 04 16 88 5c  78 00 00 09 44 e0 28 90   ...\...\x...D.(.
18670   e4 e7 20 90 14 20 21 90  05 16 80 5c 04 16 88 5c   .. .. !....\...\
18680   90 c4 fe 09 00 00 28 8c  e4 e7 20 90 14 20 29 92   ......(... .. ).
18690   18 00 20 8c 50 e0 20 c2  e4 e7 20 90 00 10 29 c2   .. .P. ... ...).
186a0   e4 e7 20 90 02 20 21 80  10 20 01 32 02 00 20 8c   .. .. !.. .2.. .
186b0   2c e0 20 c2 18 00 00 08  01 00 20 8c 2c e0 20 c2   ,. ....... ,. .
186c0   e4 e7 20 90 18 20 21 90  e4 e7 20 92 00 00 80 8c   .. .. !... .....
186d0   00 00 00 0a 00 00 00 00  00 00 00 00 00 00 00 00   ................
186e0   10 16 38 5c 00 30 30 8c  10 87 01 00 10 16 28 5c   ..8\.00.......(\
186f0   11 16 20 5c 06 16 80 5c  05 16 88 5c 04 16 90 5c   .. \...\...\...\
18700   60 b5 fe 09 58 e0 81 92  00 00 00 0a 00 00 00 00   `...X...........
18710   e7 03 20 8c 58 20 24 92  44 20 84 90 e4 ba fe 08   .. .X $.D ......
18720   ff 13 8c 10 03 00 00 00  00 00 00 00 00 00 00 00   ................
18730   54 69 6d 65 20 4f 75 74  20 2d 20 6e 6f 20 72 65   Time Out - no re
18740   73 70 6f 6e 73 65 20 66  72 6f 6d 20 70 61 72 74   sponse from part
18750   6e 65 72 20 50 41 53 53  61 46 41 58 00 00 00 00   ner PASSaFAX....
18760   10 16 68 5c 11 16 70 5c  0c 20 24 90 05 20 29 80   ..h\..p\. $.. ).
18770   64 00 20 8c 04 41 79 59  06 e8 03 5a e0 01 00 14   d. ..AyY...Z....
18780   0f 39 20 90 b8 90 01 00  00 10 01 84 01 00 80 8c   .9 .............
18790   00 00 00 0a 0c 60 23 90  08 20 29 80 fe 00 20 8c   .....'#.. ).... .
187a0   85 00 31 58 2e 00 20 8c  14 80 21 3a 4e 00 20 8c   ..1X.. ...!:N. .
187b0   0c 80 21 3a 8e 00 20 8c  18 80 21 3d 0d 16 80 5c   ..!:.. ...!=...\
187c0   0e 16 88 5c bc fd ff 09  00 00 80 8c 00 00 00 0a   ...\............
```

```
Mar 27 18:20 1996  image.txt Page 151

187d0   8c 00 20 8c 30 80 21 3d  0d 16 80 5c c4 a7 fe 09   .. .O.!=...\....
187e0   01 00 20 8c 24 a0 23 82  25 a0 23 80 01 20 21 8c   .. .$.#.%.#.. !.
187f0   25 a0 23 82 00 00 20 8c  3c a0 23 82 04 16 80 5c   %.#... .<.#....\
18800   00 00 00 0a cc 00 20 8c  30 80 21 3d 0d 16 80 5c   ...... .O.!=...\
18810   90 a7 fe 09 02 00 20 8c  24 a0 23 82 25 a0 23 80   ...... .$.#.%.#.
18820   01 20 21 8c 25 a0 23 82  00 00 20 8c 3c a0 23 82   . !.%.#... .<.#.
18830   04 16 80 5c 00 00 00 0a  4c 00 20 8c 30 80 21 3d   ...\....L. .O.!=
18840   0d 16 80 5c 5c a7 fe 09  03 00 20 8c 24 a0 23 82   ...\\..... .$.#.
18850   25 a0 23 80 01 20 21 8c  25 a0 23 82 00 00 20 8c   %.#.. !.%.#... .
18860   3c a0 23 82 04 16 80 5c  00 00 00 0a 0d 16 80 5c   <.#....\.......\
18870   30 a7 fe 09 00 00 68 8c  50 a0 23 c0 14 20 01 3a   O.....h.P.#.. .:
18880   01 00 20 8c 3e a0 23 82  09 00 80 8c 00 00 00 0a   .. .>.#.........
18890   00 00 80 8c 00 00 00 0a  0c a0 23 90 18 20 01 32   ..........#.. .2
188a0   0c a0 23 90 0c 20 21 90  0c 20 01 32 0c a0 83 90   ..#.. !.. .2....
188b0   f0 a6 fe 09 0c a0 6b 92  00 00 80 8c 00 00 00 0a   ......k.........
188c0   e0 a7 23 90 00 10 21 c0  28 20 11 3d 0d 16 80 5c   ..#...!.( .=...\
188d0   d0 a6 fe 09 02 00 20 8c  3e a0 23 82 00 00 80 8c   ...... .>.#.....
188e0   0e 16 88 5c fc c8 ff 09  00 00 80 8c 00 00 00 0a   ...\............
188f0   02 00 28 8c e0 a7 23 90  00 10 29 c2 e0 a7 23 90   ..(...#...)...#.
18900   14 20 69 92 0c 60 23 90  05 20 29 80 6a 00 20 8c   . i..`#.. ).j. .
18910   14 00 29 3d 01 00 28 8c  e0 a7 23 90 02 20 29 82   ..)=..(...#.. ).
18920   10 00 00 08 00 00 28 8c  e0 a7 23 90 02 20 29 82   ......(...#.. ).
18930   e0 a7 23 90 18 20 21 90  e0 a7 23 92 2c a0 23 c0   ..#.. !...#.,.#.
18940   14 20 01 3d 50 a0 23 c0  0c 20 c1 3d 04 00 80 8c   . .=P.#.. .=....
18950   00 00 00 0a 00 00 80 8c  00 00 00 0a 02 00 20 8c   .............. .
18960   3e a0 23 82 00 00 80 8c  0e 16 88 5c 74 c8 ff 09   >.#........\t...
18970   00 00 80 8c 00 00 00 0a  00 00 00 00 00 00 00 00   ................
18980   10 16 68 5c 11 16 70 5c  0c 20 24 90 00 10 21 80   ..h\..p\. $...!.
18990   18 0e 21 59 98 0d 21 59  04 16 78 5c 06 28 01 5a   ..!Y..!Y..x\.(.Z
189a0   98 01 00 14 0f 39 20 90  d4 90 01 00 00 10 01 84   .....9 .........
189b0   01 00 80 8c 00 00 00 0a  02 00 80 8c 00 00 00 0a   ................
189c0   03 00 80 8c 00 00 00 0a  14 00 80 8c 00 00 00 0a   ................
189d0   0c 60 23 90 03 20 29 80  fe 00 20 8c 85 00 29 58   .`#.. )... ...)X
189e0   ff 00 20 8c 85 00 29 58  05 16 30 5c 8e 00 20 8c   .. ...)X..0\.. .
189f0   20 40 21 3d 0c 60 23 90  03 20 29 80 fe 00 20 8c    @!=.`#.. )... .
18a00   85 00 21 58 30 a0 23 92  12 00 80 8c 00 00 00 0a   ..!XO.#.........
18a10   4e 00 20 8c 20 80 21 3d  0c 60 23 90 03 20 29 80   N. . .!=.`#.. ).
18a20   fe 00 20 8c 85 00 21 58  30 a0 23 92 11 00 80 8c   .. ...!XO.#.....
18a30   00 00 00 0a 2e 00 20 8c  20 80 21 3d 0c 60 23 90   ....... . .!=.`#.
18a40   03 20 29 80 fe 00 20 8c  85 00 21 58 30 a0 23 92   . )... ...!XO.#.
```

Mar 27 18:20 1996 image.txt Page 152

```
18a50   10 00 80 8c 00 00 00 0a  20 00 20 8c 0c 80 21 3d   .........  ....!=
18a60   07 00 80 8c 00 00 00 0a  40 00 20 8c 0c 80 21 3d   ........@.  ...!=
18a70   08 00 80 8c 00 00 00 0a  80 00 20 8c 0c 80 21 3d   ..........  ...!=
18a80   09 00 80 8c 00 00 00 0a  84 00 20 8c 0c 80 21 3d   ..........  ...!=
18a90   0a 00 80 8c 00 00 00 0a  44 00 20 8c 0c 80 21 3d   ........D.  ...!=
18aa0   0b 00 80 8c 00 00 00 0a  8c 00 20 8c 0c 80 21 3a   ..........  ...!:
18ab0   cc 00 20 8c 0c 80 21 3d  0c 00 80 8c 00 00 00 0a   ..  ...!=........
18ac0   4c 00 20 8c 0c 80 21 3d  0d 00 80 8c 00 00 00 0a   L.  ...!=........
18ad0   42 00 20 8c 0c 80 21 3d  04 00 80 8c 00 00 00 0a   B.  ...!=........
18ae0   62 00 20 8c 0c 80 21 3d  05 00 80 8c 00 00 00 0a   ..  ...!=........
18af0   fa 00 20 8c 0c 80 21 3d  06 00 80 8c 00 00 00 0a   ..  ...!=........
18b00   0c 60 03 32 0d 16 80 5c  98 a4 fe 09 02 00 20 8c   .`.2...\.......  .
18b10   3e a0 23 82 00 00 80 8c  0e 16 88 5c c4 c6 ff 09   >.#........\....
18b20   00 00 80 8c 00 00 00 0a  0e 00 80 8c 00 00 00 0a   ................
18b30   0f 00 80 8c 00 00 00 0a  0c 60 03 32 0d 16 80 5c   ..........`.2...\
18b40   60 a4 fe 09 02 00 20 8c  3e a0 23 82 00 00 80 8c   `.....  .>.#.....
18b50   0e 16 88 5c 8c c6 ff 09  00 00 80 8c 00 00 00 0a   ...\............
18b60   10 16 38 5c 01 09 1c 59  34 e0 50 34 03 39 20 90   ..8\...Y4.P4.9 .
18b70   f0 90 01 00 00 10 01 84  03 00 38 8c 24 00 00 08   ..........8.$...
18b80   00 00 38 8c 1c 00 00 08  02 00 38 8c 14 00 00 08   ..8.......8.....
18b90   06 00 38 8c 0c 00 00 08  01 00 38 8c 00 00 38 8c   ..8.......8...8.
18ba0   07 16 80 5c 00 00 00 0a  00 00 00 00 00 00 00 00   ...\............
18bb0   10 16 18 5c 00 30 20 c0  30 ec 05 10 0c 20 01 3a   ...\.0 .0....  .:
18bc0   03 16 80 5c fc 00 00 08  03 16 80 5c 04 00 00 08   ...\.......\....
18bd0   10 60 08 8c 00 10 2c 90  00 00 20 8c 40 e0 27 8a   .`......  .@.'.
18be0   0c 60 21 90 03 20 21 80  40 e0 27 82 0c 60 21 90   .`!..  !.@.'..`!.
18bf0   04 20 21 80 41 e0 27 82  0c 60 21 90 05 20 29 80   .  !.A.'..`!..  ).
18c00   69 00 20 8c 0c 00 29 3d  04 00 80 8c 00 00 00 0a   i.  ...)=........
18c10   00 30 20 90 10 06 06 10  50 20 21 c0 20 20 01 3d   .0 .....P !.  .=
18c20   00 30 20 88 20 06 06 10  14 20 09 3d 40 e0 27 88   .0 .  ....  .=@.'.
18c30   0c 20 09 3a 05 00 80 8c  00 00 00 0a 40 e0 2f 88   .  .:.........@./.
18c40   00 30 20 88 20 06 06 10  0c 00 29 3b 05 00 80 8c   .0 .  .....);....
18c50   00 00 00 0a 40 e0 2f 88  00 30 20 88 20 06 06 10   ....@./..0 .  ...
18c60   84 41 29 59 ff 00 20 8c  85 00 21 58 04 16 18 5c   .A)Y..  ...!X...\
18c70   0c 20 19 3b 02 00 80 8c  00 00 00 0a 00 30 20 90   .  .;.........0 .
18c80   6c 06 06 10 84 c0 20 59  00 30 20 92 6c 06 06 10   l.....  Y.0 .l...
18c90   00 30 20 90 6c 06 06 10  0c 20 51 3b 02 00 80 8c   .0 .l....  Q;....
18ca0   00 00 00 0a 40 e0 27 88  01 20 21 8c 00 30 20 8a   ....@.'..  !..0 .
18cb0   20 06 06 10 04 00 80 8c  00 00 00 0a 00 00 00 00   ................
18cc0   10 16 60 5c 00 00 18 8c  00 30 20 90 68 06 06 10   ..`\.....0 .h...
```

Mar 27 13:20 1996 image.txt Page 1[illegible]

```
18cd0   20 20 01 35 00 10 23 90  00 30 20 92 68 06 06 10   .5..#..0 .h...
18ce0   00 00 28 8c 00 10 23 90  04 20 29 92 40 00 00 08   ..(...#.. ).@...
18cf0   00 10 23 90 38 20 01 32  00 30 20 90 68 06 06 10   ..#.8 .2.0 .h...
18d00   04 16 70 5c 08 20 21 90  14 20 01 32 08 a0 23 90   ..p\. !.. .2..#.
18d10   04 16 70 5c 06 20 21 90  f4 3f 01 35 00 10 23 90   ..p\. !..?.5..#.
18d20   08 a0 23 92 00 10 23 90  04 20 71 92 00 30 20 90   ..#...#.. q..0 .
18d30   68 06 06 10 04 16 70 5c  00 00 68 8c 20 20 01 32   h.....p\..h.  .2
18d40   10 a0 2b 90 0c a0 23 90  04 41 21 59 8d 00 69 59   ..+...#..A!Y..iY
18d50   08 a0 23 90 04 16 70 5c  e8 3f 01 35 3c 60 33 3e   ..#...p\.?.5.`3>
18d60   01 00 80 8c 00 00 00 0a  00 30 28 90 68 06 06 10   .........0(.h...
18d70   00 30 20 8c 60 06 06 10  05 16 80 5c 04 16 88 5c   .0 .`.......\...\
18d80   f0 01 00 09 10 16 58 5c  10 20 0c 3d 00 00 80 6c   ......X\. .=....
18d90   e0 02 ff 09 10 00 00 08  0c e0 12 3d 02 00 80 8c   ............=....
18da0   00 00 00 0a 00 30 20 90  60 06 06 10 0c 00 69 3b   .....0 .`.....i;
18db0   01 00 80 8c 00 00 00 0a  00 30 28 90 60 06 06 10   .........0(.`...
18dc0   02 00 20 8c 05 16 80 5c  04 16 88 5c 64 cb fe 09   .. ....\...\d...
18dd0   10 16 78 5c 18 20 04 35  00 30 80 8c a0 90 01 00   ..x\. .5.0......
18de0   10 aa fe 09 00 00 80 8c  88 02 ff 09 00 30 20 90   .............0 .
18df0   68 06 06 10 04 16 70 5c  08 20 21 90 50 20 01 32   h.....p\. !.P .2
18e00   0c a0 3b 90 10 e0 33 90  10 a0 2b 90 0c a0 23 90   ..;...3...+...#.
18e10   04 41 21 59 07 16 80 5c  06 16 88 5c 04 16 90 5c   .A!Y...\...\...\
18e20   30 a8 fe 09 10 a0 2b 90  0c a0 23 90 04 41 29 59   0.....+...#..A)Y
18e30   10 e0 23 90 04 40 21 59  10 e0 23 92 08 a0 23 90   ..#..@!Y..#...#.
18e40   04 16 70 5c 08 20 21 90  b8 3f 01 35 00 30 20 90   ..p\. !..?.5.0 .
18e50   68 06 06 10 18 00 71 32  00 00 28 8c 04 a0 23 90   h.....q2..(...#.
18e60   08 20 29 92 00 30 18 90  68 06 06 10 00 30 30 90   . )..0..h....00.
18e70   60 06 06 10 10 e0 2b 90  0c e0 23 90 04 41 21 59   `.....+...#..A!Y
18e80   84 81 31 59 06 16 68 5c  0c a0 2b 90 10 e0 23 90   ..1Y..h\..+...#.
18e90   05 16 80 5c 04 16 88 5c  06 16 90 5c b4 a7 fe 09   ...\...\...\....
18ea0   10 e0 23 90 04 80 21 59  10 e0 23 92 10 a0 2b 90   ..#...!Y..#...+.
18eb0   0c a0 23 90 04 41 21 59  60 80 21 3e 00 30 70 92   ..#..A!Y`.!>.0p.
18ec0   68 06 06 10 00 30 28 90  68 06 06 10 0c 60 21 90   h....0(.h....`!.
18ed0   04 40 23 59 0c 60 21 92  00 30 20 90 68 06 06 10   .@#Y.`!..0 .h...
18ee0   0c 20 21 90 00 10 29 80  24 00 20 8c 14 00 29 3d   . !...).$. ...)=
18ef0   00 30 20 90 68 06 06 10  08 20 21 90 08 20 01 32   .0 .h.... !.. .2
18f00   70 01 ff 09 00 00 28 8c  00 30 20 90 68 06 06 10   p.....(..0 .h...
18f10   04 20 29 92 18 00 00 08  0e 16 80 5c 84 a0 fe 09   . )........\....
18f20   00 00 20 8c 00 30 20 92  68 06 06 10 0c e0 00 32   .. ..0 .h......2
18f30   03 16 80 5c 6c a0 fe 09  00 10 7b 92 00 30 20 88   ...\l.....{..0 .
18f40   20 06 06 10 01 20 21 8c  00 30 20 8a 20 06 06 10    .... !..0 . ...
```

```
Mar 27 18:20 1996  image.txt Page 154

18f50   00 30 20 90 68 06 06 10  0c 20 01 35 04 00 80 8c   .0 .h.... .5....
18f60   00 00 00 0a 03 00 80 8c  00 00 00 0a 00 00 00 00   ................
18f70   10 60 08 8c 10 16 78 5c  11 16 38 5c 48 e0 37 8c   .`....x\..8\H.7.
18f80   00 00 28 8c 06 00 20 8c  06 16 80 5c 05 16 88 5c   ..(.... ....\...\
18f90   04 16 90 5c 84 85 fe 0b  10 e0 2b 90 0c e0 23 90   ...\......+...#.
18fa0   04 41 21 59 04 16 1d 5c  24 20 31 39 0c e0 33 90   .A!Y...\$ 19..3.
18fb0   48 e0 2f 8c 06 00 20 8c  06 16 80 5c 05 16 88 5c   H./... ....\...\
18fc0   04 16 90 5c 8c a6 fe 09  54 00 00 0a 0c e0 2b 90   ...\....T.....+.
18fd0   48 e0 27 8c 05 16 80 5c  04 16 88 5c 03 16 90 5c   H.'....\...\...\
18fe0   70 a6 fe 09 08 e0 23 90  2c 20 01 32 08 e0 23 90   p.....#., .2..#.
18ff0   0c 20 31 90 48 e0 27 8c  04 c0 28 59 83 91 21 59   . 1.H.'...(Y..!Y
19000   06 16 80 5c 05 16 88 5c  04 16 90 5c 44 a6 fe 09   ...\...\...\D...
19010   0c 00 00 08 02 00 80 8c  00 00 00 0a 48 e0 2f 80   ............H./.
19020   24 00 20 8c 0c 00 29 3a  01 00 80 8c 00 00 00 0a   $. ...):........
19030   00 00 20 8c 40 e0 27 8a  4b e0 27 80 40 e0 27 82   .. .@.'.K.'.@.'.
19040   4c e0 27 80 41 e0 27 82  4d e0 2f 80 69 00 20 8c   L.'.A.'.M./.i. .
19050   24 00 29 3a 40 e0 2f 88  00 30 20 88 20 06 06 10   $.):@./..0 . ...
19060   14 00 29 3a 40 e0 27 88  0c 20 09 3a 02 00 80 8c   ..):@.'.. .:....
19070   00 00 00 0a 00 00 20 8c  00 d0 21 92 49 e0 27 80   ...... ...!.I.'.
19080   00 d0 21 82 4a e0 27 80  01 e0 21 82 00 d0 21 90   ..!.J.'...!...!.
19090   06 20 21 8c 00 d0 21 92  00 00 80 8c 00 00 00 0a   . !...!.........
190a0   61 6c 6c 6f 63 20 6d 65  6d 6f 72 79 20 66 61 69   alloc memory fai
190b0   6c 65 64 20 0a 00 00 00  8c 87 01 00 5c 89 01 00   led ........\...
190c0   94 87 01 00 98 88 01 00  c0 88 01 00 6c 88 01 00   ............l...
190d0   c0 88 01 00 b0 89 01 00  b8 89 01 00 c0 89 01 00   ................
190e0   d0 89 01 00 28 8b 01 00  30 8b 01 00 c8 89 01 00   ....(...0.......
190f0   78 8b 01 00 80 8b 01 00  88 8b 01 00 90 8b 01 00   x...............
19100   9c 8b 01 00 98 8b 01 00  9c 8b 01 00 90 8b 01 00   ................
19110   78 8b 01 00 98 8b 01 00  88 8b 01 00 00 00 00 00   x...............
19120   00 50 04 84 00 00 00 00  00 00 00 00 00 00 00 00   .P..............
19130   ff 00 20 8c 90 00 29 58  85 00 71 58 08 0c 34 59   .. ...)X..qX..4Y
19140   86 00 29 58 85 00 19 58  08 8c 39 59 87 00 29 58   ..)X...X..9Y..)X
19150   85 00 31 58 08 cc 29 59  85 00 29 58 85 00 29 58   ..1X..)Y..)X..)X
19160   08 8e 23 59 84 c3 20 58  08 0e 21 59 84 83 21 58   ..#Y.. X..!Y..!X
19170   08 0e 21 59 84 43 81 58  00 00 00 0a 00 00 00 00   ..!Y.C.X........
19180   00 30 20 8c ff ff 00 00  90 00 31 58 ff 00 20 8c   .0 .......1X.. .
19190   86 00 29 58 85 00 39 58  88 8d 29 59 00 30 20 8c   ..)X..9X..)Y.0 .
191a0   ff ff 00 00 85 00 29 58  ff 00 20 8c 85 00 29 58   ......)X.. ...)X
191b0   85 00 31 58 08 cf 29 59  00 30 20 8c ff ff 00 00   ..1X..)Y.0 .....
191c0   85 00 21 58 84 83 29 58  00 30 20 8c ff ff 00 00   ..!X..)X.0 .....
```

Mar 27 18:20 1996 image.txt Page 155

```
191d0   85 00 81 58 00 00 00 0a  00 00 00 00 00 00 00 00   ...X............
191e0   00 00 00 0a 00 00 00 00  00 00 00 00 00 00 00 00   ................
191f0   00 00 80 8c 00 00 00 0a  00 00 00 00 00 00 00 00   ................
19200   00 00 00 0a 00 00 00 00  00 00 00 00 00 00 00 00   ................
19210   10 16 30 5c 11 16 38 5c  00 00 18 8c 20 60 04 33   ..0\..8\.... `.3
19220   06 16 20 5c 02 a0 31 8c  00 10 21 88 03 00 19 59   .. \..1...!....Y
19230   01 c9 21 59 04 16 38 5c  e8 3f 01 34 10 cc 20 59   ..!Y..8\.?.4.. Y
19240   24 20 01 32 00 30 20 8c  ff ff 00 00 83 00 29 58   $ .2.0 .......)X
19250   10 cc 20 59 05 00 21 59  04 16 18 5c 10 0c 21 59   .. Y..!Y...\..!Y
19260   e4 3f 01 35 03 16 80 5c  00 00 00 0a 00 00 00 00   .?.5...\........
19270   10 16 38 5c 02 00 88 8c  b8 c6 fe 09 10 16 18 5c   ..8\...........\
19280   0c 20 04 35 00 00 80 8c  00 00 00 0a 0c e0 20 90   . .5.......... .
19290   04 c0 21 59 10 e0 20 92  0c e0 20 90 26 20 19 92   ..!Y.. ... .& ..
192a0   04 16 80 5c 00 00 00 0a  00 00 00 00 00 00 00 00   ...\............
192b0   10 16 18 5c 26 20 24 90  08 20 01 35 00 00 00 0a   ...\& $.. .5....
192c0   26 e0 80 90 dc 9c fe 08  00 00 00 00 00 00 00 00   &...............
192d0   10 16 38 5c 04 20 2c 8c  02 00 20 8c 05 16 80 5c   ..8\. ,... ....\
192e0   04 16 88 5c 4c c6 fe 09  10 16 18 5c 0c 20 04 35   ...\L......\. .5
192f0   00 00 80 8c 00 00 00 0a  0c e0 20 90 00 10 19 92   .......... .....
19300   0c e0 20 90 04 c0 21 59  04 20 21 8c 10 e0 20 92   .. ...!Y. !... .
19310   0c e0 20 90 04 20 21 8c  0c e0 20 92 0c e0 80 90   .. .. !... .....
19320   00 00 00 0a 00 00 00 00  00 00 00 00 00 00 00 00   ................
19330   04 09 24 59 00 10 21 90  04 16 18 5c 08 20 01 35   ..$Y..!....\. .5
19340   00 00 00 0a 03 16 80 5c  58 9c fe 08 00 00 00 00   .......\X.......
19350   00 00 20 8c 00 30 20 92  70 06 06 10 00 10 04 84   .. ..0 .p.......
19360   10 16 30 5c 11 16 38 5c  00 30 20 90 70 06 06 10   ..0\..8\.0 .p...
19370   10 20 01 3a 00 30 80 90  70 06 06 10 f4 a8 fe 09   . .:.0..p.......
19380   00 30 80 8c 50 93 01 00  07 16 88 5c 06 16 90 5c   .0..P......\...\
19390   d0 a8 fe 09 00 30 80 92  70 06 06 10 00 00 00 0a   .....0..p.......
193a0   03 00 80 8c 00 00 00 0a  00 00 00 00 00 00 00 00   ................
193b0   00 00 18 8c 00 00 28 8c  e0 00 20 8c 83 00 21 70   ......(... ...!p
193c0   00 34 29 92 90 06 06 10  e0 00 20 8c 83 00 21 70   .4)....... ...!p
193d0   00 34 29 8c 50 07 06 10  04 00 20 8c 05 16 80 5c   .4).P..... ....\
193e0   04 16 88 5c 7c a2 fe 09  00 00 28 8c e0 00 20 8c   ...\|.....(... .
193f0   83 00 21 70 00 34 29 c2  54 07 06 10 e0 00 20 8c   ..!p.4).T..... .
19400   83 00 21 70 00 34 29 c2  55 07 06 10 02 00 28 8c   ..!p.4).U.....(.
19410   e0 00 20 8c 83 00 21 70  00 34 29 c2 60 07 06 10   .. ...!p.4).`...
19420   00 00 28 8c e0 00 20 8c  83 00 21 70 00 34 29 92   ..(... ...!p.4).
19430   64 07 06 10 01 e0 20 8c  04 16 18 5c 78 3f 09 39   d..... ....\x?.9
19440   0e 00 20 8c 00 30 20 92  00 09 06 10 00 00 20 8c   .. ..0 ....... .
```

```
Mar 27 18:20 1996   image.txt Page 156

19450   00 30 20 92 70 06 06 10  a0 9f 00 08 00 00 00 00   .0 .p...........
19460   10 16 38 5c 10 4e 24 59  90 0d 19 59 34 e0 14 3d   ..8\.N$Y...Y4..=
19470   00 00 18 8c e0 00 20 8c  83 00 21 70 00 34 21 90   ...... ...!p.4!.
19480   90 06 06 10 2c 20 01 32  01 e0 20 8c 10 0e 21 59   ...., .2.. ...!Y
19490   90 0d 21 59 04 16 18 5c  dc 3f 09 39 14 00 00 08   ..!Y...\.?.9....
194a0   03 16 80 5c 0c 98 fe 09  10 0e 24 59 90 0d 19 59   ...\......$Y...Y
194b0   10 e0 08 39 00 30 80 8c  ff ff ff ff 00 00 00 0a   ...9.0..........
194c0   14 e0 21 90 0c 20 01 32  03 16 80 5c 00 00 00 0a   ..!.. .2...\....
194d0   e0 00 20 8c 83 00 21 70  00 34 39 92 90 06 06 10   .. ...!p.49.....
194e0   07 16 80 5c 3c b7 fe 09  e0 00 20 8c 83 00 21 70   ...\<..... ...!p
194f0   00 34 81 92 94 06 06 10  e0 00 20 8c 83 00 21 70   .4........ ...!p
19500   00 34 21 8c 90 06 06 10  14 e0 21 92 e0 00 20 8c   .4!.......!... .
19510   83 00 21 70 00 34 21 8c  90 06 06 10 00 30 20 92   ..!p.4!......0 .
19520   70 07 06 10 e0 00 20 8c  83 00 21 70 00 34 21 8c   p..... ...!p.4!.
19530   90 06 06 10 07 16 80 5c  e8 b6 fe 09 14 20 24 92   .......\..... $.
19540   03 16 80 5c 00 00 00 0a  00 00 00 00 00 00 00 00   ...\............
19550   10 16 38 5c 0c 20 04 32  14 e0 21 90 0c 20 01 35   ..8\. .2..!.. .5
19560   00 00 80 8c 00 00 00 0a  00 00 18 8c 00 00 28 8c   ..............(.
19570   e0 00 20 8c 83 00 21 70  00 34 29 92 90 06 06 10   .. ...!p.4).....
19580   e0 00 20 8c 83 00 21 70  00 34 29 92 94 06 06 10   .. ...!p.4).....
19590   e0 00 20 8c 83 00 21 70  00 34 29 8c 50 07 06 10   .. ...!p.4).P...
195a0   04 00 20 8c 05 16 80 5c  04 16 88 5c b4 a0 fe 09   .. ....\...\....
195b0   00 00 28 8c e0 00 20 8c  83 00 21 70 00 34 29 c2   ..(... ...!p.4).
195c0   54 07 06 10 e0 00 20 8c  83 00 21 70 00 34 29 c2   T..... ...!p.4).
195d0   55 07 06 10 02 00 28 8c  e0 00 20 8c 83 00 21 70   U.....(... ...!p
195e0   00 34 29 c2 60 07 06 10  00 00 28 8c e0 00 20 8c   .4).`.....(... .
195f0   83 00 21 70 00 34 29 92  64 07 06 10 01 e0 20 8c   ..!p.4).d..... .
19600   04 16 18 5c 68 3f 09 39  00 00 20 8c 14 e0 21 92   ...\h?.9.. ...!.
19610   07 16 80 5c 9c b6 fe 09  14 20 24 92 00 30 20 92   ...\..... $..0 .
19620   70 06 06 10 ac a2 00 09  04 16 80 5c 00 00 00 0a   p..........\....
19630   10 16 30 5c 11 16 38 5c  14 60 24 90 0d 20 19 80   ..0\..8\.`$.. ..
19640   0c e0 08 3a 83 00 20 8c  10 c0 20 3d 06 16 80 5c   ...:.. ... =...\
19650   07 16 88 5c 0c af fe 08  10 e0 70 3d 06 16 80 5c   ...\......p=...\
19660   07 16 88 5c fc ae fe 08  86 00 20 8c 60 c0 20 3d   ...\...... .`. =
19670   0c e0 21 90 00 10 21 80  14 20 09 30 00 00 20 8c   ..!...!.. .0.. .
19680   06 16 80 5c 04 16 88 5c  58 b8 fe 09 0c e0 21 90   ...\...\X.....!.
19690   00 10 21 80 30 20 01 30  06 16 80 5c 14 b6 fe 09   ..!.0 .0...\....
196a0   00 00 88 8c 3c b8 fe 09  0c e0 29 90 00 50 21 80   ....<.....)..P!.
196b0   01 0e 21 58 00 50 21 82  06 16 80 5c 07 16 88 5c   ..!X.P!....\...\
196c0   a0 ad fe 08 07 16 80 5c  d8 98 fe 08 0c e0 00 3d   .......\.......=
```

```
Mar 27 16:20 1996   image.txt Page 157

196d0   07 16 80 5c cc 98 fe 08  07 16 80 5c c4 98 fe 08   ...\.......\....
196e0   10 16 30 5c ac ad fe 09  10 16 38 5c 08 20 04 35   ..0\......8\. .5
196f0   00 00 00 0a 14 e0 21 90  0d 20 19 80 0c e0 08 3a   ......!.. .....:
19700   83 00 20 8c 20 c0 20 3d  06 16 80 5c 07 16 88 5c   .. . . =...\...\
19710   20 0a 00 09 2c 20 04 3a  06 16 80 5c 07 16 88 5c    ..., .:...\...\
19720   f0 af fe 08 14 e0 70 3d  06 16 80 5c 07 16 88 5c   ......p=...\...\
19730   80 01 00 09 0c 00 00 08  07 16 80 5c 64 98 fe 09   ...........\d...
19740   06 16 80 5c 7c ad fe 09  10 16 38 5c a0 3f 04 35   ...\|.....8\.?.5
19750   00 00 00 0a 00 00 00 00  00 00 00 00 00 00 00 00   ................
19760   10 16 30 5c 11 16 38 5c  14 60 24 90 0d 20 19 80   ..0\..8\.`$.. ..
19770   0c e0 08 3a 83 00 20 8c  10 c0 20 3d 06 16 80 5c   ...:.. ... =...\
19780   07 16 88 5c dc ad fe 08  86 00 20 8c 60 c0 20 3d   ...\...... .`. =
19790   0c e0 21 90 00 10 21 80  14 20 01 30 01 00 20 8c   ..!...!.. .0.. .
197a0   06 16 80 5c 04 16 88 5c  38 b7 fe 09 0c e0 21 90   ...\...\8.....!.
197b0   00 10 21 80 30 20 09 30  06 16 80 5c 64 54 fe 09   ..!.0 .0...\d...
197c0   01 00 88 8c 1c b7 fe 09  0c e0 29 90 00 50 21 80   ..........)..P!.
197d0   00 0e 21 58 00 50 21 82  06 16 80 5c 07 16 88 5c   ..!X.P!....\...\
197e0   80 ac fe 08 07 16 80 5c  b8 97 fe 08 07 16 80 5c   .......\.......\
197f0   b0 97 fe 08 00 00 00 00  00 00 00 00 00 00 00 00   ................
19800   10 16 30 5c bc ac fe 09  10 16 38 5c 08 20 04 35   ..0\......8\. .5
19810   00 00 00 0a 14 e0 21 90  0d 20 19 80 0c e0 08 3a   ......!.. .....:
19820   83 00 20 8c 20 c0 20 3d  06 16 80 5c 07 16 88 5c   .. . . =...\...\
19830   d0 07 00 09 18 20 04 3a  06 16 80 5c 07 16 88 5c   ..... .:...\...\
19840   d0 ae fe 08 07 16 80 5c  58 97 fe 09 06 16 80 5c   .......\X......\
19850   70 ac fe 09 10 16 38 5c  bc 3f 04 35 00 00 00 0a   p.....8\.?.5....
19860   00 00 00 00 65 70 69 00  00 00 00 00 00 00 00 00   ....epi.........
19870   81 00 28 8c 14 60 24 90  0d 20 29 82 e4 ab fe 08   ..(..`$.. ).....
19880   10 16 78 5c 11 16 18 5c  12 16 38 5c 0c e0 30 90   ..x\...\..8\..0.
19890   82 00 28 8c 14 e0 20 90  0d 20 29 82 10 a0 39 92   ..(... .. )...9.
198a0   c0 ab fe 08 00 00 00 00  00 00 00 00 00 00 00 00   ................
198b0   10 16 60 5c 11 16 68 5c  0c 60 24 90 00 10 71 90   ..`\..h\.`$...q.
198c0   00 30 20 8c 02 52 00 00  40 80 23 3d 0c 16 80 5c   .0 ..R..@.#=...\
198d0   0d 16 88 5c 9c 01 00 09  10 16 78 5c 10 20 04 3d   ...\......x\. .=
198e0   0c 16 80 5c 0d 16 88 5c  88 ff ff 08 08 e0 0b 3a   ...\...\.......:
198f0   00 00 00 0a 01 00 20 8c  0c 16 80 5c 0d 16 88 5c   ...... ....\...\
19900   04 16 90 5c 7c ff ff 08  00 30 20 8c 03 52 00 00   ...\|....0 ..R..
19910   40 80 23 3d 0c 16 80 5c  0d 16 88 5c 54 03 00 09   @.#=...\...\T...
19920   10 16 28 5c 10 20 04 3d  0c 16 80 5c 0d 16 88 5c   ..(\. .=...\...\
19930   40 ff ff 08 08 60 09 3a  00 00 00 0a 02 00 20 8c   @....`.:...... .
19940   0c 16 80 5c 0d 16 88 5c  04 16 90 5c 34 ff ff 08   ...\...\...\4...
```

Mar 27 18:20 1996 image.txt Page 158

```
19950   00 30 20 8c 04 52 00 00  40 80 23 3d 0c 16 80 5c   .0 ..R..@.#=...\
19960   0d 16 88 5c 2c 03 00 09  10 16 30 5c 10 20 04 3d   ...\,.....0\. .=
19970   0c 16 80 5c 0d 16 88 5c  18 fe ff 08 0d a0 09 3a   ...\...\.......:
19980   00 00 00 0a 03 00 20 8c  0c 16 80 5c 0d 16 88 5c   ...... ....\...\
19990   04 16 90 5c ec fe ff 08  00 30 20 8c 06 52 00 00   ...\.....0 ..R..
199a0   40 80 23 3d 0c 16 80 5c  0d 16 88 5c 84 03 00 09   @.#=...\...\....
199b0   10 16 38 5c 10 20 04 3d  0c 16 80 5c 0d 16 88 5c   ..8\. .=...\...\
199c0   b0 fe ff 08 08 e0 09 3a  00 00 00 0a 04 00 20 8c   .......:...... .
199d0   0c 16 80 5c 0d 16 88 5c  04 16 90 5c a4 fe ff 08   ...\...\...\....
199e0   00 30 20 8c 07 52 00 00  40 80 23 3d 0c 16 80 5c   .0 ..R..@.#=...\
199f0   0d 16 88 5c dc 03 00 09  10 16 18 5c 10 20 04 3d   ...\.......\. .=
19a00   0c 16 80 5c 0d 16 88 5c  68 fe ff 08 08 e0 08 3a   ...\...\h.......:
19a10   00 00 00 0a 05 00 20 8c  0c 16 80 5c 0d 16 88 5c   ...... ....\...\
19a20   04 16 90 5c 5c fe ff 0d  00 30 20 8c 05 44 00 00   ...\\....0 ..D..
19a30   28 80 23 3d 0c 16 80 5c  0d 16 88 5c 14 04 00 09   (.#=...\...\....
19a40   2c 20 04 3d 06 00 20 8c  0c 16 80 5c 0d 16 88 5c   , .=.. ....\...\
19a50   04 16 90 5c 2c fe ff 08  07 00 20 8c 0c 16 80 5c   ...\,...... ...\
19a60   0d 16 88 5c 04 16 90 5c  18 fe ff 08 00 00 00 0a   ...\...\........
19a70   10 16 68 5c 08 60 24 90  0c 20 71 90 14 20 24 90   ..h\.`$.. q.. $.
19a80   08 20 21 90 0c 20 01 32  01 00 80 8c 00 00 00 0a   . !.. .2........
19a90   14 60 1b 90 08 e0 38 8c  00 00 20 8c 08 e0 20 92   .`....8... ... .
19aa0   14 60 23 90 8a 20 21 8c  0c e0 20 92 00 00 20 8c   .`#.. !... ... .
19ab0   10 e0 20 92 14 e0 20 92  02 00 20 8c 18 e0 20 8a   .. ... ... ... .
19ac0   1e e0 28 8c 04 00 20 8c  0e 16 80 5c 05 16 88 5c   ..(... ....\...\
19ad0   04 16 90 5c 7c 9b fe 09  04 a0 33 8c 22 e0 28 8c   ...\|.....3.".(.
19ae0   06 16 80 5c 05 16 88 5c  04 16 90 5c 64 9b fe 09   ...\...\...\d...
19af0   08 a0 33 8c 26 e0 28 8c  06 16 80 5c 05 16 88 5c   ..3.&.(....\...\
19b00   04 16 90 5c 4c 9b fe 09  00 00 20 8c 2a e0 20 92   ...\L..... .*. .
19b10   2e e0 20 92 01 00 20 8c  32 e0 20 92 00 00 20 8c   .. ... .2. ... .
19b20   36 e0 20 92 3a e0 20 92  06 00 20 8c 3e e0 20 92   6. .:. ... .>. .
19b30   14 60 23 90 46 e0 20 92  ea 05 20 8c 4a e0 20 92   .`#.F. ... .J. .
19b40   00 00 20 8c 52 e0 20 92  04 16 28 5c 0c e0 20 90   .. .R. ..(\.. .
19b50   00 10 29 92 00 30 28 8c  f0 a1 01 00 0c e0 20 90   ..)..0(....... .
19b60   04 20 29 92 00 30 20 8c  80 96 98 00 4e e0 20 92   . )..0 .....N. .
19b70   00 30 20 90 00 23 06 10  1a e0 20 92 00 30 28 90   .0 ..#.... ..0(.
19b80   00 23 06 10 0c e0 20 90  18 20 29 92 00 30 20 8c   .#.... .. )..0 .
19b90   28 c9 05 10 42 e0 20 92  00 30 28 8c 30 2f 02 00   (...B. ..0(.0/..
19ba0   0c e0 20 90 08 20 29 92  00 30 28 8c 40 30 02 00   .. .. )..0(.@0..
19bb0   0c e0 20 90 0c 20 29 92  06 00 28 8c 0c e0 20 90   .. .. )...(... .
19bc0   2c 20 29 92 00 01 28 8c  0c e0 20 90 30 20 29 8a   , )...(... .0 ).
```

Mar 27 16:20 1996 image.txt Page 155

```
19bd0   0e 00 28 8c 0c e0 20 90  20 20 29 92 00 00 28 8c   ..(.... . )...(.
19be0   0c e0 20 90 14 20 29 92  0c e0 20 90 1c 20 29 92   .. .. )... .. ).
19bf0   0c e0 20 90 24 20 29 92  ea 05 28 8c 0c e0 20 90   .. .$ )...(... .
19c00   28 20 29 92 07 16 80 5c  d8 96 00 09 0c 20 04 3a   ( )....\...... .:
19c10   01 00 80 8c 00 00 00 0a  88 08 00 09 10 15 78 5c   ..............x\
19c20   0c 20 04 35 01 00 80 8c  00 00 00 0a 14 60 23 90   . .5.........`#.
19c30   c8 20 79 92 04 00 28 8c  14 60 23 90 c4 20 29 c2   . y...(..`#.. ).
19c40   30 06 00 09 02 00 28 8c  14 60 23 90 c5 20 29 c2   0.....(..`#.. ).
19c50   70 30 ff 09 0c 20 04 3d  01 00 80 8c 00 00 00 0a   p0... .=........
19c60   00 00 80 8c 00 00 00 0a  00 00 00 00 00 00 00 00   ................
19c70   14 20 2c 90 08 60 81 8c  28 36 00 09 00 00 20 8c   . ,..`..(...... .
19c80   08 60 21 92 04 16 80 5c  00 00 00 0a 00 00 00 00   .`!....\........
19c90   10 60 08 8c 40 e0 c7 b2  08 60 24 90 0c 20 61 90   .`..@....`$.. a.
19ca0   00 10 7b 90 04 20 1b 90  0c 20 73 90 14 20 24 90   ..{.. ... s.. $.
19cb0   08 20 e9 8c 00 30 b8 8c  a0 23 06 10 00 00 38 8c   . ...0...#....8.
19cc0   00 30 30 80 d8 23 06 10  00 30 28 80 d9 23 06 10   .00..#...0(..#..
19cd0   07 16 20 5c 0f 16 80 5c  03 16 88 5c 0e 16 90 5c   .. \...\...\...\
19ce0   1d 16 98 5c 17 16 a0 5c  07 16 a8 5c 06 16 b0 5c   ...\...\...\...\
19cf0   05 16 b8 5c 04 16 c0 5c  0d 16 c8 5c 84 a8 00 09   ...\...\...\....
19d00   10 20 83 92 10 20 23 90  10 20 01 35 01 00 80 8c   . ... #.. .5....
19d10   40 e0 c7 b0 00 00 00 0a  00 00 80 8c 40 e0 c7 b0   @...........@...
19d20   00 00 00 0a 00 00 00 00  00 00 00 00 00 00 00 00   ................
19d30   10 16 38 5c 08 60 24 90  0c 20 31 90 14 20 24 90   ..8\.`$.. 1.. $.
19d40   c0 20 29 8c 04 00 20 8c  06 16 80 5c 05 16 88 5c   . )... ....\...\
19d50   04 16 90 5c fc 98 fe 09  00 30 20 c0 30 ec 05 10   ...\.....0 .0...
19d60   60 20 01 3a 14 e0 21 90  c0 20 81 90 94 07 00 09   ` .:..!.. ......
19d70   10 16 18 5c 0c 20 04 35  01 00 80 8c 00 00 00 0a   ...\. .5........
19d80   14 e0 21 90 cc 20 19 92  01 00 28 8c 14 e0 21 90   ..!.. ....(...!.
19d90   c4 20 29 c2 00 30 30 8c  c0 9f 01 00 14 e0 29 90   . )..00.......).
19da0   00 30 20 8c c0 d4 01 00  06 16 80 5c 05 16 88 5c   .0 ........\...\
19db0   04 16 90 5c ac 9e fe 09  14 e0 21 90 d4 20 81 92   ...\......!.. ..
19dc0   00 00 80 8c 00 00 00 0a  00 00 00 00 00 00 00 00   ................
19dd0   10 16 18 5c 14 20 24 90  c0 20 29 8c 04 00 20 8c   ...\. $.. )... .
19de0   05 16 80 5c 04 16 88 5c  78 98 fe 09 00 30 20 c0   ...\...\x....0 .
19df0   30 ec 05 10 28 20 01 3a  14 e0 20 90 c4 20 21 c0   0...( .:.. .. !.
19e00   1c 20 21 3a 03 00 28 8c  14 e0 20 90 c4 20 29 c2   . !:..(.. .. ).
19e10   14 e0 20 90 cc 20 81 90  58 07 00 09 14 e0 20 90   .. .. ..X..... .
19e20   04 20 29 90 01 00 20 8c  05 16 80 5c 04 16 88 5c   . )... ....\...\
19e30   b0 b0 fe 09 14 e0 20 90  04 20 81 90 74 ae fe 09   ...... .. ..t...
19e40   01 00 88 8c 9c b0 fe 09  00 00 80 8c 00 00 00 0a   ................
```

```
Mar 27 18:20 1995  image.txt Page 160

19e50   10 60 08 8c 10 16 60 5c  11 16 68 5c 0c 60 1c 90   ..`....`\..h\.`..
19e60   08 60 74 90 14 20 3c 90  48 e0 37 8c 00 00 28 8c   .`t.. <.H.7...(.
19e70   06 00 20 8c 06 16 80 5c  05 16 88 5c 04 16 90 5c   .. ....\...\...\
19e80   98 76 fe 0b 1e e0 31 8c  48 e0 2f 8c 04 00 20 8c   .v....1.H./... .
19e90   06 16 80 5c 05 16 88 5c  04 16 90 5c b4 97 fe 09   ...\...\...\....
19ea0   0c e0 78 90 34 e0 33 35  48 e0 37 8c 0c a0 2b 90   ..x.4.35H.7...+.
19eb0   06 00 20 8c 06 16 80 5c  05 16 88 5c 04 16 90 5c   .. ....\...\...\
19ec0   90 97 fe 09 0c 16 80 5c  0d 16 88 5c a4 f9 ff 09   .......\...\....
19ed0   01 00 80 8c 00 00 00 0a  5c e0 53 35 48 e0 37 8c   ........\.S5H.7.
19ee0   0c a0 2b 90 06 00 20 8c  06 16 80 5c 05 16 88 5c   ..+... ....\...\
19ef0   04 16 90 5c 5c 97 fe 09  00 00 20 8c 40 e0 27 92   ...\\..... .@.'.
19f00   40 e0 37 8c 0c a0 23 90  06 20 29 8c 04 00 20 8c   @.7...#.. )... .
19f10   06 16 80 5c 05 16 88 5c  04 16 90 5c 34 97 fe 09   ...\...\...\4...
19f20   0c 16 80 5c 0d 16 88 5c  48 f9 ff 09 01 00 80 8c   ...\...\H.......
19f30   00 00 00 0a 78 e0 73 35  48 e0 37 8c 0c a0 2b 90   ....x.s5H.7...+.
19f40   06 00 20 8c 06 16 80 5c  05 16 88 5c 04 16 90 5c   .. ....\...\...\
19f50   00 97 fe 09 00 00 20 8c  40 e0 27 92 40 e0 37 8c   ...... .@.'.@.7.
19f60   0c a0 23 90 06 20 29 8c  04 00 20 8c 06 16 80 5c   ..#.. )... ....\
19f70   05 16 88 5c 04 16 90 5c  d8 96 fe 09 0c a0 23 90   ...\...\......#.
19f80   0a 20 29 8c 04 00 20 8c  06 16 80 5c 05 16 88 5c   . )... ....\...\
19f90   04 16 90 5c bc 96 fe 09  0c 16 80 5c 0d 16 88 5c   ...\.......\...\
19fa0   d0 f8 ff 09 01 00 80 8c  00 00 00 0a 00 00 80 8c   ................
19fb0   00 00 00 0a 00 00 00 00  00 00 00 00 00 00 00 00   ................
19fc0   10 16 30 5c 00 00 20 8c  d4 20 24 92 04 20 2c 90   ..0\.. .. $.. ,.
19fd0   01 00 20 8c 05 16 80 5c  04 16 88 5c 04 af fe 09   .. ....\...\....
19fe0   04 a0 81 90 cc ac fe 09  04 16 88 5c f4 ae fe 08   ...........\....
19ff0   45 54 30 00 00 00 00 00  00 00 00 00 00 00 00 00   ET0.............
1a000   10 16 60 5c 11 16 68 5c  00 00 38 8c 11 16 70 5c   ..`\..h\..8...p\
1a010   20 60 04 32 10 a0 2b 90  0c a0 23 90 04 41 21 59    `.2..+...#..A!Y
1a020   07 00 39 59 08 a0 23 90  04 16 70 5c e8 3f 01 35   ..9Y..#...p\.?.5
1a030   14 e0 01 3c 0d 16 80 5c  68 8f fe 09 00 00 80 8c   ...<...\h.......
1a040   00 00 00 0a 14 20 23 90  00 10 21 90 0c 20 81 90   ..... #...!.. ..
1a050   00 ab fe 09 0c 20 04 3d  01 00 80 8c 00 00 00 0a   ..... .=........
1a060   2a e0 29 8c 02 00 20 8c  05 16 80 5c 04 16 88 5c   *.)... ....\...\
1a070   c0 b8 fe 09 10 16 78 5c  14 20 04 35 0d 16 80 5c   ......x\. .5...\
1a080   20 8f fe 09 00 00 80 8c  00 00 00 0a 0c e0 2b 90    .............+.
1a090   05 16 18 5c 0c e0 23 90  2a 20 21 8c 0c e0 23 92   ...\..#.* !...#.
1a0a0   0c e0 23 90 16 60 21 92  0e 60 21 92 1a 60 39 92   ..#..`!..`!..`9.
1a0b0   12 60 39 92 26 60 79 92  0d 16 70 5c 44 60 03 32   .`9.&`y...p\D`.2
1a0c0   10 a0 2b 90 0c a0 23 90  04 41 31 59 06 16 38 5c   ..+...#..A1Y..8\
```

```
Mar 27 18:20 1996  image.txt Page 161

1a0d0   0c a0 25 90 0c e0 23 90  05 16 80 5c 04 16 88 5c   ..+...#....\...\
1a0e0   06 16 90 5c 6c 95 fe 09  0c e0 23 90 04 80 21 59   ...\l.....#...!Y
1a0f0   0c e0 23 92 08 a0 23 90  04 16 70 5c c4 3f 01 35   ..#...#...p\..5
1a100   14 20 23 90 08 20 21 8c  04 e0 20 92 00 00 20 8c   . #.. !... ... .
1a110   0c e0 20 6a 0d 16 80 5c  86 8e fe 09 03 16 80 5c   .. ....\.......\
1a120   a0 8c 00 09 04 16 80 5c  00 00 00 0a 00 00 00 00   .......\........
1a130   10 16 78 5c 11 16 38 5c  14 20 24 90 c0 20 31 8c   ..x\..8\. $.. 1.
1a140   00 30 28 8c 60 98 01 00  04 00 20 8c 06 16 80 5c   .0(.`..... ....\
1a150   05 16 88 5c 04 16 90 5c  28 62 01 08 14 20 04 3d   ...\...\(b... .=
1a160   07 16 60 5c 3c 8e fe 09  00 00 80 8c 00 00 00 0a   ...\<...........
1a170   14 e0 23 90 d0 20 21 c0  0c 20 09 3d 01 00 80 8c   ..#.. !.. .=....
1a180   00 00 00 0a 00 30 20 c0  30 ec 05 10 2c 20 01 3a   .....0 .0..., .:
1a190   14 e0 23 90 c4 20 21 c0  0c 20 11 3a 01 00 80 8c   ..#.. !.. .:....
1a1a0   00 00 00 0a 0f 16 80 5c  07 16 88 5c 54 0a 00 09   .......\...\T...
1a1b0   10 16 18 5c 28 00 00 08  14 e0 23 90 c5 20 21 c0   ...\(.....#.. !.
1a1c0   0c 20 11 3a 01 00 80 8c  00 00 00 0a 0f 16 80 5c   . .:...........\
1a1d0   07 16 88 5c ec 01 00 09  10 16 18 5c 03 16 80 5c   ...\.......\...\
1a1e0   00 00 00 0a 00 00 00 00  00 00 00 00 00 00 00 00   ................
1a1f0   10 16 30 5c 00 30 20 88  80 07 06 10 01 20 21 8c   ..0\.0 ...... !.
1a200   00 30 20 8a 80 07 06 10  26 20 3c 90 16 a0 21 90   .0 .....& <...!.
1a210   0c e0 21 92 0c e0 29 90  1a a0 21 90 05 00 21 59   ..!...)...!...!Y
1a220   10 e0 21 92 01 00 28 8c  14 e0 21 90 0d 20 29 82   ..!...(...!.. ).
1a230   04 a0 21 90 3e 20 21 90  04 20 21 90 0c 20 81 90   ..!.> !.. !.. ..
1a240   10 a9 fe 09 0c 20 04 3d  07 16 80 5c 54 8d fe 08   ..... .=...\T...
1a250   04 a0 21 90 3e 20 21 90  04 20 81 90 07 16 88 5c   ..!.> !.. .....\
1a260   b0 a8 fe 08 00 00 00 00  00 00 00 00 00 00 00 00   ................
1a270   ee 07 38 8c 00 30 30 8c  b0 a2 01 00 00 30 28 8c   ..8..00......0(.
1a280   a0 a2 01 00 00 00 20 8c  07 16 80 5c 06 16 88 5c   ...... ....\...\
1a290   05 16 90 5c 04 16 98 5c  b8 dd 00 08 00 00 00 00   ...\...\........
1a2a0   00 00 00 0a 00 00 00 00  00 00 00 00 00 00 00 00   ................
1a2b0   10 16 78 5c 00 00 20 8c  00 30 20 c2 30 ec 05 10   ..x\.. ..0 .0...
1a2c0   04 20 24 90 3e 20 21 90  c0 20 31 8c 00 30 28 8c   . $.> !.. 1..0(.
1a2d0   60 98 01 00 04 00 20 8c  06 16 80 5c 05 16 88 5c   `..... ....\...\
1a2e0   04 16 90 5c 9c 60 01 0b  68 20 04 3d 0e e0 2b 90   ...\.`..h .=..+.
1a2f0   00 30 20 90 00 09 06 10  05 00 21 59 0c 20 31 8c   .0 .......!Y. 1.
1a300   04 e0 23 90 3e 20 21 90  c0 20 29 8c 04 00 20 8c   ..#.> !.. )... .
1a310   06 16 80 5c 05 16 88 5c  04 16 90 5c 34 93 fe 09   ...\...\...\4...
1a320   0e e0 2b 90 00 30 20 90  00 09 06 10 05 00 21 59   ..+..0 .......!Y
1a330   0c 20 31 8c 00 30 28 8c  80 06 06 10 04 00 20 8c   . 1..0(....... .
1a340   06 16 80 5c 05 16 88 5c  04 16 90 5c 04 93 fe 09   ...\...\...\....
```

Mar 27 18:20 1996 image.txt Page 162

```
1a350   26 e0 23 90 04 16 38 5c  08 20 01 35 00 00 00 0a   &.#...8\. .5....
1a360   01 00 28 8c 14 e0 21 90  0d 20 29 82 16 e0 23 90   ..(...!.. )...#.
1a370   0c e0 21 92 0c e0 29 90  1a e0 23 90 05 00 21 59   ..!...)...#...!Y
1a380   10 e0 21 92 04 e0 23 90  3e 20 21 90 00 10 21 90   ..!...#.> !...!.
1a390   0c 20 81 90 bc a7 fe 09  0c 20 04 3d 07 16 80 5c   . ........ .=...\
1a3a0   00 8c fe 08 04 e0 23 90  3e 20 21 90 00 10 81 90   ......#.> !.....
1a3b0   07 16 88 5c 5c a7 fe 08  00 00 00 00 00 00 00 00   ...\\...........
1a3c0   10 16 60 5c 11 16 68 5c  11 16 78 5c 00 00 70 8c   ..`\..h\..x\..p.
1a3d0   20 60 04 32 10 e0 2b 90  0c e0 23 90 04 41 21 59    `.2..+...#..A!Y
1a3e0   8e 00 71 59 08 e0 23 90  04 15 78 5c e8 3f 01 35   ..qY..#...x\.?.5
1a3f0   14 a0 03 3d 0d 16 80 5c  a8 8b fe 09 00 00 80 8c   ...=...\........
1a400   00 00 00 0a 00 00 20 8c  0e 16 80 5c 04 16 88 5c   ...... ....\...\
1a410   c0 0b 00 09 10 16 38 5c  0c 20 04 35 01 00 80 8c   ......8\. .5....
1a420   00 00 00 0a 16 e0 19 90  0d 16 78 5c 40 60 03 32   ..........x\@`.2
1a430   0c e0 33 90 10 e0 2b 90  0c e0 23 90 04 41 21 59   ..3...+...#..A!Y
1a440   06 16 80 5c 03 16 68 5c  04 16 90 5c 04 92 fe 09   ...\...\...\....
1a450   10 e0 2b 90 0c e0 23 90  04 41 21 59 03 00 19 59   ..+...#..A!Y...Y
1a460   08 e0 23 90 04 16 78 5c  c8 3f 01 35 14 20 23 90   ..#...x\.?.5. #.
1a470   c0 20 31 90 ee 07 28 8c  05 16 20 5c 07 16 80 5c   . 1...(... \...\
1a480   06 16 88 5c 05 16 90 5c  04 16 98 5c 14 df 00 09   ...\...\...\....
1a490   0d 16 80 5c 0c 8b fe 09  00 00 80 8c 00 00 00 0a   ...\............
1a4a0   ee 07 18 8c 00 30 78 8c  88 13 00 00 00 30 70 8c   .....0x......0p.
1a4b0   f0 a5 01 00 00 30 38 8c  e0 aa 01 00 00 30 30 8c   .....08......00.
1a4c0   e0 ac 01 00 00 30 28 8c  b0 a7 01 00 00 30 20 8c   .....0(......0 .
1a4d0   f0 a8 01 00 03 16 80 5c  0f 16 88 5c 0e 16 90 5c   .......\...\...\
1a4e0   07 16 98 5c 06 16 a0 5c  05 16 a8 5c 04 16 b0 5c   ...\...\...\...\
1a4f0   70 b3 00 08 00 00 00 00  00 00 00 00 00 00 00 00   p...............
1a500   10 60 08 8c 40 e0 c7 b2  ee 07 18 8c 00 00 78 8c   .`..@.........x.
1a510   00 30 70 8c 88 13 00 00  00 30 e8 8c f0 a5 01 00   .0p......0......
1a520   00 30 38 8c e0 aa 01 00  00 30 30 8c e0 ac 01 00   .08......00.....
1a530   00 30 28 8c b0 a7 01 00  00 30 20 8c f0 a8 01 00   .0(......0 .....
1a540   03 16 88 5c 0f 16 90 5c  0e 16 98 5c 1d 16 a0 5c   ...\...\...\...\
1a550   07 16 a8 5c 06 16 b0 5c  05 16 b8 5c 04 16 c0 5c   ...\...\...\...\
1a560   00 b4 00 09 40 e0 c7 b0  00 00 00 0a 00 00 00 00   ....@...........
1a570   10 16 38 5c 00 00 18 8c  e0 00 20 8c 83 00 21 70   ..8\...... ...!p
1a580   00 34 21 90 5c 07 06 10  10 c0 21 32 01 e0 20 8c   .4!.\.....!2.. .
1a590   04 16 18 5c e4 3f 09 39  08 e0 08 39 00 00 00 0a   ...\.?.9...9....
1a5a0   e0 00 20 8c 83 00 21 70  00 34 21 90 64 07 06 10   .. ...!p.4!.d...
1a5b0   2c 20 01 32 e0 00 20 8c  83 00 21 70 00 34 81 90   , .2.. ...!p.4..
1a5c0   64 07 06 10 ac 96 fe 09  00 00 28 8c e0 00 20 8c   d.........(... .
```

Mar 27 18:20 1996 image.txt Page 103

```
1a5d0   8d 00 21 70 00 34 29 92  64 07 06 10 07 16 80 5c   ..!p.4).d......\
1a5e0   70 a7 00 08 00 00 00 00  00 00 00 00 00 00 00 00   p...............
1a5f0   10 60 08 8c 10 16 60 5c  00 00 6e 8c e0 00 20 8c   .`....`\..n... .
1a600   8d 00 21 70 00 34 21 90  5c 07 06 10 10 00 23 32   ..!p.4!.\.....#2
1a610   01 60 23 8c 04 16 68 5c  e4 3f 09 39 81 6e 03 5a   .`#...h\.?.9.n.Z
1a620   8c 00 00 11 00 00 6e 8c  e0 00 20 8c 8d 00 21 70   ......n... ...!p
1a630   00 34 21 c0 54 07 06 10  10 20 21 3a 01 60 23 8c   .4!.T.... !:.`#.
1a640   04 16 6e 5c e4 3f 09 39  08 60 0b 39 00 00 00 0a   ..n\.?.9.`.9....
1a650   e0 00 20 8c 8d 00 21 70  00 34 61 92 5c 07 06 10   .. ...!p.4a.\...
1a660   02 00 28 8c e0 00 20 8c  8d 00 21 70 00 34 29 c2   ..(... ...!p.4).
1a670   54 07 06 10 e0 00 20 8c  8d 00 21 70 00 34 29 c2   T..... ...!p.4).
1a680   60 07 06 10 00 30 28 8c  88 13 00 00 e0 00 20 8c   `....0(....... .
1a690   8d 00 21 70 00 34 29 8a  62 07 06 10 9d 20 23 90   ..!p.4).b.... #.
1a6a0   40 e0 27 92 05 00 78 8c  fd 03 70 8c 40 e0 3f 80   @.'...x...p.@.?.
1a6b0   41 e0 37 80 42 e0 2f 80  43 e0 27 80 0f 16 80 5c   A.7.B./.C.'....\
1a6c0   0e 16 88 5c 07 16 90 5c  06 16 98 5c 05 16 a0 5c   ...\...\...\...\
1a6d0   04 16 a8 5c fc 08 00 09  00 00 00 0a e0 00 20 8c   ...\.......... .
1a6e0   8d 00 21 70 00 34 21 90  64 07 06 10 2c 20 01 32   ..!p.4!.d..., .2
1a6f0   e0 00 20 8c 8d 00 21 70  00 34 81 90 64 07 06 10   .. ...!p.4..d...
1a700   70 95 fe 09 00 00 28 8c  e0 00 20 8c 8d 00 21 70   p.....(... ...!p
1a710   00 34 29 92 64 07 06 10  02 00 28 8c e0 00 20 8c   .4).d.....(... .
1a720   8d 00 21 70 00 34 29 c2  54 07 06 10 e0 00 20 8c   ..!p.4).T..... .
1a730   8d 00 21 70 00 34 29 c2  60 07 06 10 00 30 28 8c   ..!p.4).`....0(.
1a740   88 13 00 00 e0 00 20 8c  8d 00 21 70 00 34 29 8a   ...... ...!p.4).
1a750   62 07 06 10 e0 00 20 8c  8d 00 21 70 00 34 81 90   b..... ...!p.4..
1a760   94 06 06 10 9c 9a fe 09  9d 20 23 90 40 e0 27 92   ......... #.@.'.
1a770   05 00 18 8c f4 03 70 8c  40 e0 3f 80 41 e0 37 80   ......p.@.?.A.7.
1a780   42 e0 2f 80 43 e0 27 80  03 16 80 5c 0e 16 88 5c   B./.C.'....\...\
1a790   07 16 90 5c 06 16 98 5c  05 16 a0 5c 04 16 a8 5c   ...\...\...\...\
1a7a0   30 08 00 09 00 00 00 0a  00 00 00 00 00 00 00 00   0...............
1a7b0   10 60 08 8c 10 16 68 5c  00 00 70 8c e0 00 20 8c   .`....h\..p... .
1a7c0   8e 00 21 70 00 34 21 90  5c 07 06 10 10 40 23 32   ..!p.4!.\....@#2
1a7d0   01 a0 23 8c 04 16 70 5c  e4 3f 09 39 08 a0 0b 39   ..#...p\.?.9...9
1a7e0   00 00 00 0a e0 00 20 8c  8e 00 21 70 00 34 21 90   ...... ...!p.4!.
1a7f0   64 07 06 10 2c 20 01 32  e0 00 20 8c 8e 00 21 70   d..., .2.. ...!p
1a800   00 34 81 90 64 07 06 10  68 94 fe 09 00 00 28 8c   .4..d...h.....(.
1a810   e0 00 20 8c 8e 00 21 70  00 34 29 92 64 07 06 10   .. ...!p.4).d...
1a820   e0 00 20 8c 8e 00 21 70  00 34 29 90 94 06 06 10   .. ...!p.4).....
1a830   01 00 20 8c 05 16 80 5c  04 16 88 5c a4 a6 fe 09   .. ....\...\....
1a840   e0 00 20 8c 8e 00 21 70  00 34 81 90 94 06 06 10   .. ...!p.4......
```

```
Mar 27 16:20 1996  image.txt Page 164

1a850   60 a4 fe 09 01 00 88 8c  88 a6 fe 09 9d 60 23 90   `............`#.
1a860   40 e0 27 92 05 00 18 8c  f6 03 78 8c 40 e0 3f 80   @.'.......x.@.?.
1a870   41 e0 37 80 42 e0 2f 80  43 e0 27 80 0f 16 80 5c   A.7.B./.C.'....\
1a880   01 16 88 5c 07 16 90 5c  06 16 98 5c 05 16 a0 5c   ...\...\...\...\
1a890   04 16 a8 5c 3c 07 00 09  e0 00 20 8c 8e 00 21 70   ...\<...... ...!p
1a8a0   00 34 21 c0 54 07 06 10  08 20 19 3d 00 00 00 0a   .4!.T.... .=....
1a8b0   e0 00 20 8c 8e 00 21 70  00 34 21 c0 54 07 06 10   .. ...!p.4!.T...
1a8c0   08 20 21 3a 00 00 00 0a  03 00 28 8c e0 00 20 8c   . !=......(... .
1a8d0   8e 00 21 70 00 34 29 c2  54 07 06 10 0d 16 80 5c   ..!p.4).T......\
1a8e0   70 a4 00 09 00 00 00 0a  00 00 00 00 00 00 00 00   p...............
1a8f0   10 60 08 8c 10 16 60 5c  00 00 68 8c e0 00 20 8c   .`....`\..h... .
1a900   8d 00 21 70 00 34 21 90  5c 07 06 10 10 00 23 32   ..!p.4!.\.....#2
1a910   01 60 23 8c 04 16 68 5c  e4 3f 09 39 0a 60 0b 39   .`#...h\.?.9.`.9
1a920   00 00 00 0a e0 00 20 8c  8d 00 21 70 00 34 21 90   ...... ...!p.4!.
1a930   64 07 06 10 2c 20 01 32  e0 00 20 8c 8d 00 21 70   d..., .2.. ...!p
1a940   00 34 81 90 64 07 06 10  28 93 fe 09 00 00 28 8c   .4..d...(.....(.
1a950   e0 00 20 8c 8d 00 21 70  00 34 29 92 64 07 06 10   .. ...!p.4).d...
1a960   e0 00 20 8c 8d 00 21 70  00 34 29 90 94 06 06 10   .. ...!p.4).....
1a970   01 00 20 8c 05 16 80 5c  04 16 88 5c 64 a5 fe 09   .. ....\...\d...
1a980   e0 00 20 8c 8d 00 21 70  00 34 81 90 94 06 06 10   .. ...!p.4......
1a990   20 a3 fe 09 01 00 88 8c  48 a5 fe 09 9d 20 23 90    .......H.... #.
1a9a0   40 e0 27 92 05 00 78 8c  f7 03 e8 8c 40 e0 3f 80   @.'...x.....@.?.
1a9b0   41 e0 37 80 42 e0 2f 80  43 e0 27 80 0f 16 80 5c   A.7.B./.C.'....\
1a9c0   1d 16 88 5c 07 16 90 5c  06 16 98 5c 05 16 a0 5c   ...\...\...\...\
1a9d0   04 16 a8 5c fc 05 00 09  04 00 28 8c e0 00 20 8c   ...\......(... .
1a9e0   8d 00 21 70 00 34 29 c2  54 07 06 10 02 00 28 8c   ..!p.4).T.....(.
1a9f0   e0 00 20 8c 8d 00 21 70  00 34 29 c2 60 07 06 10   .. ...!p.4).`...
1aa00   00 00 28 8c e0 00 20 8c  8d 00 21 70 00 34 29 92   ..(... ...!p.4).
1aa10   5c 07 06 10 e0 00 20 8c  8d 00 21 70 00 34 29 8c   \..... ...!p.4).
1aa20   50 07 06 10 04 00 20 8c  05 16 80 5c 04 16 88 5c   P..... ....\...\
1aa30   30 8c fe 09 18 00 28 8c  02 00 20 8c 05 16 80 5c   0.....(... ....\
1aa40   04 16 88 5c ec ae fe 09  10 16 70 5c 0c 20 04 35   ...\......p\. .5
1aa50   00 00 80 8c 1c e6 fe 09  0c a0 23 90 18 20 21 8c   ..........#.. !.
1aa60   10 a0 23 92 0e 00 28 8c  14 a0 23 90 0d 20 29 82   ..#...(...#.. ).
1aa70   0c a0 2b 90 00 30 20 8c  08 52 00 00 00 50 21 92   ..+..0 ..R...P!.
1aa80   ff 00 20 8c 08 60 21 92  e0 00 20 8c 8d 00 21 70   .. ..`!... ...!p
1aa90   00 34 21 90 90 06 06 10  0c 20 81 90 b4 a0 fe 09   .4!...... ......
1aaa0   18 20 04 3d 0e 16 80 5c  f8 84 fe 09 00 00 80 8c   . .=...\........
1aab0   c0 e5 fe 09 00 00 00 0a  e0 00 20 8c 8d 00 21 70   .......... ...!p
1aac0   00 34 81 90 90 06 06 10  0e 16 88 5c 44 a0 fe 09   .4.........\D...
```

```
Mar 27 15:20 1996  image.txt Page 165

1aad0  00 00 00 0a 00 00 00 00  00 00 00 00 00 00 00 00  ................
1aae0  11 16 78 5c 01 00 20 8c  00 30 20 c2 30 ec 05 10  ..x\.. ..0 .0...
1aaf0  04 60 24 90 3e 20 21 90  c0 20 31 8c 00 30 28 8c  .`$.> !.. 1..0(.
1ab00  60 98 01 00 04 00 20 8c  06 16 80 5c 05 16 88 5c  `..... ....\...\
1ab10  04 16 90 5c 6c 5a 01 0b  6d 20 04 3d 0e e0 2b 90  ...\lZ..m .=..+.
1ab20  00 30 20 90 00 09 06 10  05 00 21 59 0c 20 31 8c  .0 .......!Y. 1.
1ab30  04 e0 23 90 3e 20 21 90  c0 20 29 8c 04 00 20 8c  ..#.> !.. )... .
1ab40  06 16 80 5c 05 16 88 5c  04 16 90 5c 04 8b fe 09  ...\...\...\....
1ab50  0e e0 2b 90 00 30 20 90  00 09 06 10 05 00 21 59  ..+..0 .......!Y
1ab60  0c 20 31 8c 00 30 28 8c  80 06 06 10 04 00 20 8c  . 1..0(....... .
1ab70  06 16 80 5c 05 16 88 5c  04 16 90 5c d4 8a fe 09  ...\...\...\....
1ab80  26 e0 23 90 04 15 38 5c  0c 20 01 35 00 00 80 8c  &.#...8\. .5....
1ab90  00 00 00 0a 01 00 28 8c  14 e0 21 90 0d 20 29 82  ......(...!.. ).
1aba0  16 e0 23 90 0c e0 21 92  0c e0 29 90 1a e0 23 90  ..#...!...)...#.
1abb0  05 00 21 59 10 e0 21 92  04 e0 23 90 3e 20 21 90  ..!Y..!...#.> !.
1abc0  00 10 21 90 0c 20 81 90  88 9f fe 09 10 20 04 3d  ..!.. ....... .=
1abd0  07 16 80 5c cc 83 fe 09  18 00 00 08 04 e0 23 90  ...\..........#.
1abe0  3e 20 21 90 00 10 81 90  07 16 88 5c 24 9f fe 09  > !........\$...
1abf0  04 e0 23 90 3e 20 21 90  d2 20 81 88 00 00 00 0a  ..#.> !.. ......
1ac00  10 16 60 5c 11 16 68 5c  11 16 78 5c 00 00 70 8c  ..`\..h\..x\..p.
1ac10  20 60 04 32 10 e0 2b 90  0c e0 23 90 04 41 21 59   `.2..+...#..A!Y
1ac20  8e 00 71 59 08 e0 23 90  04 16 78 5c e8 3f 01 35  ..qY..#...x\.?.5
1ac30  14 a0 03 3d 0d 16 80 5c  68 83 fe 09 00 00 80 8c  ...=...\h.......
1ac40  00 00 00 0a 0e 16 80 5c  68 a8 00 09 10 16 38 5c  .......\h.....8\
1ac50  0c 20 04 35 01 00 80 8c  00 00 00 0a 16 e0 19 90  . .5............
1ac60  0d 16 78 5c 40 60 03 32  0c e0 33 90 10 e0 2b 90  ..x\@`.2..3...+.
1ac70  0c e0 23 90 04 41 21 59  06 16 80 5c 03 16 88 5c  ..#..A!Y...\...\
1ac80  04 16 90 5c cc 89 fe 09  10 e0 2b 90 0c e0 23 90  ...\......+...#.
1ac90  04 41 21 59 03 00 19 59  08 e0 23 90 04 16 78 5c  .A!Y...Y..#...x\
1aca0  c8 3f 01 35 14 20 23 90  cc 20 81 90 07 16 88 5c  .?.5. #.. .....\
1acb0  50 9f 00 09 10 20 04 3d  01 00 28 8c 14 20 23 90  P.... .=..(.. #.
1acc0  d0 20 29 c2 0d 16 80 5c  d8 82 fe 09 00 00 80 8c  . )....\........
1acd0  00 00 00 0a 00 00 00 00  00 00 00 00 00 00 00 00  ................
1ace0  10 16 38 5c 00 00 18 8c  e0 00 20 8c 83 00 21 70  ..8\...... ...!p
1acf0  00 34 21 90 5c 07 06 10  10 c0 21 32 01 e0 20 8c  .4!.\.....!2.. .
1ad00  04 16 18 5c e4 3f 09 39  08 e0 08 39 00 00 00 0a  ...\.?.9...9....
1ad10  02 00 28 8c e0 00 20 8c  83 00 21 70 00 34 29 c2  ..(... ...!p.4).
1ad20  60 07 06 10 e0 00 20 8c  83 00 21 70 00 34 81 90  `..... ...!p.4..
1ad30  94 06 06 10 cc 94 fe 09  00 30 80 8c 48 ad 01 00  .........0..H...
1ad40  b0 8a fe 08 00 00 00 00  69 70 2d 32 0a 00 00 00  ........ip-2....
```

```
Mar 27 18:20 1996   image.txt Page 166

1ad50   00 00 20 8c 00 30 20 92  a0 07 06 10 01 00 20 8c   .. ..0 ....... .
1ad60   00 30 20 c2 90 07 06 10  00 00 20 8c 00 30 20 92   .0 ....... ..0 .
1ad70   94 07 06 10 00 30 20 c2  91 07 06 10 00 00 00 0a   .....0 .........
1ad80   10 16 30 5c 10 4e 24 59  90 0a 39 59 13 16 18 5c   ..0\.N$Y..9Y...\
1ad90   00 30 20 c0 90 07 06 10  10 20 11 3a 00 30 80 8c   .0 ...... .:.0..
1ada0   ff ff ff ff 00 00 00 0a  02 00 20 8c 00 30 20 c2   .......... ..0 .
1adb0   90 07 06 10 00 30 30 92  94 07 06 10 00 30 20 90   .....00......0 .
1adc0   e8 95 00 10 18 20 01 35  00 30 20 90 94 07 06 10   ..... .5.0 .....
1add0   0c 20 21 90 00 30 20 92  e8 95 00 10 0c e0 10 35   . !..0 ........5
1ade0   07 16 80 5c 00 00 00 0a  00 30 80 8c ff ff ff ff   ...\......0.....
1adf0   00 00 00 0a 00 00 00 00  00 00 00 00 00 00 00 00   ................
1ae00   00 30 28 90 e8 95 00 10  00 30 20 90 94 07 06 10   .0(......0 .....
1ae10   0c 20 21 90 10 00 29 35  00 00 20 8c 00 30 20 92   . !...)5.. ..0 .
1ae20   e8 95 00 10 00 00 20 8c  00 30 20 c2 90 07 06 10   ...... ..0 .....
1ae30   00 30 20 92 94 07 06 10  00 30 20 c2 91 07 06 10   .0 ......0 .....
1ae40   00 00 00 0a 00 00 00 00  63 6f 6e 66 00 00 00 00   ........conf....
1ae50   c8 00 90 8c 1c 00 00 08  00 00 00 00 00 00 00 00   ................
1ae60   81 00 28 8c 14 60 24 90  0d 20 29 82 f4 95 fe 08   ..(..`$.. ).....
1ae70   0c 60 34 90 82 00 28 8c  14 60 24 90 0d 20 29 82   .`4...(..`$.. ).
1ae80   10 a0 91 92 dc 95 fe 08  00 00 00 00 00 00 00 00   ................
1ae90   10 16 30 5c 11 16 38 5c  14 60 24 90 0d 20 19 80   ..0\..8\.`$.. ..
1aea0   24 e0 00 3d 00 30 20 c0  90 07 06 10 0c 20 11 3a   $..=.0 ...... .:
1aeb0   07 16 80 5c ec 80 fe 08  06 16 80 5c 07 16 88 5c   ...\.......\...\
1aec0   a0 96 fe 08 10 e0 70 3d  06 16 80 5c 07 16 88 5c   ......p=...\...\
1aed0   90 96 fe 08 86 00 20 8c  60 c0 20 3d 0c e0 21 90   ...... .`. =..!.
1aee0   00 10 21 80 14 20 09 30  00 00 20 8c 06 16 80 5c   ..!.. .0.. ....\
1aef0   04 16 88 5c ec 9f fe 09  0c e0 21 90 00 10 21 80   ...\......!...!.
1af00   30 20 01 30 06 16 80 5c  a8 9d fe 09 00 00 88 8c   0 .0...\........
1af10   d0 9f fe 09 0c e0 29 90  00 50 21 80 01 0e 21 58   ......)..P!...!X
1af20   00 50 21 82 06 16 80 5c  07 16 88 5c 34 95 fe 08   .P!....\...\4...
1af30   07 16 80 5c 6c 80 fe 08  07 16 80 5c 64 80 fe 08   ...\l......\d...
1af40   10 16 28 5c 7c 95 fe 09  10 16 30 5c 08 20 04 35   ..(\|.....0\. .5
1af50   00 00 00 0a 14 a0 21 90  0d 20 39 80 40 e0 01 3d   ......!.. 9.@..=
1af60   00 30 18 c0 91 07 06 10  10 e0 08 3d 06 16 80 5c   .0.........=...\
1af70   10 4f ff 09 44 00 00 08  18 e0 10 3d 06 16 80 5c   .O..D......=...\
1af80   e0 23 ff 09 06 16 80 5c  18 80 fe 09 2c 00 00 08   .#.....\....,...
1af90   06 16 80 5c 0c 80 fe 09  20 00 00 08 14 e0 71 3d   ...\.... .....q=
1afa0   05 16 80 5c 06 16 88 5c  a8 fe ff 09 0c 00 00 08   ...\...\........
1afb0   06 16 80 5c ec 7f fe 09  05 16 80 5c 04 95 fe 09   ...\.......\....
1afc0   10 16 30 5c 90 3f 04 35  00 00 00 0a 00 00 00 00   ..0\.?.5........
```

```
Mar 27 16:20 1996  image.txt Page 167

1afd0   90 61 06 8c 50 e0 c7 b2  08 a0 07 35 a0 e1 f7 8c   .a..P......5....
1afe0   1e 16 50 5c 40 e0 f7 92  00 00 f0 8c 00 90 82 92   ..P\@...........
1aff0   04 a0 8a 92 08 a0 92 9a  10 a0 a2 b2 20 a0 c2 b2   ............ ...
1b000   00 30 20 c0 b0 07 06 10  0c 20 01 3a 50 e0 c7 b0   .0 ...... .=P...
1b010   00 00 00 0a 70 e0 2f 8c  2c 01 20 8c 05 16 80 5c   ....p./.,. ....\
1b020   04 16 88 5c 3c 86 fe 09  88 8e fe 09 64 00 20 8c   ...\<.......d. .
1b030   84 05 24 70 05 16 80 5c  04 16 88 5c 74 76 00 09   ..$p...\...\tv..
1b040   05 16 80 5c 0c 56 01 0b  05 00 6c 59 40 e0 1f 90   ...\.V....lY@...
1b050   30 e0 20 8c 64 e0 27 92  04 a0 22 8c 60 e0 27 92   0. .d.'..."`.'.
1b060   60 e0 27 90 03 20 29 8c  00 30 20 8c fc ff ff ff   `.'.. )..0 .....
1b070   85 00 21 58 60 e0 27 92  60 e0 2f 90 04 60 21 8c   ..!X`.'.`./..`!.
1b080   60 e0 27 92 00 50 29 90  05 16 58 5c e9 03 20 8c   `.'..P)...X\.. .
1b090   74 40 21 3d 00 30 38 8c  f0 bc 01 00 60 e0 27 90   t@!=.08.....`.'.
1b0a0   03 20 29 8c 00 30 20 8c  fc ff ff ff 85 00 21 58   . )..0 .......!X
1b0b0   60 e0 27 92 60 e0 2f 90  04 60 21 8c 60 e0 27 92   `.'.`./..`!.`.'.
1b0c0   00 50 31 90 60 e0 27 90  03 20 29 8c 00 30 20 8c   .P1.`.'.. )..0 .
1b0d0   fc ff ff ff 85 00 21 58  60 e0 27 92 60 e0 2f 90   ......!X`.'.`./.
1b0e0   04 60 21 8c 60 e0 27 92  00 50 21 90 0d 16 80 5c   .`!.`.'..P!....\
1b0f0   07 16 88 5c 06 16 90 5c  04 16 98 5c 44 4c 01 09   ...\...\...\DL..
1b100   68 09 00 08 ea 03 20 8c  84 e0 02 5a cc 00 00 15   h..... ....Z....
1b110   00 30 18 8c 80 c0 01 00  60 e0 27 90 03 20 29 8c   .0......`.'.. ).
1b120   00 30 20 8c fc ff ff ff  85 00 21 58 60 e0 27 92   .0 .......!X`.'.
1b130   60 e0 2f 90 04 60 21 8c  60 e0 27 92 00 50 e9 90   `./..`!.`.'..P..
1b140   60 e0 27 90 03 20 29 8c  00 30 20 8c fc ff ff ff   `.'.. )..0 .....
1b150   85 00 21 58 60 e0 27 92  60 e0 2f 90 04 60 21 8c   ..!X`.'.`./..`!.
1b160   60 e0 27 92 00 50 39 90  60 e0 27 90 03 20 29 8c   `.'..P9.`.'.. ).
1b170   00 30 20 8c fc ff ff ff  85 00 21 58 60 e0 27 92   .0 .......!X`.'.
1b180   60 e0 2f 90 04 60 21 8c  60 e0 27 92 00 50 31 90   `./..`!.`.'..P1.
1b190   60 e0 27 90 03 20 29 8c  00 30 20 8c fc ff ff ff   `.'.. )..0 .....
1b1a0   85 00 21 58 60 e0 27 92  60 e0 2f 90 04 60 21 8c   ..!X`.'.`./..`!.
1b1b0   60 e0 27 92 00 50 21 90  0d 16 80 5c 03 16 88 5c   `.'..P!....\...\
1b1c0   1d 16 90 5c 07 16 98 5c  06 16 a0 5c 04 16 a8 5c   ...\...\...\...\
1b1d0   70 4b 01 09 94 08 00 08  f2 03 20 8c 84 e0 02 5a   pK........ ....Z
1b1e0   cc 00 00 15 00 30 e8 8c  f0 be 01 00 60 e0 27 90   .....0......`.'.
1b1f0   03 20 29 8c 00 30 20 8c  fc ff ff ff 85 00 21 58   . )..0 .......!X
1b200   60 e0 27 92 60 e0 2f 90  04 60 21 8c 60 e0 27 92   `.'.`./..`!.`.'.
1b210   00 50 19 90 60 e0 27 90  03 20 29 8c 00 30 20 8c   .P..`.'.. )..0 .
1b220   fc ff ff ff 85 00 21 58  60 e0 27 92 60 e0 2f 90   ......!X`.'.`./.
1b230   04 60 21 8c 60 e0 27 92  00 50 39 90 60 e0 27 90   .`!.`.'..P9.`.'.
1b240   03 20 29 8c 00 30 20 8c  fc ff ff ff 85 00 21 58   . )..0 .......!X
```

```
Mar 27 18:20 1996  image.txt Page 168

1b250   60 e0 27 92 60 e0 2f 90  04 60 21 8c 60 e0 27 92   `.'.`./..`!.`.'.
1b260   00 50 31 90 60 e0 27 90  03 20 29 8c 00 30 20 8c   .P1.`.'.. )..0 .
1b270   fc ff ff ff 85 00 21 58  60 e0 27 92 60 e0 2f 90   ......!X`.'.`./.
1b280   04 60 21 8c 60 e0 27 92  00 50 21 90 0d 16 80 5c   .`!.`.'..P!....\
1b290   1d 16 88 5c 03 16 90 5c  07 16 98 5c 06 16 a0 5c   ...\...\...\...\
1b2a0   04 16 a8 5c 9c 4a 01 09  c0 07 00 08 f3 03 20 8c   ...\.J.........
1b2b0   84 e0 02 5a cc 00 00 15  00 30 e8 8c c0 be 01 00   ...Z.....0......
1b2c0   60 e0 27 90 03 20 29 8c  00 30 20 8c fc ff ff ff   `.'.. )..0 .....
1b2d0   85 00 21 58 60 e0 27 92  60 e0 2f 90 04 60 21 8c   ..!X`.'.`./..`!.
1b2e0   60 e0 27 92 00 50 19 90  60 e0 27 90 03 20 29 8c   `.'..P..`.'.. ).
1b2f0   00 30 20 8c fc ff ff ff  85 00 21 58 60 e0 27 92   .0 .......!X`.'.
1b300   60 e0 2f 90 04 60 21 8c  60 e0 27 92 00 50 39 90   `./..`!.`.'..P9.
1b310   60 e0 27 90 03 20 29 8c  00 30 20 8c fc ff ff ff   `.'.. )..0 .....
1b320   85 00 21 58 60 e0 27 92  60 e0 2f 90 04 60 21 8c   ..!X`.'.`./..`!.
1b330   60 e0 27 92 00 50 31 90  60 e0 27 90 03 20 29 8c   `.'..P1.`.'.. ).
1b340   00 30 20 8c fc ff ff ff  85 00 21 58 60 e0 27 92   .0 .......!X`.'.
1b350   60 e0 2f 90 04 60 21 8c  60 e0 27 92 00 50 21 90   `./..`!.`.'..P!.
1b360   0d 16 80 5c 1d 16 88 5c  03 16 90 5c 07 16 98 5c   ...\...\...\...\
1b370   06 16 a0 5c 04 16 a8 5c  c8 49 01 09 ec 06 00 08   ...\...\.I......
1b380   f4 03 20 8c 84 e0 02 5a  cc 00 00 15 00 30 e8 8c   .. ....Z.....0..
1b390   50 bc 01 00 60 e0 27 90  03 20 29 8c 00 30 20 8c   P...`.'.. )..0 .
1b3a0   fc ff ff ff 85 00 21 58  60 e0 27 92 60 e0 2f 90   ......!X`.'.`./.
1b3b0   04 60 21 8c 60 e0 27 92  00 50 19 90 60 e0 27 90   .`!.`.'..P..`.'.
1b3c0   03 20 29 8c 00 30 20 8c  fc ff ff ff 85 00 21 58   . )..0 .......!X
1b3d0   60 e0 27 92 60 e0 2f 90  04 60 21 8c 60 e0 27 92   `.'.`./..`!.`.'.
1b3e0   00 50 39 90 60 e0 27 90  03 20 29 8c 00 30 20 8c   .P9.`.'.. )..0 .
1b3f0   fc ff ff ff 85 00 21 58  60 e0 27 92 60 e0 2f 90   ......!X`.'.`./.
1b400   04 60 21 8c 60 e0 27 92  00 50 31 90 60 e0 27 90   .`!.`.'..P1.`.'.
1b410   03 20 29 8c 00 30 20 8c  fc ff ff ff 85 00 21 58   . )..0 .......!X
1b420   60 e0 27 92 60 e0 2f 90  04 60 21 8c 60 e0 27 92   `.'.`./..`!.`.'.
1b430   00 50 21 90 0d 16 80 5c  1d 16 88 5c 03 16 90 5c   .P!....\...\...\
1b440   07 16 98 5c 06 16 a0 5c  04 16 a8 5c f4 48 01 09   ...\...\...\.H..
1b450   18 06 00 08 f5 03 20 8c  84 e0 02 5a f4 00 00 15   ...... ....Z....
1b460   00 30 e8 8c a0 bc 01 00  60 e0 27 90 03 20 29 8c   .0......`.'.. ).
1b470   00 30 20 8c fc ff ff ff  85 00 21 58 60 e0 27 92   .0 .......!X`.'.
1b480   60 e0 2f 90 04 60 21 8c  60 e0 27 92 00 50 19 90   `./..`!.`.'..P..
1b490   60 e0 27 90 03 20 29 8c  00 30 20 8c fc ff ff ff   `.'.. )..0 .....
1b4a0   85 00 21 58 60 e0 27 92  60 e0 2f 90 04 60 21 8c   ..!X`.'.`./..`!.
1b4b0   60 e0 27 92 00 50 99 90  60 e0 27 90 03 20 29 8c   `.'..P..`.'.. ).
1b4c0   00 30 20 8c fc ff ff ff  85 00 21 58 60 e0 27 92   .0 .......!X`.'.
```

```
Mar 27 18:20 1996  image.txt Page 169

1b4d0   60 e0 2f 90 04 60 21 8c  60 e0 27 92 00 50 39 90   `./..`!.`.'..P9.
1b4e0   60 e0 27 90 03 20 29 8c  00 30 20 8c fc ff ff ff   `.'.. )..0 .....
1b4f0   85 00 21 58 60 e0 27 92  60 e0 2f 90 04 60 21 8c   ..!X`.'.`./..`!.
1b500   60 e0 27 92 00 50 31 90  60 e0 27 90 03 20 29 8c   `.'..P1.`.'.. ).
1b510   00 30 20 8c fc ff ff ff  85 00 21 58 60 e0 27 92   .0 .......!X`.'.
1b520   60 e0 2f 90 04 60 21 8c  60 e0 27 92 00 50 21 90   `./..`!.`.'..P!.
1b530   0d 16 80 5c 1d 16 88 5c  03 16 90 5c 07 16 a0 5c   ...\...\...\...\
1b540   06 16 a8 5c 04 16 b0 5c  f8 47 01 09 1c 05 00 08   ...\...\.G......
1b550   f8 03 20 8c 84 e0 02 5a  cc 00 00 15 00 30 18 8c   .. ....Z.....0..
1b560   30 c0 01 00 60 e0 27 90  03 20 29 8c 00 30 20 8c   0...`.'.. )..0 .
1b570   fc ff ff ff 85 00 21 58  60 e0 27 92 60 e0 2f 90   ......!X`.'.`./.
1b580   04 60 21 8c 60 e0 27 92  00 50 e9 90 60 e0 27 90   .`!.`.'..P..`.'.
1b590   03 20 29 8c 00 30 20 8c  fc ff ff ff 85 00 21 58   . )..0 .......!X
1b5a0   60 e0 27 92 60 e0 2f 90  04 60 21 8c 60 e0 27 92   `.'.`./..`!.`.'.
1b5b0   00 50 39 90 60 e0 27 90  03 20 29 8c 00 30 20 8c   .P9.`.'.. )..0 .
1b5c0   fc ff ff ff 85 00 21 58  60 e0 27 92 60 e0 2f 90   ......!X`.'.`./.
1b5d0   04 60 21 8c 60 e0 27 92  00 50 31 90 60 e0 27 90   .`!.`.'..P1.`.'.
1b5e0   03 20 29 8c 00 30 20 8c  fc ff ff ff 85 00 21 58   . )..0 .......!X
1b5f0   60 e0 27 92 60 e0 2f 90  04 60 21 8c 60 e0 27 92   `.'.`./..`!.`.'.
1b600   00 50 21 90 0d 16 80 5c  03 16 88 5c 1d 16 90 5c   .P!....\...\...\
1b610   07 16 98 5c 06 16 a0 5c  04 16 a8 5c 24 47 01 09   ...\...\...\$G..
1b620   48 04 00 08 f7 03 20 8c  84 e0 02 5a cc 00 00 15   H..... ....Z....
1b630   00 30 e8 8c e0 bf 01 00  60 e0 27 90 03 20 29 8c   .0......`.'.. ).
1b640   00 30 20 8c fc ff ff ff  85 00 21 58 60 e0 27 92   .0 .......!X`.'.
1b650   60 e0 2f 90 04 60 21 8c  60 e0 27 92 00 50 19 90   `./..`!.`.'..P..
1b660   60 e0 27 90 03 20 29 8c  00 30 20 8c fc ff ff ff   `.'.. )..0 .....
1b670   85 00 21 58 60 e0 27 92  60 e0 2f 90 04 60 21 8c   ..!X`.'.`./..`!.
1b680   60 e0 27 92 00 50 39 90  60 e0 27 90 03 20 29 8c   `.'..P9.`.'.. ).
1b690   00 30 20 8c fc ff ff ff  85 00 21 58 60 e0 27 92   .0 .......!X`.'.
1b6a0   60 e0 2f 90 04 60 21 8c  60 e0 27 92 00 50 31 90   `./..`!.`.'..P1.
1b6b0   60 e0 27 90 03 20 29 8c  00 30 20 8c fc ff ff ff   `.'.. )..0 .....
1b6c0   85 00 21 58 60 e0 27 92  60 e0 2f 90 04 60 21 8c   ..!X`.'.`./..`!.
1b6d0   60 e0 27 92 00 50 21 90  0d 16 80 5c 1d 16 88 5c   `.'..P!....\...\
1b6e0   03 16 90 5c 07 16 98 5c  06 16 a0 5c 04 16 a8 5c   ...\...\...\...\
1b6f0   50 46 01 09 74 03 00 08  fd 03 20 8c 84 e0 02 5a   PF..t..... ....Z
1b700   cc 00 00 15 00 30 e8 8c  00 bc 01 00 60 e0 27 90   .....0......`.'.
1b710   03 20 29 8c 00 30 20 8c  fc ff ff ff 85 00 21 58   . )..0 .......!X
1b720   60 e0 27 92 60 e0 2f 90  04 60 21 8c 60 e0 27 92   `.'.`./..`!.`.'.
1b730   00 50 19 90 60 e0 27 90  03 20 29 8c 00 30 20 8c   .P..`.'.. )..0 .
1b740   fc ff ff ff 85 00 21 58  60 e0 27 92 60 e0 2f 90   ......!X`.'.`./.
```

Mar 27 18:20 1996 image.txt Page 170

```
1b750   04 60 21 8c 60 e0 27 92  00 50 39 90 60 e0 27 90   .`!.`.'..P9.`.'.
1b760   03 20 29 8c 00 30 20 8c  fc ff ff ff 85 00 21 58   . )..0 .......!X
1b770   60 e0 27 92 60 e0 2f 90  04 60 21 8c 60 e0 27 92   `.'.`./..`!.`.'.
1b780   00 50 31 90 60 e0 27 90  03 20 29 8c 00 30 20 8c   .P1.`.'.. )..0 .
1b790   fc ff ff ff 85 00 21 58  60 e0 27 92 60 e0 2f 90   ......!X`.'.`./.
1b7a0   04 60 21 8c 60 e0 27 92  00 50 21 90 0d 16 80 5c   .`!.`.'..P!....\
1b7b0   1d 16 88 5c 03 16 90 5c  07 16 98 5c 06 16 a0 5c   ...\...\...\...\
1b7c0   04 16 a8 5c 7c 45 01 09  a0 02 00 08 fe 03 20 8c   ...\|E........ .
1b7d0   1c c0 22 3d 00 30 20 8c  60 be 01 00 0d 16 80 5c   .."=.0 .`......\
1b7e0   04 16 88 5c 5c 45 01 09  80 02 00 08 ff 03 20 8c   ...\\E........ .
1b7f0   48 c0 22 3d 00 30 30 8c  20 bf 01 00 60 e0 27 90   H."=.00. ...`.'.
1b800   03 20 29 8c 00 30 20 8c  fc ff ff ff 85 00 21 58   . )..0 .......!X
1b810   60 e0 27 92 60 e0 2f 90  04 60 21 8c 60 e0 27 92   `.'.`./..`!.`.'.
1b820   00 50 21 90 0d 16 80 5c  06 16 88 5c 04 16 90 5c   .P!....\...\...\
1b830   10 45 01 09 34 02 00 08  4d 04 20 8c 48 c0 22 3d   .E..4...M. .H."=
1b840   00 30 30 8c 30 be 01 00  60 e0 27 90 03 20 29 8c   .00.0...`.'.. ).
1b850   00 30 20 8c fc ff ff ff  85 00 21 58 60 e0 27 92   .0 .......!X`.'.
1b860   60 e0 2f 90 04 60 21 8c  60 e0 27 92 00 50 21 90   `./..`!.`.'..P!.
1b870   0d 16 80 5c 06 16 88 5c  04 16 90 5c c4 44 01 09   ...\...\...\.D..
1b880   e8 01 00 08 4e 04 20 8c  48 c0 22 3d 00 30 30 8c   ....N. .H."=.00.
1b890   b0 bd 01 00 60 e0 27 90  03 20 29 8c 00 30 20 8c   ....`.'.. )..0 .
1b8a0   fc ff ff ff 85 00 21 58  60 e0 27 92 60 e0 2f 90   ......!X`.'.`./.
1b8b0   04 60 21 8c 60 e0 27 92  00 50 21 90 0d 16 80 5c   .`!.`.'..P!....\
1b8c0   06 16 88 5c 04 16 90 5c  78 44 01 09 9c 01 00 08   ...\...\xD......
1b8d0   4f 04 20 8c 1c c0 22 3d  00 30 20 8c 90 bd 01 00   O. ..."=.0 .....
1b8e0   0d 16 80 5c 04 16 88 5c  58 44 01 09 7c 01 00 08   ...\...\XD..|...
1b8f0   50 04 20 8c 48 c0 22 3d  00 30 30 8c a0 bf 01 00   P. .H."=.00.....
1b900   60 e0 27 90 03 20 29 8c  00 30 20 8c fc ff ff ff   `.'.. )..0 .....
1b910   85 00 21 58 60 e0 27 92  60 e0 2f 90 04 60 21 8c   ..!X`.'.`./..`!.
1b920   60 e0 27 92 00 50 21 90  0d 16 80 5c 06 16 88 5c   `.'..P!....\...\
1b930   04 16 90 5c 0c 44 01 09  30 01 00 08 51 04 20 8c   ...\.D..0...Q. .
1b940   48 c0 22 3d 00 30 30 8c  f0 bd 01 00 60 e0 27 90   H."=.00.....`.'.
1b950   03 20 29 8c 00 30 20 8c  fc ff ff ff 85 00 21 58   . )..0 .......!X
1b960   60 e0 27 92 60 e0 2f 90  04 60 21 8c 60 e0 27 92   `.'.`./..`!.`.'.
1b970   00 50 21 90 0d 16 80 5c  06 16 88 5c 04 16 90 5c   .P!....\...\...\
1b980   c0 43 01 09 e4 00 00 08  52 04 20 8c 48 c0 22 3d   .C......R. .H."=
1b990   00 30 30 8c d0 bd 01 00  60 e0 27 90 03 20 29 8c   .00.....`.'.. ).
1b9a0   00 30 20 8c fc ff ff ff  85 00 21 58 60 e0 27 92   .0 .......!X`.'.
1b9b0   60 e0 2f 90 04 60 21 8c  60 e0 27 92 00 50 21 90   `./..`!.`.'..P!.
1b9c0   0d 16 80 5c 06 16 88 5c  04 16 90 5c 74 43 01 09   ...\...\...\tC..
```

```
Mar 27 18:20 1996  image.txt Page 171

1b9d0   98 00 00 08 53 04 20 8c  48 c0 22 3d 00 30 30 8c   ....S. .H."=.00.
1b9e0   10 be 01 00 60 e0 27 90  03 20 29 8c 00 30 20 8c   ....`.'.. )..0 .
1b9f0   fc ff ff ff 85 00 21 58  60 e0 27 92 60 e0 2f 90   ......!X`.'.`./.
1ba00   04 60 21 8c 60 e0 27 92  00 50 21 90 0d 16 80 5c   .`!.`.'..P!....\
1ba10   05 16 88 5c 04 16 90 5c  28 43 01 09 4c 00 00 08   ...\...\(C..L...
1ba20   54 04 20 8c 30 c0 22 3d  00 30 20 8c 60 bf 01 00   T. .0."=.0 .`...
1ba30   0d 16 80 5c 04 16 88 5c  08 43 01 09 00 30 20 8c   ...\...\.C...0 .
1ba40   50 bd 01 00 0d 16 80 5c  04 16 88 5c 1c 4a 01 0b   P......\...\.J..
1ba50   18 00 00 08 00 30 20 8c  90 be 01 00 0d 16 80 5c   .....0 ........\
1ba60   04 16 88 5c dc 42 01 09  70 e0 87 8c e4 4b 01 0b   ...\.B..p....K..
1ba70   02 00 88 8c bc 9e fe 09  10 16 70 5c 0c 20 04 35   ..........p\. .5
1ba80   50 e0 c7 b0 00 00 00 0a  00 00 28 8c 14 a0 23 90   P.........(...#.
1ba90   0d 20 29 82 70 e0 6f 8c  0d 16 80 5c b4 4b 01 0b   . ).p.o....\.K..
1baa0   42 00 20 8c 14 00 81 3b  70 e0 87 8c a4 4b 01 0b   B. ....;p....K..
1bab0   10 16 48 5c 08 00 00 08  42 00 48 8c 10 a0 23 90   ..H\....B.H...#.
1bac0   0d 16 80 5c 04 16 88 5c  09 16 90 5c 84 7b fe 09   ...\...\...\.{..
1bad0   10 a0 23 90 04 40 22 59  10 a0 23 92 0d 40 6a 59   ..#..@"Y..#..@jY
1bae0   70 e0 87 8c 6c 4b 01 0b  89 01 24 59 04 16 60 5c   p...lK....$Y..`\
1baf0   74 20 01 3b 00 30 30 8c  e0 bb 01 00 10 a0 2b 90   t .;.00.......+.
1bb00   11 00 20 8c 06 16 80 5c  05 16 88 5c 04 16 90 5c   .. ....\...\...\
1bb10   40 7b fe 09 10 a0 23 90  11 20 21 8c 10 a0 23 92   @{....#.. !...#.
1bb20   33 00 20 8c 0c 00 61 3b  0c 16 78 5c 08 00 00 08   3. ...a;..x\....
1bb30   33 00 78 8c 10 a0 23 90  0d 16 80 5c 04 16 88 5c   3.x...#....\...\
1bb40   0f 16 90 5c 0c 7b fe 09  10 a0 23 90 04 c0 23 59   ...\.{....#...#Y
1bb50   10 a0 23 92 0d c0 6b 59  8f 01 23 59 04 16 60 5c   ..#...kY..#Y..`\
1bb60   94 3f 01 3c 0e 16 80 5c  f8 17 ff 09 0e 16 80 5c   .?.<...\.......\
1bb70   30 74 fe 09 50 e0 c7 b0  00 00 00 0a 00 00 00 00   0t..P...........
1bb80   10 16 68 5c 00 30 20 80  80 06 06 10 10 20 01 3a   ..h\.0 ...... .:
1bb90   00 30 70 8c 80 06 06 10  0c 00 00 08 00 30 70 90   .0p..........0p.
1bba0   34 ec 05 10 06 00 18 8c  f5 03 78 8c 00 90 3b 80   4.........x...;.
1bbb0   01 a0 33 80 02 a0 2b 80  03 a0 23 80 03 16 80 5c   ..3...+...#....\
1bbc0   0f 16 88 5c 07 16 90 5c  06 16 98 5c 05 16 a0 5c   ...\...\...\...\
1bbd0   04 16 a8 5c 0d 16 b0 5c  f8 f3 ff 08 00 00 00 00   ...\...\........
1bbe0   0d 20 20 20 20 20 20 20  20 20 20 20 20 20 20 20   .
1bbf0   00 00 00 00 00 00 00 00  00 00 00 00 00 00 00 00   ................
1bc00   20 31 30 32 31 20 50 41  53 53 61 46 41 58 20 73    1021 PASSaFAX s
1bc10   65 73 73 69 6f 6e 20 72  65 71 75 65 73 74 20 66   ession request f
1bc20   72 6f 6d 20 50 41 53 53  61 46 41 58 20 61 74 20   rom PASSaFAX at
1bc30   20 20 20 20 20 20 20 20  20 20 20 25 33 64 2e 25              %3d.%
1bc40   33 64 2e 25 33 64 2e 25  33 64 0d 00 00 00 00 00   3d.%3d.%3d......
```

Mar 27 18:20 1996  image.txt Page 172

```
1bc50   20 31 30 31 32 20 50 41  53 53 61 46 41 58 20 73    1012 PASSaFAX s
1bc60   65 73 73 69 6f 6e 20 63  72 65 61 74 65 64 20 77   ession created w
1bc70   69 74 68 20 50 41 53 53  61 46 41 58 20 61 74 20   ith PASSaFAX at
1bc80   20 20 20 20 20 20 20 20  20 20 20 25 33 64 2e 25              %3d.%
1bc90   33 64 2e 25 33 64 2e 25  33 64 0d 00 00 00 00 00   3d.%3d.%3d......
1bca0   20 31 30 31 33 20 50 41  53 53 61 46 41 58 20 73    1013 PASSaFAX s
1bcb0   65 73 73 69 6f 6e 20 77  69 74 68 20 50 41 53 53   ession with PASS
1bcc0   61 46 41 58 20 61 74 20  25 33 64 2e 25 33 64 2e   aFAX at %3d.%3d.
1bcd0   25 33 64 2e 25 33 64 20  20 20 20 66 61 69 6c 65   %3d.%3d    faile
1bce0   64 2e 20 52 65 61 73 6f  6e 3a 20 25 73 0d 00 00   d. Reason: %s...
1bcf0   20 31 30 30 31 20 4f 70  65 72 61 74 6f 72 20 72    1001 Operator r
1bd00   65 71 75 65 73 74 65 64  20 50 41 53 53 61 46 41   equested PASSaFA
1bd10   58 20 73 65 73 73 69 6f  6e 20 2d 20 64 69 61 6c   X session - dial
1bd20   20 74 61 62 6c 65 20 20  65 6e 74 72 79 20 25 32    table  entry %2
1bd30   64 2c 20 50 53 54 4e 20  6e 75 6d 62 65 72 20 25   d, PSTN number %
1bd40   73 0d 00 00 00 00 00 00  00 00 00 00 00 00 00 00   s...............
1bd50   2d 2d 2d 2d 2d 2d 2d 2d  2d 2d 2d 2d 2d 2d 2d 2d   ----------------
*
1bd80   2d 0d 00 00 00 00 00 00  00 00 00 00 00 00 00 00   -...............
1bd90   20 31 31 30 33 20 46 61  78 20 61 6e 73 77 65 72    1103 Fax answer
1bda0   64 0d 00 00 00 00 00 00  00 00 00 00 00 00 00 00   d...............
1bdb0   20 31 31 30 32 20 44 69  61 6c 69 6e 67 3a 20 25    1102 Dialing: %
1bdc0   73 0d 00 00 00 00 00 00  00 00 00 00 00 00 00 00   s...............
1bdd0   20 31 31 30 36 20 50 61  67 65 20 25 64 20 65 6e    1106 Page %d en
1bde0   64 65 64 0d 00 00 00 00  00 00 00 00 00 00 00 00   ded.............
1bdf0   20 31 31 30 35 20 50 61  67 65 20 25 64 20 73 74    1105 Page %d st
1be00   61 72 74 65 64 0d 00 00  00 00 00 00 00 00 00 00   arted...........
1be10   20 31 31 30 37 20 50 61  67 65 20 25 64 20 63 6f    1107 Page %d co
1be20   6e 66 69 72 6d 65 64 0d  00 00 00 00 00 00 00 00   nfirmed.........
1be30   20 31 31 30 31 20 43 6f  6e 74 61 63 74 69 6e 67    1101 Contacting
1be40   20 66 61 78 20 61 74 20  70 6f 72 74 20 25 64 0d    fax at port %d.
1be50   00 00 00 00 00 00 00 00  00 00 00 00 00 00 00 00   ................
1be60   20 31 30 32 32 20 50 41  53 53 61 46 41 58 20 73    1022 PASSaFAX s
1be70   65 73 73 69 6f 6e 20 72  65 71 75 65 73 74 20 67   ession request g
1be80   72 61 6e 74 65 64 0d 00  00 00 00 00 00 00 00 00   ranted..........
1be90   20 21 21 21 21 21 21 21  21 21 21 21 21 21 20 45    !!!!!!!!!!!!! E
1bea0   20 52 20 52 20 4f 20 52  20 63 6f 64 65 20 69 6e    R R O R code in
1beb0   20 45 76 65 6e 74 5f 4c  6f 67 0d 00 00 00 00 00    Event_Log......
1bec0   20 31 30 31 31 20 50 41  53 53 61 46 41 58 20 61    1011 PASSaFAX a
1bed0   74 20 25 33 64 2e 25 33  64 2e 25 33 64 2e 25 33   t %3d.%3d.%3d.%3
```

```
Mar 27 18:20 1996  image.txt Page 173

1bee0  64 20 63 6f 6e 74 61 63  74 65 64 0a 00 00 00 00   d contacted.....
1bef0  20 31 30 31 30 20 43 6f  6e 74 61 63 74 69 6e 67    1010 Contacting
1bf00  20 50 41 53 53 61 46 41  58 20 61 74 20 25 33 64    PASSaFAX at %3d
1bf10  2e 25 33 64 2e 25 33 64  2e 25 33 64 0a 00 00 00   .%3d.%3d.%3d....
1bf20  20 31 30 32 33 20 50 41  53 53 61 46 41 58 20 53    1023 PASSaFAX S
1bf30  65 73 73 69 6f 6e 20 72  65 71 75 65 73 74 20 64   ession request d
1bf40  65 6e 69 65 64 2c 20 52  65 61 73 6f 6e 3a 20 25   enied, Reason: %
1bf50  73 0a 00 00 00 00 00 00  00 00 00 00 00 00 00 00   s...............
1bf60  20 31 31 30 38 20 53 65  73 73 69 6f 6e 20 77 69    1108 Session wi
1bf70  74 68 20 66 61 78 20 74  65 72 6d 69 6e 61 74 65   th fax terminate
1bf80  64 20 20 20 20 20 20 20  20 20 20 20 20 20 20 20   d
1bf90  20 20 20 20 20 20 20 00  00 00 00 00 00 00 00 00          .........
1bfa0  20 31 31 30 34 20 48 61  6e 64 73 68 61 6b 65 20    1104 Handshake
1bfb0  77 69 74 68 20 74 68 65  20 66 61 78 20 63 6f 6d   with the fax com
1bfc0  70 6c 65 74 65 64 2c 20  46 61 78 20 49 44 3a 20   pleted, Fax ID:
1bfd0  20 20 20 20 20 20 20 25  73 0d 00 00 00 00 00 00          %s.......
1bfe0  20 31 30 31 35 20 53 65  73 73 69 6f 6e 20 77 69    1015 Session wi
1bff0  74 68 20 50 41 53 53 61  46 41 58 20 61 74 20 25   th PASSaFAX at %
1c000  33 64 2e 25 33 64 2e 25  33 64 2e 25 33 64 20 20   3d.%3d.%3d.%3d
1c010  20 20 20 20 20 20 20 20  74 65 72 6d 69 6e 61 74           terminat
1c020  65 64 0d 00 00 00 00 00  00 00 00 00 00 00 00 00   ed..............
1c030  20 31 30 31 34 20 53 65  73 73 69 6f 6e 20 77 69    1014 Session wi
1c040  74 68 20 50 41 53 53 61  46 41 58 20 61 74 20 25   th PASSaFAX at %
1c050  33 64 2e 25 33 64 2e 25  33 64 2e 25 33 64 20 20   3d.%3d.%3d.%3d
1c060  20 20 20 20 20 20 20 20  64 69 73 63 6f 6e 6e 65           disconne
1c070  63 74 65 64 0d 00 00 00  00 00 00 00 00 00 00 00   cted............
1c080  20 31 30 30 32 20 4f 70  65 72 61 74 6f 72 20 72    1002 Operator r
1c090  65 71 75 65 73 74 20 50  41 53 53 61 46 41 58 20   equest PASSaFAX
1c0a0  73 65 73 73 69 6f 6e 20  77 69 74 68 20 49 50 20   session with IP
1c0b0  61 64 64 72 65 73 73 20  25 33 64 2e 25 33 64 2e   address %3d.%3d.
1c0c0  25 33 64 2e 25 33 64 0d  00 00 00 00 00 00 00 00   %3d.%3d.........
1c0d0  10 60 08 8c 18 0e 24 59  98 0d 79 59 01 00 20 8c   .`....$Y..yY.. .
1c0e0  40 e0 27 92 00 30 38 80  8b d0 05 10 00 30 18 80   @.'..08......0..
1c0f0  89 d0 05 10 00 30 20 90  94 f5 05 10 1c 20 09 3d   .....0 ...... .=
1c100  45 00 20 8c 08 00 79 3d  2a 00 78 8c 46 00 20 8c   E. ...y=*.x.F. .
1c110  08 00 79 3d 23 00 78 8c  20 c0 79 3a 1c c0 78 3a   ..y=#.x. .y:..x:
1c120  30 00 20 8c 0c 00 79 3c  39 00 20 8c 0c 00 79 3e   0. ...y<9. ...y>
1c130  40 e0 87 90 00 00 00 0a  8f e0 01 5a 0c 02 00 15   @.........Z....
1c140  00 30 20 c0 d0 07 06 10  80 28 01 5a fc 00 00 15   .0 ......(.Z....
1c150  01 00 20 8c 00 30 20 c2  c0 07 06 10 00 30 20 c2   .. ..0 ......0 .
```

Mar 27 16:20 1996 image.txt Page 174

```
1c160   a0 07 06 10 00 00 20 8c  00 30 20 c2 c1 07 06 10   ...... ..O .....
1c170   00 30 30 8c d8 07 06 10  04 16 28 5c 04 00 20 8c   .00.......(\.. .
1c180   06 16 80 5c 05 16 88 5c  04 16 90 5c 8c 53 fe 0b   ...\...\...\.S..
1c190   00 30 30 8c d4 07 06 10  03 00 20 8c 06 16 80 5c   .00....... ....\
1c1a0   05 16 88 5c 04 16 90 5c  7c 53 fe 0b 00 30 30 8c   ...\...\pS...00.
1c1b0   00 08 06 10 06 16 80 5c  05 16 88 5c 04 16 90 5c   .......\...\...\
1c1c0   58 53 fe 0b 00 30 30 8c  e0 07 06 10 15 00 20 8c   XS...00....... .
1c1d0   06 16 80 5c 05 16 88 5c  04 16 90 5c 3c 53 fe 0b   ...\...\...\<S..
1c1e0   00 30 30 8c cc 07 06 10  04 00 20 8c 06 16 80 5c   .00....... ....\
1c1f0   05 16 88 5c 04 16 90 5c  20 53 fe 0b 20 00 20 8c   ...\...\ S.. . .
1c200   00 30 20 c2 c2 07 06 10  05 16 20 5c 00 30 20 c2   .0 ....... \.0 .
1c210   c3 07 06 10 00 30 20 c2  c4 07 06 10 00 30 20 c2   .....0 ......0 .
1c220   c5 07 06 10 00 30 20 c2  c6 07 06 10 00 30 20 c2   .....0 ......0 .
1c230   c7 07 06 10 00 30 20 c2  c8 07 06 10 00 30 20 c2   .....0 ......0 .
1c240   c9 07 06 10 7c 00 00 08  00 30 20 c0 c0 07 06 10   ....|....0 .....
1c250   01 20 29 8c 16 4e 21 59  98 0d 21 59 00 30 28 c2   . )..N!Y..!Y.0(.
1c260   c0 07 06 10 5c 20 19 39  00 30 20 c0 c9 07 06 10   ....\ .9.0 .....
1c270   28 20 01 3a 00 30 30 8c  e0 07 06 10 00 00 28 8c   ( .:.00.......(.
1c280   15 00 20 8c 06 16 80 5c  05 16 88 5c 04 16 90 5c   .. ....\...\...\
1c290   88 52 fe 0b 24 00 00 08  00 30 30 8c 00 08 06 10   .R..$....00.....
1c2a0   00 00 28 8c 03 00 20 8c  06 16 80 5c 05 16 88 5c   ..(... ....\...\
1c2b0   04 16 90 5c 64 52 fe 0b  03 00 20 8c 40 e0 27 92   ...\dR.... .@.'.
1c2c0   00 30 20 c0 c0 07 06 10  80 20 11 3d 00 30 20 c0   .0 ...... .=.0 .
1c2d0   c8 07 06 10 74 20 01 3a  00 30 80 8c cc 07 06 10   ....t .:.0......
1c2e0   b8 3b 01 0b 44 e0 87 92  44 e0 27 90 18 0e 21 59   .;..D...D.'...!Y
1c2f0   98 0d 31 59 00 30 28 c0  c6 07 06 10 01 60 21 8c   ..1Y.0(......`!.
1c300   00 30 20 c2 c6 07 06 10  00 74 31 82 d8 07 06 10   .0 ......t1.....
1c310   00 00 20 8c 00 30 20 c2  c8 07 06 10 00 30 30 8c   .. ..0 ......00.
1c320   cc 07 06 10 04 16 28 5c  04 00 20 8c 06 16 80 5c   ......(\.. ....\
1c330   05 16 88 5c 04 16 90 5c  e0 51 fe 0b 05 16 20 5c   ...\...\.Q.... \
1c340   00 30 20 c2 c7 07 06 10  8f e0 00 5a e8 00 00 15   .0 ........Z....
1c350   00 30 20 c0 d0 07 06 10  1c 20 01 3a 00 30 20 c0   .0 ...... .:.0 .
1c360   c0 07 06 10 10 20 09 3c  00 30 20 c0 c1 07 06 10   ..... .<.0 .....
1c370   10 20 21 39 02 00 20 8c  40 e0 27 92 b8 00 00 08   . !9.. .@.'.....
1c380   00 30 20 c0 c8 07 06 10  1c 20 01 3d 00 30 20 c0   .0 ...... .=.0 .
1c390   c2 07 06 10 10 c0 21 3a  02 00 20 8c 40 e0 27 92   ......!:.. .@.'.
1c3a0   94 00 00 08 01 00 20 8c  00 30 20 c2 c8 07 06 10   ...... ..0 .....
1c3b0   00 30 20 c0 c1 07 06 10  01 20 21 8c 00 30 20 c2   .0 ...... !..0 .
1c3c0   c1 07 06 10 00 30 20 c0  c1 07 06 10 68 20 09 3b   .....0 .....h .;
1c3d0   00 30 80 8c cc 07 06 10  c0 3a 01 0b 44 e0 87 92   .0.......:..D...
```

Mar 27 18:20 1996  image.txt Page 175

```
1c3e0   44 e0 27 90 18 0e 21 59  96 0d 31 59 00 30 28 c0   D.'...!Y..1Y.0(.
1c3f0   c6 07 06 10 01 60 21 8c  00 30 20 c2 c6 07 06 10   .....`!..0 .....
1c400   00 74 31 82 d8 07 06 10  00 30 30 8c cc 07 06 10   .t1......00.....
1c410   00 00 28 8c 04 00 20 8c  06 15 80 5c 05 16 88 5c   ..(... ....\...\
1c420   04 16 90 5c f4 50 fe 0b  05 16 20 5c 00 30 20 c2   ...\.P.... \.0 .
1c430   c7 07 06 10 8f e0 01 5a  40 01 00 12 8f e0 00 5a   .......Z@......Z
1c440   38 01 00 12 00 30 20 c0  d0 07 06 10 10 20 01 3a   8....0 ...... .=
1c450   02 00 20 8c 40 e0 27 92  20 01 00 08 00 30 20 c0   .. .@.'. ....0 .
1c460   c8 07 06 10 80 28 01 5a  dc 00 00 15 00 30 20 c0   .....(.Z.....0 .
1c470   c0 07 06 10 3c 20 09 3a  00 30 20 c0 c3 07 06 10   ....< .=.0 .....
1c480   10 20 11 39 02 00 20 8c  40 e0 27 92 ec 00 00 08   . .9.. .@.'.....
1c490   00 30 28 c0 c3 07 06 10  01 60 21 8c 00 30 20 c2   .0(......`!..0 .
1c4a0   c3 07 06 10 00 74 79 82  d4 07 06 10 cc 00 00 08   .....ty.........
1c4b0   00 30 20 c0 c5 07 06 10  44 20 11 39 00 30 28 c0   .0 .....D .9.0(.
1c4c0   c5 07 06 10 01 60 21 8c  00 30 20 c2 c5 07 06 10   .....`!..0 .....
1c4d0   00 74 79 82 e0 07 06 10  00 00 20 8c 00 30 20 c2   .ty....... ..0 .
1c4e0   c9 07 06 10 00 30 20 c0  c5 07 06 10 dc 20 a1 39   .....0 ...... .9
1c4f0   02 00 20 8c 40 e0 27 92  80 00 00 08 00 30 28 c0   .. .@.'......0(.
1c500   c4 07 06 10 01 60 21 8c  00 30 20 c2 c4 07 06 10   .....`!..0 .....
1c510   00 74 79 82 00 08 06 10  00 30 28 c0 c5 07 06 10   .ty......0(.....
1c520   01 60 21 8c 00 30 20 c2  c5 07 06 10 00 74 79 82   .`!..0 ......ty.
1c530   e0 07 06 10 01 00 20 8c  00 30 20 c2 c9 07 06 10   ...... ..0 .....
1c540   38 00 00 08 00 30 20 c0  c7 07 06 10 10 20 19 39   8....0 ...... .9
1c550   02 00 20 8c 40 e0 27 92  20 00 00 08 00 30 28 c0   .. .@.'. ....0(.
1c560   c7 07 06 10 01 60 21 8c  00 30 20 c2 c7 07 06 10   .....`!..0 .....
1c570   00 74 79 82 cc 07 06 10  00 30 78 c2 c2 07 06 10   .ty......0x.....
1c580   40 e0 87 90 00 00 00 0a  00 00 00 00 00 00 00 00   @...............
1c590   00 30 28 80 14 08 06 10  79 00 20 8c 14 00 29 3a   .0(.....y. ...):
1c5a0   00 30 28 80 14 08 06 10  59 00 20 8c 44 00 29 3d   .0(.....Y. .D.)=
1c5b0   00 30 28 80 15 08 06 10  65 00 20 8c 14 00 29 3a   .0(.....e. ...):
1c5c0   00 30 28 80 15 08 06 10  45 00 20 8c 24 00 29 3d   .0(.....E. .$.)=
1c5d0   00 30 28 80 16 08 06 10  73 00 20 8c 30 00 29 3a   .0(.....s. .0.):
1c5e0   00 30 28 80 16 08 06 10  53 00 20 8c 20 00 29 3a   .0(.....S. . .):
1c5f0   00 30 28 8c bc f0 01 00  01 00 20 8c 05 16 80 5c   .0(....... ....\
1c600   04 16 88 5c 4c 36 00 09  18 08 00 08 74 00 00 08   ...\L6......t...
1c610   00 30 28 8c bc f0 01 00  01 00 20 8c 05 16 80 5c   .0(....... ....\
1c620   04 16 88 5c 2c 36 00 09  00 30 28 8c 10 f1 01 00   ...\,6...0(.....
1c630   00 00 20 8c 05 16 80 5c  04 16 88 5c 14 36 00 09   .. ....\...\.6..
1c640   00 30 28 8c f0 ef 01 00  05 16 80 5c 04 16 88 5c   .0(........\...\
1c650   00 36 00 09 00 30 38 8c  14 08 06 10 04 00 30 8c   .6...08.......0.
```

Mar 27 18:20 1996 image.txt Page 176

```
1c660   04 16 28 5c 00 30 20 8c  90 c5 01 00 07 16 80 5c   ..(\.0 ........\
1c670   06 16 88 5c 05 16 90 5c  04 16 98 5c a4 36 00 08   ...\...\...\.6..
1c680   20 60 08 8c 40 e0 2f 8c  00 30 20 8c 70 f0 01 00    ..@./..0 .p...
1c690   05 16 80 5c 04 16 88 5c  a8 36 01 09 01 00 20 8c   ...\...\.6.... .
1c6a0   05 16 80 5c 04 16 88 5c  a8 35 00 09 00 30 28 8c   ...\...\.5...0(.
1c6b0   60 f1 01 00 05 16 80 5c  04 16 88 5c 94 35 00 09   `......\...\.5..
1c6c0   00 30 28 8c bc f0 01 00  05 16 80 5c 04 16 88 5c   .0(........\...\
1c6d0   80 35 00 09 05 16 80 5c  04 16 88 5c 74 35 00 09   .5.....\...\t5..
1c6e0   00 00 20 8c 00 30 20 c2  b0 07 06 10 00 30 20 92   .. ..0 ......0 .
1c6f0   18 08 06 10 00 30 30 8c  50 c7 01 00 04 16 28 5c   .....00.P.....(\
1c700   d0 07 20 8c 06 16 80 5c  05 16 88 5c 04 16 90 5c   .. ....\...\...\
1c710   50 75 fe 09 00 30 38 8c  d0 cf 05 10 00 30 30 8c   Pu...08.......00.
1c720   18 d0 05 10 01 00 28 8c  00 30 20 8c ff ff ff ff   ......(..0 .....
1c730   07 16 80 5c 06 16 88 5c  05 16 90 5c 04 16 98 5c   ...\...\...\...\
1c740   70 5b fe 09 00 00 00 0a  00 00 00 00 00 00 00 00   p[..............
1c750   00 30 20 c0 91 07 06 10  0c 20 11 3d 00 00 80 8c   .0 ...... .=....
1c760   c0 05 ff 09 00 00 28 8c  00 30 20 90 a0 f5 05 10   ......(..0 .....
1c770   50 28 29 c2 05 16 20 5c  00 30 20 c2 91 07 06 10   P()... \.0 .....
1c780   00 30 20 92 d4 cf 05 10  00 30 20 8c 70 bd 00 00   .0 ......0 .p...
1c790   00 30 20 92 d8 cf 05 10  01 00 20 8c 00 30 20 ca   .0 ....... ..0 .
1c7a0   1c d0 05 10 00 30 20 90  a0 f5 05 10 06 20 21 c0   .....0 ...... !.
1c7b0   18 0e 21 59 98 0d 21 59  10 20 51 3d 00 30 80 90   ..!Y..!Y. Q=.0..
1c7c0   a0 f5 05 10 8c 61 ff 09  00 30 38 8c d0 cf 05 10   .....a...08.....
1c7d0   00 30 30 8c 18 d0 05 10  01 00 28 8c 00 30 20 8c   .00.......(..0 .
1c7e0   ff ff ff ff 07 16 80 5c  06 16 88 5c 05 16 90 5c   .......\...\...\
1c7f0   04 16 98 5c bc 5a fe 08  00 00 00 00 00 00 00 00   ...\.Z..........
1c800   00 00 20 8c 00 30 20 c2  b0 07 06 10 14 06 00 09   .. ..0 .........
1c810   00 30 38 8c d0 cf 05 10  00 30 30 8c 18 d0 05 10   .08.......00.....
1c820   01 00 28 8c 00 30 20 8c  ff ff ff ff 07 16 80 5c   ..(..0 ........\
1c830   06 16 88 5c 05 16 90 5c  04 16 98 5c 74 5a fe 08   ...\...\...\tZ..
1c840   00 30 78 8c 20 d0 05 10  00 30 28 80 14 08 06 10   .0x. ....0(.....
1c850   79 00 20 8c 14 00 29 3a  00 30 28 80 14 08 06 10   y. ...):.0(.....
1c860   59 00 20 8c 44 00 29 3d  00 30 28 80 15 08 06 10   Y. .D.)=.0(.....
1c870   65 00 20 8c 14 00 29 3a  00 30 28 80 15 08 06 10   e. ...):.0(.....
1c880   45 00 20 8c 24 00 29 3d  00 30 28 80 16 08 06 10   E. .$.)=.0(.....
1c890   73 00 20 8c 30 00 29 3a  00 30 28 80 16 08 06 10   s. .0.):.0(.....
1c8a0   53 00 20 8c 20 00 29 3a  00 30 28 8c bc f0 01 00   S. . .):.0(.....
1c8b0   01 00 20 8c 05 16 80 5c  04 16 88 5c 94 33 00 09   .. ....\...\.3..
1c8c0   40 0e 00 08 00 30 28 8c  bc f0 01 00 01 00 20 8c   @....0(....... .
1c8d0   05 16 80 5c 04 16 88 5c  78 33 00 09 0f 16 80 5c   ...\...\x3.....\
```

```
Mar 27 18:20 1996  image.txt Page 177

1c8e0   70 cc fe 09 00 00 70 8c  01 a0 2b 8c 05 16 70 5c   p.....p...-...p\
1c8f0   00 30 20 8c 20 4e 00 00  f0 1f 29 3c 00 30 80 8c   .0 . N....)<.0..
1c900   60 ec 05 10 4c d0 fe 09  00 30 28 8c 60 f0 01 00   `...L....0(.`...
1c910   00 00 20 8c 05 16 80 5c  04 16 88 5c 34 33 00 09   .. ....\...\43..
1c920   00 30 28 8c 10 ef 01 00  01 00 20 8c 05 16 80 5c   .0(........ ....\
1c930   04 16 88 5c 1c 33 00 09  00 30 28 8c bc f0 01 00   ...\.3...0(.....
1c940   05 16 80 5c 04 16 88 5c  08 33 00 09 00 30 20 92   ...\...\.3...0 .
1c950   18 08 06 10 00 30 28 8c  80 f0 01 00 00 00 20 8c   .....0\........ .
1c960   05 16 80 5c 04 16 88 5c  e8 32 00 09 00 30 38 8c   ...\...\.2...08.
1c970   14 08 06 10 01 00 30 8c  06 16 28 5c 00 30 20 8c   ......0...(\.0 .
1c980   00 d7 01 00 07 16 80 5c  06 16 88 5c 05 16 90 5c   .......\...\...\
1c990   04 16 98 5c 8c 33 00 08  00 00 00 00 00 00 00 00   ...\.3..........
1c9a0   00 30 18 8c 20 d0 05 10  00 30 28 80 14 08 06 10   .0.. ....0(.....
1c9b0   79 00 20 8c 14 00 29 3a  00 30 28 80 14 08 06 10   y. ...):.0(.....
1c9c0   59 00 20 8c 44 00 29 3d  00 30 28 80 15 08 06 10   Y. .D.)=.0(.....
1c9d0   65 00 20 8c 14 00 29 3a  00 30 28 80 15 08 06 10   e. ...):.0(.....
1c9e0   45 00 20 8c 24 00 29 3d  00 30 28 80 16 08 06 10   E. .$.)=.0(.....
1c9f0   73 00 20 8c 30 00 29 3a  00 30 28 80 16 08 06 10   s. .0.):.0(.....
1ca00   53 00 20 8c 20 00 29 3a  00 30 28 8c bc f0 01 00   S. . .):.0(.....
1ca10   01 00 20 8c 05 16 80 5c  04 16 88 5c 34 32 00 09   .. ....\...\42..
1ca20   e0 0c 00 08 00 30 28 8c  bc f0 01 00 01 00 20 8c   .....0(........ .
1ca30   05 16 80 5c 04 16 88 5c  18 32 00 09 03 16 80 5c   ...\...\.2.....\
1ca40   20 fb fe 09 00 30 28 8c  60 f0 01 00 00 00 20 8c    ....0(.`..... .
1ca50   05 16 80 5c 04 16 88 5c  f8 31 00 09 00 30 28 8c   ...\...\.1...0(.
1ca60   70 ef 01 00 01 00 20 8c  05 16 80 5c 04 16 88 5c   p..... ....\...\
1ca70   e0 31 00 09 00 30 28 8c  bc f0 01 00 05 16 80 5c   .1...0(........\
1ca80   04 16 88 5c cc 31 00 09  00 30 28 8c 80 f0 01 00   ...\.1...0(.....
1ca90   00 00 20 8c 05 16 80 5c  04 16 88 5c b4 31 00 09   .. ....\...\.1..
1caa0   00 30 38 8c 14 08 06 10  01 00 30 8c 06 16 28 5c   .08.......0...(\
1cab0   00 30 20 8c 00 d7 01 00  07 16 80 5c 06 16 88 5c   .0 ........\...\
1cac0   05 16 90 5c 04 16 98 5c  58 32 00 08 00 00 00 00   ...\...\X2......
1cad0   60 60 08 8c 00 30 28 8c  bc f0 01 00 01 00 20 8c   ``...0(........ .
1cae0   05 16 80 5c 04 16 88 5c  68 31 00 09 04 16 78 5c   ...\...\h1....x\
1caf0   00 30 20 80 14 08 06 10  14 20 19 3a 00 30 28 80   .0 ...... .:.0(.
1cb00   14 08 06 10 24 00 20 8c  3c 00 29 3d 14 03 00 09   ....$. .<.)=....
1cb10   00 30 38 8c d0 cf 05 10  00 30 30 8c 18 d0 05 10   .08......00.....
1cb20   01 00 28 8c 00 30 20 8c  ff ff ff ff 07 16 80 5c   ..(..0 ........\
1cb30   06 16 88 5c 05 16 90 5c  04 16 98 5c 74 57 fe 09   ...\...\...\tW..
1cb40   00 00 00 0a 40 e0 2f 8c  00 30 20 8c 88 f4 01 00   ....@./..0 .....
1cb50   05 16 80 5c 04 16 88 5c  0f 16 90 5c e4 31 01 09   ...\...\...\.1..
```

```
Mar 27 18:20 1996  image.txt Page 178

1cb60   00 30 30 8c 14 08 06 10  90 e0 27 8c 06 16 80 5c   .00.......'....\
1cb70   05 16 88 5c 04 16 90 5c  78 32 01 09 8c 20 0c 3d   ...\...\x2..1 .=
1cb80   90 e0 27 90 01 09 19 59  58 e0 40 34 03 39 20 90   ..'....YX.@4.9 .
1cb90   94 fb 01 00 00 10 01 84  88 13 00 09 50 00 00 08   ............P...
1cba0   a0 1a 00 09 48 00 00 08  a8 3d 00 09 40 00 00 08   ....H....)..@...
1cbb0   f0 34 00 09 38 00 00 08  00 30 80 8c 40 c8 01 00   .4..8....0..@...
1cbc0   30 0d 00 09 28 00 00 08  00 30 80 8c a0 c9 01 00   0...(....0......
1cbd0   20 0d 00 09 18 00 00 08  08 10 00 09 10 00 00 08    ...............
1cbe0   20 0b 00 09 08 00 00 08  18 0b 00 09 00 30 38 8c    ............08.
1cbf0   d0 cf 05 10 00 30 30 8c  18 d0 05 10 01 00 28 8c   .....00.......(.
1cc00   00 30 20 8c ff ff ff ff  07 16 80 5c 06 16 88 5c   .0 ........\...\
1cc10   05 16 90 5c 04 16 98 5c  98 56 fe 09 00 00 00 0a   ...\...\.V......
1cc20   60 60 08 8c 00 30 28 8c  bc f0 01 00 01 00 20 8c   ``...0(....... .
1cc30   05 16 80 5c 04 16 88 5c  18 30 00 09 04 16 30 5c   ...\...\.0....0\
1cc40   40 e0 2f 8c 00 30 20 8c  88 f4 01 00 05 16 80 5c   @./..0 ........\
1cc50   04 16 88 5c 06 16 90 5c  e8 30 01 09 00 30 30 8c   ...\...\.0...00.
1cc60   14 08 06 10 90 e0 27 8c  06 16 80 5c 05 16 88 5c   ......'.....\...\
1cc70   04 16 90 5c 7c 31 01 09  7c 20 0c 3a 90 e0 27 90   ...\|1..| .:..'.
1cc80   01 09 19 59 68 e0 28 34  03 39 20 90 b8 fb 01 00   ...Yh.(4.9 .....
1cc90   00 10 01 84 5c 04 00 09  00 00 00 0a 00 30 80 8c   ....\........0..
1cca0   20 ce 01 00 3c 4a 00 09  00 00 00 0a 00 00 20 8c    ...<J........ .
1ccb0   00 30 20 92 18 08 06 10  48 0a 00 09 00 00 00 0a   .0 .....H.......
1ccc0   40 00 00 09 00 00 00 0a  00 30 20 90 18 08 06 10   @........0 .....
1ccd0   0c 20 01 3a ac f9 ff 09  00 00 00 0a 34 f9 ff 09   . .:........4...
1cce0   00 00 00 0a 3c 01 00 09  00 00 00 0a 34 01 00 09   ....<.......4...
1ccf0   00 00 00 0a 2c 01 00 09  00 00 00 0a 00 00 00 00   ....,...........
1cd00   70 60 08 8c 01 00 20 8c  00 30 20 c2 b0 07 06 10   p`.... ..0 .....
1cd10   40 e0 2f 8c 00 30 20 8c  70 f0 01 00 05 16 80 5c   @./..0 .p......\
1cd20   04 16 88 5c 1c 30 01 09  00 30 20 8c bc f0 01 00   ...\.0...0 .....
1cd30   05 16 80 5c 04 16 88 5c  30 37 01 0b 00 30 20 8c   ...\...\07...0 .
1cd40   40 f4 01 00 05 16 80 5c  04 16 88 5c 1c 37 01 0b   @......\...\.7..
1cd50   01 00 20 8c 05 16 80 5c  04 16 88 5c f4 2e 00 09   .. ....\...\....
1cd60   00 30 38 8c 14 08 06 10  02 00 30 8c 04 16 28 5c   .08.......0...(\
1cd70   00 30 20 8c 00 c8 01 00  07 16 80 5c 06 16 88 5c   .0 ........\...\
1cd80   05 16 90 5c 04 16 98 5c  98 2f 00 09 00 00 00 0a   ...\...\./......
1cd90   00 00 20 8c 00 30 20 c2  b0 07 06 10 00 30 28 8c   .. ..0 ......0(.
1cda0   20 08 06 10 00 30 20 8c  8d d0 05 10 05 16 80 5c    ....0 ........\
1cdb0   04 16 88 5c 40 36 01 0b  60 20 04 3a 00 30 28 8c   ...\@6..` .:.0(.
1cdc0   70 ee 01 00 01 00 20 8c  05 16 80 5c 04 16 88 5c   p..... .....\...\
1cdd0   80 2e 00 09 00 30 28 8c  40 f0 01 00 00 00 20 8c   .....0(.@..... .
```

```
Mar 27 16:20 1996   image.txt Page 175

1cde0    05 16 80 5c 04 16 88 5c  68 2e 00 09 00 30 38 8c   ...\...\h....08.
1cdf0    14 08 06 10 01 00 30 8c  06 16 28 5c 00 30 20 8c   ......0...(\.0 .
1ce00    50 cf 01 00 07 16 80 5c  06 16 88 5c 05 16 90 5c   P......\...\...\
1ce10    04 16 98 5c 0c 2f 00 08  08 00 00 08 00 00 00 00   ...\./..........
1ce20    00 30 28 8c 60 f0 01 00  00 00 20 8c 05 16 80 5c   .0(.`..... ....\
1ce30    04 16 88 5c 1c 2e 00 09  04 16 18 5c 00 30 28 8c   ...\.......\.0(.
1ce40    bc f0 01 00 01 00 20 8c  05 16 80 5c 04 16 88 5c   ...... ....\...\
1ce50    00 2e 00 09 01 e0 20 8c  04 16 18 5c e0 31 11 39   ...... ....\.1.9
1ce60    00 30 28 8c 30 f2 01 00  01 00 20 8c 05 16 80 5c   .0(.0..... ....\
1ce70    04 16 88 5c dc 2d 00 09  00 30 28 8c bc f0 01 00   ...\.-...0(.....
1ce80    05 16 80 5c 04 16 88 5c  c8 2d 00 09 00 30 28 8c   ...\...\.-...0(.
1ce90    60 f5 01 00 05 16 80 5c  04 16 88 5c b4 2d 00 09   `......\...\.-..
1cea0    00 30 28 8c d0 f2 01 00  05 16 80 5c 04 16 88 5c   .0(........\...\
1ceb0    a0 2d 00 09 00 30 28 8c  60 f2 01 00 05 16 80 5c   .-...0(.`......\
1cec0    04 16 88 5c 8c 2d 00 09  00 30 28 8c b0 f1 01 00   ...\.-...0(.....
1ced0    05 16 80 5c 04 16 88 5c  78 2d 00 09 00 30 28 8c   ...\...\x-...0(.
1cee0    f0 f0 01 00 05 16 80 5c  04 16 88 5c 64 2d 00 09   .......\...\d-..
1cef0    00 30 28 8c bc f0 01 00  05 16 80 5c 04 16 88 5c   .0(........\...\
1cf00    50 2d 00 09 00 30 28 8c  50 f2 01 00 00 00 20 8c   P-...0(.P..... .
1cf10    05 16 80 5c 04 16 88 5c  38 2d 00 09 00 30 38 8c   ...\...\8-...08.
1cf20    14 08 06 10 02 00 30 8c  04 16 28 5c 00 30 20 8c   ......0...(\.0 .
1cf30    20 cc 01 00 07 16 80 5c  06 16 88 5c 05 16 90 5c    ......\...\...\
1cf40    04 16 98 5c dc 2d 00 08  00 00 00 00 00 00 00 00   ...\.-..........
1cf50    80 60 08 8c 00 30 20 90  a0 f5 05 10 f8 27 21 90   .`...0 ......'!.
1cf60    24 20 01 32 00 30 20 90  a0 f5 05 10 f8 27 81 90   $ .2.0 ......'..
1cf70    00 6d fe 09 00 00 28 8c  00 30 20 90 a0 f5 05 10   .m....(..0 .....
1cf80    f8 27 29 92 00 30 78 8c  20 d0 05 10 01 00 20 8c   .')..0x. ..... .
1cf90    00 30 20 92 18 08 06 10  00 30 20 8c 30 08 06 10   .0 ......0 .0...
1cfa0    00 30 20 92 d4 cf 05 10  00 30 20 8c 50 fd 01 00   .0 ......0 .P...
1cfb0    00 30 20 92 d8 cf 05 10  01 00 20 8c 00 30 20 ca   .0 ....... ..0 .
1cfc0    1c d0 05 10 00 30 28 8c  60 f0 01 00 00 00 20 8c   .....0(.`..... .
1cfd0    05 16 80 5c 04 16 88 5c  78 2c 00 09 00 30 28 8c   ...\...\x,...0(.
1cfe0    bc f0 01 00 01 00 20 8c  05 16 80 5c 04 16 88 5c   ...... ....\...\
1cff0    60 2c 00 09 40 e0 1f 8c  00 30 38 8c 90 f2 01 00   `,..@....08.....
1d000    16 e0 33 8c 02 e0 2b 8c  0c e0 23 8c 03 16 80 5c   ..3...+...#....\
1d010    07 16 88 5c 06 16 90 5c  05 16 98 5c 04 16 a0 5c   ...\...\...\...\
1d020    20 2d 01 09 03 16 28 5c  01 00 20 8c 05 16 80 5c    -....(\.. ....\
1d030    04 16 88 5c 1c 2c 00 09  00 30 28 8c bc f0 01 00   ...\.,...0(.....
1d040    05 16 80 5c 04 16 88 5c  08 2c 00 09 00 30 28 8c   ...\...\.,...0(.
1d050    c0 f8 01 00 05 16 80 5c  04 16 88 5c f4 2b 00 09   .......\...\.+..
```

Mar 27 18:20 1996 image.txt Page 180

```
1d060  00 30 28 8c bc f0 01 00  05 16 80 5c 04 16 88 5c   .0(........\...\
1d070  e0 2b 00 09 00 30 28 8c  50 f1 01 00 00 00 20 8c   .+...0(.P..... .
1d080  05 16 80 5c 04 16 88 5c  c8 2b 00 09 00 30 38 8c   ...\...\.+...08.
1d090  20 08 06 10 0d 00 30 8c  02 00 28 8c 00 30 20 8c    .....0...(..0 .
1d0a0  90 cd 01 00 07 16 80 5c  06 16 88 5c 05 16 90 5c   .......\...\...\
1d0b0  04 16 98 5c 6c 2c 00 09  00 30 38 8c a0 cf 05 10   ...\l,...08.....
1d0c0  00 30 30 8c 16 d0 05 10  01 00 28 8c 00 30 20 8c   .00.......(..0 .
1d0d0  ff ff ff ff 07 16 80 5c  06 16 88 5c 05 16 90 5c   .......\...\...\
1d0e0  04 16 98 5c cc 51 fe 09  00 00 00 0a 00 00 00 00   ...\.Q..........
1d0f0  e0 60 08 8c 00 30 b8 8c  20 d0 05 10 b0 e0 2f 8c   .`...0.. ...../.
1d100  00 00 20 8c 00 30 20 82  2b d0 05 10 a4 6d fe 09   .. ..0 .+....m..
1d110  64 00 20 8c 84 05 24 70  05 16 80 5c 04 16 88 5c   d. ...$p...\...\
1d120  90 55 00 09 10 16 78 5c  40 e0 37 8c 00 00 28 8c   .U....x\@.7...(.
1d130  64 00 20 8c 06 16 80 5c  05 16 88 5c 04 16 90 5c   d. ....\...\...\
1d140  d8 43 fe 0b 00 30 28 8c  60 f0 01 00 00 00 20 8c   .C...0(.`..... .
1d150  05 16 80 5c 04 16 88 5c  f8 2a 00 09 00 30 28 8c   ...\...\.*...0(.
1d160  bc f0 01 00 01 00 20 8c  05 16 80 5c 04 16 88 5c   ...... ...\...\
1d170  e0 2a 00 09 00 30 28 8c  d0 f6 01 00 05 16 80 5c   .*...0(........\
1d180  04 16 88 5c cc 2a 00 09  00 30 28 8c bc f0 01 00   ...\.*...0(.....
1d190  05 16 80 5c 04 16 88 5c  b8 2a 00 09 06 16 70 5c   ...\...\.*....p\
1d1a0  00 30 38 8c 80 f8 01 00  02 60 33 8c 0c 60 2b 8c   .08......`3..`+.
1d1b0  00 74 23 8c f3 1b 00 00  0e 16 80 5c 07 16 88 5c   .t#........\...\
1d1c0  06 16 90 5c 05 16 98 5c  04 16 a0 5c 0f 16 a8 5c   ...\...\...\...\
1d1d0  70 2b 01 09 0e 16 28 5c  01 00 20 8c 05 16 80 5c   p+....(\.. ....\
1d1e0  04 16 88 5c 6c 2a 00 09  00 30 28 8c bc f0 01 00   ...\l*...0(.....
1d1f0  05 16 80 5c 04 16 88 5c  58 2a 00 09 05 16 80 5c   ...\...\X*.....\
1d200  04 16 88 5c 4c 2a 00 09  00 30 28 8c 40 f1 01 00   ...\L*...0(.@...
1d210  05 16 80 5c 04 16 88 5c  38 2a 00 09 00 30 28 8c   ...\...\8*...0(.
1d220  20 f1 01 00 05 16 80 5c  04 16 88 5c 24 2a 00 09    ......\...\$*..
1d230  0e 16 30 5c 00 30 28 8c  10 f4 01 00 00 30 20 8c   ..0\.0(......0 .
1d240  f0 f1 01 00 06 16 80 5c  05 16 88 5c 04 16 90 5c   .......\...\...\
1d250  f0 2a 01 09 b0 e0 77 8c  00 30 e8 8c a0 f9 01 00   .*....w..0......
1d260  00 30 18 80 60 ec 05 10  00 30 78 80 61 ec 05 10   .0..`....0x.a...
1d270  00 30 38 80 62 ec 05 10  00 30 30 80 63 ec 05 10   .08.b....00.c...
1d280  00 30 28 80 64 ec 05 10  00 30 20 80 65 ec 05 10   .0(.d....0 .e...
1d290  0e 16 80 5c 1d 16 88 5c  03 16 90 5c 0f 16 98 5c   ...\...\...\...\
1d2a0  07 16 a0 5c 06 16 a8 5c  05 16 b0 5c 04 16 b8 5c   ...\...\...\...\
1d2b0  90 2a 01 09 40 e0 2f 8c  0e 16 20 5c 05 16 80 5c   .*..@./... \...\
1d2c0  04 16 88 5c a4 31 01 0b  00 30 20 8c bc f0 01 00   ...\.1...0 .....
1d2d0  05 16 80 5c 04 16 88 5c  90 31 01 0b 00 30 20 8c   ...\...\.1...0 .
```

```
Mar 27 18:20 1996  image.txt Page 181

1d2e0   d0 f0 01 00 05 16 80 5c  04 16 88 5c 7c 31 01 0b   ........\...\|1..
1d2f0   0e 16 78 5c 00 30 70 8c  40 f7 01 00 2a 60 3b 80   ..x\.0p.@...*`;.
1d300   2b 60 33 80 2c 60 2b 80  2a 60 23 80 0f 16 80 5c   +`3.,`+.*`#....\
1d310   0e 16 88 5c 07 16 90 5c  06 16 98 5c 05 16 a0 5c   ...\...\...\...\
1d320   04 16 a8 5c 1c 2a 01 09  40 e0 2f 8c 0f 16 20 5c   ...\.*..@./... \
1d330   05 16 80 5c 04 16 88 5c  30 31 01 0b 01 00 20 8c   ...\...\01.... .
1d340   05 16 80 5c 04 16 88 5c  08 29 00 09 05 16 30 5c   ...\...\.)....0\
1d350   00 30 28 8c 10 f4 01 00  00 30 20 8c d0 f1 01 00   .0(......0 ....
1d360   06 16 80 5c 05 16 88 5c  04 16 90 5c d4 29 01 09   ...\...\...\.)..
1d370   00 30 70 8c a0 f7 01 00  2e 60 3b 80 2f 60 33 80   .0p......`;./`3.
1d380   30 60 2b 80 31 60 23 80  0f 16 80 5c 0e 16 88 5c   0`+.1`#....\...\
1d390   07 16 90 5c 06 16 98 5c  05 16 a0 5c 04 16 a8 5c   ...\...\...\...\
1d3a0   a0 29 01 09 40 e0 2f 8c  0f 16 20 5c 05 16 80 5c   .)..@./... \...\
1d3b0   04 16 88 5c b4 30 01 0b  00 30 20 8c 70 f2 01 00   ...\.0...0 .p...
1d3c0   05 16 80 5c 04 16 88 5c  a0 30 01 0b 0f 16 18 5c   ...\...\.0.....\
1d3d0   00 30 78 8c 40 f7 01 00  36 60 3b 80 37 60 33 80   .0x.@...6`;.7`3.
1d3e0   38 60 2b 80 39 60 23 80  03 16 80 5c 0f 16 88 5c   8`+.9`#....\...\
1d3f0   07 16 90 5c 06 16 98 5c  05 16 a0 5c 04 16 a8 5c   ...\...\...\...\
1d400   40 29 01 09 40 e0 2f 8c  03 16 20 5c 05 16 80 5c   @)..@./... \...\
1d410   04 16 88 5c 54 30 01 0b  01 00 20 8c 05 16 80 5c   ...\T0.... ....\
1d420   04 16 88 5c 2c 28 00 09  00 30 28 8c bc f0 01 00   ...\,(...0(.....
1d430   05 16 80 5c 04 16 88 5c  18 28 00 09 00 30 28 8c   ...\...\.(...0(.
1d440   90 f1 01 00 05 16 80 5c  04 16 88 5c 04 28 00 09   .......\...\.(..
1d450   00 30 28 8c 70 f1 01 00  05 16 80 5c 04 16 88 5c   .0(.p......\...\
1d460   f0 27 00 09 40 e0 37 8c  00 30 28 8c 10 f4 01 00   .'..@.7..0(.....
1d470   00 30 20 8c 50 f3 01 00  06 16 80 5c 05 16 88 5c   .0 .P......\...\
1d480   04 16 90 5c bc 28 01 09  06 16 28 5c 3e 60 23 8c   ...\.(....(\>`#.
1d490   05 16 80 5c 04 16 88 5c  d0 2f 01 0b 00 30 20 8c   ...\...\./...0 .
1d4a0   50 f5 01 00 05 16 80 5c  04 16 88 5c bc 2f 01 0b   P......\...\./..
1d4b0   49 60 23 8c 05 16 80 5c  04 16 88 5c ac 2f 01 0b   I`#....\...\./..
1d4c0   01 00 20 8c 05 16 80 5c  04 16 88 5c 84 27 00 09   .. ....\...\.'..
1d4d0   05 16 38 5c 00 30 30 8c  10 f4 01 00 00 30 28 8c   ..8\.00......0(.
1d4e0   30 f3 01 00 00 00 20 8c  07 16 80 5c 06 16 88 5c   0..... ....\...\
1d4f0   05 16 90 5c 04 16 98 5c  48 28 01 09 07 16 28 5c   ...\...\H(....(\
1d500   5e 60 23 8c 05 16 80 5c  04 16 88 5c 5c 2f 01 0b   ^`#....\...\\/..
1d510   5e 60 83 8c 3c 31 01 0b  90 d1 23 59 04 16 60 5c   ^`..<1....#Y..`\
1d520   28 20 01 3a 40 e0 2f 8c  00 30 20 8c bc f0 01 00   ( .:@./..0 .....
1d530   05 16 80 5c 04 16 88 5c  30 2f 01 0b 81 09 23 59   ...\...\0/....#Y
1d540   04 16 60 5c e0 3f 01 3d  40 e0 2f 8c 00 30 20 8c   ..`\.?.=@./..0 .
1d550   a0 f0 01 00 05 16 80 5c  04 16 88 5c 0c 2f 01 0b   .......\...\./..
```

```
Mar 27 18:20 1996  image.txt Page 182

1d560   6b 60 23 8c 05 16 80 5c  04 16 88 5c fc 2e 01 0b   k`#....\...\....
1d570   01 00 20 8c 05 16 80 5c  04 16 88 5c d4 26 00 09   .. ....\...\.&..
1d580   05 16 30 5c 00 30 28 8c  10 f4 01 00 00 30 20 8c   ..0\.0(......0 .
1d590   10 f3 01 00 06 16 80 5c  05 16 88 5c 04 16 90 5c   .......\...\...\
1d5a0   a0 27 01 09 06 16 28 5c  69 60 23 8c 05 16 80 5c   .'....(\i`#....\
1d5b0   04 16 88 5c b4 2e 01 0b  01 00 20 8c 05 16 80 5c   ...\...... ....\
1d5c0   04 16 88 5c 8c 26 00 09  00 30 28 8c bc f0 01 00   ...\.&...0(.....
1d5d0   05 16 80 5c 04 16 88 5c  78 26 00 09 00 30 28 8c   ...\...\x&...0(.
1d5e0   30 f1 01 00 05 16 80 5c  04 16 88 5c 64 26 00 09   0......\...\d&..
1d5f0   00 30 28 8c 20 f1 01 00  05 16 80 5c 04 16 88 5c   .0(. ......\...\
1d600   50 26 00 09 00 30 28 8c  10 f4 01 00 00 30 20 8c   P&...0(......0 .
1d610   f0 f2 01 00 06 16 80 5c  05 16 88 5c 04 16 90 5c   .......\...\...\
1d620   20 27 01 09 06 16 28 5c  7a 60 23 8c 05 16 80 5c    '....(\z`#....\
1d630   04 16 88 5c 34 2e 01 0b  00 30 20 8c a0 f6 01 00   ...\4....0 .....
1d640   05 16 80 5c 04 16 88 5c  20 2e 01 0b 7c 60 23 8c   ...\...\ ...|`#.
1d650   05 16 80 5c 04 16 88 5c  10 2e 01 0b 01 00 20 8c   ...\...\...... .
1d660   05 16 80 5c 04 16 88 5c  e8 25 00 09 00 30 28 8c   ...\...\.%...0(.
1d670   bc f0 01 00 05 16 80 5c  04 16 88 5c d4 25 00 09   .......\...\.%..
1d680   05 16 80 5c 04 16 88 5c  c8 25 00 09 00 30 28 8c   ...\...\.%...0(.
1d690   e0 f5 01 00 00 00 20 8c  05 16 80 5c 04 16 88 5c   ...... ....\...\
1d6a0   b0 25 00 09 00 30 38 8c  14 08 06 10 02 00 30 8c   .%...08.......0.
1d6b0   01 00 28 8c 00 30 20 8c  00 c8 01 00 07 16 80 5c   ..(..0 ........\
1d6c0   06 16 88 5c 05 16 90 5c  04 16 98 5c 54 26 00 09   ...\...\...\T&..
1d6d0   00 30 38 8c d0 cf 05 10  00 30 30 8c 18 d0 05 10   .08......00.....
1d6e0   00 30 20 8c ff ff ff ff  07 16 80 5c 06 16 88 5c   .0 ........\...\
1d6f0   05 16 90 5c 04 16 98 5c  b8 4b fe 09 00 00 00 0a   ...\...\.K......
1d700   60 00 00 09 00 30 38 8c  14 08 06 10 02 00 30 8c   `....08.......0.
1d710   00 00 28 8c 00 30 20 8c  d0 ca 01 00 07 16 80 5c   ..(..0 ........\
1d720   06 16 88 5c 05 16 90 5c  04 16 98 5c f4 25 00 09   ...\...\...\.%..
1d730   00 30 38 8c d0 cf 05 10  00 30 30 8c 18 d0 05 10   .08......00.....
1d740   01 00 28 8c 00 30 20 8c  ff ff ff ff 07 16 80 5c   ..(..0 ........\
1d750   06 16 88 5c 05 16 90 5c  04 16 98 5c 54 4b fe 08   ...\...\...\TK..
1d760   50 60 08 8c 00 30 28 8c  60 f0 01 00 00 00 20 8c   P`...0(.`..... .
1d770   05 16 80 5c 04 16 88 5c  d8 24 00 09 00 30 28 8c   ...\...\.$...0(.
1d780   bc f0 01 00 01 00 20 8c  05 16 80 5c 04 16 88 5c   ...... ....\...\
1d790   c0 24 00 09 00 30 28 8c  b0 f5 01 00 05 16 80 5c   .$...0(........\
1d7a0   04 16 88 5c ac 24 00 09  00 30 28 8c bc f0 01 00   ...\.$...0(.....
1d7b0   05 16 80 5c 04 16 88 5c  98 24 00 09 00 30 28 8c   ...\...\.$...0(.
1d7c0   20 fa 01 00 05 16 80 5c  04 16 88 5c 84 24 00 09    ......\...\.$..
1d7d0   00 30 28 8c 00 f9 01 00  05 16 80 5c 04 16 88 5c   .0(........\...\
```

```
Mar 27 18:20 1996  image.txt Page 183

1d7e0   70 24 00 09 00 30 28 8c  90 fa 01 00 05 16 80 5c   p$...0(........\
1d7f0   04 16 88 5c 5c 24 00 09  00 30 28 8c 60 f7 01 00   ...\\$...0(.`...
1d800   05 16 80 5c 04 16 88 5c  48 24 00 09 00 30 28 8c   ...\...\H$...0(.
1d810   40 f8 01 00 05 16 80 5c  04 16 88 5c 34 24 00 09   @.......\...\4$..
1d820   00 30 28 8c bc f0 01 00  05 16 80 5c 04 16 88 5c   .0(.........\...\
1d830   20 24 00 09 05 16 80 5c  04 16 88 5c 14 24 00 09    $......\...\.$..
1d840   00 30 28 8c 70 f3 01 00  05 16 80 5c 04 16 88 5c   .0(.p.......\...\
1d850   00 24 00 09 00 30 28 8c  70 f6 01 00 05 16 80 5c   .$...0(.p.......\
1d860   04 16 88 5c ec 23 00 09  00 30 28 8c 60 f4 01 00   ...\.#...0(.`...
1d870   05 16 80 5c 04 16 88 5c  d8 23 00 09 00 30 28 8c   ...\...\.#...0(.
1d880   10 f2 01 00 05 16 80 5c  04 16 88 5c c4 23 00 09   .......\...\.#..
1d890   00 30 28 8c 20 f5 01 00  05 16 80 5c 04 16 88 5c   .0(. .......\...\
1d8a0   b0 23 00 09 00 30 28 8c  b0 f3 01 00 05 16 80 5c   .#...0(.........\
1d8b0   04 16 88 5c 9c 23 00 09  00 30 28 8c bc f0 01 00   ...\.#...0(.....
1d8c0   05 16 80 5c 04 16 88 5c  88 23 00 09 00 30 28 8c   ...\...\.#...0(.
1d8d0   50 f2 01 00 00 00 20 8c  05 16 80 5c 04 16 88 5c   P..... ....\...\
1d8e0   70 23 00 09 01 00 80 8c  00 00 00 0a 00 00 00 00   p#..............
1d8f0   10 16 18 5c 00 30 28 8c  bc f0 01 00 01 00 20 8c   ...\.0(....... .
1d900   05 16 80 5c 04 16 88 5c  48 23 00 09 00 30 28 8c   ...\...\H#...0(.
1d910   10 f1 01 00 00 00 20 8c  05 16 80 5c 04 16 88 5c   ...... ....\...\
1d920   30 23 00 09 00 30 28 8c  d0 ee 01 00 01 00 20 8c   0#...0(....... .
1d930   05 16 80 5c 04 16 88 5c  18 23 00 09 00 30 28 8c   ...\...\.#...0(.
1d940   00 f1 01 00 00 00 20 8c  05 16 80 5c 04 16 88 5c   ...... ....\...\
1d950   00 23 00 09 00 30 20 8c  40 c8 01 00 20 00 19 35   .#...0 .@... ..5
1d960   00 30 28 8c a0 ee 01 00  01 00 20 8c 05 16 80 5c   .0(....... ....\
1d970   04 16 88 5c dc 22 00 09  1c 00 00 08 00 30 28 8c   ...\."........0(.
1d980   40 ef 01 00 01 00 20 8c  05 16 80 5c 04 16 88 5c   @..... ....\...\
1d990   c0 22 00 09 00 30 28 8c  00 f1 01 00 00 00 20 8c   ."...0(....... .
1d9a0   05 16 80 5c 04 16 88 5c  a8 22 00 09 00 30 28 8c   ...\...\."...0(.
1d9b0   b0 ef 01 00 05 16 80 5c  04 16 88 5c 94 22 00 09   .......\...\."..
1d9c0   00 30 30 8c 14 08 06 10  04 00 28 8c 06 16 80 5c   .00.......(....\
1d9d0   05 16 88 5c 04 16 90 5c  03 16 98 5c 44 23 00 09   ...\...\...\D#..
1d9e0   00 30 38 8c d0 cf 05 10  00 30 30 8c 18 d0 05 10   .08......00.....
1d9f0   01 00 28 8c 00 30 20 8c  ff ff ff ff 07 16 80 5c   ..(..0 ........\
1da00   06 16 88 5c 05 16 90 5c  04 16 98 5c a4 48 fe 08   ...\...\...\.H..
1da10   50 60 08 8c 40 e0 1f 8c  00 30 78 8c 40 f6 01 00   P`..@....0x.@...
1da20   00 30 38 80 4a d0 05 10  00 30 30 80 4b d0 05 10   .08.J....00.K...
1da30   00 30 28 80 4c d0 05 10  00 30 20 80 4d d0 05 10   .0(.L....0 .M...
1da40   03 16 80 5c 0f 16 88 5c  07 16 90 5c 06 16 98 5c   ...\...\...\...\
1da50   05 16 a0 5c 04 16 a8 5c  e8 22 01 09 00 30 20 8c   ...\...\."...0 .
```

Mar 27 18:20 1996 image.txt Page 184

```
1da60   4a d0 05 10 00 30 20 92  40 08 06 10 00 30 20 8c   J....0 .@....0 .
1da70   10 da 01 00 00 30 20 92  44 08 06 10 00 30 20 8c   ......0 .D....0 .
1da80   c0 da 01 00 00 30 20 92  48 08 06 10 00 30 20 8c   ......0 .H....0 .
1da90   10 da 01 00 00 30 20 92  4c 08 06 10 03 16 28 5c   ......0 .L.....(\
1daa0   00 00 20 8c 05 16 80 5c  04 16 88 5c a4 21 00 09   .. ....\...\.!..
1dab0   01 00 80 8c 00 00 00 0a  00 00 00 00 00 00 00 00   ................
1dac0   50 60 08 8c 40 e0 1f 8c  00 30 78 8c 10 f6 01 00   P`..@....0x.....
1dad0   00 30 38 80 4e d0 05 10  00 30 30 80 4f d0 05 10   .08.N....00.O...
1dae0   00 30 28 80 50 d0 05 10  00 30 20 80 51 d0 05 10   .0(.P....0 .Q...
1daf0   03 16 80 5c 01 16 88 5c  07 16 90 5c 06 16 98 5c   ...\...\...\...\
1db00   05 16 a0 5c 04 16 a8 5c  38 22 01 09 00 30 20 8c   ...\...\8"...0 .
1db10   4e d0 05 10 00 30 20 92  40 08 06 10 00 30 20 8c   N....0 .@....0 .
1db20   10 da 01 00 00 30 20 92  44 08 06 10 00 30 20 8c   ......0 .D....0 .
1db30   70 db 01 00 00 30 20 92  48 08 06 10 00 30 20 8c   p....0 .H....0 .
1db40   c0 da 01 00 00 30 20 92  4c 08 06 10 03 16 28 5c   ......0 .L.....(\
1db50   00 00 20 8c 05 16 80 5c  04 16 88 5c f4 20 00 09   .. ....\...\. ..
1db60   01 00 80 8c 00 00 00 0a  00 00 00 00 00 00 00 00   ................
1db70   50 60 08 8c 40 e0 1f 8c  00 30 78 8c 00 f8 01 00   P`..@....0x.....
1db80   00 30 38 80 56 d0 05 10  00 30 30 80 57 d0 05 10   .08.V....00.W...
1db90   00 30 28 80 58 d0 05 10  00 30 20 80 59 d0 05 10   .0(.X....0 .Y...
1dba0   03 16 80 5c 0f 16 88 5c  07 16 90 5c 06 16 98 5c   ...\...\...\...\
1dbb0   05 16 a0 5c 04 16 a8 5c  88 21 01 09 00 30 20 8c   ...\...\.!...0 .
1dbc0   56 d0 05 10 00 30 20 92  40 08 06 10 00 30 20 8c   V....0 .@....0 .
1dbd0   c0 da 01 00 00 30 20 92  44 08 06 10 00 30 20 8c   ......0 .D....0 .
1dbe0   20 dc 01 00 00 30 20 92  48 08 06 10 00 30 20 8c    ....0 .H....0 .
1dbf0   70 db 01 00 00 30 20 92  4c 08 06 10 03 16 28 5c   p....0 .L.....(\
1dc00   00 00 20 8c 05 16 80 5c  04 16 88 5c 44 20 00 09   .. ....\...\D ..
1dc10   01 00 80 8c 00 00 00 0a  00 00 00 00 00 00 00 00   ................
1dc20   50 60 08 8c 40 e0 37 8c  00 30 28 8c f0 f4 01 00   P`..@.7..0(.....
1dc30   00 30 20 90 5a d0 05 10  06 16 80 5c 05 16 88 5c   .0 .Z......\...\
1dc40   04 16 90 5c fc 20 01 09  00 30 20 8c 70 db 01 00   ...\. ...0 .p...
1dc50   00 30 20 92 44 08 06 10  00 00 20 8c 00 30 20 92   .0 .D..... ..0 .
1dc60   48 08 06 10 00 30 20 8c  20 dc 01 00 00 30 20 92   H....0 . ....0 .
1dc70   4c 08 06 10 06 16 28 5c  00 00 20 8c 05 16 80 5c   L.....(\.. ....\
1dc80   04 16 88 5c cc 1f 00 09  01 00 80 8c 00 00 00 0a   ...\............
1dc90   00 30 28 8c c0 f0 01 00  01 00 20 8c 05 16 80 5c   .0(....... ....\
1dca0   04 16 88 5c ac 1f 00 09  00 30 28 8c 90 f3 01 00   ...\.....0(.....
1dcb0   05 16 80 5c 04 16 88 5c  98 1f 00 09 00 30 28 80   ...\...\.....0(.
1dcc0   00 00 00 40 ff 00 20 8c  85 00 21 58 50 20 39 30   ...@.. ...!XP 90
1dcd0   00 30 28 8c 60 fa 01 00  01 00 20 8c 05 16 80 5c   .0(.`..... ....\
```

```
Mar 27 18:20 1996  image.txt Page 183

1dce0   04 16 88 5c 6c 1f 00 09  18 fa ff 09 00 30 38 8c   ...\l.........08.
1dcf0   d0 cf 05 10 00 30 30 8c  18 d0 05 10 04 16 28 5c   .....00.......(\
1dd00   00 30 20 8c ff ff ff ff  07 16 80 5c 06 16 88 5c   .0 ........\...\
1dd10   05 16 90 5c 04 16 98 5c  98 45 fe 08 44 00 00 09   ...\...\.E..D...
1dd20   00 30 28 8c 50 08 06 10  14 00 20 8c 05 16 80 5c   .0(.P.... ....\
1dd30   04 16 88 5c 2c 59 fe 09  05 16 38 5c 12 00 30 8c   ...\,Y....8\..0.
1dd40   00 00 28 8c 00 30 20 8c  e0 dd 01 00 07 16 80 5c   ..(..0 ........\
1dd50   06 16 88 5c 05 16 90 5c  04 16 98 5c c4 1f 00 08   ...\...\...\....
1dd60   50 60 08 8c 40 e0 1f 8c  00 30 78 8c c0 f7 01 00   P`..@....0x.....
1dd70   00 30 70 80 60 ec 05 10  00 30 e8 80 61 ec 05 10   .0p.`....0..a...
1dd80   00 30 38 80 62 ec 05 10  00 30 30 80 63 ec 05 10   .08.b....00.c...
1dd90   00 30 28 80 64 ec 05 10  00 30 20 80 65 ec 05 10   .0(.d....0 .e...
1dda0   03 16 80 5c 0f 16 88 5c  0e 16 90 5c 1d 16 98 5c   ...\...\...\...\
1ddb0   07 16 a0 5c 06 16 a8 5c  05 16 b0 5c 04 16 b8 5c   ...\...\...\...\
1ddc0   80 1f 01 09 03 16 28 5c  00 00 20 8c 05 16 80 5c   ......(\.. ....\
1ddd0   04 16 88 5c 7c 1e 00 09  01 00 80 8c 00 00 00 0a   ...\|...........
1dde0   00 30 28 8c bc f0 01 00  01 00 20 8c 05 16 80 5c   .0(....... ....\
1ddf0   04 16 88 5c 5c 1e 00 09  00 30 20 80 50 08 06 10   ...\\....0 .P...
1de00   38 20 69 3d fc f8 ff 09  00 30 38 8c d0 cf 05 10   8 i=.....08.....
1de10   00 30 30 8c 18 d0 05 10  01 00 28 8c 00 30 20 8c   .00.......(..0 .
1de20   ff ff ff ff 07 16 80 5c  06 16 88 5c 05 16 90 5c   .......\...\...\
1de30   04 16 98 5c 7c 44 fe 08  00 30 28 8c 50 08 06 10   ...\|D...0(.P...
1de40   11 00 20 8c 05 16 80 5c  04 16 88 5c 84 0f 00 09   .. ....\...\....
1de50   90 20 04 3a 00 30 28 8c  70 f9 01 00 01 00 20 8c   . .:.0(.p..... .
1de60   05 16 80 5c 04 16 88 5c  e8 1d 00 09 f4 fe ff 09   ...\...\........
1de70   00 30 28 8c 50 08 06 10  14 00 20 8c 05 16 80 5c   .0(.P..... ....\
1de80   04 16 88 5c dc 57 fe 09  05 16 38 5c 12 00 30 8c   ...\.W....8\..0.
1de90   00 00 28 8c 00 30 20 8c  e0 dd 01 00 07 16 80 5c   ..(..0 ........\
1dea0   06 16 88 5c 05 16 90 5c  04 16 98 5c 74 1e 00 09   ...\...\...\t...
1deb0   00 30 38 8c d0 cf 05 10  00 30 30 8c 18 d0 05 10   .08......00.....
1dec0   01 00 28 8c 00 30 20 8c  ff ff ff ff 07 16 80 5c   ..(..0 ........\
1ded0   06 16 88 5c 05 16 90 5c  04 16 98 5c d4 43 fe 08   ...\...\...\.C..
1dee0   20 f8 ff 09 00 30 38 8c  d0 cf 05 10 00 30 30 8c    ....08......00.
1def0   18 d0 05 10 01 00 28 8c  00 30 20 8c ff ff ff ff   ......(..0 .....
1df00   07 16 80 5c 06 16 88 5c  05 16 90 5c 04 16 98 5c   ...\...\...\...\
1df10   a0 43 fe 08 00 00 00 00  00 00 00 00 00 00 00 00   .C..............
1df20   00 30 20 8c 10 da 01 00  00 30 20 92 44 08 06 10   .0 ......0 .D...
1df30   00 30 20 92 4c 08 06 10  00 30 20 8c c0 da 01 00   .0 .L....0 .....
1df40   00 30 20 92 48 08 06 10  00 30 28 8c 60 f0 01 00   .0 .H....0(.`...
1df50   00 00 20 8c 05 16 80 5c  04 16 88 5c f4 1c 00 09   .. ....\...\....
```

```
Mar 27 18:20 1996  image.txt Page 166

1df60   00 30 28 8c c0 f0 01 00  01 00 20 8c 05 16 80 5c   .0(........ ....\
1df70   04 16 88 5c dc 1c 00 09  00 30 28 8c c0 f4 01 00   ...\.....0(.....
1df80   05 16 80 5c 04 16 88 5c  c8 1c 00 09 00 30 28 8c   ...\...\......0(.
1df90   c0 f0 01 00 05 16 80 5c  04 16 88 5c b4 1c 00 09   .......\...\....
1dfa0   00 30 80 90 4c 08 06 10  08 00 00 08 00 00 00 00   .0..L...........
1dfb0   10 16 18 5c 00 d0 00 86  00 30 28 8c 70 08 06 10   ...\.....0(.p...
1dfc0   10 00 20 8c 05 16 80 5c  04 16 88 5c 94 56 fe 09   .. ....\...\.V..
1dfd0   05 16 38 5c 04 16 30 5c  00 00 28 8c 00 30 20 8c   ..8\..0\..(..0 .
1dfe0   00 e0 01 00 07 16 80 5c  06 16 88 5c 05 16 90 5c   .......\...\...\
1dff0   04 16 98 5c 2c 1d 00 09  01 00 80 8c 00 00 00 0a   ...\,...........
1e000   10 60 08 8c 00 30 68 8c  20 d0 05 10 00 30 28 8c   .`...0h. ....0(.
1e010   8c f0 01 00 01 00 20 8c  05 16 80 5c 04 16 88 5c   ...... ....\...\
1e020   30 1c 00 09 00 30 20 80  70 08 06 10 58 20 69 3d   0....0 .p...X i=
1e030   00 30 20 90 48 08 06 10  0c 20 01 35 c4 f6 ff 09   .0 .H.... .5....
1e040   10 00 00 08 00 30 80 90  48 08 06 10 64 ff ff 09   .....0..H...d...
1e050   00 30 38 8c d0 cf 05 10  00 30 30 8c 18 d0 05 10   .08......00.....
1e060   01 00 28 8c 00 30 20 8c  ff ff ff ff 07 16 80 5c   ..(..0 ........\
1e070   06 16 88 5c 05 16 90 5c  04 16 98 5c 34 42 fe 09   ...\...\...\4B..
1e080   00 00 00 0a 00 30 20 80  70 08 06 10 14 20 11 3a   .....0 .p.... .:
1e090   00 30 28 80 70 08 06 10  5e 00 20 8c 44 00 29 3d   .0(.p...^. .D.)=
1e0a0   00 30 80 90 44 08 06 10  08 ff ff 09 00 30 38 8c   .0..D........08.
1e0b0   d0 cf 05 10 00 30 30 8c  18 d0 05 10 01 00 28 8c   .....00.......(.
1e0c0   00 30 20 8c ff ff ff ff  07 16 80 5c 06 16 88 5c   .0 ........\...\
1e0d0   05 16 90 5c 04 16 98 5c  d8 41 fe 09 00 00 00 0a   ...\...\.A......
1e0e0   00 30 20 80 70 08 06 10  14 20 19 3a 00 30 28 80   .0 .p.... .:.0(.
1e0f0   70 08 06 10 24 00 20 8c  3c 00 29 3d 04 f6 ff 09   p...$. .<.)=....
1e100   00 30 38 8c d0 cf 05 10  00 30 30 8c 18 d0 05 10   .08......00.....
1e110   01 00 28 8c 00 30 20 8c  ff ff ff ff 07 16 80 5c   ..(..0 ........\
1e120   06 16 88 5c 05 16 90 5c  04 16 98 5c 84 41 fe 09   ...\...\...\.A..
1e130   00 00 00 0a 00 30 28 90  4c 08 06 10 00 30 20 8c   .....0(.L....0 .
1e140   20 dc 01 00 c8 00 29 35  00 30 80 8c 70 08 06 10    .....)5.0..p...
1e150   48 1d 01 0b 10 16 70 5c  2c 20 04 3d 00 30 28 8c   H.....p\, .=.0(.
1e160   60 fb 01 00 01 00 20 8c  05 16 80 5c 04 16 88 5c   `..... ....\...\
1e170   e0 1a 00 09 00 30 80 90  4c 08 06 10 34 fe ff 09   .....0..L...4...
1e180   58 00 00 08 00 30 20 90  a0 f5 05 10 2a 28 29 88   X....0 .....*().
1e190   00 30 20 8c ff ff 00 00  85 00 21 58 0c 00 71 39   .0 .......!X..q9
1e1a0   64 00 20 8c 2c 00 71 3b  00 30 28 8c c0 f9 01 00   d. .,.q;.0(.....
1e1b0   01 00 20 8c 05 16 80 5c  04 16 88 5c 94 1a 00 09   .. ....\...\....
1e1c0   00 30 80 90 4c 08 06 10  e8 fd ff 09 0c 00 00 08   .0..L...........
1e1d0   3a 60 73 92 2c f5 ff 09  00 30 38 8c d0 cf 05 10   :`s.,.....08....
```

```
Mar 27 18:20 1996  image.txt Page 167

1e1e0   00 30 30 8c 18 d0 05 10  01 00 28 8c 00 30 20 8c   .00.......(..0 .
1e1f0   ff ff ff ff 07 16 80 5c  06 16 88 5c 05 16 90 5c   .......\...\...\
1e200   04 16 98 5c ac 40 fe 09  00 00 00 0a 00 30 18 8c   ...\.@.......0..
1e210   70 08 06 10 00 30 78 8c  00 f7 01 00 40 e0 3f 8c   p....0x.....@.?.
1e220   44 e0 37 8c 48 e0 2f 8c  4c e0 27 8c 03 16 80 5c   D.7.H./.L.'....\
1e230   0f 16 88 5c 07 16 90 5c  06 16 98 5c 05 16 a0 5c   ...\...\...\...\
1e240   04 16 a8 5c ac 1b 01 09  84 28 04 5a 18 01 00 15   ...\.....(.Z....
1e250   40 e0 3f 90 44 e0 37 90  48 e0 2f 90 4c e0 27 90   @.?.D.7.H./.L.'.
1e260   07 16 80 5c 06 16 88 5c  05 16 90 5c 04 16 98 5c   ...\...\...\...\
1e270   50 01 00 09 8c 20 04 3a  00 30 28 90 4c 08 06 10   P.... .:.0(.L...
1e280   00 30 20 8c c0 0a 01 00  20 00 29 35 00 30 28 8c   .0 ..... .)5.0(.
1e290   40 f9 01 00 01 00 20 8c  05 16 80 5c 04 16 88 5c   @..... ....\...\
1e2a0   b0 19 00 09 1c 00 00 08  00 30 28 8c f0 f9 01 00   .........0(.....
1e2b0   01 00 20 8c 05 16 80 5c  04 16 88 5c 94 19 00 09   .. ....\...\....
1e2c0   00 30 80 90 4c 08 06 10  e8 fc ff 09 00 30 38 8c   .0..L........08.
1e2d0   d0 cf 05 10 00 30 30 8c  18 d0 05 10 01 00 28 8c   .....00.......(.
1e2e0   00 30 20 8c ff ff ff ff  07 16 80 5c 06 16 88 5c   .0 ........\...\
1e2f0   05 16 90 5c 04 16 98 5c  b8 3f fe 09 00 00 00 0a   ...\...\.?......
1e300   40 e0 2f 90 00 30 20 90  40 08 06 10 00 10 29 82   @./..0 .@.....).
1e310   44 e0 2f 90 00 30 20 90  40 08 06 10 01 20 29 82   D./..0 .@.... ).
1e320   48 e0 2f 90 00 30 20 90  40 08 06 10 02 20 29 82   H./..0 .@.... ).
1e330   4c e0 2f 90 00 30 20 90  40 08 06 10 03 20 29 82   L./..0 .@.... ).
1e340   00 30 20 90 48 08 06 10  0c 20 01 35 b4 f3 ff 09   .0 .H.... .5....
1e350   38 00 00 08 00 30 80 90  48 08 06 10 54 fc ff 09   8....0..H...T...
1e360   28 00 00 08 00 30 28 8c  20 ee 01 00 01 00 20 8c   (....0(. ..... .
1e370   05 16 80 5c 04 16 88 5c  d8 18 00 09 00 30 80 90   ...\...\.....0..
1e380   4c 08 06 10 2c fc ff 09  00 30 38 8c d0 cf 05 10   L...,....08.....
1e390   00 30 30 8c 18 d0 05 10  01 00 28 8c 00 30 20 8c   .00.......(..0 .
1e3a0   ff ff ff ff 07 16 80 5c  06 16 88 5c 05 16 90 5c   .......\...\...\
1e3b0   04 16 98 5c fc 3e fe 09  00 00 00 0a 00 00 00 00   ...\.>..........
1e3c0   11 16 30 5c 12 16 38 5c  13 16 18 5c ff 00 20 8c   ..0\..8\...\.. .
1e3d0   1c 00 81 31 ff 00 20 8c  14 00 31 31 ff 00 20 8c   ...1.. ...11.. .
1e3e0   0c 00 39 31 ff 00 20 8c  0c 00 19 36 01 00 80 8c   ..91.. ....6....
1e3f0   00 00 00 0a 00 00 80 8c  00 00 00 0a 00 00 00 00   ................
1e400   50 60 08 8c 40 e0 37 8c  00 30 28 8c 20 f4 01 00   P`..@.7..0(. ...
1e410   00 30 20 8c 69 d0 05 10  06 16 80 5c 05 16 88 5c   .0 .i......\...\
1e420   04 16 90 5c 1c 19 01 09  00 30 20 8c 00 e4 01 00   ...\.....0 .....
1e430   00 30 20 92 44 08 06 10  00 30 20 8c 90 e4 01 00   .0 .D....0 .....
1e440   00 30 20 92 48 08 06 10  00 30 20 8c 00 e4 01 00   .0 .H....0 .....
1e450   00 30 20 92 4c 08 06 10  15 00 20 8c 00 30 20 92   .0 .L..... ..0 .
```

Mar 27 16:20 1996 image.txt Page 188

```
1e460   90 08 06 10 00 30 20 8c  69 d0 05 10 00 30 20 92   .....0 .i....0 .
1e470   94 08 06 10 06 16 28 5c  00 00 20 8c 05 16 80 5c   ......(\.. ....\
1e480   04 16 88 5c cc 17 00 09  01 00 80 8c 00 00 00 0a   ...\............
1e490   50 60 08 8c 40 e0 37 8c  00 30 28 8c d0 f3 01 00   P`..@.7..0(.....
1e4a0   00 30 20 8c 7e d0 05 10  06 16 80 5c 05 16 88 5c   .0 .~......\...\
1e4b0   04 16 90 5c 8c 18 01 09  00 30 20 8c 00 e4 01 00   ...\.....0 .....
1e4c0   00 30 20 92 44 08 06 10  00 30 20 8c 20 e5 01 00   .0 .D....0 . ...
1e4d0   00 30 20 92 48 08 06 10  00 30 20 8c 90 e4 01 00   .0 .H....0 .....
1e4e0   00 30 20 92 4c 08 06 10  06 00 20 8c 00 30 20 92   .0 .L..... ..0 .
1e4f0   90 08 06 10 00 30 20 8c  7e d0 05 10 00 30 20 92   .....0 .~....0 .
1e500   94 08 06 10 06 16 28 5c  00 00 20 8c 05 16 80 5c   ......(\.. ....\
1e510   04 16 88 5c 3c 17 00 09  01 00 80 8c 00 00 00 0a   ...\<...........
1e520   50 60 08 8c 40 e0 37 8c  00 30 28 8c 90 f4 01 00   P`..@.7..0(.....
1e530   00 30 20 8c 8b d0 05 10  06 16 80 5c 05 16 88 5c   .0 .........\...\
1e540   04 16 90 5c fc 17 01 09  00 30 20 8c 90 e4 01 00   ...\.....0 .....
1e550   00 30 20 92 44 08 06 10  00 00 20 8c 00 30 20 92   .0 .D..... ..0 .
1e560   48 08 06 10 00 30 20 8c  20 e5 01 00 00 30 20 92   H....0 . ....0 .
1e570   4c 08 06 10 02 00 20 8c  00 30 20 92 90 08 06 10   L..... ..0 .....
1e580   00 30 20 8c 8b d0 05 10  00 30 20 92 94 08 06 10   .0 ......0 .....
1e590   06 16 28 5c 00 00 20 8c  05 16 80 5c 04 16 88 5c   ..(\.. ....\...\
1e5a0   b0 16 00 09 01 00 80 8c  00 00 00 0a 00 00 00 00   ................
1e5b0   50 60 08 8c 40 e0 37 8c  00 30 28 8c f0 f3 01 00   P`..@.7..0(.....
1e5c0   00 30 20 8c 89 d0 05 10  06 16 80 5c 05 16 88 5c   .0 ........\...\
1e5d0   04 16 90 5c 6c 17 01 09  00 30 20 8c 20 e5 01 00   ...\l....0 . ...
1e5e0   00 30 20 92 44 08 06 10  00 00 20 8c 00 30 20 92   .0 .D..... ..0 .
1e5f0   48 08 06 10 00 30 20 8c  b0 e5 01 00 00 30 20 92   H....0 ......0 .
1e600   4c 08 06 10 02 00 20 8c  00 30 20 92 90 08 06 10   L..... ..0 .....
1e610   00 30 20 8c 89 d0 05 10  00 30 20 92 94 08 06 10   .0 ......0 .....
1e620   06 16 28 5c 00 00 20 8c  05 16 80 5c 04 16 88 5c   ..(\.. ....\...\
1e630   20 16 00 09 01 00 80 8c  00 00 00 0a 00 00 00 00    ...............
1e640   00 30 20 8c 00 e4 01 00  00 30 20 92 4c 08 06 10   .0 ......0 .L...
1e650   00 30 28 8c 60 f0 01 00  00 00 20 8c 05 16 80 5c   .0(.`..... ....\
1e660   04 16 88 5c ec 15 00 09  00 30 28 8c bc f0 01 00   ...\.....0(.....
1e670   01 00 20 8c 05 16 80 5c  04 16 88 5c d4 15 00 09   .. ....\...\....
1e680   00 30 28 8c 10 f7 01 00  05 16 80 5c 04 16 88 5c   .0(........\...\
1e690   c0 15 00 09 00 30 28 8c  c0 f0 01 00 05 16 80 5c   .....0(........\
1e6a0   04 16 88 5c ac 15 00 09  00 30 80 90 4c 08 06 10   ...\.....0..L...
1e6b0   10 00 00 08 00 00 00 00  00 00 00 00 00 00 00 00   ................
1e6c0   10 16 18 5c 00 d0 00 86  00 30 38 8c a0 08 06 10   ...\.....08.....
1e6d0   00 30 30 90 90 08 06 10  00 00 28 8c 00 30 20 8c   .00.......(..0 .
```

```
Mar 27 15:20 1996  image.txt Page 165

1e6e0   00 e7 01 00 07 16 80 5c  06 16 88 5c 05 16 90 5c   .......\...\...\
1e6f0   04 16 98 5c 2c 16 00 09  01 00 d0 8c 00 00 00 0a   ...\,...........
1e700   00 30 18 8c 20 d0 05 10  00 30 28 8c bc f0 01 00   .0.. ....0(.....
1e710   01 00 20 8c 05 16 80 5c  04 16 88 5c 34 15 00 09   .. ....\...\4...
1e720   00 30 20 80 a0 08 06 10  14 20 11 3a 00 30 28 80   .0 ...... .:.0(.
1e730   a0 08 06 10 5e 00 20 8c  40 00 29 3d 00 30 80 90   ....^. .@.)=.0..
1e740   44 08 06 10 7c ff ff 09  00 30 38 8c d0 cf 05 10   D...|....08.....
1e750   00 30 30 8c 18 d0 05 10  01 00 28 8c 00 30 20 8c   .00.......(..0 .
1e760   ff ff ff ff 07 16 80 5c  06 16 88 5c 05 16 90 5c   .......\...\...\
1e770   04 16 98 5c 3c 3b fe 08  00 30 20 80 a0 08 06 10   ...\<;...0 .....
1e780   14 20 19 3a 00 30 28 80  a0 08 06 10 24 00 20 8c   . .:.0(.....$. .
1e790   38 00 29 3d 6c ef ff 09  00 30 38 8c d0 cf 05 10   8.)=l....08.....
1e7a0   00 30 30 8c 18 d0 05 10  01 00 28 8c 00 30 20 8c   .00.......(..0 .
1e7b0   ff ff ff ff 07 16 80 5c  06 16 88 5c 05 16 90 5c   .......\...\...\
1e7c0   04 16 98 5c ec 3a fe 08  00 30 28 80 a0 08 06 10   ...\.:...0(.....
1e7d0   7f 00 20 8c 5c 00 29 3d  00 30 28 90 4c 08 06 10   .. .\.)=.0(.L...
1e7e0   00 30 20 8c 00 e4 01 00  48 00 29 35 00 00 20 8c   .0 .....H.)5.. .
1e7f0   49 e0 20 82 00 30 80 90  4c 08 06 10 c4 fe ff 09   I. ..0..L.......
1e800   00 30 38 8c d0 cf 05 10  00 30 30 8c 18 d0 05 10   .08......00.....
1e810   01 00 28 8c 00 30 20 8c  ff ff ff ff 07 16 80 5c   ..(..0 ........\
1e820   06 16 88 5c 05 16 90 5c  04 16 98 5c 84 3a fe 08   ...\...\...\.:..
1e830   00 30 20 80 a0 08 06 10  8d 28 01 5a cc 01 00 12   .0 ......(.Z....
1e840   00 30 28 90 4c 08 06 10  00 30 20 8c 00 e4 01 00   .0(.L....0 .....
1e850   68 00 29 35 00 30 80 8c  a0 08 06 10 94 34 00 09   h.)5.0.......4..
1e860   58 20 04 3d 00 30 28 8c  60 fb 01 00 01 00 20 8c   X .=.0(.`..... .
1e870   05 16 80 5c 04 16 88 5c  d8 13 00 09 00 30 80 90   ...\...\.....0..
1e880   4c 08 06 10 3c fe ff 09  00 30 38 8c d0 cf 05 10   L...<....08.....
1e890   00 30 30 8c 18 d0 05 10  04 16 28 5c 00 30 20 8c   .00.......(\.0 .
1e8a0   ff ff ff ff 07 16 80 5c  06 16 88 5c 05 16 90 5c   .......\...\...\
1e8b0   04 16 98 5c fc 39 fe 08  00 30 28 90 4c 08 06 10   ...\.9...0(.L...
1e8c0   00 30 20 8c 90 e4 01 00  68 00 29 35 00 30 80 8c   .0 .....h.)5.0..
1e8d0   a0 08 06 10 5c 34 00 09  58 20 04 3d 00 30 28 8c   ....\4..X .=.0(.
1e8e0   e0 fa 01 00 01 00 20 8c  05 16 80 5c 04 16 88 5c   ...... ....\...\
1e8f0   60 13 00 09 00 30 80 90  4c 08 06 10 c4 fd ff 09   `....0..L.......
1e900   00 30 38 8c d0 cf 05 10  00 30 30 8c 18 d0 05 10   .08......00.....
1e910   04 16 28 5c 00 30 20 8c  ff ff ff ff 07 16 80 5c   ..(\.0 ........\
1e920   06 16 88 5c 05 16 90 5c  04 16 98 5c 84 39 fe 08   ...\...\...\.9..
1e930   00 30 28 90 4c 08 06 10  00 30 20 8c 20 e5 01 00   .0(.L....0 . ...
1e940   78 00 29 35 00 30 28 80  a0 08 06 10 2a 00 20 8c   x.)5.0(.....*. .
1e950   68 00 29 3a 00 30 28 80  a0 08 06 10 23 00 20 8c   h.):.0(.....#. .
```

Mar 27 18:20 1996 image.txt Page 190

```
1e960   58 00 29 3a 00 30 28 8c  20 fb 01 00 01 00 20 8c   X.):.0(. ...... .
1e970   05 16 80 5c 04 16 88 5c  d8 12 00 09 00 30 80 90   ...\...\......0..
1e980   4c 08 06 10 3c fd ff 09  00 30 38 8c d0 cf 05 10   L...<....08.....
1e990   00 30 30 8c 18 d0 05 10  04 16 28 5c 00 30 20 8c   .00......(\.0 .
1e9a0   ff ff ff ff 07 16 80 5c  06 16 88 5c 05 16 90 5c   .......\...\...\
1e9b0   04 16 98 5c fc 38 fe 08  00 30 30 90 94 08 06 10   ...\.8...00.....
1e9c0   00 30 28 8c a0 08 06 10  05 16 80 5c 84 1c 01 0b   .0(........\....
1e9d0   10 16 20 5c 06 16 80 5c  05 16 88 5c 04 16 90 5c   .. \...\...\...\
1e9e0   e0 1a 01 0b 00 30 28 8c  a0 08 06 10 2a 00 20 8c   .....0(.....*. ,
1e9f0   10 00 29 3a 23 00 20 8c  69 e0 20 82 0c 00 00 08   ..):#. .i. .....
1ea00   2a 00 20 8c 69 e0 20 82  00 30 20 90 48 08 06 10   *. .i. ..0 .H...
1ea10   38 20 01 35 ec ec ff 09  00 30 38 8c d0 cf 05 10   8 .5.....08.....
1ea20   00 30 30 8c 18 d0 05 10  01 00 28 8c 00 30 20 8c   .00......(..0 .
1ea30   ff ff ff ff 07 16 80 5c  06 16 88 5c 05 16 90 5c   .......\...\...\
1ea40   04 16 98 5c 6c 38 fe 08  00 30 80 90 48 08 06 10   ...\l8...0..H...
1ea50   70 fc ff 09 00 30 38 8c  d0 cf 05 10 00 30 30 8c   p....08......00.
1ea60   18 d0 05 10 01 00 28 8c  00 30 20 8c ff ff ff ff   ......(..0 .....
1ea70   07 16 80 5c 06 16 88 5c  05 16 90 5c 04 16 98 5c   ...\...\...\...\
1ea80   30 38 fe 08 00 00 00 00  00 00 00 00 00 00 00 00   08..............
1ea90   10 60 08 8c 10 16 68 5c  11 16 70 5c 00 00 78 8c   .`....h\..p\..x.
1eaa0   0f 16 38 5c 07 16 18 5c  80 68 04 5a 0c 01 00 13   ..8\...\.h.Z....
1eab0   0d c0 20 59 00 10 29 c0  2d 00 20 8c 98 00 29 3a   .. Y..).-. ...):
1eac0   0d c0 20 59 00 10 29 c0  30 00 20 8c 14 00 29 3c   .. Y..).0. ...)<
1ead0   0d c0 20 59 00 10 29 c0  39 00 20 8c 4c 00 29 3e   .. Y..).9. .L.)>
1eae0   0d c0 20 59 00 10 29 c0  61 00 20 8c 14 00 29 3c   .. Y..).a. ...)<
1eaf0   0d c0 20 59 00 10 29 c0  66 00 20 8c 2c 00 29 3e   .. Y..).f. .,.)>
1eb00   0d c0 20 59 00 10 29 c0  41 00 20 8c 14 00 29 3c   .. Y..).A. ...)<
1eb10   0d c0 20 59 00 10 29 c0  46 00 20 8c 0c 00 29 3e   .. Y..).F. ...)>
1eb20   01 00 80 8c 00 00 00 0a  0c e0 21 35 01 00 80 8c   ..........!5....
1eb30   00 00 00 0a 0d c0 20 59  00 10 31 c0 40 e0 2f 8c   ...... Y..1.@./.
1eb40   07 16 20 5c 01 e0 39 8c  05 00 21 59 00 10 31 c2   .. \..9...!Y..1.
1eb50   58 00 00 08 0f 16 20 5c  01 e0 7b 8c 08 20 29 3a   X..... \..{.. ):
1eb60   0c e0 01 3d 01 00 80 8c  00 00 00 0a 00 00 28 8c   ...=..........(.
1eb70   40 e0 27 8c 04 c0 21 59  00 10 29 c2 05 16 38 5c   @.'...!Y..)...8\
1eb80   40 e0 37 8c 10 00 20 8c  06 16 80 5c 05 16 88 5c   @.7... ....\...\
1eb90   04 16 90 5c ac 13 01 09  ff 00 20 8c 0c 00 81 3e   ...\...... ....>
1eba0   01 00 60 8c 00 00 00 0a  01 e0 20 8c 04 16 18 5c   .......... ....\
1ebb0   84 a0 03 5a fc fe ff 14  0c e0 01 3a 08 e0 03 3a   ...Z.......:...:
1ebc0   0c e0 2b 3e 01 00 80 8c  00 00 00 0a 00 00 28 8c   ..+>..........(.
1ebd0   40 e0 27 8c 04 c0 21 59  00 10 29 c2 40 e0 87 8c   @.'...!Y..).@...
```

```
Mar 27 18:20 1996  image.txt Page 191

1ebe0   b8 12 01 0b ff 00 20 8c  0c 00 81 3e 01 00 80 8c   ...... ....>....
1ebf0   00 00 00 0a 00 00 80 8c  00 00 00 0a 00 00 00 00   ................
1ec00   10 60 08 8c 10 16 60 5c  11 16 68 5c 13 16 70 5c   .`....`\..h\..p\
1ec10   00 00 78 8c 01 16 38 5c  07 16 18 5c 80 6e 04 5a   ..x...8\...\.n.Z
1ec20   24 01 00 13 0c c0 20 59  00 10 29 c0 2d 00 20 8c   $..... Y..).-. .
1ec30   98 00 29 3a 0c c0 20 59  00 10 29 c0 30 00 20 8c   ..):.. Y..).0. .
1ec40   14 00 29 3c 0c c0 20 59  00 10 29 c0 39 00 20 8c   ..)<.. Y..).9. .
1ec50   4c 00 29 3e 0c c0 20 59  00 10 29 c0 61 00 20 8c   L.)>.. Y..).a. .
1ec60   14 00 29 3c 0c c0 20 59  00 10 29 c0 65 00 20 8c   ..)<.. Y..).e. .
1ec70   2c 00 29 3e 0c c0 20 59  00 10 29 c0 41 00 20 8c   ,.)>.. Y..).A. .
1ec80   14 00 29 3c 0c c0 20 59  00 10 29 c0 46 00 20 8c   ..)<.. Y..).F. .
1ec90   0c 00 29 3e 01 00 80 8c  00 00 00 0a 0c e0 21 35   ..)>..........!5
1eca0   01 00 80 8c 00 00 00 0a  0c c0 20 59 00 10 31 c0   .......... Y..1.
1ecb0   40 e0 2f 8c 07 16 20 5c  01 e0 39 8c 05 00 21 59   @./... \..9...!Y
1ecc0   00 10 31 c2 70 00 00 08  0f 16 20 5c 01 e0 7b 8c   ..1.p.... \..{.
1ecd0   08 20 29 3a 0c e0 01 3d  01 00 80 8c 00 00 00 0a   . ):...=........
1ece0   00 00 28 8c 40 e0 27 8c  04 c0 21 59 00 10 29 c2   ..(.@.'...!Y..).
1ecf0   05 16 38 5c 40 e0 37 8c  10 00 20 8c 06 16 80 5c   ..8\@.7... ....\
1ed00   05 16 88 5c 04 16 90 5c  38 12 01 09 ff 00 20 8c   ...\...\8..... .
1ed10   90 00 31 58 48 e0 2f 8c  81 c9 23 59 05 00 21 59   ..1XH./...#Y..!Y
1ed20   00 10 81 82 ff 00 20 8c  0c 00 31 3e 01 00 80 8c   ...... ...1>....
1ed30   00 00 00 0a 01 e0 20 8c  04 16 18 5c 84 60 03 5a   ...... ....\.`.Z
1ed40   e4 fe ff 14 0c e0 01 3a  08 e0 03 3a 0c e0 2b 3e   .......:...:..+>
1ed50   01 00 80 8c 00 00 00 0a  00 00 28 8c 40 e0 27 8c   ..........(.@.'.
1ed60   04 c0 21 59 00 10 29 c2  40 e0 37 8c 10 00 20 8c   ..!Y..).@.7... .
1ed70   06 16 80 5c 05 16 88 5c  04 16 90 5c c4 11 01 09   ...\...\...\....
1ed80   ff 00 20 8c 90 00 29 58  48 e0 27 8c 04 c0 23 59   .. ...)XH.'...#Y
1ed90   00 10 81 82 ff 00 20 8c  0c 00 29 3e 01 00 80 8c   ...... ...)>....
1eda0   00 00 00 0a 48 e0 2f 8c  06 00 20 8c 0e 16 80 5c   ....H./... ....\
1edb0   05 16 88 5c 04 16 90 5c  f0 27 fe 0b 00 00 80 8c   ...\...\.'......
1edc0   00 00 00 0a 00 00 00 00  00 00 00 00 00 00 00 00   ................
1edd0   10 16 30 5c 11 16 38 5c  b8 fc ff 09 10 16 18 5c   ..0\..8\.......\
1ede0   0c 20 04 3a 03 16 80 5c  00 00 00 0a 00 30 20 8c   . .:...\.....0 .
1edf0   60 ec 05 10 06 16 80 5c  07 16 88 5c 04 16 90 5c   `......\...\...\
1ee00   00 fe ff 09 10 16 18 5c  0c 20 04 3a 03 16 80 5c   .......\. .:...\
1ee10   00 00 00 0a 00 00 80 8c  00 00 00 0a 00 00 00 00   ................
1ee20   45 52 52 4f 52 20 2d 20  31 30 30 33 20 2d 20 46   ERROR - 1003 - F
1ee30   69 65 6c 64 20 66 6f 72  6d 61 74 20 69 73 20 6e   ield format is n
1ee40   6f 74 20 66 6f 75 72 20  69 6e 74 65 67 65 72 73   ot four integers
1ee50   20 73 65 70 65 72 61 74  65 20 62 79 20 64 6f 74    seperate by dot
```

```
Mar 27 16:20 1996  image.txt Page 192

1ee60   73 00 00 00 00 00 00 00  00 00 00 00 00 00 00 00   s...............
1ee70   0a 0d 45 52 52 4f 52 20  2d 20 30 30 31 30 20 2d   ..ERROR - 0010 -
1ee80   20 49 6e 63 6f 72 72 65  63 74 20 70 61 73 73 77    Incorrect passw
1ee90   6f 72 64 00 00 00 00 00  00 00 00 00 00 00 00 00   ord.............
1eea0   61 6e 64 20 72 65 70 6c  61 63 65 20 69 74 20 77   and replace it w
1eeb0   69 74 68 20 74 68 65 20  6e 65 77 20 73 65 74 75   ith the new setu
1eec0   70 20 21 00 00 00 00 00  00 00 00 00 00 00 00 00   p !.............
1eed0   53 61 76 69 6e 67 20 63  68 61 6e 67 65 73 20 77   Saving changes w
1eee0   69 6c 6c 20 74 6f 74 61  6c 6c 79 20 65 72 61 73   ill totally eras
1eef0   65 20 74 68 65 20 70 72  65 76 69 6f 75 73 20 73   e the previous s
1ef00   65 74 75 70 20 00 00 00  00 00 00 00 00 00 00 00   etup ...........
1ef10   0a 0d 20 53 61 76 69 6e  67 20 74 68 65 20 63 68   .. Saving the ch
1ef20   61 6e 67 65 73 20 63 6f  6d 70 6c 65 74 65 64 20   anges completed 
1ef30   73 75 63 63 65 73 73 66  75 6c 6c 79 00 00 00 00   successfully....
1ef40   61 6e 64 20 72 65 70 6c  61 63 65 20 69 74 20 77   and replace it w
1ef50   69 74 68 20 74 68 65 20  66 61 63 74 6f 72 79 20   ith the factory 
1ef60   64 65 66 61 75 6c 74 20  73 65 74 75 70 20 21 00   default setup !.
1ef70   0a 0d 20 52 65 73 74 6f  72 65 20 66 61 63 74 6f   .. Restore facto
1ef80   72 79 20 64 65 66 61 75  6c 74 73 20 63 6f 6d 70   ry defaults comp
1ef90   6c 65 74 65 64 20 73 75  63 63 65 73 73 66 75 6c   leted successful
1efa0   6c 79 00 00 00 00 00 00  00 00 00 00 00 00 00 00   ly..............
1efb0   41 72 65 20 79 6f 75 20  73 75 72 65 20 79 6f 75   Are you sure you
1efc0   20 77 61 6e 74 20 74 6f  20 73 61 76 65 20 74 68    want to save th
1efd0   65 20 63 75 72 72 65 6e  74 20 73 65 74 75 70 20   e current setup 
1efe0   3f 20 28 79 65 73 2f 6e  6f 29 20 00 00 00 00 00   ? (yes/no) .....
1eff0   41 72 65 20 79 6f 75 20  73 75 72 65 20 79 6f 75   Are you sure you
1f000   20 77 61 6e 74 20 74 6f  20 65 78 69 74 20 66 72    want to exit fr
1f010   6f 6d 20 73 65 74 75 70  20 77 69 74 68 6f 75 74   om setup without
1f020   20 73 61 76 69 6e 67 3f  20 28 79 65 73 2f 6e 6f    saving? (yes/no
1f030   29 20 00 00 00 00 00 00  00 00 00 00 00 00 00 00   ) ..............
1f040   0d 0a 50 72 65 73 73 20  65 6e 74 65 72 20 74 6f   ..Press enter to
1f050   20 63 6f 6e 74 69 6e 75  65 00 00 00 00 00 00 00    continue.......
1f060   1b 5b 32 4a 1b 5b 48 20  0d 00 00 00 00 00 00 00   .[2J.[H ........
1f070   1b 5b 32 4a 1b 5b 48 20  0d 0a 00 00 00 00 00 00   .[2J.[H ........
1f080   50 72 65 73 73 20 65 6e  74 65 72 20 74 6f 20 63   Press enter to c
1f090   6f 6e 74 69 6e 75 65 00  00 00 00 00 00 00 00 00   ontinue.........
1f0a0   50 41 53 53 61 46 41 58  20 44 65 6c 69 6d 69 74   PASSaFAX Delimit
1f0b0   65 72 20 20 20 20 3a 20  00 00 00 00 20 00 00 00   er    : .... ...
1f0c0   00 00 00 00 00 00 00 00  00 00 00 00 00 00 00 00   ................
1f0d0   49 6e 74 65 72 6e 65 74  20 41 64 64 72 65 73 73   Internet Address
```

Mar 27 16:20 1996 image.txt Page 193

```
1f0e0   3a 20 00 00 00 00 00 00  00 00 00 00 00 00 00 00   : ..............
1f0f0   20 35 20 45 78 69 74 20  00 00 00 00 00 00 00 00    5 Exit ........
1f100   20 20 20 20 20 20 20 20  20 20 00 00 00 00 00 00             ......
1f110   20 57 41 52 4e 49 4e 47  3a 20 00 00 00 00 00 00    WARNING: ......
1f120   20 2d 2d 2d 2d 2d 2d 2d  2d 2d 00 00 00 00 00 00    ---------......
1f130   20 53 65 63 75 72 69 74  79 3a 00 00 00 00 00 00    Security:......
1f140   20 49 50 20 53 65 74 75  70 3a 00 00 00 00 00 00    IP Setup:......
1f150   20 50 61 73 73 77 6f 72  64 3a 00 00 00 00 00 00    Password:......
1f160   20 20 45 20 58 20 49 20  54 20 49 20 4e 20 47 00      E X I T I N G.
1f170   20 2d 2d 2d 2d 2d 2d 2d  2d 2d 2d 2d 2d 2d 2d 2d    ---------------
1f180   00 00 00 00 00 00 00 00  00 00 00 00 00 00 00 00   ................
1f190   20 46 61 78 20 43 6f 6e  6e 65 63 74 69 6f 6e 3a    Fax Connection:
1f1a0   00 00 00 00 00 00 00 00  00 00 00 00 00 00 00 00   ................
1f1b0   20 34 20 53 74 61 72 74  20 45 76 65 6e 74 20 4c    4 Start Event L
1f1c0   6f 67 00 00 00 00 00 00  00 00 00 00 00 00 00 00   og..............
1f1d0   20 53 75 62 6e 65 74 20  4e 65 74 6d 61 73 6b 20    Subnet Netmask
1f1e0   20 3a 20 00 00 00 00 00  00 00 00 00 00 00 00 00    : .............
1f1f0   20 45 74 68 65 72 6e 65  74 20 41 64 64 72 65 73    Ethernet Addres
1f200   73 3a 20 00 00 00 00 00  00 00 00 00 00 00 00 00   s: .............
1f210   20 34 20 55 70 64 61 74  65 20 44 69 61 6c 20 54    4 Update Dial T
1f220   61 62 6c 65 00 00 00 00  00 00 00 00 00 00 00 00   able............
1f230   20 2d 2d 2d 20 20 4d 61  69 6e 20 4d 65 6e 75 20    ---  Main Menu
1f240   20 2d 2d 2d 00 00 00 00  00 00 00 00 00 00 00 00    ---............
1f250   20 45 6e 74 65 72 20 79  6f 75 72 20 63 68 6f 69    Enter your choi
1f260   63 65 20 3a 20 00 00 00  00 00 00 00 00 00 00 00   ce : ...........
1f270   20 20 20 44 65 66 61 75  6c 74 20 52 6f 75 74 65      Default Route
1f280   72 20 20 3a 20 00 00 00  00 00 00 00 00 00 00 00   r  : ...........
1f290   20 25 73 20 20 53 57 20  56 25 73 20 2c 20 48 57    %s  SW V%s , HW
1f2a0   20 56 25 73 20 00 00 00  00 00 00 00 00 00 00 00    V%s ...........
1f2b0   20 33 20 43 6f 6e 66 69  67 75 72 65 20 50 41 53    3 Configure PAS
1f2c0   53 61 46 41 58 00 00 00  00 00 00 00 00 00 00 00   SaFAX...........
1f2d0   20 32 20 44 69 73 70 6c  61 79 20 44 69 61 6c 20    2 Display Dial
1f2e0   54 61 62 6c 65 00 00 00  00 00 00 00 00 00 00 00   Table...........
1f2f0   20 41 6c 6c 6f 77 20 52  65 6d 6f 74 65 20 64 69    Allow Remote di
1f300   61 6c 69 6e 67 20 3a 20  00 00 00 00 00 00 00 00   aling : ........
1f310   20 49 50 20 41 64 64 72  65 73 73 20 44 65 6c 69    IP Address Deli
1f320   6d 69 74 65 72 20 3a 20  00 00 00 00 00 00 00 00   miter : ........
1f330   20 50 68 6f 6e 65 20 41  63 63 65 73 73 20 50 72    Phone Access Pr
1f340   65 66 69 78 20 20 3a 20  00 00 00 00 00 00 00 00   efix  : ........
1f350   20 46 61 78 20 43 6f 6e  6e 65 63 74 69 6f 6e 20    Fax Connection
```

Mar 27 18:20 1996 image.txt Page 194

```
1f360   4d 65 74 68 6f 64 3a 20  00 00 00 00 00 00 00 00   Method: ........
1f370   20 31 20 43 6f 6e 66 69  67 75 72 65 20 49 50 20    1 Configure IP 
1f380   50 61 72 61 6d 65 74 65  72 73 00 00 00 00 00 00   Parameters......
1f390   20 2d 2d 2d 20 20 4d 61  63 20 41 64 64 72 65 73    ---  Mac Addres
1f3a0   73 20 53 65 74 75 70 20  2d 2d 2d 00 00 00 00 00   s Setup ---.....
1f3b0   20 36 20 52 65 73 74 6f  72 65 20 46 61 63 74 6f    6 Restore Facto
1f3c0   72 79 20 44 65 66 61 75  6c 74 73 00 00 00 00 00   ry Defaults.....
1f3d0   20 50 68 6f 6e 65 20 41  63 63 65 73 73 20 50 72    Phone Access Pr
1f3e0   65 66 69 78 20 5b 25 73  5d 20 3a 20 00 00 00 00   efix [%s] : ....
1f3f0   20 49 50 20 41 64 64 72  65 73 73 20 44 65 6c 69    IP Address Deli
1f400   6d 69 74 65 72 20 5b 25  73 5d 20 3a 20 00 00 00   miter [%s] : ...
1f410   25 73 00 00 00 00 00 00  00 00 00 00 00 00 00 00   %s..............
1f420   20 44 65 66 61 75 6c 74  20 4e 75 6d 62 65 72 20    Default Number 
1f430   74 6f 20 44 69 61 6c 20  5b 25 73 5d 20 3a 20 00   to Dial [%s] : .
1f440   20 2d 2d 2d 2d 20 50 41  53 53 61 46 41 58 20 45    ---- PASSaFAX E
1f450   76 65 6e 74 20 4c 6f 67  20 2d 2d 2d 2d 20 0a 00   vent Log ---- ..
1f460   20 33 20 43 6f 6e 66 69  67 75 72 65 20 53 65 63    3 Configure Sec
1f470   75 72 69 74 79 20 50 61  72 61 6d 65 74 65 72 73   urity Parameters
1f480   00 00 00 00 00 00 00 00  25 25 25 64 64 00 00 00   ........%%%dd...
1f490   20 50 41 53 53 61 46 41  58 20 44 65 6c 69 6d 69    PASSaFAX Delimi
1f4a0   74 65 72 20 28 23 2f 2a  29 20 5b 25 73 5d 20 3a   ter (#/*) [%s] :
1f4b0   20 00 00 00 00 00 00 00  00 00 00 00 00 00 00 00    ...............
1f4c0   20 2d 2d 2d 20 20 43 6f  6e 66 69 67 75 72 65 20    ---  Configure 
1f4d0   49 50 20 50 61 72 61 6d  65 74 65 72 73 20 2d 2d   IP Parameters --
1f4e0   2d 00 00 00 00 00 00 00  00 00 00 00 00 00 00 00   -...............
1f4f0   20 46 72 61 6d 65 20 53  69 7a 65 20 66 6f 72 20    Frame Size for 
1f500   55 44 50 20 53 65 73 73  69 6f 6e 20 5b 25 64 5d   UDP Session [%d]
1f510   20 3a 20 00 00 00 00 00  00 00 00 00 00 00 00 00    : .............
1f520   20 35 20 53 61 76 65 20  43 68 61 6e 67 65 73 20    5 Save Changes 
1f530   74 6f 20 50 65 72 6d 61  6e 65 6e 74 20 4d 65 6d   to Permanent Mem
1f540   6f 72 79 00 00 00 00 00  00 00 00 00 00 00 00 00   ory.............
1f550   20 20 20 20 20 20 20 20  20 20 20 44 65 66 61 75              Defau
1f560   6c 74 20 4e 75 6d 62 65  72 20 20 20 20 20 20 20   lt Number       
1f570   20 3a 20 00 00 00 00 00  00 00 00 00 00 00 00 00    : .............
1f580   20 31 20 53 68 6f 77 20  50 41 53 53 61 46 41 58    1 Show PASSaFAX
1f590   20 47 65 6e 65 72 61 6c  20 49 6e 66 6f 72 6d 61    General Informa
1f5a0   74 69 6f 6e 00 00 00 00  00 00 00 00 00 00 00 00   tion............
1f5b0   20 2d 2d 2d 20 20 50 41  53 53 61 46 41 58 20 43    ---  PASSaFAX C
1f5c0   6f 6e 66 69 67 75 72 61  74 69 6f 6e 20 4d 65 6e   onfiguration Men
1f5d0   75 20 2d 2d 2d 00 00 00  00 00 00 00 00 00 00 00   u ---...........
```

Mar 27 18:20 1996 image.txt Page 193

```
1f5e0   20 50 72 65 73 73 20 45  6e 74 65 72 20 74 6f 20   Press Enter to 
1f5f0   67 6f 20 62 61 63 6b 20  74 6f 20 4d 61 69 6e 20  go back to Main 
1f600   4d 65 6e 75 20 00 00 00  00 00 00 00 00 00 00 00  Menu ...........
1f610   20 49 6e 74 65 72 6e 65  74 20 53 75 62 6e 65 74   Internet Subnet
1f620   20 4d 61 73 6b 20 5b 25  64 2e 25 64 2e 25 64 2e   Mask [%d.%d.%d.
1f630   25 64 5d 20 3a 20 00 00  00 00 00 00 00 00 00 00  %d] : ..........
1f640   20 49 6e 74 65 72 6e 65  74 28 49 50 29 20 41 64   Internet(IP) Ad
1f650   64 72 65 73 73 20 5b 25  64 2e 25 64 2e 25 64 2e  dress [%d.%d.%d.
1f660   25 64 5d 20 3a 20 00 00  00 00 00 00 00 00 00 00  %d] : ..........
1f670   20 32 20 43 6f 6e 66 69  67 75 72 65 20 46 61 78   2 Configure Fax
1f680   20 43 6f 6e 6e 65 63 74  69 6f 6e 20 50 61 72 61   Connection Para
1f690   6d 65 74 65 72 73 00 00  00 00 00 00 00 00 00 00  meters..........
1f6a0   20 20 20 20 20 20 20 20  20 20 20 20 20 20 52 65                Re
1f6b0   73 74 72 69 63 74 20 49  50 20 63 6f 6e 6e 65 63  strict IP connec
1f6c0   74 69 6f 6e 3a 20 00 00  00 00 00 00 00 00 00 00  tion: ..........
1f6d0   20 2d 2d 2d 20 20 50 41  53 53 61 46 41 58 20 47   ---  PASSaFAX G
1f6e0   65 6e 65 72 61 6c 20 49  6e 66 6f 72 6d 61 74 69  eneral Informati
1f6f0   6f 6e 20 20 2d 2d 2d 00  00 00 00 00 00 00 00 00  on  ---.........
1f700   25 33 64 2e 25 33 64 2e  25 33 64 2e 25 33 64 00  %3d.%3d.%3d.%3d.
1f710   20 2d 2d 2d 20 20 43 6f  6e 66 69 67 75 72 65 20   ---  Configure 
1f720   46 61 78 20 43 6f 6e 6e  65 63 74 69 6f 6e 20 50  Fax Connection P
1f730   61 72 61 6d 65 74 65 72  73 20 2d 2d 2d 00 00 00  arameters ---...
1f740   25 30 33 64 2e 25 30 33  64 2e 25 30 33 64 2e 25  %03d.%03d.%03d.%
1f750   30 33 64 20 00 00 00 00  00 00 00 00 00 00 00 00  03d ............
1f760   20 54 79 70 65 20 43 74  72 6c 2d 42 20 6f 72 20   Type Ctrl-B or 
1f770   5e 20 74 6f 20 73 65 65  20 74 68 65 20 70 72 65  ^ to see the pre
1f780   76 69 6f 75 73 20 70 61  72 61 6d 65 74 65 72 2e  vious parameter.
1f790   00 00 00 00 00 00 00 00  00 00 00 00 00 00 00 00  ................
1f7a0   25 30 33 64 2e 25 30 33  64 2e 25 30 33 64 2e 25  %03d.%03d.%03d.%
1f7b0   30 33 64 20 20 00 00 00  00 00 00 00 00 00 00 00  03d  ...........
1f7c0   20 45 74 68 65 72 6e 65  74 20 4d 61 63 20 41 64   Ethernet Mac Ad
1f7d0   64 72 65 73 73 20 5b 25  32 58 2d 25 32 58 2d 25  dress [%2X-%2X-%
1f7e0   32 58 2d 25 32 58 2d 25  32 58 2d 25 58 5d 20 3a  2X-%2X-%2X-%X] :
1f7f0   20 00 00 00 00 00 00 00  00 00 00 00 00 00 00 00   ...............
1f800   20 44 65 66 61 75 6c 74  20 52 6f 75 74 65 72 20   Default Router 
1f810   49 6e 74 65 72 6e 65 74  20 41 64 64 72 65 73 73  Internet Address
1f820   20 5b 25 64 2e 25 64 2e  25 64 2e 25 64 5d 20 3a   [%d.%d.%d.%d] :
1f830   20 00 00 00 00 00 00 00  00 00 00 00 00 00 00 00   ...............
1f840   20 54 79 70 65 20 43 74  72 6c 2d 43 20 6f 72 20   Type Ctrl-C or 
1f850   24 20 74 6f 20 72 65 74  75 72 6e 20 74 6f 20 74  $ to return to t
```

Mar 27 18:20 1996  image.txt Page 196

```
1f860   6e 65 20 70 72 65 76 69  6f 75 73 20 6d 65 6e 75   ne previous menu
1f870   2e 00 00 00 00 00 00 00  00 00 00 00 00 00 00 00   ................
1f880   20 50 41 53 53 61 46 41  58 20 20 53 57 20 56 25    PASSaFAX  SW V%
1f890   73 20 20 48 57 20 56 25  73 20 20 52 4f 4d 20 54   s  HW V%s  ROM T
1f8a0   79 70 65 3a 20 25 73 20  20 55 70 74 69 6d 65 3a   ype: %s  Uptime:
1f8b0   25 73 00 00 00 00 00 00  00 00 00 00 00 00 00 00   %s..............
1f8c0   20 28 63 29 20 63 6f 70  79 72 69 67 74 68 20 31    (c) copyrigth 1
1f8d0   39 39 35 2c 52 41 44 4c  49 4e 58 20 4c 54 44 2c   995,RADLINX LTD,
1f8e0   41 6c 6c 20 52 69 67 74  68 73 20 52 65 73 65 72   All Rigths Reser
1f8f0   76 65 64 00 00 00 00 00  00 00 00 00 00 00 00 00   ved.............
1f900   20 5b 20 5d 2e 20 54 79  70 65 20 61 20 6e 65 77    [ ]. Type a new
1f910   20 76 61 6c 75 65 20 61  6e 64 20 70 72 65 73 73    value and press
1f920   20 45 6e 74 65 72 20 74  6f 20 73 65 74 20 6e 65    Enter to set ne
1f930   77 20 76 61 6c 75 65 2e  00 00 00 00 00 00 00 00   w value.........
1f940   45 52 52 4f 52 20 2d 20  31 30 30 32 20 2d 20 49   ERROR - 1002 - I
1f950   6c 6c 65 67 61 6c 20 73  75 62 6e 65 74 20 6d 61   llegal subnet ma
1f960   73 6b 00 00 00 00 00 00  00 00 00 00 00 00 00 00   sk..............
1f970   45 52 52 4f 52 20 2d 20  31 30 30 35 20 2d 20 49   ERROR - 1005 - I
1f980   6c 6c 65 67 61 6c 20 4d  61 63 20 61 64 64 72 65   llegal Mac addre
1f990   73 73 00 00 00 00 00 00  00 00 00 00 00 00 00 00   ss..............
1f9a0   25 30 32 58 2d 25 30 32  58 2d 25 30 32 58 2d 25   %02X-%02X-%02X-%
1f9b0   30 32 58 2d 25 30 32 58  2d 25 30 32 58 20 20 00   02X-%02X-%02X  .
1f9c0   45 52 52 4f 52 20 2d 20  31 30 30 37 20 2d 20 49   ERROR - 1007 - I
1f9d0   6c 6c 65 67 61 6c 20 55  44 50 20 66 72 61 6d 65   llegal UDP frame
1f9e0   20 73 69 7a 65 20 00 00  00 00 00 00 00 00 00 00    size ..........
1f9f0   45 52 52 4f 52 20 2d 20  31 30 30 31 20 2d 20 49   ERROR - 1001 - I
1fa00   6c 6c 65 67 61 6c 20 49  6e 74 65 72 6e 65 74 20   llegal Internet
1fa10   61 64 64 72 65 73 73 00  00 00 00 00 00 00 00 00   address.........
1fa20   20 46 6f 72 20 65 61 63  68 20 70 61 72 61 6d 65    For each parame
1fa30   74 65 72 2c 20 74 68 65  20 63 75 72 72 65 6e 74   ter, the current
1fa40   20 76 61 6c 75 65 20 69  73 20 64 69 73 70 6c 61    value is displa
1fa50   79 65 64 20 69 6e 20 62  72 61 63 6b 65 74 73 00   yed in brackets.
1fa60   45 52 52 4f 52 20 2d 20  30 30 31 31 20 2d 20 54   ERROR - 0011 - T
1fa70   68 65 20 6f 70 74 69 6f  6e 20 69 73 20 6e 6f 74   he option is not
1fa80   20 61 76 61 6c 69 62 6c  65 00 00 00 00 00 00 00    avalible.......
1fa90   20 49 66 20 74 68 65 20  63 75 72 72 65 6e 74 20    If the current
1faa0   76 61 6c 75 65 20 69 73  20 63 6f 72 72 65 63 74   value is correct
1fab0   2c 20 70 72 65 73 73 20  45 6e 74 65 72 20 74 6f   , press Enter to
1fac0   20 73 65 65 20 74 68 65  20 6e 65 78 74 20 6f 6e    see the next on
1fad0   65 2e 00 00 00 00 00 00  00 00 00 00 00 00 00 00   e...............
```

Mar 27 18:20 1996 image.txt Page 157

```
1fae0   45 52 52 4f 52 20 2d 20  31 31 30 34 20 2d 20 49   ERROR - 1104 - I
1faf0   6c 6c 65 67 61 6c 20 70  61 72 61 6d 65 74 65 72   llegal parameter
1fb00   20 2d 20 50 72 65 66 69  78 20 46 69 65 6c 64 20    - Prefix Field
1fb10   00 00 00 00 00 00 00 00  00 00 00 00 00 00 00 00   ................
1fb20   45 52 52 4f 52 20 2d 20  31 31 30 33 20 2d 20 49   ERROR - 1103 - I
1fb30   6c 6c 65 67 61 6c 20 70  61 72 61 6d 65 74 65 72   llegal parameter
1fb40   20 2d 20 42 6f 6f 6c 65  61 6e 20 46 69 65 6c 64    - Boolean Field
1fb50   20 00 00 00 00 00 00 00  00 00 00 00 00 00 00 00    ...............
1fb60   45 52 52 4f 52 20 2d 20  31 31 30 31 20 2d 20 49   ERROR - 1101 - I
1fb70   6c 6c 65 67 61 6c 20 70  61 72 61 6d 65 74 65 72   llegal parameter
1fb80   20 2d 20 4e 75 6d 65 72  69 63 20 46 69 65 6c 64    - Numeric Field
1fb90   20 00 00 00 98 cb 01 00  a0 cb 01 00 a8 cb 01 00    ...............
1fba0   b0 cb 01 00 b8 cb 01 00  c8 cb 01 00 e0 cb 01 00   ................
1fbb0   e0 cb 01 00 d8 cb 01 00  94 cc 01 00 9c cc 01 00   ................
1fbc0   ac cc 01 00 c0 cc 01 00  c8 cc 01 00 e4 cc 01 00   ................
1fbd0   20 60 08 8c 40 e0 87 82  00 30 20 80 e0 08 06 10    `..@....0 .....
1fbe0   0c 20 01 32 01 00 80 8c  00 00 00 0a 01 00 20 8c   . .2.......... .
1fbf0   54 e0 27 92 40 e0 27 8c  58 e0 27 92 00 30 38 90   T.'.@.'.X.'..08.
1fc00   18 d0 05 10 00 00 30 8c  50 e0 2f 8c 06 16 20 5c   ......0.P./... \
1fc10   07 16 80 5c 06 16 88 5c  05 16 90 5c 04 16 98 5c   ...\...\...\...\
1fc20   20 21 fe 09 1c 20 04 3e  00 30 80 8c 90 00 02 00    !... .>.0......
1fc30   c0 3b fe 09 00 30 80 8c  ff ff ff ff 00 00 00 0a   .;...0..........
1fc40   00 00 80 8c 00 00 00 0a  00 00 00 00 00 00 00 00   ................
1fc50   60 60 08 8c 10 16 68 5c  11 16 70 5c f4 09 01 0b   ``....h\..p\....
1fc60   4f 00 20 8c 14 00 81 3b  0d 16 80 5c e4 09 01 0b   O. ....;...\....
1fc70   10 16 18 5c 08 00 00 08  4f 00 18 8c 03 16 78 5c   ...\....O.....x\
1fc80   40 e0 27 8c 0d 16 80 5c  04 16 88 5c 03 16 90 5c   @.'....\...\...\
1fc90   c0 39 fe 09 40 a0 03 3a  0d 00 30 8c 40 e0 2f 8c   .9..@..:..0.@./.
1fca0   0f 16 20 5c 01 e0 7b 8c  05 00 21 59 00 10 31 82   .. \..{...!Y..1.
1fcb0   00 30 20 c0 91 07 06 10  1c 20 09 3d 0a 00 30 8c   .0 ...... .=..0.
1fcc0   40 e0 2f 8c 0f 16 20 5c  01 e0 7b 8c 05 00 21 59   @./... \..{...!Y
1fcd0   00 10 31 82 94 e0 7f 92  40 e0 27 8c 98 e0 27 92   ..1.....@.'...'.
1fce0   00 30 38 90 18 d0 05 10  00 00 30 8c 90 e0 2f 8c   .08.......0.../.
1fcf0   06 16 20 5c 07 16 80 5c  06 16 88 5c 05 16 90 5c   .. \...\...\...\
1fd00   04 16 98 5c 3c 20 fe 09  08 20 04 39 00 00 00 0a   ...\< ... .9....
1fd10   00 30 80 8c 90 00 02 00  d8 3a fe 09 00 00 00 0a   .0.......:......
1fd20   00 30 80 92 30 08 06 10  00 30 88 82 34 08 06 10   .0..0....0..4...
1fd30   00 00 20 8c 00 30 20 82  35 08 06 10 00 30 90 c2   .. ..0 .5....0..
1fd40   36 08 06 10 00 30 98 92  38 08 06 10 00 00 00 0a   6....0..8.......
1fd50   70 60 08 8c 10 16 60 5c  00 00 20 8c a0 e0 27 92   p`....`\.. ...'.
```

Mar 27 18:20 1996 image.txt Page 198

```
1fd60   00 30 20 90 64 00 02 00  a4 e0 27 92 50 00 20 8c   .0 .d.....'.P. .
1fd70   90 e0 27 92 00 00 20 8c  94 e0 27 92 40 e0 27 8c   ..'... ...'.@.'.
1fd80   98 e0 27 92 00 30 20 c8  1e d0 05 10 08 20 01 37   ..'..0 ...... ./
1fd90   00 00 00 0a 00 30 38 90  18 d0 05 10 00 00 30 8c   .....08.......0.
1fda0   90 e0 21 8c a0 e0 27 8c  07 16 80 5c 06 16 88 5c   ../...'....\...\
1fdb0   05 16 90 5c 04 16 98 5c  3a 21 fe 09 28 20 04 3e   ...\...\:!..( .>
1fdc0   00 30 80 8c 70 00 02 00  28 3a fe 09 00 30 20 c8   .0..p...(:...0 .
1fdd0   1e d0 05 10 00 0e 21 58  00 30 20 ca 1e d0 05 10   ......!X.0 .....
1fde0   50 02 00 08 05 20 73 8c  00 00 68 8c 94 e0 27 90   P.... s...h...'.
1fdf0   00 28 01 5a 3c 02 00 13  40 e0 27 8c 04 40 23 59   .(.Z<...@.'..@#Y
1fe00   00 10 79 80 58 e0 43 3d  00 90 23 80 80 28 01 5a   ..y.X.C=..#..(.Z
1fe10   0c 02 00 13 06 20 23 c0  0c 20 01 3a 06 20 23 c0   ..... #.. .:. #.
1fe20   18 20 11 3d a4 e0 2f 8c  00 00 20 8c 05 16 80 5c   . .=../... ....\
1fe30   04 16 88 5c 1c fe ff 09  00 90 23 80 81 09 21 59   ...\......#...!Y
1fe40   00 90 23 82 00 90 23 80  80 28 01 5a d0 01 00 16   ..#...#..(.Z....
1fe50   00 00 20 8c 00 90 23 82  c4 01 00 08 7c e0 6b 3d   .. ...#.....|.k=
1fe60   00 90 23 80 24 20 01 3d  0a 00 30 8c 00 10 2b 90   ..#.$ .=..0...+.
1fe70   00 90 23 80 05 00 21 59  00 10 31 82 00 90 23 80   ..#...!Y..1...#.
1fe80   01 20 21 8c 00 90 23 82  00 00 30 8c 00 10 2b 90   . !...#...0...+.
1fe90   00 90 23 80 05 00 21 59  00 10 31 82 08 20 eb 90   ..#...!Y..1.. ..
1fea0   00 50 07 86 00 30 38 8c  d0 cf 05 10 00 30 30 8c   .P...08......00.
1feb0   18 d0 05 10 01 00 28 8c  00 30 20 8c ff ff ff ff   ......(..0 .....
1fec0   07 16 80 5c 06 16 88 5c  05 16 90 5c 04 16 98 5c   ...\...\...\...\
1fed0   e0 23 fe 09 00 00 00 0a  18 e0 13 3a 14 e0 1b 3a   .#.........:...:
1fee0   24 00 20 8c 0c c0 23 3a  5e 00 20 8c 84 c0 23 3d   $. ...#:^. ...#=
1fef0   00 90 23 80 2c 20 01 3d  40 e0 27 8c 04 40 23 59   ..#., .=@.'..@#Y
1ff00   00 10 31 80 00 10 2b 90  00 90 23 80 05 00 21 59   ..1...+...#...!Y
1ff10   00 10 31 82 00 90 23 80  01 20 21 8c 00 90 23 82   ..1...#.. !...#.
1ff20   00 00 30 8c 00 10 2b 90  00 90 23 80 05 00 21 59   ..0...+...#...!Y
1ff30   00 10 31 82 08 20 1b 90  00 d0 00 86 00 30 38 8c   ..1.. .......08.
1ff40   d0 cf 05 10 00 30 30 8c  18 d0 05 10 01 00 28 8c   .....00.......(.
1ff50   00 30 20 8c ff ff ff ff  07 16 80 5c 06 16 88 5c   .0 ........\...\
1ff60   05 16 90 5c 04 16 98 5c  48 23 fe 09 00 00 00 0a   ...\...\H#......
1ff70   14 e0 9b 3d 01 00 20 8c  00 30 20 82 e0 08 06 10   ...=.. ..0 .....
1ff80   9c 00 00 08 14 e0 8b 3d  00 00 20 8c 00 30 20 82   .......=.. ..0 .
1ff90   e0 08 06 10 88 00 00 08  40 e0 27 8c 04 40 23 59   ........@.'..@#Y
1ffa0   00 10 31 80 00 10 2b 90  00 90 23 80 05 00 21 59   ..1...+...#...!Y
1ffb0   00 10 31 82 00 90 23 80  01 20 21 8c 00 90 23 82   ..1...#.. !...#.
1ffc0   00 90 2b 80 04 20 23 80  28 00 29 3c 00 90 23 80   ..+.. #.(.)<..#.
1ffd0   81 09 21 59 00 90 23 82  06 20 23 c0 0c 20 01 3a   ..!Y..#.. #.. .:
```

```
Mar 27 16:20 1996  image.txt Page 155

1ffe0   06 20 23 c0 0c 20 11 3d  08 00 80 8c e4 fb ff 09   . #.. .=........
1fff0   06 20 23 c0 18 20 01 3d  40 e0 27 8c 04 40 23 59   . #.. .=@.'..@#Y
20000   0c 10 81 80 cc fb ff 09  14 00 00 08 06 20 23 c0   ..............#.
20010   0c 20 11 3d 2a 00 80 8c  b8 fb ff 09 01 60 2b 8c   . .=*.........`+.
20020   05 16 88 5c 94 e0 27 90  05 20 01 5a cc fd ff 14   ...\..'.. .Z....
20030   00 30 38 8c d0 cf 05 10  00 30 30 8c 18 d0 05 10   .08......00.....
20040   01 00 28 8c 00 30 20 8c  ff ff ff ff 07 16 80 5c   ..(..0 ........\
20050   06 16 88 5c 05 16 90 5c  04 16 98 5c 54 22 fe 09   ...\...\...\T"..
20060   00 00 00 0a 08 20 08 00  00 00 00 00 00 00 00 00   ..... ..........
20070   6d 73 67 20 69 73 20 72  65 63 65 69 76 65 64 20   msg is received
20080   77 69 74 68 20 65 72 72  6f 72 0a 00 00 00 00 00   with error......
20090   65 72 72 6f 72 20 77 72  69 74 65 20 0a 00 00 00   error write ....
200a0   40 00 00 09 00 30 38 8c  14 08 06 10 02 00 30 8c   @....08.......0.
200b0   00 00 28 8c 00 30 20 8c  f0 01 02 00 07 16 80 5c   ..(..0 ........\
200c0   06 16 88 5c 05 16 90 5c  04 16 98 5c 54 fc ff 09   ...\...\...\T...
200d0   05 16 80 5c 00 00 00 0a  00 00 00 00 00 00 00 00   ...\............
200e0   00 30 28 8c a0 20 02 00  00 00 20 8c 05 16 80 5c   .0(.. .... ....\
200f0   04 16 88 5c 5c fb ff 09  00 30 28 8c dc 20 02 00   ...\\....0(.. ..
20100   01 00 20 8c 05 16 80 5c  04 16 88 5c 44 fb ff 09   .. ....\...\D...
20110   00 30 28 8c 20 24 02 00  05 16 80 5c 04 16 88 5c   .0(. $.....\...\
20120   30 fb ff 09 00 30 28 8c  dc 20 02 00 05 16 80 5c   0....0(.. .....\
20130   04 16 88 5c 1c fb ff 09  05 16 80 5c 04 16 88 5c   ...\.......\...\
20140   10 fb ff 09 00 30 28 8c  c0 21 02 00 05 16 80 5c   .....0(..!.....\
20150   04 16 88 5c fc fa ff 09  00 30 28 8c c0 22 02 00   ...\.....0(.."..
20160   05 16 80 5c 04 16 88 5c  e8 fa ff 09 00 30 28 8c   ...\...\.....0(.
20170   70 22 02 00 05 16 80 5c  04 16 88 5c d4 fa ff 09   p".....\...\....
20180   00 30 28 8c 50 22 02 00  05 16 80 5c 04 16 88 5c   .0(.P".....\...\
20190   c0 fa ff 09 00 30 28 8c  dc 20 02 00 05 16 80 5c   .....0(.. .....\
201a0   04 16 88 5c ac fa ff 09  00 30 28 8c 40 25 02 00   ...\.....0(.@%..
201b0   05 16 80 5c 04 16 88 5c  98 fa ff 09 00 30 28 8c   ...\...\.....0(.
201c0   dc 20 02 00 05 16 80 5c  04 16 88 5c 84 fa ff 09   . .....\...\....
201d0   00 30 28 8c 80 21 02 00  00 00 20 8c 05 16 80 5c   .0(..!.... ....\
201e0   04 16 88 5c 6c fa ff 09  01 00 80 8c 00 00 00 0a   ...\l...........
201f0   60 60 08 8c 00 30 28 8c  dc 20 02 00 01 00 20 8c   ``...0(.. .... .
20200   05 16 80 5c 04 16 88 5c  48 fa ff 09 04 16 78 5c   ...\...\H.....x\
20210   00 30 20 80 14 08 06 10  14 20 19 3a 00 30 28 80   .0 ...... .:.0(.
20220   14 08 06 10 24 00 20 8c  3c 00 29 3d d4 d4 ff 09   ....$. .<.)=....
20230   00 30 38 8c d0 cf 05 10  00 30 30 8c 18 d0 05 10   .08......00.....
20240   01 00 28 8c 00 30 20 8c  ff ff ff ff 07 16 80 5c   ..(..0 ........\
20250   06 16 88 5c 05 16 90 5c  04 16 98 5c 54 20 fe 09   ...\...\...\T ..
```

```
Mar 27 18:20 1996  image.txt Page 200

20260   00 00 00 0a 40 e0 2f 8c  00 30 20 8c 18 23 02 00   ....@./..0 ..#..
20270   05 16 80 5c 04 16 88 5c  0f 16 90 5c c4 fa 00 09   ...\...\...\....
20280   00 30 30 8c 14 08 06 10  90 e0 27 8c 05 16 80 5c   .00.......'....\
20290   05 16 88 5c 04 16 90 5c  58 fb 00 09 84 20 0c 3d   ...\...\X.... .=
202a0   90 e0 1f 90 30 e0 08 3d  00 00 20 8c 00 30 20 92   ....0..=.. ..0 .
202b0   f0 08 06 10 3c 10 00 09  00 30 28 90 f4 08 06 10   ....<....0(.....
202c0   00 30 20 8c ff ff ff ff  5c 00 29 3a c4 06 00 09   .0 .....\.):....
202d0   54 00 00 08 18 e0 10 3d  64 00 20 8c 00 30 20 92   T......=d. ..0 .
202e0   f0 08 06 10 dc 10 00 09  3c 00 00 08 18 e0 18 3d   ........<......=
202f0   65 00 20 8c 00 30 20 92  f0 08 06 10 c4 10 00 09   e. ..0 .........
20300   24 00 00 08 14 e0 20 3c  00 30 80 8c a0 00 02 00   $.....  =.0......
20310   a0 13 00 09 10 00 00 08  88 fd ff 09 08 00 00 08   ................
20320   80 fd ff 09 00 30 38 8c  d0 cf 05 10 00 30 30 8c   .....08......00.
20330   18 a0 05 10 01 00 28 8c  00 30 20 8c ff ff ff ff   ......(..0 .....
20340   07 16 80 5c 06 16 88 5c  05 16 90 5c 04 16 98 5c   ...\...\...\...\
20350   60 1f fe 09 00 00 00 0a  00 00 00 00 00 00 00 00   `...............
20360   70 60 08 8c 00 30 20 90  f4 08 06 10 01 20 19 8c   p`...0 ...... ..
20370   00 30 28 90 f0 08 06 10  65 00 20 8c 24 00 29 3d   .0(.....e. .$.)=
20380   40 e0 2f 8c 00 30 20 8c  60 23 02 00 05 16 80 5c   @./..0 .`#.....\
20390   04 16 88 5c 03 16 90 5c  a8 f9 00 09 20 00 00 08   ...\...\.... ...
203a0   40 e0 2f 8c 00 30 20 8c  20 23 02 00 05 16 80 5c   @./..0 . #.....\
203b0   04 16 88 5c 03 16 90 5c  88 f9 00 09 40 e0 2f 8c   ...\...\....@./.
203c0   01 00 20 8c 05 16 80 5c  04 16 88 5c 84 f8 ff 09   .. ....\...\....
203d0   00 30 20 8c 20 05 02 00  00 30 20 92 44 08 06 10   .0 . ....0 .D...
203e0   00 30 20 8c 30 08 02 00  00 30 20 92 48 08 06 10   .0 .0....0 .H...
203f0   00 30 20 8c 20 05 02 00  00 30 20 92 4c 08 06 10   .0 . ....0 .L...
20400   01 00 80 8c 00 00 00 0a  00 00 00 00 00 00 00 00   ................
20410   50 60 08 8c 00 30 78 8c  20 d0 05 10 00 30 28 90   P`...0x. ....0(.
20420   f4 08 06 10 38 00 20 8c  85 00 21 70 00 34 21 80   ....8. ...!p.4!.
20430   bf d0 05 10 34 20 01 3d  7e e0 33 8c 00 30 28 90   ....4 .=~.3..0(.
20440   f4 08 06 10 38 00 20 8c  85 00 21 70 06 00 21 59   ....8. ...!p..!Y
20450   21 20 29 8c 00 30 20 8c  50 21 02 00 05 16 80 5c   ! )..0 .P!.....\
20460   04 16 88 5c 5c 00 01 0b  40 e0 1f 8c 00 30 38 8c   ...\\...@....08.
20470   c0 24 02 00 7e e0 33 8c  00 30 28 90 f4 08 06 10   .$..~.3..0(.....
20480   38 00 20 8c 85 00 21 70  06 00 21 59 21 20 21 8c   8. ...!p..!Y! !.
20490   03 16 80 5c 07 16 88 5c  04 16 90 5c a4 f8 00 09   ...\...\...\....
204a0   02 00 20 8c 00 30 20 92  90 08 06 10 7e e0 33 8c   .. ..0 .....~.3.
204b0   00 30 28 90 f4 08 06 10  38 00 20 8c 85 00 21 70   .0(.....8. ...!p
204c0   06 00 21 59 21 20 21 8c  00 30 20 92 94 08 06 10   ..!Y! !..0 .....
204d0   03 16 28 5c 00 00 20 8c  05 16 80 5c 04 16 88 5c   ..(\.. ....\...\
```

```
Mar 27 18:20 1996  image.txt Page 201

204e0   70 f7 ff 09 00 30 20 8c  20 06 02 00 00 30 20 92   p.....0 . ....0 .
204f0   44 08 06 10 00 30 20 8c  30 07 02 00 00 30 20 92   D....0 .0....0 .
20500   48 08 06 10 00 30 20 8c  10 04 02 00 00 30 20 92   H....0 ......0 .
20510   4c 08 06 10 01 00 80 8c  00 00 00 0a 00 00 00 00   L...............
20520   50 60 08 8c 00 30 78 8c  20 d0 05 10 00 30 28 90   P`...0x. ....0(.
20530   f4 08 06 10 38 00 20 8c  85 00 21 70 00 34 21 80   ....8. ...!p.4!.
20540   a5 d0 05 10 20 20 01 3d  40 e0 2f 8c 00 30 20 8c   ....  .=@./..0 .
20550   30 22 02 00 05 16 80 5c  04 16 88 5c e4 f7 00 09   0"......\...\....
20560   3c 00 00 08 40 e0 1f 8c  00 30 38 8c f0 22 02 00   <...@....08.."..
20570   7e e0 33 8c 00 30 28 90  f4 08 06 10 38 00 20 8c   ~.3..0(.....8. .
20580   85 00 21 70 06 00 21 59  07 20 21 8c 03 16 80 5c   ..!p..!Y. !....\
20590   07 16 88 5c 04 16 90 5c  a8 f7 00 09 00 30 20 8c   ...\...\.....0 .
205a0   20 05 02 00 00 30 20 92  44 08 06 10 00 30 20 8c    ....0 .D....0 .
205b0   30 08 02 00 00 30 20 92  48 08 06 10 00 30 20 8c   0....0 .H....0 .
205c0   20 05 02 00 00 30 20 92  4c 08 06 10 14 00 20 8c    ....0 .L..... .
205d0   00 30 20 92 90 08 06 10  7e e0 33 8c 00 30 28 90   .0 .....~.3..0(.
205e0   f4 08 06 10 38 00 20 8c  85 00 21 70 06 00 21 59   ....8. ...!p..!Y
205f0   07 20 21 8c 00 30 20 92  94 08 06 10 40 e0 2f 8c   . !..0 .....@./.
20600   00 00 20 8c 05 16 80 5c  04 16 88 5c 44 f6 ff 09   .. ....\...\D...
20610   01 00 80 8c 00 00 00 0a  00 00 00 00 00 00 00 00   ................
20620   60 60 08 8c 00 30 78 8c  20 d0 05 10 00 30 28 90   ``...0x. ....0(.
20630   f4 08 06 10 38 00 20 8c  85 00 21 70 00 34 21 80   ....8. ...!p.4!.
20640   bd d0 05 10 34 20 01 3d  7e e0 33 8c 00 30 28 90   ....4 .=~.3..0(.
20650   f4 08 06 10 38 00 20 8c  85 00 21 70 06 00 21 59   ....8. ...!p..!Y
20660   1f 20 29 8c 00 30 20 8c  d8 20 02 00 05 16 80 5c   . )..0 .. .....\
20670   04 16 88 5c 4c fe 00 0b  40 e0 1f 8c 00 30 38 8c   ...\L...@....08.
20680   f0 24 02 00 7e e0 33 8c  00 30 28 90 f4 08 06 10   .$..~.3..0(.....
20690   38 00 20 8c 85 00 21 70  06 00 21 59 1f 20 21 8c   8. ...!p..!Y. !.
206a0   03 16 80 5c 07 16 88 5c  04 16 90 5c 94 f6 00 09   ...\...\...\....
206b0   00 30 20 8c 30 08 02 00  00 30 20 92 44 08 06 10   .0 .0....0 .D...
206c0   00 30 20 8c 10 04 02 00  00 30 20 92 48 08 06 10   .0 ......0 .H...
206d0   00 30 20 8c 20 06 02 00  00 30 20 92 4c 08 06 10   .0 . ....0 .L...
206e0   02 00 20 8c 00 30 20 92  90 08 06 10 7e e0 33 8c   .. ..0 .....~.3.
206f0   00 30 28 90 f4 08 06 10  38 00 20 8c 85 00 21 70   .0(.....8. ...!p
20700   06 00 21 59 1f 20 21 8c  00 30 20 92 94 08 06 10   ..!Y. !..0 .....
20710   03 16 28 5c 00 00 20 8c  05 16 80 5c 04 16 88 5c   ..(\.. ....\...\
20720   30 f5 ff 09 01 00 80 8c  00 00 00 0a 00 00 00 00   0...............
20730   50 60 08 8c 00 30 78 8c  20 d0 05 10 00 30 28 90   P`...0x. ....0(.
20740   f4 08 06 10 38 00 20 8c  85 00 21 70 00 34 21 80   ....8. ...!p.4!.
20750   c1 d0 05 10 20 20 01 3d  40 e0 2f 8c 00 30 20 8c   ....  .=@./..0 .
```

Mar 27 18:20 1996 image.txt Page 202

```
20760   f0 23 02 00 05 16 80 5c  04 16 88 5c d4 f5 00 09   .#......\...\....
20770   3c 00 00 08 40 e0 1f 8c  00 30 38 8c 90 24 02 00   <...@....08..$..
20780   7e e0 33 8c 00 30 28 90  f4 08 06 10 38 00 20 8c    .3..0(......8. .
20790   85 00 21 70 06 00 21 59  23 20 21 8c 03 16 80 5c   ..!p..!Y# !.....\
207a0   07 16 88 5c 04 16 90 5c  38 f5 00 09 00 30 20 8c   ...\...\......0 .
207b0   10 04 02 00 00 30 20 92  44 08 06 10 00 00 20 8c   .....0 .D..... .
207c0   00 30 20 92 48 08 06 10  00 30 20 8c 30 07 02 00   .0 .H....0 .0...
207d0   00 30 20 92 4c 08 06 10  15 00 20 8c 00 30 20 92   .0 .L..... ..0 .
207e0   90 08 06 10 7e e0 33 8c  00 30 28 90 f4 08 06 10   ....~.3..0(.....
207f0   38 00 20 8c 85 00 21 70  06 00 21 59 23 20 21 8c   8. ...!p..!Y# !.
20800   00 30 20 92 94 08 06 10  40 e0 2f 8c 00 00 20 8c   .0 .....@./... .
20810   05 16 80 5c 04 16 88 5c  38 f4 ff 09 01 00 80 8c   ...\...\8.......
20820   00 00 00 0a 00 00 00 00  00 00 00 00 00 00 00 00   ................
20830   50 60 08 8c 00 30 68 8c  20 d0 05 10 00 30 28 90   P`...0h. ....0(.
20840   f4 08 06 10 38 00 20 8c  85 00 21 70 00 34 21 60   ....8. ...!p.4!.
20850   b9 d0 05 10 20 20 01 3a  40 e0 2f 8c 00 30 20 8c   ....  .:@./..0 .
20860   60 24 02 00 05 16 80 5c  04 16 88 5c d4 f4 00 09   `$......\...\....
20870   9c 00 00 08 40 e0 1f 8c  00 30 78 8c 80 25 02 00   ....@....0x..%..
20880   7e 60 33 8c 00 30 28 90  f4 08 06 10 38 00 20 8c   ~`3..0(.....8. .
20890   85 00 21 70 06 00 21 59  1b 20 71 80 7e 60 33 8c   ..!p..!Y. q.~`3.
208a0   00 30 28 90 f4 08 06 10  38 00 20 8c 85 00 21 70   .0(.....8. ...!p
208b0   06 00 21 59 1c 20 e9 80  7e 60 33 8c 00 30 28 90   ..!Y. ..~`3..0(.
208c0   f4 08 06 10 38 00 20 8c  85 00 21 70 06 00 21 59   ....8. ...!p..!Y
208d0   1d 20 39 80 7e 60 33 8c  00 30 28 90 f4 08 06 10   . 9.~`3..0(.....
208e0   38 00 20 8c 85 00 21 70  06 00 21 59 1e 20 21 80   8. ...!p..!Y. !.
208f0   03 16 80 5c 0f 16 88 5c  0e 16 90 5c 1d 16 98 5c   ...\...\...\...\
20900   07 16 a0 5c 04 16 a8 5c  38 f4 00 09 00 30 20 8c   ...\...\8....0 .
20910   20 05 02 00 00 30 20 92  44 08 06 10 00 30 20 8c    ....0 .D....0 .
20920   20 06 02 00 00 30 20 92  48 08 06 10 00 30 20 8c    ....0 .H....0 .
20930   30 08 02 00 00 30 20 92  4c 08 06 10 10 00 20 8c   0....0 .L..... .
20940   00 30 20 92 90 08 06 10  7e 60 33 8c 00 30 28 90   .0 .....~`3..0(.
20950   f4 08 06 10 38 00 20 8c  85 00 21 70 06 00 21 59   ....8. ...!p..!Y
20960   1b 20 21 8c 00 30 20 92  40 08 06 10 40 e0 2f 8c   . !..0 .@...@./.
20970   00 00 20 8c 05 16 80 5c  04 16 88 5c d4 f2 ff 09   .. ....\...\....
20980   01 00 80 8c 00 00 00 0a  00 00 00 00 00 00 00 00   ................
20990   d0 f9 ff 09 00 30 20 8c  20 05 02 00 00 30 20 92   .....0 . ....0 .
209a0   4c 08 06 10 00 30 80 90  4c 08 06 10 04 00 00 08   L....0..L.......
209b0   00 10 04 86 00 30 28 90  4c 08 06 10 00 30 20 8c   .....0(.L....0 .
209c0   30 08 02 00 44 00 29 35  00 30 28 8c 70 08 06 10   0...D.)5.0(.p...
209d0   10 00 20 8c 05 16 60 5c  04 16 88 5c 84 2c fe 09   .. ....\...\,..
```

Mar 27 10:20 1996 image.txt Page 235

```
209e0   05 16 38 5c 04 16 30 5c  00 00 28 8c 00 30 20 8c   ..8\..0\..(..0 .
209f0   40 0a 02 00 07 16 80 5c  06 16 88 5c 05 16 90 5c   @.......\...\...\
20a00   04 16 98 5c 1c f3 ff 08  00 30 38 8c a0 08 06 10   ...\.....08.....
20a10   00 30 30 90 90 08 06 10  00 00 28 8c 00 30 20 8c   .00.......(..0 .
20a20   40 0a 02 00 07 16 80 5c  06 16 88 5c 05 16 90 5c   @.......\...\...\
20a30   04 16 98 5c ec f2 ff 08  00 00 00 00 00 00 00 00   ...\............
20a40   10 60 08 8c 00 30 70 8c  20 80 05 10 00 30 28 8c   .`...0p. ....0(.
20a50   8c 20 02 00 01 00 20 8c  05 16 80 5c 04 16 88 5c   . .... ....\...\
20a60   f0 f1 ff 09 00 30 28 90  4c 08 06 10 00 30 20 8c   .....0(.L....0 .
20a70   30 08 02 00 05 20 01 5a  dc 02 00 15 00 30 28 80   0.... .Z.....0(.
20a80   70 08 06 10 7f 00 20 8c  64 00 29 30 00 00 38 8c   p..... .d.)=..8.
20a90   7e a0 33 8c 00 30 28 90  f4 08 06 10 38 00 20 8c   ~.3..0(.....8. .
20aa0   85 00 21 70 06 00 21 59  18 20 39 82 00 30 80 90   ..!p..!Y. 9..0..
20ab0   4c 08 06 10 fc fe ff 09  00 30 38 8c d0 cf 05 10   L........08.....
20ac0   00 30 30 8c 18 d0 05 10  01 00 28 8c 00 30 20 8c   .00.......(..0 .
20ad0   ff ff ff ff 07 16 80 5c  06 16 88 5c 05 16 90 5c   .......\...\...\
20ae0   04 16 98 5c cc 17 fe 09  00 00 00 0a 00 30 20 80   ...\.........0 .
20af0   70 08 06 10 14 20 11 3a  00 30 28 80 70 08 06 10   p.... .:.0(.p...
20b00   5e 00 20 8c 44 00 29 3d  00 30 80 90 44 08 06 10   ^. .D.)=.0..D...
20b10   a0 fe ff 09 00 30 38 8c  d0 cf 05 10 00 30 30 8c   .....08......00.
20b20   18 d0 05 10 01 00 28 8c  00 30 20 8c ff ff ff ff   ......(..0 .....
20b30   07 16 80 5c 06 16 88 5c  05 16 90 5c 04 16 98 5c   ...\...\...\...\
20b40   70 17 fe 09 00 00 00 0a  00 30 20 80 70 08 06 10   p........0 .p...
20b50   14 20 19 3a 00 30 28 80  70 08 06 10 24 00 20 8c   . .:.0(.p...$. .
20b60   3c 00 29 3d 3c f5 ff 09  00 30 38 8c d0 cf 05 10   <.)=<....08.....
20b70   00 30 30 8c 18 d0 05 10  01 00 28 8c 00 30 20 8c   .00.......(..0 .
20b80   ff ff ff ff 07 16 80 5c  06 16 88 5c 05 16 90 5c   .......\...\...\
20b90   04 16 98 5c 1c 17 fe 09  00 00 00 0a 00 30 20 80   ...\.........0 .
20ba0   70 08 06 10 44 20 69 3d  00 30 80 90 48 08 06 10   p...D i=.0..H...
20bb0   00 fe ff 09 00 30 38 8c  d0 cf 05 10 00 30 30 8c   .....08......00.
20bc0   18 d0 05 10 01 00 28 8c  00 30 20 8c ff ff ff ff   ......(..0 .....
20bd0   07 16 80 5c 06 16 88 5c  05 16 90 5c 04 16 98 5c   ...\...\...\...\
20be0   d0 16 fe 09 00 00 00 0a  00 30 18 8c 70 08 06 10   .........0..p...
20bf0   00 30 78 8c 50 24 02 00  40 e0 3f 8c 44 e0 37 8c   .0x.P$..@.?.D.7.
20c00   48 e0 2f 8c 4c e0 27 8c  03 16 80 5c 0f 16 88 5c   H./.L.'....\...\
20c10   07 16 90 5c 06 16 98 5c  05 16 a0 5c 04 16 a8 5c   ...\...\...\...\
20c20   d0 f1 00 09 84 28 04 5a  04 01 00 15 40 e0 3f 90   .....(.Z....@.?.
20c30   44 e0 37 90 48 e0 2f 90  4c e0 27 90 07 16 80 5c   D.7.H./.L.'....\
20c40   06 16 88 5c 05 16 90 5c  04 16 98 5c 74 d7 ff 09   ...\...\...\t...
20c50   5c 20 04 3a 00 30 28 8c  00 26 02 00 01 00 20 8c   \ .:.0(..&.... .
```

Mar 27 18:20 1996 image.txt Page 204

```
20c60   05 16 80 5c 04 16 88 5c  e8 ef ff 09 00 30 80 90   ...\...\.....0..
20c70   4c 08 06 10 3c fd ff 09  00 30 38 8c d0 cf 05 10   L...<....08.....
20c80   00 30 30 8c 18 d0 05 10  04 16 28 5c 00 30 20 8c   .00.......(\.0 .
20c90   ff ff ff ff 07 16 80 5c  06 16 88 5c 05 16 90 5c   .......\...\...\
20ca0   04 16 98 5c 0c 16 fe 09  00 00 00 0a 40 e0 2f 90   ...\........@./.
20cb0   00 30 20 90 40 08 06 10  00 10 29 82 44 e0 2f 90   .0 .@.....).D./.
20cc0   00 30 20 90 40 08 06 10  01 20 29 82 48 e0 2f 90   .0 .@.... ).H./.
20cd0   00 30 20 90 40 08 06 10  02 20 29 82 4c e0 2f 90   .0 .@.... ).L./.
20ce0   00 30 20 90 40 08 06 10  03 20 29 82 00 30 80 90   .0 .@.... )..0..
20cf0   48 08 06 10 0c fc ff 09  00 30 38 8c d0 cf 05 10   H........08.....
20d00   00 30 30 8c 18 d0 05 10  01 00 28 8c 00 30 20 8c   .00.......(..0 .
20d10   ff ff ff ff 07 16 80 5c  06 16 88 5c 05 16 90 5c   .......\...\...\
20d20   04 16 98 5c 8c 15 fe 09  00 00 00 0a 00 30 28 8c   ...\.........0(.
20d30   a0 1f 02 00 01 00 20 8c  05 16 80 5c 04 16 88 5c   ...... ....\...\
20d40   10 ef ff 09 00 30 80 90  4c 08 06 10 64 fc ff 09   .....0..L...d...
20d50   00 00 00 0a 00 30 28 80  a0 08 06 10 7f 00 20 8c   .....0(........ .
20d60   78 00 29 3d 00 30 28 90  4c 08 06 10 00 30 20 8c   x.)=.0(.L....0 .
20d70   30 07 02 00 64 00 29 35  00 00 38 8c 7e a0 33 8c   0...d.)5..8.~.3.
20d80   00 30 28 90 f4 08 06 10  38 00 20 8c 85 00 21 70   .0(.....8. ...!p
20d90   06 00 21 59 23 20 39 82  00 30 80 90 4c 08 06 10   ..!Y# 9..0..L...
20da0   10 fc ff 09 00 30 38 8c  d0 cf 05 10 00 30 30 8c   .....08......00.
20db0   18 d0 05 10 01 00 28 8c  00 30 20 8c ff ff ff ff   ......(..0 .....
20dc0   07 16 80 5c 06 16 88 5c  05 16 90 5c 04 16 98 5c   ...\...\...\...\
20dd0   e0 14 fe 09 00 00 00 0a  00 30 20 80 a0 08 06 10   .........0 .....
20de0   14 20 11 3a 00 30 28 80  a0 08 06 10 5e 00 20 8c   . .:.0(.....^. .
20df0   44 00 29 3d 00 30 80 90  44 08 06 10 b4 fb ff 09   D.)=.0..D.......
20e00   00 30 38 8c d0 cf 05 10  00 30 30 8c 18 d0 05 10   .08......00.....
20e10   01 00 28 8c 00 30 20 8c  ff ff ff ff 07 16 80 5c   ..(..0 ........\
20e20   06 16 88 5c 05 16 90 5c  04 16 98 5c 84 14 fe 09   ...\...\...\....
20e30   00 00 00 0a 00 30 20 80  a0 08 06 10 14 20 19 3a   .....0 ...... .:
20e40   00 30 28 80 a0 08 06 10  24 00 20 8c 3c 00 29 3d   .0(.....$. .<.)=
20e50   50 f2 ff 09 00 30 38 8c  d0 cf 05 10 00 30 30 8c   P....08......00.
20e60   18 d0 05 10 01 00 28 8c  00 30 20 8c ff ff ff ff   ......(..0 .....
20e70   07 16 80 5c 06 16 88 5c  05 16 90 5c 04 16 98 5c   ...\...\...\...\
20e80   30 14 fe 09 00 00 00 0a  00 30 20 80 a0 08 06 10   0........0 .....
20e90   8d 28 01 5a bc 02 00 12  00 30 28 90 4c 08 06 10   .(.Z.....0(.L...
20ea0   00 30 20 8c 10 04 02 00  05 20 01 5a f4 00 00 15   .0 ...... .Z....
20eb0   00 30 28 80 a0 08 06 10  59 00 20 8c 34 00 29 3a   .0(.....Y. .4.):
20ec0   00 30 28 80 a0 08 06 10  79 00 20 8c 24 00 29 3a   .0(.....y. .$.):
20ed0   00 30 28 80 a0 08 06 10  4e 00 20 8c 14 00 29 3a   .0(.....N. ...):
```

```
Mar 27 16:20 1996  image.txt Page 205

20ee0   00 30 28 80 a0 08 06 10  6e 00 20 8c 5c 00 29 3d   .0(.....n. .\.)=
20ef0   00 30 30 90 94 08 06 10  00 30 28 8c a0 08 06 10   .00......0(.....
20f00   05 16 80 5c 4c f7 00 0b  10 16 20 5c 06 16 80 5c   ...\L.... \...\
20f10   05 16 88 5c 04 16 90 5c  a8 f5 00 0b 00 30 20 90   ...\...\.....0 .
20f20   94 08 06 10 00 10 81 80  d0 ed 00 0b 00 30 20 90   .............0 .
20f30   94 08 06 10 00 10 81 82  00 30 80 90 48 08 06 10   .........0..H...
20f40   70 fa ff 09 28 00 00 08  00 30 28 8c 70 26 02 00   p...(....0(.p&..
20f50   01 00 20 8c 05 16 80 5c  04 16 88 5c f4 ec ff 09   .. ....\...\....
20f60   00 30 80 90 4c 08 06 10  48 fa ff 09 00 30 38 8c   .0..L...H....08.
20f70   d0 cf 05 10 00 30 30 8c  18 d0 05 10 01 00 28 8c   .....00.......(.
20f80   00 30 20 8c ff ff ff ff  07 16 80 5c 06 16 88 5c   .0 ........\...\
20f90   05 16 90 5c 04 16 98 5c  18 13 fe 09 00 00 00 0a   ...\...\........
20fa0   00 30 28 90 4c 08 06 10  00 30 20 8c 20 06 02 00   .0(.L....0 . ...
20fb0   05 20 01 5a f4 00 00 15  00 30 28 80 a0 08 06 10   . .Z.....0(.....
20fc0   55 00 20 8c 34 00 29 3a  00 30 28 80 a0 08 06 10   U. .4.):.0(.....
20fd0   75 00 20 8c 24 00 29 3a  00 30 28 80 a0 08 06 10   u. .$.):.0(.....
20fe0   54 00 20 8c 14 00 29 3a  00 30 28 80 a0 08 06 10   T. ...):.0(.....
20ff0   74 00 20 8c 5c 00 29 3d  00 30 30 90 94 08 06 10   t. .\.)=.00.....
21000   00 30 28 8c a0 08 06 10  05 16 80 5c 44 f6 00 0b   .0(........\D...
21010   10 16 20 5c 06 16 80 5c  05 16 88 5c 04 16 90 5c   .. \...\...\...\
21020   a0 f4 00 0b 00 30 20 90  94 08 06 10 00 10 81 80   .....0 .........
21030   c8 ec 00 0b 00 30 20 90  94 08 06 10 00 10 81 82   .....0 .........
21040   00 30 80 90 48 08 06 10  68 f9 ff 09 28 00 00 08   .0..H...h...(...
21050   00 30 28 8c 70 26 02 00  01 00 20 8c 05 16 80 5c   .0(.p&.... ....\
21060   04 16 88 5c ec eb ff 09  00 30 80 90 4c 08 06 10   ...\.....0..L...
21070   40 f9 ff 09 00 30 38 8c  d0 cf 05 10 00 30 30 8c   @....08......00.
21080   18 d0 05 10 01 00 28 8c  00 30 20 8c ff ff ff ff   ......(..0 .....
21090   07 16 80 5c 06 16 88 5c  05 16 90 5c 04 16 98 5c   ...\...\...\...\
210a0   10 12 fe 09 00 00 00 0a  00 30 28 90 4c 08 06 10   .........0(.L...
210b0   00 30 20 8c 30 07 02 00  6c 00 29 35 00 30 80 8c   .0 .0...l.)5.0..
210c0   a0 08 06 10 2c 0c 00 09  5c 20 04 3d 00 30 28 8c   ....,...\ .=.0(.
210d0   30 26 02 00 01 00 20 8c  05 16 80 5c 04 16 88 5c   0&.... ....\...\
210e0   70 eb ff 09 00 30 80 90  4c 08 06 10 c4 f8 ff 09   p....0..L.......
210f0   00 30 38 8c d0 cf 05 10  00 30 30 8c 18 d0 05 10   .08......00.....
21100   04 16 28 5c 00 30 20 8c  ff ff ff ff 07 16 80 5c   ..(\.0 ........\
21110   06 16 88 5c 05 16 90 5c  04 16 98 5c 94 11 fe 09   ...\...\...\....
21120   00 00 00 0a 00 30 30 90  94 08 06 10 00 30 28 8c   .....00......0(.
21130   a0 08 06 10 05 16 80 5c  18 f5 00 0b 10 16 20 5c   .......\...... \
21140   06 16 80 5c 05 16 88 5c  04 16 90 5c 74 f3 00 0b   ...\...\...\t...
21150   00 30 20 90 48 08 06 10  74 20 01 35 00 30 20 90   .0 .H...t .5.0 .
```

Mar 27 18:20 1996 image.txt Page 206

```
21160   f4 08 06 10 01 20 39 8c  7e a0 33 8c 00 30 28 90   ..... 9.~.3..0(.
21170   f4 08 06 10 38 00 20 8c  85 00 21 70 06 00 21 59   ....8. ...!p..!Y
21180   00 10 39 92 00 30 80 90  f4 08 06 10 04 0c 00 09   ..9..0..........
21190   34 20 04 3a 00 30 38 8c  f4 08 06 10 01 00 30 8c   4 .:.08.......0.
211a0   06 16 28 5c 00 30 20 8c  a0 00 02 00 07 16 80 5c   ..(\.0 ........\
211b0   06 16 88 5c 05 16 90 5c  04 16 98 5c 64 eb ff 09   ...\...\...\d...
211c0   18 00 00 08 dc ee ff 09  10 00 00 08 00 30 80 90   ..............0..
211d0   48 08 06 10 dc f7 ff 09  00 30 38 8c d0 c1 05 10   H........08.....
211e0   00 30 30 8c 18 d0 05 10  01 00 28 8c 00 30 20 8c   .00.......(..0 .
211f0   ff ff ff ff 07 16 80 5c  06 16 88 5c 05 16 90 5c   .......\...\...\
21200   04 16 98 5c ac 10 fe 09  00 00 00 0a 00 00 00 00   ...\............
21210   00 30 18 8c 20 d0 05 10  00 30 28 80 14 08 06 10   .0.. ....0(.....
21220   79 00 20 8c 14 00 29 3a  00 30 28 80 14 08 06 10   y. ...):.0(.....
21230   59 00 20 8c 44 00 29 3d  00 30 28 80 15 08 06 10   Y. .D.)=.0(.....
21240   65 00 20 8c 14 00 29 3a  00 30 28 80 15 08 06 10   e. ...):.0(.....
21250   45 00 20 8c 24 00 29 3d  00 30 28 80 16 08 06 10   E. .$.)=.0(.....
21260   73 00 20 8c 30 00 29 3a  00 30 28 80 16 08 06 10   s. .0.):.0(.....
21270   53 00 20 8c 20 00 29 3a  00 30 28 8c dc 20 02 00   S. . .):.0(.. ..
21280   01 00 20 8c 05 16 80 5c  04 16 88 5c c4 e9 ff 09   .. ....\...\....
21290   10 ee ff 08 00 30 28 90  f0 08 06 10 64 00 20 8c   .....0(.....d. .
212a0   28 00 29 3d 00 00 38 8c  7e e0 30 8c 00 30 28 90   (.)=..8.~.0..0(.
212b0   f8 08 06 10 38 00 20 8c  85 00 21 70 06 00 21 59   ....8. ...!p..!Y
212c0   00 10 39 92 dc ed ff 09  00 30 28 90 f0 08 06 10   ..9......0(.....
212d0   65 00 20 8c 08 00 29 3a  00 00 00 0a 00 30 20 90   e. ...):.....0 .
212e0   f8 08 06 10 00 30 20 92  f4 08 06 10 a4 f6 ff 08   .....0 .........
212f0   00 30 18 8c 20 d0 05 10  00 00 78 8c 00 30 20 90   .0.. .....x..0 .
21300   9e d0 05 10 34 20 01 3a  63 00 20 8c 2c 00 79 3b   ....4 .:c. .,.y;
21310   01 e0 33 8c 06 16 78 5c  7e e0 28 8c 38 00 20 8c   ..3...x\~.(.8. .
21320   86 00 21 70 05 00 21 59  00 10 21 90 0c 20 01 3a   ..!p..!Y..!.. .:
21330   63 00 20 8c dc 1f 79 3c  63 00 20 8c 70 00 79 3c   c. ...y<c. .p.y<
21340   00 30 20 8c ff ff ff ff  00 30 20 92 f4 08 06 10   .0 ......0 .....
21350   00 30 28 8c f0 1f 02 00  01 00 20 8c 05 16 80 5c   .0(....... ....\
21360   04 16 88 5c ec e8 ff 09  00 30 28 8c c0 20 02 00   ...\.....0(.. ..
21370   00 00 20 8c 05 16 80 5c  04 16 88 5c d4 e8 ff 09   .. ....\...\....
21380   00 30 38 8c 14 08 06 10  01 00 30 8c 06 16 28 5c   .08.......0...(\
21390   00 30 20 8c a0 00 02 00  07 16 80 5c 06 16 88 5c   .0 ........\...\
213a0   05 16 90 5c 04 16 98 5c  78 e9 ff 08 00 30 78 92   ...\...\x....0x.
213b0   f4 08 06 10 00 00 00 0a  00 00 00 00 00 00 00 00   ................
213c0   00 30 28 8c dc 20 02 00  01 00 20 8c 05 16 80 5c   .0(.. .... ....\
213d0   04 16 88 5c 7c e8 ff 09  00 30 28 8c a0 21 02 00   ...\|....0(..!..
```

Mar 27 16:20 1996 image.txt Page 207

```
213e0   00 00 20 8c 05 16 80 5c  04 16 88 5c 64 e6 ff 09   .. ....\...\d...
213f0   00 30 38 8c 14 08 06 10  04 00 30 8c 04 16 28 5c   .08.......0...(\
21400   00 30 20 8c 20 14 02 00  07 16 80 5c 06 16 88 5c   .0 . .......\...\
21410   05 16 90 5c 04 16 98 5c  08 e9 ff 08 00 00 00 00   ...\...\........
21420   50 60 08 8c 00 30 70 8c  20 a0 05 10 00 30 30 8c   P`...0p. ....00.
21430   14 08 06 10 00 30 28 8c  b0 22 02 00 00 30 20 8c   .....0(.."...0 .
21440   f8 08 06 10 06 16 80 5c  05 16 88 5c 04 16 90 5c   .......\...\...\
21450   a0 e9 00 09 00 00 6e 8c  00 30 20 90 9e d0 05 10   ......n..0 .....
21460   34 20 01 3a 63 00 20 8c  2c 00 69 3b 01 60 33 8c   4 .:c. .,.i;.`3.
21470   06 16 6e 5c 7e a0 2b 8c  38 00 20 8c 86 00 21 70   ..n\~.+.8. ...!p
21480   05 00 21 59 00 10 21 90  0c 20 01 3a 63 00 20 8c   ..!Y..!.. .:c. .
21490   dc 1f 69 3c 00 30 20 90  f8 08 06 10 81 09 21 59   ..i<.0 .......!Y
214a0   00 30 20 92 f8 08 06 10  00 30 20 90 f8 08 06 10   .0 ......0 .....
214b0   80 28 01 5a b4 01 00 11  00 30 28 90 f8 08 06 10   .(.Z.....0(.....
214c0   63 00 20 8c 85 20 01 5a  a0 01 00 13 7e a0 33 8c   c. .. .Z....~.3.
214d0   00 30 28 90 f8 08 06 10  38 00 20 8c 85 00 21 70   .0(.....8. ...!p
214e0   06 00 21 59 00 10 21 90  a0 28 01 5a 7c 01 00 12   ..!Y..!..(.Z|...
214f0   00 30 28 90 f0 08 06 10  64 00 20 8c 85 20 01 5a   .0(.....d. .. .Z
21500   e0 00 00 15 00 30 28 8c  dc 20 02 00 01 00 20 8c   .....0(.. .... .
21510   05 16 80 5c 04 16 88 5c  38 e7 ff 09 40 e0 1f 8c   ...\...\8...@...
21520   00 30 78 8c b0 23 02 00  7e a0 33 8c 00 30 28 90   .0x..#..~.3..0(.
21530   f8 08 06 10 38 00 20 8c  85 00 21 70 06 00 21 59   ....8. ...!p..!Y
21540   00 10 39 90 7e a0 33 8c  00 30 28 90 f8 08 06 10   ..9.~.3..0(.....
21550   38 00 20 8c 85 00 21 70  06 00 21 59 07 20 21 8c   8. ...!p..!Y. !.
21560   03 16 80 5c 0f 16 88 5c  07 16 90 5c 04 16 98 5c   ...\...\...\...\
21570   d0 e7 00 09 03 16 28 5c  01 00 20 8c 05 16 80 5c   ......(\.. ....\
21580   04 16 88 5c cc e6 ff 09  00 30 28 8c dc 20 02 00   ...\.....0(.. ..
21590   05 16 80 5c 04 16 88 5c  b8 e6 ff 09 00 30 28 8c   ...\...\.....0(.
215a0   00 21 02 00 00 00 20 8c  05 16 80 5c 04 16 88 5c   .!.... ....\...\
215b0   a0 e6 ff 09 00 30 28 8c  f0 20 02 00 05 16 80 5c   .....0(.. .....\
215c0   04 16 88 5c 8c e6 ff 09  00 30 28 8c 60 20 02 00   ...\.....0(.` ..
215d0   05 16 80 5c 04 16 88 5c  78 e6 ff 09 5c 00 00 08   ...\...\x...\...
215e0   00 30 28 8c dc 20 02 00  01 00 20 8c 05 16 80 5c   .0(.. .... ....\
215f0   04 16 88 5c 5c e6 ff 09  00 30 28 8c 00 21 02 00   ...\\....0(..!..
21600   00 00 20 8c 05 16 80 5c  04 16 88 5c 44 e6 ff 09   .. ....\...\D...
21610   00 30 28 8c f0 20 02 00  05 16 80 5c 04 16 88 5c   .0(.. .....\...\
21620   30 e6 ff 09 00 30 28 8c  20 20 02 00 05 16 80 5c   0....0(.  .....\
21630   04 16 88 5c 1c e6 ff 09  00 30 38 8c 14 08 06 10   ...\.....08.....
21640   04 00 30 8c 00 00 28 8c  00 30 20 8c 10 12 02 00   ..0...(..0 .....
21650   07 16 80 5c 06 16 88 5c  05 16 90 5c 04 16 98 5c   ...\...\...\...\
```

Mar 27 18:20 1996 image.txt Page 208

```
21660   c0 e6 ff 09 00 00 00 0a  00 30 28 8c f0 1f 02 00   .........0(.....
21670   01 00 20 8c 05 16 80 5c  04 16 88 5c a4 e5 ff 09   .. ....\...\....
21680   00 30 28 8c dc 20 02 00  05 16 80 5c 04 16 88 5c   .0(.. .....\...\
21690   c0 e5 ff 09 00 30 28 8c  c0 20 02 00 00 00 20 8c   .....0(.. .... .
216a0   05 16 80 5c 04 16 88 5c  a8 e5 ff 09 00 30 38 8c   ...\...\.....08.
216b0   14 06 06 10 01 00 30 8c  06 16 28 5c 00 30 20 8c   ......0...(\.0 .
216c0   a0 00 02 00 07 16 80 5c  06 16 88 5c 05 16 90 5c   .......\...\...\
216d0   04 16 98 5c 4c e6 ff 09  00 00 00 0a 00 00 00 00   ...\L...........
216e0   10 16 28 5c 00 00 20 8c  00 30 20 92 f4 08 06 10   ..(\.. ..0 .....
216f0   00 30 20 92 fc 08 06 10  58 00 00 09 00 30 80 8c   .0 .....X....0..
21700   f4 08 06 10 ec 03 00 09  00 30 80 92 fc 08 06 10   .........0......
21710   30 04 00 09 00 30 28 92  48 08 06 10 00 30 38 8c   0....0(.H....08.
21720   14 08 06 10 02 00 30 8c  04 16 28 5c 00 30 20 8c   ......0...(\.0 .
21730   90 16 02 00 07 16 80 5c  06 16 88 5c 05 16 90 5c   .......\...\...\
21740   04 16 98 5c dc e5 ff 08  00 00 00 00 00 00 00 00   ...\............
21750   70 60 08 8c 40 e0 2f 8c  00 30 20 8c b0 20 02 00   p`..@./..0 .. ..
21760   05 16 80 5c 04 16 88 5c  d8 e5 00 09 00 00 20 8c   ...\...\...... .
21770   05 16 80 5c 04 16 88 5c  d8 e4 ff 09 00 30 28 8c   ...\...\.....0(.
21780   dc 20 02 00 01 00 20 8c  05 16 80 5c 04 16 88 5c   . .... ....\...\
21790   c0 e4 ff 09 00 30 28 8c  90 22 02 00 05 16 80 5c   .....0(..".....\
217a0   04 16 88 5c ac e4 ff 09  00 30 28 8c dc 20 02 00   ...\.....0(.. ..
217b0   05 16 80 5c 04 16 88 5c  98 e4 ff 09 00 30 28 8c   ...\...\.....0(.
217c0   60 1f 02 00 05 16 80 5c  04 16 88 5c 84 e4 ff 09   `......\...\....
217d0   00 30 28 8c 10 21 02 00  05 16 80 5c 04 16 88 5c   .0(..!.....\...\
217e0   70 e4 ff 09 00 00 00 0a  00 00 00 00 00 00 00 00   p...............
217f0   e0 60 08 8c 10 16 60 5c  00 30 68 8c 20 d0 05 10   .`....`\.0h. ...
21800   38 00 20 8c 90 00 21 70  00 34 21 90 9e d0 05 10   8. ...!p.4!.....
21810   80 28 01 5a d0 02 00 12  40 e0 3f 8c 00 30 30 8c   .(.Z....@.?..00.
21820   e8 20 02 00 7e 60 2b 8c  38 00 20 8c 8c 00 21 70   . ..~`+.8. ...!p
21830   05 00 21 59 00 10 21 90  07 16 80 5c 06 16 88 5c   ..!Y..!....\...\
21840   04 16 90 5c fc e4 00 09  07 16 28 5c 00 30 20 8c   ...\......(\.0 .
21850   e4 20 02 00 05 16 80 5c  04 16 88 5c 0c ec 00 0b   . .....\...\....
21860   7e 60 2b 8c 38 00 20 8c  8c 00 21 70 05 00 21 59   ~`+.8. ...!p..!Y
21870   07 20 81 8c dc ed 00 0b  10 11 3d 59 07 16 78 5c   . ........=Y..x\
21880   b0 e0 37 8c 7e 60 2b 8c  38 00 20 8c 8c 00 21 70   ..7.~`+.8. ...!p
21890   05 00 21 59 07 20 21 8c  06 16 80 5c 04 16 88 5c   ..!Y. !....\...\
218a0   a0 e4 00 09 40 e0 2f 8c  06 16 20 5c 05 16 80 5c   ....@./... \...\
218b0   04 16 88 5c b4 eb 00 0b  28 e0 01 3a 40 e0 2f 8c   ...\....(..:@./.
218c0   00 30 20 8c dc 20 02 00  05 16 80 5c 04 16 88 5c   .0 .. .....\...\
218d0   98 eb 00 0b 81 c9 23 59  04 16 78 5c e0 3f 01 3d   ......#Y..x\.?.=
```

Mar 27 16:20 1996 image.txt Page 209

```
218e0   7e 60 2b 8c 38 00 20 8c  8c 00 21 70 05 00 21 59   ~`+.8. ...!p..!Y
218f0   1b 20 71 8c 1b 20 21 80  20 20 01 3d b0 e0 2f 8c   . q.. !.  .=../.
21900   00 30 20 8c 60 21 02 00  05 16 80 5c 04 16 88 5c   .0 . !......\...\
21910   30 e4 00 09 48 00 00 08  b0 e0 1f 8c 00 30 e8 8c   0...H........0..
21920   20 25 02 00 0e 16 28 5c  0e 16 20 5c 00 50 39 80    %.....(\.. \.P9.
21930   01 20 31 80 03 20 71 8c  02 20 29 80 03 20 21 80   . 1.. q.. )... !.
21940   03 16 80 5c 1a 16 88 5c  07 16 90 5c 06 16 98 5c   ...\...\...\...\
21950   05 16 a0 5c 04 16 a8 5c  e8 e3 00 09 40 e0 2f 8c   ...\...\....@./.
21960   b0 e0 27 8c 05 16 80 5c  04 16 88 5c fc ea 00 0b   ..'....\...\....
21970   00 30 20 8c dc 20 02 00  05 16 80 5c 04 16 88 5c   .0 .. .....\...\
21980   e8 ea 00 0b b0 e0 37 8c  7e 60 2b 8c 38 00 20 8c   ......7.~`+.8. .
21990   8c 00 21 70 05 00 21 59  1f 20 21 8c 06 16 80 5c   ..!p..!Y. !....\
219a0   04 16 88 5c 9c e3 00 09  40 e0 2f 8c 06 16 20 5c   ...\....@./... \
219b0   05 16 80 5c 04 16 88 5c  b0 ea 00 0b 00 30 20 8c   ...\...\.....0 .
219c0   dc 20 02 00 05 16 80 5c  04 16 88 5c 9c ea 00 0b   . .....\...\....
219d0   7e 60 2b 8c 38 00 20 8c  8c 00 21 70 05 00 21 59   ~`+.8. ...!p..!Y
219e0   21 20 21 8c 06 16 80 5c  04 16 88 5c 54 e3 00 09   ! !....\...\T...
219f0   40 e0 2f 8c 06 16 20 5c  05 16 80 5c 04 16 88 5c   @./... \...\...\
21a00   68 ea 00 0b 00 30 20 8c  e0 20 02 00 05 16 80 5c   h....0 .. .....\
21a10   04 16 88 5c 54 ea 00 0b  7e 60 2b 8c 38 00 20 8c   ...\T...~`+.8. .
21a20   8c 00 21 70 05 00 21 59  23 20 21 80 20 20 01 3d   ..!p..!Y# !.  .=
21a30   b0 e0 2f 8c 00 30 20 8c  dc 20 02 00 05 16 80 5c   ../..0 .. .....\
21a40   04 16 88 5c fc e2 00 09  44 00 00 08 7e 60 2b 8c   ...\....D...~`+.
21a50   38 00 20 8c 8c 00 21 70  05 00 21 59 23 20 81 8c   8. ...!p..!Y# ..
21a60   f0 eb 00 0b 10 51 7d 59  b0 e0 37 8c 7e 60 2b 8c   .....Q}Y..7.~`+.
21a70   38 00 20 8c 8c 00 21 70  05 00 21 59 23 20 21 8c   8. ...!p..!Y# !.
21a80   06 16 80 5c 04 16 88 5c  b8 e2 00 09 40 e0 2f 8c   ...\...\....@./.
21a90   b0 e0 27 8c 05 16 80 5c  04 16 88 5c cc e9 00 0b   ..'....\...\....
21aa0   28 e0 03 3a 40 e0 2f 8c  00 30 20 8c dc 20 02 00   (..:@./..0 .. ..
21ab0   05 16 80 5c 04 16 88 5c  b0 e9 00 0b 81 c9 23 59   ...\...\......#Y
21ac0   04 16 78 5c e0 3f 01 3d  40 e0 2f 8c 01 00 20 8c   ..x\.?.=@./... .
21ad0   05 16 80 5c 04 16 88 5c  78 e1 ff 09 04 16 80 5c   ...\...\x......\
21ae0   00 00 00 0a 00 00 80 8c  00 00 00 0a 00 00 00 00   ................
21af0   10 16 38 5c 00 00 18 8c  00 10 2c 90 63 00 20 8c   ..8\......,.c. .
21b00   30 00 29 3b 2c e0 78 3e  00 d0 81 90 e4 fc ff 09   0.);,.x>........
21b10   83 00 1c 59 00 d0 21 90  01 20 21 8c 00 d0 21 92   ...Y..!.. !...!.
21b20   00 d0 29 90 63 00 20 8c  08 00 29 3b dc ff 78 39   ..).c. ...);..x9
21b30   03 16 80 5c 00 00 00 0a  00 00 00 00 00 00 00 00   ...\............
21b40   00 30 28 8c dc 20 02 00  01 00 20 8c 05 16 80 5c   .0(.. .... ....\
21b50   04 16 88 5c fc e0 ff 09  05 16 80 5c 04 16 88 5c   ...\.......\...\
```

Mar 27 18:20 1996 image.txt Page 210

```
21b60   f0 e0 ff 09 05 16 80 5c  04 16 88 5c e4 e0 ff 09   .......\...\....
21b70   00 30 28 8c c0 25 02 00  00 00 20 8c 05 16 80 5c   .0(..%.... ....\
21b80   04 16 88 5c cc e0 ff 0a  00 00 00 00 00 00 00 00   ...\............
21b90   00 30 20 80 14 08 06 10  14 20 11 3a 00 30 28 80   .0 ...... .:.0(.
21ba0   14 08 06 10 5e 00 20 8c  58 00 29 3d 00 30 20 90   ....^. .X.)=.0 .
21bb0   fc 08 06 10 01 20 29 8c  00 30 20 90 f4 08 06 10   ..... )..0 .....
21bc0   85 01 21 59 00 30 20 92  f4 08 06 10 00 30 28 8c   ..!Y.0 ......0(.
21bd0   e0 22 02 00 00 30 20 90  f4 08 06 10 05 16 80 5c   ."...0 ........\
21be0   04 16 88 5c 0c 1c fe 09  00 30 20 90 f4 08 06 10   ...\.....0 .....
21bf0   10 20 01 3e 00 00 20 8c  00 30 20 92 f4 08 06 10   . .>.. ..0 .....
21c00   00 30 20 80 14 08 06 10  28 20 19 3a 00 30 28 80   .0 .....( .:.0(.
21c10   14 08 06 10 24 00 20 8c  18 00 29 3a 00 30 28 90   ....$. ...):.0(.
21c20   f4 08 06 10 00 30 20 8c  ff ff ff ff 40 00 29 3d   .....0 .....@.)=
21c30   00 30 18 90 48 08 06 10  00 d0 00 86 00 30 38 8c   .0..H........08.
21c40   d0 cf 05 10 00 30 30 8c  18 d0 05 10 01 00 28 8c   .....00.......(.
21c50   00 30 20 8c ff ff ff ff  07 16 80 5c 06 16 88 5c   .0 ........\...\
21c60   05 16 90 5c 04 16 98 5c  48 06 fe 08 e4 fa ff 09   ...\...\H.......
21c70   00 30 80 8c f4 08 06 10  78 fe ff 09 00 30 80 92   .0......x....0..
21c80   fc 08 06 10 bc fe ff 09  00 30 38 8c 14 08 06 10   .........08.....
21c90   02 00 30 8c 00 00 26 8c  00 30 20 8c 90 1b 02 00   ..0...(..0 .....
21ca0   07 16 80 5c 06 16 88 5c  05 16 90 5c 04 16 98 5c   ...\...\...\...\
21cb0   70 e0 ff 09 00 30 38 8c  d0 cf 05 10 00 30 30 8c   p....08......00.
21cc0   18 d0 05 10 01 00 28 8c  00 30 20 8c ff ff ff ff   ......(..0 .....
21cd0   07 16 80 5c 06 16 88 5c  05 16 90 5c 04 16 98 5c   ...\...\...\...\
21ce0   d0 05 fe 08 00 00 00 00  00 00 00 00 00 00 00 00   ................
21cf0   10 16 30 5c 5c e9 00 0b  10 16 38 5c 00 00 18 8c   ..0\\.....8\....
21d00   28 20 04 3b 06 c0 20 59  00 10 81 c0 9c df 00 0b   ( .;.. Y........
21d10   0c 20 04 3d 00 00 80 8c  00 00 00 0a 01 e0 20 8c   . .=.......... .
21d20   04 16 18 5c e0 df 21 3c  07 16 80 5c 00 00 00 0a   ...\..!<...\....
21d30   10 16 30 5c 1c e9 00 0b  10 16 38 5c 00 00 18 8c   ..0\......8\....
21d40   48 20 04 3b 06 c0 20 59  00 10 81 c0 5c df 00 0b   H .;.. Y....\...
21d50   2c 20 04 3d 00 30 28 8c  50 1f 02 00 06 c0 20 59   , .=.0(.P..... Y
21d60   00 10 21 c0 05 16 80 5c  04 16 88 5c 9c e5 00 0b   ..!....\...\....
21d70   0c 20 04 3d 00 00 80 8c  00 00 00 0a 01 e0 20 8c   . .=.......... .
21d80   04 16 18 5c c0 df 21 3c  07 16 80 5c 00 00 00 0a   ...\..!<...\....
21d90   70 60 08 8c 10 16 70 5c  00 30 18 8c 20 d0 05 10   p`....p\.0.. ...
21da0   00 00 78 8c 8e e0 03 5a  8c 01 00 12 7e e0 28 8c   ..x....Z....~.(.
21db0   38 00 20 8c 8f 00 21 70  05 00 21 59 00 10 21 90   8. ....!p..!Y..!.
21dc0   80 28 01 5a 70 01 00 12  7e e0 28 8c 38 00 20 8c   .(.Zp...~.(.8. .
21dd0   8f 00 21 70 05 00 21 59  1b 20 31 8c 7e e0 28 8c   ..!p..!Y. 1.~.(.
```

Mar 27 10:20 1996 image.txt Page 211

```
21de0   38 00 20 8c 8e 00 21 70  05 00 21 59 1b 20 29 8c   8. ...!p..!Y. ).
21df0   04 00 20 8c 06 16 80 5c  05 16 88 5c 04 16 90 5c   .. ....\...\...\
21e00   80 e3 00 0b 80 28 04 5a  2c 01 00 15 7e e0 28 8c   .....(.Z,... .(.
21e10   38 00 20 8c 8f 00 21 70  05 00 21 59 1f 20 31 80   8. ...!p..!Y. 1.
21e20   7e e0 28 8c 38 00 20 8c  8e 00 21 70 05 00 21 59    .(.8. ...!p..!Y
21e30   1f 20 21 80 86 20 01 5a  fc 00 00 15 7e e0 28 8c   . !.. .Z.... .(.
21e40   38 00 20 8c 8f 00 21 70  05 00 21 59 21 20 31 80   8. ...!p..!Y! 1.
21e50   7e e0 28 8c 38 00 20 8c  8e 00 21 70 05 00 21 59    .(.8. ...!p..!Y
21e60   21 30 21 80 86 20 01 5a  cc 00 00 15 7e e0 28 8c   ! !.. .Z.... .(.
21e70   38 00 20 8c 8f 00 21 70  05 00 21 59 23 20 31 8c   8. ...!p..!Y# 1.
21e80   7e e0 28 8c 38 00 20 8c  8e 00 21 70 05 00 21 59    .(.8. ...!p..!Y
21e90   23 20 29 8c 15 00 20 8c  06 16 80 5c 05 16 88 5c   # )... ....\...\
21ea0   04 16 90 5c dc e4 00 0b  8c 20 04 3d 00 00 30 8c   ...\.... .=..0.
21eb0   7e e0 28 8c 38 00 20 8c  8e 00 21 70 05 00 21 59    .(.8. ...!p..!Y
21ec0   00 10 31 92 40 e0 3f 8c  00 30 30 8c e0 21 02 00   ..1.@.?..00..!..
21ed0   01 a0 2b 8c 01 e0 23 8c  07 16 80 5c 06 16 88 5c   ..+...#....\...\
21ee0   05 16 90 5c 04 16 98 5c  58 de 00 09 07 16 28 5c   ...\...\X.....(\
21ef0   01 00 20 8c 05 16 80 5c  04 16 88 5c 54 dd ff 09   .. ....\...\T...
21f00   00 30 28 8c dc 20 02 00  05 16 80 5c 04 16 88 5c   .0(.. .....\...\
21f10   40 dd ff 09 00 30 28 8c  c0 20 02 00 00 00 20 8c   @....0(.. .... .
21f20   05 16 80 5c 04 16 88 5c  28 dd ff 09 01 00 80 8c   ...\...\(.......
21f30   00 00 00 0a 01 e0 2b 8c  05 16 78 5c 63 00 20 8c   ......+...x\c. .
21f40   85 20 01 5a 60 fe ff 14  00 00 80 8c 00 00 00 0a   . .Z`...........
21f50   2a 23 2c 77 57 70 50 74  54 40 00 00 00 00 00 00   *#,wWpPtT@......
21f60   45 6e 74 72 79 20 44 65  73 63 72 69 70 74 6f 6e   Entry Descripton
21f70   20 20 20 20 20 20 20 20  20 20 49 50 20 61 64 64             IP add
21f80   72 65 73 73 20 20 20 20  20 20 20 54 20 41 20 20   ress       T A
21f90   44 69 61 6c 20 4e 75 6d  62 65 72 20 00 00 00 00   Dial Number ....
21fa0   45 52 52 4f 52 20 2d 20  31 30 30 33 20 2d 20 46   ERROR - 1003 - F
21fb0   69 65 6c 64 20 66 6f 72  6d 61 74 20 69 73 20 6e   ield format is n
21fc0   6f 74 20 66 6f 75 72 20  69 6e 74 65 67 65 72 73   ot four integers
21fd0   20 73 65 70 65 72 61 74  65 20 62 79 20 64 6f 74    seperate by dot
21fe0   73 00 00 00 00 00 00 00  00 00 00 00 00 00 00 00   s...............
21ff0   0a 0d 45 52 52 4f 52 20  2d 20 31 30 30 34 20 2d   ..ERROR - 1004 -
22000   20 49 6c 6c 65 67 61 6c  20 45 6e 74 72 79 20 6e    Illegal Entry n
22010   75 6d 62 65 72 00 00 00  00 00 00 00 00 00 00 00   umber...........
22020   41 72 65 20 79 6f 75 20  73 75 72 65 20 79 6f 75   Are you sure you
22030   20 77 61 6e 74 20 74 6f  20 63 68 61 6e 67 65 20    want to change
22040   74 68 65 20 65 6e 74 72  79 20 3f 20 28 79 65 73   the entry ? (yes
22050   2f 6e 6f 29 00 00 00 00  00 00 00 00 00 00 00 00   /no)............
```

```
Mar 27 16:20 1996   image.txt Page 212

22060   41 72 65 20 79 6f 75 20  73 75 72 65 20 79 6f 75   Are you sure you
22070   20 77 61 6e 74 20 74 6f  20 64 65 6c 65 74 65 20    want to delete
22080   74 68 65 20 65 6e 74 72  79 20 3f 20 28 79 65 73   the entry ? (yes
22090   2f 6e 6f 29 00 00 00 00  00 00 00 00 00 00 00 00   /no)............
220a0   1b 5b 32 4a 1b 5b 48 20  0a 00 00 00 00 00 00 00   .[2J.[H ........
220b0   1b 5b 32 4a 1b 5b 48 20  0d 0a 00 00 00 00 00 00   .[2J.[H ........
220c0   50 72 65 73 73 20 65 6e  74 65 72 20 74 6f 20 63   Press enter to c
220d0   6f 6e 74 69 6e 75 65 00  55 00 00 00 20 00 00 00   ontinue.U... ...
220e0   20 20 00 00 20 20 20 00  20 25 30 32 64 00 00 00     ..   . %02d...
220f0   20 20 20 20 20 00 00 00  00 00 00 00 00 00 00 00        ...........
22100   20 57 41 52 4e 49 4e 47  3a 20 00 00 00 00 00 00    WARNING: ......
22110   2d 2d 2d 2d 2d 20 2d 2d  2d 2d 2d 2d 2d 2d 2d 2d   ----- ----------
22120   2d 2d 2d 2d 2d 2d 2d 2d  2d 20 2d 2d 2d 2d 2d 2d   --------- ------
22130   2d 2d 2d 2d 2d 2d 2d 2d  2d 20 20 2d 20 2d 20 20   ---------  - -  
22140   2d 2d 2d 2d 2d 2d 2d 2d  2d 2d 2d 2d 00 00 00 00   ------------....
22150   4e 00 00 00 00 00 00 00  00 00 00 00 00 00 00 00   N...............
22160   20 20 20 20 20 20 20 20  20 20 20 20 20 20 20 20                   
22170   00 00 00 00 00 00 00 00  00 00 00 00 00 00 00 00   ................
22180   20 45 6e 74 65 72 20 79  6f 75 72 20 63 68 6f 69    Enter your choi
22190   63 65 20 3a 20 00 00 00  00 00 00 00 00 00 00 00   ce : ...........
221a0   20 53 65 6c 65 63 74 20  65 6e 74 72 79 20 6e 75    Select entry nu
221b0   6d 62 65 72 20 3a 00 00  00 00 00 00 00 00 00 00   mber :..........
221c0   20 31 20 41 64 64 20 45  6e 74 72 79 20 74 6f 20    1 Add Entry to 
221d0   44 69 61 6c 20 54 61 62  6c 65 00 00 00 00 00 00   Dial Table......
221e0   0d 0a 45 52 52 4f 52 20  2d 20 31 30 30 36 20 2d   ..ERROR - 1006 -
221f0   20 54 68 65 20 6e 65 77  20 65 6e 74 72 79 3a 20    The new entry: 
22200   25 64 20 69 73 20 65 71  75 61 6c 20 74 6f 20 65   %d is equal to e
22210   6e 74 72 79 3a 20 25 64  20 69 6e 20 64 69 61 6c   ntry: %d in dial
22220   20 74 61 62 6c 65 0a 00  00 00 00 00 00 00 00 00    table..........
22230   20 44 65 73 74 69 6e 61  74 69 6f 6e 20 44 65 73    Destination Des
22240   63 72 69 70 74 69 6f 6e  20 3a 20 00 00 00 00 00   cription : .....
22250   20 34 20 53 68 6f 77 20  45 6e 74 72 69 65 73 20    4 Show Entries 
22260   6f 66 20 44 69 61 6c 20  54 61 62 6c 65 00 00 00   of Dial Table...
22270   20 33 20 55 70 64 61 74  65 20 45 6e 74 72 79 20    3 Update Entry 
22280   6f 66 20 44 69 61 6c 20  54 61 62 6c 65 00 00 00   of Dial Table...
22290   20 2d 2d 2d 20 20 50 41  53 53 61 46 41 58 20 44    ---  PASSaFAX D
222a0   69 61 6c 20 54 61 62 6c  65 20 20 2d 2d 2d 00 00   ial Table  ---..
222b0   25 30 33 64 00 00 00 00  00 00 00 00 00 00 00 00   %03d............
222c0   20 32 20 44 65 6c 65 74  65 20 45 6e 74 72 79 20    2 Delete Entry 
222d0   66 72 6f 6d 20 44 69 61  6c 20 54 61 62 6c 65 00   from Dial Table.
```

Mar 27 18:20 1996 image.txt Page 213

```
222e0   65 6e 74 72 79 20 3d 20  25 64 0a 00 00 00 00 00   entry = %d......
222f0   20 44 65 73 74 69 6e 61  74 69 6f 6e 20 44 65 73    Destination Des
22300   63 72 69 70 74 69 6f 6e  20 5b 25 73 5d 20 3a 20   cription [%s] : 
22310   00 00 00 00 00 00 00 00  25 25 25 64 64 00 00 00   ........%%%dd...
22320   1b 5b 32 4a 1b 5b 48 20  0d 0a 20 2d 2d 2d 20 41   .[2J.[H .. --- A
22330   64 64 20 45 6e 74 72 79  20 74 6f 20 44 69 61 6c   dd Entry to Dial
22340   20 54 61 62 6c 65 20 28  45 6e 74 72 79 20 6e 6f    Table (Entry no
22350   2e 20 25 30 32 64 29 20  2d 2d 2d 0a 0d 00 00 00   . %02d) ---.....
22360   1b 5b 32 4a 1b 5b 48 20  0d 0a 20 2d 2d 2d 20 55   .[2J.[H .. --- U
22370   70 64 61 74 65 20 45 6e  74 72 79 20 69 6e 20 44   pdate Entry in D
22380   69 61 6c 20 54 61 62 6c  65 20 28 45 6e 74 72 79   ial Table (Entry
22390   20 6e 6f 2e 20 25 30 32  64 29 20 2d 2d 2d 0a 0d    no. %02d) ---..
223a0   00 00 00 00 00 00 00 00  00 00 00 00 00 00 00 00   ................
223b0   52 65 71 75 65 73 74 20  74 6f 20 64 65 6c 65 74   Request to delet
223c0   65 20 65 6e 74 72 79 20  6e 6f 2e 20 25 30 32 64   e entry no. %02d
223d0   2c 20 64 65 73 74 69 6e  61 74 69 6f 6e 20 64 65   , destination de
223e0   73 63 72 69 70 74 69 6f  6e 3a 20 25 73 00 00 00   scription: %s...
223f0   20 4e 75 6d 62 65 72 20  74 6f 20 44 69 61 6c 20    Number to Dial 
22400   62 79 20 52 65 6d 6f 74  65 20 50 41 53 53 61 46   by Remote PASSaF
22410   41 58 20 5b 5d 20 3a 00  00 00 00 00 00 00 00 00   AX [] :.........
22420   20 2d 2d 2d 20 20 50 41  53 53 61 46 41 58 20 55    ---  PASSaFAX U
22430   70 64 61 74 65 20 44 69  61 6c 20 54 61 62 6c 65   pdate Dial Table
22440   20 4d 65 6e 75 20 2d 2d  2d 00 00 00 00 00 00 00    Menu ---.......
22450   25 33 64 2e 25 33 64 2e  25 33 64 2e 25 33 64 00   %3d.%3d.%3d.%3d.
22460   20 49 6e 74 65 72 6e 65  74 20 41 64 64 72 65 73    Internet Addres
22470   73 20 6f 66 20 52 65 6d  6f 74 65 20 50 41 53 53   s of Remote PASS
22480   61 46 41 58 20 5b 5d 20  3a 20 00 00 00 00 00 00   aFAX [] : ......
22490   20 4e 75 6d 62 65 72 20  74 6f 20 44 69 61 6c 20    Number to Dial 
224a0   62 79 20 52 65 6d 6f 74  65 20 50 41 53 53 61 46   by Remote PASSaF
224b0   41 58 20 5b 25 73 5d 20  3a 20 00 00 00 00 00 00   AX [%s] : ......
224c0   20 55 73 65 20 50 53 54  4e 2f 50 41 42 58 20 41    Use PSTN/PABX A
224d0   63 63 65 73 73 20 50 72  65 66 69 78 20 28 59 2f   ccess Prefix (Y/
224e0   4e 29 20 20 5b 25 73 5d  20 3a 00 00 00 00 00 00   N)  [%s] :......
224f0   20 49 6e 74 65 72 6e 65  74 20 50 72 6f 74 6f 63    Internet Protoc
22500   6f 6c 20 55 44 50 20 6f  72 20 54 43 50 20 28 55   ol UDP or TCP (U
22510   2f 54 29 20 20 5b 25 73  5d 20 3a 20 00 00 00 00   /T)  [%s] : ....
22520   25 30 33 64 2e 25 30 33  64 2e 25 30 33 64 2e 25   %03d.%03d.%03d.%
22530   30 33 64 20 00 00 00 00  00 00 00 00 00 00 00 00   03d ............
22540   20 54 79 70 65 20 43 74  72 6c 2d 43 20 6f 72 20    Type Ctrl-C or 
22550   24 20 74 6f 20 72 65 74  75 72 6e 20 74 6f 20 74   $ to return to t
```

Mar 27 18:20 1996 image.txt Page 214

```
22560   6e 65 20 70 72 65 76 69  6f 75 73 20 6d 65 6e 75   ne previous menu
22570   2e 00 00 00 00 00 00 00  00 00 00 00 00 00 00 00   ................
22580   20 49 6e 74 65 72 6e 65  74 20 41 64 64 72 65 73    Internet Addres
22590   73 20 6f 66 20 52 65 6d  6f 74 65 20 50 41 53 53   s of Remote PASS
225a0   61 4e 41 58 20 5b 25 64  2e 25 64 2e 25 64 2e 25   aNAX [%d.%d.%d.%
225b0   64 5d 20 3a 20 00 00 00  00 00 00 00 00 00 00 00   d] : ...........
225c0   20 50 72 65 73 73 20 20  45 6e 74 65 72 20 74 6f    Press  Enter to
225d0   20 63 6f 6e 74 69 6e 75  65 2c 20 43 74 72 6c 2d    continue, Ctrl-
225e0   43 20 74 6f 20 72 65 74  75 72 6e 20 74 6f 20 70   C to return to p
225f0   72 65 76 69 6f 75 73 20  6d 65 6e 75 2e 00 00 00   revious menu....
22600   45 52 52 4f 52 20 2d 20  31 30 30 31 20 2d 20 49   ERROR - 1001 - I
22610   6c 6c 65 67 61 6c 20 49  6e 74 65 72 6e 65 74 20   llegal Internet 
22620   61 64 64 72 65 73 73 00  00 00 00 00 00 00 00 00   address.........
22630   45 52 52 4f 52 20 2d 20  31 31 30 31 20 2d 20 49   ERROR - 1101 - I
22640   6c 6c 65 67 61 6c 20 70  61 72 61 6d 65 74 65 72   llegal parameter
22650   20 2d 20 4e 75 6d 65 72  69 63 20 46 69 65 6c 64    - Numeric Field
22660   00 00 00 00 00 00 00 00  00 00 00 00 00 00 00 00   ................
22670   45 52 52 4f 52 20 2d 20  31 31 30 33 20 2d 20 49   ERROR - 1103 - I
22680   6c 6c 65 67 61 6c 20 70  61 72 61 6d 65 74 65 72   llegal parameter
22690   20 2d 20 42 6f 6f 6c 65  61 6e 20 46 69 65 6c 64    - Boolean Field
226a0   00 00 00 00 00 00 00 00  00 00 00 00 00 00 00 00   ................
226b0   10 16 70 5c 00 30 20 8c  80 51 01 00 84 45 7c 74   ..p\.0 ..Q...E|t
226c0   04 44 2c 74 10 0e 20 8c  84 45 39 74 04 44 31 74   .D,t.. ..E9t.D1t
226d0   3c 00 20 8c 84 85 29 74  04 84 21 74 00 30 88 8c   <. ...)t..!t.0..
226e0   00 27 02 00 0f 16 90 5c  07 16 98 5c 05 16 a0 5c   .'.....\...\...\
226f0   04 16 a8 5c 4c d6 00 09  0e 16 80 5c 00 00 00 0a   ...\L......\....
22700   25 64 20 25 32 2e 32 64  3a 25 32 2e 32 64 3a 25   %d %2.2d:%2.2d:%
22710   32 2e 32 64 20 00 00 00  00 00 00 00 00 00 00 00   2.2d ...........
22720   50 60 08 8c 00 30 18 8c  20 d0 05 10 00 30 20 80   P`...0.. ....0 .
22730   8d d0 05 10 1c 20 01 3d  6d e0 28 8c 00 30 20 8c   ..... .=m.(..0 .
22740   a0 2d 02 00 05 16 80 5c  04 16 88 5c 74 dd 00 0b   .-.....\...\t...
22750   40 e0 37 8c 00 30 28 8c  20 2d 02 00 6d e0 20 8c   @.7..0(. -..m. .
22760   06 16 80 5c 05 16 88 5c  04 16 90 5c d4 d5 00 09   ...\...\...\....
22770   0d 00 20 8c 00 30 20 92  90 08 06 10 6d e0 20 8c   .. ..0 .....m. .
22780   00 30 20 92 94 08 06 10  06 16 28 5c 00 00 20 8c   .0 .......(\.. .
22790   05 16 80 5c 04 16 88 5c  b8 d4 ff 09 00 30 20 8c   ...\...\.....0 .
227a0   20 27 02 00 00 30 20 92  44 08 06 10 00 30 20 8c    '...0 .D....0 .
227b0   e0 27 02 00 00 30 20 92  48 08 06 10 00 30 20 8c   .'...0 .H....0 .
227c0   20 27 02 00 00 30 20 92  4c 08 06 10 01 00 80 8c    '...0 .L.......
227d0   00 00 00 0a 00 00 00 00  00 00 00 00 00 00 00 00   ................
```

```
Mar 27 16:20 1996  image.txt Page 215

227e0   50 60 08 8c 00 30 18 8c  20 a0 05 10 00 30 20 80   P`...0.. ....0 .
227f0   9a a0 05 10 1c 20 01 3d  7a e0 28 8c 00 30 20 8c   ..... .=z.(..0 .
22800   14 2a 02 00 05 16 80 5c  04 16 88 5c 54 dc 00 0b   .*.....\...\....
22810   40 e0 37 8c 00 30 28 8c  70 2a 02 00 7a e0 20 8c   @.7..0(.p*..z. .
22820   06 16 80 5c 05 16 88 5c  04 16 90 5c 14 d5 00 09   ...\...\...\....
22830   02 00 20 8c 00 30 20 92  90 08 06 10 7a e0 20 8c   .. ..0 .....z. .
22840   00 30 20 92 94 08 06 10  06 16 28 5c 00 00 20 8c   .0 .......(\.. .
22850   05 16 80 5c 04 16 88 5c  f8 d3 ff 09 00 30 20 8c   ...\...\.....0 .
22860   20 27 02 00 00 30 20 92  44 08 06 10 00 30 20 8c    '...0 .D....0 .
22870   a0 28 02 00 00 30 20 92  48 08 06 10 00 30 20 8c   .(...0 .H....0 .
22880   e0 27 02 00 00 30 20 92  4c 08 06 10 01 00 80 8c   .'...0 .L.......
22890   00 00 00 0a 00 00 00 00  00 00 00 00 00 00 00 00   ................
228a0   50 60 08 8c 00 30 18 8c  20 a0 05 10 00 30 20 80   P`...0.. ....0 .
228b0   9c a0 05 10 1c 20 01 3d  7c e0 28 8c 00 30 20 8c   ..... .=|.(..0 .
228c0   f0 2c 02 00 05 16 80 5c  04 16 88 5c f4 d0 00 0b   .,.....\...\....
228d0   40 e0 37 8c 00 30 28 8c  a0 2c 02 00 7c e0 20 8c   @.7..0(..,..|. .
228e0   06 16 80 5c 05 16 88 5c  04 16 90 5c 54 d4 00 09   ...\...\...\T...
228f0   02 00 20 8c 00 30 20 92  90 08 06 10 7c e0 20 8c   .. ..0 .....|. .
22900   00 30 20 92 94 08 06 10  06 16 28 5c 00 00 20 8c   .0 .......(\.. .
22910   05 16 80 5c 04 16 88 5c  38 d3 ff 09 00 30 20 8c   ...\...\8....0 .
22920   e0 27 02 00 00 30 20 92  44 08 06 10 00 00 20 8c   .'...0 .D..... .
22930   00 30 20 92 48 08 06 10  00 30 20 8c a0 28 02 00   .0 .H....0 ..(..
22940   00 30 20 92 4c 08 06 10  01 00 80 8c 00 00 00 0a   .0 .L...........
22950   00 30 20 8c 20 27 02 00  00 30 20 92 4c 08 06 10   .0 . '...0 .L...
22960   00 30 28 8c 00 2d 02 00  00 00 20 8c 05 16 80 5c   .0(..-.... ....\
22970   04 16 88 5c dc d2 ff 09  00 30 28 8c 10 2d 02 00   ...\.....0(..-..
22980   01 00 20 8c 05 16 80 5c  04 16 88 5c c4 d2 ff 09   .. ....\...\....
22990   00 30 28 8c 40 2d 02 00  05 16 80 5c 04 16 88 5c   .0(.@-.....\...\
229a0   b0 d2 ff 09 00 30 28 8c  10 2d 02 00 05 16 80 5c   .....0(..-.....\
229b0   04 16 88 5c 9c d2 ff 09  00 30 80 90 4c 08 06 10   ...\.....0..L...
229c0   10 00 00 08 00 00 00 00  00 00 00 00 00 00 00 00   ................
229d0   00 10 04 86 00 30 38 8c  a0 08 06 10 00 30 30 90   .....08......00.
229e0   90 08 06 10 00 00 28 8c  00 30 20 8c 10 2a 02 00   ......(..0 ..*..
229f0   07 16 80 5c 06 16 88 5c  05 16 90 5c 04 16 98 5c   ...\...\...\...\
22a00   20 d3 ff 08 00 00 00 00  00 00 00 00 00 00 00 00    ...............
22a10   00 30 28 8c 0c 2d 02 00  01 00 20 8c 05 16 80 5c   .0(..-.... ....\
22a20   04 16 88 5c 2c d2 ff 09  00 30 20 80 a0 08 06 10   ...\,....0 .....
22a30   14 20 11 3a 00 30 28 80  a0 08 06 10 5e 00 20 8c   . .:.0(.....^. .
22a40   40 00 29 3d 00 30 80 90  44 08 06 10 84 ff ff 09   @.)=.0..D.......
22a50   00 30 38 8c d0 cf 05 10  00 30 30 8c 18 a0 05 10   .08......00.....
```

Mar 27 16:20 1996 image.txt Page 216

```
22a60   01 00 28 8c 00 30 20 8c  ff ff ff ff 07 16 80 5c   ..(..0 ........\
22a70   06 16 88 5c 05 16 90 5c  04 16 98 5c 34 f8 fd 08   ...\...\...\4...
22a80   00 30 20 80 a0 08 06 10  14 20 19 3a 00 30 28 80   .0 ...... .:.0(.
22a90   a0 08 06 10 24 00 20 8c  38 00 29 3d 64 ac ff 09   ....$. .8.)=d...
22aa0   00 30 38 8c d0 cf 05 10  00 30 30 8c 18 d0 05 10   .08......00.....
22ab0   01 00 28 8c 00 30 20 8c  ff ff ff ff 07 16 80 5c   ..(..0 ........\
22ac0   06 16 88 5c 05 16 90 5c  04 16 98 5c e4 f7 fd 08   ...\...\...\....
22ad0   00 30 20 80 a0 08 06 10  8d 28 01 5a 74 01 00 12   .0 ......(.Zt...
22ae0   00 30 28 90 4c 08 06 10  00 30 20 8c 20 27 02 00   .0(.L....0 . '..
22af0   05 20 01 5a 30 01 00 12  00 30 28 80 a0 08 06 10   . .Z0....0(.....
22b00   59 00 20 8c 34 00 29 3a  00 30 28 80 a0 08 06 10   Y. .4.):.0(.....
22b10   79 00 20 8c 24 00 29 3a  00 30 28 80 a0 08 06 10   y. .$.):.0(.....
22b20   4e 00 20 8c 14 00 29 3a  00 30 28 80 a0 08 06 10   N. ...):.0(.....
22b30   6e 00 20 8c 9c 00 29 3d  00 30 30 90 94 08 06 10   n. ...)=.00.....
22b40   00 30 28 8c a0 08 06 10  05 16 80 5c 04 db 00 0b   .0(........\....
22b50   10 16 20 5c 06 16 80 5c  05 16 88 5c 04 16 90 5c   .. \...\...\...\
22b60   60 d9 00 0b 00 30 20 90  94 08 06 10 00 10 81 80   `....0 .........
22b70   88 d1 00 0b 00 30 20 90  94 08 06 10 00 10 81 82   .....0 .........
22b80   00 30 20 90 48 08 06 10  0c 20 01 35 74 ab ff 09   .0 .H.... .5t...
22b90   10 00 00 08 00 30 80 90  48 08 06 10 34 fe ff 09   .....0..H...4...
22ba0   00 30 38 8c d0 cf 05 10  00 30 30 8c 18 d0 05 10   .08......00.....
22bb0   01 00 28 8c 00 30 20 8c  ff ff ff ff 07 16 80 5c   ..(..0 ........\
22bc0   06 16 88 5c 05 16 90 5c  04 16 98 5c e4 f6 fd 08   ...\...\...\....
22bd0   00 30 28 8c b0 2d 02 00  01 00 20 8c 05 16 80 5c   .0(..-.... ....\
22be0   04 16 88 5c 6c d0 ff 09  00 30 80 90 4c 08 06 10   ...\l....0..L...
22bf0   e0 fd ff 09 00 30 38 8c  d0 cf 05 10 00 30 30 8c   .....08......00.
22c00   18 d0 05 10 04 16 28 5c  00 30 20 8c ff ff ff ff   ......(\.0 .....
22c10   07 16 80 5c 06 16 88 5c  05 16 90 5c 04 16 98 5c   ...\...\...\...\
22c20   90 f6 fd 08 00 30 30 90  94 08 06 10 00 30 28 8c   .....00......0(.
22c30   a0 08 06 10 05 16 80 5c  18 da 00 0b 10 16 20 5c   .......\...... \
22c40   06 16 80 5c 05 16 88 5c  04 16 90 5c 74 d8 00 0b   ...\...\...\t...
22c50   00 30 20 90 48 08 06 10  0c 20 01 35 a4 aa ff 09   .0 .H.... .5....
22c60   10 00 00 08 00 30 80 90  48 08 06 10 64 fd ff 09   .....0..H...d...
22c70   00 30 38 8c d0 cf 05 10  00 30 30 8c 18 d0 05 10   .08......00.....
22c80   01 00 28 8c 00 30 20 8c  ff ff ff ff 07 16 80 5c   ..(..0 ........\
22c90   06 16 88 5c 05 16 90 5c  04 16 98 5c 14 f6 fd 08   ...\...\...\....
22ca0   20 52 65 73 74 72 69 63  74 20 49 6e 63 6f 6d 69    Restrict Incomi
22cb0   6e 67 20 50 41 53 53 61  46 41 58 20 53 65 73 73   ng PASSaFAX Sess
22cc0   69 6f 6e 73 20 74 6f 20  41 64 64 72 65 73 73 65   ions to Addresse
22cd0   73 20 69 6e 20 44 69 61  6c 20 54 61 62 6c 65 20   s in Dial Table
```

```
Mar 27 16:20 1996  image.txt Page 217

22ce0   28 59 2f 4e 29 20 5b 25  73 5d 20 3a 00 00 00 00   (Y/N) [%s] :....
22cf0   59 00 00 00 00 00 00 00  00 00 00 00 00 00 00 00   Y...............
22d00   1b 5b 32 4a 1b 5b 48 20  0a 00 00 00 20 00 00 00   .[2J.[H .... ...
22d10   00 00 00 00 4e 00 00 00  00 00 00 00 00 00 00 00   ....N...........
22d20   20 41 63 63 65 73 73 20  50 61 73 73 77 6f 72 64    Access Password
22d30   20 20 5b 25 73 5d 20 3a  00 00 00 00 00 00 00 00     [%s] :........
22d40   20 2d 2d 2d 20 20 43 6f  6e 66 69 67 75 72 65 20    ---  Configure 
22d50   53 65 63 75 72 69 74 79  20 50 61 72 61 6d 65 74   Security Paramet
22d60   65 72 73 20 20 2d 2d 2d  00 00 00 00 00 00 00 00   ers  ---........
22d70   20 41 6c 6c 6f 77 20 52  65 6d 6f 74 65 20 50 41    Allow Remote PA
22d80   53 53 61 46 41 58 20 74  6f 20 44 69 61 6c 20 28   SSaFAX to Dial (
22d90   59 2f 4e 29 20 5b 25 73  5d 20 3a 00 00 00 00 00   Y/N) [%s] :.....
22da0   53 59 53 54 45 4d 00 00  00 00 00 00 00 00 00 00   SYSTEM..........
22db0   45 52 52 4f 52 20 2d 20  31 31 30 33 20 2d 20 49   ERROR - 1103 - I
22dc0   6c 6c 65 67 61 6c 20 70  61 72 61 6d 65 74 65 72   llegal parameter
22dd0   20 2d 20 42 6f 6f 6c 65  61 6e 20 46 69 65 6c 64    - Boolean Field
22de0   00 00 00 00 00 00 00 00  00 00 00 00 00 00 00 00   ................
22df0   10 16 78 5c 1a 20 34 90  04 20 2c 90 4e 60 21 90   ..x\. 4.. ,.N`!.
22e00   04 80 21 59 4e 60 21 92  1a 20 24 90 1c 20 71 36   ..!YN`!.. $.. q6
22e10   04 e0 2b 90 5e 60 21 90  01 20 21 8c 5e 60 21 92   ..+.^`!.. !.^`!.
22e20   0f 16 60 5c 4c 1d 00 08  16 e0 23 90 04 16 38 5c   ...\L.....#...8\
22e30   0c 20 81 88 4c 63 ff 09  00 30 20 8c ff ff 00 00   . ..Lc...0 .....
22e40   90 00 29 58 00 06 20 8c  0c 00 29 3b 0f 16 80 5c   ..)X.. ...);...\
22e50   c0 02 00 08 00 30 28 8c  80 23 06 10 06 00 20 8c   .....0(..#.... .
22e60   07 16 80 5c 05 16 88 5c  04 16 90 5c 14 d5 00 0b   ...\...\...\....
22e70   20 20 04 3d 01 00 20 8c  0c e0 23 8a 04 e0 2b 90     .=.. ...#...+.
22e80   56 60 21 90 01 20 21 8c  56 60 21 92 14 00 00 08   V`!.. !.V`!.....
22e90   04 e0 2b 90 52 60 21 90  01 20 21 8c 52 60 21 92   ..+.R`!.. !.R`!.
22ea0   16 e0 23 90 0e 20 21 8c  16 e0 23 92 1a e0 23 90   ..#.. !...#...#.
22eb0   0e 09 21 59 1a e0 23 92  0c e0 19 88 0c e0 40 3d   ..!Y..#.......@=
22ec0   0f 16 80 5c 3c 0a 00 08  08 06 20 8c 1c c0 20 3d   ...\<..... ... =
22ed0   00 00 28 8c 05 16 20 5c  0f 16 80 5c 05 16 88 5c   ..(... \...\...\
22ee0   04 16 90 5c 7c 5b 00 08  04 e0 2b 90 62 60 21 90   ...\|[....+.b`!.
22ef0   01 20 21 8c 62 60 21 92  0c e0 23 88 18 20 01 30   . !.b`!...#.. .0
22f00   04 e0 2b 90 56 60 21 90  01 09 21 59 56 60 21 92   ..+.V`!...!YV`!.
22f10   14 00 00 08 04 e0 2b 90  56 60 21 90 01 09 21 59   ......+.V`!...!Y
22f20   56 60 21 92 0f 16 80 5c  48 1c 00 08 00 00 00 00   V`!....\H.......
22f30   10 16 68 5c 11 16 70 5c  12 16 78 5c 04 60 84 92   ..h\..p\..x\.`..
22f40   16 60 24 90 0e 09 29 59  05 16 38 5c 0e 60 24 90   .`$...)Y..8\.`$.
22f50   0c 00 29 33 0e 16 80 5c  18 1c 00 08 0c a0 23 88   ..)3...\......#.
```

Mar 27 18:20 1996 image.txt Page 216

```
22f60   40 20 11 30 1a a0 2b 90  66 60 23 90 04 40 21 59   @ .0..+.f`#..@!Y
22f70   66 60 23 92 6e 60 23 90  01 20 21 8c 6e 60 23 92   f`#.n`#.. !.n`#.
22f80   00 30 28 8c 60 23 06 10  06 00 20 8c 07 16 80 5c   .0(..#.... ....\
22f90   05 16 88 5c 04 16 90 5c  10 e6 fd 0b 54 00 00 08   ...\...\....T...
22fa0   00 00 28 8c 05 16 20 5c  0d 16 80 5c 0f 16 88 5c   ..(... \...\...\
22fb0   07 16 90 5c 0e 16 98 5c  05 16 a0 5c 04 16 a8 5c   ...\...\...\...\
22fc0   a0 60 00 09 08 20 04 3d  00 00 00 0a 04 a0 2b 90   .`... .=......+.
22fd0   6a 60 21 90 01 20 21 8c  6a 60 21 92 1a a0 33 90   j`!.. !.j`!...3.
22fe0   04 a0 2b 90 66 60 21 90  04 80 21 59 66 60 21 92   ..+.f`!...!Yf`!.
22ff0   06 e0 31 8c 3a 60 2b 90  06 00 20 8c 06 16 80 5c   ..1.:`+... ....\
23000   05 16 88 5c 04 16 90 5c  a0 e5 fd 0b 08 00 20 8c   ...\...\...... .
23010   0c e0 21 8a 16 a0 23 90  0e 09 21 59 16 a0 23 92   ..!...#...!Y..#.
23020   1a a0 23 90 0e 20 21 8c  1a a0 23 92 04 60 23 90   ..#.. !...#..`#.
23030   04 20 19 90 0e 16 80 5c  00 d0 00 84 00 00 00 00   . .....\........
23040   10 16 68 5c 11 16 70 5c  12 16 78 5c 1a 60 24 90   ..h\..p\..x\.`$.
23050   0e 20 21 8c 1a 60 24 92  16 60 24 90 0e 09 21 59   . !..`$..`$...!Y
23060   16 60 24 92 04 60 84 92  16 60 2c 90 05 16 38 5c   .`$..`...`,...8\
23070   08 06 20 8c 0c 60 21 8a  06 60 31 8c 3a 20 2c 90   .. ..`!..`1.: ,.
23080   06 00 20 8c 06 16 80 5c  05 16 88 5c 04 16 90 5c   .. ....\...\...\
23090   18 e5 fd 0b 0c a0 23 88  30 20 11 30 6e 60 23 90   ......#.0 .0n`#.
230a0   01 20 21 8c 6e 60 23 92  00 30 28 8c 80 23 06 10   . !.n`#..0(..#..
230b0   06 00 20 8c 07 16 80 5c  05 16 88 5c 04 16 90 5c   .. ....\...\...\
230c0   e8 e4 fd 0b 24 00 00 08  6a 60 23 90 01 20 21 8c   ....$...j`#.. !.
230d0   6a 60 23 92 06 00 20 8c  07 16 80 5c 0f 16 88 5c   j`#... ....\...\
230e0   04 16 90 5c c4 e4 fd 0b  1a a0 2b 90 66 60 23 90   ...\......+.f`#.
230f0   04 40 21 59 66 60 23 92  04 60 23 90 04 20 19 90   .@!Yf`#..`#.. ..
23100   0e 16 80 5c 00 d0 00 84  00 00 00 00 00 00 00 00   ...\............
23110   10 16 60 5c 1a 20 24 90  1c 20 71 36 04 20 2b 90   ..`\. $.. q6. +.
23120   5e 60 21 90 01 20 21 8c  5e 60 21 92 0c 16 80 5c   ^`!.. !.^`!....\
23130   40 1a 00 08 16 20 33 90  06 16 68 5c 00 30 28 8c   @.... 3...h\.0(.
23140   88 23 06 10 06 00 20 8c  06 16 80 5c 05 16 88 5c   .#.... ....\...\
23150   04 16 90 5c 2c d2 00 0b  20 20 04 3d 01 00 20 8c   ...\,....  .=.. .
23160   0c 20 23 8a 04 20 2b 90  56 60 21 90 01 20 21 8c   . #.. +.V`!.. !.
23170   56 60 21 92 14 00 00 08  04 20 2b 90 52 60 21 90   V`!...... +.R`!.
23180   01 20 21 8c 52 60 21 92  16 20 23 90 0e 20 21 8c   . !.R`!.. #.. !.
23190   16 20 23 92 0c 60 83 88  e8 5f ff 09 00 30 20 8c   . #..`..._...0 .
231a0   ff ff 00 00 90 00 21 58  1a 20 23 92 16 20 23 90   ......!X. #.. #.
231b0   04 16 70 5c 01 20 21 80  1c 20 01 30 04 20 2b 90   ..p\. !.. .0. +.
231c0   62 60 21 90 01 20 21 8c  62 60 21 92 0c 16 80 5c   b`!.. !.b`!....\
231d0   a0 19 00 08 16 20 23 90  03 20 21 8c 16 20 23 92   ..... #.. !.. #.
```

```
231e0   1a 20 23 90 03 09 21 59  1a 20 23 92 02 a0 2b 80   . #...!Y. #...+.
231f0   ef 00 20 8c 85 00 39 58  83 e8 01 5a ec 00 00 15   .. ...9X...Z....
23200   00 90 2b 80 aa 00 20 8c  1c 00 29 3a 04 20 2b 90   ..+... ...):. +.
23210   62 60 21 90 01 20 21 8c  62 60 21 92 0c 16 80 5c   b`!.. !.b`!....\
23220   50 19 00 08 16 20 23 90  04 16 78 5c 00 10 21 80   P.... #...x\..!.
23230   14 20 01 35 01 e0 23 80  0c 20 01 35 02 e0 23 80   . .5..#.. .5..#.
23240   1c 20 01 32 04 20 2b 90  62 60 21 90 01 20 21 8c   . .2. +.b`!.. !.
23250   62 60 21 92 0c 16 80 5c  18 19 00 08 16 20 23 90   b`!....\..... #.
23260   05 20 21 8c 16 20 23 92  1a 20 23 90 05 09 21 59   . !.. #.. #...!Y
23270   1a 20 23 92 03 e0 1b 8a  0c e0 40 3d 0c 16 80 5c   . #.......@=...\
23280   80 06 00 08 08 06 20 8c  1c e0 20 3a 00 00 28 8c   ...... ... =..(.
23290   05 16 20 5c 0c 16 80 5c  05 16 88 5c 04 16 90 5c   .. \...\...\...\
232a0   c0 57 00 08 04 20 2b 90  62 60 21 90 01 20 21 8c   .W... +.b`!.. !.
232b0   62 60 21 92 0c 20 23 8a  18 20 01 30 04 20 2b 90   b`!.. #.. .0. +.
232c0   56 60 21 90 01 09 21 59  56 60 21 92 14 00 00 08   V`!...!YV`!.....
232d0   04 20 2b 90 56 60 21 90  01 09 21 59 56 60 21 92   . +.V`!...!YV`!.
232e0   0c 16 80 5c 8c 18 00 08  af 00 20 8c 84 e0 01 5a   ...\....... ....Z
232f0   c8 00 00 15 16 20 2b 90  81 00 20 8c 00 50 21 82   ..... +... ..P!.
23300   01 00 20 8c 01 60 21 82  00 00 20 8c 02 60 21 82   .. ..`!... ..`!.
23310   06 00 20 8c 1a 20 23 92  00 90 23 80 80 09 29 58   .. .. #...#...)X
23320   01 a0 23 80 00 90 23 82  01 a0 2b 82 06 60 2b 8c   ..#...#...+..`+.
23330   06 00 20 8c 0d 16 80 5c  05 16 88 5c 04 16 90 5c   .. ....\...\...\
23340   68 e2 fd 0b 06 60 33 8c  04 20 23 90 3a 20 29 90   h....`3.. #.: ).
23350   06 00 20 8c 06 16 80 5c  05 16 88 5c 04 16 90 5c   .. ....\...\...\
23360   48 e2 fd 0b 1a 20 83 90  18 5e ff 09 0c 60 83 8a   H.... ...^...`..
23370   1a 20 23 90 0e 20 21 8c  1a 20 23 92 16 20 6b 92   . #.. !.. #.. k.
23380   1a 20 33 90 04 20 2b 90  66 60 21 90 04 80 21 59   . 3.. +.f`!...!Y
23390   66 60 21 92 04 20 2b 90  6a 60 21 90 01 20 21 8c   f`!.. +.j`!.. !.
233a0   6a 60 21 92 04 20 23 90  04 20 21 90 04 20 e9 90   j`!.. #.. !.. ..
233b0   0c 16 80 5c 00 50 07 84  e3 00 20 8c 14 c0 21 3d   ...\.P.... ...!=
233c0   1a 20 23 90 03 20 21 8c  1a 20 23 92 4c ff ff 08   . #.. !.. #.L...
233d0   04 20 2b 90 62 60 21 90  01 20 21 8c 62 60 21 92   . +.b`!.. !.b`!.
233e0   04 20 2b 90 5a 60 21 90  01 20 21 8c 5a 60 21 92   . +.Z`!.. !.Z`!.
233f0   0c 16 80 5c 7c 17 00 08  00 00 00 00 00 00 00 00   ...\|...........
23400   90 08 00 09 2c 00 00 09  78 0f 00 09 34 51 00 09   ....,...x...4Q..
23410   50 48 00 09 fc 14 00 09  00 30 80 90 b0 23 06 10   PH.......0...#..
23420   c0 16 00 09 9c ad fe 09  48 29 00 09 f4 5f 00 08   ........H)..._..
23430   00 00 20 8c 00 30 20 92  04 09 06 10 00 30 20 92   .. ..0 ......0 .
23440   20 09 06 10 00 00 00 0a  00 00 00 00 00 00 00 00    ...............
23450   10 16 30 5c 00 30 20 90  04 09 06 10 04 16 38 5c   ..0\.0 ......8\
```

```
Mar 27 18:20 1996  image.txt Page 220

23460   28 20 01 32 12 e0 81 90  06 16 88 5c 88 cf 00 0b   ( .2.......\....
23470   0c 20 04 3d 07 16 80 5c  00 00 00 0a 00 d0 21 90   . .=...\......!.
23480   04 16 38 5c e0 3f 01 35  00 00 80 8c 00 00 00 0a   ..8\..5.........
23490   10 16 68 5c 04 20 24 90  20 20 29 90 00 30 20 90   ..h\. $.  )..0 .
234a0   00 09 06 10 10 00 29 36  00 30 80 8c ff ff ff ff   ......)6.0......
234b0   00 00 00 0a 00 30 20 90  04 09 06 10 04 16 70 5c   .....0 .......p\
234c0   20 20 01 32 10 40 73 35  00 30 80 8c ff ff ff ff     .2.@s5.0......
234d0   00 00 00 0a 00 90 23 90  04 16 70 5c e8 3f 01 35   .......#...p\.?.5
234e0   12 60 83 90 6c ff ff 09  10 20 04 32 00 30 80 8c   .`..l.... .2.0..
234f0   ff ff ff ff 00 00 00 0a  04 60 23 90 32 20 21 90   .........`#.2 !.
23500   28 20 01 32 01 00 30 8c  00 00 28 8c 04 60 23 90   ( .2..0...(..`#.
23510   32 20 79 90 0d 16 80 5c  06 16 88 5c 05 16 90 5c   2 y....\...\...\
23520   00 d0 03 88 48 00 00 08  04 60 23 90 00 10 21 90   ....H....`#...!.
23530   14 20 01 32 04 60 23 90  00 10 19 90 0d 16 80 5c   . .2.`#........\
23540   00 d0 00 86 10 60 23 88  24 20 09 30 00 00 20 8c   .....`#.$ .0.. .
23550   0d 16 80 5c 04 16 88 5c  78 52 00 09 10 20 04 3e   ...\...\xR... .>
23560   00 30 80 8c ff ff ff ff  00 00 00 0a 42 60 3b 90   .0..........B`;.
23570   04 60 23 90 28 20 31 90  04 60 23 90 20 20 29 90   .`#.( 1..`#.  ).
23580   04 60 23 90 24 20 21 90  05 00 21 59 04 81 21 59   .`#.$ !...!Y..!Y
23590   28 00 39 36 04 60 23 90  28 20 31 90 04 60 23 90   (.96.`#.( 1..`#.
235a0   20 20 29 90 04 60 23 90  24 20 21 90 05 00 21 59     )..`#.$ !...!Y
235b0   04 81 21 59 42 60 23 92  00 00 20 8c 00 50 23 92   ..!YB`#... ..P#.
235c0   00 30 20 90 04 09 06 10  10 20 01 35 00 30 68 92   .0 ...... .5.0h.
235d0   04 09 06 10 2c 00 00 08  00 30 20 90 04 09 06 10   ....,....0 .....
235e0   04 16 70 5c 00 10 21 90  14 20 01 32 00 90 23 90   ..p\..!.. .2..#.
235f0   04 16 70 5c 00 10 21 90  f4 3f 01 35 00 90 6b 92   ..p\..!..?.5..k.
23600   00 30 20 90 20 09 06 10  01 20 21 8c 00 30 20 92   .0 . .... !..0 .
23610   20 09 06 10 10 60 23 88  0c 20 01 37 0d 16 80 5c    ....`#.. .7...\
23620   10 00 00 09 00 00 80 8c  00 00 00 0a 00 00 00 00   ................
23630   10 16 38 5c 04 20 24 90  32 20 21 90 24 20 01 32   ..8\. $.2 !.$ .2
23640   03 00 30 8c 00 00 28 8c  04 e0 21 90 32 20 19 90   ..0...(...!.2 ..
23650   07 16 80 5c 06 16 88 5c  05 16 90 5c 00 d0 00 84   ...\...\...\....
23660   10 e0 21 88 00 0e 21 58  10 e0 21 8a 44 08 fe 09   ..!...!X..!.D...
23670   90 90 22 74 4a e0 21 92  07 16 80 5c 04 00 00 08   .."tJ.!....\....
23680   20 60 08 8c 40 e0 c7 b2  10 16 68 5c 16 20 24 90    `..@.....h\. $.
23690   0c 20 01 35 40 e0 c7 b0  00 00 00 0a 16 60 1b 90   . .5@........`..
236a0   1a 60 7b 90 16 60 73 90  00 30 e8 8c 90 23 06 10   .`{..`s..0...#..
236b0   00 00 60 8c 00 30 38 80  98 23 06 10 00 30 30 80   ..`..08..#...00.
236c0   99 23 06 10 01 00 28 8c  50 e0 27 8c 03 16 80 5c   .#....(.P.'....\
236d0   0f 16 88 5c 0e 16 90 5c  0d 16 98 5c 1d 16 a0 5c   ...\...\...\...\
```

```
Mar 27 18:20 1998  image.txt Page 221

236e0   0c 16 a8 5c 07 16 b0 5c  06 16 b8 5c 05 16 c0 5c   ...\...\...\...\
236f0   04 16 c8 5c 8c 0e 00 09  40 e0 c7 b0 00 00 00 0a   ...\....@.......
23700   10 16 38 5c 16 20 24 90  06 20 01 35 00 00 00 0a   ..8\. $.. .5....
23710   16 e0 31 90 fc 0d 00 09  10 16 18 5c 06 20 04 35   ...........\. .5
23720   00 00 00 0a 04 e0 20 90  08 c0 21 32 00 00 00 0a   ...... ...!2....
23730   23 e0 20 80 0d 20 01 37  00 00 00 0a 03 16 80 5c   #. .. .7.......\
23740   00 10 00 08 00 00 00 00  00 00 00 00 00 00 00 00   ................
23750   10 16 38 5c 04 20 24 90  32 20 21 90 24 20 01 32   ..8\. $.2 !.$ .2
23760   04 00 30 8c 00 00 28 8c  04 e0 21 90 32 20 19 90   ..0...(...!.2 ..
23770   07 16 80 5c 06 16 88 5c  05 16 90 5c 00 00 00 84   ...\...\...\....
23780   10 e0 21 88 80 09 21 58  10 e0 21 8a 24 07 fe 09   ..!...!X..!.$...
23790   90 90 22 74 4a e0 21 92  07 16 80 5c 64 ff ff 08   .."tJ.!....\d...
237a0   10 16 70 5c 00 30 20 90  04 09 06 10 14 00 24 35   ..p\.0 .......$5
237b0   00 90 23 90 00 30 20 92  04 09 06 10 54 00 00 08   ..#..0 .....T...
237c0   00 30 20 90 04 09 06 10  3c 20 01 32 00 30 20 90   .0 .....< .2.0 .
237d0   04 09 06 10 04 16 78 5c  00 10 21 90 28 20 01 32   ......x\..!.( .2
237e0   00 d0 23 90 10 80 23 35  00 90 23 90 00 d0 23 92   ..#...#5..#...#.
237f0   20 00 00 08 00 d0 23 90  04 16 78 5c 00 10 21 90    .....#...x\..!.
23800   e0 3f 01 35 00 30 80 8c  ff ff ff ff 00 00 00 0a   .?.5.0..........
23810   10 a0 23 88 0c 20 01 37  0e 16 80 5c 34 ff ff 09   ..#.. .7...\4...
23820   0e 16 80 5c cc 10 00 09  04 a0 23 90 32 20 21 90   ...\......#.2 !.
23830   28 20 01 32 02 00 30 8c  00 00 28 8c 04 a0 23 90   ( .2..0...(...#.
23840   32 20 39 90 0e 16 80 5c  06 16 88 5c 05 16 90 5c   2 9....\...\...\
23850   00 d0 01 86 30 00 00 08  04 a0 23 90 14 20 21 90   ....0.....#.. !.
23860   14 20 01 32 04 a0 23 90  14 20 19 90 0e 16 80 5c   . .2..#.. .....\
23870   00 d0 00 86 10 a0 23 88  0c 20 09 30 0e 16 80 5c   ......#.. .0...\
23880   10 50 00 09 00 30 20 90  20 09 06 10 01 09 21 59   .P...0 . .....!Y
23890   00 30 20 92 20 09 06 10  00 00 80 8c 00 00 00 0a   .0 . ...........
238a0   00 30 20 90 04 09 06 10  08 20 01 35 00 00 00 0a   .0 ...... .5....
238b0   00 30 80 90 04 09 06 10  e8 fe ff 09 00 30 20 90   .0...........0 .
238c0   04 09 06 10 ec 3f 01 35  00 00 00 0a 00 00 00 00   .....?.5........
238d0   00 1d 00 09 cc ff ff 09  d8 03 00 09 14 0b 00 09   ................
238e0   b0 4e 00 09 ac 12 00 08  00 00 00 00 00 00 00 00   .N..............
238f0   69 6e 74 65 72 66 61 63  65 00 00 00 00 00 00 00   interface.......
23900   10 16 78 5c 00 30 20 90  24 09 06 10 01 20 21 8c   ..x\.0 .$.... !.
23910   00 30 20 92 24 09 06 10  1a 20 24 90 20 20 a1 36   .0 .$.... $.  .6
23920   00 30 20 90 28 09 06 10  01 20 21 8c 00 30 20 92   .0 .(.... !..0 .
23930   28 09 06 10 0f 16 80 5c  38 12 00 08 16 e0 23 90   (......\8.....#.
23940   04 16 18 5c 02 20 81 88  38 58 ff 09 00 30 20 8c   ...\. ..8X...0 .
23950   ff ff 00 00 90 00 29 58  05 16 38 5c 1a e0 23 90   ......)X..8\..#.
```

```
Mar 27 18:20 1996  image.txt Page 222

23960   20 00 29 36 00 30 20 90  28 09 06 10 01 20 21 8c   .)6.0 .(.....  !.
23970   00 30 20 92 28 09 06 10  0f 16 80 5c f4 11 00 08   .0 .(......\....
23980   1a e0 3b 92 00 d0 20 80  84 0d 21 59 84 d0 23 58   ..;... ....!Y..#X
23990   20 20 21 3a 00 30 20 90  28 09 06 10 01 20 21 8c     !:.0 .(.....  !.
239a0   00 30 20 92 28 09 06 10  0f 16 80 5c c4 11 00 08   .0 .(......\....
239b0   00 d0 20 80 84 d0 23 58  01 0f 21 59 03 16 80 5c   ..  ...#X..!Y...\
239c0   04 16 88 5c 4c 58 ff 09  00 30 20 8c ff ff 00 00   ...\LX...0 .....
239d0   90 00 21 58 10 0e 21 59  90 0d 21 59 01 20 29 8c   ..!X..!Y..!Y. ).
239e0   00 30 20 8c fe ff 00 00  85 00 21 58 20 20 01 3a   .0 .......!X  .:
239f0   00 30 20 90 28 09 06 10  01 20 21 8c 00 30 20 92   .0 .(.....  !..0 .
23a00   28 09 06 10 0f 16 80 5c  68 11 00 08 10 e0 28 90   (......\h.......(.
23a10   00 30 20 8c ff ff ff ff  6c 00 29 32 10 e0 28 90   .0 .....l.)2..(.
23a20   04 e0 23 90 1e 20 21 90  5c 00 29 32 10 e0 28 90   ..#.. !.\.)2..(.
23a30   04 e0 23 90 1a 20 21 90  85 00 31 58 04 e0 23 90   ..#.. !...1X..#.
23a40   16 20 29 90 04 e0 23 90  1a 20 21 90 85 00 21 58   . )...#.. !...!X
23a50   40 00 31 35 10 e0 28 90  04 e0 23 90 1a 20 21 90   @.15..(...#.. !.
23a60   85 03 29 58 00 30 20 8c  ff ff ff ff 18 00 29 32   ..)X.0 .......)2
23a70   10 e0 28 90 04 e0 23 90  1a 20 21 90 05 02 21 58   ..(...#.. !...!X
23a80   10 20 01 35 0c e0 23 88  81 09 21 58 0c e0 23 8a   . .5..#...!X..#.
23a90   04 e0 23 90 16 20 21 90  14 20 01 32 10 e0 28 90   ..#.. !.. .2..(.
23aa0   04 e0 23 90 16 20 21 90  0c 00 29 32 0c e0 23 88   ..#.. !...)2..#.
23ab0   0c 20 09 30 0f 16 80 5c  18 00 00 08 0f 16 80 5c   . .0...\.......\
23ac0   90 62 00 08 00 00 00 00  00 00 00 00 00 00 00 00   .b..............
23ad0   10 16 78 5c 16 20 24 90  04 16 38 5c 06 20 81 88   ..x\. $...8\. ..
23ae0   a0 56 ff 09 00 30 20 8c  ff ff 00 00 90 00 29 58   .V...0 .......)X
23af0   00 30 20 8c ff 3f 00 00  85 00 21 58 1c 20 01 3a   .0 ..?....!X. .:
23b00   0f 16 80 5c 2c 02 00 09  10 16 78 5c 08 20 04 35   ...\,.....x\. .5
23b10   00 00 00 0a 16 e0 3b 90  00 d0 21 80 84 d0 33 58   ......;...!...3X
23b20   02 e0 81 88 5c 56 ff 09  00 30 20 8c ff ff 00 00   ....\V...0 .....
23b30   90 00 29 58 16 e0 23 90  06 1d 21 8c 16 e0 23 92   ..)X..#...!...#.
23b40   02 8e 21 59 04 41 21 59  1a e0 23 92 09 e0 19 80   ..!Y.A!Y..#.....
23b50   24 e0 30 3d 0c e0 29 90  10 e0 21 90 0f 16 80 5c   $.0=..)...!....\
23b60   05 16 88 5c 04 16 90 5c  07 16 98 5c 64 22 00 09   ...\...\...\d"..
23b70   8c 00 00 08 24 e0 88 3d  0c e0 29 90 10 e0 21 90   ....$..=..)...!.
23b80   0f 16 80 5c 05 16 88 5c  04 16 90 5c 07 16 98 5c   ...\...\...\...\
23b90   c0 45 00 09 68 00 00 08  24 e0 08 3d 0c e0 29 90   .E..h...$..=..).
23ba0   10 e0 21 90 0f 16 80 5c  05 16 88 5c 04 16 90 5c   ..!....\...\...\
23bb0   07 16 98 5c 8c 5a 00 09  44 00 00 08 00 30 20 90   ...\.Z..D....0 .
23bc0   2c 09 06 10 01 20 21 8c  00 30 20 92 2c 09 06 10   ,.....  !..0 .,....
23bd0   0c e0 23 88 84 d0 20 58  1c 20 01 3d 0c e0 29 90   ..#...  X. .=..).
```

```
Mar 27 16:20 1996  image.txt Page 223

23be0   02 00 20 8c 05 16 80 5c  07 16 88 5c 04 16 90 5c   .. ....\...\...\
23bf0   50 5e 00 09 0f 16 80 5c  78 0f 00 09 00 30 20 90   P^.....\x....0 .
23c00   30 09 06 10 01 20 21 8c  00 30 20 92 30 09 06 10   0.... !..0 .0...
23c10   00 00 00 0a 00 00 00 00  00 00 00 00 00 00 00 00   ................
23c20   10 16 78 5c 11 16 38 5c  16 20 34 90 00 90 21 8c   ..x\..8\. 4...!.
23c30   84 d0 2b 58 16 20 24 90  05 1a 21 8c 16 20 24 92   ..+X. $...!.. $.
23c40   02 4e 29 59 1a 20 24 90  05 01 21 59 1a 20 24 92   .N)Y. $...!Y. $.
23c50   09 a0 19 80 10 e0 30 3d  0f 16 80 5c 07 16 88 5c   ......0=...\...\
23c60   d0 35 00 08 10 e0 88 3d  0f 16 80 5c 07 16 88 5c   .5......=...\...\
23c70   d0 46 00 08 10 e0 08 3d  0f 16 80 5c 07 16 88 5c   .F......=...\...\
23c80   a0 5f 00 08 0f 16 80 5c  e8 0e 00 08 00 00 00 00   ._.....\........
23c90   00 00 20 8c 00 30 20 92  c8 23 06 10 00 30 20 92   .. ..0 ..#...0 .
23ca0   cc 23 06 10 00 00 00 0a  00 00 00 00 00 00 00 00   .#..............
23cb0   00 30 20 90 c8 23 06 10  04 16 18 5c 24 20 01 32   .0 ..#.....\$ .2
23cc0   00 d0 28 90 0e e0 20 90  08 20 81 8c 04 42 00 09   ..(... .. ...B..
23cd0   03 16 80 5c 9c 0e 00 09  05 16 18 5c e4 7f 01 35   ...\........\...5
23ce0   00 00 20 8c 00 30 20 92  cc 23 06 10 00 30 20 92   .. ..0 ..#...0 .
23cf0   c8 23 06 10 00 00 00 0a  00 00 00 00 00 00 00 00   .#..............
23d00   11 16 20 5c 11 16 80 5c  e8 05 00 09 04 16 80 5c   .. \...\.......\
23d10   60 0e 00 09 00 30 20 90  34 09 06 10 01 20 21 8c   `....0 .4.... !.
23d20   00 30 20 92 34 09 06 10  00 00 00 0a 00 00 00 00   .0 .4...........
23d30   20 60 08 8c 10 16 48 5c  40 e0 4f 92 00 30 20 90    `....H\@.O..0 .
23d40   38 09 06 10 01 20 21 8c  00 30 20 92 38 09 06 10   8.... !..0 .8...
23d50   16 20 74 90 00 30 20 90  c8 23 06 10 04 16 60 5c   . t..0 ..#....`\
23d60   3c 20 01 32 16 20 23 90  04 16 68 5c 04 a0 2b 88   < .2. #...h\..+.
23d70   04 20 21 88 1c 00 29 3d  0c a0 2b 90 0c 60 23 90   . !...)=..+..`#.
23d80   10 00 29 35 10 a0 2b 90  10 60 23 90 10 00 29 32   ..)5..+..`#...)2
23d90   00 10 23 90 04 16 60 5c  cc 3f 01 35 00 28 03 5a   ..#...`\.?.5.(.Z
23da0   a0 01 00 15 00 30 20 90  cc 23 06 10 14 20 41 3e   .....0 ..#... A>
23db0   00 06 80 8c 4c 0d 00 09  10 16 60 5c 2c 20 04 35   ....L.....`\, .5
23dc0   40 e0 4f 90 09 16 80 5c  a8 0d 00 09 00 30 20 90   @.O....\.....0 .
23dd0   34 09 06 10 01 20 21 8c  00 30 20 92 34 09 06 10   4.... !..0 .4...
23de0   00 00 a0 8c 00 00 00 0a  0e 20 7b 90 00 30 20 90   ......... {..0 .
23df0   00 09 06 10 14 20 c1 33  00 30 48 90 00 09 06 10   ..... .3.0H.....
23e00   44 e0 4f 92 0c 00 00 08  18 00 48 8c 44 e0 4f 92   D.O.......H.D.O.
23e10   44 e0 4f 90 03 60 2a 8c  00 30 20 8c fc ff ff ff   D.O..`*..0 .....
23e20   85 00 29 58 0e 20 23 90  04 40 21 59 16 20 23 92   ..)X. #..@!Y. #.
23e30   16 20 6b 90 00 00 20 8c  1a 20 23 92 06 a0 83 88   . k... .. #.....
23e40   40 53 ff 09 00 30 20 8c  ff ff 00 00 90 00 29 58   @S...0 .......)X
23e50   00 30 20 8c ff 1f 00 00  85 00 21 58 3c 20 01 3d   .0 .......!X< .=
```

Mar 27 16:20 1996 image.txt Page 224

```
23e60   00 90 23 80 84 d0 23 58  02 0e 21 59 0a 16 80 5c   ..#...#X..!Y...\
23e70   0e 16 88 5c 04 16 90 5c  30 d7 1a 0b 00 90 23 80   ...\...\0.....#.
23e80   84 d0 23 58 04 5a 23 8c  00 a0 23 92 00 0a 20 8c   ..#X.Z#...#... .
23e90   06 60 23 8a 20 00 00 08  14 00 20 8c 0a 16 80 5c   .'#. ..... ....\
23ea0   0e 16 88 5c 04 16 90 5c  00 d7 1a 0b 3c 60 23 8c   ...\...\....<'#.
23eb0   00 a0 23 92 00 a0 23 90  04 e0 23 92 00 00 28 8c   ..#...#...#...(.
23ec0   04 e0 23 90 00 10 29 92  12 20 33 90 00 d0 2b 90   ..#...).. 3...+.
23ed0   0e 20 23 90 04 41 21 59  04 81 29 59 04 e0 23 90   . #..A!Y..)Y..#.
23ee0   04 20 29 8a 08 e0 83 8c  88 3d 00 09 00 30 20 8c   . )......=...0 .
23ef0   00 3d 02 00 10 e0 23 92  14 e0 63 92 08 e0 2b 8c   .=....#...c...+.
23f00   00 30 20 8c 88 13 00 00  05 16 80 5c 04 16 88 5c   .0 .........\...\
23f10   c0 3e 00 09 00 30 20 90  c8 23 06 10 00 10 23 92   .>...0 ..#....#.
23f20   00 30 60 92 c8 23 06 10  00 30 20 90 cc 23 06 10   .0`..#...0 ..#..
23f30   01 20 21 8c 00 30 20 92  cc 23 06 10 90 00 00 08   . !..0 ..#......
23f40   0e 20 23 90 04 16 78 5c  16 20 6b 90 08 20 29 8c   . #...x\. k.. ).
23f50   00 30 20 8c 88 13 00 00  05 16 80 5c 04 16 88 5c   .0 .........\...\
23f60   70 3e 00 09 06 a0 83 88  18 52 ff 09 00 30 20 8c   p>.......R...0 .
23f70   ff ff 00 00 90 00 29 58  00 30 20 8c ff 1f 00 00   ......)X.0 .....
23f80   85 00 21 58 48 20 01 3d  00 d0 2b 90 00 90 23 80   ..!XH .=..+...#.
23f90   84 d0 23 58 02 0e 21 59  04 41 21 59 16 20 23 92   ..#X..!Y.A!Y. #.
23fa0   16 20 2b 90 05 16 68 5c  00 90 23 80 84 d0 23 58   . +...h\..#...#X
23fb0   02 0e 21 59 05 16 80 5c  0e 16 88 5c 04 16 90 5c   ..!Y...\...\...\
23fc0   e8 d5 fd 0b 00 00 20 8c  06 60 21 8a 06 a0 83 88   ...... ..'!.....
23fd0   b0 51 ff 09 00 30 20 8c  ff ff 00 00 90 00 21 58   .Q...0 .......!X
23fe0   50 20 69 37 06 a0 83 88  98 51 ff 09 00 30 20 8c   P i7.....Q...0 .
23ff0   ff ff 00 00 90 00 29 58  00 30 20 8c ff 1f 00 00   ......)X.0 .....
24000   85 00 29 58 02 a0 83 88  78 51 ff 09 00 30 20 8c   ..)X....xQ...0 .
24010   ff ff 00 00 90 00 21 58  85 1d 29 8c 00 90 23 80   ......!X..)...#.
24020   84 d0 23 58 02 0e 21 59  84 41 21 59 1a 20 23 92   ..#X..!Y.A!Y. #.
24030   40 e0 4f 90 26 60 22 90  26 20 23 92 00 d0 33 90   @.O.&`".& #...3.
24040   06 a0 83 88 3c 51 ff 09  00 30 20 8c ff ff 00 00   ....<Q...0 .....
24050   90 00 29 58 00 30 20 8c  ff 1f 00 00 85 00 21 58   ..)X.0 .......!X
24060   84 9d 29 8c 05 16 50 5c  02 a0 83 88 14 51 ff 09   ..)...P\.....Q..
24070   00 30 20 8c ff ff 00 00  90 00 21 58 05 00 29 59   .0 .......!X..)Y
24080   00 90 23 80 84 d0 23 58  02 0e 21 59 04 41 31 59   ..#...#X..!Y.A1Y
24090   06 16 58 5c 0e 20 2b 90  12 20 23 90 05 00 21 59   ..X\. +.. #...!Y
240a0   44 00 31 36 0c 16 80 5c  48 02 00 09 08 e0 83 8c   D.16...\H.......
240b0   20 3e 00 09 0c 16 80 5c  b8 0a 00 09 40 e0 4f 90    >.....\.....@.O.
240c0   09 16 80 5c ac 0a 00 09  00 30 20 90 34 09 06 10   ...\.....0 .4...
240d0   01 20 21 8c 00 30 20 92  34 09 06 10 00 00 80 8c   . !..0 .4.......
```

```
Mar 27 18:20 1996  image.txt Page 225

240e0   00 00 00 0a 04 e0 3b 8c  04 e0 23 90 28 20 01 32   ......;...#.( .2
240f0   00 d0 29 90 00 d0 21 90  04 20 21 88 05 00 21 59   ..)...!.. !...!Y
24100   14 00 51 34 00 d0 21 90  04 16 38 5c 00 10 21 90   ..Q4..!...8\..!.
24110   e0 3f 01 35 00 d0 21 90  18 20 01 35 40 e0 4f 90   .?.5..!.. .5@.O.
24120   09 16 80 5c 4c 0a 00 09  00 00 80 8c 00 00 00 0a   ...\L...........
24130   07 16 18 5c 00 d0 21 90  28 20 01 32 00 d0 28 90   ...\..!.( .2..(.
24140   00 d0 20 90 04 20 21 88  05 00 21 59 14 00 59 36   .. .. !...!Y..Y6
24150   00 d0 20 90 04 16 18 5c  00 10 21 90 e0 3f 01 35   .. ....\..!..?.5
24160   00 d0 20 90 14 20 01 32  00 d0 20 90 04 20 49 88   .. .. .2.. .. I.
24170   48 e0 4f 92 0c 00 00 08  00 00 48 8c 48 e0 4f 92   H.O.......H.H.O.
24180   00 30 20 8c ff ff 00 00  48 e0 4f 90 89 00 41 58   .0 .....H.O...AX
24190   4c e0 47 92 00 d0 21 90  18 00 51 36 00 d0 21 90   L.G...!...Q6..!.
241a0   04 d1 2a 39 00 d0 21 90  04 20 29 8a 00 d0 39 90   ..*9..!.. )...9.
241b0   00 d0 20 90 0c 20 01 32  00 d0 20 90 10 00 59 31   .. .. .2.. ...Y1
241c0   00 d0 20 90 00 d0 21 92  d0 00 00 08 00 d0 20 90   .. ...!....... .
241d0   4c e0 4f 90 04 40 22 59  14 00 59 35 00 d0 20 90   L.O..@"Y..Y5.. .
241e0   00 10 21 90 00 d0 21 92  60 00 00 08 00 d0 20 90   ..!...!.`..... .
241f0   4c e0 4f 90 04 40 22 59  0b 01 29 59 00 30 20 8c   L.O..@"Y..)Y.0 .
24200   ff ff 00 00 85 00 41 58  50 e0 47 92 06 a0 83 88   ......AXP.G.....
24210   70 4f ff 09 90 00 21 58  0c 20 69 30 50 e0 4f 90   pO....!X. i0P.O.
24220   10 60 32 36 00 00 20 8c  00 d0 21 92 1c 00 00 08   .`26.. ...!.....
24230   00 d0 20 90 00 10 21 90  00 d0 22 92 50 e0 4f 90   .. ...!...".P.O.
24240   04 e0 4a 8a 00 d0 59 92  00 90 23 80 84 d0 23 58   ..J...Y...#...#X
24250   04 9d 2b 8c 0a c1 22 59  0a 16 80 5c 05 16 88 5c   ..+..."Y...\...\
24260   04 16 90 5c 44 d3 fd 0b  40 e0 4f 90 09 16 80 5c   ...\D...@.O....\
24270   00 09 00 09 1a 20 23 90  6c 20 01 32 04 e0 23 90   ..... #.l .2..#.
24280   18 20 01 32 04 e0 2b 90  00 d0 23 90 04 41 29 59   . .2..+...#..A)Y
24290   1a 20 23 90 50 00 29 34  0c 16 80 5c 54 00 00 09   . #.P.)4...\T...
242a0   08 e0 83 8c 2c 3c 00 09  00 50 23 80 84 d0 2b 58   ....,<...P#...+X
242b0   1a 20 23 90 05 1d 21 8c  1a 20 23 92 1a 20 83 90   . #...!.. #.. ..
242c0   c0 4e ff 09 02 60 83 8a  00 30 20 90 3c 09 06 10   .N...`...0 .<...
242d0   01 20 21 8c 00 30 20 92  3c 09 06 10 0c 16 80 5c   . !..0 .<......\
242e0   00 00 00 0a 00 00 80 8c  00 00 00 0a 00 00 00 00   ................
242f0   10 16 38 5c 00 30 18 8c  c8 23 06 10 00 30 20 90   ..8\.0...#...0 .
24300   c8 23 06 10 08 20 01 35  00 00 00 0a 00 d0 20 90   .#... .5...... .
24310   24 c0 21 35 00 d0 21 90  00 d0 20 92 00 30 20 90   $.!5..!... ..0 .
24320   cc 23 06 10 81 09 21 59  00 30 20 92 cc 23 06 10   .#....!Y.0 ..#..
24330   00 00 00 0a 00 d0 20 90  04 16 18 5c 00 10 21 90   ...... ....\..!.
24340   cc 3f 01 35 00 00 00 0a  00 00 00 00 00 00 00 00   .?.5............
24350   00 08 38 8c 00 30 20 90  00 09 06 10 10 20 c1 33   ..8..0 ...... .3
```

Mar 27 18:20 1996 image.txt Page 226

```
24360   00 30 18 90 00 09 06 10  08 00 00 08 18 00 18 8c   .0..............
24370   03 c1 81 59 00 00 00 0a  00 00 00 00 00 00 00 00   ...Y............
24380   00 00 20 8c 00 30 20 92  10 09 06 10 00 30 20 92   .. ..0 ......0 .
24390   14 09 06 10 00 30 20 92  18 09 06 10 00 00 00 0a   .....0 .........
243a0   10 16 18 5c 00 10 24 90  14 20 01 32 00 d0 80 90   ...\..$.. .2....
243b0   f0 ff ff 09 00 d0 80 90  78 4f ff 09 04 e0 20 90   ........xO.... .
243c0   14 20 01 32 04 e0 80 90  d8 ff ff 09 04 e0 80 90   . .2............
243d0   60 4f ff 09 08 e0 20 90  08 20 01 35 00 00 00 0a   `O.... .. .5....
243e0   08 e0 80 90 0c 04 00 08  00 00 00 00 00 00 00 00   ................
243f0   00 30 80 8c 10 09 06 10  a8 ff ff 08 00 00 00 00   .0..............
24400   11 16 38 5c 08 20 24 8c  04 16 18 5c 08 20 01 35   ..8\. $....\. .5
24410   00 00 00 0a 00 d0 20 90  14 20 01 32 00 d0 20 90   ...... .. .2.. .
24420   21 20 29 80 21 e0 21 80  14 00 29 3c 00 d0 20 90   ! ).!.!...)<.. .
24430   00 d0 21 92 00 d0 38 92  00 00 00 0a 00 d0 20 90   ..!...8....... .
24440   04 16 18 5c d0 3f 01 35  00 00 00 0a 00 00 00 00   ...\.?.5........
24450   11 16 38 5c 08 20 1c 8c  08 20 24 90 08 20 01 35   ..8\. .. $.. .5
24460   00 00 00 0a 00 d0 20 90  10 c0 21 35 00 d0 21 90   ...... ...!5..!.
24470   00 d0 20 92 00 00 00 0a  00 d0 20 90 04 16 18 5c   .. ....... ....\
24480   00 10 21 90 e0 3f 01 35  00 00 00 0a 00 00 00 00   ..!..?.5........
24490   a0 4c ff 09 10 16 28 5c  00 00 30 8c 00 30 20 8c   .L....(\..0..0 .
244a0   10 09 06 10 04 16 38 5c  48 20 01 32 08 e0 21 90   ......8\H .2..!.
244b0   18 20 01 32 08 e0 21 90  04 20 21 90 10 20 21 88   . .2..!.. !.. !.
244c0   08 20 01 37 08 e0 31 90  00 30 20 8c 00 00 00 80   . .7..1..0 .....
244d0   85 00 21 58 0c 20 01 35  00 d0 19 90 08 00 00 08   ..!X. .5........
244e0   04 e0 19 90 03 16 38 5c  01 4e 29 59 c0 ff 00 35   ......8\.N)Y...5
244f0   18 a0 01 32 23 a0 21 80  10 20 39 30 00 90 21 90   ...2#.!.. 90..!.
24500   04 16 30 5c f0 3f 01 35  06 16 80 5c 00 00 00 0a   ..0\.?.5...\....
24510   20 4c ff 09 10 16 28 5c  00 00 30 8c 00 30 20 8c    L....(\..0..0 .
24520   10 09 06 10 04 16 38 5c  38 20 01 32 08 e0 21 90   ......8\8 .2..!.
24530   08 20 01 32 08 e0 31 90  00 30 20 8c 00 00 00 80   . .2..1..0 .....
24540   85 00 21 58 0c 20 01 35  00 d0 19 90 08 00 00 08   ..!X. .5........
24550   04 e0 19 90 03 16 38 5c  01 4e 29 59 d0 ff 00 35   ......8\.N)Y...5
24560   18 a0 01 32 23 a0 21 80  10 20 39 30 00 90 21 90   ...2#.!.. 90..!.
24570   04 16 30 5c f0 3f 01 35  06 16 80 5c 00 00 00 0a   ..0\.?.5...\....
24580   20 60 08 8c 10 16 60 5c  11 16 68 5c 12 16 48 5c    `....`\..h\..H\
24590   40 e0 4f 92 13 16 40 5c  44 e0 47 92 14 16 70 5c   @.O...@\D.G...p\
245a0   ff 00 20 8c 95 00 49 58  48 e0 4f 92 96 00 51 58   .. ...IXH.O...QX
245b0   97 00 79 58 98 00 41 58  4c e0 47 92 19 16 48 5c   ..yX..AXL.G...H\
245c0   50 e0 4f 92 0c 20 04 35  00 00 68 8c 08 00 00 08   P.O.. .5..h.....
245d0   8c 40 63 58 0c 16 80 5c  58 4b ff 09 10 16 30 5c   .@cX...\XK....0\
```

Mar 27 18:20 1996 image.txt Page 227

```
245e0   08 16 80 5c 4c 4b ff 09  10 16 28 5c 00 30 20 8c   ...\LK....(\.0 .
245f0   10 05 06 10 06 16 80 5c  05 16 88 5c 04 16 90 5c   .......\...\...\
24600   50 e0 41 90 09 16 98 5c  f8 00 00 09 10 16 18 5c   P.O....\.......\
24610   0c 20 04 35 00 00 80 8c  00 00 00 0a 00 00 58 8c   . .5.........X.
24620   08 e0 20 90 04 16 38 5c  44 20 01 32 18 e0 21 90   .. ...8\D .2..!.
24630   30 80 23 35 22 e0 21 80  28 c0 23 3d 21 e0 21 80   0.#5".!.(.#=!.!.
24640   2c 80 22 3a 03 16 80 5c  07 16 88 5c 04 fe ff 09   ,.":...\...\....
24650   00 00 20 8c 00 d0 21 92  01 00 58 8c 10 00 00 08   .. ...!...X.....
24660   00 d0 21 90 04 16 38 5c  c4 3f 01 35 48 e0 01 35   ..!...8\.?.5H..5
24670   24 00 80 8c 5c 4c ff 09  10 16 38 5c 18 20 04 35   $...\L....8\. .5
24680   01 00 20 8c 50 e0 4f 90  00 50 22 92 00 00 80 8c   .. .P.O..P".....
24690   00 00 00 0a 00 00 20 8c  00 d0 21 92 08 e0 61 92   ...... ...!...a.
246a0   0c e0 69 92 18 e0 71 92  22 e0 79 82 1c e0 21 92   ..i...q.".y...!.
246b0   01 00 58 8c 40 e0 4f 90  10 e0 49 92 44 e0 47 90   ..X.@.O...I.D.G.
246c0   04 e0 41 92 ec f7 fd 09  90 50 22 74 14 e0 21 92   ..A......"t..!.
246d0   4c e0 4f 90 23 e0 49 82  48 e0 47 90 20 e0 41 82   L.O.#.I.H.G. .A.
246e0   21 e0 51 82 10 e0 02 3a  03 16 80 5c 07 16 88 5c   !.Q....:...\...\
246f0   10 fd ff 09 07 16 80 5c  00 00 00 0a 00 00 00 00   .......\........
24700   10 16 60 5c 11 16 68 5c  12 16 70 5c 13 16 78 5c   ..`\..h\..p\..x\
24710   0c 60 04 35 0e 16 80 5c  00 00 00 0a 00 30 20 8c   .`.5...\.....0 .
24720   00 00 00 80 8d 00 21 58  14 20 01 35 02 00 20 8c   ......!X. .5.. .
24730   00 d0 23 92 00 00 80 8c  00 00 00 0a 00 30 20 8c   ..#..........0 .
24740   00 00 00 80 8c 00 21 58  0c 20 01 35 0e 16 18 5c   ......!X. .5...\
24750   08 00 00 08 04 a0 1b 8c  00 d0 20 90 4c 20 01 35   .......... .L .5
24760   0c 00 80 8c 6c 4b ff 09  00 d0 80 92 00 d0 20 90   ....lK........ .
24770   14 20 01 35 01 00 20 8c  00 d0 23 92 00 00 80 8c   . .5.. ...#.....
24780   00 00 00 0a 00 00 28 8c  00 d0 20 90 00 10 29 92   ......(... ...).
24790   00 d0 20 90 04 20 29 92  00 d0 20 90 08 20 29 92   .. .. )... .. ).
247a0   01 00 38 8c 08 00 00 08  00 00 38 8c 01 0e 33 59   ..8.......8...3Y
247b0   01 4e 2b 59 00 d0 20 90  06 16 80 5c 05 16 88 5c   .N+Y.. ....\...\
247c0   04 16 90 5c 0f 16 98 5c  38 ff ff 09 10 16 58 5c   ...\...\8.....X\
247d0   18 20 04 35 14 e0 09 3d  00 d0 80 90 54 4b ff 09   . .5...=....TK..
247e0   00 00 20 8c 00 d0 20 92  0b 16 80 5c 00 00 00 0a   .. ... ....\....
247f0   10 16 70 5c 08 20 84 90  38 49 ff 09 10 16 78 5c   ..p\. ..8I....x\
24800   0c a0 83 90 2c 49 ff 09  10 16 28 5c 00 30 20 8c   ....,I....(\.0 .
24810   10 09 06 10 04 16 30 5c  38 20 01 32 34 60 01 32   ......0\8 .24`.2
24820   00 30 20 8c 00 00 00 80  8f 00 21 58 0c 20 01 35   .0 .......!X. .5
24830   00 90 39 90 08 00 00 08  04 a0 39 90 07 16 30 5c   ..9.......9...0\
24840   01 ce 7b 59 01 4e 29 59  08 e0 01 32 d4 7f 01 35   ..{Y.N)Y...2...5
24850   08 a0 01 35 00 00 00 0a  06 16 80 5c 0e 16 88 5c   ...5.......\...\
```

Mar 27 18:20 1996 image.txt Page 228

```
24860   f0 fb ff 09 18 a0 23 90  20 20 01 32 18 a0 23 90   ......#.  .2..#.
24870   04 20 21 90 14 20 01 32  18 a0 23 90 04 20 19 90   . !.. .2..#.. ..
24880   0e 16 80 5c 00 40 00 08  0e 16 80 5c a4 4a ff 08   ...\.......\.J..
24890   10 16 28 5c 11 16 30 5c  00 10 24 90 10 20 01 32   ..(\..0\..$.. .2
248a0   00 50 81 90 06 16 88 5c  e8 ff ff 09 04 60 21 90   .P.....\.....`!.
248b0   10 20 01 32 04 60 81 90  06 16 88 5c d4 ff ff 09   . .2.`.....\....
248c0   08 60 21 90 08 20 01 35  00 00 00 0a 08 60 21 90   .`!.. .5.....`!.
248d0   04 20 21 90 08 80 21 32  00 00 00 0a 08 60 81 90   . !...!2.....`..
248e0   10 ff ff 08 00 00 00 00  00 00 00 00 00 00 00 00   ................
248f0   00 30 28 8c 10 09 06 10  10 15 20 5c 05 16 80 5c   .0(....... \...\
24900   04 16 88 5c 8c ff ff 08  69 63 6d 70 00 00 00 00   ...\....icmp....
24910   00 00 20 8c 00 30 20 92  24 09 06 10 00 30 20 92   .. ..0 .$....0 .
24920   28 09 06 10 00 30 20 92  40 09 06 10 00 30 20 92   (....0 .@....0 .
24930   44 09 06 10 00 30 20 92  2c 09 06 10 00 30 20 92   D....0 .,....0 .
24940   48 09 06 10 00 30 20 92  30 09 06 10 00 30 20 92   H....0 .0....0 .
24950   4c 09 06 10 00 30 20 92  50 09 06 10 00 30 20 92   L....0 .P....0 .
24960   54 09 06 10 00 30 20 92  38 09 06 10 00 30 20 92   T....0 .8....0 .
24970   3c 09 06 10 00 30 20 92  34 09 06 10 00 30 20 92   <....0 .4....0 .
24980   58 09 06 10 00 30 20 92  5c 09 06 10 00 30 20 92   X....0 .\....0 .
24990   60 09 06 10 00 30 20 92  64 09 06 10 00 30 20 92   `....0 .d....0 .
249a0   68 09 06 10 00 30 20 92  6c 09 06 10 00 30 20 92   h....0 .l....0 .
249b0   70 09 06 10 00 30 20 92  74 09 06 10 00 30 20 92   p....0 .t....0 .
249c0   78 09 06 10 00 30 20 92  7c 09 06 10 00 30 20 92   x....0 .|....0 .
249d0   80 09 06 10 00 30 20 92  84 09 06 10 00 30 20 92   .....0 ......0 .
249e0   88 09 06 10 00 30 20 92  8c 09 06 10 00 30 20 92   .....0 ......0 .
249f0   90 09 06 10 00 30 20 92  94 09 06 10 00 30 20 92   .....0 ......0 .
24a00   98 09 06 10 00 30 20 92  9c 09 06 10 00 30 20 92   .....0 ......0 .
24a10   a0 09 06 10 00 30 20 92  a4 09 06 10 00 30 20 92   .....0 ......0 .
24a20   a8 09 06 10 00 30 20 92  ac 09 06 10 00 30 20 92   .....0 ......0 .
24a30   b0 09 06 10 00 30 20 92  b4 09 06 10 00 30 20 92   .....0 ......0 .
24a40   b8 09 06 10 00 30 20 92  bc 09 06 10 00 30 20 92   .....0 ......0 .
24a50   c0 09 06 10 00 30 20 92  c4 09 06 10 00 30 20 92   .....0 ......0 .
24a60   c8 09 06 10 00 30 20 92  cc 09 06 10 00 30 20 92   .....0 ......0 .
24a70   d0 09 06 10 00 30 20 92  d4 09 06 10 00 30 20 92   .....0 ......0 .
24a80   d8 09 06 10 00 30 20 92  dc 09 06 10 00 30 20 92   .....0 ......0 .
24a90   e0 09 06 10 00 30 20 92  e4 09 06 10 00 30 20 92   .....0 ......0 .
24aa0   e8 09 06 10 00 30 20 92  ec 09 06 10 00 30 20 92   .....0 ......0 .
24ab0   f0 09 06 10 00 30 20 92  f4 09 06 10 00 30 20 92   .....0 ......0 .
24ac0   f8 09 06 10 00 30 20 92  fc 09 06 10 00 30 20 92   .....0 ......0 .
24ad0   00 0a 06 10 00 00 00 0a  00 00 00 00 00 00 00 00   ................
```

Mar 27 15:20 1996 image.txt Page 229

```
24ae0   10 16 18 5c 08 20 04 30  01 e0 18 8c 00 00 20 8c   ...\. .0...... .
24af0   00 30 20 92 10 0a 06 10  00 00 00 0a 00 00 00 00   .0 .............
24b00   10 16 38 5c 08 20 04 30  01 e0 39 8c 2a e0 81 8c   ..8\. .0..9.*...
24b10   60 47 ff 09 10 16 18 5c  0c 20 04 35 00 00 80 8c   `G.....\. .5....
24b20   00 00 00 0a 2a e0 20 8c  0e e0 20 92 12 e0 38 92   ....*. ... ...8.
24b30   00 00 20 8c 00 d0 20 92  04 e0 20 92 0c e0 20 8a   .. ... ... ... .
24b40   0e e0 20 90 16 e0 20 92  12 e0 20 90 1a e0 20 92   .. ... ... ... .
24b50   00 00 20 8c 22 e0 20 92  1e e0 20 92 03 16 80 5c   .. .". ... ....\
24b60   00 00 00 0a 00 00 00 00  00 00 00 00 00 00 00 00   ................
24b70   40 47 ff 08 00 00 00 00  00 00 00 00 00 00 00 00   @G..............
24b80   00 00 00 0a 00 00 00 00  00 00 00 00 00 00 00 00   ................
*
24ba0   10 16 20 5c 00 10 84 88  d8 45 ff 09 00 10 81 8a   .. \.....E......
24bb0   02 20 81 88 cc 45 ff 09  02 20 81 8a 04 20 81 90   . ...E... ... ..
24bc0   70 45 ff 09 04 20 81 92  08 20 81 90 64 45 ff 09   pE... ... ..dE..
24bd0   08 20 81 92 0c 20 81 88  a8 45 ff 09 0c 20 81 8a   . ... ...E... ..
24be0   0e 20 81 88 9c 45 ff 09  0e 20 81 8a 12 20 81 88   . ...E... ... ..
24bf0   90 45 ff 09 12 20 81 8a  00 00 00 0a 00 00 00 00   .E... ..........
24c00   10 16 68 5c 11 16 70 5c  38 60 04 32 0d 16 80 5c   ..h\..p\8`.2...\
24c10   00 11 00 09 2c 20 04 3a  00 50 23 80 24 20 19 37   ...., .:.P#.$ .7
24c20   0a 60 23 c0 3c 20 21 3a  0a 60 23 c0 34 20 41 3a   .`#.< !:.`#.4 A:
24c30   0a 60 23 c0 2c 20 11 3a  0a 60 23 c0 24 20 19 3a   .`#., .:.`#.$ .:
24c40   18 a0 03 32 22 a0 23 90  10 20 01 32 22 a0 eb 90   ...2".#.. .2"...
24c50   0e 16 80 5c 00 50 07 86  00 00 80 8c 00 00 00 0a   ...\.P..........
24c60   00 00 20 8c 00 90 23 92  2d 60 23 90 00 10 71 92   .. ...#.-`#...q.
24c70   2d 60 73 92 1a a0 2b 90  13 60 23 90 04 40 21 59   -`s...+..`#..@!Y
24c80   13 60 23 92 0c a0 23 88  1c 20 71 30 13 60 23 90   .`#...#.. q0.`#.
24c90   01 09 21 59 0f 60 23 92  91 60 23 88 85 09 21 58   ..!Y.`#..`#...!X
24ca0   91 60 23 8a 00 50 23 80  00 2f 01 5a 01 00 78 8c   .`#..P#../.Z..x.
24cb0   18 00 00 17 0c a0 23 88  0d 2f 01 5a 00 00 20 27   ......#../.Z.. '
24cc0   84 30 00 5a 00 00 78 25  01 60 33 80 05 ce 2b 59   .0.Z..x%.`3...+Y
24cd0   20 00 20 8c 04 40 31 65  01 60 33 82 65 60 2b 90    . ..@1e.`3.e`+.
24ce0   69 60 23 90 10 00 29 32  89 60 2b 90 0b 60 23 90   i`#...)2.`+..`#.
24cf0   24 00 29 35 01 60 3b 80  81 c9 39 58 01 60 3b 82   $.)5.`;...9X.`;.
24d00   06 60 23 90 01 20 21 8c  06 60 23 92 0d 16 80 5c   .`#.. !..`#....\
24d10   50 25 00 09 0d 16 80 5c  38 07 00 09 00 30 20 8c   P%.....\8....0 .
24d20   ff ff 00 00 90 00 29 58  85 30 00 5a 00 00 20 22   ......)X.0.Z.. "
24d30   00 50 1b 80 04 0e 21 59  10 08 19 65 00 50 1b 82   .P....!Y...e.P..
24d40   05 16 60 5c 00 00 00 0a  00 00 00 00 00 00 00 00   ..`\............
24d50   10 16 30 5c bc 0f 00 09  08 20 04 3d 00 00 00 0a   ..0\..... .=....
```

Mar 27 18:20 1996 image.txt Page 230

```
24d60   00 90 21 80 08 20 19 30  00 00 00 0a 06 a0 21 90   ..!.. .0......!.
24d70   01 20 21 8c 06 a0 21 92  0a a0 39 c0 08 e0 19 3a   . !...!...9....:
24d80   10 e0 21 3d 05 00 20 8c  0a a0 21 c2 44 00 00 08   ..!=.. ...!.D...
24d90   10 e0 41 3d 09 00 20 8c  0a a0 21 c2 34 00 00 08   ..A=.. ...!.4...
24da0   20 e0 09 3d 06 a0 21 90  01 09 21 59 06 a0 21 92    ..=..!...!Y..!.
24db0   01 00 20 8c 06 16 80 5c  04 16 88 5c 64 02 00 08   .. ....\...\d...
24dc0   06 a0 21 90 01 09 21 59  06 a0 21 92 00 00 00 0a   ..!...!Y..!.....
24dd0   91 a0 21 88 80 09 21 58  91 a0 21 8a 13 a0 21 90   ..!...!X..!...!.
24de0   01 20 21 8c 13 a0 21 92  01 a0 19 80 81 c9 18 58   . !...!........X
24df0   01 a0 19 82 06 16 80 5c  68 24 00 08 00 00 00 00   .......\h$......
24e00   10 60 08 8c 10 16 60 5c  11 16 68 5c 00 30 20 8c   .`....`\..h\.0 .
24e10   ff ff 00 00 92 00 71 58  93 00 79 58 14 16 30 5c   ......qX..yX..0\
24e20   15 16 58 5c 16 16 50 5c  14 00 28 8c 00 00 20 8c   ..X\..P\..(... .
24e30   05 16 80 5c 04 16 88 5c  48 4e 00 09 10 16 18 5c   ...\...\HN.....\
24e40   08 20 04 35 00 00 00 0a  16 e0 28 90 05 16 38 5c   . .5......(...8\
24e50   02 60 71 8a 00 50 79 8a  04 60 31 92 06 60 59 92   .`q..Py..`1..`Y.
24e60   00 00 20 8c 0e 60 21 8a  04 00 20 8c 0c 60 21 8a   .. ..`!... ..`!.
24e70   10 a0 02 3a 0c e0 21 88  84 09 21 58 0c e0 21 8a   ...:..!...!X..!.
24e80   00 30 28 8c ff 0f ff ff  0c e0 21 88 84 40 21 58   .0(.......!..@!X
24e90   0c e0 21 8a 00 30 28 8c  00 50 00 00 0c e0 21 88   ..!..0(..P....!.
24ea0   84 43 21 58 0c e0 21 8a  07 16 80 5c f4 fc ff 09   .C!X..!....\....
24eb0   44 e0 67 92 40 e0 6f 92  14 00 80 8c c4 42 ff 09   D.g.@.o......B..
24ec0   4a e0 87 8a 00 00 20 8c  48 e0 27 82 06 00 20 8c   J..... .H.'... .
24ed0   49 e0 27 82 40 e0 2f 8c  05 16 80 5c 04 16 88 5c   I.'.@./....\...\
24ee0   30 43 ff 09 00 30 20 8c  ff ff 00 00 90 00 21 58   0C...0 .......!X
24ef0   10 0e 21 59 90 0d 21 59  10 e0 21 8a 0a 00 20 8c   ..!Y..!Y..!... .
24f00   07 16 80 5c 04 16 88 5c  08 43 ff 09 00 30 20 8c   ...\...\.C...0 .
24f10   ff ff 00 00 90 00 21 58  10 0e 21 59 90 0d 29 59   ......!X..!Y..)Y
24f20   00 30 20 8c ff ff 00 00  04 42 21 58 10 e0 21 8a   .0 ......B!X..!.
24f30   14 00 20 8c 1a e0 20 92  06 00 20 8c 03 16 80 5c   .. ... ... ....\
24f40   04 16 88 5c 0c 16 90 5c  0d 16 98 5c b4 4f 00 09   ...\...\...\.O..
24f50   00 30 20 90 00 0a 06 10  01 20 21 8c 00 30 20 92   .0 ...... !..0 .
24f60   00 0a 06 10 00 00 00 0a  00 00 00 00 00 00 00 00   ................
24f70   10 16 60 5c 11 16 68 5c  12 16 70 5c 16 20 24 90   ..`\..h\..p\. $.
24f80   04 16 78 5c 0c 20 21 88  08 20 11 30 00 00 00 0a   ..x\. !.. .0....
24f90   0c e0 23 88 04 2f 01 5a  00 00 20 20 04 16 58 5c   ..#../.Z..  ..X\
24fa0   44 20 01 3a 1a 20 2b 90  0c e0 23 88 8c 0d 21 59   D .:. +...#...!Y
24fb0   84 d0 23 58 02 0f 21 59  04 41 19 59 0c e0 23 88   ..#X..!Y.A.Y..#.
24fc0   08 20 09 30 01 e0 18 8c  0c e0 23 88 08 20 01 30   . .0......#.. .0
24fd0   01 e0 18 8c 00 00 30 8c  04 e0 23 90 04 c0 38 59   ......0...#...8Y
```

Mar 27 18:20 1996 image.txt Page 231

| | | | | | | | | | | | | | | | | | |
|---|---|---|---|---|---|---|---|---|---|---|---|---|---|---|---|---|---|
| 24fe0 | 0c | 00 | 00 | 08 | 08 | e0 | 33 | 90 | 00 | 00 | 38 | 8c | 00 | a0 | 2b | 88 | ......3...8...+. |
| 24ff0 | 02 | e0 | 23 | 88 | 0d | 16 | 80 | 5c | 0e | 16 | 88 | 5c | 05 | 16 | 90 | 5c | ..#....\...\...\ |
| 25000 | 04 | 16 | 98 | 5c | 06 | 16 | a0 | 5c | 07 | 16 | a8 | 5c | 0b | 16 | b0 | 5c | ...\...\...\...\ |
| 25010 | f0 | fd | ff | 08 | 00 | 00 | 00 | 00 | 00 | 00 | 00 | 00 | 00 | 00 | 00 | 00 | ................ |
| 25020 | 10 | 16 | 70 | 5c | 11 | 16 | 78 | 5c | e8 | 0c | 00 | 09 | 08 | 20 | 04 | 3d | ..p\..x\...... .= |
| 25030 | 00 | 00 | 00 | 0a | 00 | 90 | 1b | 80 | 83 | c9 | 18 | 58 | 00 | 90 | 1b | 82 | ............X.... |
| 25040 | 29 | a0 | 23 | 90 | 20 | 20 | 01 | 32 | 29 | a0 | 2b | 90 | 00 | 50 | 21 | 90 | ).#.  .2).+..P!. |
| 25050 | 29 | a0 | 23 | 92 | 05 | 16 | 80 | 5c | d8 | 04 | 00 | 09 | 29 | a0 | 23 | 90 | ).#....\....).#. |
| 25060 | e8 | 3f | 01 | 35 | 29 | a0 | 23 | 8c | 2d | a0 | 23 | 92 | 79 | a0 | 23 | 90 | .?.5).#.-.#.y.#. |
| 25070 | 20 | 20 | 01 | 32 | 79 | a0 | 2b | 90 | 00 | 50 | 21 | 90 | 79 | a0 | 23 | 92 | .2y.+..P!.y.#. |
| 25080 | 05 | 16 | 80 | 5c | ec | 1a | ff | 09 | 79 | a0 | 23 | 90 | e8 | 3f | 01 | 35 | ...\....y.#..?.5 |
| 25090 | 00 | 00 | 20 | 8c | 7e | a0 | 23 | 82 | 45 | a0 | 83 | 8c | 34 | 2e | 00 | 09 | .. .~.#.E...4... |
| 250a0 | 35 | a0 | 83 | 8c | 2c | 2e | 00 | 09 | b9 | a0 | 23 | 90 | 14 | 20 | 01 | 32 | 5...,.....#.. .2 |
| 250b0 | b9 | a0 | 3b | 90 | 0e | 16 | 80 | 5c | 0f | 16 | 88 | 5c | 00 | d0 | 01 | 86 | ..;....\...\.... |
| 250c0 | 00 | 00 | 20 | 8c | b9 | a0 | 23 | 92 | 06 | a0 | 23 | 90 | 08 | 20 | 01 | 32 | .. ...#...#.. .2 |
| 250d0 | 00 | 00 | 00 | 0a | 0a | a0 | 33 | c0 | 08 | a0 | 11 | 3a | 1c | a0 | 19 | 3d | ......3....:...= |
| 250e0 | 00 | 30 | 20 | 90 | e8 | 09 | 06 | 10 | 01 | 20 | 21 | 8c | 00 | 30 | 20 | 92 | .0 ...... !..0 . |
| 250f0 | e8 | 09 | 06 | 10 | 20 | 00 | 00 | 08 | 08 | a0 | 21 | 3a | 18 | a0 | 41 | 3d | .... .....!:..A= |
| 25100 | 00 | 30 | 20 | 90 | ec | 09 | 06 | 10 | 01 | 20 | 21 | 8c | 00 | 30 | 20 | 92 | .0 ...... !..0 . |
| 25110 | ec | 09 | 06 | 10 | 0e | 16 | 80 | 5c | d8 | 0a | 00 | 08 | 00 | 00 | 00 | 00 | .......\........ |
| 25120 | 10 | 16 | 70 | 5c | 11 | 16 | 78 | 5c | 08 | 60 | 04 | 35 | 00 | 00 | 00 | 0a | ..p\..x\.`.5.... |
| 25130 | 00 | d0 | 23 | 80 | 08 | 20 | 19 | 30 | 00 | 00 | 00 | 0a | 74 | ed | fd | 09 | ..#.. .0....t... |
| 25140 | 90 | 90 | 2a | 74 | 59 | e0 | 23 | 90 | 04 | 41 | 29 | 59 | 05 | 16 | 30 | 5c | ..*tY.#..A)Y..0\ |
| 25150 | 00 | 30 | 20 | 8c | 00 | dd | 6d | 00 | 24 | 00 | 29 | 34 | 01 | e0 | 3b | 80 | .0 ...m.$.)4..;. |
| 25160 | 84 | c9 | 39 | 58 | 01 | e0 | 3b | 82 | 06 | e0 | 23 | 90 | 01 | 20 | 21 | 8c | ..9X..;...#.. !. |
| 25170 | 06 | e0 | 23 | 92 | 0f | 16 | 80 | 5c | e8 | 20 | 00 | 08 | 01 | e0 | 1b | 80 | ..#....\. ...... |
| 25180 | 04 | ce | 18 | 58 | 01 | e0 | 1b | 82 | 00 | 30 | 20 | 8c | 00 | dd | 6d | 00 | ...X.....0 ...m. |
| 25190 | 06 | 01 | 21 | 59 | 0e | 16 | 80 | 5c | 04 | 16 | 88 | 5c | 34 | 2c | 00 | 08 | ..!Y...\...\4,.. |
| 251a0 | 10 | 16 | 30 | 5c | 00 | 10 | 24 | 80 | 08 | 20 | 19 | 30 | 00 | 00 | 00 | 0a | ..0\..$.. .0.... |
| 251b0 | 35 | a0 | 81 | 8c | 1c | 2d | 00 | 09 | 00 | 90 | 39 | 80 | 07 | ce | 39 | 58 | 5....-....9...9X |
| 251c0 | 00 | 90 | 39 | 82 | 00 | 90 | 21 | 80 | 0c | 20 | 31 | 37 | 45 | a0 | 81 | 8c | ..9...!.. 17E... |
| 251d0 | 00 | 2d | 00 | 09 | 0a | a0 | 21 | c0 | 0c | 20 | 51 | 3a | 00 | 00 | 20 | 8c | .-....!.. Q:.. . |
| 251e0 | 02 | a0 | 21 | 92 | 00 | 90 | 21 | 80 | 08 | 20 | 09 | 37 | 00 | 00 | 00 | 0a | ..!...!.. .7.... |
| 251f0 | 00 | 30 | 20 | 8c | 20 | 51 | 02 | 00 | 3d | a0 | 21 | 92 | 35 | a0 | 81 | 8c | .0 . Q..=.!.5... |
| 25200 | 06 | 16 | 88 | 5c | 1c | ff | ff | 08 | 00 | 00 | 00 | 00 | 00 | 00 | 00 | 00 | ...\............ |
| 25210 | 10 | 16 | 38 | 5c | 08 | 20 | 04 | 35 | 00 | 00 | 00 | 0a | 00 | d0 | 21 | 80 | ..8\. .5......!. |
| 25220 | 08 | 20 | 19 | 30 | 00 | 00 | 00 | 0a | 00 | d0 | 21 | 80 | 2c | 20 | 39 | 37 | . .0......!., 97 |
| 25230 | 00 | d0 | 19 | 80 | 87 | c9 | 18 | 58 | 00 | d0 | 19 | 82 | 00 | d0 | 21 | 80 | .......X......!. |
| 25240 | 18 | 20 | 31 | 37 | 45 | e0 | 29 | 8c | f4 | 01 | 20 | 8c | 05 | 16 | 80 | 5c | . 17E.)... ....\ |
| 25250 | 04 | 16 | 88 | 5c | 7c | 2b | 00 | 08 | 00 | 00 | 00 | 0a | 00 | 00 | 00 | 00 | ...\\|+.......... |

```
Mar 27 18:20 1996  image.txt Page 232

25260   10 16 68 5c 08 20 04 35  00 00 00 0a 00 50 23 80   ..h\. .5.....P#.
25270   08 20 19 30 00 00 00 0a  55 60 2b 90 34 ec fd 09   . .0....U`+.4...
25280   90 90 22 74 04 41 21 59  04 16 70 5c 14 20 01 3c   .."t.A!Y..p\. .<
25290   01 50 3b 80 83 c9 39 58  01 60 3b 82 00 00 00 0a   .P;...9X.`;.....
252a0   00 50 23 80 3c 20 31 37  00 50 1b 80 86 c9 1d 5b   .P#.< 17.P.....[
252b0   00 50 1b 82 00 50 23 80  28 20 39 37 45 60 7b 8c   .P...P#.( 97E`{.
252c0   f4 01 20 8c 0c 00 71 33  0e 16 30 5c 08 00 00 08   .. ...q3..0\....
252d0   f4 01 30 8c 0f 16 80 5c  06 16 88 5c f4 2a 00 08   ..0....\...\.*..
252e0   00 00 00 0a 00 00 00 00  00 00 00 00 00 00 00 00   ................
252f0   11 16 28 5c 08 60 04 35  00 00 00 0a 00 50 21 80   ..(\.`.5.....P!.
25300   08 20 19 30 00 00 00 0a  00 50 21 e0 1c 20 31 30   . .0.....P!.. 10
25310   00 50 19 80 06 ce 16 58  00 50 19 82 01 60 e9 80   .P.....X.P...`..
25320   83 49 ef 58 01 60 e9 82  00 50 21 80 28 20 39 30   .I.X.`...P!.( 90
25330   00 50 31 80 07 8e 31 58  00 50 31 82 01 60 39 80   .P1...1X.P1..`9.
25340   86 c9 39 58 01 60 39 82  01 60 19 80 81 c9 18 58   ..9X.`9..`.....X
25350   01 60 19 82 06 60 21 90  01 20 21 8c 06 60 21 92   .`...`!.. !..`!.
25360   05 16 80 5c fc 1e 00 08  00 00 00 00 00 00 00 00   ...\............
25370   01 00 20 8c 11 16 80 5c  04 16 88 5c a4 fc ff 08   .. .....\...\....
25380   10 16 78 5c 00 10 24 80  08 20 19 30 00 00 00 0a   ..x\..$.. .0....
25390   b9 e0 23 90 2c 20 01 32  01 00 20 8c b9 e0 1b 90   ..#., .2.. .....
253a0   0f 16 80 5c 04 16 88 5c  00 d0 00 86 00 d0 23 80   ...\...\......#.
253b0   08 20 19 30 00 00 00 0a  00 00 20 8c b9 e0 23 92   . .0...... ...#.
253c0   02 e0 2b 90 01 60 21 8c  02 e0 23 92 10 60 19 36   ..+..`!...#..`.6
253d0   01 e0 eb 80 83 49 ef 58  01 e0 eb 82 0a 00 20 8c   .....I.X...... .
253e0   0a e0 23 c2 00 d0 33 80  01 8e 31 58 00 d0 33 82   ..#...3...1X..3.
253f0   45 e0 83 8c dc 2a 00 09  00 d0 3b 80 07 ce 39 58   E....*....;...9X
25400   00 d0 3b 82 18 ce 21 59  1f 0c 21 59 00 d0 1b 80   ..;...!Y..!Y....
25410   06 0e 29 59 40 00 20 8c  04 40 19 65 00 d0 1b 82   ..)Y@. ..@.e....
25420   00 30 20 8c 70 53 02 00  3d e0 23 92 35 e0 2b 8c   .0 .pS..=.#.5.+.
25430   00 30 20 8c 60 ea 00 00  05 16 80 5c 04 16 88 5c   .0 .`......\...\
25440   90 29 00 08 00 00 00 00  00 00 00 00 00 00 00 00   .)..............
25450   10 16 30 5c bc 08 00 09  0c 20 04 3a 00 90 21 80   ..0\..... .:..!.
25460   0c 20 19 30 00 00 80 8c  00 00 00 0a 13 a0 29 90   . .0..........).
25470   89 a0 21 90 04 41 29 59  05 16 38 5c 17 a0 21 88   ..!..A)Y..8\..!.
25480   0c 00 29 36 00 00 18 8c  18 00 00 08 17 a0 29 88   ..)6..........).
25490   00 30 20 8c ff ff 00 00  87 00 21 58 84 41 19 59   .0 .......!X.A.Y
254a0   03 16 80 5c 00 00 00 0a  00 00 00 00 00 00 00 00   ...\............
254b0   10 16 38 5c 2a 00 80 8c  18 3e ff 09 10 16 18 5c   ..8\*....>.....\
254c0   0c 20 04 35 00 00 80 8c  00 00 00 0a 07 16 80 5c   . .5...........\
254d0   00 3e ff 09 0e e0 80 92  0e e0 20 90 14 20 01 35   .>........ .. .5
```

Mar 27 18:20 1996 image.txt Page 255

```
254e0   03 16 80 5c 4c 3e ff 09  00 00 80 8c 00 00 00 0a   ...\L>..........
254f0   11 e0 38 92 0e e0 20 90  16 e0 20 92 1a e0 38 92   ..8... ... ...8.
25500   00 00 20 8c 00 a0 20 92  04 e0 20 92 0c e0 20 8a   .. ... ... ... .
25510   00 30 20 8c 30 55 02 00  22 e0 20 92 00 00 20 8c   .0 .0U..". ... .
25520   26 e0 20 92 03 16 80 5c  00 00 00 0a 00 00 00 00   &. ....\........
25530   10 16 20 5c 0e 20 84 90  f8 3a ff 09 04 16 80 5c   .. \. ...=.....\
25540   f0 3a ff 08 00 00 00 00  00 00 00 00 00 00 00 00   .=..............
25550   10 16 60 5c bc 07 00 09  08 20 04 3a 00 00 00 0a   ..`\..... .=....
25560   00 10 23 80 08 20 19 30  00 00 00 0a 0a 20 23 c0   ..#.. .0..... #.
25570   03 09 69 59 4c 60 2b 34  0a 39 20 90 f8 56 02 00   ..iYL`+4.9 ..V..
25580   00 10 01 84 9a 20 1b 90  99 20 7b 90 87 20 73 88   ..... ... {.. s.
25590   85 20 3b 88 0b 20 33 90  00 00 28 8c 05 16 20 5c   . ;.. 3...(... \
255a0   03 16 80 5c 0f 16 88 5c  0e 16 90 5c 07 16 98 5c   ...\...\...\...\
255b0   06 16 a0 5c 05 16 a8 5c  04 16 b0 5c 44 f8 ff 09   ...\...\...\D...
255c0   02 00 20 8c 0c 16 80 5c  04 16 88 5c 54 fa ff 08   .. ....\...\T...
255d0   80 07 00 09 10 16 18 5c  08 20 04 35 00 00 00 0a   .......\. .5....
255e0   03 16 80 5c 6c ff ff 09  68 07 00 09 10 16 18 5c   ...\l...h......\
255f0   f0 3f 04 35 00 00 00 0a  00 00 00 00 00 00 00 00   .?.5............
25600   10 16 60 5c 11 16 68 5c  08 07 00 09 08 20 04 3d   ..`\..h\..... .=
25610   00 00 00 0a 00 10 23 80  08 20 19 30 00 00 00 0a   ......#.. .0....
25620   7f 20 2b 88 00 30 20 8c  ff ff 00 00 8d 00 21 58   . +..0 .......!X
25630   08 00 29 3d 00 00 00 0a  7f 20 6b 8a 7f 20 2b 88   ..)=..... k.. +.
25640   93 20 23 88 84 41 71 59  7f 20 23 88 81 0d 29 59   . #..AqY. #...)Y
25650   1d 20 23 88 10 00 29 3b  7f 20 23 88 81 0d 79 59   . #...);. #...yY
25660   08 00 00 08 1d 20 7b 88  2c c0 73 3c 7f 20 23 88   ..... {.,.s<. #.
25670   93 20 23 8a 01 20 1b 80  83 c9 18 58 01 20 1b 82   . #.. .....X. ..
25680   1c ce 20 59 1f 0c 21 59  01 20 eb 80 01 08 e9 65   .. Y..!Y. .....e
25690   01 20 eb 82 0a 20 23 c0  02 09 31 59 44 a0 21 34   . ... #...1YD.!4
256a0   06 39 20 90 10 57 02 00  00 10 01 84 01 20 3b 80   .9 ..W....... ;.
256b0   83 c9 39 58 01 20 3b 82  1c ce 21 59 1f 0c 21 59   ..9X. ;...!Y..!Y
256c0   01 20 1b 80 01 08 19 65  01 20 1b 82 06 20 23 90   . .....e. ... #.
256d0   01 20 21 8c 06 20 23 92  0c 16 80 5c 84 1b 00 08   . !.. #....\....
256e0   00 00 00 0a 00 00 00 00  00 00 00 00 00 00 00 00   ................
256f0   93 20 84 88 00 00 00 0a  84 55 02 00 84 55 02 00   . .......U...U..
25700   84 55 02 00 84 55 02 00  c0 55 02 00 84 55 02 00   .U...U...U...U..
25710   ac 56 02 00 ac 56 02 00  ac 56 02 00 ac 56 02 00   .V...V...V...V..
25720   ac 56 02 00 00 00 00 00  00 00 00 00 00 00 00 00   .V..............
25730   80 e7 fd 09 90 90 2a 74  7f 00 20 8c 85 00 21 58   ......*t.. ...!X
25740   03 20 29 8c 00 30 20 90  20 0a 06 10 04 40 21 59   . )..0 . ....@!Y
25750   00 30 20 92 20 0a 06 10  04 16 80 5c 00 00 00 0a   .0 . ......\....
```

Mar 27 18:20 1996 image.txt Page 234

```
25760   10 16 38 5c 20 60 04 39  48 e7 fd 09 90 90 2a 74   ..8\ `.9H.....*t
25770   59 e0 21 90 04 41 29 59  00 30 20 8c 60 ea 00 00   Y.!..A)Y.0 .`...
25780   0c 00 29 33 01 00 1a 8c  08 00 00 08 02 00 1a 8c   ..)3............
25790   03 16 80 5c 00 00 00 0a  00 00 00 00 00 00 00 00   ...\............
257a0   10 16 30 5c ad 20 94 92  a9 20 9c 92 b1 20 a4 92   ..0\. ... ... ..
257b0   b5 20 ac 92 b9 20 b4 92  00 30 20 8c 60 57 02 00   . ... ...0 .`W..
257c0   bd 20 24 92 93 20 8c 8a  7f 20 8c 8a 17 20 8c 8a   . $.. ... ... ..
257d0   1b 20 8c 8a 85 20 d4 8a  87 20 c4 8a 9d 20 bc 92   . ... ... ... ..
257e0   99 20 cc 92 0a 20 dc c2  00 30 28 8c ff 0f ff ff   . ... ...0(.....
257f0   91 a0 21 88 84 40 21 58  91 a0 21 8a 00 30 28 8c   ..!..@!X..!..0(.
25800   00 50 00 00 91 a0 21 88  84 43 21 58 91 a0 21 8a   .P....!..C!X..!.
25810   18 02 20 8c 1d a0 21 8a  19 a0 21 8a bd 0b 20 8c   .. ...!...!... .
25820   71 a0 21 92 65 a0 21 92  69 a0 21 92 00 90 39 80   q.!.e.!.i.!...9.
25830   82 c9 39 58 00 90 39 82  1d ce 21 59 1f 0c 21 59   ..9X..9...!Y..!Y
25840   00 90 19 80 01 08 19 65  00 90 19 82 00 30 20 8c   .......e.....0 .
25850   f0 52 02 00 4d a0 21 92  00 00 00 0a 00 00 00 00   .R..M.!.........
25860   10 60 08 8c 40 e0 c7 b2  00 30 20 8c ff ff 00 00   .`..@....0 .....
25870   90 00 61 58 91 00 21 58  04 16 68 5c 12 16 70 5c   ..aX..!X..h\..p\
25880   13 16 78 5c 14 16 58 5c  15 16 50 5c 16 16 48 5c   ..x\..X\..P\..H\
25890   08 20 01 32 10 20 03 35  00 00 80 8c 40 e0 c7 b0   . .2. .5....@...
258a0   00 00 00 0a 00 30 20 50  28 0a 06 10 04 16 18 5c   .....0 .(......\
258b0   2c 20 01 32 0a e0 20 c0  18 20 09 3d 85 e0 20 88   , .2.. .. .=.. .
258c0   10 00 23 3d 00 00 80 8c  40 e0 c7 b0 00 00 00 0a   ..#=....@.......
258d0   a5 e0 20 90 04 16 18 5c  dc 3f 01 35 00 00 80 8c   .. ....\.?.5....
258e0   30 02 00 09 10 16 18 5c  10 20 04 35 00 00 80 8c   0......\. .5....
258f0   40 e0 c7 b0 00 00 00 0a  00 00 38 8c 07 16 30 5c   @.........8...0\
25900   06 16 28 5c 01 00 20 8c  03 16 80 5c 0d 16 88 5c   ..(\.. ....\...\
25910   0e 16 90 5c 0f 16 98 5c  0b 16 a0 5c 0a 16 a8 5c   ...\...\...\...\
25920   09 16 b0 5c 07 16 b8 5c  06 16 c0 5c 05 16 c8 5c   ...\...\...\...\
25930   0c 16 d0 5c 04 16 d8 5c  68 fe ff 09 91 e0 20 88   ...\...\h..... .
25940   84 93 24 58 91 e0 20 8a  03 16 80 5c 40 e0 c7 b0   ..$X.. ....\@...
25950   00 00 00 0a 00 00 00 00  00 00 00 00 00 00 00 00   ................
25960   10 60 08 8c 10 16 60 5c  00 30 20 8c ff ff 00 00   .`....`\.0 .....
25970   91 00 69 58 92 00 29 58  05 16 70 5c 93 00 79 58   ..iX..)X..p\..yX
25980   14 16 58 5c 15 16 50 5c  18 16 48 5c 40 e0 4f 92   ..X\..P\..H\@.O.
25990   17 16 40 5c 44 e0 47 92  18 16 48 5c 48 e0 4f 92   ..@\D.G...H\H.O.
259a0   24 60 01 32 00 00 80 8c  0e 16 88 5c 0c 16 90 5c   $`.2.......\...\
259b0   0d 16 98 5c ac 02 00 09  74 20 04 32 00 00 80 8c   ...\....t .2....
259c0   00 00 00 0a 00 30 20 88  24 0a 06 10 01 20 31 8c   .....0 .$.... 1.
259d0   00 30 20 8c ff ff 00 00  86 00 29 58 00 30 30 8a   .0 .......)X.00.
```

Mar 27 18:20 1996 image.txt Page 235

```
259e0   24 0a 06 10 00 04 20 8c  10 00 29 3b 00 04 20 8c   $..... ...);.. .
259f0   00 30 20 8a 24 0a 06 10  00 00 38 8c 00 30 30 88   .0 .$.....8..00.
25a00   24 0a 06 10 07 16 28 5c  05 16 20 5c 07 16 80 5c   $.....(\.. \...\
25a10   06 16 88 5c 05 16 90 5c  04 16 98 5c 44 02 00 09   ...\...\...\D...
25a20   a4 3f 04 35 00 30 70 88  24 0a 06 10 28 e0 03 32   .?.5.0p.$...(..2
25a30   0c 16 80 5c 5c ea ff 09  10 16 48 5c 4c e0 4f 92   ...\\.....H\L.O.
25a40   14 20 04 32 00 00 80 8c  c8 00 00 09 10 16 18 5c   . .2...........\
25a50   0c 20 04 35 00 00 80 8c  00 00 00 0a 4c e0 4f 90   . .5........L.O.
25a60   04 60 22 90 16 20 29 90  02 00 20 8c 03 16 80 5c   .`".. )... ....\
25a70   0f 16 88 5c 0b 16 90 5c  0a 16 98 5c 40 e0 47 90   ...\...\...\@.G.
25a80   0d 16 a0 5c 44 e0 4f 90  09 16 a8 5c 48 e0 47 90   ...\D.O....\H.G.
25a90   08 16 b0 5c 0c 16 b8 5c  0d 16 c0 5c 05 16 c8 5c   ...\...\...\...\
25aa0   0e 16 d0 5c 04 16 d8 5c  f8 fc ff 09 84 fc ff 09   ...\...\........
25ab0   89 e0 80 92 0b e0 80 92  01 20 24 8c 13 e0 20 92   ......... $... .
25ac0   91 e0 20 88 81 09 21 58  91 e0 20 8a 01 e0 e8 80   .. ...!X.. .....
25ad0   81 49 ef 58 01 e0 e8 82  06 e0 20 90 01 20 21 8c   .I.X...... .. !.
25ae0   06 e0 20 92 03 16 80 5c  78 17 00 09 00 30 20 90   .. ....\x....0 .
25af0   e0 09 06 10 01 20 21 8c  00 30 20 92 e0 09 06 10   ..... !..0 .....
25b00   03 16 80 5c 00 00 00 0a  00 00 00 00 00 00 00 00   ...\............
25b10   10 16 38 5c 00 30 28 90  2c 0a 06 10 40 00 20 8c   ..8\.0(.,...@. .
25b20   0c 00 29 34 00 00 80 8c  00 00 00 0a c5 00 80 8c   ..)4............
25b30   a0 37 ff 09 10 16 18 5c  0c 20 04 35 00 00 80 8c   .7.....\. .5....
25b40   00 00 00 0a 00 30 20 90  2c 0a 06 10 01 20 21 8c   .....0 .,.... !.
25b50   00 30 20 92 2c 0a 06 10  20 e0 01 35 00 00 28 8c   .0 .,... ..5..(.
25b60   c5 00 20 8c 03 16 80 5c  05 16 88 5c 04 16 90 5c   .. ....\...\...\
25b70   a8 b9 fd 0b 2c 00 00 08  c5 00 20 8c 03 16 80 5c   ....,..... ....\
25b80   07 16 88 5c 04 16 90 5c  20 ba fd 0b 00 00 20 8c   ...\...\ ..... .
25b90   31 e0 20 92 29 e0 20 92  45 e0 20 92 35 e0 20 92   1. .). .E. .5. .
25ba0   00 00 20 8c 7e e0 20 82  32 00 20 8c 7d e0 20 82   .. .~. .2. .}. .
25bb0   29 e0 20 8c 2d e0 20 92  35 e0 80 8c b4 20 00 09   ). .-. .5.... ..
25bc0   45 e0 80 8c ac 20 00 09  51 e0 18 92 41 e0 18 92   E.... ..Q...A...
25bd0   00 30 20 90 28 0a 06 10  a5 e0 20 92 00 30 18 92   .0 .(..... ..0..
25be0   28 0a 06 10 03 16 80 5c  00 00 00 0a 00 00 00 00   (......\........
25bf0   10 16 38 5c 00 30 18 8c  28 0a 06 10 00 30 20 90   ..8\.0..(....0 .
25c00   28 0a 06 10 24 20 01 32  00 d0 20 90 1c c0 21 32   (...$ .2.. ....!2
25c10   00 d0 20 90 a5 20 19 8c  a5 20 21 90 0c 20 01 32   .. .. ... !.. .2
25c20   00 d0 20 90 ec df 21 35  00 d0 20 90 08 20 01 35   .. ....!5.. .. .5
25c30   00 00 00 0a a5 e0 21 90  00 d0 20 92 07 16 80 5c   ......!... ....\
25c40   f0 36 ff 09 00 30 20 90  2c 0a 06 10 01 09 21 59   .6...0 .,.....!Y
25c50   00 30 20 92 2c 0a 06 10  00 00 00 0a 00 00 00 00   .0 .,...........
```

```
Mar 27 18:20 1996  image.txt Page 236

25c60   10 16 76 5c 00 30 20 8c  ff ff 00 00 91 00 29 58   ..x\.0 ......)X
25c70   12 16 30 5c 93 00 39 58  00 30 20 90 2d 0a 06 10   ..0\..9X.0 .(...
25c80   04 16 18 5c 48 20 01 32  0c e0 03 32 99 e0 20 90   ...\H .2...2.. .
25c90   30 c0 23 35 0c 60 01 32  85 e0 20 88 24 40 21 3d   0.#5.`.2.. .$@!=
25ca0   0c a0 01 32 9a e0 20 90  18 80 21 35 0c e0 01 32   ...2.. ...!5...2
25cb0   87 e0 20 88 0c c0 21 3d  03 16 80 5c 00 00 00 0a   .. ...!=...\....
25cc0   a5 e0 20 90 04 16 18 5c  c0 3f 01 35 00 30 20 90   .. ....\.?.5.0 .
25cd0   28 0a 06 10 04 16 18 5c  28 20 01 32 0a e0 20 c0   (......\( .2.. .
25ce0   14 20 09 3d 85 e0 20 88  0c 40 21 3d 03 16 80 5c   . .=.. ..@!=...\
25cf0   00 00 00 0a a5 e0 20 90  04 16 18 5c e0 31 01 35   ...... ....\..5
25d00   00 00 80 8c 00 00 00 0a  00 00 00 00 00 00 00 00   ................
25d10   10 16 38 5c 00 30 20 90  28 0a 06 10 04 16 18 5c   ..8\.0 .(......\
25d20   1c 20 01 32 0c c0 19 35  01 00 80 8c 00 00 00 0a   . .2...5........
25d30   a5 e0 20 90 04 16 18 5c  ec 3f 01 35 00 00 80 8c   .. ....\.?.5....
25d40   00 00 00 0a 00 00 00 00  00 00 00 00 00 00 00 00   ................
25d50   00 30 80 90 28 0a 06 10  00 00 00 0a 00 00 00 00   .0..(...........
25d60   a5 20 84 90 00 00 00 0a  00 00 00 00 00 00 00 00   . ..............
25d70   40 e1 fd 09 90 90 2a 74  00 30 20 8c ff ff 00 00   @.....*t.0 .....
25d80   85 00 29 74 00 30 20 90  20 0a 06 10 04 43 29 58   ..)t.0 . ....C)X
25d90   00 30 28 92 20 0a 06 10  00 30 20 8c ff ff 00 00   .0(. ....0 .....
25da0   85 00 29 58 00 30 20 88  24 0a 06 10 04 43 21 58   ..)X.0 .$....C!X
25db0   00 30 20 8a 24 0a 06 10  00 00 20 8c 00 30 20 92   .0 .$..... ..0 .
25dc0   28 0a 06 10 00 30 20 92  2c 0a 06 10 00 00 00 0a   (....0 .,.......
25dd0   60 60 08 8c 40 e0 87 92  11 16 48 5c 60 e0 4f 92   ``..@.....H\`.O.
25de0   12 16 40 5c 64 e0 47 92  00 00 20 8c 44 e0 27 92   ..@\d.G... .D.'.
25df0   04 16 48 5c 68 e0 4f 92  00 30 20 90 f0 09 06 10   ..H\h.O..0 .....
25e00   01 20 21 8c 00 30 20 92  f0 09 06 10 40 e0 27 90   . !..0 .....@.'.
25e10   16 20 61 90 40 e0 27 90  1a 20 21 90 04 16 50 5c   . a.@.'.. !...P\
25e20   1c 20 a1 36 00 30 20 90  fc 09 06 10 01 20 21 8c   . .6.0 ...... !.
25e30   00 30 20 92 fc 09 06 10  48 0b 00 08 0a 16 80 5c   .0 .....H......\
25e40   40 33 ff 09 5a e0 87 8a  60 e0 4f 90 50 e0 4f 92   @3..Z...`.O.P.O.
25e50   64 e0 47 90 54 e0 47 92  06 00 20 8c 59 e0 27 82   d.G.T.G... .Y.'.
25e60   20 a0 02 30 01 89 2a 59  40 e0 27 90 16 20 21 90    ..0..*Y@.'.. !.
25e70   04 40 21 59 00 10 49 80  6c e0 4f 92 0c 00 00 08   .@!Y..I.l.O.....
25e80   00 00 48 8c 6c e0 4f 92  6c e0 4f 90 58 e0 4f 82   ..H.l.O.l.O.X.O.
25e90   01 8c 22 59 0c 16 80 5c  04 16 88 5c 74 33 ff 09   .."Y...\...\t3..
25ea0   00 30 20 8c ff ff 00 00  90 00 21 58 10 0e 21 59   .0 .......!X..!Y
25eb0   90 0d 31 59 50 e0 2f 8c  06 00 20 8c 05 16 80 5c   ..1YP./... ....\
25ec0   04 16 88 5c 4c 33 ff 09  00 30 20 8c ff ff 00 00   ...\L3...0 .....
25ed0   90 00 21 58 10 0e 21 59  90 0d 21 59 06 00 21 59   ..!X..!Y..!Y..!Y
```

Mar 27 18:20 1996 image.txt Page 237

```
25ee0   01 20 29 8c 00 30 20 8c  fe ff 00 00 85 00 21 58   . )..0 .......!X
25ef0   1c 20 01 32 00 30 20 90  fc 09 06 10 01 20 21 8c   . .2.0 ...... !.
25f00   00 30 20 92 fc 09 06 10  78 0a 00 08 0c 16 80 5c   .0 .....x......\
25f10   90 ec ff 09 0c 20 23 88  8c 0d 21 59 84 d0 23 58   ..... #...!Y..#X
25f20   02 0e 21 59 04 16 48 5c  70 e0 4f 92 0c 20 a1 31   ..!Y..H\p.O.. .1
25f30   70 e0 4f 90 1c 80 4a 36  00 30 20 90 fc 09 06 10   p.O...J6.0 .....
25f40   01 20 21 8c 00 30 20 92  fc 09 06 10 34 0a 00 08   . !..0 .....4...
25f50   70 e0 4f 90 09 81 5a 59  00 00 30 8c 02 20 2b 88   p.O...ZY..0.. +.
25f60   00 10 23 88 06 16 80 5c  05 16 88 5c 60 e0 47 90   ..#....\...\`.G.
25f70   08 16 90 5c 04 16 98 5c  e8 fc ff 09 44 e0 87 92   ...\...\....D...
25f80   44 e0 27 90 00 28 01 5a  20 0a 00 12 44 e0 27 90   D.'..(.Z ...D.'.
25f90   00 10 21 80 03 2f 01 5a  e8 09 00 17 44 e0 2f 90   ..!../.Z....D./.
25fa0   06 60 21 90 01 20 21 8c  06 60 21 92 04 df fd 09   .`!.. !..`!.....
25fb0   90 90 2a 74 44 e0 27 90  59 20 29 92 0c 20 23 88   ..*tD.'.Y ).. #.
25fc0   01 2f 01 5a 00 00 70 27  0c 20 23 88 00 2f 01 5a   ./.Z..p'. #../.Z
25fd0   00 00 68 27 0c 20 23 88  02 2f 01 5a 00 00 48 27   ..h'. #../.Z..H'
25fe0   74 e0 4f 92 44 e0 27 90  0a 20 41 c0 78 e0 47 92   t.O.D.'.. A.x.G.
25ff0   30 20 0a 3d 44 e0 2f 8c  40 e0 27 90 05 16 80 5c   0 .=D./.@.'....\
26000   0c 16 88 5c 60 e0 4f 90  09 16 90 5c 64 e0 47 90   ...\`.O....\d.G.
26010   08 16 98 5c 04 16 a0 5c  c8 09 00 09 64 09 00 08   ...\...\....d...
26020   78 e0 4f 90 34 60 12 3d  44 e0 2f 90 40 e0 27 90   x.O.4`.=D./.@.'.
26030   05 16 80 5c 0c 16 88 5c  04 16 90 5c 94 0a 00 09   ...\...\...\....
26040   80 28 04 5a 3c 09 00 12  0b 40 23 59 00 28 01 5a   .(.Z<....@#Y.(.Z
26050   cc 05 00 14 2c 09 00 08  44 e0 27 90 93 20 21 88   ....,...D.'.. !.
26060   20 20 01 3d 04 20 2b 90  44 e0 27 90 8d 20 21 90     .=. +.D.'.. !.
26070   05 20 01 5a 00 00 48 25  7c e0 4f 92 fc 00 00 08   . .Z..H%|.O.....
26080   04 20 2b 90 44 e0 27 90  8d 20 21 90 84 41 21 59   . +.D.'.. !..A!Y
26090   84 30 00 5a 00 00 20 24  84 30 00 5a 01 00 48 8c   .0.Z.. $.0.Z..H.
260a0   80 e0 4f 92 34 00 00 15  04 20 33 90 44 e0 27 90   ..O.4.... 3.D.'.
260b0   8d 20 29 90 44 e0 27 90  93 20 21 88 05 00 21 59   . ).D.'.. !...!Y
260c0   84 81 21 59 84 30 00 5a  00 00 20 23 84 30 00 5a   ..!Y.0.Z.. #.0.Z
260d0   00 00 48 25 80 e0 4f 92  80 e0 4f 90 89 30 00 5a   ..H%..O...O..0.Z
260e0   00 00 40 8c 84 e0 47 92  84 00 00 12 04 20 23 90   ..@...G...... #.
260f0   04 80 23 59 04 c0 22 59  04 40 2b 59 44 e0 27 90   ..#Y.."Y.@+YD.'.
26100   8d 20 21 90 84 41 21 59  84 30 00 5a 00 00 20 26   . !..A!Y.0.Z.. &
26110   84 30 00 5a 01 00 48 8c  88 e0 4f 92 40 00 00 15   .0.Z..H...O.@...
26120   04 20 23 90 04 80 23 59  04 c0 22 59 04 40 33 59   . #...#Y.."Y.@3Y
26130   44 e0 27 90 8d 20 29 90  44 e0 27 90 93 20 21 88   D.'.. ).D.'.. !.
26140   05 00 21 59 84 81 21 59  84 30 00 5a 00 00 20 21   ..!Y..!Y.0.Z.. !
26150   84 30 00 5a 00 00 48 25  88 e0 4f 92 88 e0 4f 90   .0.Z..H%..O...O.
```

```
26160   89 30 00 5a 00 00 40 25  84 e0 47 92 84 e0 4f 90   .0.Z..@%..G...O.
26170   09 16 40 5c 7c e0 47 92  7c e0 4f 90 74 60 02 3a   ..@\|.G.|.O.t`.:
26180   04 20 2b 90 44 e0 27 90  8d 20 21 90 84 41 21 59   . +.D.'.. !..A!Y
26190   40 20 01 3e 08 20 2b 90  44 e0 27 90 89 20 21 90   @ .>. +.D.'.. !.
261a0   84 41 21 59 2c 20 01 3b  08 20 2b 90 44 e0 27 90   .A!Y, .;. +.D.'.
261b0   0b 20 21 90 84 41 21 59  1a 20 01 3c 08 20 2b 90   . !..A!Y. .<. +.
261c0   44 e0 27 90 05 16 80 5c  04 16 88 5c c4 0a 00 09   D.'....\...\....
261d0   74 e0 4f 90 00 68 02 5a  a8 07 00 15 44 e0 27 90   t.O..h.Z....D.'.
261e0   01 20 e9 80 83 49 ef 58  01 20 e9 82 94 07 00 08   . ...I.X. ......
261f0   04 20 2b 90 44 e0 27 90  8d 20 21 90 84 41 21 59   . +.D.'.. !..A!Y
26200   80 28 01 5a 08 01 00 13  44 e0 2f 90 79 60 79 8c   .(.Z....D./.y`y.
26210   04 20 23 90 04 c0 1a 59  79 60 21 90 84 20 01 32   . #....Yy`!.. .2
26220   00 d0 23 90 16 20 31 90  04 a0 29 90 40 e0 27 90   ..#.. 1...).@.'.
26230   1a 20 21 90 05 00 29 59  0c a0 21 88 8c 0d 21 59   . !...)Y..!...!Y
26240   84 a0 23 58 02 0f 21 59  04 41 39 59 04 20 2b 90   ..#X..!Y.A9Y. +.
26250   04 a0 21 90 84 41 21 59  0c 20 01 3b 00 d0 7b 90   ..!..A!Y. .;..{.
26260   38 00 00 08 87 c1 20 59  38 20 01 39 00 d0 2b 90   8..... Y8 .9..+.
26270   00 50 21 90 00 d0 23 92  00 00 20 8c 00 50 21 92   .P!...#... ..P!.
26280   05 16 80 5c ec e8 ff 09  44 e0 2f 90 7e 60 21 80   ...\....D./.~`!.
26290   01 09 21 59 7e 60 21 82  00 d0 23 90 84 3f 01 35   ..!Y~`!...#..?.5
262a0   00 d0 2b 90 40 e0 27 90  00 10 29 92 40 e0 27 90   ..+.@.'...).@.'.
262b0   00 d0 23 92 00 00 20 8c  40 e0 27 92 44 e0 27 90   ..#... .@.'.D.'.
262c0   7e 20 29 80 44 e0 27 90  7d 20 21 80 2c 00 29 3c   ~ ).D.'.} !.,.)<
262d0   44 e0 27 90 79 20 31 90  00 90 29 90 44 e0 27 90   D.'.y 1...).D.'.
262e0   79 20 29 92 00 00 20 8c  00 90 21 92 06 16 80 5c   y )... ...!....\
262f0   80 e8 ff 09 8c 06 00 08  44 e0 2f 90 7e 60 21 80   ........D./.~`!.
26300   01 20 21 8c 7e 60 21 82  78 06 00 08 44 e0 27 90   . !.~`!.x...D.'.
26310   93 20 21 88 20 20 01 3d  0e c0 22 59 04 40 23 59   . !.  .=.."Y.@#Y
26320   14 20 01 33 44 e0 27 90  01 20 e9 80 83 49 ef 58   . .3D.'.. ...I.X
26330   01 20 e9 82 34 a0 03 32  04 20 2b 90 44 e0 27 90   . ..4..2. +.D.'.
26340   8d 20 21 90 84 41 21 59  20 20 01 3e 0c 20 23 88   . !..A!Y  .>. #.
26350   01 0e 21 58 0c 20 23 8a  00 00 70 8c 04 20 23 90   ..!X. #...p.. #.
26360   01 20 21 8c 04 20 23 92  3c 60 03 32 04 20 23 90   . !.. #.<`.2. #.
26370   04 80 23 59 04 c0 32 59  44 e0 27 90 8d 20 29 90   ..#Y..2YD.'.. ).
26380   44 e0 27 90 93 20 21 88  05 00 21 59 84 81 21 59   D.'.. !...!Y..!Y
26390   14 20 01 3b 0c 20 23 88  00 0e 21 58 0c 20 23 8a   . .;. #...!X. #.
263a0   00 00 68 8c 74 e0 4f 90  1c 60 02 32 44 e0 2f 90   ..h.t.O..`.2D./.
263b0   02 00 20 8c 05 16 80 5c  04 16 88 5c 64 ec ff 09   .. ....\...\d...
263c0   c0 05 00 08 00 a8 03 5a  e0 05 00 15 0c 20 23 88   .......Z..... #.
263d0   04 2f 01 5a ac 05 00 10  44 e0 27 90 0a 20 21 c0   ./.Z....D.'.. !.
```

```
Mar 27 18:20 1996  image.txt Page 239

263e0   40 20 19 3a 08 20 2b 90  44 e0 27 90 89 20 21 90   @ .=. +.D.'.. !.
263f0   84 41 21 59 80 28 01 5a  80 05 00 11 08 20 2b 90   .A!Y.(.Z..... +.
26400   44 e0 27 90 0b 20 21 90  84 41 21 59 80 28 01 5a   D.'.. !..A!Y.(.Z
26410   95 05 00 14 44 e0 87 90  0c 16 88 5c f4 0b 00 09   ....D.......\....
26420   08 20 2b 90 44 e0 27 90  0b 20 21 90 84 41 21 59   . +.D.'.. !..A!Y
26430   1a 20 01 3b 44 e0 27 90  01 20 e9 80 83 49 ef 58   . .;D.'.. ...I.X
26440   01 20 e9 82 3c 05 00 08  44 e0 27 90 01 20 21 80   . ..<...D.'.. !.
26450   24 20 21 30 44 e0 27 90  89 20 29 90 44 e0 27 90   $ !0D.'.. ).D.'.
26460   13 20 21 90 10 00 29 35  44 e0 57 90 34 ed ff 09   . !...)5D...4...
26470   18 00 00 08 08 20 2b 90  44 e0 27 90 05 16 80 5c   ..... +.D.'....\
26480   04 16 88 5c 0c 08 00 09  44 e0 27 90 21 20 29 90   ...\....D.'.! ).
26490   04 20 23 90 84 41 21 59  30 20 01 39 44 e0 27 90   . #..A!Y0 .9D.'.
264a0   21 20 29 90 04 20 23 90  05 20 01 5a f4 00 00 15   ! ).. #.. .Z....
264b0   44 e0 27 90 25 20 29 90  08 20 23 90 84 41 21 59   D.'.% ).. #..A!Y
264c0   80 28 01 5a dc 00 00 14  08 20 2b 90 0e 20 23 88   .(.Z..... +.. #.
264d0   05 00 29 59 44 e0 27 90  0b 20 21 90 04 41 29 59   ..)YD.'.. !..A)Y
264e0   05 16 48 5c 68 e0 4f 92  0e 20 23 88 0c 00 29 36   ..H\h.O.. #...)6
264f0   00 00 48 8c 68 e0 4f 92  68 e0 4f 90 28 60 02 33   ..H.h.O.h.O.(`.3
26500   44 e0 27 90 0b 20 29 90  44 e0 27 90 13 20 21 90   D.'.. ).D.'.. !.
26510   14 00 29 32 44 e0 27 90  01 20 e9 80 81 49 ef 58   ..)2D.'.. ...I.X
26520   01 20 e9 82 0e 20 2b 88  44 e0 27 90 17 20 29 8a   . ... +.D.'.. ).
26530   04 20 2b 90 44 e0 27 90  21 20 29 92 08 20 2b 90   . +.D.'.! ).. +.
26540   44 e0 27 90 25 20 29 92  44 e0 27 90 00 10 21 80   D.'.% ).D.'...!.
26550   50 20 21 30 08 20 2b 90  0e 20 23 88 05 00 29 59   P !0. +.. #...)Y
26560   44 e0 27 90 13 20 21 90  84 41 21 59 34 20 01 3b   D.'.. !..A!Y4 .;
26570   44 e0 27 90 00 10 e9 80  04 4e ef 58 00 10 e9 82   D.'......N.X....
26580   44 e0 27 90 b1 20 21 90  18 20 01 32 44 e0 2f 90   D.'.. !.. .2D./.
26590   44 e0 27 90 b1 20 e9 90  05 16 80 5c 00 50 07 86   D.'.. .....\.P..
265a0   44 e0 27 90 17 20 21 88  74 20 01 3d 44 e0 27 90   D.'.. !.t .=D.'.
265b0   01 20 21 80 10 20 11 37  44 e0 27 90 01 20 21 80   . !.. .7D.'.. !.
265c0   5c 20 09 30 44 e0 27 90  01 20 e9 80 01 4e ef 58   \ .0D.'.. ...N.X
265d0   01 20 e9 82 1e 4e 27 59  1f 0c 21 59 44 e0 2f 90   . ...N'Y..!YD./.
265e0   01 60 e9 80 02 0e 21 59  04 08 e9 65 01 60 e9 82   .`....!Y...e.`..
265f0   00 30 28 8c f0 71 02 00  44 e0 27 90 3d 20 29 92   .0(..q..D.'.= ).
26600   44 e0 27 90 35 20 29 8c  44 e0 27 90 69 20 21 90   D.'.5 ).D.'.i !.
26610   05 16 80 5c 04 16 88 5c  b8 17 00 09 0c 20 23 88   ...\...\..... #.
26620   05 2f 01 5a 9c 00 00 10  44 e0 27 90 00 10 21 80   ./.Z....D.'...!.
26630   20 20 29 30 04 20 2b 90  12 20 23 88 05 00 29 59     )0. +.. #...)Y
26640   44 e0 27 90 81 20 21 90  84 41 21 59 74 20 01 3b   D.'.. !..A!Yt .;
26650   44 e0 27 90 0a 20 49 c0  8c e0 4f 92 14 60 22 3a   D.'.. I...O..`":
```

```
Mar 27 18:20 1996  image.txt Page 240

26660   8c e0 4f 90 0c 60 2a 3a  8c e0 4f 90 54 60 32 3a   ..O.. *:..O.T'2=
26670   44 e0 27 90 00 10 e9 80  83 49 ef 58 00 10 e9 82   D.'......I.X....
26680   04 20 2b 90 12 20 23 88  02 00 29 59 44 e0 27 90   . +.. #...)YD.'.
26690   81 20 29 92 44 e0 27 90  c1 20 21 90 24 20 01 32   . ).D.'.. !.$ .2
266a0   44 e0 37 90 12 20 23 88  01 20 29 8c 44 e0 27 90   D.7.. #.. ).D.'.
266b0   c1 20 e9 90 06 16 80 5c  05 16 88 5c 00 50 07 88   . .....\...\.P..
266c0   44 e0 27 90 7f 20 21 88  24 20 01 3b 44 e0 2f 90   D.'.. !.$ .;D./.
266d0   40 e0 27 8c 05 16 80 5c  04 16 88 5c e4 07 00 09   @.'....\...\....
266e0   0c 20 04 3a 44 e0 87 90  78 e8 ff 09 40 e0 27 90   . .:D...x...@.'.
266f0   00 28 01 5a c8 00 00 15  09 68 03 5a c0 00 00 15   .(.Z.....h.Z....
26700   44 e0 27 90 79 20 21 90  00 28 01 5a 60 00 00 12   D.'.y !..(.Z....
26710   44 e0 27 90 79 20 21 90  16 20 31 90 06 16 60 5c   D.'.y !.. 1...`\
26720   44 e0 27 90 8d 20 29 90  04 a0 21 90 84 41 21 59   D.'.. )...!..A!Y
26730   d4 30 00 5a 00 00 20 23  84 20 01 3a 44 e0 27 90   .0.Z.. #. .:D.'.
26740   79 20 21 90 40 e0 27 92  40 e0 27 90 00 10 29 90   y !.@.'.@.'...).
26750   44 e0 27 90 79 20 29 92  00 00 28 8c 40 e0 27 90   D.'.y )...(.@.'.
26760   00 10 29 92 44 e0 2f 90  7e 60 21 80 01 09 21 59   ..).D./.~`!...!Y
26770   7e 60 21 82 40 e0 27 90  1a 20 29 90 0c 20 23 88   ~`!.@.'.. ).. #.
26780   8c 0d 21 59 84 d0 23 58  02 0f 21 59 04 41 59 59   ..!Y..#X..!Y.AYY
26790   0c 20 23 88 01 2f 01 5a  00 00 70 27 0c 20 23 88   . #../.Z..p'. #.
267a0   00 2f 01 5a 00 00 68 27  0c 20 23 88 02 2f 01 5a   ./.Z..h'. #../.Z
267b0   00 00 48 27 74 e0 4f 92  7c fb ff 08 44 e0 27 90   ..H't.O.|...D.'.
267c0   7f 20 29 88 44 e0 27 90  93 20 21 88 84 41 49 59   . ).D.'.. !..AIY
267d0   90 e0 4f 92 44 e0 27 90  7f 20 21 88 81 0d 29 59   ..O.D.'.. !...)Y
267e0   44 e0 27 90 1d 20 21 88  18 00 29 3b 44 e0 27 90   D.'.. !...);D.'.
267f0   7f 20 21 88 81 0d 49 59  94 e0 4f 92 10 00 00 08   . !...IY..O.....
26800   44 e0 27 90 1d 20 49 88  94 e0 4f 92 90 e0 4f 90   D.'.. I...O...O.
26810   94 e0 47 90 3c 00 4a 3c  44 e0 27 90 7f 20 29 88   ..G.<.J<D.'.. ).
26820   44 e0 27 90 93 20 29 8a  44 e0 27 90 01 20 e9 80   D.'.. ).D.'.. ..
26830   83 49 ef 58 01 20 e9 82  1c 4e 27 59 1f 0c 29 59   .I.X. ...N'Y..)Y
26840   44 e0 27 90 01 20 e9 80  01 48 e9 65 01 20 e9 82   D.'.. ...H.e. ..
26850   44 e0 27 90 00 10 21 80  2c 20 29 30 44 e0 27 90   D.'...!., )0D.'.
26860   8d 20 29 90 44 e0 27 90  81 20 21 90 84 41 21 59   . ).D.'.. !..A!Y
26870   14 20 01 3b 44 e0 27 90  00 10 e9 80 05 4e ef 58   . .;D.'......N.X
26880   00 10 e9 82 00 68 03 5a  f8 00 00 12 44 e0 27 90   .....h.Z....D.'.
26890   0a 20 21 c0 04 16 48 5c  98 e0 4f 92 84 20 51 34   . !...H\..O.. Q4
268a0   98 e0 4f 90 09 39 20 90  34 72 02 00 00 10 01 84   ..O..9 .4r......
268b0   d0 00 00 08 08 00 28 8c  44 e0 27 90 0a 20 29 c2   ......(.D.'.. ).
268c0   60 00 00 08 44 e0 27 90  0b 20 29 90 44 e0 27 90   `...D.'.. ).D.'.
268d0   89 20 21 90 14 00 29 32  07 00 28 8c 44 e0 27 90   . !...)2..(.D.'.
```

```
Mar 27 16:20 1996  image.txt Page 241

268e0   0a 20 29 c2 3c 00 00 08  44 e0 87 90 b4 e8 ff 09   . ).<...D.......
268f0   0a 00 28 8c 44 e0 27 90  0a 20 29 c2 24 00 00 08   ..(.D.'.. ).$...
26900   44 e0 27 90 01 20 e9 80  83 49 ef 58 01 20 e9 82   D.'.. ...I.X. ..
26910   70 00 00 08 44 e0 87 90  6e ea ff 09 64 00 00 08   p...D...n...d...
26920   44 e0 2f 90 8d 60 21 90  01 20 21 8c 8d 60 21 92   D./..`!.. !..`!.
26930   44 e0 27 90 01 20 e9 80  83 49 ef 58 01 20 e9 82   D.'.. ...I.X. ..
26940   44 e0 27 90 b5 20 21 90  24 20 01 32 44 e0 2f 90   D.'.. !.$ .2D./.
26950   44 e0 27 90 b5 20 e5 90  05 16 80 5c 00 50 07 88   D.'.. .....\.P..
26960   00 00 28 8c 44 e0 27 90  b5 20 29 92 44 e0 27 90   ..(.D.'.. ).D.'.
26970   0a 20 21 c0 0c 20 31 3d  44 e0 87 90 04 ea ff 09   . !.. 1=D.......
26980   40 e0 27 90 0c 20 01 32  40 e0 87 90 e4 e1 ff 09   @.'.. .2@.......
26990   44 e0 27 90 08 20 01 35  00 00 00 0a 44 e0 87 90   D.'.. .5....D...
269a0   c0 08 00 09 00 00 00 0a  44 e0 2f 90 02 00 20 8c   ........D./... .
269b0   05 16 80 5c 04 16 88 5c  6e e6 ff 09 40 e0 87 90   ...\...\n...@...
269c0   60 e0 4f 90 09 16 68 5c  64 e0 47 90 08 16 90 5c   `.O...h\d.G....\
269d0   a0 e5 ff 09 ac ff ff 08  00 00 00 00 00 00 00 00   ................
269e0   10 16 60 5c 11 16 68 5c  12 16 70 5c 13 16 78 5c   ..`\..h\..p\..x\
269f0   14 16 28 5c 00 10 24 90  04 16 30 5c 00 10 21 80   ..(\..$...0\..!.
26a00   08 20 19 30 00 00 00 0a  00 00 20 8c 06 a0 21 92   . .0...... ...!.
26a10   00 10 23 92 0c 60 23 88  08 20 11 30 00 00 00 0a   ..#..`#.. .0....
26a20   0c 60 23 88 20 20 21 37  0c 60 23 88 18 20 09 30   .`#.  !7.`#.. .0
26a30   06 16 80 5c dc f0 ff 09  10 16 38 5c 00 10 83 92   ...\......8\....
26a40   14 20 04 35 05 16 80 5c  0e 16 88 5c 0f 16 90 5c   . .5...\...\...\
26a50   20 e5 ff 08 01 00 20 8c  06 e0 21 92 9d e0 71 92    ..... ...!...q.
26a60   99 e0 79 92 00 50 23 88  87 e0 21 8a 03 00 20 8c   ..y..P#...!... .
26a70   0a e0 21 c2 04 60 23 90  01 20 21 8c 8d e0 21 92   ..!..`#.. !...!.
26a80   b0 ec ff 09 89 e0 81 92  0b e0 81 92 01 20 24 8c   ............. $.
26a90   13 e0 21 92 0e 60 23 88  17 e0 21 8a 07 16 80 5c   ..!..`#...!....\
26aa0   0d 16 88 5c ec 05 00 09  1d e0 81 8a 01 e0 19 80   ...\............
26ab0   81 c9 18 58 01 e0 19 82  00 30 20 90 e4 09 06 10   ...X.....0 .....
26ac0   01 20 21 8c 00 30 20 92  e4 09 06 10 00 00 00 0a   . !..0 .........
26ad0   10 16 70 5c 11 16 78 5c  12 16 30 5c 0c 60 24 88   ..p\..x\..0\.`$.
26ae0   0c 20 21 37 00 00 80 8c  00 00 00 0a 08 e0 2b 90   . !7..........+.
26af0   0b a0 23 90 40 00 29 32  0c e0 23 88 0c 20 11 30   ..#.@.)2..#.. .0
26b00   00 00 80 8c 00 00 00 0a  9d a0 2b 90 99 a0 23 90   ..........+...#.
26b10   06 16 80 5c 05 16 88 5c  04 16 90 5c 54 e4 ff 09   ...\...\...\T...
26b20   01 a0 3b 80 82 c9 39 58  01 a0 3b 82 00 00 80 8c   ..;...9X..;.....
26b30   00 00 00 0a 0c e0 23 88  1c 20 11 30 02 00 20 8c   ......#.. .0.. .
26b40   0e 16 80 5c 04 16 88 5c  d8 e4 ff 09 00 00 80 8c   ...\...\........
26b50   00 00 00 0a 0c e0 23 88  0c 20 09 37 00 00 80 8c   ......#.. .7....
```

Mar 27 18:20 1996 image.txt Page 242

```
26b60   00 00 00 0a 0e 16 80 5c  0f 1b 88 5c 24 05 00 09   ........\...\$...
26b70   1d a0 83 8a 91 a0 23 88  84 09 21 58 91 a0 23 8a   .......#...!X..#.
26b80   04 e0 23 90 01 20 21 8c  04 e0 23 92 04 e0 23 90   ..#.. !...#...#.
26b90   8c a0 23 92 0e 16 80 5c  0f 16 88 5c 74 04 00 09   ..#....\...\t...
26ba0   01 a0 1b 80 83 c9 18 58  01 a0 1b 82 01 00 80 8c   ........X.......
26bb0   00 00 00 0a 00 00 00 00  00 00 00 00 00 00 00 00   ................
26bc0   10 16 38 5c 5d 20 24 90  08 20 01 35 00 00 00 0a   ..8\] $.. .5....
26bd0   89 e0 29 90 61 e0 21 90  84 41 21 59 08 20 01 3c   ..).a.!..A!Y. .<
26be0   00 00 00 0a cc d2 fd 09  90 90 2a 74 5d e0 21 90   ..........*t].!.
26bf0   04 41 29 59 6d e0 21 90  03 0c 21 59 04 41 29 59   .A)Ym.!...!Y.A)Y
26c00   05 16 18 5c 6d e0 21 90  04 40 21 59 6d e0 21 92   ...\m.!..@!Ym.!.
26c10   08 60 01 3e 83 11 18 59  71 e0 21 90 02 0c 21 59   .`.>...Yq.!...!Y
26c20   04 c1 28 59 05 16 18 5c  71 e0 21 90 04 40 21 59   ..(Y...\q.!..@!Y
26c30   71 e0 21 92 6d e0 21 90  03 0c 29 59 71 e0 21 90   q.!.m.!...)Yq.!.
26c40   05 00 21 59 65 e0 21 92  65 e0 29 90 00 30 20 8c   ..!Ye.!.e.)..0 .
26c50   80 a9 03 00 14 00 29 36  00 30 20 8c 80 a9 03 00   ......)6.0 .....
26c60   65 e0 21 92 18 00 00 08  65 e0 29 90 f4 01 20 8c   e.!.....e.)... .
26c70   0c 00 29 33 f4 01 20 8c  65 e0 21 92 65 e0 21 90   ..)3.. .e.!.e.!.
26c80   69 e0 21 92 00 00 20 8c  5d e0 21 92 00 00 00 0a   i.!... .].!.....
26c90   10 16 60 5c 11 16 68 5c  00 50 24 80 10 20 19 37   ..`\..h\.P$.. .7
26ca0   89 60 23 90 84 01 23 59  08 20 01 3c 00 00 00 0a   .`#...#Y. .<....
26cb0   00 50 23 80 10 20 19 37  89 60 23 90 84 01 23 59   .P#.. .7.`#...#Y
26cc0   08 20 01 3c 00 00 00 0a  91 60 23 88 1c 20 29 30   . .<.....`#.. )0
26cd0   0f 60 23 90 84 01 23 59  10 20 01 3b 91 60 23 88   .`#...#Y. .;.`#.
26ce0   05 0e 21 58 91 60 23 8a  29 60 23 90 04 16 70 5c   ..!X.`#.)`#...p\
26cf0   70 20 01 32 89 60 2b 90  1a a0 23 90 05 00 21 59   p .2.`+...#...!Y
26d00   84 01 23 59 5c 20 01 39  1a a0 2b 90 89 60 23 90   ..#Y\ .9..+..`#.
26d10   04 40 21 59 89 60 23 92  00 90 23 90 29 60 23 92   .@!Y.`#...#.)`#.
26d20   0c 20 01 35 29 60 23 8c  2d 60 23 92 22 a0 23 90   . .5)`#.-`#.".#.
26d30   10 20 01 32 22 a0 eb 90  0e 16 80 5c 00 50 07 86   . .2"......\.P..
26d40   29 60 23 90 04 16 70 5c  18 20 01 32 89 60 2b 90   )`#...p\. .2.`+.
26d50   1a a0 23 90 05 00 21 59  84 01 23 59 ac 3f 01 3e   ..#...!Y..#Y.?.>
26d60   3c a0 03 32 89 60 2b 90  1a a0 23 90 05 00 21 59   <..2.`+...#...!Y
26d70   84 01 23 59 28 20 01 3e  89 60 23 90 04 01 2b 59   ..#Y( .>.`#...+Y
26d80   16 a0 23 90 04 40 21 59  16 a0 23 92 1a a0 23 90   ..#..@!Y..#...#.
26d90   05 01 21 59 1a a0 23 92  89 60 63 92 19 60 2b 88   ..!Y..#..`c..`+.
26da0   1b 60 23 88 0c 00 29 3b  1d 60 7b 88 18 00 00 08   .`#...);.`{.....
26db0   1d 60 2b 88 1d 60 23 88  85 00 29 74 19 60 23 88   .`+..`#...)t.`#.
26dc0   84 45 79 74 19 60 23 88  84 c0 23 59 19 60 23 8a   .Eyt.`#...#Y.`#.
26dd0   0d 16 80 5c ec fd ff 09  0b 60 23 90 3c 00 61 32   ...\.....`#.<.a2
```

Mar 27 16:20 1996 image.txt Page 243

```
26de0   02 60 23 90 08 20 19 38  00 00 00 0a 69 60 26 90   .`#.. .8....i`&.
26df0   00 30 20 8c 88 13 00 00  08 00 29 31 00 00 00 0a   .0 ......)1....
26e00   01 60 3b 80 82 c9 39 58  01 60 3b 82 00 00 20 8c   .`;...9X.`;... .
26e10   3a 60 23 92 00 00 00 0a  0d 16 80 5c 84 e3 ff 09   :`#........\....
26e20   13 60 2b 90 0b 60 23 90  84 41 21 59 14 20 01 3b   .`+..`#..A!Y. .;
26e30   01 60 1b 80 81 c9 18 58  01 60 1b 82 00 00 00 0a   .`.....X.`......
26e40   91 60 23 88 08 20 01 37  00 00 00 0a 89 60 23 90   .`#.. .7.....`#.
26e50   01 20 29 8c 0b 60 23 90  08 00 29 32 00 00 00 0a   . )..`#...)2....
26e60   91 60 23 88 00 0e 21 58  91 60 23 8a 0b 60 23 90   .`#...!X.`#..`#.
26e70   89 60 23 92 0a 60 33 c0  10 a0 29 3d 06 00 20 8c   .`#..`3...)=.. .
26e80   0a 60 23 c2 00 00 00 0a  14 a0 39 3d 0a 00 20 8c   .`#.......9=.. .
26e90   0a 60 23 c2 0d 16 80 5c  e8 e4 ff 08 08 a0 49 3a   .`#....\......I:
26ea0   00 00 00 0a 01 00 20 8c  0d 16 80 5c 04 16 88 5c   ...... ....\...\
26eb0   70 e1 ff 08 00 00 00 00  00 00 00 00 00 00 00 00   p...............
26ec0   10 16 70 5c 11 16 78 5c  00 50 3c 90 00 10 24 80   ..p\..x\.P<...$.
26ed0   08 20 19 37 0c e0 01 35  00 00 80 8c 00 00 00 0a   . .7...5........
26ee0   16 e0 21 90 04 16 30 5c  04 20 29 90 8d a0 23 90   ..!...0\. )...#.
26ef0   84 41 21 59 0c 20 01 3b  00 00 80 8c 00 00 00 0a   .A!Y. .;........
26f00   0c a0 21 88 8c 0d 21 59  84 d0 23 58 02 0f 29 59   ..!...!Y..#X..)Y
26f10   16 e0 21 90 04 40 21 59  16 e0 21 92 1a e0 21 90   ..!..@!Y..!...!.
26f20   05 01 21 59 1a e0 21 92  04 a0 29 90 1a e0 21 90   ..!Y..!...)...!.
26f30   05 00 29 59 8d a0 23 90  84 41 21 59 1c 20 01 3c   ..)Y..#..A!Y. .<
26f40   07 16 80 5c 2c dc ff 09  00 00 20 8c 00 d0 23 92   ...\,..... ...#.
26f50   04 16 80 5c 00 00 00 0a  8d a0 2b 90 04 a0 21 90   ...\......+...!.
26f60   04 41 29 59 16 e0 21 90  04 40 21 59 16 e0 21 92   .A)Y..!..@!Y..!.
26f70   1a e0 21 90 05 01 21 59  1a e0 21 92 1a e0 29 90   ..!...!Y..!...).
26f80   7f a0 23 88 0c 00 29 36  7f a0 23 88 1a e0 21 92   ..#...)6..#...!.
26f90   1a e0 29 90 8d a0 23 90  04 40 21 59 8d a0 23 92   ..)...#..@!Y..#.
26fa0   1a e0 29 90 93 a0 23 88  18 00 29 33 1a e0 29 90   ..)...#...)3..).
26fb0   93 a0 23 88 05 01 21 59  93 a0 23 8a 0c 00 00 08   ..#...!Y..#.....
26fc0   00 00 20 8c 93 a0 23 8a  a9 a0 23 90 24 20 01 32   .. ...#...#.$ .2
26fd0   1a e0 21 90 1c 20 01 32  a9 a0 1b 90 0e 16 80 5c   ..!.. .2.......\
26fe0   07 16 88 5c 00 d0 00 86  7f a0 83 8a 0c 00 00 08   ...\............
26ff0   07 16 80 5c 7c db ff 09  00 00 20 8c 00 d0 23 92   ...\|..... ...#.
27000   01 00 80 8c 00 00 00 0a  00 00 00 00 00 00 00 00   ................
27010   10 16 30 5c 11 16 38 5c  00 10 24 80 08 20 19 30   ..0\..8\..$.. .0
27020   00 00 00 0a 04 00 20 8c  0a a0 21 c2 0e e0 21 88   ...... ...!...!.
27030   17 a0 21 8a 04 e0 21 90  21 a0 21 92 08 e0 21 90   ..!...!.!.!...!.
27040   25 a0 21 92 91 a0 21 88  01 0e 21 58 91 a0 21 8a   %.!...!...!X..!.
27050   89 a0 21 90 01 20 21 8c  89 a0 21 92 06 16 80 5c   ..!.. !...!....\
```

Mar 27 18:20 1996 image.txt Page 244

```
27060   60 fb ff 09 06 16 80 5c  38 e1 ff 09 ad a0 21 90   `......\8.....!.
27070   08 20 01 35 00 00 00 0a  ad a0 19 90 06 16 80 5c   . .5...........\
27080   00 d0 00 84 00 00 00 00  00 00 00 00 00 00 00 00   ................
27090   10 16 48 5c 11 16 60 5c  18 02 6e 8c 00 10 24 80   ..H\..`\..n...$.
270a0   0c 20 19 30 00 00 80 8c  00 00 00 0a 0c 20 23 88   . .0......... #.
270b0   8c 0d 21 59 84 a0 23 58  02 0f 21 59 14 09 21 59   ..!Y..#X..!Y..!Y
270c0   14 20 73 8c 81 09 39 59  80 28 01 5a b0 00 00 13   . s...9Y.(.Z....
270d0   0e 16 20 5c 01 a0 73 8c  00 10 19 80 5c e0 10 3d   .. \..s.....\..=
270e0   0e 16 20 5c 01 a0 73 8c  00 10 21 80 50 20 21 3d   .. \..s...!.P !=
270f0   0e 16 20 5c 0e 16 30 5c  00 10 21 80 0d 0f 29 59   .. \..0\..!...)Y
27100   00 30 20 8c ff ff 00 00  85 00 29 58 02 a0 71 8c   .0 ......)X..q.
27110   01 a0 21 80 85 03 29 58  00 30 20 8c ff ff 00 00   ..!...)X.0 .....
27120   85 00 29 58 05 16 6e 5c  40 00 20 8c 10 00 29 3b   ..)X..n\@. ...);
27130   40 00 68 8c 08 00 00 06  0c e0 00 3d 00 00 38 8c   @.h........=..8.
27140   30 00 00 08 2c e0 08 3a  00 90 23 80 0c 20 11 3e   0...,...:..#.. .>
27150   00 00 38 8c 1c 00 00 08  00 90 23 80 81 09 21 59   ..8.......#...!Y
27160   84 c1 39 59 00 90 23 80  81 09 21 59 0e 00 71 59   ..9Y..#...!Y..qY
27170   07 16 20 5c 81 c9 39 59  58 3f 01 3c 9d 60 82 90   .. \..9YX?.<.`..
27180   10 d3 ff 09 10 16 78 5c  54 20 04 32 20 e0 03 32   ......x\T .2 ..2
27190   23 e0 23 80 18 20 01 30  04 e0 23 90 42 20 21 90   #.#.. .0..#.B !.
271a0   14 09 21 59 14 09 59 59  08 00 00 08 18 02 58 8c   ..!Y..YY......X.
271b0   00 30 20 8c ff ff 00 00  8b 00 21 58 04 16 40 5c   .0 ......!X..@\
271c0   0c 00 69 3b 0d 16 50 5c  08 00 00 08 08 16 50 5c   ..i;..P\......P\
271d0   00 30 20 8c ff ff 00 00  8a 00 69 58 0d 16 80 5c   .0 ......iX...\
271e0   00 00 00 0a 00 00 00 00  00 00 00 00 00 00 00 00   ................
271f0   11 16 38 5c 08 60 04 35  00 00 00 0a 00 d0 21 80   ..8\.`.5......!.
27200   08 20 19 30 00 00 00 0a  01 e0 19 80 82 c9 18 58   . .0...........X
27210   01 e0 19 82 06 e0 21 90  01 20 21 8c 06 e0 21 92   ......!.. !...!.
27220   07 16 80 5c 3c 00 00 08  00 00 00 00 00 00 00 00   ...\<...........
27230   40 d9 ff 08 b0 68 02 00  b0 68 02 00 b0 68 02 00   @....h...h...h..
27240   b4 68 02 00 b4 68 02 00  c4 68 02 00 e8 68 02 00   .h...h...h...h..
27250   00 69 02 00 00 69 02 00  00 69 02 00 14 69 02 00   .i...i...i...i..
27260   40 60 08 8c 10 16 60 5c  00 00 48 8c 50 e0 4f 92   @`....`\..H.P.O.
27270   09 16 40 5c 54 e0 47 92  06 20 24 90 14 20 09 33   ..@\T.G.. $.. .3
27280   06 20 23 90 01 09 21 59  06 20 23 92 00 00 00 0a   . #...!Y. #.....
27290   00 10 23 80 24 20 19 30  06 20 23 90 01 09 21 59   ..#.$ .0. #...!Y
272a0   06 20 23 92 01 00 20 8c  0c 16 80 5c 04 16 88 5c   . #... ....\...\
272b0   70 dd ff 09 00 00 00 0a  89 20 2b 90 06 20 23 90   p........ +.. #.
272c0   30 00 29 35 01 20 23 80  0c 20 09 37 01 20 23 80   0.)5. #.. .7. #.
272d0   20 20 11 30 dc cb fd 09  90 90 2a 74 55 20 23 90     .0......*tU #.
```

```
Mar 27 16:20 1996  image.txt Page 243

272e0   04 41 21 59 0c 20 01 3b  1d 20 23 88 19 20 23 8a   .A!Y. .;. #.. #.
272f0   89 20 4b 90 58 e0 4f 92  17 20 2b 88 19 20 23 88   . K.X.O.. +.. #.
27300   10 00 29 3b 17 20 4b 88  5c e0 4f 92 0c 00 00 08   ..);. K.\.O.....
27310   19 20 4b 88 5c e0 4f 92  58 e0 4f 90 5c e0 47 90   . K.\.O.X.O.\.G.
27320   09 00 2a 59 03 15 48 5c  60 e0 4f 92 13 20 23 90   ..*Y..H\`.O.. #.
27330   84 41 21 59 0c 20 01 3b  13 20 4b 90 60 e0 4f 92   .A!Y. .;. K.`.O.
27340   1f 20 2b 88 17 20 23 88  0c 00 29 3b 17 20 23 88   . +.. #...);. #.
27350   1f 20 23 8a 01 20 23 80  01 2f 01 5a b4 00 00 10   . #.. #../.Z....
27360   01 20 23 80 06 2f 01 5a  a8 00 00 17 1d 20 33 88   . #../.Z..... 3.
27370   0b 20 23 90 60 e0 4f 90  04 41 2a 59 00 30 20 8c   . #.`.O..A*Y.0 .
27380   ff ff 00 00 85 00 21 58  88 00 31 3e 00 10 23 80   ......!X..1>..#.
27390   10 20 11 30 89 20 2b 90  0b 20 23 90 40 00 29 35   . .0. +.. #.@.)5
273a0   01 20 23 80 14 20 29 30  13 20 23 90 60 e0 4f 90   . #.. )0. #.`.O.
273b0   89 01 21 59 5c 20 01 3b  0b 20 23 90 60 e0 4f 90   ..!Y\ .;. #.`.O.
273c0   04 41 2a 59 00 30 20 8c  ff ff 00 00 85 00 29 58   .A*Y.0 .......)X
273d0   1f 20 23 88 81 0d 21 59  38 00 29 3c 01 20 23 80   . #...!Y8.)<. #.
273e0   0c 20 29 30 0c 16 80 5c  28 de ff 09 01 20 eb 80   . )0...\(..... ..
273f0   04 4e ef 58 01 20 eb 82  1b 4e 27 59 1f 0c 21 59   .N.X. ...N'Y..!Y
27400   01 20 eb 80 01 0e 21 59  02 08 e9 65 01 20 eb 82   . ....!Y...e. ..
27410   01 20 23 80 20 20 09 30  0b 20 23 90 60 e0 4f 90   . #.  .0. #.`.O.
27420   84 41 22 59 10 20 01 3c  01 20 eb 80 01 4e ef 58   .A"Y. .<. ...N.X
27430   01 20 eb 82 01 20 23 80  34 20 09 37 01 20 23 80   . ... #.4 .7. #.
27440   2c 20 11 37 01 20 23 80  24 20 19 37 01 20 23 80   , .7. #.$ .7. #.
27450   1c 20 01 37 01 20 23 80  14 20 21 37 06 20 23 90   . .7. #.. !7. #.
27460   01 09 21 59 06 20 23 92  00 00 00 0a 01 20 23 80   ..!Y. #...... #.
27470   10 20 11 30 01 20 eb 80  01 4e ef 58 01 20 eb 82   . .0. ...N.X. ..
27480   89 20 53 90 29 20 6b 90  00 00 58 8c 01 20 23 80   . S.) k...X.. #.
27490   78 20 09 30 89 20 2b 90  0b 20 23 90 6c 00 29 32   x .0. +.. #.l.)2
274a0   91 20 23 88 08 20 09 30  01 a0 52 8c 40 60 03 32   . #.. .0..R.@`.2
274b0   0b 20 2b 90 1a 60 23 90  0a 00 21 59 84 41 21 59   . +..`#...!Y.A!Y
274c0   2c 20 01 39 1a 60 23 90  0a 00 51 59 00 50 23 90   , .9.`#...QY.P#.
274d0   04 16 68 5c 18 20 01 32  0b 20 2b 90 1a 60 23 90   ..h\. .2. +..`#.
274e0   0a 00 21 59 84 41 21 59  dc 3f 01 3e 1c 60 03 32   ..!Y.A!Y.?.>.`.2
274f0   0b 20 23 90 84 81 22 59  10 20 01 3e 0b 20 23 90   . #..."Y. .>. #.
27500   0a 01 59 59 0b 20 53 90  01 20 23 80 14 20 09 37   ..YY. S.. #.. .7
27510   01 20 23 80 0c 20 11 37  01 20 23 80 3c 20 21 30   . #.. .7. #.< !0
27520   35 20 83 8c ac 09 00 09  45 20 83 8c a4 09 00 09   5 ......E ......
27530   00 10 eb 80 07 4e ef 58  00 10 eb 82 18 4e 27 59   .....N.X.....N'Y
27540   1f 0c 21 59 00 10 eb 80  06 0e 29 59 40 00 20 8c   ..!Y......)Y@. .
27550   04 40 e9 65 00 10 eb 82  14 00 48 8c 64 e0 4f 92   .@.e......H.d.O.
```

```
Mar 27 18:20 1996  image.txt Page 246

27560   91 20 23 88 1c 20 09 30  64 e0 4f 90 04 60 2a 8c   . #.. .0d.O..`*.
27570   00 30 20 8c ff ff 00 00  85 00 49 58 64 e0 4f 92   .0 .......IXd.O.
27580   01 20 23 80 10 20 11 37  01 20 23 80 01 2f 01 5a   . #.. ./. #../.Z
27590   c8 00 00 10 1a 20 23 88  04 16 78 5c 0a 00 29 59   ..... #...x\..)Y
275a0   13 20 23 90 84 41 21 59  18 20 01 3b 13 20 23 90   . #..A!Y. .;. #.
275b0   0a 01 29 59 00 30 20 8c  ff ff 00 00 85 00 79 58   ..)Y.0 .......yX
275c0   0a c0 23 59 60 e0 4f 90  89 01 21 59 18 20 01 3b   ..#Y`.O...!Y. .;
275d0   60 e0 4f 90 0a 41 2a 59  00 30 20 8c ff ff 00 00   `.O..A*Y.0 .....
275e0   85 00 79 58 91 20 23 88  20 20 01 30 0a c0 2b 59   ..yX. #.  .0..+Y
275f0   13 20 23 90 14 00 29 35  01 c9 2b 59 00 30 20 8c   . #...)5..+Y.0 .
27600   ff ff 00 00 85 00 79 58  91 20 23 88 1c 20 09 30   ......yX. #.. .0
27610   89 20 23 90 14 00 51 35  01 c9 2b 59 00 30 20 8c   . #...Q5..+Y.0 .
27620   ff ff 00 00 85 00 79 58  20 e0 03 3d 91 20 23 88   ......yX ..=. #.
27630   84 d0 20 58 14 20 01 3d  17 20 23 88 80 28 01 5a   .. X. .=. #..(.Z
27640   e0 03 00 15 01 00 78 8c  01 20 eb 80 04 4e ef 58   ......x.. ...N.X
27650   01 20 eb 82 20 00 00 08  01 20 23 80 14 20 21 30   . .. .... #.. !0
27660   01 00 78 8c 89 20 23 90  01 09 51 59 08 00 00 08   ..x.. #...QY....
27670   00 00 78 8c 64 e0 4f 90  89 c0 2b 59 00 30 20 8c   ..x.d.O...+Y.0 .
27680   ff ff 00 00 85 00 29 58  05 16 40 5c 68 e0 47 92   ......)X..@\h.G.
27690   00 00 20 8c 05 16 80 5c  04 16 88 5c e4 25 00 09   .. ....\...\.%..
276a0   10 16 48 5c 6c e0 4f 92  00 28 04 5a 74 03 00 12   ..H\l.O..(.Zt...
276b0   6c e0 4f 90 16 60 32 90  06 16 70 5c 16 60 22 90   l.O..`2...p\.`".
276c0   64 e0 47 90 04 00 4a 59  70 e0 4f 92 85 20 2b 8c   d.G...JYp.O.. +.
276d0   14 00 20 8c 06 16 80 5c  05 16 88 5c 04 16 90 5c   .. ....\...\...\
276e0   c8 9e fd 0b 04 a0 51 92  0c a0 21 88 58 20 29 30   ......Q...!.X )0
276f0   0f 20 23 90 8a 01 21 59  40 20 01 39 0f 20 23 90   . #...!Y@ .9. #.
27700   0a 01 29 59 00 30 20 8c  ff ff 00 00 14 00 29 33   ..)Y.0 .......)3
27710   0f 20 23 90 0a 01 49 59  74 e0 4f 92 10 00 00 08   . #...IYt.O.....
27720   00 30 48 8c ff ff 00 00  74 e0 4f 92 74 e0 4f 90   .0H.....t.O.t.O.
27730   12 a0 4b 8a 10 00 00 08  0c a0 23 88 05 0e 21 58   ..K.......#...!X
27740   0c a0 23 8a 0c a0 23 88  10 20 09 30 0c 16 80 5c   ..#...#.. .0...\
27750   0e 16 88 5c 6c 03 00 09  00 68 03 5a e4 00 00 12   ...\l....h.Z....
27760   00 e8 03 5a dc 00 00 12  00 00 38 8c 1a 60 23 90   ...Z......8..`#.
27770   0b 01 29 59 05 16 18 5c  87 c1 23 59 05 20 01 5a   ..)Y...\..#Y. .Z
27780   00 00 20 26 04 16 48 5c  78 e0 4f 92 08 20 01 3d   .. &..H\x.O.. .=
27790   87 c1 1b 59 70 e0 4f 90  09 c0 29 59 16 60 23 90   ...Yp.O...)Y.`#.
277a0   04 c0 22 59 05 16 80 5c  04 16 88 5c 03 16 90 5c   .."Y...\...\...\
277b0   f8 9d fd 0b 07 c0 28 59  00 30 20 8c ff ff 00 00   ......(Y.0 .....
277c0   85 00 39 58 78 e0 47 90  18 20 02 3a 0c 60 23 88   ..9Xx.G.. .:.`#.
277d0   10 20 69 30 0c a0 23 88  83 09 21 58 0c a0 23 8a   . i0..#...!X..#.
```

Mar 27 18:20 1996 image.txt Page 247

```
277e0   10 c0 3b 3a 00 00 58 8c  00 50 6b 90 60 ff ff 08   ..;:..X..Pk.....
277f0   78 e0 4f 90 10 60 02 3a  00 50 23 90 04 16 88 5c   x.O..`.:.P#....\
27800   2c 20 01 32 78 e0 4f 90  10 60 02 3a 00 c0 48 8c   , .2x.O..`.:..H.
27810   7c e0 4f 92 0c 00 00 08  0b c0 48 59 7c e0 4f 92   |.O.......HY|.O.
27820   7c e0 4f 90 09 16 58 5c  18 00 00 08 00 10 23 80   |.O...X\......#.
27830   10 20 01 30 0c a0 23 88  83 09 21 58 0c a0 23 8a   . .0..#...!X..#.
27840   29 20 23 90 10 20 01 32  0c a0 23 88 00 0e 21 58   ) #.. .2..#...!X
27850   0c a0 23 8a 0a c0 53 59  0c a0 23 88 14 20 09 30   ..#...SY..#.. .0
27860   13 20 23 90 84 81 22 59  08 20 01 3e 01 a0 52 8c   . #..."Y. .>..R.
27870   0c a0 23 88 14 20 01 30  13 20 23 90 84 81 22 59   ..#.. .0. #..."Y
27880   08 20 01 3e 01 a0 52 8c  0b 20 23 90 84 81 22 59   . .>..R.. #..."Y
27890   34 20 01 3b 01 20 23 80  20 20 09 30 5d 20 23 90   4 .;. #.  .0] #.
278a0   18 20 01 35 0c c5 fd 09  90 90 22 74 5d 20 23 92   . .5......"t] #.
278b0   0b 20 23 90 61 20 23 92  0b 20 53 92 01 00 48 8c   . #.a #.. S...H.
278c0   54 e0 4f 92 0e 16 80 5c  d8 d2 ff 09 68 e0 4f 90   T.O....\....h.O.
278d0   09 16 80 5c ac 18 ff 09  4a e0 87 8a 9d 20 23 90   ...\....J.... #.
278e0   44 e0 27 92 99 20 23 90  40 e0 27 92 00 00 20 8c   D.'.. #.@.'... .
278f0   48 e0 27 82 06 00 20 8c  49 e0 27 82 14 e0 03 30   H.'... .I.'....0
27900   00 00 28 8c 70 e0 4f 90  09 c0 23 59 00 10 29 82   ..(.p.O...#Y..).
27910   40 e0 2f 8c 06 00 20 8c  05 16 80 5c 04 16 88 5c   @./... ....\...\
27920   f0 18 ff 09 00 30 20 8c  ff ff 00 00 90 00 21 58   .....0 .......!X
27930   10 0e 21 59 90 0d 21 59  10 a0 23 8a 68 e0 4f 90   ..!Y..!Y..#.h.O.
27940   01 60 22 8c 81 0d 21 59  0e 16 80 5c 04 16 88 5c   .`"...!Y...\...\
27950   c0 18 ff 09 00 30 20 8c  ff ff 00 00 90 00 21 58   .....0 .......!X
27960   10 0e 21 59 90 0d 29 59  00 30 20 8c ff ff 00 00   ..!Y..)Y.0 .....
27970   04 42 21 58 10 a0 23 8a  6c e0 47 90 1a 20 4a 92   .B!X..#.l.G.. J.
27980   06 00 30 8c 9d 20 2b 90  99 20 23 90 08 16 80 5c   ..0.. +.. #....\
27990   06 16 88 5c 05 16 90 5c  04 16 98 5c 64 25 00 09   ...\...\...\d%..
279a0   01 20 23 80 10 20 11 30  54 e0 4f 90 08 60 02 3d   . #.. .0T.O..`.=
279b0   18 e0 03 3d 00 30 20 90  f4 09 06 10 01 20 21 8c   ...=.0 ...... !.
279c0   00 30 20 92 f4 09 06 10  01 20 23 80 1c 20 11 30   .0 ...... #.. .0
279d0   18 e0 03 3a 00 30 20 90  f8 09 06 10 01 20 21 8c   ...:.0 ...... !.
279e0   00 30 20 92 f8 09 06 10  01 20 eb 80 00 4e ef 58   .0 ...... ...N.X
279f0   01 20 eb 82 50 e0 4f 90  01 60 4a 8c 50 e0 4f 92   . ..P.O..`J.P.O.
27a00   20 e0 03 32 01 20 23 80  18 20 09 30 0b 20 23 90    ..2. #.. .0. #.
27a10   60 e0 4f 90 84 41 22 59  80 28 01 5a 3c fb ff 14   `.O..A"Y.(.Z<...
27a20   01 20 23 80 14 20 05 37  01 20 23 80 0c 20 11 37   . #.. .7. #.. .7
27a30   01 20 23 80 24 20 21 30  00 30 20 8c 60 7b 02 00   . #.$ !0.0 .`{..
27a40   3d 20 23 92 35 20 2b 8c  69 20 23 90 05 16 80 5c   = #.5 +.i #....\
27a50   04 16 88 5c 7c 03 00 09  01 20 eb 80 03 4e ef 58   ...\|.... ...N.X
```

```
Mar 27 18:20 1996  image.txt Page 248

27a60   01 20 eb 82 1c 4e 27 59  1f 0c 21 59 01 20 eb 80   . ...N'Y..!Y. ..
27a70   02 0e 21 59 04 08 e9 65  01 20 eb 82 1d 4e 27 59   ..!Y...e. ...N'Y
27a80   1f 0c 21 59 01 20 eb 80  01 0e 21 59 02 08 e9 65   ..!Y. ....!Y...e
27a90   01 20 eb 82 1c c4 10 09  90 90 2a 74 69 20 23 90   . ........*ti #.
27aa0   05 00 21 59 55 20 23 92  06 20 23 90 01 09 21 59   ..!YU #.. #...!Y
27ab0   06 20 23 92 00 00 00 0a  00 00 00 00 00 00 00 00   . #.............
27ac0   10 16 70 5c 11 16 78 5c  00 10 24 80 08 20 19 30   ..p\..x\..$.. .0
27ad0   00 00 00 0a 9d a0 83 90  b8 c9 ff 09 10 16 38 5c   ..............8\
27ae0   20 20 04 32 23 e0 21 80  16 20 01 30 04 e0 21 90     .2#.!.. .0..!.
27af0   42 20 21 90 14 09 21 59  14 09 19 59 08 00 00 08   B !...!Y...Y....
27b00   16 02 18 8c 00 30 20 8c  ff ff 00 00 83 00 31 58   .....0 .......1X
27b10   00 30 28 8c ff 0f ff ff  0c e0 23 88 84 40 21 58   .0(.......#..@!X
27b20   0c e0 23 8a 00 30 28 8c  00 60 00 00 0c e0 23 88   ..#..0(..`....#.
27b30   84 43 21 58 0c e0 23 8a  02 00 20 8c 14 e0 23 82   .C!X..#... ...#.
27b40   04 00 20 8c 15 e0 23 82  88 8d 21 59 16 e0 23 82   .. ...#...!Y..#.
27b50   ff 00 20 8c 86 00 21 58  17 e0 23 82 00 00 00 0a   .. ...!X..#.....
27b60   11 16 70 5c 08 60 04 35  00 00 00 0a 00 90 23 80   ..p\.`.5......#.
27b70   08 20 19 30 00 00 00 0a  06 a0 23 90 01 20 21 8c   . .0......#.. !.
27b80   06 a0 23 92 bd a0 23 90  44 20 01 32 02 a0 23 90   ..#...#.D .2..#.
27b90   03 09 21 59 04 16 78 5c  34 20 01 3b bd a0 3b 90   ..!Y..x\4 .;..;.
27ba0   0e 16 80 5c 0f 16 88 5c  00 d0 01 86 20 20 14 3d   ...\...\....  .=
27bb0   06 a0 23 90 01 09 21 59  06 a0 23 92 03 00 20 8c   ..#...!Y..#... .
27bc0   0e 16 80 5c 04 16 88 5c  58 d4 ff 08 02 a0 2b 90   ...\...\X.....+.
27bd0   01 60 21 8c 02 a0 23 92  48 60 01 35 17 a0 2b 88   .`!...#.H`.5..+.
27be0   19 a0 23 88 0c 00 29 3b  17 a0 33 88 08 00 00 08   ..#...);..3.....
27bf0   19 a0 33 88 81 8d 21 59  1b a0 23 8a 1b a0 2b 88   ..3...!Y..#...+.
27c00   1d a0 23 88 01 0f 21 59  10 00 29 3b 1d a0 23 88   ..#...!Y..);..#.
27c10   01 0f 21 59 1b a0 23 8a  1d a0 23 88 19 a0 23 8a   ..!Y..#...#...#.
27c20   00 00 20 8c 5d a0 23 92  69 a0 23 90 01 0e 29 59   .. .].#.i.#...)Y
27c30   69 a0 2b 92 00 30 20 8c  80 a9 03 00 10 00 29 36   i.+..0 .......)6
27c40   00 30 20 8c 80 a9 03 00  69 a0 23 92 01 a0 1b 80   .0 .....i.#.....
27c50   82 c9 18 58 01 a0 1b 82  0e 16 80 5c 04 f6 ff 08   ...X.......\....
27c60   00 00 20 8c 00 30 20 92  34 0a 06 10 00 00 00 0a   .. ..0 .4.......
27c70   00 30 20 8c ff ff ff ff  04 20 24 92 00 00 00 0a   .0 ...... $.....
27c80   30 c2 fd 09 90 90 2a 74  05 16 30 5c 00 30 20 90   0.....*t..0\.0 .
27c90   30 0a 06 10 04 41 39 59  00 30 20 90 34 0a 06 10   0....A9Y.0 .4...
27ca0   04 16 18 5c 30 20 01 32  04 e0 20 90 28 00 39 36   ...\0 .2.. .(.96
27cb0   04 e0 20 90 04 c1 39 59  00 00 20 8c 04 e0 20 92   .. ...9Y.. ... .
27cc0   00 d0 20 90 04 16 18 5c  0c 20 01 32 04 e0 20 90   .. ....\. .2.. .
27cd0   e0 1f 39 31 14 e0 00 32  10 e0 01 33 04 e0 20 90   ..91...2...3.. .
```

Mar 27 18:20 1996 image.txt Page 245

```
27ce0   07 01 21 59 04 e0 20 92  00 30 30 92 30 0a 06 10   ..!Y.. ..00.0...
27cf0   00 00 00 0a 00 00 00 00  00 00 00 00 00 00 00 00   ................
27d00   00 30 20 90 34 0a 06 10  7c 20 01 32 74 ff ff 09   .0 .4...| .2t...
27d10   00 30 20 90 34 0a 06 10  04 20 21 90 04 30 00 5a   .0 .4.... !..0.Z
27d20   00 00 20 22 60 20 01 3a  00 30 28 90 34 0a 06 10   .. "` .:.0(.4...
27d30   00 50 21 90 00 30 20 92  34 0a 06 10 00 30 20 8c   .P!..0 .4....0 .
27d40   ff ff ff ff 04 60 21 92  0c 60 21 90 08 60 19 90   .....`!..`!..`..
27d50   05 16 80 5c 04 16 88 5c  00 d0 00 88 00 30 20 90   ...\...\.....0 .
27d60   34 0a 06 10 20 20 01 32  18 ff ff 09 00 30 20 90   4...  .2.....0 .
27d70   34 0a 06 10 04 20 21 90  04 30 00 5a 00 00 20 22   4.... !..0.Z.. "
27d80   a8 3f 01 3a 00 30 20 90  34 0a 06 10 08 20 01 35   .?.:.0 .4.... .5
27d90   00 00 00 0a 00 30 20 90  34 0a 06 10 04 20 29 90   .....0 .4.... ).
27da0   d0 07 20 8c 85 00 29 70  e8 03 20 8c 84 45 29 70   .. ...)p.. ..E)p
27db0   00 30 20 8c 00 7d 02 00  05 16 80 5c 04 16 88 5c   .0 ..}.....\...\
27dc0   a0 15 ff 08 00 00 00 00  00 00 00 00 00 00 00 00   ................
27dd0   10 16 78 5c 11 16 38 5c  08 20 04 35 00 00 00 0a   ..x\..8\. .5....
27de0   08 e0 23 90 08 20 01 35  00 00 00 0a 04 e0 2b 90   ..#.. .5......+.
27df0   00 30 20 8c ff ff ff ff  0c 00 29 32 0f 16 80 5c   .0 .......)2...\
27e00   d0 00 00 09 7c fe ff 09  04 e0 3b 92 00 30 18 8c   ....|.....;..0..
27e10   34 0a 06 10 00 30 20 90  34 0a 06 10 48 20 01 32   4....0 .4...H .2
27e20   00 d0 20 90 04 20 29 90  04 e0 23 90 38 00 29 31   .. .. )...#.8.)1
27e30   00 d0 20 90 04 20 29 90  04 e0 23 90 05 01 21 59   .. .. )...#...!Y
27e40   04 e0 23 92 00 d0 20 90  04 16 18 5c 00 10 21 90   ..#... ....\..!.
27e50   14 20 01 32 00 d0 20 90  04 20 29 90 04 e0 23 90   . .2.. .. )...#.
27e60   d0 1f 29 36 00 d0 20 90  00 d0 23 92 00 d0 78 92   ..)6.. ...#...x.
27e70   00 d0 23 90 18 20 01 32  04 e0 33 90 00 d0 2b 90   ..#.. .2..3...+.
27e80   04 60 21 90 06 01 21 59  04 60 21 92 00 30 20 90   .`!...!Y.`!..0 .
27e90   34 0a 06 10 08 00 79 32  00 00 00 0a 00 30 20 90   4.....y2.....0 .
27ea0   34 0a 06 10 04 20 29 90  d0 07 20 8c 85 00 29 70   4.... )... ...)p
27eb0   e8 03 20 8c 84 45 29 70  00 30 20 8c 00 7d 02 00   .. ..E)p.0 ..}..
27ec0   05 16 80 5c 04 16 88 5c  98 14 ff 08 00 00 00 00   ...\...\........
27ed0   10 16 78 5c 00 30 38 8c  34 0a 06 10 00 30 20 90   ..x\.08.4....0 .
27ee0   34 0a 06 10 10 20 01 5a  00 00 18 22 08 20 04 35   4.... .Z...". .5
27ef0   00 00 00 0a 04 e0 2b 90  00 30 20 8c ff ff ff ff   ......+..0 .....
27f00   08 00 29 35 00 00 00 0a  78 fd ff 09 00 d0 23 90   ..)5....x.....#.
27f10   18 20 01 32 04 e0 33 90  00 d0 2b 90 04 60 21 90   . .2..3...+..`!.
27f20   04 80 21 59 04 60 21 92  00 d0 21 90 24 20 01 32   ..!Y.`!...!.$ .2
27f30   00 d0 21 90 1c c0 23 32  00 d0 21 90 04 16 38 5c   ..!...#2..!...8\
27f40   00 10 21 90 0c 20 01 32  00 d0 21 90 ec df 23 35   ..!.. .2..!...#5
27f50   00 d0 21 90 0c 20 01 32  00 d0 23 90 00 d0 21 92   ..!.. .2..#...!.
```

Mar 27 18:20 1996 image.txt Page 250

```
27f60   00 30 20 8c ff ff ff ff  04 e0 23 92 08 e0 00 3d   .0 .......#....=
27f70   00 00 00 0a 00 30 20 90  34 0a 06 10 08 20 01 35   .....0 .4.... .5
27f80   00 00 00 0a 00 30 20 90  34 0a 06 10 04 20 21 90   .....0 .4.... !.
27f90   08 20 01 34 00 00 00 0a  00 30 20 90 34 0a 06 10   . .4.....0 .4...
27fa0   04 20 29 90 d0 07 20 8c  85 00 29 70 e8 03 20 8c   . )... ...)p.. .
27fb0   84 45 29 70 00 30 20 8c  00 7d 02 00 05 16 80 5c   .E)p.0 ..}.....\
27fc0   04 16 88 5c 9c 13 ff 08  00 00 00 00 00 00 00 00   ...\............
27fd0   08 20 84 8c ac 1c 00 09  10 16 38 5c 0c 20 04 35   . ........8\. .5
27fe0   00 00 80 8c 00 00 00 0a  16 e0 21 90 08 20 21 8c   ..........!.. !.
27ff0   16 e0 21 92 1a e0 21 90  08 09 21 59 1a e0 21 92   ..!...!...!Y..!.
28000   07 16 80 5c 00 00 00 0a  00 00 00 00 00 00 00 00   ...\............
28010   08 60 8c 8c cc 1c 00 09  10 16 38 5c 0c 20 04 35   .`........8\. .5
28020   00 00 80 8c 00 00 00 0a  16 e0 21 90 08 20 21 8c   ..........!.. !.
28030   16 e0 21 92 1a e0 21 90  08 09 21 59 1a e0 21 92   ..!...!...!Y..!.
28040   07 16 80 5c 00 00 00 0a  00 00 00 00 00 00 00 00   ...\............
28050   00 30 20 8c ff ff 00 00  90 00 19 58 01 00 38 8c   .0 ........X..8.
28060   11 16 30 5c 12 16 28 5c  13 16 20 5c 03 16 80 5c   ..0\..(\.. \...\
28070   07 16 88 5c 06 16 90 5c  05 16 98 5c 04 16 a0 5c   ...\...\...\...\
28080   20 00 00 09 00 30 20 8c  ff ff 00 00 90 00 81 58    ....0 ........X
28090   00 00 00 0a 00 00 00 00  00 00 00 00 00 00 00 00   ................
280a0   00 30 20 8c ff ff 00 00  90 00 29 58 05 16 68 5c   .0 .......)X..h\
280b0   91 00 71 58 12 16 78 5c  13 16 30 5c 14 16 38 5c   ..qX..x\..0\..8\
280c0   2c 60 01 3d 00 30 28 88  1c 24 06 10 01 60 21 8c   ,`.=.0(..$...`!.
280d0   00 30 20 8a 1c 24 06 10  05 16 68 5c 05 16 80 5c   .0 ..$....h\...\
280e0   70 05 00 09 e0 3f 04 35  38 00 00 08 00 00 18 8c   p....?.58.......
280f0   30 a0 03 3b 8d c0 80 59  58 05 00 09 0c 20 04 32   0..;...YX.... .2
28100   00 00 80 8c 00 00 00 0a  01 e0 28 8c 00 30 20 8c   ..........(..0 .
28110   ff ff 00 00 85 00 21 58  04 16 18 5c d8 9f 23 3c   ......!X...\..#<
28120   0d 16 80 5c 0e 16 88 5c  0f 16 90 5c 06 16 98 5c   ...\...\...\...\
28130   07 16 a0 5c 1c 04 00 09  0d 16 80 5c 00 00 00 0a   ...\.......\....
28140   00 30 20 8c ff ff 00 00  90 00 81 58 74 04 00 08   .0 ........Xt...
28150   10 60 08 8c 10 16 60 5c  11 16 68 5c 12 16 70 5c   .`....`\..h\..p\
28160   13 16 58 5c 00 30 20 90  d0 09 06 10 01 20 21 8c   ..X\.0 ...... !.
28170   00 30 20 92 d0 09 06 10  16 20 24 90 04 16 78 5c   .0 ...... $...x\
28180   04 20 81 88 fc 0f ff 09  00 30 20 8c ff ff 00 00   . .......0 .....
28190   90 00 29 58 05 16 38 5c  1a 20 23 90 24 00 29 36   ..)X..8\. #.$.)6
281a0   00 30 20 90 d6 09 06 10  01 20 21 8c 00 30 20 92   .0 ...... !..0 .
281b0   d8 09 06 10 0c 16 80 5c  b8 c9 ff 09 00 00 00 0a   .......\........
281c0   06 e0 23 88 00 28 01 5a  bc 00 00 12 10 e0 01 30   ..#..(.Z.......0
281d0   00 00 28 8c 0f c0 21 59  00 10 29 c2 01 e0 21 8c   ..(...!Y..)...!.
```

Mar 27 16:20 1996 image.txt Page 251

```
281e0   01 0c 21 59 0f 16 80 5c  04 16 88 5c 24 10 ff 09   ..!Y...\...\$...
281f0   00 30 20 8c ff ff 00 00  90 00 21 58 10 0e 21 59   .0 .......!X..!Y
28200   90 0d 01 59 40 e0 6f 92  44 e0 77 92 00 00 20 8c   ...Y@.o.D.w... .
28210   48 e0 27 82 11 00 20 8c  49 e0 27 82 04 e0 23 88   H.'... .I.'...#.
28220   4a e0 27 8a 40 e0 2f 8c  06 00 20 8c 05 16 80 5c   J.'.@./... ....\
28230   04 16 88 5c dc 0f ff 09  00 30 20 8c ff ff 00 00   ...\.....0 .....
28240   90 00 21 58 10 0e 21 59  90 0d 21 59 06 00 21 59   ..!X..!Y..!Y..!Y
28250   01 20 29 8c 00 30 20 8c  fe ff 00 00 85 00 21 58   . )..0 .......!X
28260   24 20 01 32 00 30 20 90  d8 09 06 10 01 20 21 8c   $ .2.0 ...... !.
28270   00 30 20 92 d8 09 06 10  0c 16 80 5c f4 c8 ff 09   .0 ........\....
28280   00 00 00 0a 0f 16 80 5c  78 02 00 09 16 20 23 90   .......\x.... #.
28290   08 20 21 8c 16 20 23 92  08 c9 21 59 1a 20 23 92   . !.. #...!Y. #.
282a0   02 e0 83 88 ac 03 00 09  10 16 18 5c 3c 20 04 32   ...........\< .2
282b0   08 e0 20 90 28 20 01 32  00 d0 2b 88 10 e0 20 90   .. .( .2..+... .
282c0   08 e0 e8 90 0c 16 80 5c  0d 16 88 5c 05 16 90 5c   .......\...\...\
282d0   04 16 98 5c 00 50 07 86  00 00 00 0a 0c 16 80 5c   ...\.P.........\
282e0   90 c8 ff 09 00 00 00 0a  00 30 20 90 d4 09 06 10   .........0 .....
282f0   01 20 21 8c 00 30 20 92  d4 09 06 10 0c 20 23 88   . !..0 ...... #.
28300   84 d0 20 58 10 20 01 3a  0c 16 80 5c 64 c8 ff 09   .. X. .:...\d...
28310   00 00 00 0a 0f 16 80 5c  e8 01 00 09 03 00 20 8c   .......\...... .
28320   0d 16 80 5c 0b 16 88 5c  04 16 90 5c 14 17 00 09   ...\...\...\....
28330   0c 16 80 5c 3c c8 ff 09  00 00 00 0a 00 00 00 00   ...\<...........
28340   10 16 70 5c 11 16 78 5c  16 20 24 90 04 16 30 5c   ..p\..x\. $...0\
28350   04 16 80 5c ac 01 00 09  00 10 81 88 f4 02 00 09   ...\............
28360   10 16 38 5c 28 20 04 32  0c e0 21 90 20 20 01 32   ..8\( .2..!.  .2
28370   02 a0 29 88 10 e0 21 90  0c e0 19 90 0f 16 80 5c   ..)...!........\
28380   05 16 88 5c 04 16 90 5c  00 d0 00 86 0e 16 80 5c   ...\...\.......\
28390   e0 c7 ff 08 00 00 00 00  00 00 00 00 00 00 00 00   ................
283a0   10 60 08 8c 10 16 60 5c  11 16 68 5c 12 16 70 5c   .`....`\..h\..p\
283b0   13 16 78 5c 00 30 20 90  dc 09 06 10 01 20 21 8c   ..x\.0 ...... !.
283c0   00 30 20 92 dc 09 06 10  16 20 24 90 08 09 21 59   .0 ...... $...!Y
283d0   16 20 24 92 16 20 34 90  1a 20 24 90 08 20 21 8c   . $.. 4.. $.. !.
283e0   1a 20 24 92 1a 20 24 90  04 16 38 5c 10 20 01 30   . $.. $...8\. .0
283f0   00 00 28 8c 06 c0 21 59  00 10 29 c2 04 a0 39 8a   ..(...!Y..)...9.
28400   00 90 79 8a 02 a0 71 8a  06 16 80 5c f4 00 00 09   ..y...q....\....
28410   04 20 23 90 0c 20 01 32  04 20 1b 90 24 00 00 08   . #.. .2. ..$...
28420   0d 16 80 5c 6c c0 ff 09  10 16 58 5c 10 20 04 35   ...\l.....X\. .5
28430   0c 16 80 5c 3c c7 ff 09  00 00 00 0a 04 e0 1a 90   ...\<...........
28440   16 e0 20 90 40 e0 27 92  44 e0 6f 92 00 00 20 8c   .. .@.'.D.o... .
28450   48 e0 27 82 11 00 20 8c  49 e0 27 82 04 a0 21 88   H.'... .I.'...!.
```

```
Mar 27 16:20 1996  image.txt Page 252

28460   4a e0 27 8a 40 e0 2f 8c  06 00 20 8c 05 16 80 5c   J.'.@./... ....\
28470   04 16 88 5c 9c 0d ff 09  00 30 20 8c ff ff 00 00   ...\.....0 .....
28480   90 00 21 58 10 0e 21 59  90 0d 21 59 06 a0 21 8a   ..!X..!Y..!Y..!.
28490   01 e0 21 8c 81 0d 21 59  06 16 80 5c 04 16 88 5c   ..!...!Y...\....
284a0   70 0d ff 09 00 30 20 8c  ff ff 00 00 90 00 21 58   p....0 .......!X
284b0   10 0e 21 59 90 0d 29 59  00 30 20 8c ff ff 00 00   ..!Y..)Y.0 .....
284c0   04 42 21 58 06 a0 21 8a  06 a0 21 88 10 20 01 3d   .B!X..!...!.. .=
284d0   00 30 20 8c ff ff 00 00  06 a0 21 8a 11 00 20 8c   .0 .......!... .
284e0   0c 16 80 5c 04 16 88 5c  0d 16 90 5c 04 1a 00 09   ...\...\...\....
284f0   00 00 00 0a 00 00 00 00  00 00 00 00 00 00 00 00   ................
28500   10 16 20 5c 00 10 84 88  78 0c ff 09 00 10 81 8a   .. \....x.......
28510   02 20 81 88 6c 0c ff 09  02 20 81 8a 04 20 81 88   . ..l.... ... ..
28520   60 0c ff 09 04 20 81 8a  06 20 81 88 54 0c ff 09   `.... ... ..T...
28530   06 20 81 8a 00 00 00 0a  00 00 00 00 00 00 00 00   . ..............
28540   00 00 20 8c 00 30 20 92  40 0a 06 10 00 00 00 0a   .. ..0 .@.......
28550   00 30 20 8c ff ff 00 00  90 00 71 58 91 00 79 58   .0 .......qX..yX
28560   12 16 28 5c 13 16 30 5c  14 16 38 5c 14 00 80 8c   ..(\..0\..8\....
28570   60 0d ff 09 10 16 18 5c  10 20 04 35 00 30 80 8c   `......\. .5.0..
28580   ff ff ff ff 00 00 00 0a  04 e0 70 8a 06 e0 78 8a   ..........p...x.
28590   08 e0 28 92 0c e0 30 92  10 e0 38 92 00 30 20 90   ..(...0...8..0 .
285a0   40 0a 06 10 00 d0 20 92  00 30 18 92 40 0a 06 10   @..... ..0..@...
285b0   00 00 80 8c 00 00 00 0a  00 00 00 00 00 00 00 00   ................
285c0   00 30 20 8c ff ff 00 00  90 00 31 58 00 30 18 90   .0 .......1X.0..
285d0   40 0a 06 10 00 30 20 90  40 0a 06 10 34 20 01 32   @....0 .@...4 .2
285e0   00 30 20 90 40 0a 06 10  04 20 21 88 24 80 21 3d   .0 .@.... !.$.!=
285f0   00 30 28 90 40 0a 06 10  05 16 38 5c 00 50 21 90   .0(.@.....8\.P!.
28600   00 30 20 92 40 0a 06 10  05 16 80 5c 24 0d ff 08   .0 .@......\$...
28610   00 30 20 90 40 0a 06 10  04 16 38 5c 08 20 01 35   .0 .@.....8\. .5
28620   00 00 00 0a 04 e0 21 88  14 80 21 3d 00 d0 21 90   ......!...!=..!.
28630   00 d0 20 92 07 16 80 5c  f8 0c ff 08 07 16 18 5c   .. ....\.......\
28640   00 d0 21 90 04 16 38 5c  dc 3f 01 35 00 00 00 0a   ..!...8\.?.5....
28650   00 30 20 8c ff ff 00 00  90 00 39 58 00 30 20 90   .0 .......9X.0 .
28660   40 0a 06 10 04 16 18 5c  30 20 01 32 04 e0 20 88   @......\0 .2.. .
28670   1c c0 21 39 04 e0 28 88  06 e0 20 88 85 00 21 59   ..!9..(... ...!Y
28680   0c 00 39 3b 03 16 80 5c  00 00 00 0a 00 d0 20 90   ..9;...\...... .
28690   04 16 18 5c d8 3f 01 35  00 00 80 8c 00 00 00 0a   ...\.?.5........
286a0   00 30 20 8c ff ff 00 00  90 00 71 58 00 00 38 8c   .0 .......qX..8.
286b0   00 30 18 8c ff ff ff ff  00 30 20 90 40 0a 06 10   .0.......0 .@...
286c0   0c 20 01 35 00 00 80 8c  00 00 00 0a 0e 16 80 5c   . .5...........\
286d0   80 ff ff 09 10 16 78 5c  2c 20 04 32 04 e0 2b 88   ......x\, .2..+.
```

```
Mar 27 18:20 1996  image.txt Page 253

286e0   01 a0 23 8c 20 00 29 39  01 a0 33 8c 04 e0 2b 88   ..#. .)9..3...+.
286f0   06 e0 23 88 85 00 21 59  0c 00 31 3b 01 a0 83 8c   ..#...!Y..1;....
28700   00 00 00 0a 00 30 20 90  40 0a 06 10 04 16 78 5c   .....0 .@.....x\
28710   44 20 01 32 04 e0 2b 88  06 e0 23 88 85 00 21 59   D ..2..+...#...!Y
28720   81 09 21 59 24 00 71 3b  04 e0 2b 88 06 e0 23 88   ..!Y$.q;..+...#.
28730   85 00 21 59 14 c0 20 33  04 e0 2b 88 06 e0 23 88   ..!Y.. 3..+...#.
28740   85 00 19 59 0f 16 38 5c  00 d0 23 90 04 16 78 5c   ...Y..8\..#...x\
28750   c4 3f 01 35 0c e0 01 35  00 00 80 8c 00 00 00 0a   .?.5...5........
28760   04 e0 81 8b 00 00 00 0a  00 00 00 00 00 00 00 00   ................
28770   00 00 80 8c 2c ff ff 09  00 30 20 8c ff ff 00 00   ....,....0 .....
28780   90 00 81 58 00 00 00 0a  00 00 00 00 00 00 00 00   ...X............
28790   00 30 20 90 40 0a 06 10  04 16 18 5c 18 20 01 32   .0 .@......\. .2
287a0   00 d0 20 90 03 16 80 5c  8b 0b ff 09 04 16 18 5c   .. ....\.......\
287b0   f0 3f 01 35 00 00 20 8c  00 30 20 92 40 0a 06 10   .?.5.. ..0 .@...
287c0   00 00 00 0a 00 00 00 00  00 00 00 00 00 00 00 00   ................
287d0   10 16 70 5c 11 16 78 5c  10 20 24 88 14 20 09 37   ..p\..x\. $.. .7
287e0   00 00 20 8c 22 a0 23 92  04 16 80 5c 00 00 00 0a   .. .".#....\....
287f0   36 a0 23 90 18 20 21 8c  04 c0 23 59 84 90 82 70   6.#.. !...#Y...p
28800   d0 0a ff 09 10 16 38 5c  10 20 04 35 00 30 80 8c   ......8\. .5.0..
28810   ff ff ff ff 00 00 00 0a  22 a0 3b 92 f0 e0 19 8c   ........".;.....
28820   00 00 30 8c 01 00 20 8c  0c e0 21 92 00 00 20 8c   ..0... ...!... .
28830   10 e0 21 92 14 e0 21 92  00 d0 19 92 36 a0 23 90   ..!...!.....6.#.
28840   04 c0 23 59 03 00 19 59  18 e0 39 8c 01 a0 21 8c   ..#Y...Y..9...!.
28850   04 16 30 5c d0 3f 51 39  26 a0 83 8c 14 f4 ff 09   ..0\.?Q9&.......
28860   00 30 20 8c 40 93 02 00  2e a0 23 92 32 a0 73 92   .0 .@......#.2.s.
28870   26 a0 2b 8c e8 03 20 8c  05 16 80 5c 04 16 88 5c   &.+... ....\...\
28880   50 f5 ff 09 00 00 80 8c  00 00 00 0a 00 00 00 00   P...............
28890   10 16 38 5c 22 20 24 90  08 20 01 35 00 00 00 0a   ..8\" $.. .5....
288a0   00 00 18 8c 22 e0 29 90  83 10 26 70 05 00 81 59   ....".)...&p...Y
288b0   30 0b 00 09 01 e0 20 8c  04 16 18 5c e8 3f 51 39   0..... ....\.?Q9
288c0   22 e0 81 90 6c 0a ff 09  26 e0 81 8c 04 f6 ff 09   "...l...&.......
288d0   00 00 20 8c 22 e0 21 92  00 00 00 0a 00 00 00 00   .. .".!.........
288e0   10 16 70 5c 11 16 78 5c  36 20 24 90 10 20 29 8c   ..p\..x\6 $.. ).
288f0   36 20 24 90 85 00 29 59  04 20 24 90 20 20 21 90   6 $...)Y. $.  !.
28900   05 00 29 59 04 20 24 90  24 20 21 90 05 00 81 59   ..)Y. $.$ !....Y
28910   f0 c1 ff 09 10 16 18 5c  0c 20 04 35 00 00 80 8c   .......\. .5....
28920   00 00 00 0a 0e e0 28 90  04 a0 23 90 20 20 21 90   ......(...#.  !.
28930   05 00 21 59 16 e0 20 92  16 e0 38 90 00 00 20 8c   ..!Y.. ...8... .
28940   06 e0 21 82 01 00 20 8c  07 e0 21 82 0c e0 29 8c   ..!... ...!...).
28950   36 a0 23 90 05 00 31 59  00 00 28 8c 36 a0 23 90   6.#...1Y..(.6.#.
```

Mar 27 18:20 1996 image.txt Page 254

```
28960   06 16 80 5c 05 16 88 5c  04 16 90 5c ac 8b fd 0b   ...\...\...\....
28970   0c e0 29 8c 36 a0 23 90  05 00 29 59 36 a0 23 90   ..).6.#...)Y6.#.
28980   05 00 21 59 00 10 79 82  08 cc 33 59 0c e0 29 8c   ..!Y..y...3Y..).
28990   36 a0 23 90 05 00 29 59  36 a0 23 90 05 00 21 59   6.#...)Y6.#...!Y
289a0   01 20 31 82 10 cc 33 59  0c e0 29 8c 36 a0 23 90   . 1...3Y..).6.#.
289b0   05 00 29 59 36 a0 23 90  05 00 21 59 02 20 31 82   ..)Y6.#...!Y. 1.
289c0   18 cc 33 59 0c e0 29 8c  36 a0 23 90 05 00 29 59   ..3Y..).6.#...)Y
289d0   36 a0 23 90 05 00 21 59  03 20 31 82 18 a0 33 90   6.#...!Y. 1...3.
289e0   08 e0 29 8c 36 a0 23 90  05 00 21 59 00 10 31 82   ..).6.#...!Y..1.
289f0   18 a0 23 90 08 0c 31 59  08 e0 29 8c 36 a0 23 90   ..#...1Y..).6.#.
28a00   05 00 21 59 01 20 31 82  18 a0 23 90 10 0c 31 59   ..!Y. 1...#...1Y
28a10   08 e0 29 8c 36 a0 23 90  05 00 21 59 02 20 31 82   ..).6.#...!Y. 1.
28a20   18 a0 23 90 18 0c 31 59  08 e0 29 8c 36 a0 23 90   ..#...1Y..).6.#.
28a30   05 00 21 59 03 20 31 82  00 30 20 8c 80 23 08 10   ..!Y. 1..0 ..#..
28a40   0e 16 80 5c 03 16 88 5c  04 16 90 5c f4 07 00 09   ...\...\...\....
28a50   01 00 80 8c 00 00 00 0a  00 00 00 00 00 00 00 00   ................
28a60   10 16 60 5c 11 16 48 5c  12 16 58 5c 00 00 38 8c   ..`\..H\..X\..8.
28a70   04 20 7c 90 16 20 6c 90  1a 20 24 90 30 20 41 31   . |.. l.. $.0 A1
28a80   05 60 23 80 28 20 21 3d  04 60 2b 80 36 e0 23 90   .`#.( !=.`+.6.#.
28a90   1c 00 29 3d 1a 20 33 90  36 e0 23 90 10 20 29 8c   ..)=. 3.6.#.. ).
28aa0   36 e0 23 90 85 00 21 59  0c 00 31 33 0c 16 80 5c   6.#...!Y..13...\
28ab0   c0 c0 ff 08 06 60 33 80  07 60 23 80 08 0f 29 59   .....`3..`#...)Y
28ac0   00 30 20 8c ff ff 00 00  85 00 21 58 86 03 51 58   .0 .......!X..QX
28ad0   00 01 20 8c 84 a0 02 5a  c0 03 00 15 00 50 33 80   .. ....Z.....P3.
28ae0   01 60 23 80 08 0f 29 59  00 30 20 8c ff ff 00 00   .`#...)Y.0 .....
28af0   85 00 21 58 86 03 29 58  04 e0 23 90 30 20 21 88   ..!X..)X..#.0 !.
28b00   24 00 29 3d 02 60 33 80  03 60 23 80 08 0f 29 59   $.)=.`3..`#...)Y
28b10   00 30 20 8c ff ff 00 00  85 00 21 58 86 03 21 58   .0 .......!X..!X
28b20   0c 20 41 3a 0c 16 80 5c  48 c0 ff 08 36 e0 33 90   . A:...\H...6.3.
28b30   0c 60 2b 8c 36 e0 23 90  05 00 21 59 04 80 21 59   .`+.6.#...!Y..!Y
28b40   00 10 31 80 0c 60 2b 8c  36 e0 23 90 05 00 29 59   ..1..`+.6.#...)Y
28b50   36 e0 23 90 05 00 21 59  01 20 21 80 08 0e 21 59   6.#...!Y. !...!Y
28b60   86 03 31 58 0c 60 2b 8c  36 e0 23 90 05 00 29 59   ..1X.`+.6.#...)Y
28b70   36 e0 23 90 05 00 21 59  02 20 21 80 10 0e 21 59   6.#...!Y. !...!Y
28b80   86 03 31 58 0c 60 2b 8c  36 e0 23 90 05 00 29 59   ..1X.`+.6.#...)Y
28b90   36 e0 23 90 05 00 21 59  03 20 21 80 18 0e 21 59   6.#...!Y. !...!Y
28ba0   86 03 29 58 05 16 38 5c  16 e0 23 90 34 00 29 32   ..)X..8\..#.4.)2
28bb0   00 30 20 90 04 09 08 10  04 16 18 5c 18 20 01 32   .0 ........\. .2
28bc0   16 e0 20 90 10 c0 21 32  00 d0 20 90 04 16 18 5c   .. ...!2.. ....\
28bd0   f0 3f 01 35 0c e0 00 35  0c 16 80 5c 94 bf ff 08   .?.5...5...\....
```

```
Mar 27 18:20 1996  image.txt Page 255

28be0   36 e0 2b 90 08 60 23 8c  04 40 21 59 00 10 31 80   6.+..`#..@!Y..1.
28bf0   08 60 2b 8c 36 e0 23 90  05 00 21 59 01 20 21 80   .`+.6.#...!Y. !.
28c00   08 0e 21 59 86 03 31 58  08 60 2b 8c 36 e0 23 90   ..!Y..1X.`+.6.#.
28c10   05 00 21 59 02 20 21 80  10 0e 21 59 86 03 31 58   ..!Y. !...!Y..1X
28c20   08 60 2b 8c 36 e0 23 90  05 00 21 59 03 20 21 80   .`+.6.#...!Y. !.
28c30   18 0e 21 59 86 03 21 58  0f 16 80 5c 04 16 88 5c   ..!Y..!X...\...\
28c40   10 05 00 09 10 16 70 5c  10 20 04 35 0f 16 80 5c   ......p\. .5...\
28c50   60 05 00 09 10 16 70 5c  00 90 33 90 08 60 2b 8c   `.....p\..3..`+.
28c60   36 e0 23 90 06 16 80 5c  05 16 88 5c 04 16 90 5c   6.#....\...\...\
28c70   38 e9 1a 0b 1c e0 02 32  00 90 2b 90 36 e0 23 90   8......2..+.6.#.
28c80   05 00 81 59 09 16 88 5c  0b 16 90 5c 1c e9 fd 0b   ...Y...\...\....
28c90   20 b2 1a 09 90 90 22 74  08 a0 23 92 0c a0 23 90    ......"t..#...#.
28ca0   8c 20 01 30 36 e0 2b 90  08 60 23 8c 04 40 21 59   . .06.+..`#..@!Y
28cb0   00 10 31 80 08 60 2b 8c  36 e0 23 90 05 00 21 59   ..1..`+.6.#...!Y
28cc0   01 20 21 80 08 0e 21 59  86 03 31 58 08 60 2b 8c   . !...!Y..1X.`+.
28cd0   36 e0 23 90 05 00 21 59  02 20 21 80 10 0e 21 59   6.#...!Y. !...!Y
28ce0   86 03 31 58 08 60 2b 8c  36 e0 23 90 05 00 21 59   ..1X.`+.6.#...!Y
28cf0   03 20 21 80 18 0e 21 59  86 03 21 58 04 a0 23 92   . !...!Y..!X..#.
28d00   00 00 20 8c 0c a0 23 92  14 00 00 08 0c a0 23 90   .. ...#.......#.
28d10   0c 20 11 30 0e 16 80 5c  c8 05 00 09 00 00 20 8c   . .0...\...... .
28d20   06 60 23 82 02 00 20 8c  07 60 23 82 0c 60 2b 8c   .`#... ..`#..`+.
28d30   36 e0 23 90 05 00 31 59  00 90 2b 90 36 e0 23 90   6.#...1Y..+.6.#.
28d40   06 16 80 5c 05 16 88 5c  04 16 90 5c 5c 88 fd 0b   ...\...\...\\...
28d50   04 a0 33 90 0c 60 2b 8c  36 e0 23 90 05 00 29 59   ..3..`+.6.#...)Y
28d60   36 e0 23 90 05 00 21 59  00 10 31 82 04 a0 23 90   6.#...!Y..1...#.
28d70   08 0c 31 59 0c 60 2b 8c  36 e0 23 90 05 00 29 59   ..1Y.`+.6.#...)Y
28d80   36 e0 23 90 05 00 21 59  01 20 31 82 04 a0 23 90   6.#...!Y. 1...#.
28d90   10 0c 31 59 0c 60 2b 8c  36 e0 23 90 05 00 29 59   ..1Y.`+.6.#...)Y
28da0   36 e0 23 90 05 00 21 59  02 20 31 82 04 a0 23 90   6.#...!Y. 1...#.
28db0   18 0c 31 59 0c 60 2b 8c  36 e0 23 90 05 00 29 59   ..1Y.`+.6.#...)Y
28dc0   36 e0 23 90 05 00 21 59  03 20 31 82 54 e0 01 32   6.#...!Y. 1.T..2
28dd0   08 60 2b 8c 36 e0 23 90  05 00 21 59 00 10 39 82   .`+.6.#...!Y..9.
28de0   08 cc 31 59 08 60 2b 8c  36 e0 23 90 05 00 21 59   ..1Y.`+.6.#...!Y
28df0   01 20 31 82 10 cc 31 59  08 60 2b 8c 36 e0 23 90   . 1...1Y.`+.6.#.
28e00   05 00 21 59 02 20 31 82  18 cc 31 59 08 60 2b 8c   ..!Y. 1...1Y.`+.
28e10   36 e0 23 90 05 00 21 59  03 20 31 82 60 00 00 08   6.#...!Y. 1.`...
28e20   16 e0 33 90 08 60 2b 8c  36 e0 23 90 05 00 21 59   ..3..`+.6.#...!Y
28e30   00 10 31 82 16 e0 23 90  08 0c 31 59 08 60 2b 8c   ..1...#...1Y.`+.
28e40   36 e0 23 90 05 00 21 59  01 20 31 82 16 e0 23 90   6.#...!Y. 1...#.
28e50   10 0c 31 59 08 60 2b 8c  36 e0 23 90 05 00 21 59   ..1Y.`+.6.#...!Y
```

```
Mar 27 18:20 1996  image.txt Page 256

28e60   02 20 31 82 16 e0 23 90  18 0c 31 59 08 60 2b 8c   . 1...#...1Y.`+.
28e70   36 e0 23 90 05 00 21 59  03 20 31 82 0c 60 2b 8c   6.#...!Y. 1..`+.
28e80   36 e0 23 90 05 00 21 59  0f 16 80 5c 0c 16 88 5c   6.#...!Y...\...\
28e90   04 16 90 5c ac 03 00 08  00 02 20 8c d4 a0 02 5a   ...\...... ....Z
28ea0   84 01 00 15 36 e0 33 90  0c 60 2b 8c 36 e0 23 90   ....6.3..`+.6.#.
28eb0   05 00 21 59 04 80 21 59  00 10 31 80 0c 60 2b 8c   ..!Y..!Y..1..`+.
28ec0   36 e0 23 90 05 00 29 59  36 e0 23 90 05 00 21 59   6.#...)Y6.#...!Y
28ed0   01 20 21 80 08 0e 21 59  86 03 31 58 0c 60 2b 8c   . !...!Y..1X.`+.
28ee0   36 e0 23 90 05 00 29 59  36 e0 23 90 05 00 21 59   6.#...)Y6.#...!Y
28ef0   02 20 21 80 10 0e 21 59  86 03 31 58 0c 60 2b 8c   . !...!Y..1X.`+.
28f00   36 e0 23 90 05 00 29 59  36 e0 23 90 05 00 21 59   6.#...)Y6.#...!Y
28f10   03 20 21 80 18 0e 21 59  86 03 29 58 16 e0 23 90   . !...!Y..)X..#.
28f20   0c 00 29 32 0c 16 80 5c  48 bc ff 08 36 e0 2b 90   ..)2...\H...6.+.
28f30   08 60 23 8c 04 40 21 59  00 10 31 80 08 60 2b 8c   .`#..@!Y..1..`+.
28f40   36 e0 23 90 05 00 21 59  01 20 21 80 08 0e 21 59   6.#...!Y. !...!Y
28f50   86 03 31 58 08 60 2b 8c  36 e0 23 90 05 00 21 59   ..1X.`+.6.#...!Y
28f60   02 20 21 80 10 0e 21 59  86 03 31 58 08 60 2b 8c   . !...!Y..1X.`+.
28f70   36 e0 23 90 05 00 21 59  03 20 21 80 18 0e 21 59   6.#...!Y. !...!Y
28f80   86 03 21 58 0f 16 80 5c  04 16 88 5c c4 01 00 09   ..!X...\...\....
28f90   10 16 70 5c 10 20 04 35  0f 16 80 5c 14 02 00 05   ..p\. .5...\....
28fa0   10 16 70 5c 00 90 33 90  08 60 2b 8c 36 e0 23 90   ..p\..3..`+.6.#.
28fb0   06 16 80 5c 05 16 88 5c  04 16 90 5c ec 85 fd 0b   ...\...\...\....
28fc0   f0 ae fd 09 90 90 22 74  08 a0 23 92 0c a0 23 90   ......"t..#...#.
28fd0   6c 20 01 30 36 e0 2b 90  08 60 23 8c 04 40 21 59   l .06.+..`#..@!Y
28fe0   00 10 31 80 08 60 2b 8c  36 e0 23 90 05 00 21 59   ..1..`+.6.#...!Y
28ff0   01 20 21 80 08 0e 21 59  86 03 31 58 08 60 2b 8c   . !...!Y..1X.`+.
29000   36 e0 23 90 05 00 21 59  02 20 21 80 10 0e 21 59   6.#...!Y. !...!Y
29010   86 03 31 58 08 60 2b 8c  36 e0 23 90 05 00 21 59   ..1X.`+.6.#...!Y
29020   03 20 21 80 18 0e 21 59  86 03 21 58 04 a0 23 92   . !...!Y..!X..#.
29030   00 00 20 8c 0c a0 23 92  14 00 00 08 0c a0 23 90   .. ...#.......#.
29040   0c 20 11 30 0e 16 80 5c  98 02 00 09 0c 16 80 5c   . .0...\.......\
29050   20 bb ff 08 0c 16 80 5c  18 bb ff 08 00 00 00 00    ......\........
29060   10 16 60 5c 11 16 68 5c  12 16 70 5c 13 16 78 5c   ..`\..h\..p\..x\
29070   14 16 30 5c 15 16 38 5c  d8 00 00 09 10 16 18 5c   ..0\..8\.......\
29080   10 20 04 35 0c 16 80 5c  28 01 00 09 10 16 18 5c   . .5...\(......\
29090   00 00 20 8c 00 d0 23 92  0c e0 20 90 34 20 11 30   .. ...#... .4 .0
290a0   0c 16 80 5c 0d 16 88 5c  38 f8 ff 09 14 e0 20 90   ...\...\8..... .
290b0   10 20 01 32 14 e0 20 90  00 10 79 92 08 00 00 08   . .2.. ...y.....
290c0   10 e0 78 92 14 e0 78 92  00 00 80 8c 00 00 00 0a   ..x...x.........
290d0   0c e0 20 90 38 20 01 30  0c 16 80 5c 0d 16 88 5c   .. .8 .0...\...\
```

Mar 27 18:20 1996   image.txt Page 257

```
290e0   00 f8 ff 09 04 e0 68 92  10 e0 78 92 14 e0 78 92   ......h...x...x.
290f0   04 00 20 8c 0c e0 20 92  08 ad fd 09 90 90 22 74   .. ... ......."t
29100   08 e0 20 92 00 00 80 8c  00 00 00 0a 00 a0 28 90   .. ...........(.
29110   36 20 23 90 0e 16 80 5c  05 16 88 5c 04 16 90 5c   6 #....\...\...\
29120   88 84 fd 0b 20 e0 01 32  00 a0 28 90 36 20 23 90   .... ..2..(.6 #.
29130   05 00 21 59 06 16 80 5c  04 16 88 5c 07 16 90 5c   ..!Y...\...\...\
29140   68 84 fd 0b 01 00 80 8c  00 00 00 0a 00 00 00 00   h...............
29150   10 16 30 5c 11 16 38 5c  00 00 1a 8c 22 a0 29 90   ..0\..8\....".).
29160   83 10 26 70 05 00 21 59  04 20 21 90 28 c0 21 35   ..&p..!Y. !.(.!5
29170   22 a0 29 90 83 10 26 70  05 00 21 59 0c 20 21 90   ".)...&p..!Y. !.
29180   14 20 01 37 22 a0 29 90  83 10 26 70 05 00 81 59   . .7".)...&p...Y
29190   00 00 00 0a 01 e0 20 8c  04 16 18 5c c0 3f 51 39   ...... ....\.?Q9
291a0   00 00 80 8c 00 00 00 0a  00 00 00 00 00 00 00 00   ................
291b0   10 16 68 5c 00 00 78 8c  0f 16 38 5c 07 16 70 5c   ..h\..x...8\..p\
291c0   22 60 2b 90 8e 10 26 70  05 00 21 59 0c 20 21 90   "`+...&p..!Y. !.
291d0   14 20 01 30 22 60 2b 90  8e 10 26 70 05 00 79 59   . .0"`+...&p..yY
291e0   44 00 00 08 cc ac fd 09  90 90 32 74 22 60 2b 90   D.........2t"`+.
291f0   8e 10 26 70 05 00 21 59  08 20 21 90 04 81 21 59   ..&p..!Y. !...!Y
29200   04 16 18 5c 14 c0 21 34  22 60 2b 90 8e 10 26 70   ...\..!4"`+...&p
29210   05 00 79 59 03 16 38 5c  01 a0 23 8c 04 16 70 5c   ..yY..8\..#...p\
29220   a0 3f 51 39 0f 16 80 5c  b8 01 00 09 0f 16 80 5c   .?Q9...\.......\
29230   00 00 00 0a 00 00 00 00  00 00 00 00 00 00 00 00   ................
29240   10 16 70 5c 11 16 78 5c  12 16 38 5c 16 60 2c 90   ..p\..x\..8\.`,.
29250   04 20 24 90 30 20 21 88  00 50 21 82 04 20 24 90   . $.0 !..P!.. $.
29260   30 20 21 88 88 0d 21 59  01 60 21 82 08 00 20 8c   0 !...!Y.`!... .
29270   02 60 21 82 00 00 20 8c  03 60 21 82 36 20 24 90   .`!... ..`!.6 $.
29280   04 60 21 82 04 00 20 8c  05 60 21 82 08 60 31 8c   .`!... ..`!..`1.
29290   3a 20 2c 90 36 20 24 90  06 16 80 5c 05 16 88 5c   : ,.6 $....\...\
292a0   04 16 90 5c 04 83 fd 0b  04 e0 73 92 36 a0 23 90   ...\......s.6.#.
292b0   10 20 29 8c 36 a0 23 90  85 00 21 59 1a e0 23 92   . ).6.#...!Y..#.
292c0   04 a0 23 90 0c 20 19 90  0e 16 80 5c 0f 16 88 5c   ..#.. .....\...\
292d0   07 16 90 5c 00 d0 00 84  00 00 00 00 00 00 00 00   ...\............
292e0   10 16 70 5c 10 20 2c 90  05 16 78 5c 00 00 20 8c   ..p\. ,...x\.. .
292f0   10 20 24 92 14 20 24 92  0c 20 24 92 08 60 01 35   . $.. $.. $..`.5
29300   00 00 00 0a 00 d0 3b 90  04 e0 33 90 04 a0 2b 90   ......;...3...+.
29310   04 e0 23 90 04 20 21 90  08 20 19 90 06 16 80 5c   ..#.. !.. .....\
29320   0f 16 88 5c 05 16 90 5c  00 d0 00 86 07 16 78 5c   ...\...\......x\
29330   d4 ff 01 35 00 00 00 0a  00 00 00 00 00 00 00 00   ...5............
29340   10 16 78 5c 11 16 20 5c  68 ab fd 09 90 90 1a 74   ..x\.. \h......t
29350   04 16 38 5c 00 00 30 8c  22 e0 29 90 86 10 26 70   ..8\..0.".)...&p
```

Mar 27 18:20 1996 image.txt Page 258

```
29360   05 00 21 59 08 20 21 90  04 c1 28 59 00 30 20 8c   ..!Y. !...(Y.0 .
29370   c0 27 09 00 34 00 29 33  22 e0 29 90 86 10 28 70   .'..4.)3".)...&p
29380   05 00 21 59 0c 20 21 90  30 20 11 30 22 e0 29 90   ..!Y. !.0 .0".).
29390   86 10 26 70 05 00 21 59  08 20 21 90 04 c1 28 59   ..&p..!Y. !...(Y
293a0   14 01 20 8c 14 00 29 34  22 e0 29 90 86 10 26 70   .. ...)4".)...&p
293b0   05 00 81 59 2c 00 00 05  01 a0 21 8c 04 16 30 5c   ...Y,.....!...0\
293c0   98 3f 51 39 e8 03 20 8c  01 16 80 5c 04 16 88 5c   .?Q9.. ....\...\
293d0   00 ea ff 08 00 00 00 00  00 00 00 00 00 00 00 00   ................
293e0   10 16 38 5c 10 20 24 90  04 16 18 5c 18 20 01 32   ..8\. $....\. .2
293f0   00 a0 20 90 03 16 80 5c  78 b7 ff 09 04 16 18 5c   .. ....\x......\
29400   f0 3f 01 35 01 00 20 8c  0c e0 21 92 00 00 20 8c   .?.5.. ...!... .
29410   10 e0 21 92 14 e0 21 92  00 00 00 0a 00 00 00 00   ..!...!.........
29420   00 00 20 8c 00 30 20 8a  50 0a 06 10 00 30 20 92   .. ..0 .P....0 .
29430   54 0a 06 10 00 30 20 92  58 0a 06 10 0a 00 18 8c   T....0 .X.......
29440   00 00 20 8c 03 39 20 92  60 0a 06 10 03 16 20 5c   .. ..9 .`..... \
29450   81 c9 18 59 ec 3f 01 3c  00 30 80 8c 90 0a 06 10   ...Y.?.<.0......
29460   10 e8 ff 09 00 30 20 8c  60 b2 02 00 00 30 20 92   .....0 .`....0 .
29470   98 0a 06 10 00 00 20 8c  00 30 20 92 9c 0a 06 10   ...... ..0 .....
29480   00 30 20 92 b0 0a 06 10  00 30 28 8c 90 0a 06 10   .0 ......0(.....
29490   00 30 20 8c 00 97 49 01  05 16 80 5c 04 16 88 5c   .0 ...I....\...\
294a0   30 e9 ff 09 00 30 80 8c  a0 0a 06 10 c4 e7 ff 09   0....0..........
294b0   00 30 20 8c 10 b3 02 00  00 30 20 92 a8 0a 06 10   .0 ......0 .....
294c0   00 00 20 8c 00 30 20 92  ac 0a 06 10 00 30 20 92   .. ..0 ......0 .
294d0   b4 0a 06 10 00 30 28 8c  a0 0a 06 10 00 30 20 8c   .....0(......0 .
294e0   00 5c 26 05 05 16 80 5c  04 16 88 5c e4 e8 ff 08   .\&....\...\....
294f0   00 30 20 90 58 0a 06 10  1c 20 01 32 00 30 80 90   .0 .X.... .2.0..
29500   58 0a 06 10 cc 16 00 09  00 30 20 90 58 0a 06 10   X........0 .X...
29510   ec 3f 01 35 00 30 80 8c  90 0a 06 10 b4 e9 ff 09   .?.5.0..........
29520   00 30 80 8c a0 0a 06 10  a8 e9 ff 09 64 1e 00 08   .0..........d...
29530   00 30 20 8c ff ff 00 00  90 00 61 58 91 00 69 58   .0 .......aX..iX
29540   93 00 21 58 14 16 30 5c  15 16 58 5c 08 89 74 59   ..!X..0\..X\..tY
29550   08 20 29 8c 00 30 20 8c  ff ff 00 00 85 00 29 58   . )..0 .......)X
29560   05 16 78 5c 00 00 20 8c  05 16 80 5c 04 16 88 5c   ..x\.. ....\...\
29570   10 07 00 09 10 16 38 5c  08 20 04 35 00 00 00 0a   ......8\. .5....
29580   16 e0 29 90 05 16 18 5c  16 e0 81 90 0e 16 88 5c   ..)....\.......\
29590   0f 16 90 5c 14 80 fd 0b  08 00 20 8c 00 50 21 82   ...\...... ..P!.
295a0   04 60 61 8a 06 60 69 8a  00 00 20 8c 02 60 21 8a   .`a..`i... ..`!.
295b0   10 e0 03 30 00 00 28 8c  03 c0 23 59 00 10 29 c2   ...0..(...#Y..).
295c0   01 e0 23 8c 81 0d 21 59  03 16 80 5c 04 16 88 5c   ..#...!Y...\...\
295d0   40 fc fe 09 00 30 20 8c  ff ff 00 00 90 00 21 58   @....0 .......!X
```

Mar 27 18:20 1996 image.txt Page 259

```
295e0   10 0e 21 59 90 0d 29 59  00 30 20 8c ff ff 00 00   ..!Y..)Y.0 .....
295f0   04 42 21 58 02 e0 20 8a  1a e0 79 92 01 00 20 8c   .B!X.. ...y... .
29600   07 16 80 5c 04 16 88 5c  0d 16 90 5c 0b 16 98 5c   ...\...\...\...\
29610   f0 06 00 09 00 30 20 90  9c 09 06 10 01 20 21 8c   .....0 ...... !.
29620   00 30 20 92 9c 09 06 10  00 30 20 90 bc 09 06 10   .0 ......0 .....
29630   01 20 21 8c 00 30 20 92  bc 09 06 10 00 00 00 0a   . !..0 .........
29640   10 16 60 5c 11 16 68 5c  12 16 58 5c 00 30 20 90   ..`\..h\..X\.0 .
29650   68 09 06 10 01 20 21 8c  00 30 20 92 68 09 06 10   h.... !..0 .h...
29660   16 20 7c 90 1a 20 24 90  04 16 70 5c 20 20 41 36   . |.. $...p\  A6
29670   00 30 20 90 6c 09 06 10  01 20 21 8c 00 30 20 92   .0 .l.... !..0 .
29680   6c 09 06 10 0c 16 80 5c  e8 b4 ff 08 10 a0 03 30   l......\.......0
29690   00 00 28 8c 0f 80 23 59  00 10 29 c2 01 a0 23 8c   ..(...#Y..)...#.
296a0   01 0d 21 59 0f 16 80 5c  04 16 88 5c 64 fb fe 09   ..!Y...\...\d...
296b0   00 30 20 8c ff ff 00 00  90 00 21 58 10 0e 21 59   .0 .......!X..!Y
296c0   90 0d 21 59 01 20 29 8c  00 30 20 8c fe ff 00 00   ..!Y. )..0 .....
296d0   83 00 21 58 20 20 01 3a  00 30 20 90 6c 09 06 10   ..!X  .:.0 .l...
296e0   01 20 21 8c 00 30 20 92  6c 09 06 10 0c 16 80 5c   . !..0 .l......\
296f0   80 b4 ff 08 00 d0 23 80  04 16 48 5c 0f 28 01 5a   ......#...H\.(.Z
29700   40 02 00 14 09 39 20 90  40 9c 02 00 00 10 01 84   @....9 .@.......
29710   00 30 20 90 84 09 06 10  01 20 21 8c 00 30 20 92   .0 ...... !..0 .
29720   84 09 06 10 00 00 20 8c  0e 16 80 5c 04 16 88 5c   ...... ....\...\
29730   50 05 00 09 10 16 38 5c  0c 20 04 35 0c 16 80 5c   P.....8\. .5...\
29740   30 b4 ff 08 16 e0 31 90  06 16 18 5c 16 e0 29 90   0.....1....\..).
29750   16 20 23 90 05 16 80 5c  04 16 88 5c 0e 16 90 5c   . #....\...\...\
29760   48 7e fd 0b 00 00 20 8c  00 90 21 82 02 a0 21 8a   H~.... ...!...!.
29770   10 a0 03 30 00 00 28 8c  03 80 23 59 00 10 29 c2   ...0..(...#Y..).
29780   01 a0 23 8c 81 0d 21 59  03 16 80 5c 04 16 88 5c   ..#...!Y...\...\
29790   80 fa fe 09 00 30 20 8c  ff ff 00 00 90 00 21 58   .....0 .......!X
297a0   10 0e 21 59 90 0d 29 59  00 30 20 8c ff ff 00 00   ..!Y..)Y.0 .....
297b0   04 42 21 58 02 e0 20 8a  1a e0 71 92 01 00 20 8c   .B!X.. ...q... .
297c0   07 16 80 5c 04 16 88 5c  0d 16 90 5c 0b 16 98 5c   ...\...\...\...\
297d0   30 07 00 09 00 30 20 90  9c 09 06 10 01 20 21 8c   0....0 ...... !.
297e0   00 30 20 92 9c 09 06 10  00 30 20 90 bc 09 06 10   .0 ......0 .....
297f0   01 20 21 8c 00 30 20 92  bc 09 06 10 58 01 00 08   . !..0 .....X...
29800   24 00 20 8c 20 00 71 33  00 30 20 90 6c 09 06 10   $. . .q3.0 .l...
29810   01 20 21 8c 00 30 20 92  6c 09 06 10 0c 16 80 5c   . !..0 .l......\
29820   50 b3 ff 08 00 30 20 90  70 09 06 10 01 20 21 8c   P....0 .p.... !.
29830   00 30 20 92 70 09 06 10  08 e0 2b 8c 16 20 23 90   .0 .p.....+.. #.
29840   04 41 29 59 1a 20 23 90  05 01 21 59 1a 20 23 92   .A)Y. #...!Y. #.
29850   08 e0 23 8c 16 20 23 92  0c 16 80 5c 0a 16 88 5c   ..#.. #....\...\
```

```
Mar 27 18:20 1996  image.txt Page 260

29860   c0 a3 ff 08 00 30 20 90  80 09 06 10 01 20 21 8c   ......0 ...... !.
29870   00 30 20 92 80 09 06 10  8c 00 00 08 00 30 20 90   .0 ..........0 .
29880   7c 09 06 10 01 20 21 8c  00 30 20 92 7c 09 06 10   |..... !..0 .|...
29890   c4 00 00 08 00 30 20 90  88 09 06 10 01 20 21 8c   ......0 ...... !.
298a0   00 30 20 92 88 09 06 10  16 20 33 90 16 20 23 90   .0 ...... 3.. #.
298b0   08 20 41 8c 00 30 20 90  c0 0a 06 10 98 20 01 32   . A..0 ...... .2
298c0   04 a0 32 88 06 a0 2a 88  06 89 23 59 00 30 e8 90   ..2...*...#Y.0..
298d0   c0 0a 06 10 06 16 80 5c  05 16 88 5c 08 16 90 5c   .......\...\...\
298e0   04 16 98 5c 06 16 a0 5c  06 16 a8 5c 00 50 07 86   ...\...\...\.P..
298f0   64 00 00 08 00 30 20 90  74 09 06 10 01 20 21 8c   d....0 .t..... !.
29900   00 30 20 92 74 09 06 10  4c 00 00 08 00 30 20 90   .0 .t...L....0 .
29910   78 09 06 10 01 20 21 8c  00 30 20 92 78 09 06 10   x.... !..0 .x...
29920   34 00 00 08 00 30 20 90  8c 09 06 10 01 20 21 8c   4....0 ...... !.
29930   00 30 20 92 8c 09 06 10  1c 00 00 08 18 00 00 08   .0 .............
29940   00 30 20 90 6c 09 06 10  01 20 21 8c 00 30 20 92   .0 .l.... !..0 .
29950   6c 09 06 10 0c 16 80 5c  18 b2 ff 08 00 00 00 00   l......\........
29960   10 16 30 5c 09 20 24 80  1c 20 09 3d 00 90 21 80   ..0\. $.. .=..!.
29970   84 d0 23 58 04 9d 21 80  0c 20 41 3a 00 00 80 8c   ..#X..!.. A:....
29980   00 00 00 0a 06 a0 81 88  f8 f7 fe 09 00 30 20 8c   .............0 .
29990   ff ff 00 00 90 00 29 58  00 30 20 8c ff 1f 00 00   ......)X.0 .....
299a0   85 00 21 58 0c 20 01 3a  00 00 80 8c 00 00 00 0a   ..!X. .:........
299b0   00 90 21 80 84 d0 23 58  04 39 28 8c 10 00 00 00   ..!...#X.9(.....
299c0   05 16 18 5c 00 00 20 8c  05 16 80 5c 04 16 88 5c   ...\.. ....\...\
299d0   b0 02 00 09 10 16 38 5c  20 20 04 35 00 30 20 90   ......8\  .5.0 .
299e0   a0 09 06 10 01 20 21 8c  00 30 20 92 a0 09 06 10   ..... !..0 .....
299f0   00 00 80 8c 00 00 00 0a  1a e0 19 92 16 e0 21 90   ..............!.
29a00   08 20 29 8c 00 90 21 80  84 d0 23 58 04 39 20 8c   . )...!...#X.9 .
29a10   08 00 00 00 05 16 80 5c  06 16 88 5c 04 16 90 5c   .......\...\...\
29a20   88 7b fd 0b 00 30 20 90  9c 09 06 10 01 20 21 8c   .{...0 ...... !.
29a30   00 30 20 92 9c 09 06 10  07 16 80 5c 00 00 00 0a   .0 ........\....
29a40   10 16 78 5c 12 16 38 5c  11 16 80 5c 14 ff ff 09   ..x\..8\...\....
29a50   10 16 18 5c 08 20 04 35  00 00 00 0a 16 e0 30 90   ...\. .5......0.
29a60   03 00 20 8c 00 90 21 82  01 a0 39 82 00 00 20 8c   .. ...!...9... .
29a70   02 a0 21 8a 1a e0 20 90  01 0c 21 59 06 16 80 5c   ..!... ...!Y...\
29a80   04 16 88 5c 8c f7 fe 09  00 30 20 8c ff ff 00 00   ...\.....0 .....
29a90   90 00 21 58 10 0e 21 59  90 0a 29 59 00 30 20 8c   ..!X..!Y..)Y.0 .
29aa0   ff ff 00 00 04 42 21 58  02 a0 21 8a 00 30 20 90   .....B!X..!..0 .
29ab0   a4 09 06 10 01 20 21 8c  00 30 20 92 a4 09 06 10   ..... !..0 .....
29ac0   01 00 20 8c 03 16 80 5c  04 16 88 5c 0f 16 90 5c   .. ....\...\...\
29ad0   20 04 00 08 00 00 00 00  00 00 00 00 00 00 00 00    ...............
```

```
Mar 27 18:20 1996  image.txt Page 261

29ae0   10 16 70 5c 12 16 78 5c  13 16 38 5c 11 16 80 5c   ..p\..x\..8\...\
29af0   70 fe ff 09 10 16 18 5c  08 20 04 35 00 00 00 0a   p......\. .5....
29b00   16 e0 30 90 05 00 20 8c  00 90 21 82 01 a0 79 82   ..0... ......y.
29b10   04 a0 39 92 00 00 20 8c  02 a0 21 8a 1a e0 20 90   ..9... ...!... .
29b20   01 0c 21 59 06 16 80 5c  04 16 88 5c e4 f6 fe 09   ..!Y...\...\....
29b30   00 30 20 8c ff ff 00 00  90 00 21 58 10 0e 21 59   .0 .......!X..!Y
29b40   90 0d 29 59 00 30 20 8c  ff ff 00 00 04 42 21 58   ..)Y.0 ......B!X
29b50   02 a0 21 8a 00 30 20 90  b4 09 06 10 01 20 21 8c   ..!..0 ...... !.
29b60   00 30 20 92 b4 09 06 10  01 00 20 8c 03 16 80 5c   .0 ....... ....\
29b70   04 16 88 5c 0e 16 90 5c  78 03 00 08 00 00 00 00   ...\...\x.......
29b80   10 16 78 5c 12 16 38 5c  11 16 80 5c d4 fd ff 09   ..x\..8\...\....
29b90   10 16 18 5c 08 20 04 35  00 00 00 0a 16 e0 30 90   ...\. .5......0.
29ba0   06 00 20 8c 00 90 21 82  01 a0 39 82 00 00 20 8c   .. ...!...9... .
29bb0   04 a0 21 8a 06 a0 21 8a  02 a0 21 8a 1a e0 20 90   ..!...!...!... .
29bc0   01 0c 21 59 06 16 80 5c  04 16 88 5c 44 f6 fe 09   ..!Y...\...\D...
29bd0   00 30 20 8c ff ff 00 00  90 00 21 58 10 0e 21 59   .0 .......!X..!Y
29be0   90 0d 29 59 00 30 20 8c  ff ff 00 00 04 42 21 58   ..)Y.0 ......B!X
29bf0   02 a0 21 8a 00 30 20 90  a8 09 06 10 01 20 21 8c   ..!..0 ...... !.
29c00   00 30 20 92 a8 09 06 10  01 00 20 8c 03 16 80 5c   .0 ....... ....\
29c10   04 16 88 5c 0f 16 90 5c  d8 02 00 08 00 00 00 00   ...\...\........
29c20   50 af ff 08 00 00 00 00  00 00 00 00 00 00 00 00   P...............
29c30   00 00 00 0a 00 00 00 00  69 63 6d 70 00 00 00 00   ........icmp....
29c40   94 98 02 00 40 99 02 00  40 99 02 00 00 98 02 00   ....@...@.......
29c50   7c 98 02 00 64 98 02 00  40 99 02 00 40 99 02 00   |...d...@...@...
29c60   10 97 02 00 40 99 02 00  40 99 02 00 f4 98 02 00   ....@...@.......
29c70   0c 99 02 00 24 99 02 00  40 99 02 00 3c 99 02 00   ....$...@...<...
29c80   10 16 30 5c 11 16 38 5c  14 20 24 8c 04 40 2c 59   ..0\..8\. $..@,Y
29c90   00 30 20 90 00 09 06 10  05 00 81 59 64 ae ff 09   .0 ........Yd...
29ca0   10 16 18 5c 0c 20 04 35  00 00 80 8c 00 00 00 0a   ...\. .5........
29cb0   0e e0 20 90 14 20 21 8c  04 c0 29 59 00 30 20 90   .. .. !...)Y.0 .
29cc0   00 09 06 10 05 00 21 59  16 e0 20 92 1a e0 30 92   ......!Y.. ...0.
29cd0   1e e0 38 92 03 16 80 5c  00 00 00 0a 00 00 00 00   ..8....\........
29ce0   10 16 30 5c 11 16 38 5c  12 16 18 5c 12 40 24 59   ..0\..8\...\.@$Y
29cf0   14 20 29 8c 00 30 20 90  00 09 06 10 05 00 29 59   . )..0 .......)Y
29d00   12 20 24 90 18 00 29 36  06 16 80 5c 64 ae ff 09   . $...)6...\d...
29d10   07 16 80 5c 03 16 88 5c  68 ff ff 08 0e a0 21 90   ...\...\h.....!.
29d20   14 20 21 8c 04 c0 28 59  00 30 20 90 00 09 06 10   . !...(Y.0 .....
29d30   05 00 21 59 16 a0 21 92  1a a0 39 92 1e a0 19 92   ..!Y..!...9.....
29d40   00 00 20 8c 04 a0 21 92  06 16 80 5c 00 00 00 0a   .. ...!....\....
29d50   10 16 70 5c 16 20 7c 90  0c 20 24 86 84 d0 20 58   ..p\. |.. $... X
```

Mar 27 18:20 1996 image.txt Page 262

```
29d60   0c 20 01 3a 0e 16 80 5c  08 ae ff 08 08 e0 23 80   . .:...\......#.
29d70   1c 20 01 3a 08 e0 23 80  01 09 29 59 ff 00 20 8c   . .:..#...)Y.. .
29d80   85 00 21 58 08 e0 2b 82  24 20 01 3d 0c e0 2b 90   ..!X..+.$ .=..+.
29d90   00 00 20 8c 05 16 80 5c  0f 16 88 5c 04 16 90 5c   .. ....\...\...\
29da0   e0 fd ff 09 0e 16 80 5c  c8 ad ff 08 00 00 20 8c   .......\...... .
29db0   0a e0 23 8a 00 d0 23 80  84 d0 23 58 01 0f 21 59   ..#...#...#X..!Y
29dc0   0f 16 80 5c 04 16 88 5c  48 f4 fe 09 00 30 20 8c   ...\...\H....0 .
29dd0   ff ff 00 00 90 00 21 58  10 0e 21 59 90 0a 29 59   ......!X..!Y..)Y
29de0   00 30 20 8c ff ff 00 00  04 42 21 58 0a e0 23 8a   .0 ......B!X..#.
29df0   10 e0 85 90 5c a6 ff 09  10 16 38 5c 24 20 04 35   ..........8\$ .5
29e00   0c e0 2b 90 01 00 20 8c  05 16 80 5c 0f 16 88 5c   ..+... ....\...\
29e10   04 16 90 5c 2c fc ff 09  0e 16 80 5c 54 ad ff 08   ...\,.......\T...
29e20   04 e0 29 90 04 a0 23 90  4c 00 29 35 0c e0 2b 90   ..)...#.L.)5..+.
29e30   04 e0 21 90 1a 20 21 90  85 00 31 58 04 e0 21 90   ..!.. !...1X..!.
29e40   16 20 29 90 04 e0 21 90  1a 20 21 90 85 00 21 58   . )...!.. !...!X
29e50   24 00 31 35 0c e0 33 90  01 00 28 8c 10 e0 21 90   $.15..3...(...!.
29e60   06 16 80 5c 0f 16 88 5c  05 16 90 5c 04 16 98 5c   ...\...\...\...\
29e70   70 fc ff 09 04 e0 21 90  04 a0 23 92 04 e0 21 90   p.....!...#...!.
29e80   16 20 21 90 1c 20 01 32  04 e0 21 90 16 20 29 90   . !.. .2..!.. ).
29e90   10 e0 23 90 0c 00 29 35  0e 16 80 5c 34 9c ff 08   ..#...)5...\4...
29ea0   0e 16 80 5c 07 16 88 5c  e8 01 00 09 10 16 18 5c   ...\...\.......\
29eb0   30 20 04 3a 24 e0 08 3d  0c e0 2b 90 04 00 20 8c   0 .:$..=..+... .
29ec0   05 16 80 5c 0f 16 88 5c  04 16 90 5c 74 fb ff 09   ...\...\...\t...
29ed0   0e 16 80 5c 9c ac ff 08  0e 16 80 5c 94 ac ff 08   ...\.......\....
29ee0   00 00 00 0a 00 00 00 00  00 00 00 00 00 00 00 00   ................
29ef0   00 00 98 8c 0c 00 00 08  00 00 00 00 00 00 00 00   ................
29f00   10 16 60 5c 11 16 48 5c  12 16 68 5c 13 16 70 5c   ..`\..H\..h\..p\
29f10   00 00 38 8c 00 30 20 90  4c 09 06 10 01 20 21 8c   ..8..0 .L.... !.
29f20   00 30 20 92 4c 09 06 10  1e 20 24 90 14 20 29 8c   .0 .L.... $.. ).
29f30   05 16 78 5c 16 20 24 90  05 01 21 59 16 20 24 92   ..x\. $...!Y. $.
29f40   1a 20 24 90 04 40 21 59  1a 20 24 92 16 20 34 90   . $..@!Y. $.. 4.
29f50   04 20 24 90 4c 20 01 35  0d 16 80 5c 34 a5 ff 09   . $.L .5...\4...
29f60   10 16 38 5c 34 20 04 35  00 30 20 90 50 09 06 10   ..8\4 .5.0 .P...
29f70   01 20 21 8c 00 30 20 92  50 09 06 10 00 30 20 90   . !..0 .P....0 .
29f80   54 09 06 10 01 20 21 8c  00 30 20 92 54 09 06 10   T.... !..0 .T...
29f90   0c 16 80 5c dc ab ff 08  04 e0 21 90 04 20 23 92   ...\......!.. #.
29fa0   04 20 1b 90 0c 20 23 88  20 20 11 30 04 20 23 90   . ... #.  .0. #.
29fb0   10 20 01 32 04 20 23 90  1e 20 59 90 08 00 00 08   . .2. #.. Y.....
29fc0   1e e0 58 90 0b 16 68 5c  02 cc 23 59 86 09 21 58   ..X...h\..#Y..!X
29fd0   00 90 21 82 00 30 20 90  00 24 06 10 08 a0 21 82   ..!..0 ..$....!.
```

Mar 27 16:20 1996 image.txt Page 283

```
29fe0   00 00 20 8c 06 a0 21 8a  00 30 28 90 d0 0a 06 10   .. ...!..0(.....
29ff0   01 60 21 8c 00 30 20 92  d0 0a 06 10 05 16 80 5c   .`!..0 ........\
2a000   80 f1 1e 09 04 a0 81 8a  00 00 20 8c 0a a0 21 8a   .......... ...!.
2a010   0c a0 03 32 0e 16 50 5c  08 00 00 08 15 e0 50 90   ...2..P\......P.
2a020   0c a0 51 92 10 a0 69 92  1a 20 83 90 54 f1 1e 09   ..Q...i.. ..T...
2a030   02 a0 81 8a 00 00 20 8c  01 a0 21 82 09 a0 49 82   ...... ...!...I.
2a040   01 cc 23 59 06 16 80 5c  04 16 88 5c c4 f1 1e 09   ..#Y...\...\....
2a050   00 30 20 8c ff ff 00 00  90 00 21 58 10 0e 21 59   .0 .......!X..!Y
2a060   90 0d 29 59 00 30 20 8c  ff ff 00 00 04 42 21 58   ..)Y.0 ......B!X
2a070   0a a0 21 8a 0c 16 80 5c  07 16 88 5c 14 00 00 09   ..!....\...\....
2a080   08 20 04 3d 00 00 00 0a  0c 16 80 5c e4 aa ff 08   . .=.......\....
2a090   10 16 6e 5c 11 16 70 5c  16 20 34 90 0c 60 04 32   ..n\..p\. 4..`.2
2a0a0   23 a0 23 80 0c 20 01 30  10 a0 39 90 08 00 00 08   #.#.. .0..9.....
2a0b0   10 a0 3b 90 07 16 78 5c  1a 60 2b 90 04 60 23 90   ..;...x\.`+..`#.
2a0c0   42 20 21 90 4c 00 29 36  06 a0 81 86 b4 f0 1e 09   B !.L.)6........
2a0d0   00 30 20 8c ff ff 00 00  90 00 21 58 20 20 71 30   .0 .......!X  q0
2a0e0   00 30 20 90 5c 09 06 10  01 20 21 8c 00 30 20 92   .0 .\.... !..0 .
2a0f0   5c 09 06 10 01 00 80 8c  00 00 00 0a 0d 16 80 5c   \..............\
2a100   0f 16 88 5c cc 29 00 09  00 00 80 8c 00 00 00 0a   ...\.)..........
2a110   04 60 2b 90 04 60 23 90  04 20 21 90 08 20 19 90   .`+..`#.. !.. ..
2a120   05 16 80 5c 0d 16 88 5c  0f 16 90 5c 00 a0 00 86   ...\...\...\....
2a130   00 00 80 8c 00 00 00 0a  00 00 00 00 00 00 00 00   ................
2a140   10 16 30 5c 00 30 38 8c  58 0a 06 10 0c 20 04 32   ..0\.08.X.... .2
2a150   2a a0 21 90 08 20 01 32  00 00 00 0a 00 d0 21 90   *.!.. .2......!.
2a160   24 20 01 32 00 d0 21 90  1c 80 21 32 00 d0 21 90   $ .2..!...!2..!.
2a170   36 20 39 8c 36 20 21 90  0c 20 01 32 00 d0 21 90   6 9.6 !.. .2..!.
2a180   ec 9f 21 35 00 d0 21 90  0c 80 21 35 36 a0 21 90   ..!5..!...!56.!.
2a190   00 d0 21 92 00 00 20 8c  36 a0 21 92 1e a0 21 90   ..!... .6.!...!.
2a1a0   00 10 21 90 08 20 21 90  08 20 01 35 00 00 00 0a   ..!.. !.. .5....
2a1b0   1e a0 21 90 00 10 21 90  08 20 19 90 06 16 80 5c   ..!...!.. .....\
2a1c0   00 d0 00 84 00 00 00 00  00 00 00 00 00 00 00 00   ................
2a1d0   90 60 08 8c 40 e0 e7 92  10 16 60 5c 00 30 68 8c   .`..@.....`\.0h.
2a1e0   f6 ff ff ff 0e 20 24 90  24 20 01 35 00 30 20 8c   ..... $.$ .5.0 .
2a1f0   f3 ff ff ff 0c 16 80 5c  04 16 88 5c 24 06 00 09   .......\...\$...
2a200   01 00 80 8c 40 e0 e7 90  00 00 00 0a 0e 20 23 90   ....@........ #.
2a210   00 10 21 90 00 28 01 5a  c0 01 00 12 00 00 18 8c   ..!..(.Z........
2a220   03 16 38 5c 0e 20 23 90  00 10 31 90 03 16 28 5c   ..8\. #...1...(\
2a230   03 16 20 5c 03 16 80 5c  07 16 88 5c 06 16 90 5c   .. \...\...\...\
2a240   05 16 98 5c 04 16 a0 5c  98 1a 00 09 02 20 23 90   ...\...\..... #.
2a250   0c 20 79 8c 0f 16 18 5c  02 20 2b 90 06 20 23 90   . y....\. +.. #.
```

```
Mar 27 18:20 1996  image.txt Page 264

2a260   05 00 21 59 02 09 21 59  00 10 21 80 08 0f 31 59   ..!Y..!Y..!...1Y
2a270   02 20 2b 90 06 20 23 90  05 00 21 59 02 09 21 59   . +.. #...!Y..!Y
2a280   01 20 21 80 00 0f 21 59  86 03 29 58 00 30 20 8c   . !...!Y..)X.0 .
2a290   ff ff 00 00 65 00 e1 58  02 20 2b 90 06 20 23 90   .......X. +.. #.
2a2a0   05 00 21 59 04 09 21 59  00 10 21 80 08 0f 31 59   ..!Y..!Y..!...1Y
2a2b0   02 20 2b 90 06 20 23 90  05 00 21 59 04 09 21 59   . +.. #...!Y..!Y
2a2c0   01 20 21 80 00 0f 21 59  86 03 29 58 00 30 20 8c   . !...!Y..)X.0 .
2a2d0   ff ff 00 00 85 00 39 58  0a 20 23 90 0c 20 21 8c   ......9X. #.. !.
2a2e0   04 00 24 59 04 20 21 8c  06 20 23 92 0a 20 23 90   ..$Y. !.. #.. #.
2a2f0   0f 00 31 59 0e 20 23 90  00 10 29 90 10 16 20 5c   ..1Y. #...)... \
2a300   06 16 80 5c 05 16 88 5c  04 16 90 5c 9c 72 fa 0b   ...\...\...\.r..
2a310   88 0d 2f 59 ff 00 20 8c  85 00 31 58 02 20 2b 90   ../Y.. ...1X. +.
2a320   06 20 23 90 05 00 21 59  02 09 21 59 00 10 31 82   . #...!Y..!Y..1.
2a330   ff 00 20 8c 9c 00 31 58  02 20 2b 90 06 20 23 90   .. ...1X. +.. #.
2a340   05 00 21 59 02 09 21 59  01 20 31 82 88 cd 29 59   ..!Y..!Y. 1...)Y
2a350   ff 00 20 8c 85 00 31 58  02 20 2b 90 06 20 23 90   .. ...1X. +.. #.
2a360   05 00 21 59 04 09 21 59  00 10 31 82 ff 00 20 8c   ..!Y..!Y..1... .
2a370   87 00 31 58 02 20 2b 90  06 20 23 90 05 00 21 59   ..1X. +.. #...!Y
2a380   04 09 21 59 01 20 31 82  50 e0 2f 8c 1e 00 20 8c   ..!Y. 1.P./... .
2a390   0c 16 80 5c 03 16 88 5c  1c 16 90 5c 07 16 98 5c   ...\...\...\...\
2a3a0   05 16 a0 5c 04 16 a8 5c  98 0c 00 09 10 16 68 5c   ...\...\......h\
2a3b0   00 30 20 8c f6 ff ff ff  20 00 81 3d 0e 20 23 90   .0 ..... ..=. #.
2a3c0   04 20 21 8c 0e 20 23 92  0e 20 23 90 00 10 21 90   . !.. #.. #...!.
2a3d0   00 28 01 5a 48 fe ff 15  1c 60 03 3e 0c 16 80 5c   .(.ZH....`.>...\
2a3e0   0d 16 88 5c 3c 04 00 09  01 00 80 8c 40 e0 e7 90   ...\<.......@...
2a3f0   00 00 00 0a 8c 60 03 3b  2a 20 23 90 01 20 21 8c   .....`.;* #.. !.
2a400   2a 20 23 92 12 20 23 90  04 30 00 5a 00 00 20 22   * #.. #..0.Z.. "
2a410   84 30 00 5a 01 00 70 8c  44 00 00 15 00 00 78 8c   .0.Z..p.D.....x.
2a420   0f 16 38 5c 07 16 30 5c  50 e0 2f 8c 26 20 23 90   ..8\..0\P./.& #.
2a430   12 20 eb 90 0c 16 80 5c  0f 16 88 5c 07 16 90 5c   . .....\...\...\
2a440   06 16 98 5c 05 16 a0 5c  0d 16 a8 5c 04 16 b0 5c   ...\...\...\...\
2a450   00 50 07 86 90 30 00 5a  00 00 70 25 2a 20 23 90   .P...0.Z..p%* #.
2a460   01 09 21 59 2a 20 23 92  18 a0 03 3a 0c 16 80 5c   ..!Y* #....:...\
2a470   d0 fc ff 09 01 00 80 8c  40 e0 e7 90 00 00 00 0a   ........@.......
2a480   32 20 23 90 24 20 21 30  00 30 20 8c ec ff ff ff   2 #.$ !0.0 .....
2a490   0c 16 80 5c 04 16 88 5c  88 03 00 09 01 00 80 8c   ...\...\........
2a4a0   40 e0 e7 90 00 00 00 0a  1e 20 23 90 00 10 21 90   @........ #...!.
2a4b0   04 20 e9 90 0c 16 80 5c  00 50 07 86 18 0e 24 59   . .....\.P....$Y
2a4c0   98 0a 21 59 04 16 68 5c  1c 20 01 3a 0c 16 80 5c   ..!Y..h\. .:...\
2a4d0   0d 16 88 5c 4c 03 00 09  01 00 80 8c 40 e0 e7 90   ...\L.......@...
```

Mar 27 18:20 1996 image.txt Page 265

```
2a4e0   00 00 00 0a 00 00 80 8c  40 e0 e7 90 00 00 00 0a   ........@.......
2a4f0   70 64 08 8c 40 e0 e7 92  10 16 60 5c 11 16 68 5c   pd..@.....`\..h\
2a500   12 16 70 5c 13 16 48 5c  a0 e4 4f 92 50 e0 27 8c   ..p\..H\..O.P.'.
2a510   11 16 80 5c 12 16 88 5c  04 16 90 5c 94 16 00 09   ...\...\...\....
2a520   18 0e 24 59 98 0a 21 59  60 20 01 3a 50 e0 e7 8c   ..$Y..!Y` .:P...
2a530   60 e0 3f 8c 1e 00 30 8c  00 00 28 8c 74 99 fd 09   `.?...0...(.t...
2a540   90 90 22 74 0a 16 80 5c  0e 16 88 5c 1c 16 90 5c   .."t...\...\...\
2a550   07 16 98 5c 06 16 a0 5c  05 16 a8 5c 04 16 b0 5c   ...\...\...\...\
2a560   a0 e4 4f 90 09 16 b8 5c  c8 1c 00 09 10 16 c8 5c   ..O....\........\
2a570   18 20 04 39 00 30 20 8c  ff ff 00 00 83 00 29 5a   . .9.0 .......)Z
2a580   54 e0 27 88 10 00 29 3b  00 00 80 8c 40 e0 e7 90   T.'...);....@...
2a590   00 00 00 0a 50 e0 2f 8c  60 e0 27 8c 0c 16 80 5c   ....P./.`.'....\
2a5a0   0d 16 88 5c 0e 16 90 5c  05 16 98 5c 04 16 a0 5c   ...\...\...\...\
2a5b0   03 16 a8 5c 7c 06 00 09  18 0e 24 59 98 0a 29 59   ...\|.....$Y..)Y
2a5c0   05 16 58 5c 00 30 20 8c  ed ff ff ff 04 41 49 59   ..X\.0 ......AIY
2a5d0   a4 e4 4f 92 13 68 02 5a  30 02 00 14 a4 e4 4f 90   ..O..h.Z0.....O.
2a5e0   09 39 20 90 dc ab 02 00  00 10 01 84 32 20 23 90   .9 .........2 #.
2a5f0   02 0a 21 58 50 20 01 32  50 e0 2f 8c 60 e0 27 8c   ..!XP .2P./.`.'.
2a600   0c 16 80 5c 0d 16 88 5c  0e 16 90 5c 05 16 98 5c   ...\...\...\...\
2a610   04 16 a0 5c 03 16 a8 5c  58 10 00 09 18 0e 24 59   ...\...\X.....$Y
2a620   98 0d 21 59 04 16 50 5c  1c 20 01 3a 0c 16 80 5c   ..!Y..P\. .:...\
2a630   0a 16 88 5c ec 01 00 09  01 00 80 8c 40 e0 e7 90   ...\........@...
2a640   00 00 00 0a 54 e0 27 88  84 c1 28 59 05 16 18 5c   ....T.'...(Y...\
2a650   00 30 20 8c ff ff 00 00  85 00 29 58 56 e0 27 88   .0 .......)XV.'.
2a660   08 00 29 3e 56 e0 1f 88  00 00 78 8c 2c e0 00 3b   ..)>V.....x.,..;
2a670   60 e0 2f 8c 54 e0 27 88  8f 00 21 59 05 0e 21 59   `./.T.'...!Y..!Y
2a680   05 00 21 59 0f fd 27 92  20 04 00 00 01 e0 23 8c   ..!Y..'. .....#.
2a690   04 16 78 5c dc df 20 3c  2a 20 23 90 01 20 21 8c   ..x\.. <* #.. !.
2a6a0   2a 20 23 92 12 20 23 90  04 30 00 5a 00 00 20 22   * #.. #..0.Z.. "
2a6b0   84 30 00 5a 01 00 48 8c  a8 e4 4f 92 40 00 00 15   .0.Z..H...O.@...
2a6c0   50 e0 37 8c 20 e4 2f 8c  26 20 23 90 12 20 eb 90   P.7. ./.& #.. ..
2a6d0   0c 16 80 5c 0d 16 88 5c  0e 16 90 5c 06 16 98 5c   ...\...\...\...\
2a6e0   05 16 a0 5c 03 16 a8 5c  04 16 b0 5c 00 50 07 86   ...\...\...\.P..
2a6f0   90 30 00 5a 00 00 48 25  a8 e4 4f 92 a8 e4 4f 90   .0.Z..H%..O...O.
2a700   09 16 40 5c ac e4 47 92  2a 20 23 90 01 09 21 59   ..@\..G.* #...!Y
2a710   2a 20 23 92 0c 60 02 3a  0c 16 80 5c 24 fa ff 09   * #..`.:...\$...
2a720   ac e4 4f 90 09 16 80 5c  40 e0 e7 90 00 00 00 0a   ..O....\@.......
2a730   32 20 23 90 08 0a 21 58  54 20 01 32 50 e0 2f 8c   2 #...!XT .2P./.
2a740   60 e0 27 8c 0c 16 80 5c  0d 16 88 5c 0e 16 90 5c   `.'....\...\...\
2a750   05 16 98 5c 04 16 a0 5c  03 16 a8 5c 06 16 b0 5c   ...\...\...\...\
```

```
Mar 27 18:20 1996  image.txt Page 266

2a760   10 11 00 09 18 0e 24 59  98 0d 21 59 04 16 50 5c   ......$Y..!Y..P\
2a770   1c 20 01 3a 0c 16 80 5c  0a 16 88 5c a4 00 00 09   . .:...\...\....
2a780   01 00 80 8c 40 e0 e7 90  00 00 00 0a 00 30 20 8c   ....@.........0 .
2a790   fb ff ff ff 1c 00 59 3a  0c 16 80 5c 0b 16 88 5c   ......Y:...\...\
2a7a0   80 00 00 09 01 00 80 8c  40 e0 e7 90 00 00 00 0a   ........@.......
2a7b0   0e 20 23 90 04 20 21 8c  0e 20 23 92 2a 20 23 90   . #.. !.. #.* #.
2a7c0   01 20 21 8c 2a 20 23 92  0c 16 80 5c 04 fa ff 09   . !.* #....\....
2a7d0   10 16 48 5c ac e4 4f 92  2a 20 23 90 01 09 21 59   ..H\..O.* #...!Y
2a7e0   2a 20 23 92 0c 20 04 3a  0c 16 80 5c 54 f9 ff 09   * #.. .:...\T...
2a7f0   01 00 80 8c 40 e0 e7 90  00 00 00 0a 00 00 80 8c   ....@...........
2a800   40 e0 e7 90 00 00 00 0a  0c 16 80 5c 0b 16 88 5c   @...........\...\
2a810   10 00 00 09 01 00 80 8c  40 e0 e7 90 00 00 00 0a   ........@.......
2a820   10 16 30 5c 18 4e 24 59  98 0d 39 59 1b 20 24 90   ..0\.N$Y..9Y. $.
2a830   04 16 18 5c 38 20 01 32  00 00 20 8c 16 a0 21 92   ...\8 .2.. ...!.
2a840   2a a0 21 90 01 20 21 8c  2a a0 21 92 26 a0 21 90   *.!.. !.*.!.&.!.
2a850   06 16 80 5c 07 16 88 5c  04 16 90 5c 00 d0 00 86   ...\...\...\....
2a860   2a a0 21 90 01 09 21 59  2a a0 21 92 06 16 80 5c   *.!...!Y*.!....\
2a870   d0 f8 ff 08 00 00 00 00  00 00 00 00 00 00 00 00   ................
2a880   20 60 08 8c 10 16 60 5c  11 16 48 5c 40 e0 4f 92    `....`\..H\@.O.
2a890   12 16 40 5c 44 e0 47 92  13 16 48 5c 48 e0 4f 92   ..@\D.G...H\H.O.
2a8a0   14 16 68 5c 15 16 40 5c  4c e0 47 92 16 16 70 5c   ..h\..@\L.G...p\
2a8b0   17 16 58 5c 18 16 78 5c  30 a0 05 32 00 90 23 90   ..X\..x\0..2..#.
2a8c0   28 20 01 32 00 90 23 90  00 10 21 90 1c 20 01 32   ( .2..#...!.. .2
2a8d0   00 90 23 90 04 20 21 90  10 20 01 32 00 90 23 90   ..#.. !.. .2..#.
2a8e0   08 20 21 90 2c 20 01 35  20 60 03 32 00 00 28 8c   . !., .5 `.2..(.
2a8f0   00 30 20 8c fd ff ff ff  05 16 80 5c 04 16 88 5c   .0 .........\...\
2a900   0f 16 90 5c 00 50 03 86  00 00 80 8c 00 00 00 0a   ...\.P..........
2a910   00 00 28 8c ff 00 20 8c  05 16 80 5c 04 16 88 5c   ..(... ....\...\
2a920   0c 16 90 5c dc 15 00 09  10 16 18 5c 20 20 04 3c   ...\.......\  .<
2a930   14 60 03 32 00 00 80 8c  03 16 88 5c 0f 16 90 5c   .`.2.......\...\
2a940   00 50 03 86 00 00 80 8c  00 00 00 0a 0f 01 28 8c   .P............(.
2a950   00 90 23 90 00 10 e9 90  05 16 80 5c 0e 16 88 5c   ..#........\...\
2a960   00 50 07 86 10 16 38 5c  2c 20 04 35 20 60 03 32   .P....8\, .5 `.2
2a970   00 00 28 8c 00 30 20 8c  fb ff ff ff 05 16 80 5c   ..(..0 ........\
2a980   04 16 88 5c 0f 16 90 5c  00 50 03 86 00 00 80 8c   ...\...\.P......
2a990   00 00 00 0a 00 30 28 88  50 0a 06 10 01 60 21 8c   .....0(.P....`!.
2a9a0   00 30 20 8a 50 0a 06 10  00 a0 29 8a 48 e0 4f 90   .0 .P.....).H.O.
2a9b0   12 e0 49 92 16 e0 69 92  4c e0 47 90 1a e0 41 92   ..I...i.L.G...A.
2a9c0   1e e0 71 92 26 e0 79 92  00 00 20 8c 2a e0 21 92   ..q.&.y... .*.!.
2a9d0   81 c9 20 59 0a e0 21 92  10 e0 20 8c 0b e0 21 92   .. Y..!... ...!.
```

Mar 27 18:20 1996 image.txt Page 267

```
2a9e0   d0 94 fd 09 90 90 22 74  2e e0 21 92 32 e0 59 92   ......"t..!.2.Y.
2a9f0   00 00 20 8c 22 e0 21 92  00 30 20 90 58 0a 06 10   .. .".!..0 .X...
2aa00   35 e0 21 92 00 30 38 92  58 0a 06 10 0c e0 2a 37   5.!..08.X.....*7
2aa10   18 a0 23 90 14 20 01 35  00 30 20 8c 58 24 06 10   ..#.. .5.0 .X$..
2aa20   0e e0 21 92 0c 00 00 08  18 a0 23 90 0e e0 21 92   ..!.......#...!.
2aa30   00 d0 21 88 10 0e 29 59  00 30 20 8c 00 00 ff ff   ..!...)Y.0 .....
2aa40   85 00 21 58 88 09 31 58  18 8c 29 59 ff 00 20 8c   ..!X..1X..)Y.. .
2aa50   85 00 29 58 02 e0 21 90  00 10 29 82 10 8c 29 59   ..)X..!...)...)Y
2aa60   ff 00 20 8c 85 00 29 58  02 e0 21 90 01 20 29 82   .. ...)X..!.. ).
2aa70   08 8c 29 59 ff 00 20 8c  85 00 29 58 02 e0 21 90   ..)Y.. ...)X..!.
2aa80   02 20 29 82 ff 00 20 8c  86 00 29 58 02 e0 21 90   . )... ...)X..!.
2aa90   03 20 29 82 00 00 28 8c  02 e0 21 90 04 20 29 82   . )...(...!.. ).
2aaa0   01 00 28 8c 02 e0 21 90  05 20 29 82 00 00 28 8c   ..(...!.. )...(.
2aab0   02 e0 21 90 06 20 29 82  02 e0 21 90 07 20 29 82   ..!.. )...!.. ).
2aac0   02 e0 21 90 08 20 29 82  02 e0 21 90 09 20 29 82   ..!.. )...!.. ).
2aad0   02 e0 21 90 0a 20 29 82  02 e0 21 90 0b 20 29 82   ..!.. )...!.. ).
2aae0   02 e0 21 90 0c 20 29 8c  ff 00 20 8c 05 16 80 5c   ..!.. )... ....\
2aaf0   04 16 88 5c 0c 16 90 5c  08 14 00 09 10 16 48 5c   ...\...\......H\
2ab00   50 e0 4f 92 1c c0 80 3a  07 16 80 5c 50 e0 4f 90   P.O....:...\P.O.
2ab10   09 16 88 5c 0c fd ff 09  00 00 80 8c 00 00 00 0a   ...\............
2ab20   00 30 20 8c ff ff 00 00  44 e0 4f 90 89 00 31 58   .0 .....D.O...1X
2ab30   88 8d 29 59 ff 00 20 8c  85 00 29 58 02 e0 21 90   ..)Y.. ...)X..!.
2ab40   0c 20 21 8c 04 c0 20 59  00 10 29 82 ff 00 20 8c   . !... Y..)... .
2ab50   86 00 29 58 02 e0 21 90  0c 20 21 8c 04 c0 20 59   ..)X..!.. !... Y
2ab60   01 20 29 82 00 30 20 8c  ff ff 00 00 40 e0 47 90   . )..0 .....@.G.
2ab70   88 00 31 58 88 8d 29 59  ff 00 20 8c 85 00 29 58   ..1X..)Y.. ...)X
2ab80   02 e0 21 90 0c 20 21 8c  04 c0 20 59 02 20 29 82   ..!.. !... Y. ).
2ab90   ff 00 20 8c 86 00 29 58  02 e0 21 90 0c 20 21 8c   .. ...)X..!.. !.
2aba0   04 c0 20 59 03 20 29 82  07 16 80 5c 24 f6 ff 09   .. Y. )....\$...
2abb0   0c 20 04 3a 00 00 50 8c  08 00 00 08 07 16 50 5c   . .:..P.......P\
2abc0   0a 16 80 5c 00 00 00 0a  00 00 00 00 00 00 00 00   ...\............
2abd0   00 30 88 8c f1 ff ff ff  48 fc ff 08 fc a7 02 00   .0......H.......
2abe0   fc a7 02 00 fc a7 02 00  fc a7 02 00 08 a8 02 00   ................
2abf0   30 a7 02 00 08 a8 02 00  fc a7 02 00 08 a8 02 00   0...............
2ac00   30 a7 02 00 fc a7 02 00  fc a7 02 00 08 a8 02 00   0...............
2ac10   08 a8 02 00 08 a8 02 00  fc a7 02 00 08 a8 02 00   ................
2ac20   fc a7 02 00 fc a7 02 00  ec a5 02 00 00 00 00 00   ................
2ac30   50 60 08 8c 10 16 48 5c  70 e0 4f 92 11 16 60 5c   P`....H\p.O...`\
2ac40   12 16 68 5c 13 16 40 5c  74 e0 47 92 14 16 70 5c   ..h\..@\t.G...p\
2ac50   15 16 48 5c 76 e0 4f 92  18 20 04 32 14 20 03 32   ..H\v.O.. .2. .2
```

Mar 27 18:20 1996 image.txt Page 288

```
2ac60   10 60 03 33 74 e0 4f 90  08 60 02 32 10 a0 03 35   .`.3t.O..`.2...5
2ac70   00 30 80 8c fd ff ff ff  00 00 00 0a 70 e0 4f 90   .0..........p.O.
2ac80   02 50 32 90 c6 60 2a 90  40 e0 27 8c c6 16 80 5c   .P2..`*.@.'....\
2ac90   05 16 8d 5c 04 16 90 5c  18 14 00 09 18 0e 24 59   ...\...\......$Y
2aca0   98 0d 21 59 4c 20 01 39  70 e0 4f 90 02 60 ea 90   ..!YL .9p.O..`..
2acb0   06 60 9a 90 40 e0 97 8c  50 e0 bf 8c 01 00 38 8c   .`..@...P.....8.
2acc0   00 00 30 8c 06 16 28 5c  05 16 20 5c 1d 16 80 5c   ..0...(\.. \...\
2acd0   13 16 88 5c 17 16 98 5c  07 16 a0 5c 06 16 a8 5c   ...\...\...\...\
2ace0   05 16 b0 5c 04 16 b8 5c  48 15 00 09 10 20 04 3e   ...\...\H.... .>
2acf0   00 30 80 8c f3 ff ff ff  00 00 00 0a 74 e0 4f 90   .0..........t.O.
2ad00   02 60 22 80 3c 20 01 30  74 e0 4f 90 02 60 22 80   .`".< .0t.O..`".
2ad10   18 0e 21 59 1c 0c 21 59  28 20 01 3d 74 e0 4f 90   ..!Y..!Y( .=t.O.
2ad20   02 60 22 80 1c 20 39 30  74 e0 4f 90 02 60 22 80   .`".. 90t.O..`".
2ad30   1c 20 29 30 54 e0 2f 88  ff 00 20 8c 10 00 29 3d   . )0T./... ...)=
2ad40   00 30 80 8c f0 ff ff ff  00 00 00 0a 74 e0 4f 90   .0..........t.O.
2ad50   02 60 22 80 10 20 31 30  00 30 80 8c ef ff ff ff   .`".. 10.0......
2ad60   00 00 00 0a 74 e0 4f 90  03 60 22 80 10 20 01 37   ....t.O..`".. .7
2ad70   00 30 80 8c ee ff ff ff  00 00 00 0a 74 e0 4f 90   .0..........t.O.
2ad80   00 50 2a 88 70 e0 47 90  00 10 22 88 10 00 29 3a   .P*.p.G..."...):
2ad90   00 30 80 8c ed ff ff ff  00 00 00 0a 74 e0 4f 90   .0..........t.O.
2ada0   09 16 80 5c bc 17 00 09  18 0e 24 59 98 0d 21 59   ...\......$Y..!Y
2adb0   04 16 40 5c 7c e0 47 92  10 20 01 3a 7c e0 4f 90   ..@\|.G.. .:|.O.
2adc0   09 16 80 5c 00 00 00 0a  74 e0 4f 90 04 60 22 88   ...\....t.O..`".
2add0   04 16 50 5c 78 e0 47 90  0c 00 22 3e 78 e0 4f 90   ..P\x.G...">x.O.
2ade0   09 16 50 5c 00 00 78 8c  7c a0 02 3b 54 e0 2f 88   ..P\..x.|..;T./.
2adf0   05 ce 23 59 0e 00 21 59  04 20 21 88 50 00 29 3d   ..#Y..!Y. !.P.)=
2ae00   56 e0 2f 88 05 ce 23 59  0e 00 21 59 06 20 21 88   V./...#Y..!Y. !.
2ae10   3c 00 29 3d 50 e0 3f 90  00 00 30 8c 06 16 28 5c   <.)=P.?...0...(\
2ae20   05 ce 23 59 0e 00 21 59  00 10 21 90 07 16 80 5c   ..#Y..!Y..!....\
2ae30   06 16 88 5c 05 16 90 5c  04 16 98 5c 0c 16 a0 5c   ...\...\...\...\
2ae40   0d 16 a8 5c 8c 17 00 09  10 20 04 3a 00 30 80 8c   ...\..... .:.0..
2ae50   f0 ff ff ff 00 00 00 0a  01 e0 23 8c 04 16 78 5c   ..........#...x\
2ae60   8c 9f 22 3c 50 e0 1f 90  74 e0 4f 90 04 60 2a 88   .."<P...t.O..`*.
2ae70   06 60 22 88 85 00 21 59  04 16 50 5c 78 e0 47 90   .`"...!Y..P\x.G.
2ae80   0c 00 22 3e 78 e0 4f 90  09 16 50 5c 00 00 48 8c   ..">x.O...P\..H.
2ae90   80 e0 4f 92 74 e0 47 90  04 20 22 88 04 16 78 5c   ..O.t.G.. "...x\
2aea0   84 a0 02 5a e8 00 00 13  54 e0 2f 88 05 ce 23 59   ...Z....T./...#Y
2aeb0   0e 00 21 59 04 20 21 88  05 16 80 5c 04 16 88 5c   ..!Y. !....\...\
2aec0   40 1a 00 09 50 20 04 3a  03 16 48 5c 84 e0 4f 92   @...P .:..H\..O.
2aed0   50 e0 27 90 0c 00 19 35  00 00 58 8c 08 00 00 08   P.'....5..X.....
```

Mar 27 18:20 1996 image.txt Page 265

```
2aee0   0c 16 58 5c 05 ce 23 59  0e 00 21 59 00 10 21 90   ..X\..#Y..!Y..!.
2aef0   84 e0 4f 90 09 16 80 5c  0b 16 88 5c 0d 16 90 5c   ..O....\...\...\
2af00   04 16 98 5c 0c 16 a0 5c  0d 16 a8 5c c4 16 00 09   ...\...\...\....
2af10   10 20 04 3a 00 30 80 8c  10 ff ff ff 00 00 00 0a   . .:.0..........
2af20   56 e0 2f 88 05 ce 23 59  0e 00 21 59 06 20 21 88   V./...#Y..!Y. !.
2af30   05 16 80 5c 04 16 88 5c  8e 16 00 09 10 20 04 3a   ...\...\..... .:
2af40   01 00 48 8c 80 e0 4f 92  34 00 00 08 80 e0 4f 90   ..H...O.4.....O.
2af50   14 60 02 3d 05 ce 23 59  0e 00 21 59 06 20 21 88   .`.=..#Y..!Y. !.
2af60   10 20 29 3a 00 30 80 8c  10 ff ff ff 00 30 00 0a   . ):.0..........
2af70   05 ce 23 59 0e 00 21 59  0e 20 19 90 01 e0 23 8c   ..#Y..!Y. ....#.
2af80   04 16 78 5c 84 a0 02 5a  20 ff ff 14 80 e0 4f 90   ..x\...Z .....O.
2af90   10 60 02 3d 00 30 80 8c  f2 ff ff ff 00 00 00 0a   .`.=.0..........
2afa0   00 00 80 8c 00 00 00 0a  00 00 00 00 00 00 00 00   ................
2afb0   10 16 70 5c 00 00 78 8c  00 10 24 80 04 16 38 5c   ..p\..x...$...8\
2afc0   78 20 01 3a 0f c0 79 59  01 00 30 8c 54 e0 09 39   x .:..yY..0.T..9
2afd0   0e 80 21 59 00 10 29 80  41 00 20 8c 2c 00 29 3c   ..!Y..).A. .,.)<
2afe0   0e 80 21 59 00 10 29 80  5a 00 20 8c 1c 00 29 39   ..!Y..).Z. ...)9
2aff0   0e 80 21 59 00 10 21 80  61 20 29 8c 41 00 20 8c   ..!Y..!.a ).A. .
2b000   84 41 19 59 0c 00 00 08  0e 80 21 59 00 10 19 80   .A.Y......!Y....
2b010   0f c0 78 59 01 a0 21 8c  04 16 30 5c b4 df 21 3e   ..xY..!...0\..!>
2b020   01 e0 21 8c 0e 00 21 59  04 16 70 5c 00 10 21 80   ..!...!Y..p\..!.
2b030   04 16 38 5c 90 3f 01 3d  0b cc 83 70 00 00 00 0a   ..8\.?.=...p....
2b040   20 60 08 8c 10 16 60 5c  11 16 48 5c 40 e0 4f 92    `....`\..H\@.O.
2b050   12 16 40 5c 44 e0 47 92  13 16 48 5c 48 e0 4f 92   ..@\D.G...H\H.O.
2b060   14 16 40 5c 4c e0 47 92  15 16 48 5c 50 e0 4f 92   ..@\L.G...H\P.O.
2b070   00 00 70 8c 18 60 04 32  4c e0 4f 90 10 60 02 32   ..p..`.2L.O..`.2
2b080   0c 20 03 32 1e 20 23 90  10 20 01 35 00 30 80 8c   . .2. #.. .5.0..
2b090   fd ff ff ff 00 00 00 0a  32 20 23 90 05 0a 21 58   ........2 #...!X
2b0a0   0c 20 01 35 00 00 80 8c  00 00 00 0a 40 e0 4f 90   . .5........@.O.
2b0b0   09 16 80 5c fc fe ff 09  10 39 20 90 60 0a 06 10   ...\.....9 .`...
2b0c0   04 16 68 5c 00 28 01 5a  50 01 00 12 06 60 23 88   ..h\.(.ZP....`#.
2b0d0   48 e0 4f 90 09 16 80 5c  04 16 88 5c 14 17 00 09   H.O....\...\....
2b0e0   10 16 78 5c 2e 20 23 90  0d 16 80 5c 04 16 88 5c   ..x\. #....\...\
2b0f0   50 18 00 09 80 28 04 5a  10 01 00 12 04 60 23 88   P....(.Z.....`#.
2b100   44 e0 4f 90 09 16 80 5c  04 16 88 5c f4 17 00 09   D.O....\...\....
2b110   80 28 04 5a f4 00 00 12  1e 60 23 80 28 20 09 30   .(.Z.....`#.( .0
2b120   8f 30 00 5a 00 00 20 22  84 30 00 5a 01 00 18 8c   .0.Z.. ".0.Z....
2b130   58 00 00 15 32 20 23 90  02 2f 01 5a 00 00 18 27   X...2 #../.Z...'
2b140   48 00 00 08 8f 30 00 5a  00 00 20 22 84 30 00 5a   H....0.Z.. ".0.Z
2b150   00 00 58 8c 18 00 00 12  06 60 23 88 84 70 01 5a   ..X......`#..p.Z
```

```
Mar 27 16:20 1996  image.txt Page 270

2b160   00 00 20 25 84 30 00 5a  00 00 58 25 8b 30 00 5a   .. %.0.Z..X%.0.Z
2b170   01 00 50 8c 10 00 00 15  32 20 23 90 00 2f 01 5a   ..P.....2 #../.Z
2b180   00 00 50 27 0a 18 18 5c  80 e0 00 3d 00 00 e8 8c   ..P'...\...=....
2b190   13 16 38 5c 00 50 33 90  07 16 28 5c 05 18 20 5c   ..8\.P3...(\.. \
2b1a0   40 e0 4f 90 09 16 80 5c  1a 16 88 5c 07 16 90 5c   @.O....\...\...\
2b1b0   06 16 98 5c 05 16 a0 5c  04 16 a8 5c 14 14 00 09   ...\...\...\....
2b1c0   48 20 04 3d 1e 60 23 80  0c 20 09 30 1f 60 83 c0   H .=.`#.. .0.`..
2b1d0   00 00 00 0a 50 e0 4f 90  10 40 72 3c 00 30 80 8c   ....P.O..@r<.0..
2b1e0   ef ff ff ff 00 00 00 0a  0e 16 20 5c 01 a0 73 8c   .......... \..s.
2b1f0   4c e0 4f 90 04 5d 6a 92  10 e0 03 3d 0e 60 4b 90   L.O..]j....=.`K.
2b200   40 e0 4f 92 a8 fe ff 08  12 60 23 90 04 16 68 5c   @.O......`#...h\
2b210   00 28 01 5a b8 fe ff 15  38 a0 03 3b 81 89 23 59   .(.Z....8..;..#Y
2b220   4c e0 4f 90 04 5d 22 90  06 20 21 88 24 20 29 3d   L.O..]".. !.$ )=
2b230   03 00 20 8c 48 e0 4f 90  09 16 80 5c 04 16 88 5c   .. .H.O....\...\
2b240   b0 15 00 09 0c 20 04 3d  00 00 80 8c 00 00 00 0a   ..... .=........
2b250   0e 16 80 5c 00 00 00 0a  00 00 00 00 00 00 00 00   ...\............
2b260   10 16 68 5c 4c 8c fd 09  90 90 32 74 00 30 20 90   ..h\L.....2t.0 .
2b270   b0 0a 06 10 80 20 01 35  00 30 20 90 58 0a 06 10   ..... .5.0 .X...
2b280   04 16 78 5c 28 20 01 32  2e e0 23 90 04 81 29 59   ..x\( .2..#...)Y
2b290   00 30 20 8c 00 00 00 80  08 00 29 33 2e e0 33 90   .0 .......)3..3.
2b2a0   36 e0 23 90 04 16 78 5c  e0 3f 01 35 00 00 38 8c   6.#...x\.?.5..8.
2b2b0   07 39 20 90 60 0a 06 10  04 16 70 5c 2c 20 01 32   .9 .`.....p\, .2
2b2c0   0e 16 80 5c 06 16 88 5c  78 16 00 09 10 20 04 3d   ...\...\x.... .=
2b2d0   1e a0 1b 80 80 c9 18 58  1e a0 1b 82 12 a0 23 90   .......X......#.
2b2e0   04 16 70 5c dc 3f 01 35  01 e0 21 8c 04 16 38 5c   ..p\.?.5..!...8\
2b2f0   c0 3f 59 39 08 60 03 35  00 00 00 0a 00 30 20 8c   .?Y9.`.5.....0 .
2b300   00 97 49 01 0d 16 80 5c  04 16 88 5c c4 ca ff 08   ..I....\...\....
2b310   10 16 28 5c 00 30 20 90  b4 0a 06 10 58 20 01 35   ..(\.0 .....X .5
2b320   00 00 18 8c 03 39 30 8c  60 0a 06 10 03 39 20 90   .....90.`....9 .
2b330   60 0a 06 10 04 16 38 5c  30 20 01 32 1e e0 21 80   `.....8\0 .2..!.
2b340   18 20 01 30 12 e0 21 90  00 90 21 92 07 16 80 5c   . .0..!...!....\
2b350   e0 df fe 09 08 00 00 06  12 e0 31 8c 00 90 21 90   ..........1...!.
2b360   04 16 38 5c d8 3f 01 35  01 e0 20 8c 04 16 18 5c   ..8\.?.5.. ....\
2b370   b4 3f 59 39 08 60 01 35  00 00 00 0a 00 30 20 8c   .?Y9.`.5.....0 .
2b380   00 5c 26 05 05 16 80 5c  04 16 88 5c 44 ca ff 08   .\&....\...\D...
2b390   00 00 18 8c 03 39 20 90  60 0a 06 10 04 16 38 5c   .....9 .`.....8\
2b3a0   28 20 01 32 12 e0 21 90  03 39 20 92 60 0a 06 10   ( .2..!..9 .`...
2b3b0   07 16 80 5c 7c df fe 09  03 39 20 90 60 0a 06 10   ...\|....9 .`...
2b3c0   04 16 38 5c e0 3f 01 35  01 e0 20 8c 04 16 18 5c   ..8\.?.5.. ....\
2b3d0   c4 3f 59 39 00 00 00 0a  00 00 00 00 00 00 00 00   .?Y9............
```

```
Mar 27 19:20 1996  image.txt Page 271

2b3e0   10 16 68 5c 11 16 70 5c  12 16 78 5c 13 16 80 5c   ..h\..p\..x\...\
2b3f0   00 00 38 8c 0c 60 04 35  00 00 80 8c 00 00 00 0a   ..8..`.5........
2b400   00 90 23 80 80 28 01 5a  ac 00 00 12 00 90 2b 80   ..#..(.Z......+.
2b410   c0 00 20 8c 85 00 19 58  44 c0 20 3d 0c e0 03 35   .. ....XD. =...5
2b420   00 00 80 8c 00 00 00 0a  00 90 2b 80 00 30 20 8c   ..........+..0 .
2b430   3f ff ff ff 85 00 21 58  08 0f 21 59 0f 00 29 59   ?.....!X..!Y..)Y
2b440   01 a0 23 80 05 00 29 59  05 16 70 5c 0f 80 21 59   ..#...)Y..p\..!Y
2b450   5c 00 29 34 00 00 80 8c  00 00 00 0a 48 e0 00 3d   \.)4........H..=
2b460   28 50 03 32 00 90 23 80  01 20 21 8c 0d 16 80 5c   (P.2..#.. !....\
2b470   0e 16 88 5c 04 16 90 5c  30 61 fd 0b 00 90 23 80   ...\...\0a....#.
2b480   01 20 21 8c 0d 00 69 59  00 90 23 80 01 20 21 8c   . !...iY..#.. !.
2b490   07 00 39 59 00 90 23 80  01 20 21 8c 0e 00 71 59   ..9Y..#.. !...qY
2b4a0   0c 00 00 08 00 00 80 8c  00 00 00 0a 00 90 23 80   ..............#.
2b4b0   5c 3f 01 3d 0c 60 03 32  00 00 20 8c 00 50 23 82   \?.=.`.2.. ..P#.
2b4c0   01 e0 81 8c 00 00 00 0a  00 00 00 00 00 00 00 00   ................
2b4d0   10 16 60 5c 11 16 48 5c  12 16 58 5c 13 16 50 5c   ..`\..H\..X\..P\
2b4e0   14 16 68 5c 0e 60 74 90  00 00 78 8c 0c 60 04 32   ..h\.`t...x..`.2
2b4f0   08 e0 02 32 10 60 03 35  00 30 80 8c fd ff ff ff   ...2.`.5.0......
2b500   00 00 00 0a 06 60 22 88  02 09 41 59 3c 20 6a 34   .....`"...AY< j4
2b510   08 39 20 90 a0 bc 02 00  00 10 01 84 00 30 78 8c   .9 ..........0x.
2b520   90 bc 02 00 24 00 00 08  00 30 78 8c 7c bc 02 00   ....$....0x.|...
2b530   18 00 00 08 00 30 78 8c  80 bc 02 00 0c 00 00 08   .....0x.........
2b540   00 30 78 8c 84 bc 02 00  30 e0 03 35 1c 20 03 32   .0x.....0..5. .2
2b550   0e 60 2a 90 0c 60 22 88  0c 16 80 5c 05 16 88 5c   .`*..`"....\...\
2b560   04 16 90 5c 44 60 fd 0b  0c 60 22 88 00 50 23 92   ...\D`...`"..P#.
2b570   00 00 80 8c 00 00 00 0a  00 00 20 8c 00 50 23 92   .......... ..P#.
2b580   00 d0 23 c0 80 28 01 5a  e0 00 00 12 0f 16 20 5c   ..#..(.Z...... \
2b590   01 e0 7b 8c 00 10 19 c0  68 00 20 8c 38 c0 20 3d   ..{.....h. .8. =
2b5a0   20 20 03 32 00 90 33 80  0c 16 20 5c 0c 16 28 5c     .2..3... \..(\
2b5b0   00 10 31 82 01 a0 23 80  02 60 61 8c 01 60 21 82   ..1...#..`a..`!.
2b5c0   02 a0 73 8c 00 50 23 90  02 20 21 8c 00 50 23 92   ..s..P#.. !..P#.
2b5d0   8c 00 00 08 64 00 20 8c  78 c0 20 3d 0c 16 80 5c   ....d. .x. =...\
2b5e0   0e 16 88 5c 0b 16 90 5c  0a 16 98 5c f4 fd ff 09   ...\...\...\....
2b5f0   10 16 38 5c 10 20 04 3d  00 30 80 8c fe ff ff ff   ..8\. .=.0......
2b600   00 00 00 0a 00 50 23 90  04 c0 21 59 00 50 23 92   .....P#...!Y.P#.
2b610   08 20 03 32 0c c0 61 59  00 00 28 8c 05 16 20 5c   . .2..aY..(... \
2b620   05 16 80 5c 04 16 88 5c  0e 16 90 5c 0b 16 98 5c   ...\...\...\...\
2b630   0a 16 a0 5c ac 06 00 09  10 16 38 5c 0c 20 04 3e   ...\......8\. .>
2b640   07 16 80 5c 00 00 00 0a  0e c0 71 59 10 00 00 08   ...\......qY....
2b650   00 30 80 8c f3 ff ff ff  00 00 00 0a 00 d0 23 c0   .0............#.
```

```
Mar 27 16:20 1996  image.txt Page 272

2b660   80 28 01 5a 28 ff ff 13  00 00 80 8c 00 00 00 0a   ..Z(............
2b670   20 60 08 8c 10 16 48 5c  44 e0 4f 92 11 15 60 5c    `....H\D.O...`\
2b680   12 16 58 5c 13 16 40 5c  48 e0 47 92 14 16 68 5c   ..X\..@\H.G...h\
2b690   15 16 48 5c 40 e0 4f 92  00 00 40 8c 50 e0 47 92   ..H\@.O...@.P.G.
2b6a0   14 20 04 32 10 20 03 32  48 e0 4f 90 08 60 02 32   . .2. .2H.O..`.2
2b6b0   10 60 03 35 00 30 80 8c  fd ff ff ff 00 00 00 0a   .`.5.0..........
2b6c0   44 e0 4f 90 1e 60 22 90  1c 20 29 90 03 16 78 5c   D.O..`". )...x\
2b6d0   00 30 20 8c 9b c4 20 00  0c 00 29 36 00 30 78 8c   .0 ... ...)6.0x.
2b6e0   9b c4 20 00 48 e0 4f 90  04 60 2a 88 06 60 22 88   .. .H.O..`*..`".
2b6f0   83 00 41 59 54 e0 47 92  44 e0 4f 90 32 60 2a 90   ..AYT.G.D.O.2`*.
2b700   40 00 20 8c 04 42 21 58  20 20 01 32 48 e0 4f 90   @. ..B!X  .2H.O.
2b710   08 60 2a 88 0a 60 22 88  83 00 21 59 54 e0 47 90   .`*..`"...!YT.G.
2b720   88 00 41 59 54 e0 47 92  54 e0 4f 90 4c e0 47 90   ..AYT.G.T.O.L.G.
2b730   10 00 4a 36 00 30 80 8c  ef ff ff ff 00 00 00 0a   ..J6.0..........
2b740   48 e0 4f 90 04 60 22 88  04 16 18 5c 54 e0 47 90   H.O..`"....\T.G.
2b750   84 20 02 5a a0 01 00 13  00 00 30 8c 05 ce 20 59   . .Z......0... Y
2b760   0d 00 29 59 40 e0 27 8c  06 16 80 5c 05 16 88 5c   ..)Y@.'....\...\
2b770   0c 16 90 5c 0b 16 98 5c  04 16 a0 5c 54 fd ff 09   ...\...\...\T...
2b780   18 0e 24 59 98 0d 21 59  04 16 48 5c 58 e0 4f 92   ..$Y..!Y..H\X.O.
2b790   10 20 01 3a 58 e0 4f 90  09 16 80 5c 00 00 00 0a   . .:X.O....\....
2b7a0   00 00 28 8c 05 ce 20 59  0d 00 21 59 00 10 21 90   ..(... Y..!Y..!.
2b7b0   05 16 80 5c 04 16 88 5c  0c 16 90 5c 0b 16 98 5c   ...\...\...\...\
2b7c0   20 fc ff 09 10 16 50 5c  10 20 04 3d 00 30 80 8c    .....P\. .=.0..
2b7d0   fe ff ff ff 00 00 00 0a  20 a0 2a 8c 40 e0 27 90   ........ .*.@.'.
2b7e0   05 00 81 59 ec da fe 09  10 16 70 5c 10 20 04 35   ...Y......p\. .5
2b7f0   00 30 80 8c fb ff ff ff  00 00 00 0a 05 ce 20 59   .0............ Y
2b800   0d 00 e9 59 00 50 27 b0  00 90 23 b2 10 60 27 b0   ...Y.P'...#..`'.
2b810   10 a0 23 b2 20 a0 23 8c  00 90 23 92 40 e0 27 90   ..#. .#...#.@.'.
2b820   0c a0 23 8a 00 90 23 90  04 80 22 59 0e a0 23 92   ..#...#..."Y..#.
2b830   00 90 2b 90 05 ce 20 59  0d 00 21 59 00 10 21 90   ..+... Y..!Y..!.
2b840   05 16 80 5c 04 16 88 5c  0c 16 90 5c 0b 16 98 5c   ...\...\...\...\
2b850   90 fb ff 09 10 80 82 3a  00 30 80 8c f3 ff ff ff   .......:.0......
2b860   00 00 00 0a 0e a0 33 90  05 ce 20 59 0d 00 29 59   ......3... Y..)Y
2b870   40 e0 27 8c 06 16 80 5c  05 16 88 5c 0c 16 90 5c   @.'....\...\...\
2b880   0b 16 98 5c 04 16 a0 5c  48 fc ff 09 18 0e 24 59   ...\...\H.....$Y
2b890   98 0d 21 59 04 16 48 5c  58 e0 4f 92 10 20 01 3a   ..!Y..H\X.O.. .:
2b8a0   58 e0 4f 90 09 16 80 5c  00 00 00 0a 0c a0 2b 88   X.O....\......+.
2b8b0   40 e0 27 90 10 00 29 32  00 30 80 8c f3 ff ff ff   @.'...)2.0......
2b8c0   00 00 00 0a 08 a0 23 90  08 00 79 36 08 a0 7b 90   ......#...y6..{.
2b8d0   50 e0 4f 90 12 a0 4b 92  0e 16 48 5c 50 e0 4f 92   P.O...K...H\P.O.
```

Mar 27 18:20 1998 image.txt Page 273

```
2b8e0  01 e0 20 8c 04 16 18 5c  54 e0 47 90 84 20 02 5a   .. ....\T.G.. .Z
2b8f0  6d fe ff 14 50 e0 4f 90  09 16 70 5c 44 60 02 32   n...P.O...p\D`.2
2b900  08 a0 23 90 08 c0 23 36  08 a0 75 92 00 90 83 90   ..#...#6..(.....
2b910  a0 f6 ff 09 10 16 18 5c  12 a0 2b 90 05 16 48 5c   .......\..+...H\
2b920  50 e0 4f 92 10 39 20 90  60 0a 06 10 12 a0 23 92   P.O..9 . .....#.
2b930  10 39 70 92 60 0a 06 10  05 16 70 5c c4 7f 01 35   .9p.`.....p\...5
2b940  00 00 80 8c 00 00 00 0a  00 00 00 00 00 00 00 00   ................
2b950  10 60 08 8c 10 16 50 5c  11 16 60 5c 12 16 48 5c   .`....P\..`\..H\
2b960  40 e0 4f 92 13 16 68 5c  14 16 70 5c 15 16 40 5c   @.O...h\..p\..@\
2b970  44 e0 47 92 18 8e 25 59  98 0d 59 59 0c 20 04 32   D.G...%Y..YY. .2
2b980  08 20 03 32 10 60 03 35  00 30 80 8c fd ff ff ff   . .2.`.5.0......
2b990  00 0c 00 0a 02 60 23 80  14 20 29 30 04 60 23 88   .....`#.. )0.`#.
2b9a0  0c 20 01 3a 06 60 23 88  0c 20 01 3a 00 00 80 8c   . .:.`#.. .:....
2b9b0  00 00 00 0a 0b 16 48 5c  48 e0 4f 92 00 30 20 8c   ......H\H.O..0 .
2b9c0  f2 ff ff ff 1c c0 22 3a  00 30 20 8c f6 ff ff ff   ......":.0 .....
2b9d0  48 e0 4f 90 0c 40 22 3a  00 00 80 8c 00 00 00 0a   H.O..@":........
2b9e0  04 a0 2b 88 ff 00 20 8c  10 00 29 3d 00 30 80 8c   ..+... ...)=.0..
2b9f0  f0 ff ff ff 00 00 00 0a  04 60 2b 88 06 60 23 88   .........`+..`#.
2ba00  85 00 29 59 08 60 23 88  85 00 29 59 0a 60 23 88   ..)Y.`#...)Y.`#.
2ba10  85 00 21 59 04 16 18 5c  44 e0 4f 90 0c 40 22 36   ..!Y...\D.O..@"6
2ba20  44 e0 4f 90 09 16 18 5c  04 60 2b 88 06 60 23 88   D.O....\.`+..`#.
2ba30  85 00 21 59 04 16 38 5c  34 c0 20 3b 05 ce 21 59   ..!Y..8\4. ;..!Y
2ba40  0e 00 21 59 04 20 29 88  04 a0 23 88 14 00 29 3d   ..!Y. )...#...)=
2ba50  05 ce 21 59 0e 00 21 59  06 20 21 88 10 20 31 3a   ..!Y..!Y. !.. 1:
2ba60  01 e0 21 8c 04 16 38 5c  d4 df 20 3c 0c c0 38 3d   ..!...8\.. <..8=
2ba70  00 00 80 8c 00 00 00 0a  00 00 28 8c 00 90 23 90   ..........(...#.
2ba80  05 16 80 5c 04 16 88 5c  0c 16 90 5c 40 e0 4f 90   ...\...\...\@.O.
2ba90  09 16 98 5c 4c f9 ff 09  10 16 40 5c 4c e0 47 92   ...\L.....@\L.G.
2baa0  10 20 04 3d 00 30 80 8c  fe ff ff ff 00 00 00 0a   . .=.0..........
2bab0  4c e0 4f 90 20 60 82 8c  18 d8 fe 09 10 16 78 5c   L.O. `........x\
2bac0  10 20 04 35 00 30 80 8c  fb ff ff ff 00 00 00 0a   . .5.0..........
2bad0  20 e0 23 8c 00 d0 23 92  00 d0 2b 90 00 90 23 90    .#...#...+...#.
2bae0  05 16 80 5c 04 16 88 5c  0c 16 90 5c 40 e0 4f 90   ...\...\...\@.O.
2baf0  09 16 98 5c ec f8 ff 09  4c e0 47 90 10 00 82 3a   ...\....L.G....:
2bb00  00 30 80 8c f3 ff ff ff  00 00 00 0a 04 a0 23 88   .0............#.
2bb10  04 e0 23 8a 06 a0 23 88  06 e0 23 8a 05 ce 21 59   ..#...#...#...!Y
2bb20  0e 00 21 59 0e 20 29 90  05 ce 21 59 0e 00 21 59   ..!Y. )...!Y..!Y
2bb30  0c 20 21 88 05 00 21 59  04 09 21 59 00 10 21 80   . !...!Y..!Y..!.
2bb40  18 0e 31 59 05 ce 21 59  0e 00 21 59 0e 20 29 90   ..1Y..!Y..!Y. ).
2bb50  05 ce 21 59 0e 00 21 59  0c 20 21 88 05 00 21 59   ..!Y..!Y. !...!Y
```

Mar 27 18:20 1996 image.txt Page 2/4

```
2bb60  04 09 21 59 01 20 21 80  10 0e 21 59 6b 03 31 58   ..!Y. !...!...1X
2bb70  05 ce 21 59 0e 00 21 59  0e 20 29 90 05 ce 21 59   ..!...!Y. )...!Y
2bb80  0e 00 21 59 0c 20 21 6b  03 00 21 59 04 09 21 59   ..!Y. !...!Y..!Y
2bb90  02 20 21 80 08 0e 21 59  6b 03 31 58 05 ce 21 59   . !...!Y..1X..!Y
2bba0  0e 00 21 59 0e 20 29 90  05 ce 21 59 0e 00 21 59   ..!Y. )...!Y..!Y
2bbb0  0c 20 21 6b 05 00 21 59  04 09 21 59 03 20 21 80   . !...!Y..!Y. !.
2bbc0  86 03 21 58 08 e0 23 92  00 00 20 8c 0c e0 23 8a   ..!X..#... ...#.
2bbd0  0e e0 23 92 05 ce 21 59  0e 00 21 59 1b 20 21 90   ..#...!Y..!Y. !.
2bbe0  1b e0 23 92 05 ce 21 59  0e 00 21 59 1a 20 21 90   ..#...!Y..!Y. !.
2bbf0  1a e0 23 92 1e e0 eb 80  d1 49 e1 58 1e e0 eb 82   ..#......I.X....
2bc00  1e e0 eb 80 02 4e e1 58  1e e0 eb 82 1e e0 eb 80   .....N.X........
2bc10  03 4e e1 58 1e e0 eb 82  11 e0 5b c2 08 e0 2b 90   .N.X......[...+.
2bc20  1e a0 22 90 1c 20 21 90  1c 00 29 3b 1e a0 22 90   ..".. !...);..".
2bc30  1c 20 21 90 08 e0 23 92  08 e0 2b 90 00 30 20 8c   . !...#...+..0 .
2bc40  9b c4 20 00 10 00 29 3b  00 30 20 8c 9b c4 20 00   .. ...);.0 ... .
2bc50  08 e0 23 92 00 a0 83 90  3b f3 ff 05 10 16 38 5c   ..#.....;.....8\
2bc60  10 39 20 90 60 0a 06 10  12 e0 23 92 10 39 78 92   .9 .`.....#..9x.
2bc70  60 0a 06 10 00 00 80 8c  00 00 00 0a 68 64 00 00   `...........hd..
2bc80  64 00 00 00 64 64 00 00  00 00 00 00 00 00 00 00   d...dd..........
2bc90  64 64 68 68 68 68 68 68  68 68 68 68 00 00 00 00   ddhhhhhhhhhh....
2bca0  34 b5 02 00 48 b5 02 00  48 b5 02 00 34 b5 02 00   4...H...H...4...
2bcb0  1c b5 02 00 34 b5 02 00  34 b5 02 00 34 b5 02 00   ....4...4...4...
2bcc0  48 b5 02 00 48 b5 02 00  34 b5 02 00 48 b5 02 00   H...H...4...H...
2bcd0  40 b5 02 00 28 b5 02 00  00 00 00 00 00 00 00 00   @...(...........
2bce0  10 60 08 8c 10 16 60 5c  11 16 68 5c 12 16 70 5c   .`....`\..h\..p\
2bcf0  13 16 48 5c 40 e0 4f 92  14 16 40 5c 44 e0 47 92   ..H\@.O...@\D.G.
2bd00  00 00 58 8c 01 00 50 8c  10 a0 04 35 00 30 80 8c   ..X...P....5.0..
2bd10  fd ff ff ff 00 00 00 0a  00 90 2b 80 05 16 38 5c   ..........+...8\
2bd20  c0 00 20 8c 85 00 49 58  48 e0 4f 92 68 40 22 3d   .. ...IXH.O.h@"=
2bd30  40 e0 4f 90 10 60 02 35  00 30 80 8c fe ff ff ff   @.O..`.5.0......
2bd40  00 00 00 0a 08 a0 02 3a  02 e0 5a 8c 00 00 50 8c   .......:..Z...P.
2bd50  00 90 2b 80 00 30 20 8c  3f ff ff ff 85 00 21 58   ..+..0 .?.....!X
2bd60  08 0f 21 59 40 e0 4f 90  09 00 29 59 01 a0 23 80   ..!Y@.O...)Y..#.
2bd70  05 00 29 59 05 16 70 5c  44 e0 47 90 09 00 22 59   ..)Y..p\D.G..."Y
2bd80  05 20 01 5a 5c 01 00 14  00 30 80 8c fe ff ff ff   . .Z\....0......
2bd90  00 00 00 0a 48 e0 4f 90  80 68 02 5a 38 01 00 15   ....H.O..h.Z8...
2bda0  0c a0 02 3a 01 e0 21 8c  8b 00 59 59 00 28 03 5a   ...:..!...YY.(.Z
2bdb0  a0 00 00 12 01 00 78 8c  81 e8 01 5a c4 00 00 11   ......x....Z....
2bdc0  0e c0 23 59 00 10 19 80  44 e0 00 3d 84 49 23 59   ..#Y....D..=.I#Y
2bdd0  04 1b 68 5c 10 20 01 3e  00 30 80 8c ff ff ff ff   ..h\. .>.0......
```

Mar 27 15:20 1996 image.txt Page 275

| | | | | | | | | | | | | | | | | | |
|---|---|---|---|---|---|---|---|---|---|---|---|---|---|---|---|---|---|
| 2bde0 | 00 | 00 | 00 | 0a | 5c | 00 | 30 | 8c | 0c | 16 | 20 | 5c | 0c | 16 | 28 | 5c | ....\.0... \..(\ |
| 2bdf0 | 00 | 10 | 31 | c2 | 30 | 00 | 20 | 8c | 01 | 60 | 21 | c2 | 02 | 60 | 21 | c2 | ...1.0. ..`!..`!. |
| 2be00 | 04 | 60 | 61 | 8c | 03 | 60 | 21 | c2 | 68 | 00 | 00 | 0a | 2e | 00 | 20 | 8c | . a.. !.h..... . |
| 2be10 | 0c | c0 | 20 | 3a | 5c | 00 | 20 | 8c | 2c | c0 | 20 | 3a | 81 | 49 | 23 | 59 | .. :\. ,. :.I#Y |
| 2be20 | 04 | 16 | 68 | 5c | 10 | 20 | 01 | 3e | 00 | 30 | 80 | 8c | ff | ff | ff | ff | ..h\. .>.0...... |
| 2be30 | 00 | 00 | 00 | 0a | 5c | 00 | 28 | 8c | 0c | 16 | 20 | 5c | 01 | 20 | 63 | 8c | ....\.(... \. c. |
| 2be40 | 00 | 10 | 29 | c2 | 81 | 49 | 23 | 59 | 04 | 16 | 68 | 5c | 10 | 20 | 01 | 3e | ..)..I#Y..h\. .> |
| 2be50 | 00 | 30 | 80 | 8c | ff | ff | ff | ff | 00 | 00 | 00 | 0a | 0e | c0 | 23 | 59 | .0...........#Y |
| 2be60 | 00 | 10 | 29 | 80 | 0c | 15 | 20 | 5c | 01 | 20 | 63 | 8c | 00 | 10 | 29 | c2 | ..)... \. c...). |
| 2be70 | 01 | e0 | 23 | 8c | 04 | 16 | 78 | 5c | 84 | e0 | 01 | 5a | 44 | ff | ff | 15 | ..#...x\...ZD... |
| 2be80 | 01 | e0 | 21 | 8c | 0e | 00 | 71 | 59 | 58 | 20 | 03 | 32 | 81 | 49 | 23 | 59 | ..!...qYX .2.I#Y |
| 2be90 | 04 | 16 | 68 | 5c | 10 | 20 | 01 | 3e | 00 | 30 | 80 | 8c | ff | ff | ff | ff | ..h\. .>.0...... |
| 2bea0 | 00 | 00 | 00 | 0a | 00 | 90 | 23 | 60 | 10 | 20 | 01 | 3d | 00 | 00 | 48 | 8c | ......#`. .=..H. |
| 2beb0 | 4c | e0 | 41 | 92 | 0c | 00 | 00 | 08 | 2e | 00 | 48 | 8c | 4c | e0 | 41 | 92 | L.A.......H.L.A. |
| 2bec0 | 0c | 16 | 20 | 5c | 01 | 20 | 63 | 8c | 4c | e0 | 41 | 90 | 00 | 10 | 49 | c2 | .. \. c.L.A...I. |
| 2bed0 | 10 | 00 | 00 | 08 | 00 | 30 | 80 | 8c | fe | ff | ff | ff | 00 | 00 | 00 | 0a | .....0.......... |
| 2bee0 | 14 | e0 | 01 | 3a | 00 | 28 | 03 | 5a | 30 | fe | ff | 15 | 80 | a8 | 02 | 5a | ...:.(.Z0......Z |
| 2bef0 | 28 | fe | ff | 15 | 0b | 16 | 60 | 5c | 00 | 00 | 00 | 0a | 00 | 00 | 00 | 00 | (......`\........ |
| 2bf00 | 10 | 16 | 68 | 5c | 11 | 16 | 70 | 5c | 12 | 16 | 78 | 5c | 10 | 16 | 38 | 5c | ..h\..p\..x\..8\ |
| 2bf10 | 10 | a0 | 04 | 35 | 00 | 30 | 80 | 8c | fd | ff | ff | ff | 00 | 00 | 00 | 0a | ...5.0.......... |
| 2bf20 | ff | 00 | 20 | 8c | 08 | 00 | 71 | 36 | ff | 00 | 70 | 8c | 00 | 00 | 18 | 8c | .. ...q6..p..... |
| 2bf30 | 00 | d0 | 23 | c0 | 80 | 28 | 01 | 5a | 10 | 01 | 00 | 12 | 00 | d0 | 2b | c0 | ..#..(.Z......+. |
| 2bf40 | 2e | 00 | 20 | 8c | 85 | 20 | 01 | 5a | 00 | 01 | 00 | 12 | 0d | c1 | 21 | 59 | .. .. .Z......!Y |
| 2bf50 | 10 | 80 | 23 | 34 | 00 | 30 | 80 | 8c | ff | ff | ff | ff | 00 | 00 | 00 | 0a | ..#4.0.......... |
| 2bf60 | 01 | e0 | 18 | 8c | 00 | d0 | 2b | c0 | 5c | 00 | 20 | 8c | 85 | 20 | 01 | 5a | ......+.\. .. .Z |
| 2bf70 | ac | 00 | 00 | 15 | 01 | e0 | 23 | 8c | 04 | 16 | 78 | 5c | 00 | 10 | 29 | c0 | ......#...x\..). |
| 2bf80 | 30 | 00 | 20 | 8c | 98 | 00 | 29 | 3c | 00 | d0 | 2b | c0 | 39 | 00 | 20 | 8c | 0. ...)<..+.9. . |
| 2bf90 | 8c | 00 | 29 | 39 | 01 | e0 | 2b | c0 | 30 | 00 | 20 | 8c | 28 | 00 | 29 | 3c | ..)9..+.0. .(.)< |
| 2bfa0 | 01 | e0 | 2b | c0 | 39 | 00 | 20 | 8c | 1c | 00 | 29 | 39 | 02 | e0 | 2b | c0 | ..+.9. ...)9..+. |
| 2bfb0 | 30 | 00 | 20 | 8c | 10 | 00 | 29 | 3c | 02 | e0 | 2b | c0 | 39 | 00 | 20 | 8c | 0. ...)<..+.9. . |
| 2bfc0 | 10 | 00 | 29 | 3e | 00 | 30 | 80 | 8c | fe | ff | ff | ff | 00 | 00 | 00 | 0a | ..)>.0.......... |
| 2bfd0 | 44 | 60 | 03 | 32 | 00 | d0 | 2b | c0 | 30 | 00 | 20 | 8c | 84 | 41 | 29 | 59 | D`.2..+.0. ..A)Y |
| 2bfe0 | 64 | 00 | 20 | 8c | 85 | 00 | 31 | 74 | 01 | e0 | 2b | c0 | 30 | 00 | 20 | 8c | d. ...1t..+.0. . |
| 2bff0 | 84 | 41 | 21 | 59 | 84 | 90 | 22 | 74 | 86 | 00 | 31 | 59 | 02 | e0 | 2b | c0 | .A!Y.."t..1Y..+. |
| 2c000 | 30 | 00 | 20 | 8c | 84 | 41 | 21 | 59 | 86 | 00 | 29 | 59 | 07 | c0 | 20 | 59 | 0. ..A!Y..)Y.. Y |
| 2c010 | 00 | 10 | 29 | 82 | 03 | e0 | 7b | 8c | 18 | 00 | 00 | 08 | 10 | 60 | 03 | 32 | ..)...{.......`.2 |
| 2c020 | 00 | d0 | 2b | c0 | 07 | c0 | 20 | 59 | 00 | 10 | 29 | 82 | 01 | e0 | 7b | 8c | ..+... Y..)...{. |
| 2c030 | 00 | d0 | 23 | c0 | 14 | 20 | 01 | 3a | 00 | d0 | 2b | c0 | 2e | 00 | 20 | 8c | ..#.. .:..+.... . |
| 2c040 | 85 | 20 | 01 | 5a | 08 | ff | ff | 15 | 3f | 00 | 20 | 8c | 10 | 00 | 19 | 3c | . .Z....?. ....< |
| 2c050 | 00 | 30 | 80 | 8c | fc | ff | ff | ff | 00 | 00 | 00 | 0a | 08 | 60 | 03 | 32 | .0...........`.2 |

Mar 27 18:20 1996 image.txt Page 276

```
2c060   00 a0 19 82 01 e0 20 8c  07 00 39 59 0f 16 20 5c   ...... ...9Y.. \
2c070   01 e0 7b 8c 00 10 21 c0  80 28 01 5a 00 fe ff 15   ..{...!..(.Z....
2c080   0c c1 21 59 10 80 23 34  00 30 80 8c ff ff ff ff   ..!Y..#4.0......
2c090   00 00 00 0a 0c 80 03 32  00 00 20 8c 00 a0 21 82   ..... .2.. ...!.
2c0a0   0c c1 21 59 01 20 81 8c  00 00 00 0a 00 0c 00 00   ..!Y. ..........
2c0b0   10 16 68 5c 12 16 70 5c  10 60 64 38 00 30 80 8c   ..h\..p\.`d8.0..
2c0c0   fd ff ff ff 00 00 00 0a  00 50 23 80 1a 0e 29 59   .........P#...)Y
2c0d0   01 60 23 80 10 0e 21 59  85 03 29 58 02 60 23 80   .`#...!Y..)X.`#.
2c0e0   0b 0e 21 59 85 03 29 58  03 60 23 80 85 03 31 58   ..!Y..)X.`#...1X
2c0f0   04 60 23 80 08 0f 29 59  05 60 23 80 00 0f 21 59   .`#...)Y.`#...!Y
2c100   85 03 21 58 04 a0 23 8a  06 60 23 80 06 0f 29 59   ..!X..#..`#...)Y
2c110   07 60 23 80 00 0f 21 59  85 03 21 58 05 a0 23 8a   .`#...!Y..!X..#.
2c120   08 60 23 80 08 0f 29 59  09 60 23 80 00 0f 21 59   .`#...)Y.`#...!Y
2c130   85 03 21 58 08 a0 23 8a  0a 60 23 80 08 0f 29 59   ..!X..#..`#...)Y
2c140   0b 60 23 80 00 0f 21 59  85 03 21 58 0a a0 23 8a   .`#...!Y..!X..#.
2c150   00 30 20 8c 00 00 ff ff  86 00 21 58 10 0c 21 59   .0 .......!X..!Y
2c160   00 90 23 8a 00 30 20 8c  00 80 00 00 86 00 21 58   ..#..0 .......!X
2c170   0f 0c 21 59 02 a0 1b 80  01 08 19 65 02 a0 1b 82   ..!Y.......e....
2c180   00 30 20 8c 00 78 00 00  86 00 21 58 0b 0c 21 59   .0 ..x....!X..!Y
2c190   02 a0 eb 80 01 0e 21 59  1e 08 e9 65 02 a0 eb 82   ......!Y...e....
2c1a0   00 04 20 8c 86 00 21 58  0a 0c 21 59 02 a0 7b 80   .. ...!X..!Y..{.
2c1b0   05 0e 29 59 20 00 20 8c  04 40 79 65 02 a0 7b 82   ..)Y . ..@ye..{.
2c1c0   00 02 20 8c 86 00 21 58  09 0c 21 59 02 a0 eb 80   .. ...!X..!Y....
2c1d0   06 0e 29 59 40 00 20 8c  04 40 e9 65 02 a0 eb 82   ..)Y@. ..@.e....
2c1e0   00 01 20 8c 86 00 21 58  08 0c 21 59 02 a0 7b 80   .. ...!X..!Y..{.
2c1f0   07 0e 29 59 80 00 20 8c  04 40 79 65 02 a0 7b 82   ..)Y.. ..@ye..{.
2c200   86 00 21 58 07 0c 21 59  03 a0 3b 80 01 08 39 65   ..!X..!Y..;...9e
2c210   03 a0 3b 82 86 d0 23 58  03 a0 1b 80 01 0e 21 59   ..;...#X......!Y
2c220   1e 08 19 65 03 a0 1b 82  00 00 80 8c 00 00 00 0a   ...e............
2c230   30 60 08 8c 10 16 60 5c  11 16 68 5c 12 16 70 5c   0`....`\..h\..p\
2c240   13 16 48 5c 40 e0 4f 92  14 16 40 5c 44 e0 47 92   ..H\@.O...@\D.G.
2c250   15 16 58 5c 16 16 48 5c  48 e0 4f 92 17 16 40 5c   ..X\..H\H.O...@\
2c260   4c e0 47 92 04 a0 2c 88  06 a0 24 88 85 00 29 59   L.G...,...$...)Y
2c270   08 a0 24 88 85 00 29 59  0a a0 24 88 85 00 21 59   ..$...)Y..$...!Y
2c280   04 16 48 5c 50 e0 4f 92  00 00 78 8c 0c 20 3c 8c   ..H\P.O...x.. <.
2c290   00 28 01 5a 9c 02 00 13  44 e0 4f 90 09 c0 22 59   .(.Z....D.O..."Y
2c2a0   0f 20 01 5a 8c 02 00 13  18 c0 7a 34 0b c1 23 59   . .Z......z4..#Y
2c2b0   05 0e 21 59 40 e0 4f 90  09 00 51 59 08 00 00 08   ..!Y@.O...QY....
2c2c0   00 00 50 8c 0a 16 18 5c  00 00 28 8c 05 16 20 5c   ..P....\..(... \
2c2d0   05 16 80 5c 04 16 88 5c  07 16 90 5c 0c 16 98 5c   ...\...\...\...\
```

Mar 27 18:20 1996 image.txt Page 277

```
2c2e0   0a 16 a0 5c fc 19 ff 09  10 16 45 5c 04 e0 4f 92   ...\......E\..O.
2c2f0   10 20 04 3e 54 e0 4f 90  09 16 80 5c 00 00 00 0a   . .>T.O....\....
2c300   08 e0 00 32 00 d0 38 92  54 e0 4f 90 07 40 3a 59   ...2..8.T.O..@:Y
2c310   1c e0 00 32 00 a0 21 80  0a 0f 29 59 01 e0 21 80   ...2..!...)Y..!.
2c320   00 0f 21 59 85 03 21 58  06 e0 20 8a 02 e0 39 8c   ..!Y..!X.. ...9.
2c330   1c e0 00 32 00 a0 21 80  08 0f 29 59 01 e0 21 80   ...2..!...)Y..!.
2c340   00 0f 21 59 85 03 21 58  04 e0 20 8a 02 e0 39 8c   ..!Y..!X.. ...9.
2c350   04 a0 23 88 1c 00 79 33  98 e0 00 32 00 00 20 8c   ..#...y3...2.. .
2c360   08 e0 20 92 0c e0 20 8a  0e e0 20 92 84 00 00 08   .. ... ... .....
2c370   30 e0 00 32 00 a0 21 80  18 0e 29 59 01 e0 21 80   0..2..!...)Y..!.
2c380   10 0e 21 59 85 03 29 58  02 e0 21 80 08 0e 21 59   ..!Y..)X..!...!Y
2c390   85 03 29 58 03 e0 21 80  85 03 21 58 06 e0 20 92   ..)X..!...!X.. .
2c3a0   07 16 30 5c 04 a0 21 8c  04 16 38 5c 00 10 21 80   ..0\..!...8\..!.
2c3b0   08 0f 29 59 05 a0 21 80  00 0f 21 59 85 03 29 58   ..)Y..!...!Y..)X
2c3c0   00 30 20 8c ff ff 00 00  85 00 49 58 58 e0 4f 92   .0 .......IXX.O.
2c3d0   0c e0 00 32 58 e0 4f 90  0c e0 48 8a 02 e0 39 8c   ...2X.O...H...9.
2c3e0   08 e0 00 32 0e e0 38 92  58 e0 4f 90 07 40 3a 59   ...2..8.X.O..@:Y
2c3f0   00 e8 00 5a 0c 01 00 12  00 00 20 8c 12 e0 20 92   ...Z...... ... .
2c400   48 e0 4f 90 16 e0 48 92  4c e0 47 90 1a e0 40 92   H.O...H.L.G...@.
2c410   1e e0 e8 80 01 4e ef 58  1e e0 e8 82 04 a0 2b 88   .....N.X......+.
2c420   06 a0 23 88 85 00 21 59  0f 20 01 5a 00 00 20 24   ..#...!Y. .Z.. $
2c430   1e e0 e8 80 02 0e 21 59  04 08 e9 65 1e e0 e8 82   ......!Y...e....
2c440   1e e0 20 80 02 2f 01 5a  00 00 48 8c 5c e0 4f 92   .. ../.Z..H.\.O.
2c450   1c 00 00 10 02 a0 23 80  1a 0e 21 59 1f 0c 21 59   ......#...!Y..!Y
2c460   04 30 00 5a 00 00 48 25  5c e0 4f 92 5c e0 4f 90   .0.Z..H%\.O.\.O.
2c470   89 30 00 5a 00 00 40 8c  60 e0 47 92 1c 00 00 12   .0.Z..@.`.G.....
2c480   04 a0 23 88 84 30 00 5a  00 00 20 25 84 30 00 5a   ..#..0.Z.. %.0.Z
2c490   00 00 48 25 60 e0 4f 92  60 e0 4f 90 89 30 00 5a   ..H%`.O.`.O..0.Z
2c4a0   00 00 40 8c 64 e0 47 92  3c 00 00 12 0c 20 2b 8c   ..@.d.G.<.... +.
2c4b0   00 d0 20 90 05 16 80 5c  0c 16 88 5c 0d 16 90 5c   .. ....\...\...\
2c4c0   04 16 98 5c 0c 16 a0 5c  0d 16 a8 5c 04 01 00 09   ...\...\...\....
2c4d0   90 30 00 5a 00 00 20 22  84 30 00 5a 00 00 48 25   .0.Z.. ".0.Z..H%
2c4e0   64 e0 4f 92 1e e0 e8 80  64 e0 4f 90 03 4e 22 59   d.O.....d.O..N"Y
2c4f0   08 08 e9 65 1e e0 e8 82  00 00 20 8c 1f e0 20 c2   ...e...... ... .
2c500   0c 40 23 59 0c 00 39 36  0f 16 80 5c 00 00 00 0a   .@#Y..96...\....
2c510   01 e0 23 8c 04 16 78 5c  50 e0 4f 90 14 40 22 33   ..#...x\P.O..@"3
2c520   44 e0 4f 90 09 c0 22 59  0f 20 01 5a 7c fa ff 14   D.O..."Y. .Z|...
2c530   10 c0 7a 36 0b c1 4b 59  68 e0 4f 92 0c 00 00 08   ..z6..KYh.O.....
2c540   00 00 48 8c 68 e0 4f 92  68 e0 4f 90 09 16 80 5c   ..H.h.O.h.O....\
2c550   00 00 00 0a 00 00 00 00  00 00 00 00 00 00 00 00   ................
```

Mar 27 18:20 1996 image.txt Page 278

```
2c560   03 20 24 80 10 0e 21 59  1c 0c 21 59 04 16 18 5c   . $...!Y..!Y...\
2c570   54 20 29 34 03 39 20 90  a0 c9 02 00 00 10 01 84   T )4.9 .........
2c580   00 00 80 8c 00 00 00 0a  00 30 80 8c f8 ff ff ff   .........0......
2c590   00 00 00 0a 00 30 80 8c  f7 ff ff ff 00 00 00 0a   .....0..........
2c5a0   00 30 80 8c f6 ff ff ff  00 00 00 0a 00 30 80 8c   .0...........0..
2c5b0   f5 ff ff ff 00 00 00 0a  00 30 80 8c f4 ff ff ff   .........0......
2c5c0   00 00 00 0a 00 30 80 8c  f0 ff ff ff 00 00 00 0a   .....0..........
2c5d0   10 60 08 8c 10 16 60 5c  11 16 68 5c 12 16 50 5c   .`....`\..h\..P\
2c5e0   13 16 70 5c 14 16 58 5c  15 16 48 5c 40 e0 4f 92   ..p\..X\..H\@.O.
2c5f0   08 20 04 32 10 a0 03 35  00 30 80 8c fd ff ff ff   . .2...5.0......
2c600   00 00 00 0a 00 10 2b 80  05 16 78 5c 00 90 33 80   ......+...x\..3.
2c610   c0 00 20 8c 85 00 21 58  78 20 01 32 c0 00 20 8c   .. ...!Xx .2.. .
2c620   8f 00 29 58 10 00 29 32  00 30 80 8c fe ff ff ff   ..)X..)2.0......
2c630   00 00 00 0a 10 60 03 35  00 30 80 8c fd ff ff ff   .....`.5.0......
2c640   00 00 00 0a 00 10 2b 80  00 30 20 8c 3f ff ff ff   ......+..0 .?...
2c650   85 00 21 58 08 0f 21 59  0a 00 29 59 01 20 23 80   ..!X..!Y..)Y. #.
2c660   05 00 29 59 05 16 60 5c  0d 60 22 59 10 00 29 34   ..)Y..`\.`"Y..)4
2c670   00 30 80 8c fe ff ff ff  00 00 00 0a 00 10 2b 80   .0............+.
2c680   05 16 78 5c c0 00 20 8c  85 00 21 58 90 3f 01 35   ..x\.. ...!X.?.5
2c690   c0 00 20 8c 86 00 21 58  7c 20 01 32 c0 00 20 8c   .. ...!X| .2.. .
2c6a0   86 00 29 58 10 00 29 32  00 30 80 8c fe ff ff ff   ..)X..)2.0......
2c6b0   00 00 00 0a 10 e0 02 35  00 30 80 8c fd ff ff ff   .......5.0......
2c6c0   00 00 00 0a 00 90 2b 80  00 30 20 8c 3f ff ff ff   ......+..0 .?...
2c6d0   85 00 21 58 08 0f 21 59  0b 00 29 59 01 a0 23 80   ..!X..!Y..)Y..#.
2c6e0   05 00 29 59 05 16 70 5c  40 e0 4f 90 0b 40 22 59   ..)Y..p\@.O..@"Y
2c6f0   10 00 29 34 00 30 80 8c  fe ff ff ff 00 00 00 0a   ..)4.0..........
2c700   00 90 2b 80 05 16 30 5c  c0 00 20 8c 85 00 21 58   ..+...0\.. ...!X
2c710   8c 3f 01 35 28 80 79 32  10 80 79 33 01 00 48 8c   .?.5(.y2..y3..H.
2c720   44 e0 4f 92 0c 00 00 08  02 00 48 8c 44 e0 4f 92   D.O.......H.D.O.
2c730   44 e0 4f 90 09 16 80 5c  00 00 00 0a 0c e0 03 35   D.O....\.......5
2c740   00 00 80 8c 00 00 00 0a  01 00 30 8c 84 e0 0b 31   ..........0....1
2c750   0c 80 21 59 00 10 29 80  05 16 38 5c 0e 80 21 59   ..!Y..)...8\..!Y
2c760   00 10 19 80 41 00 20 8c  18 00 29 34 5a 00 20 8c   ....A. ...)4Z. .
2c770   10 00 39 31 61 e0 29 8c  41 00 20 8c 04 41 39 59   ..91a.).A. ..A9Y
2c780   41 00 20 8c 18 00 19 34  5a 00 20 8c 10 00 19 31   A. ....4Z. ....1
2c790   61 e0 28 8c 41 00 20 8c  04 41 19 59 28 c0 38 32   a.(.A. ..A.Y(.82
2c7a0   10 c0 38 33 01 00 48 8c  48 e0 4f 92 0c 00 00 08   ..83..H.H.O.....
2c7b0   02 00 48 8c 48 e0 4f 92  48 e0 4f 90 09 16 80 5c   ..H.H.O.H.O....\
2c7c0   00 00 00 0a 01 a0 21 8c  04 16 30 5c 84 df 23 36   ......!...0\..#6
2c7d0   01 e0 23 8c 0c 00 61 59  01 e0 23 8c 0e 00 71 59   ..#...aY..#...qY
```

```
Mar 27 18:20 1996  image.txt Page 279

2c7e0   24 fe ff 08 00 00 00 00  00 00 00 00 00 00 00 00   $...............
2c7f0   10 16 50 5c 11 16 6d 5c  10 60 04 5a 00 00 20 22   ..P\..m\.`.Z.. "
2c800   84 30 00 5a 01 00 70 8c  18 00 00 15 ff 00 20 8c   .0.Z..p....... .
2c810   0c 20 01 5a 00 00 20 22  84 30 00 5a 00 00 70 25   . .Z.. ".0.Z..p%
2c820   8e 30 00 5a 01 00 78 8c  34 00 00 15 fe 00 20 8c   .0.Z..x.4..... .
2c830   0c 20 01 5a 00 00 20 22  84 30 00 5a 00 00 28 8c   . .Z.. ".0.Z..(.
2c840   14 00 00 12 0d f0 03 5a  00 00 20 22 84 30 00 5a   .......Z.. ".0.Z
2c850   00 00 28 25 85 30 00 5a  00 00 78 25 8f 30 00 5a   ..(%.0.Z..x%.0.Z
2c860   01 00 30 8c 88 00 00 15  fd 00 20 8c 0c 20 01 5a   ..0....... .. .Z
2c870   00 00 20 22 84 30 00 5a  00 00 38 8c 6e 00 00 12   .. ".0.Z..8.n...
2c880   0d f0 01 5a 00 00 20 22  84 30 00 5a 01 00 18 8c   ...Z.. ".0.Z....
2c890   14 00 00 15 0d 70 02 5a  00 00 20 22 84 30 00 5a   .....p.Z.. ".0.Z
2c8a0   00 00 18 25 83 30 00 5a  01 00 58 8c 14 00 00 15   ...%.0.Z..X.....
2c8b0   0d 30 02 5a 00 00 20 22  84 30 00 5a 00 00 58 25   .0.Z.. ".0.Z..X%
2c8c0   8b 30 00 5a 01 00 50 8c  14 00 00 15 0d b0 03 5a   .0.Z..P........Z
2c8d0   00 00 20 22 84 30 00 5a  00 00 50 25 8a 30 00 5a   .. ".0.Z..P%.0.Z
2c8e0   00 00 38 25 87 30 00 5a  00 00 30 25 06 16 80 5c   ..8%.0.Z..0%...\
2c8f0   00 00 00 0a 00 00 00 00  00 00 00 00 00 00 00 00   ................
2c900   10 16 38 5c 10 60 04 5a  00 00 20 22 84 30 00 5a   ..8\.`.Z.. ".0.Z
2c910   01 00 18 8c 18 00 00 15  ff 00 20 8c 07 20 01 5a   .......... .. .Z
2c920   00 00 20 22 84 30 00 5a  00 00 18 25 03 16 80 5c   .. ".0.Z...%...\
2c930   00 00 00 0a 00 00 00 00  00 00 00 00 00 00 00 00   ................
2c940   10 16 78 5c 11 16 38 5c  1e 20 24 80 1f 0e 21 59   ..x\..8\. $...!Y
2c950   1f 0c 21 59 04 30 00 5a  00 00 20 22 84 30 00 5a   ..!Y.0.Z.. ".0.Z
2c960   00 00 18 8c 34 00 00 12  16 e0 33 90 08 e0 2b 90   ....4.....3...+.
2c970   e8 03 20 8c 85 00 21 70  06 00 21 59 07 01 29 59   .. ...!p..!Y..)Y
2c980   00 30 20 8c 00 00 00 80  05 20 01 5a 00 00 20 24   .0 ...... .Z.. $
2c990   84 30 00 5a 00 00 18 25  03 16 80 5c 00 00 00 0a   .0.Z...%...\....
2c9a0   80 c5 02 00 88 c5 02 00  94 c5 02 00 a0 c5 02 00   ................
2c9b0   ac c5 02 00 b8 c5 02 00  00 00 00 00 00 00 00 00   ................
2c9c0   11 16 48 5c 00 10 24 b0  00 50 24 b2 10 20 24 90   ..H\..$..P$.. $.
2c9d0   10 60 24 92 00 10 24 80  84 d0 23 58 02 0e 21 59   .`$...$...#X..!Y
2c9e0   14 09 21 59 04 16 70 5c  14 20 64 8c 14 60 6c 8c   ..!Y..p\. d..`l.
2c9f0   00 00 58 8c 94 20 01 3a  00 10 23 c0 84 d0 57 58   ..X.. .:..#...WX
2ca00   10 a0 02 3d 00 00 70 8c  0e 16 78 5c 70 00 00 08   ...=..p...x\p...
2ca10   0c a0 0a 3d 01 00 78 8c  1c 00 00 08 01 20 23 c0   ...=..x...... #.
2ca20   04 16 78 5c 10 20 11 3e  00 00 70 8c 0e 16 78 5c   ..x\. .>..p...x\
2ca30   4c 00 00 08 10 80 7b 3e  00 00 70 8c 0e 16 78 5c   L.....{>..p...x\
2ca40   3c 00 00 08 00 10 23 c0  34 20 39 30 0f 16 18 5c   <.....#.4 90...\
2ca50   28 e0 03 3a 0c 16 20 5c  01 20 63 8c 00 10 29 c0   (..:.. \. c...).
```

```
Mar 27 18:20 1996  image.txt Page 280

2ca60   0d 16 20 5c 01 60 6b 8c  00 10 29 c2 81 c9 20 59   .. \. K...)... Y
2ca70   04 16 18 5c e0 3f 01 3a  6b c0 3b 39 8f 81 23 59   ...\.?.=..(?..#Y
2ca80   04 16 70 5c 74 3f 01 3a  8b a0 20 58 24 20 01 3a   ..p\t?.=.. X$ .:
2ca90   00 00 28 8c 0d 16 20 5c  01 60 6b 8c 00 10 29 c2   ..(.... \. K...).
2caa0   01 e0 22 8c 04 16 58 5c  84 d0 20 58 e4 3f 01 3d   .."...X\.. X.?.=
2cab0   14 e0 22 8c 02 0c 21 59  86 09 21 58 00 50 22 82   .."...!Y..!X.P".
2cac0   00 00 00 0a 00 00 00 00  00 00 00 00 00 00 00 00   ................
2cad0   70 60 08 8c 40 e0 e7 92  10 16 48 5c 90 e0 4f 92   p`..@.....H\..O.
2cae0   11 16 40 5c 94 e0 47 92  16 20 e4 90 1c 16 60 5c   ..@\..G.. .... \
2caf0   04 20 24 90 42 20 45 90  98 e0 4f 92 09 16 40 5c   . $.B E...O...@\
2cb00   9c e0 47 92 00 10 27 80  84 d0 3b 58 07 16 18 5c   ..G...'...;X...\
2cb10   07 1d 4f 8c a0 e0 4f 92  02 20 87 88 64 c6 fe 09   ..O...O.. ..d...
2cb20   00 30 20 8c ff ff 00 00  90 00 29 58 02 ce 21 59   .0 ......)X..!Y
2cb30   84 41 31 59 06 16 68 5c  06 20 87 88 44 c6 fe 09   .A1Y..h\. ..D...
2cb40   00 30 20 8c ff ff 00 00  90 00 29 58 00 30 20 8c   .0 ......)X.0 .
2cb50   ff 1f 00 00 85 00 29 58  00 30 20 8c ff ff 00 00   ......)X.0 .....
2cb60   85 00 51 58 06 20 87 88  18 c6 fe 09 90 00 29 58   ..QX. ........)X
2cb70   00 30 20 8c 00 20 00 00  85 00 29 58 00 30 20 8c   .0 .. ....)X.0 .
2cb80   ff ff 00 00 85 00 41 58  a4 e0 47 92 50 e0 27 8c   ......AX..G.P.'.
2cb90   1c 16 80 5c 04 16 88 5c  28 fe ff 09 07 9d 21 8c   ...\...\(.....!.
2cba0   98 e0 4f 90 38 40 22 3e  02 ce 20 59 9c e0 4f 90   ..O.8@">.. Y..O.
2cbb0   84 41 2a 59 00 30 20 8c  f8 ff ff ff 85 00 71 58   .A*Y.0 .......qX
2cbc0   00 30 20 8c ff 1f 00 00  8a 00 21 58 8d 09 81 58   .0 ......!X...X
2cbd0   b0 c5 fe 09 06 20 83 8a  08 00 00 08 0d 16 70 5c   ..... ........p\
2cbe0   03 9d 23 8c 90 e0 4f 90  1a 60 22 92 1a 60 82 90   ..#...O..`"..`..
2cbf0   90 c5 fe 09 02 20 83 8a  00 00 20 8c 0a 20 23 8a   ..... .... .. #.
2cc00   01 cf 20 59 0c 16 80 5c  04 16 88 5c 04 c6 fe 09   .. Y...\...\....
2cc10   00 30 20 8c ff ff 00 00  90 00 21 58 10 0e 21 59   .0 ......!X..!Y
2cc20   90 0d 29 59 00 30 20 8c  ff ff 00 00 04 42 21 58   ..)Y.0 ......B!X
2cc30   0a 20 23 8a 8e 41 33 59  06 16 68 5c a0 e0 47 90   . #..A3Y..h\..G.
2cc40   08 80 43 59 a0 e0 47 92  83 8d 23 59 8a 00 29 59   ..CY..G...#Y..)Y
2cc50   00 30 20 8c ff ff 00 00  85 00 51 58 00 00 20 8c   .0 ......QX.. .
2cc60   00 50 22 92 09 16 58 5c  50 e0 27 80 84 d0 1b 58   .P"...X\P.'....X
2cc70   80 a8 01 5a c8 01 00 12  00 30 20 90 00 09 06 10   ...Z.....0 .....
2cc80   03 1d 49 8c a8 e0 4f 92  9c e0 47 90 14 00 6a 3e   ..I...O...G...j>
2cc90   9c e0 4f 90 09 16 40 5c  ac e0 47 92 0c 00 00 08   ..O...@\..G.....
2cca0   0d 16 48 5c ac e0 4f 92  a8 e0 4f 90 ac e0 47 90   ..H\..O...O...G.
2ccb0   09 00 82 59 4c 7e ff 09  10 16 78 5c 44 20 04 35   ...YL~....x\D .5
2ccc0   0b 16 78 5c 20 e0 02 32  00 d0 23 90 04 16 48 5c   ..x\ ..2..#...H\
2ccd0   90 e0 4f 92 0f 16 80 5c  98 7e ff 09 04 16 78 5c   ..O....\.~....x\
```

Mar 27 13:20 1996 image.txt Page 281

```
2cce0   e8 3f 01 35 00 30 20 90  5c 09 06 10 01 20 21 8c   ...5.0 .\.... !.
2ccf0   00 30 20 92 5c 09 06 10  40 e0 e7 90 00 00 00 0a   .0 .\...@.......
2cd00   90 e0 4f 90 04 60 22 90  04 e0 23 92 0e e0 2b 90   ..O..`"...#...+.
2cd10   00 30 20 90 00 09 06 10  05 00 21 59 16 e0 23 92   .0 .......!Y..#.
2cd20   16 e0 33 90 50 e0 2f 8c  02 ce 20 59 06 16 80 5c   ..3.P./... Y...\
2cd30   05 16 88 5c 04 16 90 5c  70 48 fd 0b 16 e0 63 90   ...\...\pH....c.
2cd40   03 5d 23 8c 9c e0 47 90  38 00 22 3e 02 ce 20 59   .]#...G.8.">.. Y
2cd50   9c e0 4f 90 84 41 2a 59  00 30 20 8c f8 ff ff ff   ..O..A*Y.0 .....
2cd60   83 00 71 58 00 30 20 8c  ff ff 00 00 8a 00 21 58   ..qX.0 .......!X
2cd70   8d 09 81 58 0c c4 fe 09  06 20 83 8a 24 00 00 08   ...X..... ..$...
2cd80   0d 16 70 5c 00 30 20 8c  ff ff 00 00 8a 00 21 58   ..p\.0 .......!X
2cd90   a4 e0 4f 90 84 43 82 58  e8 c3 fe 09 06 20 83 8a   ..O..C.X..... ..
2cda0   03 9a 23 8c 1a e0 23 92  1a e0 83 90 d4 c3 fe 09   ..#...#.........
2cdb0   02 20 83 8a 00 00 20 8c  0a 20 23 8a 01 cf 20 59   . .... .. #... Y
2cdc0   0c 16 80 5c 04 16 88 5c  48 c4 fe 09 00 30 20 8c   ...\...\H....0 .
2cdd0   ff ff 00 00 90 00 21 58  10 0e 21 59 90 0d 29 59   ......!X..!Y..)Y
2cde0   00 30 20 8c ff ff 00 00  04 42 21 58 0a 20 23 8a   .0 ......B!X. #.
2cdf0   16 e0 23 90 03 1d 81 8c  a0 e0 4f 90 09 16 88 5c   ..#.......O....\
2ce00   0e 16 90 5c a4 47 fd 0b  8e 41 33 59 06 16 68 5c   ...\.G...A3Y..h\
2ce10   09 80 4b 59 a0 e0 4f 92  83 8d 23 59 8a 00 29 59   ..KY..O...#Y..)Y
2ce20   00 30 20 8c ff ff 00 00  85 00 51 58 00 d0 5b 92   .0 .......QX..[.
2ce30   0f 16 58 5c 80 a8 01 5a  40 fe ff 15 00 30 20 90   ..X\...Z@....0 .
2ce40   58 09 06 10 01 20 21 8c  00 30 20 92 58 09 06 10   X.... !..0 .X...
2ce50   0c e0 02 35 40 e0 e7 90  00 00 00 0a 0b 16 78 5c   ...5@.........x\
2ce60   00 d0 32 90 06 16 58 5c  04 e0 2b 90 04 e0 23 90   ..2...X\..+...#.
2ce70   04 20 21 90 08 20 e9 90  05 16 80 5c 0f 16 88 5c   . !.. .....\...\
2ce80   94 e0 4f 90 09 16 90 5c  00 50 07 86 00 30 20 90   ..O....\.P...0 .
2ce90   60 09 06 10 01 20 21 8c  00 30 20 92 60 09 06 10   `.... !..0 .`...
2cea0   bc bf 01 35 40 e0 e7 90  00 00 00 0a 00 00 00 00   ...5@...........
2ceb0   10 16 78 5c 11 16 30 5c  12 16 38 5c 13 16 80 5c   ..x\..0\..8\...\
2cec0   f0 85 ff 09 10 16 18 5c  0c 20 04 35 0b 00 80 8c   .......\. .5....
2ced0   00 00 00 0a 00 90 19 92  16 e0 20 90 00 d0 21 92   .......... ...!.
2cee0   a1 e0 2b 90 00 30 20 8c  b0 d2 00 00 22 e0 20 92   ..+..0 ....". .
2cef0   26 e0 28 92 00 00 80 8c  00 00 00 0a 00 00 00 00   &.(.............
2cf00   11 16 60 5c 12 16 68 5c  13 16 70 5c 10 16 78 5c   ..`\..h\..p\..x\
2cf10   18 20 04 32 a1 e0 23 90  04 16 38 5c 0c 20 01 32   . .2..#...8\. .2
2cf20   0c 16 30 5c 0c 20 03 35  0a 00 80 8c 00 00 00 0a   ..0\. .5........
2cf30   1a a0 69 92 10 a0 03 30  0c a0 21 88 8e 09 21 58   ..i....0..!...!X
2cf40   0c a0 21 8a 01 16 80 5c  06 16 88 5c b4 7c ff 09   ..!....\...\.|..
2cf50   30 20 04 3d 1b e0 21 80  28 20 29 30 04 e0 21 90   0 .=..!.( )0..!.
```

Mar 27 18:20 1996 image.txt Page 282

```
2cf60   2c 20 21 90 1c 20 01 32  0e 00 28 8c 04 e0 21 90   , !.. .2..(...!.
2cf70   2c 20 19 90 07 16 80 5c  05 16 88 5c 00 d0 00 84   , .....\...\....
2cf80   00 00 80 8c 00 00 00 0a  00 00 00 00 00 00 00 00   ................
2cf90   c0 7d ff 09 00 00 80 8c  00 00 00 0a 00 00 00 00   .}..............
2cfa0   b0 85 ff 08 00 00 00 00  00 00 00 00 00 00 00 00   ................
2cfb0   11 16 28 5c a1 20 24 90  04 16 38 5c 08 20 01 35   ..(\. $...8\. .5
2cfc0   00 00 00 0a 05 16 18 5c  0c 60 09 3d 00 00 30 8c   .......\.`.=..0.
2cfd0   2c 00 00 08 0c e0 10 3a  01 00 30 8c 20 00 00 08   ,......:..0. ...
2cfe0   0c e0 10 3a 02 00 30 8c  14 00 00 08 0c e0 20 3a   ...:..0....... :
2cff0   03 00 30 8c 08 00 00 08  0f 00 30 8c 07 16 80 5c   ..0.......0....\
2d000   06 16 88 5c bc 1c 00 09  07 16 80 5c 24 c3 fe 08   ...\.......\$...
2d010   10 16 30 5c a1 20 3c 90  24 00 80 8c b4 c2 fe 09   ..0\. <.$.......
2d020   10 16 18 5c 00 30 20 8c  b0 cf 02 00 b9 a0 21 92   ...\.0 .......!.
2d030   0c 20 04 35 06 16 80 5c  18 85 ff 08 04 e0 29 90   . .5...\......).
2d040   08 e0 21 90 03 16 80 5c  06 16 88 5c 05 16 90 5c   ..!....\...\...\
2d050   04 16 98 5c 7c 27 00 09  18 0e 24 59 98 0d 21 59   ...\|'....$Y..!Y
2d060   14 20 01 3a 03 16 80 5c  c8 c2 fe 09 06 16 80 5c   . .:...\.......\
2d070   e0 84 ff 08 a1 a0 19 92  0c e0 21 90 20 e0 20 92   ..........!. . .
2d080   03 16 80 5c bc 1b 00 08  00 00 00 00 00 00 00 00   ...\............
2d090   10 16 38 5c a1 20 24 90  04 16 18 5c 0c 20 01 35   ..8\. $....\. .5
2d0a0   07 16 80 5c ac 84 ff 08  03 16 80 5c 94 1b 00 08   ...\.......\....
2d0b0   11 16 38 5c a1 20 34 90  16 60 2c 90 1a 60 24 90   ..8\. 4..`,..`$.
2d0c0   06 16 80 5c 05 16 88 5c  04 16 90 5c 04 03 00 09   ...\...\...\....
2d0d0   07 16 80 5c 9c 7a ff 09  06 16 80 5c e4 ff fd 08   ...\.z.....\....
2d0e0   a1 20 24 90 04 16 38 5c  08 20 01 35 00 00 00 0a   . $...8\. .5....
2d0f0   1b e0 21 80 08 20 29 37  00 00 00 0a 04 e0 21 90   ..!.. )7......!.
2d100   2c 20 21 90 1c 20 01 32  0e 00 28 8c 04 e0 21 90   , !.. .2..(...!.
2d110   2c 20 19 90 07 16 80 5c  05 16 88 5c 00 d0 00 84   , .....\...\....
2d120   00 00 00 0a 00 00 00 00  00 00 00 00 00 00 00 00   ................
2d130   20 7c ff 08 00 00 00 00  00 00 00 00 00 00 00 00    |..............
2d140   10 16 38 5c a1 20 24 90  04 16 18 5c 08 20 01 35   ..8\. $....\. .5
2d150   00 00 00 0a 03 16 80 5c  d8 c1 fe 09 00 00 20 8c   .......\...... .
2d160   a1 e0 21 92 00 00 00 0a  00 00 00 00 00 00 00 00   ..!.............
2d170   00 30 20 8c ff ff 00 00  91 00 39 58 a1 20 24 90   .0 .......9X. $.
2d180   04 16 18 5c 08 20 01 35  00 00 00 0a 03 16 80 5c   ...\. .5.......\
2d190   07 16 88 5c 7c 1a 00 08  00 00 00 00 00 00 00 00   ...\|...........
2d1a0   20 60 08 8c 40 e0 c7 b2  50 e0 e7 92 10 16 60 5c    `..@...P.....`\
2d1b0   00 30 20 8c ff ff 00 00  91 00 69 58 12 16 70 5c   .0 .......iX..p\
2d1c0   13 16 58 5c 24 00 80 8c  08 c1 fe 09 10 16 18 5c   ..X\$..........\
2d1d0   14 20 04 35 00 00 80 8c  40 e0 c7 b0 50 e0 e7 90   . .5....@...P...
```

Mar 27 15:20 1996 image.txt Page 283

```
2d1e0   00 00 00 0a 00 00 e0 8c  b8 fe fd 09 10 15 e8 5c   ...............\
2d1f0   00 30 58 8c 90 d0 02 00  00 30 38 8c b0 d0 02 00   .0.......08.....
2d200   00 30 30 8c e0 d0 02 00  00 30 28 8c 30 d1 02 00   .00......0(.0...
2d210   00 30 20 8c b0 cf 02 00  0c 16 80 5c 0a 16 88 5c   .0 .........\...\
2d220   1c 16 90 5c 1d 16 98 5c  17 16 a0 5c 07 16 a8 5c   ...\...\...\...\
2d230   06 16 b0 5c 05 16 b8 5c  04 16 c0 5c 24 87 ff 09   ...\...\...\$...
2d240   10 16 78 5c 1c 20 04 35  03 16 80 5c e4 c0 fe 09   ..x\. .5...\....
2d250   00 00 60 8c 40 e0 c7 b0  50 e0 e7 90 00 00 00 0a   ....@...P.......
2d260   00 ce 22 58 03 16 90 5c  0f 16 88 5c 0e 16 90 5c   .."X...\...\...\
2d270   04 16 98 5c 5c 25 00 09  18 0e 24 59 98 0d 21 59   ...\\%....$Y..!Y
2d280   24 20 01 3a 03 16 80 5c  a8 c0 fe 09 0f 16 80 5c   $ .:...\.......\
2d290   c0 82 ff 09 00 00 80 8c  40 e0 c7 b0 50 e0 e7 90   ........@...P...
2d2a0   00 00 00 0a a1 e0 1b 92  00 30 20 8c 70 d1 02 00   .........0 .p...
2d2b0   c1 e0 23 92 03 16 80 5c  40 e0 c7 b0 50 e0 e7 90   ..#....\@...P...
2d2c0   00 00 00 0a 00 00 00 00  00 00 00 00 00 00 00 00   ................
2d2d0   00 30 20 8c ff ff 00 00  90 00 61 58 11 16 68 5c   .0 .......aX..h\
2d2e0   12 16 70 5c 10 00 80 8c  e8 bf fe 09 10 16 18 5c   ..p\...........\
2d2f0   0c 20 04 35 00 00 80 8c  00 00 00 0a b4 fd fd 09   . .5............
2d300   10 16 e8 5c 00 30 98 8c  10 d0 02 00 00 30 38 8c   ...\.0.......08.
2d310   b0 d0 02 00 00 30 30 8c  e0 d0 02 00 00 30 28 8c   .....00......0(.
2d320   30 d1 02 00 00 30 20 8c  40 d1 02 00 0c 16 80 5c   0....0 .@......\
2d330   1d 16 88 5c 13 16 90 5c  07 16 98 5c 06 16 a0 5c   ...\...\...\...\
2d340   05 16 a8 5c 04 16 b0 5c  18 85 ff 09 10 16 78 5c   ...\...\......x\
2d350   14 20 04 35 03 16 80 5c  d8 bf fe 09 00 00 80 8c   . .5...\........
2d360   00 00 00 0a 00 d0 78 92  04 e0 68 92 80 89 23 58   ......x...h...#X
2d370   08 e0 20 92 00 00 20 8c  0c e0 20 92 a1 e0 1b 92   .. ... ... .....
2d380   00 30 20 8c 70 d1 02 00  c1 e0 23 92 03 16 80 5c   .0 .p.....#....\
2d390   00 00 00 0a 00 00 00 00  00 00 00 00 00 00 00 00   ................
2d3a0   10 16 18 5c 08 20 04 35  00 00 00 0a 00 d0 20 90   ...\. .5...... .
2d3b0   0c 20 01 32 00 d0 80 90  98 79 ff 08 03 16 80 5c   . .2.....y.....\
2d3c0   70 bf fe 08 00 00 00 00  00 00 00 00 00 00 00 00   p...............
2d3d0   70 60 08 8c 10 16 60 5c  11 16 68 5c 00 00 70 8c   p`....`\..h\..p.
2d3e0   0e 16 78 5c 0e 16 48 5c  40 e0 4f 92 01 89 44 59   ..x\..H\@.O...DY
2d3f0   44 e0 47 92 00 a8 04 5a  88 16 00 13 1e 20 23 88   D.G....Z..... #.
2d400   10 20 01 32 1e 20 23 88  01 09 21 59 1e 20 23 8a   . .2. #...!Y. #.
2d410   1a 20 23 80 1d 0e 21 59  1d 0c 21 59 04 16 48 5c   . #...!Y..!Y..H\
2d420   48 e0 4f 92 07 28 01 5a  18 16 00 14 48 e0 4f 90   H.O..(.Z....H.O.
2d430   09 39 20 90 58 f8 02 00  00 10 01 84 2c a0 03 32   .9 .X.........,.2
2d440   04 20 23 90 00 10 21 90  1c 20 01 32 04 20 23 90   . #...!.. .2. #.
2d450   00 10 e9 90 0c 16 80 5c  0e 16 88 5c 0f 16 90 5c   .......\...\...\
```

Mar 27 18:20 1996  image.txt Page 264

```
2d460   00 50 07 86 00 00 70 8c  00 50 23 80 38 20 51 3a   .P....p..P#.8 Q:
2d470   04 20 23 90 00 10 21 90  28 20 01 32 00 30 30 8c   . #...!.( .2.00.
2d480   64 24 06 10 01 00 28 8c  04 20 23 90 00 10 e9 90   d$....(.. #.....
2d490   0c 16 80 5c 06 16 88 5c  05 16 90 5c 00 50 07 86   ...\...\...\.P..
2d4a0   34 00 00 08 04 20 23 90  00 10 21 90 28 20 01 32   4.... #...!.( .2
2d4b0   00 30 30 8c 60 24 06 10  02 00 28 8c 04 20 23 90   .00.`$....(.. #.
2d4c0   00 10 e9 90 0c 16 80 5c  06 16 88 5c 05 16 90 5c   .......\...\...\
2d4d0   00 50 07 86 1a 20 eb 80  07 18 e8 65 1a 20 eb 82   .P... .....e. ..
2d4e0   00 50 23 80 8a 28 01 5a  7c 15 00 12 00 50 23 80   .P#..(.Z|....P#.
2d4f0   80 28 01 5a 70 15 00 12  01 49 6b 59 44 e0 41 90   .(.Zp....IkYD.A.
2d500   01 60 4a 8c 44 e0 4f 92  5c 15 00 08 00 50 2b 80   .`J.D.O.\....P+.
2d510   ff 00 20 8c 14 00 29 3d  1a 20 eb 80 07 38 e8 65   .. ...)=. ...8.e
2d520   1a 20 eb 82 40 15 00 08  00 50 23 80 2c 20 69 3d   . ..@....P#., i=
2d530   1a 20 23 80 24 20 39 37  1a 20 23 80 1c 20 29 37   . #.$ 97. #.. )7
2d540   1a 20 23 80 14 20 31 37  1a 20 eb 80 07 d8 e9 65   . #.. 17. .....e
2d550   1a 20 eb 82 10 15 00 08  10 a0 03 35 0d 16 70 5c   . .........5..p\
2d560   01 00 78 8c 00 15 00 08  01 e0 7b 8c f8 14 00 08   ..x.......{.....
2d570   00 a8 03 5a 18 01 00 12  00 50 2b 80 f0 00 20 8c   ...Z.....P+... .
2d580   85 20 01 5a 08 01 00 12  1a 20 23 80 05 2f 01 5a   . .Z..... #../.Z
2d590   c4 00 00 10 1c 20 2b 80  24 00 20 8c 85 20 01 5a   ..... +.$. .. .Z
2d5a0   00 00 20 24 84 30 00 5a  00 00 48 8c 4c e0 4f 92   .. $.0.Z..H.L.O.
2d5b0   20 00 00 12 04 20 23 90  30 20 21 90 04 30 00 5a    .... #.0 !..0.Z
2d5c0   00 00 20 25 84 30 00 5a  00 00 48 25 4c e0 4f 92   .. %.0.Z..H%L.O.
2d5d0   4c e0 4f 90 89 30 00 5a  00 00 40 8c 50 e0 47 92   L.O..0.Z..@.P.G.
2d5e0   28 00 00 12 1c 20 2b 80  04 20 23 90 30 20 21 90   (.... +.. #.0 !.
2d5f0   05 1d 21 90 04 30 00 5a  00 00 20 25 84 30 00 5a   ..!..0.Z.. %.0.Z
2d600   00 00 48 25 50 e0 4f 92  50 e0 4f 90 74 60 02 3a   ..H%P.O.P.O.t`.:
2d610   00 00 98 8c 1c 20 3b 80  13 16 30 5c 1c 20 2b 80   ..... ;...0\. +.
2d620   04 20 23 90 30 20 21 90  05 1d e9 90 0c 16 80 5c   . #.0 !........\
2d630   13 16 88 5c 07 16 90 5c  0e 16 98 5c 0f 16 a0 5c   ...\...\...\...\
2d640   06 16 a8 5c 00 50 07 86  90 30 00 5a 00 00 e8 25   ...\.P...0.Z...%
2d650   30 00 00 08 1a 20 23 80  28 20 31 37 04 20 23 90   0.... #.( 17. #.
2d660   00 10 21 90 1c 20 01 32  04 20 23 90 00 10 e9 90   ..!.. .2. #.....
2d670   0c 16 80 5c 0e 16 88 5c  0f 16 90 5c 00 50 07 86   ...\...\...\.P..
2d680   00 00 70 8c 0e 16 48 5c  40 e0 4f 92 00 50 2b 80   ..p...H\@.O..P+.
2d690   ef 00 20 8c 04 41 49 59  54 e0 4f 92 10 68 02 5a   .. ..AIYT.O..h.Z
2d6a0   b4 04 00 14 54 e0 4f 90  09 39 20 90 78 f8 02 00   ....T.O..9 .x...
2d6b0   00 10 01 84 0d 16 70 5c  01 00 78 8c 1a 20 eb 80   ......p\..x.. ..
2d6c0   07 18 e8 65 1a 20 eb 82  9c 13 00 08 04 20 23 90   ...e. ....... #.
2d6d0   18 20 21 90 14 20 01 32  04 20 23 90 18 20 e9 90   . !.. .2. #.. ..
```

```
Mar 27 18:20 1995  image.txt Page 283

2d6e0   0c 18 80 5c 00 50 07 86  1a 20 eb 80 07 18 e8 65   ...\.P.. ......e
2d6f0   1a 20 eb 82 70 13 00 08  04 20 23 90 1c 20 21 90   . ..p.... #.. !.
2d700   14 20 01 32 04 20 23 90  1c 20 e9 90 0c 16 80 5c   . .2. #.. ......\
2d710   00 50 07 86 1a 20 eb 80  07 18 e8 65 1a 20 eb 82   .P... ......e. ..
2d720   44 13 00 08 04 20 23 90  04 20 21 90 14 20 01 32   D.... #.. !.. .2
2d730   04 20 23 90 04 20 e9 90  0c 16 80 5c 00 50 07 86   . #.. .....\.P..
2d740   1a 20 eb 80 07 18 e8 65  1a 20 eb 82 1a 20 23 80   . .....e. ... #.
2d750   03 2f 01 5a 10 13 00 10  1b 20 23 80 03 2f 01 5a   ./.Z..... #../.Z
2d760   04 13 00 10 01 00 e8 8c  02 00 98 8c ff 00 38 8c   ..............8.
2d770   f2 00 30 8c 00 00 28 8c  05 16 20 5c 0c 16 80 5c   ..0...(... \...\
2d780   1d 16 88 5c 13 16 90 5c  07 16 98 5c 06 16 a0 5c   ...\...\...\...\
2d790   05 16 a8 5c 04 16 b0 5c  d8 17 00 09 c8 12 00 08   ...\...\........
2d7a0   04 20 23 90 08 20 21 90  14 20 01 32 04 20 23 90   . #.. !.. .2. #.
2d7b0   08 20 e9 90 0c 16 80 5c  00 50 07 86 1a 20 eb 80   . .....\.P... ..
2d7c0   07 18 e8 65 1a 20 eb 82  1a 20 23 80 03 2f 01 5a   ...e. ... #../.Z
2d7d0   94 12 00 10 01 00 e8 8c  02 00 98 8c ff 00 38 8c   ..............8.
2d7e0   f2 00 30 8c 00 00 28 8c  05 16 20 5c 0c 16 80 5c   ..0...(... \...\
2d7f0   1d 16 88 5c 13 16 90 5c  07 16 98 5c 06 16 a0 5c   ...\...\...\...\
2d800   05 16 a8 5c 04 16 b0 5c  68 17 00 09 58 12 00 08   ...\...\h...X...
2d810   04 20 23 90 0c 20 21 90  14 20 01 32 04 20 23 90   . #.. !.. .2. #.
2d820   0c 20 e9 90 0c 16 80 5c  00 50 07 86 1a 20 eb 80   . .....\.P... ..
2d830   07 18 e8 65 1a 20 eb 82  2c 12 00 08 1a 20 23 80   ...e. ..,.... #.
2d840   20 20 31 37 04 20 23 90  14 20 21 90 14 20 01 32     17. #.. !.. .2
2d850   04 20 23 90 14 20 e9 90  0c 16 80 5c 00 50 07 86   . #.. .....\.P..
2d860   1a 20 eb 80 07 18 e8 65  1a 20 eb 82 f8 11 00 08   . .....e. ......
2d870   1a 20 23 80 20 20 31 37  04 20 23 90 10 20 21 90   . #.  17. #.. !.
2d880   14 20 01 32 04 20 23 90  10 20 e9 90 0c 16 80 5c   . .2. #.. .....\
2d890   00 50 07 86 1a 20 eb 80  07 18 e8 65 1a 20 eb 82   .P... ......e. ..
2d8a0   c4 11 00 08 04 20 23 90  20 20 21 90 2c 20 01 32   ..... #.  !., .2
2d8b0   09 20 23 80 84 0d 21 59  84 d0 20 58 18 0e 21 59   . #...!Y.. X..!Y
2d8c0   98 0d 21 59 14 20 11 3a  04 20 23 90 20 20 e9 90   ..!Y. .:. #.  ..
2d8d0   0c 16 80 5c 00 50 07 86  1a 20 eb 80 07 18 e8 65   ...\.P... ......e
2d8e0   1a 20 eb 82 80 11 00 08  1a 20 eb 80 07 18 e8 65   . ....... ......e
2d8f0   1a 20 eb 82 70 11 00 08  1a 20 eb 80 07 98 e9 65   . ..p.... ......e
2d900   1a 20 eb 82 60 11 00 08  1a 20 23 80 2c 20 29 37   . ..`.... #., )7
2d910   04 20 23 90 2c 20 21 90  1c 20 01 32 04 00 28 8c   . #., !.. .2..(.
2d920   04 20 23 90 2c 20 e9 90  0c 16 80 5c 05 16 88 5c   . #., .....\...\
2d930   00 50 07 86 30 11 00 08  00 a8 03 5a cc 00 00 12   .P..0......Z....
2d940   1c 20 2b 80 24 00 20 8c  85 20 01 5a 00 00 20 24   . +.$. .. .Z.. $
2d950   84 30 00 5a 00 00 48 8c  58 e0 4f 92 20 00 00 12   .0.Z..H.X.O. ...
```

```
Mar 27 16:20 1998  image.txt Page 286

2d960   04 20 23 90 30 20 21 90  04 30 00 5a 00 00 20 25   . #.0 !..0.Z.. %
2d970   84 30 00 5a 00 00 48 25  58 e0 4f 92 58 e0 4f 90   .0.Z..H%X.O.X.O.
2d980   89 30 00 5a 00 00 40 8c  5c e0 47 92 28 00 00 12   .0.Z..@.\.G.(...
2d990   1c 20 2b 80 04 20 23 90  30 20 21 90 05 1d 21 90   . +.. #.0 !...!.
2d9a0   04 30 00 5a 00 00 20 25  84 30 00 5a 00 00 48 25   .0.Z.. %.0.Z..H%
2d9b0   5c e0 4f 92 5c e0 4f 90  44 60 02 3a 00 00 38 8c   \.O.\.O.D`.:..8.
2d9c0   1c 20 33 80 1c 20 2b 80  04 20 23 90 30 20 21 90   . 3.. +.. #.0 !.
2d9d0   05 1d e9 90 0c 16 80 5c  07 16 88 5c 06 16 90 5c   .......\...\...\
2d9e0   0e 16 98 5c 01 16 a0 5c  40 e0 4f 90 09 16 a8 5c   ...\...\@.O....\
2d9f0   00 50 07 86 90 30 00 5a  00 00 e8 25 00 00 70 8c   .P...0.Z...%..p.
2da00   0e 16 48 5c 40 e0 4f 92  1c 20 2b 80 24 00 20 8c   ..H\@.O.. +.$. .
2da10   85 20 01 5a 00 00 20 24  84 30 00 5a 00 00 48 8c   . .Z.. $.0.Z..H.
2da20   60 e0 4f 92 20 00 00 12  04 20 23 90 30 20 21 90   `.O. .... #.0 !.
2da30   04 30 00 5a 00 00 20 25  84 30 00 5a 00 00 48 25   .0.Z.. %.0.Z..H%
2da40   60 e0 4f 92 60 e0 4f 90  89 30 00 5a 00 00 40 8c   `.O.`.O..0.Z..@.
2da50   64 e0 47 92 28 00 00 12  1c 20 2b 80 04 20 23 90   d.G.(.... +.. #.
2da60   30 20 21 90 05 1d 21 90  04 30 00 5a 00 00 20 25   0 !...!..0.Z.. %
2da70   84 30 00 5a 00 00 48 25  64 e0 4f 92 64 e0 4f 90   .0.Z..H%d.O.d.O.
2da80   4c 60 02 3a f0 00 90 8c  1c 20 9b 80 00 00 b8 8c   L`.:..... ......
2da90   17 16 38 5c 07 16 30 5c  1c 20 2b 80 04 20 23 90   ..8\..0\. +.. #.
2daa0   30 20 21 90 05 1d e9 90  0c 16 80 5c 12 16 88 5c   0 !........\...\
2dab0   13 16 90 5c 17 16 98 5c  07 16 a0 5c 06 16 a8 5c   ...\...\...\...\
2dac0   00 50 07 86 90 30 00 5a  00 00 e8 25 1a 20 eb 80   .P...0.Z...%. ..
2dad0   05 4e ef 58 1a 20 eb 82  1a 20 eb 80 07 18 e8 65   .N.X. ... .....e
2dae0   1a 20 eb 82 80 0f 00 08  1a 20 23 80 18 20 31 30   . ....... #.. 10
2daf0   1e 20 23 88 10 20 01 3d  1a 20 eb 80 06 4e ef 58   . #.. .=. ...N.X
2db00   1a 20 eb 82 1a 20 eb 80  07 18 e8 65 1a 20 eb 82   . ... .....e. ..
2db10   54 0f 00 08 1a 20 eb 80  07 18 e9 65 1a 20 eb 82   T.... .....e. ..
2db20   44 0f 00 08 1a 20 eb 80  07 58 e9 65 1a 20 eb 82   D.... ...X.e. ..
2db30   34 0f 00 08 1a 20 eb 80  07 98 e8 65 1a 20 eb 82   4.... .....e. ..
2db40   24 0f 00 08 1a 20 eb 80  07 d8 e8 65 1a 20 eb 82   $.... .....e. ..
2db50   14 0f 00 08 04 20 23 90  2c 20 21 90 1c 20 01 32   ..... #., !.. .2
2db60   04 00 28 8c 04 20 23 90  2c 20 e9 90 0c 16 80 5c   ..(.. #., .....\
2db70   05 16 88 5c 00 50 07 86  ec 0e 00 08 1a 20 eb 80   ...\.P....... ..
2db80   07 18 e8 65 1a 20 eb 82  00 50 2b 80 24 00 20 8c   ...e. ...P+.$. .
2db90   48 00 29 3b 00 50 23 80  01 0d 29 59 08 20 23 8c   H.);.P#...)Y. #.
2dba0   04 40 21 59 00 10 31 80  00 50 2b 80 01 4d 21 59   .@!Y..1..P+..M!Y
2dbb0   01 0e 21 59 04 41 21 59  04 39 20 8c 02 00 00 00   ..!Y.A!Y.9 .....
2dbc0   84 85 21 59 84 d0 20 58  18 0e 21 59 98 0d 49 59   ..!Y.. X..!Y..IY
2dbd0   68 e0 4f 92 0c 00 00 06  00 00 48 8c 68 e0 4f 92   h.O.......H.h.O.
```

```
Mar 27 15:20 1996  image.txt Page 267

2dbe0   68 e0 4f 90 2c 80 1a 3d  04 20 23 90 2c 20 21 90   h.O.,..=. #., !.
2dbf0   1c 20 01 32 04 00 28 8c  04 20 23 90 2c 20 e9 90   . .2..(.. #., ..
2dc00   0c 16 80 5c 05 16 88 5c  00 50 07 85 58 0e 00 98   ...\...\.P..X...
2dc10   68 e0 4f 90 82 68 02 5a  4c 0e 00 12 58 e0 4f 90   h.O..h.ZL...h.O.
2dc20   81 68 02 3a 40 01 00 15  00 50 2b 80 24 00 20 8c   .h.:@....P+.$. .
2dc30   85 20 01 5a 00 00 20 24  84 30 00 5a 00 00 48 8c   . .Z.. $.0.Z..H.
2dc40   6c e0 4f 92 20 00 00 12  04 20 23 90 30 20 21 90   l.O. .... #.0 !.
2dc50   04 30 00 5a 00 00 20 25  84 30 00 5a 00 00 48 25   .0.Z.. %.0.Z..H%
2dc60   6c e0 4f 92 6c e0 4f 90  89 30 00 5a 00 00 40 8c   l.O.l.O..0.Z..@.
2dc70   70 e0 47 92 28 00 00 12  00 50 2b 80 04 20 23 90   p.G.(....P+.. #.
2dc80   30 20 21 90 05 1d 21 90  04 30 00 5a 00 00 20 25   0 !...!..0.Z.. %
2dc90   84 30 00 5a 00 00 48 25  70 e0 4f 92 70 e0 4f 90   .0.Z..H%p.O.p.O.
2dca0   4c 60 02 3a fd 00 90 8c  00 50 9b 80 00 00 b8 8c   L`.:.....P......
2dcb0   17 16 38 5c 07 16 30 5c  00 50 2b 80 04 20 23 90   ..8\..0\.P+.. #.
2dcc0   30 20 21 90 05 1d e9 90  0c 16 80 5c 12 16 88 5c   0 !........\...\
2dcd0   13 16 90 5c 17 16 98 5c  07 16 a0 5c 06 16 a8 5c   ...\...\...\...\
2dce0   00 50 07 86 90 30 00 5a  00 00 e8 25 00 50 2b 80   .P...0.Z...%.P+.
2dcf0   24 00 20 8c 6c 00 29 3b  00 50 23 80 01 0d 29 59   $. .l.);.P#...)Y
2dd00   08 20 23 8c 04 40 21 59  00 10 31 80 00 50 2b 80   . #..@!Y..1..P+.
2dd10   01 4d 21 59 01 0e 21 59  04 41 21 59 04 39 20 8c   .M!Y..!Y.A!Y.9 .
2dd20   02 00 00 00 04 d7 20 59  06 02 31 58 00 50 2b 80   ...... Y..1X.P+.
2dd30   01 4d 21 59 01 0e 21 59  04 41 21 59 04 39 20 8c   .M!Y..!Y.A!Y.9 .
2dd40   02 00 00 00 04 96 20 59  86 03 31 58 08 20 2b 6c   ...... Y..1X. +.
2dd50   00 50 23 80 01 0d 21 59  05 00 21 59 00 10 31 82   .P#...!Y..!Y..1.
2dd60   04 0d 00 08 68 e0 4f 90  80 68 02 5a c0 01 00 15   ....h.O..h.Z....
2dd70   00 50 2b 80 24 00 20 8c  85 20 01 5a 20 01 00 13   .P+.$. .. .Z ...
2dd80   04 20 23 90 30 20 21 90  00 28 01 5a 10 01 00 12   . #.0 !..(.Z....
2dd90   00 50 2b 80 04 20 23 90  30 20 21 90 05 1d 21 90   .P+.. #.0 !...!.
2dda0   00 28 01 5a f8 00 00 12  fd 00 90 8c 00 50 9b 80   .(.Z.........P..
2ddb0   00 00 b8 8c 17 16 38 5c  07 16 30 5c 00 50 2b 80   ......8\..0\.P+.
2ddc0   04 20 23 90 30 20 21 90  05 1d e9 90 0c 16 80 5c   . #.0 !........\
2ddd0   12 16 88 5c 13 16 90 5c  17 16 98 5c 07 16 a0 5c   ...\...\...\...\
2dde0   06 16 a8 5c 00 50 07 86  b4 20 04 3a 00 00 e8 8c   ...\.P... .:....
2ddf0   03 00 98 8c ff 00 38 8c  fb 00 30 8c 00 50 2b 80   ......8...0..P+.
2de00   1d 16 20 5c 0c 16 80 5c  1d 16 88 5c 13 16 90 5c   .. \...\...\...\
2de10   07 16 98 5c 06 16 a0 5c  05 16 a8 5c 04 16 b0 5c   ...\...\...\...\
2de20   50 11 00 09 00 50 2b 80  24 00 20 8c 6c 00 29 3b   P....P+.$. .l.);
2de30   00 50 23 80 01 0d 29 59  08 20 23 8c 04 40 21 59   .P#...)Y. #..@!Y
2de40   00 10 31 80 00 50 2b 80  01 4d 21 59 01 0e 21 59   ..1..P+..M!Y..!Y
2de50   04 41 21 59 04 39 20 8c  02 00 00 00 04 d7 20 59   .A!Y.9 ....... Y
```

Mar 27 15:20 1998 image.txt Page 288

```
2de60   05 02 31 58 00 50 2b 80  01 4d 21 59 01 0e 21 59   ..1X.P+..M!Y..!Y
2de70   04 41 21 59 04 39 20 8c  02 00 00 00 04 96 20 59   .A!Y.9 ....... Y
2de80   86 03 31 58 08 20 2b 8c  00 50 23 80 01 0d 21 59   ..1X. +..P#...!Y
2de90   05 00 21 59 00 10 31 82  cc 00 00 08 00 00 e8 8c   ..!Y..1.........
2dea0   03 00 9a 8c ff 00 38 8c  fc 00 39 8c 00 50 2b 80   ......8...9..P+.
2deb0   1d 16 20 5c 0c 16 80 5c  1d 16 88 5c 13 16 90 5c   .. \...\...\...\
2dec0   07 16 98 5c 06 16 a0 5c  05 16 a8 5c 04 16 b0 5c   ...\...\...\...\
2ded0   a0 10 00 09 00 50 2b 80  24 00 20 8c 4c 00 29 3b   .....P+.$. .L.);
2dee0   00 50 23 80 01 0d 29 59  08 20 23 8c 04 40 21 59   .P#...)Y. #..@!Y
2def0   00 10 31 80 00 50 2b 80  01 4d 21 59 01 0e 21 59   ..1..P+..M!Y..!Y
2df00   04 41 21 59 04 39 20 8c  02 00 00 00 04 a7 20 59   .A!Y.9 ....... Y
2df10   06 02 31 58 08 20 2b 8c  00 50 23 80 01 0d 21 59   ..1X. +..P#...!Y
2df20   05 00 21 59 00 10 31 82  3c 0b 00 0d 04 20 23 90   ..!Y..1.<.... #.
2df30   2c 20 21 90 1c 20 01 32  0f 00 28 8c 04 20 23 90   , !.. .2..(.. #.
2df40   2c 20 e9 90 0c 16 80 5c  05 16 88 5c 00 50 07 86   , .....\...\.P..
2df50   14 0b 00 08 1a 20 eb 80  07 18 e8 55 1a 20 eb 82   ..... .....e. ..
2df60   00 50 2b 80 24 00 20 8c  44 00 29 3b 00 50 23 80   .P+.$. .D.);.P#.
2df70   01 0d 29 59 08 20 23 8c  04 40 21 59 00 10 31 80   ..)Y. #..@!Y..1.
2df80   00 50 2b 80 01 4d 21 59  01 0e 21 59 04 41 21 59   .P+..M!Y..!Y.A!Y
2df90   04 39 20 8c 02 00 00 00  84 85 21 59 84 d0 20 58   .9 .......!Y.. X
2dfa0   18 0e 21 59 98 0d 19 59  08 00 00 08 00 00 18 8c   ..!Y...Y........
2dfb0   80 e8 00 5a b0 0a 00 12  83 e8 00 5a 20 01 00 15   ...Z.......Z ...
2dfc0   00 50 2b 80 24 00 20 8c  85 20 01 5a 00 00 20 24   .P+.$. ...Z.. $
2dfd0   84 30 00 5a 00 00 48 8c  74 e0 4f 92 20 00 00 12   .0.Z..H.t.O. ...
2dfe0   04 20 23 90 30 20 21 90  04 30 00 5a 00 00 20 25   . #.0 !..0.Z.. %
2dff0   84 30 00 5a 00 00 48 25  74 e0 4f 92 74 e0 4f 90   .0.Z..H%t.O.t.O.
2e000   89 30 00 5a 00 00 40 8c  78 e0 47 92 28 00 00 12   .0.Z..@.x.G.(...
2e010   00 50 2b 80 04 20 23 90  30 20 21 90 05 1d 21 90   .P+.. #.0 !...!.
2e020   04 30 00 5a 00 00 20 25  84 30 00 5a 00 00 48 25   .0.Z.. %.0.Z..H%
2e030   78 e0 4f 92 78 e0 4f 90  4c 60 02 3a fe 00 90 8c   x.O.x.O.L`.:....
2e040   00 50 9b 80 00 00 b8 8c  17 16 38 5c 07 16 30 5c   .P........8\..0\
2e050   00 50 2b 80 04 20 23 90  30 20 21 90 05 1d e9 90   .P+.. #.0 !.....
2e060   0c 16 80 5c 12 16 88 5c  13 16 90 5c 17 16 98 5c   ...\...\...\...\
2e070   07 16 a0 5c 06 16 a8 5c  00 50 07 86 90 30 00 5a   ...\...\.P...0.Z
2e080   00 00 e8 25 00 50 2b 80  24 00 20 8c 4c 00 29 3b   ...%.P+.$. .L.);
2e090   00 50 23 80 01 0d 29 59  08 20 23 8c 04 40 21 59   .P#...)Y. #..@!Y
2e0a0   00 10 31 80 00 50 2b 80  01 4d 21 59 01 0e 21 59   ..1..P+..M!Y..!Y
2e0b0   04 41 21 59 04 39 20 8c  02 00 00 00 04 d7 20 59   .A!Y.9 ....... Y
2e0c0   08 02 31 58 08 20 2b 8c  00 50 23 80 01 0d 21 59   ..1X. +..P#...!Y
2e0d0   05 00 21 59 00 10 31 82  8c 09 00 08 0c e0 08 3a   ..!Y..1........:
```

Mar 27 18:26 1996 image.txt Page 269

```
2e0e0   81 e8 00 5a 38 01 00 15  00 50 2b 60 24 00 20 8c   ...Z8....P+.S. .
2e0f0   85 20 01 5a 00 00 20 24  84 30 00 5a 00 00 48 8c   . .Z.. S.O.Z..H.
2e100   7c e0 41 92 20 00 00 12  04 20 23 90 30 20 21 90   |.O. .... #.O !.
2e110   04 30 00 5a 00 00 20 25  84 30 00 5a 00 00 48 25   .O.Z.. %.O.Z..H%
2e120   7c e0 41 92 7c e0 41 90  89 30 00 5a 00 00 40 8c   |.O.|.O..O.Z..@.
2e130   80 e0 47 92 28 00 00 12  00 50 2b 80 04 20 23 90   ..G.(....P+.. #.
2e140   30 20 21 90 05 1d 21 90  04 30 00 5a 00 00 20 25   0 !...!..O.Z.. %
2e150   84 30 00 5a 00 00 48 25  80 e0 41 92 80 e0 41 90   .O.Z..H%..O...O.
2e160   4c 60 02 3a 1e 00 90 8c  00 50 3b 90 00 00 08 8c   L`.:.....P......
2e170   17 15 38 5c 07 16 30 5c  00 50 2b 80 04 20 23 90   ..8\..0\.P+.. #.
2e180   30 20 21 90 05 1d e9 90  0c 16 80 5c 12 16 88 5c   0 !.........\...\
2e190   13 16 90 5c 17 16 98 5c  07 16 a0 5c 06 16 a8 5c   ...\...\...\...\
2e1a0   00 50 07 86 90 30 00 5a  00 00 e8 25 00 00 e8 8c   .P...O.Z...%....
2e1b0   03 00 98 8c 1f 00 38 8c  1c 00 30 8c 00 50 2b 80   ......8...0..P+.
2e1c0   1a 15 20 5c 0c 16 80 5c  1d 16 88 5c 13 16 90 5c   .. \...\...\...\
2e1d0   07 15 98 5c 06 16 a0 5c  05 16 a8 5c 04 16 b0 5c   ...\...\...\...\
2e1e0   90 0d 00 09 00 50 2b 80  24 00 20 8c 4c 00 29 3b   .....P+.S. .L.);
2e1f0   00 50 23 80 01 0d 29 59  08 20 23 8c 04 40 21 59   .P#...)Y. #..@!Y
2e200   00 10 31 80 00 50 2b 80  01 4d 21 59 01 0e 21 59   ..1..P+..M!Y..!Y
2e210   04 41 21 59 04 39 20 8c  02 00 00 00 04 d7 20 59   .A!Y.9 ....... Y
2e220   06 02 31 58 08 20 2b 8c  00 50 23 80 01 0d 21 59   ..1X. +..P#...!Y
2e230   05 00 21 59 00 10 31 82  2c 08 00 08 04 20 23 90   ..!Y..1.,.... #.
2e240   2c 20 21 90 1c 20 01 32  0f 00 28 8c 04 20 23 90   , !.. .2..(.. #.
2e250   2c 20 e9 90 0c 16 80 5c  05 16 88 5c 00 50 07 86   , .....\...\.P..
2e260   04 08 00 08 1a 20 eb 80  07 18 e8 65 1a 20 eb 82   ..... .....e. ..
2e270   00 50 2b 80 24 00 20 8c  40 00 29 3b 00 50 23 80   .P+.S. .@.);.P#.
2e280   01 0d 29 59 08 20 23 8c  04 40 21 59 00 10 31 80   ..)Y. #..@!Y..1.
2e290   00 50 2b 80 01 4d 21 59  01 0e 21 59 04 41 21 59   .P+..M!Y..!Y.A!Y
2e2a0   02 0e 21 59 84 85 21 59  84 d0 20 58 18 0e 21 59   ..!Y..!Y.. X..!Y
2e2b0   98 0d 59 59 08 00 00 08  00 00 58 8c 2c e0 1a 3d   ..YY......X.,..=
2e2c0   04 20 23 90 2c 20 21 90  1c 20 01 32 04 00 28 8c   . #., !.. .2..(.
2e2d0   04 20 23 90 2c 20 e9 90  0c 16 80 5c 05 16 88 5c   . #., .....\...\
2e2e0   00 50 07 86 80 07 00 08  82 e8 02 5a 78 07 00 12   .P.........Zx...
2e2f0   81 e8 02 5a 38 01 00 15  00 50 2b 60 24 00 20 8c   ...Z8....P+.S. .
2e300   85 20 01 5a 00 00 20 24  84 30 00 5a 00 00 48 8c   . .Z.. S.O.Z..H.
2e310   84 e0 4f 92 20 00 00 12  04 20 23 90 30 20 21 90   ..O. .... #.O !.
2e320   04 30 00 5a 00 00 20 25  84 30 00 5a 00 00 48 25   .O.Z.. %.O.Z..H%
2e330   84 e0 4f 92 84 e0 4f 90  89 30 00 5a 00 00 40 8c   ..O...O..O.Z..@.
2e340   86 e0 47 92 28 00 00 12  00 50 2b 80 04 20 23 90   ..G.(....P+.. #.
2e350   30 20 21 90 05 1d 21 90  04 30 00 5a 00 00 20 25   0 !...!..O.Z.. %
```

Mar 27 18:20 1996 image.txt Page 290

```
2e360   84 30 00 3a 00 00 48 25  88 e0 41 92 88 e0 41 90   .0.:..H%..A...A.
2e370   4c 60 02 3a fb 00 90 8c  00 50 9b 80 00 00 b8 8c   L`.:.....P......
2e380   17 16 38 5c 07 16 30 5c  00 50 2b 80 04 20 23 90   ..8\..0\.P+.. #.
2e390   30 20 21 90 05 1d e9 90  0c 16 80 5c 12 16 88 5c   0 !.........\...\
2e3a0   13 16 90 5c 17 16 98 5c  07 16 a0 5c 06 16 a8 5c   ...\...\...\...\
2e3b0   00 50 07 86 90 30 00 3a  00 00 e8 25 00 50 2b 80   .P...0.:...%.P+.
2e3c0   24 00 20 8c 64 00 29 3b  00 50 23 80 01 0d 29 59   $. .d.);.P#...)Y
2e3d0   08 20 23 8c 04 40 21 59  00 10 31 80 00 50 2b 80   . #..@!Y..1..P+.
2e3e0   01 4d 21 59 01 0e 21 59  04 41 21 59 02 0e 21 59   .M!Y..!Y.A!Y..!Y
2e3f0   04 d7 20 59 06 02 31 58  00 50 2b 80 01 4d 21 59   .. Y..1X.P+..M!Y
2e400   01 0e 21 59 04 41 21 59  02 0e 21 59 04 96 20 59   ..!Y.A!Y..!Y.. Y
2e410   86 03 31 58 08 20 2b 8c  00 50 23 80 01 0d 21 59   ..1X. +..P#...!Y
2e420   05 00 21 59 00 10 31 82  3c 06 00 08 80 e8 02 5a   ..!Y..1.<......Z
2e430   04 01 00 15 00 50 2b 80  24 00 20 8c 85 20 01 5a   .....P+.$. .. .Z
2e440   18 01 00 13 04 20 23 90  30 20 21 90 00 28 01 5a   ..... #.0 !..(.Z
2e450   08 01 00 12 00 50 2b 80  04 20 23 90 30 20 21 90   .....P+.. #.0 !.
2e460   05 1d 21 90 00 28 01 5a  f0 00 00 12 fb 00 90 8c   ..!..(.Z........
2e470   00 50 9b 80 00 00 b8 8c  17 16 38 5c 07 16 30 5c   .P........8\..0\
2e480   00 50 2b 80 04 20 23 90  30 20 21 90 05 1d e9 90   .P+.. #.0 !.....
2e490   0c 16 80 5c 12 16 88 5c  13 16 90 5c 17 16 98 5c   ...\...\...\...\
2e4a0   07 16 a0 5c 06 16 a8 5c  00 50 07 86 ac 20 04 3a   ...\...\.P... .:
2e4b0   00 00 e8 8c 03 00 98 8c  ff 00 38 8c fd 00 30 8c   ..........8...0.
2e4c0   00 50 2b 80 1d 16 20 5c  0c 16 80 5c 1d 16 88 5c   .P+... \...\...\
2e4d0   13 16 90 5c 07 16 98 5c  06 16 a0 5c 05 16 a8 5c   ...\...\...\...\
2e4e0   04 16 b0 5c 8c 0a 00 09  00 50 2b 80 24 00 20 8c   ...\.....P+.$. .
2e4f0   64 00 29 3b 00 50 23 80  01 0d 29 59 08 20 23 8c   d.);.P#...)Y. #.
2e500   04 40 21 59 00 10 31 80  00 50 2b 80 01 4d 21 59   .@!Y..1..P+..M!Y
2e510   01 0e 21 59 04 41 21 59  02 0e 21 59 04 d7 20 59   ..!Y.A!Y..!Y.. Y
2e520   06 02 31 58 00 50 2b 80  01 4d 21 59 01 0e 21 59   ..1X.P+..M!Y..!Y
2e530   04 41 21 59 02 0e 21 59  04 96 20 59 86 03 31 58   .A!Y..!Y.. Y..1X
2e540   08 20 2b 8c 00 50 23 80  01 0d 21 59 05 00 21 59   . +..P#...!Y..!Y
2e550   00 10 31 82 10 05 00 08  00 00 e8 8c 03 00 98 8c   ..1.............
2e560   ff 00 38 8c fe 00 30 8c  00 50 2b 80 1d 16 20 5c   ..8...0..P+... \
2e570   0c 16 80 5c 1d 16 88 5c  13 16 90 5c 07 16 98 5c   ...\...\...\...\
2e580   06 16 a0 5c 05 16 a8 5c  04 16 b0 5c e4 05 00 09   ...\...\...\....
2e590   00 50 2b 80 24 00 20 8c  48 00 29 3b 00 50 23 80   .P+.$. .H.);.P#.
2e5a0   01 0d 29 59 08 20 23 8c  04 40 21 59 00 10 31 80   ..)Y. #..@!Y..1.
2e5b0   00 50 2b 80 01 4d 21 59  01 0e 21 59 04 41 21 59   .P+..M!Y..!Y.A!Y
2e5c0   02 0e 21 59 04 d7 20 59  06 02 31 58 08 20 2b 8c   ..!Y.. Y..1X. +.
2e5d0   00 50 23 80 01 0d 21 59  05 00 21 59 00 10 31 82   .P#...!Y..!Y..1.
```

Mar 27 18:20 1996 image.txt Page 231

```
2e5e0  84 04 00 08 04 20 23 90  2c 20 21 90 1c 20 01 32  ..... #., !.. .2
2e5f0  01 00 28 dc 04 20 23 90  2c 20 e9 90 0c 15 80 5c  ..\.. #.. .....\
2e600  05 16 88 5c 00 50 07 86  5c 04 00 08 1a 20 e0 80  ...\.P..\.... ..
2e610  07 1d e8 65 1a 20 e0 82  00 50 2b 80 24 00 20 8c  ...e. ...P+.$. .
2e620  40 00 29 3b 00 50 23 80  01 0d 29 59 08 20 23 8c  @.);.P#...)Y. #.
2e630  04 40 21 59 00 10 31 80  00 50 2b 80 01 4d 21 59  .@!Y..1..P+..M!Y
2e640  01 0e 21 59 04 41 21 59  02 0e 21 59 84 d5 21 59  ..!Y.A!Y..!Y..!Y
2e650  84 d0 20 58 1d 0e 21 59  98 0d 31 59 08 00 00 08  .. X..!Y..1Y....
2e660  00 00 50 8c 80 a8 02 5a  fc 03 00 12 83 a8 02 5a  ..P.....Z.......Z
2e670  1c 01 00 15 00 50 2b 80  24 00 20 8c 85 20 01 5a  .....P+.$. .. .Z
2e680  00 00 20 24 84 30 00 5a  00 00 48 8c 8c e0 4f 92  .. $.0.Z..H...O.
2e690  20 00 00 12 04 20 23 90  30 20 21 90 04 30 00 5a   .... #.0 !..0.Z
2e6a0  00 00 20 25 84 30 00 5a  00 00 48 25 8c e0 4f 92  .. %.0.Z..H%..O.
2e6b0  8c e0 4f 90 89 30 00 5a  00 00 40 8c 90 e0 47 92  ..O..0.Z..@...G.
2e6c0  28 00 00 12 00 50 2b 80  04 20 23 90 30 20 21 90  (....P+.. #.0 !.
2e6d0  05 1d 21 90 04 30 00 5a  00 00 20 25 84 30 00 5a  ..!..0.Z.. %.0.Z
2e6e0  00 00 48 25 90 e0 4f 92  90 e0 4f 90 4c 60 02 3a  ..H%..O...O.L`.:
2e6f0  fc 00 90 8c 00 50 9b 80  00 00 b8 8c 17 16 38 5c  .....P........8\
2e700  07 16 30 5c 00 50 2b 80  04 20 23 90 30 20 21 90  ..0\.P+.. #.0 !.
2e710  05 1d e9 90 0c 16 80 5c  12 16 88 5c 13 16 90 5c  .......\...\...\
2e720  17 16 98 5c 07 16 a0 5c  06 16 a8 5c 00 50 07 86  ...\...\...\.P..
2e730  90 30 00 5a 00 00 e8 25  00 50 2b 80 24 00 20 8c  .0.Z...%.P+.$. .
2e740  48 00 29 3b 00 50 23 80  01 0d 29 59 08 20 23 8c  H.);.P#...)Y. #.
2e750  04 40 21 59 00 10 31 80  00 50 2b 80 01 4d 21 59  .@!Y..1..P+..M!Y
2e760  01 0e 21 59 04 41 21 59  02 0e 21 59 04 d7 20 59  ..!Y.A!Y..!Y.. Y
2e770  06 02 31 58 08 20 2b 8c  00 50 23 80 01 0d 21 59  ..1X. +..P#...!Y
2e780  05 00 21 59 00 10 31 82  dc 02 00 08 0c a0 0a 3a  ..!Y..1........:
2e790  82 a8 02 5a 54 01 00 15  00 50 2b 80 24 00 20 8c  ...ZT....P+.$. .
2e7a0  85 20 01 5a 00 00 20 24  84 30 00 5a 00 00 48 8c  . .Z.. $.0.Z..H.
2e7b0  94 e0 4f 92 20 00 00 12  04 20 23 90 30 20 21 90  ..O. .... #.0 !.
2e7c0  04 30 00 5a 00 00 20 25  84 30 00 5a 00 00 48 25  .0.Z.. %.0.Z..H%
2e7d0  94 e0 4f 92 94 e0 4f 90  89 30 00 5a 00 00 40 8c  ..O...O..0.Z..@.
2e7e0  98 e0 47 92 28 00 00 12  00 50 2b 80 04 20 23 90  ..G.(....P+.. #.
2e7f0  30 20 21 90 05 1d 21 90  04 30 00 5a 00 00 20 25  0 !...!..0.Z.. %
2e800  84 30 00 5a 00 00 48 25  98 e0 4f 92 98 e0 4f 90  .0.Z..H%..O...O.
2e810  4c 60 02 3a fc 00 90 8c  00 50 9b 80 00 00 b8 8c  L`.:.....P......
2e820  17 16 38 5c 07 16 30 5c  00 50 2b 80 04 20 23 90  ..8\..0\.P+.. #.
2e830  30 20 21 90 05 1d e9 90  0c 16 80 5c 12 16 88 5c  0 !........\...\
2e840  13 16 90 5c 17 16 98 5c  07 16 a0 5c 06 16 a8 5c  ...\...\...\...\
2e850  00 50 07 86 90 30 00 5a  00 00 e8 25 00 00 e8 8c  .P...0.Z...%....
```

```
Mar 27 18:20 1996  image.txt Page 292

2e860   03 00 98 8c ff 00 38 8c  1e 00 30 8c 00 50 2b 80   ......8...0..P+.
2e870   1a 16 20 5c 0c 16 80 5c  1a 16 88 5c 13 16 90 5c   .. \...\...\...\
2e880   07 16 98 5c 06 16 a0 5c  05 16 a8 5c 04 16 b0 5c   ...\...\...\...\
2e890   e0 06 00 09 00 50 2b 80  24 00 20 8c 48 00 29 3b   .....P+.$. .H.);
2e8a0   00 50 23 80 01 0a 2f 59  08 20 23 8c 04 40 21 59   .P#.../Y. #..@!Y
2e8b0   00 10 31 80 00 50 2b 80  01 4d 21 59 01 0e 21 59   ..1..P+..M!Y..!Y
2e8c0   04 41 21 59 02 0e 21 59  04 d7 20 59 06 02 31 58   .A!Y..!Y.. Y..1X
2e8d0   08 20 2b 8c 00 50 23 80  01 0a 21 59 05 00 21 59   . +..P#...!Y..!Y
2e8e0   00 10 31 82 80 01 00 08  04 20 23 90 2c 20 21 90   ..1...... #., !.
2e8f0   1c 20 01 32 01 00 28 8c  04 20 23 90 2c 20 e9 90   . .2..(.. #., ..
2e900   0c 16 80 5c 05 16 88 5c  00 50 07 86 58 01 00 08   ...\...\.P..X...
2e910   1a 20 23 80 2c 20 2f 30  04 20 23 90 2c 20 21 90   . #., /0. #., !.
2e920   1c 20 01 32 04 00 28 8c  04 20 23 90 2c 20 e9 90   . .2..(.. #., ..
2e930   0c 16 80 5c 05 16 88 5c  00 50 07 86 28 01 00 08   ...\...\.P..(...
2e940   00 50 2b 80 1c 20 2b 82  24 00 20 8c 85 20 01 5a   .P+.. +.$. .. .Z
2e950   00 00 20 24 84 30 00 5a  00 00 48 8c 9c e0 4f 92   .. $.0.Z..H...O.
2e960   20 00 00 12 04 20 23 90  30 20 21 90 04 30 00 5a    .... #.0 !..0.Z
2e970   00 00 20 25 84 30 00 5a  00 00 48 25 9c e0 4f 92   .. %.0.Z..H%..O.
2e980   9c e0 4f 90 89 30 00 5a  00 00 40 8c a0 e0 47 92   ..O..0.Z..@...G.
2e990   2c 00 00 12 00 50 2b 80  1c 20 2b 82 04 20 23 90   ,....P+.. +.. #.
2e9a0   30 20 21 90 05 1d 21 90  04 30 00 5a 00 00 20 25   0 !...!..0.Z.. %
2e9b0   84 30 00 5a 00 00 48 25  a0 e0 4f 92 a0 e0 4f 90   .0.Z..H%..O...O.
2e9c0   54 60 02 3a fa 00 90 8c  00 50 9b 80 1c 20 9b 82   T`.:.....P... ..
2e9d0   00 00 b8 8c 17 16 38 5c  07 16 30 5c 00 50 2b 80   ......8\..0\.P+.
2e9e0   1c 20 2b 82 04 20 23 90  30 20 21 90 05 1d e9 90   . +.. #.0 !.....
2e9f0   0c 16 80 5c 12 16 88 5c  13 16 90 5c 17 16 98 5c   ...\...\...\...\
2ea00   07 16 a0 5c 06 16 a8 5c  00 50 07 86 90 30 00 5a   ...\...\.P...0.Z
2ea10   00 00 e8 25 1a 20 eb 80  07 18 e8 65 1a 20 eb 82   ...%. .....e. ..
2ea20   1a 20 eb 80 85 49 ef 58  1a 20 eb 82 00 50 23 80   . ...I.X. ...P#.
2ea30   1c 20 23 82 01 00 48 8c  40 e0 4f 92 28 00 00 08   . #...H.@.O.(...
2ea40   04 20 23 90 2c 20 21 90  1c 20 01 32 0f 00 28 8c   . #., !.. .2..(.
2ea50   04 20 23 90 2c 20 e9 90  0c 16 80 5c 05 16 88 5c   . #., .....\...\
2ea60   00 50 07 86 01 60 6b 8c  44 e0 4f 90 09 16 20 5c   .P...`k.D.O... \
2ea70   01 49 4a 59 44 e0 4f 92  00 28 01 5a 80 e9 ff 14   .IJYD.O..(.Z....
2ea80   1a 20 23 80 1d 0e 21 59  1d 0c 21 59 78 20 39 3d   . #...!Y..!Yx 9=
2ea90   2c a0 03 32 04 20 23 90  00 10 21 90 1c 20 01 32   ,..2. #...!.. .2
2eaa0   04 20 23 90 00 10 e9 90  0c 16 80 5c 0e 16 88 5c   . #........\...\
2eab0   0f 16 90 5c 00 50 07 86  00 00 70 8c 00 10 83 90   ...\.P....p.....
2eac0   30 6c ff 09 40 20 04 3b  04 20 23 90 00 10 21 90   0l..@ .;. #...!.
2ead0   28 20 01 32 00 30 30 8c  64 24 08 10 01 00 28 8c   ( .2.00.d$....(.
```

Mar 27 18:20 1996 image.txt Page 233

```
2eae0   04 20 23 90 00 10 e9 90  0c 15 80 5c 06 16 88 5c   . #.........\...\
2eaf0   05 16 90 5c 00 50 07 86  1a 20 e5 80 07 18 ed 55   ...\.P... ......e
2eb00   1a 20 e0 82 06 a0 03 35  00 00 00 0a 1a 20 23 80   . ......5..... #.
2eb10   05 2f 02 5a c4 00 00 10  1c 20 25 80 24 00 20 8c   ./.Z..... %.$. .
2eb20   85 20 01 5a 00 00 20 24  84 30 00 5a 00 00 48 8c   . .Z.. $.0.Z..H.
2eb30   a4 e0 4f 92 20 00 00 12  04 20 23 90 30 20 21 90   ..O. .... #.0 !.
2eb40   04 30 00 5a 00 00 20 25  84 30 00 5a 00 00 48 25   .0.Z.. %.0.Z..H%
2eb50   a4 e0 4f 92 a4 e0 4f 90  89 30 00 5a 00 00 40 8c   ..O...O..0.Z..@.
2eb60   a6 e0 47 92 28 00 00 12  1c 20 28 80 04 20 23 90   ..G.(.... (.. #.
2eb70   30 20 21 90 05 1a 21 90  04 30 00 5a 00 00 20 25   0 !...!..0.Z.. %
2eb80   84 30 00 5a 00 00 48 25  a6 e0 4f 92 ad e0 4f 90   .0.Z..H%..O...O.
2eb90   78 60 02 3a 00 00 58 cc  1c 20 3b d0 13 15 30 5c   x`.:....X. ;...0\
2eba0   1c 20 2b 80 04 20 23 90  30 20 21 90 05 1a e9 90   . +.. #.0 !.....
2ebb0   0c 16 80 5c 13 16 88 5c  07 16 90 5c 0e 16 98 5c   ...\...\...\...\
2ebc0   0f 16 a0 5c 06 16 a8 5c  00 50 07 86 90 30 00 5a   ...\...\.P...0.Z
2ebd0   00 00 e8 25 00 00 00 0a  1a 20 23 80 2c 20 31 37   ...%..... #., 17
2ebe0   04 20 23 90 00 10 21 90  1c 20 01 32 04 20 23 90   . #...!.. .2. #.
2ebf0   00 10 e9 90 0c 16 80 5c  0e 16 88 5c 0f 16 90 5c   .......\...\...\
2ec00   00 50 07 84 00 00 00 0a  00 00 00 0a 00 00 00 00   .P..............
2ec10   1e 20 8c 8a 11 30 00 5a  00 00 28 25 1a 20 1c 80   . ...0.Z..(%. ..
2ec20   19 ce 20 59 1f 0c 21 59  84 43 21 58 06 0e 29 59   .. Y..!Y.C!X..)Y
2ec30   40 00 20 8c 04 40 19 65  1a 20 1c 82 00 00 00 0a   @. ..@.e. ......
2ec40   10 16 78 5c 1a 20 3c 80  84 c9 39 58 1a 20 3c 82   ..x\. <...9X. <.
2ec50   04 e0 23 90 24 20 21 90  14 20 01 32 04 e0 23 90   ..#.$ !.. .2..#.
2ec60   24 20 19 90 0f 16 80 5c  00 d0 00 86 1a e0 23 80   $ .....\......#.
2ec70   08 20 19 37 00 00 00 0a  1b e0 23 80 3c 20 31 37   . .7......#.< 17
2ec80   03 00 30 8c 01 00 28 8c  05 16 20 5c 0f 16 80 5c   ..0...(... \...\
2ec90   06 16 88 5c 05 16 90 5c  04 16 98 5c 04 04 00 09   ...\...\...\....
2eca0   00 00 28 8c 0f 16 80 5c  06 16 88 5c 05 16 90 5c   ..(....\...\...\
2ecb0   04 16 98 5c ec 03 00 08  00 00 00 0a 00 00 00 00   ...\............
2ecc0   10 16 28 5c 18 4e 24 59  98 0d 21 59 04 16 30 5c   ..(\.N$Y..!Y..0\
2ecd0   24 20 01 3a 04 60 21 90  2c 20 21 90 18 20 01 32   $ .:.`!., !.. .2
2ece0   04 60 21 90 2c 20 39 90  05 16 80 5c 06 16 88 5c   .`!., 9....\...\
2ecf0   00 d0 01 86 04 60 21 90  28 20 21 90 14 20 01 32   .....`!.( !.. .2
2ed00   04 60 21 90 28 20 19 90  05 16 80 5c 00 d0 00 84   .`!.( .....\....
2ed10   00 00 00 0a 00 00 00 00  00 00 00 00 00 00 00 00   ................
2ed20   20 60 08 8c 10 16 60 5c  11 16 58 5c 12 16 50 5c    `....`\..X\..P\
2ed30   01 00 68 8c 00 00 78 8c  1a 20 24 80 0c 20 21 37   ..h...x.. $.. !7
2ed40   0c 00 60 8c 00 00 00 0a  1b 20 23 80 1b 0e 21 59   ..`...... #...!Y
2ed50   1f 0c 49 59 48 e0 4f 92  54 60 03 3d 00 10 33 90   ..IYH.O.T`.=..3.
```

```
Mar 27 18:20 1996  image.txt Page 294

2ed60   44 e0 2f 8c 40 e0 27 8c  06 16 80 5c 05 16 88 5c   D./.@.'....\...\
2ed70   04 16 90 5c 0f 16 98 5c  38 e1 ff 09 18 0e 24 59   ...\...\8.....$Y
2ed80   98 0d 21 59 04 16 48 5c  4c e0 4f 92 10 20 01 3a   ..!Y..H\L.O.. .:
2ed90   4c e0 4f 90 09 16 80 5c  00 00 00 0a 40 e0 27 90   L.O....\....@.'.
2eda0   0c 20 01 35 0f 00 80 8c  00 00 00 0a 00 0c 70 5c   . .5.........p.
2edb0   00 a8 02 5a 24 01 00 13  0b 80 23 59 00 10 39 80   ...Z$.....#Y..9.
2edc0   ff 00 20 8c 48 c0 21 3d  0c 60 03 3a 01 e0 7b 8c   .. .H.!=.`.:..{.
2edd0   18 00 00 08 ff 00 30 8c  40 e0 2f 90 01 60 21 8c   ......0.@./..`!.
2ede0   40 e0 27 92 00 50 31 82  0c 60 03 3a 01 e0 7b 8c   @.'..P1..`.:..{.
2edf0   18 00 00 08 ff 00 30 8c  40 e0 2f 90 01 60 21 8c   ......0.@./..`!.
2ee00   40 e0 27 92 00 50 31 82  c0 00 00 08 8a e8 01 5a   @.'..P1........Z
2ee10   94 00 00 15 1b 20 23 80  68 20 09 37 1b 20 23 60   ..... #.h .7. #.
2ee20   60 20 01 37 0c 60 03 3a  01 e0 7b 8c 18 00 00 08   ` .7.`.:..{.....
2ee30   0a 00 30 8c 40 e0 2f 90  01 60 21 8c 40 e0 27 92   ..0.@./..`!.@.'.
2ee40   00 50 31 82 0c 60 03 3a  01 e0 7b 8c 30 00 00 08   .P1..`.:..{.0...
2ee50   1a 20 23 80 14 20 19 37  1b 20 23 80 0c 20 11 30   . #.. .7. #.. .0
2ee60   00 00 18 8c 08 00 00 08  0a 00 18 8c 40 e0 2f 90   ............@./.
2ee70   01 60 21 8c 40 e0 27 92  00 50 19 82 4c 00 00 08   .`!.@.'..P..L...
2ee80   0c 60 03 3a 01 e0 7b 8c  18 00 00 08 0a 00 30 8c   .`.:..{.......0.
2ee90   40 e0 2f 90 01 60 21 8c  40 e0 27 92 00 50 31 82   @./..`!.@.'..P1.
2eea0   28 00 00 08 0c 60 03 3a  01 e0 7b 8c 1c 00 00 08   (....`.:..{.....
2eeb0   0b 80 23 59 00 10 31 80  40 e0 2f 90 01 60 21 8c   ..#Y..1.@./..`!.
2eec0   40 e0 27 92 00 50 31 82  01 a0 23 8c 04 16 70 5c   @.'..P1...#...p\
2eed0   04 a0 02 5a e4 fe ff 14  28 e0 03 35 10 60 03 3a   ...Z....(..5.`.:
2eee0   00 00 48 8c 50 e0 4f 92  0c 00 00 08 0f 00 48 8c   ..H.P.O.......H.
2eef0   50 e0 4f 92 50 e0 4f 90  09 16 80 5c 00 00 00 0a   P.O.P.O....\....
2ef00   0d 16 20 5c 81 49 6b 59  80 28 01 5a 3c fe ff 15   .. \.IkY.(.Z<...
2ef10   00 10 33 90 44 e0 2f 90  00 00 20 8c 06 16 80 5c   ..3.D./... ....\
2ef20   05 16 88 5c 0f 16 90 5c  04 16 98 5c d4 df ff 09   ...\...\...\....
2ef30   18 0e 24 59 98 0d 21 59  04 16 48 5c 4c e0 4f 92   ..$Y..!Y..H\L.O.
2ef40   10 20 01 3a 4c e0 4f 90  09 16 80 5c 00 00 00 0a   . .:L.O....\....
2ef50   1b 20 eb 80 48 e0 4f 90  04 4e 22 59 10 08 e9 65   . ..H.O..N"Y...e
2ef60   1b 20 eb 82 00 00 80 8c  00 00 00 0a 00 00 00 00   . ..............
2ef70   20 60 08 8c 10 16 60 5c  11 16 68 5c 12 16 70 5c    `....`\..h\..p\
2ef80   13 16 58 5c 14 16 50 5c  15 16 48 5c 48 e0 4f 92   ..X\..P\..H\H.O.
2ef90   16 16 40 5c 4c e0 47 92  1a 20 24 80 0c 20 21 37   ..@\L.G.. $.. !7
2efa0   0c 00 80 8c 00 00 00 0a  00 10 3b 90 40 e0 37 8c   ..........;.@.7.
2efb0   44 e0 2f 8c 05 00 20 8c  07 16 80 5c 06 16 88 5c   D./... ....\...\
2efc0   05 16 90 5c 04 16 98 5c  e8 de ff 09 18 0e 24 59   ...\...\......$Y
2efd0   98 0d 21 59 04 16 78 5c  0c 20 01 3a 0f 16 80 5c   ..!Y..x\. .:...\
```

Mar 27 15:20 1996 image.txt Page 295

```
2efe0   00 00 00 0a 44 e0 2f 90  01 60 21 8c 44 e0 27 92   ....D./..`!.D.'.
2eff0   00 50 59 82 44 e0 2f 90  01 60 21 8c 44 e0 27 92   .PY.D./..`!.D.'.
2f000   00 50 51 82 44 e0 2f 90  01 60 21 8c 44 e0 27 92   .PQ.D./..`!.D.'.
2f010   48 e0 41 90 00 50 49 82  44 e0 2f 90 01 60 21 8c   H.A..PI.D./..`!.
2f020   44 e0 27 92 4c e0 47 90  00 50 41 82 00 10 4b 90   D.'.L.G..PA...K.
2f030   50 e0 41 92 40 e0 47 90  54 e0 47 92 0e 16 48 5c   P.A.@.G.T.G...H\
2f040   58 e0 41 92 0c 60 03 3a  01 00 18 8c 08 00 00 08   X.A..`.:........
2f050   00 00 18 8c 50 e0 41 90  09 16 60 5c 54 e0 47 90   ....P.A...`\T.G.
2f060   08 16 88 5c 58 e0 41 90  09 16 90 5c 03 16 98 5c   ...\X.A....\...\
2f070   90 de ff 09 18 0e 24 59  98 0d 21 59 04 16 78 5c   ......$Y..!Y..x\
2f080   0c 20 01 3a 0f 16 80 5c  00 00 00 0a 00 00 80 8c   . .:...\........
2f090   00 00 00 0a 00 00 00 00  00 00 00 00 00 00 00 00   ................
2f0a0   10 16 60 5c ff 00 20 8c  91 00 29 58 03 16 68 5c   ..`\.. ...)X..h\
2f0b0   12 16 70 5c 13 16 78 5c  24 00 20 8c 20 00 29 3b   ..p\..x\$. . .);
2f0c0   04 20 23 90 30 20 21 90  14 20 01 32 04 20 23 90   . #.0 !.. .2. #.
2f0d0   30 20 21 90 0d 1d 21 90  0c 20 01 35 03 00 80 8c   0 !...!.. .5....
2f0e0   00 00 00 0a 48 a0 03 3a  24 00 20 8c 38 00 69 3b   ....H..:$. .8.i;
2f0f0   01 4d 2b 59 08 20 23 8c  04 40 21 59 00 10 29 80   .M+Y. #..@!Y..).
2f100   01 4d 23 59 01 0e 21 59  04 41 23 59 02 0e 21 59   .M#Y..!Y.A#Y..!Y
2f110   84 45 21 59 84 d0 20 58  18 0e 21 59 98 0d 19 59   .E!Y.. X..!Y...Y
2f120   54 00 00 08 00 00 18 8c  4c 00 00 08 24 00 20 8c   T.......L...$. .
2f130   3c 00 69 3b 01 4d 2b 59  08 20 23 8c 04 40 21 59   <.i;.M+Y. #..@!Y
2f140   00 10 29 80 01 4d 23 59  01 0e 21 59 04 41 23 59   ..)..M#Y..!Y.A#Y
2f150   04 39 20 8c 02 00 00 00  84 45 21 59 84 d0 20 58   .9 ......E!Y.. X
2f160   18 0e 21 59 98 0d 59 59  08 00 00 08 00 00 58 8c   ..!Y..YY......X.
2f170   0b 16 18 5c 08 e0 08 3a  0c e0 18 3d 06 00 80 8c   ...\...:...=....
2f180   00 00 00 0a 82 e8 00 5a  4c 01 00 15 0c e0 03 3a   .......ZL......:
2f190   00 00 80 8c 00 00 00 0a  9c a0 03 3a 24 00 20 8c   ...........:$. .
2f1a0   54 00 69 3b 01 4d 2b 59  08 20 23 8c 04 40 21 59   T.i;.M+Y. #..@!Y
2f1b0   00 10 29 80 01 4d 23 59  01 0e 21 59 04 41 23 59   ..)..M#Y..!Y.A#Y
2f1c0   02 0e 21 59 04 d7 20 59  05 02 29 58 01 4d 23 59   ..!Y.. Y..)X.M#Y
2f1d0   01 0e 21 59 04 41 23 59  02 0e 21 59 04 d6 20 59   ..!Y.A#Y..!Y.. Y
2f1e0   85 03 31 58 08 20 2b 8c  01 4d 23 59 05 00 21 59   ..1X. +..M#Y..!Y
2f1f0   00 10 31 82 00 00 e8 8c  03 00 38 8c ff 00 30 8c   ..1.......8...0.
2f200   fe 00 28 8c 1d 16 20 5c  0c 16 80 5c 1d 16 88 5c   ..(... \...\...\
2f210   07 16 90 5c 06 16 98 5c  05 16 a0 5c 0d 16 a8 5c   ...\...\...\...\
2f220   04 16 b0 5c 4c fd ff 09  18 0e 24 59 98 0d 81 59   ...\L.....$Y...Y
2f230   00 00 00 0a 24 00 20 8c  5c 00 69 3b 01 4d 2b 59   ....$. .\.i;.M+Y
2f240   08 20 23 8c 04 40 21 59  00 10 29 80 01 4d 23 59   . #..@!Y..)..M#Y
2f250   01 0e 21 59 04 41 23 59  04 39 20 8c 02 00 00 00   ..!Y.A#Y.9 .....
```

Mar 27 18:20 1996 image.txt Page 296

```
2f260    04 d7 20 59 05 02 29 58  01 4d 23 59 01 0e 21 59   .. Y..)X.M#Y..!Y
2f270    04 41 23 59 04 39 20 8c  02 00 00 00 04 a6 20 59   .A#Y.9 ....... Y
2f280    85 03 31 58 08 20 2b 8c  01 4d 23 59 05 00 21 59   ..1X. +..M#Y..!Y
2f290    00 10 31 82 00 00 e8 8c  03 00 38 8c ff 00 30 8c   ..1.......8...0.
2f2a0    fc 00 28 8c 1d 16 20 5c  0c 16 80 5c 1d 16 88 5c   ..(... \...\...\
2f2b0    07 16 90 5c 06 16 98 5c  05 16 a0 5c 0d 16 a8 5c   ...\...\...\...\
2f2c0    04 16 b0 5c ac fc ff 09  18 0e 24 59 98 0d 81 59   ...\......$Y...Y
2f2d0    00 00 00 0a 80 e8 00 5a  4c 01 00 15 0c e0 03 3d   .......ZL......=
2f2e0    00 00 80 8c 00 00 00 0a  9c a0 03 3a 24 00 20 8c   ............:$. .
2f2f0    54 00 69 3b 01 4d 2b 59  08 20 23 8c 04 40 21 59   T.i;.M+Y. #..@!Y
2f300    00 10 29 80 01 4d 23 59  01 0e 21 59 04 41 23 59   ..)..M#Y..!Y.A#Y
2f310    02 0e 21 59 04 d7 20 59  05 02 29 58 01 4d 23 59   ..!Y.. Y..)X.M#Y
2f320    01 0e 21 59 04 41 23 59  02 0e 21 59 04 56 20 59   ..!Y.A#Y..!Y.V Y
2f330    85 03 31 58 08 20 2b 8c  01 4d 23 59 05 00 21 59   ..1X. +..M#Y..!Y
2f340    00 10 31 82 00 00 e8 8c  03 00 38 8c ff 00 30 8c   ..1.......8...0.
2f350    fd 00 28 8c 1d 16 20 5c  0c 16 80 5c 1d 16 88 5c   ..(... \...\...\
2f360    07 16 90 5c 06 16 98 5c  05 16 a0 5c 0d 16 a8 5c   ...\...\...\...\
2f370    04 16 b0 5c fc fb ff 09  18 0e 24 59 98 0d 81 59   ...\......$Y...Y
2f380    00 00 00 0a 24 00 20 8c  5c 00 69 3b 01 4d 2b 59   ....$. .\.i;.M+Y
2f390    08 20 23 8c 04 40 21 59  00 10 29 80 01 4d 23 59   . #..@!Y..)..M#Y
2f3a0    01 0e 21 59 04 41 23 59  04 39 20 8c 02 00 00 00   ..!Y.A#Y.9 .....
2f3b0    04 d7 20 59 05 02 29 58  01 4d 23 59 01 0e 21 59   .. Y..)X.M#Y..!Y
2f3c0    04 41 23 59 04 39 20 8c  02 00 00 00 04 56 20 59   .A#Y.9 ......V Y
2f3d0    85 03 31 58 08 20 2b 8c  01 4d 23 59 05 00 21 59   ..1X. +..M#Y..!Y
2f3e0    00 10 31 82 00 00 e8 8c  03 00 38 8c ff 00 30 8c   ..1.......8...0.
2f3f0    fb 00 28 8c 1d 16 20 5c  0c 16 80 5c 1d 16 88 5c   ..(... \...\...\
2f400    07 16 90 5c 06 16 98 5c  05 16 a0 5c 0d 16 a8 5c   ...\...\...\...\
2f410    04 16 b0 5c 5c fb ff 09  18 0e 24 59 98 0d 81 59   ...\\.....$Y...Y
2f420    00 00 00 0a 0f 00 80 8c  00 00 00 0a 00 00 00 00   ................
2f430    10 16 68 5c ff 00 20 8c  91 00 29 58 05 16 70 5c   ..h\.. ...)X..p\
2f440    24 00 20 8c 20 00 29 3b  04 60 23 90 30 20 21 90   $. . .);.`#.0 !.
2f450    14 20 01 32 04 60 23 90  30 20 21 90 0e 1d 21 90   . .2.`#.0 !...!.
2f460    0c 20 01 35 05 00 80 8c  00 00 00 0a 1b 60 23 80   . .5.........`#.
2f470    0c 20 01 30 08 00 80 8c  00 00 00 0a 1b 60 1b 80   . .0.........`..
2f480    80 c9 18 58 1b 60 1b 82  1d 60 73 82 00 00 78 8c   ...X.`...`s...x.
2f490    03 00 38 8c ff 00 30 8c  fa 00 28 8c 0f 16 20 5c   ..8...0...(... \
2f4a0    0d 16 80 5c 0f 16 88 5c  07 16 90 5c 06 16 98 5c   ...\...\...\...\
2f4b0    05 16 a0 5c 0e 16 a8 5c  04 16 b0 5c b4 fa ff 09   ...\...\...\....
2f4c0    18 0e 24 59 98 0d 81 59  00 00 00 0a 00 00 00 00   ..$Y...Y........
2f4d0    10 16 68 5c 1b 20 24 80  0c 20 01 37 09 00 80 8c   ..h\. $.. .7....
```

Mar 27 18:20 1998 image.txt Page 297

```
2f4e0   00 00 00 0a 1b 60 1b 80  00 ce 1a 58 1b 60 1b 82   ..... .....X. ..
2f4f0   00 00 78 8c 02 00 70 8c  ff 00 38 8c f0 00 30 8c   ..x...p...8...0.
2f500   0f 16 28 5c 05 16 20 5c  0a 16 80 5c 0f 16 88 5c   ..(\.. \...\...\
2f510   0e 16 90 5c 07 16 98 5c  06 16 a0 5c 05 16 a8 5c   ...\...\...\...\
2f520   04 16 b0 5c 4c fa ff 09  18 0e 24 59 98 0d 81 59   ...\L.....$Y...Y
2f530   00 00 00 0a 00 00 00 00  00 00 00 00 00 00 00 00   ................
2f540   10 16 78 5c ff 00 20 8c  91 00 21 58 12 16 28 5c   ..x\.. ...!X..(\
2f550   13 16 30 5c 04 16 88 5c  d8 fe ff 09 18 0e 24 59   ..0\...\......$Y
2f560   98 0d 21 59 04 16 38 5c  54 20 01 3a 1b e0 23 80   ..!Y..8\T .:..#.
2f570   20 20 01 30 0f 16 80 5c  05 16 88 5c 06 16 90 5c     .0...\...\...\
2f580   a0 f7 ff 09 18 0e 24 59  98 0d 19 59 08 00 00 08   ......$Y...Y....
2f590   09 00 18 8c 18 ce 20 59  98 0d 21 59 04 16 38 5c   ...... Y..!Y..8\
2f5a0   1c 20 01 3d 0f 16 80 5c  28 ff ff 09 18 0e 24 59   . .=...\(.....$Y
2f5b0   98 0d 21 59 04 16 38 5c  0c 20 01 3a 07 16 80 5c   ..!Y..8\. .:...\
2f5c0   00 00 00 0a 00 00 80 8c  00 00 00 0a 00 00 00 00   ................
2f5d0   10 16 70 5c 11 16 78 5c  00 00 38 8c 11 15 20 58   ..p\..x\..8... X
2f5e0   01 20 21 8c 91 00 21 58  04 16 30 5c 00 28 01 5a   . !...!X..0\.(.Z
2f5f0   b0 00 00 12 06 16 18 5c  14 a0 09 35 1a a0 23 80   .......\...5..#.
2f600   80 20 19 30 87 83 39 58  78 00 00 08 14 e0 20 35   . .0..9Xx..... 5
2f610   1b a0 23 80 6c 20 31 30  87 83 39 58 64 00 00 08   ..#.l 10..9Xd...
2f620   14 e0 10 35 1b a0 23 80  58 20 19 30 87 83 39 58   ...5..#.X .0..9X
2f630   50 00 00 08 1c e0 40 35  1a a0 23 80 44 20 19 37   P.....@5..#.D .7
2f640   1b a0 23 80 3c 20 11 30  87 83 39 58 34 00 00 08   ..#.< .0..9X4...
2f650   1c e0 80 35 1a a0 23 80  28 20 19 30 1b a0 23 80   ...5..#.( .0..#.
2f660   20 20 11 30 87 83 39 58  18 00 00 08 20 00 20 8c     .0..9X.... . .
2f670   10 c0 20 35 1b a0 23 80  08 20 29 30 87 83 39 58   .. 5..#.. )0..9X
2f680   0f 82 29 58 05 16 78 5c  05 15 20 58 01 20 21 8c   ..)X..x\.. X. !.
2f690   85 00 21 58 04 16 30 5c  00 28 01 5a 58 ff ff 15   ..!X..0\.(.ZX...
2f6a0   07 16 80 5c 00 00 00 0a  00 00 00 00 00 00 00 00   ...\............
2f6b0   10 16 60 5c 11 16 68 5c  12 16 70 5c 11 15 20 58   ..`\..h\..p\.. X
2f6c0   01 20 21 8c 91 00 21 58  04 16 78 5c 08 20 01 35   . !...!X..x\. .5
2f6d0   00 00 00 0a 0f 16 30 5c  24 e0 13 35 8e c0 23 58   ......0\$..5..#X
2f6e0   04 30 00 5a 00 00 20 25  1b 20 3b 80 03 0e 21 59   .0.Z.. %. ;...!Y
2f6f0   08 08 39 65 1b 20 3b 82  ac 00 00 08 2c a0 41 35   ..9e. ;.....,.A5
2f700   1a 20 23 80 a0 20 19 37  8e c0 23 58 04 30 00 5a   . #.. .7..#X.0.Z
2f710   00 00 20 25 1b 20 1b 80  02 0e 21 59 04 08 19 65   .. %. ....!Y...e
2f720   1b 20 1b 82 80 00 00 08  2c a0 81 35 1a 20 23 80   . ......,..5. #.
2f730   74 20 19 30 8e c0 23 58  04 30 00 5a 00 00 20 25   t .0..#X.0.Z.. %
2f740   1b 20 eb 80 02 0e 21 59  04 08 e9 65 1b 20 eb 82   . ....!Y...e. ..
2f750   54 00 00 08 20 00 20 8c  28 80 21 35 8e c0 23 58   T... . .(.!5..#X
```

Mar 27 18:20 1996 image.txt Page 298

```
2f760    04 30 00 5a 00 00 20 25  1b 20 3b 80 05 0e 29 59   .0.Z.. %. ;...)Y
2f770    20 00 20 8c 04 40 39 65  1b 20 3b 82 28 00 00 08    . ..@9e. ;.(...
2f780    24 a0 21 35 8e c0 23 58  04 30 00 5a 00 00 20 25   $.!5..#X.0.Z.. %
2f790    1b 20 1b 80 06 0e 29 59  40 00 20 8c 04 40 19 65   . ....)Y@. ..@.e
2f7a0    1b 20 1b 82 00 c2 20 58  05 16 68 5c 05 15 20 5a   . .... X..h\.. Z
2f7b0    01 20 21 8c 85 00 21 58  04 16 78 5c 00 28 01 5a   . !...!X..x\.(.Z
2f7c0    14 ff ff 15 00 00 00 0a  00 00 00 00 00 00 00 00   ................
2f7d0    10 16 70 5c 11 16 78 5c  12 16 30 5c 13 16 38 5c   ..p\..x\..0\..8\
2f7e0    0c 20 04 35 0a 00 80 8c  00 00 00 0a 00 00 28 8c   . .5..........(.
2f7f0    24 00 20 8c 0e 16 80 5c  05 16 88 5c 04 16 90 5c   $. ....\...\...\
2f800    18 10 fa 00 00 90 7b 92  04 a0 33 92 00 e1 01 5a   ......{...3....Z
2f810    00 00 20 27 1a a0 1b 80  03 0e 21 59 08 08 19 65   .. '......!Y...e
2f820    1a a0 1b 82 0e 16 80 5c  07 16 88 5c 07 16 90 5c   .......\...\...\
2f830    80 fe ff 09 05 16 80 5c  00 00 00 0a 00 00 00 00   .......\........
2f840    00 10 84 90 4c d7 ff 09  00 00 80 8c 00 00 00 0a   ....L...........
2f850    00 10 84 90 4c d7 ff 08  0c d5 02 00 70 d5 02 00   ....L.......p...
2f860    7c db 02 00 54 df 02 00  b4 e2 02 00 0c e6 02 00   |...T...d.......
2f870    10 e9 02 00 3c d4 02 00  cc d6 02 00 08 d9 02 00   ....<...........
2f880    e8 d8 02 00 e8 da 02 00  f8 d6 02 00 24 d7 02 00   ............$...
2f890    a0 d7 02 00 10 d8 02 00  3c d8 02 00 70 d8 02 00   ........<...p...
2f8a0    a4 d8 02 00 f8 d8 02 00  14 db 02 00 24 db 02 00   ............$...
2f8b0    34 db 02 00 44 db 02 00  b4 d6 02 00 00 00 00 00   4...D...........
2f8c0    10 16 68 5c ff 00 20 8c  91 00 71 58 78 e0 04 35   ..h\.. ...qXx..5
2f8d0    0e 16 78 5c fb 00 20 8c  18 80 23 3d 1a 60 eb 80   ..x\.. ...#=.`..
2f8e0    87 49 ef 58 1a 60 eb 82  01 00 80 8c 00 00 00 0a   .I.X.`..........
2f8f0    fc 00 20 8c 18 c0 23 3d  1a 60 33 80 07 8e 31 58   .. ...#=.`3...1X
2f900    1a 60 33 82 00 00 80 8c  00 00 00 0a fd 00 20 8c   .`3........... .
2f910    18 c0 23 3d 1b 60 3b 80  81 c9 39 58 1b 60 3b 82   ..#=.`;...9X.`;.
2f920    01 00 80 8c 00 00 00 0a  fe 00 20 8c 18 c0 23 3d   ........... ...#=
2f930    1b 60 1b 80 01 ce 18 58  1b 60 1b 82 00 00 80 8c   .`.....X.`......
2f940    00 00 00 0a 04 60 23 90  2c 20 21 90 1c 20 01 32   .....`#., !.. .2
2f950    04 00 28 8c 04 60 23 90  2c 20 e9 90 0d 16 80 5c   ..(..`#., .....\
2f960    05 16 88 5c 00 50 07 86  00 00 80 8c 00 00 00 0a   ...\.P..........
2f970    01 00 80 8c 00 00 00 0a  00 00 00 00 00 00 00 00   ................
2f980    10 16 78 5c ff 00 20 8c  91 00 31 58 30 e0 04 35   ..x\.. ...1X0..5
2f990    06 16 38 5c fb 00 20 8c  1c 80 21 3a fc 00 20 8c   ..8\.. ...!:.. .
2f9a0    14 c0 21 3a fd 00 20 8c  0c c0 21 3a fe 00 20 8c   ..!:.. ...!:.. .
2f9b0    0c c0 21 3a 01 00 80 8c  00 00 00 0a 04 e0 23 90   ..!:..........#.
2f9c0    2c 20 21 90 1c 20 01 32  04 00 28 8c 04 e0 23 90   , !.. .2..(...#.
2f9d0    2c 20 19 90 0f 16 80 5c  05 16 88 5c 00 d0 00 85   , .....\...\....
```

Mar 27 16:20 1996 image.txt Page 257

```
2f9e0   00 00 80 8c 00 00 00 0a  00 00 00 00 00 00 00 00   ................
2f9f0   10 60 08 8c 10 16 60 5c  ff 00 20 8c 91 00 69 58   .`....`\.. ...iX
2fa00   15 15 70 5c 14 16 78 5c  15 16 58 5c 14 e0 04 35   ..p\..x\..X\...5
2fa10   fd 00 20 8c 8d 20 01 3a  00 0c 80 22 00 00 00 0a   .. .. .:..."....
2fa20   0a 20 23 80 8b 0d 21 59  84 d0 20 58 18 0e 21 59   . #...!Y.. X..!Y
2fa30   98 0d 21 59 14 20 11 3d  10 e0 02 3a 0c e0 0b 35   ..!Y. .=...:...5
2fa40   00 90 23 80 0c 20 09 3a  00 00 80 8c 00 00 00 0a   ..#.. .:........
2fa50   05 00 20 8c 0c 16 80 5c  04 16 88 5c d4 f9 ff 09   .. ....\...\....
2fa60   18 0e 24 59 98 0d 21 59  0c 20 01 3a 00 0c 80 8c   ..$Y..!Y. .:....
2fa70   00 00 00 0a 00 00 20 8c  40 e0 27 82 1b 20 23 80   ...... .@.'.. #.
2fa80   20 20 01 30 40 e0 2f 8c  01 0c 20 8c 0c 16 80 5c     .0@./... ....\
2fa90   05 16 88 5c 04 16 90 5c  88 f2 ff 09 04 00 00 08   ...\...\........
2faa0   00 00 30 8c 24 00 20 8c  3c 00 31 3b 01 8d 29 59   ..0.$. .<.1;..)Y
2fab0   08 20 23 8c 04 40 21 59  00 10 29 80 01 8d 21 59   . #..@!Y..)...!Y
2fac0   01 0e 21 59 04 81 21 59  04 39 20 8c 02 00 00 00   ..!Y..!Y.9 .....
2fad0   84 45 21 59 84 d0 20 58  18 0e 21 59 98 0d 39 59   .E!Y.. X..!Y..9Y
2fae0   08 00 00 08 00 00 38 8c  34 e0 11 3d fb 00 20 8c   ......8.4..=.. .
2faf0   40 e0 27 82 41 e0 37 82  1b 20 23 80 20 20 01 30   @.'.A.7.. #.  .0
2fb00   40 e0 2f 8c 02 00 20 8c  0c 16 80 5c 05 16 88 5c   @./... ....\...\
2fb10   04 16 90 5c 0c f2 ff 09  04 00 00 08 24 00 20 8c   ...\........$. .
2fb20   38 00 31 3b 01 8d 29 59  08 20 23 8c 04 40 21 59   8.1;..)Y. #..@!Y
2fb30   00 10 29 80 01 8d 21 59  01 0e 21 59 04 81 21 59   ..)...!Y..!Y..!Y
2fb40   02 0e 21 59 84 45 21 59  84 d0 20 58 18 0e 21 59   ..!Y.E!Y.. X..!Y
2fb50   98 0d 19 59 08 00 00 08  00 00 18 8c 34 e0 10 3d   ...Y........4..=
2fb60   fd 00 20 8c 40 e0 27 82  41 e0 37 82 1b 20 23 80   .. .@.'.A.7.. #.
2fb70   20 20 01 30 40 e0 2f 8c  02 00 20 8c 0c 16 80 5c     .0@./... ....\
2fb80   05 16 88 5c 04 16 90 5c  98 f1 ff 09 04 00 00 08   ...\...\........
2fb90   01 a0 29 8c 05 16 30 5c  24 00 20 8c 85 20 01 5a   ..)...0\$. .. .Z
2fba0   04 ff ff 14 0c 16 80 5c  28 f9 ff 09 00 00 80 8c   .......\(.......
2fbb0   00 00 00 0a 00 00 00 00  00 00 00 00 00 00 00 00   ................
2fbc0   10 60 08 8c 40 e0 87 92  00 30 80 8c e0 0a 06 10   .`..@....0......
2fbd0   00 00 00 0a 00 00 00 00  00 00 00 00 00 00 00 00   ................
2fbe0   10 60 08 8c 40 e0 87 92  00 30 80 8c 70 0b 06 10   .`..@....0..p...
2fbf0   00 00 00 0a 00 00 00 00  00 00 00 00 00 00 00 00   ................
2fc00   10 60 08 8c 40 e0 87 92  00 30 80 8c e0 0b 06 10   .`..@....0......
2fc10   00 00 00 0a 00 00 00 00  00 00 00 00 00 00 00 00   ................
2fc20   00 30 80 8c e0 0a 06 10  00 00 00 0a 00 00 00 00   .0..............
2fc30   00 30 80 8c 70 0b 06 10  00 00 00 0a 00 00 00 00   .0..p...........
2fc40   00 30 80 8c e0 0b 06 10  00 00 00 0a 00 00 00 00   .0..............
*
```

```
Mar 27 18:20 1996  image.txt Page 300

2fc60   10 60 08 8c 40 e0 87 92  00 00 00 0a 00 00 00 00   .`..@...........
*
2fca0   00 14 f0 8c 3c 00 00 00  1e 16 a0 5c 00 1e f0 5c   ....<.......\...\
2fcb0   ff 00 98 8c 34 c0 84 39  00 14 90 8c 00 00 00 00   ....4..9........
2fcc0   00 30 88 8c c0 fc 02 00  11 81 8c 59 00 74 ec 8c   .0.........Y.t..
2fcd0   b1 06 03 00 10 40 97 59  00 90 9c 80 84 c6 84 5b   .....@.Y.......X
2fce0   00 10 05 84 00 00 00 0a  00 1e 80 5c 00 10 05 84   ...........\....
2fcf0   00 14 f0 8c 40 00 00 00  1e 16 a0 5c 00 1e f0 5c   ....@......\...\
2fd00   00 14 88 8c 00 00 00 00  00 30 90 8c 08 fa 02 00   .........0......
2fd10   12 41 94 59 00 b4 94 8c  b1 06 03 00 10 80 9c 59   .A.Y...........Y
2fd20   00 a0 ec 80 18 60 0f 30  41 20 8c 8c 61 00 98 8c   .....`.0A ..a...
2fd30   93 41 84 59 00 10 05 84  00 00 00 0a 00 10 05 84   .A.Y............
2fd40   90 60 08 8c 50 e0 c7 b2  08 a0 07 35 a0 e0 f7 8c   .`..P......5....
2fd50   40 e0 f7 92 1e 16 78 5c  04 e0 8b 92 08 e0 93 9a   @.....x\........
2fd60   00 30 e8 8c ff ff ff 7f  02 1e 50 5c 10 e0 a3 b2   .0........P\....
2fd70   0f 1e 56 5c 20 e0 c3 b2  70 e0 87 92 00 1e f0 5c   ..V\ ...p......\
2fd80   1e 16 40 5c 78 e0 87 92  10 16 48 5c 74 e0 e1 92   ..@\x.....H\t...
2fd90   7c e0 57 92 80 e0 5f 92  84 e0 57 92 8c e0 f7 92   |.W..._...W.....
2fda0   40 e0 1f 90 30 e0 58 8c  64 e0 5f 92 00 14 e8 8c   @...0.X.d._.....
2fdb0   00 00 00 00 00 30 18 8c  b4 fd 02 00 03 41 1f 59   .....0.......A.Y
2fdc0   08 c8 5b 59 00 f4 98 8c  e0 24 03 00 70 e0 97 8c   ..[Y.....$..p...
2fdd0   60 e0 5f 92 11 16 80 5c  60 e0 8f 8c 74 0b 00 09   `._....\`...t...
2fde0   09 00 54 59 00 90 42 c2  50 e0 c7 b0 00 00 00 0a   ..TY..B.P.......
2fdf0   90 60 08 8c 50 e0 c7 b2  08 a0 07 35 a0 e0 f7 8c   .`..P......5....
2fe00   40 e0 f7 92 1e 16 48 5c  04 60 8a 92 08 60 92 9a   @.....H\.`...`..
2fe10   00 1e f0 5c 1e 16 50 5c  10 60 a2 b2 20 60 c2 b2   ...\..P\.`.. `..
2fe20   70 e0 87 92 78 e0 87 92  28 08 00 0b 01 08 5c 59   p...x...(.....\Y
2fe30   74 e0 5f 92 01 1e 18 5c  7c e0 1f 92 80 e0 57 92   t._....\|.....W.
2fe40   84 e0 57 92 8c e0 57 92  40 e0 1f 90 30 e0 e8 8c   ..W...W.@...0...
2fe50   64 e0 ef 92 08 48 52 59  60 e0 57 92 04 60 82 90   d....HRY`.W..`..
2fe60   00 14 50 8c 00 00 00 00  00 30 58 8c 68 fe 02 00   ..P......0X.h...
2fe70   0b 81 5a 59 00 f4 9a 8c  90 24 03 00 60 e0 8f 8c   ..ZY.....$..`...
2fe80   70 e0 97 8c 1c 18 00 09  50 e0 c7 b0 00 00 00 0a   p.......P.......
2fe90   00 14 f0 8c a0 00 00 00  00 10 94 c0 05 18 98 58   ...............X
2fea0   92 e0 04 5a 00 1e b8 5c  17 16 b0 5c 08 00 00 12   ...Z...\...\....
2feb0   14 a0 4c 3d 01 08 84 59  00 10 94 c0 f8 df 94 3a   ..L=...Y.......:
2fec0   f4 bf 4c 3a 05 58 eb 58  10 40 97 3d 01 1e b8 5c   ..L:.X.X.@.=...\
2fed0   01 08 84 59 10 00 00 08  05 d8 8a 58 08 40 94 3d   ...Y.......X.@.=
2fee0   01 08 84 59 00 10 94 c0  05 18 ec 58 34 40 97 3c   ...Y.......X4@.<
2fef0   05 58 ae 58 2c 40 95 39  01 08 8c 59 00 50 a4 c0   .X.X,@.9...Y.P..
```

```
Mar 27 10:20 1996  image.txt Page 561

2f100    00 10 94 c0 96 90 82 74  94 60 07 5a 9d 81 9c 59   .......t.`.Z...Y
2f110    90 c0 b4 59 11 16 80 5c  08 00 00 14 dc 5f a5 3e   ...Y...\......_.>
2f120    08 e0 05 3a 96 11 b0 59  16 15 80 5c 1e 16 e8 5c   ...:...Y...\...\
2f130    00 1e f0 5c 00 50 07 84  00 00 00 0a 00 00 00 00   ...\.P..........
2f140    10 16 78 5c 11 16 38 5c  12 15 60 5c f4 fc ff 09   ..x\..8\..`\....
2f150    00 10 6c 90 00 1e 70 5c  e8 fc ff 09 00 10 74 92   ..l...p\......t.
2f160    00 d0 eb c0 00 14 50 8c  00 00 00 00 00 30 40 8c   ......P......0@.
2f170    6c ff 02 00 08 81 42 59  00 34 1a 8c b1 06 03 00   l.....BY.4......
2f180    1d c0 18 59 00 d0 18 80  0f 16 50 5c 08 e0 18 37   ...Y......P\...7
2f190    24 60 4f 3d 00 34 4a 8c  b1 06 03 00 01 c8 7b 59   $`O=.4J.......{Y
2f1a0    00 d0 eb c0 09 40 ff 59  00 d0 18 80 f0 ff 18 37   .....@.Y.......7
2f1b0    ec 7f 4f 3a 05 58 5b 58  88 c0 ea 3d 01 e0 4b c0   ..O:.X[X...=..K.
2f1c0    01 c8 7b 59 24 c0 4a 3a  05 d8 1a 58 1c c0 48 3a   ..{Y$.J:...X..H:
2f1d0    18 60 4a 3a 00 34 1a 8c  b1 06 03 00 09 c0 18 59   .`J:.4.........Y
2f1e0    00 d0 18 80 1c e0 18 30  08 e0 01 32 00 d0 51 92   .......0...2..Q.
2f1f0    50 fc ff 09 00 10 6c 92  0e 16 80 5c 00 00 00 0a   P.....l....\....
30000    0f 16 80 5c 07 16 88 5c  0c 16 90 5c a4 00 00 09   ...\...\...\....
30010    10 16 58 5c 90 11 40 59  28 fc ff 09 00 10 1c 90   ..X\..@Y(.......
30020    05 98 48 58 0c 40 1a 3a  1f 18 18 58 58 c0 58 36   ..HX.@.:...XX.X6
30030    10 fc ff 09 00 10 4c 92  1f 18 40 58 48 00 00 08   ......L...@XH...
30040    0f 16 80 5c 07 16 88 5c  0c 16 90 5c 64 00 00 09   ...\...\...\d...
30050    10 16 48 5c 10 16 40 5c  e8 fb ff 09 00 10 1c 90   ..H\..@\........
30060    05 98 58 58 10 c0 1a 3a  00 30 18 8c ff ff ff 7f   ..XX...:.0......
30070    14 c0 48 36 cc fb ff 09  00 30 40 8c ff ff ff 7f   ..H6.....0@.....
30080    00 10 5c 92 bc fb ff 09  00 10 1c 90 0c e0 00 3d   ..\............=
30090    b0 fb ff 09 00 10 6c 92  10 e0 01 32 00 d0 19 90   ......l....2....
300a0    08 c0 1b 35 00 d0 51 92  08 16 80 5c 00 00 00 0a   ...5..Q....\....
300b0    10 16 38 5c 11 16 70 5c  12 16 58 5c 00 1e 30 5c   ..8\..p\..X\..0\
300c0    06 16 68 5c 7c fb ff 09  00 10 64 90 06 16 40 5c   ..h\|.....d...@\
300d0    70 fb ff 09 00 10 34 92  00 d0 99 c0 00 14 e8 8c   p.....4.........
300e0    00 00 00 00 00 30 78 8c  e4 00 03 00 0f 41 7f 59   .....0x......A.Y
300f0    00 f4 1b 8c b1 06 03 00  13 c0 18 59 00 d0 18 80   ...........Y....
30100    07 16 48 5c 08 e0 18 37  24 e0 4c 3d 00 f4 53 8c   ..H\...7$.L=..S.
30110    b1 06 03 00 01 c8 39 59  00 d0 99 c0 0a c0 1c 59   ......9Y.......Y
30120    00 d0 18 80 f0 ff 18 37  ec ff 4c 3a 05 58 1b 58   .......7..L:.X.X
30130    10 c0 98 3d 01 1e 50 5c  01 c8 39 59 24 00 00 08   ...=..P\..9Y$...
30140    05 d8 1a 58 14 c0 98 3d  01 c8 39 59 06 16 40 5c   ...X...=..9Y..@\
30150    06 16 50 5c 0c 00 00 08  06 16 40 5c 06 16 50 5c   ..P\......@\..P\
30160    3c e0 02 3d 00 d0 59 c0  05 18 1c 58 28 c0 58 3d   <..=..Y....X(.X=
30170    01 e0 81 c0 54 06 00 0b  83 de 1b 59 10 c0 80 3d   ....T......Y...=
```

Mar 27 18:20 1996 image.txt Page 302

```
30180   10 1e 58 5c 02 c8 39 59  48 00 00 08 08 1e 58 5c   ..X\..9YH.....X\
30190   40 00 00 08 0a 1e 58 5c  38 00 00 08 28 e0 82 3d   @.....X\8...(..=
301a0   00 d0 e9 c0 05 18 1c 58  28 c0 e8 3d 01 e0 d1 c0   .......X(..=....
301b0   18 06 00 0b 83 de 1b 59  18 c0 80 3d 02 c0 39 59   .......Y...=..9Y
301c0   10 00 00 08 9c e0 12 39  05 18 19 58 94 c0 58 39   .......9...X..X9
301d0   00 d0 19 c0 07 16 30 5c  88 e0 00 3a 00 f4 2b 8c   ......0\...:..+.
301e0   b1 06 03 00 00 d0 81 c0  05 00 1c 59 00 d0 18 8d   ...........Y....
301f0   10 e0 10 30 05 18 1c 58  83 01 9c 59 28 00 00 08   ...0...X...Y(...
30200   f8 fa ff 0b 00 f4 1b 8c  b1 06 03 00 10 c0 18 59   ...............Y
30210   00 d0 18 80 4c e0 00 30  0b 50 18 58 83 01 1c 59   ....L..0.P.X...Y
30220   0a c0 98 59 3c c0 9a 3b  00 10 18 58 13 c1 18 59   ...Y<..;...X...Y
30230   80 c5 18 70 18 c0 68 36  05 98 1b 58 04 fa ff 09   ...p..h6...X....
30240   00 10 1c 92 08 16 68 5c  18 00 00 08 01 c8 39 59   ......h\......9Y
30250   00 d0 e9 c0 8d c0 1a 70  13 c0 68 59 88 71 07 3d   .......p..hY.q.=
30260   18 a0 03 32 08 80 39 32  0c 40 3a 35 00 90 4b 92   ...2..92.@:5..K.
30270   08 00 00 08 00 90 3b 92  c8 f9 ff 09 00 10 4c 90   ......;.......L.
30280   05 98 1b 58 0c c0 48 3d  00 1d 68 58 0c 00 00 08   ...X..H=..hX....
30290   b0 f9 ff 09 00 10 64 92  10 a0 0a 3d 00 1d 18 58   ......d....=...X
302a0   0d c1 18 59 01 c8 68 59  0d 16 80 5c 00 00 00 0a   ...Y..hY...\....
302b0   10 16 78 5c 9c 03 00 0b  01 09 44 59 80 28 02 5a   ..x\......DY.(.Z
302c0   00 1e 50 5c 34 00 00 13  88 c0 5b 59 0f 16 48 5c   ..P\4.....[Y..H\
302d0   00 d0 ea c0 00 50 1a c0  01 88 52 59 81 09 42 59   .....P....RY..BY
302e0   8a 20 02 5a 00 d0 1a c2  00 50 ea c2 01 48 4a 59   . .Z.....P...HJY
302f0   81 c9 5a 59 dc ff ff 14  0f 16 80 5c 00 00 00 0a   ..ZY.......\....
30300   00 14 f0 8c 4c 00 00 00  00 10 a4 90 ff 00 b8 8c   ....L...........
30310   91 c0 8d 58 08 4e 94 59  91 83 94 58 10 8e ac 59   ...X.N.Y...X...Y
30320   92 43 9d 58 1e 16 e8 5c  04 08 84 59 00 1e f0 5c   .C.X...\...Y...\
30330   14 16 a8 5c 13 66 05 5a  00 10 a4 90 1c 00 00 17   ...\.f.Z........
30340   00 6e 05 5a 04 08 84 59  e8 ff ff 10 00 1e 80 5c   .n.Z...Y.......\
30350   00 50 07 84 00 00 00 0a  05 09 84 59 95 c0 b5 58   .P.........Y...X
30360   11 a0 05 5a 01 08 84 59  08 4c ad 59 e4 ff ff 12   ...Z...Y.L.Y....
30370   ec bf 05 35 d8 ff ff 08  00 14 f0 8c 54 00 00 00   ...5........T...
30380   1e 16 e8 5c 00 1e f0 5c  44 a0 04 3b 10 80 94 59   ...\...\D..;...Y
30390   10 a0 04 5a 00 10 ac 90  34 00 00 13 00 50 9c 90   ...Z....4....P..
303a0   04 08 84 59 04 48 8c 59  e8 df ac 32 ff 00 a0 8c   ...Y.H.Y...2....
303b0   04 09 84 59 94 40 bd 58  94 c0 b4 58 1c 80 bd 35   ...Y.@.X...X...5
303c0   08 0e a5 59 01 08 84 59  ec 9f 84 34 00 1e 80 5c   ...Y...Y...4...\
303d0   00 50 07 84 00 00 00 0a  0c 00 00 14 01 1e 80 5c   .P.............\
303e0   00 50 07 84 81 19 80 59  00 50 07 84 00 14 f0 8c   .P.....Y.P......
303f0   54 00 00 00 00 10 ac 90  1e 16 b8 5c 00 1e f0 5c   T...........\...\
```

Mar 27 18:20 1996 image.txt Page 305

```
30400   ff 00 a0 8c 04 08 84 59  00 50 9c 90 00 6e 05 5a   .......Y.P...n.Z
30410   15 16 90 5c 14 00 00 12  12 e0 04 5a 04 48 8c 59   ...\.......Z.H.Y
30420   00 10 ac 90 e0 ff ff 12  94 80 ac 58 94 c0 b4 58   ...........X...X
30430   1c 50 a8 35 00 a8 05 5a  08 0e a5 59 ec ff ff 15   ...5...Z...Y....
30440   00 1e 80 5c 00 d0 05 84  00 00 00 0a 0c 00 00 14   ...\............
30450   01 1e 80 5c 00 d0 05 84  81 19 80 59 00 d0 05 84   ...\.......Y....
30460   00 14 f0 8c a4 00 00 00  1e 16 e8 5c 00 10 a4 98   ............\...
30470   08 08 94 59 ff 00 98 8c  00 2e 05 5a 15 16 b8 5c   ...Y.......Z...\
30480   1e 00 00 17 00 ee 05 5a  00 90 a4 98 08 88 94 59   .......Z.......Y
30490   e8 ff ff 10 04 89 94 59  17 16 a0 5c 09 89 ac 59   .......Y...\...Y
304a0   94 c0 b4 58 00 a8 05 5a  01 48 ad 59 08 0c a5 59   ...X...Z.H.Y...Y
304b0   f0 ff ff 15 10 00 00 08  00 14 f0 8c 4c 00 00 00   ............L...
304c0   10 16 a8 5c 00 50 94 90  1e 16 b0 5c ff 00 98 8c   ...\.P.....\....
304d0   04 48 8c 59 00 ae 04 5a  12 16 a0 5c 14 00 00 12   .H.Y...Z...\....
304e0   00 50 94 90 00 50 a5 92  04 48 ad 59 e4 ff ff 08   .P...P...H.Y....
304f0   93 00 f5 58 08 0c a5 59  00 a8 07 5a 00 50 f5 82   ...X...Y...Z.P..
30500   01 48 ad 59 ec ff ff 15  00 90 05 84 00 00 00 0a   .H.Y............
30510   00 14 f0 8c 70 00 00 00  1e 16 e8 5c 64 a0 04 3b   ....p......\d..;
30520   00 50 bc 90 10 16 a8 5c  ff 00 98 8c 11 80 b4 59   .P.....\.......Y
30530   12 40 95 59 04 48 8c 59  16 60 04 5a 17 16 a0 5c   .@.Y.H.Y.`.Z...\
30540   1c 00 00 14 00 2e 05 5a  00 50 bc 90 40 00 00 12   .......Z.P..@...
30550   00 50 a5 92 04 48 ad 59  dc ff ff 08 93 00 f5 58   .P...H.Y.......X
30560   12 60 05 5a 08 0c a5 59  18 00 00 12 00 a8 07 5a   .`.Z...Y.......Z
30570   00 50 f5 82 01 48 ad 59  e4 ff ff 15 e4 ff ff 08   .P...H.Y........
30580   00 1e f0 5c 00 50 07 84  00 00 00 0a 93 00 f5 58   ...\.P.........X
30590   00 a8 07 5a 13 16 b8 5c  08 ce 9c 59 f0 ff ff 15   ...Z...\...Y....
305a0   01 c9 9d 59 93 00 a5 58  00 50 a5 92 08 89 b4 59   ...Y...X.P.....Y
305b0   15 a0 05 5a 04 48 ad 59  a8 ff ff 11 00 50 f5 92   ...Z.H.Y.....P..
305c0   f0 ff ff 08 00 14 f0 8c  64 00 00 00 1e 16 e8 5c   ........d......\
305d0   00 1e f0 5c 54 a0 04 3b  12 00 94 59 10 a0 04 5a   ...\T..;...Y...Z
305e0   00 10 ac 90 44 00 00 13  00 50 9c 90 04 08 84 59   ....D....P.....Y
305f0   00 6e 05 5a 04 48 8c 59  08 00 00 12 e0 df ac 32   .n.Z.H.Y.......2
30600   04 09 84 59 ff 00 a0 8c  94 40 bd 58 94 c0 b4 58   ...Y.....@.X...X
30610   24 80 bd 35 00 a8 05 5a  08 0e a5 59 0c 00 00 12   $..5...Z...Y....
30620   01 08 84 59 e4 9f 84 34  00 1e 80 5c 00 50 07 84   ...Y...4...\.P..
30630   00 00 00 0a 0c 00 00 14  01 1e 80 5c 00 50 07 84   ...........\.P..
30640   81 19 80 59 00 50 07 84  00 14 f0 8c 54 00 00 00   ...Y.P......T...
30650   1e 16 e8 5c 00 10 a4 98  08 08 94 59 ff 00 98 8c   ...\.......Y....
30660   00 2e 05 5a 15 16 b8 5c  1e 00 00 17 00 ee 05 5a   ...Z...\.......Z
30670   00 90 a4 98 08 88 94 59  e8 ff ff 10 04 89 94 59   .......Y.......Y
```

```
Mar 27 18:20 1996  image.txt Page 304

30680   17 16 a0 5c 09 89 94 59  94 c0 f4 58 00 a8 07 5a   ...\...f...X...Z
30690   01 88 94 59 08 0c a5 59  f0 ff ff 15 10 81 84 59   ...f...f.......f
306a0   00 50 07 84 00 00 00 0a  00 00 00 00 00 00 00 00   .P..............
306b0   00 20 20 20 20 20 20 20  20 20 28 28 28 28 28 20   .          (((((
306c0   20 20 20 20 20 20 20 20  20 20 20 20 20 20 20 20
306d0   20 48 10 10 10 10 10 10  10 10 10 10 10 10 10 10    H..............
306e0   10 84 84 84 84 84 84 84  84 84 84 10 10 10 10 10   ................
306f0   10 10 81 81 81 81 81 81  01 01 01 01 01 01 01 01   ................
30700   01 01 01 01 01 01 01 01  01 01 01 01 10 10 10 10   ................
30710   10 10 82 82 82 82 82 82  02 02 02 02 02 02 02 02   ................
30720   02 02 02 02 02 02 02 02  02 02 02 02 10 10 10 10   ................
30730   20 00 00 00 00 00 00 00  00 00 00 00 00 00 00 00    ...............
30740   00 00 00 00 00 00 00 00  00 00 00 00 00 00 00 00   ................
*
307c0   00 14 f0 8c 40 00 00 00  1e 16 a0 5c 00 1e f0 5c   ....@......\...\
307d0   00 14 88 8c 00 00 00 00  00 30 90 8c d8 07 03 00   ..........0.....
307e0   12 41 94 59 00 b4 94 8c  b1 06 03 00 10 80 9c 59   .A.Y...........Y
307f0   00 d0 ec 80 18 60 07 30  61 20 8c 8c 06 58 98 58   .....`.0a ...X.X
30800   93 41 84 59 00 10 05 84  00 00 00 0a 00 10 05 84   .A.Y............
30810   00 14 f0 8c 44 00 00 00  1e 16 a0 5c 00 1e f0 5c   ....D......\...\
30820   00 14 b8 8c 58 0c 00 00  9c de ab 59 1c 1e b0 5c   ....X......Y...\
30830   90 40 ed 58 16 44 ef 59  17 40 97 59 00 90 9c 80   .@.X.D.Y.@.Y....
30840   04 4c ad 59 15 30 00 5a  00 50 9c c2 01 48 8c 59   .L.Y.0.Z.P...H.Y
30850   84 89 b5 59 dc ff ff 15  00 10 05 84 00 00 00 0a   ...Y............
30860   90 30 00 5a 81 09 7c 59  11 16 40 5c 12 16 58 5c   .0.Z..|Y..@\..X\
30870   13 16 48 5c 14 16 50 5c  08 00 00 15 00 00 00 0a   ..H\..P\........
30880   00 d0 1a 90 08 16 80 5c  09 16 88 5c 01 c8 18 59   .......\...\...Y
30890   00 d0 1a 92 00 90 02 86  8f 30 00 5a 81 c9 7b 59   .........0.Z..{Y
308a0   e0 ff ff 15 00 00 00 0a  00 00 00 00 00 00 00 00   ................
308b0   00 10 1c c0 10 16 78 5c  11 16 40 5c 83 30 00 5a   ......x\..@\.0.Z
308c0   12 16 58 5c 13 16 48 5c  00 1e 50 5c 2c 00 00 12   ..X\..H\..P\,...
308d0   00 10 1a 90 0b 16 88 5c  01 c8 18 59 00 10 1a 92   .......\...Y....
308e0   00 d0 83 c0 00 50 02 86  01 c8 7b 59 00 d0 1b c0   .....P....{Y....
308f0   01 88 52 59 dc ff 00 3d  0a 16 80 5c 00 00 00 0a   ..RY...=...\....
30900   91 30 00 5a 10 16 78 5c  12 16 50 5c 81 49 44 59   .0.Z..x\..P\.IDY
30910   13 16 58 5c 14 16 48 5c  08 00 00 15 00 00 00 0a   ..X\..H\........
30920   00 90 1a 90 0b 16 88 5c  01 c8 18 59 00 90 1a 92   .......\...Y....
30930   00 d0 83 c0 00 50 02 86  88 30 00 5a 81 09 42 59   .....P...0.Z..BY
30940   01 c8 7b 59 dc ff ff 15  00 00 00 0a 00 00 00 00   ..{Y............
30950   70 60 08 8c 40 e0 c7 b2  00 00 28 8c 90 e0 2f 92   p`..@.....(.../.
```

```
Mar 27 18:20 1996  image.txt Page 305

30960   10 16 68 5c 50 e0 87 8c  11 16 70 5c 05 16 d8 5c   ..h\P.....p\...\
30970   13 16 58 5c 12 16 78 5c  01 1e 20 5c 94 e0 27 92   ..X\..x\.. \..'.
30980   04 16 28 5c 98 e0 21 92  05 1e 90 5c 8c 0b 1d 0b   ..(\..!....\....
30990   60 e0 87 8c 05 98 90 58  00 00 20 8c 04 16 88 5c   `.......X.. ....\
309a0   78 0b 1d 0b 00 50 53 c0  80 a8 02 5a 8c 0a 00 12   x....PS....Z....
309b0   05 58 29 58 9c e0 21 92  9c e0 2f 90 24 40 51 3a   .X)X..!.../.$@Q:
309c0   90 e0 1f 90 0f 16 88 5c  01 c8 18 59 90 e0 1f 92   .......\...Y....
309d0   00 50 83 c0 00 d0 01 86  01 48 6b 59 80 0a 00 08   .P.......HkY....
309e0   00 00 28 8c 05 16 20 5c  a0 e0 27 92 05 16 30 5c   ..(... \..'...0\
309f0   05 16 60 5c a4 e0 27 92  05 16 48 5c 05 16 98 5c   ..`\..'...H\...\
30a00   05 16 40 58 08 16 d8 5c  08 16 90 5c 05 16 88 5c   ..@X...\...\...\
30a10   01 48 6b 59 00 50 53 c0  12 81 ea 59 5c 60 87 34   .HkY.PS....Y\`.4
30a20   00 14 18 8c 78 0a 00 00  1d d0 58 90 00 14 e8 8c   ....x.....X.....
30a30   00 00 00 00 00 30 18 8c  34 0a 03 00 03 41 1f 59   .....0..4....A.Y
30a40   03 dc 02 84 05 58 63 58  1b 16 40 5c c4 ff ff 08   .....XcX..@\....
30a50   05 d8 4a 58 8c ff ff 08  b8 7f 02 3d 1b 16 48 5c   ..JX.......=..H\
30a60   b0 ff ff 08 05 d8 30 58  a8 ff ff 08 a4 3f 03 35   ......0X.....?.5
30a70   0a 16 40 5c 9c ff ff 08  05 98 82 58 38 00 54 3d   ..@\.......X8.T=
30a80   00 90 1b 90 03 1d e8 58  03 c8 18 59 9d c0 e8 58   .......X...Y...X
30a90   04 48 1f 59 00 90 1b 92  00 50 57 90 10 a0 02 3e   .H.Y.....PW....>
30aa0   05 58 63 58 1b 16 40 5c  8a 11 50 59 01 48 6b 59   .XcX..@\..PY.HkY
30ab0   70 00 00 08 00 14 58 8c  00 00 00 00 00 30 e8 8c   p.....X......0..
30ac0   bc 0a 03 00 1d c1 ea 59  00 74 1f 8c b1 06 03 00   .......Y.t......
30ad0   0a c0 18 59 00 d0 18 80  02 ef 00 5a 00 00 28 8c   ...Y.......Z..(.
30ae0   05 16 50 5c 3c 00 00 10  00 74 97 8c b1 06 03 00   ..P\<....t......
30af0   05 18 bc 58 01 48 5b 59  00 d0 1a c0 00 50 6b c0   ...X.H[Y.....Pk.
30b00   8a 90 52 74 12 c0 18 59  00 d0 e8 80 97 41 1b 59   ..Rt...Y.....A.Y
30b10   8a c0 50 59 02 6f 07 5a  0b 16 68 5c d8 ff ff 17   ..PY.o.Z..h\....
30b20   00 50 eb c0 05 98 1b 58  9d e0 00 5a 00 00 c0 22   .P.....X...Z..."
30b30   b0 20 06 32 01 48 6b 59  00 50 5b c0 34 00 5c 3d   . .2.HkY.P[.4.\=
30b40   00 90 1b 90 03 1d 58 58  03 c8 18 59 8b c0 e8 58   ......XX...Y...X
30b50   04 48 1f 59 00 90 1b 92  00 50 5f 90 0c e0 02 3e   .H.Y.....P_....>
30b60   00 00 28 8c 05 16 c0 5c  01 48 6b 59 7c 00 00 08   ..(....\.HkY|...
30b70   00 14 90 8c 00 00 00 00  00 30 e8 8c 78 0b 03 00   .........0..x...
30b80   1d 81 ec 59 00 74 1f 8c  b1 06 03 00 0b c0 18 59   ...Y.t.........Y
30b90   00 d0 18 80 02 ef 00 5a  00 00 28 8c 05 16 58 5c   .......Z..(...X\
30ba0   48 00 00 10 00 74 87 8c  b1 06 03 00 05 18 bc 58   H....t.........X
30bb0   01 48 93 59 00 90 1c c0  00 50 6b c0 8b 90 5a 74   .H.Y.....Pk...Zt
30bc0   10 c0 18 59 00 d0 e8 80  97 41 1b 59 8b c0 58 59   ...Y.....A.Y..XY
30bd0   02 6f 07 5a 12 16 68 5c  d8 ff ff 17 0c 00 00 08   .o.Z..h\........
```

Mar 27 18:20 1996 image.txt Page 306

```
30be0   00 00 28 8c 05 16 58 5c  00 50 e0 c0 02 de 1e 59   ..(...X\.P.....Y
30bf0   1c c0 e8 3d 98 e0 2f 90  05 16 d0 5c 05 16 20 5c   ...=../....\.. \
30c00   94 e0 27 92 01 48 6b 59  70 00 00 08 08 18 1b 58   ..'..HkYp.......X
30c10   1c c0 e8 3d 02 1e a0 5c  98 e0 2f 90 05 16 20 5c   ...=...\../... \
30c20   94 e0 27 92 01 48 6b 59  50 00 00 08 83 5e 1b 59   ..'..HkYP....^.Y
30c30   40 c0 e8 3d 05 dd 1a 58  89 e0 00 5a 01 48 6b 59   @..=...X...Z.HkY
30c40   0c 00 00 12 05 58 1b 58  0c c0 48 3d 00 00 28 8c   .....X.X..H=..(.
30c50   05 16 48 5c 00 00 28 8c  05 16 d0 5c 98 e0 27 90   ..H\..(....\..'.
30c60   04 16 a8 5c 05 16 20 5c  94 e0 27 92 0c 00 00 08   ...\.. \..'.....
30c70   00 00 28 8c 05 16 a0 5c  00 50 93 c0 08 98 e8 58   ..(....\.P.....X
30c80   05 98 1a 58 1d 81 ec 59  1a e0 00 5a 81 e0 cf 8c   ...X...Y...Z....
30c90   70 07 00 11 00 14 18 8c  48 08 00 00 1d dd 80 90   p.......H.......
30ca0   00 14 e8 8c 00 00 00 00  00 30 18 8c a8 0c 03 00   ..........0.....
30cb0   03 41 1f 59 03 1c 04 84  08 20 06 35 06 1e 58 5c   .A.Y.... .5..X\
30cc0   07 16 c8 5c 0f 16 c0 5c  0a 16 98 5c 09 16 a8 5c   ...\...\...\...\
30cd0   0b 16 80 5c 08 16 b8 5c  0e 16 88 5c 06 16 a0 5c   ...\...\...\...\
30ce0   0c 16 b0 5c ac 18 00 09  90 e0 1f 90 90 c0 18 59   ...\...........Y
30cf0   90 e0 1f 92 64 07 00 08  98 e0 2f 90 05 16 d0 5c   ....d...../....\
30d00   02 1e e8 5c 00 00 28 8c  05 16 48 5c e0 02 00 08   ...\..(...H\....
30d10   98 e0 2f 90 05 16 d0 5c  20 a0 01 32 05 18 1c 58   ../....\ ..2...X
30d20   50 e0 1f c2 00 00 28 8c  51 e0 2f c2 58 e0 27 90   P.....(.Q./...'.
30d30   04 16 28 5c a4 e0 2f 92  1a 30 00 5a 00 00 28 8c   ..(\../..0.Z..(.
30d40   05 16 48 5c 4c 00 00 12  00 90 1b 90 03 1d 98 58   ..H\L..........X
30d50   00 14 e8 8c 28 07 00 00  03 c8 18 59 93 c0 98 58   ....(......Y...X
30d60   04 c8 1c 59 00 90 1b 92  00 d0 9c 90 93 d0 19 58   ...Y...........X
30d70   1d c0 18 59 00 d0 18 80  03 cc 9c 59 13 30 00 5a   ...Y.......Y.0.Z
30d80   01 49 ce 59 00 50 1e c2  e4 ff ff 15 18 03 00 08   .I.Y.P..........
30d90   00 90 1b 90 03 1d 98 58  00 14 e8 8c e0 06 00 00   .......X........
30da0   03 c8 18 59 93 c0 98 58  04 c8 1c 59 00 90 1b 92   ...Y...X...Y....
30db0   00 d0 9c 90 93 d0 19 58  1d c0 18 59 00 d0 18 80   .......X...Y....
30dc0   03 cc 9c 59 13 30 00 5a  01 49 ce 59 00 50 1e c2   ...Y.0.Z.I.Y.P..
30dd0   e4 ff ff 15 d0 02 00 08  98 e0 2f 90 05 16 d0 5c   ........../....\
30de0   0a 1e e8 5c 00 00 28 8c  05 16 48 5c 00 02 00 08   ...\..(...H\....
30df0   98 e0 2f 90 05 16 20 5c  a0 e0 27 92 24 a0 01 32   ../... \..'.$..2
30e00   05 18 1c 58 50 e0 1f c2  00 50 1b c0 02 1e 28 5c   ...XP....P....(\
30e10   a4 e0 2f 92 51 e0 1f c2  00 00 20 8c 52 e0 27 c2   ../.Q..... .R.'.
30e20   4c a0 06 32 00 90 1b 90  03 1d 48 58 00 14 98 8c   L..2......HX....
30e30   4c 06 00 00 03 c8 18 59  89 c0 e8 58 04 48 1f 59   L......Y...X.H.Y
30e40   00 90 1b 92 00 50 4f 90  89 d0 1b 58 13 c0 18 59   .....PO....X...Y
30e50   00 a0 18 80 04 4c 4a 59  09 30 00 5a 01 49 ce 59   .....LJY.0.Z.I.Y
```

Mar 27 18:20 1996  image.txt Page 307

```
30e60   00 50 1e c2 e4 ff ff 15  48 00 00 08 00 90 1b 90   .P......H.......
30e70   03 1d 48 58 00 14 e8 8c  04 06 00 00 03 c8 18 59   ..HX...........Y
30e80   89 c0 48 58 04 48 1a 59  00 90 1b 92 00 50 4a 90   ..HX.H.Y.....PJ.
30e90   8d 80 1b 58 1d c0 18 59  00 d0 18 80 04 4c 4a 59   ...X...Y.....LJY
30ea0   09 30 00 5a 01 49 ce 59  00 50 1e c2 e4 ff ff 15   .0.Z.I.Y.P......
30eb0   00 00 28 8c 05 16 48 5c  ec 01 00 08 98 e0 2f 90   ..(...H\....../.
30ec0   05 16 d0 5c 98 e0 2f 90  05 16 98 5c 0a 1e e8 5c   ...\../....\...\
30ed0   1c 01 00 08 94 e0 2f 90  8c 60 01 32 28 a0 4a 3b   ....../..`.2(.J;
30ee0   24 20 03 32 90 e0 97 8c  89 89 82 59 07 16 a0 5c   $ .2.......Y...\
30ef0   0f 16 98 5c 1b 16 88 5c  6c f9 ff 09 00 00 28 8c   ...\...\l.....(.
30f00   05 16 50 5c 00 90 1b 90  03 1d 38 58 60 e0 8f 8c   ..P\......8X`...
30f10   03 c8 18 59 8b c0 e8 58  04 48 1f 59 00 90 1b 92   ...Y...X.H.Y....
30f20   00 50 87 90 f4 f8 ff 0b  07 16 a0 5c 0f 16 98 5c   .P.........\...\
30f30   90 e0 97 8c 60 e0 87 8c  09 1e 88 5c c4 f9 ff 09   ....`......\....
30f40   89 a8 02 5a 14 05 00 13  89 89 82 59 07 16 a0 5c   ...Z.......Y...\
30f50   0f 16 98 5c 1b 16 88 5c  90 e0 97 8c 04 f9 ff 09   ...\...\........
30f60   f8 04 00 08 28 a0 22 3b  24 20 03 32 90 e0 97 8c   ....(.";$ .2....
30f70   84 89 82 59 07 16 a0 5c  0f 16 98 5c 1b 16 88 5c   ...Y...\...\...\
30f80   e0 f8 ff 09 00 00 28 8c  05 16 50 5c 00 90 1b 90   ......(...P\....
30f90   03 1d 48 58 60 e0 8f 8c  03 c8 18 59 89 c0 48 58   ..HX`......Y..HX
30fa0   04 48 1a 59 00 90 1b 92  00 50 82 90 6c f8 ff 0b   .H.Y.....P..l...
30fb0   07 16 a0 5c 0f 16 98 5c  90 e0 97 8c 60 e0 87 8c   ...\...\....`...
30fc0   04 1e 88 5c 3c f9 ff 09  84 a8 02 5a 8c 04 00 13   ...\<......Z....
30fd0   84 89 82 59 07 16 a0 5c  0f 16 98 5c 1b 16 88 5c   ...Y...\...\...\
30fe0   90 e0 97 8c 7c f8 ff 09  70 04 00 08 60 a0 06 32   ....|...p...`..2
30ff0   00 90 1b 90 03 1d 90 58  93 30 00 5a 03 c8 18 59   .......X.0.Z...Y
31000   92 c0 98 58 04 c8 1c 59  00 90 1b 92 00 d0 94 90   ...X...Y........
31010   10 00 00 12 0c a0 04 3e  05 58 4b 58 92 11 90 59   .......>.XKX...Y
31020   00 14 98 8c 58 04 00 00  1d 84 1c 70 13 c0 18 59   ....X......p...Y
31030   9d 85 94 70 00 d0 18 80  92 30 00 5a 01 49 ce 59   ...p.....0.Z.I.Y
31040   00 50 1e c2 e4 ff ff 15  5c 00 00 08 00 90 1b 90   .P......\.......
31050   03 1d 90 58 93 30 00 5a  03 c8 18 59 92 c0 98 58   ...X.0.Z...Y...X
31060   04 c8 1c 59 00 90 1b 92  00 d0 94 90 10 00 00 12   ...Y............
31070   0c a0 04 3e 05 58 4b 58  92 11 90 59 00 14 98 8c   ...>.XKX...Y....
31080   fc 03 00 00 1d 84 1c 70  13 c0 18 59 9d 85 94 70   .......p...Y...p
31090   00 d0 18 80 92 30 00 5a  01 49 ce 59 00 50 1e c2   .....0.Z.I.Y.P..
310a0   e4 ff ff 15 19 16 80 5c  a8 f5 ff 0b 18 30 00 5a   .......\.....0.Z
310b0   a4 e0 2f 90 05 00 d4 59  1c 00 00 12 00 50 ee c0   ../....Y.....P..
310c0   05 18 1c 58 0c c0 e8 3d  80 e8 02 5a 8c 03 00 12   ...X...=...Z....
310d0   1b 16 40 5c 10 20 06 32  0c c0 d2 33 1a c1 5a 59   ..@\. .2...3..ZY
```

```
Mar 27 18:20 1996   image.txt Page 308

310e0   0c 00 00 08 00 00 28 8c  05 16 58 5c 1a c0 ea 59   ......(...X\...Y
310f0   1c 40 57 36 89 30 00 5a  1d 81 52 59 18 00 00 12   .@W6.0.Z..RY....
31100   14 a0 02 3b 81 89 52 59  0c 00 00 08 00 00 28 8c   ...;..RY......(.
31110   05 16 50 5c 28 20 03 35  24 c0 46 35 90 e0 97 8c   ..P\( .5$.F5....
31120   0a 16 80 5c 07 16 a0 5c  0f 16 98 5c 08 16 88 5c   ...\...\...\...\
31130   30 f7 ff 09 00 00 28 8c  05 16 50 5c 24 a0 01 32   0.....(...P\$..2
31140   90 e0 8f 8c 50 e0 87 8c  0f 16 90 5c 07 16 98 5c   ....P......\...\
31150   60 f7 ff 09 50 e0 87 8c  f8 14 ff 0b 10 81 d6 59   `...P..........Y
31160   1c 60 02 3a 90 e0 ff 90  09 16 80 5c 0f 16 88 5c   .`.:.......\...\
31170   01 c8 18 59 90 e0 1f 92  00 d0 01 86 2c 20 03 35   ...Y........, .5
31180   05 16 1c 58 24 c0 40 35  90 e0 97 8c 0a 16 80 5c   ...X$.@5.......\
31190   07 16 a0 5c 0f 16 98 5c  08 16 88 5c c4 f6 ff 09   ...\...\...\....
311a0   00 00 28 8c 05 16 50 5c  1c e0 02 3a 90 e0 97 8c   ..(...P\...:....
311b0   07 16 a0 5c 0f 16 98 5c  05 18 8c 58 0b 16 80 5c   ...\...\...X...\
311c0   a0 f6 ff 09 a0 e0 2f 90  28 60 01 32 19 16 80 5c   ....../.(`.2...\
311d0   6e 13 00 0b 07 16 a0 5c  0f 16 98 5c 90 e0 97 8c   n......\...\....
311e0   19 16 80 5c 1a 16 88 5c  18 f7 ff 09 1c 00 00 08   ...\...\........
311f0   07 16 a0 5c 0f 16 98 5c  90 e0 97 8c 19 16 80 5c   ...\...\.......\
31200   1a 16 88 5c fc f6 ff 09  80 a8 02 5a 4c 02 00 12   ...\.......ZL...
31210   0a 16 80 5c 07 16 a0 5c  0f 16 98 5c 1b 16 88 5c   ...\...\...\...\
31220   90 e0 97 8c 3c f6 ff 09  30 02 00 08 00 90 1b 90   ....<...0.......
31230   03 1d 48 58 8a 30 00 5a  03 c8 18 59 89 c0 e8 58   ..HX.0.Z...Y...X
31240   04 48 1f 59 00 90 1b 92  00 50 4f 90 20 00 00 15   .H.Y.....PO. ...
31250   1c 20 06 35 90 e0 8f 8c  09 16 80 5c 0f 16 90 5c   . .5.......\...\
31260   07 16 98 5c 4c f6 ff 09  f0 01 00 08 09 16 80 5c   ...\L..........\
31270   e0 f3 ff 0b 18 30 00 5a  10 16 40 5c 0c 00 00 12   .....0.Z..@\....
31280   08 c0 42 36 0b 16 40 5c  40 a0 02 3a 34 00 52 36   ..B6..@\@..:4.R6
31290   0c 30 00 5a 08 81 52 59  30 00 00 15 90 e0 97 8c   .0.Z..RY0.......
312a0   0a 16 80 5c 07 16 a0 5c  0f 16 98 5c 1b 16 88 5c   ...\...\...\...\
312b0   b0 f5 ff 09 00 00 28 8c  05 16 50 5c 0c 00 00 08   ......(...P\....
312c0   00 00 28 8c 05 16 50 5c  07 16 a0 5c 0f 16 98 5c   ..(...P\...\...\
312d0   90 e0 97 8c 08 16 88 5c  09 16 80 5c 24 f6 ff 09   .......\...\$...
312e0   80 a8 02 5a 74 01 00 12  0a 16 80 5c 07 16 a0 5c   ...Zt......\...\
312f0   0f 16 98 5c 1b 16 88 5c  90 e0 97 8c 64 f5 ff 09   ...\...\....d...
31300   58 01 00 08 20 20 03 35  1c a0 02 3a 90 e0 97 8c   X...  .5...:....
31310   81 89 82 59 07 16 a0 5c  0f 16 98 5c 08 16 88 5c   ...Y...\...\...\
31320   40 f5 ff 09 00 90 1b 90  03 1d 48 58 0f 16 88 5c   @.........HX...\
31330   03 c8 18 59 89 c0 48 58  04 48 1a 59 00 90 1b 92   ...Y..HX.H.Y....
31340   90 e0 1f 90 00 50 82 90  01 c8 18 59 90 e0 1f 92   .....P.....Y....
31350   00 d0 01 86 00 28 03 5a  00 01 00 12 80 a8 02 5a   .....(.Z.......Z
```

```
Mar 27 10:20 1996  image.txt Page 309

31360   f8 00 00 12 90 e0 97 8c  81 89 82 59 07 16 a0 5c   ............Y...\
31370   01 16 98 5c 08 16 88 5c  e8 f4 ff 09 dc 00 50 08   ...\...\........
31380   2c a0 06 32 00 90 1b 90  03 1a 58 58 90 e0 57 90   ,..2......XX..W.
31390   03 c8 18 59 8b c0 e8 58  04 48 ff 59 00 90 16 92   ...Y...X.H.Y....
313a0   00 50 ff 90 00 d0 50 92  60 00 00 08 2c 60 04 32   .P....P.....,`.2
313b0   00 90 1b 90 03 1d 48 58  90 e0 e1 90 03 c8 18 59   ......HX.......Y
313c0   89 c0 50 58 04 88 1a 59  00 90 1b 92 00 90 1a 90   ..PX...Y........
313d0   00 a0 e8 ca 84 00 00 08  00 90 1b 90 03 1c 58 58   ..............XX
313e0   90 e0 4f 90 03 c8 18 59  8b c0 e8 58 04 48 ff 59   ..O....Y...X.H.Y
313f0   00 90 1b 92 00 50 ff 90  00 a0 48 92 5c 00 00 08   .....P....H.\...
31400   20 20 03 33 1c a0 02 3a  90 e0 97 8c 81 89 82 59     .3...:........Y
31410   07 16 a0 5c 0f 16 98 5c  08 16 88 5c 44 f4 ff 09   ...\...\...\D...
31420   90 e0 ff 90 0f 16 88 5c  01 c8 18 59 90 e0 ff 52   .......\...Y...R
31430   00 50 83 c0 00 d0 01 86  20 20 03 32 1c a0 02 3a   .P......  .2...:
31440   90 e0 97 8c 81 89 82 59  07 16 a0 5c 0f 16 98 5c   .......Y...\...\
31450   08 16 88 5c 0c f4 ff 09  01 48 60 59 00 50 53 c0   ...\.....HKY.PS.
31460   80 a8 02 5a 54 f5 ff 15  90 e0 87 90 40 e0 c7 b0   ...ZT.......@...
31470   00 00 00 0a 00 00 00 00  00 00 00 00 00 00 00 00   ................
31480   30 31 32 33 34 35 36 37  38 39 61 62 63 64 65 66   0123456789abcdef
31490   00 00 00 00 00 00 00 00  00 00 00 00 00 00 00 00   ................
314a0   58 0a 03 00 78 0a 03 00  78 0a 03 00 64 0a 03 00   X...x...x...d...
314b0   78 0a 03 00 78 0a 03 00  78 0a 03 00 78 0a 03 00   x...x...x...x...
314c0   78 0a 03 00 78 0a 03 00  78 0a 03 00 50 0a 03 00   x...x...x...P...
314d0   78 0a 03 00 44 0a 03 00  78 0a 03 00 78 0a 03 00   x...D...x...x...
314e0   6c 0a 03 00 f8 0c 03 00  00 14 03 00 bc 0e 03 00   l...............
314f0   b8 0c 03 00 00 14 03 00  b8 0c 03 00 00 14 03 00   ................
31500   00 14 03 00 00 14 03 00  00 14 03 00 00 14 03 00   ................
31510   00 14 03 00 00 14 03 00  10 0d 03 00 00 14 03 00   ................
31520   00 14 03 00 00 14 03 00  00 14 03 00 00 14 03 00   ................
31530   d8 0d 03 00 00 14 03 00  00 14 03 00 f0 0d 03 00   ................
31540   00 14 03 00 00 14 03 00  00 14 03 00 00 14 03 00   ................
*
31560   00 14 03 00 00 0d 03 00  04 13 03 00 c4 0e 03 00   ................
31570   b8 0c 03 00 b8 0c 03 00  b8 0c 03 00 00 14 03 00   ................
31580   c4 0e 03 00 00 14 03 00  00 14 03 00 00 14 03 00   ................
31590   00 14 03 00 80 13 03 00  18 0d 03 00 d4 0e 03 00   ................
315a0   00 14 03 00 00 14 03 00  2c 12 03 00 00 14 03 00   ........,.......
315b0   e0 0d 03 00 00 14 03 00  00 14 03 00 fc 0d 03 00   ................
315c0   00 10 1c 90 01 c8 18 59  00 10 1c 92 11 16 80 5c   .......Y.......\
315d0   00 90 04 d8 00 00 00 0a  00 00 00 00 00 00 00 00   ................
```

Mar 27 18:20 1996 image.txt Page 310

```
315e0   00 50 5c 90 00 1d 18 58   90 e0 00 5a 81 c9 1a 59   .P\....X...Z...Y
315f0   00 50 1c 92 12 16 48 5c   08 00 00 15 00 00 00 0a   .P....H\........
31600   1c 48 52 59 0c a0 02 5a   0a 16 d0 5c 54 e6 ff 09   .HRY...Z...\T...
31610   0c 60 1a 90 0a 30 00 5a   04 ce 18 58 0c 60 1a 92   .`...0.Z...X.`..
31620   04 60 1a 90 01 c8 18 59   04 60 1a 92 00 50 1a 90   .`.....Y.`...P..
31630   01 c9 18 59 00 50 1a 92   08 00 00 15 00 00 00 0a   ...Y.P..........
31640   0a 16 80 5c 4c e6 ff 08   00 00 00 00 00 00 00 00   ...\L...........
31650   00 14 10 8c 28 00 00 00   1e 16 a0 5c 00 1e f0 5c   ....(......\...\
31660   00 50 ec c0 2c 60 07 5a   18 0e ec 59 98 4d e1 59   .P..,`.Z...Y.M.Y
31670   00 50 94 c0 10 80 ec 3d   01 1e 80 5c 00 10 05 64   .P.....=...\...d
31680   00 00 00 0a 01 48 8c 59   00 50 9c c0 e4 ff 04 3d   .....H.Y.P.....=
31690   00 1e 80 5c 00 10 05 64   00 00 00 00 00 00 00 00   ...\...d........
316a0   b0 61 08 8c 40 e0 c7 b2   00 1e 28 5c c4 e1 2f 92   .a..@.....(\../.
316b0   c0 e1 2f 92 10 16 78 5c   c0 e1 87 8c 05 16 30 5c   ../...x\......0\
316c0   05 16 20 5c c8 e1 27 92   05 16 70 5c 11 16 c8 5c   .. \..'...p\...\
316d0   12 16 88 5c 12 16 a0 5c   13 16 90 5c 13 16 d8 5c   ...\...\...\...\
316e0   01 1e 20 5c cc e1 27 92   04 16 38 5c d4 fe ff 09   .. \..'...8\....
316f0   00 1d 58 58 90 e0 02 5a   10 16 40 5c b8 0b 00 12   ..XX...Z..@\....
31700   1a 16 90 5c 08 16 80 5c   c0 e1 8f 8c d4 fe ff 09   ...\...\........
31710   00 d0 1b c0 80 e8 00 5a   9c 0b 00 12 c4 e1 2f 90   .......Z....../.
31720   05 16 70 5c 05 16 20 5c   d0 e1 27 92 05 58 29 58   ..p\.. \..'..X)X
31730   d4 e1 2f 92 00 d0 eb c0   d0 e1 2f 90 05 16 60 5c   ../......./...`\
31740   d4 e1 27 90 9d 20 01 5a   05 16 48 5c 05 16 20 5c   ..'.. .Z..H\.. \
31750   d8 e1 27 92 dc e1 27 92   ec 00 00 12 80 68 07 5a   ..'...'......h.Z
31760   54 0b 00 12 00 14 40 8c   00 00 00 00 00 30 68 8c   T.....@......0h.
31770   6c 17 03 00 0d 01 6a 59   00 74 1b 8c b1 06 03 00   l.....jY.t......
31780   1d c0 18 59 00 d0 18 80   74 e0 18 30 1a 16 88 5c   ...Y....t..0...\
31790   c0 e1 87 8c 1b 16 90 5c   28 fe ff 09 00 74 1b 8c   .......\(....t..
317a0   b1 06 03 00 10 c0 18 59   00 d0 18 80 10 16 40 5c   .......Y......@\
317b0   dc ff 18 37 1a 16 90 5c   c0 e1 8f 8c 08 16 80 5c   ...7...\.......\
317c0   20 fe ff 09 00 d0 eb c0   00 74 1b 8c b1 06 03 00    ........t......
317d0   1d c0 18 59 00 d0 18 80   5c e0 18 30 00 74 eb 8c   ...Y....\..0.t..
317e0   b1 06 03 00 01 c8 7b 59   00 d0 1b c0 1d c0 18 59   ......{Y.......Y
317f0   00 d0 18 80 f0 ff 18 37   3c 00 00 08 00 d0 1b c0   .......7<.......
31800   01 c8 7b 59 c0 e1 87 8c   1a 16 88 5c 1b 16 90 5c   ..{Y.......\...\
31810   b0 fd ff 09 83 20 04 5a   10 16 40 5c 18 00 00 12   ..... .Z..@\....
31820   1a 16 90 5c 08 16 80 5c   c0 e1 8f 8c b4 fd ff 09   ...\...\........
31830   84 0a 00 08 00 d0 eb c0   d4 e1 2f 90 9d 60 01 5a   ........../..`.Z
31840   1c ff ff 15 01 e0 eb c0   05 98 1a 58 01 c8 7b 59   ...........X..{Y
31850   0c c0 e8 3d 07 16 60 5c   01 c8 7b 59 00 d0 6b c0   ...=..`\..{Y..k.
```

Mar 27 16:20 1996 image.txt Page 311

```
31860   00 14 e8 8c 00 00 00 00  00 30 c0 8c 68 18 03 00   .........0..h...
31870   1a 41 c7 59 00 34 1e 8c  b1 06 03 00 0a c0 18 59   .A.Y.4.........Y
31880   00 d0 18 80 3c e0 10 30  00 34 9e 8c b1 06 03 00   ....<..0.4......
31890   05 18 94 58 01 c8 60 59  00 50 10 20 00 d0 7b c0   ...X..`Y.P. ..{.
318a0   09 90 4a 70 13 c0 18 59  00 d0 e8 80 92 c1 1b 59   ..Jp...Y.......Y
318b0   09 c0 48 59 02 6f 07 5a  0a 16 78 5c d8 ff ff 17   ..HY.o.Z..x\....
318c0   00 d0 eb c0 83 5e 1b 59  1c c0 e8 3a 07 16 28 5c   .....^.Y...:..(\
318d0   dc e1 2f 92 0e 16 20 5c  cc e1 27 92 01 c8 7b 59   ../... \..'...{Y
318e0   40 00 00 08 06 18 1b 58  1c c0 e8 3a 02 1e 28 5c   @......X...:..(\
318f0   d8 e1 2f 92 05 16 20 5c  cc e1 27 92 01 c8 7b 59   ../... \..'...{Y
31900   20 00 00 08 82 de 1e 59  1a c0 e8 3a 07 16 28 5c    ......Y...:..(\
31910   d8 e1 2f 92 07 16 20 5c  cc e1 27 92 01 c8 7b 59   ../... \..'...{Y
31920   00 d0 eb c0 06 d8 1e 58  4c c0 e8 3a 63 00 18 8c   .......XL..:c...
31930   44 c0 e8 3a 6e 00 18 8c  3c c0 e8 3a d4 e1 2f 90   D..:n...<..:../.
31940   34 40 e9 3a 1a 16 88 5c  c0 e1 87 8c 1b 16 90 5c   4@.:...\.......\
31950   70 fc ff 09 00 34 1e 8c  b1 06 03 00 10 c0 18 59   p....4.........Y
31960   00 d0 18 80 10 16 40 5c  dc ff 18 37 86 e0 02 5a   ......@\...7...Z
31970   44 09 00 12 00 d0 eb c0  06 d8 1c 58 d4 e1 2f 90   D..........X../.
31980   05 41 ef 59 1d e0 00 5a  2c 09 00 11 00 14 18 8c   .A.Y...Z,.......
31990   ac 09 00 00 1d dd 18 90  18 dc 00 84 07 16 28 5c   ..............(\
319a0   d8 e1 2f 92 02 1e c0 5c  0e 16 50 5c cc 00 00 08   ../....\..P\....
319b0   07 16 28 5c d8 e1 2f 92  0a 1e c0 5c 02 1e 50 5c   ..(\../....\..P\
319c0   b8 00 00 08 0e 16 c0 5c  02 1e 50 5c ac 00 00 08   .......\..P\....
319d0   07 16 28 5c d8 e1 2f 92  08 1e c0 5c 07 16 50 5c   ..(\../....\..P\
319e0   07 16 28 5c c8 e1 2f 92  90 00 00 08 07 16 28 5c   ..(\../.......(\
319f0   d8 e1 2f 92 0a 1e c0 5c  02 1e 50 5c 07 16 28 5c   ../....\..P\..(\
31a00   c8 e1 2f 92 74 00 00 08  05 18 1c 58 88 e0 00 5a   ../.t......X...Z
31a10   10 1e c0 5c 03 1e 50 5c  07 16 28 5c c8 e1 2f 92   ...\..P\..(\../.
31a20   58 00 00 15 60 e0 47 c2  1a 16 88 5c c0 e1 87 8c   X...`.G....\....
31a30   1b 16 90 5c 8c fb ff 09  10 16 68 5c bc e2 ff 0b   ...\......h\....
31a40   06 18 1e 58 24 c0 80 3d  60 e0 2f 8c 00 50 69 c2   ...X$..=`./..Pi.
31a50   1a 16 88 5c c0 e1 87 8c  1b 16 90 5c 64 fb ff 09   ...\.......\d...
31a60   10 16 40 5c 14 00 00 08  1a 16 90 5c 0d 16 80 5c   ..@\.......\...\
31a70   c0 e1 8f 8c 6c fb ff 09  8a 90 ed 70 09 30 00 5a   ....l......p.0.Z
31a80   00 14 18 8c 58 08 00 00  1d c0 68 59 08 00 00 15   ....X.....hY....
31a90   5d 01 48 8c 09 30 00 5a  60 e0 57 8c 0a 16 28 5c   ].H..0.Z`.W...(\
31aa0   e0 e1 2f 92 34 00 00 12  05 d8 1a 58 0c c0 40 3a   ../.4......X..@:
31ab0   05 58 1b 58 24 c0 40 3d  00 90 42 c2 01 88 52 59   .X.X$.@=..B...RY
31ac0   01 49 4a 59 1a 16 88 5c  c0 e1 87 8c 1b 16 90 5c   .IJY...\.......\
31ad0   f0 fa ff 09 10 16 40 5c  78 20 06 35 05 18 1c 58   ......@\x .5...X
```

```
Mar 27 18:20 1996  image.txt Page 312

31ae0   6e c0 40 3d 00 90 42 c2  01 88 52 59 01 49 4a 59   n.@=..B...RY.IJY
31af0   1a 16 88 5c c0 e1 87 8c  1b 16 90 5c c4 fa ff 09   ...\........\....
31b00   10 16 40 5c f4 e1 ff 0b  06 13 1e 58 30 c0 d0 3d   ..@\........X0..=
31b10   00 14 6e 8c 0a 08 00 00  00 90 42 c2 01 88 52 59   ..n.......B...RY
31b20   01 49 4a 59 1a 16 88 5c  c0 e1 87 8c 1b 16 90 5c   .IJY...\.......\
31b30   90 fa ff 09 10 16 40 5c  18 00 00 08 00 14 6e 8c   .......@\......n.
31b40   b2 07 00 00 0c 00 00 08  00 14 6e 8c bc 07 00 00   ..........n.....
31b50   4c 60 02 32 08 16 80 5c  0d 16 88 5c fc fa ff 0b   L`.2...\...\....
31b60   3c 20 04 3a 00 90 42 c2  01 88 52 59 1a 16 88 5c   < .:..B...RY...\
31b70   c0 e1 87 8c 10 16 90 5c  48 fa ff 09 01 6e 02 5a   ........\H....n.Z
31b80   10 16 40 5c 01 49 4a 59  14 00 00 12 08 16 80 5c   ..@\.IJY.......\
31b90   0d 16 88 5c c4 fa ff 0b  cc 3f 04 3d 1a 16 90 5c   ...\.....?.=...\
31ba0   c0 e1 8f 8c 08 16 80 5c  38 fa ff 09 e0 e1 2f 90   .......\8..../.
31bb0   0a 60 01 5a 00 90 72 c2  fc 06 00 12 0a c0 1a 59   .`.Z..r........Y
31bc0   00 d0 80 c0 0d 16 88 5c  90 fa ff 0b 80 28 04 5a   .......\.....(.Z
31bd0   e4 06 00 12 c8 e1 2f 90  24 60 01 3a 18 16 90 5c   ....../.$`.:...\
31be0   0e 16 88 5c e0 e1 2f 90  05 16 80 5c c4 e4 ff 09   ...\../....\....
31bf0   10 16 20 5c e4 e1 27 92  20 00 00 08 18 16 90 5c   .. \..'. ......\
31c00   0e 16 88 5c e0 e1 2f 90  05 16 80 5c 34 e3 ff 09   ...\../....\4...
31c10   10 16 20 5c e8 e1 27 92  c4 e1 2f 90 01 48 29 59   .. \..'.../..H)Y
31c20   c4 e1 2f 92 00 28 03 5a  7c 06 00 15 d8 e1 2f 90   ../..(.Z|...../.
31c30   44 60 01 32 00 50 1e 90  03 1d 48 58 c8 e1 2f 90   D`.2.P....HX../.
31c40   85 30 00 5a 03 c8 18 59  89 c0 48 58 04 48 1a 59   .0.Z...Y..HX.H.Y
31c50   00 50 1e 92 00 50 4a 90  10 00 00 12 e4 e1 2f 90   .P...PJ......./.
31c60   00 50 2a 92 a0 00 00 08  e8 e1 2f 90 00 50 2a 92   .P*......./..P*.
31c70   94 00 00 08 dc e1 2f 90  50 60 01 32 00 50 1e 90   ....../.P`.2.P..
31c80   03 1d e8 58 c8 e1 2f 90  85 30 00 5a 03 c8 18 59   ...X../..0.Z...Y
31c90   9d c0 48 58 04 48 1a 59  00 50 1e 92 00 50 ea 90   ..HX.H.Y.P...P..
31ca0   1c 00 00 12 00 30 18 8c  ff ff 00 00 e4 e1 2f 90   .....0......../.
31cb0   85 c0 18 58 00 50 1f ca  4c 00 00 08 e8 e1 2f 90   ...X.P..L...../.
31cc0   00 50 2f ca 40 00 00 08  00 50 1e 90 03 1d 48 58   .P/.@....P....HX
31cd0   c8 e1 2f 90 85 30 00 5a  03 c8 18 59 89 c0 48 58   ../..0.Z...Y..HX
31ce0   04 48 1a 59 00 50 1e 92  00 50 4a 90 10 00 00 12   .H.Y.P...PJ.....
31cf0   e4 e1 2f 90 00 50 2a 92  0c 00 00 08 e8 e1 2f 90   ../..P*......./.
31d00   00 50 2a 92 01 88 31 59  9c 05 00 08 20 20 03 35   .P*...1Y....  .5
31d10   00 50 1e 90 03 1d 50 58  03 c8 18 59 8a c0 e8 56   .P....PX...Y...X
31d20   04 48 1f 59 00 50 1e 92  00 50 57 90 0c 60 02 35   .H.Y.P...PW..`.5
31d30   00 30 48 8c ff 7f 00 00  88 e0 02 5a 78 05 00 12   .0H........Zx...
31d40   60 60 02 32 00 34 1e 8c  b1 06 03 00 08 c0 18 59   ``.2.4.........Y
31d50   00 d0 18 80 4c e0 18 37  48 c0 42 3a 0c 20 03 35   ....L..7H.B:. .5
```

Mar 27 18:20 1996 image.txt Page 315

```
31d60   00 90 42 c2 01 88 52 59  01 49 4a 59 1a 16 88 5c   ..B...RY.IJY...\
31d70   c0 e1 87 8c 1b 16 90 5c  48 f8 ff 09 09 30 00 5a   .......\H....0.Z
31d80   10 16 40 5c 1c 00 00 12  00 34 1e 8c b1 06 03 00   ..@\.....4......
31d90   08 c0 18 59 00 d0 18 80  08 e0 18 37 c0 df 42 3d   ...Y.......7..B=
31da0   0c 20 03 35 00 90 72 c2  01 88 31 59 88 e0 02 5a   . .5..r...1Y...Z
31db0   c4 e1 2f 90 01 48 29 59  c4 e1 2f 92 f8 04 00 12   ../..H)Y../.....
31dc0   1a 16 90 5c c0 e1 8f 8c  08 16 80 5c 14 f8 ff 09   ...\.......\....
31dd0   d4 04 00 08 20 20 03 35  00 50 1e 90 03 1a e8 58   ....  .5.P.....X
31de0   03 c8 18 59 9d c0 e8 58  04 48 1f 59 00 50 1e 92   ...Y...X.H.Y.P..
31df0   00 50 57 90 08 60 02 35  07 16 48 5c 1a 16 88 5c   .PW..`.5..H\...\
31e00   c0 e1 87 8c 1b 16 90 5c  8d f7 ff 09 90 e0 02 5a   ...............Z
31e10   10 16 40 5c a0 04 00 12  38 60 02 32 34 c0 42 3a   ..@\....8`.24.B:
31e20   0c 20 03 35 00 90 42 c2  01 88 52 59 1a 16 88 5c   . .5..B...RY...\
31e30   c0 e1 87 8c 1b 16 90 5c  88 f7 ff 09 01 68 02 5a   .......\.....h.Z
31e40   10 16 40 5c 01 49 4a 59  08 00 00 12 d4 df 42 3d   ..@\.IJY......B=
31e50   1a 16 90 5c c0 e1 8f 8c  08 16 80 5c 84 f7 ff 09   ...\.......\....
31e60   08 20 03 35 01 88 31 59  c4 e1 2f 90 01 48 29 59   . .5..1Y../..H)Y
31e70   c4 e1 2f 92 30 04 00 08  1a 16 90 5c c0 e1 8f 8c   ../.0......\....
31e80   08 16 80 5c 5c f7 ff 09  08 60 02 35 5d 01 48 8c   ...\\....`.51.H.
31e90   1a 16 80 5c 1b 16 a8 5c  19 16 98 5c 09 16 88 5c   ...\...\...\...\
31ea0   d8 e1 2f 90 05 16 90 5c  0c 16 a0 5c fc 06 00 0b   ../....\...\....
31eb0   90 30 00 5a 10 16 40 5c  fc 03 00 12 c0 e1 1f 90   .0.Z..@\........
31ec0   0c 30 00 5a 83 00 1a 59  c0 e1 1f 92 08 00 00 15   .0.Z...Y........
31ed0   01 88 31 59 c4 e1 2f 90  01 48 29 59 c4 e1 2f 92   ..1Y../..H)Y../.
31ee0   c4 03 00 08 cc e1 2f 90  00 68 01 5a f0 00 00 12   ....../..h.Z....
31ef0   08 60 02 35 5d 01 48 8c  09 30 00 5a 60 e0 57 8c   .`.51.H..0.Z`.W.
31f00   0a 16 28 5c ec e1 2f 92  5c 00 00 12 00 34 1e 8c   ..(\../.\....4..
31f10   b1 06 03 00 08 c0 18 59  00 d0 18 80 07 18 68 58   .......Y......hX
31f20   44 e0 38 30 00 90 42 c2  01 88 52 59 01 49 4a 59   D.80..B...RY.IJY
31f30   1a 16 88 5c c0 e1 87 8c  1b 16 90 5c 84 f6 ff 09   ...\.......\....
31f40   09 30 00 5a 10 16 40 5c  1c 00 00 12 00 34 1e 8c   .0.Z..@\.....4..
31f50   b1 06 03 00 08 c0 18 59  00 d0 18 80 8d c0 18 58   .......Y.......X
31f60   c4 ff 00 3d 00 90 72 c2  60 e0 1f c0 80 e8 00 5a   ...=..r.`......Z
31f70   44 03 00 12 1a 16 90 5c  c0 e1 8f 8c 08 16 80 5c   D......\.......\
31f80   60 f6 ff 09 60 e0 1f c0  80 e8 00 5a 28 03 00 12   `...`......Z(...
31f90   0e 16 88 5c 10 1e 90 5c  ec e1 2f 90 05 16 80 5c   ...\...\../....\
31fa0   10 e1 ff 09 0c 30 00 5a  50 e0 87 92 0c 01 00 15   .....0.ZP.......
31fb0   00 50 1e 90 03 1a 48 58  01 88 31 59 03 c8 18 59   .P....HX..1Y...Y
31fc0   89 c0 e8 58 04 48 1f 59  00 50 1e 92 50 e0 4f 90   ...X.H.Y.P..P.O.
31fd0   00 50 1f 90 00 d0 48 92  e0 00 00 08 1a 16 90 5c   .P....H........\
```

Mar 27 18:20 1996 image.txt Page 314

```
31fe0   c0 e1 8f 8c 08 16 80 5c  f8 f5 ff 09 05 18 1c 58   .......\.......X
31ff0   61 e0 57 8c 60 e0 1f c2  08 1e 48 5c c0 e1 87 8c   a.W.`.....H\....
32000   1a 16 88 5c 1b 16 90 5c  8e f3 ff 09 00 34 1e 8c   ...\...\.....4..
32010   b1 06 03 00 10 c0 1a 59  00 d0 18 80 10 16 40 5c   .......Y......@\
32020   07 ef 00 5a 07 18 6e 58  44 00 00 10 01 6e 02 5a   ...Z..nXD....n.Z
32030   00 90 42 c2 01 88 52 59  01 49 4a 59 30 00 00 12   ..B...RY.IJY0...
32040   1a 16 88 5c c0 e1 87 8c  1b 16 90 5c 74 f5 ff 09   ...\.......\t...
32050   00 34 1e 8c b1 06 03 00  10 c0 18 59 00 d0 18 80   .4.........Y....
32060   10 16 40 5c 83 40 1b 58  c4 ff 00 3d 60 e0 1f c0   ..@\.@.X...=`...
32070   d0 e8 00 5a 40 02 00 12  0c 30 00 5a 00 90 72 c2   ...Z@....0.Z..r.
32080   38 00 00 13 00 50 1e 90  03 1d e8 58 60 e0 87 8c   8....P.....X`...
32090   03 c8 18 59 9d c0 48 58  04 48 1a 59 00 50 1e 92   ...Y..HX.H.Y.P..
320a0   00 50 1a 90 0e 16 88 5c  10 1e 90 5c 04 e0 ff 09   .P.....\...\....
320b0   00 d0 80 92 01 88 31 59  c4 e1 2f 90 01 48 29 59   ......1Y../..H)Y
320c0   c4 e1 2f 92 e0 01 00 08  c0 e1 2f 90 e8 e1 2f 92   ../......./.../.
320d0   54 f5 ff 08 1a 16 88 5c  c0 e1 87 8c 1b 16 90 5c   T......\.......\
320e0   e0 f4 ff 09 90 e0 02 5a  10 16 40 5c c8 01 00 12   .......Z..@\....
320f0   1a 16 90 5c 08 16 80 5c  c0 e1 8f 8c e4 f4 ff 09   ...\...\........
32100   01 c8 7b 59 00 d0 eb c0  06 98 1f 58 60 e0 57 8c   ..{Y.......X`.W.
32110   9d e0 00 5a 0a 16 c0 5c  18 00 00 15 00 90 5a c2   ...Z...\......Z.
32120   01 88 52 59 07 16 68 5c  01 c8 7b 59 08 00 00 08   ..RY..h\..{Y....
32130   0e 16 68 5c 00 d0 1b c0  06 58 ef 58 18 40 1f 3d   ..h\.....X.X.@.=
32140   01 c8 7b 59 00 d0 1b c0  0c e0 00 3a 00 90 ea c2   ..{Y.......:....
32150   01 88 52 59 00 d0 1b c0  1c 40 1f 3a 00 d0 1b c0   ..RY.....@.:....
32160   01 c8 7b 59 00 90 1a c2  00 d0 1b c0 01 88 52 59   ..{Y..........RY
32170   ec 5f 1f 3d 09 30 00 5a  00 90 72 c2 0c 00 00 15   ._.=.0.Z..r.....
32180   00 30 48 8c ff 7f 00 00  20 20 03 35 00 50 1e 90   .0H.....  .5.P..
32190   03 1d e8 58 03 c8 18 59  9d c0 50 58 04 88 1a 59   ...X...Y..PX...Y
321a0   00 50 1e 92 00 90 52 90  1a 16 88 5c c0 e1 87 8c   .P....R....\....
321b0   1b 16 90 5c 0c f4 ff 09  10 16 40 5c 18 16 88 5c   ...\......@\...\
321c0   98 f4 ff 0b 0d 20 04 5a  ec 00 00 12 1a 16 90 5c   ..... .Z.......\
321d0   08 16 80 5c c0 e1 8f 8c  08 f4 ff 09 58 60 02 32   ...\........X`.2
321e0   1a 16 88 5c c0 e1 87 8c  1b 16 90 5c d4 f3 ff 09   ...\.......\....
321f0   10 16 40 5c 18 16 88 5c  60 f4 ff 0b 38 00 6c 32   ..@\...\`...8.l2
32200   0c 20 03 35 00 90 42 c2  01 88 52 59 01 4b 4a 5a   . .5..B...RY.KJZ
32210   24 00 00 12 1a 16 88 5c  c0 e1 87 8c 1b 16 90 5c   $......\.......\
32220   a0 f3 ff 09 10 16 40 5c  18 16 88 5c 2c f4 ff 0b   ......@\...\,...
32230   d0 1f 6c 35 1a 16 90 5c  08 16 80 5c c0 e1 8f 8c   ..l5...\...\....
32240   a0 f3 ff 09 0c 30 00 5a  00 90 72 c2 08 00 00 15   .....0.Z..r.....
32250   01 88 31 59 c4 e1 2f 90  01 48 29 59 c4 e1 2f 92   ..1Y../..H)Y../.
```

```
Mar 27 15:20 1996  image.txt Page 318

32260   44 00 00 08 d4 e1 2f 90  4c 40 41 3a c0 e1 87 8c   D....../.L@A-....
32270   1a 16 d8 5c 1b 16 90 5c  48 f3 ff 09 c0 e1 87 8c   ...\...\H.......
32280   1a 16 d8 5c 1b 16 90 5c  38 f3 ff 09 10 16 40 5c   ...\...\8.....@\
32290   1a 16 90 5c c0 e1 8f dc  48 f3 ff 09 08 00 00 08   ...\....H.......
322a0   14 00 00 08 01 e0 1b c0  01 c8 7b 59 80 ed 00 5a   ..........{Y...Z
322b0   84 f4 ff 15 c4 e1 2f 90  10 60 01 3a 06 16 80 5c   ....../..`.:...\
322c0   40 e0 c7 b0 00 00 00 0a  08 c0 42 3a 0e 16 5b 5c   @.........B:..[\
322d0   08 16 80 5c 40 e0 c7 b0  00 00 00 0a 00 00 00 00   ...\@...........
322e0   30 31 00 00 00 00 00 00  00 00 00 00 00 00 00 00   01..............
322f0   00 00 00 00 00 00 30 31  32 33 34 35 36 37 00 00   ......01234567..
32300   00 00 00 00 00 00 00 00  00 00 00 00 30 31 32 33   ............0123
32310   34 35 36 37 38 39 00 00  00 00 00 00 00 00 00 00   456789..........
32320   00 00 30 31 32 33 34 35  36 37 38 39 61 62 63 64   ..0123456789abcd
32330   65 66 41 42 43 44 45 46  00 00 00 00 00 00 00 00   efABCDEF........
32340   64 22 03 00 a0 22 03 00  a0 22 03 00 a0 22 03 00   d"..."..."..."..
32350   a0 22 03 00 a0 22 03 00  a0 22 03 00 a0 22 03 00   ."..."..."..."..
*
323b0   a0 22 03 00 9c 19 03 00  a0 22 03 00 b0 19 03 00   ."......."......
323c0   78 1e 03 00 a0 22 03 00  78 1e 03 00 a0 22 03 00   x...."..x...."..
323d0   a0 22 03 00 a0 22 03 00  a0 22 03 00 a0 22 03 00   ."..."..."..."..
323e0   a0 22 03 00 a0 22 03 00  d0 19 03 00 a0 22 03 00   ."..."......."..
323f0   a0 22 03 00 a0 22 03 00  a0 22 03 00 a0 22 03 00   ."..."..."..."..
32400   ec 19 03 00 a0 22 03 00  a0 22 03 00 08 1a 03 00   ....."..."......
32410   a0 22 03 00 a0 22 03 00  d4 20 03 00 a0 22 03 00   ."..."... ...."..
32420   a0 22 03 00 a0 22 03 00  a0 22 03 00 a0 22 03 00   ."..."..."..."..
32430   a0 22 03 00 a4 19 03 00  d4 1d 03 00 b8 19 03 00   ."..............
32440   78 1e 03 00 78 1e 03 00  78 1e 03 00 a0 22 03 00   x...x...x...."..
32450   c4 19 03 00 a0 22 03 00  a0 22 03 00 a0 22 03 00   ....."..."..."..
32460   a0 22 03 00 c8 20 03 00  d8 19 03 00 e4 1e 03 00   ."... ..........
32470   a0 22 03 00 a0 22 03 00  0c 1d 03 00 a0 22 03 00   ."..."......."..
32480   f4 19 03 00 a0 22 03 00  a0 22 03 00 08 1a 03 00   ....."..."......
32490   00 14 f0 8c 30 00 00 00  1e 16 a0 5c 00 1e f0 5c   ....0......\...\
324a0   04 20 8c 90 91 30 00 5a  81 49 94 59 04 20 94 92   . ...0.Z.I.Y. ..
324b0   1c 00 00 16 00 10 ec 90  01 48 9f 59 00 10 9c 92   .........H.Y....
324c0   00 50 87 80 00 10 05 64  00 00 00 0a 00 1d 80 58   .P.............X
324d0   00 10 05 64 00 00 00 00  00 00 00 00 00 00 00 00   ................
324e0   00 14 f0 8c 44 00 00 00  1e 16 a0 5c 00 1e f0 5c   ....D......\...\
324f0   04 60 ec 90 81 49 ef 59  5a 30 00 5a 04 60 ec 92   .`...I.Y.0.Z.`..
32500   20 00 00 14 00 50 ec 90  ff 00 90 8c 90 60 94 58    ....P.........X
32510   01 48 9f 59 00 50 9c 92  00 50 87 82 06 00 00 08   .H.Y.P...P......
```

```
Mar 27 18:20 1996  image.txt Page 316

32520   00 1a 90 58 12 16 80 5c  00 10 05 84 00 00 00 0a   ...X...\........
32530   00 14 f0 8c 48 00 00 00  1e 16 a0 5c 00 1e f0 5c   ....H......\...\
32540   00 10 ec c0 10 16 b8 5c  30 60 07 3a 61 00 e8 8c   .......\0`.:a...
32550   00 10 94 c0 18 40 97 3c  7a 00 98 8c 10 c0 94 39   .....@.<z......9
32560   00 b4 8c 8c e0 ff ff ff  00 10 8c c2 01 08 84 59   ...............Y
32570   00 10 94 c0 ac bf 04 3d  17 16 80 5c 00 10 05 84   .......=...\....
32580   00 00 00 0a 00 00 00 00  00 00 00 00 00 00 00 00   ................
32590   00 1e f0 5c 00 00 00 0a  00 00 00 00 00 00 00 00   ...\............
325a0   00 30 f0 8c b4 25 03 00  1e 16 e8 5c 00 1e f0 5c   .0...%.....\...\
325b0   00 50 07 84 00 00 00 0a  00 00 00 00 70 26 00 00   .P..........p&..
325c0   00 00 00 00 00 00 00 00  00 00 00 00 60 0c 06 10   ............`...
325d0   00 00 00 00 00 00 00 00  00 00 00 00 40 2f 00 00   ............@/..
325e0   00 00 ff ff 0a 00 02 00  00 00 00 00 01 00 00 00   ................
325f0   00 00 00 00 00 00 00 00  00 00 00 00 6e 78 00 00   ............nx..
32600   00 00 ff ff 0a 00 03 00  00 00 00 00 6e 78 00 00   ............nx..
32610   00 00 ff ff 0a 00 03 00  00 00 00 00 f0 74 00 00   .............t..
32620   c0 74 00 00 d0 74 00 00  00 00 00 00 80 0c 06 10   .t...t..........
32630   00 00 00 00 00 00 00 00  00 00 00 00 00 00 00 00   ................
32640   00 00 00 00 00 00 00 00  00 00 00 00 90 0c 06 10   ................
32650   00 00 00 00 00 00 00 00  00 00 00 00 00 00 00 00   ................
32660   00 00 00 00 00 00 00 00  00 00 00 00 80 0c 06 10   ................
32670   00 00 00 00 00 00 00 00  a0 0c 06 10 c0 0c 06 10   ................
32680   e0 0c 06 10 c0 0c 06 10  06 00 00 40 00 00 00 00   ...........@....
32690   00 00 00 00 00 00 00 00  00 00 00 00 00 00 00 00   ................
*
32740   00 00 00 00 00 00 00 00  00 00 00 93 00 00 00 00   ................
32750   00 00 00 00 00 00 00 00  ff ff ff ff ff ff 00 00   ................
32760   00 00 00 00 00 00 00 00  00 00 00 00 80 9c 00 00   ................
32770   00 00 ff ff 0a 00 03 00  00 00 00 00 80 9c 00 00   ................
32780   00 00 ff ff 14 00 03 00  00 00 00 00 b0 a4 00 00   ................
32790   d0 9d 00 00 90 9c 00 00  00 00 00 00 f0 0d 06 10   ................
327a0   00 00 00 00 00 00 00 00  b0 a9 00 00 80 aa 00 00   ................
327b0   00 00 00 00 00 00 00 00  00 00 00 00 00 0e 06 10   ................
327c0   00 00 00 00 00 00 00 00  10 0e 06 10 30 0e 06 10   ............0...
327d0   00 00 00 00 00 00 00 00  40 c9 05 10 00 00 00 00   ........@.......
327e0   00 00 00 00 00 00 00 00  0a 6d 67 6d 74 3a 20 45   .........mgmt: E
327f0   52 52 4f 52 3a 20 00 00  60 c4 00 00 00 00 00 00   RROR: ..`.......
32800   01 00 00 00 00 00 00 00  21 22 23 24 25 26 27 28   ........!"#$%&'(
32810   29 2a 2b 2c 2d 2e 2f 30  31 32 33 34 35 36 37 38   )*+,-./012345678
32820   00 00 00 00 00 00 00 00  59 6f 75 20 6a 75 73 74   ........You just
```

We claim:

1. Facsimile transmission apparatus for transmitting and receiving facsimile messages over a network, the apparatus comprising:

a facsimile transmission control device operative, upon occurrence of a network transmission delay which would otherwise cause an associated local transmitting facsimile device to disconnect, to supply at least one disconnection-preventing signal to the associated local transmitting facsimile device until a signal arrives from a remote receiving facsimile device via the network; and a network interface operative to interface between said facsimile transmission control device and the network.

2. Apparatus according to claim 1 wherein said disconnection-prevention signal comprises a signal causing the local transmitting facsimile device to send a training sequence signal after transmission of a page.

3. Apparatus according to claim 1 wherein said signal arriving from said receiving facsimile device comprises an acknowledgement of a portion of a facsimile message.

4. Apparatus according to claim 3 wherein said at least one disconnection-preventing signal comprises a false acknowledgement signal causing the local transmitting facsimile to resend a training signal again after transmission of a page.

5. Apparatus according to claim 1 wherein said disconnection-prevention signal comprises a facsimile transmission speed adjuster signal operative to cause the local transmitting facsimile device to reduce its speed of transmission.

6. Apparatus according to claim 5 wherein said speed adjuster signal is operative to indicate to said sending local facsimile device that a training session has failed.

7. Apparatus according to claim 1 and also comprising an interface operative to interface between said facsimile transmission control device and the local transmitting facsimile, and wherein said signal arrives from a receiving facsimile device via the network and interface switchboard.

8. Apparatus according to claim 1 wherein said disconnection-preventing signal comprises a false confirmation signal causing the local transmitting facsimile device to send the next page.

9. A facsimile transmission method for transmitting and receiving facsimile messages over a network, the method comprising:

transmitting a facsimile message over a network from a sending facsimile device to a receiving facsimile device; and upon occurrence of a network transmission delay which would otherwise cause a local one of said facsimile devices to disconnect, locally supplying at least one disconnection-preventing signal to the sending local facsimile device until a signal arrives from the receiving facsimile device via the network.

10. A method according to claim 9 wherein said disconnection-preventing signal comprises a NULL signal which causes the local facsimile device to hold traffic for a predetermined period.

11. A method according to claim 9 wherein said disconnection-preventing signal comprises a signal causing the sending local facsimile device to send a training sequence signal after sending of a page.

12. A method according to claim 9 wherein said signal arriving from said receiving facsimile device comprises an acknowledgement of a portion of a facsimile message.

13. A method according to claim 12 wherein said at least one disconnection-preventing signal comprises a false acknowledgement signal causing the sending local facsimile device to resend a training signal again after sending of a page.

14. A method according to claim 9 wherein said disconnection-preventing signal comprises a facsimile transmission speed adjuster signal operative to cause the sending local facsimile device to reduce its speed of transmission.

15. A method according to claim 9 wherein said facsimile message includes a last page and also comprising transmitting, after said last page, an additional page having a predetermined contents known to said receiving facsimile device.

16. A method according to claim 15 wherein said additional page comprises a blank page.

17. A method according to claim 9 wherein said disconnection-preventing signal comprises a false confirmation signal causing the sending local facsimile device to send the next page, and thereafter, should confirmation not arrive from the receiving facsimile device via the network, sending a disconnect signal to the sending local facsimile device.

18. A facsimile transmission apparatus for transmitting and receiving facsimile messages over a network, the apparatus comprising:

a facsimile transmission control device operative, upon occurrence of a network transmission delay which would otherwise cause an associated local transmitting facsimile device to disconnect, to supply at least one disconnection-preventing signal to the associated local receiving facsimile device until a signal arrives from a remote transmitting facsimile device via the network;

a network interface operative to interface between said facsimile transmission control device and the network; and wherein said disconnection-preventing signal is a NULL transmitting subscriber identification signal (TSI) which is repeated until real data arrives from the other side.

19. Apparatus according to claim 18 wherein said signal arriving from said local sending facsimile device comprises a portion of a facsimile message.

20. A facsimile transmission method for transmitting and receiving facsimile messages over a network, the method comprising:

transmitting a facsimile message over a network from a sending facsimile device through a receiving facsimile device;

upon occurrence of a network transmission delay which would otherwise cause a local one of said facsimile devices to disconnect, locally supplying at least one disconnection-preventing signal to the receiving local facsimile device until a signal arrives from the sending facsi wherein by the network; and wherein said disconnection-preventing signal comprises NULL transmitting transcriber identification signals (TSI) which are repeated until the real data arrives from the other side.

21. A method according to claim 20 wherein said signal arriving from said sending facsimile device comprises a portion of a facsimile message.

* * * * *